US009167228B2

(12) United States Patent
Monari et al.

(10) Patent No.: US 9,167,228 B2
(45) Date of Patent: Oct. 20, 2015

(54) INSTRUMENTED SPORTS PARAPHERNALIA SYSTEM

(71) Applicants: Lawrence Maxwell Monari, Palm Bay, FL (US); Lawrence Scott Monari, Palm Bay, FL (US)

(72) Inventors: Lawrence Maxwell Monari, Palm Bay, FL (US); Lawrence Scott Monari, Palm Bay, FL (US)

( * ) Notice: Subject to any disclaimer, the term of this patent is extended or adjusted under 35 U.S.C. 154(b) by 273 days.

(21) Appl. No.: 13/711,792

(22) Filed: Dec. 12, 2012

(65) Prior Publication Data

US 2013/0176401 A1 Jul. 11, 2013

Related U.S. Application Data

(60) Provisional application No. 61/582,637, filed on Jan. 3, 2012.

(51) Int. Cl.

*H04N 5/225* (2006.01)
*H04N 13/02* (2006.01)
*H04N 5/232* (2006.01)
*H04N 5/222* (2006.01)

(52) U.S. Cl.

CPC ............... *H04N 13/02* (2013.01); *H04N 5/222* (2013.01); *H04N 5/225* (2013.01); *H04N 5/2252* (2013.01); *H04N 5/2254* (2013.01); *H04N 5/2257* (2013.01); *H04N 5/232* (2013.01); *H04N 5/23219* (2013.01); *H04N 5/23251* (2013.01); *H04N 2213/001* (2013.01)

(58) Field of Classification Search

None

See application file for complete search history.

(56) References Cited

U.S. PATENT DOCUMENTS

| | | | | | |
|---|---|---|---|---|---|
| 5,280,904 | A | * | 1/1994 | Rodriguez | 473/477 |
| 5,489,886 | A | * | 2/1996 | Wexler et al. | 340/323 R |
| 5,553,846 | A | * | 9/1996 | Frye et al. | 473/455 |
| 5,852,754 | A | * | 12/1998 | Schneider | 396/427 |
| 6,704,044 | B1 | * | 3/2004 | Foster et al. | 348/157 |
| 6,735,382 | B2 | * | 5/2004 | Schneider | 396/26 |
| 8,237,787 | B2 | * | 8/2012 | Hollinger | 348/82 |
| 2004/0036770 | A1 | * | 2/2004 | Adams | 348/157 |
| 2004/0239759 | A1 | * | 12/2004 | Wickramaratna | 348/61 |
| 2005/0179774 | A1 | * | 8/2005 | Fletcher et al. | 348/61 |
| 2006/0273522 | A1 | * | 12/2006 | Marshall et al. | 273/407 |
| 2007/0188612 | A1 | * | 8/2007 | Carter | 348/157 |
| 2007/0260743 | A1 | * | 11/2007 | Oijer | 709/231 |

(Continued)

FOREIGN PATENT DOCUMENTS

| | | | | |
|---|---|---|---|---|
| GB | 2407725 | | * | 5/2005 |
| GB | 2407725 | A | * | 6/2006 |

(Continued)

*Primary Examiner* — Robert Hance

(57) ABSTRACT

A real time system to televise sporting events from amongst the players on the playing field is disclosed. Sports paraphernalia that are ordinarily used by the players on the playing field are instrumented with a variety of TV cameras, microphones, and bi-directional communication electronics. Sports paraphernalia like footballs, ice hockey pucks, baseball first bases, baseball second bases, baseball third bases, baseball home plates and baseball pitcher's rubbers are disclosed. The instrumentation is built into and contained within the sports paraphernalia themselves. The instrumented sports paraphernalia televise signals to an antenna array relay junction, which relays the signals to a remote base station where they are processed and finally broadcast to a TV viewing audience. The cameraman in the remote base station exercises command and control over the functions of the instrumented sports paraphernalia.

67 Claims, 108 Drawing Sheets

(56) References Cited

U.S. PATENT DOCUMENTS

| | | | | |
|---|---|---|---|---|
| 2007/0291143 | A1* | 12/2007 | Barbieri et al. | 348/264 |
| 2007/0294962 | A1* | 12/2007 | Pumford et al. | 52/116 |
| 2010/0026809 | A1* | 2/2010 | Curry | 348/157 |
| 2011/0237367 | A1* | 9/2011 | Kodama et al. | 473/570 |

FOREIGN PATENT DOCUMENTS

| | | | | |
|---|---|---|---|---|
| GB | 2487209 | A | * | 7/2012 |
| WO | WO 0002628 | A1 | * | 1/2000 |

* cited by examiner

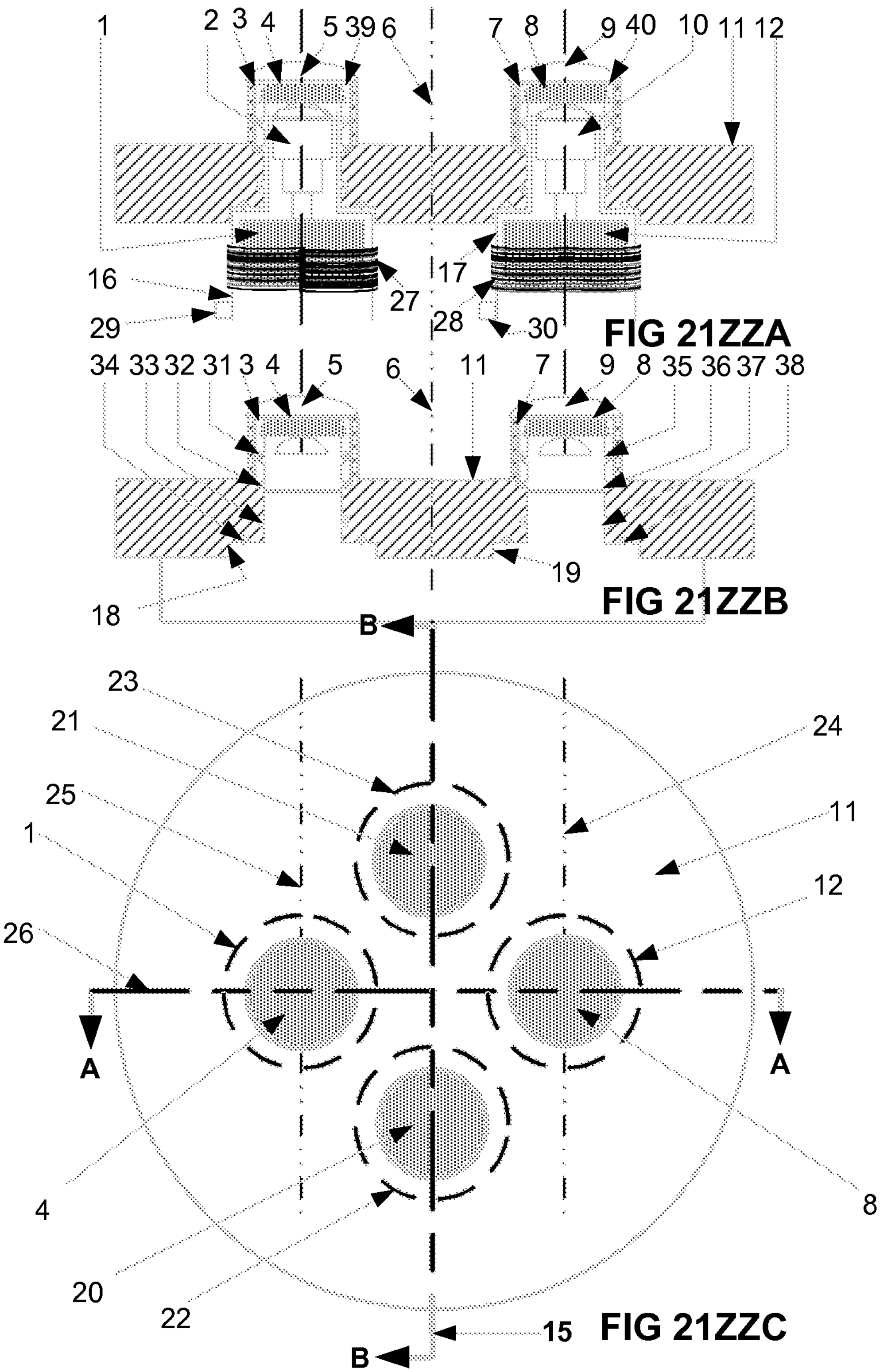
FIG 21ZZA
FIG 21ZZB
FIG 21ZZC 7
3
1
8
3
1
4
9
5
6
5
2
5
6

1
5
2

7

4

A
A
1
2
3
4
5
6
7
8
9
10
11
12
13
14
16
17
18
19
20
21
22
23
24
25
26
27
28
29
30
31
32
33
34

A
A
2
3
23
4
11
6
7
29
12
15
26
8
19
22
21
39
31
35
24
27
43
45
25
44
34
20
37
38
18
32
33
17
16
40
5
30
42
28
14
41
36
13
10

2
3
1
8
4
5
12
41
20
32
27
6
11
7
28
15
24
19
23
26
43
25
21
9
22

43
20
7
35 37
38 36 44
8
23
18
19
24
34

10
33 17 1642 26 40 29 5 30 32 31 639 14 13 12 11 25

INSTRUMENTED SPORTS PARAPHERNALIA SYSTEM

This application claims the benefit of U.S. Provisional Application No. 61/582,637, filed 3 Jan. 2012.

BACKGROUND OF THE INVENTION

1. Field of the Invention

The present invention relates generally to television broadcasting, and in particular to the television broadcasting of sports events from a system of instrumented sports paraphernalia on the playing fields/rinks of sports stadiums.

2. Description of the Prior Art

Many sports are played in sports venues including stadiums, arenas etc. Examples of these sports are football, baseball and ice hockey. Football, baseball and ice hockey are televised in these venues for entertaining TV viewing audiences, training players; and for doing instant replays.

A prior art system for capturing video and audio of these sporting events within these venues involves positioning video cameras at ground, roof and balcony locations within the sporting arena or sports stadium, around the periphery of the sporting event and outside of the actual playing field. U.S. Pat. No. 8,194,135 (James) and U.S. Pat. No. 8,184,169 (Ortiz) and U.S. Pat. No. 8,059,152 (daCosta) and U.S. Pat. No. 8,013,899 (Gillard) and U.S. Pat. No. 7,376,388 (Ortiz) and U.S. Pat. No. 7,030,906 (Auffret) and U.S. Pat. No. 6,934,510 (Katayama) and U.S. Pat. No. 6,873,355 (Thompson) and U.S. Pat. No. 6,681,398 (Verna)) and U.S. Pat. No. 5,416,513 (Morisaki) are examples. Another prior art system for capturing video and audio of these sporting events involves mounting cameras at various mobile or fixed overhead positions on cable rails deployed over the playing field. U.S. Pat. No. 8,199,197 (Bennett) and U.S. Pat. No. 7,239,106 (Rodnunsky) and U.S. Pat. No. 5,568,189 (Kneller) and U.S. Pat. No. 4,710,819 (Brown) are examples. Yet another prior art system for capturing video and audio of these sporting events involves the use of hand held cameras carried around the periphery of the sporting event and outside of the actual playing field. U.S. Pat. No. 7,128,419 (Harris) and U.S. Pat. No. 4,017,168 (Brown) are examples. Still yet another prior art system for capturing video and audio of these sporting events involves cameras mounted on blimps deployed in the air space above the playing field. U.S. Pat. No. 7,173,649 (Shannon) and U.S. Pat. No. 5,426,476 (Fussell) are examples. Other prior art systems for capturing video and audio of these sporting events involve cameras mounted on helmets and caps used by the players on the playing field. U.S. Pat. No. 6,819,354 (Foster) and U.S. Pat. No. 6,704,044 (Foster)) and U.S. Pat. No. 6,028,627 (Helmsderfer) are examples. Also, in prior art fields unrelated to television sports broadcasting, cameras have been carried aloft by sport's projectiles et al, where the cameras are used and specifically adapted to measure the path of travel of the projectiles in their flight. These projectiles concentrate on getting pictures without sound, while the projectiles are in the air, for the purpose of determining the path of the projectile. U.S. Pat. No. 6,833,849 (Kurokawa) and U.S. Pat. No. 6,995,787 (Adams) and U.S. Pat. No. 7,335,116 (Petrov) and U.S. Pat. No. 7,791,808 (French) and U.S. Pat. No. 8,085,188 (Tuxen) are examples. Projectiles in the prior art do not address the needs of broadcast television for the TV viewing audience.

It should be noted that an important consideration in meeting the needs of televising sporting events is to routinely provide high quality entertaining pictures and sounds to the TV viewing audience which contain significant aspects of the game. Prior art projectiles like those cited above have not been designed or intended or made practical or useful as suitable platforms from which to televise sporting events.

BRIEF SUMMARY OF THE INVENTION

This invention relates to a system used to televise sports events. Sports paraphernalia, which are ordinarily used by the players on the playing field during a game, are instrumented with TV cameras and microphones to televise the audio and video of the game.

SPECIFICATION

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BRIEF DESCRIPTION OF THE SEVERAL VIEWS OF THE DRAWINGS

In order to more fully understand the objects of the invention, the following detailed description of the illustrative embodiments should be read in conjunction with the appended figure drawings, wherein:

FIG. 6AA is a top view of the inflated instrumented football's bladder that is short and flat.

FIG. 6BB is a side view of the inflated instrumented football's bladder that is short and flat.

FIG. 7AA is a top view of the inflated instrumented football's bladder that is dimpled.

FIG. 7BB is an end view of the inflated instrumented football's bladder that is dimpled.

FIG. 21II shows a side view section of the Type XV buffer plate and instrumentation package assembly.

FIG. 21JJ shows a side view section of just the buffer plate alone.

FIG. 21LL shows a side view section of the Type XIV buffer plate and instrumentation package assembly.

FIG. 21MM shows a side view section of just the buffer plate alone.

FIG. 21QQ shows a side view section of the Type XIII buffer plate and instrumentation package assembly.

FIG. 21RR shows a side view section of just the buffer plate alone.

FIG. 21SS shows an end view of just the buffer plate alone.

FIG. 21ZB shows a side view section of just the buffer plate alone.

FIG. 21ZC shows an end view of just the buffer plate alone.

FIG. 21ZZA shows a side view section of the Type XII buffer plate assembly and instrumentation package assembly.

FIG. 21ZZB shows a side view section of just the buffer plate assembly alone.

FIG. 21ZZC shows an end view of just the buffer plate assembly alone.

FIG. 35B is a side view of the four camera wireless instrumentation package assembly.

FIG. 35C is a side view of the four camera wireless, fiber optics and bi-directional high speed copper network communications instrumentation package assembly.

FIG. 36A shows a side view section of the instrumentation package assembly element for instrumented baseball bases.

FIG. 36B shows a top view section of the instrumentation package assembly element for instrumented baseball bases.

FIG. 36C shows a bottom view section of the instrumentation package assembly element for instrumented baseball bases.

FIG. 36D is a block diagram of the instrumented baseball base instrumentation package assembly element electronics circuits.

FIG. 36E is a block diagram of the power supply and battery charging circuits inside the instrumentation package assembly used inside instrumented baseball bases.

FIG. 37A is a diagram of the top view of the battery pack charging unit sitting on top of and charging the instrumented baseball home plate.

FIG. 37B is a diagram of the side view of the battery pack charging unit sitting on top of and charging the instrumented baseball home plate.

FIG. 37C is a diagram of the front view of the battery pack charging unit sitting on top of and charging the instrumented baseball home plate.

FIG. 37D is a diagram of the top view of the battery pack charging unit sitting on top of and charging the instrumented baseball base.

FIG. 37E is a diagram of the side view of the battery pack charging unit sitting on top of and charging the instrumented baseball base.

Figures 37A, 37B, 37C:
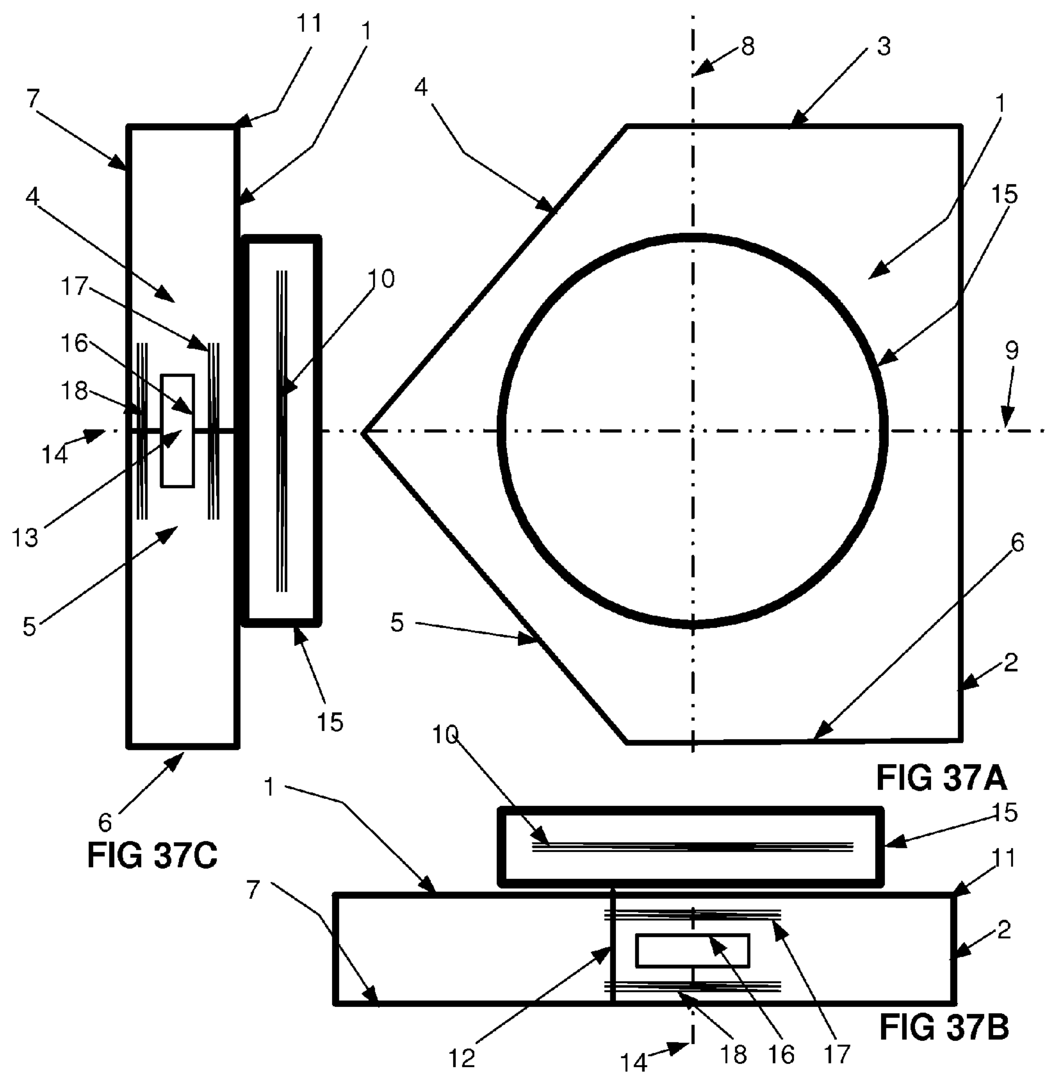
Figures 37D, 37E, 37F:
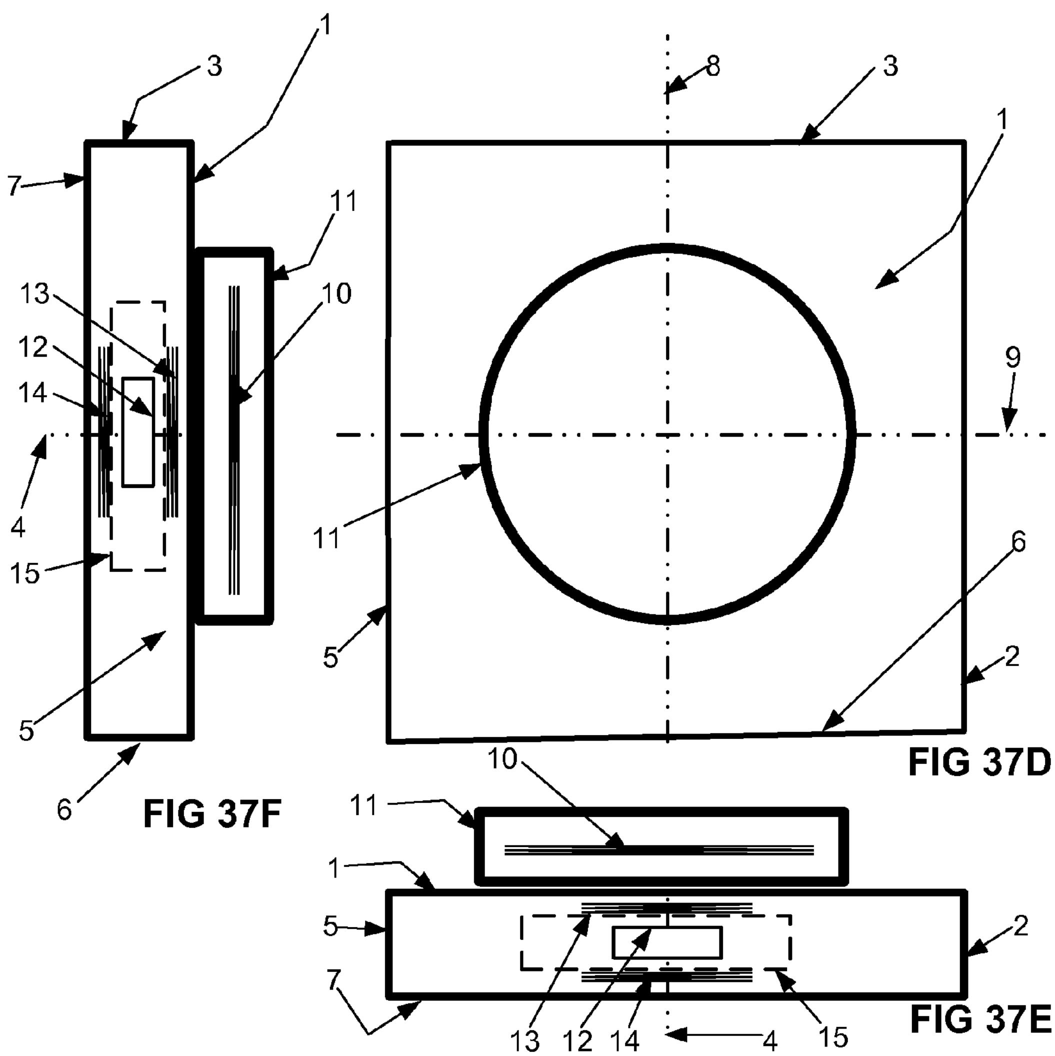

FIG. 37F is a diagram of the front view of the battery pack charging unit sitting on top of and charging the instrumented baseball base.

Figure 37G:
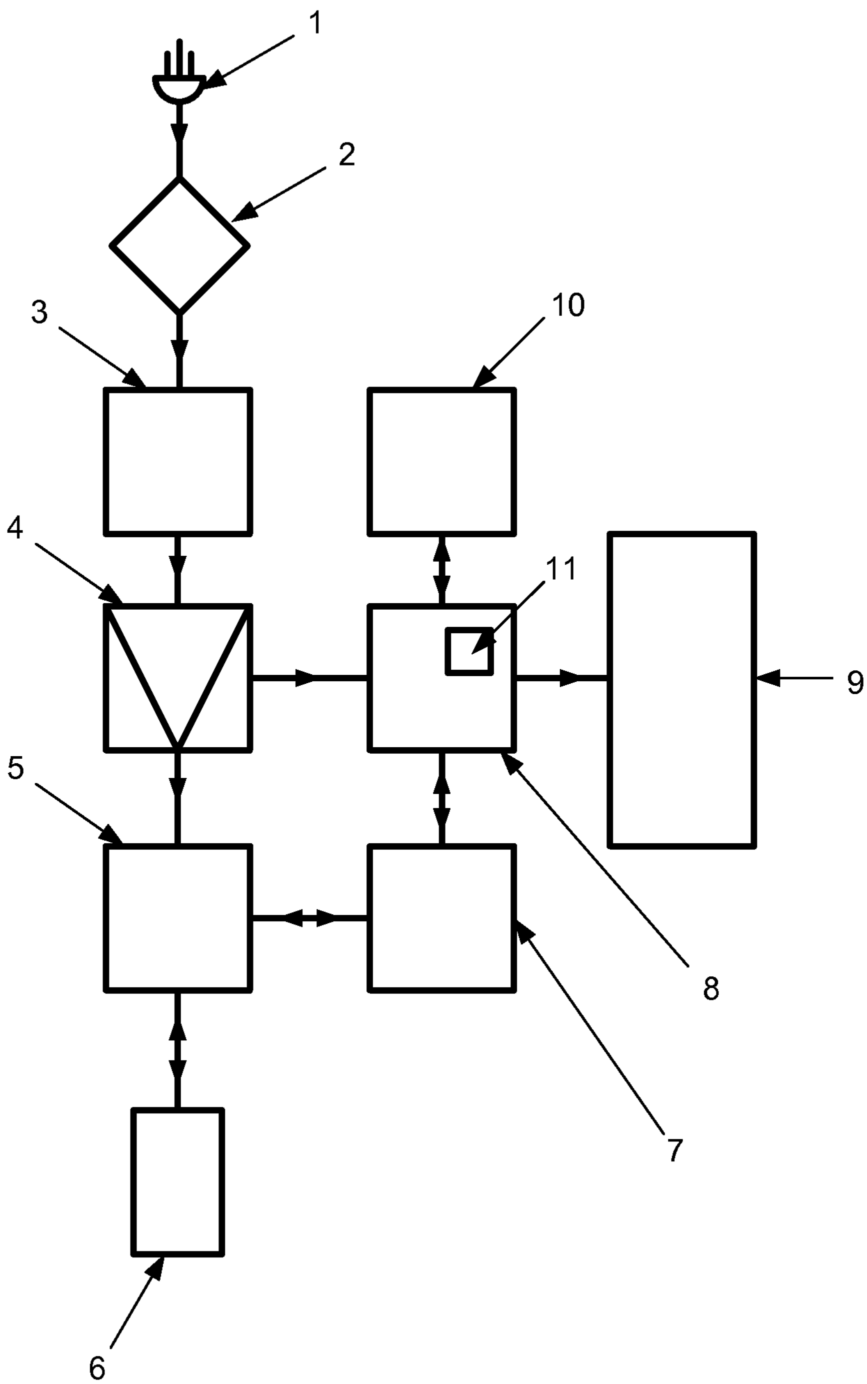

FIG. 37G is a block diagram showing the electronic circuits inside the charging station unit used to charge the battery pack inside the instrumented baseball bases and instrumented baseball home plate.

Figure 38A:
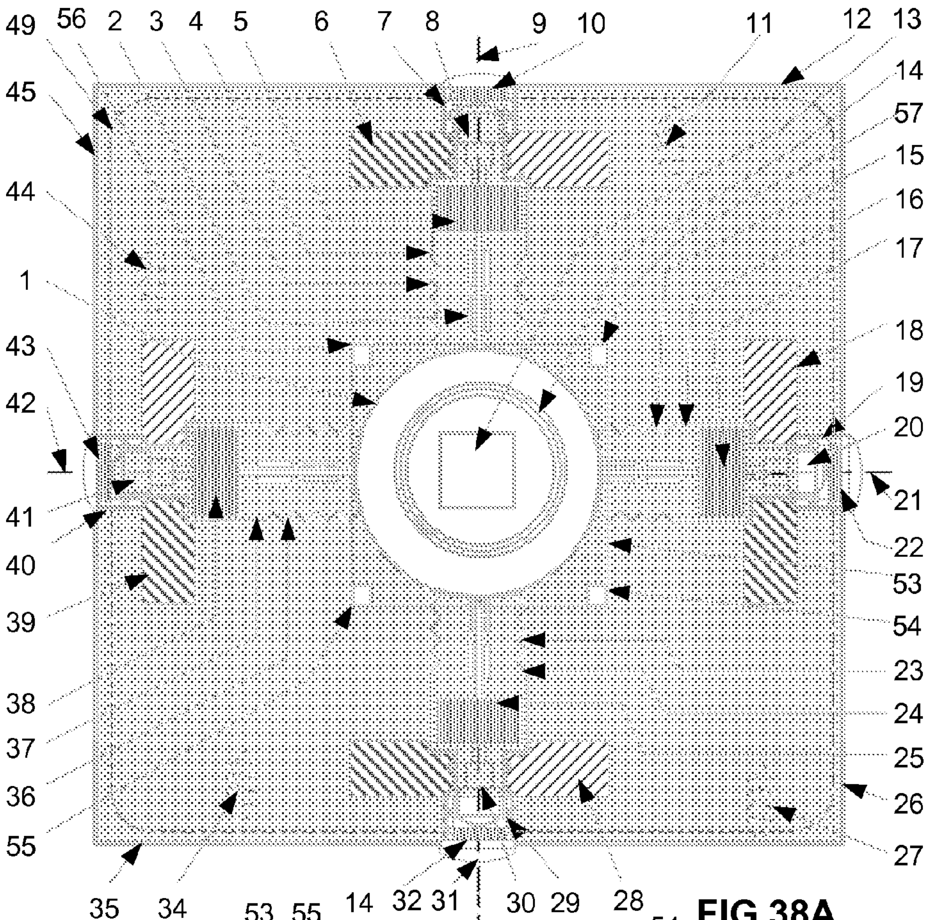

FIG. 38A is a top view of a instrumented baseball base.

Figure 38B:
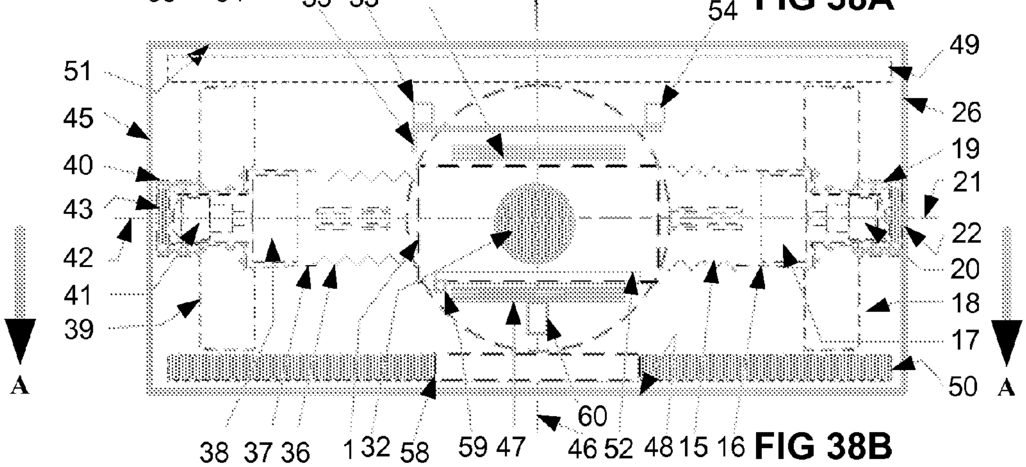

FIG. 38B is a side view of a instrumented baseball base.

Figure 39A:
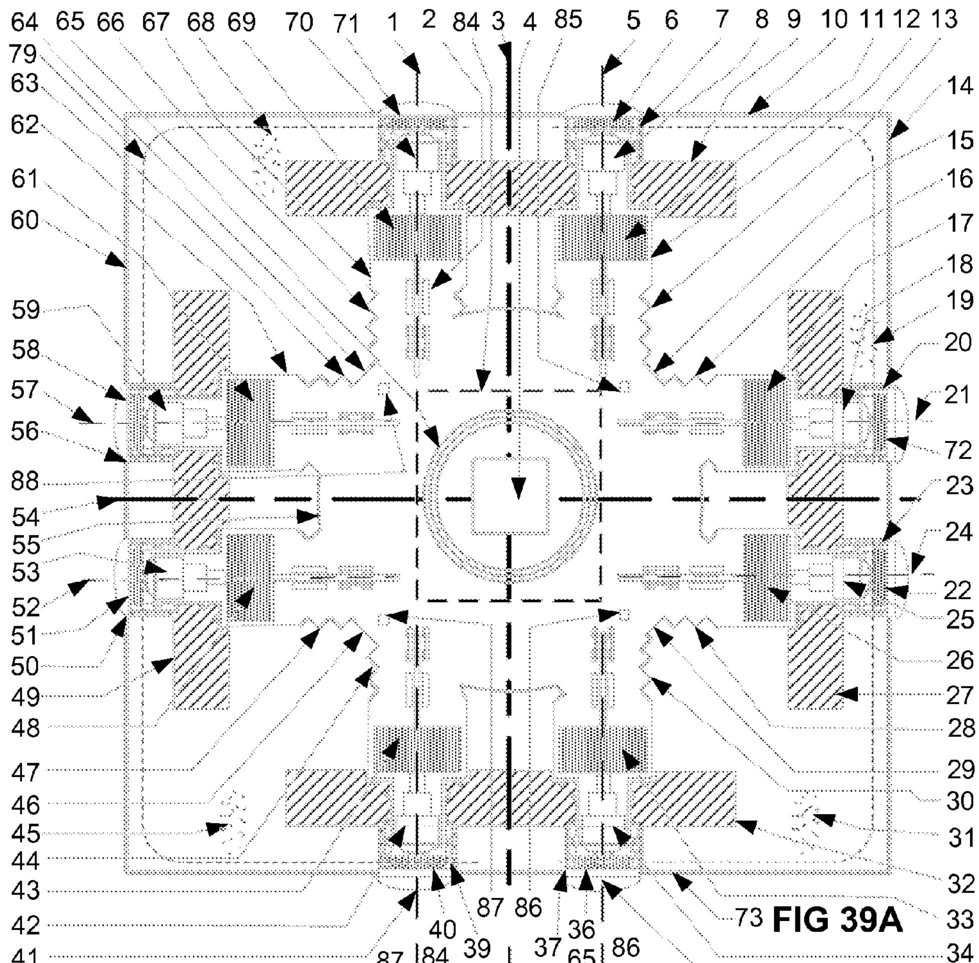

FIG. 39A is the top view of an eight camera instrumented baseball base.

Figure 39B:
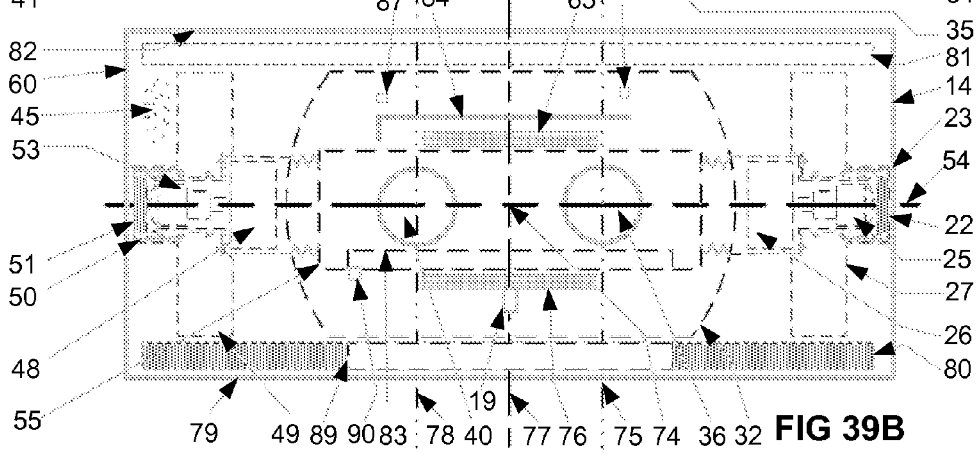

FIG. 39B is the side view of an eight camera instrumented baseball base.

Figures 40A, 40B, 40C:
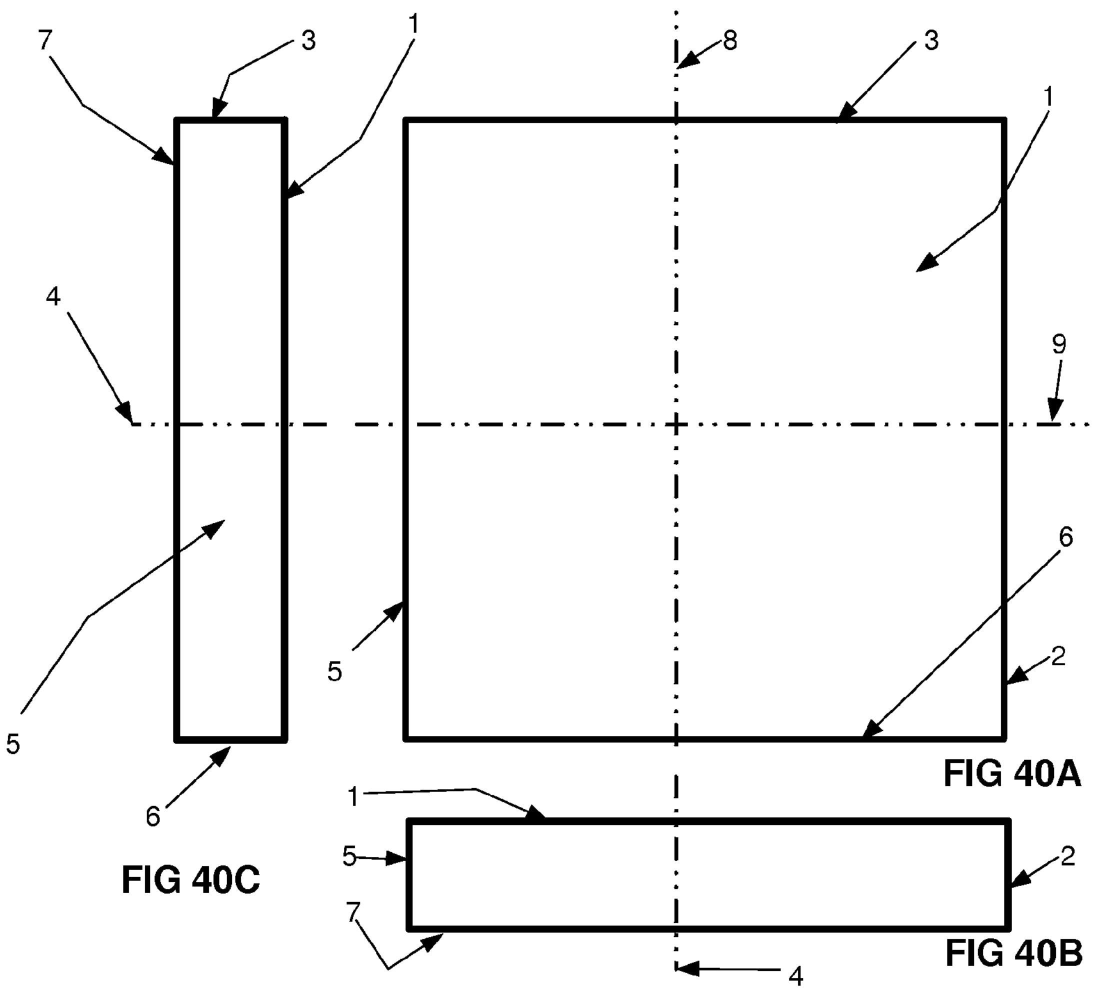

FIG. 40A is a top view of a standard conventional baseball base.

FIG. 40B is a side view of a standard conventional baseball base.

FIG. 40C is a side view of a standard conventional baseball base.

Figures 41A, 41B, 41C:
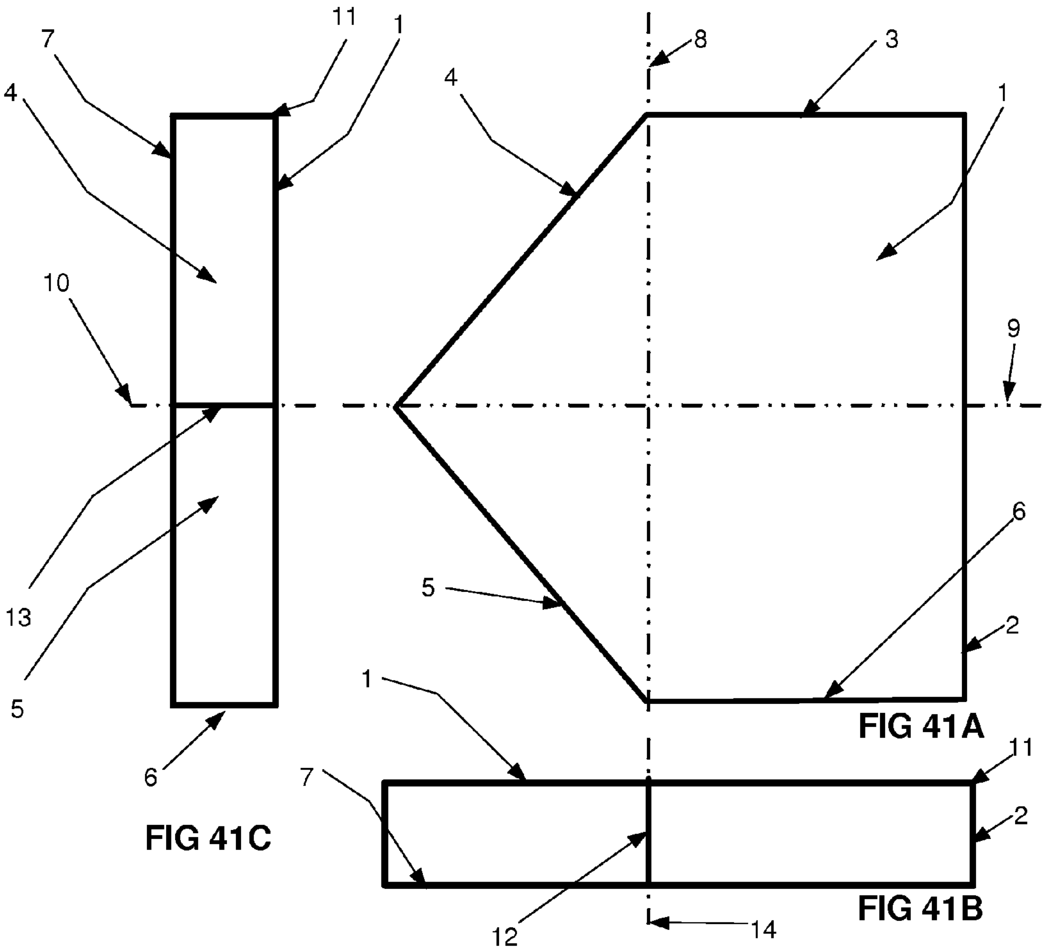

FIG. 41A is a top view of a standard conventional major league home plate.

FIG. 41B is a side view of a standard conventional major league home plate.

FIG. 41C is a side view of a standard conventional major league home plate.

Figure 42A:
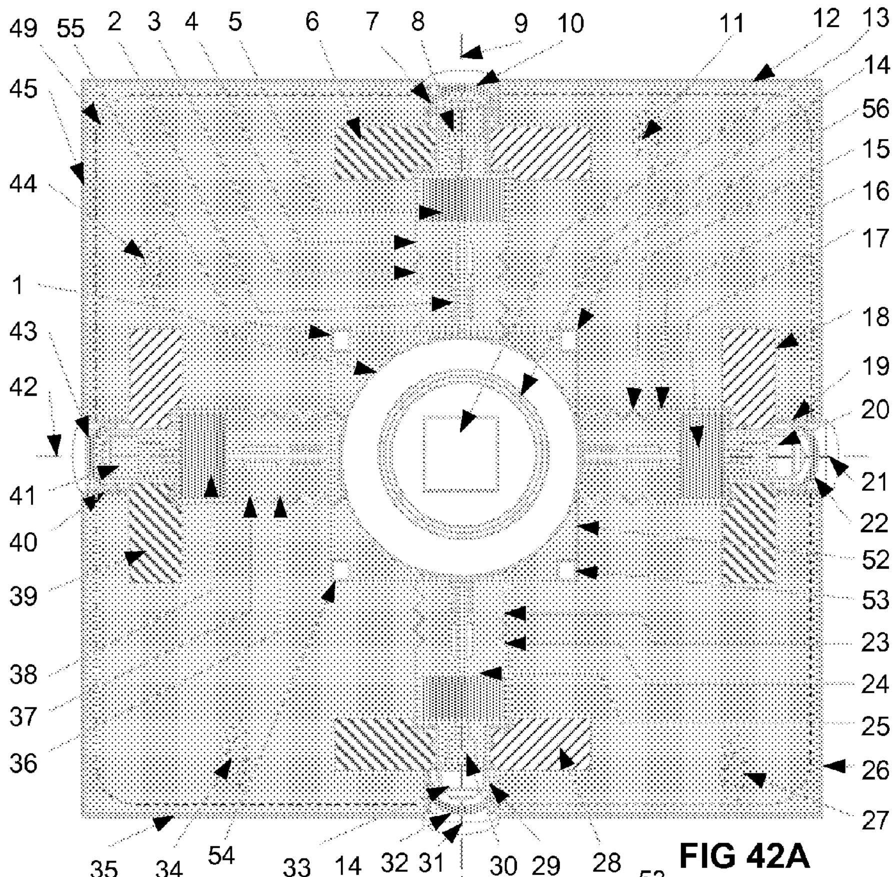

FIG. 42A is a top view of a four camera instrumented baseball base.

Figure 42B:
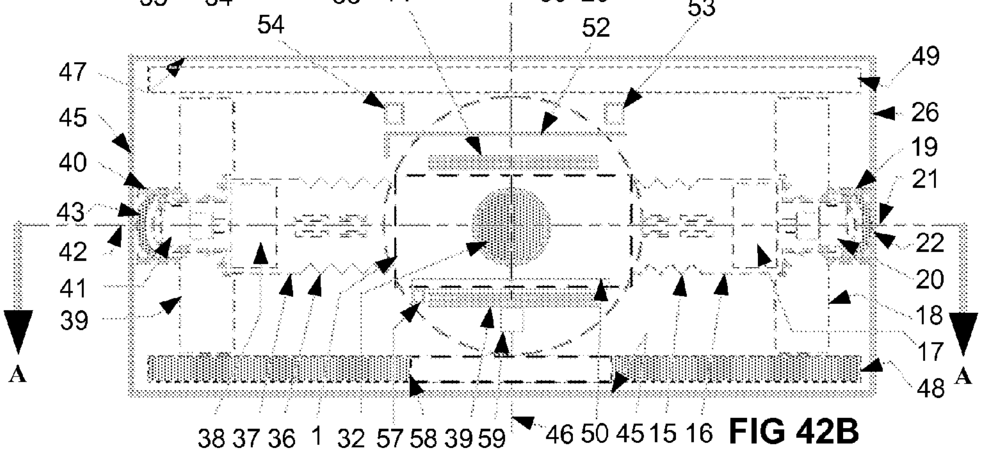

FIG. 42B is a side view of a four camera instrumented baseball base.

Figure 42C:
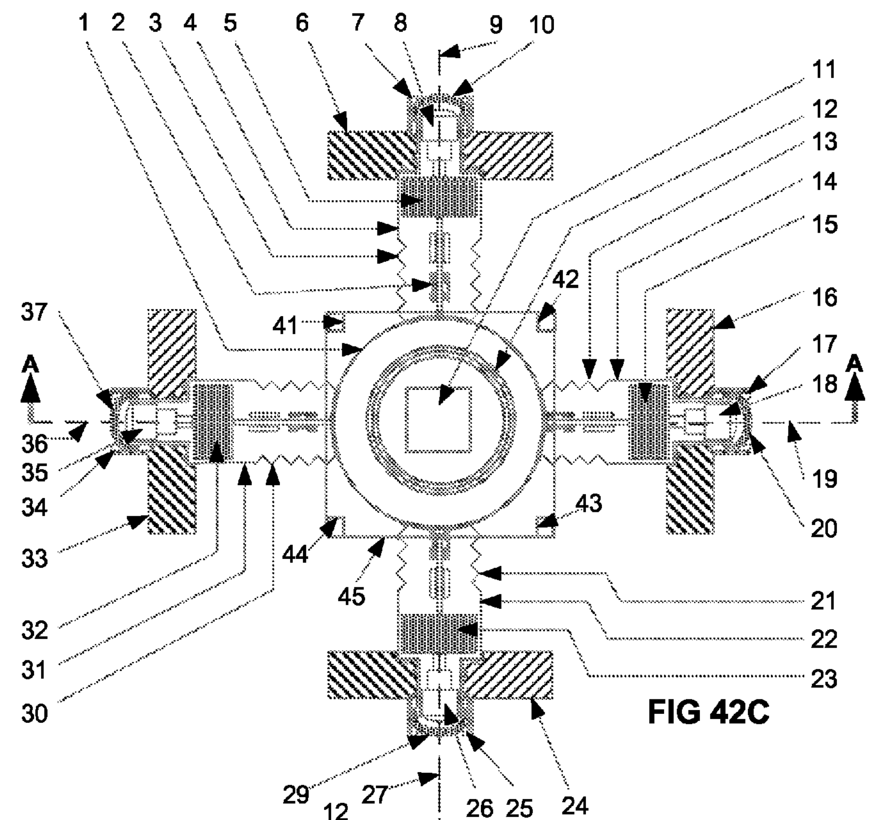

FIG. 42C is a top view of a four camera instrumentation package assembly mounted in buffer plate assemblies.

Figure 42D:
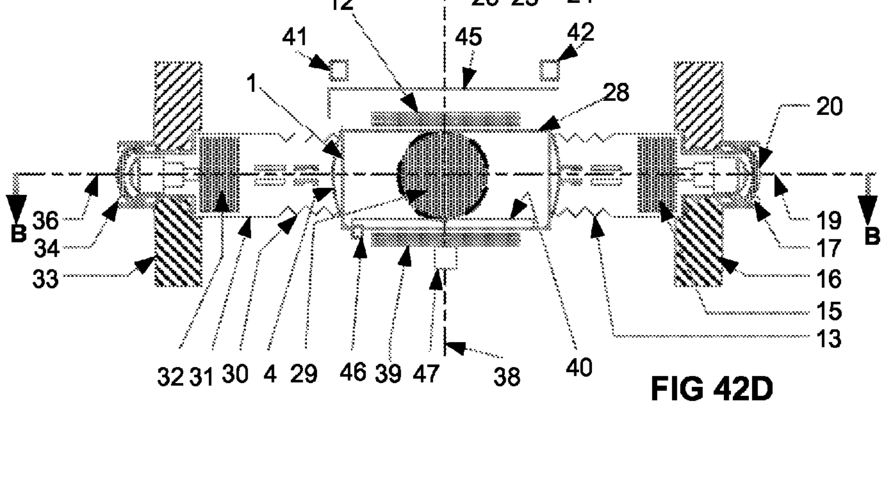

FIG. 42D is a side view of a four camera instrumentation package assembly mounted in buffer plate assemblies.

Figure 42E:
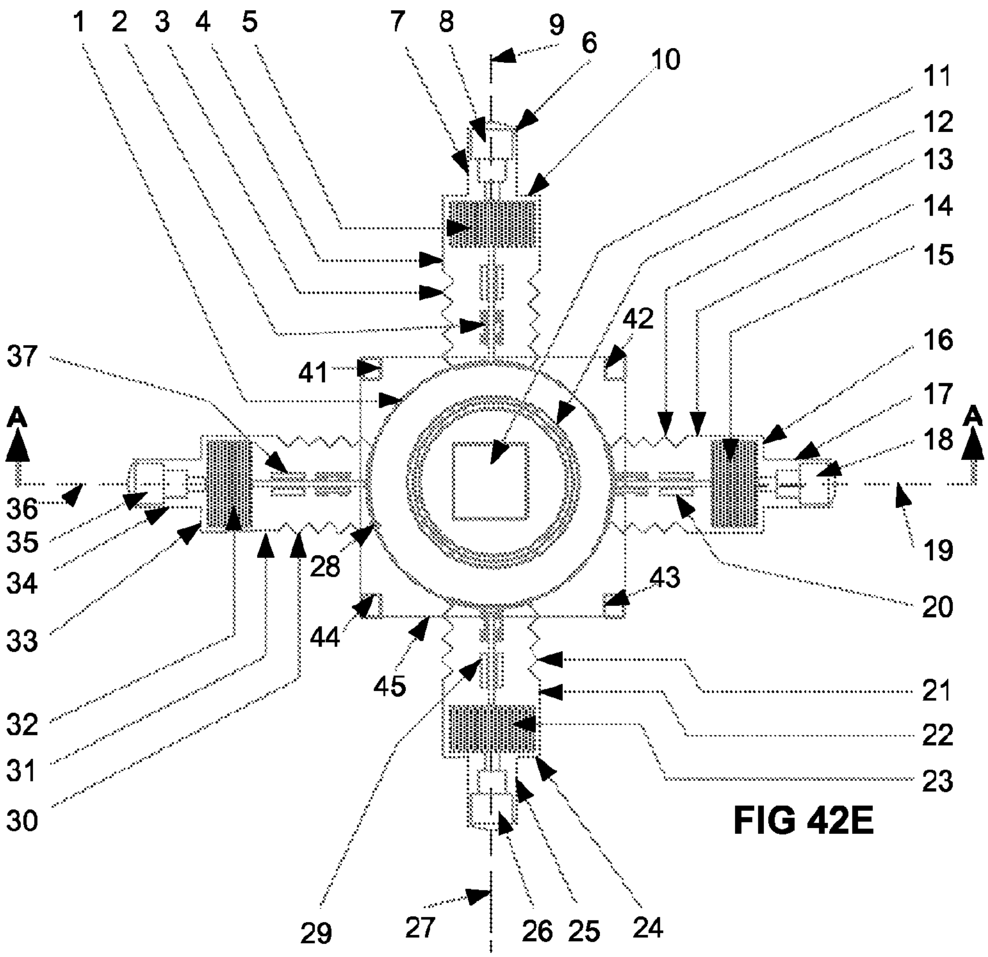

FIG. 42E is a top view of a four camera instrumentation package assembly.

Figure 42F:
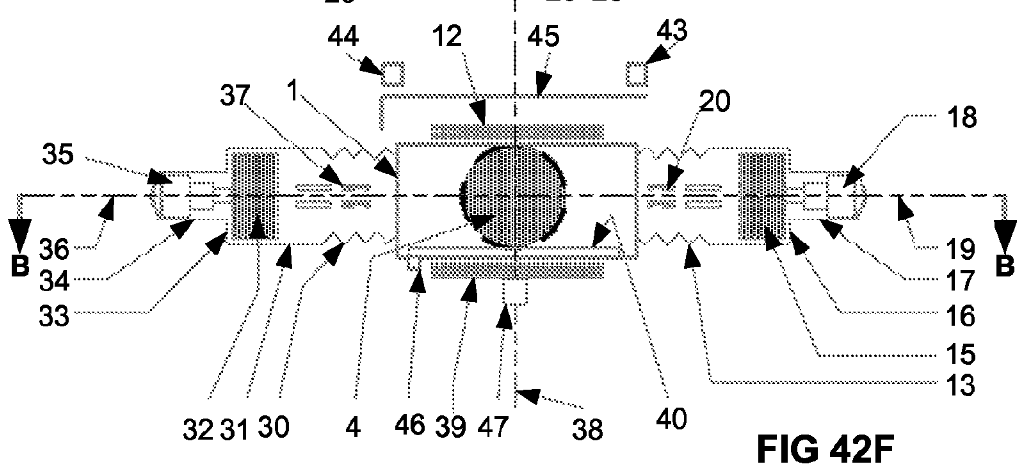

FIG. 42F is a side view of a four camera instrumentation package assembly.

Figures 43A, 43B:
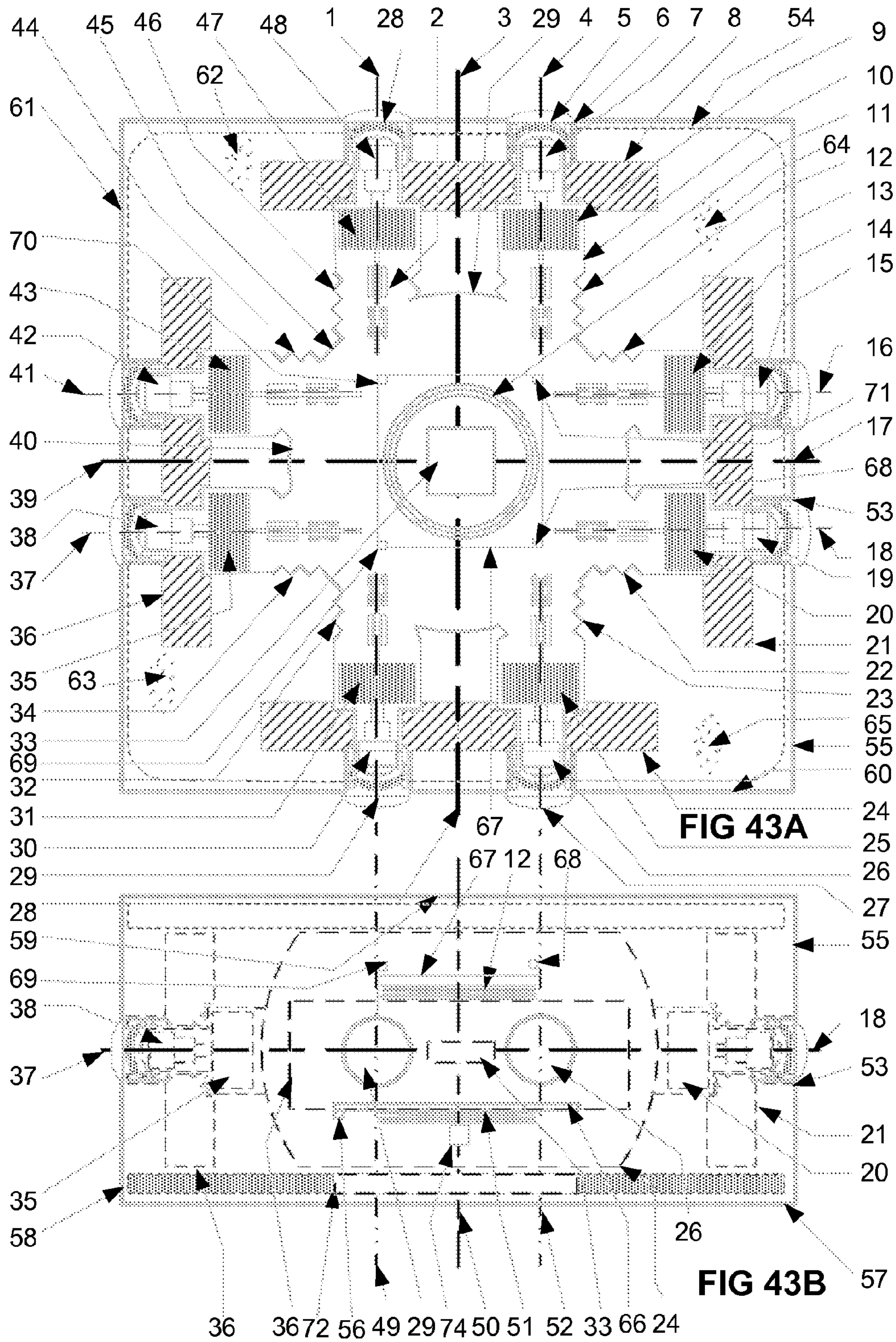

FIG. 43A is the top view of an eight camera instrumented baseball base.

FIG. 43B is the side view of an eight camera instrumented baseball base.

Figure 43C:
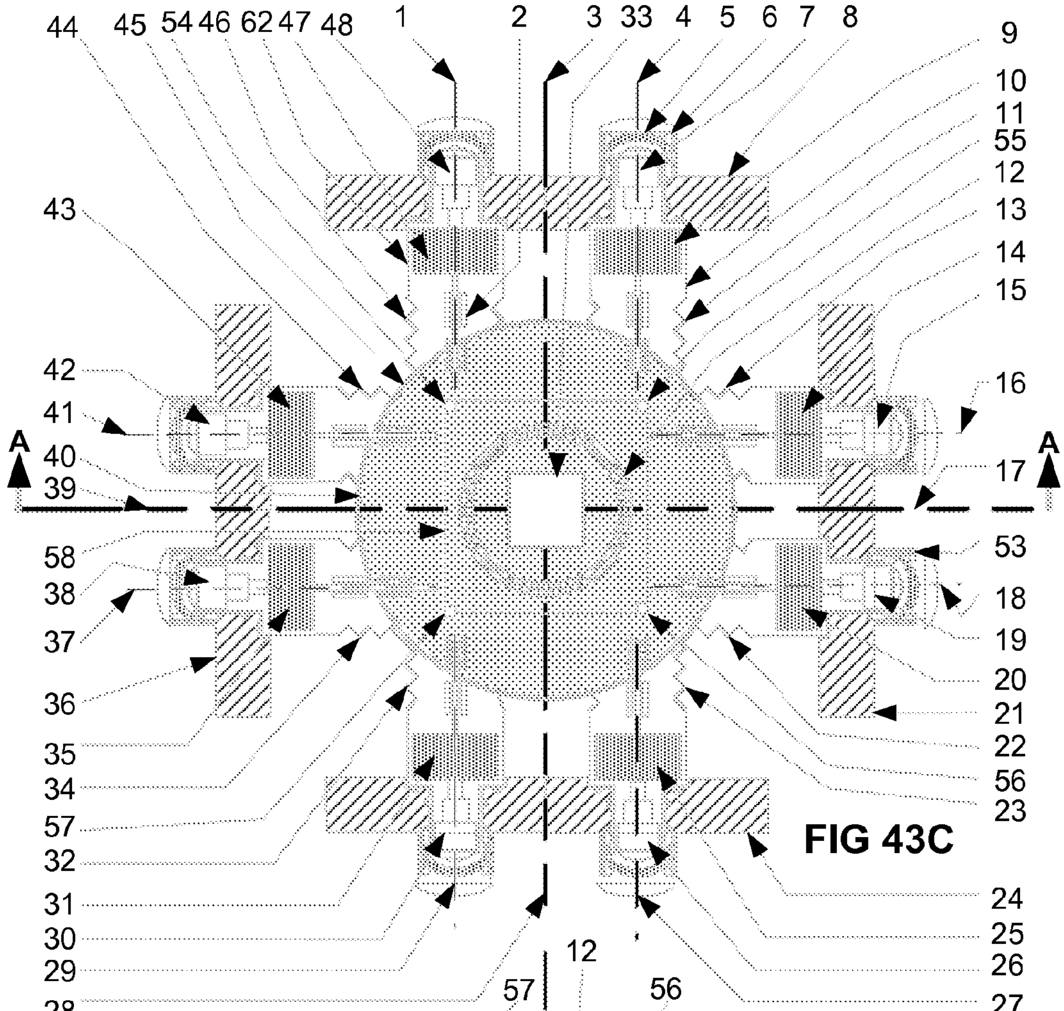

FIG. 43C is the top view of an instrumentation package assembly for an eight camera instrumented baseball base, mounted in buffer plate assemblies.

Figure 43D:
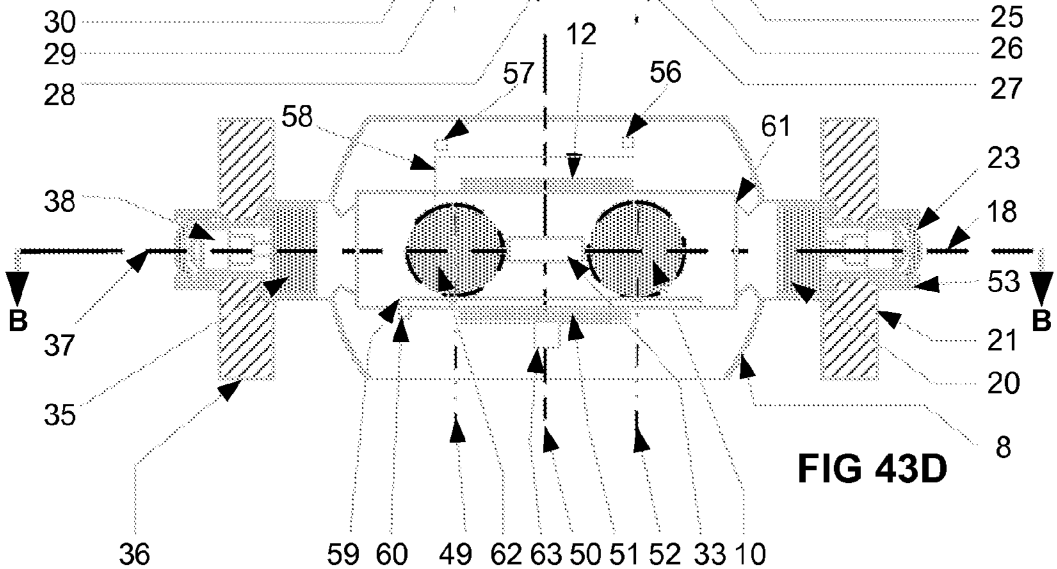

FIG. 43D is the side view of an instrumentation package assembly for an eight camera instrumented baseball base, mounted in buffer plate assemblies.

Figure 43E:
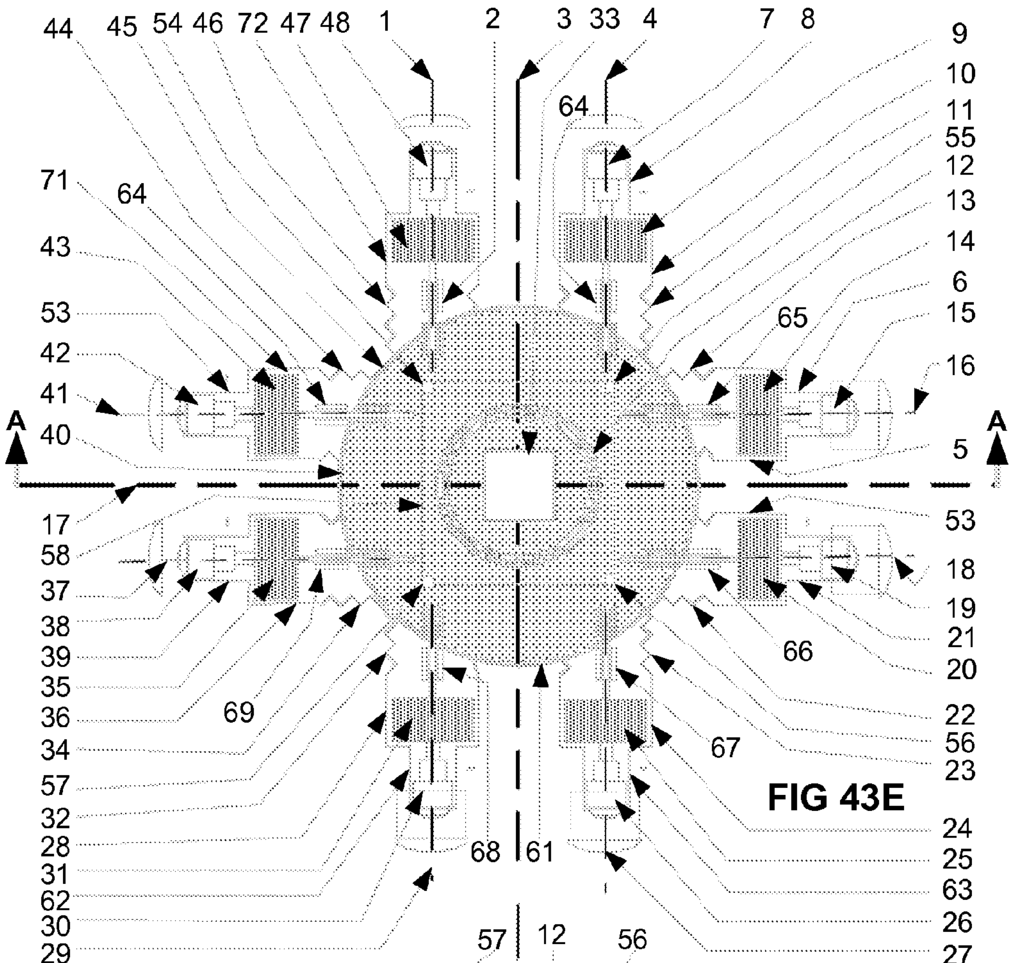

FIG. 43E is the top view of an instrumentation package assembly for an eight camera instrumented baseball base.

Figure 43F:
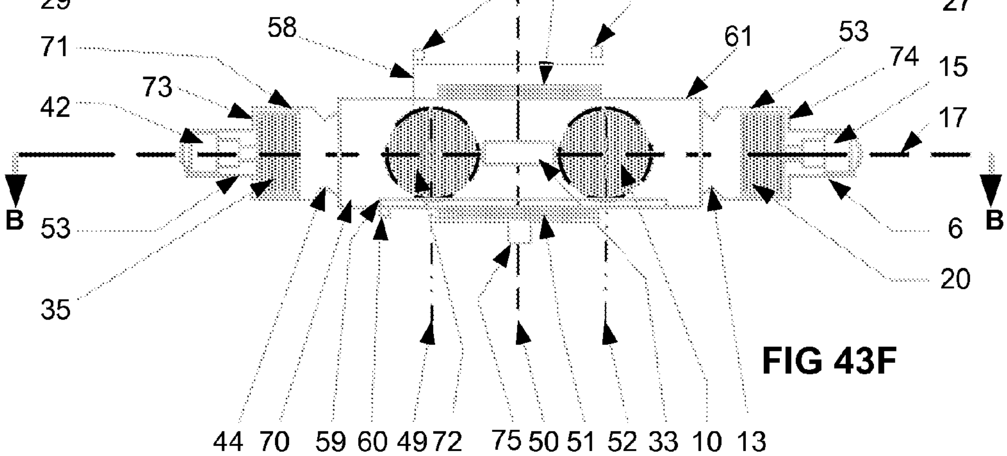

FIG. 43F is the side view of an instrumentation package assembly for an eight camera instrumented baseball base.

Figures 44A, 44B:
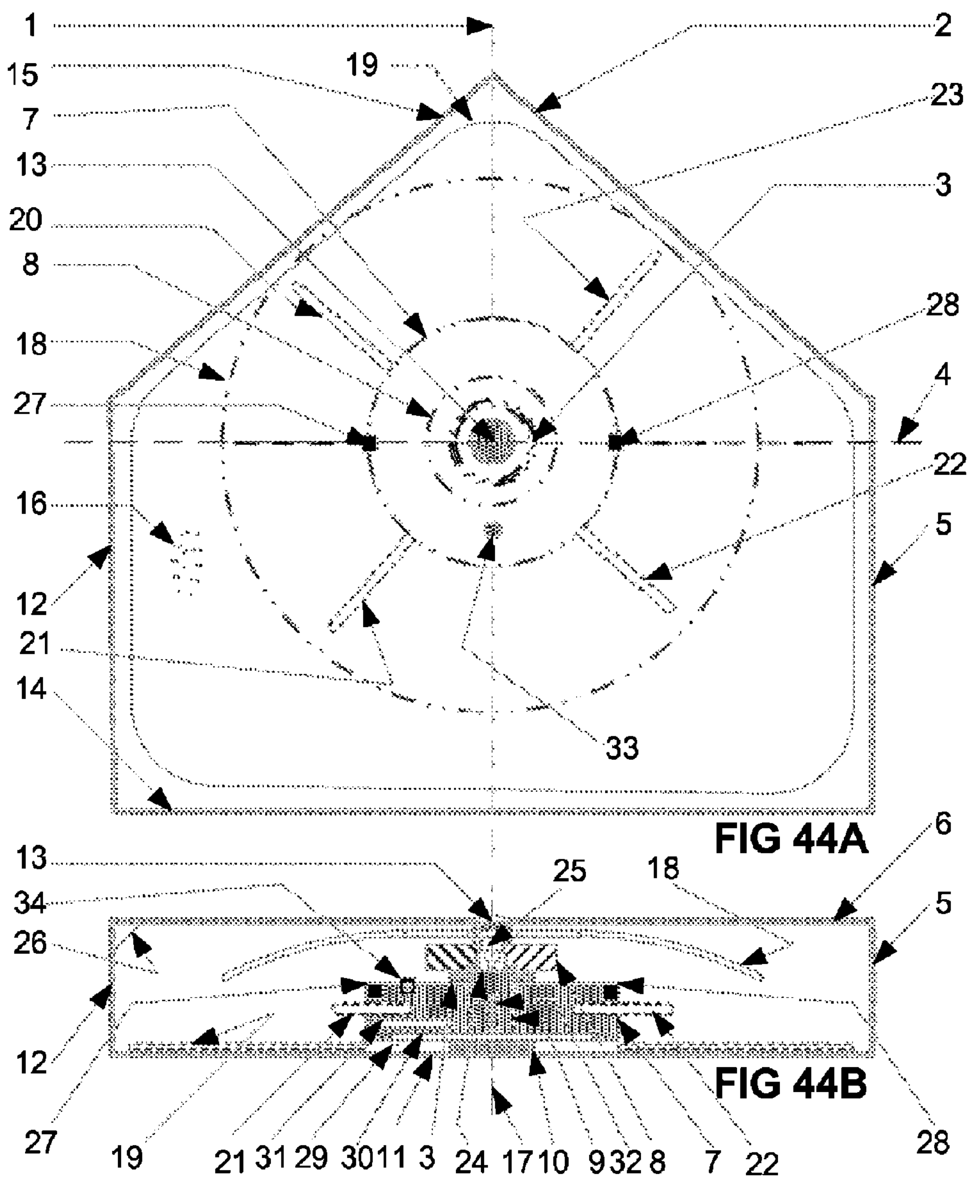

FIG. 44A is a top view of a one camera instrumented baseball home plate.

FIG. 44B is a side view of a one camera instrumented baseball home plate.

Figure 45A:
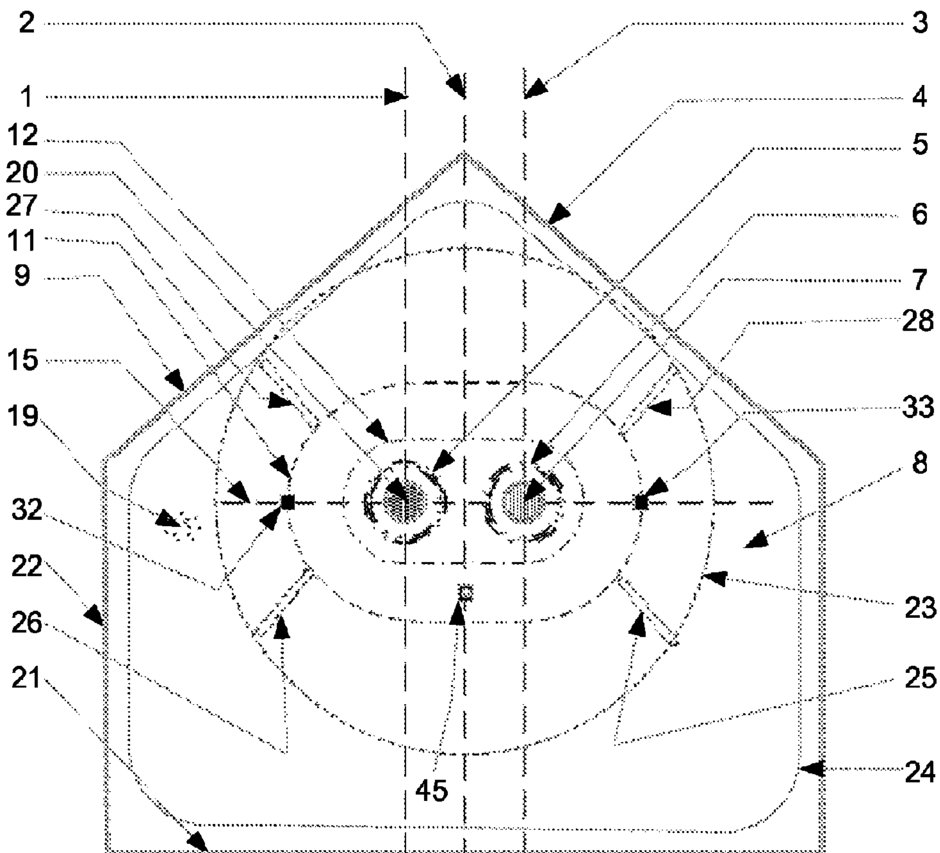

FIG. 45A is a top view of a two camera instrumented baseball home plate.

Figure 45B:
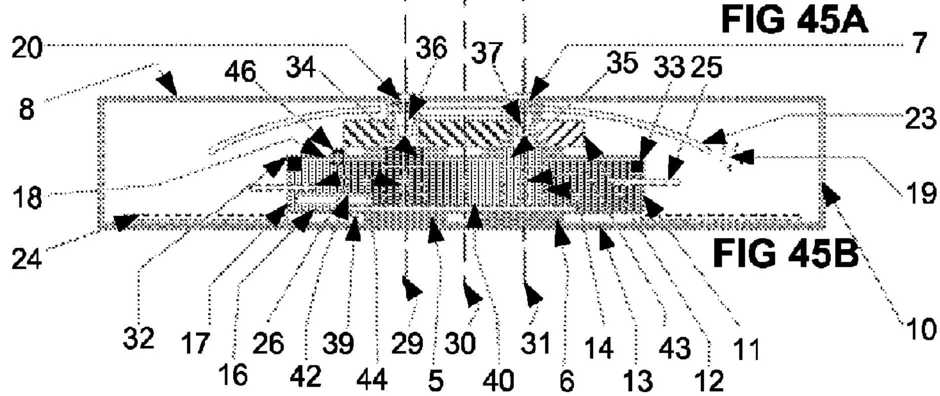

FIG. 45B is a side view of a two camera instrumented baseball home plate.

Figure 46A:
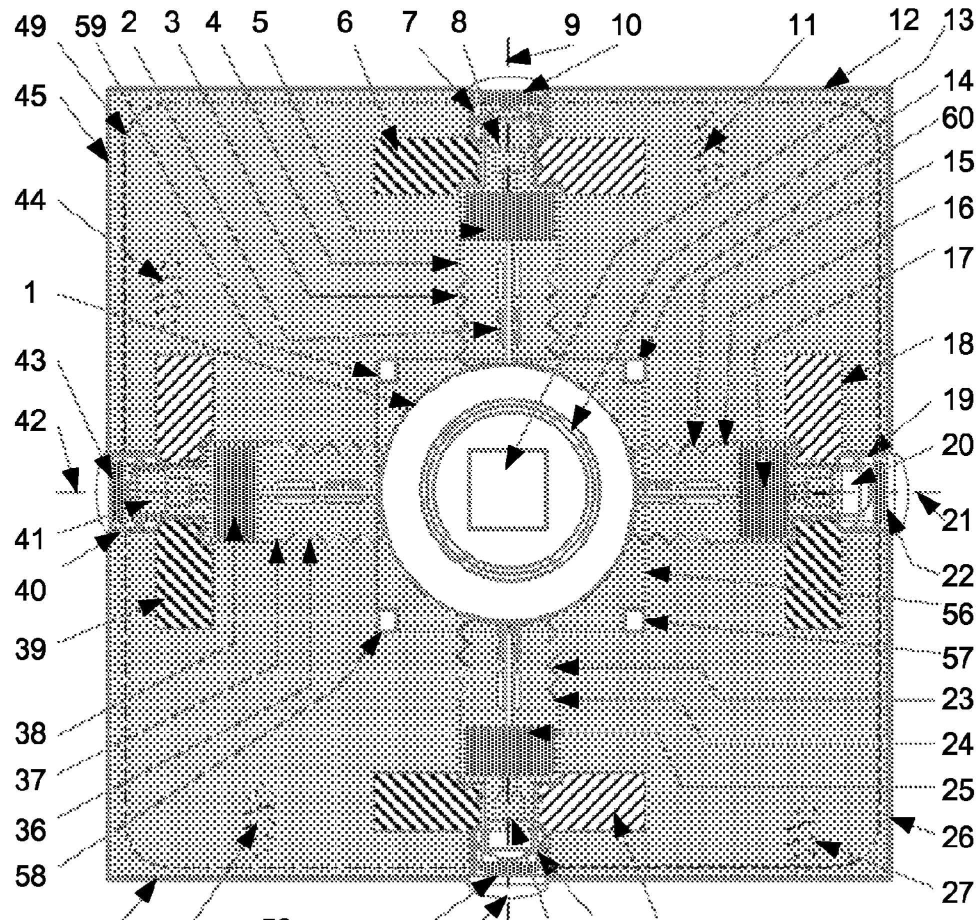

FIG. 46A is a top view of a four tilted camera instrumented baseball base.

Figure 46B:
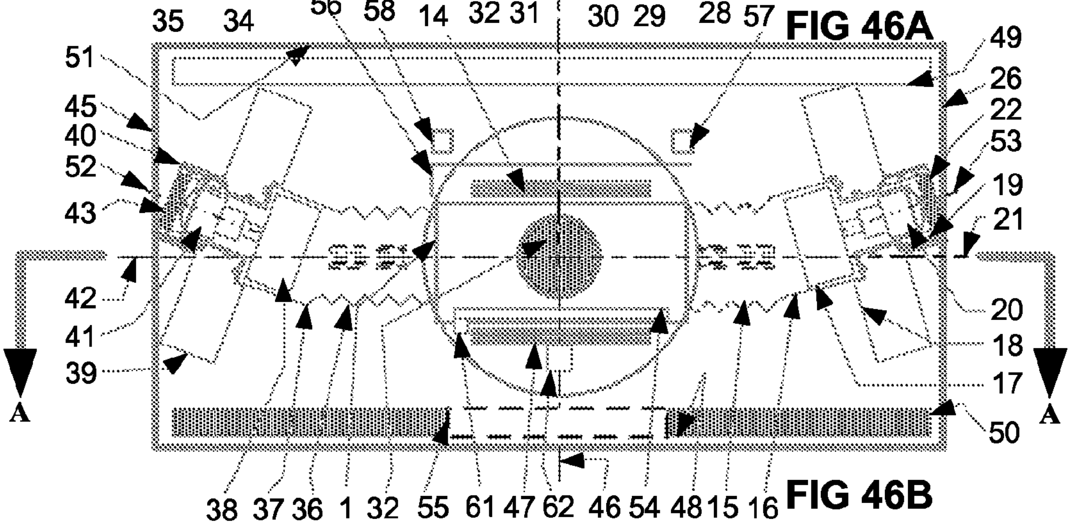

FIG. 46B is a side view of a four tilted camera instrumented baseball base.

Figure 47A:
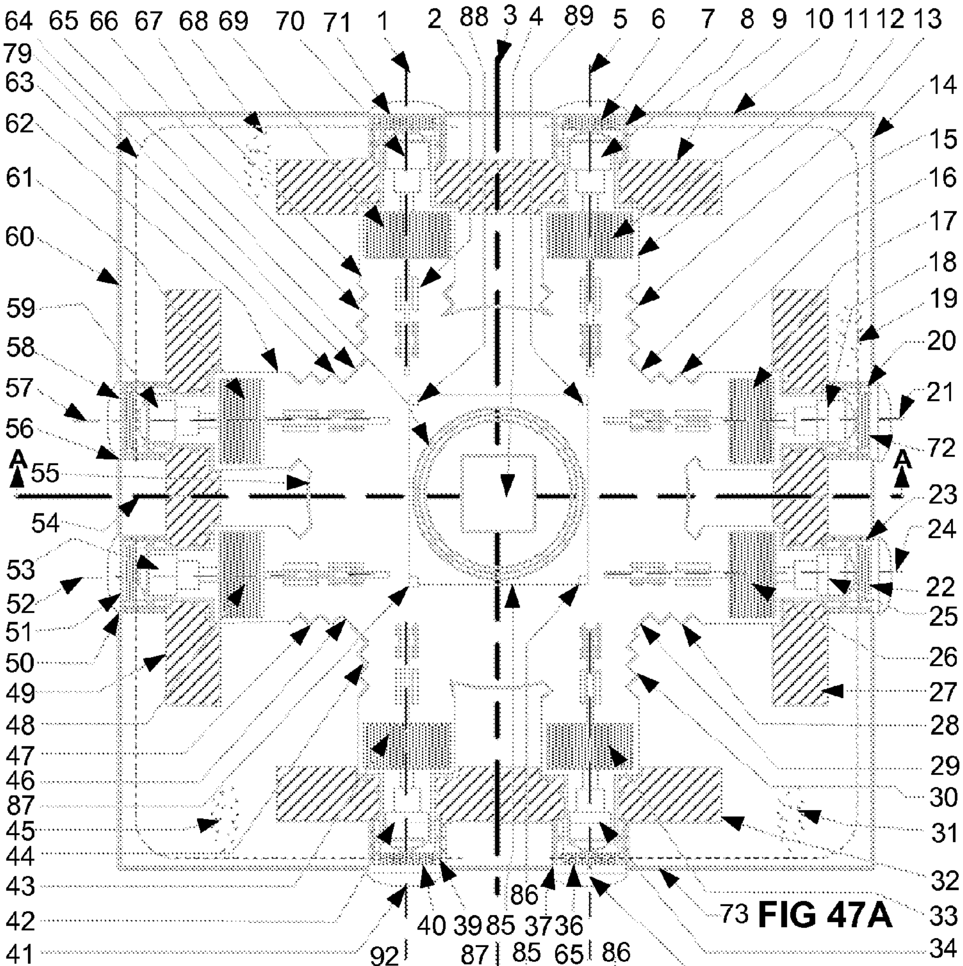

FIG. 47A is a top view of an eight tilted camera instrumented baseball base.

Figure 47B:
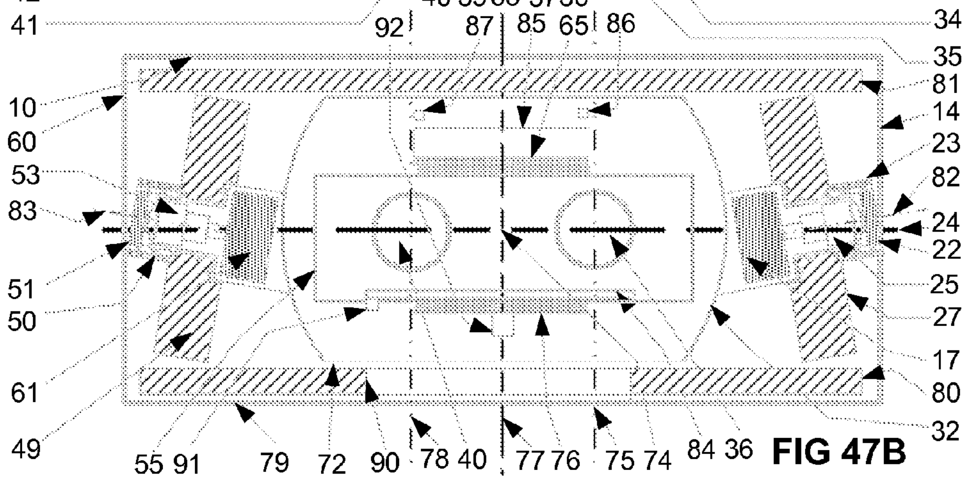

FIG. 47B is a side view of an eight tilted camera instrumented baseball base.

Figure 47C:
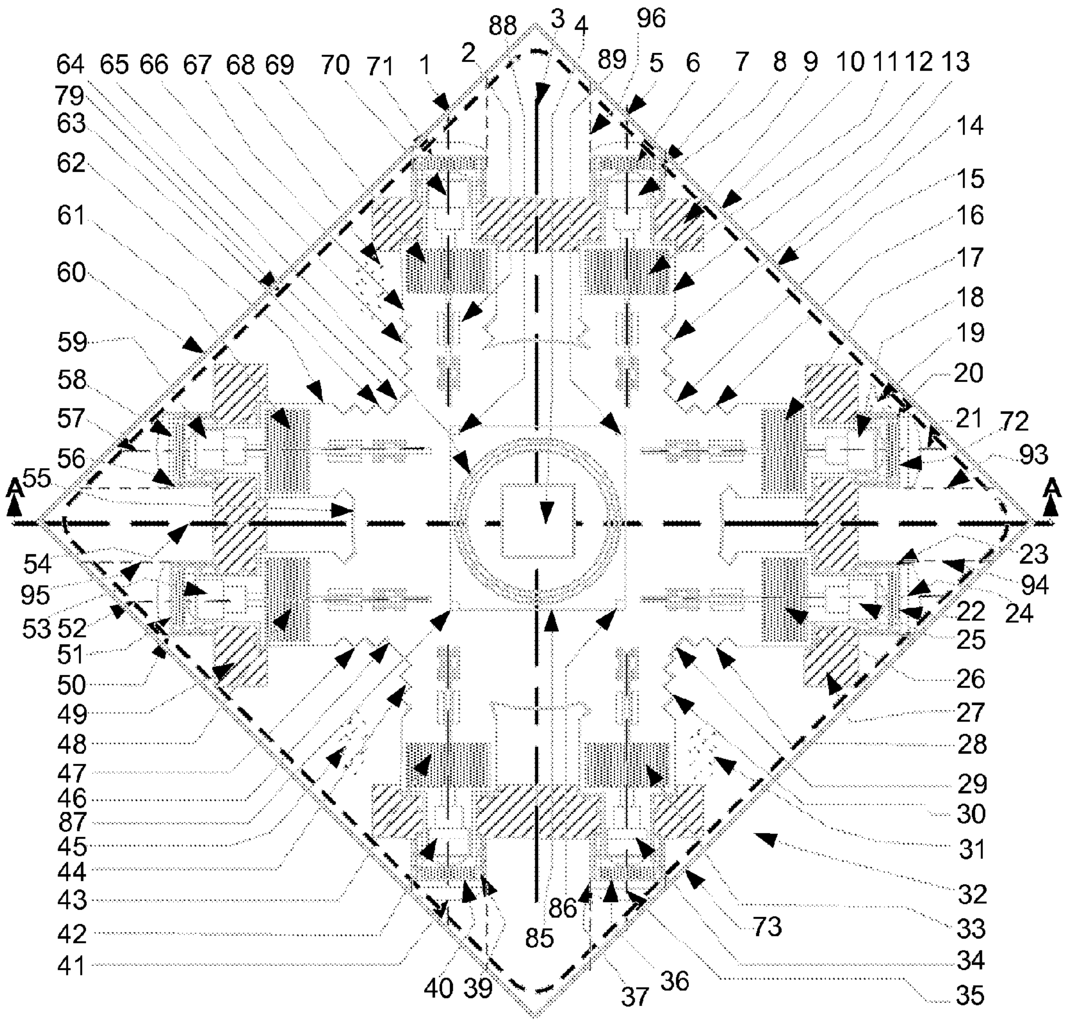

FIG. 47C is a top view of an eight tilted camera instrumented baseball base.

Figure 47D:
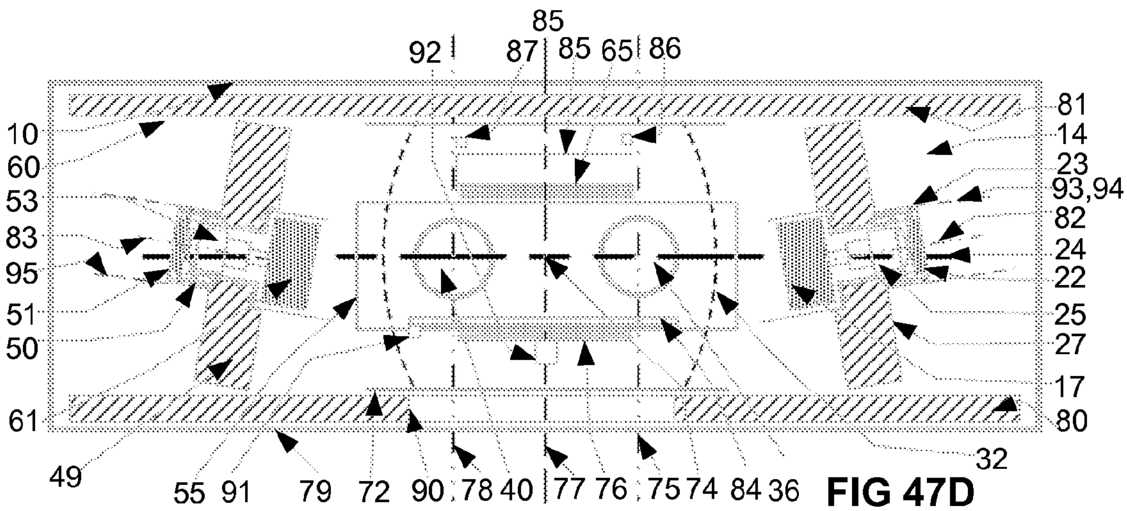

FIG. 47D is a corner view of an eight tilted camera instrumented baseball base.

Figures 48A, 48B, 48C, 48D:
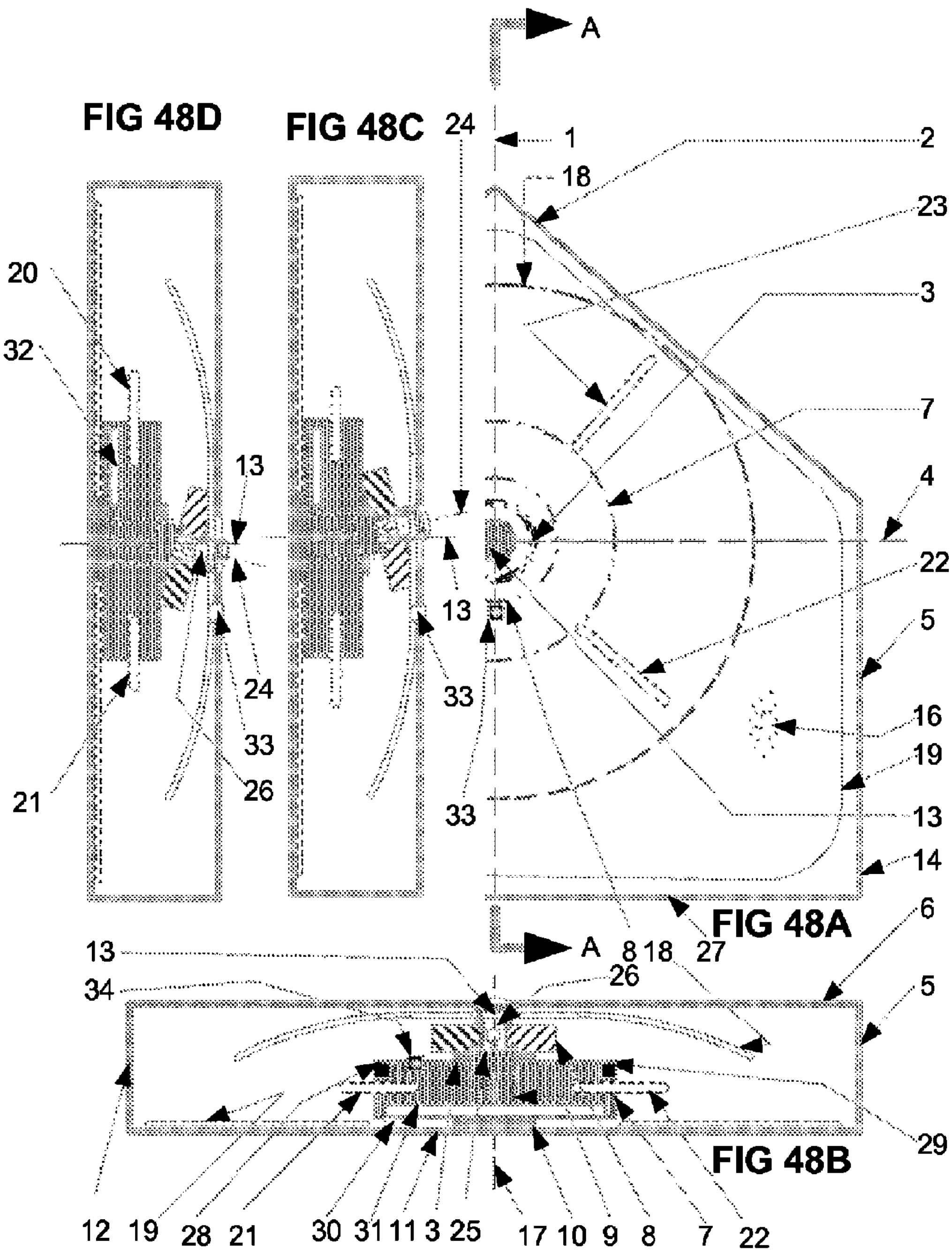

FIG. 48A is a top view of a one tilted camera instrumented baseball home plate.

FIG. 48B is a side view of a one tilted camera instrumented baseball home plate.

FIG. 48C is a side view of a one tilted camera instrumented baseball home plate.

FIG. 48D is a side view of a one tilted camera instrumented baseball home plate.

Figures 49A, 49B, 49C, 49D:
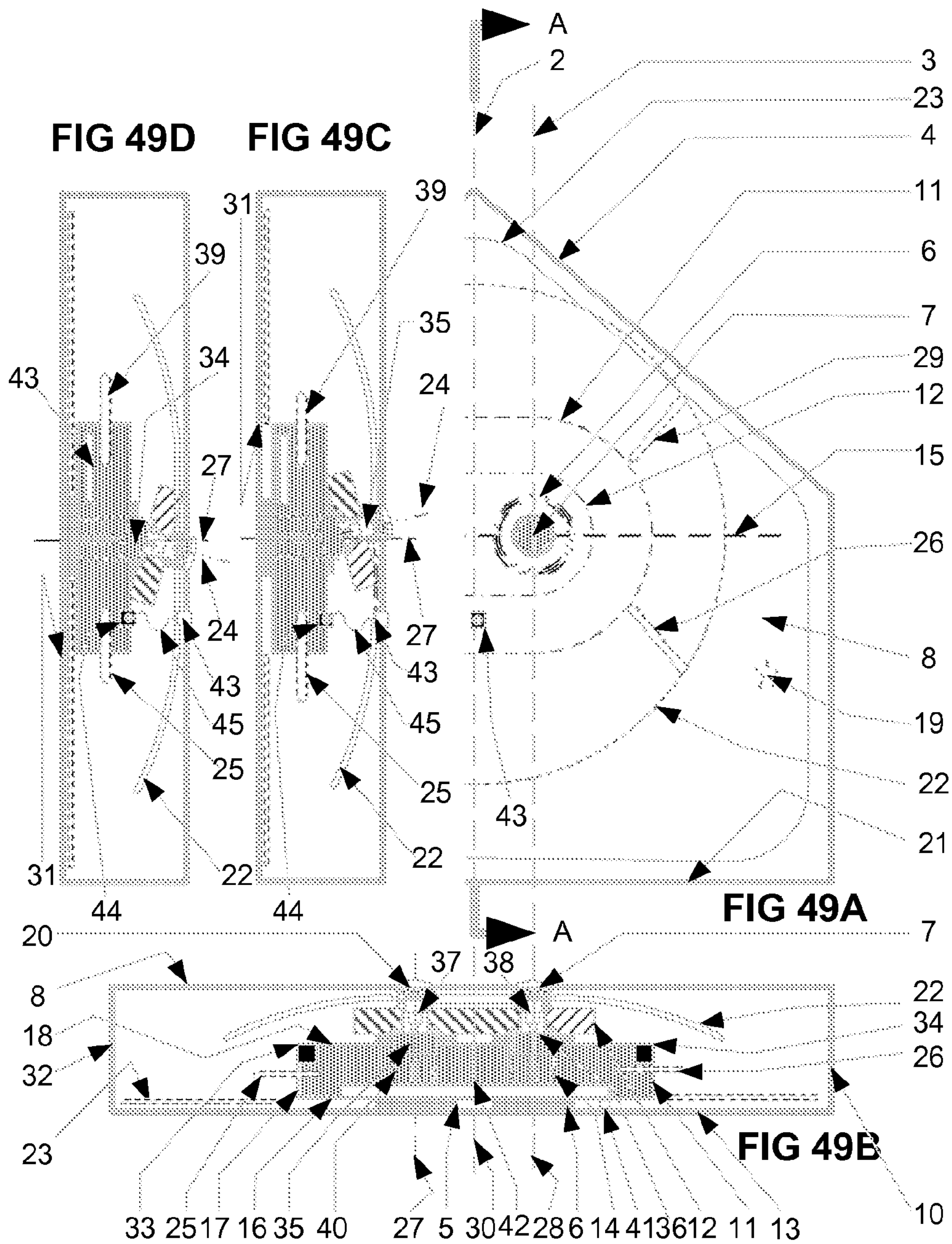

FIG. 49A is a top view of a two tilted camera instrumented baseball home plate.

FIG. 49B is a side view of a two tilted camera instrumented baseball home plate.

FIG. 49C is a side view of a one tilted camera instrumented baseball home plate.

FIG. 49D is a side view of a one tilted camera instrumented baseball home plate.

Figure 50A:
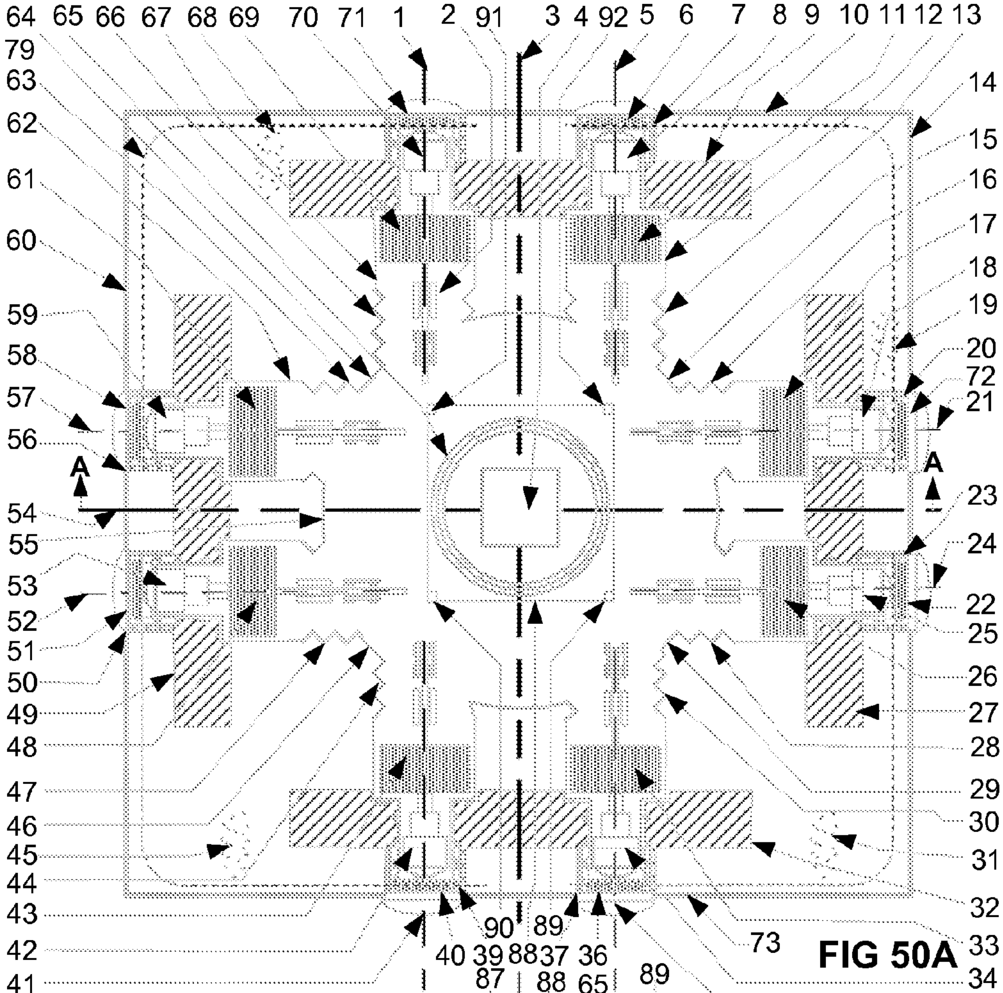

FIG. 50A is a top view of an eight tilted camera instrumented baseball base.

Figure 50B:
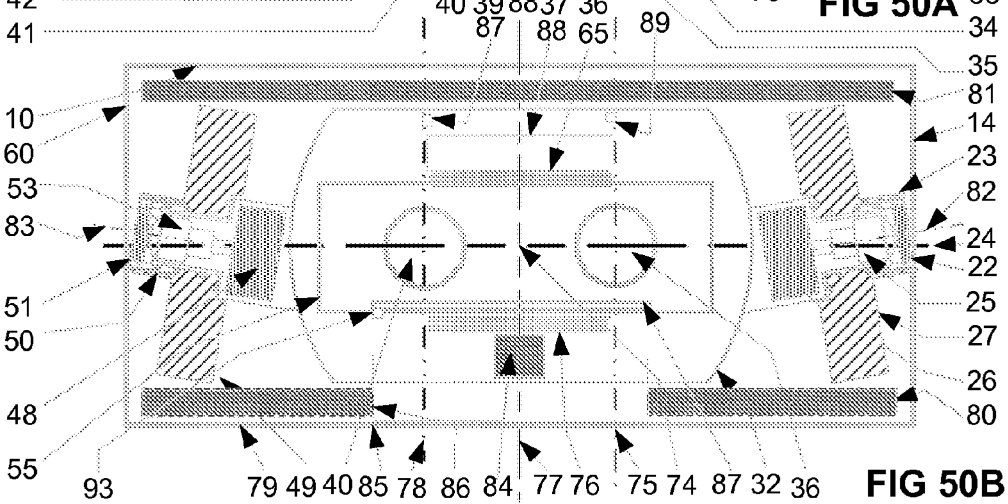

FIG. 50B is a side view of an eight tilted camera instrumented baseball base.

Figures 51A, 51B, 51C, 51D:
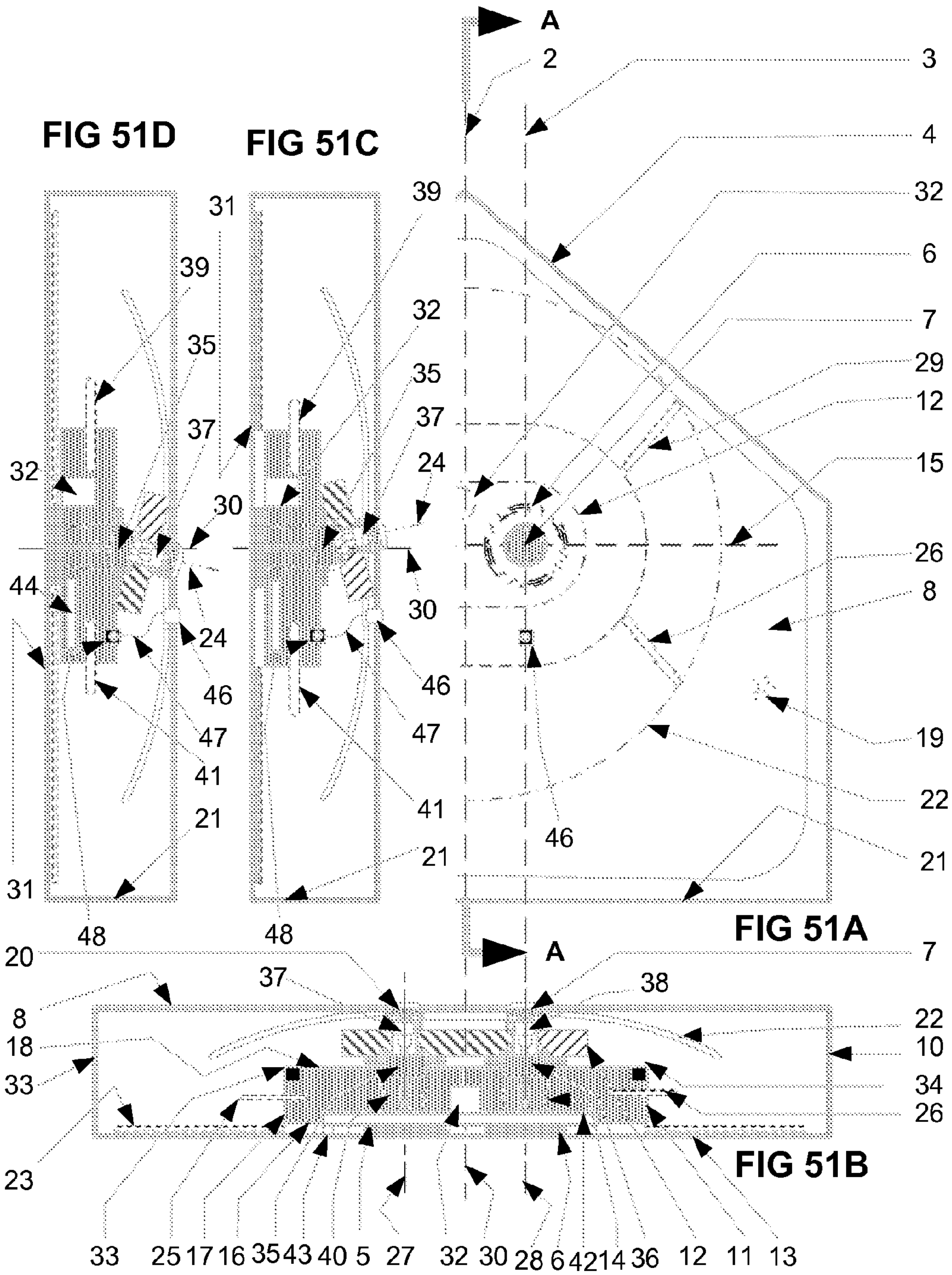

FIG. 51A is the top view of a two tilted camera instrumented baseball home plate.

FIG. 51B is the side view of a two tilted camera instrumented baseball home plate.

FIG. 51C is a side view of a two tilted camera instrumented baseball home plate.

FIG. 51D is a side view of a two tilted camera instrumented baseball home plate.

Figures 52A, 52B:
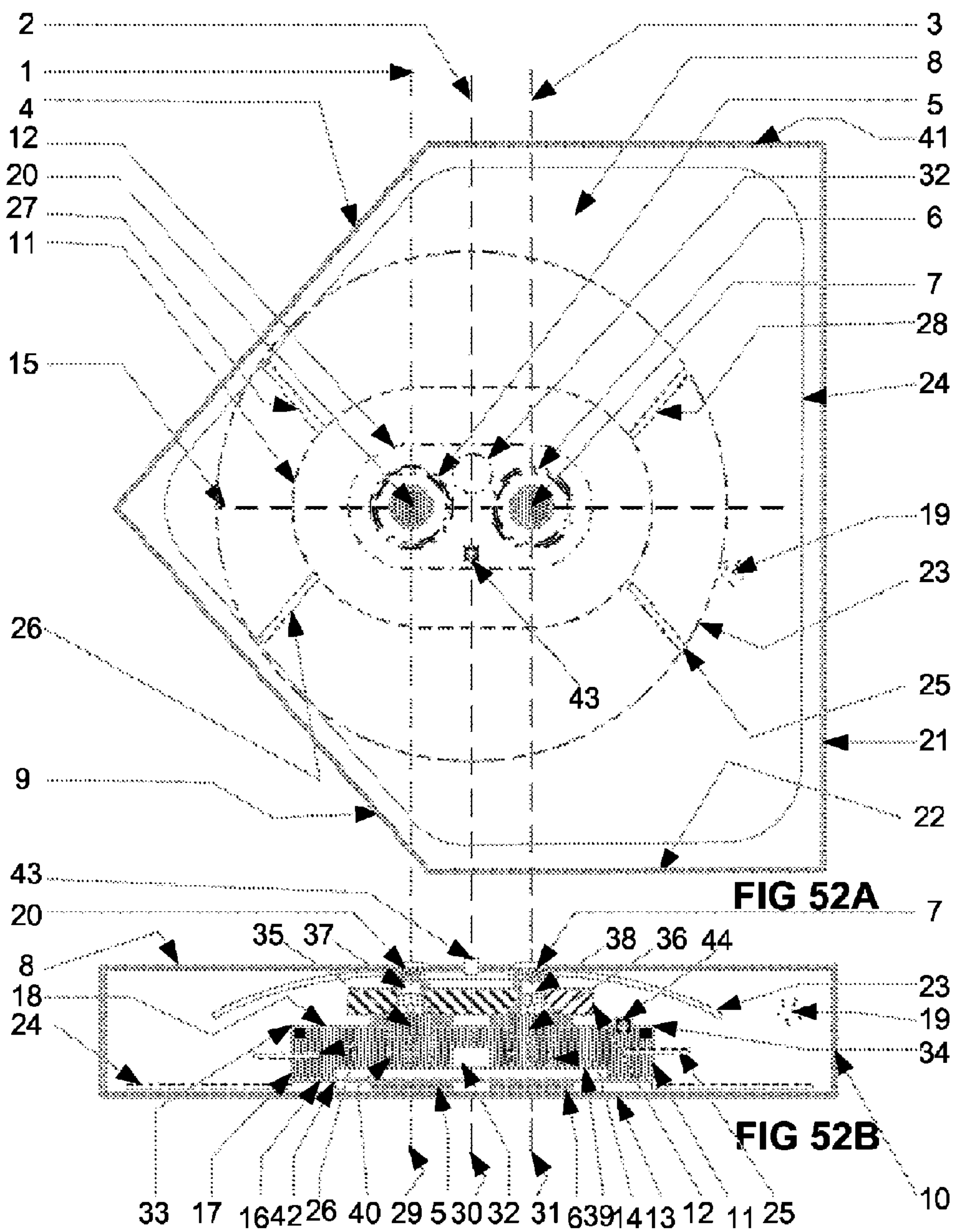

FIG. 52A is the top view of a two camera instrumented baseball home plate.

FIG. 52B is the side view of a two camera instrumented baseball home plate.

Figures 53A, 53B, 53C:
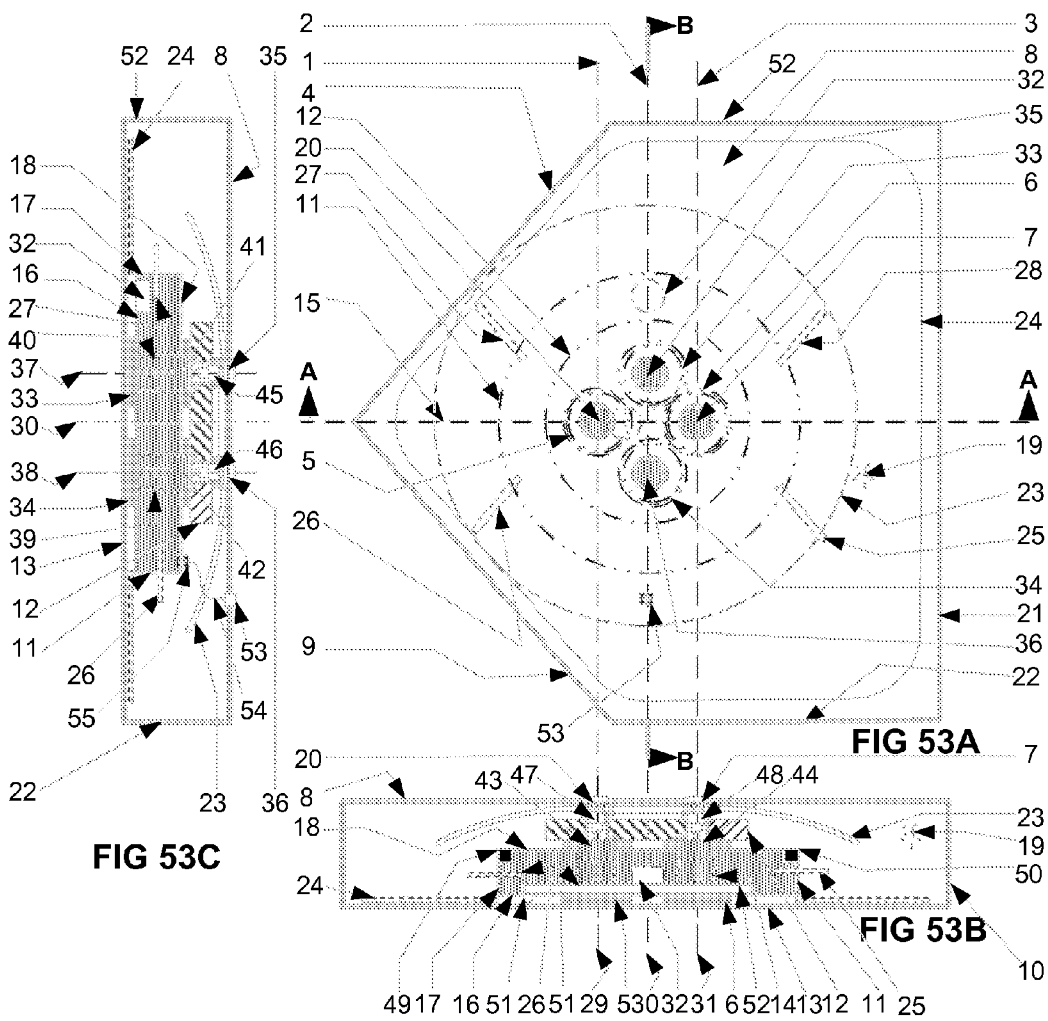

FIG. 53A is the top view of a four camera instrumented baseball home plate.

FIG. 53B is the side view of a four camera instrumented baseball home plate.

FIG. 53C is the side view of a four camera instrumented baseball home plate.

Figures 54A, 54B, 54C:
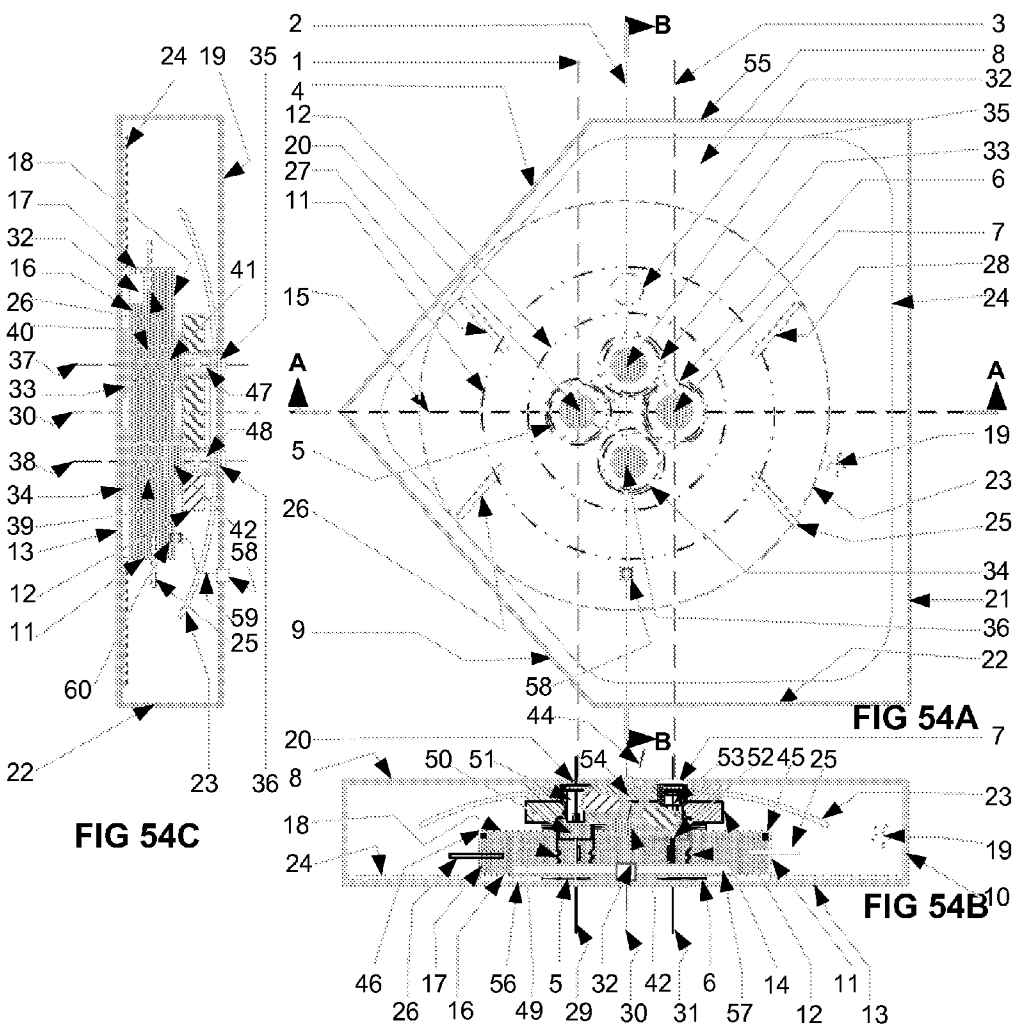

FIG. 54A is the top view of a four tilted camera instrumented baseball home plate.

FIG. 54B is the side view of a four tilted camera instrumented baseball home plate.

FIG. 54C is the side view of a four tilted camera instrumented baseball home plate.

Figures 55A, 55B, 55C:
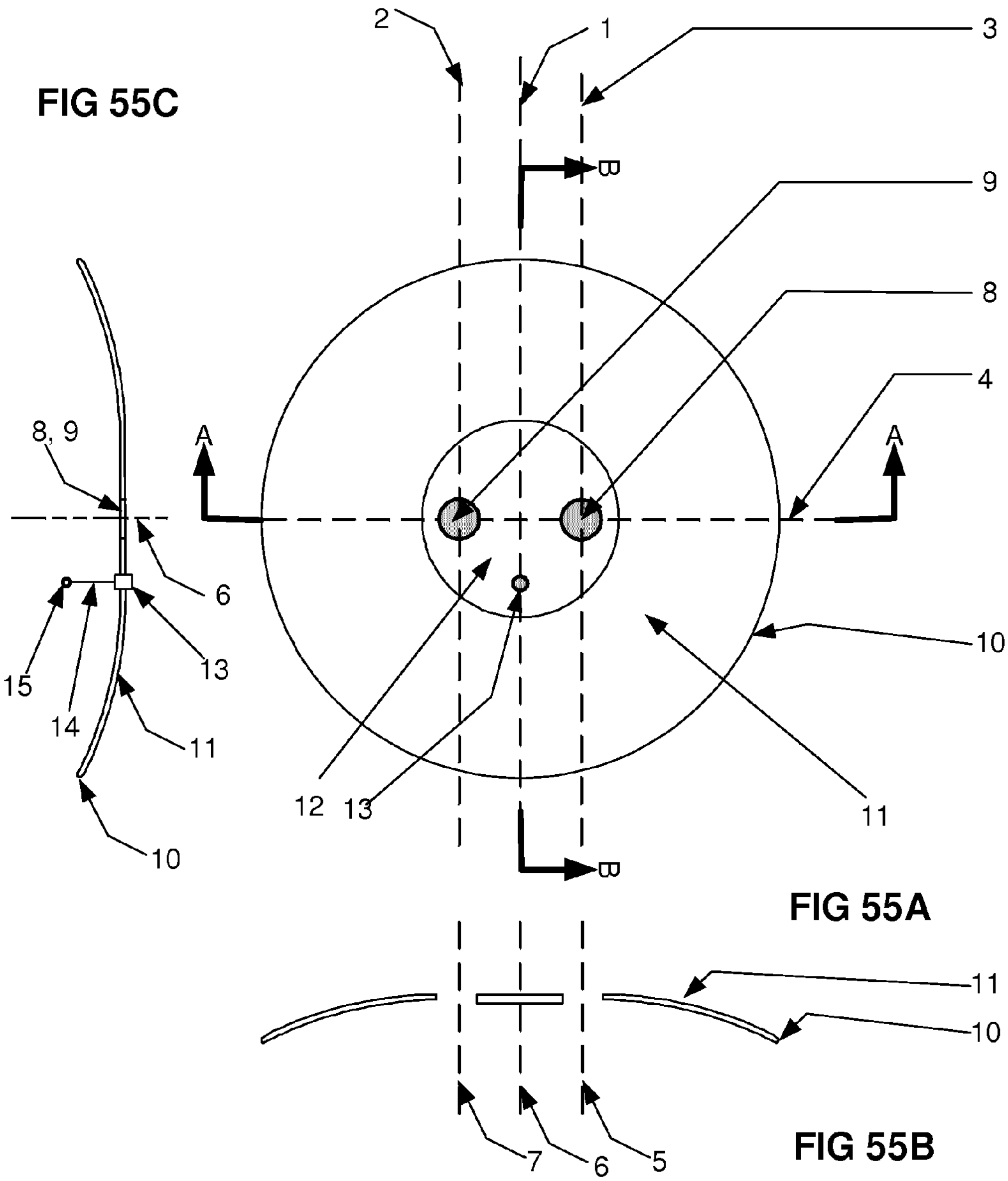

FIG. 55A is the top view of an upper protective cover plate with two windows.

FIG. 55B is the front view of an upper protective cover plate with two windows.

FIG. 55C is the side view of an upper protective cover plate with two windows.

Figures 56A, 56B, 56C:
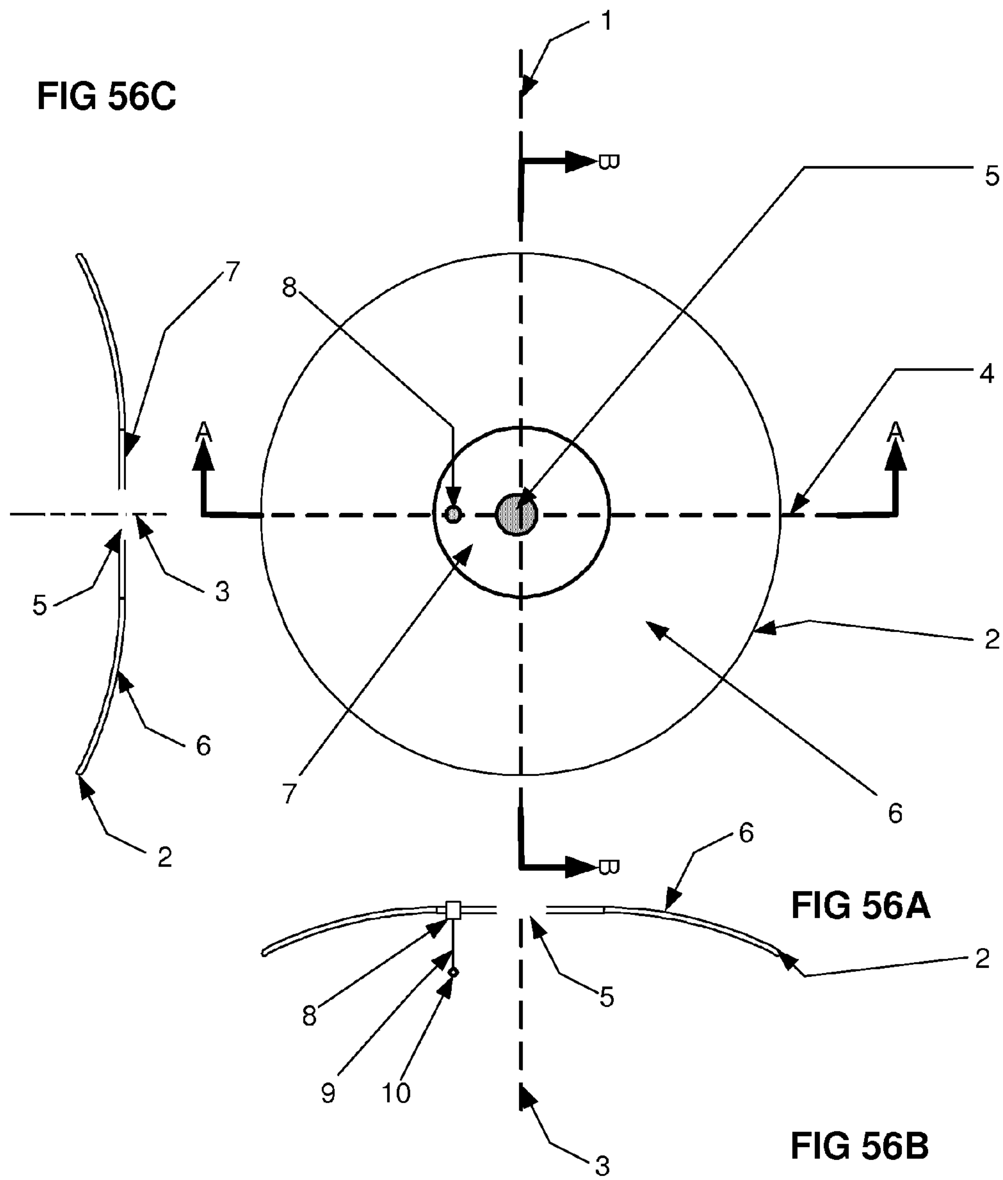

FIG. 56A is the top view of an upper protective cover plate with one window.

FIG. 56B is the front view of an upper protective cover plate with one window.

FIG. 56C is the side view of an upper protective cover plate with one window.

Figures 57A, 57B, 57C:
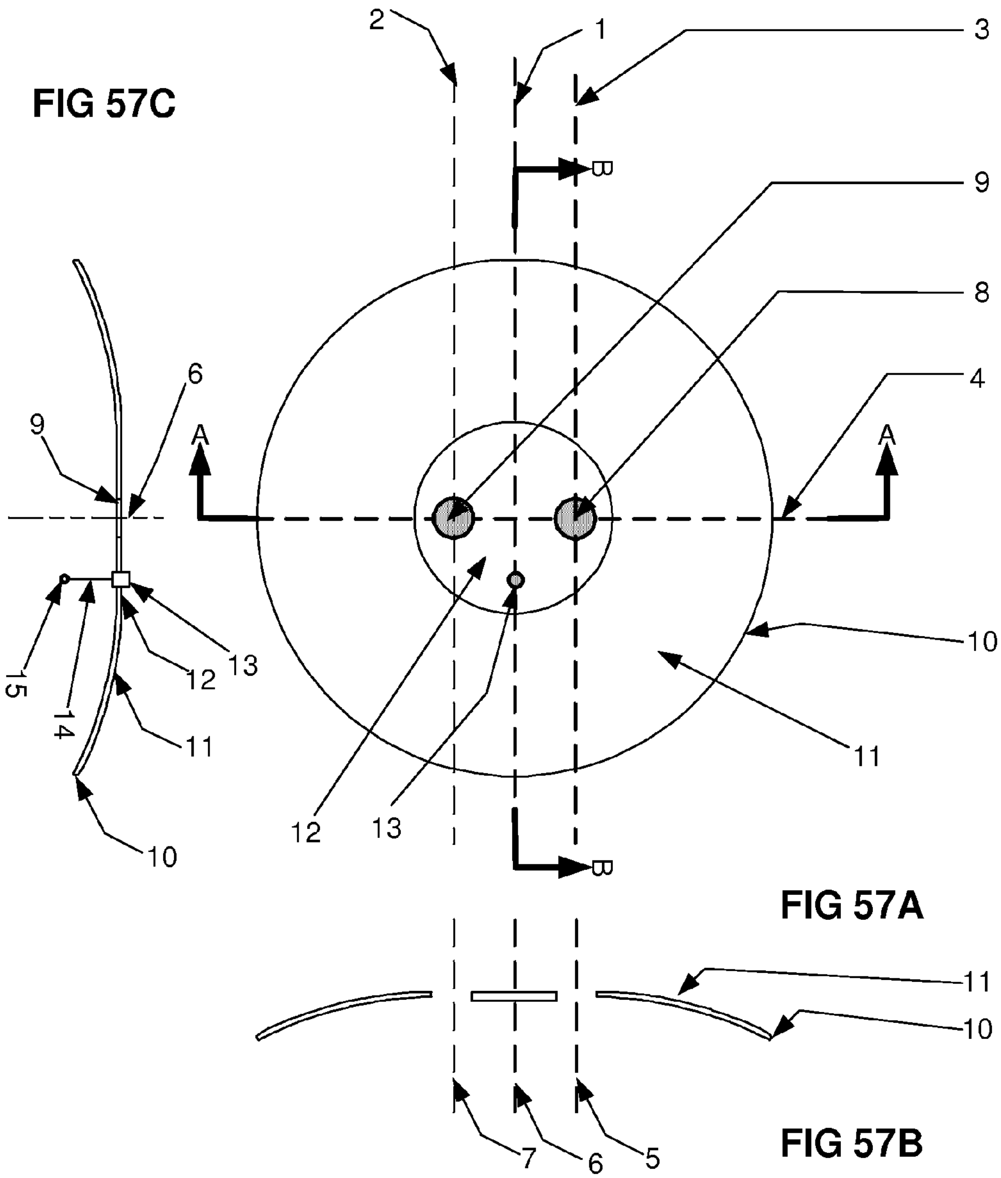

FIG. 57A is the top view of an upper protective cover plate with two windows.

FIG. 57B is the front view of an upper protective cover plate with two windows.

FIG. 57C is the side view of an upper protective cover plate with two windows.

Figures 58A, 58B, 58C:
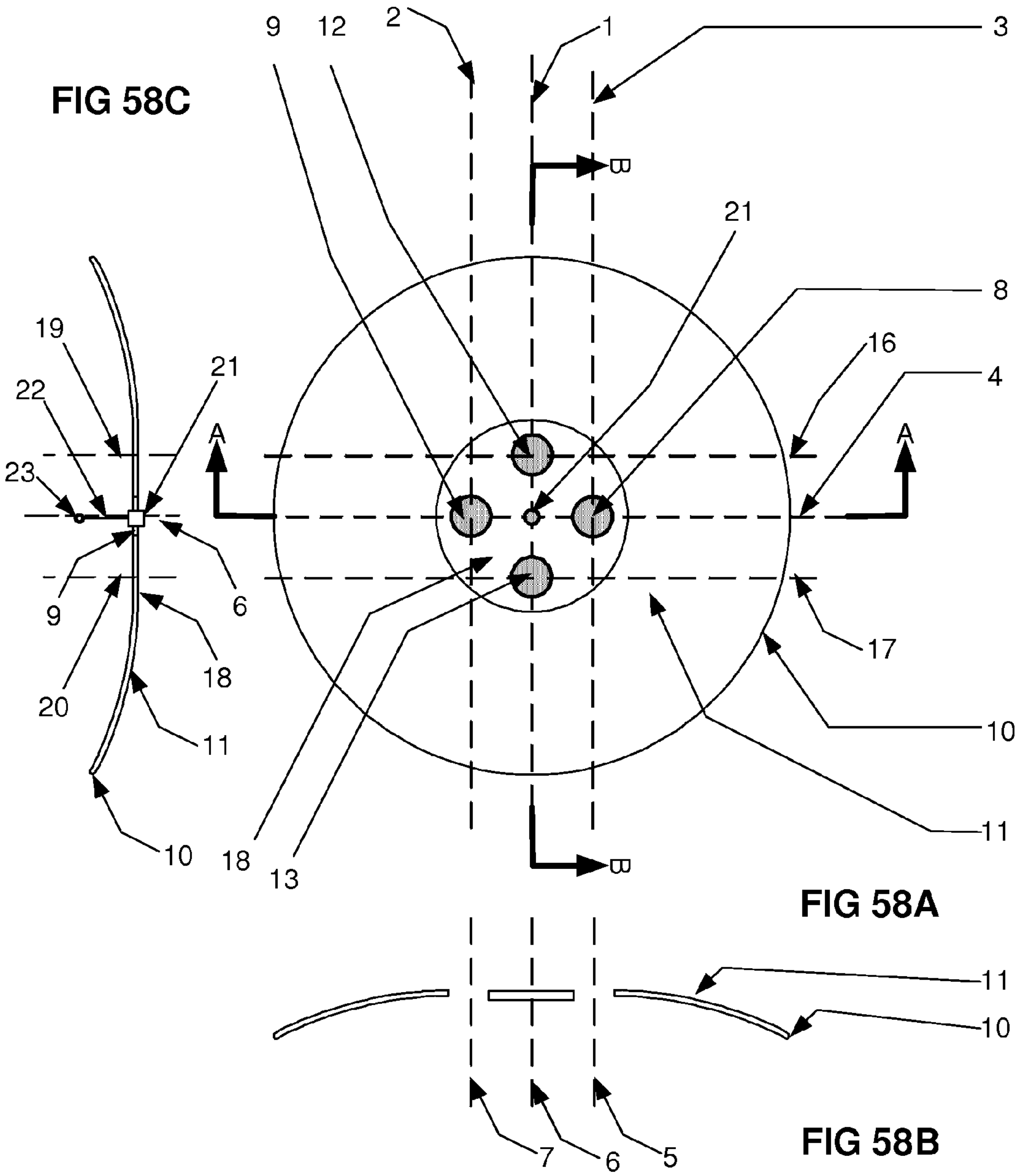

FIG. 58A is the top view of an upper protective cover plate with four windows.

FIG. 58B is the front view of an upper protective cover plate with four windows.

FIG. 58C is the side view of an upper protective cover plate with four windows.

Figures 59A, 59B:
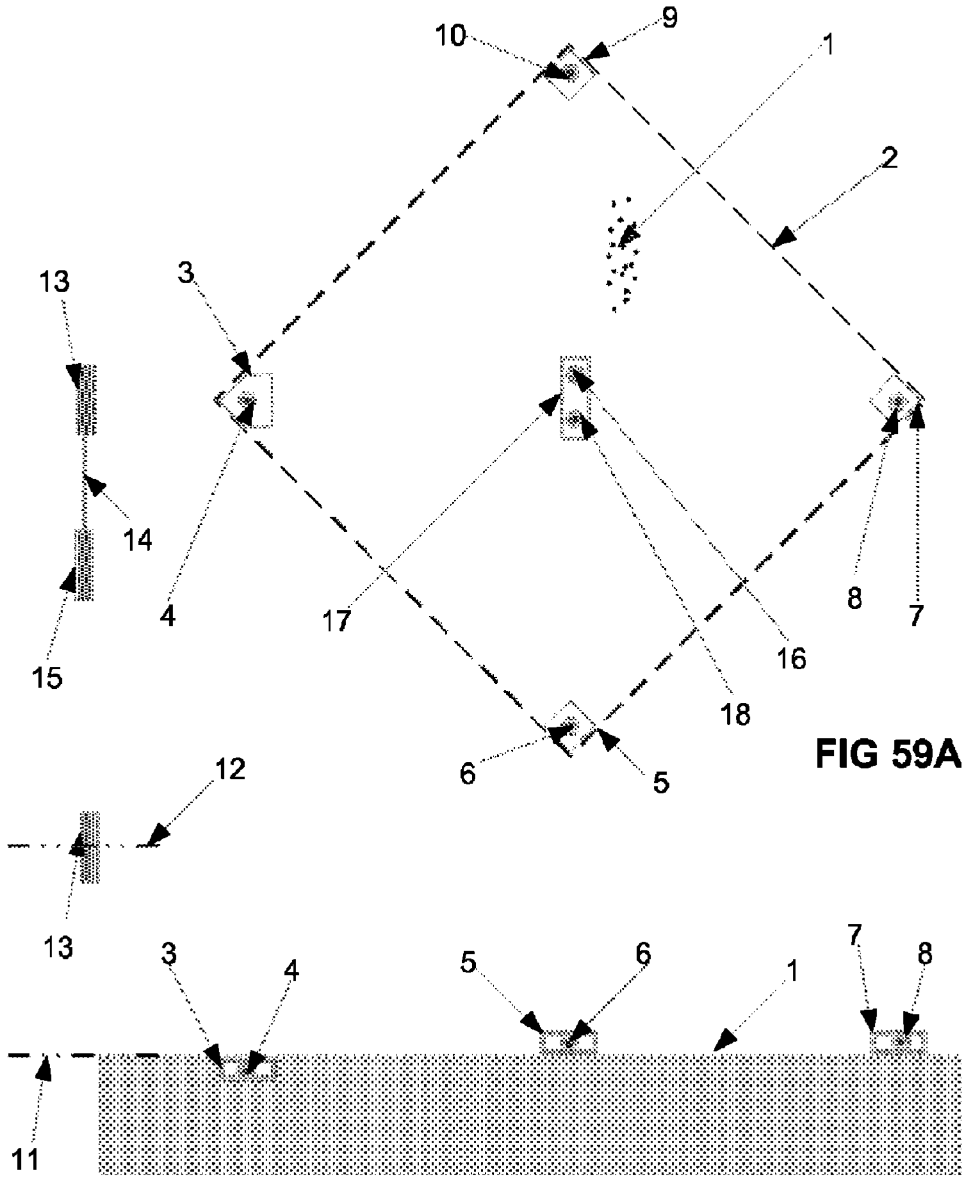

FIG. 59A is a diagram of the top view of a typical instrumented baseball stadium equipped to wirelessly televise baseball games from instrumented sports paraphernalia on the baseball playing field.

FIG. 59B is a diagram of the side view of a typical instrumented baseball stadium equipped to wirelessly televise baseball games from instrumented sports paraphernalia on the baseball playing field.

Figure 60A:
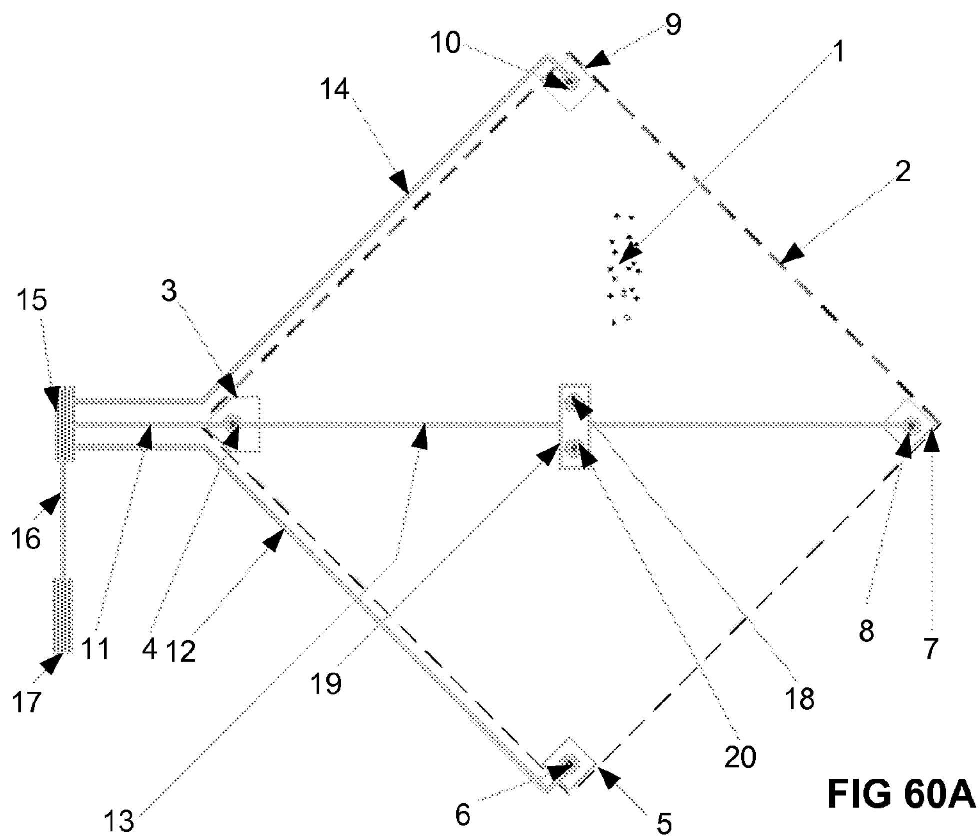

FIG. 60A is a diagram of the top view of a typical instrumented baseball stadium equipped to televise baseball games via fiber optics cable and/or bi-directional high speed copper network communications cable from instrumented sports paraphernalia on the baseball playing field.

Figure 60B:
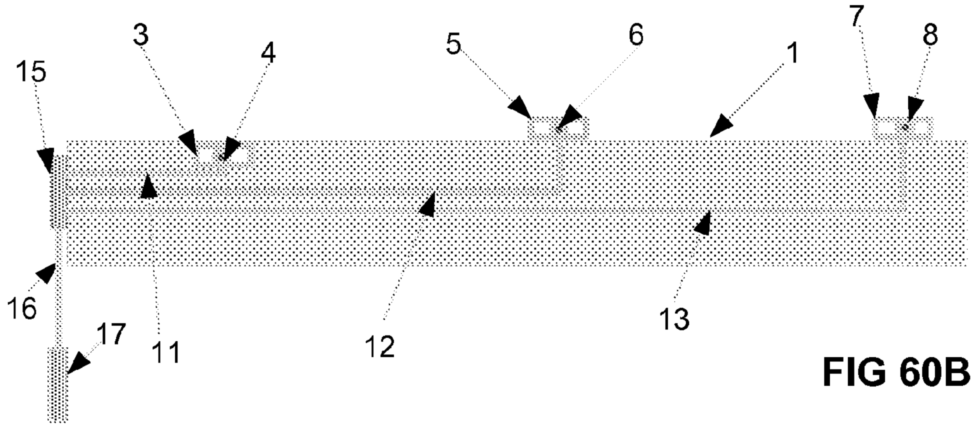

FIG. 60B is a diagram of the side view of a typical instrumented baseball stadium equipped to televise baseball games via fiber optics cable and bi-directional high speed copper network communications cable from instrumented sports paraphernalia on the baseball playing field.

Figure 61A:
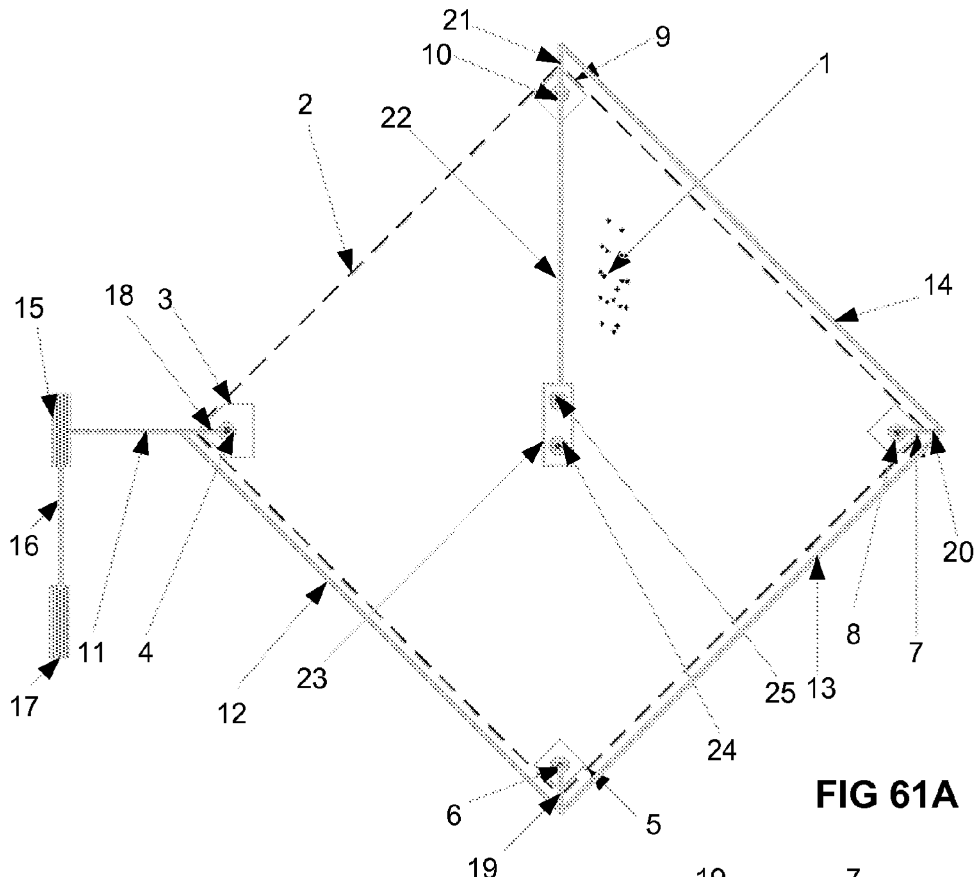

FIG. 61A is a diagram of the top view of a typical instrumented baseball stadium equipped to televise baseball games via fiber optics cable and bi-directional high speed copper network communications cable from instrumented sports paraphernalia on the baseball playing field.

Figure 61B:
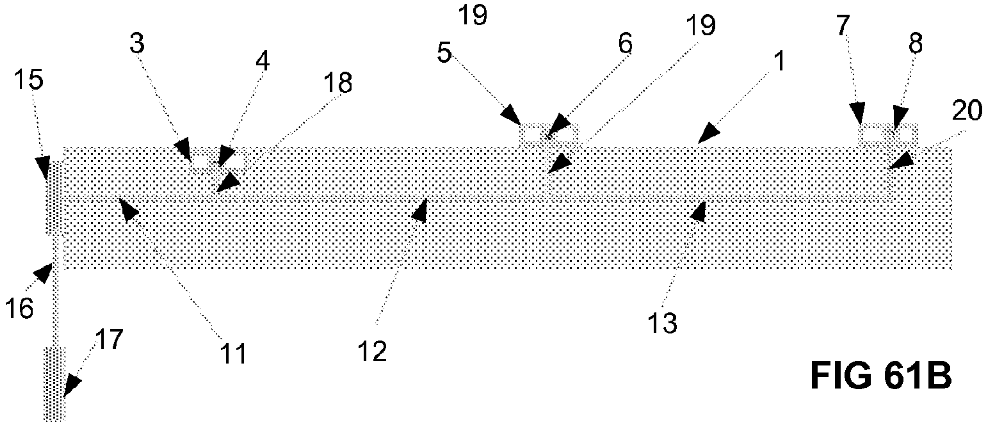

FIG. 61B is a diagram of the side view of a typical instrumented baseball stadium equipped to televise baseball games via fiber optics cable and bi-directional high speed copper network communications cable from instrumented sports paraphernalia on the baseball playing field.

Figure 62A:
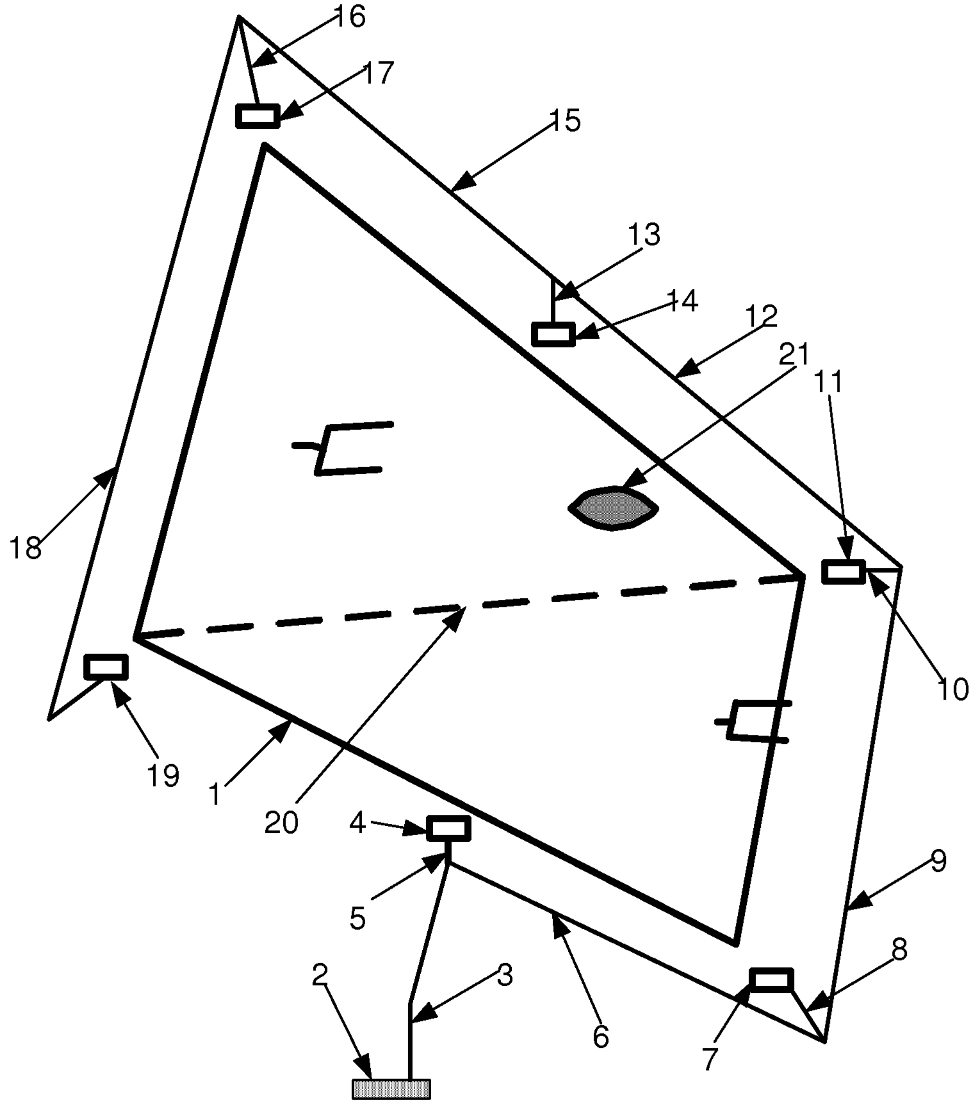

FIG. 62A is a diagram of a typical instrumented football stadium equipped with a wireless RF bi-directional communications link to televise football games from an instrumented football, which is in play on the football playing field, and a remote base station via the antenna array relay junction.

Figure 62B:
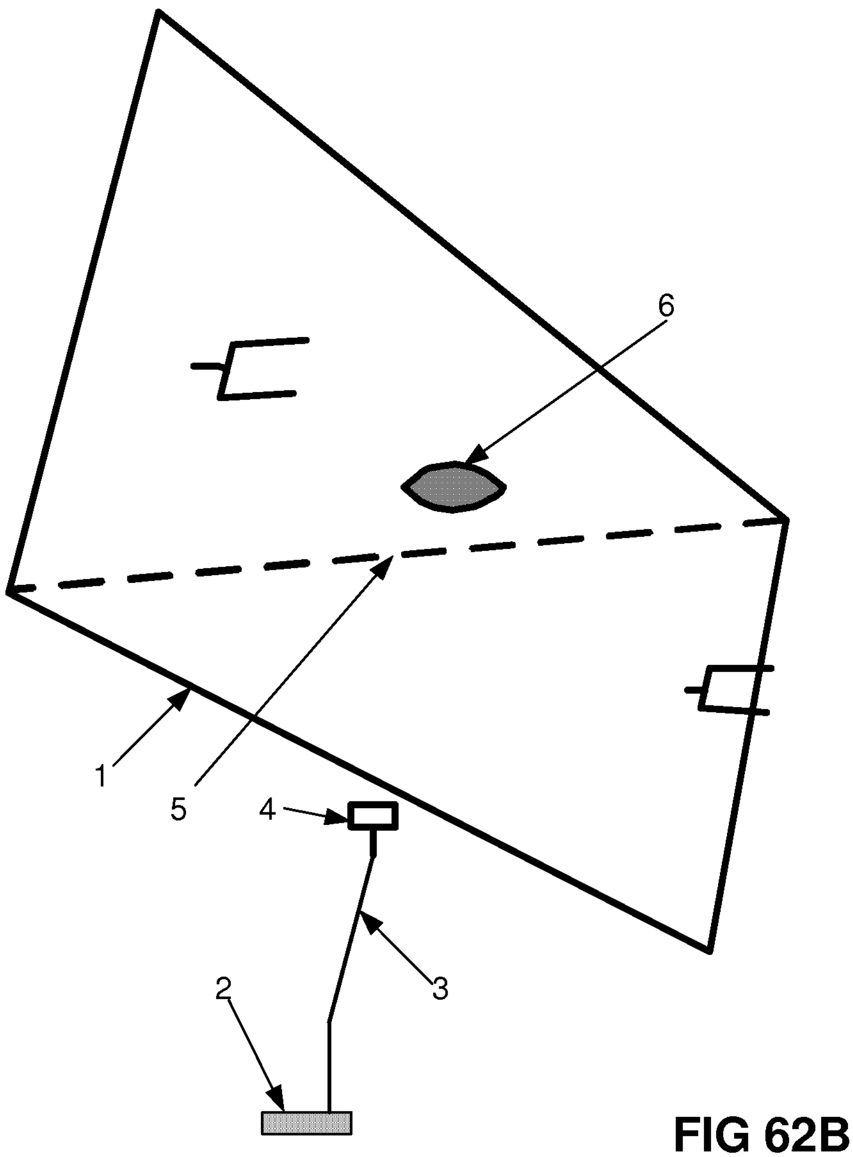

FIG. 62B shows a typical instrumented football stadium equipped with a wireless bi-directional RF communications link to televise football games from an instrumented football, which is in play on the football playing field, and a remote base station via the antenna array relay junction.

Figure 62C:
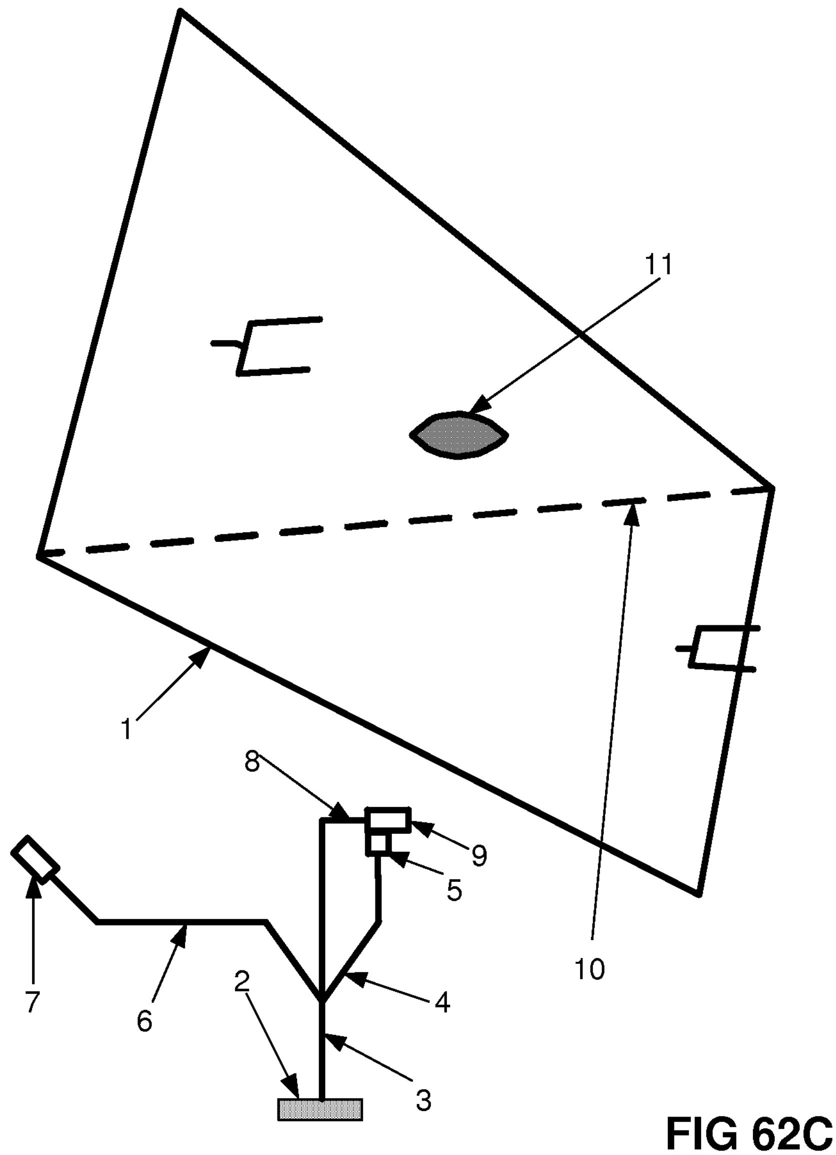

FIG. 62C shows a typical instrumented football stadium equipped with a wireless bi-directional RF communications link to televise football games from an instrumented football which is in play on the football playing field, and a remote base station via the antenna array relay junction.

Figure 62D:
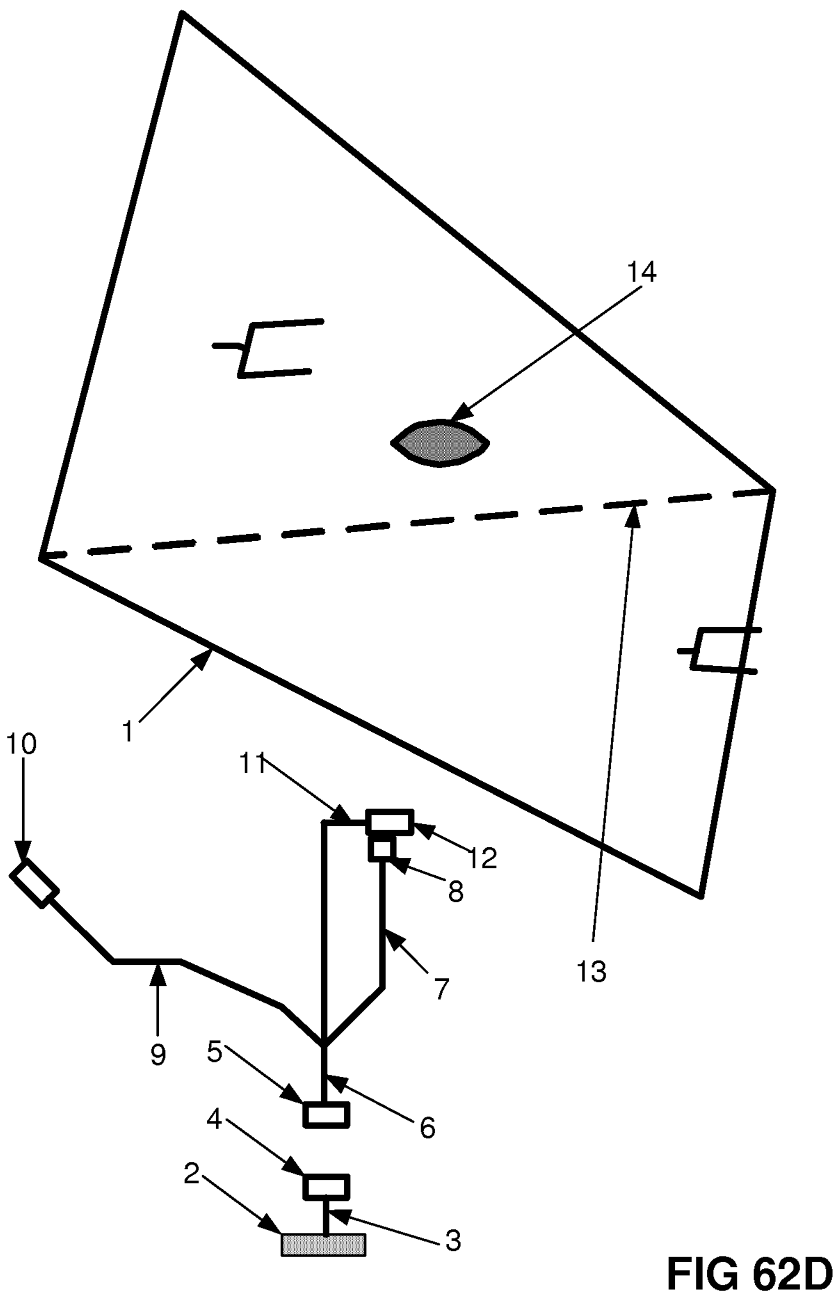

FIG. 62D shows a typical instrumented football stadium equipped with a wireless bi-directional communications link to televise football games from an instrumented football which is in play on the football playing field, and a remote base station via the antenna array relay junction.

Figure 62E:
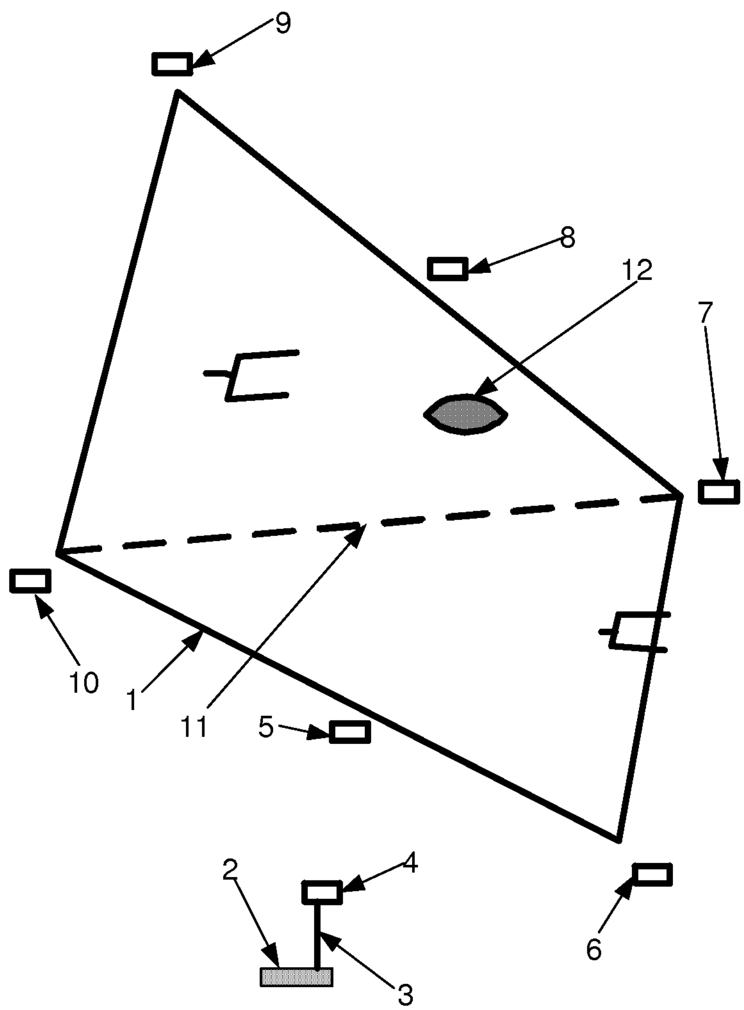

FIG. 62E shows a typical instrumented football stadium equipped with a wireless bi-directional communications link to televise football games from an instrumented football which is in play on the football playing field, and a remote base station via the antenna array relay junction.

Figure 63A:
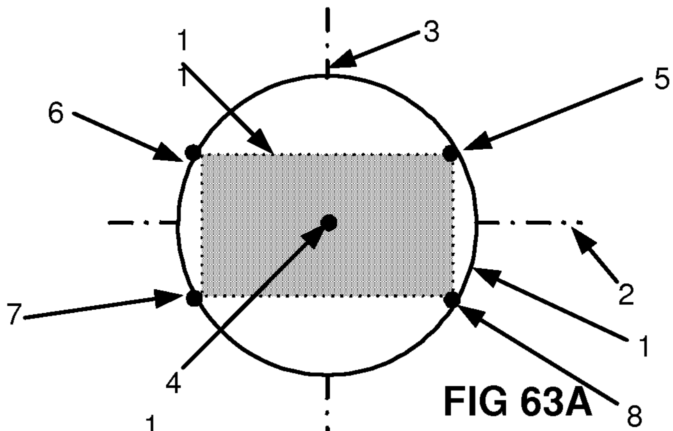

FIG. 63A is a top view of the circular CCD camera chip showing the scanned letterbox picture frame format superimposed on it at an angular direction of zero degrees.

Figure 63B:
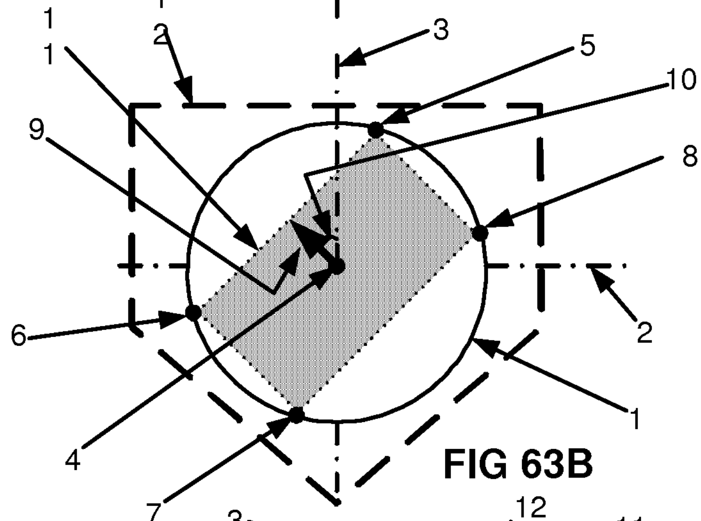

FIG. 63B is a top view of a virtual instrumented baseball home plate showing the generalized orientation of the circular CCD camera's sensor chip with the electronically scanned letterbox format superimposed on it at an arbitrary angular direction.

Figure 63C:
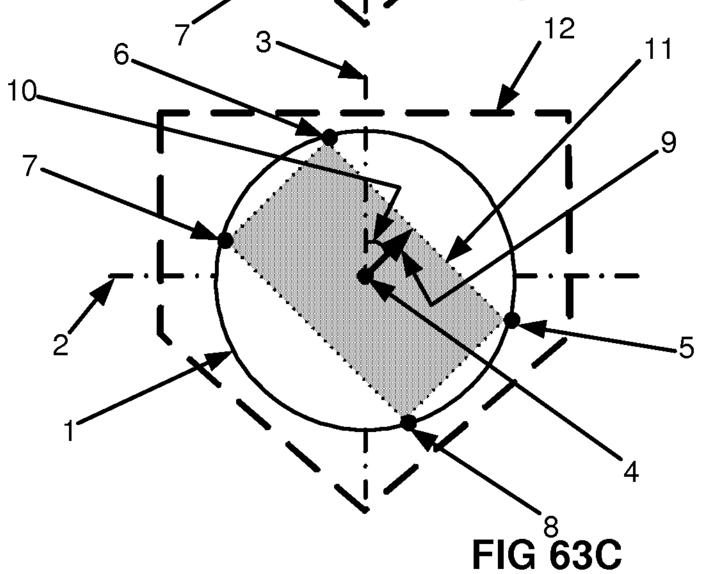

FIG. 63C is a top view of a virtual instrumented baseball home plate showing the generalized orientation of the circular CCD camera's sensor chip with the electronically scanned letterbox format superimposed on it at an angular direction of minus forty five degrees.

Figure 64A:
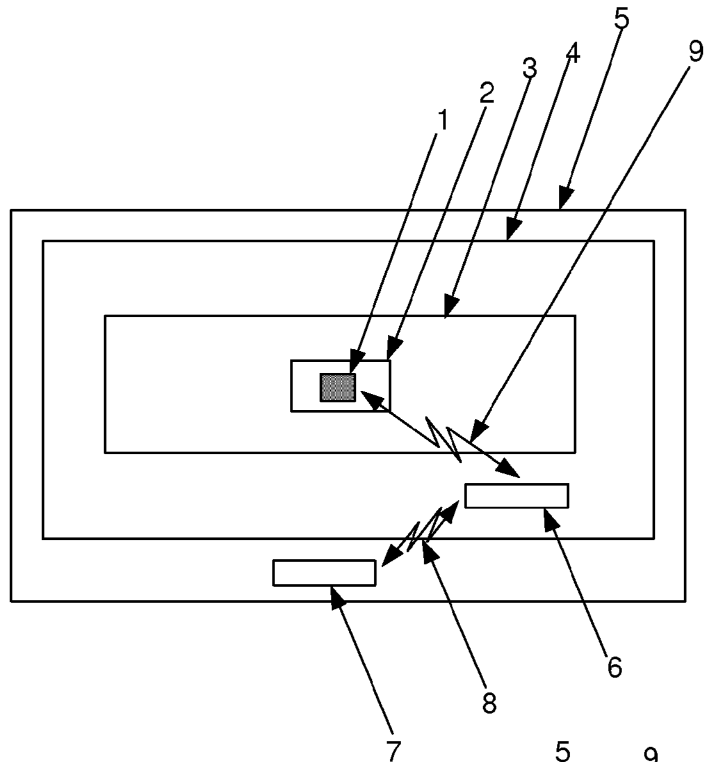

FIG. 64A is a top view of a typical instrumented sports stadium having been configured for use with both static and dynamic instrumented sports paraphernalia, for televising games from the playing field using wireless radio wave communication links.

Figure 64B:
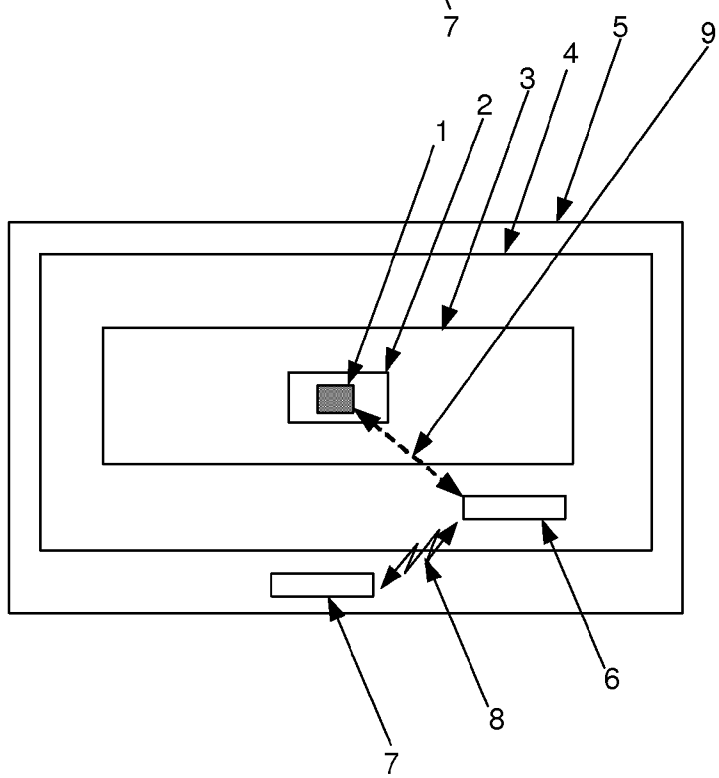

FIG. 64B is a top view of a typical instrumented sports stadium having been configured and equipped for use with static instrumented sports paraphernalia, for televising games from the playing field using fiber optics cable and bi-directional high speed copper network cable communication links.

Figure 64C:
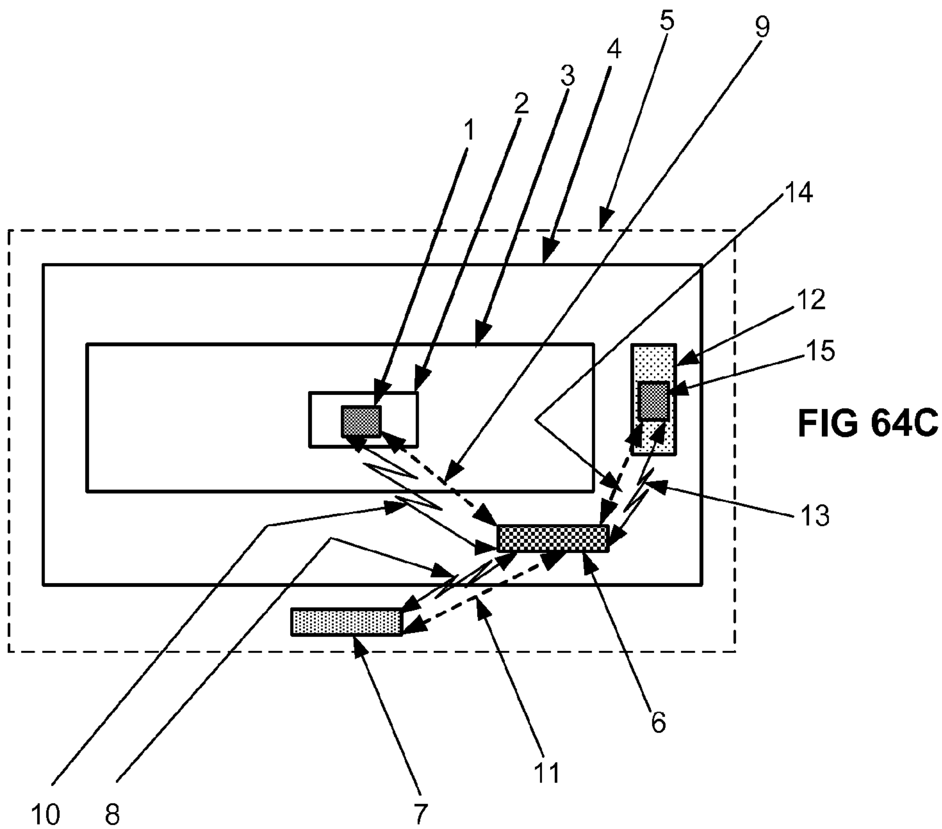

FIG. 64C is a top view of a typical instrumented sports stadium that has been configured and equipped for use with both static and dynamic instrumented sports paraphernalia, for televising games from both on the playing field, and off the playing field, using bi-directional wireless radio wave communication links and/or bi-directional fiber optics cable and bi-directional high speed copper network communications cable links.

Figures 65A, 65B, 65C:
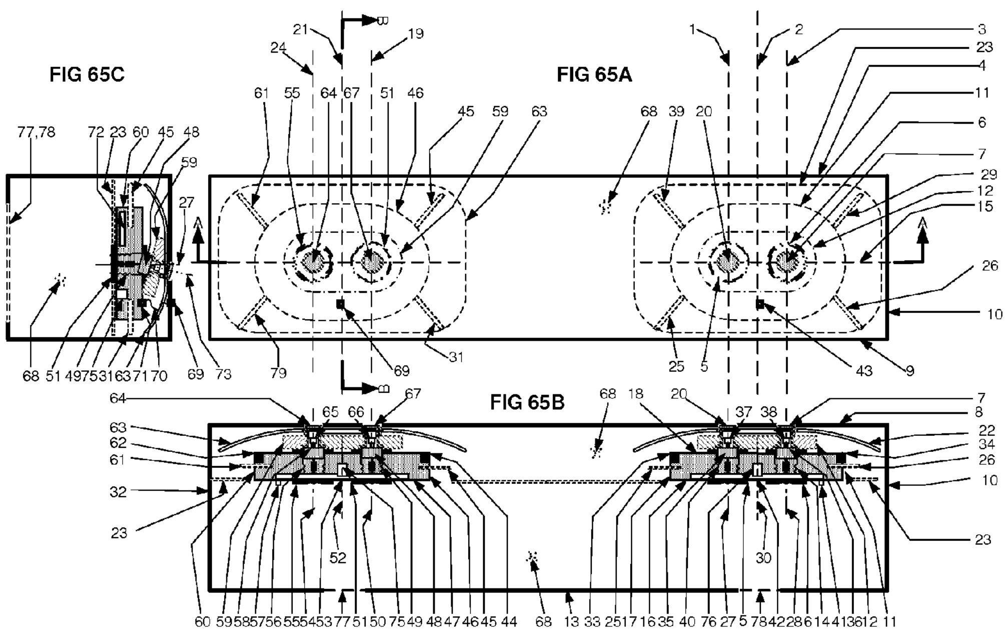

FIG. 65A is a top view of the instrumented baseball pitcher's rubber.

FIG. 65B is a side view of the instrumented baseball pitcher's rubber.

FIG. 65C is an end view of the instrumented baseball pitcher's rubber.

Figure 66A:
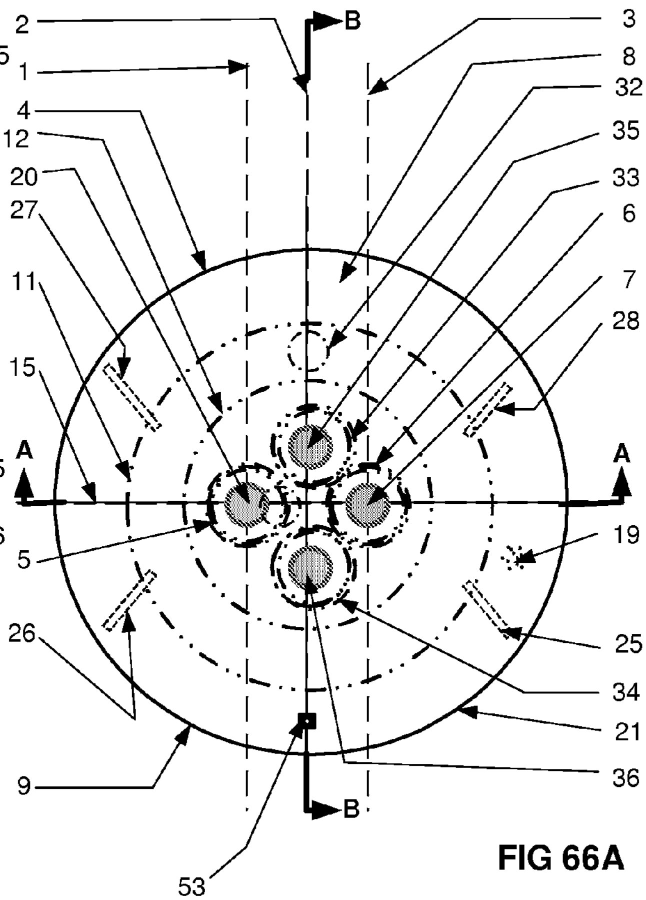

FIG. 66A is a top view of the instrumented hockey puck.

Figure 66C:
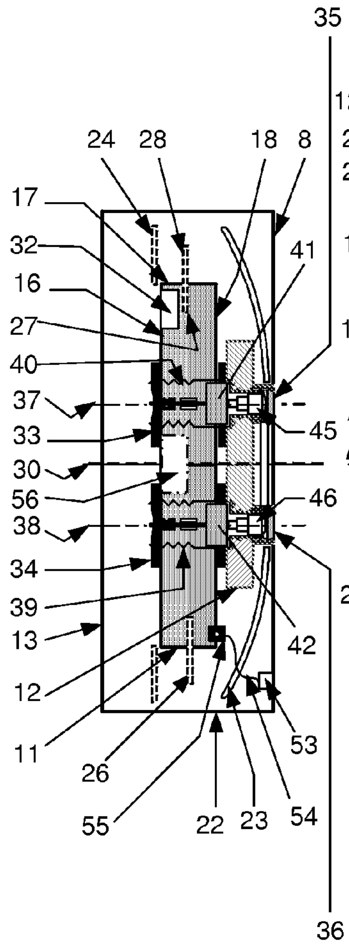
Figure 66B:
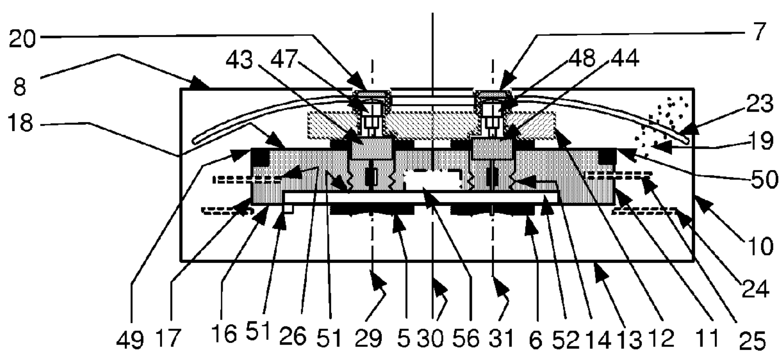

FIG. 66B is a front view of the instrumented hockey puck.

FIG. 66C is a side view of the instrumented hockey puck.

DETAILED DESCRIPTION OF THE INVENTION

Throughout this description, the preferred embodiments and examples shown should be considered as examples, rather than limitations, of the present invention.

The following are some of the preferred embodiments and contemplations disclosed in the present invention for the major system components of the "Instrumented Sports Paraphernalia System" discussed in the detailed descriptions of the drawings.

| General Instrumented Sports Paraphernalia System | |
|---|---|
| Instrumented Sports Paraphernalia | Instrumentation Package Assemblies |
| Instrumented Sports Stadiums | Instrumented Football Bladders |
| Instrumented Playing Fields | Cameras and Optical Windows |
| Instrumented Bullpens | Buffer Plate Assemblies |
| Remote Base Stations | 3-Dimension Stereo Camera Pairs |
| Instrumented Footballs | Antenna Array Relay Junctions |
| Instrumented Baseball Bases | Battery Charging Stations |
| Instrumented Baseball Home Plates | Hand Held Remotes |
| Instrumented Baseball Pitcher's Rubbers | Tripod Mounted Set-up Camera System |
| Instrumented Ice Hockey Pucks | Upper Protective Cover Plates |

General "Instrumented Sports Paraphernalia System" Preferred Embodiments and Contemplations The present invention contemplates equipping existing prior art sports stadiums with an "Instrumented Sports Paraphernalia System" comprised of instrumented sports paraphernalia, an antenna array relay junction(s), bi-directional communication links and a remote base station, to improve the quality of the sports stadium's TV broadcasts. The present invention contemplates a system for televising professional, college and high school league sports games with cameras and microphones positioned on the playing field amongst the players. The TV cameras and microphones, along with their supporting electronics, are packaged in modules which are housed inside selected sports paraphernalia that are used in the game by the players on the playing field. Sports paraphernalia instrumented in this way will be called "instrumented sports paraphernalia". The module containing the TV cameras and microphones will be called an "instrumentation package assembly". Examples of preferred embodiments of instrumented sports paraphernalia disclosed in the present invention are: instrumented footballs, instrumented baseball $1^{st}$, $2^{nd}$ and 3rd bases, instrumented baseball home plates, instrumented baseball pitcher's rubbers and instrumented ice hockey pucks. The televised pictures and sound are transmitted as signals from the instrumented sports paraphernalia via wireless radio, and/or fiber optics cable, and/or copper cable to an antenna array relay junction which is positioned beyond the side lines of the playing field. The antenna array relay junction then relays the signals by wireless radio, and/or fiber optics cable and/or copper cable to a remote base station which is in the vicinity of the sports stadium. The remote base station processes the incoming signals and broadcasts the pictures and sounds to a live TV viewing audience. In a preferred embodiment of the present invention, the remote base station receives signals from a multitude of instrumented sports paraphernalia simultaneously. In a preferred embodiment of the present invention, the remote base station transmits command and control signals back to the multitude of instrumented sports paraphernalia to control their functions and monitor their status. In alike manner, the present invention contemplates ways and means to televise the pictures and sounds from sports demonstrations, sports promotions, sports commercials, player warm-up sessions, and player training sessions.

The present invention contemplates televising pictures and sounds of the players from rare exciting vantage points amongst the players on the playing field and in their bullpens in SD, HD and 3-D. The present invention contemplates broadcasting real time pictures to the TV viewing audience, which originate from dynamic instrumented sports paraphernalia, and have been processed by the remote base station so that they are free of jitter, shaking and spin. The present invention enables cameras and microphones to be near to and amongst the players themselves during each play of the game. The present invention provides a more close at hand method of televising fast action packed sports events, like football, baseball, and ice hockey by doing it from the sports paraphernalia used by the players within the game itself; thereby conveying a level of excitement and detail of the game heretofore unrealized by the viewing audience. It is contemplated that the instrumented sports paraphernalia will be equipped with 3-D stereo camera pairs to further convey the realism and excitement of the game to the TV viewing audience.

The present invention contemplates that the TV cameras will see out onto the playing field from a whole selection of vantage points from inside the instrumented sports paraphernalia. For example, TV cameras will see out from all sides of the instrumented baseball $1^{st}$, $2^{nd}$ and $3^{rd}$ bases; TV cameras will see out from the tops of instrumented baseball home plates; TV cameras will see out from the tops of instrumented baseball pitchers rubbers; TV cameras will see out from the tops of instrumented ice hockey pucks; TV cameras will see out from both vertices of instrumented footballs. The present invention contemplates that the instrumented sports paraphernalia will be flexible to contain a whole selection of TV camera configurations. For example, in a preferred embodiment a TV camera will see out from each of the two vertices of the instrumented football; in another preferred embodiment a TV camera will see out from each of the four sides of each of the instrumented baseball $1^{st}$, $2^{nd}$ and $3^{rd}$ bases; in another preferred embodiment a 3-D stereo pair of TV cameras will see out from each of the four sides of each of the instrumented baseball $1^{st}$, $2^{nd}$ and $3^{rd}$ bases; in another preferred embodiment a 3-D stereo pair of TV cameras will see out from each of the four corners of each of the instrumented baseball $1^{st}$, $2^{nd}$ and $3^{rd}$ bases; in another preferred embodiment a single TV camera will see out from the top of the instrumented baseball home plate; in another preferred embodiment a 3-D stereo pair of TV cameras will see out from the top of the instrumented baseball home plate; in another preferred embodiment two 3-D stereo pairs of TV cameras will see out from the top of the instrumented baseball home plate; in another preferred embodiment effectively six 3-D stereo pairs of TV cameras will see out from the top of the instrumented baseball home plate; in another preferred embodiment a single TV camera will see out from the top of the instrumented ice hockey pucks; in another preferred embodiment two 3-D stereo pairs of TV cameras will see out from the top of the instrumented ice hockey pucks; in another preferred embodiment effectively six 3-D stereo pairs of TV cameras will see out from the top of the instrumented ice hockey pucks; in another preferred embodiment two 3-D stereo pairs of TV cameras will see out from the top of the instrumented baseball pitcher's rubber; in another preferred embodiment effectively six 3-D stereo pairs of TV cameras will see out from the top of the instrumented baseball pitcher's rubber.

The present invention contemplates that the instrumentation package assembly within the instrumented sports paraphernalia be instrumented with a transceiver and antenna capable of transmitting radio signals encoded with the picture and sound information to a remote base station via an antenna array relay junction. The present invention contemplates that instrumented sports paraphernalia, that are in play on the playing field during professional league games and player training sessions, are instrumented with cameras and microphones enabling them to acquire pictures and sounds of the players from amongst the players on the playing field. Electronics within the instrumentation package assembly televises the pictures and sounds to a remote base station via an antenna array relay junction.

The present invention contemplates that the instrumented sports paraphernalia can substitute for conventional sports paraphernalia on the playing field amongst the players and be accepted by the leagues. The present invention contemplates the instrumented sports paraphernalia to have substantially the same weight, balance, appearance and playing qualities as conventional professional league sports paraphernalia, so as to be accepted as credible substitutes by the leagues and qualify them to substitute for conventional professional league sports paraphernalia used in the game. The present invention contemplates a system for wirelessly televising professional league football games from footballs that are instrumented with television cameras and microphones that are housed inside the footballs, where TV signals are transmitted from the cameras and microphones from within the footballs to a remote base station; where from the final signals are broadcasted to a TV viewing audience.

The present invention contemplates a system for wirelessly televising professional league baseball games from baseball $1^{st}$, $2^{nd}$ and 3rd bases, baseball pitcher's rubbers, ice hockey pucks and baseball home plates that are instrumented with television cameras and microphones that are housed inside the sports paraphernalia, where TV signals are transmitted from the cameras and microphones within to a remote base station, where from the final signals are broadcasted to an TV viewing audience. The present invention contemplates a system for wirelessly televising professional league baseball games from the pitcher's rubber's that are instrumented with television cameras and microphones that are housed inside the pitcher's rubber's, where TV signals are transmitted from the cameras and microphones from within the pitcher's rubber's to a remote base station, and from where the final signals are broadcasted to an audience. The present invention contemplates a system for wirelessly televising professional league ice hockey games from ice hockey pucks that are instrumented with television cameras and microphones that are housed inside the pucks, where TV signals are transmitted from the cameras and microphones from within the pucks to a remote base station, and from where the final signals are broadcasted to an audience. The present invention contemplates a system for wirelessly televising professional, college and high school games from sports paraphernalia that are instrumented with television cameras and microphones that are housed inside the sports paraphernalia, where TV signals are transmitted from the cameras and microphones from within the sports paraphernalia to a remote base station, and from where the final signals are broadcasted to an audience.

The present invention contemplates a system for televising professional, college and high school league baseball games from $1^{st}$, $2^{nd}$ and 3rd bases, home plates, and pitcher's rubbers that are instrumented with television cameras and microphones that are housed inside the instrumented baseball bases, baseball home plates, and pitcher's rubbers where TV signals are transmitted from the cameras and microphones from within the bases, plates and rubbers to a remote base station via fiber optics cable and/or copper cable that is buried in the ground beneath the playing field, and from where the remote base station broadcasts the final signals to an audience. The present invention contemplates that the instrumentation package assembly within the instrumented sports paraphernalia be instrumented with a transceiver and antenna to transmit radio signals encoded with the picture and sound information to a remote base station via an antenna array relay junction. The present invention contemplates that one or more cameras, and one or more microphones, and supporting electronics are packaged within an instrumentation package assembly that is housed inside the instrumented sports paraphernalia. The instrumented sports paraphernalia is used on the field of play in place of the conventional sports paraphernalia which it replaces during a game. The instrumented sports paraphernalia has the identical outward appearance and playability as the conventional sports paraphernalia it replaces. The instrumented sports paraphernalia possesses one or more optical windows through which its cameras may acquire video as they look out onto the playing field. The instrumentation package assembly possesses sound conduction paths by which the microphones hear the sounds of impacts made directly to the instrumented sports paraphernalia and also sounds made in the vicinity of the instrumented sports paraphernalia. The instrumented sports paraphernalia possesses all the elements within itself, necessary to wirelessly transmit video and sound of the game from within itself, to a remote base station via an antenna array relay junction. The antenna array relay junction and the remote base station are both located in the sports stadium and its vicinity. The instrumented sports paraphernalia is deployed at the traditional location of the conventional sports paraphernalia which it substitutes for on the playing field amongst the players during a game.

Inside the instrumented sports paraphernalia the TV cameras are deployed at optical windows enabling them to look out from the instrumented sports paraphernalia onto the playing field. The pictures and sounds acquired by the TV cameras and microphones are transmitted from the instrumented sports paraphernalia via a bi-directional closed circuit transmitting and receiving network to a remote base station. The pictures and sounds are processed and formatted at the remote base station, thus preparing them for presentation to a final live TV audience for viewing. An operator at the remote base station commands and controls the electronic and optical functions of the instrumented sports paraphernalia by transmitting command and control signals to the instrumented sports paraphernalia using the bi-directional RF wireless and/or fiber optics cable network. The present invention is contemplated to endure the rigors of the hostile environment on the field. The instrumented sports paraphernalia is both airtight and watertight and is designed to endure shock, vibration and temperature extremes. The present invention overcomes the shortcomings of the prior art by providing a more close at hand method of televising fast action packed sports events like football and baseball, by doing it from instrumented sports paraphernalia used by the players within the game itself; thereby conveying a level of excitement and detail of the game heretofore unrealized by the viewing audience. The microphones pick up the impacts and shocks to the football when the instrumented football is thrown, hiked, caught, hit, fumbled, kicked, sacked or strikes the goal post netting. The audience can also hear the rush of the air as the football spins on a pass through the air.

The present invention visually and audibly extends and enhances the audience's pleasure and excitement of the game by acquiring pictures and sounds from the spatial vantage points occupied by instrumented sports paraphernalia on the playing field amongst the players. Such intimate pictures and sounds taken so close and immediate to the players have heretofore been unobtainable during football games, baseball games, and ice hockey games. These pictures and sounds taken from these special vantage points are not possible in the prior art. For example, the microphones pick up and enable the audience to hear in real time the real impacts and shocks to the puck's skin when the ice hockey puck is hit, moving, being blocked or striking the goal post netting when a goal is scored. The audience can also hear the rush and scraping of the flying ice flakes as the puck spins with forward motion on the ice. The present invention visually and audibly extends and enhances the audience's pleasure and excitement of the game by acquiring pictures and sounds from special spatial vantage points that are not possible in the prior art. Such intimate pictures and sounds taken so close and immediate to the players have heretofore been unobtainable. The present invention contemplates ways and means to capture pictures and sounds of the players during popular sports events, demonstrations, promotions, warm-ups and player training sessions from vantage points amongst the players on the playing field.

This invention enables cameras and microphones to be near to and amongst the players themselves during each play. The present invention contemplates that the instrumentation package assembly within the instrumented sports paraphernalia be instrumented with a transceiver and antenna capable of transmitting radio signals encoded with the picture and sound information to a remote base station. The present invention contemplates instrumented sports paraphernalia that have substantially the same weight, balance, appearance and playing qualities of conventional regulation professional, college and high school league sports paraphernalia, so as to be accepted as credible substitutes by the leagues and qualify them to substitute for sports paraphernalia used in the game. The present invention contemplates instrumenting sports paraphernalia such as footballs, hockey pucks, 1st and $2^{nd}$ and 3rd baseball bases, home plates, and baseball pitcher's rubbers. The present invention contemplates that sports paraphernalia that are in play on the playing field during professional league games, player training sessions and warming-up sessions, are instrumented with cameras and microphones thereby enabling them to acquire pictures and sounds of the players on the field. The present invention contemplates ways and means to process and format wirelessly transmitted pictures and sounds from sports paraphernalia, thereby enabling their presentation to a viewing audience. The present invention contemplates ways and means to televise pictures and sounds of sports events, sports demonstrations, sports promotions, sports player warm-up and player training sessions, by instrumenting sports paraphernalia used in the game with TV cameras and microphones. The present invention contemplates that the remote base station be equipped with hardware and software for processing the encoded radio signals it receives from the instrumented sports paraphernalia and preparing the encoded pictures and sounds with a format suitable for presentation to a viewing audience.

The present invention contemplates a remote base station where the pictures and sounds received from the cameras and microphones within the instrumented sports paraphernalia are processed and formatted, thus preparing them for presentation to a final live TV audience for viewing. The present invention contemplates that the instrumented sports paraphernalia functions are enabled, commanded and controlled in response to signals it receives from the remote base station. The present invention visually and audibly extends and enhances the audience's pleasure and excitement of the game by acquiring pictures and sounds from special spatial vantage points that are not possible in the prior art. Such intimate pictures and sounds taken so close and immediate to the players have heretofore been unobtainable. The present invention achieves this objective by providing a more close at hand method of televising fast action packed sports events, like baseball, by doing it from paraphernalia used by the players within the game itself; thereby conveying a level of excitement and detail of the game heretofore unrealized by the viewing audience. This invention enables cameras and microphones to be near to and amongst the players themselves during each play. Microphones pick up and enable the audience to hear in real time the impacts and shocks when the football is thrown, hiked, caught, hit, fumbled, kicked, sacked or striking the goal post netting. The audience can also hear the rush of the air as the football spins on a pass through the air.

The present invention contemplates producing instrumented sports paraphernalia that have substantially the same weight, balance, appearance and playing qualities of conventional professional league sports paraphernalia, so as to be accepted as a credible substitute by the leagues and qualify it to substitute for conventional professional league sports paraphernalia used in the game. Besides professional league games, the present invention contemplates a variety of other venues like college and high school sporting events and training sessions where the instrumented sports paraphernalia may be used. The present invention contemplates a system for wirelessly televising professional league baseball games from baseball bases and baseball home plates that are instrumented with television cameras and microphones that are housed inside the instrumented baseball bases and baseball home plate, where TV signals are transmitted from the cameras and microphones within the bases and plates to a remote base station. Inside the instrumented sports paraphernalia the TV cameras are deployed at optical windows enabling them to look out from inside the instrumented sports paraphernalia onto the playing field. The pictures and sounds acquired by the TV cameras and microphones are transmitted from the instrumented sports paraphernalia via a bi-directional closed circuit transmitting and receiving network to a remote base station. The pictures and sounds are processed and formatted at the remote base station, thus preparing them for presentation to a final live TV audience for viewing. An operator at the remote base station commands and controls the electronic and optical functions of the instrumented sports paraphernalia by transmitting command and control signals to the instrumented sports paraphernalia using the bi-directional RF wireless and/or fiber optics cable network. The present invention is contemplated to endure the rigors of the hostile environment on the field. The instrumented sports paraphernalia is both airtight and watertight and is designed to endure shock, vibration and temperature extremes.

Besides professional league games, the present invention contemplates a variety of venues like college and high school sporting events and training sessions. The cameras can be of different types, yielding picture formats such as still frame photographs, freeze frame, full motion video, real time video, SD/HD real time video, and 3-D SD/HD real time video. The present invention contemplates enhancing the enjoyment of sports events, demonstration games, player training and warm-up sessions by other live audiences besides live TV viewing audiences. Examples of such audiences are those streaming on the internet, those viewing live general displays in stadiums, those reviewing reproductions of all the intimate details of the game that were too numerous to broadcast in real time, and instant replay judges/umpires etc. Readers of newspapers and magazines can also benefit by the high resolution still photos of critical plays that the system produces. The present invention contemplates ways and means to process and format the pictures and sounds from the cameras and microphones to enable their presentation to a viewing audience.

Instrumented Sports Paraphernalia Preferred Embodiments and Contemplations

The present invention contemplates that sports paraphernalia, that are in play on the playing field during sports games, are instrumented with TV cameras and microphones enabling them to acquire the pictures and sounds of the players on the field, and televise them to a remote base station via an antenna array relay junction. The present invention overcomes the shortcomings of the prior art by providing a more close at hand method of televising fast action packed sports events by doing it from the instrumented sports paraphernalia used by the players within the game itself; thereby conveying a level of excitement and detail of the game heretofore unrealized by the viewing audience. The present invention contemplates ways and means to televise the pictures and sounds of professional sports events, college sports events and high school sports events. The present invention contemplates instrumenting sports paraphernalia such as footballs, hockey pucks, baseball's $1^{st}$, $2^{nd}$ and 3rd bases, home plates, and baseball pitcher's rubbers, etc.

The present invention contemplates that TV cameras, lenses, microphones, RF antennas, electronics and a battery pack are housed within the instrumented sports paraphernalia inside a module called the instrumentation package assembly. The present invention contemplates that the instrumentation package assembly possesses all the elements necessary to acquire and transmit the video and sound of the game by fiber optics cable/copper cable and/or wirelessly by RF to the remote base station, while the instrumented sports paraphernalia is on the playing field during a sports game. The present invention contemplates a system for wirelessly televising sports games from sports paraphernalia that are instrumented with television cameras and microphones that are housed inside the instrumented sports paraphernalia inside a module called an instrumented package assembly. The present invention contemplates that sports paraphernalia, that are in play on the playing field during sports games are instrumented with cameras and microphones thereby enabling them to acquire pictures and sounds of the players on the field. The present invention contemplates that the cameras and microphones that are used to instrument the sports paraphernalia can be of different types, yielding picture formats such as still frame photographs, freeze frame, full motion video, real time video, SD/HD real time video, and 3-D SD/HD real time video.

The present invention contemplates a remote base station where the pictures and sounds received from the cameras and microphones within the instrumented sports paraphernalia are processed and formatted, thus preparing them for presentation to a final live TV audience for viewing. The present invention contemplates achieving its objectives by a more close at hand method of televising fast action packed sports events, like football, by doing it from instrumented sports paraphernalia used by the players within the game itself, enabling cameras and microphones to be near to and amongst the players themselves during each play, thereby conveying a level of excitement and detail to the game heretofore unrealized by the TV viewing audience using prior art methods. The present invention visually and audibly extends and enhances the audience's pleasure and excitement of the game by acquiring pictures and sounds from all the special spatial vantage points that the instrumented sports paraphernalia occupies and sees and feels on the field. Such intimate pictures and sounds taken so close and immediate to the players have heretofore been unobtainable during sports games. For example, the microphones pick up and enable the audience to hear in real time the impacts and shocks when the instrumented sports paraphernalia is thrown, hiked, caught, hit, fumbled, kicked, pitched, sacked or striking the goal post netting. The audience can also hear the rush of the air as the instrumented sports paraphernalia spins on a pass through the air. The present invention contemplates that the instrumented sports paraphernalia be equipped with a battery pack capable of being wirelessly charged by a source external to the instrumented sports paraphernalia.

The present invention contemplates that instrumented sports paraphernalia be equipped with a battery pack capable of being removed from the instrumented sports paraphernalia and replaced by a substitute battery pack. The present invention contemplates instrumenting both moving and static sports paraphernalia. The present invention contemplates instrumented sports paraphernalia that endures the rigors of the hostile environment on the sports playing field. The present invention contemplates instrumented sports paraphernalia that has substantially the same weight, balance, outward appearance and playing qualities of conventional league sports paraphernalia, so as to be accepted as a credible substitute by the conventional league sports paraphernalia used in the game. The present invention contemplates instrumented sports paraphernalia with optical windows through which the TV cameras within the instrumented sports paraphernalia to look out onto the playing field.

Instrumented Sports Stadiums/Arenas Preferred Embodiments and Contemplations

In a preferred embodiment of the present invention, an instrumented sports stadium/arena is equipped with an antenna array relay junction which serves as a means to receive wirelessly televised video and sound signals from the instrumented sports paraphernalia and relay same to the remote base station. The antenna array relay junction also serves as a means to relay command and control signals wirelessly from the remote base station to the instrumented sports paraphernalia. In a preferred embodiment of the present invention, an instrumented sports stadium is equipped with an antenna array which serves as a means to receive wirelessly televised video and sound signals from instrumented footballs, instrumented baseball bases, instrumented baseball home plates, instrumented baseball pitcher's rubbers, instrumented hockey pucks, which are examples of static and dynamic instrumented sports paraphernalia In a preferred embodiment of the present invention, an instrumented sports stadium is equipped with an antenna array relay junction which serves as a means to receive televised video and sound signals from the instrumented sports paraphernalia by fiber optics cable and relay same to the remote base station by fiber optics cable. The antenna array relay junction also serves as a means to relay command and control signals from the remote base station to the instrumented sports paraphernalia by fiber optics cable. Instrumented baseball bases, instrumented baseball home plates, instrumented baseball pitcher's rubbers, instrumented hockey pucks, are examples of static instrumented sports paraphernalia. In a preferred embodiment of the present invention, an instrumented sports stadium is equipped with an antenna array relay junction which serves as a means to receive televised video and sound signals from the instrumented sports paraphernalia wirelessly and/or by fiber optics cable and relay same to the remote base station wirelessly and/or by fiber optics cable. The antenna array relay junction also serves as a means to relay command and control signals from the remote base station to the instrumented sports paraphernalia wirelessly and/or by fiber optics cable.

Instrumented Playing Fields

In a preferred embodiment, the instrumented playing field is configured with bi-directional fiber optics cable/copper cable communications links buried beneath the ground between the instrumented sports paraphernalia that are positioned at their traditional locations on the playing field and the antenna array relay junction. In a preferred embodiment, an instrumented baseball 1$^{st}$ base, and instrumented baseball 2$^{nd}$ base, an instrumented baseball 3$^{rd}$ base, an instrumented baseball home plate, and an instrumented baseball pitcher's rubber are located on the baseball diamond at their traditional positions. In a preferred embodiment, an instrumented baseball 1$^{st}$ base, instrumented baseball 2$^{nd}$ base, instrumented baseball 3$^{rd}$ base, instrumented baseball home plate, and an instrumented baseball pitcher's rubber are located on the baseball diamond at their traditional positions, and connected to the bi-directional fiber optics cable/copper cable which is extended upward from under the ground into the bottom opening in each of these sports paraphernalia to form the connection.

Instrumented Baseball Bullpens

In a preferred embodiment, the instrumented baseball bullpen is configured with bi-directional fiber optics cable/copper cable communications links buried beneath the ground between the instrumented sports paraphernalia that are positioned at their traditional locations in the bullpen and the antenna array relay junction. In a preferred embodiment, an instrumented baseball home plate, and an instrumented baseball pitcher's rubber are located in the baseball bullpen at their traditional positions. In a preferred embodiment, an instrumented baseball home plate, and an instrumented baseball pitcher's rubber are located in the baseball bullpen at their traditional positions, and connected to the bi-directional fiber optics cable/copper cable which is extended upward from under the ground into the bottom opening in each of these sports paraphernalia to form the connection.

Remote Base Stations Preferred Embodiments and Contemplations

The present invention contemplates that the remote base station is equipped with hardware and software for processing the encoded video and audio signals received from the instrumented sports paraphernalia, and preparing the pictures and sounds with a format suitable for presentation to a live TV viewing audience. The present invention contemplates that the operating functions of the instrumented sports paraphernalia are enabled, commanded and controlled by signals it receives from the remote base station. The present invention contemplates instrumented sports paraphernalia where TV signals are transmitted from the cameras and microphones within the instrumented sports paraphernalia to a remote base station by fiber optics cable and/or by RF wireless radio means. The present invention contemplates a remote base station with means to process and format pictures and sounds received from a single or a multiplicity of instrumented sports paraphernalia on the playing field. The present invention contemplates that an operator at the remote base station controls all the various electronic and optical functions of the instrumented sports paraphernalia, wirelessly and/or by fiber optics cable, by transmitting command and control signals to the instrumented sports paraphernalia.

Instrumented Footballs Preferred Embodiments and Contemplations

In a preferred embodiment, referring to the disclosed instrumented football shown in FIG. 1, the instrumented football has substantially the same size, shape, grip, and color as the conventional professional league American football shown in FIG. 22. In a preferred embodiment, the present invention contemplates the instrumented football to be non-intrusive to the game. The curved exterior surface of the buffer plates is calculated to match the vesica piscis wall curvature of the cover/liner. It is made to prop up the ends of the instrumented football. The microphones pick up and enable the audience to hear in real time the impacts and shocks when the football is thrown, hiked, caught, hit, fumbled, kicked, sacked or striking the goal post netting. The audience can also hear the rush of the air as the football spins on a pass through the air.

The present invention particularly contemplates a system for televising professional league football games. Footballs are instrumented with two television cameras and microphones. Each one of the two TV cameras and microphones are housed inside the instrumented football within an instrumentation package assembly. The present invention contemplates a system for televising professional league football games as well as football games in other venues. Footballs are instrumented with two television cameras and microphones. Footballs instrumented in this manner are referred to in the present invention as instrumented footballs. The two TV cameras and microphones are housed inside the instrumented football within a module referred to in the present invention as an instrumentation package assembly. Compared to the prior art, the present invention provides a more close at hand method of televising fast action packed sports events, like football, by televising games from the football used by the players from within the game itself. Compared to the prior art, the present invention thereby conveys a level of excitement and detail of the game heretofore unrealized by the viewing audience. The present invention enables cameras and microphones to be near to and amongst the players themselves during each play.

The invention visually and audibly extends and enhances the audience's pleasure and excitement of the game by acquiring pictures and sounds from all the special spatial vantage points that the instrumented football occupies and sees and feels on the field. Such intimate pictures and sounds taken so close and immediate to the players have heretofore been unobtainable during a football game in the prior art. For example, the microphones pick up and enable the audience to hear in real time the impacts and shocks to the skin of the football when the football is thrown, hiked, caught, hit, fumbled, kicked, sacked or striking the goal post netting. The audience can also hear the rush of the air as the football spins on a pass through the air. The present invention is specifically contemplated to endure the rigors of the hostile environment on the field. The instrumentation package assembly is both airtight and watertight and is designed to endure shock, vibration and temperature. Inside the instrumentation package assembly, the TV cameras are deployed at opposite ends of the football. Optical windows enable them to look out from both ends of the football onto the playing field. The pictures and sounds acquired by the TV cameras and microphones are wirelessly transmitted from the instrumented football via a closed circuit transmitting and receiving network, to a remote base station. The pictures and sounds are processed and formatted at the remote base station, thus preparing them for presentation to a final live TV audience for viewing. An operator at the remote base station can control the various electronic and optical functions of the instrumented football by wirelessly transmitting control signals to the football from the remote base station. The present invention contemplates that the instrumented football's functions are enabled, commanded and controlled in response to signals it receives from the remote base station. In a preferred embodiment, the present invention contemplates the instrumented football to be equipped with an instrumentation package assembly shown in FIG. 2, that is mounted inside the instrumented football shown in FIG. 1, which is capable of wirelessly televising football games from its cameras and microphones contained therein; and can conveniently be inserted into the football through the conventionally sized lacing gap in the seam at the top of the football.

In a preferred embodiment of the present invention, the instrumented football has substantially the same outward appearance as the conventional professional league American football because its size, shape, grip, texture and color are made identical to the conventional professional league American football. In a preferred embodiment of the present invention, the instrumented football has substantially the same playing and handling qualities as the conventional professional league American football because its weight, center of gravity and moments of inertia are made identical to the conventional professional league American football. The present invention is contemplated to endure the rigors of the hostile environment on the field. The instrumentation package assembly is both airtight and watertight and is designed to endure shock, vibration and temperature. Inside the instrumentation package assembly, the TV cameras are deployed at opposite ends of the football. Small unobtrusive optical windows located at the football's vertices enable them to look out from both ends of the football onto the playing field. The real-time pictures and sounds acquired by the TV cameras and microphones are wirelessly transmitted from the football via a closed circuit bi-directional transmitting and receiving network, to a remote base station. The remote base station is disclosed in FIG. 62A and FIG. 62B and FIG. 62C and FIG. 62D and FIG. 62E and FIG. 64A and FIG. 64C. The pictures and sounds are processed and formatted at the remote base station, thus preparing them for presentation to a final live TV audience for viewing. An operator at the remote base station can command and control the various electronic, mechanical and optical functions of the instrumented football by wirelessly transmitting command and control signals to the instrumented football from the remote base station.

The present invention contemplates that the instrumented football's electronic and optical functions are enabled, commanded and controlled by the signals that the instrumented football receives from a remote base station. The remote base station is located on or remotely from the sports stadium grounds. In a preferred embodiment of the present invention, the antenna array which serves as a means to receive wirelessly televised video and sound signals from the instrumented football, also serves to relay the video and sound signals to a remote base station. In a preferred embodiment of the present invention an antenna array relay junction, located off the playing field in the sports stadium, serves as a means to receive and wirelessly relay televised video and sound signals from the instrumented football to the remote base station. In venues where there is no formal sports stadium, but just a playing field, the antenna array and the remote base station are located off of the playing field. In a preferred embodiment of the present invention, the instrumented football has substantially the same outward appearance as the conventional professional league American football because its size, shape, grip, texture and color are made identical to the conventional professional league American football (this makes the football unobtrusive to the players in the game.

In a preferred embodiment of the present invention, the instrumented football has substantially the same handling qualities as the conventional professional league American football because its size, shape, grip, texture, weight, center of gravity and moments of inertia are made substantially the same as the conventional professional league American football. The present invention contemplates an instrumented football having substantially the same appearance, weight, balance, center of gravity, moments of inertia, playing and handling qualities of a conventional professional league football, so as to be accepted by the leagues and qualify it to substitute for conventional professional and non-professional league American footballs in all game venues. In a preferred embodiment, referring to the disclosed instrumented football disclosed in FIG. 1A and FIG. 1B and FIG. 1C for example, the instrumented football's appearance, weight, balance, center of gravity, and moments of inertia are identical to those of the conventional professional league football. The instrumented football's size, weight, balance, center of gravity, and moments of inertia affect the instrumented football's dynamic behavior. The football's dynamic behavior in turn affects the instrumented football's playing and handling qualities.

In a preferred embodiment, referring to the disclosed instrumented football disclosed in FIG. 1, the instrumented football's balance and dynamic behavior are identical to those of the conventional professional league football. In order to achieve this objective, the present invention contemplates producing an instrumented football having substantially the same weight, balance, appearance and playing qualities of a conventional professional league football, so as to be accepted by the leagues and qualify it to substitute for conventional professional league footballs in the game. In a preferred embodiment, the present invention contemplates instrumented footballs like those shown in FIG. 1A and FIG. 1B and FIG. 1C and FIG. 1D, and FIG. 9A and FIG. 9B, and FIG. 9C and FIG. 9D, and FIG. 9E, and FIG. 9F, and FIG. 10A and FIG. 10B, and FIG. 11A and FIG. 11B, FIG. 12A and FIG. 12B, FIG. 13A and FIG. 13B, FIG. 14A and FIG. 14B, and FIG. 15A and FIG. 15B, and FIG. 16A and FIG. 16B, and FIG. 17A and FIG. 17B, and FIG. 20A and FIG. 20B.

In preferred embodiments, the present invention contemplates instrumented footballs to be equipped with any one of the instrumentation package assemblies shown in FIG. 2A and FIG. 2B and FIG. 2C, and FIG. 3A and FIG. 3B and FIG. 3C, and FIG. 4A and FIG. 4B and FIG. 4C, and FIG. 5A and FIG. 5B and FIG. 5C. For example, the instrumented football shown in FIG. 1A and FIG. 1B and FIG. 1C and FIG. 1D, is equipped with the instrumentation package assembly shown in FIG. 2A and FIG. 2B and FIG. 2C which is capable of wirelessly televising football games from its two cameras and two microphones contained therein; and can conveniently be inserted into the football through the conventionally sized lacing gap in the seam at the top of the football. The instrumented football is made non-obtrusive to the game by making its outward appearance of size, shape, texture and color substantially identical to the conventional professional league American footballs. For example, the instrumented football's cover is propped up to the same vesica piscis shape as the conventional American footballs. In a preferred embodiment, referring to the disclosed instrumented football in FIG. 1, the bladder is made to inflate and to prop up the football's cover 2 to a predetermined shape (the same shape as the conventional football's cover 2 shown in FIG. 22), and to be of substantially lower mass than the prior art bladder used in conventional footballs. This is achieved by minimizing the amount of material used, using light weight materials, and using strong materials. In order to meet our objective to make the bladder weigh less than professional league football bladders, the bladder uses a lighter weight synthetic material having equal resilience and greater strength rather than the rubber used in professional league footballs. It is contemplated in the present invention that the inflated bladders used to prop up the covers of the preferred embodiments of the disclosed instrumented footballs, prop up the instrumented football's covers to the same predetermined vesica piscis shape as the conventional football covers.

Figure 6A:
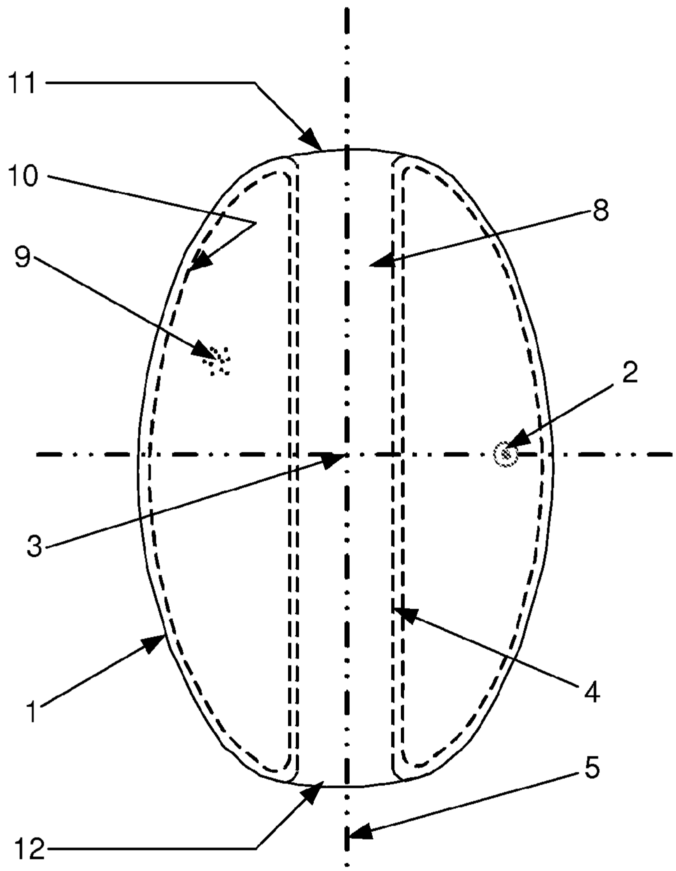
FIG. 6A shows a top view of an inflated instrumented football's bladder with an inner cylindrical hollow.
Figure 6B:
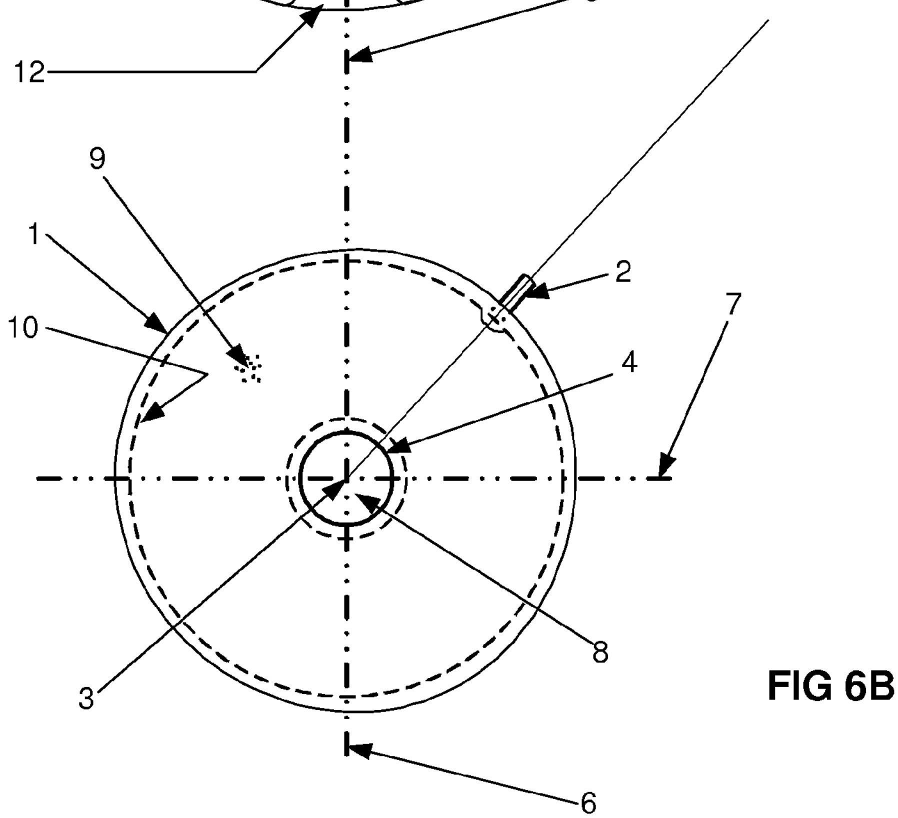
FIG. 6B shows an end view of the inflated instrumented football's bladder with an inner cylindrical hollow.
Figure 6A:
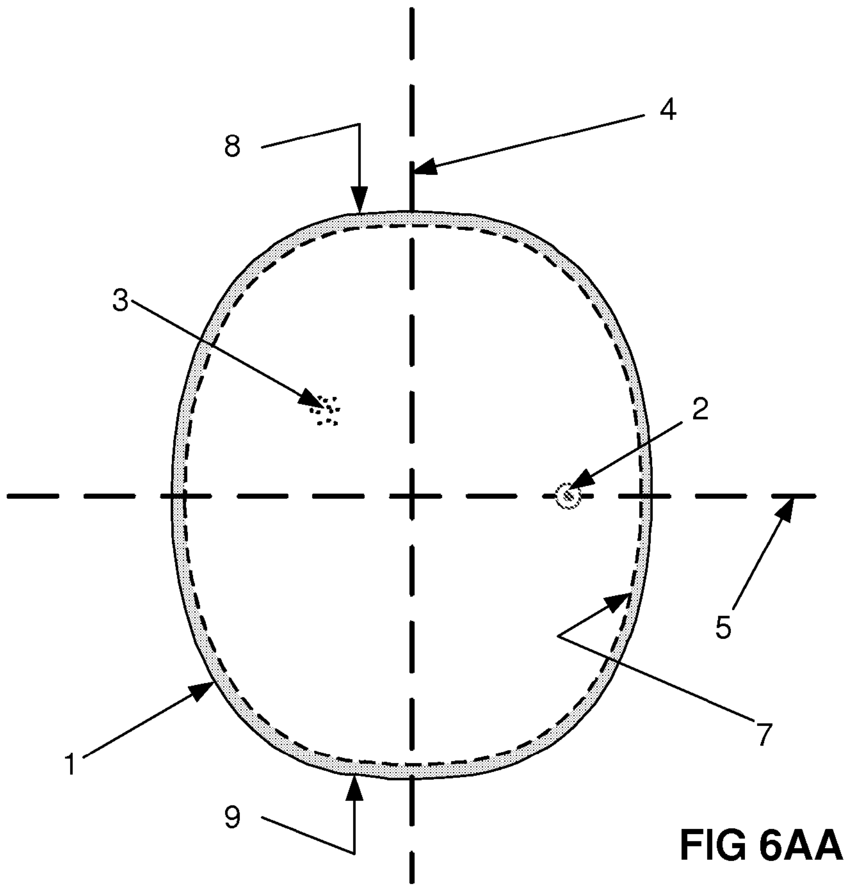
Figure 6B:
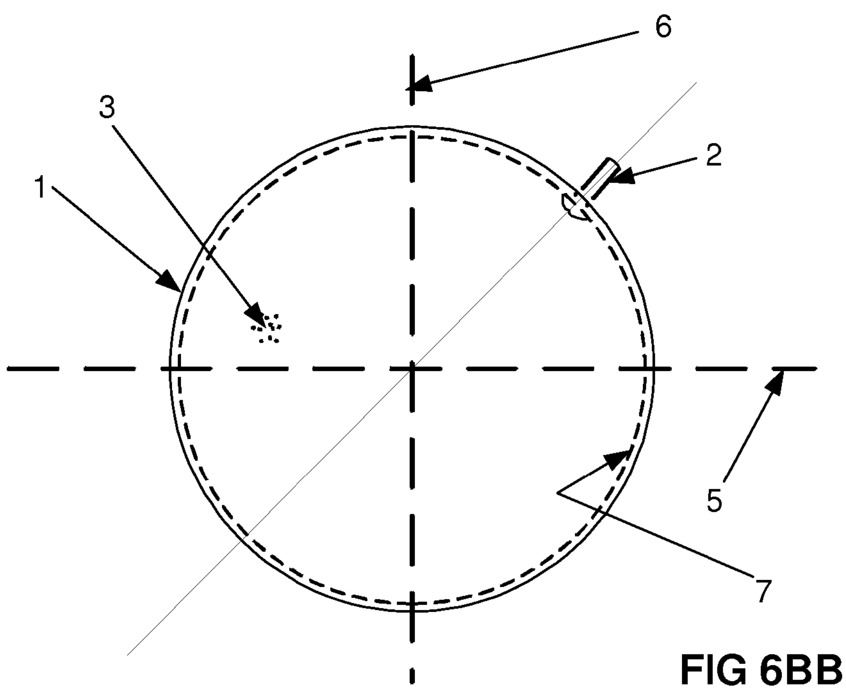
Figure 7A:
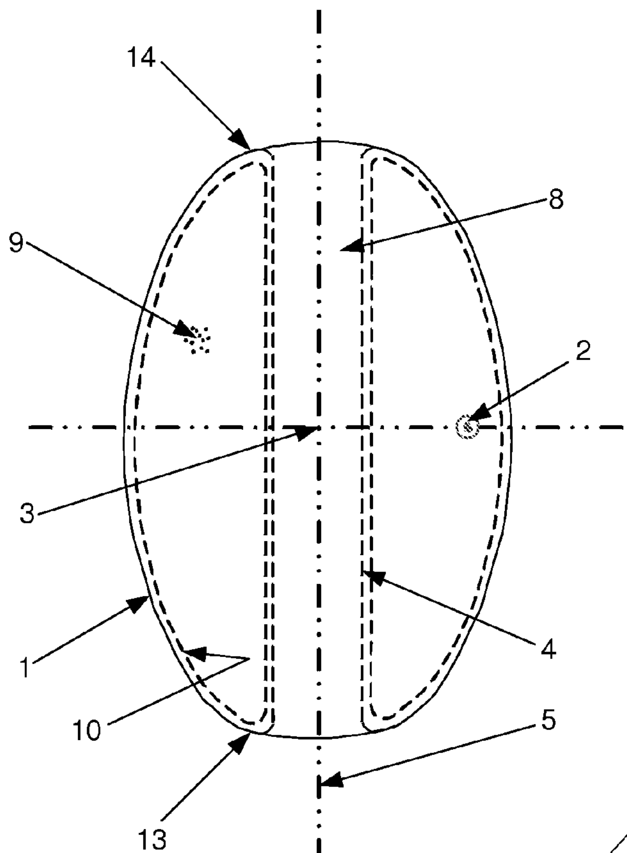
FIG. 7A shows a top view of an inflated instrumented football's bladder that has a radial slot.
Figure 7B:
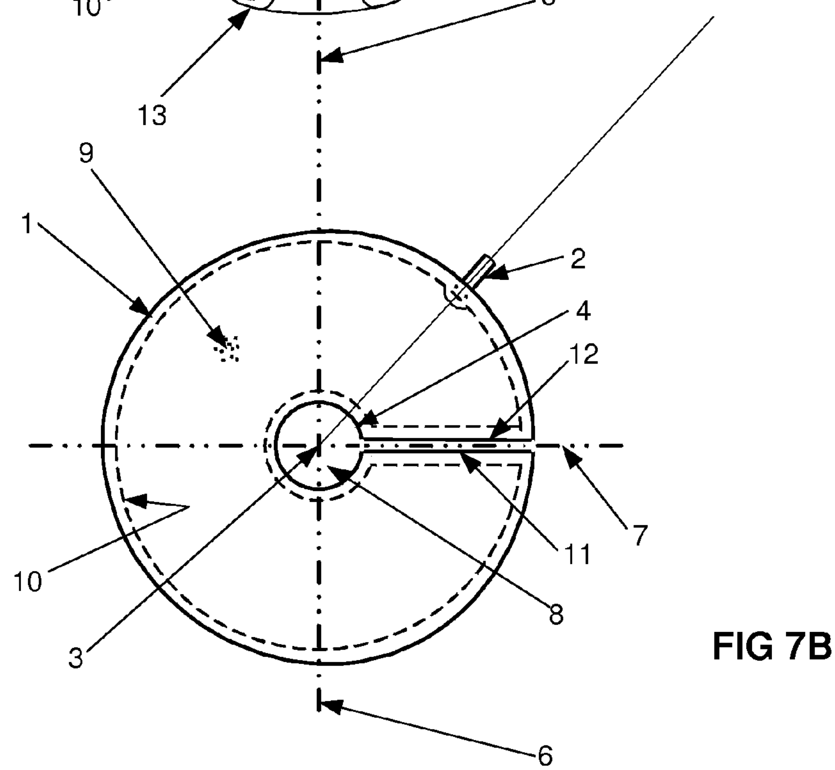
FIG. 7B shows an end view of the inflated instrumented football's bladder that has a radial slot.
Figures 7A, 7B, 7C:
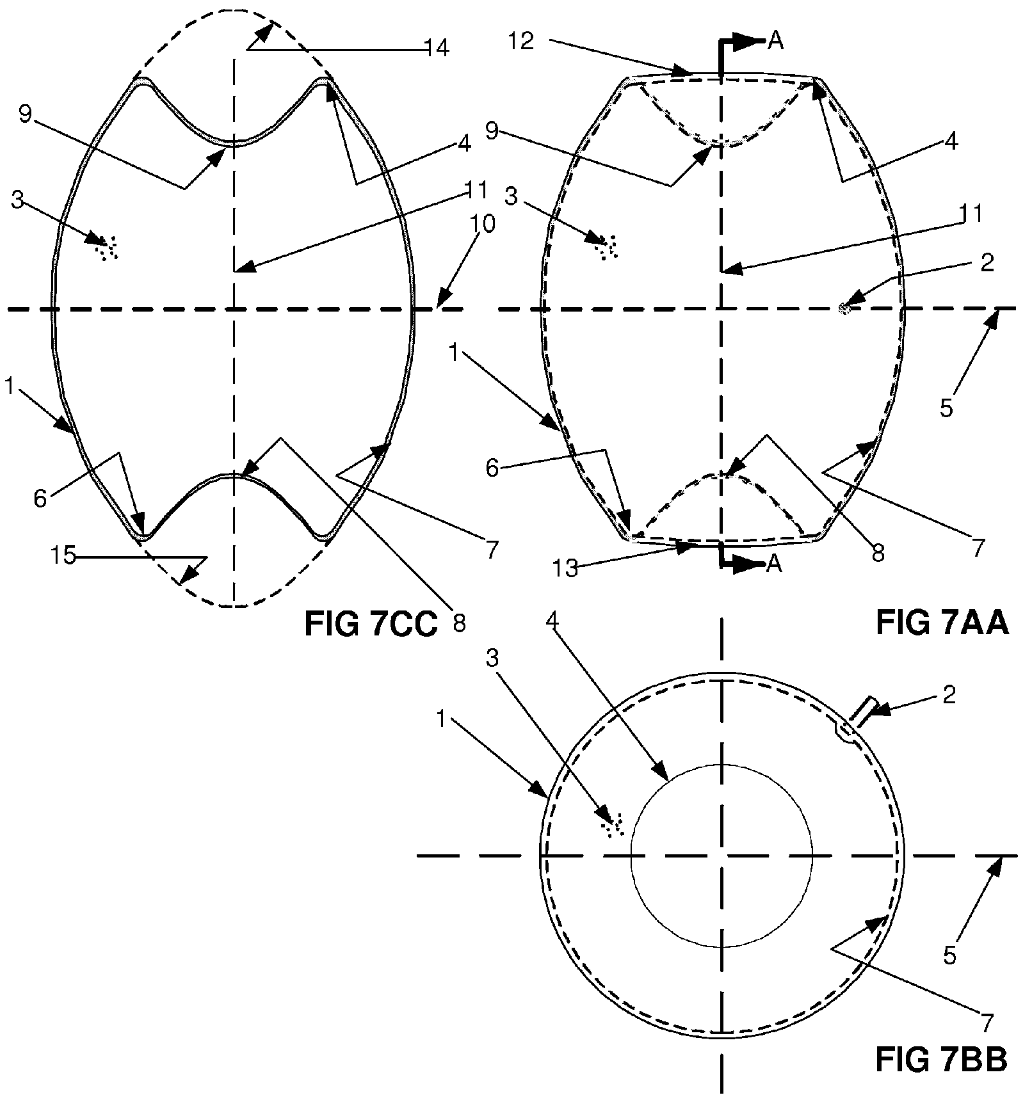
FIG. 7CC is a side view A-A section of FIG. 7AA.
Figure 8A:
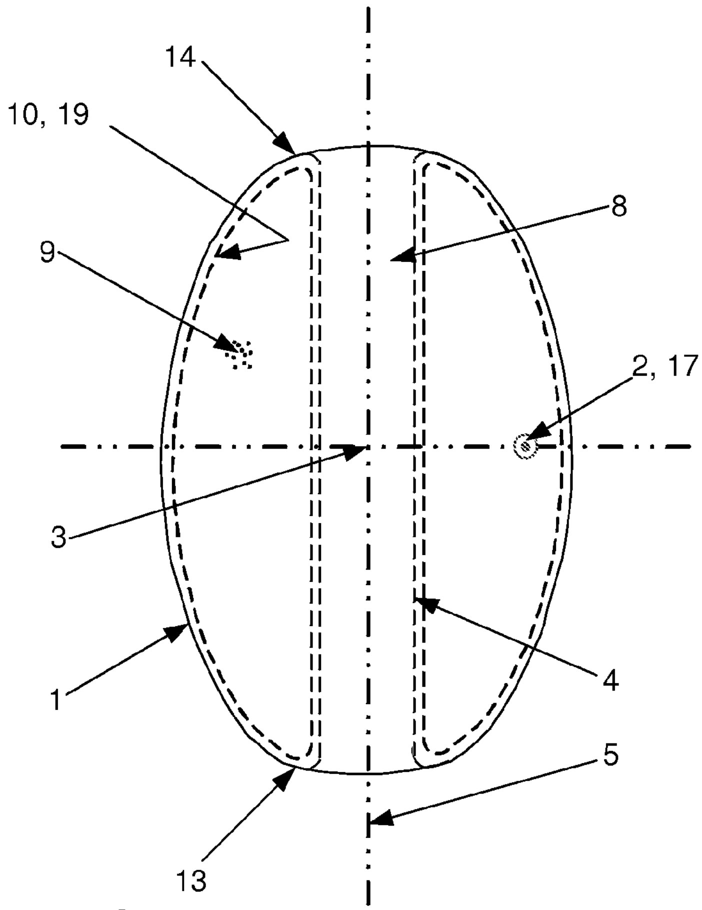
FIG. 8A shows a top view of a inflated instrumented football's bladder with identical halves.
Figure 8B:
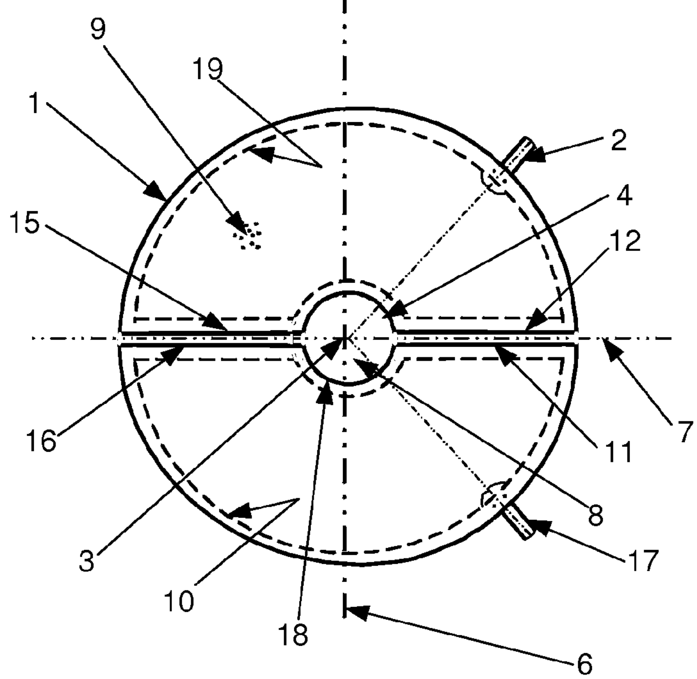
FIG. 8B shows an end view of the inflated instrumented football's bladder with identical halves.

In preferred embodiments, the present invention contemplates the instrumented football to be equipped with any one of the inflated bladders shown in FIG. 6A and FIG. 6B, and FIG. 6AA, and FIG. 6BB, and FIG. 7A and FIG. 7B, and FIG. 7AA and FIG. 7BB and FIG. 7CC, and FIG. 8A and FIG. 8B. For example, the instrumented football shown in FIG. 1A and FIG. 1B and FIG. 1C and FIG. 1D, is equipped with the inflated bladder shown in FIG. 6A and FIG. 6B which props up its cover to the same predetermined vesica piscis shape as the conventional football covers; and also positions, holds, aligns, and cushions the instrumented football's instrumentation package assembly that wirelessly televises football games from its two cameras and two microphones. In order to meet our objective to make the inflated bladder weigh less than the professional league football bladders, the bladder in a preferred embodiment uses a lighter weight synthetic material having equal resilience and greater strength rather than the rubber material used in typical professional league footballs. In the present invention the curved exterior surfaces of the buffer plates in all preferred embodiments is calculated to match the vesica piscis wall curvature of the cover/liner. The buffer plates are made to prop up the ends of the instrumented football to match the vesica piscis shape of the vertices of the typical professional league footballs. In a preferred embodiment, the center of gravity of the instrumented football is at exactly the same location as the center of gravity of the conventional football. The present invention contemplates that the instrumented football be instrumented with a battery pack capable of being wirelessly charged.

Instrumented Baseball Bases Preferred Embodiments and Contemplations

The present invention contemplates a system for televising professional league baseball games, college league baseball games and high school league baseball games from unique positions amongst the players on the playing field. The 1$^{st}$, 2$^{nd}$ and 3$^{rd}$ baseball bases are instrumented with TV cameras and microphones. Baseball bases instrumented in this manner in the present invention are referred to as instrumented baseball bases. The cameras and microphones are housed inside each of the instrumented baseball bases in a module called an instrumentation package assembly.

The present invention contemplates a system for televising professional league baseball games. Baseball bases are instrumented with four TV cameras and microphones. Each one of the four cameras and microphones are housed inside the instrumented baseball base in an instrumentation package assembly. In a preferred embodiment, the present inventions contemplates the instrumentation package assembly to wirelessly and/or by fiber optics, televise baseball games from its cameras and microphones from inside the instrumented baseball bases. In a preferred embodiment, the present invention contemplates an instrumented baseball base to be instrumented with an instrumentation package assembly that is mounted inside the baseball base. A baseball base which is instrumented with an instrumentation package assembly shall be referred to as an instrumented baseball base. The present invention details the design and construction of such a baseball base. In a preferred embodiment, the present invention contemplates the instrumented baseball base to be equipped with an instrumentation package assembly that is mounted inside the instrumented baseball base which is capable of wirelessly televising baseball games from its cameras and microphones contained therein.

The pictures and sounds acquired by the TV cameras and microphones inside the instrumented baseball base are wirelessly transmitted from the instrumented baseball base via a closed circuit transmitting and receiving network, to a remote base station. The pictures and sounds are processed and formatted at the remote base station, thus preparing them for presentation to a final live TV audience for viewing. An operator at the remote base station can control various electronic and optical functions of the instrumented baseball base by wirelessly transmitting control signals to the instrumented baseball base. In a preferred embodiment, the present invention contemplates an instrumented baseball base, which when stationed on any baseball playing field at any or all of the traditional 1st, 2nd and 3rd base locations can wirelessly and autonomously televise baseball games under the command and control of the remote base station. The remote base station is disclosed in FIG. 59A and FIG. 59B and FIG. 60A and FIG. 60B and FIG. 61A and FIG. 61B. The present invention contemplates that the instrumented baseball base's functions are enabled, commanded and controlled by and in response to signals it receives from the remote base station.

The pictures and sounds acquired by the TV cameras and microphones from inside the instrumented baseball base are transmitted wirelessly and/or by fiber optics from the instrumented baseball base via a bi-directional closed circuit transmitting and receiving network to the remote base station. The pictures and sounds are processed and formatted at the remote base station, thus preparing them for presentation to a final live TV audience for viewing. The remote base station is disclosed in FIG. 59A and FIG. 59B and FIG. 60A and FIG. 60B and FIG. 61A and FIG. 61B. The present invention contemplates that the instrumented baseball base's functions are enabled, commanded, and controlled by signals it receives from the remote base station. An operator at the remote base station controls the various electronic and optical functions of the instrumented baseball base by transmitting command and control signals wirelessly and by fiber optics to the instrumented baseball bases from the remote base station.

The invention visually and audibly extends and enhances the audience's pleasure and excitement of the game by acquiring pictures and sounds from all the special spatial vantage points that the instrumented baseball bases traditionally occupy and sees and feels on the field. Such intimate pictures and sounds taken so close and immediate to the players have heretofore been unobtainable during a baseball game. For example, the microphones pick up and enable the audience to hear in real time the impacts and shocks when a baseball is hit or thrown close to a base. The audience can also hear the rush of the air as the baseball spins on a throw through the air. In order to achieve this objective, the present invention contemplates producing an instrumented baseball base having substantially the same appearance and playing qualities of a conventional professional league baseball base, so as to be accepted by the leagues and qualify it to substitute for conventional professional league bases in the game. The present invention contemplates that the instrumented baseball bases be unobtrusive to the game and its players. In order to achieve this objective, the present invention contemplates preferred embodiments for the instrumented baseball bases having substantially the same appearance and playing qualities of conventional professional league baseball bases, conventional college league baseball bases and conventional high school baseball bases so as to be accepted by the leagues and qualify the instrumented baseball bases to substitute for conventional league baseball bases in the game.

In preferred embodiments, the present invention contemplates instrumented baseball bases like those shown in drawings: FIG. 38A and FIG. 38B, and FIG. 39A and FIG. 39B, and FIG. 42A and FIG. 42B, and FIG. 43A and FIG. 43B, and FIG. 46A and FIG. 46B, and FIG. 47A and FIG. 47B, and FIG. 47C and FIG. 47D, and FIG. 50A and FIG. 50B.

In preferred embodiments, the present invention contemplates instrumentation package assemblies like those shown in drawings: FIG. 42E and FIG. 42F, and FIG. 43E and FIG. 43F. The instrumented baseball base is contemplated to endure the rigors of the hostile environment on the playing field. The instrumented baseball base is airtight and watertight and is designed to endure shock, vibration and temperature extremes. Inside the instrumented baseball base, the TV cameras and microphones are deployed at each of the four sides of the base. Optical windows positioned at each of the four sides of the base enable the cameras to look out from all four sides of the instrumented baseball base onto the playing field. The present invention contemplates that the instrumented baseball base be instrumented with a battery pack which is capable of being wirelessly charged.

Instrumented Baseball Home Plates preferred embodiments and contemplations

In a preferred embodiment, the present invention contemplates an instrumented home plate, which when stationed on any baseball playing field at its traditional location on the baseball diamond, can wirelessly and/or by fiber optics autonomously televise baseball games under the command and control of the remote base station. The remote base station is disclosed in FIG. 59A and FIG. 59B and FIG. 60A and FIG. 60B and FIG. 61A and FIG. 61B.

In a preferred embodiment, the present invention contemplates instrumented home plates, which when stationed on any baseball playing field at the traditional home plate location can wirelessly and/or by fiber optics autonomously televise baseball games under the command and control of a remote base station. The present invention contemplates a system for televising professional league baseball games, college league baseball games and high school league baseball games from a unique position amongst the players on the playing field. Instrumented home plates are instrumented with TV cameras and microphones. The cameras and microphones are housed inside the instrumented home plates in a module called an instrumentation package assembly. The present invention visually and audibly extends and enhances the audience's pleasure and excitement of the game by acquiring pictures and sounds from the special spatial vantage point that the instrumented home plates occupy and see and feel on the field. Such intimate pictures and sounds taken so close and immediate to the players have heretofore been unobtainable during a baseball game. For example, the microphones pick up and enable the audience to hear in real time the impacts and shock when a baseball is hit or thrown close to an instrumented home plate or when a player slides into the instrumented home plate. The audience can also hear the rush of the air as the baseball spins on a throw through the air.

In a preferred embodiment, the present invention contemplates the instrumented home plate to be equipped with an instrumentation package assembly that is mounted inside the instrumented home plate which is capable of wirelessly televising baseball games from its cameras and microphones contained therein. In a preferred embodiment, the present invention contemplates the instrumentation package assembly to wirelessly and by fiber optics televise baseball games from its cameras and microphones from inside the instrumented home plate In preferred embodiments, the present invention contemplates instrumented home plates like those shown in drawings: FIG. 44A and FIG. 44B, and FIG. 45A and FIG. 45B, and FIG. 48A and FIG. 48B and FIG. 48C and FIG. 48D, and FIG. 49A and FIG. 49B and FIG. 49C and FIG. 49D, and FIG. 51A and FIG. 51B and FIG. 51C and FIG. 51D, and FIG. 52A and FIG. 52B, and FIG. 53A and FIG. 53B and FIG. 53C, and FIG. 54A and FIG. 54B and FIG. 54C.

The pictures and sounds acquired by the TV cameras and microphones from inside the instrumented home plates are transmitted wirelessly and/or by fiber optics from the instrumented home plates via a bi-directional closed circuit transmitting and receiving network to the remote base station. The pictures and sounds are processed and formatted at the remote base station, thus preparing them for presentation to a final live TV audience for viewing. The remote base station is disclosed in FIG. 59A and FIG. 59B and FIG. 60A and FIG. 60B and FIG. 61A and FIG. 61B.

The present invention contemplates that the instrumented home plate's functions are enabled, commanded, and controlled by wireless and/or by fiber optics signals it receives from the remote base station. An operator at the remote base station controls the various electronic and optical functions of the instrumented home plates by transmitting command and control signals wirelessly and/or by fiber optics to the instrumented home plates from the remote base station. The present invention contemplates that the instrumented home plates be unobtrusive to the game. In order to achieve this objective, the present invention contemplates producing preferred embodiments for instrumented home plates having substantially the same appearance and playing qualities of conventional professional league baseball home plates, conventional college league baseball home plates and conventional high school baseball home plates so as to be accepted by the leagues and qualify the instrumented home plates to substitute for conventional league baseball home plates in the game. The present invention contemplates that the instrumented home plates be instrumented with a battery pack which is capable of being wirelessly charged. In a preferred embodiment, the present invention contemplates an instrumented baseball home plate, which when stationed at its traditional location in the bullpen, can wirelessly and autonomously televise pitcher's warm-up and practice sessions under the command and control of the remote base station. The remote base station is disclosed in FIG. 59A and FIG. 59B and FIG. 60A and FIG. 60B and FIG. 61A and FIG. 61B.

Instrumented Pitcher's Rubbers Preferred Embodiments and Contemplations

In a preferred embodiment, the present invention contemplates an instrumented pitcher's rubber, which when stationed on any baseball playing field at its traditional location on the baseball diamond, can wirelessly and/or by fiber optics autonomously televise baseball games under the command and control of the remote base station. The remote base station is disclosed in FIG. 59A and FIG. 59B and FIG. 60A and FIG. 60B and FIG. 61A and FIG. 61B.

The present invention contemplates a system for televising professional league baseball games, college league baseball games and high school league baseball games from a unique position amongst the players on the playing field. Instrumented pitcher's rubbers are instrumented with TV cameras and microphones. The cameras and microphones are housed inside the instrumented pitcher's rubbers in modules called instrumentation package assemblies. The present invention visually and audibly extends and enhances the audience's pleasure and excitement of the game by acquiring pictures and sounds from the special spatial vantage point that the instrumented pitcher's rubbers occupy and see and feel on the field. Such intimate pictures and sounds taken so close and immediate to the players have heretofore been unobtainable during a baseball game. For example, the microphones pick up and enable the audience to hear in real time the impacts and shock when a baseball is hit or thrown close to an instrumented pitcher's rubber or when the pitcher steps on the instrumented pitcher's rubber during a pitch. The audience can also hear the rush of the air as the baseball spins on a throw through the air.

In a preferred embodiment, the present invention contemplates the instrumented pitcher's rubber to wirelessly and/or by fiber optics televise baseball games from its cameras and microphones from inside the instrumented pitcher's rubber. In preferred embodiments, the present invention contemplates instrumented pitcher's rubbers like those shown in drawings: FIG. 65A and FIG. 65B and FIG. 65C. In a preferred embodiment, the present invention contemplates instrumented pitcher's rubbers which when stationed on any baseball playing field at the traditional pitcher's rubber location on the pitcher's mound can wirelessly and/or by fiber optics autonomously televise baseball games under the command and control of a remote base station. The pictures and sounds acquired by the TV cameras and microphones from inside the instrumented pitcher's rubbers are transmitted wirelessly and/or by fiber optics from the instrumented pitcher's rubbers via a bi-directional closed circuit transmitting and receiving network to the remote base station. The pictures and sounds are processed and formatted at the remote base station, thus preparing them for presentation to a final live TV audience for viewing. The remote base station is disclosed in FIG. 59A and FIG. 59B and FIG. 60A and FIG. 60B and FIG. 61A and FIG. 61B.

The present invention contemplates that the instrumented pitcher's rubber's electronic and optical functions are enabled, commanded, and controlled by wireless and/or fiber optics signals it receives from the remote base station. An operator at the remote base station controls the various electronic and optical functions of the instrumented pitcher's rubbers by transmitting command and control signals wirelessly and/or by fiber optics to the instrumented pitcher's rubbers from the remote base station. The present invention contemplates that the instrumented pitcher's rubbers be unobtrusive to the game. In order to achieve this objective, the present invention contemplates producing preferred embodiments for instrumented pitcher's rubbers having substantially the same appearance and playing qualities of conventional professional league baseball pitcher's rubbers, conventional college league baseball pitcher's rubbers and conventional high school baseball pitcher's rubbers so as to be accepted by the leagues and qualify the instrumented pitcher's rubbers to substitute for conventional league baseball pitcher's rubbers in the game. The present invention contemplates that the instrumented pitcher's rubbers be instrumented with a battery pack capable of being wirelessly charged.

In a preferred embodiment, the present invention contemplates the Instrumented Pitcher's rubber to be equipped with an instrumentation package assembly that is mounted inside the Instrumented Pitcher's rubber which is capable of wirelessly televising baseball games from its cameras and microphones contained therein. In a preferred embodiment, the present invention contemplates an instrumented pitcher's rubber, which when stationed at its traditional location on the pitcher's mound in the bullpen, can wirelessly and/or by fiber optics autonomously televise pitcher's warm-up and practice sessions under the command and control of the remote base station. The remote base station is disclosed in FIG. 59A and FIG. 59B and FIG. 60A and FIG. 60B and FIG. 61A and FIG. 61B.

The present invention contemplates that the instrumented pitcher's rubber functions are enabled, commanded and controlled by, and in response to, signals it receives from the remote base station. In a preferred embodiment, the present invention contemplates the Instrumented Pitcher's rubber to be equipped with an instrumentation package assembly that is mounted inside the Instrumented Pitcher's rubber which is capable of wirelessly televising baseball games from its cameras and microphones contained therein. In a preferred embodiment, the present invention contemplates an Instrumented Pitcher's rubber, which when stationed on any baseball playing field at its traditional location on the baseball diamond at the pitcher's mound, can wirelessly and autonomously televise baseball games under the command and control of the remote base station. The remote base station is disclosed in FIG. 59A and FIG. 59B and FIG. 60A and FIG. 60B and FIG. 61A and FIG. 61B. In a preferred embodiment, the present invention contemplates an Instrumented Pitcher's rubber, which when stationed off the baseball playing field at its traditional location on the pitcher's mound in the bullpen, can wirelessly and autonomously televise pitcher's warm-up and practice sessions under the command and control of the remote base station. The remote base station is disclosed in FIG. 59A and FIG. 59B and FIG. 60A and FIG. 60B and FIG. 61A and FIG. 61B.

Instrumented Ice Hockey Pucks Preferred Embodiments and Contemplations

In a preferred embodiment, referring to the disclosed instrumented ice hockey puck shown in FIG. 66A and FIG. 66B and FIG. 66C, the instrumented ice hockey puck has substantially the same size, shape, texture, and color as the conventional regulation professional league ice hockey puck.

In a preferred embodiment, the present invention contemplates the instrumented ice hockey puck to be non-intrusive to the game. The optical windows in the top of the instrumented ice hockey puck are made small and are tinted blue or black to make them less noticeable to the players in comparison to the black color of the puck. The microphones pick up and enable the audience to hear in real time the impacts and shocks to its skin when the instrumented ice hockey puck is hit, sliding, striking or bouncing. The audience can also hear the rush of the ice as the instrumented ice hockey puck spins and moves on a pass on the ice.

The present invention particularly contemplates a system for televising professional league ice hockey games. Ice hockey puck is instrumented with four television cameras and three microphones. The TV cameras and microphones are packaged inside the instrumented ice hockey puck within an instrumentation package assembly. The present invention contemplates a system for televising professional league ice hockey games as well as ice hockey games in other venues. Ice hockey pucks are instrumented with television cameras and microphones. Ice hockey pucks instrumented in this manner are referred to in the present invention as instrumented ice hockey pucks. The TV cameras and microphones are packaged inside the instrumented ice hockey pucks within a module referred to in the present invention as an instrumentation package assembly.

Compared to the prior art, the present invention provides a more close at hand method of televising fast action packed sports events, like ice hockey, by televising games from instrumented ice hockey puck used by the players in the game itself. Compared to the prior art, the present invention thereby conveys a level of excitement and detail of the game heretofore unrealized by the viewing audience. The present invention enables cameras and microphones to be near to and amongst the hockey players themselves during each play on the ice rink. The invention visually and audibly extends and enhances the audience's pleasure and excitement of the game by acquiring pictures and sounds from all the special spatial vantage points that the instrumented ice hockey puck occupies and sees and feels on the ice. Such intimate pictures and sounds taken so close and immediate to the hockey players have heretofore been unobtainable during a football game. For example, the microphones pick up and enable the audience to hear in real time the impacts and shocks when the puck is moving or striking the goal post netting. The audience can also hear the whoosh of the ice as the instrumented ice hockey puck spins on a pass on the ice.

The present invention is specifically contemplated to endure the rigors of the hostile environment on the ice rink. The instrumentation package assembly is both airtight and watertight and is designed to endure shock, vibration and temperature variations. Inside the instrumentation package assembly, the TV cameras are deployed at the top of the instrumented ice hockey puck. Optical windows enable them to look out from the top of the instrumented ice hockey puck onto the ice rink. The pictures and sounds acquired by the TV cameras and microphones are wirelessly transmitted from the instrumented ice hockey puck via a closed circuit transmitting and receiving network, to a remote base station. The pictures and sounds are processed and formatted at the remote base station, thus preparing them for presentation to a final live TV audience for viewing. An operator at the base station can control the various electronic and optical functions of the instrumented ice hockey puck by wirelessly transmitting control signals to the instrumented ice hockey puck from the remote base station. The present invention contemplates that the instrumented ice hockey puck electronic, mechanical and optical functions are enabled, commanded and controlled in response to signals it receives from the remote base station. In a preferred embodiment, the present invention contemplates the instrumented ice hockey puck to be equipped with an instrumentation package assembly shown in FIG. 35A and FIG. 35B and FIG. 35C, that is mounted inside the instrumented ice hockey puck shown in FIG. 66A and FIG. 66B and FIG. 66C, which is capable of wirelessly televising ice hockey games from its cameras and microphones contained therein; and can conveniently be encapsulated and molded into the instrumented ice hockey puck. The instrumentation package assembly and the buffer plate assembly and the protective cover plates are encapsulated and molded into the instrumented ice hockey puck to keep them aligned and secure.

In a preferred embodiment of the present invention, the instrumented ice hockey puck has substantially the same outward appearance as the conventional professional league ice hockey puck because its size, shape, texture and color are made identical to the conventional professional league ice hockey puck. This makes the instrumented ice hockey puck unobtrusive to the players in the game. In a preferred embodiment of the present invention, the instrumented ice hockey puck has substantially the same playing and handling qualities as the conventional professional league ice hockey puck because its weight, balance, center of gravity and moments of inertia are made identical to the conventional professional league ice hockey puck. The present invention is contemplated to endure the rigors of the hostile environment on the rink. The instrumentation package assembly is both airtight and watertight and is designed to endure shock, vibration and temperature variations. Inside the instrumentation package assembly, the TV cameras are deployed to look out the top of the instrumented ice hockey puck. Small unobtrusive optical windows located on the top of the instrumented ice hockey puck enable them to look out onto the ice hockey rink through extremely wide angle lenses. Fish eye lenses are one example of the camera lenses that are used. The real-time pictures and sounds acquired by the TV cameras and microphones are wirelessly transmitted from the instrumented ice hockey puck via a closed circuit bi-directional transmitting and receiving network, to a remote base station. The remote base station hardware and software which is used for the instrumented ice hockey puck is the same remote base station hardware and software used for the instrumented footballs. The remote base station used for the instrumented footballs is disclosed in FIG. 62A and FIG. 62B and FIG. 62C and FIG. 62D and FIG. 62E and FIG. 64A and FIG. 64C. Furthermore, the remote base station hardware and software is the same used for the instrumented baseball bases, instrumented baseball home plates, and instrumented baseball pitcher's rubbers; with the exception that the remote base station software doesn't have to deal with gyroscopic data because the bases, plates and rubbers are fixed and motionless i.e. they have no forward velocity or pitch, roll and yaw data because they are static sports paraphernalia. The pictures and sounds are processed and formatted at the remote base station, thus preparing them for presentation to a final live or instant replay TV audience for viewing. An operator at the remote base station can command and control the various electronic, mechanical and optical functions of the instrumented ice hockey puck by wirelessly transmitting command and control signals to the instrumented ice hockey puck from the remote base station. The remote base station is located on, or remotely from, the sports stadium grounds. In a preferred embodiment of the present invention, the antenna array relay junction which serves as a means to receive wirelessly televised video and sound signals from the instrumented ice hockey puck, also serves to relay the video and sound signals to the remote base station. In a preferred embodiment of the present invention the antenna array relay junction, located off the playing field but within the sports stadium, serves as a means to receive and wirelessly relay televised video and sound signals from the instrumented ice hockey puck to the remote base station. In venues where there is no formal sports stadium/arena around the ice rink, the antenna array relay junction and the remote base station are located off of the ice rink, but in the vicinity of the ice rink.

The instrumented football's size, weight, balance, center of gravity, and moments of inertia affect the instrumented ice hockey puck's dynamic behavior. The instrumented ice hockey puck's dynamic behavior in turn affects the instrumented ice hockey puck's playing and handling qualities.

Figure 35C:
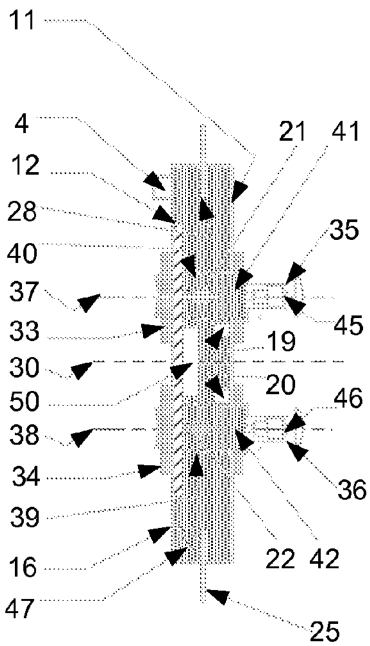
FIG. 35A is a top view of the four camera wireless, fiber optics and bi-directional high speed copper network communications instrumentation package assembly.
Figure 35A:
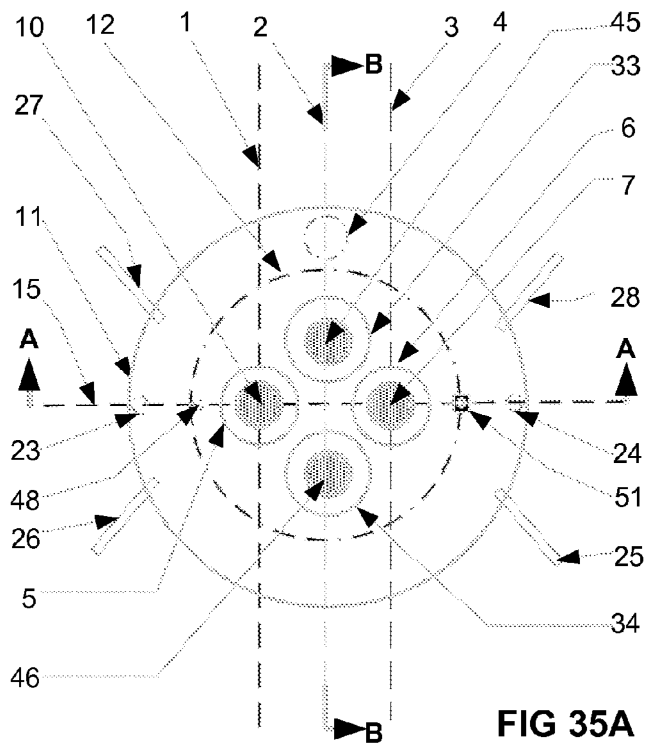
Figure 35B:
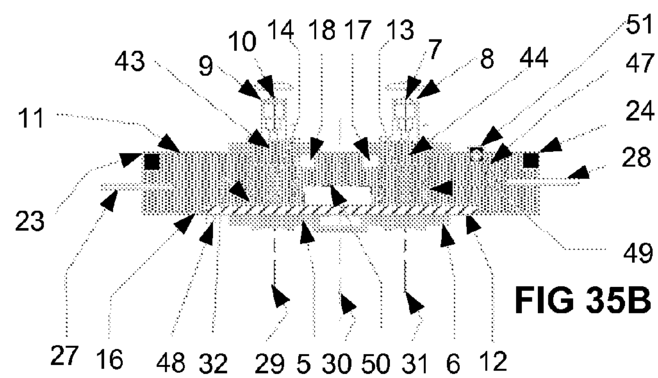

In preferred embodiments, the present invention contemplates instrumented ice hockey puck to be equipped with the instrumentation package assemblies shown in FIG. 35A and FIG. 35B and FIG. 35C. The instrumented ice hockey puck equipped with this instrumentation package assembly, wirelessly televises ice hockey games from its four cameras and three microphones packaged therein. The present invention contemplates that the instrumented ice hockey puck be instrumented with a battery pack capable of being inductively wirelessly charged by a battery charging unit similar to the one shown in FIG. 37A and FIG. 37B and FIG. 37C, and FIG. 37D and FIG. 37E and FIG. 37F for charging the battery packs in instrumented baseball bases, instrumented baseball home plates and instrumented baseball pitcher's rubbers.

Instrumentation Package Assemblies Preferred Embodiments and Contemplations

The present invention contemplates that TV cameras, microphones, supporting electronics and a battery pack are packaged within a module or instrumentation package assembly that is stationed inside sports paraphernalia. The instrumentation package assembly is contemplated to endure the rigors of the hostile environment on the playing field. The instrumentation package assembly is both airtight and watertight and is designed to endure the shock, vibration and temperature variations encountered by the sports paraphernalia during a game. Optical windows stationed on the outer skin of the sports paraphernalia enable the cameras to look out onto the playing field. The pictures and sounds acquired by the TV cameras and microphones are encoded by the supporting electronics and wirelessly televised from the sports paraphernalia via a closed circuit transmitting and receiving network, to a remote base station. The pictures and sounds are processed and formatted at the remote base station by hardware and software, preparing them for presentation to a final live TV audience for viewing. An operator at the remote base station can control the various electronic and optical functions of the instrumented sports paraphernalia by wirelessly transmitting control signals to the instrumented sports paraphernalia.

The present invention contemplates that one of six different instrumentation package assembly types each containing two TV cameras, two microphones and supporting electronics are stationed inside an instrumented football used on the playing field; and that the cameras peer out through optical windows at opposite ends of the football. The present invention contemplates that one of six different instrumentation package assembly types each containing as many as eight TV cameras, four microphones and supporting electronics are stationed inside instrumented baseball bases like $1^{st}$, $2^{nd}$ and $3^{rd}$ bases, used on the playing field; and that the cameras peer out through optical windows on the four sides and corners of the instrumented baseball base. The present invention contemplates that one of six different instrumentation package assembly types each containing as many as four TV cameras, three microphones and supporting electronics are stationed inside an instrumented baseball home plate used on the playing field; and that the cameras peer out through optical windows at the top of the instrumented baseball base.

The present invention contemplates that two identical instrumentation package assembly types each containing as many as two TV cameras, six microphones and supporting electronics are stationed inside an instrumented baseball pitcher's rubber used on the playing field; and that the cameras peer out through optical windows at the top of the instrumented baseball pitcher's rubber. The present invention contemplates that an instrumentation package assembly containing four TV cameras, three microphones and supporting electronics is stationed inside an ice hockey puck used on the ice rink; and that the cameras peer out through optical windows at the top of the ice hockey puck. The present invention contemplates that some instrumentation package assembly types possesses all the elements including a transceiver and antenna necessary to acquire and wirelessly transmit by encoded radio signals the video and sound of the game to a remote base station from within the sports paraphernalia during the course of a game. The present invention contemplates that some instrumentation package assembly types possesses all the elements necessary to acquire and transmit by fiber optics cable the video and sound of the game to a remote base station from within the sports paraphernalia during the course of a game.

The present invention contemplates that some instrumentation package assembly types possesses all the elements necessary to acquire and transmit by copper cable the video and sound of the game to a remote base station from within the sports paraphernalia during the course of a game. The present invention contemplates that the instrumentation package assembly be instrumented with a battery pack capable of being wirelessly charged by magnetic induction. The present invention contemplates a wireless RF radio communications system for televising sports games from instrumented sports paraphernalia that are located on the playing field amongst the players. The instrumented sports paraphernalia transmits an RF carrier signal modulated with the audio and video from its TV cameras and microphones to an antenna array located outside the playing field. The RF carrier signal is received by the antenna array and relayed to a remote base station which decodes and processes the signal for broadcast to the TV viewing audience.

The present invention contemplates a fiber optics cable communications system for televising sports games from instrumented sports paraphernalia that are located on the playing field amongst the players. The instrumented sports paraphernalia transmits a signal modulated with the audio and video from its TV cameras and microphones via a fiber optics cable buried in the ground beneath it in the playing field. The signal is received by an antenna array relay junction, located outside of the playing field that relays the signal to a remote base station which decodes and processes the signal for broadcast to the TV viewing audience. The present invention contemplates a copper cable communications system for televising sports games from instrumented sports paraphernalia that are located on the playing field amongst the players. The instrumented sports paraphernalia transmits a signal modulated with the audio and video from its TV cameras and microphones via a copper cable buried in the ground beneath it in the playing field. The signal is received by an antenna array relay junction, located outside of the playing field that relays the signal to a remote base station which decodes and processes the signal for broadcast to the TV viewing audience. The present invention contemplates an instrumentation package assembly which is airtight and watertight, and is designed to endure shock, vibration and temperature variations.

Instrumented Football Bladders Preferred Embodiments and Contemplations

In certain preferred embodiments of the present invention, the bladder for the instrumented football uses a lighter weight synthetic material having equal resilience and greater strength than the rubber used in prior art professional league footballs. In certain preferred embodiments of the present invention, the bladder for the instrumented football uses an inflation gas that is lighter than air.

Cameras

It is contemplated that commercial of the shelf TV cameras, state of the art TV cameras, and TV cameras using specialized circular sensor arrayed chips as disclosed in FIG. 63A, FIG. 63B and FIG. 63C will be used in the preferred embodiments.

Optical Windows

It is contemplated that each instrumented sports paraphernalia will have at least one, or a multiplicity of optical windows through which the cameras inside the instrumented sports paraphernalia can peer out onto the playing field. It is contemplated that the optical windows will be sealed and will protect the instrumentation package assembly and its cameras and lenses from the weather and damage from the game. It is contemplated that the optical windows will be unobtrusive to the game. It is contemplated that the optical windows will be easily replaceable with substitute windows.

Buffer Plate Assembly Preferred Embodiments and Contemplations

It is contemplated that the buffer plates provide a bore for mounting the instrumentation package assembly inside the instrumented sports paraphernalia. It is contemplated that the buffer plate assembly has an optical window(s) which is(are) used to protect the instrumentation package assembly and its cameras and lenses, while still allowing the cameras to see out of the instrumented sports paraphernalia onto the playing field. It is contemplated that the buffer plate assembly furnish a threaded sleeve cell into which the optical window is mounted, thereby permitting the optical windows to be easily removed and replaced. It is contemplated that the buffer plates furnish bored holes through which the cameras see out of the instrumented sports paraphernalia onto the playing field. It is contemplated that the curved exterior surface of the buffer plates be shaped to match the interior vesica piscis wall curvature shape of the cover/liner in order to provide for a smooth fit to prop up the ends of the football. It is contemplated that the curved exterior surface of the buffer plates be radially notched to prevent an interference fit with the interior stitching between the football's cover/liner panels. It is contemplated that the buffer plates furnish bored holes with which to mount the instrumentation package assembly inside the sports paraphernalia onto the playing field. It is contemplated that the buffer plates provide a mounting means for the instrumentation package assembly inside the instrumented sports paraphernalia.

3-Dimension Stereo Camera Pairs

It is contemplated that certain preferred embodiments of the instrumented sports paraphernalia will carry 3-D stereo camera pairs to be used to provide 3-D imagery to the TV viewing audience. It is contemplated that the 3-D will be of high SD and HD quality.

Antenna Array Relay Junctions Preferred Embodiments and Contemplations

In a preferred embodiment of the present invention, an antenna array relay junction which serves as a means to receive wirelessly televised video and sound signals from the instrumented sports paraphernalia is stationed in the vicinity of the playing field in the sports stadium. In a preferred embodiment of the present invention, the antenna array relay junction is situated in the stadium to serve as a means to receive wirelessly televised video and sound signals from the instrumented sports paraphernalia. In a preferred embodiment of the present invention, an antenna array relay junction is situated in the above the ground and outside the side lines of the playing field. In a preferred embodiment of the present invention, an antenna array relay junction is situated outside and above the side lines of the playing field and is carried aloft in a blimp or balloon. In a preferred embodiment of the present invention, an antenna array relay junction which serves as a means to receive televised video and sound signals by fiber optics cable from the instrumented sports paraphernalia is situated in the vicinity of the playing field in the sports stadium.

Battery Charging Stations Preferred Embodiments and Contemplations

The present invention contemplates a charging station which is compatible with the instrumented sports paraphernalia for wirelessly charging the battery packs of the instrumented sports paraphernalia while they are inside the instrumented sports paraphernalia. The present invention contemplates a battery charging station which is external to the instrumented sports paraphernalia, and which when placed in the close vicinity of the instrumented sports paraphernalia, wirelessly charges the battery packs inside the instrumented sports paraphernalia by magnetic induction coupling. The present invention contemplates a common charging station for the instrumented baseball bases, instrumented baseball home plates, instrumented baseball pitcher's rubbers, and instrumented ice hockey pucks.

Hand Held Remotes Preferred Embodiments and Contemplations

The present invention contemplates a hand held remote capable of wirelessly interrogating the status of all the functions inside the instrumented sports paraphernalia. The present invention contemplates a hand held remote capable of wirelessly interrogating the status of all the electrical and optical functions of the instrumented sports paraphernalia both on and off the playing field. The present invention contemplates a hand held remote capable of wirelessly operating all the electrical and optical functions of the instrumented sports paraphernalia both on and off the baseball field.

Tripod Mounted Set-Up Camera System Preferred Embodiments and Contemplations

The present invention contemplates a "pre-game set-up camera apparatus" for photographically scanning the sports event venue in order to build an archive of images of the venue taken from the playing field as the instrumented sports paraphernalia cameras would see it, to be used by the remote base station to provide spatial reference images for processing the encoded video pictures received from the instrumented sports paraphernalia on the playing field using image recognition processing techniques to stabilize the pictures by removing spin, jitter and shaking and making them upright.

Upper Protective Cover Plates

In a preferred embodiment, the top protective cover plate is made dome shaped so the walls of its bores can surround the optical windows near the very top of the instrumented baseball home plate and shelter them from hits, while still keeping the edge of the protective cover plate far down below the top of the instrumented baseball home plate and well below the surface of the playing field in the ground, so the edge can not be felt by the players if the players impact the top surface of the instrumented baseball home plate.

The preferred embodiments of the major system components of the "Instrumented Sports Paraphernalia System" disclosed in the present invention meet the objectives below. Besides the objectives given here below, there are further objectives that are discussed and will become apparent in the detailed descriptions of the accompanying drawings.

| General Instrumented Sports Paraphernalia System | |
|---|---|
| Instrumented Sports Paraphernalia | Instrumentation Package Assemblies |
| Instrumented Sports Stadiums | Instrumented Football Bladders |
| Instrumented Sports Playing Fields | Cameras and Optical Windows |
| Instrumented Bullpens | Buffer Plate Assemblies |
| Remote Base Stations | 3-Dimension Stereo Camera Pairs |
| Instrumented Footballs | Antenna Array Relay Junctions |
| Instrumented Baseball Bases | Battery Charging Stations |
| Instrumented Baseball Home Plates | Hand Held Remotes |
| Instrumented Baseball Pitcher's Rubbers | Tripod Mounted Set-up Camera System |
| Instrumented Ice Hockey Pucks | Upper Protective Cover Plates |

General "Instrumented Sports Paraphernalia System" Objectives

It is an objective of the present invention to equip existing prior art sports stadiums with "instrumented sports paraphernalia systems" comprised of instrumented sports paraphernalia, an antenna array relay junction, bi-directional communication links, and a remote base station to improve the quality of the sports stadium's TV broadcasts. It is an objective of the present invention to provide an improved method for audiences to view sports events and hear its sounds. It is an objective of the present invention to televise and broadcast sports games by an improved method. It is an objective of the present invention to televise sports games from camera angles and microphone vantage points from inside instrumented sports paraphernalia used on the playing field amongst the players. It is an objective of the present invention to provide an improved method of gathering video and audio to be used by judges and referees making instant replay calls. It is an objective of the present invention to improve the enjoyment, excitement and satisfaction of TV viewing audiences watching televised sports events. It is an objective of the present invention to introduce an improved method of employing SD, 3-D and HD to televise and broadcast sports events. It is an objective of the present invention to introduce an improved method of employing extremely wide angle camera lenses to televise and broadcast sports events. It is an objective of the present invention to broadcast real time high quality SD, HD and 3-D pictures to the TV viewing audience, which originate from dynamic instrumented sports paraphernalia, and have been processed by the remote base station so that they are free of jitter, shaking and spin. It is an objective of the present invention to introduce an improved method of employing extremely wide angle zoom camera lenses to televise and broadcast sports events. It is an objective of the present invention to introduce an improved method to getting close-up shots and sounds of the players from otherwise untapped spatial vantage points and angles in the game. It is an objective of the present invention to acquire intimate pictures and sounds taken so close and immediate to the sports players from on the playing field that they have heretofore been unobtainable during a game. It is an objective of the present invention to enhance the viewing experience of the viewing audience by capturing pictures and sounds of sports games in HD and 3-D that were not possible before in the prior art. It is an objective of the present invention to provide a means for wirelessly televising real time games from cameras and microphones mounted inside the three instrumented baseball bases, instrumented pitcher's rubber, and instrumented baseball home plate on the field of play. It is an objective of the present invention to capture pictures and sounds of sports events from on the field of play amongst the players during the game. It is an objective of the present invention to overcome the shortcomings of the prior art by providing a means of televising more intimate and exciting shots of sports events from amongst the players on the playing field during a game. It is an objective of the present invention to overcome the shortcomings of the prior art by providing a means of televising more intimate and exciting shots of sports events from amongst the players off of the playing field during warm-ups and training sessions. It is an objective of the present invention to televise pictures and sounds from off the playing field among the players. It is an objective of the present invention to present suitable pictures and sounds to a viewing audience. It is an objective of the present invention to present pictures and sounds of the game to a viewing audience in a suitable viewing format.

It is an objective of the present invention to provide an improved method for audiences to see action sports up close; for example, the feet of a player stealing and sliding into $2^{nd}$ base; the view from under the batter's chin as he swings at a pitch; the view of the batter as he sees an oncoming pitch; the catcher's face as he positions to catch a pitch; and all in 3-D and HD for added pleasure and excitement. It is an objective of the present invention to enable cameras and microphones to be near to and amongst the players themselves during each play. It is an objective of the present invention to capture pictures and sounds from where the sports paraphernalia was, and where it is going to be. It is an objective of the present invention to present suitable picture and sound quality to a viewing audience. It is an objective of the present invention to capture pictures and sounds on the field from amongst the players in a more unobtrusive and clandestine manner than TV cameras used on the sidelines in plain sight by cameramen in the prior art. It is an objective of the present invention that the system disclosed for televising sports events from instrumented sports paraphernalia used on instrumented playing fields in instrumented sports stadiums, be compatible for use on any playing field in any sports stadium venue. It is an objective of the present invention that the system disclosed for televising sports events from instrumented sports paraphernalia used on instrumented playing fields, be compatible for use on any playing field venue with no sports stadium. It is an objective of the present invention that TV cameras will see out onto the playing fields from a whole selection of vantage points from inside the instrumented sports paraphernalia. It is an objective of the present invention that the instrumented sports paraphernalia will be flexible to contain a whole selection of TV camera configurations. It is an objective of the present invention to improve the method of training athletes. It is an objective of the present invention to improve the method of training athletes by using audio and video taken from static and dynamic instrumented sports paraphernalia of the game and of their training sessions.

Instrumented Sports Paraphernalia Objectives

It is an objective of the present invention that the instrumented sports paraphernalia provide an improved means to televise sporting events. It is an objective of the present invention that the instrumented sports paraphernalia's outward appearance looks substantially the same as its conventional counterpart professional league sports paraphernalia. It is an objective of the present invention to provide instrumented sports paraphernalia that have the same handling and playability qualities as their conventional counterpart professional league sports paraphernalia. It is an objective of the present invention to provide instrumented sports paraphernalia that have the same handling and playability qualities as their conventional counterpart non-professional league sports paraphernalia. It is an objective of the present invention that the instrumented sports paraphernalia provide an improved means to televise sporting events in professional league, college league and high school league venues. It is an objective of the present invention for the instrumented sports paraphernalia to be non-intrusive to the game. It is an objective of the present invention for the instrumented sports paraphernalia to withstand the rigors of the game. It is an objective of the present invention for the instrumented sports paraphernalia to withstand the weather conditions on the playing field. It is an objective of the present invention for the instrumented sports paraphernalia to be used to improve the training of the players.

It is an objective of the present invention to stabilize the imagery obtained from dynamic instrumented sports paraphernalia in an upright condition in the picture frame, regardless of the pitch, roll or yaw of the dynamic instrumented sports paraphernalia, as viewed by a live TV audience in the HD CCD letterbox picture format by using gyroscopic encoders. It is an objective of the present invention to stabilize the imagery obtained from the dynamic instrumented sports paraphernalia in an upright condition in the picture frame, regardless of the pitch, roll or yaw of the dynamic instrumented sports paraphernalia, as viewed by a live TV audience in the HD CCD letterbox picture format by image recognition processing. It is an objective of the present invention to stabilize the imagery obtained from the dynamic instrumented sports paraphernalia in an upright condition in the picture frame, regardless of the pitch, roll or yaw of the dynamic instrumented sports paraphernalia, as viewed by a live TV audience in the HD CCD letterbox picture format by using gyroscopic encoders and image recognition processing. It is an objective of the present invention to stabilize the imagery obtained from the dynamic instrumented sports paraphernalia in an upright condition in the picture frame, regardless of the pitch, roll or yaw of the dynamic instrumented sports paraphernalia, as viewed by a live TV audience in the HD CCD letterbox picture format by using image recognition processing of the archived data base derived from the tripod mounted set-up camera system. It is an objective of the present invention to stabilize the imagery obtained from the dynamic instrumented sports paraphernalia in an upright condition in the picture frame, regardless of the pitch, roll or yaw of the football, as viewed by a live TV audience in the HD CCD letterbox picture format by using image recognition processing of the archived data base derived from the tripod mounted set-up camera system in the remote base station. It is an objective of the present invention to provide views of the game not seen before during broadcasts by real time TV audiences. It is an objective of the present invention to provide views of the game from cameras inside the instrumented sports paraphernalia. It is an objective of the present invention to provide views of the playing field from the air, as seen from the instrumented sports paraphernalia, as the instrumented sports paraphernalia is passed in the air; and as a player is running to catch and receive the instrumented sports paraphernalia; and when the instrumented sports paraphernalia is fumbled; and after the instrumented sports paraphernalia is goal kicked or punted; and when a field goal occurs as the instrumented sports paraphernalia flies between the goal posts. It is an objective of the present invention to provide views of the sports paraphernalia playing field from the clutches of a standing player's grip as seen from the cameras inside the instrumented sports paraphernalia; and as the instrumented sports paraphernalia is being positioned; and as the players pause to throw the instrumented sports paraphernalia, and as a player stands motionless holding the instrumented sports paraphernalia. It is an objective of the present invention to provide views of the playing field as the instrumented sports paraphernalia is held still in the clutches of a player's grip. It is an objective of the present invention to provide views of the playing field as the instrumented sports paraphernalia is held in the clutches of a player's grip as he is running; It is an objective of the present invention to provide views of the playing field as the instrumented sports paraphernalia is held in the clutches of a player's grip as he is being pursued by other players. It is an objective of the present invention to provide views of the playing field from ground level, as for example when the instrumented sports paraphernalia is sliding, rolling free or bouncing at ground level; It is an objective of the present invention to provide views of the playing field as the instrumented sports paraphernalia is held in the clutches of a player's grip as he is being heaped upon. It is an objective of the present invention to provide views of the playing field as the instrumented sports paraphernalia is held in the clutches of a player's grip as the instrumented sports paraphernalia is held and waiting to be punted. It is an objective of the present invention to provide views of the playing field as the instrumented sports paraphernalia is held in the clutches of a player's grip as the instrumented sports paraphernalia is held and waiting to be kicked for a field goal. It is an objective of the present invention to provide views of the playing field as the instrumented sports paraphernalia is held in the clutches of a player's grip as the player touches the instrumented sports paraphernalia to the ground beyond the goal line after a touchdown.

It is an objective of the present invention to provide sounds of the game not heard before during broadcasts by real time TV audiences. It is an objective of the present invention to provide sounds of the game from dynamic instrumented sports paraphernalia. It is an objective of the present invention to provide sounds heard by the dynamic instrumented sports paraphernalia while it is in the air; and sounds heard by the dynamic instrumented sports paraphernalia as the dynamic instrumented sports paraphernalia is passed; and sounds heard by the dynamic instrumented sports paraphernalia as a player is running to catch and receive the dynamic instrumented sports paraphernalia; and sounds heard when the dynamic instrumented sports paraphernalia is fumbled; and sounds heard during and after the dynamic instrumented sports paraphernalia is goal kicked or punted; and sounds heard when a field goal occurs as the dynamic instrumented sports paraphernalia flies between the goal posts and strikes a net. It is an objective of the present invention for the dynamic instrumented sports paraphernalia to hear sounds as the instrumented sports paraphernalia is being hiked; and hear sounds as the player pauses to throw the dynamic instrumented sports paraphernalia; or hear sounds as a player holding the dynamic instrumented sports paraphernalia stands motionless beyond the goal line. It is an objective of the present invention for the dynamic instrumented sports paraphernalia to hear sounds as the dynamic instrumented sports paraphernalia being clutched in a running player's grip; to hear sounds as a player is poised to catch the dynamic instrumented sports paraphernalia; to hear sounds as a player is being pursued by other players; to hear sounds as a player is being tackled or tagged; to hear sounds as a player is making a goal. It is an objective of the present invention to hear sounds on the playing field from ground level; as heard when the instrumented sports paraphernalia is bouncing, rolling free or sliding at ground level; and as a player who is griping the dynamic instrumented sports paraphernalia is heaped upon; and as the instrumented sports paraphernalia is held and waiting to be kicked; and as the instrumented sports paraphernalia touches the ground beyond the goal line.

It is an objective of the present invention to provide instrumented sports paraphernalia with provisions for holding the instrumentation package assembly inside itself, and has provisions for isolating the instrumentation package assembly from shocks received by the instrumented sports paraphernalia during the game, and provide means to load and unload the instrumentation package assembly into and out from the instrumented sports paraphernalia host. It is an objective of the present invention to provide a mounting means for the instrumentation package assembly that will reduce the shock and vibration to the instrumentation package assembly during the instrumented sports paraphernalia's use in a sports event. It is an objective of the present invention to provide a permanent position and nesting place for the instrumentation package assembly inside the instrumented sports paraphernalia. It is an objective of the present invention to maintain alignment of the instrumentation package assembly relative to the instrumented sports paraphernalia during usage of the instrumented sports paraphernalia during a game. It is an objective of the current invention to locate and firmly seat the instrumentation package assembly inside the instrumented sports paraphernalia, and to provide a portal which is unobtrusive to the players through which the cameras inside the instrumentation package assembly can peer outward through the cover of the instrumented sports paraphernalia. It is an objective of the current invention to preserve the alignment of the instrumentation package assembly with the mechanical axis of the instrumented sports paraphernalia, and to prevent damage and preserve normal operation of the instrumentation package assembly even when the instrumented sports paraphernalia is subjected to shock, vibration, dirt, humidity, moisture, and temperature variations during a game. It is an objective of the present invention to reduce the shock and vibration to the instrumentation package assembly during the instrumented sports paraphernalia's use in a sports event by providing isolation and by providing padding and air mattress-like suspension and cushioning. It is an objective of the present invention to provide an instrumentation package assembly that can be assembled (loaded) into the instrumented sports paraphernalia through a convenient means in the existing cover panels of prior art conventional footballs. It is an objective of the present invention to provide instrumented sports paraphernalia which has provisions for holding the instrumentation package assembly inside itself and for isolating the instrumentation package assembly from shocks received by the instrumented sports paraphernalia during the game. It is an objective of the present invention to provide instrumented sports paraphernalia with provisions for holding the instrumentation package assembly inside itself, and has provisions for isolating the instrumentation package assembly from shocks received by the instrumented sports paraphernalia during the game, and provide means to load and unload the instrumentation package assembly into and out from the instrumented sports paraphernalia host. It is an objective of the present invention to provide a mounting means for the instrumentation package assembly that will reduce the shock and vibration to the instrumentation package assembly during the instrumented sports paraphernalia's use in a sports event. It is an objective of the present invention to provide a permanent position and nesting place for the instrumentation package assembly inside the instrumented sports paraphernalia. It is an objective of the present invention to maintain alignment of the instrumentation package assembly relative to the instrumented sports paraphernalia during usage of the instrumented sports paraphernalia during a game. It is an objective of the current invention to locate and firmly seat the instrumentation package assembly inside the instrumented sports paraphernalia, and to provide a portal which is unobtrusive to the players through which the cameras inside the instrumentation package assembly can peer outward through the cover of the instrumented sports paraphernalia. It is an objective of the current invention to preserve the alignment of the instrumentation package assembly with the mechanical axis of the instrumented sports paraphernalia, and to prevent damage and preserve normal operation of the instrumentation package assembly even when the instrumented sports paraphernalia is subjected to shock, vibration, dirt, humidity, moisture, and temperature variations during a game. It is an objective of the present invention to reduce the shock and vibration to the instrumentation package assembly during the instrumented sports paraphernalia's use in a sports event by providing isolation and by providing padding and air mattress-like suspension and cushioning. It is an objective of the present invention to provide a means to wirelessly televise sounds from impacts to the instrumented sports paraphernalia used on the field of play during league games, sports events, warm-up sessions, and training sessions. It is an objective of the present invention to televise pictures and sounds from on the playing field from where the instrumented sports paraphernalia was, and where it is going to be. It is an objective of the present invention for the instrumented sports paraphernalia to be non-intrusive to the game. It is an objective of the present invention to provide a means to wirelessly transmit pictures and sounds, from instrumented sports paraphernalia used on and off the field of play during league games, sports events, training sessions, and warm-up sessions. It is an objective of the present invention to provide instrumented college sports paraphernalia which is substantially equivalent to the conventional college sports paraphernalia used in college league games. It is an objective of the present invention to provide a college instrumented sports paraphernalia which is substantially of the same weight, balance, dynamic behavior, handling and general appearance as conventional college sports paraphernalia used in college league games. It is an objective of the present invention to provide college instrumented sports paraphernalia which has the same general outward appearance as conventional college sports paraphernalia used in college league games, training, practice, demonstrations, promotions, film making and parades. It is an objective of the present invention to capture pictures despite the erratic motion of the instrumented sports paraphernalia. It is an objective of the present invention to present pictures to an audience that are suitable for their viewing. It is an objective of the present invention for instrumented sports paraphernalia to wirelessly televise pictures and sounds from where they are positioned on the playing field. It is an objective of the present invention for instrumented sports paraphernalia to televise pictures and sounds using bi-directional fiber optics cable communication links from where they are positioned on the playing field. It is an objective of the present invention to visually and audibly extend and enhance the TV audience's pleasure and excitement of the game by acquiring pictures and sounds from all the special spatial vantage points that the instrumented sports paraphernalia have on the field in close proximity to the players. It is an objective of the present invention to capture pictures and sounds from where the instrumented sports paraphernalia is. It is an objective of the present invention to provide a means to wirelessly transmit pictures and sounds, from instrumented sports paraphernalia used on the field of play during league games, sports events and training sessions, to a remote base station. It is an objective of the present invention to provide a means to wirelessly transmit pictures and sounds, from instrumented sports paraphernalia used on or off the field of play during sports events, training sessions, warming-up sessions, demonstrations, and promotions to a remote base station. It is an objective of the present invention to provide a means to wirelessly televise pictures and sounds from instrumented sports paraphernalia used off the field of play during league games, sports events and training sessions, to a remote base station. It is an objective of the present invention to provide a means to wirelessly televise pictures and sounds from instrumented sports paraphernalia used on the field of play during league games, sports events and training sessions, to a remote base station. It is an objective of the present invention to capture pictures and sounds from where the instrumented sports paraphernalia (football) was, and where it is going. It is an objective of the present invention to capture pictures and sounds from moving instrumented sports paraphernalia yielding pictures and sounds showing the locations on the playing field/arena where the instrumented sports paraphernalia was from, and to where it is now moving to. It is an objective of the present invention that the system disclosed for televising sports events from instrumented sports paraphernalia used on instrumented playing fields in instrumented sports stadiums, be compatible for use on any playing field and in any sports stadium venue. It is an objective of the present invention that the system disclosed for televising sports events from instrumented sports paraphernalia used on instrumented playing fields, be compatible for use on any playing field venue with or without the presence of a sports stadium.

Instrumented Sports Stadium Objectives

It is an objective of the present invention to equip a sports stadium to wirelessly receive RF televised video and sound signals of football games from TV cameras and microphones inside an instrumented football which is on the playing field, in real time. A sports stadium so equipped will be referred to as an "instrumented sports stadium" in the present invention to differentiate it from an ordinary sports stadium. It is an objective of the present invention to equip the instrumented sports stadium with an antenna array relay junction means to relay the video and sound signals, received from the instrumented football, to a remote base station for processing and final broadcast to a TV viewing audience. It is an objective of the present invention to equip a sports stadium/arena to wirelessly receive RF televised video and sound signals of ice hockey games from TV cameras and microphones inside an instrumented ice hockey puck which is on the playing field/rink, in real time. A sports stadium/arena so equipped will be referred to as an "instrumented sports stadium" in the present invention to differentiate it from an ordinary sports stadium/arena. It is an objective of the present invention to equip the instrumented sports stadium with an antenna array relay junction means to relay the video and sound signals, received from the instrumented ice hockey puck, to a remote base station for processing and final broadcast to a TV viewing audience. It is an objective of the present invention that the instrumented sports stadium is equipped with an antenna array relay junction, a remote base station, bi-directional communication links between the instrumented sports paraphernalia and the antenna array relay junction, and bi-directional communication links between the antenna array relay junction and the remote base station. It is an objective of the present invention to equip a sports stadium to receive televised video and sound signals of baseball games from TV cameras and microphones inside instrumented baseball bases, instrumented baseball home plates, and instrumented pitcher's rubbers which are on the playing field, in real time. A sports stadium so equipped will be referred to as an "instrumented sports stadium" in the present invention to differentiate it from an ordinary sports stadium. It is an objective of the present invention to equip the instrumented sports stadium with an antenna array relay junction means to relay the video and sound signals, received from the instrumented football, to a remote base station. It is an objective of the present invention to equip a sports stadium to televise sports events from both dynamic and static sports paraphernalia. It is an objective of the present invention to provide a selection of alternative fiber optic cable/copper cable runs and configurations that can be buried beneath the ground of the playing field. It is an objective of the present invention to equip a sports stadium/arena to wirelessly receive RF televised video and sound signals from a multiplicity of instrumented sports paraphernalia simultaneously and transmit the signals to a remote base station via an antenna array relay junction for final processing and broadcast to a TV viewing audience.

Instrumented Sports Playing Field Objectives

It is an objective of the present invention to outfit any typical baseball playing field with an instrumented baseball $1^{st}$ base, an instrumented baseball $2^{nd}$ base, an instrumented baseball $3^{rd}$ base, an instrumented baseball pitcher's rubber, and an instrumented baseball home plate, positioned at their traditional locations on the baseball diamond. It is an objective of the present invention to outfit any typical baseball playing field with bi-directional fiber optic cable/copper cable communication links buried beneath the ground. It is an objective of the present invention to establish air ways for transmission of televised RF signals above any typical baseball playing field.

It is an objective of the present invention to outfit any typical baseball playing field with low voltage power cable buried beneath the ground. It is an objective of the present invention to outfit any typical football playing field with an instrumented football. It is an objective of the present invention to establish air ways for transmission of televised RF signals above any typical football playing field. It is an objective of the present invention to outfit any typical ice hockey rink with an instrumented ice hockey puck. It is an objective of the present invention to establish air ways for transmission of televised RF signals above any typical ice hockey rink. It is an objective of the present invention to establish air ways for transmission of RF signals above any typical baseball stadium playing field between the sports paraphernalia and the antenna array relay junction. It is an objective of the present invention to outfit any typical baseball stadium playing field with bi-directional fiber optic cable/copper cable communication links buried beneath the ground between the sports paraphernalia and the antenna array relay junction. It is an objective of the present invention to establish air ways for the transmission of RF signals between any typical football and the antenna array relay junction(s). It is an objective of the present invention to establish air ways for transmission of RF signals between any typical ice hockey puck and the antenna array relay junction(s). It is an objective of the present invention to provide a selection of alternative fiber optic cable/copper cable runs and configurations that can be buried beneath the ground of the playing field. It is an objective of the present invention to equip a playing field to televise sports events from both dynamic and static sports paraphernalia.

Instrumented Bullpen Objectives

It is an objective of the present invention to instrument the baseball stadium bullpen with an instrumented baseball home plate and an instrumented baseball pitcher's rubber which are positioned at their traditional locations in the baseball bullpen. It is an objective of the present invention to establish air ways for transmission of televised RF signals above any typical baseball stadium bullpen. It is an objective of the present invention to outfit any typical baseball stadium bullpen with bi-directional fiber optic cable/copper cable communication links buried beneath the ground. It is an objective of the present invention to outfit any typical baseball stadium bullpen with low voltage power cable buried beneath the ground. It is an objective of the present invention to establish air ways for transmission of RF signals above any typical baseball stadium bullpen between the sports paraphernalia and the antenna array relay junction. It is an objective of the present invention to outfit any typical baseball stadium bullpen with bi-directional fiber optic cable/copper cable communication links buried beneath the ground between the sports paraphernalia and the antenna array relay junction. It is an objective of the present invention to equip a bullpen to televise sports events from both dynamic and static sports paraphernalia.

Remote Base Station Objectives

It is an objective of the present invention to provide a means to wirelessly transmit pictures and sounds, from instrumented sports paraphernalia used on the field of play during league games, sports events and training sessions, to a remote base station. It is an objective of the present invention to provide a means to wirelessly transmit pictures and sounds, from instrumented sports paraphernalia used on and off the field of play before, during and after sports events, training sessions, demonstrations, and promotions to a remote base station. It is an objective of the present invention to provide a means to wirelessly transmit 3-D pictures and sounds from instrumented sports paraphernalia used on the playing field during league games, sports events, and training sessions, to a remote base station. It is an objective of the present invention to provide a means to wirelessly transmit 3-D pictures and sounds from instrumented sports paraphernalia used off of the playing field during warm-up sessions, promotions and training sessions, to a remote base station. It is an objective of the present invention to enable the remote base station with means to receive the relayed video and sound signals from the instrumented sports stadium. It is an objective of the present invention to enable the remote base station with a means to wirelessly command and control the electronic, optical and mechanical functions of the instrumentation package assembly. It is an objective of the present invention to enable the remote base station with a means to wirelessly command and control the electronic and mechanical functions of the antenna array relay junction. It is an objective of the present invention to enable the remote base station with a means to process the video and sound signals relayed to it from the instrumented sports paraphernalia. It is an objective of the present invention to enable the remote base station with a means to telecast the video and sound signals from the instrumented sports paraphernalia to the TV viewing audience. It is an objective of the present invention to provide a means to wirelessly televise pictures and sounds from instrumented sports paraphernalia used off the field of play during league games, sports events and training sessions, to a remote base station. It is an objective of the present invention to provide a means to wirelessly televise pictures and sounds from instrumented sports paraphernalia used on the field of play during league games, sports events and training sessions, to a remote base station. It is an objective of the present invention to provide a means to wirelessly transmit pictures and sounds from instrumented sports paraphernalia used on the field of play during league games, sports events and training sessions, to a remote base station. It is an objective of the present invention to provide a means to wirelessly transmit pictures and sounds, from instrumented sports paraphernalia used on or off the field of play during sports events, training sessions, demonstrations, and promotions to a remote base station. It is an objective of the present invention to provide a means to wirelessly televise pictures and sounds from instrumented sports paraphernalia used on the field of play during league games, sports events and training sessions, to a remote base station. It is an objective of the present invention to provide a means to wirelessly transmit pictures and sounds, from instrumented sports paraphernalia used on the field of play during league games, sports events and training sessions, to a remote base station. It is an objective of the present invention to provide a means to wirelessly transmit pictures and sounds, from instrumented sports paraphernalia used on or off the field of play during sports events, training sessions, demonstrations, and promotions to a remote base station. It is an objective of the present invention to provide a means to wirelessly televise pictures and sounds from instrumented sports paraphernalia used off the field of play during league games, sports events and training sessions, to a remote base station. It is an objective of the present invention to provide a means to wirelessly televise pictures and sounds from instrumented sports paraphernalia used on the field of play during league games, sports events and training sessions, to a remote base station. It is an objective of the present invention to process pictures televised by the four cameras inside the instrumented baseball base to the remote base station, and makes them appear upright to the viewing audience. It is an objective of the present invention to enable the cameraman in the remote base station to align the 3-D stereo camera picture frames with one another. It is an objective of the present invention to enable the cameraman in the remote base station to align the 3-D stereo camera picture frames with the horizon. It is an objective of the present invention to enable the cameraman in the remote base station to align the 3-D stereo camera picture frames with the outfield horizon. It is an objective of the present invention to enable the cameraman in the remote base station to align the 3-D stereo camera picture frames with the centerline of the baseball diamond between $2^{nd}$ base and home plate. It is an objective of the present invention to provide a means to wirelessly televise pictures and sounds from instrumented sports paraphernalia used off the field of play during league games, sports events, warm-up sessions, and training sessions, to a remote base station. It is an objective of the present invention to provide a means to wirelessly televise pictures and sounds from instrumented sports paraphernalia used on the field of play during league games, sports events, warm-up sessions, and training sessions, to a remote base station. It is an objective of the present invention to provide a means to wirelessly televise pictures and sounds from instrumented sports paraphernalia used off the field of play during league games, sports events and training sessions, to a remote base station. It is an objective of the present invention to provide a means to wirelessly televise pictures and sounds from instrumented sports paraphernalia used on the field of play during league games, sports events and training sessions, to a remote base station. It is an objective of the present invention to provide a means to wirelessly transmit pictures and sounds, from instrumented sports paraphernalia used on or off the field of play during sports events, warm-up sessions, training sessions, demonstrations, and promotions to a remote base station. It is an objective of the present invention to provide a means to wirelessly transmit pictures and sounds, from instrumented sports paraphernalia used on the field of play during league games, sports events and training sessions, to a remote base station. It is an objective of the present invention to provide a means to wirelessly transmit pictures and sounds, from instrumented sports paraphernalia used on or off the field of play during sports events, training sessions, demonstrations, and promotions to a remote base station. It is an objective of the present invention to establish air ways for transmission of RF signals between the remote base station and the antenna array relay junction. It is an objective of the present invention to outfit any typical sports stadium with bi-directional fiber optic cable/copper cable communication links between the remote base station and the antenna array relay junction.

Instrumented Football Objectives

The preferred embodiments disclosed in the instrumented football drawings shown in: FIG. 1A and FIG. 1B and FIG. 1C and FIG. 1D, and FIG. 9A and FIG. 9B, and FIG. 9C and FIG. 9D, and FIG. 9E, and FIG. 9F, and FIG. 10A and FIG. 10B, and FIG. 11A and FIG. 11B, and FIG. 12A and FIG. 12B, and FIG. 13A and FIG. 13B, and FIG. 14A and FIG. 14B, and FIG. 15A and FIG. 15B, and FIG. 16A and FIG. 16B, and FIG. 17A and FIG. 17B, and FIG. 20A and FIG. 20B, FIG. 62A, FIG. 62B, FIG. 62C, FIG. 62D, and FIG. 62E meet the following objectives.

It is an objective of the present invention to instrument a football, which will be in play on the football field during a football game, with a means enabling it to capture video and sounds of the game from its vantage point amongst the players on the playing field in real time. This football will be referred to as an "instrumented football" in the present invention to differentiate it from an ordinary conventional football.

It is an objective of the present invention to provide a means for wirelessly televising football games from cameras and microphones mounted inside the football in play. It is an objective of the present invention to instrument a football with two CCD (or equivalent) sensor arrayed cameras, and two microphones. It is an objective of the present invention for the instrumented football to be non-intrusive to the game. It is an objective of the present invention to provide the instrumented football with a means to wirelessly televise the captured video and sounds, from inside the instrumented football, to a remote base station via an antenna array relay junction which is positioned off the playing field within the vicinity of the instrumented sports stadium. It is an objective of the present invention to enable the instrumented football to wirelessly televise the captured video and sounds from the instrumentation inside the instrumented football to a remote base station via an antenna array relay junction located in the vicinity of the playing field and sports stadium in real time. It is an objective of the present invention to provide the instrumented football with a means to wirelessly receive signals from a remote base station via the antenna array relay junction in the instrumented sports stadium to command and control the video and sound capturing functions of the instrumented football, as well as the other electrical, mechanical and optical functions inside the instrumented football. It is an objective of the present invention to enable the instrumented football to wirelessly televise the captured video and sounds independent of the spatial attitude of the instrumented football during the game. It is an objective of the present invention that the instrumented football's outward appearance looks substantially the same as a conventional professional league American football. It is an objective of the present invention that the instrumented football's handling qualities be substantially the same as those of a conventional college league American football. It is an objective of the present invention that the instrumented football's playing and handling qualities be substantially the same as those of a regulation conventional professional league American football.

It is an objective of the present invention to capture, stabilize, remove the spin and make upright TV pictures taken from the instrumented football and broadcast said pictures to a TV audience, despite the spinning, pitching, yawing and forward motion of the instrumented football. It is an objective of the present invention to capture, stabilize, remove the spin and make upright HD TV pictures taken from the instrumented football, and broadcast said pictures to a TV audience, despite the spinning, pitching, yawing and forward motion of the instrumented football. It is an objective of the present invention to capture, stabilize, remove the spin and make upright 3-D HD TV pictures taken from the instrumented football, and broadcast said pictures to a TV audience, despite the spinning, pitching, yawing and forward motion of the instrumented football. It is an objective of the present invention to stabilize the imagery obtained from the instrumented football in an upright condition in the picture frame, regardless of the pitch, roll or yaw of the football, as viewed by a live TV audience in the HD CCD letterbox picture format. It is an objective of the present invention to stabilize the imagery obtained from the instrumented football in an upright condition in the picture frame, regardless of the pitch, roll or yaw of the football, as viewed by a live TV audience in the HD CCD letterbox picture format by using gyroscopic encoders. It is an objective of the present invention to stabilize the imagery obtained from the instrumented football in an upright condition in the picture frame, regardless of the pitch, roll or yaw of the football, as viewed by a live TV audience in the HD CCD letterbox picture format by image recognition processing. It is an objective of the present invention to stabilize the imagery obtained from the instrumented football in an upright condition in the picture frame, regardless of the pitch, roll or yaw of the football, as viewed by a live TV audience in the HD CCD letterbox picture format by using gyroscopic encoders and image recognition processing. It is an objective of the present invention to stabilize the imagery obtained from the instrumented football in an upright condition in the picture frame, regardless of the pitch, roll or yaw of the football, as viewed by a live TV audience in the HD CCD letterbox picture format by using image recognition processing of the archived data base derived from the tripod mounted set-up camera system. It is an objective of the present invention to stabilize the imagery obtained from the instrumented football in an upright condition in the picture frame, regardless of the pitch, roll or yaw of the football, as viewed by a live TV audience in the HD CCD letterbox picture format by using image recognition processing of the archived data base derived from the tripod mounted set-up camera system in the remote base station.

It is an objective of the present invention to provide views of the game not seen before during broadcasts by real time TV audiences. It is an objective of the present invention to provide views of the game from the instrumented football. It is an objective of the present invention to provide views of the football playing field from the air, as seen from both vertices of the instrumented football, as the instrumented football is passed, as a player is running to catch and receive the instrumented football, when the instrumented football is fumbled, after the instrumented football is goal kicked or punted, when a field goal occurs as the instrumented football flies between the goal posts. It is an objective of the present invention to provide views of the football playing field from the clutches of a standing player's grip, as seen from both vertices of the instrumented football; as the instrumented football is being hiked to the quarterback; as the quarterback pauses to throw the instrumented football, or as a player stands motionless beyond the goal line after making a touchdown. It is an objective of the present invention to provide views of the instrumented football playing field from the clutches of a running player's grip, as seen from both vertices of the instrumented football; poised to catch the instrumented football, running for the goal line, being pursued by other players, being tackled, or making a touchdown. It is an objective of the present invention to provide views of the football playing field from ground level, as seen from both vertices of the instrumented football; as the instrumented football is rolling free on the ground after being fumbled, as a player griping the instrumented football is heaped upon, as the instrumented football is held and waiting to be punted, as the instrumented football is held and waiting to be kicked for a field goal, or as a player touches the football to the ground beyond the goal line after a touchdown.

It is an objective of the present invention to provide sounds of the game not heard before during broadcasts by real time TV audiences. It is an objective of the present invention to provide sounds of the game from the instrumented football. It is an objective of the present invention to provide sounds heard by the football from in the air, sounds heard from both vertices of the instrumented football, sounds heard as the instrumented football is passed, sounds heard as a player is running to catch and receive the instrumented football, sounds heard when the instrumented football is fumbled, sounds heard after the instrumented football is goal kicked or punted, sounds heard when a field goal occurs as the instrumented football flies between the goal posts. It is an objective of the present invention to provide sounds heard from the football playing field, sounds heard from the clutches of a standing player's grip, sounds heard from both vertices of the instrumented football; sounds heard as the instrumented football is being hiked to the quarterback; sounds heard as the quarterback pauses to throw the instrumented football, or sounds heard as a player stands motionless beyond the goal line after making a touchdown. It is an objective of the present invention to provide sounds heard from the instrumented football from the clutches of a running player's grip, sounds heard as a player is poised to catch the instrumented football, sounds heard as a player is running for the goal line, sounds heard as a player is being pursued by other players, sounds heard as a player is being tackled, sounds heard as a player is making a touchdown. It is an objective of the present invention to provide sounds heard of the football playing field from ground level, as heard from both vertices of the instrumented football; as the instrumented football is rolling free on the ground after being fumbled, as a player who is griping the instrumented football is heaped upon, as the instrumented football is held and waiting to be punted, as the instrumented football is held and waiting to be kicked for a field goal, or as a player touches the football to the ground beyond the goal line after making a touchdown. It is an objective of the present invention to enable the instrumented football to have two cameras within the instrumented football to see out from both ends of the football's vertices. It is an objective of the present invention to have two cameras within the instrumented football to see out from both ends of the football, where one camera looks at where the football is going and one camera looks at where the football has been. It is also an objective of the present invention to enable the two cameras within the instrumented football to be protected from the hazards on the playing field such as ice, snow, rain, dirt and physical impacts. It is an objective of the present invention to take pictures with extremely wide angle fields of view of the football playing field and the players using the two cameras within the instrumented football. It is an objective of the present invention that the instrumented football has the same weight, and the same center of gravity location as the conventional football. It is an objective of the present invention that the instrumented football has the same weight, center of gravity location and moments of inertia as the conventional American football. It is an objective of the current invention to provide a means to prop up the instrumented football to the same vesica piscis shape as the conventional regulation professional league American football. It is an objective of the present invention to provide buffer plate clearance for any protuberance in the stitching along the seams between adjacent cover panels in the interior of the instrumented football at its two vertices. It is an objective of the present invention to be able to lace the instrumented football with the conventional laces and lacing stitch hole pattern. It is an objective of the present invention for the instrumented football to televise RF signals from the instrumented football to the antenna array relay junction using the air ways above any typical football playing field as communication links It is an objective of the present invention for the instrumented football to receive RF signals from the remote base station via the antenna array relay junction using the air ways linking the instrumented football to the antenna array relay junction. It is an objective of the present invention for the instrumented football to receive command and control signals from the remote base station via the antenna array relay junction using the air ways as communication links thereby enabling the cameraman in the remote base station to control the functions and monitor the status of the instrumented football.

Instrumented Baseball Base Objectives

The preferred embodiments disclosed in the instrumented baseball base drawings shown in: FIG. 38A and FIG. 38B, and FIG. 39A and FIG. 39B, and FIG. 42A and FIG. 42B, and FIG. 43A and FIG. 43B, and FIG. 46A and FIG. 46B, and FIG. 47A and FIG. 47B, and FIG. 47C and FIG. 47D, and FIG. 50A and FIG. 50B, FIG. 59A and FIG. 59B, FIG. 60A and FIG. 60B, FIG. 61A and FIG. 61B meet the following objectives.

It is an objective of the present invention that three instrumented baseball bases and one home plate, that are all disposed simultaneously on the baseball playing field, can transmit TV pictures and sound simultaneously by wireless means to a remote base station, and simultaneously receive wireless command signals from the remote base station to control the functions within the instrumented baseball bases and home plate. It is an objective of the present invention to wirelessly capture pictures and sounds from the instrumented baseball bases from where they are positioned on the playing field. It is an objective of the present invention that the three instrumented baseball bases that are all disposed simultaneously on the baseball playing field, can transmit TV pictures and sound simultaneously by wireless means to a remote base station, and simultaneously receive wireless command signals from the remote base station to control the functions within the instrumented baseball bases and instrumented baseball home plate. It is an objective of the present invention that the instrumented baseball base's outward appearance looks substantially the same as a conventional professional league baseball base shown in FIG. 40. It is an objective of the present invention that the instrumented baseball base's outward appearance looks substantially the same as a conventional professional league baseball base shown in FIG. 41A and FIG. 41B and FIG. 41C.

It is an objective of the present invention to outfit a typical baseball playing field with a compliment of three instrumented baseball bases ($1^{st}$ base, $2^{nd}$ base and $3^{rd}$ base respectively) and with one instrumented home plate, and with one baseball pitcher's rubber. It is an objective of the present invention for the instrumented baseball bases to be non-intrusive to the game. It is an objective of the present invention that the instrumented baseball base's outward appearance looks substantially the same as a typical conventional professional league baseball base shown in FIG. 40A and FIG. 40B and FIG. 40C. It is an objective of the present invention that the instrumented baseball bases have substantially the same handling qualities by the baseball field maintenance personnel as the conventional professional league baseball bases. It is an objective of the present invention to enable the four cameras within the instrumented baseball base to see out from all four sides of the baseball base. It is an objective of the present invention to instrument a baseball base with four CCD sensor arrayed cameras (or equivalent), and two microphones. It is also an objective of the present invention to enable the four cameras within the instrumented baseball base to be protected from the hazards on the playing field such as ice, snow, rain, dirt and physical impacts. It is an objective of the current invention to provide a means for the four cameras inside the instrumented baseball base to look out respectively from each of the base's four sides onto the baseball playing field. It is an objective of the present invention to enable each of the four cameras within the instrumented baseball base to be protected from the hazards on the playing field such as ice, snow, rain, dirt and physical impacts. It is an objective of the present invention to enable each of the four cameras inside the instrumented baseball base to see extremely wide angle fields of view through the optical windows. It is an objective of the present invention to enable the instrumented baseball bases to each have four cameras, and for each camera to see out respectively from each of the four sides of each of the instrumented baseball bases, onto the baseball field of play during a game. It is an objective of the present invention to enable the instrumented baseball bases to each have eight cameras arranged as four 3-D stereo camera pairs, and for each pair to see out respectively from each of the four sides of each of the instrumented baseball bases, onto the baseball field of play during a game. It is an objective of the present invention to enable the instrumented baseball bases to each have eight cameras arranged as four 3-D stereo camera pairs, and for each pair to see out respectively from each of the four corners of each of the instrumented baseball bases, onto the baseball field of play during a game. It is an objective of the current invention to provide a means to prevent moisture and dirt from entering the instrumented baseball bases and interfering with the functions of the instrumentation package assembly inside the base. It is an objective of the current invention to provide a stable mounting means for the instrumentation package assembly inside the instrumented baseball base. It is an objective of the current invention to provide a means to prevent damage to the instrumentation package assembly from debris entering the instrumented baseball base. It is an objective of the present invention that the instrumented baseball base has the same center of gravity location as the conventional baseball base. It is an objective of the present invention that the weight of the instrumented baseball bases is made about the same as the conventional baseball bases. It is an objective of the present invention to connect the instrumented baseball bases to the bi-directional fiber optic cable/copper cable communication links buried beneath the ground of the playing field linking it to the antenna array relay junction. It is an objective of the present invention to connect the instrumented baseball bases to the low voltage electric power copper cable buried beneath the ground of the playing field. It is an objective of the present invention for the instrumented baseball bases to televise RF signals from the instrumented baseball bases to the antenna array relay junction using the air ways above any typical baseball playing field as communication links. It is an objective of the present invention for the instrumented baseball bases to televise signals from the instrumented baseball bases to the antenna array relay junction using the bi-directional fiber optic cable/copper cable communication links buried beneath the ground of the playing field linking it to the antenna array relay junction. It is an objective of the present invention for the instrumented baseball bases to receive signals from the remote base station via the antenna array relay junction using the bi-directional fiber optic cable/copper cable communication links buried beneath the ground of the playing field linking the instrumented baseball bases to the antenna array relay junction. It is an objective of the present invention for the instrumented baseball bases to receive RF signals from the remote base station via the antenna array relay junction using the air ways linking the instrumented baseball bases to the antenna array relay junction. It is an objective of the present invention for the instrumented baseball bases to receive command and control signals from the remote base station via the antenna array relay junction using the bi-directional fiber optic cable/copper cable communication links thereby enabling the cameraman in the remote base station to control the functions of the instrumented baseball bases. It is an objective of the present invention for the instrumented baseball bases to receive command and control signals from the remote base station via the antenna array relay junction using the air ways as communication links thereby enabling the cameraman in the remote base station to control the functions of the instrumented baseball bases.

Instrumented Baseball Home Plates Objectives

The preferred embodiments disclosed in the instrumented baseball home plate drawings shown in: FIG. 44A and FIG. 44B, and FIG. 45A and FIG. 45B, and FIG. 48A and FIG. 48B and FIG. 48C and FIG. 48D, and FIG. 49A and FIG. 49B and FIG. 49C and FIG. 49D, and FIG. 51A and FIG. 51B and FIG. 51C and FIG. 51D, and FIG. 52A and FIG. 52B, and FIG. 53A and FIG. 53B and FIG. 53C, and FIG. 54A and FIG. 54B and FIG. 54C, FIG. 59A and FIG. 59B, FIG. 60A and FIG. 60B, FIG. 61A and FIG. 61B meet the following objectives.

It is an objective of the present invention to instrument the pitcher's bullpen off the playing field with an instrumented baseball home plate. It is an objective of the present invention to outfit a typical baseball bullpen with an instrumented home plate and an instrumented pitcher's rubber.

It is an objective of the present invention to outfit a typical baseball playing field with one instrumented home plate. It is an objective of the present invention for the instrumented baseball home plate to be non-intrusive to the game. It is an objective of the present invention to wirelessly capture pictures and sounds from the instrumented baseball home plate from where it is positioned on the playing field. It is an objective of the current invention to provide a means for the camera inside the instrumented baseball home plate to look out from the top of the plate onto the baseball playing field. It is an objective of the present invention to instrument a baseball home plate with a CCD sensor arrayed camera (or equivalent), and two microphones. It is an objective of the present invention to enable the camera inside the instrumented baseball home plate to see extremely wide angle fields of view through the optical windows. It is an objective of the present invention to enable the camera within the instrumented baseball home plate to be protected from the hazards on the playing field such as ice, snow, rain, dirt and physical impacts. It is an objective of the present invention to enable the instrumented baseball home plate to have one camera, and for the camera to see out from the top of the instrumented home plate, onto the baseball field of play during a game. It is an objective of the present invention to enable the instrumented baseball home plate to have two cameras, and for the cameras to see out from the top of the instrumented home plate, onto the baseball field of play during a game, and for the two cameras to constitute a 3-D stereo camera pair. It is an objective of the present invention to enable the instrumented baseball home plate to have two cameras, and for the cameras to see out from the top of the instrumented home plate, onto the baseball bullpen during pitching practice and warm-up sessions, and for the two cameras to constitute a 3-D stereo camera pair. It is an objective of the present invention to enable the instrumented baseball home plate to have four cameras arranged as four 3-D stereo camera pairs, and for each pairs to see out from the top of the instrumented home plate, onto the baseball field of play during a game, and for the two cameras to constitute a 3-D stereo camera pair. It is an objective of the present invention that the weight of the instrumented baseball home plate be made about the same as the conventional baseball home plate. It is an objective of the present invention that the instrumented baseball home plate has the same center of gravity location as the conventional baseball home plate. It is an objective of the current invention to provide a means to prevent moisture and dirt from entering the instrumented baseball home plate and interfering with the functions of the instrumentation package assembly inside the instrumented baseball home plate. It is an objective of the present invention to connect the instrumented baseball home plates to the bi-directional fiber optic cable/copper cable communication links buried beneath the ground of the playing field linking it to the antenna array relay junction. It is an objective of the present invention to connect the instrumented baseball home plates to the low voltage electric power copper cable buried beneath the ground of the playing field. It is an objective of the present invention for the instrumented baseball home plates to televise RF signals from the instrumented baseball home plates to the antenna array relay junction using the air ways above any typical baseball playing field as communication links. It is an objective of the present invention for the instrumented baseball home plates to televise signals from the instrumented baseball home plates to the antenna array relay junction using the bi-directional fiber optic cable/copper cable communication links buried beneath the ground of the playing field linking it to the antenna array relay junction. It is an objective of the present invention for the instrumented baseball home plates to receive signals from the remote base station via the antenna array relay junction using the bi-directional fiber optic cable/copper cable communication links buried beneath the ground of the playing field linking the instrumented baseball home plates to the antenna array relay junction. It is an objective of the present invention for the instrumented baseball home plates to receive RF signals from the remote base station via the antenna array relay junction using the air ways linking the instrumented baseball home plates to the antenna array relay junction. It is an objective of the present invention for the instrumented baseball home plates to receive command and control signals from the remote base station via the antenna array relay junction using the bi-directional fiber optic cable/copper cable communication links thereby enabling the cameraman in the remote base station to control the functions of the instrumented baseball home plates. It is an objective of the present invention for the instrumented baseball home plates to receive command and control signals from the remote base station via the antenna array relay junction using the air ways as communication links thereby enabling the cameraman in the remote base station to control the functions of the instrumented baseball home plates.

Instrumented Baseball Pitcher's Rubber Objectives

It is an objective of the present invention to locate an instrumented baseball pitcher's rubber on the pitcher's mound at its traditional position on the playing field. It is an objective of the present invention to locate an instrumented baseball pitcher's rubber at the pitcher's mound at its traditional position on the pitcher's mound in the pitcher's bullpen off the playing field. It is an objective of the present invention to equip the instrumented baseball pitcher's rubber with four cameras, and for the cameras to see out from the top of the pitchers rubber onto the baseball bullpen during pitching practice and warm-up sessions, and for the four cameras to be split into two pairs, where each pair constitutes a 3-D stereo camera pair; and where a 3-D stereo camera pair is located at either end of the pitcher's rubber. It is an objective of the present invention to connect the instrumented baseball pitcher's rubber to the bi-directional fiber optic cable/copper cable communication links buried beneath the ground of the playing field linking it to the antenna array relay junction. It is an objective of the present invention to connect the instrumented baseball pitcher's rubber to the low voltage electric power copper cable buried beneath the ground of the playing field. It is an objective of the present invention for the instrumented baseball pitcher's rubber to televise RF signals from the instrumented baseball pitcher's rubber to the antenna array relay junction using the air ways above any typical baseball playing field as communication links. It is an objective of the present invention for the instrumented baseball pitcher's rubber to televise signals from the instrumented baseball pitcher's rubber to the antenna array relay junction using the bi-directional fiber optic cable/copper cable communication links buried beneath the ground of the playing field linking it to the antenna array relay junction. It is an objective of the present invention for the instrumented baseball pitcher's rubber to receive signals from the remote base station via the antenna array relay junction using the bi-directional fiber optic cable/copper cable communication links buried beneath the ground of the playing field linking the instrumented baseball pitcher's rubber to the antenna array relay junction. It is an objective of the present invention for the instrumented baseball pitcher's rubber to receive RF signals from the remote base station via the antenna array relay junction using the air ways linking the instrumented baseball pitcher's rubber to the antenna array relay junction. It is an objective of the present invention for the instrumented baseball pitcher's rubber to receive command and control signals from the remote base station via the antenna array relay junction using the bi-directional fiber optic cable/copper cable communication links thereby enabling the cameraman in the remote base station to control the functions of the instrumented baseball pitcher's rubber. It is an objective of the present invention for the instrumented baseball pitcher's rubber to receive command and control signals from the remote base station via the antenna array relay junction using the air ways as communication links thereby enabling the cameraman in the remote base station to control the functions of the instrumented baseball pitcher's rubber.

Instrumented Ice Hockey Puck Objectives

It is an objective of the present invention to instrument an ice hockey puck, which will be in play on the ice rink in a sports arena, with a means enabling it to capture video and sounds of the game from its vantage point amongst the players on the ice in real time. This ice hockey puck will be referred to as an "instrumented ice hockey puck" in the present invention to differentiate it from an ordinary conventional instrumented ice hockey puck. It is an objective of the present invention to provide a means for wirelessly televising ice hockey games from cameras and microphones mounted inside the ice hockey puck in play. It is an objective of the present invention to instrument an ice hockey puck with four CCD (or equivalent) sensor arrayed cameras, and three microphones. It is an objective of the present invention to instrument an ice hockey puck with two 3-D stereo camera pairs and three microphones. It is an objective of the present invention for the instrumented ice hockey puck to be non-intrusive to the game. It is an objective of the present invention to provide the instrumented ice hockey puck with a means to wirelessly televise the captured video and sounds, from inside the instrumented ice hockey puck, to an antenna array relay junction which is positioned off the ice rink within the vicinity of the instrumented sports stadium/arena. It is an objective of the present invention to enable the instrumented ice hockey puck to wirelessly televise the captured video and sound from the instrumentation inside the instrumented ice hockey puck to an antenna array relay junction in the vicinity of the ice rink in real time. It is an objective of the present invention to provide the instrumented ice hockey puck with a means to wirelessly receive signals from a remote base station via the antenna array relay junction in the instrumented sports stadium/arena to command and control the video and sound capturing functions of the instrumented ice hockey puck, as well as the other electrical, mechanical and optical functions inside the instrumented ice hockey puck. It is an objective of the present invention to provide a means for wirelessly televising games from cameras and microphones mounted inside the instrumented ice hockey puck in play. It is an objective of the present invention to enable the instrumented ice hockey puck to wirelessly televise the captured video and sounds independent of the spatial attitude of the instrumented ice hockey puck during the game. It is an objective of the present invention to stabilize the imagery obtained from dynamic instrumented sports paraphernalia like ice hockey pucks in an upright condition in the picture frame, regardless of the pitch, roll or yaw of the dynamic instrumented sports paraphernalia, as viewed by a live TV audience in the HD CCD letterbox picture format by using gyroscopic encoders. It is an objective of the present invention to stabilize the imagery obtained from the instrumented ice hockey pucks in an upright condition in the picture frame, regardless of the pitch, roll or yaw of the instrumented ice hockey pucks, as viewed by a live TV audience in the HD CCD letterbox picture format by image recognition processing. It is an objective of the present invention to stabilize the imagery obtained from the instrumented ice hockey pucks in an upright condition in the picture frame, regardless of the pitch, roll or yaw of the instrumented ice hockey pucks, as viewed by a live TV audience in the HD CCD letterbox picture format by using gyroscopic encoders and image recognition processing. It is an objective of the present invention to stabilize the imagery obtained from the instrumented ice hockey pucks in an upright condition in the picture frame, regardless of the pitch, roll or yaw of the instrumented ice hockey pucks, as viewed by a live TV audience in the HD CCD letterbox picture format by using image recognition processing of the archived data base derived from the tripod mounted set-up camera system. It is an objective of the present invention to stabilize the imagery obtained from the instrumented ice hockey pucks in an upright condition in the picture frame, regardless of the pitch, roll or yaw of the football, as viewed by a live TV audience in the HD CCD letterbox picture format by using image recognition processing of the archived data base derived from the tripod mounted set-up camera system in the remote base station. It is an objective of the present invention that the instrumented ice hockey puck's outward appearance looks substantially the same as regulation conventional professional league ice hockey pucks. It is an objective of the present invention that the instrumented ice hockey puck's playing and handling qualities be substantially the same as those of regulation conventional professional league ice hockey pucks. It is an objective of the present invention to capture, stabilize, remove the spin and make upright TV pictures taken from the instrumented ice hockey puck and broadcast said pictures to a TV audience, despite the spinning and forward motion of the instrumented ice hockey puck. It is an objective of the present invention to capture, stabilize, remove the spin and make upright HD TV pictures taken from the instrumented ice hockey puck, and broadcast said pictures to a TV audience, despite the spinning and forward motion of the instrumented ice hockey puck. It is an objective of the present invention to capture, stabilize, remove the spin and make upright 3-D HD TV pictures taken from the instrumented ice hockey puck, and broadcast said pictures to a TV audience, despite the spinning and forward motion of the instrumented ice hockey puck. It is an objective of the present invention to enable the four cameras within the instrumented ice hockey puck to see out from the top of the instrumented ice hockey puck. It is also an objective of the present invention to enable the four cameras within the instrumented ice hockey puck be protected from the hazards on the ice rink such as ice, dirt and physical impacts. It is an objective of the present invention to take pictures with extremely wide angle fields of view of the ice hockey rink and the players using the four cameras within the instrumented ice hockey puck. It is an objective of the present invention to instrument an ice hockey puck with four CCD (or equivalent) sensor arrayed cameras, and three microphones. It is an objective of the present invention for the instrumented ice hockey puck to televise RF signals from the instrumented ice hockey puck to the antenna array relay junction using the air ways above any typical ice hockey rink as communication links. It is an objective of the present invention for the instrumented ice hockey puck to receive RF signals from the remote base station via the antenna array relay junction using the air ways linking the instrumented ice hockey puck to the antenna array relay junction. It is an objective of the present invention for the instrumented ice hockey puck to receive command and control signals from the remote base station via the antenna array relay junction using the air ways as communication links thereby enabling the cameraman in the remote base station to control the functions of the instrumented ice hockey puck.

Instrumentation Package Assembly Objectives

It is an objective of the present invention to provide sports paraphernalia with a module with which to instrument them to televise video and audio of the playing field. It is an objective of the present invention to provide sports paraphernalia with a universal module with which to instrument them to televise video and audio, which can be used simultaneously by a variety of different sports paraphernalia on the playing field. It is an objective of the present invention to provide instrumented sports paraphernalia with means for holding the instrumentation package assembly inside itself, and for isolating the instrumentation package assembly from shocks and vibrations received by the instrumented sports paraphernalia during the game. It is an objective of the present invention to provide instrumented sports paraphernalia with means for loading and unloading the instrumentation package assembly into and out from the instrumented sports paraphernalia host. It is an objective of the present invention to provide a means to firmly mount the instrumentation package assembly inside the instrumented sports paraphernalia. It is an objective of the present invention to provide a mounting means for the instrumentation package assembly that will reduce the shock and vibration to the instrumentation package assembly during the instrumented sports paraphernalia's use in a sports event. It is an objective of the present invention to provide an instrumentation package assembly that can be assembled (loaded) into the instrumented sports paraphernalia through a convenient means in the existing cover panels of prior art conventional footballs. It is an objective of the present invention to maintain alignment of the instrumentation package assembly relative to the instrumented sports paraphernalia during usage of the instrumented sports paraphernalia during a game. It is an objective of the current invention to locate and firmly seat the instrumentation package assembly inside the instrumented sports paraphernalia, and to provide a portal which is unobtrusive to the players through which the cameras inside the instrumentation package assembly can peer outward through the cover of the instrumented sports paraphernalia. It is an objective of the current invention to provide the instrumentation package assembly with a corrugated bellows means to tilt the line of sight of the cameras inside the instrumented sports paraphernalia. It is an objective of the current invention to preserve the alignment of the instrumentation package assembly with the mechanical axis of the instrumented sports paraphernalia, and to prevent damage and preserve normal operation of the instrumentation package assembly even when the instrumented sports paraphernalia is subjected to shock, vibration, dirt, humidity, moisture, and temperature variations during a game. It is an objective of the present invention to reduce the shock and vibration to the instrumentation package assembly during the instrumented sports paraphernalia's use in a sports event by providing isolation and by providing padding and air mattress-like suspension and cushioning. It is an objective of the present invention to provide a permanent position and nesting place for the instrumentation package assembly inside the instrumented sports paraphernalia. It is an objective of the present invention that the instrumented sports paraphernalia be designed to withstand shock and vibration encountered during the game. It is an objective of the present invention that the instrumented sports paraphernalia be designed to withstand dirt and weather conditions. It is an objective of the present invention to provide a mounting means for the instrumentation package assembly that will reduce the shock and vibration to the instrumentation package assembly during the instrumented sports paraphernalia's use in a sports event. It is an objective of the present invention that the instrumentation package assembly placed within the instrumented sports paraphernalia is able to include as many electronic capabilities as possible within its confines in order to enhance and benefit the viewing experience of the audience. It is an objective of the present invention to provide an instrumentation package assembly which includes cameras, microphones and wireless equipment that is sized and packaged properly so it can be inserted and removed from within the instrumented sports paraphernalia and given routine maintenance and repairs. It is an objective of the present invention to provide a permanent position and nesting place for the instrumentation package assembly inside the instrumented sports paraphernalia. It is an objective of the present invention to maintain alignment of the instrumentation package assembly relative to the instrumented sports paraphernalia during usage of the instrumented sports paraphernalia during a game. It is an objective of the current invention to locate and firmly seat the instrumentation package assembly inside the instrumented sports paraphernalia, and to provide a portal which is unobtrusive to the players through which the cameras inside the instrumentation package assembly can peer outward through the cover of the instrumented sports paraphernalia. It is an objective of the current invention to preserve the alignment of the instrumentation package assembly with the mechanical axis of the instrumented sports paraphernalia, and to prevent damage and preserve normal operation of the instrumentation package assembly even when the instrumented sports paraphernalia is subjected to shock, vibration, dirt, humidity, moisture, and temperature variations during a game. It is an objective of the present invention to reduce the shock and vibration to the instrumentation package assembly during the instrumented sports paraphernalia's use in a sports event by providing isolation and by providing padding and air mattress-like suspension and cushioning. It is an objective of the present invention to provide an instrumentation package assembly which includes cameras, microphones and wireless equipment that is sized and packaged properly so it can be inserted and removed from within the instrumented sports paraphernalia and given routine maintenance and repairs. It is an objective of the present invention that the instrumentation package assembly includes electronic capabilities within its confines to enhance and benefit the viewing experience of the audience. It is an objective of the present invention that the packaging design used to mount the electronic components inside the instrumentation package assembly be as lightweight as possible. It is an objective of the present invention that the instrumentation package assembly includes all the electronic features and capabilities to enhance and benefit the viewing experience of the TV audience. It is an objective of the present invention that the packaging design used to mount the electronic components inside the instrumentation package assembly be as light-weight as possible and be achieved by minimizing the amount of material used, using light weight materials, and strong materials. It is an objective of the present invention that the instrumentation package assembly be designed to withstand shock and vibration encountered during the game. It is an objective of the present invention that the instrumentation package assembly be designed to withstand dirt and weather conditions. It is an objective of the present invention that the electronic components, and the packaging used to mount the components inside the instrumentation package assembly, be compact and light-weight. It is an objective of the present invention that the instrumentation package assembly placed within the instrumented sports paraphernalia is able to include as many electronic capabilities as possible within its confines in order to enhance and benefit the viewing experience of the audience. It is an objective of the present invention that the packaging design used to mount the electronic components inside the instrumentation package assembly be as durable and robust but be as light-weight as possible. It is an objective of the present invention to provide an instrumentation package assembly which includes cameras, microphones and wireless equipment that is sized and packaged properly so it can be inserted and removed from within the instrumented sports paraphernalia and given routine maintenance and repairs. It is an objective of the present invention to reduce the shock and vibration to the TV camera and electronics in the instrumentation package assembly. It is an objective of the present invention to isolate the instrumentation package assembly from shock and vibration. It is an objective of the present invention for the bladder to provide sufficient space for the instrumentation package assembly inside the instrumented football so as not to interfere with the functions of the instrumentation package assembly. It is an objective of the present invention that the packaging design used to mount the electronic components inside the instrumentation package assembly be as durable and robust but be as light-weight as possible. It is an objective of the present invention that the packaging design used to mount the electronic components inside the instrumentation package assembly is light-weight. It is an objective of the present invention that the instrumentation package assembly includes electronic capabilities within its confines to enhance and benefit the viewing experience of the audience. It is an objective of the present invention that the instrumentation package assembly is able to include as many electronic capabilities as possible within its confines to enhance and benefit the viewing experience of the audience. It is an objective of the present invention that the packaging design used to mount the electronic components inside the instrumentation package assembly is light-weight. It is an objective of the present invention to provide an instrumentation package assembly that can be loaded and assembled into the instrumented sports paraphernalia through the lacing gap in the seam between the cover panels of the existing prior art conventional footballs. It is an objective of the present invention to provide an instrumentation package assembly which includes cameras, microphones and wireless equipment that is sized properly so it can be inserted (loaded) and assembled into the instrumented football through the lacing gap in the seam between the cover panels of the instrumented football. It is an objective of the current invention to provide a means for the cameras inside the instrumentation package assembly to look out of from both vertices of the instrumented football. It is an objective of the current invention to provide a means to prevent moisture and dirt from entering the instrumented football and interfering with the operating game functions of the football and the electronic and optical functions of the instrumentation package assembly inside the instrumented football. It is an objective of the present invention that the instrumented football be designed to withstand dirt and weather conditions. It is an objective of the present invention to provide a mounting means for the instrumentation package assembly inside the instrumented footballs that will reduce the shock and vibration to the instrumentation package assembly during the instrumented football's use in sports events. It is an objective of the current invention to provide a stable means to firmly mount the instrumentation package assembly inside the instrumented football and retain its alignment during play. It is an objective of the present invention to provide an instrumentation package assembly that can be loaded and assembled into the football through the lacing gap in the seam between the cover panels of the instrumented football. It is an objective of the current invention to provide a means to prevent damage to the instrumentation package assembly from debris entering the instrumented football. It is an objective of the current invention to provide a means to isolate the instrumentation package assembly from the shock and vibration encountered by the instrumented football. It is an objective of the present invention to provide a permanent position and nesting place for the instrumentation package assembly inside the instrumented football. It is an objective of the present invention to maintain alignment of the instrumentation package assembly relative to the football during usage of the instrumented football. It is an objective of the current invention to provide a means for the four cameras inside the instrumentation package assembly to look out on the baseball field from the four sides of the instrumented baseball base. It is an objective of the current invention to provide a stable mounting means for the instrumentation package assembly inside the instrumented baseball base. It is an objective of the current invention to provide a means to prevent moisture and dirt from entering the instrumented baseball bases and interfering with the operating game functions of the base and the instrumentation package assembly functions inside the base. It is an objective of the current invention to provide a means to isolate the instrumentation package assembly from the shock and vibration encountered by the instrumented baseball base. It is an objective of the present invention to provide a permanent position and nesting place for the instrumentation package assembly inside the instrumented baseball bases. It is an objective of the current invention to provide a means to prevent damage to the instrumentation package assembly from debris entering the instrumented baseball bases. It is an objective of the present invention to provide a means to firmly mount the instrumentation package assembly inside the instrumented baseball bases. It is an objective of the present invention to provide a mounting means for the instrumentation package assembly inside the instrumented baseball bases that will reduce the shock and vibration to the instrumentation package assembly during the instrumented baseball bases use in sports events. It is an objective of the current invention to provide a means for the four cameras inside the instrumentation package assembly to look out on the baseball field from the four sides of the instrumented baseball base. It is an objective of the present invention that the instrumented baseball bases be designed to withstand dirt and weather conditions. It is an objective of the current invention to provide a stable mounting means for the instrumentation package assembly inside the instrumented baseball home plate. It is an objective of the current invention to provide a means to prevent moisture and dirt from entering the instrumented baseball home plate and interfering with the operating game functions of the plate and instrumentation package assembly functions inside the plate. It is an objective of the current invention to provide a means to prevent damage to the instrumentation package assembly from debris entering the instrumented baseball home plate.

It is an objective of the present invention to provide a means to firmly mount the instrumentation package assembly inside the instrumented baseball home plates. It is an objective of the current invention to provide a means to isolate the instrumentation package assembly from the shock and vibration encountered by the instrumented baseball home plate. It is an objective of the present invention that the instrumented baseball home plates be designed to withstand dirt and weather conditions. It is an objective of the present invention to provide a mounting means for the instrumentation package assembly inside the instrumented baseball home plates that will reduce the shock and vibration to the instrumentation package assembly during the instrumented baseball home plates use in sports events. It is an objective of the present invention to provide a permanent position and nesting place for the instrumentation package assembly inside the instrumented baseball home plates. It is an objective of the present invention that the instrumented baseball pitcher's rubber be designed to withstand dirt and weather conditions. It is an objective of the present invention to provide a means to firmly mount the instrumentation package assembly inside the instrumented baseball pitcher's rubbers. It is an objective of the current invention to provide a means to prevent moisture and dirt from entering the instrumented baseball pitcher's rubber and interfering with the operating game functions of the rubber and the instrumentation package assembly functions inside the rubber. It is an objective of the present invention to provide a mounting means for the instrumentation package assembly inside the baseball pitcher's rubber that will reduce the shock and vibration to the instrumentation package assembly during the baseball pitcher's rubbers use in sports events. It is an objective of the present invention to provide a permanent position and nesting place for the instrumentation package assembly inside the baseball pitcher's rubbers. It is an objective of the current invention to provide a stable mounting means for the instrumentation package assembly inside the instrumented baseball pitcher's rubber. It is an objective of the current invention to provide a means to prevent moisture and dirt from entering the instrumented baseball home plate and interfering with the functions of the instrumentation package assembly inside the baseball pitcher's rubber. It is an objective of the current invention to provide a means to prevent damage to the instrumentation package assembly from debris entering the instrumented baseball pitcher's rubber. It is an objective of the current invention to provide a means to isolate the instrumentation package assembly from the shock and vibration encountered by the instrumented baseball pitcher's rubber. It is an objective of the present invention that the weight of the instrumented football's bladder is made substantially less than the mass of the conventional football's bladder. It is an objective of the present invention to hold the interpupillary distance, of the optical and mechanical axis of each 3-dimension camera pair, to a value suitable for a 3-dimension format needed by a viewing audience. It is an objective of the present invention to provide a means to firmly mount the instrumentation package assembly inside the instrumented sports paraphernalia. It is an objective of the current invention to preserve the alignment of the instrumentation package assembly with the mechanical axis of the instrumented sports paraphernalia, and to prevent damage and preserve normal operation of the instrumentation package assembly even when the instrumented sports paraphernalia is subjected to shock, vibration, dirt, humidity, moisture, and temperature variations during a game.

Instrumented Football Bladder Objectives

It is an objective of the current invention to provide a bladder for the instrumented football, together with buffer plate assemblies, that will prop up the existing American football covers to the same vesica piscis shape as the conventional regulation American footballs. It is an objective of the current invention to provide a selection of bladders for the instrumented footballs, where each one has its own distinct advantages. It is an objective of the current invention to provide a bladder which is distinguished from the conventional professional football bladders by the inclusion of an inner hollow cylindrical wall which forms a symmetrically disposed cylindrical hollow cavity space extending down the full length of the long axis centerline of the bladder. It is an objective of the current invention to provide a bladder which is distinguished from the conventional professional prior art football bladders by its nearly its flattened shaped ends, as compared to the vesica piscis shaped ends of the prior art bladders. It is an objective of the current invention to provide a bladder which is distinguished from the conventional professional football bladders by the inclusion of an open slot that runs radially outward from the central hollow cavity to the outer wall of the bladder along the full length of the bladder from end to end parallel to the axis of the bladder. It is an objective of the current invention to provide a bladder which is distinguished from the conventional professional prior art American football bladders by its dimpled vesica piscis shaped ends as compared to the vesica piscis shaped ends of the prior art bladders vertices, where the dimples are created simply by taking an existing prior art bladder used in regulation conventional footballs and applying pressure to push in both vertices. It is an objective of the current invention to provide a bladder which is distinguished from the conventional professional prior art American football bladders in that it consists of two separate identical halves, where each half has its own gas valve for inflation. It is an objective of the current invention to provide a means to prop up the instrumented football at to the same vesica piscis shape as the conventional regulation American footballs. It is an objective of some of the preferred embodiments of the present invention that the weight of the instrumented football's bladders be less than the weight of the conventional football's bladder. It is an objective of the present invention that the instrumented football's bladder provides cushioning to protect the instrumentation package assembly from shock and vibration damage. It is an objective of the present invention that the inflated bladder cradles the instrumentation package assembly so it will not become misaligned inside the instrumented football when subjected to shock, vibration and crushing forces during the game. It is a further objective of the present invention to enable the inflated bladder to shield the instrumentation package assembly from being damaged during the game. It is a further objective of the present invention to enable the inflated bladder to fit between the buffer plates and apply even pressure to the buffer plates within the instrumented football. It is a further objective of the present invention to enable the inflated bladder to prop up the cover/liner sandwich of the instrumented football to the same vesica piscis shape as with conventional professional league footballs. It is an objective of the present invention to provide the instrumented football with a bladder that has provisions for holding the instrumentation package assembly and for cushioning and isolating the instrumentation package assembly from shocks received by the football during the game. It is an objective of the present invention to provide the instrumented football with a bladder that is of lighter weight compared to the bladder used in a conventional football, in order to help keep the net weight of the entire instrumented football substantially equal to the weight of the conventional professional league American football. It is an objective of the present invention to provide a bladder which enables an instrumentation package assembly to be assembled more quickly into an instrumented football, than with the bladder specified in FIG. 6A and FIG. 6B. It is an objective of the present invention to provide a bladder which is less costly to manufacture, than the bladders specified in FIG. 6A and FIG. 6B, and FIG. 7A and FIG. 7B. It is an objective of the present invention for the bladder to provide sufficient space for the instrumentation package assembly inside the instrumented football so as not to interfere with its functions. It is a further objective of the present invention to enable the inflated bladder to cradle the instrumentation package assembly so it will not become misaligned inside the instrumented football when subjected to shock and crushing forces during the game. It is a further objective of the present invention to enable the inflated bladder to shield the instrumentation package assembly from being damaged during the game. It is a further objective of the present invention to enable the inflated bladder to fit between the buffer plates and apply even pressure to the buffer plates within the instrumented football. It is a further objective of the present invention to enable the inflated bladder to prop up the cover/liner sandwich of the instrumented football to the same vesica piscis shape as with conventional professional league footballs. It is an objective of the present invention to provide the instrumented football with a bladder that has provisions for holding the instrumentation package assembly and for cushioning and isolating the instrumentation package assembly from shocks received by the football during the game. It is an objective of the present invention to provide the instrumented football with a bladder that is of lighter weight compared to the bladder used in conventional footballs.

Camera Objectives

It is an objective of the present invention to enable the two cameras within the instrumented football to see extremely wide angle fields of view from their respective vertices of the football. It is an objective of the present invention to enable the two cameras within the instrumented football to see extremely wide angle fields of view through the instrumented football's windows. It is an objective of the present invention to enable the two cameras within the instrumented football to be protected from the hazards on the playing field such as ice, snow, rain, dirt and physical impacts. It is an objective of the present invention to enable the two cameras within the instrumented football to see extremely wide angle fields of view through the windows. It is an objective of the present invention to use cameras inside of the instrumented sports paraphernalia to produce quality SD, HD and 3-D video. It is an objective of the present invention to use cameras inside of the instrumented sports paraphernalia that use a selection of ordinary commercial off the shelf CCD sensor chips, state of the art sensor chips, and/or the circular CCD sensor chips disclosed if FIG. 63A and FIG. 63B and FIG. 63C. It is an objective of the present invention to easily remove, replace or substitute camera lenses. It is an objective of the present invention to introduce an improved method of employing extremely wide angle camera lenses to televise and broadcast sports events. It is an objective of the present invention to introduce an improved method of employing extremely wide angle zoom camera lenses to televise and broadcast sports events. It is an objective of the present invention to introduce an improved method to getting close-up shots and sounds of the players from otherwise untapped spatial vantage points and angles in the game.

Optical Window Objectives

It is an objective of the current invention to provide a straightforward means to permit damaged optical windows to be replaced easily in the instrumented baseball base. It is an objective of the present invention to coat the optical windows with coatings whose colors blend in and are non-obtrusive to the game. It is an objective of the present invention to keep the size of the optical windows as small as possible so that they are unobtrusive to the game while minimizing the effects on the light levels, resolution and fields of view of the camera lenses. It is an objective of the current invention to provide a straightforward means to permit damaged optical windows to be replaced easily in the instrumented baseball home plate. It is an objective of the present invention to provide optical windows suitable for both more or less than extremely wide fields of view for the instrumented baseball bases. It is an objective of the present invention to provide optical windows which do not vignette extremely wide fields of view for the instrumented baseball home plate. It is an objective of the present invention to provide a buffer plate and an optical window which do not vignette extremely wide fields of view for the cameras in the instrumented baseball base. It is an objective of the present invention to provide a buffer plate and an optical window which do not vignette extremely wide fields of view for the camera in the instrumented baseball home plate.

It is an objective of the present invention to provide optical windows which do not produce optical aberrations for the extremely wide fields of view of the cameras for the instrumented baseball bases. It is an objective of the present invention to provide optical windows which do not produce optical aberrations for the extremely wide fields of view of the camera for the instrumented baseball home plate. It is an objective of the present invention to provide a straightforward means to enable the interchange of optical windows where the windows have different curvatures ranging from plane flat surfaces to shell-like-domed shaped concentric surfaces, for the instrumented baseball bases. It is an objective of the present invention to provide a straightforward means to enable the interchange of optical windows where the windows have different curvatures ranging from plane flat surfaces to shell-like-domed shaped concentric surfaces, for the instrumented baseball home plates. It is an objective of the present invention to provide optical windows that can be replaced easily. For example, if one is damaged, or if it needs to accommodate a different type camera lens. It is an objective of the present invention to provide optical windows suitable for less than extremely wide fields of view. It is an objective of the present invention to provide a buffer plate and an optical window which do not vignette extremely wide fields of view. It is an objective of the present invention to provide optical windows which do not produce optical aberrations for extremely wide fields of view. It is an objective of the present invention to provide a straightforward means to enable the interchange of optical windows where the windows have different curvatures ranging from plane flat surfaces to shell-like-domed shaped concentric surfaces. It is an objective of the current invention to provide a straightforward means to permit damaged optical windows to be replaced easily. It is an objective of the present invention to provide optical windows suitable for less than extremely wide fields of view. It is an objective of the present invention to provide a buffer plate and an optical window which do not vignette extremely wide fields of view. It is an objective of the present invention to provide a straightforward means to enable the interchange of optical windows where the windows have different curvatures ranging from plane flat surfaces to shell-like-domed shaped concentric surfaces. It is an objective of the present invention to provide optical windows which do not produce optical aberrations for the extremely wide fields of view of the camera for the instrumented football. It is an objective of the current invention to provide a straightforward means to permit damaged optical windows to be replaced easily in the instrumented baseball base. It is an objective of the current invention to provide a straightforward means to permit damaged optical windows to be replaced easily. It is an objective of the current invention to provide a straightforward means to permit damaged optical windows to be replaced easily in the instrumented baseball home plate. It is an objective of the current invention to provide a straightforward means to permit damaged optical windows to be replaced easily in the instrumented baseball pitcher's rubber. It is an objective of the present invention to provide optical windows suitable for extremely wide fields of view for the instrumented baseball bases. It is an objective of the present invention to provide optical windows which do not vignette extremely wide fields of view for the instrumented baseball home plate. It is an objective of the present invention to provide a buffer plate and an optical window which do not vignette extremely wide fields of view for the cameras in the instrumented baseball base. It is an objective of the present invention to provide a buffer plate and an optical window which do not vignette extremely wide fields of view for the camera in the instrumented baseball home plate. It is an objective of the present invention to provide optical windows which do not produce optical aberrations for the extremely wide fields of view of the cameras for the instrumented baseball bases. It is an objective of the present invention to provide optical windows which do not produce optical aberrations for the extremely wide fields of view of the camera for the instrumented baseball home plate. It is an objective of the present invention to provide a straightforward means to enable the interchange of optical windows where the windows have different curvatures ranging from plane flat surfaces to shell-like-domed shaped concentric surfaces, for the instrumented baseball bases. It is an objective of the present invention to provide a straightforward means to enable the interchange of optical windows where the windows have different curvatures ranging from plane flat surfaces to shell-like-domed shaped concentric surfaces, for the instrumented baseball home plates. It is an objective of the current invention to provide a straightforward means to permit damaged optical windows to be replaced easily in the instrumented baseball base. It is an objective of the current invention to provide a straightforward means to permit damaged optical windows to be replaced easily in the instrumented baseball home plate. It is an objective of the present invention to provide optical windows suitable for both more or less than extremely wide fields of view for the instrumented baseball bases. It is an objective of the present invention to provide optical windows which do not vignette extremely wide fields of view for the instrumented baseball home plate. It is an objective of the present invention to provide a buffer plate and an optical window which do not vignette extremely wide fields of view for the cameras in the instrumented baseball base. It is an objective of the present invention to provide a buffer plate and an optical window which do not vignette extremely wide fields of view for the camera in the instrumented baseball home plate. It is an objective of the present invention to provide optical windows which do not produce optical aberrations for the extremely wide fields of view of the cameras for the instrumented baseball bases. It is an objective of the present invention to provide optical windows which do not produce optical aberrations for the extremely wide fields of view of the camera for the instrumented baseball home plate. It is an objective of the present invention to provide a straightforward means to enable the interchange of optical windows where the windows have different curvatures ranging from plane flat surfaces to shell-like-domed shaped concentric surfaces, for the instrumented baseball bases. It is an objective of the present invention to provide a straightforward means to enable the interchange of optical windows where the windows have different curvatures ranging from plane flat surfaces to shell-like-domed shaped concentric surfaces, for the instrumented baseball home plates. It is an objective of the present invention to provide optical windows that can be replaced easily. For example, if one is damaged, or if it needs to accommodate a different type camera lens. It is an objective of the present invention to provide optical windows suitable for less than extremely wide fields of view. It is an objective of the present invention to provide a buffer plate and an optical window which do not vignette extremely wide fields of view. It is an objective of the present invention to provide optical windows which do not produce optical aberrations for extremely wide fields of view. It is an objective of the present invention to provide a straightforward means to enable the interchange of optical windows where the windows have different curvatures ranging from plane flat surfaces to shell-like-domed shaped concentric surfaces. It is an objective of the current invention to provide a straightforward means to permit damaged optical windows to be replaced easily. It is an objective of the present invention to provide optical windows suitable for less than extremely wide fields of view. It is an objective of the present invention to provide a buffer plate and an optical window which do not vignette extremely wide fields of view. It is an objective of the present invention to provide a straightforward means to enable the interchange of optical windows where the windows have different curvatures ranging from plane flat surfaces to shell-like-domed shaped concentric surfaces. It is an objective of the current invention to provide a straightforward means to permit damaged optical windows to be replaced easily. It is an objective of the present invention to provide optical windows suitable for less than extremely wide fields of view. It is an objective of the present invention to provide a buffer plate and an optical window which do not vignette extremely wide fields of view. It is an objective of the present invention to provide a straightforward means to enable the interchange of optical windows where the windows have different curvatures ranging from plane flat surfaces to shell-like-domed shaped concentric surfaces. It is an objective of the current invention to provide a straightforward means to permit damaged optical windows to be replaced easily. It is an objective of the present invention to provide optical windows suitable for less than extremely wide fields of view. It is an objective of the present invention to provide a straightforward means to enable the interchange of optical windows where the windows have different curvatures ranging from plane flat surfaces to shell-like-concentric surfaces.

Buffer Plate Assembly Objectives

It is an objective of the present invention to provide a buffer plate assembly with an optical window which does not vignette the extremely wide fields of view of the cameras. It is an objective of the present invention to provide a buffer plate assembly with an unobstructed path through which the cameras see onto the playing field from inside the instrumented sports paraphernalia. It is an objective of the present invention to provide a buffer plate assembly that mounts the instrumentation package assembly inside the instrumented sports paraphernalia, and protects it from damage and misalignment. It is an objective of the present invention to provide a buffer plate assembly with an optical window that is easily replaceable. It is an objective of the present invention to provide a buffer plate assembly that acts like a bearing and provides a solid and stable mounting for the instrumentation package assembly inside the instrumented sports paraphernalia. It is an objective of the present invention to provide a buffer plate assembly that allows the instrumentation package assembly to be aligned. It is an objective of the present invention to provide a means to align the cameras of the 3-D stereo camera pairs.

3-Dimension Stereo Camera Pair Objectives

It is an objective of the present invention to provide a means to hold the interpupillary distance of each 3-dimension stereo camera pair to a value suitable for a 3-dimension HD formats needed by the TV viewing audience. It is an objective of the present invention to use 3-dimension stereo camera pairs in the instrumented baseball bases, instrumented baseball home plates, instrumented baseball pitcher's rubbers, and instrumented ice hockey pucks to produce realistic 3-D effects of the game for the TV viewing audience.

Antenna Array Relay Junction Objectives

It is an objective of the present invention that the antenna array relay junction receive televised signals simultaneously from a multiplicity of static instrumented sports paraphernalia that are fixed on the playing field. It is an objective of the present invention that the antenna array relay junction(s) receive televised signals from dynamic instrumented sports paraphernalia that may move anywhere on the playing field. It is an objective of the present invention that the antenna array relay junction receives televised signals simultaneously from a multiplicity of static instrumented sports paraphernalia that are on the playing field and relays them simultaneously to the remote base station. It is an objective of the present invention that the antenna array relay junction receives command and control signals from the remote base station and relays them to a dynamic instrumented sports paraphernalia that is on the playing field. It is an objective of the present invention that the antenna array relay junction receives command and control signals from the remote base station and relays them simultaneously to a multiplicity of static instrumented sports paraphernalia that are on the playing field.

Battery Charging Station Objectives

It is an objective of the present invention to keep the instrumented sports paraphernalia wirelessly charged with electricity by using battery charging stations. It is an objective of the present invention to provide a charging station unit for charging footballs. It is an objective of the present invention to provide a charging station unit for charging footballs wirelessly. It is an objective of the present invention to provide a football charging station unit which has the ability to simultaneously handle the charging, recharging and/or perform comprehensive software assisted diagnostic testing of instrumented footballs in single and/or multiple quantities. It is an objective of the present invention to provide a charging station unit for charging instrumented baseball bases, instrumented baseball home plates, instrumented baseball pitcher's rubbers, and instrumented ice hockey pucks. It is an objective of the present invention to provide a charging station unit for charging instrumented baseball bases, instrumented baseball home plates, instrumented baseball pitcher's rubbers, and instrumented ice hockey pucks wirelessly. It is an objective of the present invention for the instrumented baseball bases, instrumented baseball home plates, instrumented baseball pitcher's rubbers, and instrumented ice hockey pucks to use the same charging station. It is an objective of the current invention to furnish rechargeable battery packs to each of the sports paraphernalia. It is an objective of the current invention to provide a straightforward means to permit worn out battery packs to be replaced easily in the instrumented baseball bases, instrumented baseball home plates, and instrumented baseball pitcher's rubbers. It is an objective of the current invention to wirelessly charge the battery packs while the battery packs are inside of their instrumented sports paraphernalia. It is an objective of the current invention for the status of the battery packs to be monitored by means external to the instrumented sports paraphernalia. It is an objective of the current invention for the battery pack power to be externally controlled and monitored by the cameraman in the remote base station. It is an objective of the current invention for the battery pack power to be externally wirelessly controlled and monitored by the battery pack charging station. It is an objective of the current invention for the battery pack power to be externally wirelessly controlled and monitored by the hand held remote.

Hand Held Remote Objectives

It is an objective of the present invention to provide a hand-held remote control unit to enable and disable the instrumentation package assembly mounted inside the instrumented football. It is an objective of the present invention to provide a hand-held remote control unit to enable and disable the instrumentation package assembly mounted inside the instrumented football wirelessly. It is an objective of the present invention to provide a hand-held remote control unit to enable, disable and interrogate the instrumentation package assembly mounted inside the instrumented football wirelessly. It is an objective of the present invention to provide a hand-held remote control unit to enable and disable the instrumentation package assemblies mounted inside the instrumented baseball bases, instrumented baseball home plates, instrumented baseball pitcher's rubbers, and instrumented ice hockey pucks. It is an objective of the present invention to provide a hand-held remote control unit to enable and disable the instrumentation package assemblies mounted inside the instrumented baseball bases, instrumented baseball home plates, instrumented baseball pitcher's rubbers, and instrumented ice hockey pucks wirelessly. It is an objective of the present invention to provide a hand-held remote control unit to enable, disable and interrogate the instrumentation package assemblies mounted inside the instrumented baseball bases, instrumented baseball home plates, instrumented baseball pitcher's rubbers, and instrumented ice hockey pucks wirelessly.

Tripod Mounted Set-Up Camera System Objectives

It is an objective of the present invention to gather sample photographic images to create an image database that is subsequently utilized by the remote base station software to enhance, stabilize and/or make upright the real-time images received from the football's cameras during game time.

Upper Protective Cover Plate Objectives

It is an objective of the present invention that the upper protective cover plate be made dome shaped so the walls of its bores can surround the optical windows near the very top of the instrumented baseball home plate and shelter them from hits, while still keeping the edge of the protective cover plate far down below the top of the instrumented baseball home plate and well below the surface of the playing field in the ground, so the edge can not be felt by the players if the players impact the top surface of the instrumented baseball home plate. It is an objective of the present invention that the upper protective cover plate provide a clear unobstructed path for the view of the cameras to be unobstructed. It is an objective of the present invention that the upper protective cover plate provide for mounting the microphone on the top of the instrumented baseball home plate. It is an objective of the present invention that the upper protective cover plate be shaped to shield the instrumentation package assembly inside the instrumented baseball home plate from damage during the game.

DETAILED DESCRIPTION OF THE DRAWINGS

FIG. 1A and FIG. 1B and FIG. 1C and FIG. 1D

The detailed physical elements disclosed in the instrumented football drawings shown in FIG. 1A and FIG. 1B and FIG. 1C and FIG. 1D are identified as follows: 1 is the origin (0, 0, 0) of the instrumented football's three axis coordinate system (x, y, z). 2 is the instrumented football's cover. 3 is the liner interface forming a sandwich between the cover and the instrumented football's cover. 4 are the laces. 5 is the gap in the cover along the top of the instrumented football between the adjacent top two cover panels. 6 is the gas valve through which pressurized gas is pumped into the bladder to inflate it. 7 are the electronics mounted along the y-axis or long axis of the instrumented football. 8 is the z-axis. 9 is the x-axis. 10 is the gas used to inflate the pre-formed bladder. 11 and 12 are the optical windows. 13 is the liner. 14 and 15 are the vertices or tips/ends of the instrumented football where the cylindrical small diameter ends of the buffer plates are pressed through the bores in the cover/liner sandwich. 16 and 17 are buffer plates used to mount the instrumentation package assembly to the instrumented football. 18 is a corrugated bellows section of the skin of the instrumentation package assembly. 19 is the instrumentation package assembly's smooth cylindrical section. 20 and 21 are CCD sensor array cameras (or equivalent). 22 and 23 are air-tight and water-tight seals between the optical windows and the buffer plates. 24 and 25 are condenser microphones. 26 and 27 are camera lenses. 28 and 29 are the induction coils at either end of the instrumentation package assembly used to charge the battery pack 36. 30 is the hollow cylindrical region of the blabber. 31 is the surface of the hollow cylindrical cavity region of the pre-formed bladder that presses against the instrumentation package assembly when the pre-formed bladder is inflated. 32 is the inside surface of the inflated bladder which props up the instrumented football's cover. 33 is the outside surface of the inflated bladder that presses against the liner 13. 34 is an antenna element. 35 is an antenna element. 36 is a battery pack.

Figure 1A:
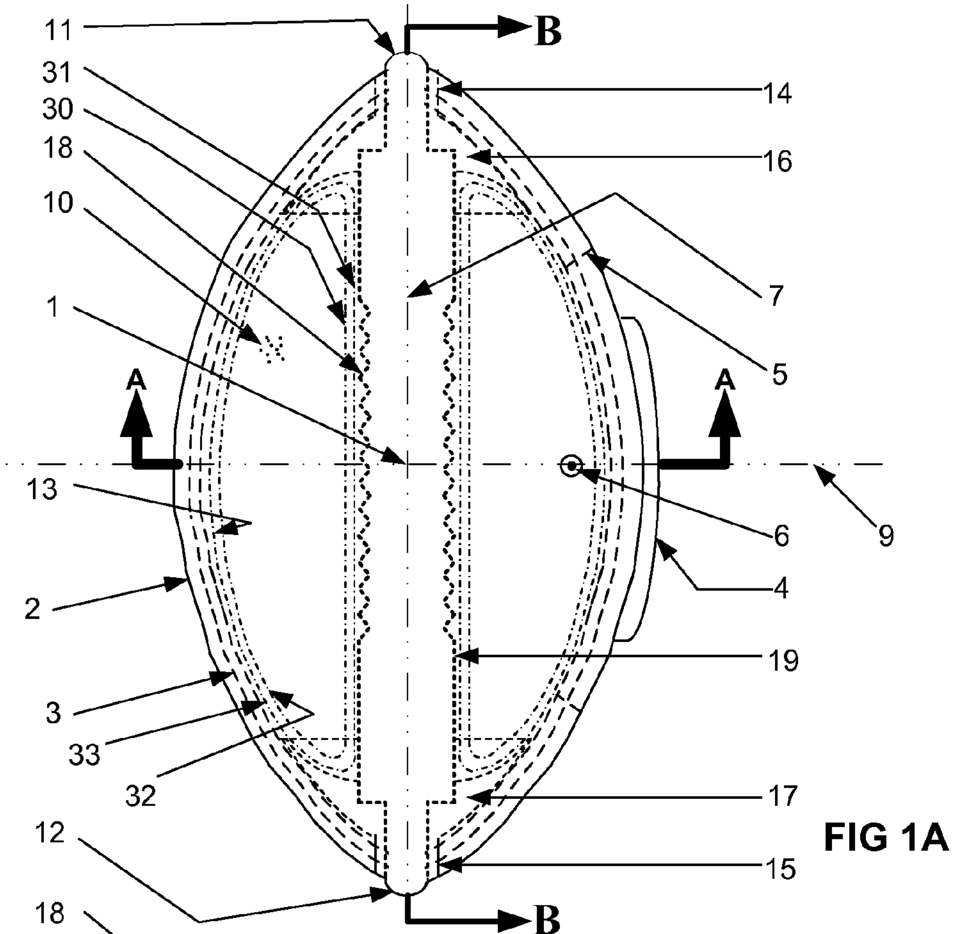
FIG. 1A shows a side view of the instrumented football.

FIG. 1A shows a side view of the instrumented football.

Figure 1B:
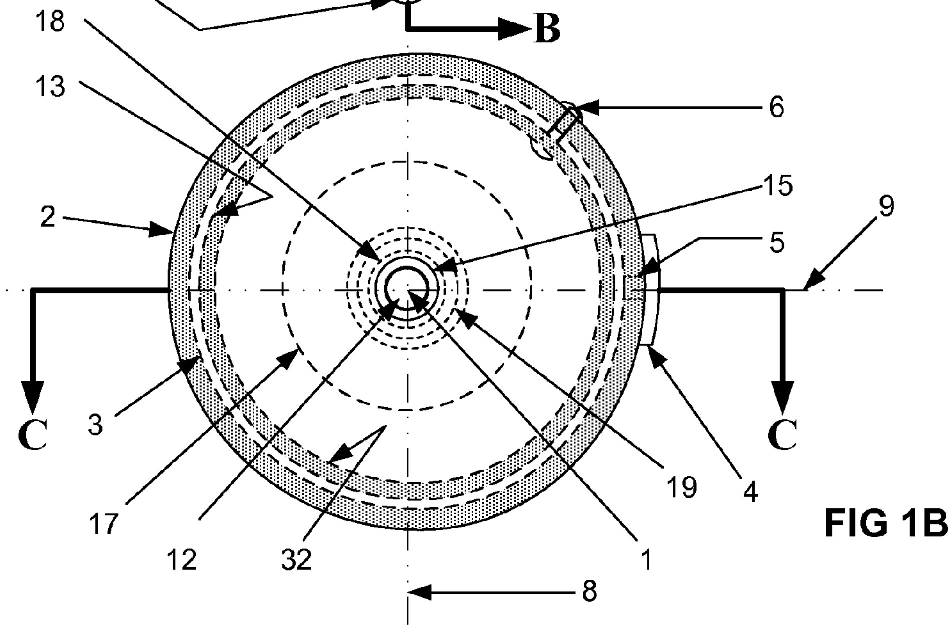
FIG. 1B shows an end view of the instrumented football.

FIG. 1B shows an end view of the instrumented football.

Figure 1C:
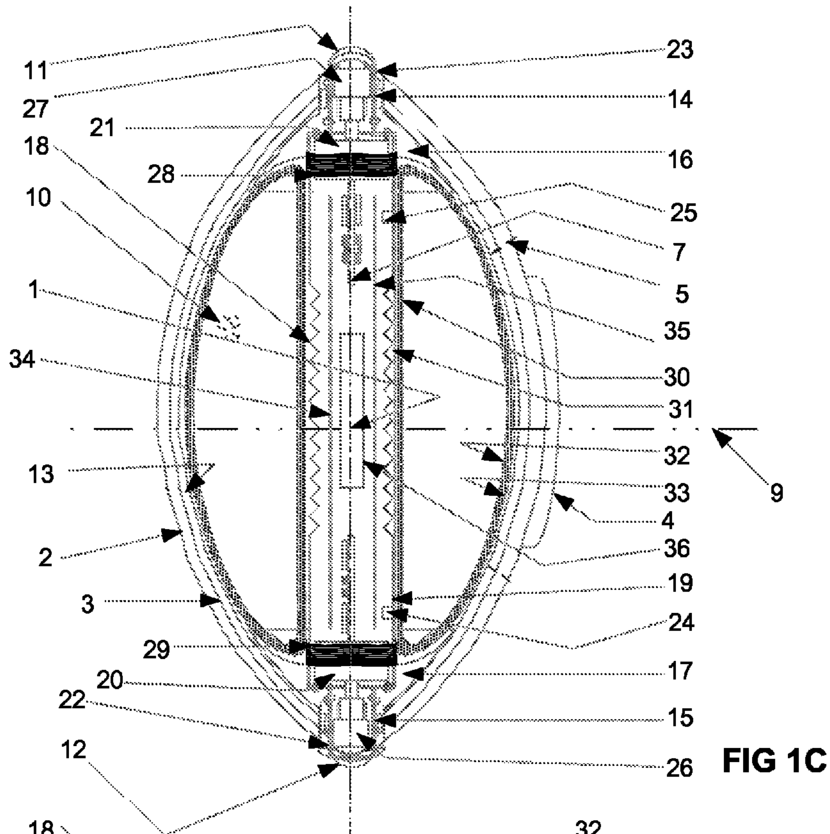
FIG. 1C shows a B-B section view of FIG. 1A.

FIG. 1C shows a B-B section view of FIG. 1A.

Figure 1D:
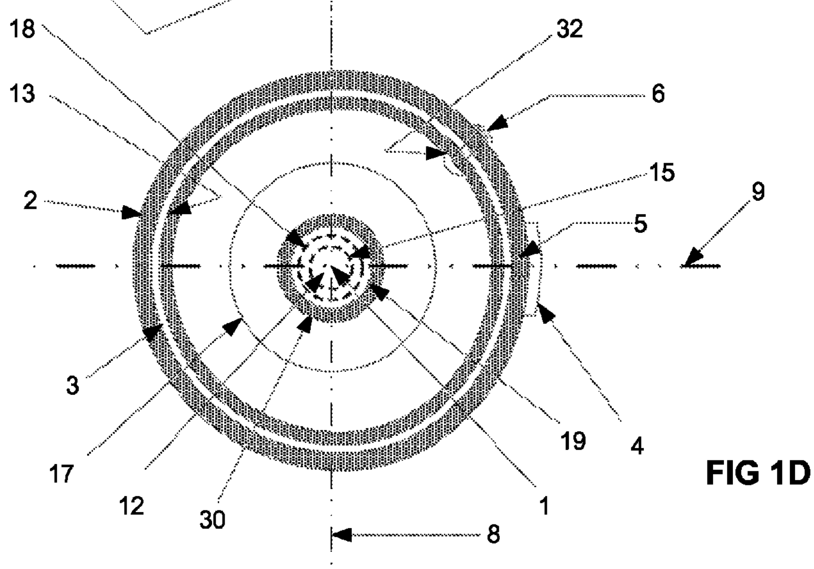
FIG. 1D shows an A-A section view of FIG. 1A.

FIG. 1D shows an A-A section view of FIG. 1A.

Referring to drawings FIG. 1A and FIG. 1B and FIG. 1C and FIG. 1D, in a preferred embodiment, an instrumented football provided in accordance with the invention is comprised of an instrumentation package assembly 19, two buffer plate assemblies 16 and 17, a cover/liner sandwich 3 and 13, a bladder 33, a gas valve 6, gas 10, and laces 4 is disclosed. It is under the command and control of the remote base station disclosed in FIG. 62A and FIG. 62B and FIG. 62C and FIG. 62D and FIG. 62E and FIG. 64A and FIG. 64C.

Figure 23:
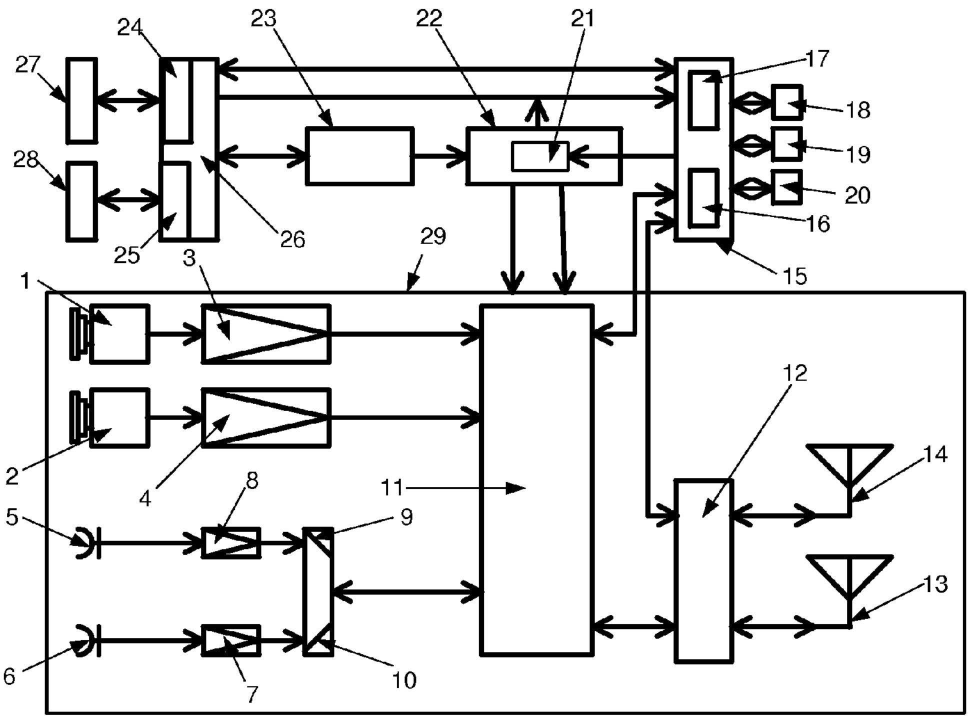
FIG. 23 is a block diagram showing the electronic signals and data flows in the instrumentation package assembly.
Figure 24:
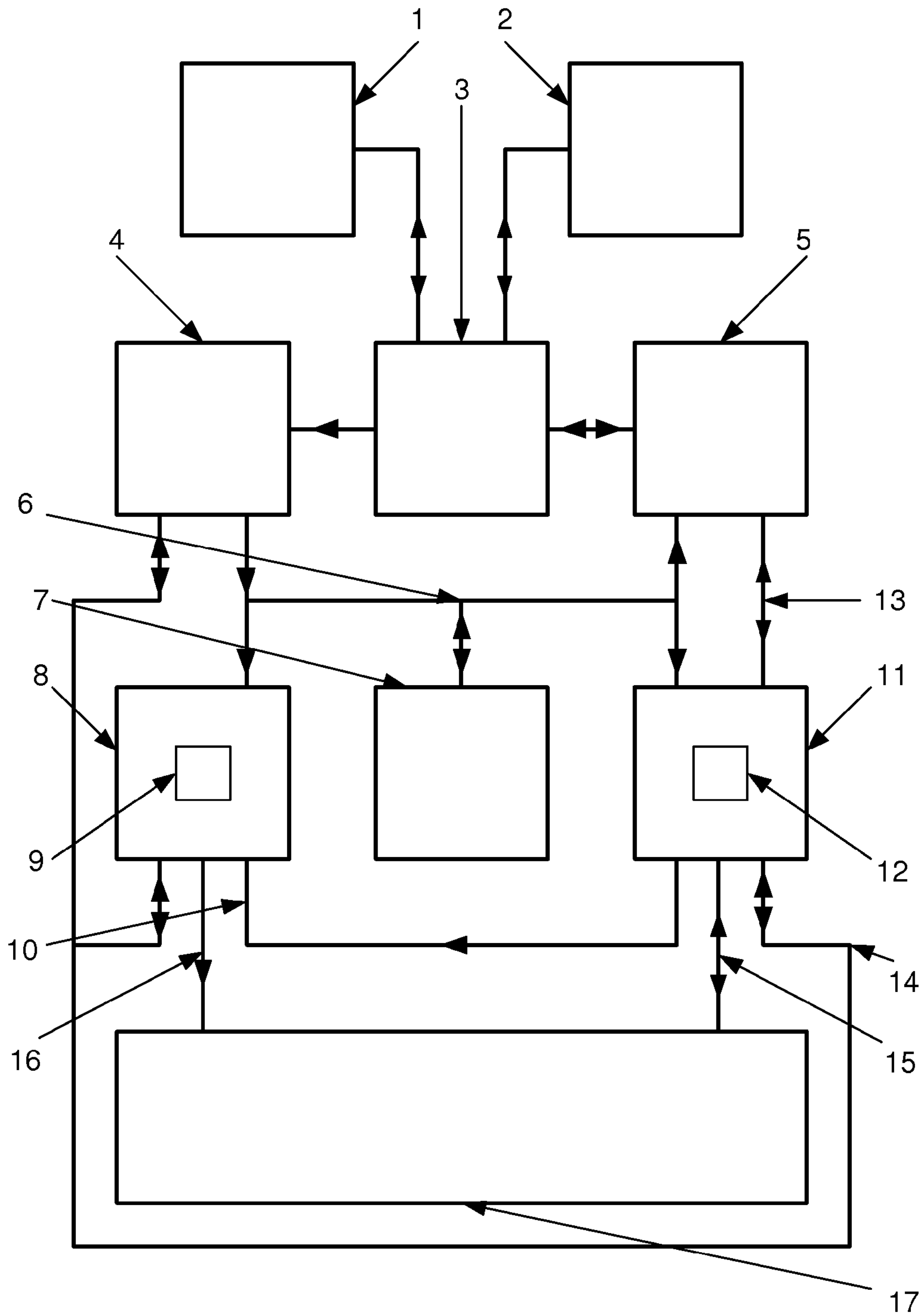
FIG. 24 is a block diagram showing the signals and data flows in the power supply and battery charging circuits inside the instrumentation package assembly.

The electronics 7 in the instrumentation package assembly 19 are balanced and mounted close to the y-axis in order to minimize their moments of inertia. FIG. 23 is a block diagram that explains the detailed circuitry, flow of electrical signals and data in the general operation of the instrumentation package assembly electronics used for televising pictures and sounds, controlling the electrical and mechanical functions within the instrumentation package assembly, and charging the battery pack 36. FIG. 24 is a block diagram showing the circuitry, signals and data flows in the power supply and battery charging circuits inside the instrumentation package assembly.

The instrumentation package assembly 19 is shown mounted inside the instrumented football using two buffer plates 16 and 17. Two buffer plate assemblies 16 and 17 are located inside the instrumented football; one at each of its vertices 14 and 15. Precision holes are bored in each of the cover's vertices 14 and 15. The circumferences of the holes are precisely stitched to form a precision hole. The instrumentation package assembly 19 has two TV cameras 20 and 21, two microphones 24 and 25, two wireless antenna elements 34 and 35, battery pack 36 and supporting electronics, all housed within its enclosure 19. The cameras 20 and 21 peer out through portals in the instrumented football's vertices 14 and 15. The induction coils 28 and 29 are wound on the outside surface of the enclosure 19. The inflated bladder 32 cradles the instrumentation package assembly 19 inside A. The bladder 32 is inflated with gas 10 through the gas valve 6. The shape of the instrumented football is essentially circularly symmetric about its y-axis.

In a preferred embodiment, the instrumentation package assembly 19 is mounted inside the instrumented football by using two identical buffer plate assemblies 16 and 17. There is one buffer plate assembly attached to the interior walls of the football at each of the instrumented football's vertices 14 and 15. The buffer plates 16 and 17 have machined bores into which the ends of the instrumentation package assembly 19 are mounted. The buffer plates 16 and 17 act in a way like shaft bearings by holding the instrumentation package assembly 19 at each of its ends. The buffer plates 16 and 17 are constructed with a small diameter cylindrical section that has a small bore that protrudes through the instrumented football's cover/liner sandwich 3 at its vertices 14 and 15. This bore permits the TV cameras 20 and 21 to see out onto the football playing field in both directions from each of the instrumented football's vertices 14 and 15.

Figures 2A, 2B, 2C:
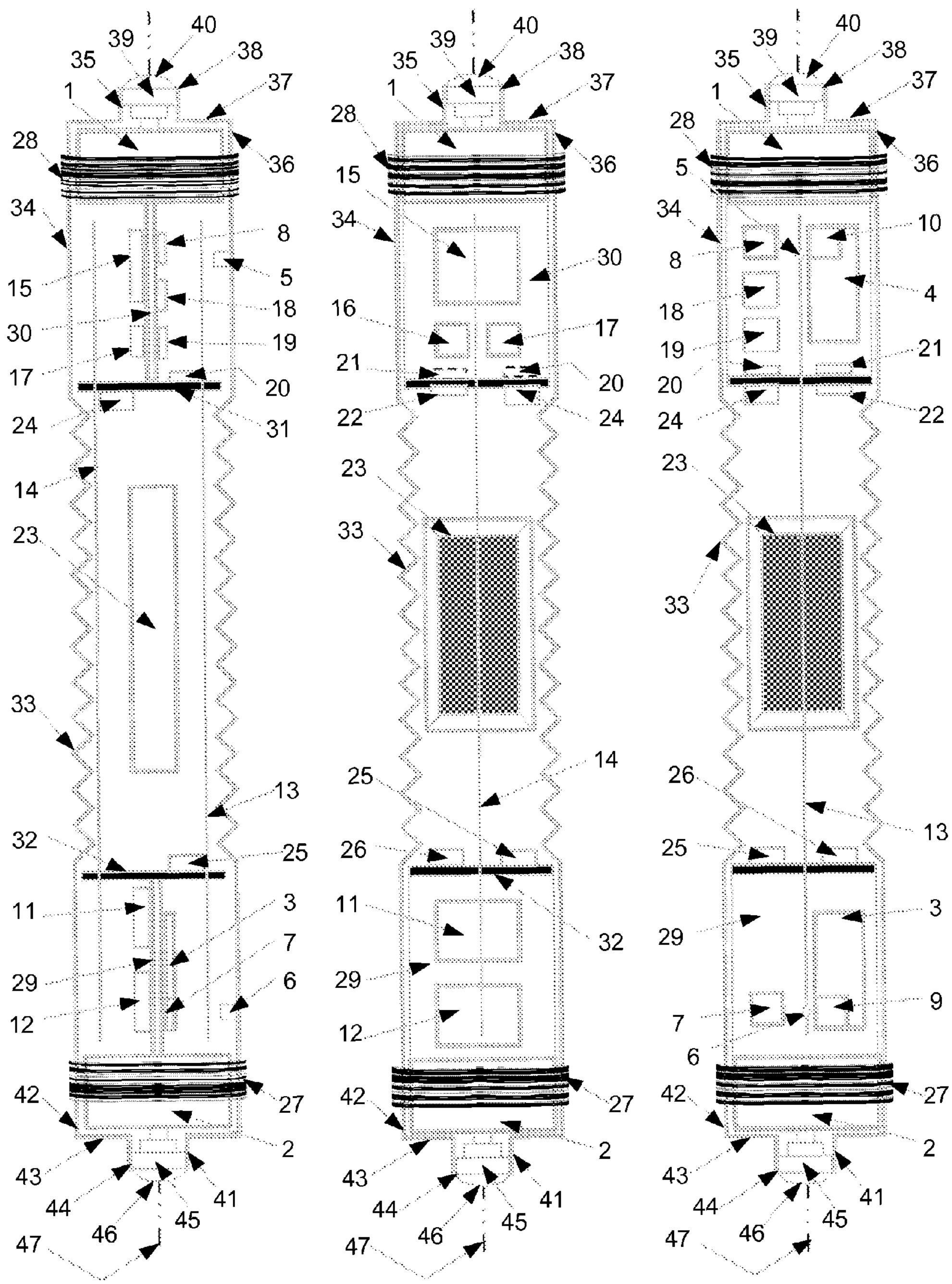
FIG. 2A shows a side view section of the instrumented football's instrumentation package assembly.
FIG. 2B shows a top view section of the instrumented football's instrumentation package assembly.
FIG. 2C shows a bottom view section of the instrumented football's instrumentation package assembly.

The preferred embodiment of the instrumentation package assembly 19 is disclosed in FIG. 2A and FIG. 2B and FIG. 2C.

Figure 4A:
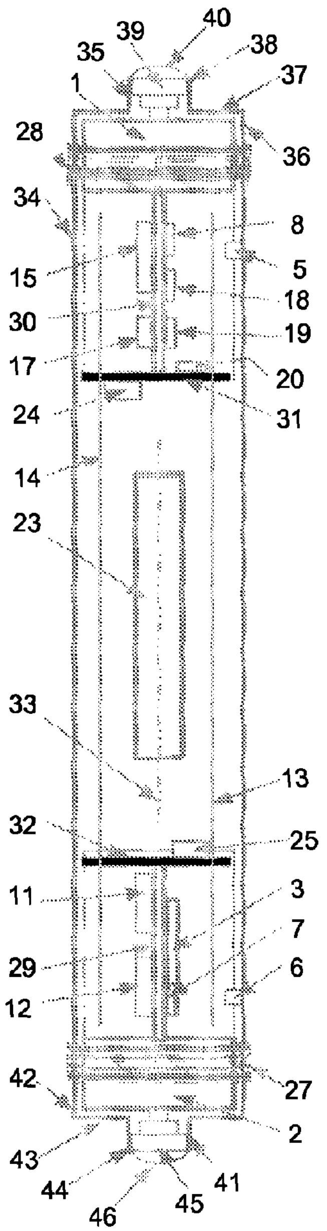
FIG. 4A shows a front side view section of the instrumented football's instrumentation package assembly.
Figure 4B:
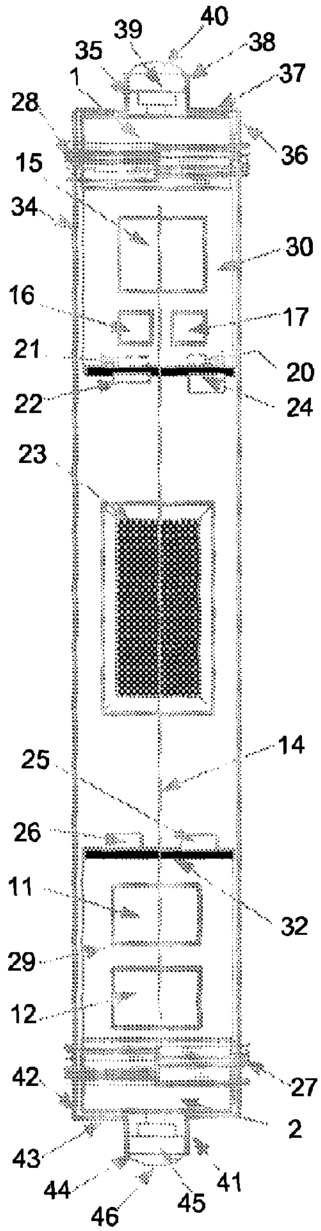
FIG. 4B shows a top view section of the instrumented football's instrumentation package assembly.
Figure 4C:
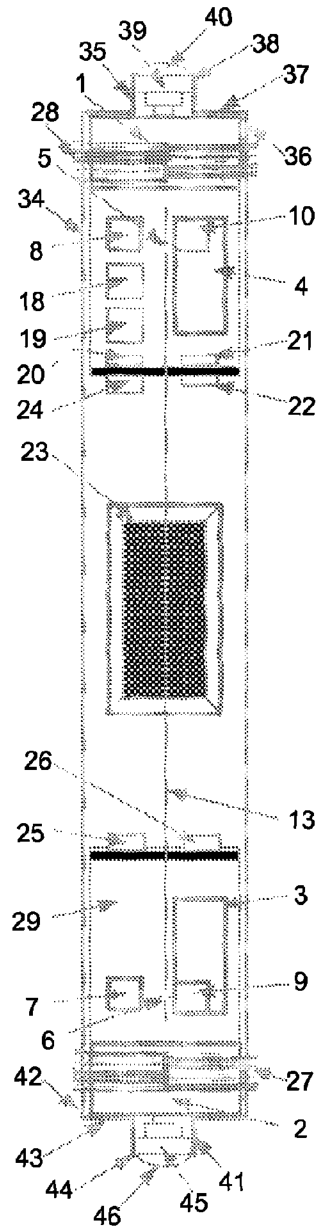
FIG. 4C shows a bottom view section of the instrumented football's instrumentation package assembly.

Details of various other preferred embodiments of instrumentation package assemblies, that may be used to substitute for the instrumentation package assembly above, are specified in FIG. 4A and FIG. 4B and FIG. 4C.

Figure 21A:
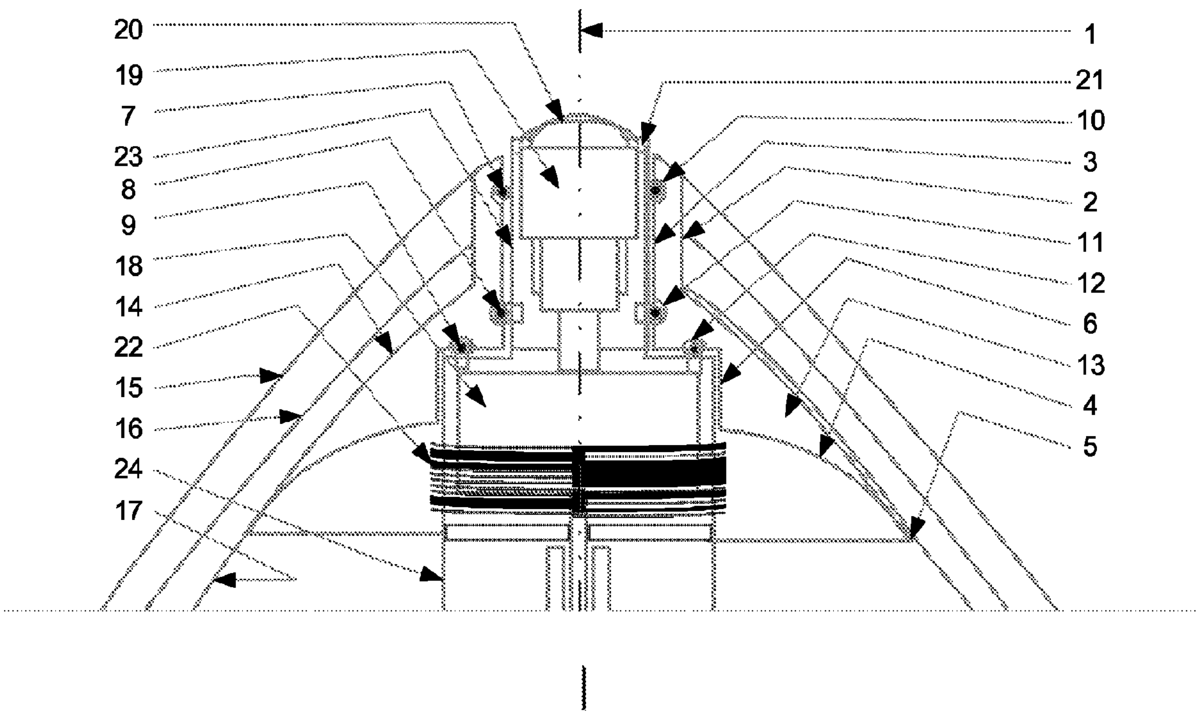
FIG. 21A shows a side view section of the Type I buffer plate and instrumentation package assembly.
Figure 21B:
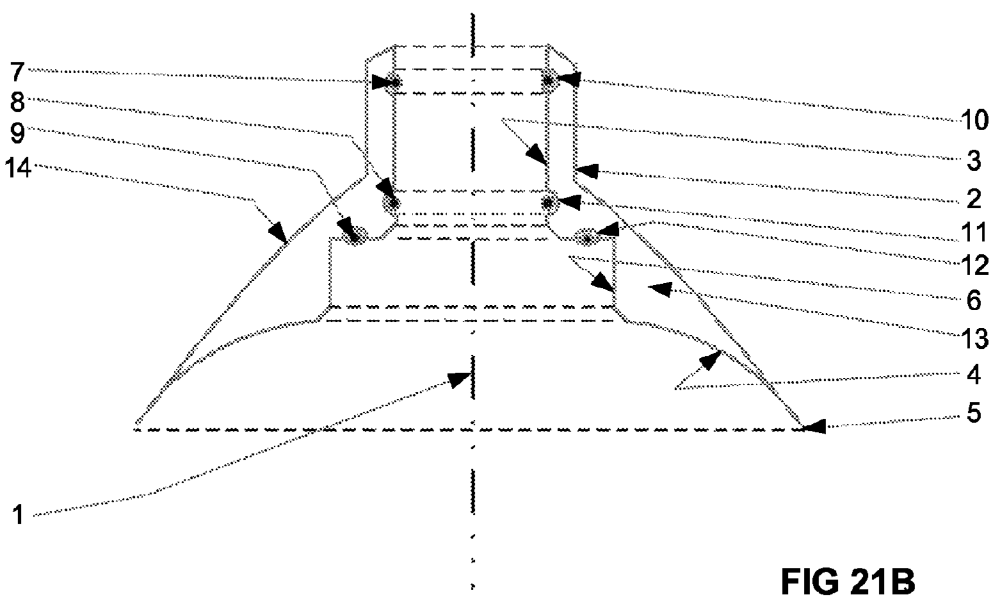
FIG. 21B shows a side view section of just the buffer plate alone.
Figure 21C:
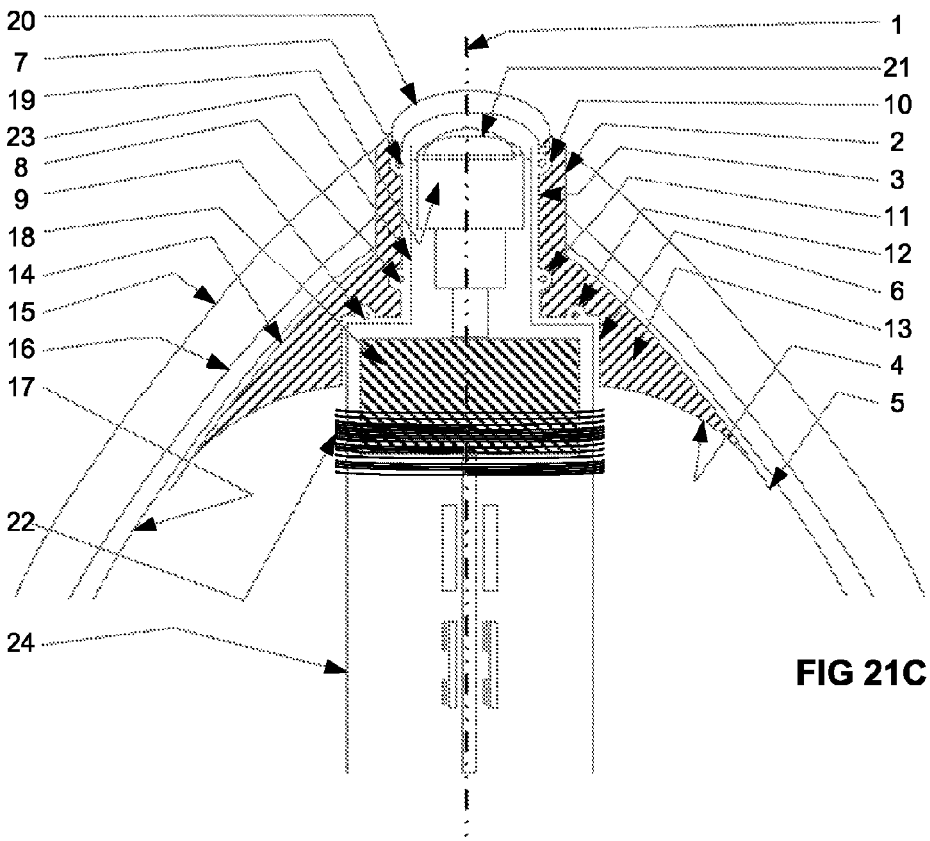
FIG. 21C shows a side view section of the Type II buffer plate and instrumentation package assembly.
Figure 21D:
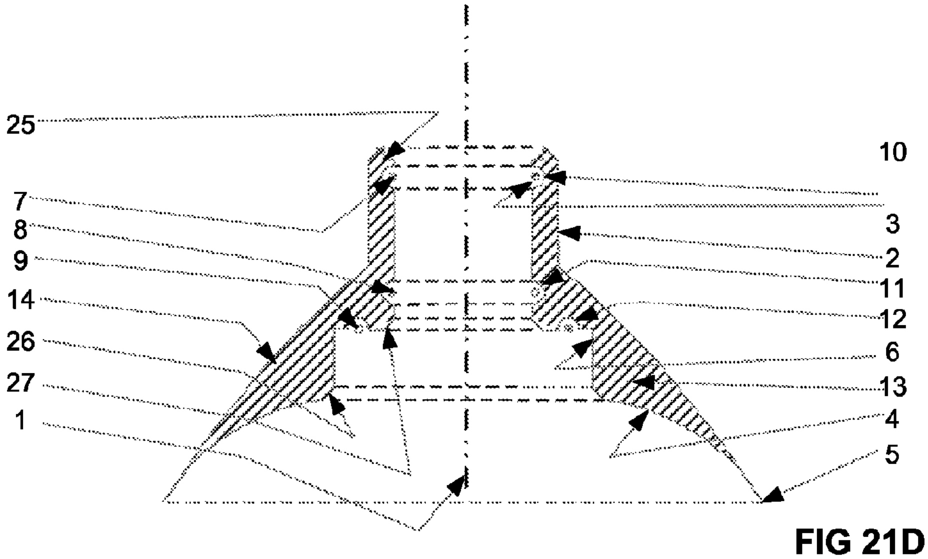
FIG. 21D shows a side view section of just the buffer plate alone.

The preferred embodiment of the buffer plate assemblies 16 and 17 is disclosed in FIG. 21C and FIG. 21D. 16 and 17 are identical.

Figure 21E:
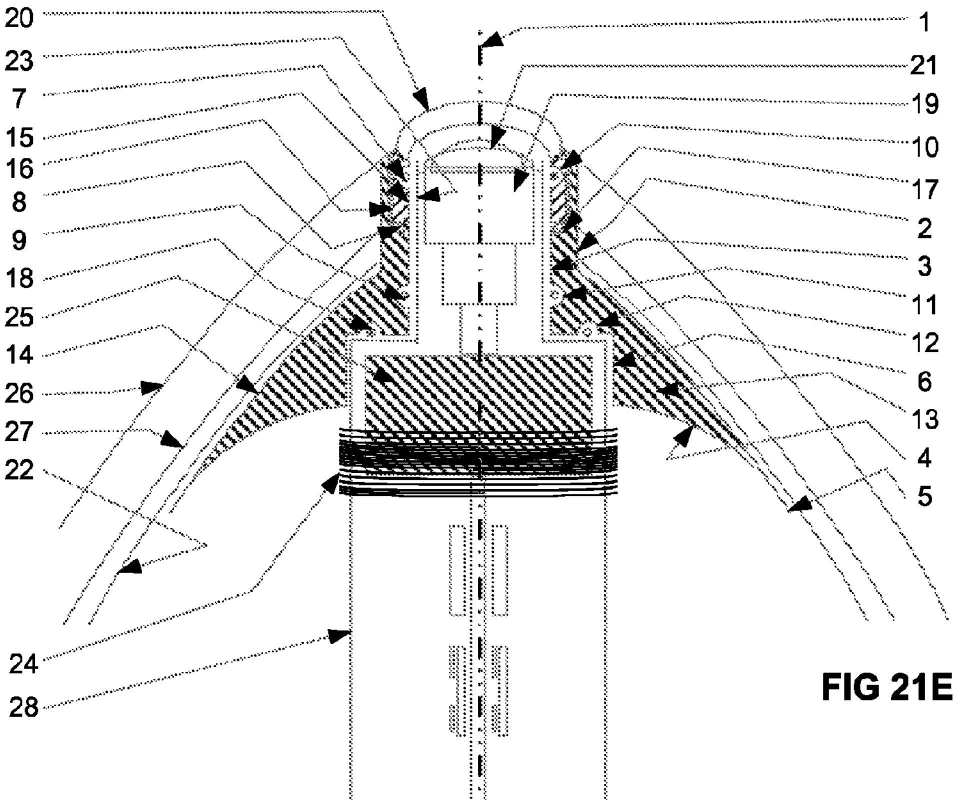
FIG. 21E shows a side view section of the Type III buffer plate and instrumentation package assembly.
Figure 21F:
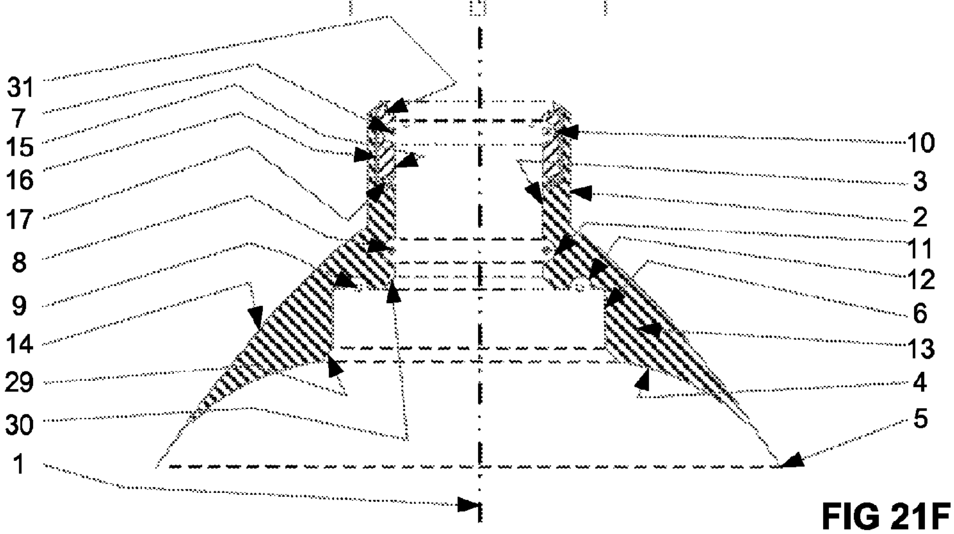
FIG. 21F shows a side view section of just the buffer plate alone.

Details of various other preferred embodiments of buffer plate assemblies, that may be used to substitute for the buffer plate assemblies above, are specified in FIG. 21E and FIG. 21F.

The preferred embodiment of the inflated bladder 33 is disclosed in FIG. 6A and FIG. 6B.

Details of various other preferred embodiments of inflated bladders that are used to substitute for the inflated bladder above, are specified in FIG. 7A and FIG. 7B, and. FIG. 8A and FIG. 8B.

In a preferred embodiment, the present invention contemplates the instrumented football to be instrumented with an instrumentation package assembly shown in FIG. 2A and FIG. 2B and FIG. 2C, that is mounted inside the instrumented football shown in FIG. 1A and FIG. 1B and FIG. 1C and FIG. 1D, which is capable of wirelessly televising football games from its cameras and microphones contained therein; and can conveniently be inserted into the football through the conventionally sized lacing gap in the seam at the top of the football.

In the preferred embodiment, the present invention contemplates that cameras 1 and/or 2 can capture images containing the horizon independent of the instrumented football's special orientation. This is achieved by cameras 1 and 2 by using lenses 39 and 45 that have extremely wide fields of view of approximately one hundred and eighty degrees. Unless the camera lens is blocked by a player or an obstacle, the extremely wide field of view enables the one or both cameras to see the stadium's horizon.

One of the advantages of the present invention over the prior art is that the present invention provides a more close at hand method of televising fast action packed sports events, like football, by doing it from within sports paraphernalia used by the players within the game itself; thereby conveying a level of excitement and detail of the game heretofore unrealized by the viewing audience. This invention enables TV cameras and microphones to be near to and amongst the players themselves during each play.

The invention visually and audibly extends and enhances the audience's pleasure and excitement of the game by acquiring pictures and sounds from all the special spatial vantage points that the instrumented football occupies and sees and feels on the football field. Such intimate pictures and sounds taken so close and immediate to the players have heretofore been unobtainable during a football game. For example, the microphones pick up and enable the audience to hear in real time the impacts and shocks when the football is thrown, hiked, caught, hit, fumbled, kicked, sacked or striking the goal post netting. The audience can also hear the rush of the air as the instrumented football spins on a pass through the air. From the vantage point of the football amongst the players on the field of play, the audience can hear and feel the sounds produced by contact to the football's cover created by player's handling, passing, receiving, clutching, fumbling, sacking, kicking and crushing the football. For example, the TV audience will hear a loud blast as the football is kicked for a field goal. The TV audience will hear a crunching sound when the football is crushed beneath the players. The TV audience will hear a bumping sound when the football is fumbled and is freely bouncing on the ground. The TV audience will hear the whooshing sound of the air as the football is thrown to a wide receiver.

The present invention contemplates an instrumented football having substantially the same weight, balance, appearance and playing qualities of a conventional professional league football, so as to be accepted by the leagues and qualify to substitute it for prior art conventional professional league footballs in the game. The prior art conventional professional league football is referred to in FIG. 22A and FIG. 22B.

In addition to live TV viewing audiences, the present invention contemplates enhancing the enjoyment of sports events, demonstration games, and player training sessions by audiences streaming on the internet, those viewing live general displays in stadiums, and those reviewing reproductions of all the intimate details of the game that were too numerous to broadcast in real time. Readers of newspapers and magazines can also benefit by high resolution still photos of critical plays that the system delivers.

The instrumentation package assembly 19 carries two CCD sensor arrayed cameras 20 and 21 and two microphones 24 and 25. The two cameras 20 and 21 share a common optical axis 7 and look out in opposite directions from one another from the instrumented football along its y-axis. Each of the two cameras 20 and 21 are aligned within the instrumentation package assembly 19 so that the cameras 20 and 21 each yield a wirelessly transmitted upright image to the remote base station when the instrumented football is oriented in space so its laces 4 are on top and pointing skyward. The instrumentation package assembly 19 wirelessly transmits signals from its gyroscope electronics to the remote base station that processes the signals keeps the final broadcast pictures from the cameras 20 and 21 always upright. Several preferred embodiments of instrumentation package assemblies are disclosed in FIGS. 2, 3, 4, and 5.

As an example of how the remote base station does its image processing, if the instrumented football is initially located at rest at the center of the football field at x-y-z coordinates P(0, 0, 0), with the instrumented football arranged on the field so that the optical axis of its cameras are aligned along the x-axis of the field, and if the two goal posts are located at coordinates GP(d, 0, 0) and GP(−d, 0, 0) at either end of the field, then the TV viewing audience will see the goal post GP(d, 0, 0) appear upright near the center of the HD letterbox picture frame screen format from the camera looking in the positive x direction, and see the goal post GP(−d, 0, 0) appear upright near the center of the HD letterbox picture frame screen format from the camera looking in the negative x direction.

If the instrumented football is now struck so it accelerates to velocity V along the positive x-axis of the field toward the goal post GP(d, 0, 0), and if the instrumented football has a clockwise spin (or roll) about its y-axis, then as the instrumented football travels closer to the goal post GP(d, 0, 0) and further from goal post GP(−d, 0, 0), the TV viewing audience will see goal post GP(d, 0, 0) be imaged upright near the center of the HD letterbox picture frame screen format from the camera looking in the positive x direction, and see the goal post GP(−d, 0, 0) appear upright near the center of the HD letterbox picture frame screen format from the camera looking in the negative x direction. The goal post GP(d, 0, 0) will appear to be growing larger and closer, and the goal post GP(−d, 0, 0) will appear to be growing smaller and further away. Even though the remote base station receives imagery from both cameras simultaneously, the cameraman in the remote base station selects which camera's imagery is to be televised to the TV viewing audience.

The pitch, roll and yaw gyroscope data from the instrumentation package assembly contains the encoded spin rate, spin sense, and the velocity direction of the cameras. The hardware and software in the remote base station processes the velocity data it receives from the instrumented football's onboard instrumentation package assembly and aligns the HD letterbox picture frame screen formats of the cameras so that they are stable relative to the direction of the goal posts GP(d, 0, 0) and GP(−d, 0, 0). The hardware and software in the remote base station processes the data it receives from the instrumented football's onboard instrumentation package assembly, and derotates the spinning imagery that the TV cameras see, and removes the spin from the imagery of the cameras to stabilize them and make them upright in the HD letterbox picture frame screen format that the TV viewing audience sees from each of the two cameras. If the cameraman wishes, he can display the views from both of the cameras to the TV audience simultaneously; in which case the goal post GP(d, 0, 0) will appear to be getting closer and the goal post GP(−d, 0, 0) will appear to be getting further away.

The instrumentation package assembly 19 is supported at its two ends by two identical buffer plates 16 and 17 which have been permanently attached, by bonding, to the inside surface of the instrumented football at each of its vertices. The small outside diameter of the cylindrical ends of the buffer plates 16 and 17 are made slightly conical. The slightly conical small diameter ends of each of the buffer plates 16 and 17 are press fitted into each of the ends of the instrumented football's vertices through co-axial holes 14 and 15 which are machined into the football's cover/liner sandwich. During the present invention's early manufacturing process of forming the basic outer leather cover panel shell of the football, the entire leather covering 2 (which is comprised of four leather panels, not shown) has been previously stitched and bonded together with its synthetic liner 13 to form a cover/liner sandwich. The cover 2 of the instrumented football is essentially made identical to that of the conventional prior art football shown in FIG. 22A and FIG. 22B except that it has two precision coaxial holes bored in its vertices 14 and 15. The holes are precision stitched to receive the cylindrical ends of buffer plates 16 and 17.

The cylindrical ends of the buffer plates 16 and 17 are made slightly conical so as to facilitate their smooth entry into the two axial holes in the football's cover/liner sandwich 3 at its vertices (tips/ends) 14 and 15, without interfering. The outside diameter of the leading tip of the conical cylinder is tapered slightly smaller than the diameter of the co-axial holes 14 and 15 in the cover/liner sandwich 3. The outside diameter of the back end of the conical cylinder is made slightly larger than that of the co-axial hole diameters in the cover/liner sandwich 3 so as to achieve a tapered press fit.

The conical cylindrical ends of the buffer plates 16 and 17 are sealed and bonded to the cover/liner sandwich 3 around the circumference of these co-axial holes at 14 and 15 with a permanent resilient bonding compound that is air-tight and water-tight. Inside the football, the buffer plates 16 and 17 are also sealed and bonded to the interior walls of the cover/liner sandwich 3 at its vertices 14 and 15. This sandwich, which forms the walls of the football, provides the buffer plates 16 and 17 which are bonded to it with stable and resilient places inside both vertices (tips/ends) 14 and 15 of the football with which to mount the instrumentation package assembly 19.

The two identical buffer plates 16 and 17 that are mounted and bonded inside the football to the cover/liner sandwich 3 at their respective vertices (tips/ends) at each end of the football 14 and 15, each have bores which are permanently aligned coaxially to one another and to the football's mechanical y-axis of symmetry 7. The opposite ends of the instrumentation package assembly 19 are inserted into these bores, thereby aligning the instrumentation package assembly 19 co-axially with the football's y-axis 7. The buffers plates 16 and 17 act as bearings for the instrumentation package assembly 19, and thereby restrict and restrain the motion of the instrumentation package assembly 19. Besides functioning as bearings to support the instrumentation package assembly 19 within the football, the buffer plates 16 and 17 provide hollow portals through which the cameras may peer out at the playing field from their vantage points inside the football's instrumentation package assembly. Several preferred embodiments for buffer plates 16 and 17 are disclosed in FIG. 21.

The buffer plates 16 and 17 are cast or machined from a light-weight resilient plastic material such as polycarbonates, ABS, fiber reinforced plastics and foams. They prop up the instrumented football's cover 2 to the same vesica piscis shape matching that of the conventional football when the bladder 33 is inflated with gas 10.

The two buffer plates 16 and 17 are mounted and permanently bonded to the inside of both vertices of the instrumented football. When the bladder 33 is inflated with gas 10, it presses against the interior curved surfaces of the buffer plates. The buffer plates 16 and 17 transmit this pressure to the interior walls of the football's cover and liner at its vertices. The buffer plates 16 and 17 support the cover and the liners at the football's vertices. The buffer plates 16 and 17 both have an identical vesica piscis shape. The buffer plates 16 and 17 are much stiffer than the cover/liner sandwich, thereby making the shape of the cover/liner's sandwich conform to the vesica piscis shape of the buffer plates 16 and 17.

Each buffer plate 16 and 17 has a cylindrical axial bore down its center. The bores are co-axial with the y-axis 7 of the instrumented football. Each buffer plate bore contains three o-rings. The o-rings are mounted into three circularly symmetric groves around the y-axis of each bore (see FIGS. 20 and 21). The o-rings seal the ends of the instrumentation package assembly 19 to the inside diameter of the buffer plate bores. These o-rings act as airtight and water-tight seals. The small diameter ends of the instrumentation package assembly 19 are made slightly conical, so that the ends of the instrumentation package assembly 19 will fit into the o-rings without being obstructed. Consequently there will be no resistance when the instrumentation package assembly 19 is inserted and finally seated into each of the buffer plate bores.

In summary, the buffer plates 16 and 17 are multi-purposed. They provide a pre-formed surface against which the cover 2 and liner 13 surfaces will conform. They absorb any shock to the ends of the football's cover. They protect the instrumentation package assembly 19 from becoming misaligned relative to the cover. They provide clear bore portals through which the cameras may peer out of the football through its vertices 14 and 15, and prevent the instrumentation package assembly 19 from popping out thru the vertices of the cover 2.

The instrumented football, like the prior art conventional professional league American football, has a conventional prolate spheroidal configuration more closely resembling a vesica piscis and comprises an inflated rubber bladder 33 enclosed in a leather cover 2 and a synthetic cover/liner sandwich 3 of predetermined thickness and weight. The cover 2 is normally formed of four leather panels (not shown) joined at longitudinal seams (not shown) along the top of the football. Each panel is attached to an interior lining 13. The lining 13 is synthetic and is sewn to each panel 2. The lining is composed of three layers of cross-laid fabric firmly cemented together. The lining prevents the panel 2 from stretching or growing out of shape during use. The four panels are stitched together. Two of the panels are perforated along adjoining edges at the top of the football so that they can be laced together. The edges with the lacing holes, however, are not stitched together thereby forming a seam with an open gap 5. One of these lacing panels receives an additional perforation and reinforcements in its center, to hold the air inflation valve 6. Generally, the ball is about eleven inches long and about twenty-two inches in circumference at the center. The leather panels are usually tanned to a natural brown color. The mechanical centerline 7 of the football is defined herein as being parallel to and coincident with the longitudinal axis of symmetry of the football defined herein as the football's y-axis 7. The geometrical center of symmetry (0, 0, 0) is the origin of the (x, y, z) coordinate system of the conventional football, and lies at the intersection of the x-axis 9 and z-axis 8 with the y-axis 7.

Because the laces 4 and gas valve stem 6 add asymmetrical weight to the football, the center of gravity, also known as the center of mass of the football, is located slightly above the center of the football 1 on its x-axis 9, being slightly closer to the gap 5, laces 4 and valve 6.

The rubber bladder 33 is inserted into the conventional football through the seam gap 5. Polyvinyl chloride or leather laces 4 are inserted through the perforations around the seam gap 5 to provide a grip for holding, hiking and passing the football. The football is laced and then inflated with gas 10 to a pressure of not less than 12.5 lb per square inch, but no more than 13.5 lb per square inch. The bladder 33 has a gas valve attached thereon whose valve stem 6 protrudes through a hole in the ball cover panel closest to the laces. The valve hole in the cover permits the entry of pressurized gas through the valve stem 6 to inflate the bladder 33. The inflated bladder 33 is disposed symmetrically within the ball cover and performs the function of propping up the ball cover 2 after inflation by pressing on the interior walls of the cover's liner 13. The inflatable bladder 33 has a predetermined shape.

The long axis of symmetry of the instrumented football is defined as its y-axis 7. The y-axis 7 is essentially the instrumented football's mechanical centerline from vertex to vertex (or tip to tip). The football's cover 2, liner 13, pre-formed bladder 33, buffer plates 16 and 17, and instrumentation package assembly 19 are all aligned coaxially with the y-axis 7 of the instrumented football. The laces 4 of the instrumented football are defined to be on the top of the instrumented football and are sewn parallel to the y-axis 7, and use the same lace hole stitch pattern as used in the conventional football shown in FIG. 22.

The x-axis 9 and the z-axes 8 of the instrumented football are both mutually perpendicular to the football's long y-axis 7. The instrumented football's vertices are at either end of the football along its y-axis 7. The origin 1 of the instrumented football's three axes coordinate system is defined to be at the geometrical center of symmetry of the instrumented football's cover 2. The cover 2 is bonded to the liner 13 to form a sandwich at their interface 3.

The origin 1 of the conventional professional league American football's three axes coordinate system shown in FIG. 22 is located at the geometrical center of symmetry of its cover also, and is at the same location inside its cover 2. This is anticipated because the cover's of both the instrumented football and the conventional football are identical, both having the same size and shape, and lace hole stitch pattern.

The gas valve 6 is located at forty-five degrees from the gap 5 in the cover 2 in the x-z plane.

The cover 2, liner 13, and bladder 33 are circularly symmetric around the y-axis 7. The inflated instrumented football's bladder 33 is disposed inside the football's cover 2 and liner 13 to prop up the instrumented football's cover 2 to the desired vesica piscis shape.

The inflated bladder 33 has an axial hollow cylindrical cavity 30 down its center that surrounds and forms around the instrumentation package assembly in a manner so as to press on it and cushion it, but not to obstruct its cameras 20 and 21 from seeing outside of the football. The inflated bladder 33 simultaneously nests, locates and supports the instrumentation package assembly and cushions it from shock. Several preferred embodiments for bladders are disclosed in FIGS. 6, 7, 8, and 9.

In each venue instance, the instrumented football's outward appearance is made to look substantially the same as the conventional professional league footballs, college league footballs, and high school league footballs. Consequently, the instrumented footballs are made to be interchangeable with and more easily integrated into these venues than ones that would look differently.

The instrumented football has substantially the same size, shape, grip, texture, and color as the conventional professional league American football shown in FIG. 22.

The instrumented football's basic structure i.e. cover 2, seams (not shown), seam gap 5, laces 4, lace stitch hole pattern (not shown), and gas valve 6 are constructed substantially in the same manner as the conventional professional league American football shown and specified in FIG. 22 unless otherwise specified elsewhere. The outward appearance of the instrumented football is accordingly the same vesica piscis shape and size as the conventional footballs. The curved surfaces on the buffer plates form the shape of the vertices of the instrumented football to match the vesica piscis shape of the conventional football vertices. The pre-formed bladder 33 of the instrumented football and the cover/liner forms the shape of the remainder of the instrumented football to match the vesica piscis shape of the conventional football. The gas valve 6 is the identical valve used in the conventional footballs. The gas valve 6 is located at the same place as with conventional footballs. The gas valve 6 is located at forty-five degrees from the gap 5 in the cover in the x-z plane defined by 8 and 9.

The instrumented football cover 2 is made substantially from the same leather material as used in conventional football covers. The four leather panels (not shown) that comprise the instrumented football's cover are identical to the conventional football's four leather panels. The four leather panels (not shown) that comprise the instrumented football's cover are joined at longitudinal seams (not shown) and stitched together in the same fashion as conventional football panels. Two of the cover's panels are perforated along adjoining edges in the same way as with conventional football's panels, so that they can be laced together in the same fashion as with the conventional football cover. The edges with the lacing holes are not stitched together thereby forming a seam with an open gap 5 which is closed when it is secured with laces 4 in the same fashion as with the conventional football, thereby giving it the same shape and grip as a conventional football.

One of these lacing panels receives an additional perforation hole and reinforcements in its center, to hold the gas inflation valve 6 thru which the instrumented football's bladder 33 is inflated with gas 10 to a pressure of between 12.5 and 13.5 pounds per square inch in the same fashion as with the conventional footballs per the official regulations. When the bladder 33 is inflated with gas 10, it props up the football's cover to a predetermined vesica piscis shape which is the same as the conventional football's shape.

In the preferred embodiment, the inflation pressure is kept very close to 12.5 pounds per square inch. The lower operating pressure is desirable to keep the weight of the gas 10 at a minimum.

The inflated bladder 33 exerts direct pressure on the interior surfaces of the liner 2, buffer plates 16, 17 and the instrumentation package assembly 19. The bladder 33 presses axially along the y-axis against the interior curved concave walls of the buffer plates 16, 17, thereby forcing them outward against the football's vertices (covers/liners) at opposite ends of the football. The exterior surfaces of the buffer plates 16 and 17 have the vesica piscis shape. Pressure exerted by the buffer plates 16, 17 on the cover/liner forces the football's cover to take on the vesica piscis shape of the conventional football.

The bladder 33 is distinguished from the conventional professional football bladders by the inclusion of an inner hollow cylindrical wall 31 which forms a symmetrically disposed cylindrical cavity space 30 extending down the full length of the long y-axis centerline 5 of the bladder. There is no gas in this space. The purpose of this space is to provide a nest for the instrumentation package assembly 19. The inflated bladder 33 will hug and hold the instrumentation package assembly 19 in this space.

The diameter of the inner cylindrical wall 31, of the bladder's cavity 30 before inflation, is made greater than the diameter of the skin of the instrumentation package assembly 19, thereby allowing the instrumentation package assembly 19 to be easily loaded into the bladder's cavity 30. The diameter of the inner cylindrical wall 31, of the bladder's cavity 30 after inflation with gas 10, wants to be smaller than the diameter of the skin of the instrumentation package assembly 19, thereby causing interference fit between the two when the bladder is inflated. The inner cylindrical cavity wall presses inwardly on the skin of the instrumentation package assembly 19 which is nested within the cavity, thereby restraining the instrumentation package assembly 19 from moving and keeping it aligned to the cover when the football suffers shock and vibration during play. Additionally, the bladder 33 acts essentially as a shock and vibration isolator. The bladder 33 acts to dampen and moderate the severe shock and vibration that would otherwise be encountered by the instrumentation package assembly 19 and its contents.

When inflated, the bladder, having a central inner cavity 30 extending down the long central y-axis 7 of the football, looks like a stretched and distorted torroid. The two cameras 20 and 21 peer out from each of the open ends of the cavity, through the axial bore in the buffer plates 16 and 17, and through the football's cover 2.

The following steps describe an example of the production assembly process for the instrumented football: The football cover/liner is held horizontally in a holding fixture with its cover/liner gap 5 facing up. The buffer plates 16 and 17 are inserted into the football through its cover/liner gap 5. The buffer plates 16 and 17 are arranged at both vertices 14 and 15 of the football and aligned together. The buffer plates 16 and 17 are bonded in place. The football is stretched in the holding fixture to increase the distance between he buffer plates 16 and 17. The bladder is inserted into the football cover/liner through the cover/liner gap 5. The bladder needs to be compressed toward one of the football's vertices in order to make room for the instrumentation package assembly. The instrumentation package assembly is inserted through the cover/liner gap 5 and inserted into the bladder's hollow central cavity 30. The bladder is decompressed and arranged so its ends line up with both of the interior surfaces of the buffer plates 16 and 17. The bladder is arranged so its gas valve lines up with the accommodating hole in the cover/liner. The bladder is very lightly inflated with gas. Each end of the instrumentation package assembly is loaded into its respective buffer plate assembly bore. The instrumentation package assembly is rotated about the y-axis 7 of the football in order to align its cameras with the gap. The football's holding fixture is relaxed. The gas valve is set. The football is laced up. The bladder is then fully inflated with gas. The instrumented football is then removed from the holding fixture.

As the bladder is filled with gas, the hollow cavity 30 closes up around and sandwiches the instrumentation package assembly inside the hollow cavity 30 thereby further restraining movement of the instrumentation package assembly.

The football is stretched in the fixture to increase the distance between the buffer plates. The bladder 33 needs to be compressed toward one of the football's vertices in order to make room for the instrumentation package assembly. The instrumentation package assembly is inserted through the cover/liner gap and inserted into the bladder's 33 hollow central cavity 8. The bladder is decompressed and arranged so its ends line up with both of the interior surfaces of the buffer plates. The bladder 33 is arranged so its gas valve lines up with the accommodating hole in the cover/liner. The bladder 33 is very lightly inflated with gas. Each end of the instrumentation package assembly is loaded into its respective buffer plate assembly bore. The instrumentation package assembly is rotated about the y-axis 5 of the bladder in order to align its cameras with the gap. The football's holding fixture is relaxed. The gas valve is set. The football is laced up. The bladder 33 is then fully inflated with gas 10.

The instrumentation package assembly's corrugated bellows 18 acts as a spring in compression, and it too causes the shoulders of the instrumentation package assembly to press against the buffer plates along the y-axis 7, thereby forcing them outward against the opposite vertices 14 and 15 of the football's cover/liner at either end of the football.

The two cameras 20 and 21 and two microphones 24 and 25 within the instrumented football are protected from the hazards on the playing field such as ice, snow, rain, dirt and physical impacts by the optical windows 11 and 12. The instrumented football has two small inconspicuous optical windows 11 and 12 disposed at both vertices 14 and 15 of the instrumented football. The optical windows 11 and 12 are each mounted and sealed to each of the small diameter cylindrical ends of the buffer plates 14 and 15 respectively at either end of the instrumented football. The seals 22 and 23 are airtight and waterproof to protect the cameras, microphones and electronics within the instrumentation package assembly.

The optical windows 11 and 12 permit the two cameras 20 and 21 mounted inside the instrumented football to simultaneously look out through their respective optical windows 11 and 12 onto the playing field from both ends of the instrumented football while the instrumented football is in play during a game, and be protected from hazards such as ice, snow, rain, dirt and physical impacts. The optical windows 11 and 12 are small circular single elements.

When the instrumented football is passed from one player to another, the forward camera can see where the instrumented football is going, and the rear camera can see where the instrumented football has been. From the vantage point of the forward camera, the viewing audience can see the strained receiver groping for the instrumented football with his outstretched hands as he expects to be slammed after his catch by his opponent who is close at hand. The audience can see the quarter back's quivering hand as the ball leaves his possession, and see the failed attempt of the opposition to sack him as the instrumented football recedes. As the instrumented football is delivered from place to place on the playing field amidst a storm of activity, the duel camera arrangement gives the viewing audience unending contemporaneous front and rear shots that get across a sense of the action that prior art cameras looking on from outside the field cannot get across. These views are unique and have not been possible in the prior art.

The optical windows 11 and 12 are made strong to protect the cameras and microphones. The optical windows 11 and 12 are hard coated by vapor deposition with materials such as MgFl or SiO2 to help prevent the outer-most window 11 and 12 surfaces from being scratched during the game. The window 11 and 12 material itself is chosen to be strong. It is made from hard optical glass such as barium lanthanum borate glasses, or hard optical plastic like acrylic or polycarbonate, both of which are scratch resistant. The plastic material is preferred because it will not splinter when impacted and is therefore safe. High quality pre-stressed optical glass is also safe and will not splinter but is far more costly.

The optical windows 11 and 12 are made small to make them inconspicuous, and substantially preserve the instrumented football's look-alike quality and playability with the conventional football, while still retaining sufficient clear aperture for the camera lenses to see events on the playing field in prevailing light. Typical optical windows 11 and 12 range in size from about 2 mm to 8 mm in diameter and pierce the space once occupied by the blunt ends of the conventional football. Besides their small size, the optical windows 11 and 12 are made additionally inconspicuous by very lightly tinting them brown to match the tan coloration of the conventional football cover. In the event that an optical window 11 and 12 breaks or gets damaged, it can be easily replaced by unscrewing it from the vertex of the instrumented football. FIGS. 21E, 21F, 21G, 21H, 21I, 21J, 21II, 21JJ, 21L, 21M, 21LL and 21MM show the threaded sleeves in the buffer plate's that enable the optical windows 11 and 12 to be easily replaced.

The optical windows 11 and 12 are shell-like spherically domed shaped and disposed one at either end of each of the buffer plates. The shell-like spherically domed shape gives extra strength to the windows like the shape of an egg's shell gives to an egg. The outer surfaces of the windows are spherical in shape and convex outward and shell-like as is necessary to permit the cameras to see fields of view with extremely wide viewing angles approaching 90 degrees off the y-axis of the instrumented football without vignetting. Shell-like implies that the spherical surfaces of the optical windows are thin and concentric. In applications where extremely wide viewing angles are not required, the optical window surfaces can be made flat and plane parallel. The flat and plane parallel optical windows 11 and 12 are easier to manufacture and less costly to produce.

The two windows 12 and 11 share the same optical axis with camera lenses 26 and 27, which is the y-axis of the instrumented football. The windows 11 and 12 face convex outwardly from the instrumented football. Their inner and outer surfaces of the windows 11 and 12 are concentric and spherical in shape, and form shell-like miniature domes that afford wide angle fields of view for the cameras when the cameras are used with wide angle camera lenses. The shell-like domed shaped optical windows 11 and 12 enable the cameras to use lenses that have extremely wide viewing angles approaching 90 degrees off the y-axis without introducing bothersome optical aberrations and vignetting. The shell-like domed shape of the windows 11 and 12 also imparts increased physical strength to the windows.

The functions of the camera lenses 26 and 27 such as focus adjustment settings and iris adjustment settings are controlled wirelessly by the cameraman from the remote base station by sending command and control signals from the remote base station to the instrumented football. The cameraman can also send command and control signals from the remote base station to the instrumented football to put these settings on automatic under the control of the camera electronics. The optical and electronic zoom functions of the camera lenses 26 and 27 are operated by the cameraman by sending command and control signals from the remote base station to the instrumented football. The cameraman can select from a wide variety of HD camera lenses. Wide angle lenses and ultra wide angle lenses are used in many venues to give the TV viewing audience the feeling of being there on the playing field amongst the players. In some venues the cameraman may choose to use camera lenses with more magnification and narrower fields of view to better cover certain plays. In some venues the cameraman may choose camera lenses with small f-numbers to deal with poorer lighting conditions. In many venues the cameraman will choose the camera lenses 26 and 27 to be identical to one another. In many venues the cameraman will choose to use identical settings in both lenses 26 and 27 so that the TV viewing audience will see the same from either end of the instrumented football.

The instrumented football is made to have substantially the same handling qualities as the conventional professional league American football. An example of a conventional professional league American football is shown in FIG. 22. Instrumented football's whose handling qualities are substantially the same as the conventional professional league footballs, college league footballs, and high school league footballs are more easily integrated into these game venues than ones with different handling qualities.

The instrumented football's balance and dynamic behavior are made as close to the conventional professional league football as possible. In order to achieve this objective, the instrumented football must have substantially the same size, shape, grip, mass, balance, and dynamic behavior as a conventional professional league American football. The balance of the instrumented football is primarily a function of the instrumented football's mass, and center of mass location relative to its three major axes.

The dynamic behavior of the instrumented football is primarily a function of the football's mass, center of mass location, and moment of inertia around the football's three major axes. The instrumented football shown in FIG. 1 has substantially the same outward appearance of size, shape and grip as the conventional football.

The combined moment of inertia of the cover 2, stitching (not shown), laces 4, and the gas valve 6 of the instrumented football shown in FIG. 1 is designed to be made identical to the combined moment of inertia of the cover 2, stitching (not shown), laces 4 and gas valve 6 of the conventional football shown in FIG. 22. This is accomplished by employing the same materials, dimensions and construction methods for the cover, stitching, laces and gas valve in the instrumented football as used in the conventional football.

For the instrumented football, from general physics principles, the combined moment of inertia of the bladder 13, gas 10, buffer plates 16, 17 and the instrumentation package assembly 19 is equal to the sum of the separate moments of inertia of the bladder, gas, buffer plates and the instrumentation package assembly about each of its three major axes.

For the instrumented football, the combined weight of its bladder, gas, buffer plates and instrumentation package assembly is designed to be made equal to the combined weight of the bladder, liner and gas of the conventional football. Equalization is obtained primarily by using lower weight parts and lighter materials in the instrumented football.

As in the case of the conventional football, the weight of the instrumented football's bladder is symmetrically disposed about the instrumented football's major axes in order to achieve balance.

Various unique bladders are disclosed in FIG. 6A and FIG. 6B, FIG. 6AA and FIG. 6BB, FIG. 7A and FIG. 7B, FIG. 7AA and FIG. 7BB, and FIG. 8A and FIG. 8B.

The instrumented football is designed such that the weight of its bladder and liner, weight of its two buffer plates and the weight of its instrumentation package assembly are all symmetrically disposed about the instrumented football's major axes in order to achieve balance around its x, y an z axes 9, 7 and 8. The component parts in the instrumentation package assembly itself are all manufactured from light materials to minimize the weight of the entire package. The parts are spatially distributed within the instrumentation package assembly to achieve balance and control the package's moments of inertia around the instrumented football's three major axes 9, 7 and 8. Given all the foregoing design measures mentioned above, the instrumented football achieves the invention's objective to have its balance, dynamic behavior, and handling equal to the conventional professional league football shown in FIG. 22.

The center of gravity of the instrumented football is made to be at exactly the same location as the center of gravity of the conventional football. The coordinate location of the center of gravity of both the instrumented football and the conventional football is at (x, 0, 0) which is slightly above 1 along the x-axis 9. The x coordinate of the center of gravity has a small positive value. The location of the center of gravity is slightly above the center of the football on its x-axis 9 because the laces on the top of both types of footballs add asymmetrical mass to the top of both of the footballs. Packaging all the electronic capabilities required to fulfill the objectives of the present invention into the confined space within the instrumented football is a major challenge. The electronics components needed to carry out all the electronic functions of the instrumentation package assembly defined above, are packaged into the confined space of the instrumentation package assembly inside the instrumented football and their weight, center of gravity and moment of inertia make the instrumented football be identical to the conventional regulation professional league, college league and high school league footballs to insure that the playability and handling qualities of the instrumented footballs qualify them as substitutes.

The instrumentation package assembly 19 and the two buffer plate assemblies 16 and 17 add weight to the instrumented football. In order to make the weight of the instrumented football equal to the weight of the conventional prior art football, it is necessary to minimize the weight of the instrumentation package assembly 19 and the two buffer plates 16 and 17 without compromising their functions. It is also necessary to reduce the weight of the remaining components of the instrumented football. In order to make the weight of the instrumented football be equal to the weight of the conventional prior art football, the combined weight reductions to these components should be made equal to the combined weight increases due to the instrumentation package assembly 19 and the two buffer plate assemblies 16 and 17.

Besides the instrumentation package assembly and the two buffer plate assemblies, there are a limited number of other parts that comprise the instrumented football; whether it is a professional, college, or high school league type football. They include: cover 2, liner 13, cement, thread, laces 4, gas valve 6, gas 10, and the bladder 33.

In a further preferred embodiment, the conventional prior art liner 13 material used in prior art conventional footballs is replaced with a lighter stronger material like Exxcore™ dynamically vulcanized alloy (DVA) liner material. This Exxcore™ dynamically vulcanized alloy (DVA) liner material is lighter than the prior art liner material and thereby serves to lighten the weight of the instrumented football from what it would be if the prior art liner material were used.

The gas used to inflate prior art conventional footballs is air at a pressure of 12.5 to 13.5 pounds per square inch. In a further preferred embodiment, the air gas used in prior art conventional footballs is replaced with a lighter gas like helium at a pressure of 12.5 to 13.5 pounds per square inch. The helium gas is lighter than the prior art gas and thereby serves to lighten the weight of the instrumented football from what it would be if the prior art gas (air) were used.

The inflated bladder 33 of the instrumented football is made to inflate and prop up the instrumented football's cover 2 to a predetermined shape which is the same shape as the conventional football's cover 2 shown in FIG. 22. The bladder 33 used in the instrumented football is specified in the preferred embodiment shown in FIG. 6A and FIG. 6B. The predetermined shape of the inflated bladder 33 of the instrumented football is the vesica piscis which is the same shape as the conventional football's cover 2 shown in FIG. 22.

The bladder used in a conventional professional league football is made essentially from natural rubber. In a further preferred embodiment, the conventional prior art rubber material is replaced with a lighter stronger material like Exxcore™ dynamically vulcanized alloy (DVA) material. This Exxcore™ dynamically vulcanized alloy (DVA) material is lighter than the prior art bladder material and thereby serves to lighten the weight of the instrumented football from what it would be if the prior art bladder material were used.

The inflated bladder 33 of the instrumented football is made to inflate and prop up the instrumented football's cover 2 to a predetermined shape which is the same shape as the conventional football's cover 2 shown in FIG. 22. The inflated bladder 33 of the instrumented football has substantially lower weight than the prior art bladder used in conventional footballs.

The gas 10 used to inflate the instrumented football bladder 33 is helium at a pressure of 12.5 to 13.5 pounds per square inch which is the same pressure as for the conventional footballs filled with air. The bladder used in a conventional professional league football is made essentially from natural rubber. The bladder used in the instrumented football accomplishes the same functions as the bladder used in conventional footballs but with substantially lower weight.

The instrumented football is constructed to produce substantially no audible noise, from its mechanics and electronics in its interior, that can be heard by the players and be a cause for distraction. The only noise producing element in the instrumented football's instrumentation package assembly is the camera lens. Changes in the optical power (zoom), optical focus, and f-number settings of the camera lens are accomplished mechanically. The mechanism used to adjust these settings produces sounds that are inaudible to the players who are outside the football because of sound absorption, muffling, baffling and damping features designed into the instrumented football such as its unique bladder, bellows and buffer plate assemblies.

The weight range of conventional training footballs varies significantly compared to the conventional footballs used in league football games. Therefore the weight of an instrumented training ball may deviate to a greater extent from the conventional training ball and still be acceptable when utilized within the normal training venues.

The lines of sight of the camera 20 and 21 are looking straight outward along the y-axis of the instrumented football from the vertices of the instrumented football along their respective coaxial optical axes. Their lines of sight are all parallel to one another. The SD/HD letter box picture formats of cameras 20 and 21 are aligned together. Video information from the two cameras is transmitted simultaneously from the instrumented football to the remote base station where it is processed. The SD/HD letter box picture formats of cameras 20 and 21 are aligned together in the remote base station's processing software. The data stream containing the video is transmitted wirelessly from the instrumented football to the remote base station. The data from the pitch, roll and yaw gyros is processed by the remote base station software to yield the spin(roll) rate, spin sense and direction of forward motion of the instrumented football.

The spin rate, spin sense and direction of forward motion of the instrumented football is then used by the processor to remove the spin from the imagery through derotation processing which stabilizes the imagery in the SD/HD letterbox picture format and holds it upright for broadcast to viewing by the TV audience.

The televised images viewed by the TV audience are maintained upright in the HD letterbox picture frame despite the motions of the instrumented football, by transmitting pitch, yaw and roll data from the gyroscopes along with the televised image data from the instrumented football's instrumentation package assembly 19 to the remote base station which processes the imagery and gyroscope data in its processor's hardware and software and derotates the imagery and holds it upright. Pitch, yaw and roll gyroscopes and encoders are part of the supporting electronics in the instrumentation package assembly 19.

In another preferred embodiment, the circular HD CCD TV camera sensor chips disclosed in drawings FIG. 63A and FIG. 63B and FIG. 63C are used in the two cameras 20 and 21 rather than ordinary prior art CCD sensor chips. These circular HD CCD TV camera sensor chips have an advantage over ordinary HD CCD sensor chips because they permit transmission of the entire circular sensor array of pixels to the remote base station for processing, even though the instrumented football is spinning (rolling), pitching and yawing. The pixel elements of ordinary prior art CCD sensor chips cover only the area of the letterbox shape, thereby causing a loss of field of view when the instrumented football spins with the letterbox shaped sensors inside it. Use of the circular HD CCD TV camera sensor chips eliminates this problem of field of view loss when the instrumented football spins. Using the processor software in the remote base station, the SD/HD letterbox picture frame format is made to spin in sync with the spin of the instrumented football in the processor to derotate and stabilize the imagery and lock it in its upright position relative to the direction of forward motion of the instrumented football without loss of any of the field of view. For example, as the instrumented football spins in the air about its y-axis 7, the optical images formed on the two circular HD CCD TV camera sensor chips by the camera lenses 26 and 27, fully fill the circular sensor's surfaces. As the instrumented football spins in the air, so does the optical images on the circular sensor's surfaces of both chips. The circular sensors are large enough to cover and track the full SD/HD letterbox picture frame format of the images whatever their rotation angle may be in spin. The gyroscopes detect the y-axis 7 spin of the instrumentation package assembly 19 with the spinning instrumented football and encodes the spin data as well as the pitch and yaw data. The spin(roll) data along with pitch and yaw data, and televised image data from the circular camera sensors are transmitted to the remote base station wirelessly from the RF antennas 34 and 35 to the remote base station via the antenna array relay junction. The remote base station processes the encoded spin data with the televised image data and delivers a spin stable upright HD letterbox picture to the TV viewing audience from both cameras. The cameraman in the remote base station selects which camera's views to broadcast to the TV viewers. The cameraman may elect to broadcast both views side by side in the same letterbox frame so the audience can see where the football has been and where it is going. If the cameraman wishes, he can zoom out away from where the football has been, and zoom in toward where the football is going. If the cameraman wishes, he can zoom in toward where the football has been, and zoom out away from where the football is going.

When an optical window of one of the cameras is obscured by dirt; the remaining camera can continue to produce imagery of the game for the TV viewers. The two holes for the optical windows in the vertices of the instrumented football are made just large enough to prevent vignetting of the cameras fields of view.

In an alternate preferred embodiment, in certain venues where similar camera lenses are not required or deemed useful, the two identical lenses, for example 26 and 27, may be replaced with two dissimilar lenses having different focal lengths and fields of view. Under these same circumstances, the cameraman may elect to set dissimilar focal lengths into the zoom lenses facing outward from both vertices of the instrumented football. One lens, 26 for example, may be set to a long focal length for close-up facial expressions of the players, where the other lens 27 may be set to a short focal length for wider shots of the players moving into position to sack the quarterback.

It should be noted at this point, that in general the two cameras can be electronically commanded and controlled by the cameraman to change from one setting to an alternative setting.

Each of the microphones 24 and 25 listens for sounds from their respective sides of the instrumented football. The condenser microphones enable the viewing audience to hear real-time contacts, impacts and shocks to the instrumented football. Microphones 24 and 25 enable the TV audience to hear sounds that result from air or any physical contacts or vibrations to the instrumented football; like for example, the crash of a player landing on the instrumented football.

Simultaneously live TV pictures are taken by the TV cameras of their respective field of views of the live action on the playing field. Cameras 20 and 21 will enable the TV audience to see close-ups from the instrumented football's perspective as players maneuver to intercept it as it whizzes bye them on a pass. This will be an action packed event never before witnessed by a TV audience. Each of the plays will produce breath taking excitement and expectations by the TV viewing audience. In summary, the instrumented football provides video and sound to the viewing audience that is so exciting and realistic that it makes the individual members of the audience feel that they are in the game on the field amongst the players. In many ways because of the unusual detail this is more exciting than viewing the game in person from the stands of the football stadium.

As an example of how the remote base station does its image processing, if the instrumented football is initially located at rest at the center of the field at x-y-z coordinates P(0, 0, 0), with the instrumented football arranged on the field so that cameras 20 and 21 are aligned along x-axis of the field, and the two goal posts are located at coordinates GP(d, 0, 0) and GP(−d, 0, 0) at either end of the field, with camera 20 facing GP(d, 0, 0) and camera 21 facing GP(−d, 0, 0), then the TV viewing audience will see goal post GP(d,0 0) appear upright near the bottom central edge of the HD letterbox picture frame screen format of camera 20, and will see goal post GP(−d, 0, 0) appear upright near the bottom central edge of the HD letterbox picture frame screen format of camera 21.

If for example, the instrumented football is now struck so it accelerates to velocity V along the x-axis of the field with its forward motion in the positive x-axis direction toward the goal post GP(d, 0, 0), and if the instrumented football has a clockwise spin (or roll) about its y-axis 7, then as the instrumented football travels closer to the goal post GP(d, 0, 0), the TV viewing audience will see the goal post GP(d, 0, 0) be imaged upright above the bottom central edge of the HD letterbox picture frame screen format and see it appear to be growing larger and closer to the center of the letterbox picture frame. The pitch, roll and yaw gyroscope data from the instrumentation package assembly is simultaneously transmitted to the base station via the antenna array relay junction where the spin rate, spin sense, and the direction of forward motion of each of the cameras is calculated by the processing software. The software in the remote base station processes the data it receives from the instrumented football onboard instrumentation package assembly and aligns the HD letterbox picture frame screen formats of the cameras so that they are stable relative to the direction of the goal post GP(d, 0, 0). The software in the remote base station processes the data it receives from the instrumented football's onboard instrumentation package assembly, and derotates the spinning imagery that the TV cameras see, and removes the spin from the imagery of the cameras to stabilize it and make it upright in the HD letterbox picture frame screen format that the TV viewing audience sees. The remote base station receives imagery from both cameras simultaneously. The remote base station software automatically processes the incoming data stream from both cameras and the cameraman selects which camera's imagery to broadcast to the TV viewing audience.

The cameraman, in the remote base station, software selects the wireless mode of communication between the instrumented football and the remote base station. The cameraman uses the equipment (antenna array relay junction) that is installed in the football stadium with which to command and control his choice and communicate it to the instrumented football on the football stadium playing field. Refer to FIG. 62A, and FIG. 62B, and FIG. 62C, and FIG. 62D, and FIG. 62E, and FIG. 64A and FIG. 64C for disclosures regarding the remote base station and the antenna array relay junction.

The cameraman, selects items from a software menu of control commands that go to the network transceiver at the remote base station that are subsequently transmitted to the instrumented football for the purpose of adjusting various system initializations, operating parameters, radio frequency, polling system status data such as battery condition, and initiating remote mechanical adjustments such as camera focus, optical zoom, iris and movement to the cameras' field of view, etc over the selected bi-directional communications link i.e. wireless radio connectivity being used within the particular sports stadium.

These commands, when intercepted by the network transceiver within the instrumented football are applied to its microprocessor, which then in turn upon executing the instructions stored within the contents of its firmware applies a pulse coded control signal via the power and control interconnect interface inside the instrumentation package to the corresponding electronics i.e. the mechanical actuators that provides optical focus and/or zoom adjustment of the cameras and microphone gain and selection, etc as desired by the cameraman and/or special software running on the computer at the remote base station. The power and control interconnect interface is shown in electronic circuitry drawing FIG. 23, and is represented by dotted lines, and consists of the electrical control wiring to and from the electronic components of the instrumented football that are being controlled.

Referring to the Preferred Embodiments Specified in FIG. 1A and FIG. 1B and FIG. 1C and FIG. 1D, the Instrumented Football Satisfies all of the Following Further Objectives:

It is an objective of the present invention to provide an instrumented football which includes a cover, liner, liner/cover interface, laces, cover gap, gas valve, gas, bladder, two optical windows, two buffer plates bores in the cover/liner sandwich, and instrumentation package assembly. It is an objective of the present invention to provide an instrumentation package assembly. which includes a corrugated bellows section, a smooth cylindrical section, two CCD sensor array cameras (or equivalent), air-tight and water-tight seals, two condenser microphones, two camera lenses, two induction coils, battery pack, two antenna elements, gyroscopic encoders, and supporting electronics.

It is an objective of the present invention to stabilize the imagery obtained from the instrumented football in an upright condition in the picture frame, regardless of the pitch, roll or yaw of the football, as viewed by a live TV audience in the HD CCD letterbox picture format. It is an objective of the present invention to stabilize the imagery obtained from the instrumented football in an upright condition in the picture frame, regardless of the pitch, roll or yaw of the football, as viewed by a live TV audience in the HD CCD letterbox picture format by using gyroscopic encoders. It is an objective of the present invention to stabilize the imagery obtained from the instrumented football in an upright condition in the picture frame, regardless of the pitch, roll or yaw of the football, as viewed by a live TV audience in the HD CCD letterbox picture format by image recognition processing. It is an objective of the present invention to stabilize the imagery obtained from the instrumented football in an upright condition in the picture frame, regardless of the pitch, roll or yaw of the football, as viewed by a live TV audience in the HD CCD letterbox picture format by using gyroscopic encoders and image recognition processing. It is an objective of the present invention to stabilize the imagery obtained from the instrumented football in an upright condition in the picture frame, regardless of the pitch, roll or yaw of the football, as viewed by a live TV audience in the HD CCD letterbox picture format by using image recognition processing of the archived data base derived from the tripod mounted set-up camera system. It is an objective of the present invention to stabilize the imagery obtained from the instrumented football in an upright condition in the picture frame, regardless of the pitch, roll or yaw of the football, as viewed by a live TV audience in the HD CCD letterbox picture format by using image recognition processing of the archived data base derived from the tripod mounted set-up camera system in the remote base station.

It is an objective of the present invention to provide views of the game not seen before during broadcasts by real time TV audiences. It is an objective of the present invention to provide views of the game from the instrumented football. It is an objective of the present invention to provide views of the football playing field from the air, as seen from both vertices of the instrumented football, as the instrumented football is passed, as a player is running to catch and receive the instrumented football, when the instrumented football is fumbled, after the instrumented football is goal kicked or punted, when a field goal occurs as the instrumented football flies between the goal posts. It is an objective of the present invention to provide views of the football playing field from the clutches of a standing player's grip, as seen from both vertices of the instrumented football; as the instrumented football is being hiked to the quarterback; as the quarterback pauses to throw the instrumented football, or as a player stands motionless beyond the goal line after making a touchdown. It is an objective of the present invention to provide views of the instrumented football playing field from the clutches of a running player's grip, as seen from both vertices of the instrumented football; poised to catch the instrumented football, running for the goal line, being pursued by other players, being tackled, or making a touchdown. It is an objective of the present invention to provide views of the football playing field from ground level, as seen from both vertices of the instrumented football; as the instrumented football is rolling free on the ground after being fumbled, as a player griping the instrumented football is heaped upon, as the instrumented football is held and waiting to be punted, as the instrumented football is held and waiting to be kicked for a field goal, or as a player touches the football to the ground beyond the goal line after a touchdown.

It is an objective of the present invention to provide sounds of the game not heard before during broadcasts by real time TV audiences. It is an objective of the present invention to provide sounds of the game from the instrumented football. It is an objective of the present invention to provide sounds heard by the football from in the air, sounds heard from both vertices of the instrumented football, sounds heard as the instrumented football is passed, sounds heard as a player is running to catch and receive the instrumented football, sounds heard when the instrumented football is fumbled, sounds heard after the instrumented football is goal kicked or punted, sounds heard when a field goal occurs as the instrumented football flies between the goal posts. It is an objective of the present invention to provide sounds heard from the football playing field, sounds heard from the clutches of a standing player's grip, sounds heard from both vertices of the instrumented football; sounds heard as the instrumented football is being hiked to the quarterback; sounds heard as the quarterback pauses to throw the instrumented football, or sounds heard as a player stands motionless beyond the goal line after making a touchdown. It is an objective of the present invention to provide sounds heard from the instrumented football from the clutches of a running player's grip, sounds heard as a player is poised to catch the instrumented football, sounds heard as a player is running for the goal line, sounds heard as a player is being pursued by other players, sounds heard as a player is being tackled, sounds heard as a player is making a touchdown. It is an objective of the present invention to provide sounds heard of the football playing field from ground level, as heard from both vertices of the instrumented football; as the instrumented football is rolling free on the ground after being fumbled, as a player who is griping the instrumented football is heaped upon, as the instrumented football is held and waiting to be punted, as the instrumented football is held and waiting to be kicked for a field goal, or as a player touches the football to the ground beyond the goal line after making a touchdown.

It is an objective of the present invention to enable coaches who are on the sidelines during training sessions to hear the spoken dialog of their team's players from on the football playing field. It is an objective of the present invention to enable coaches who are on the sidelines during training sessions to view details of the team's players during training sessions on the football playing field. It is an objective of the present invention to enable referees who are on and off the field during games to review details of the game from the two cameras onboard the instrumented football by instant replay. It is an objective of the present invention to equip the instrumentation package assembly to capture video and sounds on the playing field from both of its vertices of the instrumented football. The instrumentation package assembly has two TV cameras, two microphones, two wireless antenna elements, battery pack and supporting electronics housed inside its enclosure. It is an objective of the present invention to enable the instrumentation package assembly with means to wirelessly televise the captured video and sounds to a remote base station via an antenna array relay junction stationed off the playing field but within (and around) the space of the instrumented sports stadium. The antenna array relay junction is equipped to relay the video and sounds to the remote base station. The remote base station is located within the instrumented sports stadium or its vicinity. It is an objective of the present invention that the instrumented football is under the command and control of a cameraman in the remote base station. It is an objective of the present invention to enable the instrumentation package assembly to be mounted inside the instrumented football in a manner permitting its two cameras and two microphones to see and hear out from both ends of the instrumented football. It is an objective of the present invention to enable the instrumentation package assembly to be mounted inside the instrumented football in a manner permitting the instrumentation package assembly to be protected from damage during the game. It is an objective of the present invention to enable the instrumentation package assembly to be mounted inside the instrumented football in a manner permitting it to maintain its mechanical and optical alignment during the game. It is an objective of the present invention to provide a permanent position and nesting place for the instrumentation package assembly inside the instrumented football. It is an objective of the present invention to be able to lace the football with the conventional laces and lacing stitch hole pattern. It is an objective of the present invention to provide an inflatable bladder means to permit easy assembly and alignment of the instrumentation package assembly in the instrumented football. It is an objective of the present invention to provide an inflatable bladder means to permit the instrumentation package assembly to be nested, cradled and isolated from shock and vibration in the instrumented football. It is an objective of the present invention to provide an instrumentation package assembly that can flex and is sized so that it can be easily loaded and assembled into the football through the conventional seam gap in the cover panels of regulation footballs used by professional leagues, college leagues and high school leagues. It is an objective of the present invention to provide an instrumentation package assembly that can flex and is sized so that it can be easily removed and disassembled from the football through the conventional seam gap in the cover panels of regulation footballs used by professional leagues, college leagues and high school leagues. It is an objective of the present invention to provide an instrumentation package assembly that carries its own rechargeable battery pack. It is an objective of the present invention to provide an instrumentation package assembly that carries its own rechargeable battery pack that carries sufficient energy to power the cameras, lenses, antennas and electronics for the duration of the football game. It is an objective of the present invention to provide an instrumentation package assembly that carries its own battery pack that is recharged wirelessly by induction. It is an objective of the present invention to provide instrumentation package assembly electronics that require little power to operate and are lightweight. It is an objective of the present invention to provide an instrumentation package assembly that can withstand axial and tangential compression and decompression loads exerted on it during play. It is an objective of the present invention to provide an instrumented football whose total weight, center of gravity and moments of inertia are identical to regulation conventional footballs. It is an objective of the present invention to lighten the instrumented football by inflating its bladder with a lighter gas than that used in prior art conventional regulation footballs. It is an objective of the present invention to lighten the instrumented football by using a lighter weight bladder than that used in prior art conventional regulation footballs. It is an objective of the present invention to lighten the instrumented football by using a lighter weight bladder liner than is used in prior art conventional regulation footballs. It is an objective of the present invention to provide an instrumented football whose playing qualities, handling qualities and bladder are identical to those in prior art conventional regulation footballs. It is an objective of the present invention that the instrumentation package assembly be designed to withstand dirt and weather conditions. It is an objective of the present invention that the instrumented football's bladder provides cushioning to protect the instrumentation package assembly from shock and vibration damage. It is an objective of the present invention that the instrumented football's bladder is easily loaded and assembled into the football through the conventional seam gap in the cover panels of regulation footballs used by professional leagues, college leagues and high school leagues. It is an objective of the present invention to provide the instrumented football with a bladder that has provisions for holding the instrumentation package assembly and for cushioning and isolating the instrumentation package assembly from shocks received by the football during the game. It is an objective of the present invention to provide the instrumented football with a bladder that is of lighter weight compared to the bladder used in conventional footballs. It is an objective of the present invention that the optical windows are made small to be unobtrusive to the game without vignetting the field of view of the cameras under the prevailing lighting conditions. It is an objective of the present invention that the optical windows withstand heavy blows received during the game and protect the instrumentation package assembly. It is an objective of the present invention that the optical windows be easily removed and replaced.

FIG. 2A and FIG. 2B and FIG. 2C

The detailed physical elements disclosed in the instrumentation package assembly drawings shown in FIG. 2A and FIG. 2B and FIG. 2C are identified as follows: 1 and 2 are miniature SD/HD TV cameras. 3 and 4 are signal compression modules. 5 and 6 are condenser microphones. 7 and 8 are operational amplifiers. 9 and 10 are audio encoders. 11 is a network transceiver for wirelessly transmitting and receiving radio signals. 12 is an MPEG stream encoder. 13 and 14 are intentional radiators or antenna elements. 15 is a system control microprocessor. 16 is a ROM, 17 is a RAM. 18, 19 is the instrumentation package assembly, and 20 are real-time pitch, roll and yaw gyroscope encoders. 21 is a power switching circuit. 22 is a power supply. 23 is a rechargeable battery pack which powers all the electronics in the instrumentation package assembly. 24 and 25 are tuning capacitors. 26 is a stand by data separator circuit. 27 and 28 are inductive pickup coils used to wirelessly charge by inductive coupling electricity from a charging station external to the football to the battery pack within the instrumentation package assembly. 29 and 30 are circuit boards used to mount the electronic components within the instrumentation package assembly. 31 and 32 are circular circuit boards used to mount the antenna elements and electronics components. 33 is the corrugated bellows section of the skin. 34 is the cylindrical skin section. 35 and 41 are the small diameter slightly conical ends of the instrumentation package assembly. 37 and 43 are shoulders on the ends of the instrumentation package assembly. 36 and 42 are the large diameter ends of the instrumentation package assembly. 38 and 44 are air and water tight seals between the camera lenses and the small diameter slightly conical ends of the instrumentation package assembly. 39 and 45 are the camera lenses. 40 and 46 are the front lens elements of camera lenses 39 and 45 respectively. 47 is the mechanical y-axis of the instrumentation package assembly and the optical axis of the cameras and their lenses. 48 is the x-axis. 49 is the z-axis.

FIG. 2A shows a side view section of the instrumentation package assembly.

FIG. 2B shows a top view section of the instrumentation package assembly.

FIG. 2C shows a bottom view section of the instrumentation package assembly.

Referring to drawings FIG. 2A and FIG. 2B and FIG. 2C, in a preferred embodiment, an instrumentation package assembly 19 provided in accordance with the invention, comprises two cameras 1 and 2, two camera lenses 39 and 45, two microphones 5 and 6, two antenna elements 13 and 14, battery pack 23, induction coils 27 and 28, supporting electronics (numerous), and an enclosure is disclosed. The enclosure of the instrumentation package assembly is essentially circularly symmetric about its y-axis.

The instrumentation package assembly 19 is an autonomous module for wirelessly televising pictures and sounds from the cameras 1 and 2 and microphones 5 and 6 from within its enclosure. It is under the command and control of the remote base station disclosed in FIG. 62A and FIG. 62B and FIG. 62C and FIG. 62D and FIG. 62E and FIG. 64A and FIG. 64C. Its enclosure is made up of several sections 33, 34, 35, 36, 37 38, 41, 42, 43, and 44. The picture and sounds are taken directly by the instrumentation package assembly's cameras 1 and 2 and microphones 5 and 6. The instrumentation package assembly is designed as a sealed unit to be mounted within the instrumented football that will be in play on the football field.

The instrumentation package assembly wirelessly communicates the pictures and sounds from within the instrumented football which is on the football playing field, to an antenna array located off the playing field, which then relays the pictures and sounds to a remote base station for final processing and dissemination. Refer to FIG. 62A and FIG. 62B and FIG. 62C and FIG. 62D and FIG. 62E and FIG. 64A and FIG. 64C for the specification of the antenna array and the remote base station.

FIG. 23 is a block diagram that explains the detailed circuitry, flow of electrical signals and data in the general operation of the instrumentation package assembly electronics used for televising pictures and sounds, controlling the electrical and mechanical functions within the instrumentation package assembly, and charging the battery pack 23. FIG. 24 is a block diagram showing the signals and data flows in the power supply and battery charging circuits inside the instrumentation package assembly.

From the vantage point of the football amongst the players on the field of play, using the instrumentation package assembly microphones 5 and 6, the audience can hear and feel the sounds produced by contact to the football's cover created by player's handling, passing, receiving, clutching, fumbling, sacking, kicking and crushing the football. For example, the TV audience will hear a loud blast as the football is kicked for a field goal. The TV audience will hear a crunching sound when the football is crushed beneath the players. The TV audience will hear a bumping sound when the football is fumbled and is freely bouncing on the ground. The TV audience will hear the whooshing sound of the air as the football is thrown to a wide receiver.

The optical axis 47 of the cameras within the instrumentation package assembly are aligned to be coaxial with the instrumentation package assembly's mechanical y-axis. The cameras are positioned at either end of the instrumentation package assembly and look out through the football's vertices through the portals in the buffer plate assemblies. The mechanical y-axis 7 of the instrumentation package assembly is aligned coaxially with the mechanical x-axis of the football after mounting the instrumentation package assembly inside the football. The instrumentation package assembly is mounted inside the football using a pair of buffer plates that act as bearings for the instrumentation package assembly. There is one buffer plate supporting each end of the instrumentation package assembly. The buffer plates are shown supporting the instrumentation package assembly in FIG. 1. Six different buffer plate embodiments are shown in FIG. 21A and FIG. 21B, FIG. 21C and FIG. 21D, FIG. 21E and FIG. 21F, FIG. 21G and FIG. 21H, FIG. 21I and FIG. 21J, FIG. 21L and FIG. 21M.

The instrumentation package assembly contains two miniature SD/HD TV cameras land 2 and two condenser microphones 5 and 6 and supporting electronics. The cameras, microphones and supporting electronics are housed together within the skin 34 of the instrumentation package assembly which is mounted inside the instrumented football. Each one of the two TV cameras and microphones are located at their respective ends of the football. The TV cameras are aligned within the instrumentation package assembly so they share a common optical axis, each one looking out in opposite directions from the instrumentation package assembly through the portals in the cover's vertices. The portals in the cover's vertices are precision holes bored in each of the cover's vertices. The circumferences of the holes are precisely stitched to form precision holes.

The condenser microphones are attached to the top interior wall of the instrumentation package assembly's skin 34. The microphones hear any sounds produced by physical contact of the football's cover with any external thing, including for example air currents felt on the cover during the football's flight in the air when being passed.

The instrumentation package assembly's skin 34 is made of polycarbonates, ABS and fiber reinforced plastics which are strong and also are non-conductors of electricity. It is necessary to use a skin made of a non-conducting material so as to allow radio signals to radiate thru the enclosure from the antenna elements within the skin, for the purpose of televising signals by wireless communications to and from the remote base station.

The instrumentation package assembly's network transceiver 11 wirelessly transmits real-time pictures and sounds from the football's cameras and microphones via duel parallel antenna array elements 13 and 14, also known as intentional radiators, to a remote base station. The duel parallel antenna array elements are axially mounted between the two circular circuit boards 29 and 30.

As an alternative example, the duel parallel antenna array 13 and 14 could be replaced with a helix antenna (not shown) with similar dimensions wound on the inside diameter of the instrumentation package assembly down the length of its skin 34 between the two circular circuit boards 29 and 30. The diameter of the circular circuit boards is such as to provide a slip fit with the inside diameter of the skin.

The antenna array shown in FIG. 62A and FIG. 62B and FIG. 62C and FIG. 62D and FIG. 62E and FIG. 64A and FIG. 64C is deployed in the stadium and receives radio signals from the football's antenna array elements 13 and 14. Antenna array elements 13 and 14 are in quadrature to radiate radio signals to the antenna array relay junction with sufficient gain so as to overcome RF noise and provide for a large enough gain bandwidth product to accommodate real-time SD/HD picture quality requirements. The instrumentation package assembly's network transceiver 11 also provides a wireless means for the football to receive command and control radio signals from the remote base station.

Figure 31:
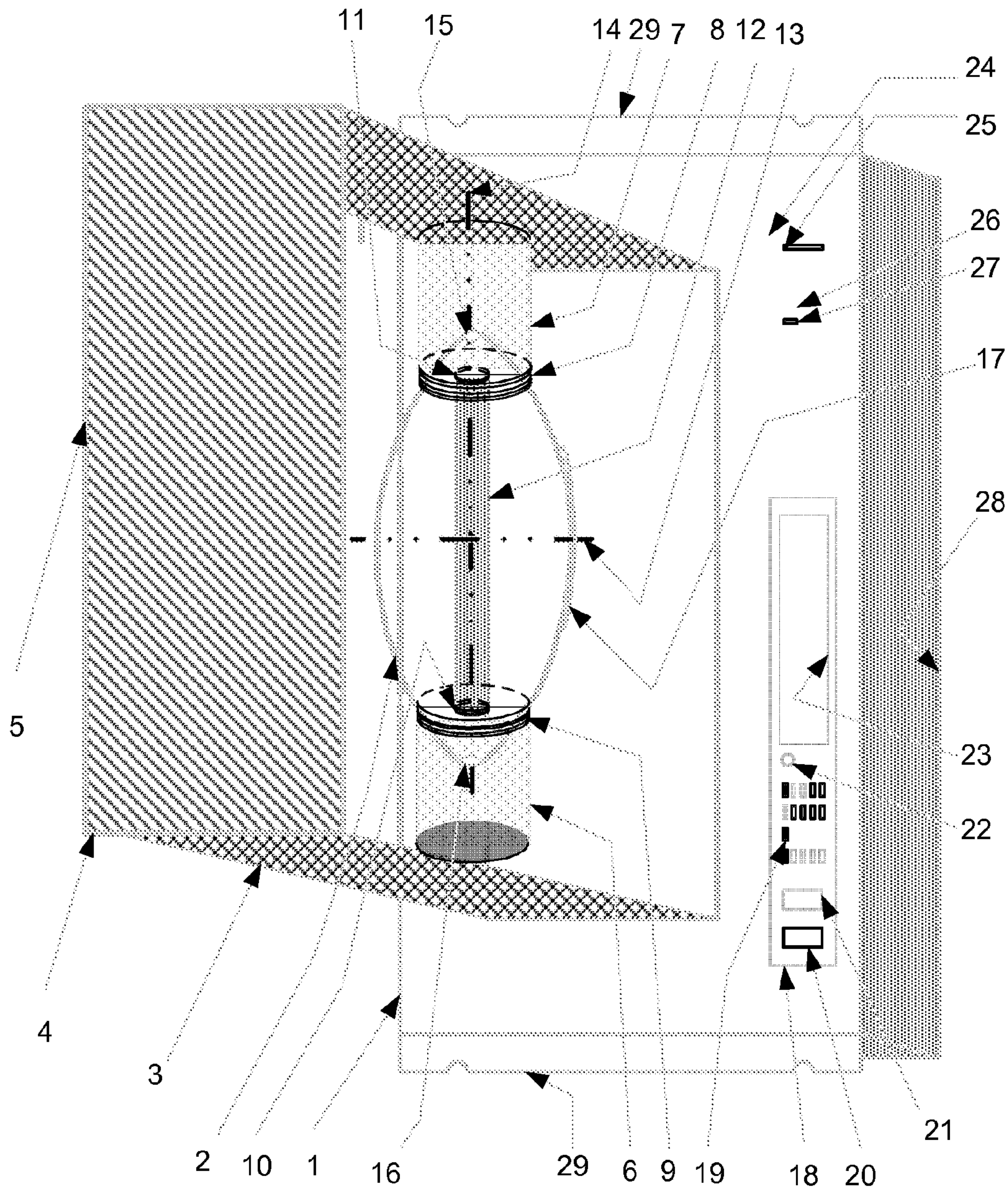
FIG. 31 is an isometric view showing the instrumented football being charged inside the charging station unit.

The instrumentation package assembly's battery pack 23 is wirelessly charged before and during games on an as needed basis, in the charging station disclosed in the preferred embodiment in FIG. 31. Charging of the battery pack 23 is accomplished wirelessly by inductive coupling. The instrumented football's inductive pickup coils 27 and 28 act as the secondary windings on an air core transformer. Time varying magnetic flux is furnished to 27 and 28 by the primary windings of the charging station with a frequency of about 250 kHz.

Each TV camera looks out in opposite directions from its respective end of the instrumentation package assembly.

Consequently the instrumentation package assembly enables each TV camera to look out in opposite directions from its respective end of the instrumented football along the football's long axis of symmetry. Each of the two microphones listens for sounds from the playing field from their respective ends of the football. The two condenser microphones enable the viewing audience to hear real-time contacts, impacts and shocks to the football. Simultaneously live TV pictures are taken by each of the two TV cameras of their respective fields of view of the live action on the playing field. The condenser microphones have good quality, small size, and small weight; and they consume low power. As newer better microphone technologies become available, they will be used in other preferred embodiments of the current invention.

The images of the horizon provide horizontal reference data used by the image recognition and processing software in the remote base station to yield pictures that appear stabilized and upright to the viewing audience regardless of the instrumented football's spatial attitudes and dynamic motions on the field. The images of the horizon are accomplished using camera lenses with extremely wide fields of view; for example, fish-eye zoom lenses. The image data of the horizon, acquired with lenses having extremely wide viewing angles, is used in the image processing software as a horizontal frame of reference to yield finally broadcast TV pictures that appear stabilized and upright to the TV viewing audience. In addition, frames of reference used for yielding stabilized and upright real time pictures are also obtained from the real-time pitch, roll and yaw gyroscope encoders 18, 19, and 20.

The horizon is herein defined as the visual departure line between the sky and the ground in the images. The horizon may also be the departure line between the sky and structures on the ground, as is the case where the playing field is inside a football stadium. Horizon data from these images supplements the pitch, roll and yaw data from the three gyroscopes in the instrumentation package assembly. Together this data is used to assist the processing hardware and software in the base station to stabilize and make upright the pictures received from the two cameras, regardless of the dynamic motion and spatial orientation of the football. As the football is made to execute habitual twisting, turning and spinning routines by the players, the audience still finally sees processed real-time stable upright pictures of the players and the playing field. Although an occasional bounce, jump, bump or tilt of the pictures is tolerable, if the pictures were not largely stable and upright, the viewing audience would quickly grow weary and dizzy.

The diameter of the instrumentation package assembly is kept to a minimum in order to minimize its moment of inertia about the three axes. The dimension of the outside diameter of the corrugated skin 33 of the instrumentation package assembly is governed largely by the physical diagonal dimension of the largest components within the instrumentation package assembly, like the camera's CCD sensor array and the battery.

The battery's charging coils 27 and 28 are wound on the outside diameter at both ends of the instrumentation package assembly's skin and act electrically as a transformer's secondary winding. The coils are wound on the outside diameter of the instrumentation package assembly to keep any heat they may produce away from the contents of the instrumentation package assembly while the battery is being charged. The number of turns in each charging coil is made large enough to inductively couple a sufficient number of magnetic lines of flux from the primary coil of the battery charging station disclosed in FIG. 31 so as to charge the battery in a reasonably short time before and during games. When the football is placed in the battery charging station disclosed in FIG. 31, the charging coils 27 and 28 receive electrical energy inductively coupled from the primary coils of the charging station.

The instrumentation package assembly has a flexible corrugated bellows skin section 33 and two cylindrically smooth sections like 34. The length of the instrumentation package assembly is approximately the length of the inflated football measured along its y-axis (i.e. about 11 inches).

The corrugated section 33 of the instrumentation package assembly's skin allows the instrumentation package assembly to be folded to facilitate inserting the instrumentation package assembly through the gap 5 in the seam in the football's cover shown in FIG. 1. Additionally, the corrugated section 33 allows the instrumentation package assembly to act as a spring and compress or expand or twist its length without damaging the contents of the instrumentation package assembly. When circumstances arise where the players tend to crush the football, the instrumentation package assembly will compress or expand or twist.

The instrumentation package assembly is filled with a dry pressurized gas like nitrogen to prevent the entry of moisture or dirt. The seal between the optical windows and the enclosure prevents the dry gas from leaking out of the enclosure. A desiccant is disposed near the TV lenses and optical windows to collect and prevent any moisture build-up.

A variety of different camera lens types, with different lens setting capability, are used providing they are small in size and weight. The auto iris setting permits the camera lens to automatically adjust for varying lighting conditions on the field. The auto focus setting permits the camera lens to adjust focus for varying distances of the players and action subjects on the field. The zoom setting permits the camera lens to adjust focal lengths and image size/magnification. These functions/settings are controlled by the cameraman in the remote base station by wirelessly transmitting command and control signals from the remote base station to the instrumentation package assembly inside the instrumented football. The auto focus and auto iris are frequently run in the automatic mode under control of each of the TV camera's electronics.

When the football has been thrown and is in flight on its trajectory from the quarterback to his intended receiver, the distance of the football from the quarterback is increasing, whereas the distance of the football to the intended receive is decreasing. Each camera can be independently and simultaneously commanded and controlled to auto focus on their respective subjects. The rearward camera is looking backward in the direction to where the football has been, and can retain its focus on the quarterback, while the forward camera is looking forward in the direction of its travel, and retains its focus on the receiver.

The functions of the camera lenses 39 and 45 such as focus adjustment settings and iris adjustment settings are controlled wirelessly by the cameraman from the remote base station by sending command and control signals from the remote base station to the instrumented football. The cameraman can also send command and control signals from the remote base station to the instrumented football to put these settings on automatic under the control of the camera electronics. The optical and electronic zoom functions of the camera lenses 39 and 45 are operated by the cameraman by sending command and control signals from the remote base station to the instrumented football. The cameraman can select from a wide variety of HD camera lenses. Wide angle lenses and ultra wide angle lenses are used in many venues to give the TV viewing audience the feeling of being there on the playing field amongst the players. In some venues the cameraman may choose to use camera lenses with more magnification and narrower fields of view to better cover certain plays. In some venues the cameraman may choose camera lenses with small f-numbers to deal with poorer lighting conditions. In many venues the cameraman will choose the camera lenses 39 and 45 to be identical to one another. In many venues the cameraman will choose to use identical settings in both lenses 39 and 45 so that the TV viewing audience will see the same from either end of the instrumented football.

Referring to the Preferred Embodiments Specified in FIG. 2A and FIG. 2B and FIG. 2C, the Instrumentation Package Assembly Satisfies all of the Following Further Objectives:

It is an objective of the present invention to symmetrically package the components of the instrumentation package assembly around the x-axis, y-axis and z-axis of the instrumentation package assembly in order to balance the weight around each axis. It is an objective of the present invention to symmetrically package the components of the instrumentation package assembly around the x-axis, y-axis and z-axis of the instrumentation package assembly in order to minimize the moments of inertia around each axis. It is an objective of the present invention for the instrumentation package assembly to provide a means for wirelessly televising the video and audio of football games from inside an instrumented football that is in play on the football playing field. It is an objective of the present invention for the instrumentation package assembly to provide a means for televising the video of football games from TV cameras that look out onto the playing field from both ends of the instrumented football. It is an objective of the present invention for the instrumented football to furnish portals through its cover through which the two cameras packaged within the instrumentation package assembly can see out onto the playing field from inside the instrumented football. It is an objective of the present invention for the instrumentation package assembly to include two TV cameras, two microphones, bi-directional wireless communications electronics, RF antennas, gyroscope encoders, magnetic induction coils, battery charging electronics, power supply electronics, support electronics and a battery pack. It is an objective of the present invention for the instrumentation package assembly to include two microphones to hear sounds generated by contacts with the instrumented football's cover and are wirelessly transmitted to, and processed by, the remote base station to produce HD stereophonic surround sound of the events on the playing field to the TV audience. It is an objective of the present invention for the instrumentation package assembly to include a rechargeable battery pack which can be wirelessly charged by magnetic induction. It is an objective of the present invention for the instrumentation package assembly to wirelessly televise pictures and sounds of the game to a remote base station located within the vicinity of the football stadium, via an RF antenna array relay junction located in the football stadium outside the boundaries of the playing field. It is an objective of the present invention for the instrumentation package assembly to wirelessly transmit the gyroscope encoder data from the instrumented football to the remote base station for processing. It is an objective of the present invention for the instrumentation package assembly to be commanded and controlled wirelessly by the remote base station by means of a bi-directional data communications link using an RF antenna array relay junction located in the football stadium between the instrumented football and the remote base station. It is an objective of the present invention for the instrumentation package assembly to use a variety of camera lenses including ones having extremely wide viewing angles of the football field. It is an objective of the present invention for the instrumentation package assembly to use camera lenses having settings for zoom, focus and iris. It is an objective of the present invention for the instrumentation package assembly to use camera lenses having settings for auto zoom, auto focus and auto iris. It is an objective of the present invention for the instrumentation package assembly to use camera lenses having settings for zoom, focus and iris which are controlled wirelessly from the remote base station by the cameraman and/or automatically by software in the remote base station. It is an objective of the present invention for the instrumentation package assembly to be sized properly so it can be inserted into the instrumented football through the identically conventionally sized lacing gap in the seam of the cover of a conventional regulation football. It is an objective of the present invention for the instrumentation package assembly to be sized properly so it can be withdrawn from the football through the identically conventionally sized lacing gap in the seam of the cover of a conventional regulation football. It is an objective of the present invention for the instrumentation package assembly to be cradled and isolated from shock and vibration by the instrumented football's bladder. It is an objective of the present invention for the instrumentation package assembly to be shielded from damage by the optical windows which are part of the buffer plate assemblies. It is an objective of the present invention to make the instrumentation package assembly flexible so it can be bent and inserted into the instrumented football through the conventional identical lacing hole pattern slot in the cover/liner sandwich of a conventional regulation football. It is an objective of the present invention to make the instrumentation package assembly flexible so it can be bent and inserted into the football through the identical conventional lacing hole pattern slot in the cover of a conventional regulation football. It is an objective of the present invention to make the instrumentation package assembly press axially along the y-axis on the buffer plate assemblies so the instrumentation package assembly will maintain its alignment between the buffer plate assemblies under conditions of shock and vibration. It is an objective of the present invention for the instrumentation package assembly to take compressive, twisting and stretching impacts and loads. It is an objective of the present invention to prop up the cover of the instrumented football to take the identical vesica piscis shape as the covers of conventional regulation footballs. It is an objective of the present invention for the instrumented football to use the identical cover used by conventional regulation footballs. It is an objective of the present invention for the instrumented football to be laced using the identical laces used by conventional regulation footballs. It is an objective of the present invention for the instrumented football's bladder to be inflated with gas to the identical pressure used by conventional regulation footballs. It is an objective of the present invention to process the pictures captured by the two cameras from inside the instrumented football, and make them appear stabilized and upright to the viewing audience regardless of the instrumented football's spatial attitudes and dynamic motions. It is an objective of the present invention for the instrumentation package assembly to be shock resistant and ruggedized to endure the rigors of the game. It is an objective of the present invention for the instrumentation package assembly to include two miniature SD/HD TV cameras, signal compression modules, two condenser microphones, two operational amplifiers, two audio encoders, a network transceiver, a MPEG stream encoder, two antenna elements, a system control microprocessor, a ROM, a RAM, real-time pitch, roll and yaw gyroscope encoders, a power switching circuit, a power supply, a rechargeable battery pack, two tuning capacitors, a stand by data separator circuit, two inductive pickup coils, circuit boards, corrugated bellows section, cylindrical skin section, small diameter slightly conical ends, machined shoulders on the ends, large diameter ends, air and water tight seals, and two camera lenses.

Figure 3A:
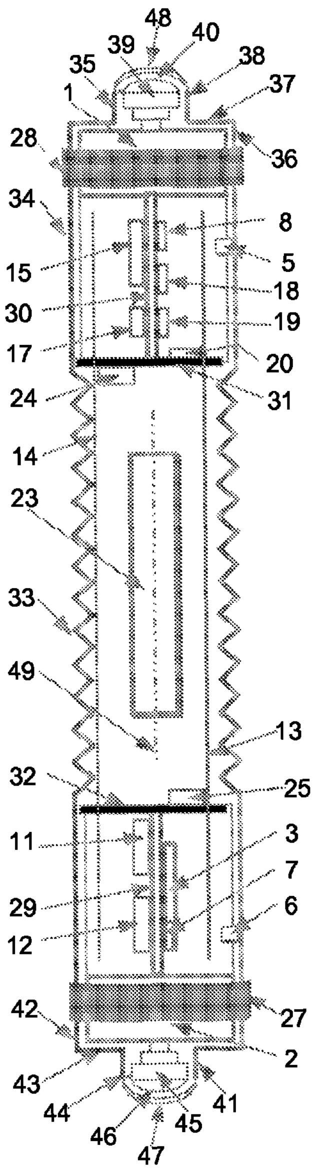
FIG. 3A shows a front side view section of the instrumented football's instrumentation package assembly.
Figure 3B:
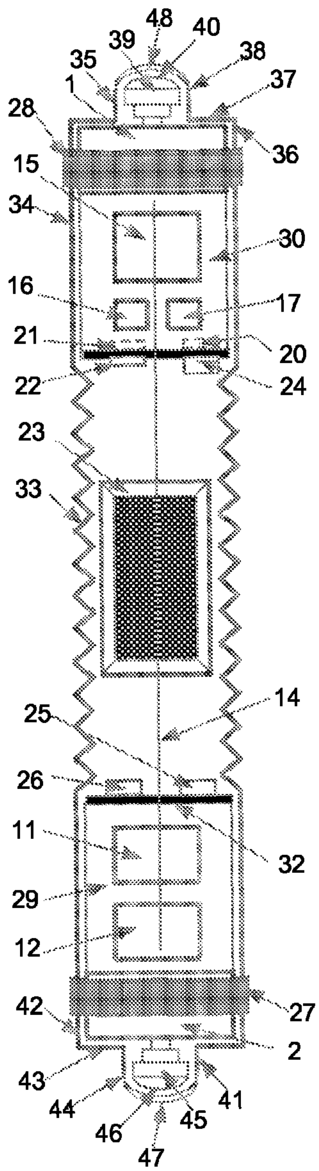
FIG. 3B shows a top view section of the instrumented football's instrumentation package assembly.
Figure 3C:
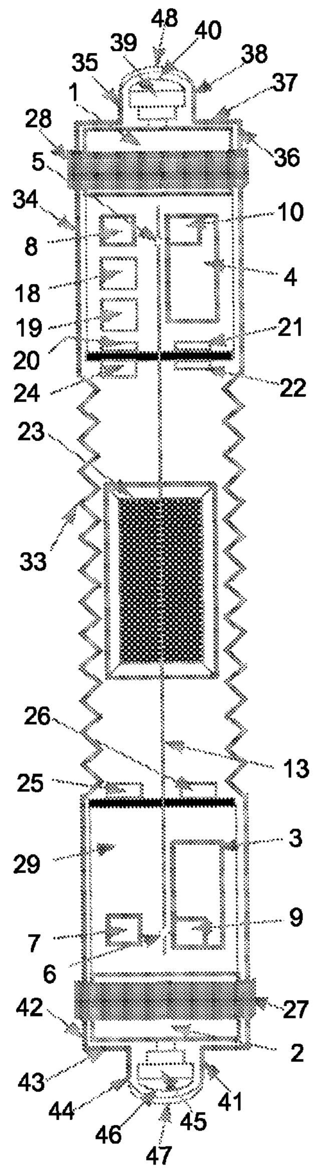
FIG. 3C shows a bottom view section of the instrumented football's instrumentation package assembly.

FIG. 3A and FIG. 3B and FIG. 3C

The detailed physical elements disclosed in the instrumentation package assembly drawings shown in FIG. 3A and FIG. 3B and FIG. 3C are identified as follows: 1 and 2 are miniature SD/HD TV cameras. 3 and 4 are signal compression modules. 5 and 6 are condenser microphones. 7 and 8 are operational amplifiers. 9 and 10 are audio encoders. 11 is a network transceiver for wirelessly transmitting and receiving radio signals. 12 is an MPEG stream encoder. 13 and 14 are two intentional radiators or antenna elements. 15 is a system control microprocessor. 16 is a ROM, 17 is a RAM. 18, 19, and 20 are real-time pitch, roll and yaw gyroscope encoders. 21 is a power switching circuit. 22 is a power supply. 23 is a battery pack. 24 and 25 are tuning capacitors. 26 is a stand by data separator circuit. 27 and 28 are inductive pickup coils, 29 and 30 are circuit boards. 31 and 32 are circular circuit boards. 33 is the corrugated bellows section of the skin. 34 is the cylindrical skin section. 35 and 41 are the small diameter slightly conical ends of the instrumentation package assembly. 37 and 43 are shoulders on the ends of the instrumentation package assembly. 36 and 42 are the large diameter ends of the instrumentation package assembly. 38 and 44 are air and water tight seals between the optical windows 48 and 47 respectively and the small diameter slightly conical ends of the instrumentation package assembly. 39 and 45 are the camera lenses. 40 and 46 are the front lens elements of camera lenses 39 and 45 respectively. 49 is the mechanical y-axis of the instrumentation package assembly and the optical axis of the cameras and their lenses.

FIG. 3A shows a front side view section of the instrumentation package assembly.

FIG. 3B shows a top view section of the instrumentation package assembly.

FIG. 3C shows a bottom view section of the instrumentation package assembly.

Referring to drawings FIG. 3A and FIG. 3B and FIG. 3C, in a preferred embodiment, an instrumentation package assembly provided in accordance with the invention, comprises two optical windows 47 and 48, two cameras 1 and 2, two camera lenses 39 and 45, two microphones 5 and 6, two antenna elements 13 and 14, battery pack 23, induction coils 27 and 28, supporting electronics (numerous), and an enclosure is disclosed. The enclosure of the instrumentation package assembly is essentially circularly symmetric about its y-axis.

FIG. 23 is a block diagram that explains the detailed circuitry, flow of electrical signals and data in the general operation of the instrumentation package assembly electronics used for televising pictures and sounds, controlling the electrical and mechanical functions within the instrumentation package assembly, and charging the battery pack 23. FIG. 24 is a block diagram showing the signals and data flows in the power supply and battery charging circuits inside the instrumentation package assembly.

The only difference between the preferred embodiment shown in FIG. 3A and FIG. 3B and FIG. 3C and the embodiment shown in FIG. 2A and FIG. 2B and FIG. 2C is that two optical windows 47 and 48 have been added to FIG. 3A and FIG. 3B and FIG. 3C. The optical windows 47 and 48 are mounted and sealed to the tips of the instrumentation package assembly enclosure in front of the front lens elements 40 and 46 of camera lenses 39 and 45. Each of the optical windows is a single thin optical element made domed shaped with spherical surfaces to keep them cheap. Each of the optical windows 47 and 48 are identical to one another.

The purpose of these additional windows 47 and 48 is to offer an additional gas seal and protect the contents of the instrumentation package assembly as a unit. Rather than depending on the integrity of the internal seals within camera lenses 39 and 45 themselves, the windows 48 and 47 guarantee the quality of the seals as an extra precaution. This embodiment eliminates the need to use more expensive camera lenses that have built in internal seals themselves. This embodiment has the disadvantage that it adds an additional optical surface that can cause vignetting of the field of view with some extremely wide angle lenses when it is used with a buffer plate assembly that already has an optical window. These windows 47 and 48 also protect the front lens elements 40 and 46 of camera lenses 39 and 45 respectively from damage. In the event that the optical windows get damaged, they can easily be replaced by screwing them off the end of the instrumentation package assembly, and screwing on a replacement. The windows are mounted in threaded cells to facilitate this operation.

The instrumented football has two small inconspicuous optical windows disposed at both vertices of the instrumented football. The optical windows 11 and 12 are each mounted and sealed to each of the small diameter cylindrical ends of the buffer plates 14 and 15 respectively at either end of the instrumented football. The seals 22 and 23 are airtight and waterproof to protect the cameras, microphones and electronics within the instrumentation package assembly.

The optical windows 11 and 12 permit the two cameras 20 and 21 mounted inside the instrumented football to simultaneously look out through their respective windows onto the playing field from both ends of the football while the football is in play during a game, and be protected from hazards such as ice, snow, rain, dirt and physical impacts. The optical windows are small circular single elements.

The optical windows are made small so as not to alter the outward appearance or playability of the instrumented football compared to the conventional football. The diameter of the optical windows is determined by the level of the prevailing lighting conditions on the playing field during the football game, the light sensitivity of the cameras, the working f-number of the camera lens, the maximum field of view without vignetting, the proximity of the entrance pupil of the camera lens to the optical window and a number of other factors. A typical range of optical window diameters from 2 mm to 8 mm provides high quality HD pictures with current cameras and is non-obtrusive and does not alter the outward appearance of the football significantly. As better more sensitive cameras become available as the camera technology improves, this range will be reduced thereby making the optical windows even smaller and more un-obtrusive.

The optical windows are made strong to protect the cameras and microphones. The optical windows are hard coated by vapor deposition with materials such as MgFl or SiO2 to help prevent the outer-most window surfaces from being scratched during the game. The window material itself is chosen to be strong. It is made from hard optical glass such as barium lanthanum borate glasses, or hard optical plastic like acrylic or polycarbonate, both of which are scratch resistant. The plastic material is preferred because it will not splinter when impacted and is therefore safe. High quality pre-stressed optical glass is also safe and will not splinter but is far more costly.

The optical windows are made small to make them inconspicuous, and substantially preserve the instrumented football's look-alike quality with the conventional football, while still retaining sufficient clear aperture for the camera lenses to see events on the playing field in prevailing light. The optical windows pierce the space once occupied by the blunt ends of the conventional football. Besides their small size, the windows are made additionally inconspicuous by very lightly tinting them brown to match the tan coloration of the conventional football cover.

The optical windows 47 and 48 shell-like and spherically domed shaped. The shell-like spherically domed shape gives extra strength to the windows like the shape of an egg's shell gives to an egg. The outer surfaces of the windows are spherical in shape and convex outward and shell-like as is necessary to permit the cameras to see fields of view with extremely wide viewing angles approaching 90 degrees off the y-axis of the instrumented football without vignetting. Shell-like implies that the spherical surfaces of the optical windows are thin and concentric. In applications where extremely wide viewing angles are not required, the optical window surfaces can be made flat and plane parallel. The flat and plane parallel optical windows are easier to manufacture and less costly to produce.

The two windows share the same optical axis with camera lenses 39 and 45, which is the y-axis of the instrumentation package assembly. The windows face convex outwardly from the instrumentation package assembly. The inner and outer surfaces of the windows are concentric and spherical in shape, and form shell-like miniature domes that afford wide angle fields of view for the cameras when the cameras are used with wide angle camera lenses. The shell-like domed shaped optical windows enable the cameras to use lenses that have extremely wide viewing angles approaching 90 degrees off the x-axis without introducing bothersome optical aberrations and vignetting.

A variety of different camera lens types, with different lens setting capability, can be used providing they are small in size and weight. The auto iris setting permits the camera lens to automatically adjust for varying lighting conditions on the field. The auto focus setting permits the camera lens to adjust focus for varying distances of the players and action subjects on the field.

When the football has been thrown and is in flight on its trajectory from the quarterback to his intended receiver, the distance of the football from the quarterback is increasing, whereas the distance of the football to the intended receive is decreasing. Each camera can be independently and simultaneously commanded and controlled to auto focus on their respective subjects. The rearward camera is looking backward in the direction to where the football has been, and can retain its focus on the quarterback, while the forward camera is looking forward in the direction of its travel, and retains its focus on the receiver.

The functions of the camera lenses 39 and 45 such as focus adjustment settings and iris adjustment settings are controlled wirelessly by the cameraman from the remote base station by sending command and control signals from the remote base station to the instrumented football. The cameraman can also send command and control signals from the remote base station to the instrumented football to put these settings on automatic under the control of the camera electronics. The optical and electronic zoom functions of the camera lenses 39 and 45 are operated by the cameraman by sending command and control signals from the remote base station to the instrumented football. The cameraman can select from a wide variety of HD camera lenses. Wide angle lenses and ultra wide angle lenses are used in many venues to give the TV viewing audience the feeling of being there on the playing field amongst the players. In some venues the cameraman may choose to use camera lenses with more magnification and narrower fields of view to better cover certain plays. In some venues the cameraman may choose camera lenses with small f-numbers to deal with poorer lighting conditions. In many venues the cameraman will choose the camera lenses 39 and 45 to be identical to one another. In many venues the cameraman will choose to use identical settings in both lenses 39 and 45 so that the TV viewing audience will see the same from either end of the instrumented football.

Referring to the Preferred Embodiments Specified in FIG. 3A and FIG. 3B and FIG. 3C, the Instrumentation Package Assembly Satisfies all of the Following Further Objectives:

It is an objective of the present invention to equip the instrumentation package assembly with easily replaceable shell-like thin spherically domed shaped optical window located at both of its ends to seal and protect the contents of the instrumentation package assembly. It is an objective of the present invention to equip the instrumentation package assembly with easily replaceable shell-like thin spherically domed shaped small circular single element inconspicuous optical windows. It is an objective of the present invention to equip the instrumentation package assembly with optical windows that do not alter the outward appearance or playability of the instrumented football compared to the conventional football. It is an objective of the present invention to equip the instrumentation package assembly with optical windows that are inconspicuous, and substantially preserve the instrumented football's look-alike quality with the conventional football. It is an objective of the present invention to equip the instrumentation package assembly with optical windows that preserve the fields of view of extremely wide angle camera lenses without vignetting and producing off-axis optical aberrations. It is an objective of the present invention for the two TV cameras within the instrumentation package assembly to auto focus on their respective subjects. It is an objective of the present invention for the instrumentation package assembly to include two miniature SD/HD TV cameras, signal compression modules, two condenser microphones, two operational amplifiers, two audio encoders, a network transceiver, a MPEG stream encoder, two antenna elements, a system control microprocessor, a ROM, a RAM, real-time pitch, roll and yaw gyroscope encoders, a power switching circuit, a power supply, a rechargeable battery pack, two tuning capacitors, a stand by data separator circuit, two inductive pickup coils, circuit boards, corrugated bellows section, cylindrical skin section, small diameter slightly conical ends, machined shoulders on the ends, large diameter ends, air and water tight seals, two camera lenses, and two optical windows.

FIG. 4A and FIG. 4B and FIG. 4C

The detailed physical elements disclosed in the instrumentation package assembly drawings shown in FIG. 4A and FIG. 4B and FIG. 4C are identified as follows: 1 and 2 are miniature SD/HD TV cameras. 3 and 4 are signal compression modules. 5 and 6 are condenser microphones. 7 and 8 are operational amplifiers. 9 and 10 are audio encoders. 11 is a network transceiver for wirelessly transmitting and receiving radio signals. 12 is a MPEG stream encoder. 13 and 14 are intentional radiators or antenna elements. 15 is a system control microprocessor. 16 is a ROM. 17 is a RAM. 18, 19, and 20 are real-time pitch, roll and yaw gyroscope encoders. 21 is a power switching circuit. 22 is a power supply. 23 is a battery pack. 24 and 25 are tuning capacitors, 26 is a stand by data separator circuit, 27 and 28 are inductive pickup coils. 29 and 30 are circuit boards. 31 and 32 are circular circuit boards. 33 is the centerline and y-axis of the cylindrical instrumentation package assembly. 34 is the cylindrical skin section. 35 and 41 are the small diameter slightly conical ends of the instrumentation package assembly. 37 and 43 are shoulders on the ends of the instrumentation package assembly, 36 and 42 are the large diameter ends of the instrumentation package assembly. 38 and 44 are air and water tight seals between the camera lenses and the small diameter slightly conical ends of the instrumentation package assembly. 39 and 45 are the camera lenses. 40 and 46 are the front lens elements of camera lenses 39 and 45 respectively.

FIG. 4A shows a front side view section of the instrumentation package assembly.

FIG. 4B shows a top view section of the instrumentation package assembly.

FIG. 4C shows a bottom view section of the instrumentation package assembly.

Referring to the drawings FIG. 4A and FIG. 4B and FIG. 4C, in a preferred embodiment, an instrumentation package assembly provided in accordance with the invention, comprises two cameras 1 and 2, two camera lenses 39 and 45, two microphones 5 and 6, two antenna elements 13 and 14, battery pack 23, induction coils 27 and 28, supporting electronics (numerous), and an enclosure is disclosed. The enclosure of the instrumentation package assembly is essentially circularly symmetric about its y-axis.

FIG. 23 is a block diagram that explains the detailed circuitry, flow of electrical signals and data in the general operation of the instrumentation package assembly electronics used for televising pictures and sounds, controlling the electrical and mechanical functions within the instrumentation package assembly, and charging the battery pack 23. FIG. 24 is a block diagram showing the signals and data flows in the power supply and battery charging circuits inside the instrumentation package assembly.

The only difference between the preferred embodiment shown in FIG. 4A and FIG. 4B and FIG. 4C and the embodiment shown in FIG. 2A and FIG. 2B and FIG. 2C is that the instrumentation package assembly disclosed in FIG. 4A and FIG. 4B and FIG. 4C has a smooth continuous cylindrical skin, whereas the instrumentation package assembly disclosed in FIG. 2A and FIG. 2B and FIG. 2C has a corrugated bellows skin section in its enclosure.

The purpose of the smooth cylindrical skin 33 is that is offers a simpler way to mount the instrumentation package assembly as a unit inside certain sports paraphernalia. This embodiment recognizes the fact that not every instrumentation package assembly benefits from the use of a corrugated bellows, as for example in cases where the instrumentation package assembly does not need to be bent in order to make it fit to place it inside the designated sports paraphernalia. The smooth cylindrical skin 33 has an advantage in that it eliminates the need to use the more expensive skins that have a corrugated bellows when the benefits they afford do not justify their use. The smooth cylindrical skin 33 has a disadvantage in that it cannot compress or stretch when the instrumented football is shocked and vibrated and therefore cannot protect the contents of the instrumentation package assembly under these conditions and hold its alignment as well. The smooth cylindrical skin 33 can serve well however for example if the instrumented football is just being used as a demonstrator unit or as a training unit for cameramen in a shock free environment where the only goal is to show how the TV video and sounds are captured and how the overall system works.

A variety of different camera lens types, with different lens setting capability, can be used providing they are small in size and weight. The auto iris setting permits the camera lens to automatically adjust for varying lighting conditions on the field. The auto focus setting permits the camera lens to adjust focus for varying distances of the players and action subjects on the field.

When the football has been thrown and is in flight on its trajectory from the quarterback to his intended receiver, the distance of the football from the quarterback is increasing, whereas the distance of the football to the intended receive is decreasing. Each camera can be independently and simultaneously commanded and controlled to auto focus on their respective subjects. The rearward camera is looking backward in the direction to where the football has been, and can retain its focus on the quarterback, while the forward camera is looking forward in the direction of its travel, and retains its focus on the receiver.

The functions of the camera lenses 39 and 45 such as focus adjustment settings and iris adjustment settings are controlled wirelessly by the cameraman from the remote base station by sending command and control signals from the remote base station to the instrumented football. The cameraman can also send command and control signals from the remote base station to the instrumented football to put these settings on automatic under the control of the camera electronics. The optical and electronic zoom functions of the camera lenses 39 and 45 are operated by the cameraman by sending command and control signals from the remote base station to the instrumented football. The cameraman can select from a wide variety of HD camera lenses. Wide angle lenses and ultra wide angle lenses are used in many venues to give the TV viewing audience the feeling of being there on the playing field amongst the players. In some venues the cameraman may choose to use camera lenses with more magnification and narrower fields of view to better cover certain plays. In some venues the cameraman may choose camera lenses with small f-numbers to deal with poorer lighting conditions. In many venues the cameraman will choose the camera lenses 39 and 45 to be identical to one another. In many venues the cameraman will choose to use identical settings in both lenses 39 and 45 so that the TV viewing audience will see the same from either end of the instrumented football.

Referring to the Preferred Embodiments Specified in FIG. 4A and FIG. 4B and FIG. 4C, the Instrumentation Package Assembly Satisfies all of the Following Further Objectives:

It is an objective of the present invention for the instrumentation package assembly to include two miniature SD/HD TV cameras, signal compression modules, two condenser microphones, two operational amplifiers, two audio encoders, a network transceiver, a MPEG stream encoder, two antenna elements, a system control microprocessor, a ROM, a RAM, real-time pitch, roll and yaw gyroscope encoders, a power switching circuit, a power supply, a rechargeable battery pack, two tuning capacitors, a stand by data separator circuit, two inductive pickup coils, circuit boards, corrugated bellows section, cylindrical skin section, small diameter slightly conical ends, machined shoulders on the ends, large diameter ends, air and water tight seals, and two camera lenses.

Figures 5A, 5B, 5C:
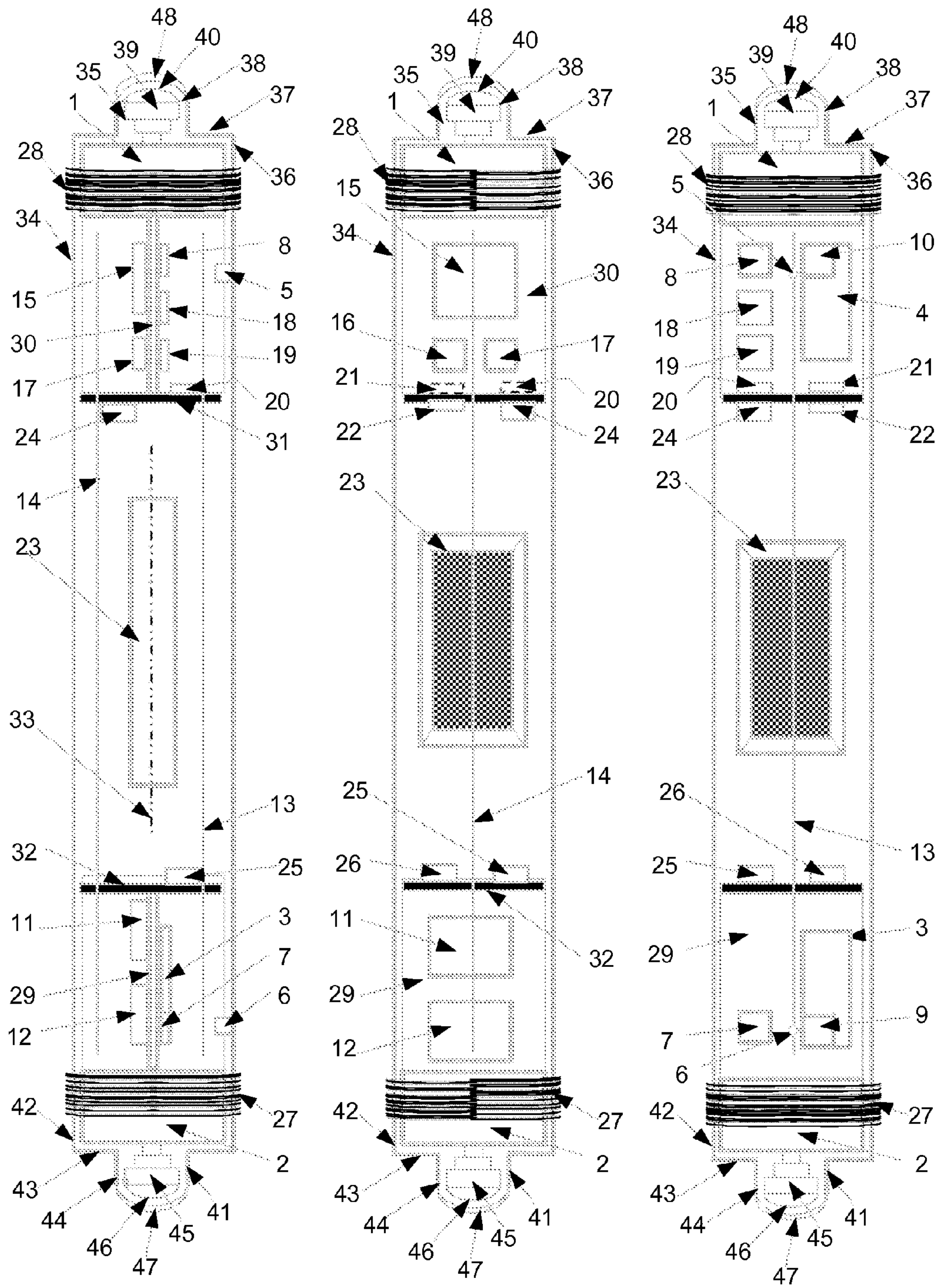
FIG. 5A shows a front side view section of the instrumented football's instrumentation package assembly.
FIG. 5B shows a top view section of the instrumented football's instrumentation package assembly.
FIG. 5C shows a bottom view section of the instrumented football's instrumentation package assembly.

FIG. 5A and FIG. 5B and FIG. 5C

The detailed physical elements disclosed in the instrumentation package assembly drawings shown in FIG. 5A and FIG. 5B and FIG. 5C are identified as follows: 1 and 2 are miniature SD/HD TV cameras. 3 and 4 are signal compression modules. 5 and 6 are condenser microphones. 7 and 8 are operational amplifiers. 9 and 10 are audio encoders. 11 is a network transceiver for wirelessly transmitting and receiving radio signals. 12 is a MPEG stream encoder. 13 and 14 are intentional radiators or antenna elements. 15 is a system control microprocessor. 16 is a ROM. 17 is a RAM. 18, 19, and 20 are real-time pitch, roll and yaw gyroscope encoders. 21 is a power switching circuit. 22 is a power supply. 23 is a battery pack. 24 and 25 are tuning capacitors. 26 is a stand by data separator circuit. 27 and 28 are inductive pickup coils. 29 and 30 are circuit boards. 31 and 32 are circular circuit boards. 33 is the centerline and y-axis of the instrumentation package assembly. 34 is the cylindrical skin section. 35 and 41 are the small diameter slightly conical ends of the instrumentation package assembly. 37 and 43 are shoulders on the ends of the instrumentation package assembly. 36 and 42 are the large diameter ends of the instrumentation package assembly. 38 and 44 are air and water-tight seals between the optical windows 48 and 47 respectively and the small diameter slightly conical ends of the instrumentation package assembly. 39 and 45 are the camera lenses. 40 and 46 are the front lens elements of camera lenses 39 and 45 respectively.

FIG. 5A shows a front side view section of the instrumentation package assembly.

FIG. 5B shows a top view section of the instrumentation package assembly.

FIG. 5C shows a bottom view section of the instrumentation package assembly.

Referring to the drawings FIG. 5A and FIG. 5B and FIG. 5C, in a preferred embodiment, an instrumentation package assembly provided in accordance with the invention, comprises two optical windows 47 and 48, two cameras 1 and 2, two camera lenses 39 and 45, two microphones 5 and 6, two antenna elements 13 and 14, battery pack 23, induction coils 27 and 28, supporting electronics (numerous), and an enclosure is disclosed. The enclosure of the instrumentation package assembly is essentially circularly symmetric about its y-axis.

FIG. 23 is a block diagram that explains the detailed circuitry, flow of electrical signals and data in the general operation of the instrumentation package assembly electronics used for televising pictures and sounds, controlling the electrical and mechanical functions within the instrumentation package assembly, and charging the battery pack 23. FIG. 24 is a block diagram showing the signals and data flows in the power supply and battery charging circuits inside the instrumentation package assembly.

The only differences between the preferred embodiment shown in FIG. 5A and FIG. 5B and FIG. 5C and the embodiment shown in FIG. 3A and FIG. 3B and FIG. 3C is that a smooth continuous cylindrical skin enclosure is used in FIG. 5A and FIG. 5B and FIG. 5C that replaces the corrugated bellows skin section used in FIG. 3A and FIG. 3B and FIG. 3C.

The purpose of the smooth cylindrical skin 33 is that is offers a simpler way to mount the instrumentation package assembly as a unit inside certain sports paraphernalia. This embodiment recognizes the fact that not every instrumentation package assembly benefits from the use of a corrugated bellows, as for example in cases where the instrumentation package assembly does not need to be bent in order to make it fit to place it inside the designated sports paraphernalia.

The smooth cylindrical skin 33 has an advantage in that it eliminates the need to use the more expensive skins that have a corrugated bellows when the benefits they afford do not justify their use. The smooth cylindrical skin 33 has a disadvantage in that it cannot compress or stretch when the instrumented football is shocked and vibrated and therefore cannot protect the contents of the instrumentation package assembly under these conditions and hold its alignment as well. The smooth cylindrical skin 33 can serve well however for example if the instrumented football is just being used as a demonstrator unit or as a training unit for cameramen in a shock free environment where the only goal is to show how the TV video and sounds are captured and how the overall system works.

A variety of different camera lens types, with different lens setting capability, can be used providing they are small in size and weight. The auto iris setting permits the camera lens to automatically adjust for varying lighting conditions on the field. The auto focus setting permits the camera lens to adjust focus for varying distances of the players and action subjects on the field. When the football has been thrown and is in flight on its trajectory from the quarterback to his intended receiver, the distance of the football from the quarterback is increasing, whereas the distance of the football to the intended receive is decreasing. Each camera can be independently and simultaneously commanded and controlled to auto focus on their respective subjects. The rearward camera is looking backward in the direction to where the football has been, and can retain its focus on the quarterback, while the forward camera is looking forward in the direction of its travel, and retains its focus on the receiver. The functions of the camera lenses 39 and 45 such as focus adjustment settings and iris adjustment settings are controlled wirelessly by the cameraman from the remote base station by sending command and control signals from the remote base station to the instrumented football. The cameraman can also send command and control signals from the remote base station to the instrumented football to put these settings on automatic under the control of the camera electronics. The optical and electronic zoom functions of the camera lenses 39 and 45 are operated by the cameraman by sending command and control signals from the remote base station to the instrumented football. The cameraman can select from a wide variety of HD camera lenses. Wide angle lenses and ultra wide angle lenses are used in many venues to give the TV viewing audience the feeling of being there on the playing field amongst the players. In some venues the cameraman may choose to use camera lenses with more magnification and narrower fields of view to better cover certain plays. In some venues the cameraman may choose camera lenses with small f-numbers to deal with poorer lighting conditions. In many venues the cameraman will choose the camera lenses 39 and 45 to be identical to one another. In many venues the cameraman will choose to use identical settings in both lenses 39 and 45 so that the TV viewing audience will see the same from either end of the instrumented football.

The purpose of these additional windows 47 and 48 is to offer an additional gas seal and protect the contents of the instrumentation package assembly as a unit. Rather than depending on the integrity of the internal seals within camera lenses 39 and 45 themselves, the windows 48 and 47 guarantee the quality of the seals as an extra precaution. This embodiment eliminates the need to use more expensive camera lenses that have built in internal seals themselves. This embodiment has the disadvantage that it adds an additional optical surface that can cause vignetting of the field of view with some extremely wide angle lenses when it is used with a buffer plate assembly that already has an optical window. These windows 47 and 48 also protect the front lens elements 40 and 46 of camera lenses 39 and 45 respectively from damage. In the event that the optical windows get damaged, they can easily be replaced by screwing them off the end of the instrumentation package assembly, and screwing on a replacement. The windows are mounted in threaded cells to facilitate this operation.

Referring to the Preferred Embodiments Specified in FIG. 5A and FIG. 5B and FIG. 5C, the Instrumentation Package Assembly Satisfies all of the Following Further Objectives:

It is an objective of the present invention for the instrumentation package assembly to include two miniature SD/HD TV cameras, signal compression modules, two condenser microphones, two operational amplifiers, two audio encoders, a network transceiver, a MPEG stream encoder, two antenna elements, a system control microprocessor, a ROM, a RAM, real-time pitch, roll and yaw gyroscope encoders, a power switching circuit, a power supply, a rechargeable battery pack, two tuning capacitors, a stand by data separator circuit, two inductive pickup coils, circuit boards, corrugated bellows section, cylindrical skin section, small diameter slightly conical ends, machined shoulders on the ends, large diameter ends, air and water tight seals, two camera lenses, and two optical windows.

FIG. 6A and FIG. 6B

The detailed physical elements disclosed in the instrumented football bladder drawings shown in FIG. 6A and FIG. 6B are identified as follows: 1 is the outside surface of the bladder. 2 is the gas valve. 3 is the origin of the bladder's three coordinate axis. 4 is the wall of the bladder's inner central hollow cylindrical cavity. 5 is the bladder's y-axis. 6 is the bladder's z-axis. 7 is the bladder's x-axis. 8 is the space inside the bladder's inner central hollow cylindrical cavity. 9 is the gas that inflates the pre-formed bladder. 10 is the inside surface of the bladder. 11 and 12 are the ends of the bladder.

FIG. 6A shows a top view of an inflated instrumented football bladder with inner cylindrical hollow.

FIG. 6B shows an end view of the inflated instrumented football bladder with inner cylindrical hollow.

Referring to drawings FIG. 6A and FIG. 6B, in a preferred embodiment, an instrumented football bladder is disclosed. The bladder is shown inflated with gas as it would be inside the instrumented football's cover. The bladder is circularly symmetric around its y-axis 5.

The bladder is accommodated by the instrumented footballs specified in FIG. 9A and FIG. 9B, FIG. 10A and FIG. 10B, FIG. 11A and FIG. 11B, FIG. 13A and FIG. 13B, FIG. 16A and FIG. 16B, and FIG. 17 and FIG. 17B. These are the same instrumented footballs that also accommodate the bladders specified in FIG. 7A and FIG. 7B, and FIG. 8A and FIG. 8B.

The bladder accommodates the instrumentation package assemblies specified in FIG. 2A and FIG. 2B and FIG. 2C, FIG. 3A and FIG. 3B and FIG. 3C, FIG. 4A and FIG. 4B and FIG. 4C, FIG. 5A and FIG. 5B and FIG. 5C.

The bladder is distinguished from the conventional professional football bladders by the inclusion of an inner hollow cylindrical wall 4 which forms a symmetrically disposed cylindrical hollow cavity space 8 extending down the full length of the long y-axis centerline 5 of the bladder. There is no gas pumped into this space 8. Only the ambient air in the football's surrounding environment gets into this space 8. The purpose of this space 8 is to provide a nesting space for the instrumentation package assembly. The instrumentation package assembly will occupy this space 8 inside the instrumented football. The inflated bladder will hug and hold the instrumentation package assembly in this space 8. For example, refer to FIG. 1A and FIG. 1B and FIG. 1C and FIG. 1D.

Additionally, the bladder is distinguished from the conventional bladder in that its overall length is shorter. It is shorter because the ends of the bladder are truncated in order to make the inflated bladder fit in the space between the two buffer plates located at the football's vertices in the interior of the instrumented football shown in FIG. 10A and FIG. 10B.

Additionally, the bladder is distinguished from the conventional bladder in that its vertices are pre-formed to match the shape of the curved interior surfaces of the buffer plates when the bladder is inflated inside the instrumented football, rather than match the vesica piscis shape of the interior walls of the cover/liner at the vertices as in conventional footballs. The bladder is shaped to be in smooth contact and press up against the buffer plates when the bladder is inflated.

Figure 21G:
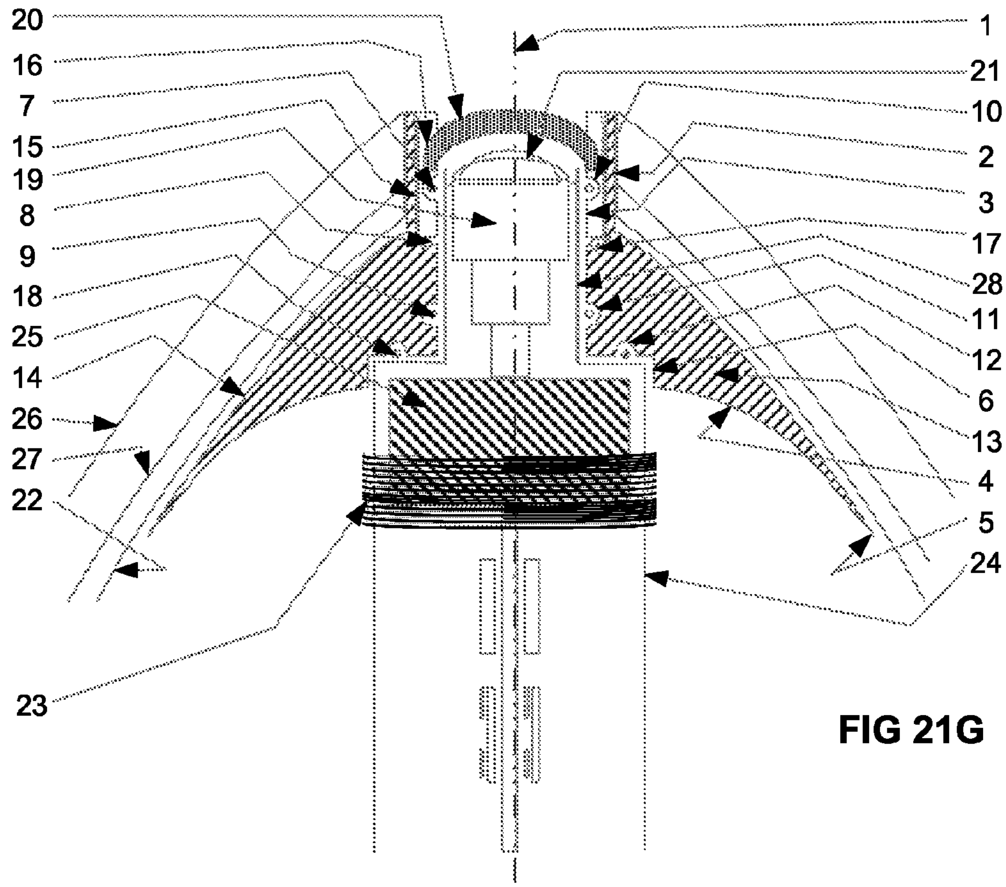
FIG. 21G shows a side view section of the Type IV buffer plate and instrumentation package assembly.
Figure 21H:
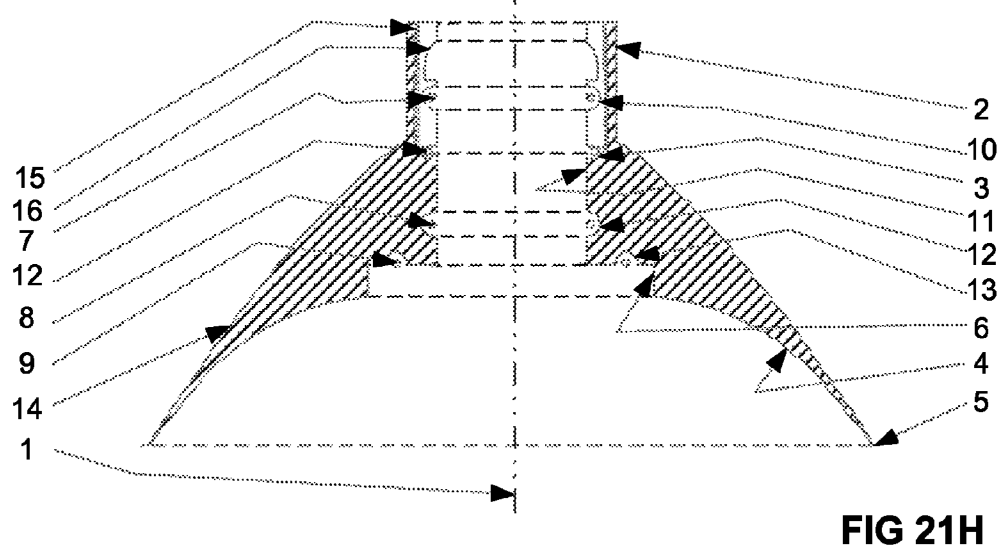
FIG. 21H shows a side view section of just the buffer plate alone.
Figure 21I:
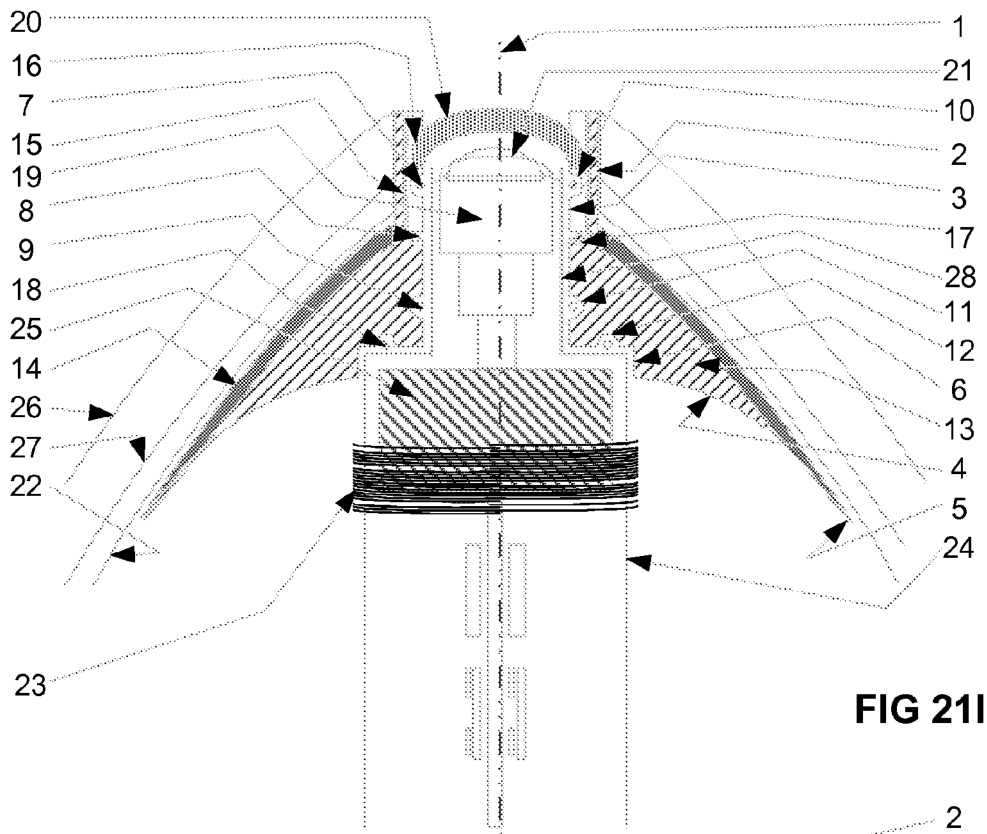
FIG. 21I shows a side view section of the Type V buffer plate assembly and instrumentation package assembly.
Figure 21J:
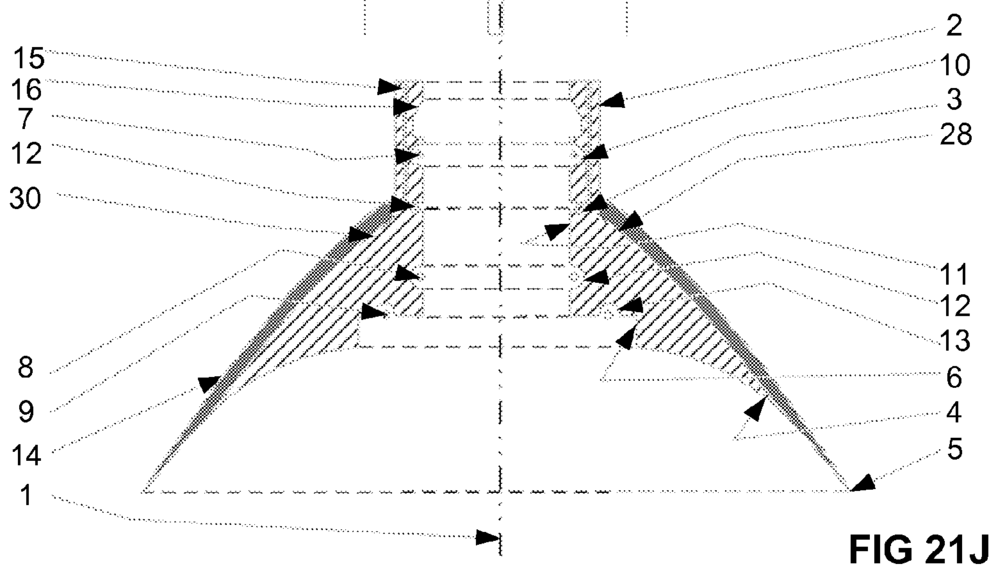
FIG. 21J shows a side view section of just the buffer plate alone.
Figure 21I:
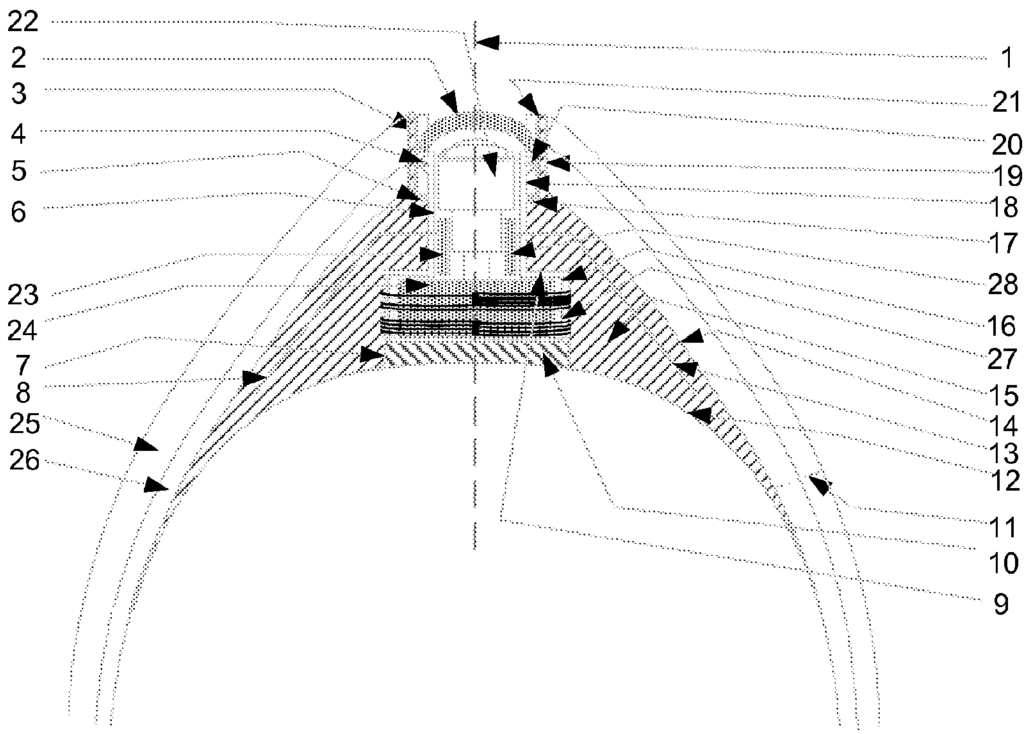
Figure 21J:
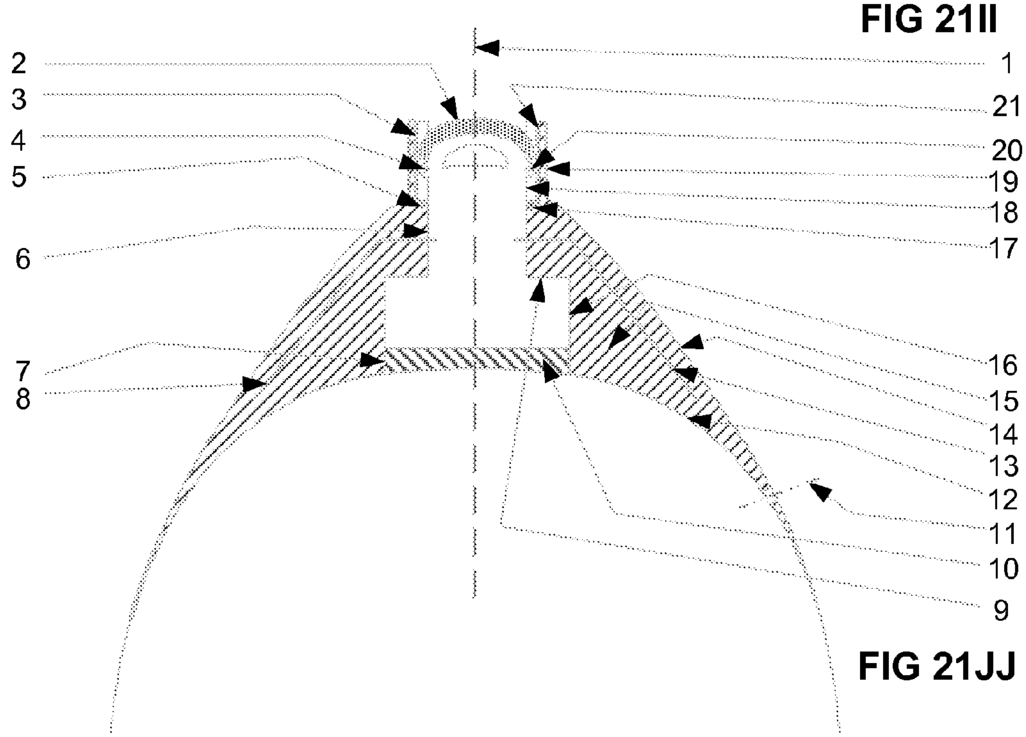
Figure 21K:
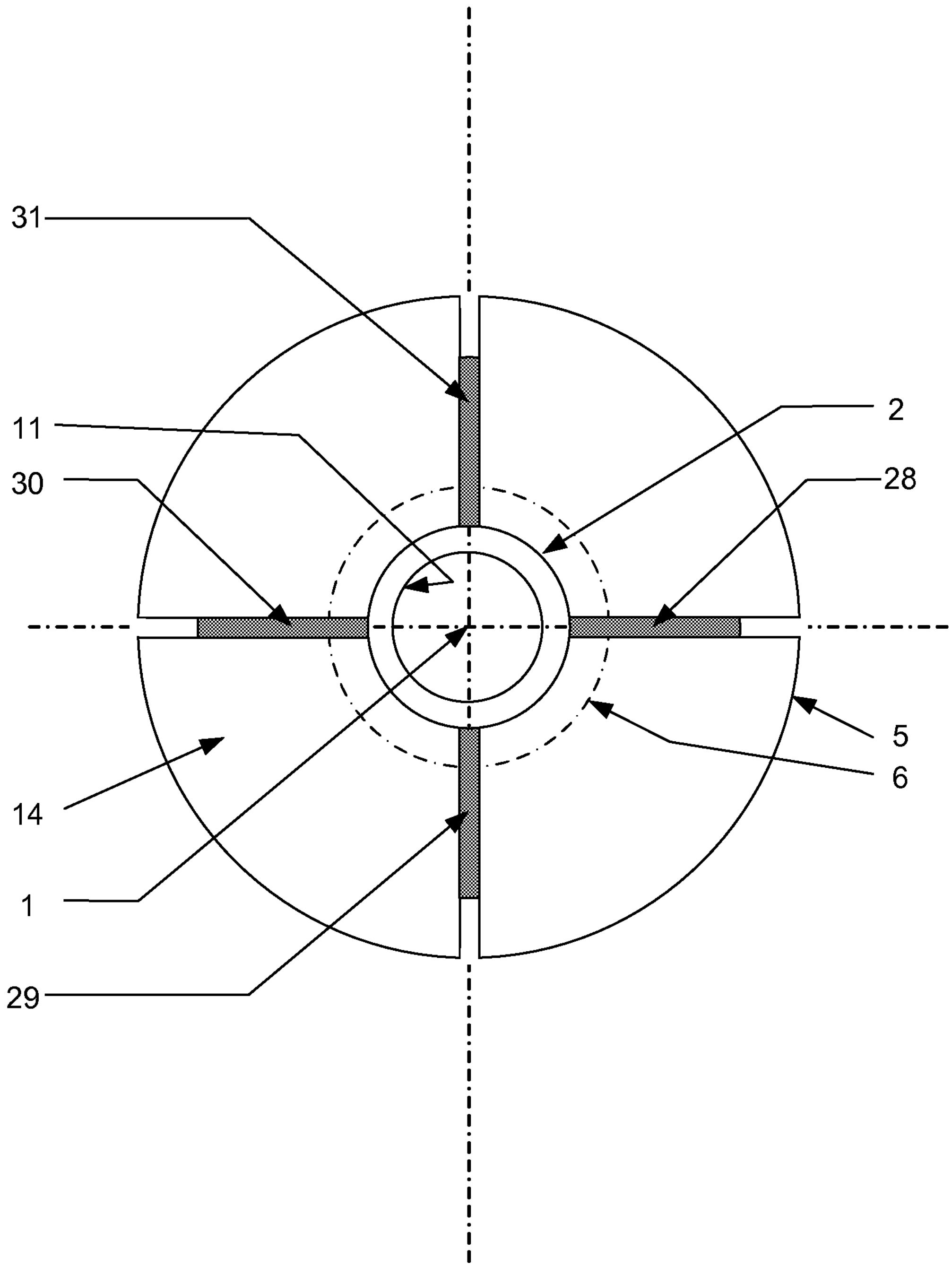
FIG. 21K shows an end view of just the buffer plate alone.
Figure 21L:
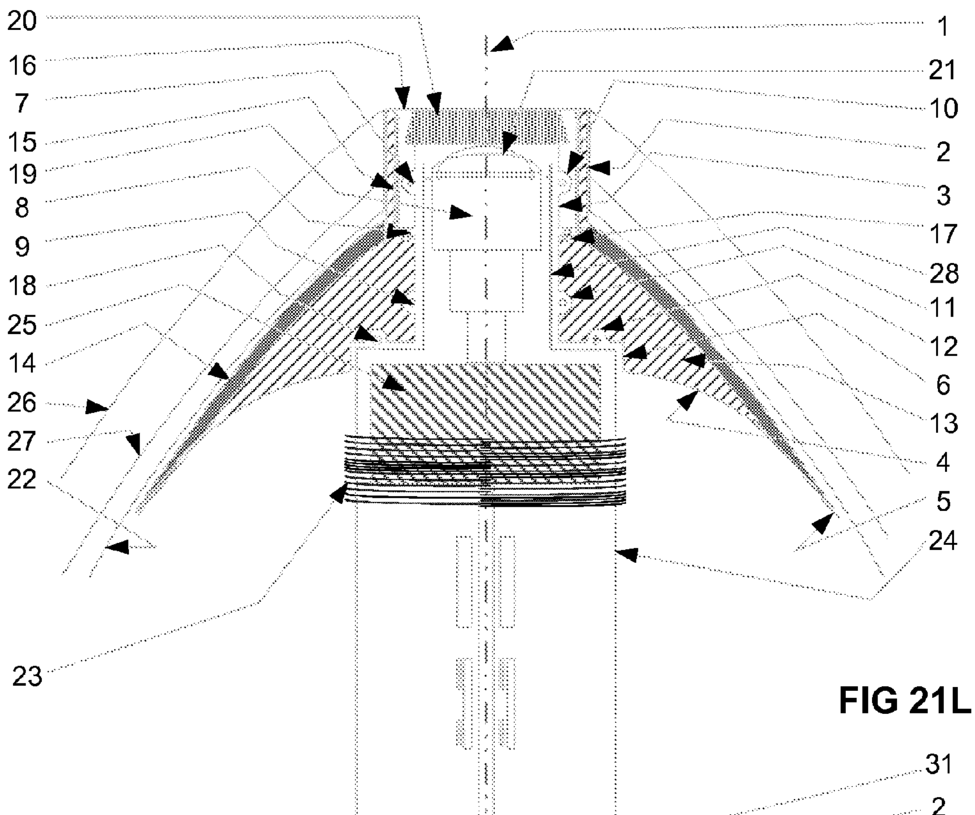
FIG. 21L shows a side view section of the Type VI buffer plate and instrumentation package assembly.
Figure 21M:
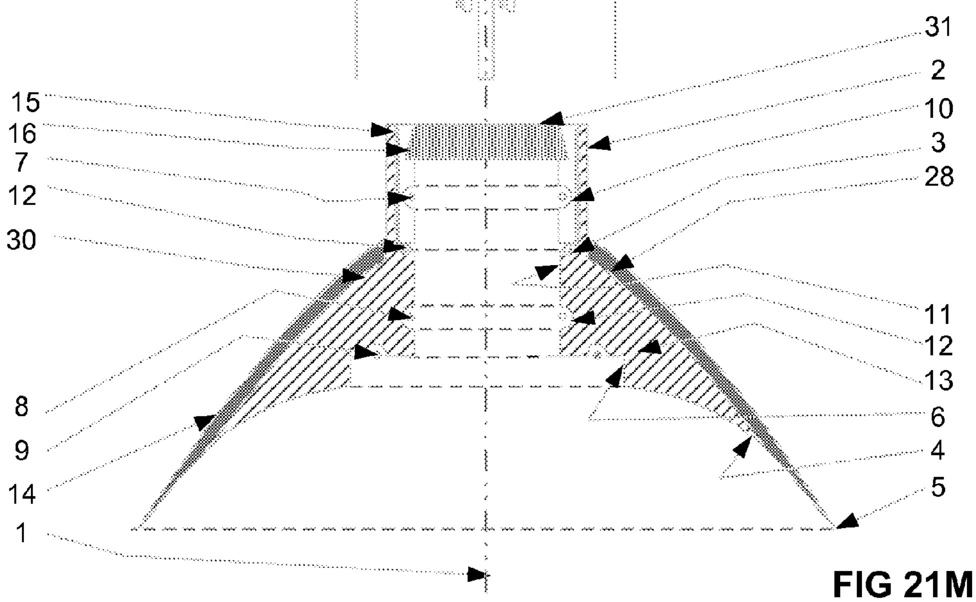
FIG. 21M shows a side view section of just the buffer plate alone.
Figure 21L:
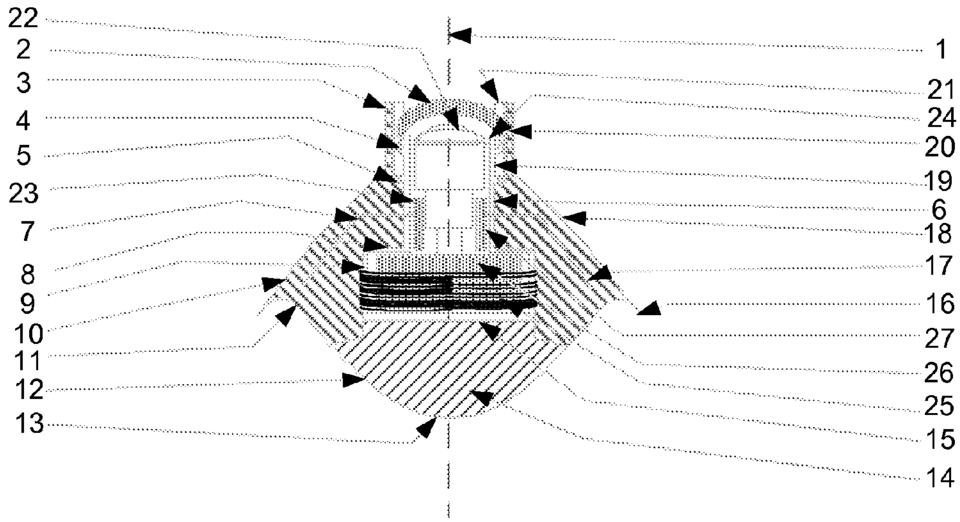
Figure 21M:
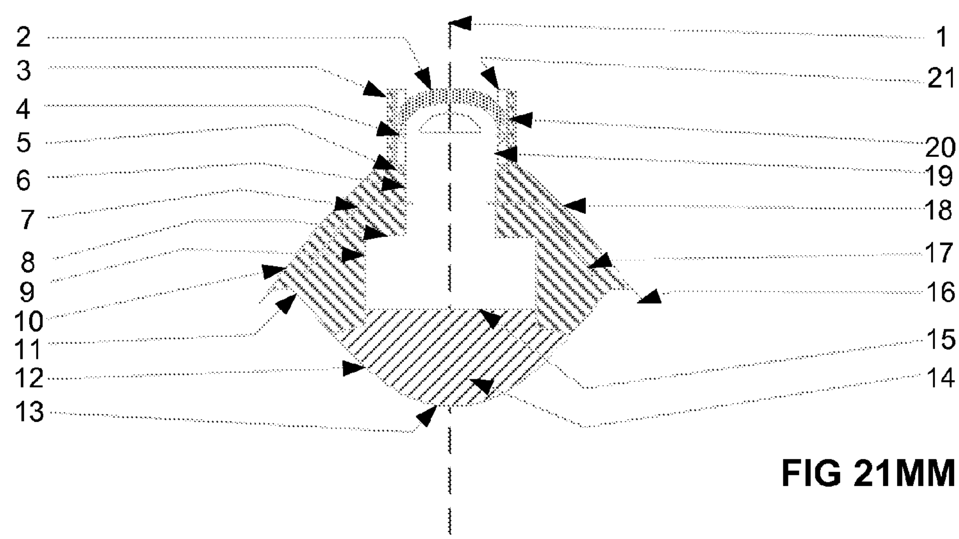

Various preferred embodiments of buffer plates that are used with the bladder for instrumented footballs are shown in FIG. 21A and FIG. 21B, FIG. 21C and FIG. 21D, FIG. 21E and FIG. 21F, FIG. 21G and FIG. 21H, FIG. 21I and FIG. 21J, FIG. 21II and FIG. 21JJ, FIG. 21K, and FIG. 21L and FIG. 21M.

When the instrumented football is laced and inflated with gas through the gas valve 2, the outer wall 1 of the bladder presses on the interior wall of the football's cover/liner sandwich and on the interior curved surfaces of the two opposite buffer plates, thereby propping up the cover/liner sandwich and holding the bladder in place and aligned relative to the cover. The bladder has a pre-determined overall shape when inflated, and props up the instrumented football's cover to the same shape as the conventional professional league American football.

The bladder is symmetric around the y-axis 5. The bladder is made with the same 1 vesica piscis shape in the region around its central girth, as the bladder used in conventional professional footballs shown in FIG. 18A and FIG. 18B. Its gas valve 2 is identical to the gas valve used in conventional professional football bladders. Its gas valve is in the same location on the bladder's x-z plane as with the conventional football bladder.

Before inflation with gas 9, the diameter of the cylindrical wall 4 of the bladder's hollow cavity 8 is greater than the diameter of the skin of the instrumentation package assembly, thereby allowing the instrumentation package assembly to be easily slipped into the bladder's hollow cavity. After inflation with gas 9, the diameter of the cylindrical wall 4 of the bladder's hollow cavity 8 is made smaller than the diameter of the skin of the instrumentation package assembly, thereby causing an interference fit between the two when the bladder is inflated. The inner cylindrical cavity wall 4 presses inwardly on the skin of the instrumentation package assembly which is nested within the cavity, thereby restraining the instrumentation package assembly from moving and keeping it aligned to the cover when the football suffers shock and vibration during play. Additionally, the bladder acts essentially as a shock and vibration isolator. The bladder acts to dampen, moderate and cushion the severe shock and vibration that would otherwise be encountered by the instrumentation package assembly and its contents.

When the football is laced and the bladder is fully inflated with gas 9, the outer wall of the bladder 1 presses against the interior wall of the football's liner and cover, thereby propping up the football to the same vesica piscis shape that conventional footballs have. Conversely, the cover and liner hold the bladder in place and aligned relative to the cover.

In one preferred embodiment, the bladder is made from the same material as prior art conventional bladders i.e. natural rubber.

In one preferred embodiment, the bladder is inflated with air which is the gas used to inflate prior art bladders.

In order to meet an additional objective to make the bladder weigh less than conventional prior art professional league football bladders, the bladder in an alternative preferred embodiment uses a lighter weight synthetic material having equal resilience and greater strength than the rubber used in professional league footballs. In this alternative preferred embodiment, the instrumented football bladder shown in FIG. 6 is made of a stronger material than the natural rubber used in conventional footballs. Exxon Exxcore™ DVA is an example of such a material. This stronger material enables the instrumented football's bladder to be made thinner and be of substantially lighter weight. compared to the conventional football bladders made of natural rubber. Despite its light weight, the instrumented football's bladder matches or exceeds the performance of the conventional professional league football bladder.

Exxcore™ dynamically vulcanized alloy (DVA), is a blend of specialty elastomer and nylon, and has been used as a next-generation resin for advanced tire innerliners. It affords up to an 80% reduction in bladder thickness in the instrumented football while still performing the same functions of the natural rubber bladder used in conventional footballs. This reduction in bladder thickness yields a weight (mass) difference between the instrumented football bladder and the conventional football bladder of up to 80%. In addition to performing the functions of the natural rubber bladder, the instrumented football bladder has a superior inflation pressure retention loss rate for the gas used to inflate the bladder.

The following steps describe an example of the production assembly process for the instrumented football which uses the bladder: The football cover/liner is held horizontally in a fixture with its gap facing up. The buffer plates are inserted into the football through its gap. The buffer plates are arranged at both vertices of the football and aligned together. The buffer plates are bonded in place. The bladder is inserted into the football cover/liner through the gap. The football is stretched in the fixture to increase the distance between he buffer plates. The bladder needs to be compressed toward one of the football's vertices in order to make room for the instrumentation package assembly. The instrumentation package assembly is inserted through the cover/liner gap and inserted into the bladder's hollow central cavity 8. The bladder is decompressed and arranged so its ends line up with both of the interior surfaces of the buffer plates. The bladder is arranged so its gas valve 2 lines up with the accommodating hole in the cover/liner. The bladder is very lightly inflated with gas. Each end of the instrumentation package assembly is loaded into its respective buffer plate assembly bore. The instrumentation package assembly is rotated about the y-axis 5 of the bladder in order to align its cameras with the gap. The football's holding fixture is relaxed. The gas valve 2 is set. The football is laced up. The bladder is then fully inflated with gas 9. The instrumented football is then removed from the holding fixture. As the bladder is filled with gas, the hollow cavity 8 closes up and sandwiches the instrumentation package assembly inside the hollow cavity thereby further restraining movement of the instrumentation package assembly.

In a further preferred embodiment, the bladder is inflated with helium gas rather than air which is the gas used to inflate prior art bladders. The purpose of using helium gas rather than air is to reduce the inflated weight of the bladder, and thereby reduce the weight of the instrumented football from what it would otherwise be if its bladder were inflated with air.

Referring to the Preferred Embodiments Specified in FIG. 6A and FIG. 6B, the Bladder Satisfies all of the Following Further Objectives:

It is an objective of the present invention for the bladder to include a gas valve, gas, inner central hollow cylindrical cavity wall, open holes at both ends of the hollow cylinder, and an external pre-formed vesica piscis shape. It is an objective of the present invention for the bladder to provide sufficient space for the instrumentation package assembly inside the instrumented football so as not to interfere with its functions. It is a further objective of the present invention to enable the inflated bladder to shield the instrumentation package assembly from being damaged during the game. It is a further objective of the present invention to enable the inflated bladder to fit between the buffer plates and apply even pressure to the buffer plates within the instrumented football. It is a further objective of the present invention to enable the inflated bladder to prop up the cover/liner sandwich of the instrumented football to the same vesica piscis shape as with conventional professional league footballs. It is a further objective of the present invention to enable the inflated bladder to cradle the instrumentation package assembly so it will not become misaligned inside the instrumented football when subjected to shock and crushing forces during the game. It is an objective of the present invention to provide the instrumented football with a bladder that has provisions for holding the instrumentation package assembly and for cushioning and isolating the instrumentation package assembly from shocks received by the football during the game. It is an objective of the present invention to provide the instrumented football with a bladder that is of lighter weight compared to the bladder used in conventional footballs. It is an objective of the present invention for the instrumented football bladder to have an inner hollow cylindrical wall which provides a nesting and holding space for the instrumentation package assembly. It is an objective of the present invention for the instrumented football's inflated bladder's overall length to be shorter than conventional regulation football bladders. It is an objective of the present invention for the instrumented football's inflated bladder to prop up the cover of the instrumented football in the region around its central girth to the identical vesica piscis shape of the covers of conventional regulation footballs. It is an objective of the present invention for the instrumented football's inflated bladder to use the identical gas valve and gas valve location used in conventional regulation professional footballs. It is an objective of the present invention for the instrumented football's inflated bladder to keep the instrumentation package assembly aligned between the buffer plate assemblies when the football suffers shock and vibration during play. It is an objective of the present invention for the instrumented football's inflated bladder to dampen, moderate and cushion the severe shock and vibration that would otherwise be encountered by the instrumentation package assembly and its contents during a game. It is an objective of the present invention for the instrumented football's cover and liner hold the bladder in place and aligned relative to the cover.

It is an objective of the present invention for the instrumented football's bladder to be made from a lighter weight synthetic material having equal resilience and greater strength than the rubber used in regulation professional league footballs. It is an objective of the present invention to replace the conventional prior art liner material with Exxcore™ dynamically vulcanized alloy (DVA) liner material or with a similar strong light-weight material.

FIG. 6AA and FIG. 6BB

The detailed physical elements disclosed in the instrumented football bladder drawings shown in FIG. 6AA and FIG. 6BB are identified as follows: 1 is the bladder's outer wall. 2 is the gas valve. 3 is the gas that inflates the bladder. 4 is the bladder's y-axis. 5 is the bladder's x-axis. 6 is the bladder's z-axis. 7 is the bladder's inner wall. 8 is an end of the bladder. 9 is an end of the bladder.

FIG. 6AA is a top view of the inflated instrumented football bladder that is short and flat.

FIG. 6BB is a side view of the inflated instrumented football bladder that is short and flat.

Referring to drawings FIG. 6AA and FIG. 6BB, in a preferred embodiment, an instrumented football bladder is disclosed. The bladder is shown inflated with gas as it would be inside the instrumented football's cover. The bladder is circularly symmetric around its y-axis 4.

Figure 9A:
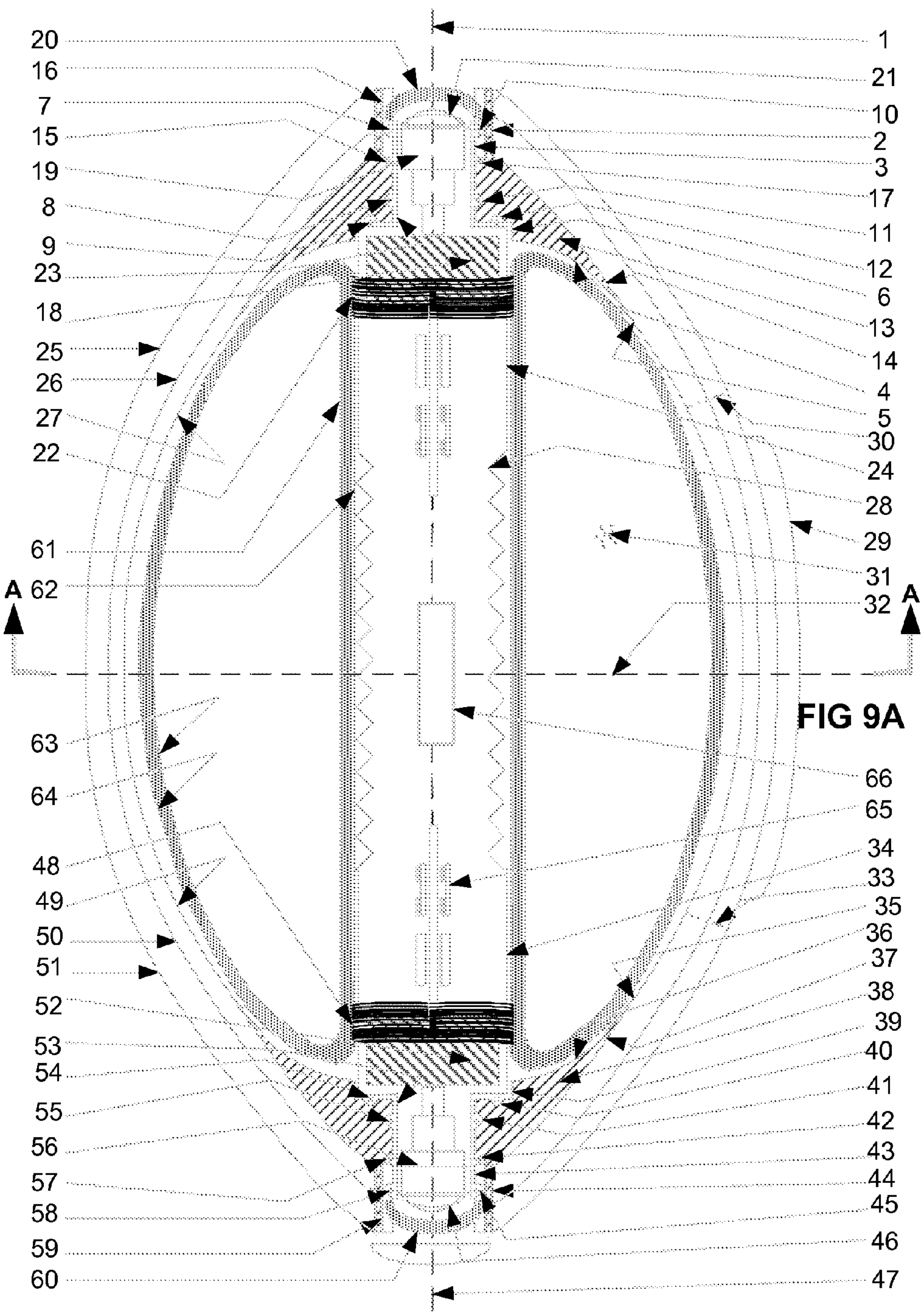
FIG. 9A is a side view section B-B of the instrumented football in FIG. 9B.
Figure 9B:
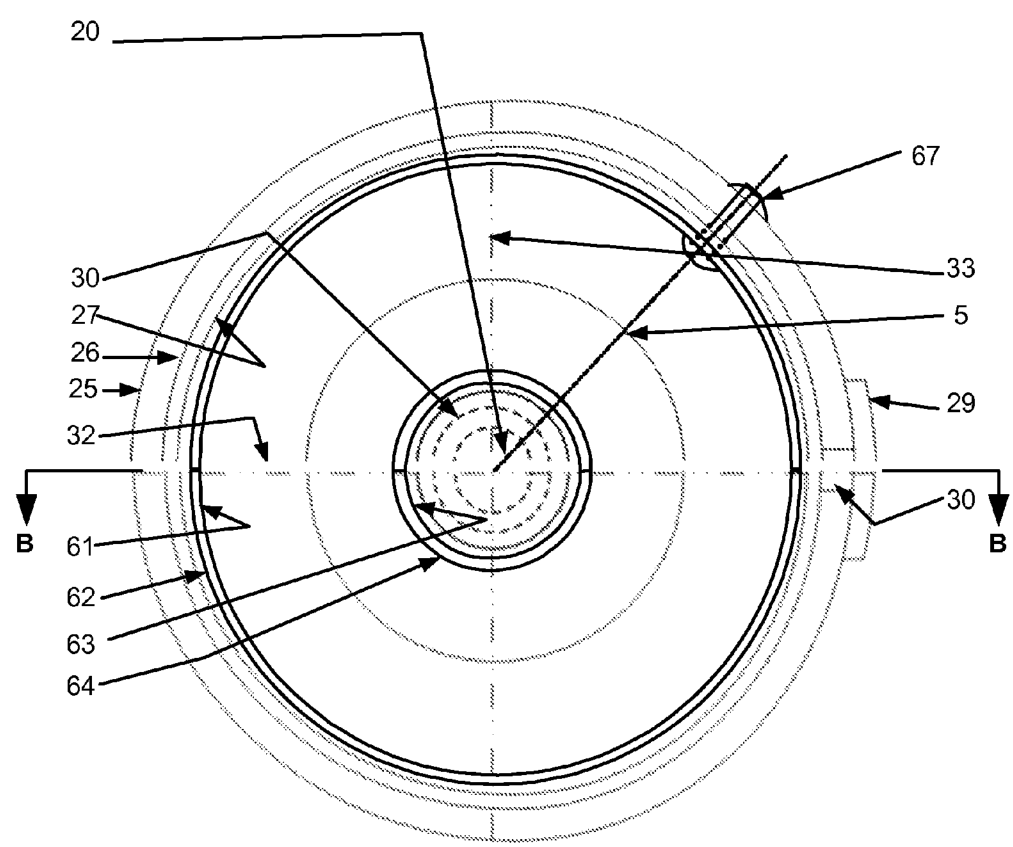
FIG. 9B is an end view section A-A of the instrumented football in FIG. 9A.
Figure 9C:
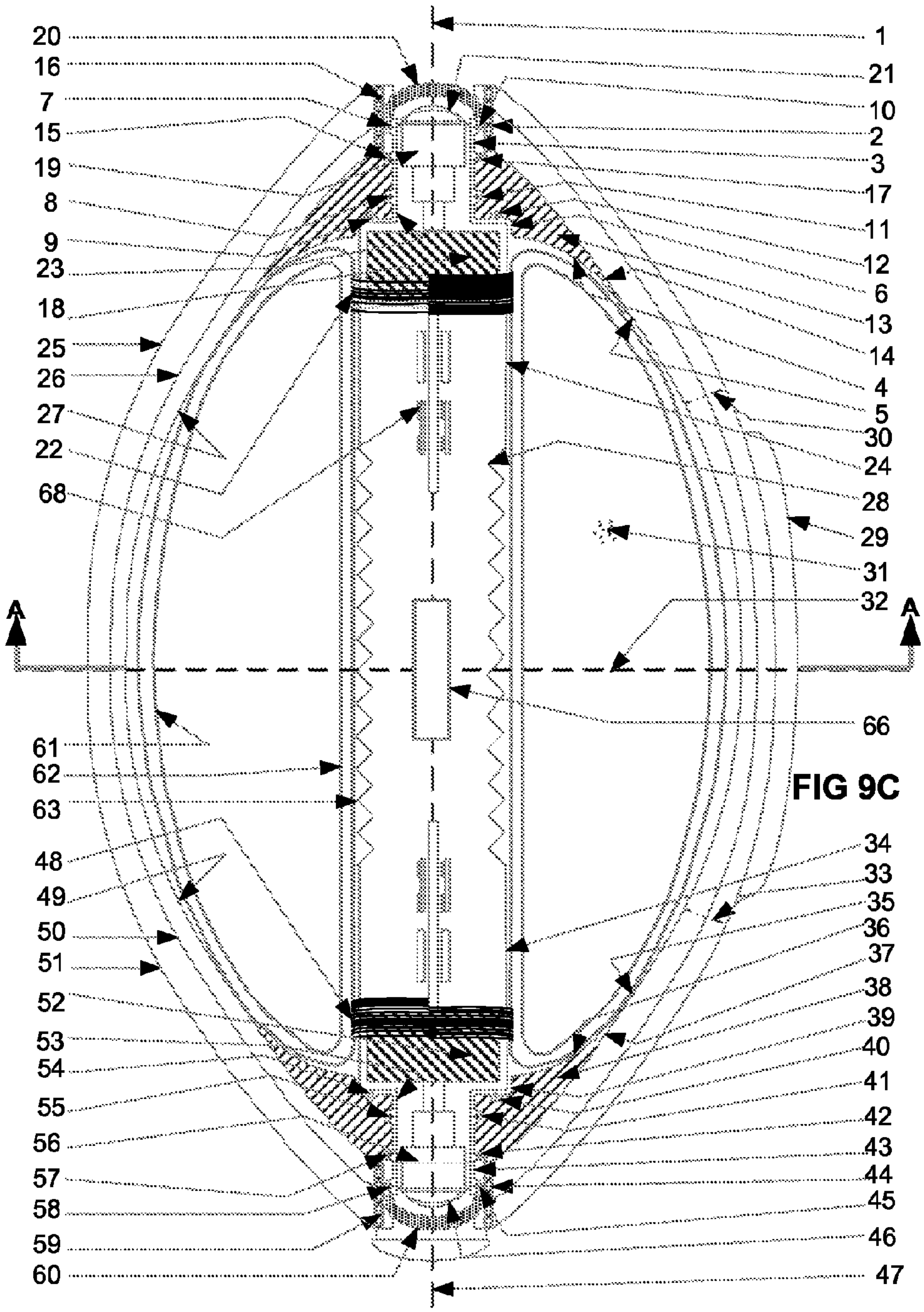
FIG. 9C is a side view section B-B of the instrumented football in FIG. 9D.
Figure 9D:
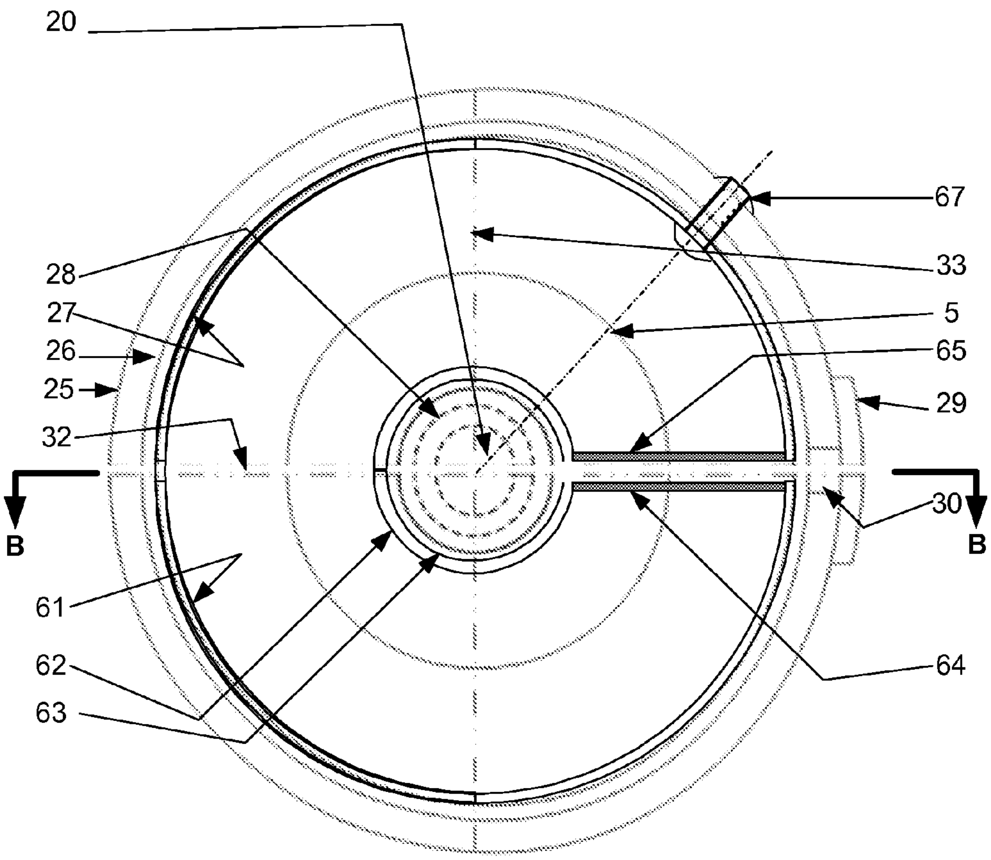
FIG. 9D is an end view section A-A of the instrumented football in FIG. 9C.
Figure 9E:
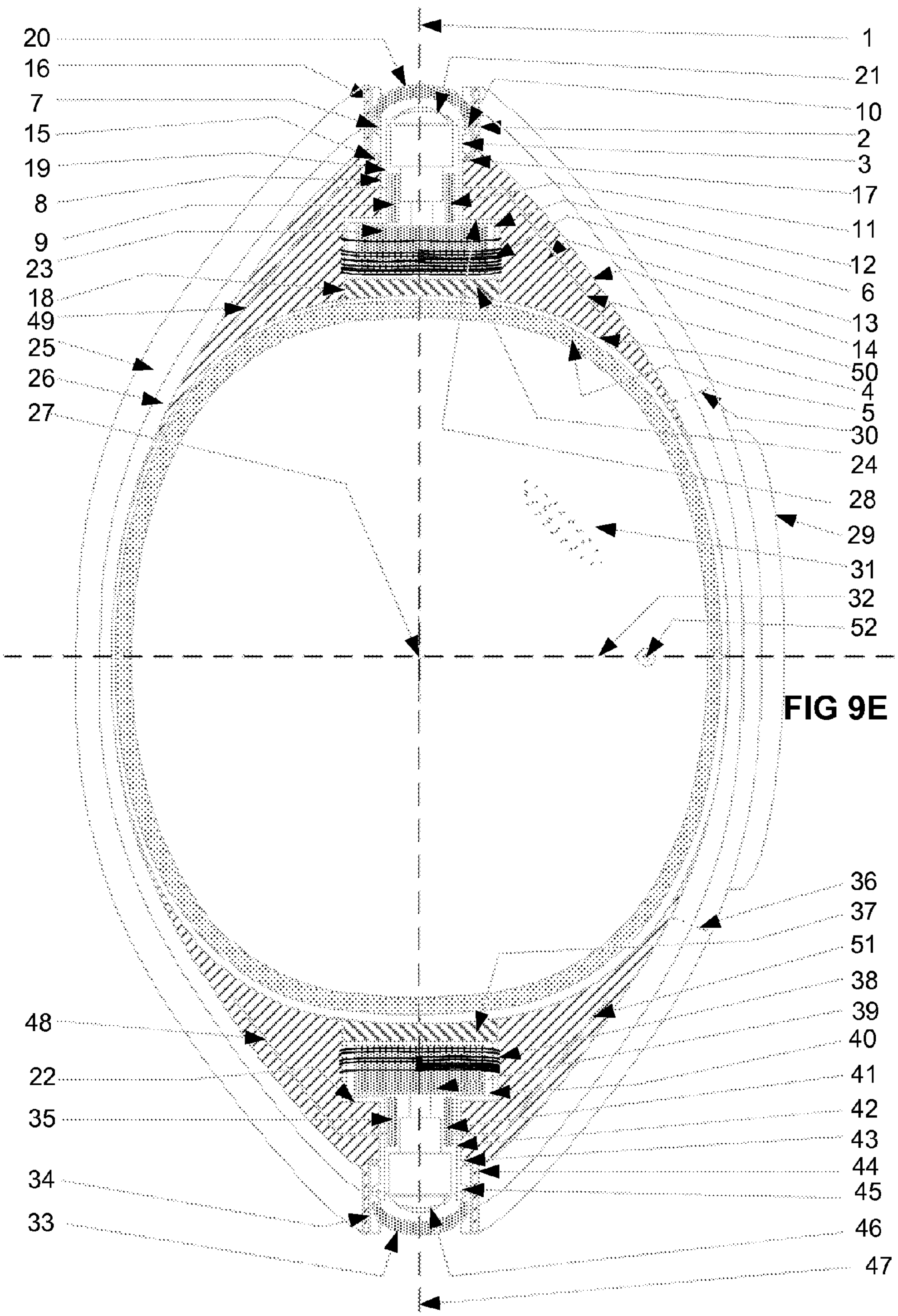
FIG. 9E is a side view section of the instrumented football.

The bladder is accommodated by the instrumented football specified in FIG. 9E.

The present bladder is distinguished from the conventional professional prior art football bladders by its nearly its flattened shaped ends 8 and 9, as compared to the vesica piscis shaped ends of the prior art bladders.

The present bladder is circularly symmetric around its y-axis centerline 4 and its x-axis centerline 5.

Additionally, the bladder is distinguished from the conventional bladder in that its overall length is shorter. It is shorter because the ends of the bladder are truncated in order to make the inflated bladder fit in the space between the two buffer plates in the interior of the instrumented football shown in FIG. 9E.

Additionally, the bladder is distinguished from the conventional bladder in that its vertices are pre-formed to match the shape of the curved interior surfaces of the buffer plates when the bladder is inflated inside the instrumented football, rather than match the vesica piscis shape of the interior walls of the cover/liner at the vertex in prior art conventional footballs. The present bladder is shaped to be in smooth contact to press up against the buffer plates when the bladder is inflated.

The buffer plates and instrumentation package assemblies that are used with the bladder for instrumented footballs are specified in FIG. 21II and FIG. 21JJ. The buffer plates mate with the interior cover/liner walls of the instrumented football. The ends of the buffer plates have the same vesica piscis shape as the interior cover/liner walls of the conventional prior art football vertices. The interior cover/liner walls of the instrumented football have the same vesica piscis shape as the interior cover/liner walls of the conventional prior art football vertices.

When the instrumented football is laced and inflated with gas through the gas valve 2. The outer wall 1 of the bladder presses on the interior wall of the football's cover/liner sandwich and on the interior curved surfaces of the two opposite buffer plates, thereby propping up the cover/liner sandwich and holding the bladder in place and aligned relative to the cover. The bladder has a pre-determined overall shape when inflated, and props up the instrumented football's cover to the same vesica piscis shape as the conventional prior art professional league American football.

The bladder is symmetric around its x-axis 5. The bladder is made with the same 1 vesica piscis shape in the region around its central girth, as the prior art bladder used in conventional professional footballs shown in FIG. 18A and FIG. 18B. Its gas valve 2 is identical to the gas valve used in conventional professional prior art football bladders. Its gas valve is in the same location on the bladder's x-z plane as with the conventional prior art football bladder.

When the football is laced and the bladder is fully inflated with gas 3, the outer wall of the bladder 1 presses against the interior wall of the football's liner and cover, thereby propping up the instrumented football to the same vesica piscis shape as the prior art conventional footballs. Conversely, the cover and liner hold the bladder in place and aligned relative to the cover.

The present bladder is made from the same natural rubber material as used with prior art conventional footballs. However, in order to meet our objective to make the bladder weigh less than prior art professional league football bladders, the bladder is made of a lighter weight synthetic material having equal resilience and greater strength than the rubber used in prior art professional league footballs.

In another preferred embodiment, the present bladder is made of a stronger material than the natural rubber used in conventional footballs. Exxon Exxcore™ DVA is an example of such a material. This stronger material enables the instrumented football's bladder to be made thinner and be of substantially lighter weight compared to the conventional prior art football bladders made of natural rubber. Despite its light weight, the instrumented football's bladder matches or exceeds the performance of the conventional professional league football bladder.

Exxcore™ dynamically vulcanized alloy (DVA), is a blend of specialty elastomer and nylon, and has been used as a next-generation resin for advanced tire innerliners. It affords up to an 80% reduction in bladder thickness in the instrumented football while still performing the same functions of the natural rubber bladder used in conventional footballs. This reduction in bladder thickness yields a weight (mass) difference between the instrumented football bladder and the conventional football bladder of up to 80%. In addition to performing the functions of the natural rubber bladder, the instrumented football bladder has a superior inflation pressure retention loss rate for the gas used to inflate the bladder.

The following steps describe an example of the production assembly process for the instrumented football which uses the bladder. The instrumented football cover/liner is held horizontally in a fixture with its gap facing up. The two buffer plates containing their respective instrumentation package assemblies are inserted into the football through its gap. The buffer plates are arranged at both vertices of the football and the cameras are aligned together. The buffer plates are bonded in place. The bladder is inserted into the football cover/liner through the gap. The bladder is arranged so its ends line up with both of the interior surfaces of the buffer plates. The bladder is arranged so its gas valve 2 lines up with the accommodating hole in the cover/liner. The bladder is very lightly inflated with gas. The football's holding fixture is relaxed. The gas valve 2 is set. The football is laced up. The bladder is then fully inflated with gas 3. The instrumented football is then removed from the holding fixture.

In a further preferred embodiment, the bladder is inflated with helium gas rather than air which is the gas used to inflate prior art bladders. The purpose of using helium gas rather than air is to reduce the inflated weight of the bladder, and thereby reduce the weight of the instrumented football from what it would otherwise be if its bladder were inflated with air.

Referring to the Preferred Embodiments Specified in FIG. 6AA and FIG. 6BB, the Bladder Satisfies all of the Following Further Objectives:

It is an objective of the present invention for the bladder to provide sufficient space for the instrumentation package assembly inside the instrumented football so as not to interfere with its functions. It is an objective of the present invention to provide the instrumented football with a bladder that is of lighter weight compared to the bladder used in prior art regulation conventional footballs. It is an objective of the present invention to enable the inflated bladder to press upon and restrain the two buffer plate assemblies which house the instrumentation package assemblies so they will not become misaligned inside the instrumented football when they are subjected to shock and crushing forces during the game. It is an objective of the present invention to enable the inflated bladder to shield the instrumentation package assembly from being damaged during the game.

It is an objective of the present invention to enable the inflated bladder to fit between the buffer plates and apply even pressure to the buffer plates within the instrumented football. It is an objective of the present invention to enable the inflated bladder to prop up the cover/liner sandwich of the instrumented football to the same vesica piscis shape as with regulation conventional professional league footballs. It is an objective of the present invention for the bladder to accommodate two identical and cheap instrumentation package assemblies. It is an objective of the present invention for the bladder to be nearly spherical in shape. It is an objective of the present invention for the bladder to be circularly symmetric around its y-axis centerline and circularly symmetric around its x-axis centerline. It is an objective of the present invention for the bladder to be accommodated by the instrumented football specified in FIG. 9E. It is an objective of the present invention for the bladder's shape to be nearly flattened at its vertices as compared to the vesica piscis shaped vertices of the prior art regulation conventional football bladders. It is an objective of the present invention for the bladder's overall length to be shorter than prior art regulation conventional football bladders. It is an objective of the present invention for the bladder's vertices to be pre-formed to match the shape of the non-vesica piscis curved interior surfaces of the buffer plates when the bladder is inflated inside the instrumented football. It is an objective of the present invention for the bladder to be shaped to be in smooth contact to press up against the buffer plates when the bladder is inflated. It is an objective of the present invention for the bladder's gas valve to be identical to the gas valve used in conventional professional prior art football bladders. It is an objective of the present invention for the bladder's gas valve to be in the same location on the bladder's x-z plane as with conventional prior art football bladders. It is an objective of the present invention for the inflated bladder to press against the interior wall of the football's liner and cover, thereby propping up the instrumented football to the same vesica piscis shape as the prior art regulation conventional footballs. It is an objective of the present invention for the bladder to be made of a lighter weight synthetic material having equal resilience and greater strength than the rubber used in prior art professional league regulation footballs. It is an objective of the present invention for the bladder's to be made of Exxon Exxcore™ DVA material. It is an objective of the present invention for the bladder to be made thinner and be of substantially lighter weight compared to the regulation conventional prior art football bladders made of natural rubber. It is an objective of the present invention for the bladder to have a superior inflation pressure retention loss rate for the gas used to inflate the bladder. It is an objective of the present invention for the bladder to be inflated with helium gas rather than air which is the gas used to inflate prior art bladders. It is an objective of the present invention for the instrumented football's inflated bladder to prop up the cover of the instrumented football in the region around its central girth to the identical vesica piscis shape of the covers of conventional regulation footballs. It is an objective of the present invention for the instrumented football's inflated bladder to keep the instrumentation package assembly aligned between the buffer plate assemblies when the football suffers shock and vibration during play. It is an objective of the present invention for the instrumented football's cover and liner hold the bladder in place and aligned relative to the cover.

FIG. 7A and FIG. 7B

The detailed physical elements disclosed in the instrumented football bladder drawings shown in FIG. 7A and FIG. 7B are identified as follows: 1 is the outer wall surface of the pre-formed bladder. 2 is the gas valve, 3 is the origin of the pre-formed bladder's three coordinate axis. 4 is the wall of the pre-formed bladder's inner central cylindrical cavity wall. 5 is the pre-formed bladder's y-axis. 6 is the pre-formed bladder's z-axis. 7 is the bladder's x-axis. 8 is the space inside the pre-formed bladder's hollow inner central cylindrical cavity. 9 is the gas that inflates the pre-formed bladder. 10 is the inside wall of the bladder. 11 and 12 are the surfaces of two interior parallel walls that form a slot in the bladder. 13 and 14 are the ends of the pre-formed bladder.

FIG. 7A shows a top view of an inflated instrumented football bladder that has a radial slot.

FIG. 7B shows an end view of the inflated instrumented football bladder that has a radial slot.

Referring to drawings FIG. 7A and FIG. 7B, in a preferred embodiment, a bladder that has a unique feature that distinguishes it from the bladder specified in FIG. 6A and FIG. 6B, and from conventional prior art football bladders, is disclosed.

The bladder has an open slot that runs radially outward from the central hollow cavity 8 to the outer wall 1 of the bladder. The slot walls are 11 and 12. The walls 11 and 12 run the full length of the bladder from end 13 to end 14 parallel to the y-axis 5. The slot will close up when the bladder is fully inflated with gas. The purpose of the slot is to enable the instrumentation package assembly to be assembled more quickly into the instrumented football than the bladder specified in FIG. 6A and FIG. 6B. The bladder is shown inflated with gas as it would be inside the instrumented football's cover.

The bladder is accommodated by the instrumented footballs specified in FIG. 9C and FIG. 9D, FIG. 10A and FIG. 10B, FIG. 11A and FIG. 11B, FIG. 13A and FIG. 13B, FIG. 16A and FIG. 16B, and FIG. 17 and FIG. 17B. These are the same instrumented footballs that also accommodate the bladders specified in FIG. 6A and FIG. 6B, and FIG. 8A and FIG. 8B.

The advantage of this present bladder 1 over the bladder specified in FIG. 6A and FIG. 6B is that it simplifies the assembly phase of the manufacturing process of the instrumented football and reduces the cost of production. The instrumentation package assembly is loaded and aligned more easily into the football using the present bladder 1. The instrumentation package assembly is loaded directly into the cylindrical cavity's hollow 8 of the bladder through the slot formed by 11 and 12.

The present bladder does have a disadvantage however in that it is more expensive to manufacture than the bladder specified in FIG. 6A and FIG. 6B.

The bladder accommodates the instrumentation package assemblies specified in FIG. 2A and FIG. 2B and FIG. 2C, FIG. 3A and FIG. 3B and FIG. 3C, FIG. 4A and FIG. 4B and FIG. 4C, FIG. 5A and FIG. 5B and FIG. 5C. These are the same instrumentation package assemblies that are accommodated by the bladder specified in FIG. 6A and FIG. 6B.

The following steps describe an example of the production assembly process for the instrumented football which uses the bladder: The football cover/liner is held horizontally in a fixture with its gap facing up. The buffer plates are inserted into the football through its gap. The buffer plates are arranged at both vertices of the football and aligned together. The buffer plates are bonded in place. The bladder is inserted into the football cover/liner through the gap. The bladder is arranged so its ends 13 and 14 line up with the interior surfaces of the buffer plates. The bladder is arranged so its gas valve 2 lines up with the accommodating hole in the cover/liner.

The bladder is arranged so its slot walls 11 and 12 line up with the gap in the cover/liner. The bladder is partially inflated with gas 9. The instrumentation package assembly is inserted into the football through the football's gap. The instrumentation package assembly is then inserted between the bladder's slot walls 11 and 12 and into the bladders hollow central cavity 8. The football is then stretched in the fixture, thereby increasing the distance between the buffer plates. Each end of the instrumentation package assembly is loaded into its respective buffer plat assembly bore. The instrumentation package assembly is then rotated about the y-axis 5 of the football in order to align its cameras with the gap. The gas valve 2 is set. The football is laced up. The bladder is then fully inflated with gas 9. The instrumented football is then removed from the holding fixture.

As the bladder is filled with gas 9, the two interior parallel walls of the slot 11 and 12 close up and touch, thereby sandwiching the instrumentation package assembly between them and further restraining movement of the instrumentation package assembly. When inflated, the bladder looks somewhat like a hotdog bun, with the hot dog being the instrumentation package assembly. The walls of the slot close up and press against one another along the full length of the slot when the bladder is inflated.

Comparing the steps of this assembly procedure with the ones used for the bladder specified in FIG. 6A and FIG. 6B, the former assembly procedure is less complex and time consuming because it permits the instrumentation package assembly to enter the bladder's cavity in one direct simple step without having to rearrange the bladder.

In order to meet our objective to make the bladder weigh less than professional league football bladders, the bladder uses a lighter weight synthetic material having equal resilience and greater strength rather than the rubber used in professional league footballs.

In a preferred embodiment, the bladder is made of a stronger material than the natural rubber used in conventional footballs. Exxon Exxcore™ DVA is an example of such a material. The stronger material enables the instrumented football's bladder to be made thinner and be of substantially lighter weight compared to the conventional football bladders made of natural rubber. Despite its light weight, the instrumented football's bladder matches or exceeds the performance of the conventional professional league football bladder.

Exxcore™ dynamically vulcanized alloy (DVA), is a blend of specialty elastomer and nylon, and has been used as a next-generation resin for advanced tire innerliners. It affords up to an 80% reduction in bladder thickness in the instrumented football while still performing the same functions of the natural rubber bladder used in conventional footballs. This reduction in bladder thickness yields a weight (mass) difference between the instrumented football bladder and the conventional football bladder of up to 80%. In addition to performing the functions of the natural rubber bladder, the instrumented football bladder has a superior inflation pressure retention loss rate for the gas used to inflate the bladder.

Besides the open slot, the bladder is distinguished from the conventional professional football bladder by the inclusion of an inner hollow cylindrical wall 4 which forms a symmetrically disposed cylindrical cavity space 8 extending down the full length of the long y-axis centerline 5 of the bladder. There is no gas in this space besides air. The purpose of this space is to provide a nest for the instrumentation package assembly. The instrumentation package assembly will occupy this space inside the instrumented football. The inflated bladder will hug and hold the instrumentation package assembly in this space. For example, refer to FIG. 1A and FIG. 1B and FIG. 1C and FIG. 1D.

Additionally, the bladder is distinguished from the conventional bladder in that its overall length is shorter. It is shorter because the ends of the bladder are truncated in order to make the inflated bladder fit in the space between the two buffer plates in the interior of the instrumented football shown in FIG. 10A and FIG. 10B.

Additionally, the bladder is distinguished from the conventional bladder in that its vertices are pre-formed to match the shape of the curved interior surfaces of the buffer plates when the bladder is inflated inside the instrumented football, rather than match the vesica piscis shape of the interior walls of the cover/liner at the vertex in conventional footballs. The bladder is shaped to be in smooth contact and press up against the buffer plates when the bladder is inflated. Various preferred embodiments of buffer plates that are used with the bladder for instrumented footballs are shown in FIG. 21A and FIG. 21B, FIG. 21C and FIG. 21D, FIG. 21E and FIG. 21F, FIG. 21G and FIG. 21H, FIG. 21I and FIG. 21J, FIG. 21II and FIG. 21JJ, FIG. 21K, and FIG. 21L and FIG. 21M.

When the instrumented football is laced and inflated with gas 9 through the gas valve 2, the outer wall 1 of the bladder presses on the interior wall of the football's cover/liner sandwich and on the interior curved surfaces of the two opposite buffer plates, thereby propping up the cover/liner sandwich and holding the bladder in place and aligned relative to the cover. The bladder has a pre-determined overall shape when inflated, and props up the instrumented football's cover to the same shape as the conventional professional league American football.

The bladder is symmetric around the y-axis 5. The bladder is made with the same 1 vesica piscis shape in the region around its central girth, as the bladder used in conventional professional footballs shown in FIG. 18A and FIG. 18B. Its gas valve 2 is identical to the gas valve used in conventional professional football bladders. Its gas valve is in the same location on the bladder's x-z plane as with the conventional football bladder.

The diameter of the bladder's hollow cavity 8 formed by the wall 4, is made so that after inflation with gas 9 it is smaller than the diameter of the skin of the instrumentation package assembly, thereby causing an interference fit between the two. The inner cylindrical cavity wall 4 presses inwardly on the skin of the instrumentation package assembly which is nested within the cavity, thereby restraining the instrumentation package assembly from moving and keeping it aligned to the cover when the football suffers shock and vibration during play. Additionally, the bladder acts essentially as a shock and vibration isolator. The bladder acts to dampen, moderate and cushion the severe shock and vibration that would otherwise be encountered by the instrumentation package assembly and its contents.

When the football is laced and the bladder is fully inflated with gas 9, the outer wall of the bladder 1 presses against the interior wall of the football's liner and cover, thereby propping up the football to the same vesica piscis shape that conventional footballs have. Conversely, the cover and liner hold the bladder in place and aligned relative to the cover.

In a further preferred embodiment, the bladder is inflated with helium gas rather than air which is the gas used to inflate prior art bladders. The purpose of using helium gas 9 rather than air is to reduce the inflated weight of the bladder, and thereby reduce the weight of the instrumented football from what it would otherwise be if its bladder were inflated with air.

Referring to the Preferred Embodiments Specified in FIG. 7A and FIG. 7B, the Bladder Satisfies all of the Following Objectives:

It is an objective of the present invention to provide a bladder which reduces the time of assembling the instrumentation package assembly into the instrumented football. It is an objective of the present invention for the bladder to provide sufficient space for the instrumentation package assembly inside the instrumented football so as not to interfere with its functions. It is a further objective of the present invention to enable the inflated bladder to cradle the instrumentation package assembly so it will not become misaligned inside the instrumented football when subjected to shock and crushing forces during the game. It is a further objective of the present invention to enable the inflated bladder to shield the instrumentation package assembly from being damaged during the game. It is a further objective of the present invention to enable the inflated bladder to fit between the buffer plates and apply even pressure to the buffer plates within the instrumented football. It is a further objective of the present invention to enable the inflated bladder to prop up the cover/liner sandwich of the instrumented football to the same vesica piscis shape as with conventional professional league footballs. It is an objective of the present invention to provide the instrumented football with a bladder that has provisions for holding the instrumentation package assembly and for cushioning and isolating the instrumentation package assembly from shocks received by the football during the game. It is an objective of the present invention to provide the instrumented football with a bladder that is of lighter weight compared to the bladder used in conventional footballs. It is an objective of the present invention to provide the instrumented football with a bladder that has provisions for holding the instrumentation package assembly and for cushioning and isolating the instrumentation package assembly from shocks received by the football during the game. It is an objective of the present invention to provide the instrumented football with a bladder that has a hollow cylindrical region down the length of the bladder to nest and protect the instrumentation package. It is an objective of the present invention to provide the instrumented football with a bladder that has a hollow cylindrical region down the length of the bladder to make space for the instrumentation package assembly. It is an objective of the present invention to provide the instrumented football with a bladder that has an open slot that runs radially outward from its central hollow cavity to the outer wall of the bladder along the full length of the bladder. It is an objective of the present invention to provide the instrumented football with a bladder that has an open slot that closes up along the full length of the bladder when the bladder is inflated. It is an objective of the present invention to provide the instrumented football with a bladder that enables the instrumentation package assembly to be assembled and aligned more quickly into the instrumented football. It is an objective of the present invention to provide the instrumented football with a bladder that is widely accepted among the various instrumented football embodiments such as those specified in FIG. 9C and FIG. 9D, FIG. 10A and FIG. 10B, FIG. 11A and FIG. 11B, FIG. 13A and FIG. 13B, FIG. 16A and FIG. 16B, and FIG. 17 and FIG. 17B that also accommodate the bladders specified in FIG. 6A and FIG. 6B, and FIG. 8A and FIG. 8B. It is an objective of the present invention to provide the instrumented football with a bladder that accommodates the instrumentation package assemblies specified in FIG. 2A and FIG. 2B and FIG. 2C, FIG. 3A and FIG. 3B and FIG. 3C, FIG. 4A and FIG. 4B and FIG. 4C, FIG. 5A and FIG. 5B and FIG. 5C which also accommodate the bladder specified in FIG. 6A and FIG. 6B. It is an objective of the present invention to provide the instrumented football with a bladder that bladder weighs less than professional league football bladders. It is an objective of the present invention to provide the instrumented football with a bladder that uses a lighter weight synthetic material having equal resilience and greater strength rather than the rubber used in professional league regulation footballs. It is an objective of the present invention to provide the instrumented football with a bladder that the bladder is made of a stronger material than the natural rubber used in conventional footballs. It is an objective of the present invention to provide the instrumented football with a bladder that is made of Exxon Exxcore™ DVA material. It is an objective of the present invention to provide the instrumented football with a bladder that will hug and hold the instrumentation package assembly in place, like in FIG. 1A and FIG. 1B and FIG. 1C and FIG. 1D regardless of the shock, vibration and crushing loads that the instrumented football endures during a game. It is an objective of the present invention to provide the instrumented football with a bladder that accommodates the various preferred embodiments of buffer plates that are used like those shown in FIG. 21A and FIG. 21B, FIG. 21C and FIG. 21D, FIG. 21E and FIG. 21F, FIG. 21G and FIG. 21H, FIG. 21I and FIG. 21J, FIG. 21II and FIG. 21JJ, FIG. 21K, and FIG. 21L and FIG. 21M. It is an objective of the present invention to provide the instrumented football with a bladder whose hollow cylindrical cavity forms an interference fit with the skin of the instrumentation package assembly which is nested within the cavity, thereby restraining the instrumentation package assembly from moving and keeping it aligned to the cover when the football suffers shock and vibration during play. It is an objective of the present invention to provide the instrumented football with a bladder that acts essentially as a shock and vibration isolator for the instrumentation package assembly and its contents. It is an objective of the present invention to provide the instrumented football with a bladder that is inflated with helium gas rather than air which is the gas used to inflate prior art bladders. It is an objective of the present invention for the bladder to include a gas valve, gas, inner central hollow cylindrical cavity wall, open holes at both ends of the hollow cylinder, single slot radial walls, and an external pre-formed vesica piscis shape. It is an objective of the present invention for the bladder to have an open slot that runs radially outward from the central hollow cavity to the outer wall of the bladder. It is an objective of the present invention for the bladder to enable the instrumentation package assembly to be assembled more quickly into the instrumented football than bladders without a slot. It is an objective of the present invention to provide the instrumented football with a bladder that has slot walls that will close up and press flat against one another when the both halves of the bladder are fully inflated with gas. It is an objective of the present invention to enable the inflated bladder to press upon and restrain the two buffer plate assemblies which house the instrumentation package assemblies so they will not become misaligned inside the instrumented football when they are subjected to shock and crushing forces during the game. It is an objective of the present invention for the bladder's overall length to be shorter than prior art regulation conventional football bladders. It is an objective of the present invention for the bladder's vertices to be pre-formed to match the shape of the non-vesica piscis curved interior surfaces of the buffer plates when the bladder is inflated inside the instrumented football. It is an objective of the present invention for the bladder to be shaped to be in smooth contact to press up against the buffer plates when the bladder is inflated. It is an objective of the present invention for the bladder's gas valve to be identical to the gas valve used in conventional professional prior art football bladders. It is an objective of the present invention for the bladder's gas valve to be in the same location on the bladder's x-z plane as with conventional prior art football bladders. It is an objective of the present invention for the inflated bladder to press against the interior wall of the football's liner and cover, thereby propping up the instrumented football to the same vesica piscis shape as the prior art regulation conventional footballs. It is an objective of the present invention for the bladder to be made of a lighter weight synthetic material having equal resilience and greater strength than the rubber used in prior art professional league regulation footballs. It is an objective of the present invention for the bladder's to be made of Exxon Exxcore™ DVA material. It is an objective of the present invention for the bladder to be made thinner and be of substantially lighter weight compared to the regulation conventional prior art football bladders made of natural rubber. It is an objective of the present invention for the bladder to have a superior inflation pressure retention loss rate for the gas used to inflate the bladder. It is an objective of the present invention for the bladder to be inflated with helium gas rather than air which is the gas used to inflate prior art bladders. It is an objective of the present invention for the instrumented football's inflated bladder to keep the instrumentation package assembly aligned between the buffer plate assemblies when the football suffers shock and vibration during play. It is an objective of the present invention for the instrumented football's cover and liner hold the bladder in place and aligned relative to the cover. It is an objective of the present invention to provide the instrumented football with a bladder that has slot walls that will close up and press flat against one another when the both halves of the bladder are fully inflated with gas, and then may be cemented to one another.

FIG. 7AA and FIG. 7BB and FIG. 7CC

The detailed physical elements disclosed in the instrumented football bladder drawings shown in FIG. 7AA and FIG. 7BB and FIG. 7CC are identified as follows: 1 is the bladder's outer wall. 2 is the gas valve. 3 is the gas that inflates the bladder. 4 is the fold in the bladder wall. 5 is the bladder's x-axis. 6 is the fold in the bladder wall. 7 is the bladder's inner wall. 8 is dimple in the bladder. 9 is dimple in the bladder. 10 is the bladder's z-axis. 11 is the bladder's y-axis. 12 is the end of the bladder. 13 is the end of the bladder. 14 is the virtual vertex of the bladder. 15 is the virtual vertex of the bladder.

FIG. 7AA is a top view of the inflated instrumented football bladder that is dimpled.

FIG. 7BB is an end view of the inflated instrumented football bladder that is dimpled.

FIG. 7CC is a side view A-A section of FIG. 7AA.

There is no space inside a conventional prior art football's cover to instrument it with an instrumentation package assembly. The entire space inside the conventional football's cover is taken up by the conventional football's inflated bladder filled with air gas.

Referring to drawings FIG. 7AA and FIG. 7BB and FIG. 7CC, in a preferred embodiment, a conventional football cover/liner instrumented with two instrumentation packages and two buffer plate assemblies, while still retaining the conventional football's existing cover/liner and bladder, is disclosed.

The present bladder is distinguished from the conventional professional prior art football bladders by its dimpled vesica piscis shaped ends 8 and 9, as compared to the vesica piscis shaped ends of the prior art bladders vertices. The dimples are created simply by taking an existing prior art bladder used in regulation conventional footballs and applying pressure to push in both vertices.

In the present invention, an existing American football cover is used. Precision holes are bored in each of the cover's vertices. The circumferences of the holes are then precisely stitched to form a precision hole. The cover is arranged and held in a fixture with its gap on top. Two buffer plate assemblies are inserted into the conventional cover's cavity through the lacing gap in the top of the cover. The buffer plates and instrumentation package assemblies are specified in FIG. 21LL and FIG. 21MM. Each of the buffer plates contains an instrumentation package assembly. Each of the buffer plates is inserted into the holes at each of the cover's vertices and bonded and sealed in place to the inside cover/liner wall at each vertex. The buffer plate's exterior surface matches the interior vesica piscis shape of the cover. The buffer plate's interior surface is a bulge in the form of an inverted vesica piscis shape. The conventional football's existing bladder is inserted into the conventional cover's cavity through the lacing gap in the top of the cover. Both ends of the conventional football bladder are tucked in to form dimples 8 and 9. The gas valve 2 is set. The bladder is partially inflated with gas 3. The gap is laced up and closed. The bladder is fully inflated with gas 3. The bladder expands to the classic vesica piscis shape when fully inflated and laced under the conventional football's cover. The football, now an instrumented football, is removed from the holding fixture.

The bladder is shown inflated with gas as it would be inside the instrumented football's cover.

Figure 9F:
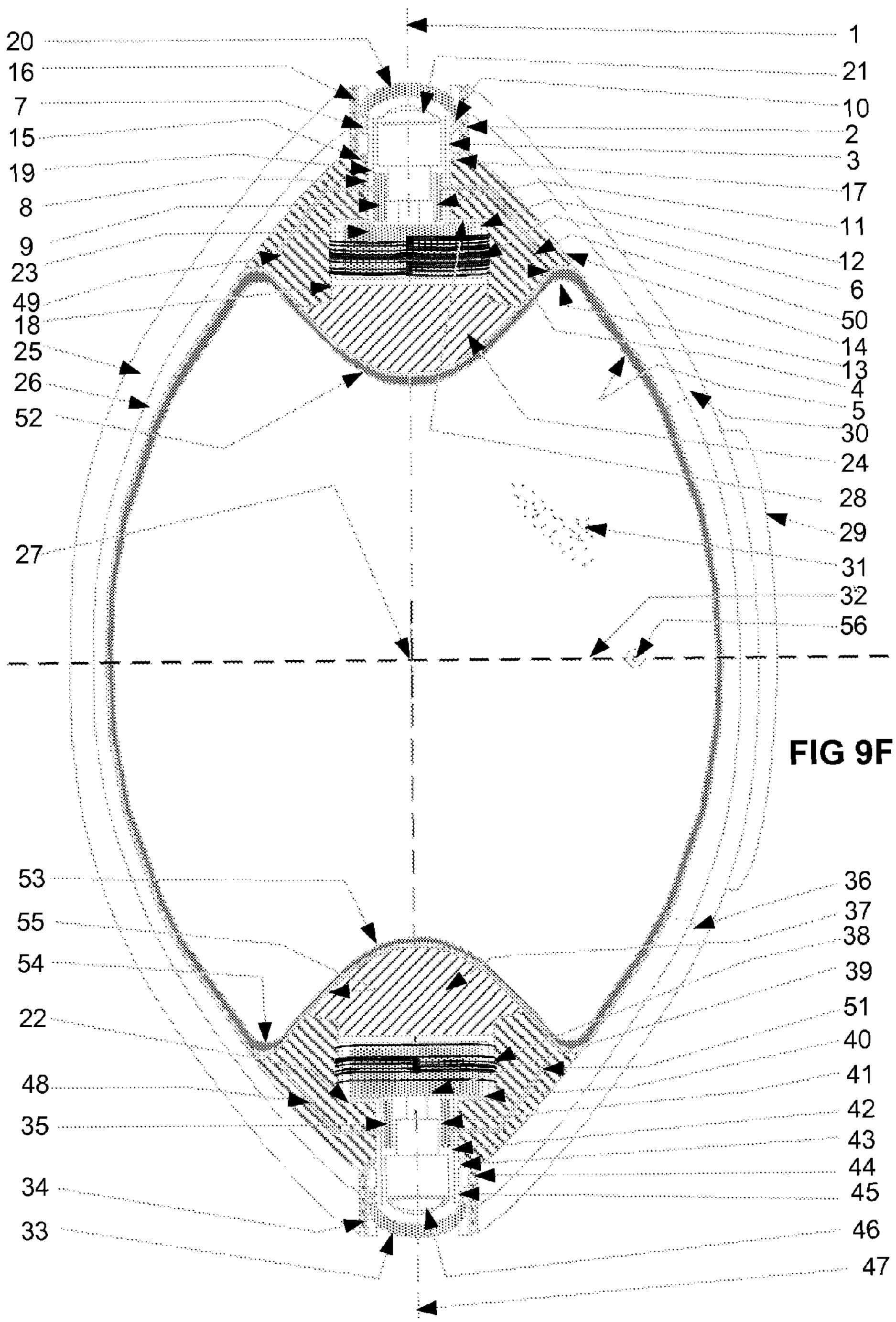
FIG. 9F is a side view section of an instrumented football with a modified prior art cover and bladder.

The bladder is accommodated by the instrumented football specified in FIG. 9F.

The present bladder is distinguished from the conventional professional prior art football bladders by its dimpled vesica piscis shaped ends 8 and 9, as compared to the vesica piscis shaped ends of the prior art bladders vertices. The dimples are created simply by taking an existing prior art bladder used in regulation conventional footballs and applying pressure to push in both vertices. The benefit of the present bladder's dimple is that it allows more space for the instrumentation package assembly inside the football than the un-dimpled bladder shown in FIG. 6AA and FIG. 6BB. Another benefit of the present bladder's dimple is that it allows the use of the same identical prior art bladders used in regulation conventional footballs. The prior art football bladders are just dimpled at each of their ends to form the bladder of the present invention without materially changing the prior art bladder. Since the prior art bladders are already available, this nullifies the development cost of the present dimpled bladders. This bladder is simple because it already exists except for the dimples which are easily created at no cost.

The present bladder embodiment shown in FIG. 7AA and FIG. 7BB and FIG. 7CC accommodates the instrumented football shown in FIG. 9F and uses the buffer plate assemblies shown in FIG. 21LL and FIG. 21MM. This bladder embodiment has an advantage of simplicity and zero development cost compared with the various other bladder preferred embodiments. It can be introduced into venues where cost is an issue and where the cost of other embodiments presents an economic barrier. This embodiment has some disadvantages. The physical size of the instrumentation package assemblies is limited. The battery packs are small thereby creating a lower time of powered operation and a potentially smaller wireless range of RF transmission. The smaller space for electronics limits the bandwidth thereby potentially limiting the picture and sound quality.

The present bladder is circularly symmetric around its y-axis centerline 11 and its x-axis centerline 5

Additionally, the bladder is distinguished from the conventional bladder in that its overall length is shorter. It is shorter because the ends of the bladder are dimpled in order to make the inflated bladder fit in the space between the two buffer plates in the interior of the instrumented football shown in FIG. 9F.

This bladder has an advantage over the bladder disclosed in FIG. 6AA and FIG. 6BB because it not only cushions the instrumentation package assemblies, but it cradles the buffer plate assemblies which contain the instrumentation package assemblies by holding them within its dimple.

Additionally, the bladder is distinguished from the conventional prior art bladder in that the present bladder's vesica piscis shaped dimples are pre-formed to match the shape of the curved interior surfaces of the buffer plates when the bladder is inflated inside the instrumented football, rather than match the vesica piscis shape of the interior walls of the cover/liner at the vertex in prior art conventional footballs. The present bladder is shaped to be in smooth contact to press up against the buffer plates when the bladder is inflated and to cradle them.

The buffer plates mate with the interior cover/liner walls of the instrumented football. The ends of the buffer plates have the same vesica piscis shape as the interior cover/liner walls of the conventional prior art football vertices. The interior cover/liner walls of the instrumented football have the same vesica piscis shape as the interior cover/liner walls of the conventional prior art football vertices.

When the instrumented football is laced and inflated with gas 3 through the gas valve 2. The outer wall 1 of the bladder presses on the interior wall of the football's cover/liner sandwich and on the interior curved surfaces of the two opposite buffer plates, thereby propping up the cover/liner sandwich and holding the bladder in place and aligned relative to the cover. The bladder has a pre-determined overall shape when inflated, and props up the instrumented football's cover to the same vesica piscis shape as the conventional prior art professional league American football.

The bladder is symmetric around its x-axis 5. The present bladder is formed from a prior art conventional professional football bladder made of natural rubber. The vertices of the prior art conventional professional football bladder are simply tucked in and folded at 6 and 4 to form dimples 8 and 9. The vertices are shown as 15 and 14 respectively.

Its gas valve 6 is identical to the gas valve used in conventional professional prior art football bladders. Its gas valve 2 is in the same location on the bladder's x-z plane as with the conventional prior art football bladder.

When the football is laced and the bladder is fully inflated with gas 3, the outer wall of the bladder 1 presses against the interior wall of the football's liner and cover, thereby propping up the instrumented football to the same vesica piscis shape as the prior art conventional footballs. Conversely, the cover and liner hold the bladder in place and aligned relative to the cover.

The present bladder is made from the same natural rubber material used in prior art conventional football bladders.

In an alternative preferred embodiment, the instrumented football uses a bladder that is of lighter weight compared to the bladder used in conventional footballs. The bladder is made of a lighter weight synthetic material having equal resilience and greater strength than the rubber used in prior art professional league footballs.

In a preferred embodiment, the present bladder is made of a stronger material than the natural rubber used in conventional footballs. Exxon Exxcore™ DVA is an example of such a material. This stronger material enables the instrumented football's bladder to be made thinner and be of substantially lighter weight compared to the conventional prior art football bladders made of natural rubber. Despite its light weight, the instrumented football's bladder matches or exceeds the performance of the conventional professional league football bladder.

Exxcore dynamically vulcanized alloy (DVA), is a blend of specialty elastomer and nylon, and has been used as a next-generation resin for advanced tire innerliners. It affords up to an 80% reduction in bladder thickness in the instrumented football while still performing the same functions of the natural rubber bladder used in conventional footballs. This reduction in bladder thickness yields a weight (mass) difference between the instrumented football bladder and the conventional football bladder of up to 80%. In addition to performing the functions of the natural rubber bladder, the instrumented football bladder has a superior inflation pressure retention loss rate for the gas used to inflate the bladder.

The following steps describe an example of the production assembly process for the instrumented football which uses the bladder. The instrumented football cover/liner is held horizontally in a fixture with its gap facing up. The cover/liner is identical to the cover/liner used with prior art conventional footballs. The two buffer plates containing their respective instrumentation package assemblies are inserted into the football cover/liner through its gap. The buffer plates are arranged at both vertices of the football and the cameras are aligned together. The buffer plates are bonded in place. The bladder is inserted into the football cover/liner through the gap. The vertices of the bladder are tucked in and arranged so its dimpled ends line up with both of the interior surfaces bulges of the buffer plates. The bladder is arranged so its gas valve 2 lines up with the accommodating hole in the cover/liner. The bladder is very lightly inflated with gas. The football's holding fixture is relaxed. The gas valve 2 is set. The football is laced up. The bladder is then fully inflated with gas 3. The instrumented football is then removed from the holding fixture.

In a further preferred embodiment, the bladder is inflated with helium gas rather than air which is the gas used to inflate prior art bladders. The purpose of using helium gas 3 rather than air is to reduce the inflated weight of the bladder, and thereby reduce the weight of the instrumented football from what it would otherwise be if its bladder were inflated with air.

Referring to the Preferred Embodiments Specified in FIG. 7AA and FIG. 7BB and FIG. 7CC, the Bladder Satisfies all of the Following Objectives:

It is an objective of the present invention for the bladder to provide sufficient space for the instrumentation package assembly inside the instrumented football so as not to interfere with its functions. In an alternative preferred embodiment, it is an objective of the present invention to also provide the instrumented football with a bladder that is of lighter weight compared to the bladder used in conventional footballs. In order to meet our objective to make the bladder weigh less than prior art professional league football bladders. It is an objective of the present invention to instrument a conventional football while still retaining both its existing cover and bladder. It is a further objective of the present invention to enable the inflated bladder to press upon and restrain the two buffer plate assemblies which house the instrumentation package assemblies so they will not become misaligned inside the instrumented football when they are subjected to shock and crushing forces during the game. It is a further objective of the present invention to enable the inflated bladder to shield the instrumentation package assembly from being damaged during the game. It is a further objective of the present invention to enable the inflated bladder to fit between the buffer plates and apply even pressure to the buffer plates within the instrumented football. It is a further objective of the present invention to enable the inflated bladder to prop up the cover/liner sandwich of the instrumented football to the same vesica piscis shape as with conventional professional league footballs. It is an objective of the present invention to provide the instrumented football with a bladder that is of zero cost to develop. It is an objective of the present invention to provide the instrumented football with a bladder that is identical to existing prior art bladders with the exception that it is dimpled. It is an objective of the present invention to provide the instrumented football with a bladder that is accommodated by the instrumented football specified in FIG. 9F. It is an objective of the present invention to provide the instrumented football with a bladder that is circularly symmetric around its y-axis centerline and its x-axis centerline.

It is an objective of the present invention to provide the instrumented football with a bladder that not only cushions the instrumentation package assemblies, but cradles the buffer plate assemblies which contain the instrumentation package assemblies by holding them within its dimple.

It is an objective of the present invention to provide the instrumented football with a bladder that has vesica piscis shaped dimples that are pre-formed to match the vesica piscis shape of the curved interior surfaces of the buffer plates when the bladder is inflated inside the instrumented football.

It is an objective of the present invention to provide the instrumented football with a bladder that is shaped to be in smooth contact to press up against the buffer plates when the bladder is inflated and to cradle them. It is an objective of the present invention to provide the instrumented football with a bladder that is made of a lighter weight material compared to the natural rubber used in regulation prior art conventional footballs but has the identical form of prior art existing bladders except for its dimples. It is an objective of the present invention for the bladder to accommodate two cheap instrumentation package assemblies. It is an objective of the present invention for the bladder to be nearly spherical in shape. It is an objective of the present invention for the bladder to be circularly symmetric around its y-axis centerline and circularly symmetric around its x-axis centerline.

It is an objective of the present invention for the bladder to be accommodated by the instrumented football specified in FIG. 9F. It is an objective of the present invention for the bladder's overall length to be shorter than prior art regulation conventional football bladders. It is an objective of the present invention for the bladder's vertices to be pre-formed to match the shape of the vesica piscis curved interior surfaces of the buffer plates when the bladder is inflated inside the instrumented football. It is an objective of the present invention for the bladder to be shaped to be in smooth contact to press up against the buffer plates when the bladder is inflated. It is an objective of the present invention for the bladder's gas valve to be identical to the gas valve used in conventional professional prior art football bladders. It is an objective of the present invention for the bladder's gas valve to be in the same location on the bladder's x-z plane as with conventional prior art football bladders. It is an objective of the present invention for the inflated bladder to press against the interior wall of the football's liner and cover, thereby propping up the instrumented football to the same vesica piscis shape as the prior art regulation conventional footballs. It is an objective of the present invention for the bladder's to be made of Exxon Exxcore™ DVA material. It is an objective of the present invention for the bladder to be made thinner and be of substantially lighter weight compared to the regulation conventional prior art football bladders made of natural rubber. It is an objective of the present invention for the bladder to have a superior inflation pressure retention loss rate for the gas used to inflate the bladder. It is an objective of the present invention for the bladder to be inflated with helium gas rather than air which is the gas used to inflate prior art bladders. It is an objective of the present invention for the instrumented football's inflated bladder to prop up the cover of the instrumented football in the region around its central girth to the identical vesica piscis shape of the covers of conventional regulation footballs. It is an objective of the present invention for the instrumented football's inflated bladder to keep the instrumentation package assembly aligned between the buffer plate assemblies when the football suffers shock and vibration during play. It is an objective of the present invention for the instrumented football's cover and liner hold the bladder in place and aligned relative to the cover.

FIG. 8A and FIG. 8B

The detailed physical elements disclosed in the instrumented football bladder drawings shown in FIG. 8A and FIG. 8B are identified as follows: 1 is the outer wall surface of the pre-formed bladder. 2 and 17 are identical gas valves. 3 is the origin of the pre-formed bladder's three coordinate axis system. 4 and 18 are each half of the cylindrical central hollow cavity wall. 5 is the pre-formed bladder's y-axis. 6 is the pre-formed bladder's z-axis. 7 is the pre-formed bladder's x-axis. 8 is the space inside the pre-formed bladder's hollow inner central cylindrical cavity. 9 is the gas that inflates the pre-formed bladder halves. 10 and 19 are the inside of the bladder. 11 and 12 and 15 and 16 are the surfaces of the two interior parallel walls that form a slot down the middle between the two halves of the bladder. 13 and 14 are the ends of the pre-formed bladder.

FIG. 8A shows a top view of a inflated instrumented football bladder with identical halves.

FIG. 8B shows an end view of the inflated instrumented football bladder with identical halves.

Referring to drawings FIG. 8A and FIG. 8B, in a preferred embodiment, a bladder that has a unique feature that distinguishes it from the bladders specified in FIG. 6A and FIG. 6B, and FIG. 7A and FIG. 7B, and from conventional football bladders, is disclosed. The bladder is comprised of two separate identical halves. The bladder is shown inflated with gas as it would be inside the instrumented football's cover. Each half has its own gas valve for inflation. When inflated, the two halves together conform to the inside walls of the football's cover 1, thereby propping up the cover.

The bladder has two open slots that run radially outward from the central hollow cavity 8 to the outer wall 1 of the bladder. The slot walls are 11 and 12, and 15 and 16. The walls 11, 12, 15, 16 run the full length of the bladder from end 13 to end 14 parallel to the y-axis 5. The slots will close up when the both halves of the bladder are fully inflated with gas. When the bladder is fully inflated with gas after the cover is laced, the interior walls 11 and 12, and 15 and 16 press flat against one another.

The bladder is accommodated by the instrumented footballs specified in FIG. 9A and FIG. 9B, FIG. 10A and FIG. 10B, FIG. 11A and FIG. 11B, FIG. 13A and FIG. 13B, FIG. 16A and FIG. 16B, and FIG. 17 and FIG. 17B. These are the same instrumented footballs that also accommodate the bladders specified in FIG. 6A and FIG. 6B, and FIG. 7A and FIG. 7B.

The bladder accommodates the instrumentation package assemblies specified in FIG. 2A and FIG. 2B and FIG. 2C, FIG. 3A and FIG. 3B and FIG. 3C, FIG. 4A and FIG. 4B and FIG. 4C, FIG. 5A and FIG. 5B and FIG. 5C. These are the same instrumentation package assemblies that are accommodated by the bladder specified in FIG. 6A and FIG. 6B, and FIG. 7A and FIG. 7B.

An advantage of the duel slot in the bladder is that it enables the instrumentation package assembly to be assembled more quickly into the instrumented football compared with the bladder specified in FIG. 6A and FIG. 6B.

Another advantage of the bladder over the bladders specified in both FIG. 6A and FIG. 6B, and FIG. 7A and FIG. 7B in that it is less costly to manufacture. It is less costly because it is comprised of two relatively simple identical halves, compared to one complex piece.

It has a disadvantage however in that it uses two gas valves 2 and 17 rather than one. The bladder uses the same gas valves as used in the conventional professional football bladders. The identical gas valves 2 and 17 are both positioned ninety degrees apart in the x-z plane on the bladder. The gas valves 2 and 17 are each positioned forty five degrees on either side of the bladder's slot. Now since the instrumented football's cover will have two corresponding gas valve locations, the cover is not an exact look-alike compared to the conventional cover which has only one gas valve. The bladder is distinguished from the conventional bladders in that its overall length is shorter. It is shorter because the ends of the bladder are truncated in order to make the inflated bladder fit into the space between the instrumented football's two opposite buffer plates, and press on those buffer plates when inflated with gas.

Additionally, the ends of the bladder are pre-formed to match the shape of the interior curved surfaces of the buffer plates when the bladder is inflated, whereas the conventional bladders have the vesica piscis shape at the vertices inside the conventional football cover. Various preferred embodiments of buffer plates that are used with the bladder for instrumented footballs are shown in FIG. 21A and FIG. 21B, FIG. 21C and FIG. 21D, FIG. 21E and FIG. 21F, FIG. 21G and FIG. 21H, FIG. 21I and FIG. 21J, FIG. 21II and FIG. 21JJ, FIG. 21K, and FIG. 21L and FIG. 21M.

The bladder is also distinguished from the conventional professional football bladder by its central cylindrical hollow cavity 8 which is formed by walls 4 and 18 of the two halves extending down the full length along the y-axis centerline 5. The instrumentation package assembly is nested in this cavity.

The two walls of the separate bladder halves form into a cylinder whose walls are 4 and 18 to produce a pre-formed space whose diameter is smaller than the skin diameter of the instrumentation package assembly that it holds captive and is symmetrically disposed around the centerline of the bladder 5. The bladder looks like a sandwich of two separate buns holding a sausage between them in the middle. The diameter of cylindrical wall of the bladder's hollow cavity is made slightly smaller than the skin diameter of the instrumentation package assembly so that an interference fit is created with the instrumentation package assembly when the bladder is fully inflated.

The cylindrical walls of the bladder's hollow cavity press inwardly on the skin of the instrumentation package assembly which is nested in the cavity when the bladder is inflated. The pressure from the bladder restrains the instrumentation package assembly from moving and shifting its position, and keeps it aligned to the cover and the lining when the football suffers shock during the course of a game.

When the instrumented football is laced and inflated with gas 9 through the gas valve 2, the outer wall 1 of the bladder presses on the interior wall of the football's cover/liner sandwich and on the interior curved surfaces of the two opposite buffer plates, thereby propping up the cover/liner sandwich and holding the bladder in place and aligned relative to the cover. The bladder has a pre-determined overall shape when inflated with gas 9, and its outer wall 1 props up the instrumented football's cover to the same vesica piscis shape as the conventional professional league American footballs. Conversely, the cover and liner hold the bladder in place and aligned relative to the cover.

By making the bladder in two halves, is makes it easier to load the instrumentation package assembly into the football. Consequently, the bladder enables an instrumentation package assembly to be assembled more quickly into an instrumented football, than with the bladder specified in FIG. 6A and FIG. 6B.

The following steps describe an example of the production assembly process for the instrumented football which uses the bladder: The football cover/liner is held horizontally in a fixture with its gap facing up. The buffer plates are inserted into the football through its gap. The buffer plates are arranged at both vertices of the football and aligned together. The buffer plates are bonded in place. Both halves of the bladder are inserted into the football cover/liner through the gap. The bladder halves are arranged so their ends 13 and 14 line up with the interior surfaces of the buffer plates. The bladder halves are arranged so their gas valves 2 and 17 line up with the accommodating holes in the cover/liner. The bladder halves are arranged so their slot walls 11 and 12, and 15 and 16 line up with the gap in the cover/liner. The bladder halves are partially inflated with gas 9. The instrumentation package assembly is inserted into the football through the football's gap. The instrumentation package assembly is then inserted between the bladder's slot walls 11 and 12, and 15 and 16 and into the bladders hollow central cavity 8. The football is then stretched in the fixture, thereby increasing the distance between the buffer plates. Each end of the instrumentation package assembly is loaded into its respective buffer plate assembly bore. The instrumentation package assembly is then rotated about the y-axis 5 of the football in order to align its cameras with the gap. The gas valves are set. The football is laced up. The bladder is then fully inflated with gas 9. The instrumented football is then removed from the holding fixture.

As the bladder is filled with gas 9, the two interior parallel walls of the slot 11 and 12, and 15 and 16 close up and touch, thereby sandwiching the instrumentation package assembly between them and further restraining movement of the instrumentation package assembly.

Comparing the steps of this assembly procedure with the ones used for the bladder specified in FIG. 6A and FIG. 6B, the former assembly procedure is less complex and time consuming because it permits the instrumentation package assembly to enter the bladder's cavity in one direct simple step without having to rearrange the bladder.

In a preferred embodiment, the bladder is made of a stronger material than the natural rubber used in conventional footballs. Exxon Exxcore™ DVA is an example of such a material. The stronger material enables the instrumented football's bladder to be made thinner and be of substantially lighter weight compared to the conventional football bladders made of natural rubber. Despite its light weight, the instrumented football's bladder matches or exceeds the performance of the conventional professional league football bladder.

Exxcore dynamically vulcanized alloy (DVA), is a blend of specialty elastomer and nylon, and has been used as a next-generation resin for advanced tire innerliners. It affords up to an 80% reduction in bladder thickness in the instrumented football while still performing the same functions of the natural rubber bladder used in conventional footballs. This reduction in bladder thickness yields a weight (mass) difference between the instrumented football bladder and the conventional football bladder of up to 80%. In addition to performing the functions of the natural rubber bladder, the instrumented football bladder has a superior inflation pressure retention loss rate for the gas used to inflate the bladder.

Besides the open slot, the bladder is distinguished from the conventional professional football bladder by the inclusion of an inner hollow cylindrical wall 4 which forms a symmetrically disposed cylindrical cavity space 8 extending down the full length of the long y-axis centerline 5 of the bladder. There is no gas in this space besides air. The purpose of this space is to provide a nest for the instrumentation package assembly. The instrumentation package assembly will occupy this space inside the instrumented football. The inflated bladder will hug and hold the instrumentation package assembly in this space. For example, refer to FIG. 1A and FIG. 1B and FIG. 1C and FIG. 1D.

Additionally, the bladder is distinguished from the conventional bladder in that its overall length is shorter. It is shorter because the ends of the bladder are truncated in order to make the inflated bladder fit in the space between the two buffer plates in the interior of the instrumented football shown in FIG. 10A and FIG. 10B.

Additionally, the bladder is distinguished from the conventional bladder in that its vertices are pre-formed to match the shape of the curved interior surfaces of the buffer plates when the bladder is inflated inside the instrumented football, rather than match the vesica piscis shape of the interior walls of the cover/liner at the vertex in conventional footballs. The bladder is shaped to be in smooth contact and press up against the buffer plates when the bladder is inflated.

When the instrumented football is laced and inflated with gas 9 through the gas valve 2, the outer wall 1 of the bladder presses on the interior wall of the football's cover/liner sandwich and on the interior curved surfaces of the two opposite buffer plates, thereby propping up the cover/liner sandwich and holding the bladder in place and aligned relative to the cover. The bladder has a pre-determined overall shape when inflated with gas 9, and its outer wall 1 props up the instrumented football's cover to the same vesica piscis shape as the conventional professional league American footballs.

The bladder is symmetric around the y-axis 5. The bladder is made with the same 1 vesica piscis shape in the region around its central girth, as the bladder used in conventional professional footballs shown in FIG. 18A and FIG. 18B. Its gas valve 2 is identical to the gas valve used in conventional professional football bladders. Its gas valve is in the same location on the bladder's x-z plane as with the conventional football bladders.

The diameter of the inner cylindrical of the bladder's hollow cavity 8 formed by walls 4 and 18, is made so that after inflation with gas 9 it is smaller than the diameter of the skin of the instrumentation package assembly, thereby causing an interference fit between the two. The inner cylindrical cavity walls 4 and 8 press inwardly on the skin of the instrumentation package assembly which is nested within the cavity, thereby restraining the instrumentation package assembly from moving and keeping it aligned to the cover when the football suffers shock and vibration during play. Additionally, the bladder acts essentially as a shock and vibration isolator.

The bladder acts to dampen, moderate and cushion the severe shock and vibration that would otherwise be encountered by the instrumentation package assembly and its contents.

In a further preferred embodiment, the bladder is inflated with helium gas rather than air which is the gas used to inflate prior art bladders. The purpose of using helium gas 9 rather than air is to reduce the inflated weight of the bladder, and thereby reduce the weight of the instrumented football from what it would otherwise be if its bladder were inflated with air.

Referring to the Preferred Embodiments Specified in FIG. 8A and FIG. 8B, the Bladder Satisfies all of the Following Further Objectives:

It is an objective of the present invention for the bladder to include a gas valve, gas, inner central hollow cylindrical cavity wall, open holes at both ends of the hollow cylinder, double slotted radial walls, two gas valves, and an external pre-formed vesica piscis shape. It is an objective of the resent invention for the bladder to have two open slots that run radially outward from the central hollow cavity to the outer wall of the bladder. It is an objective of the present invention for the bladder to be constructed of two identical half bladders. It is an objective of the present invention to provide a bladder which enables an instrumentation package assembly to be assembled more quickly into an instrumented football, than with the bladders without slots. It is an objective of the present invention to provide a bladder which is less costly to manufacture, than the bladders specified in FIG. 6A and FIG. 6B, and FIG. 7A and FIG. 7B. It is an objective of the present invention for the bladder to provide sufficient space for the instrumentation package assembly inside the instrumented football so as not to interfere with its functions. It is a further objective of the present invention to enable the inflated bladder to cradle the instrumentation package assembly so it will not become misaligned inside the instrumented football when subjected to shock and crushing forces during the game. It is a further objective of the present invention to enable the inflated bladder to shield the instrumentation package assembly from being damaged during the game. It is a further objective of the present invention to enable the inflated bladder to fit between the buffer plates and apply even pressure to the buffer plates within the instrumented football. It is a further objective of the present invention to enable the inflated bladder to prop up the cover/liner sandwich of the instrumented football to the same vesica piscis shape as with conventional professional league footballs. It is an objective of the present invention to provide the instrumented football with a bladder that has provisions for holding the instrumentation package assembly and for cushioning and isolating the instrumentation package assembly from shocks received by the football during the game. It is an objective of the present invention to provide the instrumented football with a bladder that is of lighter weight compared to the bladder used in conventional footballs. It is an objective of the present invention to provide the instrumented football with a bladder that consists of two separate identical halves where each half has its own gas valve for inflation. It is an objective of the present invention to provide the instrumented football with a bladder that has two slots that will close up and press flat against one another when the both halves of the bladder are fully inflated with gas. It is an objective of the present invention to provide the instrumented football with a bladder that has two slots that will close up and press flat against one another when the both halves of the bladder are fully inflated with gas and then may be cemented to one another. It is an objective of the present invention to provide the instrumented football with a bladder that is accommodated by the instrumented footballs specified in FIG. 9A and FIG. 9B, FIG. 10A and FIG. 10B, FIG. 11A and FIG. 11B, FIG. 13A and FIG. 13B, FIG. 16A and FIG. 16B, and FIG. 17 and FIG. 17B. These are the same instrumented footballs that also accommodate the bladders specified in FIG. 6A and FIG. 6B, and FIG. 7A and FIG. 7B.

It is an objective of the present invention to provide the instrumented football with a bladder that accommodates the instrumentation package assemblies specified in FIG. 2A and FIG. 2B and FIG. 2C, FIG. 3A and FIG. 3B and FIG. 3C, FIG. 4A and FIG. 4B and FIG. 4C, FIG. 5A and FIG. 5B and FIG. 5C. These are the same instrumentation package assemblies that are accommodated by the bladder specified in FIG. 6A and FIG. 6B, and FIG. 7A and FIG. 7B. It is an objective of the present invention to provide the instrumented football with a bladder that enables the instrumentation package assembly to be assembled more quickly into the instrumented football compared with the bladder specified in FIG. 6A and FIG. 6B. It is an objective of the present invention to provide the instrumented football with a bladder that is less costly to manufacture than the bladders shown in FIG. 6A and FIG. 6B, and FIG. 7A and FIG. 7B. It is an objective of the present invention to provide the instrumented football with a bladder that uses the same gas valves as used in the conventional regulation professional football bladders with one of the gas valves located on the football at the same position as with the conventional regulation professional league footballs. It is an objective of the present invention to provide the instrumented football with a bladder that is shorter than bladders used in conventional regulation professional league footballs. It is an objective of the present invention to provide the instrumented football with a bladder that is pre-formed to match the shape of the interior curved surfaces of the buffer plates when the bladder is inflated. It is an objective of the present invention to provide the instrumented football with a bladder that can be used with the various preferred embodiments of buffer plates shown in FIG. 21A and FIG. 21B, FIG. 21C and FIG. 21D, FIG. 21E and FIG. 21F, FIG. 21G and FIG. 21H, FIG. 21I and FIG. 21J, FIG. 21II and FIG. 21JJ, FIG. 21K, and FIG. 21L and FIG. 21M. It is an objective of the present invention to provide the instrumented football with a bladder that when inflated has a central cylindrical hollow cavity between the walls of its two halves extending down the full length along its y-axis centerline to nest the instrumentation package assembly and keep it aligned during the game. It is an objective of the present invention to provide the instrumented football with a bladder that the outer wall of the bladder presses on the interior wall of the football's cover/liner sandwich and on the interior curved surfaces of the two opposite buffer plates, thereby propping up the cover/liner sandwich and holding the bladder in place and aligned relative to the cover. It is an objective of the present invention to provide the instrumented football with a bladder that the bladder has a pre-determined overall shape when inflated with gas and its outer wall props up the instrumented football's cover to the same vesica piscis shape as the conventional regulation professional league American footballs. It is an objective of the present invention to provide the instrumented football with a bladder that the cover and liner hold the bladder in place and aligned relative to the cover. It is an objective of the present invention to provide the instrumented football with a bladder that makes it easier to load the instrumentation package assembly into the football. It is an objective of the present invention to provide the instrumented football with a bladder that the bladder is made of a stronger material than the natural rubber used in conventional footballs. It is an objective of the present invention to provide the instrumented football with a bladder that the bladder is made of a lighter weight material than the natural rubber used in conventional footballs. It is an objective of the present invention to provide the instrumented football with a bladder that the bladder is made of Exxon Exxcore™ DVA. It is an objective of the present invention to provide the instrumented football with a bladder that has a superior inflation pressure retention loss rate for the gas used to inflate the bladder. It is an objective of the present invention to provide the instrumented football with a bladder whose length is shorter than that of conventional bladders. It is an objective of the present invention to provide the instrumented football with a bladder that is symmetric around its y-axis centerline. It is an objective of the present invention to provide the instrumented football with a bladder that is made with the same vesica piscis shape in the region around its central girth as the bladder used in conventional professional footballs. It is an objective of the present invention to provide the instrumented football with a bladder whose central cylindrical cavity walls after inflation are of a smaller diameter than the skin of the instrumentation package assembly, thereby causing an interference fit between the two. It is an objective of the present invention to provide the instrumented football with a bladder that acts as a shock and vibration isolator for the nested instrumentation package assembly and its contents. It is an objective of the present invention to provide the instrumented football with a bladder that is inflated with helium gas rather than air which is the gas used to inflate prior art bladders.

FIG. 9A and FIG. 9B

The detailed physical elements disclosed in the instrumented professional league football drawings shown in FIG. 9A and FIG. 9B are identified as follows: 1 is the y-axis of both the instrumentation package assembly and the instrumented football. 2 is the slightly conical small diameter end of the buffer plate pressed into the machined bore of the cover/liner sandwich. 3 is the threaded sleeve window holder part of the buffer plate assembly with the small diameter bore. 4 is the curved interior surface of the buffer plate which is pressed against by the inflated pre-formed bladder. 5 is the tapered edge of the buffer plate. 6 is the large diameter bore in the buffer plate. 7 is an o-ring seal. 8 is an o-ring seal. 9 is an o-ring seal. 10 is an o-ring mounting grove. 11 is an o-ring mounting grove. 12 is an o-ring mounting grove. 13 is a buffer plate assembly. 14 is the exterior convex curved surface of the buffer plate that presses on and is bonded to the cover/liner sandwich. 15 is an o-ring seal. 16 is the thread in the buffer plate window assembly. 17 is an o-ring mounting grove. 18 is a TV camera. 19 is a camera lens. 20 is an optical window. 21 is the surface of the front element of the camera lens. 22 is an induction coil for wirelessly charging the battery package. 23 is the small diameter end of the instrumentation package assembly. 24 is the cylindrical segment of the skin of the instrumentation package assembly. 25 is the instrumented football's cover. 26 is the football's liner. 27 is the inside surface of the football's liner which is pressed on by the pre-formed bladder. 28 corrugated bellows segment of the skin of the instrumentation package assembly. 29 are the football's laces. 30 is the gap in the seam between the football's panels. 31 is the gas used to inflate the pre-formed bladder. 32 is the x-axis of the instrumented football's coordinate system. 33 is the z-axis of the instrumented football's coordinate system. 34 is the cylindrical segment of the skin of the instrumentation package assembly. 35 is the tapered edge of the buffer plate. 36 is the curved interior surface of the buffer plate which is pressed against by the inflated pre-formed bladder. 37 is the exterior convex curved surface of the buffer plate that presses on and is bonded to the cover/liner sandwich. 38 is a buffer plate assembly. 39 is the large diameter bore in the buffer plate. 40 is an o-ring mounting grove. 41 is an o-ring mounting grove. 42 is an o-ring mounting grove. 43 is the threaded sleeve window holder part of the buffer plate assembly with the small diameter bore. 44 is the slightly conical small diameter end of the buffer plate pressed into the machined bore of the cover/liner sandwich. 45 o-ring groove. 46 is the surface of the front element of the camera lens. 47 is the co-axis (x-axis) of the instrumentation package assembly and the instrumented football. 48 is an induction coil for wirelessly charging the battery package. 49 is the inside surface of the football's liner which is pressed on by the pre-formed bladder. 50 is the football's liner. 51 is the instrumented football's cover. 52 is a TV camera. 53 is the small diameter end of the instrumentation package assembly. 54 is an o-ring seal. 55 is an o-ring seal. 56 is a camera lens. 57 is an o-ring seal. 58 is an o-ring seal. 59 is the thread in the buffer plate window assembly. 60 is an optical window. 61 is the hollow cylindrical cavity wall inside the inflated bladder. 62 is the innermost surface of the hollow cylindrical cavity of the pre-formed bladder which presses on the skin of the instrumentation package assembly. 63 is the inside wall of the inflated bladder. 64 is the outside surface of the inflated bladder which presses on the instrumented football's liner. 65 typical instrumentation package assembly electronics. 66 is the battery pack. 67 is the gas valve.

FIG. 9A is a side view section B-B of the instrumented football in FIG. 9B.

FIG. 9B is an end view section A-A of the instrumented football in FIG. 9A.

Referring to drawings FIG. 9A and FIG. 9B, in a preferred embodiment, an instrumented football is disclosed that is essentially identical to the preferred embodiment disclosed in FIG. 1A and FIG. 1B and FIG. 1C and FIG. 1D except that optical windows 20 and 60 are recessed into the vertices of the instrumented football's cover 51 with the window's outer optical surfaces being flush with the tips of the instrumented football cover's vertices. Recessing the optical windows 20 and 60 into the vertices of the instrumented football's cover has an advantage by making them less obtrusive to the players, and protects their outer optical surfaces better from damage during game play. In order to accomplish this, different buffer plate assemblies are required. The buffer plate assemblies 13 and 38 that are used in the present invention are disclosed in FIG. 21G and FIG. 21H. The bladder 64 that is used in the present invention is disclosed in FIG. 6A and FIG. 6B.

The portals in the cover's vertices for the buffer plates are precision holes bored in each of the cover's vertices. The circumferences of the holes are precisely stitched to form a precision hole.

The present embodiment disclosed in FIG. 9A and FIG. 9B also has an additional advantage over that disclosed in FIG. 1A and FIG. 1B and FIG. 1C. The present embodiment provides for quick trouble-free removal and replacement of the optical windows 20 and 60 by allowing them to be threaded in or out of the vertices of the instrumented football. This is accomplished by mounting the optical windows 20 and 60 in threaded sleeves 3 and 43 that screw into the buffer plate assemblies 13 and 38 respectively mounted in the vertices of the instrumented football. This facilitates the removal of damaged optical windows with new ones. It also facilitates the exchange of optical windows with alternative optical windows having different optical prescriptions. It also facilitates the easy removal and exchange of the camera lenses 19 and 56 by providing an access port through which they can be quickly and easily replaced. Removal of an optical window is achieved by unscrewing the threaded sleeve which carries the optical window from its threaded bore in the buffer plate assembly. Replacement of an optical window is achieved by screwing in another sleeve containing another optical window into its threaded bore in the buffer plate assembly. Removal of a camera lens is achieved by first unscrewing the threaded sleeve which carries the optical window that is in front of the camera lens from its buffer plate assembly; and then unscrewing the camera lens and removing it through the threaded bore in the buffer plate assembly. Replacement of an optical window is achieved by screwing in another sleeve containing another optical window into its threaded bore in the buffer plate assembly.

The preferred embodiment of the instrumentation package assembly 24 is disclosed in FIG. 2A and FIG. 2B and FIG. 2C.

Details of various other preferred embodiments of instrumentation package assemblies that may be used to substitute for the instrumentation package assembly 24 above are specified in FIG. 4A and FIG. 4B and FIG. 4C.

Details of various preferred embodiments of buffer plate assemblies that are used above are specified in FIG. 21G and FIG. 21H, and FIG. 21I and FIG. 21J and FIG. 21K.

Referring to the Preferred Embodiments Specified in FIG. 9A and FIG. 9B, the Instrumented Professional League Football Satisfies all of the Following Further Objectives:

It is an objective of the present invention to provide an instrumented professional league football having its spherical domed shaped optical windows recessed into the vertices of its cover with the window's outer optical surfaces being flush with the tips of the instrumented football cover's vertices. It is an objective of the present invention to provide an instrumented professional league football with removable and replaceable optical windows. It is an objective of the present invention to provide an instrumented professional league football with an easy means to remove and exchange camera lenses. It is an objective of the present invention to provide an instrumented football that carries its own rechargeable battery pack. It is an objective of the present invention to provide an instrumented football that carries its own rechargeable battery pack that carries sufficient energy to power the cameras, lenses, antennas and electronics for the duration of the football game. It is an objective of the present invention to provide an instrumented football that carries its own battery pack that is recharged wirelessly by induction.

FIG. 9C and FIG. 9D

The detailed physical elements disclosed in the instrumented professional league football drawings shown in FIG. 9C and FIG. 9D are identified as follows: 1 is the y-axis of both the instrumentation package assembly and the instrumented football. 2 is the slightly conical small diameter end of the buffer plate pressed into the machined bore of the cover/liner sandwich. 3 is the threaded window holder part of the buffer plate assembly with the small diameter bore. 4 is the curved interior surface of the buffer plate which is pressed against by the inflated pre-formed bladder. 5 is the tapered edge of the buffer plate. 6 is the large diameter bore in the buffer plate. 7 is an o-ring seal. 8 is an o-ring seal. 9 is an o-ring seal. 10 is an o-ring mounting grove. 11 is an o-ring mounting grove. 12 is an o-ring mounting grove. 13 is a buffer plate. 14 is the exterior convex curved surface of the buffer plate that presses on and is bonded to the cover/liner sandwich. 15 is an o-ring seal. 16 is the thread in the buffer plate window assembly. 17 is an o-ring mounting grove. 18 is a TV camera. 19 is a camera lens. 20 is an optical window. 21 is the surface of the front element of the camera lens. 22 is an induction coil for wirelessly charging the battery package. 23 is the small diameter end of the instrumentation package assembly. 24 is the cylindrical segment of the skin of the instrumentation package assembly. 25 is the instrumented football's cover. 26 is the football's liner. 27 is the inside surface of the football's liner which is pressed on by the pre-formed bladder. 28 corrugated bellows segment of the skin of the instrumentation package assembly. 29 are the football's laces. 30 is the gap in the seam between the football's panels. 31 is the gas used to inflate the pre-formed bladder. 32 is the x-axis of the instrumented football's coordinate system. 33 is the z-axis of the instrumented football's coordinate system. 34 is the cylindrical segment of the skin of the instrumentation package assembly. 35 is the tapered edge of the buffer plate. 36 is the curved interior surface of the buffer plate which is pressed against by the inflated pre-formed bladder. 37 is the exterior convex curved surface of the buffer plate that presses on and is bonded to the cover/liner sandwich. 38 is a buffer plate. 39 is the large diameter bore in the buffer plate. 40 is an o-ring mounting grove. 41 is an o-ring mounting grove. 42 is an o-ring mounting grove. 43 is the threaded window holder part of the buffer plate assembly with the small diameter bore. 44 is the slightly conical small diameter end of the buffer plate pressed into the machined bore of the cover/liner sandwich. 45 o-ring groove. 46 is the surface of the front element of the camera lens. 47 is the co-axis (x-axis) of the instrumentation package assembly and the instrumented football. 48 is an induction coil for wirelessly charging the battery package. 49 is the inside surface of the football's liner which is pressed on by the pre-formed bladder. 50 is the football's liner. 51 is the instrumented football's cover. 52 is a TV camera. 53 is the small diameter end of the instrumentation package assembly. 54 is an o-ring seal. 55 is an o-ring seal. 56 is a camera lens. 57 is an o-ring seal. 58 is an o-ring seal. 59 is the thread in the buffer plate window assembly. 60 is an optical window. 61 is the inside surface of the inflated bladder. 62 is the hollow cylindrical cavity wall of the pre-formed bladder. 63 is the innermost surface of the hollow cylindrical cavity of the pre-formed bladder which presses on the skin of the instrumentation package assembly. 64 and 65 are the surfaces of two interior parallel walls that form a slot in the bladder. 66 is the battery pack. 67 is the gas valve. 68 typical instrumentation package assembly electronics.

FIG. 9C is a side view section B-B of the instrumented football in FIG. 9D.

FIG. 9D is an end view section A-A of the instrumented football in FIG. 9C.

Referring to drawings FIG. 9C and FIG. 9D, in a preferred embodiment, an instrumented football is disclosed that is essentially identical to the preferred embodiment disclosed in FIG. 9A and FIG. 9B except that different buffer plate assemblies and a different bladder are used in FIG. 9C and FIG. 9D. The bladder 61 that is used in the present invention is disclosed in FIG. 7A and FIG. 7B The buffer plate assemblies 13 and 38 that are used in the present invention are disclosed in FIG. 21I and FIG. 21J and FIG. 21K. These buffer plate assemblies offer an advantage over the ones used in FIG. 9A and FIG. 9B. 13 and 38 have four radial grooves (channels or slots) 28 and 29 and 30 and 31 cut into the tip of the buffer plate at ninety degree intervals around its y-axis 1.

The purpose of the four slots (grooves or channels) is to provide clearance for any protuberance in the stitching along the seams between adjacent cover panels in the interior of the instrumented football at its two vertices. These slots provide a nesting place for the stitching. When filled with bonding material, these slots will bond solidly to the cover panel stitching thereby producing a secure bond between the buffer plates and the instrumented football's cover panels.

The slots avoid there being the possibility of an interference fit between the surface of the buffer plate 14 and the interior surface of the football vertices which the buffer plates need to bond to. The depth of the slots depends on the depth dimension of the protuberance of the stitching. The width of the slots depends on the width dimension of the protuberance of the stitching. For example, it is contemplated that a slot depth range of ⅛ to ¼ inch will be satisfactory to accommodate most factory manufactured stitching tolerances. It is also contemplated that a slot width range of ⅛ to ¼ inch will be satisfactory to accommodate most factory manufactured stitching tolerances.

The bladder 61 that is used in the present invention is disclosed in FIG. 7A and FIG. 7B. This bladder offers an advantage over the one used in FIG. 9A and FIG. 9B. The instrumentation package assembly 24 is loaded and aligned more easily into the football using bladder 61. The instrumentation package assembly 24 is loaded directly into the cylindrical hollow 63 of the bladder 61 through the slot formed by walls 64 and 65.

The instrumentation package assembly 24 is disclosed in FIG. 2A and FIG. 2B and FIG. 2C.

Details of various other preferred embodiments of instrumentation package assemblies, that may be used to substitute for the instrumentation package assembly 24 above, are specified in FIG. 4A and FIG. 4B and FIG. 4C.

The buffer plate assemblies 16 and 17 are identical and are disclosed in FIG. 21G and FIG. 21H.

Details of various other preferred embodiments of buffer plate assemblies, that may be used to substitute for the buffer plate assemblies above, are specified in FIG. 21I and FIG. 21J, and FIG. 21I and FIG. 21J, and FIG. 21L and FIG. 21M.

The inflated bladder 61 is disclosed in FIG. 7A and FIG. 7B.

The portals in the cover's vertices are precision holes bored in each of the cover's vertices. The circumferences of the holes are precisely stitched to form a precision hole.

Referring to the Preferred Embodiments Specified in FIG. 9C and FIG. 9D, the Instrumented Professional League football satisfies all of the following further objectives:

It is an objective of the present invention to provide an instrumented professional league football having its spherical domed shaped optical windows recessed into the vertices its cover with the window's outer optical surfaces being flush with the tips of the instrumented football cover's vertices. It is an objective of the present invention to provide an instrumented professional league football with removable and replaceable optical windows. It is an objective of the present invention to provide an instrumented professional league football with an easy means to remove and exchange camera lenses. It is an objective of the present invention to provide clearance in the buffer plate assembly for any protuberance in the cover stitching that may cause an interference fit between the seams of adjacent cover panels in the interior of the instrumented football at its two vertices.

It is an objective of the present invention for the instrumented football to be equipped with a bladder that permits the instrumentation package assembly to be assembled into the instrumented football through its lacing gap directly into the central cylindrical hollow of the bladder through the slotted walls of the bladder. It is an objective of the present invention for the instrumented football to be equipped with a choice of buffer plate assemblies shown in FIG. 21I and FIG. 21J and FIG. 21K that may be substituted for those shown in FIG. 21G and FIG. 21H and FIG. 21K. It is an objective of the present invention for the instrumented football to be equipped with a choice of buffer plate assemblies shown in FIG. 21II and FIG. 21JJ and FIG. 21K that may be substituted for those shown in FIG. 21G and FIG. 21H and FIG. 21K. It is an objective of the present invention for the instrumented football to be equipped with a choice of buffer plate assemblies shown in FIG. 21L and FIG. 21M and FIG. 21K that may be substituted for those shown in FIG. 21G and FIG. 21H and FIG. 21K. It is an objective of the present invention to provide an instrumentation package assembly that carries its own rechargeable battery pack. It is an objective of the present invention to provide an instrumentation package assembly that carries its own rechargeable battery pack that carries sufficient energy to power the cameras, lenses, antennas and electronics for the duration of the football game. It is an objective of the present invention to provide an instrumentation package assembly that carries its own battery pack that is recharged wirelessly by induction.

FIG. 9E

The detailed physical elements disclosed in the instrumented professional league football drawing shown in FIG. 9E are identified as follows: 1 is the y-axis of the instrumented football. 2 is a precision bore in the cover's vertex. 3 is the threaded sleeve. 4 is an inflection point in the interior surface of the buffer plate assembly for the fold in the bladder. 5 is the bladder. 6 is an induction coil. 7 is an o-ring seal. 8 is the small bore portal in the buffer plate assembly. 9 is the supporting electronics. 10 is the optical window seal. 11 is the battery pack. 12 is the large cylindrical diameter enclosure segment of the instrumentation package assembly. 13 is a fold in the end of the bladder. 14 is the exterior vesica piscis shaped surface of the buffer plate assembly. 15 is an o-ring seal. 16 is the threaded sleeve. 17 is the circular groove for the o-ring. 18 is the joint between the large diameter buffer plate bore and the buffer plate assembly plug 24. 19 is the small diameter segment of the instrumentation package assembly cylindrical enclosure. 20 is the optical window. 21 is the camera lens. 22 is the shoulder wall of the buffer plate assembly. 23 is the camera. 24 is a plug in the buffer plate assembly. 25 is the existing prior art cover. 26 is the liner. 27 is the center of the football. 28 is the shoulder segment of the instrumentation package assembly enclosure. 29 is the lacing. 30 is the lacing gap in the cover. 31 is the gas that inflates the bladder. 32 is the x-axis of the instrumented football. 33 is the optical window. 34 is the threaded sleeve. 35 is the battery pack. 36 is the lacing gap in the cover. 37 is a plug in the buffer plate assembly. 38 is an induction coil. 39 is the camera. 40 is an antenna element molded into the buffer plate. 41 is the supporting electronics. 42 is the small diameter segment of the instrumentation package assembly enclosure. 43 is an o-ring seal. 44 is a precision bore in the cover's vertex. 45 is an o-ring seal. 46 is the camera lens. 47 is the y-axis of the instrumented football. 48 is an antenna element molded into the buffer plate 37. 49 is an antenna element molded into the buffer plate 18. 50 is an antenna element molded into the buffer plate 18. 51 is an antenna element molded into the buffer plate 37. 52 is the gas valve.

FIG. 9E is a side view section of the instrumented football.

Referring to drawing FIG. 9E, in a preferred embodiment, a conventional prior art football cover/liner is shown that is modified and instrumented with two instrumentation package assemblies 6 and 40, two buffer plate assemblies 24 and 37, and a special bladder 5, is disclosed. The bladder 5 that is used in the present invention is disclosed in FIG. 6AA and FIG. 6BB. The buffer plate is shown in FIG. 21LL and FIG. 21MM.

The present instrumented football has an advantage in that it is easily and more cheaply constructed. It has a disadvantage with regard to previously described preferred embodiments in that its instrumentation package assemblies may become more easily misaligned from the shock and vibration of the game because they are not held together by a common axial structure. Each of its instrumentation package assemblies has limited space for its batteries, thereby requiring them to be more frequently charged. Also, broadcast range will be limited because of power limitations.

In the present invention, precision holes 2 and 44 are bored in each of the vertices of the existing prior art cover. The circumferences of the holes are precisely stitched to form a precision hole. The cover 25 is arranged and held in a holding fixture with its gap 30, 36 on top. Two buffer plate assemblies 24 and 37 are inserted into the conventional cover's cavity through the lacing gap 30, 36 in the top of the cover. Each of the buffer plates 24 and 37 contains an instrumentation package assembly 6 and 40. Each of the buffer plates 24 and 37 is inserted into the holes 2 and 44 at each of the cover's vertices. The exterior surface of the buffer plates has the classic vesica piscis shape. This shape matches the vesica piscis shape of the inside of the cover/liner sandwich 25, 26. The exterior surfaces of the buffer plates 24 and 37 are slotted to match the stitching protuberances of the cover/liner panels inside the football. Each of the buffer plate assemblies 24 and 37 is rotated about the footballs y-axis to align the cameras 23 and 39 to the gap, thereby producing upright televised pictures. The buffer plate assemblies 24 and 37 are bonded in place to the inside cover/liner 25, 26 wall at each vertex. The buffer plate's exterior surface matches the interior vesica piscis shape of the cover at the cover's vertices and props up the cover with the vesica piscis shape. The shape of the instrumented football is essentially circularly symmetric about its y-axis. There is no space inside a conventional football to instrument it with an instrumentation package assembly. The entire space inside the conventional football's cover/liner is taken up by the conventional football's inflated bladder.

The bladder 5 is inserted into the conventional cover's cavity through the lacing gap 30, 36 in the top of the cover. The bladder 5 is specified in FIG. 6AA and FIG. 6BB.

The smooth curvature of the buffer plate's 18 and 37 interior surface, for example 4, matches the shape of the ends of the bladder, for example 5. The gas valve 52 is set. The bladder 5 is partially inflated with gas 31. The gap 30, 36 is laced up and closed. The bladder 5 is fully inflated with gas 31. The bladder 5 expands to the classic vesica piscis shape around its girth beneath the cover 25 when fully inflated and laced under the cover 25. The bladder 5 is distinguished from the conventional bladder because its ends do not expand to the classical vesica piscis shape as does the conventional bladder. The bladder 5 expands to a more spherically rounded shape at its ends when it presses on the buffer plates 18 and 37 whose interior surfaces are nearly spherical in form. The football, now an instrumented football, is removed from the holding fixture.

The plugs in the buffer plate assemblies 24 and 37 are removable, enabling the instrumentation package assemblies which contain the cameras 23 and 39, camera lens 21 and 46, battery packs 35 and 11, and the supporting electronics 9 and 41, to be loaded into the buffer plate assemblies 18 and 37, or removed for service and maintenance. The wireless antenna elements 49, 50, 51 and 48 are molded into the buffer plate assemblies to stabilize them from shock and vibration.

A variety of different camera lens types, with different lens setting capability, can be used providing they are small in size and weight. The auto iris setting permits the camera lens to automatically adjust for varying lighting conditions on the field. The auto focus setting permits the camera lens to adjust focus for varying distances of the players and action subjects on the field.

When the football has been thrown and is in flight on its trajectory from the quarterback to his intended receiver, the distance of the football from the quarterback is increasing, whereas the distance of the football to the intended receive is decreasing. Each camera can be independently and simultaneously commanded and controlled to auto focus on their respective subjects. The rearward camera is looking backward in the direction to where the football has been, and can retain its focus on the quarterback, while the forward camera is looking forward in the direction of its travel, and retains its focus on the receiver.

The functions of the camera lenses 21 and 46 such as focus adjustment settings and iris adjustment settings are controlled wirelessly by the cameraman from the remote base station by sending command and control signals from the remote base station to the instrumented football. The cameraman can also send command and control signals from the remote base station to the instrumented football to put these settings on automatic under the control of the camera electronics. The optical and electronic zoom functions of the camera lenses 21 and 46 are operated by the cameraman by sending command and control signals from the remote base station to the instrumented football. The cameraman can select from a wide variety of HD camera lenses. Wide angle lenses and ultra wide angle lenses are used in many venues to give the TV viewing audience the feeling of being there on the playing field amongst the players. In some venues the cameraman may choose to use camera lenses with more magnification and narrower fields of view to better cover certain plays. In some venues the cameraman may choose camera lenses with small f-numbers to deal with poorer lighting conditions. In many venues the cameraman will choose the camera lenses 21 and 46 to be identical to one another. In many venues the cameraman will choose to use identical settings in both lenses 21 and 46 so that the TV viewing audience will see the same from either end of the instrumented football.

Referring to the Preferred Embodiments Specified in FIG. 9E, the Instrumented Football Satisfies all of the Following Further Objectives:

It is an objective of the present invention for the instrumented football to be equipped with two instrumentation package assemblies, two buffer plate assemblies, and a special bladder disclosed in FIG. 6AA and FIG. 6BB. It is an objective of the present invention for the instrumented football to be equipped with more cheaply constructed instrumentation package assemblies. It is an objective of the present invention for the instrumented football to be equipped with precision holes bored in each of the vertices where the circumferences of the holes are precisely stitched to form a precision hole in an existing prior art regulation cover. It is an objective of the present invention for the instrumented football to be equipped with two buffer plate assemblies that are each inserted into the precision holes in each of the vertices of the conventional football cover. It is an objective of the present invention for the instrumented football to be equipped with two buffer plate assemblies that are assembled into the cover of the instrumented football through the lacing gap in the top of the football's cover. It is an objective of the present invention for the instrumented football to be equipped with two buffer plates that act as bearings for the instrumentation package assembly that are each mounted to the opposite vertices inside the instrumented football. It is an objective of the present invention for the instrumented football to be equipped with two buffer plates at each of the cover's vertices where the exterior surface of the buffer plates has the classic vesica piscis shape to match the cover's vertices and prop up the cover with the vesica piscis shape. It is an objective of the present invention for the instrumented football to be equipped with a bladder that is inserted into the conventional cover's cavity through the lacing gap on the top of the cover. It is an objective of the present invention for the instrumented football to be equipped with two buffer plate assemblies each having removable threaded plugs enabling the contents of the two instrumentation package assemblies i.e. cameras, camera lenses, battery packs and supporting electronics to be loaded or unloaded for the service and maintenance of the contents. It is an objective of the present invention for the instrumented football to be equipped with Two buffer plate assemblies where the wireless antenna elements are molded into the buffer plate assemblies to stabilize them from shock, vibration and the environment. It is an objective of the present invention for the instrumented football to be equipped with cameras that can be independently and simultaneously commanded and controlled to auto focus on their respective subjects by the cameraman in the remote base station. It is an objective of the present invention for the instrumented football to be equipped with a rearward camera looking backward in the direction to where the football has been, and can retain its auto focus on the quarterback, while the forward camera is looking forward in the direction of its travel, and retains its focus on the receiver. It is an objective of the present invention for the instrumented football to be equipped with camera lenses having focus adjustment settings and iris adjustment settings that are controlled wirelessly by the cameraman from the remote base station, by sending command and control signals from the remote base station to the instrumented football.

It is an objective of the present invention for the instrumented football to be equipped with a low cost instrumentation package assembly, low cost buffer plate assembly and low cost bladder that can be introduced into venues where cost may otherwise be an economic barrier to entry and where quality can be made a tradeoff. It is an objective of the present invention to provide an instrumented professional league football having its spherical domed shaped optical windows recessed into the vertices its cover with the window's outer optical surfaces being flush with the tips of the instrumented football cover's vertices. It is an objective of the present invention to provide an instrumented professional league football with removable and replaceable optical windows. It is an objective of the present invention to provide an instrumented professional league football with an easy means to remove and exchange camera lenses. It is an objective of the present invention to provide clearance in the buffer plate assembly for any protuberance in the cover stitching that may cause an interference fit between the seams of adjacent cover panels in the interior of the instrumented football at its two vertices. It is an objective of the present invention for the instrumented football to be equipped with instrumentation package assemblies that are assembled directly into the instrumented football through its lacing gap and positioned to see out onto the playing field through each of the vertices of the instrumented football. It is an objective of the present invention for the instrumented football to be equipped with buffer plate assemblies shown in FIG. 21II and FIG. 21JJ. It is an objective of the present invention for the instrumented football to be equipped with the bladder shown in FIG. 6AA and FIG. 6BB. It is an objective of the present invention to provide an instrumented football that carries two instrumentation package assemblies, where each one carries its own rechargeable battery pack. It is an objective of the present invention to provide an instrumented football that carries two instrumentation package assemblies where each instrumentation package assembly that carries its own rechargeable battery pack that carries sufficient energy to power the cameras, lenses, antennas and electronics for the duration of the football game. It is an objective of the present invention to provide an instrumented football which carries two instrumentation package assemblies that each carries its own battery pack that is recharged wirelessly by induction. It is an objective of the present invention to provide an instrumented football where space is gained for its two instrumentation package assemblies and two buffer plate assemblies simply by folding the vertices of a common conventional football bladder inward and forming dimples. It is an objective of the present invention to provide an instrumented football where space is conserved for instrumentation inside the football by building the two instrumentation package assemblies inside their respective buffer plate assemblies.

FIG. 9F

The detailed physical elements disclosed in the instrumented football drawing shown in FIG. 9F are identified as follows: 1 is the y-axis of the instrumented football. 2 is a precision bore in the cover's vertex. 3 is the threaded sleeve. 4 is an inflection point in the interior surface of the buffer plate assembly for the fold in the bladder. 5 is the bladder. 6 is an induction coil. 7 is an o-ring seal. 8 is the small bore portal in the buffer plate assembly. 9 is the supporting electronics. 10 is the optical window seal. 11 is the battery pack. 12 is the large cylindrical diameter enclosure segment of the instrumentation package assembly. 13 is a fold in the end of the bladder. 14 is the exterior vesica piscis shaped surface of the buffer plate assembly. 15 is an o-ring seal. 16 is the threaded sleeve. 17 is the circular groove for the o-ring. 18 is the joint between the large diameter buffer plate bore and the buffer plate assembly plug 24. 19 is the small diameter segment of the instrumentation package assembly cylindrical enclosure. 20 is the optical window. 21 is the camera lens. 22 is the shoulder wall of the buffer plate assembly. 23 is the camera. 24 is a buffer plate assembly (plug). 25 is the existing prior art cover. 26 is the liner. 27 is the center of the football. 28 is the shoulder segment of the instrumentation package assembly enclosure. 29 is the lacing. 30 is the lacing gap in the cover. 31 is the gas that inflates the bladder. 32 is the x-axis of the instrumented football. 33 is the optical window. 34 is the threaded sleeve. 35 is the battery pack. 36 is the lacing gap in the cover. 37 is a buffer plate assembly plug. 38 is an induction coil. 39 is the camera. 40 is an antenna element molded into the buffer plate. 41 is the supporting electronics. 42 is the small diameter segment of the instrumentation package assembly enclosure. 43 is an o-ring seal. 44 is a precision bore in the cover's vertex. 45 is an o-ring seal. 46 is the camera lens. 47 is the y-axis of the instrumented football. 48 is an antenna element molded into the buffer plate. 49 is an antenna element molded into the buffer plate. 50 is an antenna element molded into the buffer plate. 51 is an antenna element molded into the buffer plate. 52 is a vesica piscis shaped dimple in the bladder 5. 53 is a vesica piscis shaped dimple in the bladder 5. 54 is a fold in the end of the bladder 5. 55 is the interior vesica piscis shaped surface of the buffer plate assembly plug 37. 56 is the gas valve.

FIG. 9F is a side view section of an instrumented professional league football with a modified prior art cover and bladder.

Referring to drawing FIG. 9F, in a preferred embodiment, an instrumented professional league football with a modified prior art cover and bladder, is disclosed. A conventional prior art football cover is instrumented with two instrumentation packages 12 and 40 and two buffer plate assemblies 24 and 37, while still retaining the conventional football's existing cover/liner and bladder 5, is disclosed. This is accomplished in the following way. In the present invention, precision holes 2 and 44 are bored in each of the existing prior art cover 25 vertices. The circumferences of the holes are precisely stitched to form a precision hole. The cover/liner sandwich is arranged and held in a fixture with its gap 30, 35 on top. Two buffer plate assemblies 24 and 37 are inserted into the conventional cover's cavity through the lacing gap 30, 35 in the top of the cover. Each of the buffer plates 24 and 37 contains an instrumentation package assembly 12 and 40. Each of the buffer plates 24 and 37 is inserted into the holes 2 and 44 at each of the cover's vertices. Each of the buffer plate assemblies 24 and 37 is rotated about the footballs y-axis 1 to align the cameras 23 and 39 to the gap 30, 35, thereby producing upright televised pictures. The buffer plate assemblies 24 and 37 are bonded in place to the inside cover 25 walls at each vertex. The buffer plate's 24 and 37 exterior surface matches the interior vesica piscis shape of the cover 25. The buffer plate's 24 and 37 interior surface forms bulges 52 and 53 in the form of an inverted vesica piscis shapes. The bulges 52 and 53 face into the football's cavity and their shapes are a reflection of the cover's 25 vesica piscis shape. The shape of the instrumented football is essentially circularly symmetric about its y-axis.

The bladder 5 that is used in the present invention is disclosed in FIG. 7AA and FIG. 7BB and FIG. 7CC. This bladder is essentially identical to the existing prior art bladders used in American footballs today except that it is pushed in at both ends to form dimples. To form the bladder shown in FIG. 7AA and FIG. 7BB and FIG. 7CC, the ends (vertices) of the existing commercial off the shelf bladder are simply depressed inward. Since these bladders are plentiful and inexpensive, the instrumented football shown in FIG. 9F can be more easily constructed than other preferred embodiments shown in other drawings. The cover/liner 25, 26 used in FIG. 9F can be an ordinary existing commercial off the shelf cover/liner which is also plentiful and inexpensive. The instrumented football shown in FIG. 9F is very suitable for ordinary sandlot play and amusement where the players want a TV recording of themselves participating in the game. If HD is not required by the players, cheaper SD cameras 23 and lenses 21 are used in the instrumentation package assembly inside the buffer plate assembly 24 shown in FIG. 21LL and FIG. 21MM.

The conventional football's existing prior art bladder 5 is inserted into the conventional cover's cavity through the lacing gap 30, 36 in the top of the cover 25. Both ends of the conventional football bladder are folded at 13 and 54 and tucked in to form dimples 52 and 53. The gas valve 56 is set. The bladder is partially inflated with gas 31. The gap is laced up and closed. The bladder is fully inflated with gas 31. The bladder 5 expands to the classic vesica piscis shape beneath the cover 25 when fully inflated and laced. The football, now an instrumented football, is removed from the holding fixture.

The plugs in the buffer plate assemblies 24 and 37 are removable, enabling the instrumentation package assemblies which contain the cameras 23 and 39, camera lens 21 and 46, battery packs 35 and 11, and the supporting electronics 9 and 41, to be loaded into the buffer plate assemblies 18 and 37, or removed for service and maintenance. The wireless antenna elements 49, 50, 51 and 48 are molded into the buffer plate assemblies to stabilize them from shock and vibration.

There is no space inside a conventional football to instrument it with an instrumentation package assembly. The entire space inside the conventional football is taken up by the conventional football's inflated bladder. The present invention solves this problem simply by folding the vertices of a common conventional football bladder inward and forming dimples to gain the space need by the buffer plate assemblies and the instrumentation package assemblies to instrument the football.

The present preferred embodiment has several advantages. First, it has the advantage of simplicity because all of it components, except its two identical instrumentation package assemblies inside the buffer plate assemblies, already exist. This leads to shorter product development time to the market and smaller product development cost. Second, it is very easy to assemble, thereby lowering its cost to manufacture. Third, it can be sold at a lower price than previous preferred embodiments, and therefore is more affordable in college and high school venues that have small equipment budgets and simpler playing fields.

The present preferred embodiment has several disadvantages compared to previous preferred embodiments. Like its predecessor in FIG. 9E its instrumentation package assemblies may become more easily misaligned from the shock and vibration of the game because they are not held together by a common axial structure. Each of its instrumentation package assemblies has limited space for its batteries, thereby requiring them to be more frequently charged. Also, broadcast range will be limited because of power limitations.

A variety of different camera lens types, with different lens setting capability, can be used providing they are small in size and weight. The auto iris setting permits the camera lens to automatically adjust for varying lighting conditions on the field. The auto focus setting permits the camera lens to adjust focus for varying distances of the players and action subjects on the field.

When the football has been thrown and is in flight on its trajectory from the quarterback to his intended receiver, the distance of the football from the quarterback is increasing, whereas the distance of the football to the intended receive is decreasing. Each camera can be independently and simultaneously commanded and controlled to auto focus on their respective subjects. The rearward camera is looking backward in the direction to where the football has been, and can retain its focus on the quarterback, while the forward camera is looking forward in the direction of its travel, and retains its focus on the receiver.

The functions of the camera lenses 21 and 46 such as focus adjustment settings and iris adjustment settings are controlled wirelessly by the cameraman from the remote base station by sending command and control signals from the remote base station to the instrumented football. The cameraman can also send command and control signals from the remote base station to the instrumented football to put these settings on automatic under the control of the camera electronics. The optical and electronic zoom functions of the camera lenses 21 and 46 are operated by the cameraman by sending command and control signals from the remote base station to the instrumented football. The cameraman can select from a wide variety of HD camera lenses. Wide angle lenses and ultra wide angle lenses are used in many venues to give the TV viewing audience the feeling of being there on the playing field amongst the players. In some venues the cameraman may choose to use camera lenses with more magnification and narrower fields of view to better cover certain plays. In some venues the cameraman may choose camera lenses with small f-numbers to deal with poorer lighting conditions. In many venues the cameraman will choose the camera lenses 21 and 46 to be identical to one another. In many venues the cameraman will choose to use identical settings in both lenses 21 and 46 so that the TV viewing audience will see the same from either end of the instrumented football.

Referring to the Preferred Embodiments Specified in FIG. 9F, the Instrumented Professional League Football Satisfies all of the Following Objectives:

It is an objective of the present invention for the instrumented football to be equipped with two separate instrumentation package assemblies that are each assembled directly into the instrumented football through its lacing gap and positioned to see out onto the playing field from the opposite ends of the instrumented football through each of the vertices of the instrumented football. It is an objective of the present invention for the instrumented football to be equipped with only one instrumentation package assembly in venues where cost is an economic issue. It is an objective of the present invention for the instrumented football to be equipped with buffer plate assemblies shown in FIG. 21LL and FIG. 21MM. It is an objective of the present invention for the instrumented football to be equipped with the bladder shown in FIG. 7AA and FIG. 7BB and FIG. 7CC. It is an objective of the present invention to equip an instrumented football with the identical cover and bladder used in existing conventional regulation professional league footballs, except that the bladder has been folded inward at its ends to form dimples at both of its vertices. It is an objective of the present invention to provide an instrumented football that carries two instrumentation package assemblies, where each one carries its own rechargeable battery pack, and where the battery packs are charged using the battery charging unit shown in FIG. 31. It is an objective of the present invention to provide an instrumented football that carries two instrumentation package assemblies where each instrumentation package assembly that carries its own rechargeable battery pack that carries sufficient energy to power the cameras, lenses, antennas and electronics for the duration of the football game. It is an objective of the present invention to provide an instrumented football which carries two instrumentation package assemblies that each carries its own battery pack that is recharged wirelessly by induction. It is an objective of the present invention to provide an instrumented football with space for two instrumentation package assemblies and two buffer plate assemblies while still retaining the conventional football's existing cover/liner and bladder. It is an objective of the present invention to provide an instrumented football where its antenna elements are molded into the buffer plate assemblies to stabilize them from shock and vibration. It is an objective of the present invention to provide an instrumented football where space is gained for its two instrumentation package assemblies and two buffer plate assemblies simply by folding the vertices of a common conventional football bladder inward and forming dimples. It is an objective of the present invention to provide an instrumented football where space is conserved by building the two instrumentation package assemblies inside their respective buffer plate assemblies. It is an objective of the present invention to provide an instrumented football that has simplicity, lower development cost, and a shorter product development cycle. It is an objective of the present invention to provide an instrumented football that can be sold at a lower price to venues that have small equipment budgets and simpler playing fields, for example, sandlot players and high schools. It is an objective of the present invention to provide an instrumented football that can employ one of a variety of different camera lens types.

Figure 10A:
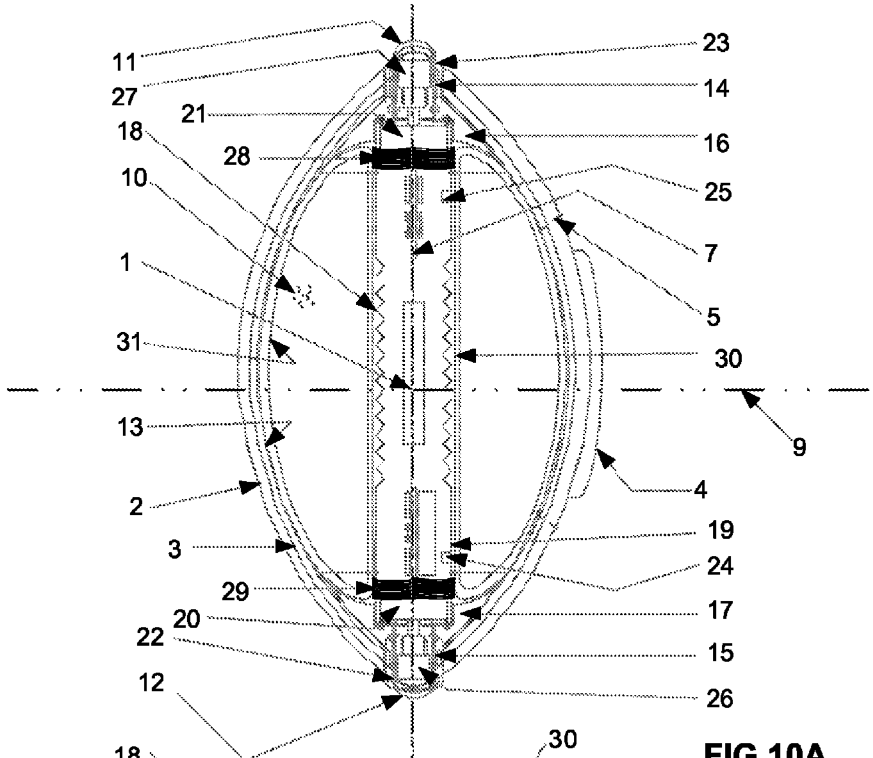
FIG. 10A is a side view section of the instrumented football.
Figure 10B:
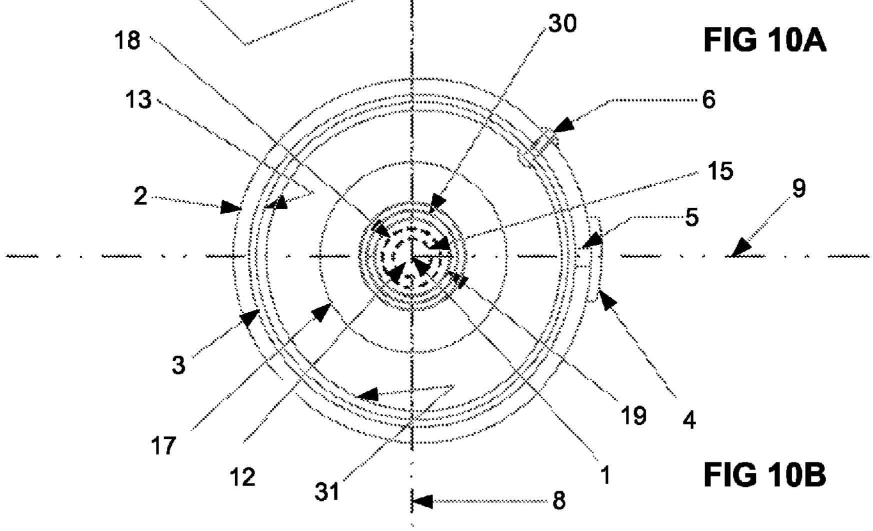
FIG. 10B is an end view section of the instrumented football.

FIG. 10A and FIG. 10B

The detailed physical elements disclosed in the instrumented professional league football drawings shown in FIG. 10A and FIG. 10B are identified as follows: 1 is the rechargeable battery pack located near the origin (0,0,0) of the instrumented football's three axis coordinate system (x,y,z). 2 is a prior art regulation cover modified with two machined and precision stitched holes coaxially bored into its vertices. 3 is the football's liner. 4 are the laces. 5 is the gap in the cover along the top of the instrumented football between the adjacent top two cover panels. 6 is the gas valve through which pressurized gas is pumped into the pre-formed bladder to inflate it. 7 are instrumentation package assembly electronics mounted close to the y-axis of the instrumented football. 8 is the z-axis. 9 is the x-axis. 10 is the gas used to inflate the pre-formed bladder. 11 and 12 are the optical windows. 13 is the pre-formed Type I bladder which props up the instrumented football's cover by pressing on its liner. 14 and 15 are the small diameter ends of the buffer plates whose surfaces are vesica piscis shaped and which are pressed through the holes in the cover and liner at both vertices of the instrumented football respectively. 16 and 17 are buffer plates used to mount the instrumentation package assembly to the football. 18 is a corrugated bellows section of the skin of the instrumentation package assembly that allows the instrumentation package assembly to be temporarily bent at its center to provide ease of facilitation while aligning and positioning it into the bores in the buffer plates. 19 is the smooth cylindrical section of the instrumentation package assembly. 20 and 21 are CCD sensor array cameras (or equivalent). 22 and 23 are air-tight and water-tight seals between the optical windows and the buffer plates. 24 and 25 are condenser microphones. 26 and 27 are camera lenses. 28 and 29 are the induction coils at either end of the instrumentation package assembly used to charge the battery pack. 30 is the hollow cavity of the pre-formed bladder which is pressing on the skin of the instrumentation package assembly. 31 is the pre-formed bladder which is pressing on the liner.

FIG. 10A is a side view section of the instrumented football.

FIG. 10B is an end view section of the instrumented football.

Referring to drawings FIG. 10A and FIG. 10B, in a preferred embodiment, an instrumented football constructed with an instrumentation package assembly having a corrugated bellows skin, two buffer plates, a bladder, lightweight gas, modified prior art cover, and a lightweight liner, is disclosed. These unique elements are in addition to the conventional prior art parts comprised of laces and gas valve stem which are identical to the parts used in a conventional football. Details of the corrugated bellows instrumentation package assembly are shown in FIG. 2A and FIG. 2B and FIG. 2C. Details of the Type III buffer plates are shown in FIG. 21E and FIG. 21F. Details of Type I bladder are shown in FIG. 6A and FIG. 6B. The shape of the instrumented football is essentially a vesica piscis which is circularly symmetric about its long y-axis.

The electronics 7 in the instrumentation package assembly are balanced and mounted close to the y-axis in order to minimize their moments of inertia. FIG. 23 is a block diagram that explains the detailed circuitry, flow of electrical signals and data in the general operation of the instrumentation package assembly electronics used for televising pictures and sounds, controlling the electrical and mechanical functions within the instrumentation package assembly, and charging the battery pack 1. FIG. 24 is a block diagram showing the circuitry, signals and data flows in the power supply and battery charging circuits inside the instrumentation package assembly.

The buffer plates 16 and 17 are permanently bonded to the interior of the football's cover and liner at each of it vertices.

The buffer plates serve to provide the instrumentation package assembly with a semi-rigid means with which to mount the instrumentation package assembly to an otherwise pliable football.

Throwing, kicking, piling-on and punting of the football can all cause vibration and shock to the football. In order to reduce shock and vibration to the TV camera and electronics enclosure, nesting the enclosure within the pressured walls of the hollow cavity of the inflated bladder achieves a hammock effect thereby isolating the enclosure. As the bladder is inflated with gas, the bladder walls squeeze the enclosure.

The present invention uses a TV and electronics enclosure that can compress and fold, and become non-rigid and loose its stiffness for over half its length. This is achieved by forming the skin of the enclosure into a flexible corrugated bellows in the central region of its overall length. Referring to the disclosure shown in FIG. 3A and FIG. 3B and FIG. 3C, the corrugated bellows allows the enclosure to compress and fold thereby absorbing shock and vibration. An example explaining how the instrumentation package assembly 19 may be assembled into the instrumented football shown in FIG. 10 is discussed as follows: The football's cover/liner is first modified in the following way. Precision holes are co-axially bored in a prior art football cover/liner at each of its two vertices parallel to the y-axis. The holes are precision stitched to fit snuggly around the small diameter ends of the buffer plates 14 and 15 which will later be pressed through the holes in the cover and liner at both vertices of the instrumented football respectively. Bonding compound is then applied to the two identical buffer plates 16 and 17 on their slightly conical small diameter ends 14 and 15, and to their adjoining vesica piscis shaped surfaces. The two buffer plates are inserted into the football through the open seam gap 5 at the top of the football. The two identical buffer plates 16 and 17 are positioned inside the football, into each of the precision holes at each of the football's two vertices, with their optical windows 11 and 12 looking outward. A jack is inserted into the football through the open seam gap 5 and used to co-axially press the buffer plates into the machined holes in the football's cover at each of its vertices. The jack subsequently presses the buffer plates against the interior surfaces of the cover/liner vertices, and aligns and holds the plates as the bonding compound between the buffer plates and the cover/liner is curing. The jack is withdrawn from the interior of the football after the bonding compound that secures the buffer plates to the cover/liner sandwich 3 at each vertex is cured. The buffer plates are now permanently coaxially bonded into the football against the cover/lining sandwich 3 at each end of the football at their respective vertices.

The instrumentation package assembly is inserted into the central hollow cylindrical cavity of the bladder. The pliable pre-formed bladder with the instrumentation package assembly inside is then inserted into the football through the open seam gap 5 between the panels. The pre-formed bladder is then appropriately aligned (arranged) in-between the buffer plates, so that when it is later inflated, its surfaces will appropriately match the interior surfaces of the buffer plates, and apply pressure to the buffer plates and the cover/liner to prop up the football.

The football is then pressed upon from both sides and flattened with the open gap 5 at the top along one edge. Its vertices are now grabbed and pulled apart from the outside of the football with a clamping fixture, so as to expand the distance (the space) between the buffer plates, and to allow room for the instrumentation package assembly to be fitted in between them. Each end of the instrumentation package assembly is inserted into its respective small bore in the buffer plates past the rubber o-rings at both vertices of the football.

The corrugated bellows section 18 of the skin of the instrumentation package assembly is springy and allows the instrumentation package assembly to be temporarily bent at its center to provide ease of facilitation while aligning and positioning its ends into the bores of the buffer plates. The buffer plates act as bearings that hold the instrumentation package assembly inside the football along the x, y and z-axes. After the instrumentation package assembly is seated in and between the buffer plates, the corrugated bellows springs the instrumentation package assembly back to its original straight shape.

The instrumentation package assembly is now past through the rubber o-rings in the buffer plates at both vertices of the football, and seated on the o-rings against its shoulders. The o-rings restrict the movement of the instrumentation package assembly inside the football and provide isolation from shock and vibration. The corrugated bellows also allows the instrumentation package assembly to absorb shock and vibration by compressing and bending when the football is hit, caught, kicked or crushed during play.

The two cameras 20 and 21 within the instrumentation package assembly are now able to look out through both ends of the football through the optical windows 11 and 12 which are attached and sealed to the ends of the buffer plates. The vertices of the football are then released from the clamps and the football is allowed to fatten and contract in on the instrumentation package assembly. The gas valve stem 6 of the bladder is pressed through its hole in the cover. The preceding operation has enabled the instrumentation package assembly to be held and aligned in place between the buffer plates at the football's vertices.

The football is next arranged in a jig/fixture with its gap 5 pointing skyward, and with its long y-axis 7 held horizontally. The instrumentation package assembly battery power is now turned on. The instrumentation package assembly is rotated around its y-axis 7 until the pictures wirelessly received from its two cameras are simultaneously upright. The bladder is then gradually inflated and the cover is laced permanently to close up the open seam gap 5. As the type I bladder is inflated, the diameter of the central cylindrical cavity becomes smaller and gradually grabs and presses upon the instrumentation package assembly so as to cushion it and hold it in place.

Moisture can get in at the region around the football's laces. In order to mitigate the risk of moisture filling the region between the football's cover, liner and its bladder by way of the space between its laces, a thin sealing compound is administered to the inside surface of the football's cover and liner seam and the bladder near its laces, thereby effecting a positive moisture proof seal between the football's covering and its bladder at the opening. The covering itself must be waterproofed as well on its inside surface.

A variety of different camera lens types, with different lens setting capability, can be used providing they are small in size and weight. The auto iris setting permits the camera lens to automatically adjust for varying lighting conditions on the field. The auto focus setting permits the camera lens to adjust focus for varying distances of the players and action subjects on the field.

When the football has been thrown and is in flight on its trajectory from the quarterback to his intended receiver, the distance of the football from the quarterback is increasing, whereas the distance of the football to the intended receive is decreasing. Each camera can be independently and simultaneously commanded and controlled to auto focus on their respective subjects. The rearward camera is looking backward in the direction to where the football has been, and can retain its focus on the quarterback, while the forward camera is looking forward in the direction of its travel, and retains its focus on the receiver.

The functions of the camera lenses 26 and 27 such as focus adjustment settings and iris adjustment settings are controlled wirelessly by the cameraman from the remote base station by sending command and control signals from the remote base station to the instrumented football. The cameraman can also send command and control signals from the remote base station to the instrumented football to put these settings on automatic under the control of the camera electronics. The optical and electronic zoom functions of the camera lenses 26 and 27 are operated by the cameraman by sending command and control signals from the remote base station to the instrumented football. The cameraman can select from a wide variety of HD camera lenses. Wide angle lenses and ultra wide angle lenses are used in many venues to give the TV viewing audience the feeling of being there on the playing field amongst the players. In some venues the cameraman may choose to use camera lenses with more magnification and narrower fields of view to better cover certain plays. In some venues the cameraman may choose camera lenses with small f-numbers to deal with poorer lighting conditions. In many venues the cameraman will choose the camera lenses 26 and 27 to be identical to one another. In many venues the cameraman will choose to use identical settings in both lenses 26 and 27 so that the TV viewing audience will see the same from either end of the instrumented football.

Referring to the Preferred Embodiments Specified in FIG. 10A and FIG. 10B, the Instrumented Professional League Football Satisfies all of the Following Further Objectives:

It is an objective of the present invention to provide an instrumented football comprised of a prior art regulation cover modified with two machined and precision stitched holes coaxially bored into its vertices, lightweight liner, laces, gap in the cover, gas valve, lightweight gas, pre-formed bladder, two optical windows, two buffer plates, instrumentation package assembly, corrugated bellows section of the instrumentation package assembly, smooth cylindrical section, two CCD sensor array cameras (or equivalent), air-tight and water-tight seals, two condenser microphones, electronics, two camera lenses, two induction coils, and rechargeable battery pack. It is an objective of the present invention to provide an instrumented football using buffer plates shown in FIG. 21C and FIG. 21D, and the bladder shown in FIG. 6A and FIG. 6B. It is an objective of the present invention to provide an instrumented football using a bladder with a central cylindrical cavity down its length to firmly hold the instrumentation package assembly inside it. It is an objective of the present invention to construct an instrumented professional league football which uses a prior art cover and liner to save on the cost to create unique covers and liners. It is an objective of the present invention to provide a means to firmly mount the instrumentation package assembly inside the football. It is an objective of the present invention to provide a mounting means for the instrumentation package assembly that will reduce the shock and vibration to the instrumentation package assembly during the instrumented football's use in sports events, etc. both on and off the field.

It is an objective of the present invention to use a lighter weight liner in the instrumented football than the liner used in the conventional football. It is an objective of the present invention to use a lighter weight gas to inflate the instrumented football than the air gas used in to inflate the conventional football. It is an objective of the present invention to provide an instrumentation package assembly that can be loaded and assembled into the football through the conventional seam gap in the cover panels. It is an objective of the present invention to be able to lace the football with the conventional laces and lacing stitch hole pattern. It is an objective of the present invention to provide a permanent position and nesting place for the instrumentation package assembly inside the football. It is an objective of the present invention to maintain alignment of the instrumentation package assembly relative to the football during usage of the instrumented football. It is an objective of the present invention to provide an instrumented football constructed with an instrumentation package assembly having a corrugated bellows skin, two buffer plates, a bladder, lightweight gas, modified prior art cover, lightweight liner and conventional prior art parts comprised of laces and gas valve stem which are identical to the parts used in a conventional regulation football. It is an objective of the present invention to provide an instrumented football where the instrumentation package assembly enclosure within the pressured walls of the central hollow cylindrical cavity of the inflated bladder reduces the shock and vibration to the TV camera and electronics during a game. It is an objective of the present invention to provide an instrumented football where the instrumentation package assembly enclosure can compress and fold, and become non-rigid and loose its stiffness for over half its length. It is an objective of the present invention to provide an instrumented football where the instrumentation package assembly has a corrugated bellows section of its skin which is springy and allows the instrumentation package assembly to be temporarily bent at its center to provide ease of facilitation while aligning and positioning its ends into the bores of the buffer plates. It is an objective of the present invention to provide an instrumented football where the instrumentation package assembly sits between buffer plates that act as bearings that hold and restrain the instrumentation package assembly inside the football along its x, y and z axes. It is an objective of the present invention to provide an instrumented football where the instrumentation package assembly's corrugated bellows section allows the instrumentation package assembly to absorb shock and vibration by compressing and bending when the football is hit, caught, kicked or crushed during play. It is an objective of the present invention to provide an instrumented football where the instrumentation package assembly's corrugated bellows section allows the instrumentation package assembly to be gripped by the inflated bladder's central hollow cylindrical cavity. It is an objective of the present invention to provide an instrumented football that has a battery pack that is wirelessly charged by magnetic induction.

Figure 11A:
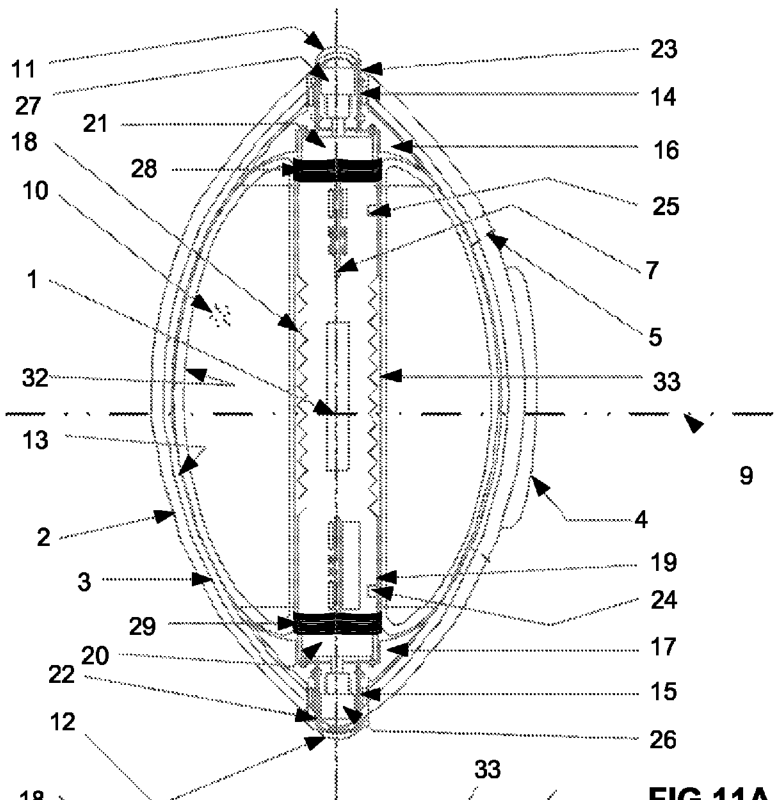
FIG. 11A is a side view section of the instrumented football.
Figure 11B:
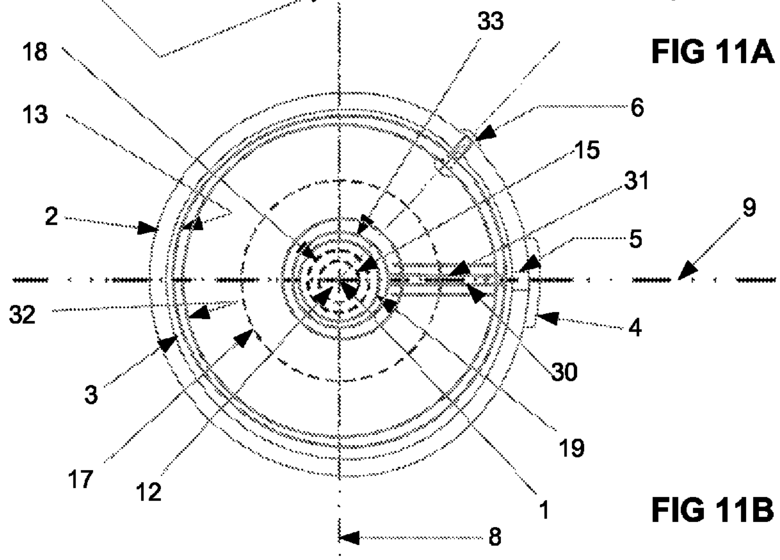
FIG. 11B is an end view section of the instrumented football.

FIG. 11A and FIG. 11B

The detailed physical elements disclosed in the instrumented professional league football drawings shown in FIG. 11A and FIG. 11B are identified as follows: 1 is the rechargeable battery pack located near the origin (0,0,0) of the instrumented football's three axis coordinate system (x,y,z). 2 is a prior art regulation cover modified with two machined and precision stitched holes coaxially bored into its vertices. 3 is the football's liner. 4 are the laces. 5 is the gap in the cover along the top of the instrumented football between the adjacent top two cover panels. 6 is the gas valve through which pressurized gas is pumped into the pre-formed bladder to inflate it. 7 are instrumentation package assembly electronics mounted close to the y-axis of the instrumented football. 8 is the z-axis. 9 is the x-axis. 10 is the gas used to inflate the pre-formed bladder. 11 and 12 are the optical windows. 13 is the pre-formed Type II bladder which props up the instrumented football's cover. 14 and 15 are the small diameter ends of the buffer plates whose surfaces are vesica piscis shaped and which are pressed through the holes in the cover and liner at both vertices of the instrumented football respectively. 16 and 17 are buffer plates used to mount the instrumentation package assembly to the football. 18 is a corrugated bellows section of the skin of the instrumentation package assembly that allows the instrumentation package assembly to be temporarily bent at its center to provide ease of facilitation while aligning and positioning it into the bores in the buffer plates. 19 is the smooth cylindrical section of the instrumentation package assembly. 20 and 21 are CCD sensor array cameras (or equivalent). 22 and 23 are air-tight and water-tight seals between the optical windows and the buffer plates. 24 and 25 are condenser microphones. 26 and 27 are camera lenses. 28 and 29 are the induction coils at either end of the instrumentation package assembly used to charge the battery pack. 30 and 31 are two interior parallel pre-formed bladder walls forming a slot down from the top of the football to the pre-formed bladder's hollow cylindrical cavity. 32 is the pre-formed bladder pressing outward on the liner. 33 is the hollow cavity of the pre-formed bladder which is pressing inward on the skin of the instrumentation package assembly.

FIG. 11A is a side view section of the instrumented football.

FIG. 11B is an end view section of the instrumented football.

Referring to drawings FIG. 11A and FIG. 11B, in a preferred embodiment, an instrumented football constructed with an instrumentation package assembly having a corrugated bellows skin, two Type III buffer plates, a Type II bladder, lightweight gas, modified prior art cover, and a lightweight liner, is disclosed. These unique elements are in addition to its conventional parts comprised of laces and gas valve stem which are identical to the parts used in a conventional football. Details of the corrugated bellows instrumentation package assembly are shown in FIG. 2A and FIG. 2B and FIG. 2C. Details of the Type III buffer plates are shown in FIG. 21E and FIG. 21F. Details of the Type II bladder are shown in FIG. 7A and FIG. 7B. The shape of the instrumented football is essentially a vesica piscis which is circularly symmetric about its y-axis 7.

The electronics 7 in the instrumentation package assembly are balanced and mounted close to the y-axis in order to minimize their moments of inertia. FIG. 23 is a block diagram that explains the detailed circuitry, flow of electrical signals and data in the general operation of the instrumentation package assembly electronics used for televising pictures and sounds, controlling the electrical and mechanical functions within the instrumentation package assembly, and charging the battery pack 1. FIG. 24 is a block diagram showing the circuitry, signals and data flows in the power supply and battery charging circuits inside the instrumentation package assembly.

The buffer plates 16 and 17 are permanently attached to the interior of the football's cover and liner at each of it vertices. The buffer plates serve to provide the instrumentation package assembly with a semi-rigid means with which to mount the instrumentation package assembly to an otherwise pliable football.

The only difference between the current embodiment and the embodiment shown in FIG. 10 is that the current embodiment utilizes a FIG. 7A and FIG. 7B bladder rather than the FIG. 6AA and FIG. 6BB bladder used in FIG. 10.

An example explaining how the instrumentation package assembly 19 may be assembled chronologically into the instrumented football shown in FIG. 11 is discussed as follows:

The football's cover/liner is first modified in the following way. Precision holes are co-axially bored in a prior art football cover/liner at each of its two vertices parallel to the y-axis. The holes are precision stitched to fit snuggly around the small diameter ends of the buffer plates 14 and 15 which will later be pressed through the holes in the cover and liner at both vertices of the instrumented football respectively. Bonding compound is then applied to the two identical buffer plates 16 and 17 on their slightly conical small diameter ends 14 and 15, and to their adjoining vesica piscis shaped surfaces. The two buffer plates are inserted into the football through the open seam gap 5 at the top of the football. The two identical buffer plates 16 and 17 are positioned at each of the football's two vertices, into each of the precision holes at each of the football's two vertices, with their optical windows 11 and 12 looking outward. A jack is inserted into the football through the open seam gap 5 and used to co-axially press the buffer plates into the machined holes in the football's cover at each of its vertices. The jack subsequently presses the buffer plates against the interior surfaces of the cover/liner vertices, and aligns and holds the plates as the bonding compound between the buffer plates and the cover/liner is curing. The jack is withdrawn from the interior of the football after the bonding compound that secures the buffer plates to the cover/liner sandwich 3 at each vertex is cured. The buffer plates are now permanently bonded into the football against the cover/lining sandwich 3 at each end of the football at their respective vertices.

The pliable pre-formed Type II bladder is then inserted into the football through the open seam gap 5 between the open cover panels on the top of the football. The Type II pre-formed bladder is then appropriately aligned (arranged) in-between the two buffer plates, so that when the bladder is later inflated its surfaces will appropriately match the interior surfaces of the buffer plates, and thereby apply pressure to the buffer plates and to the cover/liner to prop up the football. The parallel bladder walls 30 and 31 forming the slot in the Type II bladder are arranged so that the bladder's slot is aligned with the open gap 5 in the cover panels.

The football is then pressed upon on both sides and flattened out with its open gap 5 facing skyward at the top along one edge of the flattened football. The football's vertices are now held and pulled apart from the outside of the football with a clamping fixture. This expands the axial distance (the space) between the buffer plates inside the football to allow room for the instrumentation package assembly to now be fitted in between them.

The instrumentation package assembly is now pushed into the football through the gap 5 opening in the football at its top. It is pushed down into the slot between the parallel walls 30 and 31 of the bladder until it enters the hollow cylindrical cavity of the bladder 33. Within the hollow cylindrical cavity of the bladder 33 the instrumentation package assembly now lies parallel to the x-axis of the football. Each end of the instrumentation package assembly is then inserted into its respective small bore in each of the buffer plates.

The corrugated bellows section 18 of the skin of the instrumentation package assembly is springy and allows the instrumentation package assembly to be temporarily bent at its center to provide ease of facilitation while aligning and positioning its ends into the bores of the buffer plates. The buffer plates act as bearings that hold the instrumentation package assembly inside the football along the x, y and z-axes. After the instrumentation package assembly is seated in and between the buffer plates, the corrugated bellows springs the instrumentation package assembly back to its original straight shape.

The instrumentation package assembly is now passed through the rubber o-rings in the buffer plates at both vertices of the football, and seated on the o-rings against its shoulders. The o-rings restrict the movement of the instrumentation package assembly inside the football and provide isolation from shock and vibration. The corrugated bellows also allows the instrumentation package assembly to absorb shock and vibration by compressing and bending when the football is hit, caught, kicked or crushed during play.

In order to reduce shock and vibration to the TV camera and electronics enclosure, nesting the enclosure within the pressured walls of the hollow cavity of the inflated bladder achieves a hammock effect thereby isolating the enclosure. As the bladder is inflated with gas, the bladder walls squeeze the enclosure.

The present invention uses a TV and electronics enclosure that can compress and fold, and become non-rigid and loose its stiffness for over half its length. This is achieved by forming the skin of the enclosure into a flexible corrugated bellows in the central region of its overall length. Referring to the disclosure shown in FIG. 3A and FIG. 3B and FIG. 3C, the corrugated bellows allows the enclosure to compress and fold thereby absorbing shock and vibration.

The two cameras 20 and 21 within the instrumentation package assembly are now able to look out through both ends of the football through the optical windows 11 and 12 which are attached and sealed to the ends of their respective buffer plates 16 and 17. The vertices of the football are then released from the clamps and the football is allowed to fatten and contract in on the instrumentation package assembly. The preceding operation enabled the instrumentation package assembly to be held and aligned in place inside the football between the buffer plates at the football's vertices.

The football is next arranged in a jig/fixture with its gap 5 pointing skyward, and with its long x-axis 7 held horizontally. The instrumentation package assembly battery power is now turned on. The instrumentation package assembly is rotated around its x-axis 7 until the pictures wirelessly received from its two cameras are simultaneously upright. The gas valve stem 6 of the bladder is pushed through its hole in the cover/liner. The bladder is then gradually inflated and the cover is laced permanently to close up the open seam. As the Type II bladder is inflated, the diameter of its central cylindrical cavity becomes smaller and gradually grabs and presses upon the instrumentation package assembly so as to cushion it and hold it in place.

A variety of different camera lens types, with different lens setting capability, can be used providing they are small in size and weight. The auto iris setting permits the camera lens to automatically adjust for varying lighting conditions on the field. The auto focus setting permits the camera lens to adjust focus for varying distances of the players and action subjects on the field.

When the football has been thrown and is in flight on its trajectory from the quarterback to his intended receiver, the distance of the football from the quarterback is increasing, whereas the distance of the football to the intended receive is decreasing. Each camera can be independently and simultaneously commanded and controlled to auto focus on their respective subjects. The rearward camera is looking backward in the direction to where the football has been, and can retain its focus on the quarterback, while the forward camera is looking forward in the direction of its travel, and retains its focus on the receiver.

The functions of the camera lenses 26 and 27 such as focus adjustment settings and iris adjustment settings are controlled wirelessly by the cameraman from the remote base station by sending command and control signals from the remote base station to the instrumented football. The cameraman can also send command and control signals from the remote base station to the instrumented football to put these settings on automatic under the control of the camera electronics. The optical and electronic zoom functions of the camera lenses 26 and 27 are operated by the cameraman by sending command and control signals from the remote base station to the instrumented football. The cameraman can select from a wide variety of HD camera lenses. Wide angle lenses and ultra wide angle lenses are used in many venues to give the TV viewing audience the feeling of being there on the playing field amongst the players. In some venues the cameraman may choose to use camera lenses with more magnification and narrower fields of view to better cover certain plays. In some venues the cameraman may choose camera lenses with small f-numbers to deal with poorer lighting conditions. In many venues the cameraman will choose the camera lenses 26 and 27 to be identical to one another. In many venues the cameraman will choose to use identical settings in both lenses 26 and 27 so that the TV viewing audience will see the same from either end of the instrumented football.

Referring to the Preferred Embodiments Specified in FIG. 11A and FIG. 11B, the Instrumented Professional League Football Satisfies all of the Following Further Objectives:

It is an objective of the present invention to provide an instrumented football comprised a prior art regulation cover modified with two machined and precision stitched holes coaxially bored into its vertices, lightweight liner, laces, gap in the cover, gas valve, lightweight gas, pre-formed bladder, two optical windows, two buffer plates, instrumentation package assembly, corrugated bellows section of the instrumentation package assembly, smooth cylindrical section, two CCD sensor array cameras (or equivalent), air-tight and water-tight seals, two condenser microphones, electronics, two camera lenses, two induction coils, and rechargeable battery pack. It is an objective of the present invention to provide an instrumented football using the buffer plates shown in FIG. 21C and FIG. 21D, and the bladder shown in FIG. 7AA and FIG. 7BB. It is an objective of the present invention to provide an instrumented football using a bladder with a central cylindrical cavity and slot down its length to firmly hold the instrumentation package assembly inside it.

It is an objective of the present invention to provide a means to firmly mount the instrumentation package assembly inside the football. It is an objective of the present invention to provide a mounting means for the instrumentation package assembly that will reduce the shock and vibration to the instrumentation package assembly during the instrumented football's use in a sports event. It is an objective of the present invention to use a lighter weight liner in the instrumented football than the liner used in the conventional football. It is an objective of the present invention to use a lighter weight gas to inflate the instrumented football than the air gas used in to inflate the conventional football. It is an objective of the present invention to provide an instrumentation package assembly that can be loaded and assembled into the football through the conventional seam gap in the cover panels. It is an objective of the present invention to be able to lace the football with the conventional laces and lacing stitch hole pattern. It is an objective of the present invention to provide a permanent position and nesting place for the instrumentation package assembly inside the football.

It is an objective of the present invention to maintain alignment of the instrumentation package assembly relative to the football during usage of the instrumented football. It is an objective of the present invention to provide an instrumented football where the instrumentation package assembly enclosure can compress and fold, and become non-rigid and loose its stiffness for over half its length. It is an objective of the present invention to provide an instrumented football where the instrumentation package assembly has a corrugated bellows section of its skin which is springy and allows the instrumentation package assembly to be temporarily bent at its center to provide ease of facilitation while aligning and positioning its ends into the bores of the buffer plates. It is an objective of the present invention to provide an instrumented football where the instrumentation package assembly sits between buffer plates that act as bearings that hold and restrain the instrumentation package assembly inside the football along its x, y and z axes. It is an objective of the present invention to provide an instrumented football where the instrumentation package assembly's corrugated bellows section allows the instrumentation package assembly to absorb shock and vibration by compressing and bending when the football is hit, caught, kicked or crushed during play. It is an objective of the present invention to provide an instrumented football where the instrumentation package assembly's corrugated bellows section allows the instrumentation package assembly to be gripped by the inflated bladder's central hollow cylindrical cavity. It is an objective of the present invention to provide an instrumented football that has a battery pack that is wirelessly charged by magnetic induction.

Figure 12A:
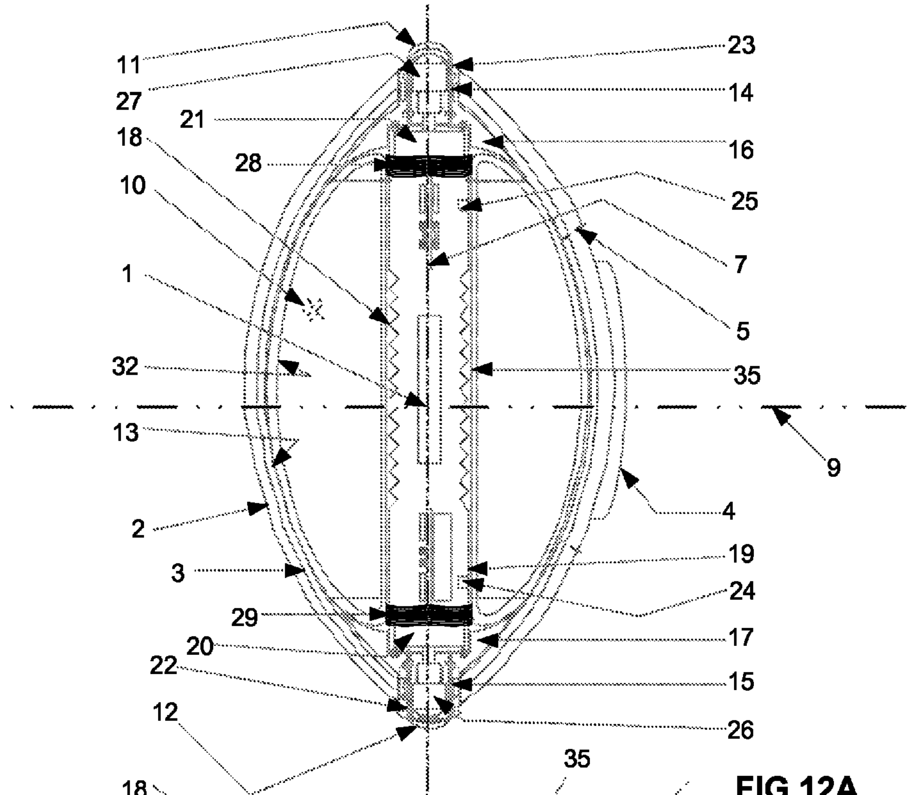
FIG. 12A is a side view section of the instrumented football.
Figure 12B:
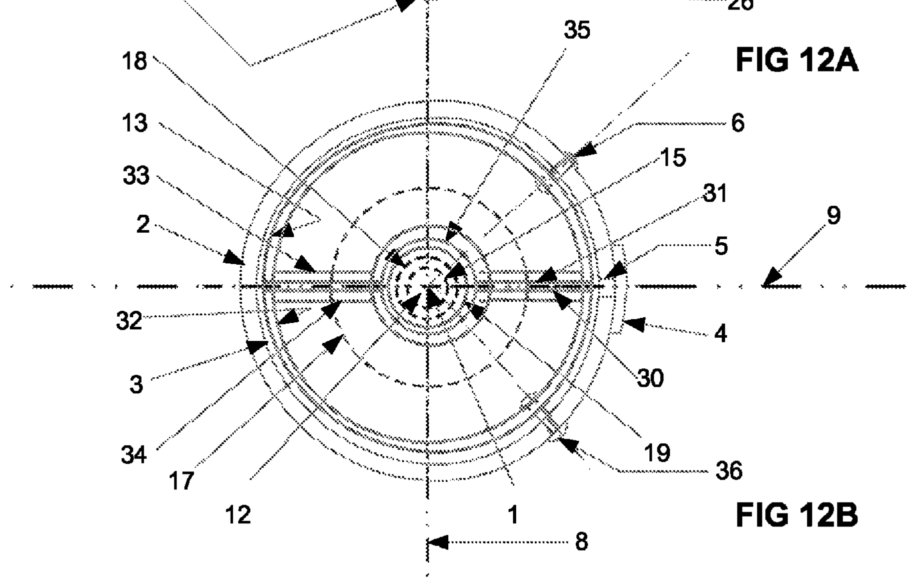
FIG. 12B is an end view section of the instrumented football.

FIG. 12A and FIG. 12B

The detailed physical elements disclosed in the instrumented professional league football drawings shown in FIG. 12A and FIG. 12B are identified as follows: 1 is the rechargeable battery pack located near the origin (0,0,0) of the instrumented football's three axis coordinate system (x,y,z). 2 is a prior art regulation cover modified with two machined and precision stitched holes coaxially bored into its vertices. 3 is the football's liner. 4 are the laces. 5 is the gap in the cover along the top of the instrumented football between the adjacent top two cover panels. 6 is the gas valve through which pressurized gas is pumped into the first half of the pre-formed bladder to inflate it. 7 7 are instrumentation package assembly electronics mounted close to the y-axis of the instrumented football. 8 is the z-axis. 9 is the x-axis. 10 is the gas used to inflate the pre-formed bladder. 11 and 12 are the optical windows. 13 is the pre-formed Type III bladder which props up the instrumented football's cover. 14 and 15 are the small diameter ends of the buffer plates whose surfaces are vesica piscis shaped and which are pressed through the holes in the cover and liner at both vertices of the instrumented football respectively. 16 and 17 are buffer plates used to mount the instrumentation package assembly to the football. 18 is a corrugated bellows section of the skin of the instrumentation package assembly that allows the instrumentation package assembly to be temporarily bent at its center to provide ease of facilitation while aligning and positioning it into the bores in the buffer plates. 19 is the smooth cylindrical section of the instrumentation package assembly. 20 and 21 are CCD sensor array cameras (or equivalent). 22 and 23 are air-tight and water-tight seals between the optical windows and the buffer plates. 24 and 25 are condenser microphones. 26 and 27 are camera lenses. 28 and 29 are the induction coils at either end of the instrumentation package assembly used to charge the battery pack. 30 and 31 are two interior parallel pre-formed bladder walls forming a slot down from the top of the football to the pre-formed bladder's hollow cylindrical cavity. 32 is the pre-formed bladder pressing outward on the liner. 33 and 34 are two interior parallel pre-formed bladder walls forming a slot from the central hollow cavity down to the bottom of the football. 35 is the hollow cavity of the pre-formed bladder which is pressing inward on the skin of the instrumentation package assembly. 36 is the gas valve through which pressurized gas is pumped into the second half of the pre-formed bladder to inflate it.

FIG. 12A is a side view section of the instrumented football.

FIG. 12B is an end view section of the instrumented football.

Referring to drawings FIG. 12A and FIG. 12B, in a preferred embodiment, an instrumented football constructed with an instrumentation package assembly having a corrugated bellows skin, two Type III buffer plates, a bladder, lightweight gas, modified prior art cover and a lightweight liner, is disclosed. These unique elements are in addition to its conventional parts comprised of laces and gas valve stem which are identical to the parts used in a conventional football. Details of the corrugated bellows instrumentation package assembly are shown in FIG. 2A and FIG. 2B and FIG. 2C. Details of the Type III buffer plates are shown in FIG. 21E and FIG. 21F. Details of the Type III bladder are shown in FIG. 8A and FIG. 8B. As shown in FIG. 8A and FIG. 8B the bladder is constructed of two identical halves. The shape of the instrumented football is essentially a vesica piscis which is circularly symmetric about its y-axis 7.

The electronics 7 in the instrumentation package assembly are balanced and mounted close to the y-axis in order to minimize their moments of inertia. FIG. 23 is a block diagram that explains the detailed circuitry, flow of electrical signals and data in the general operation of the instrumentation package assembly electronics used for televising pictures and sounds, controlling the electrical and mechanical functions within the instrumentation package assembly, and charging the battery pack 1. FIG. 24 is a block diagram showing the circuitry, signals and data flows in the power supply and battery charging circuits inside the instrumentation package assembly.

The buffer plates 16 and 17 are permanently attached to the interior of the football's cover and liner at each of it vertices. The buffer plates serve to provide the instrumentation package assembly with a semi-rigid means with which to mount the instrumentation package assembly to an otherwise pliable football.

The only difference between the current embodiment and the embodiment shown in FIG. 11 is that the current embodiment utilizes a FIG. 8A and FIG. 8B bladder rather than the FIG. 7AA and FIG. 7BB bladder used in FIG. 11.

An example explaining how the instrumentation package assembly 19 may be assembled into the instrumented football shown in FIG. 11 is discussed as follows: The football's cover/liner is first modified in the following way. Precision holes are co-axially bored in a prior art football cover/liner at each of its two vertices parallel to the y-axis. The holes are precision stitched to fit snuggly around the small diameter ends of the buffer plates 14 and 15 which will later be pressed through the holes in the cover and liner at both vertices of the instrumented football respectively. Bonding compound is then applied to the two identical buffer plates 16 and 17 on their slightly conical small diameter ends 14 and 15, and to their adjoining vesica piscis shaped surfaces. The two buffer plates are inserted into the football through the open seam gap 5 at the top of the football. The two identical buffer plates 16 and 17 are positioned at each of the football's two vertices, into each of the precision holes at each of the football's two vertices, with their optical windows 11 and 12 looking outward. A jack is inserted into the football through the open seam gap 5 and used to co-axially press the buffer plates into the machined holes in the football's cover at each of its vertices. The jack subsequently presses the buffer plates against the interior surfaces of the cover/liner vertices, and aligns and holds the plates as the bonding compound between the buffer plates and the cover/liner is curing. The jack is withdrawn from the interior of the football after the bonding compound that secures the buffer plates to the cover/liner sandwich 3 at each vertex is cured. The buffer plates are now permanently bonded into the football against the cover/lining sandwich 3 at each end of the football at their respective vertices.

Both halves of the pliable pre-formed Type III pre-formed bladder are then inserted into the football through the open seam gap 5 between the open panels on the top of the football. The Type III pre-formed bladder is comprised of two identical halves. Each half has its own valve stems 2 and 16. The valve stems 2 and 36 are pressed through their respective holes in the cover/lining. The Type III pre-formed bladder is then appropriately aligned (arranged) in-between the two buffer plates, so that when the bladder is later inflated, its surfaces will appropriately match the interior surfaces of the buffer plates, and thereby apply pressure to the buffer plates and to the cover/liner to prop up the football. The parallel bladder walls 30 and 31 forming the upper slot in the Type III bladder are arranged so that the slot is aligned with the open gap 5 in the cover panels.

The football is then pressed upon on both sides and flattened out with its open gap 5 facing skyward at the top along one edge of the flattened football. The football's vertices are now held and pulled apart from the outside of the football with a clamping fixture. This expands the axial distance (the space) between the buffer plates inside the football to allow room for the instrumentation package assembly to now be fitted in between them.

The instrumentation package assembly is now pushed into the football through the gap 5 opening in the football at its top. It is pushed down into the slot between the parallel walls 30 and 31 of the bladder until it enters the hollow cylindrical cavity of the bladder 33. Within the hollow cylindrical cavity of the bladder 33 the instrumentation package assembly now lies parallel to the x-axis of the football. Each end of the instrumentation package assembly is then inserted into its respective small bore in each of the buffer plates.

The corrugated bellows section 18 of the skin of the instrumentation package assembly is springy and allows the instrumentation package assembly to be temporarily bent at its center to provide ease of facilitation while aligning and positioning its ends into the bores of the buffer plates. The buffer plates act as bearings that hold the instrumentation package assembly inside the football along the x, y and z-axes. After the instrumentation package assembly is seated in and between the buffer plates, the corrugated bellows springs the instrumentation package assembly back to its original straight shape.

The instrumentation package assembly is now past through the rubber o-rings in the buffer plates at both vertices of the football, and seated on the o-rings against its shoulders. The o-rings restrict the movement of the instrumentation package assembly inside the football and provide isolation from shock and vibration. The corrugated bellows also allows the instrumentation package assembly to absorb shock and vibration by compressing and bending when the football is hit, caught, kicked or crushed during play.

In order to reduce shock and vibration to the TV camera and electronics enclosure, nesting the enclosure within the pressured walls of the hollow cavity of the inflated bladder achieves a hammock effect thereby isolating the enclosure. As the bladder is inflated with gas, the bladder walls squeeze the enclosure.

The present invention uses a TV and electronics enclosure that can compress and fold, and become non-rigid and loose its stiffness for over half its length. This is achieved by forming the skin of the enclosure into a flexible corrugated bellows in the central region of its overall length. Referring to the disclosure shown in FIG. 3A and FIG. 3B and FIG. 3C, the corrugated bellows allows the enclosure to compress and fold thereby absorbing shock and vibration.

The two cameras 20 and 21 cameras within the instrumentation package assembly are now able to look out through both ends of the football through the optical windows 11 and 12 which are attached and sealed to the ends of their respective buffer plates 16 and 17. The vertices of the football are then released from the clamps and the football is allowed to fatten and contract in on the instrumentation package assembly. The preceding operation enabled the instrumentation package assembly to be held and aligned in place inside the football between the buffer plates at the football's vertices.

The football is next arranged in a jig/fixture with its gap 5 pointing skyward, and with its long x-axis 7 held horizontally. The instrumentation package assembly battery power is now turned on. The instrumentation package assembly is rotated around its x-axis 7 until the pictures wirelessly received from its two cameras are simultaneously upright. The bladder is then gradually inflated and the cover is laced permanently to close up the open seam. As the Type I bladder is inflated, the diameter of its central cylindrical cavity becomes smaller and gradually grabs and presses upon the instrumentation package assembly so as to cushion it and hold it in place.

A variety of different camera lens types, with different lens setting capability, can be used providing they are small in size and weight. The auto iris setting permits the camera lens to automatically adjust for varying lighting conditions on the field. The auto focus setting permits the camera lens to adjust focus for varying distances of the players and action subjects on the field.

When the football has been thrown and is in flight on its trajectory from the quarterback to his intended receiver, the distance of the football from the quarterback is increasing, whereas the distance of the football to the intended receive is decreasing. Each camera can be independently and simultaneously commanded and controlled to auto focus on their respective subjects. The rearward camera is looking backward in the direction to where the football has been, and can retain its focus on the quarterback, while the forward camera is looking forward in the direction of its travel, and retains its focus on the receiver.

The functions of the camera lenses 26 and 27 such as focus adjustment settings and iris adjustment settings are controlled wirelessly by the cameraman from the remote base station by sending command and control signals from the remote base station to the instrumented football. The cameraman can also send command and control signals from the remote base station to the instrumented football to put these settings on automatic under the control of the camera electronics. The optical and electronic zoom functions of the camera lenses 26 and 27 are operated by the cameraman by sending command and control signals from the remote base station to the instrumented football. The cameraman can select from a wide variety of HD camera lenses. Wide angle lenses and ultra wide angle lenses are used in many venues to give the TV viewing audience the feeling of being there on the playing field amongst the players. In some venues the cameraman may choose to use camera lenses with more magnification and narrower fields of view to better cover certain plays. In some venues the cameraman may choose camera lenses with small f-numbers to deal with poorer lighting conditions. In many venues the cameraman will choose the camera lenses 26 and 27 to be identical to one another. In many venues the cameraman will choose to use identical settings in both lenses 26 and 27 so that the TV viewing audience will see the same from either end of the instrumented football.

Referring to the Preferred Embodiments Specified in FIG. 12A and FIG. 12B, the Instrumented Professional League Football Satisfies all of the Following Further Objectives:

It is an objective of the present invention to provide an instrumented football comprised of a cover, lightweight liner, laces, gap in the cover, gas valve, lightweight gas, pre-formed bladder, two optical windows, two buffer plates, instrumentation package assembly, corrugated bellows section of the instrumentation package assembly, smooth cylindrical section, two CCD sensor array cameras (or equivalent), air-tight and water-tight seals, two condenser microphones, electronics, two camera lenses, two induction coils, and rechargeable battery pack. It is an objective of the present invention to provide an instrumented football using a bladder with a central cylindrical cavity and a double slot down its length to firmly hold the instrumentation package assembly inside it. It is an objective of the present invention to provide a means to firmly mount the instrumentation package assembly inside the football. It is an objective of the present invention to provide a mounting means for the instrumentation package assembly that will reduce the shock and vibration to the instrumentation package assembly during the instrumented football's use in a sports event. It is an objective of the present invention to use a lighter weight liner in the instrumented football than the liner used in the conventional football. It is an objective of the present invention to use a lighter weight gas to inflate the instrumented football than the air gas used in to inflate the conventional football. It is an objective of the present invention to provide an instrumentation package assembly that can be loaded and assembled into the football through the conventional seam gap in the cover panels. It is an objective of the present invention to be able to lace the football with the conventional laces and lacing stitch hole pattern. It is an objective of the present invention to provide a permanent position and nesting place for the instrumentation package assembly inside the football. It is an objective of the present invention to maintain alignment of the instrumentation package assembly relative to the football during usage of the instrumented football in a game. It is an objective of the present invention to provide a permanent position and nesting place for the instrumentation package assembly inside the football. It is an objective of the present invention to maintain alignment of the instrumentation package assembly relative to the football during usage of the instrumented football. It is an objective of the present invention to provide an instrumented football where the instrumentation package assembly enclosure can compress and fold, and become non-rigid and loose its stiffness for over half its length. It is an objective of the present invention to provide an instrumented football where the instrumentation package assembly has a corrugated bellows section of its skin which is springy and allows the instrumentation package assembly to be temporarily bent at its center to provide ease of facilitation while aligning and positioning its ends into the bores of the buffer plates. It is an objective of the present invention to provide an instrumented football where the instrumentation package assembly sits between buffer plates that act as bearings that hold and restrain the instrumentation package assembly inside the football along its x, y and z-axes. It is an objective of the present invention to provide an instrumented football where the instrumentation package assembly's corrugated bellows section allows the instrumentation package assembly to absorb shock and vibration by compressing and bending when the football is hit, caught, kicked or crushed during play. It is an objective of the present invention to provide an instrumented football where the instrumentation package assembly's corrugated bellows section allows the instrumentation package assembly to be gripped by the inflated bladder's central hollow cylindrical cavity. It is an objective of the present invention to provide an instrumented football that has a battery pack that is wirelessly charged by magnetic induction.

Figure 13A:
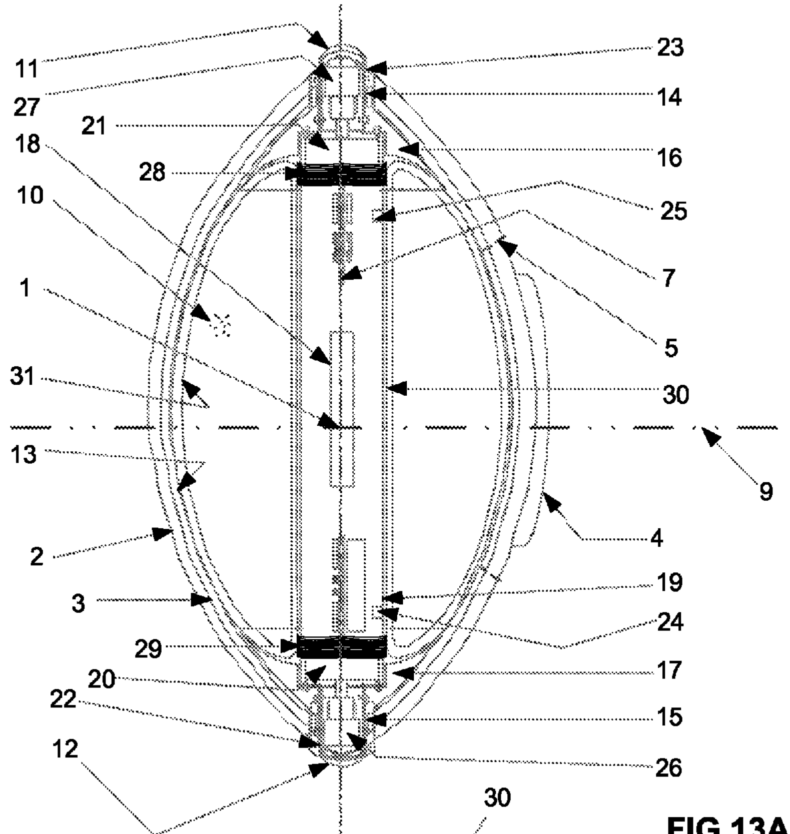
FIG. 13A is a side view section of the instrumented football.
Figure 13B:
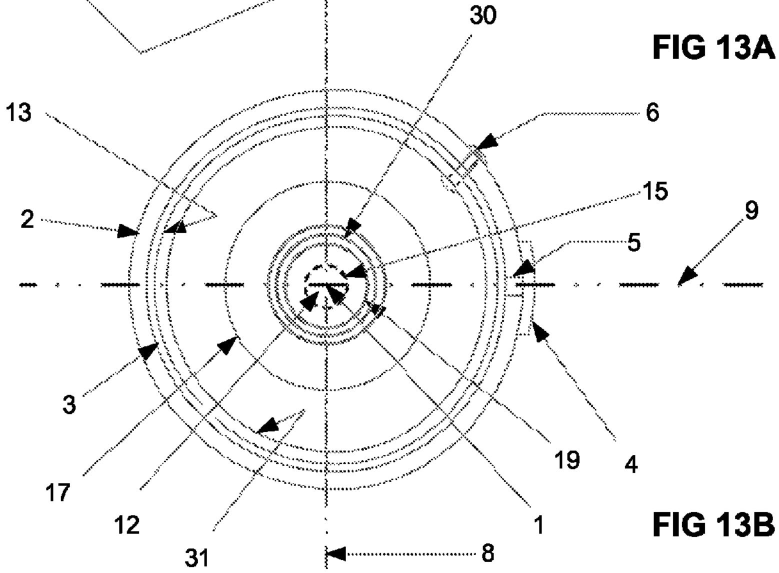
FIG. 13B is an end view section of the instrumented football.

FIG. 13A and FIG. 13B

The detailed physical elements disclosed in the instrumented professional league football drawings shown in FIG. 13A and FIG. 13B are identified as follows: 1 is the rechargeable battery pack located near the origin (0,0,0) of the instrumented football's three axis coordinate system (x,y,z). 2 is a prior art regulation cover modified with two machined and precision stitched holes coaxially bored into its vertices. 3 is the football's liner. 4 are the laces. 5 is the gap in the cover along the top of the instrumented football between the adjacent top two cover panels. 6 is the gas valve through which pressurized gas is pumped into the pre-formed bladder to inflate it. 7 are instrumentation package assembly electronics mounted close to the y-axis of the instrumented football. 8 is the z-axis. 9 is the x-axis. 10 is the gas used to inflate the pre-formed bladder. 11 and 12 are the optical windows. 13 is the pre-formed Type I bladder which props up the instrumented football's cover. 14 and 15 are the small diameter ends of the buffer plates whose surfaces are vesica piscis shaped and which are pressed through the holes in the cover and liner at both vertices of the instrumented football respectively. 16 and 17 are buffer plates used to mount the instrumentation package assembly to the football. 18 is a battery pack. 19 is the smooth cylindrical skin section of the instrumentation package assembly. 20 and 21 are CCD sensor array cameras (or equivalent). 22 and 23 are air-tight and water-tight seals between the optical windows and the buffer plates. 24 and 25 are condenser microphones. 26 and 27 are camera lenses. 28 and 29 are the induction coils at either end of the instrumentation package assembly used to charge the battery pack. 30 is the hollow cylindrical cavity of the pre-formed bladder which is pressing inward on the skin of the instrumentation package assembly. 31 is the pre-formed bladder which is pressing outward on the liner.

FIG. 13A is a side view section of the instrumented football.

FIG. 13B is an end view section of the instrumented football.

Referring to drawings FIG. 13A and FIG. 13B, in a preferred embodiment, an instrumented football constructed with a cylindrical skin instrumentation package assembly, two Type III buffer plates, a bladder, lightweight gas, modified prior art cover and a lightweight liner, is disclosed. These unique elements are in addition to its conventional parts comprised of laces and gas valve stem which are identical to the parts used in a conventional football. Details of the cylindrical skin instrumentation package assembly are shown in FIG. 4A and FIG. 4B and FIG. 4C. Details of the Type III buffer plates are shown in FIG. 21E and FIG. 21F. Details of the Type I bladder are shown in FIG. 6A and FIG. 6B. The shape of the instrumented football is essentially a vesica piscis which is circularly symmetric about its y-axis 7.

The preferred embodiment disclosed in FIG. 13A and FIG. 13B is distinguished from the preferred embodiments shown in FIG. 10A and FIG. 10B, and FIG. 11A and FIG. 11B, and FIG. 12A and FIG. 12B by its use of a smooth cylindrical skin enclosure rather than the corrugated bellows. The smooth cylinder is easier to manufacture and has a lower cost.

The electronics 7 in the instrumentation package assembly are balanced and mounted close to the y-axis in order to minimize their moments of inertia. FIG. 23 is a block diagram that explains the detailed circuitry, flow of electrical signals and data in the general operation of the instrumentation package assembly electronics used for televising pictures and sounds, controlling the electrical and mechanical functions within the instrumentation package assembly, and charging the battery pack 1. FIG. 24 is a block diagram showing the circuitry, signals and data flows in the power supply and battery charging circuits inside the instrumentation package assembly.

The buffer plates 16 and 17 are permanently attached to the interior of the football's cover and liner at each of it vertices. The buffer plates serve to provide the instrumentation package assembly with a semi-rigid means with which to mount the instrumentation package assembly to an otherwise pliable football.

In order to reduce shock and vibration to the TV camera and electronics enclosure, nesting the enclosure within the pressured walls of the hollow cavity of the inflated bladder achieves a hammock effect thereby isolating the enclosure. As the bladder is inflated with gas, the bladder walls squeeze the enclosure.

In a conventional football, moisture can get in at the region around the football's laces. In order to mitigate the risk of moisture filling the region between the instrumented football's cover, liner and its pre-formed bladder by way of the space between its laces, a thin compliant sealing compound is administered to the inside surface of the football's cover and liner seam and the bladder near its laces, thereby effecting a positive moisture proof seal between the football's covering and its bladder at the opening. The covering itself must be waterproofed as well on its inside surface.

Throwing, kicking, piling-on and punting of the football, cause vibration and shock to the football that is consequently seen by the TV camera and electronics enclosure.

The reduction of shock and vibration to the TV cameras and their associated electronics within the instrumentation package assembly is achieved by nesting the instrumentation package assembly in the pressured walls of the hollow cavity of the inflated bladder inside the football; and by isolating shock from the buffer plates to the ends of the instrumentation package assembly with rubber o-rings. The bladder performs its task by providing a hammock effect on the instrumentation package assembly and thereby isolating it.

An example explaining how the instrumentation package assembly 19 may be assembled into the instrumented football shown in FIG. 13 is discussed as follows: The football's cover/liner is first modified in the following way. Precision holes are coaxially bored in a prior art football cover/liner at each of its two vertices parallel to the y-axis. The holes are precision stitched to fit snuggly around the small diameter ends of the buffer plates 14 and 15 which will later be pressed through the holes in the cover and liner at both vertices of the instrumented football respectively. Bonding compound is then applied to the two identical buffer plates 16 and 17 on their slightly conical small diameter ends 14 and 15, and to their adjoining vesica piscis shaped surfaces. The two buffer plates are inserted into the football through the open seam gap 5 at the top of the football. The two identical buffer plates 16 and 17 are positioned inside the football, at each of the football's two vertices, into each of the precision holes at each of the football's two vertices, with their optical windows 11 and 12 looking outward. A jack is inserted into the football through the open seam gap 5 at the top of the football and used to co-axially press the buffer plates into the machined holes in the football's cover at each of its vertices. The jack subsequently presses the buffer plates against the interior surfaces of the cover/liner vertices, and aligns and holds the plates as the bonding compound between the buffer plates and the cover/liner is curing. The jack is withdrawn from the interior of the football after the bonding compound that secures the buffer plates to the cover/liner sandwich 3 at each vertex is cured. The buffer plates are now permanently coaxially bonded into the football against the cover/lining sandwich 3 at each end of the football at their respective vertices.

The instrumentation package assembly is inserted into the central hollow cylindrical cavity of the Type I bladder.

The pliable pre-formed Type I bladder with the instrumentation package assembly is then inserted into the football through the open seam gap 5 between the panels. The gas valve stem 6 of the bladder is pressed through its hole in the cover. The Type I pre-formed bladder is then appropriately aligned (arranged) in-between the buffer plates, so that when it is later inflated, its surfaces will appropriately match the interior surfaces of the buffer plates, and apply pressure to the buffer plates and the cover/liner to prop up the football.

The football is then pressed upon from both sides and flattened with the open gap 5 at the top along one edge. Its vertices are now grabbed and pulled apart from the outside of the football with a clamping fixture, so as to expand the distance (the space) between the buffer plates, and to allow room for the instrumentation package assembly to be fitted in between them. Each end of the instrumentation package assembly is inserted into its respective small bore in the buffer plates past the rubber o-rings at both vertices of the football. The cameras within the instrumentation package assembly are now able to look out through both ends of the football through the optical windows 11 and 12 which are attached and sealed to the ends of the buffer plates. The vertices of the football are then released from the clamps and the football is allowed to fatten and contract in on the instrumentation package assembly. The gas valve stem 6 of the bladder is pressed through its hole in the cover. The preceding operation has enabled the instrumentation package assembly to be held and aligned in place between the buffer plates at the football's vertices.

The football is next arranged in a jig/fixture with its gap 5 pointing skyward and with its long y-axis 7 held horizontally. The instrumentation package assembly battery power is now turned on. The instrumentation package assembly is rotated around its y-axis 7 until the pictures wirelessly received from its two cameras are simultaneously upright. The bladder is then gradually inflated and the cover is laced permanently to close up the open seam gap 5. As the Type I bladder is inflated, the diameter of its central cylindrical cavity becomes smaller and gradually grabs and presses upon the instrumentation package assembly so as to cushion it and hold it in place.

Moisture can get in at the region around the football's laces. In order to mitigate the risk of moisture filling the region between the football's cover, liner and its bladder by way of the space between its laces, a thin sealing compound is administered to the inside surface of the football's cover and liner seam and the bladder near its laces, thereby effecting a positive moisture proof seal between the football's covering and its bladder at the opening. The covering itself must be waterproofed as well on its inside surface.

A variety of different camera lens types, with different lens setting capability, can be used providing they are small in size and weight. The auto iris setting permits the camera lens to automatically adjust for varying lighting conditions on the field. The auto focus setting permits the camera lens to adjust focus for varying distances of the players and action subjects on the field.

When the football has been thrown and is in flight on its trajectory from the quarterback to his intended receiver, the distance of the football from the quarterback is increasing, whereas the distance of the football to the intended receive is decreasing. Each camera can be independently and simultaneously commanded and controlled to auto focus on their respective subjects. The rearward camera is looking backward in the direction to where the football has been, and can retain its focus on the quarterback, while the forward camera is looking forward in the direction of its travel, and retains its focus on the receiver.

The functions of the camera lenses 26 and 27 such as focus adjustment settings and iris adjustment settings are controlled wirelessly by the cameraman from the remote base station by sending command and control signals from the remote base station to the instrumented football. The cameraman can also send command and control signals from the remote base station to the instrumented football to put these settings on automatic under the control of the camera electronics. The optical and electronic zoom functions of the camera lenses 26 and 27 are operated by the cameraman by sending command and control signals from the remote base station to the instrumented football. The cameraman can select from a wide variety of HD camera lenses. Wide angle lenses and ultra wide angle lenses are used in many venues to give the TV viewing audience the feeling of being there on the playing field amongst the players. In some venues the cameraman may choose to use camera lenses with more magnification and narrower fields of view to better cover certain plays. In some venues the cameraman may choose camera lenses with small f-numbers to deal with poorer lighting conditions. In many venues the cameraman will choose the camera lenses 26 and 27 to be identical to one another. In many venues the cameraman will choose to use identical settings in both lenses 26 and 27 so that the TV viewing audience will see the same from either end of the instrumented football.

Referring to the Preferred Embodiments Specified in FIG. 13A and FIG. 13B, the Instrumented Professional League Football Satisfies all of the Following Objectives:

It is an objective of the present invention to provide an instrumented football comprised of a prior art regulation cover modified with two machined and precision stitched holes coaxially bored into its vertices, lightweight liner, laces, gap in the cover, gas valve, lightweight gas, pre-formed bladder, two optical windows, two buffer plates, instrumentation package assembly, smooth cylindrical section, two CCD sensor array cameras (or equivalent), air-tight and water-tight seals, two condenser microphones, electronics, two camera lenses, two induction coils, and rechargeable battery pack. It is an objective of the present invention to provide an instrumented football using buffer plates shown in FIG. 21C and FIG. 21D, and the bladder shown in FIG. 6A and FIG. 6B. It is an objective of the present invention to provide an instrumentation package having a cylindrical skin, two buffer plates, a bladder, lightweight gas, modified prior art cover, lightweight liner, conventional laces and gas valve stem. It is an objective of the present invention to provide a means to firmly mount the instrumentation package assembly inside the football. It is an objective of the present invention to provide a mounting means for the instrumentation package assembly that will reduce the shock and vibration to the instrumentation package assembly during the instrumented football's use in a sports event. It is an objective of the present invention to use a lighter weight liner in the instrumented football than the liner used in the conventional football. It is an objective of the present invention to use a lighter weight gas to inflate the instrumented football than the air gas used in to inflate the conventional football. It is an objective of the present invention to provide an instrumentation package assembly that can be loaded and assembled into the football through the conventional seam gap in the cover panels. It is an objective of the present invention to be able to lace the football with the conventional laces and lacing stitch hole pattern. It is an objective of the present invention to provide a permanent position and nesting place for the instrumentation package assembly inside the football. It is an objective of the present invention to maintain alignment of the instrumentation package assembly relative to the football during usage of the instrumented football during a game or training. It is an objective of the present invention to reduce the shock and vibration to the TV cameras and their associated electronics within the instrumentation package assembly. It is an objective of the present invention to provide an instrumented football where the instrumentation package assembly sits between buffer plates that act as bearings that hold and restrain the instrumentation package assembly inside the football along its x, y and z axes. It is an objective of the present invention to provide an instrumented football where the instrumentation package assembly's smooth cylindrical section allows the instrumentation package assembly to be gripped by the inflated bladder's central hollow cylindrical cavity. It is an objective of the present invention to provide an instrumented football that has a battery pack that is wirelessly charged by magnetic induction.

Figure 14A:
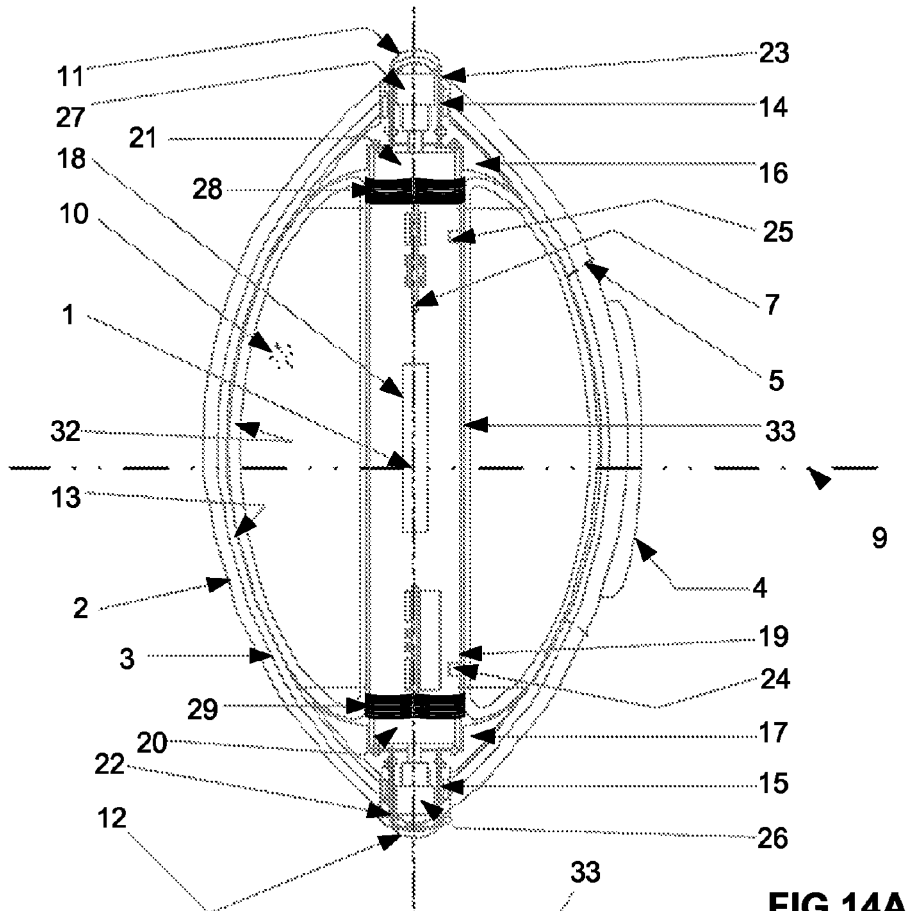
FIG. 14A is a side view section of the instrumented football.
Figure 14B:
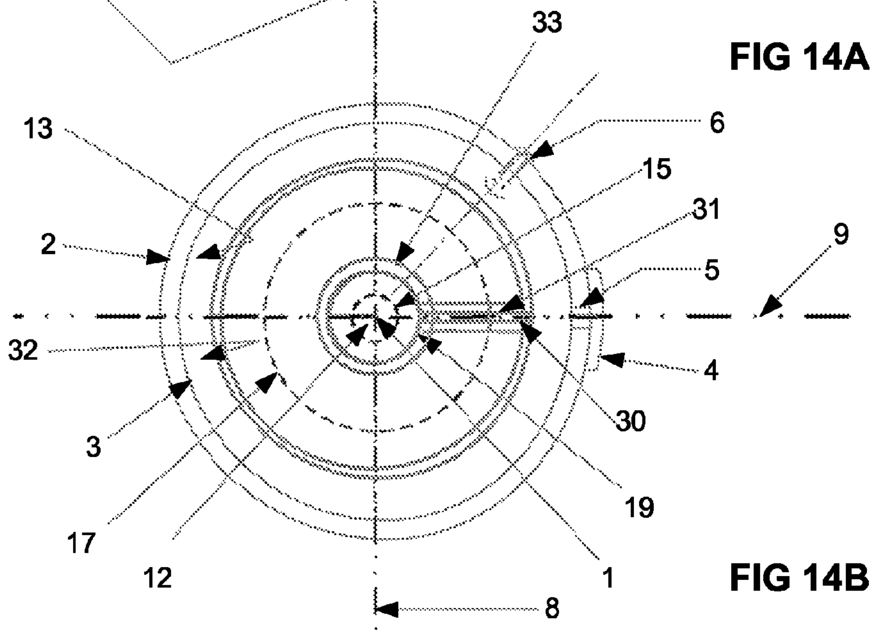
FIG. 14B is an end view section of the instrumented football.

FIG. 14A and FIG. 14B

The detailed physical elements disclosed in the instrumented professional league football drawings shown in FIG. 14A and FIG. 14B are identified as follows: 1 is the rechargeable battery pack located near the origin (0,0,0) of the instrumented football's three axis coordinate system (x,y,z). 2 is a prior art regulation cover modified with two machined and precision stitched holes coaxially bored into its vertices. 3 is the football's liner. 4 are the laces. 5 is the gap in the cover along the top of the instrumented football between the adjacent top two cover panels. 6 is the gas valve through which pressurized gas is pumped into the pre-formed bladder to inflate it. 7 are instrumentation package assembly electronics mounted close to the y-axis of the instrumented football. 8 is the z-axis. 9 is the x-axis. 10 is the gas used to inflate the pre-formed bladder. 11 and 12 are the optical windows. 13 is the pre-formed Type II bladder which props up the instrumented football's cover. 14 and 15 are the small diameter ends of the buffer plates whose surfaces are vesica piscis shaped and which are pressed through the holes in the cover and liner at both vertices of the instrumented football respectively. 16 and 17 are buffer plates used to mount the instrumentation package assembly to the football. 18 is a battery pack. 19 is the smooth cylindrical skin section of the instrumentation package assembly. 20 and 21 are CCD sensor array cameras (or equivalent). 22 and 23 are air-tight and water-tight seals between the optical windows and the buffer plates. 24 and 25 are condenser microphones. 26 and 27 are camera lenses. 28 and 29 are the induction coils at either end of the instrumentation package assembly used to charge the battery pack. 30 and 31 are two interior parallel pre-formed bladder walls forming a slot down from the top of the football to the pre-formed bladder's hollow cylindrical cavity. 32 is the pre-formed bladder pressing outward on the liner. 33 is the hollow cavity of the pre-formed bladder which is pressing inward on the skin of the instrumentation package assembly.

FIG. 14A is a side view section of the instrumented football.

FIG. 14B is an end view section of the instrumented football.

Referring to drawings FIG. 14A and FIG. 14B, in a preferred embodiment, an instrumented football constructed with an instrumentation package assembly having a cylindrical skin, two Type III buffer plates, a Type II bladder, lightweight gas, modified prior art cover and a lightweight liner, is disclosed. These unique elements are in addition to its conventional parts comprised of laces and gas valve stem which are identical to the parts used in a conventional football. Details of the cylindrical skin instrumentation package assembly are shown in FIG. 4A and FIG. 4B and FIG. 4C. Details of the Type III buffer plates are shown in FIG. 21E and FIG. 21F. Details of the Type II bladder are shown in FIG. 7A and FIG. 7B. The shape of the instrumented football is essentially a vesica piscis which is circularly symmetric about its y-axis 7.

The only difference between the current embodiment and the embodiment shown in FIG. 10 is that the current embodiment utilizes a FIG. 7A and FIG. 7B bladder rather than the FIG. 6A and FIG. 6B bladder used in FIG. 10.

The electronics 7 in the instrumentation package assembly are balanced and mounted close to the y-axis in order to minimize their moments of inertia. FIG. 23 is a block diagram that explains the detailed circuitry, flow of electrical signals and data in the general operation of the instrumentation package assembly electronics used for televising pictures and sounds, controlling the electrical and mechanical functions within the instrumentation package assembly, and charging the battery pack 1. FIG. 24 is a block diagram showing the circuitry, signals and data flows in the power supply and battery charging circuits inside the instrumentation package assembly.

The buffer plates 16 and 17 are permanently attached to the interior of the football's cover and liner at each of it vertices. The buffer plates serve to provide the instrumentation package assembly with a semi-rigid means with which to mount the instrumentation package assembly to an otherwise pliable football.

An example explaining how the instrumentation package assembly 19 may be assembled into the instrumented football shown in FIG. 14 is discussed as follows: The football's cover/liner is first modified in the following way. Precision holes are coaxially bored in a prior art football cover/liner at each of its two vertices parallel to the y-axis. The holes are precision stitched to fit snuggly around the small diameter ends of the buffer plates 14 and 15 which will later be pressed through the holes in the cover and liner at both vertices of the instrumented football respectively. Bonding compound is then applied to the two identical buffer plates 16 and 17 on their slightly conical small diameter ends 14 and 15, and to their adjoining vesica piscis shaped surfaces. The two buffer plates are inserted into the football through the open seam gap 5 at the top of the football. The two identical buffer plates 16 and 17 are positioned at each of the football's two vertices, into each of the precision holes at each of the football's two vertices, with their optical windows 11 and 12 looking outward. A jack is inserted into the football through the open seam gap 5 and used to co-axially press the buffer plates into the machined holes in the football's cover at each of its vertices. The jack subsequently presses the buffer plates against the interior surfaces of the cover/liner vertices, and aligns and holds the plates as the bonding compound between the buffer plates and the cover/liner is curing. The jack is withdrawn from the interior of the football after the bonding compound that secures the buffer plates to the cover/liner sandwich 3 at each vertex is cured. The buffer plates are now permanently bonded into the football against the cover/lining sandwich 3 at each end of the football at their respective vertices.

The pliable pre-formed Type II bladder is then inserted into the football through the open seam gap 5 between the open cover panels on the top of the football. The Type II pre-formed bladder is then appropriately aligned (arranged) in-between the two buffer plates, so that when the bladder is later inflated its surfaces will appropriately match the interior surfaces of the buffer plates, and thereby apply pressure to the buffer plates and to the cover/liner to prop up the football. The parallel bladder walls 30 and 31 forming the slot in the Type II bladder are arranged so that the bladder's slot is aligned with the open gap 5 in the cover panels.

The football is then pressed upon on both sides and flattened out with its open gap 5 facing skyward at the top along one edge of the flattened football. The football's vertices are now held and pulled apart from the outside of the football with a clamping fixture. This expands the axial distance (the space) between the buffer plates inside the football to allow room for the instrumentation package assembly to now be fitted in between them.

The instrumentation package assembly is now pushed into the football through the gap 5 opening in the football at its top. It is pushed down into the slot between the parallel walls 30 and 31 of the bladder until it enters the hollow cylindrical cavity of the bladder 33. Within the hollow cylindrical cavity of the bladder 33 the instrumentation package assembly now lies parallel to the x-axis of the football. Each end of the instrumentation package assembly is then inserted into its respective small bore in each of the buffer plates. The instrumentation package assembly is now passed through the rubber o-rings in the buffer plates at both vertices of the football, and seated on the o-rings against its shoulders. The o-rings restrict the movement of the instrumentation package assembly inside the football and provide isolation from shock and vibration.

The two cameras within the instrumentation package assembly are now able to look out through both ends of the football through the optical windows 11 and 12 which are attached and sealed to the ends of their respective buffer plates 16 and 17. The vertices of the football are then released from the clamps and the football is allowed to fatten and contract in on the instrumentation package assembly. The preceding operation enabled the instrumentation package assembly to be held and aligned in place inside the football between the buffer plates at the football's vertices. The football is next arranged in a jig/fixture with its gap 5 pointing skyward, and with its long x-axis 7 held horizontally. The instrumentation package assembly battery power is now turned on. The instrumentation package assembly is rotated around its x-axis 7 until the pictures wirelessly received from its two cameras are simultaneously upright. The gas valve stem 6 of the bladder is pushed through its hole in the cover/liner. The bladder is then gradually inflated and the cover is laced permanently to close up the open seam gap 5. As the Type II bladder is inflated, the diameter of its central cylindrical cavity becomes smaller and gradually grabs and presses upon the instrumentation package assembly so as to cushion it and hold it in place.

Throwing, kicking, piling-on and punting of the football, cause vibration and shock to the football that is consequently seen by the TV camera and electronics enclosure.

Reduction of shock and vibration to the TV camera and electronics enclosure is achieved by nesting the enclosure within the pressured walls of the hollow cavity of the inflated bladder, thereby achieving a hammock effect and isolating the enclosure. As the bladder is inflated with gas, the bladder walls squeeze the enclosure.

Moisture can get in at the region around the football's laces. In order to mitigate the risk of moisture filling the region between the football's cover, liner and its bladder by way of the space between its laces, a thin sealing compound is administered to the inside surface of the football's cover and liner seam and the bladder near its laces, thereby effecting a positive moisture proof seal between the football's covering and its bladder at the opening. The covering itself must be waterproofed as well on its inside surface.

A variety of different camera lens types, with different lens setting capability, can be used providing they are small in size and weight. The auto iris setting permits the camera lens to automatically adjust for varying lighting conditions on the field. The auto focus setting permits the camera lens to adjust focus for varying distances of the players and action subjects on the field.

When the football has been thrown and is in flight on its trajectory from the quarterback to his intended receiver, the distance of the football from the quarterback is increasing, whereas the distance of the football to the intended receive is decreasing. Each camera can be independently and simultaneously commanded and controlled to auto focus on their respective subjects. The rearward camera is looking backward in the direction to where the football has been, and can retain its focus on the quarterback, while the forward camera is looking forward in the direction of its travel, and retains its focus on the receiver.

The functions of the camera lenses 26 and 27 such as focus adjustment settings and iris adjustment settings are controlled wirelessly by the cameraman from the remote base station by sending command and control signals from the remote base station to the instrumented football. The cameraman can also send command and control signals from the remote base station to the instrumented football to put these settings on automatic under the control of the camera electronics. The optical and electronic zoom functions of the camera lenses 26 and 27 are operated by the cameraman by sending command and control signals from the remote base station to the instrumented football. The cameraman can select from a wide variety of HD camera lenses. Wide angle lenses and ultra wide angle lenses are used in many venues to give the TV viewing audience the feeling of being there on the playing field amongst the players. In some venues the cameraman may choose to use camera lenses with more magnification and narrower fields of view to better cover certain plays. In some venues the cameraman may choose camera lenses with small f-numbers to deal with poorer lighting conditions. In many venues the cameraman will choose the camera lenses 26 and 27 to be identical to one another. In many venues the cameraman will choose to use identical settings in both lenses 26 and 27 so that the TV viewing audience will see the same from either end of the instrumented football.

Referring to the Preferred Embodiments Specified in FIG. 14A and FIG. 14B, the Instrumented Professional League Football Satisfies all of the Following Objectives:

It is an objective of the present invention to provide an instrumented football comprised of a prior art regulation cover modified with two machined and precision stitched holes coaxially bored into its vertices., lightweight liner, laces, gap in the cover, gas valve, lightweight gas, pre-formed bladder, two optical windows, two buffer plates, instrumentation package assembly, smooth cylindrical section, two CCD sensor array cameras (or equivalent), air-tight and water-tight seals, two condenser microphones, electronics, two camera lenses, two induction coils, and rechargeable battery pack. It is an objective of the present invention to provide an instrumented football using buffer plates shown in FIG. 21C and FIG. 21D, and the bladder shown in FIG. 7A and FIG. 7B.

It is an objective of the present invention to provide a means to firmly mount the instrumentation package assembly inside the football. It is an objective of the present invention to provide a mounting means for the instrumentation package assembly that will reduce the shock and vibration to the instrumentation package assembly during the instrumented football's use in a sports event. It is an objective of the present invention to use a lighter weight liner in the instrumented football than the liner used in the conventional football. It is an objective of the present invention to use a lighter weight gas to inflate the instrumented football than the air gas used in to inflate the conventional football. It is an objective of the present invention to provide an instrumentation package assembly that can be loaded and assembled into the football through the conventional seam gap in the cover panels. It is an objective of the present invention to be able to lace the football with the conventional laces and lacing stitch hole pattern. It is an objective of the present invention to provide a permanent position and nesting place for the instrumentation package assembly inside the football. It is an objective of the present invention to maintain alignment of the instrumentation package assembly relative to the football during usage of the instrumented football. It is an objective of the present invention to reduce the shock and vibration to the TV camera and electronics in the instrumentation package assembly. It is an objective of the present invention to provide an instrumented football where the instrumentation package assembly's smooth cylindrical section allows the instrumentation package assembly to be gripped by the inflated bladder's central hollow cylindrical cavity. It is an objective of the present invention to provide an instrumented football that has a battery pack that is wirelessly charged by magnetic induction.

Figure 15A:
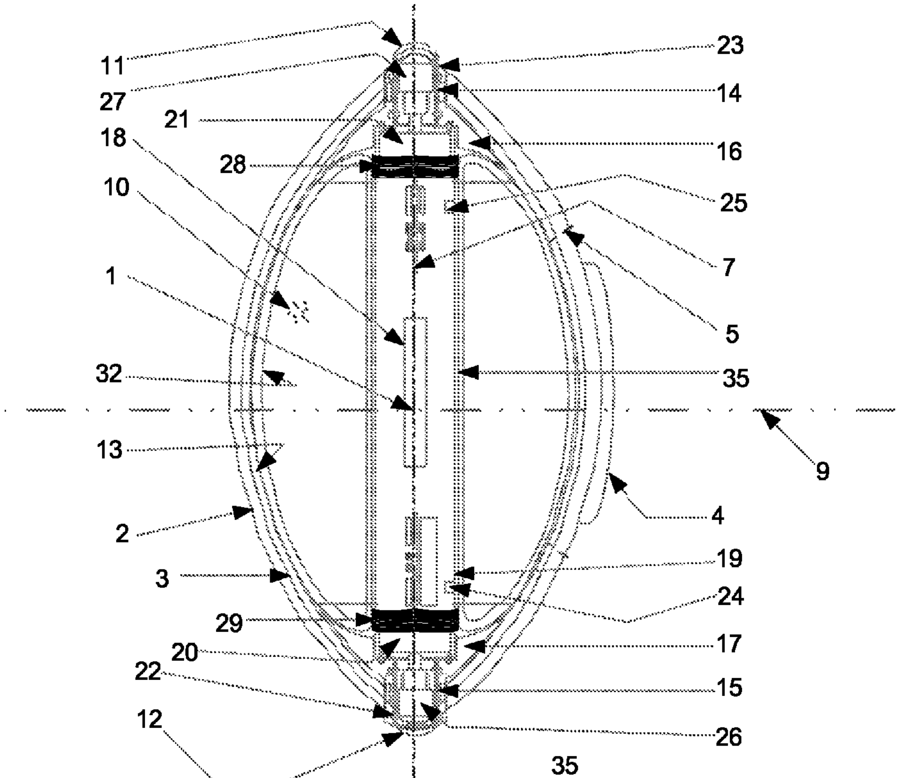
FIG. 15A is a side view section of the instrumented football.
Figure 15B:
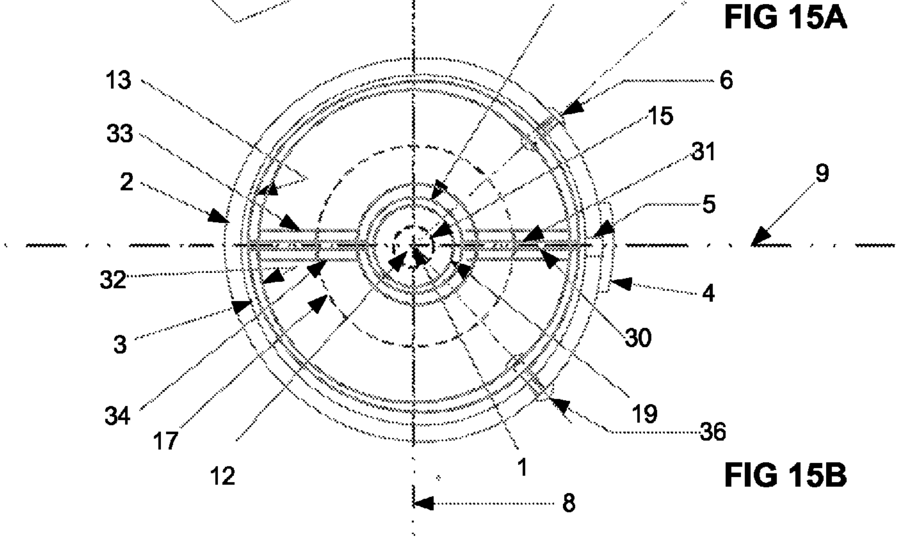
FIG. 15B is an end view section of the instrumented football.

FIG. 15A and FIG. 15B

The detailed physical elements disclosed in the instrumented professional league football drawings shown in FIG. 15A and FIG. 15B are identified as follows: 1 is the rechargeable battery pack located near the origin (0,0,0) of the instrumented football's three axis coordinate system (x,y,z). 2 is a prior art regulation cover modified with two machined and precision stitched holes coaxially bored into its vertices. 3 is the football's liner. 4 are the laces. 5 is the gap in the cover along the top of the instrumented football between the adjacent top two cover panels. 6 is the gas valve through which pressurized gas is pumped into the first half of the pre-formed bladder to inflate it. 7 are instrumentation package assembly electronics mounted close to the y-axis of the instrumented football. 8 is the z-axis. 9 is the x-axis. 10 is the gas used to inflate the pre-formed bladder. 11 and 12 are the optical windows. 13 is the pre-formed Type III bladder which props up the instrumented football's cover. 14 and 15 are the small diameter ends of the buffer plates whose surfaces are vesica piscis shaped and which are pressed through the holes in the cover and liner at both vertices of the instrumented football respectively. 16 and 17 are buffer plates used to mount the instrumentation package assembly to the football. 18 is a battery pack. 19 is the smooth cylindrical skin section of the instrumentation package assembly. 20 and 21 are CCD sensor array cameras (or equivalent), 22 and 23 are air-tight and water-tight seals between the optical windows and the buffer plates. 24 and 25 are condenser microphones. 26 and 27 are camera lenses. 28 and 29 are the induction coils at either end of the instrumentation package assembly used to charge the battery pack. 30 and 31 are two interior parallel pre-formed bladder walls forming a slot down from the top of the football to the pre-formed bladder's hollow cylindrical cavity. 32 is the pre-formed bladder pressing outward on the liner. 33 and 34 are two interior parallel pre-formed bladder walls forming a slot from the central hollow cavity down to the bottom of the football. 35 is the hollow cavity of the pre-formed bladder which is pressing inward on the skin of the instrumentation package assembly. 36 is the gas valve through which pressurized gas is pumped into the second half of the pre-formed bladder to inflate it.

FIG. 15A is a side view section of the instrumented football.

FIG. 15B is an end view section of the instrumented football.

Referring to drawings FIG. 15A and FIG. 15B, in a preferred embodiment, an instrumented football constructed with an cylindrical skin instrumentation package assembly, two Type III buffer plates, a Type III bladder, lightweight gas, modified prior art cover, and a lightweight liner, is disclosed. These unique elements are in addition to its conventional parts comprised of laces and two gas valve stems which are identical to the parts used in a conventional football. Details of the cylindrical skin instrumentation package assembly are shown in FIG. 4. Details of the Type III buffer plates are shown in FIG. 21E and FIG. 21F. Details of the Type III bladder are shown in FIG. 8A and FIG. 8B. As shown in FIG. 8A and FIG. 8B, the bladder is constructed of two identical halves. The instrumentation package assembly is specified in FIG. 4A and FIG. 4B and FIG. 4C. The shape of the instrumented football is essentially circularly symmetric about its y-axis.

The buffer plates 16 and 17 are permanently attached to the interior of the football's cover and liner at each of it vertices. The buffer plates serve to provide the instrumentation package assembly with a semi-rigid means with which to mount the instrumentation package assembly to an otherwise pliable football.

The only difference between the embodiment disclosed in FIG. 15A and FIG. 15B and the embodiment shown in FIG. 11 is that the embodiment disclosed in FIG. 16 utilizes a FIG. 8A and FIG. 8B bladder rather than the FIG. 7A and FIG. 7B bladder used in FIG. 11.

The electronics 7 in the instrumentation package assembly are balanced and mounted close to the y-axis in order to minimize their moments of inertia. FIG. 23 is a block diagram that explains the detailed circuitry, flow of electrical signals and data in the general operation of the instrumentation package assembly electronics used for televising pictures and sounds, controlling the electrical and mechanical functions within the instrumentation package assembly, and charging the battery pack 1. FIG. 24 is a block diagram showing the circuitry, signals and data flows in the power supply and battery charging circuits inside the instrumentation package assembly.

An example explaining how the instrumentation package assembly 19 may be assembled into the instrumented football shown in FIG. 11 is discussed as follows:

The football's cover/liner is first modified in the following way. Precision holes are co-axially bored in a prior art football cover/liner at each of its two vertices parallel to the y-axis. The holes are precision stitched to fit snuggly around the small diameter ends of the buffer plates 14 and 15 which will later be pressed through the holes in the cover and liner at both vertices of the instrumented football respectively. Bonding compound is then applied to the two identical buffer plates 16 and 17 on their slightly conical small diameter ends 14 and 15, and to their adjoining vesica piscis shaped surfaces. The two buffer plates are inserted into the football through the open seam gap 5 at the top of the football. The two identical buffer plates 16 and 17 are positioned at each of the football's two vertices, into each of the precision holes at each of the football's two vertices, with their optical windows 11 and 12 looking outward. A jack is inserted into the football through the open seam gap 5 and used to co-axially press the buffer plates into the machined holes in the football's cover at each of its vertices. The jack subsequently presses the buffer plates against the interior surfaces of the cover/liner vertices, and aligns and holds the plates as the bonding compound between the buffer plates and the cover/liner is curing. The jack is withdrawn from the interior of the football after the bonding compound that secures the buffer plates to the cover/liner sandwich 3 at each vertex is cured. The buffer plates are now permanently bonded into the football against the cover/lining sandwich 3 at each end of the football at their respective vertices.

Both halves of the pliable pre-formed Type III pre-formed bladder are then inserted into the football through the open seam gap 5 between the open panels on the top of the football. The Type III pre-formed bladder is comprised of two identical halves. Each half has its own valve stems 6 and 36. The valve stems 6 and 36 are pressed through their respective holes in the cover/lining. The Type III pre-formed bladder is then appropriately aligned (arranged) in-between the two buffer plates, so that when the bladder is later inflated, its surfaces will appropriately match the interior surfaces of the buffer plates, and thereby apply pressure to the buffer plates and to the cover/liner to prop up the football. The parallel bladder walls 30 and 31 forming the upper slot in the Type III bladder are arranged so that the slot is aligned with the open gap 5 in the cover panels.

The football is then pressed upon on both sides and flattened out with its open gap 5 facing skyward at the top along one edge of the flattened football. The football's vertices are now held and pulled apart from the outside of the football with a clamping fixture. This expands the axial distance (the space) between the buffer plates inside the football to allow room for the instrumentation package assembly to now be fitted in between them.

The instrumentation package assembly is now pushed into the football through the gap 5 opening in the football at its top. It is pushed down into the slot between the parallel walls 30 and 31 of the bladder until it enters the hollow cylindrical cavity of the bladder 33. Within the hollow cylindrical cavity of the bladder 33 the instrumentation package assembly now lies parallel to the x-axis of the football. Each end of the instrumentation package assembly is then inserted into its respective small bore in each of the buffer plates. The instrumentation package assembly is now passed through the rubber o-rings in the buffer plates at both vertices of the football, and seated on the o-rings against its shoulders. The o-rings restrict the movement of the instrumentation package assembly inside the football and provide isolation from shock and vibration.

The two cameras within the instrumentation package assembly are now able to look out through both ends of the football through the optical windows 11 and 12 which are attached and sealed to the ends of their respective buffer plates 16 and 17. The vertices of the football are then released from the clamps and the football is allowed to fatten and contract in on the instrumentation package assembly. The preceding operation enabled the instrumentation package assembly to be held and aligned in place inside the football between the buffer plates at the football's vertices.

The football is next arranged in a jig/fixture with its gap 5 pointing skyward, and with its long x-axis 7 held horizontally. The instrumentation package assembly battery power is now turned on. The instrumentation package assembly is rotated around its x-axis 7 until the pictures wirelessly received from its two cameras are simultaneously upright. The bladder is then gradually inflated and the cover is laced permanently to close up the open seam. As the Type I bladder is inflated, the diameter of its central cylindrical cavity becomes smaller and gradually grabs and presses upon the instrumentation package assembly so as to cushion it and hold it in place.

Reduction of shock and vibration to the TV camera and electronics enclosure is achieved by nesting the enclosure within the pressured walls of the hollow cavity of the inflated bladder, thereby achieving a hammock effect and isolating the enclosure. As the bladder is inflated with gas, the bladder walls squeeze the enclosure.

Moisture can get in at the region around the football's laces. In order to mitigate the risk of moisture filling the region between the football's cover, liner and its bladder by way of the space between its laces, a thin sealing compound is administered to the inside surface of the football's cover and liner seam and the bladder near its laces, thereby effecting a positive moisture proof seal between the football's covering and its bladder at the opening. The covering itself must be waterproofed as well on its inside surface.

Referring to the Preferred Embodiments Specified in FIG. 15A and FIG. 15B, the Instrumented Professional League Football Satisfies all of the Following Objectives:

It is an objective of the present invention to provide an instrumented football comprised of a prior art regulation cover modified with two machined and precision stitched holes coaxially bored into its vertices., lightweight liner, laces, gap in the cover, gas valve, lightweight gas, pre-formed bladder, two optical windows, two buffer plates, instrumentation package assembly, smooth cylindrical section, two CCD sensor array cameras (or equivalent), air-tight and water-tight seals, two condenser microphones, electronics, two camera lenses, two induction coils, and rechargeable battery pack. It is an objective of the present invention to provide an instrumented football using buffer plates shown in FIG. 21C and FIG. 21D, and the bladder shown in FIG. 8A and FIG. 8B. It is an objective of the present invention to provide a means to firmly mount the instrumentation package assembly inside the football. It is an objective of the present invention to provide a mounting means for the instrumentation package assembly that will reduce the shock and vibration to the instrumentation package assembly during the instrumented football's use in a sports event. It is an objective of the present invention to use a lighter weight liner in the instrumented football than the liner used in the conventional football. It is an objective of the present invention to use a lighter weight gas to inflate the instrumented football than the air gas used in to inflate the conventional football. It is an objective of the present invention to provide an instrumentation package assembly that can be loaded and assembled into the football through the conventional seam gap in the cover panels. It is an objective of the present invention to be able to lace the football with the conventional laces and lacing stitch hole pattern. It is an objective of the present invention to provide a permanent position and nesting place for the instrumentation package assembly inside the football. It is an objective of the present invention to maintain alignment of the instrumentation package assembly relative to the football during usage of the instrumented football. It is an objective of the present invention to reduce the shock and vibration to the TV camera and electronics enclosure. Throwing, kicking, piling-on and punting of the football, cause vibration and shock to the football that is consequently seen by the TV camera and electronics enclosure. It is an objective of the present invention to provide an instrumented football where the instrumentation package assembly's smooth cylindrical section allows the instrumentation package assembly to be gripped by the inflated bladder's central hollow cylindrical cavity. It is an objective of the present invention to provide an instrumented football that has a battery pack that is wirelessly charged by magnetic induction.

Figure 16A:
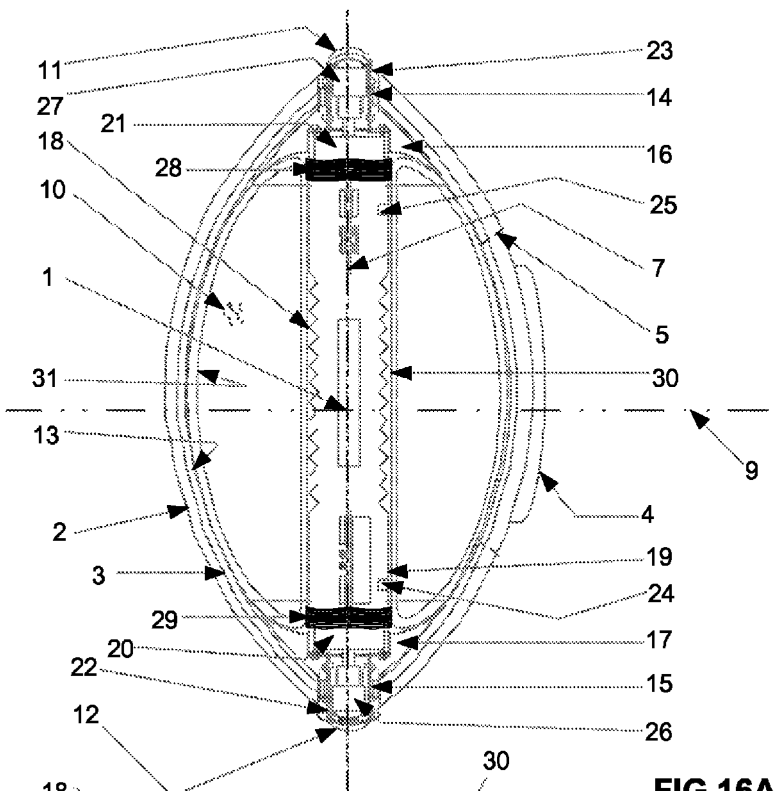
FIG. 16A is a side view section of the instrumented football.
Figure 16B:
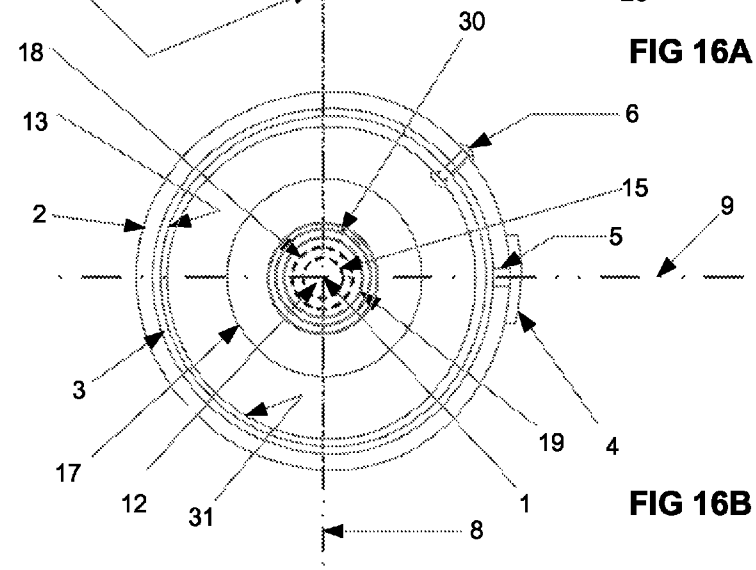
FIG. 16B is an end view section of the instrumented football.

FIG. 16A and FIG. 16B

The detailed physical elements disclosed in the instrumented high school league football drawings shown in FIG. 16A and FIG. 16B are identified as follows: 1 is the rechargeable battery pack located near the origin (0,0,0) of the instrumented football's three axis coordinate system (x,y,z). 2 is a prior art regulation cover modified with two machined and precision stitched holes coaxially bored into its vertices. 3 is the football's liner. 4 are the laces. 5 is the gap in the cover along the top of the instrumented football between the adjacent top two cover panels. 6 is the gas valve through which pressurized gas is pumped into the pre-formed bladder to inflate it. 7 are instrumentation package assembly electronics mounted close to the y-axis of the instrumented football. 8 is the z-axis. 9 is the x-axis. 10 is the gas used to inflate the pre-formed bladder. 11 and 12 are the optical windows. 13 is the pre-formed Type I bladder which props up the instrumented football's cover by pressing on its liner. 14 and 15 are the small diameter ends of the buffer plates which are pressed through the cover at both vertices of the instrumented football respectively. 16 and 17 are buffer plates used to mount the instrumentation package assembly to the football. 18 is a corrugated bellows section of the skin of the instrumentation package assembly. 19 is the smooth cylindrical section of the instrumentation package assembly. 20 and 21 are CCD sensor array cameras (or equivalent). 22 and 23 are air-tight and water-tight seals between the optical windows and the buffer plates. 24 and 25 are condenser microphones. 26 and 27 are camera lenses. 28 and 29 are the induction coils at either end of the instrumentation package assembly used to charge the battery pack. 30 is the hollow cavity of the pre-formed bladder which is pressing on the skin of the instrumentation package assembly. 31 is the pre-formed bladder which is pressing on the liner.

FIG. 16A is a side view section of the instrumented college football.

FIG. 16B is an end view section of the instrumented college football.

Referring to drawings FIG. 16A and FIG. 16B, in a preferred embodiment, an instrumented college league football which is substantially the same weight, balance, dynamic behavior, handling and general appearance as conventional college league footballs, is disclosed. The instrumented college football is constructed with an instrumentation package assembly having a corrugated bellows skin, two Type III buffer plates, a Type I bladder, lightweight gas, modified prior art cover, and a lightweight liner. These unique elements are in addition to its conventional parts comprised of laces and gas valve stem which are identical to the parts used in a conventional football. Details of the corrugated bellows instrumentation package assembly are shown in FIG. 2A and FIG. 2B and FIG. 2C. Details of the Type III buffer plates are shown in FIG. 21E and FIG. 21F. Details of the Type I bladder are shown in FIG. 6A and FIG. 6B. The shape of the instrumented football is essentially a vesica piscis which is circularly symmetric about its y-axis 7.

The electronics 7 in the instrumentation package assembly are balanced and mounted close to the y-axis in order to minimize their moments of inertia. FIG. 23 is a block diagram that explains the detailed circuitry, flow of electrical signals and data in the general operation of the instrumentation package assembly electronics used for televising pictures and sounds, controlling the electrical and mechanical functions within the instrumentation package assembly, and charging the battery pack 1. FIG. 24 is a block diagram showing the circuitry, signals and data flows in the power supply and battery charging circuits inside the instrumentation package assembly.

The buffer plates 16 and 17 are permanently attached to the interior of the football's cover and liner at each of it vertices. The buffer plates serve to provide the instrumentation package assembly with a semi-rigid means with which to mount the instrumentation package assembly to an otherwise pliable football.

An example explaining how the instrumentation package assembly 19 may be assembled into the instrumented football shown in FIG. 11 is discussed as follows: The football's cover/liner is first modified in the following way. Precision holes are coaxially bored in a prior art football cover/liner at each of its two vertices parallel to the y-axis. The holes are precision stitched to fit snuggly around the small diameter ends of the buffer plates 14 and 15 which will later be pressed through the holes in the cover and liner at both vertices of the instrumented football respectively. Bonding compound is then applied to the two identical buffer plates 16 and 17 on their slightly conical small diameter ends 14 and 15, and to their adjoining vesica piscis shaped surfaces. The two buffer plates are inserted into the football through the open seam gap 5 at the top of the football. The two identical buffer plates 16 and 17 are positioned at each of the football's two vertices, into each of the precision holes at each of the football's two vertices, with their optical windows 11 and 12 looking outward. A jack is inserted into the football through the open seam gap 5 and used to co-axially press the buffer plates into the machined holes in the football's cover at each of its vertices. The jack subsequently presses the buffer plates against the interior surfaces of the cover/liner vertices, and aligns and holds the plates as the bonding compound between the buffer plates and the cover/liner is curing. The jack is withdrawn from the interior of the football after the bonding compound that secures the buffer plates to the cover/liner sandwich 3 at each vertex is cured. The buffer plates are now permanently bonded into the football against the cover/lining sandwich 3 at each end of the football at their respective vertices.

Throwing, kicking, piling-on and punting of the football can all cause vibration and shock to the football.

In order to accomplish the reduction of shock and vibration to the TV camera and electronics enclosure, nesting the enclosure within in the pressured walls of the hollow cavity of the inflated bladder, achieves a hammock effect thereby isolating the enclosure. As the bladder is inflated with gas, the bladder walls squeeze the enclosure.

The present invention uses a TV and electronics enclosure that can compress and fold, and become non-rigid and loose its stiffness for over half its length. This is achieved by forming the skin of the enclosure into a flexible corrugated bellows in the central region of its overall length. Refer to FIG. 3A and FIG. 3B and FIG. 3C. The bellows allows the enclosure to compress and fold thereby absorbing shock and vibration.

Moisture can get in at the region around the football's laces. In order to mitigate the risk of moisture filling the region between the football's cover, liner and its bladder by way of the space between its laces, a thin sealing compound is administered to the inside surface of the football's cover and liner seam and the bladder near its laces, thereby effecting a positive moisture proof seal between the football's covering and its bladder at the opening. The covering itself must be waterproofed as well on its inside surface.

A variety of different camera lens types, with different lens setting capability, can be used providing they are small in size and weight. The auto iris setting permits the camera lens to automatically adjust for varying lighting conditions on the field. The auto focus setting permits the camera lens to adjust focus for varying distances of the players and action subjects on the field.

When the football has been thrown and is in flight on its trajectory from the quarterback to his intended receiver, the distance of the football from the quarterback is increasing, whereas the distance of the football to the intended receive is decreasing. Each camera can be independently and simultaneously commanded and controlled to auto focus on their respective subjects. The rearward camera is looking backward in the direction to where the football has been, and can retain its focus on the quarterback, while the forward camera is looking forward in the direction of its travel, and retains its focus on the receiver.

The functions of the camera lenses 26 and 27 such as focus adjustment settings and iris adjustment settings are controlled wirelessly by the cameraman from the remote base station by sending command and control signals from the remote base station to the instrumented football. The cameraman can also send command and control signals from the remote base station to the instrumented football to put these settings on automatic under the control of the camera electronics. The optical and electronic zoom functions of the camera lenses 26 and 27 are operated by the cameraman by sending command and control signals from the remote base station to the instrumented football. The cameraman can select from a wide variety of HD camera lenses. Wide angle lenses and ultra wide angle lenses are used in many venues to give the TV viewing audience the feeling of being there on the playing field amongst the players. In some venues the cameraman may choose to use camera lenses with more magnification and narrower fields of view to better cover certain plays. In some venues the cameraman may choose camera lenses with small f-numbers to deal with poorer lighting conditions. In many venues the cameraman will choose the camera lenses 26 and 27 to be identical to one another. In many venues the cameraman will choose to use identical settings in both lenses 26 and 27 so that the TV viewing audience will see the same from either end of the instrumented football.

Referring to the Preferred Embodiments Specified in FIG. 16A and FIG. 16B, the Instrumented College League football satisfies all of the following further objectives:

It is an objective of the present invention to provide an instrumented football comprised of a cover, lightweight liner, laces, gap in the cover, gas valve, lightweight gas, pre-formed bladder, two optical windows, two buffer plates, instrumentation package assembly, corrugated bellows section of the instrumentation package assembly, smooth cylindrical section, two CCD sensor array cameras (or equivalent), air-tight and water-tight seals, two condenser microphones, electronics, two camera lenses, two induction coils, and rechargeable battery pack. It is an objective of the present invention to provide an instrumented college league football where the instrumentation package assembly enclosure can compress and fold, and become non-rigid and loose its stiffness for over half its length. It is an objective of the present invention to provide an instrumented college league football where the instrumentation package assembly has a corrugated bellows section of its skin which is springy and allows the instrumentation package assembly to be temporarily bent at its center to provide ease of facilitation while aligning and positioning its ends into the bores of the buffer plates.

It is an objective of the present invention to provide an instrumented college league football where the instrumentation package assembly sits between buffer plates that act as bearings that hold and restrain the instrumentation package assembly inside the football along its x, y and z axes.

It is an objective of the present invention to provide an instrumented college league football where the instrumentation package assembly's corrugated bellows section allows the instrumentation package assembly to absorb shock and vibration by compressing and bending when the football is hit, caught, kicked or crushed during play. It is an objective of the present invention to provide an instrumented college league football where the instrumentation package assembly's corrugated bellows section allows the instrumentation package assembly to be gripped by the inflated bladder's central hollow cylindrical cavity. It is an objective of the present invention to provide an instrumented college league football which is substantially equivalent to the conventional college football used in college league football games. It is an objective of the present invention to provide an instrumented college league football which is substantially of the same weight, balance, dynamic behavior, handling, playability and general appearance as conventional college footballs used in college league football games. It is an objective of the present invention to provide an instrumented college league football which has the same general outward appearance as conventional college footballs used in college league football games, training, practice, demonstrations, promotions, film making and parades. It is an objective of the present invention to reduce the shock and vibration to the instrumentation package assembly during the instrumented college league football's use in a sports event by providing isolation and by providing padding and an air mattress-like cushioning suspension. It is an objective of the present invention to provide an instrumentation package assembly that can be assembled/loaded into the college league football through the conventional seam gap in the cover panels. It is an objective of the present invention to provide a permanent position and nesting place for the instrumentation package assembly inside the college league football. It is an objective of the present invention to maintain alignment of the instrumentation package assembly during usage of the instrumented college league football.

Figure 17A:
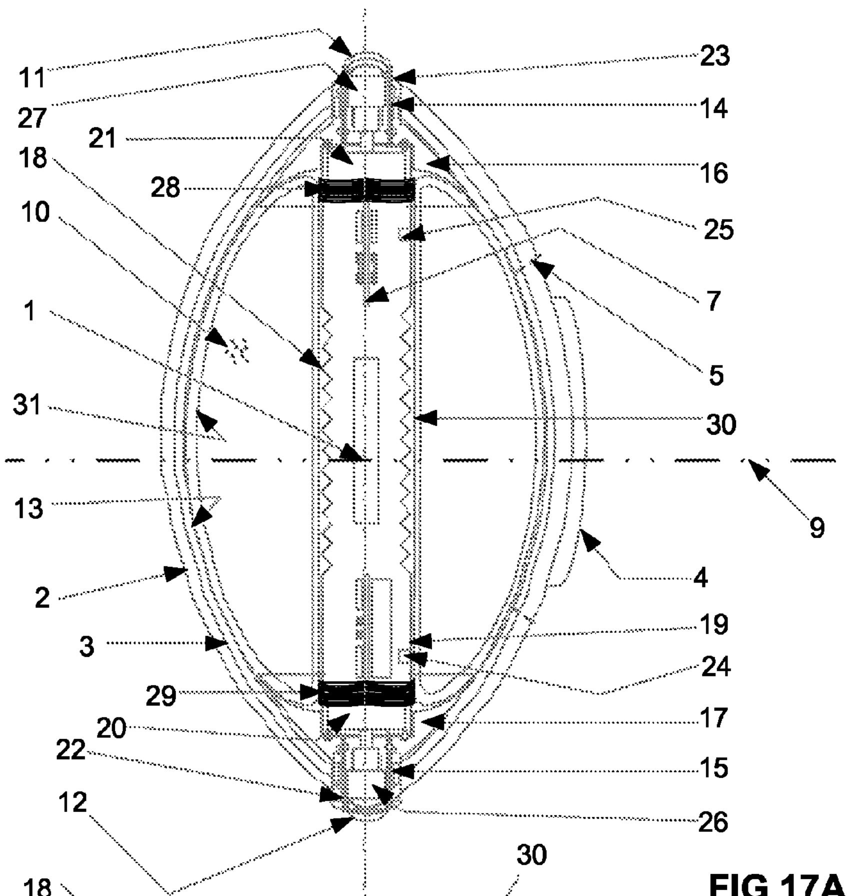
FIG. 17A is a side view section of the instrumented football.
Figure 17B:
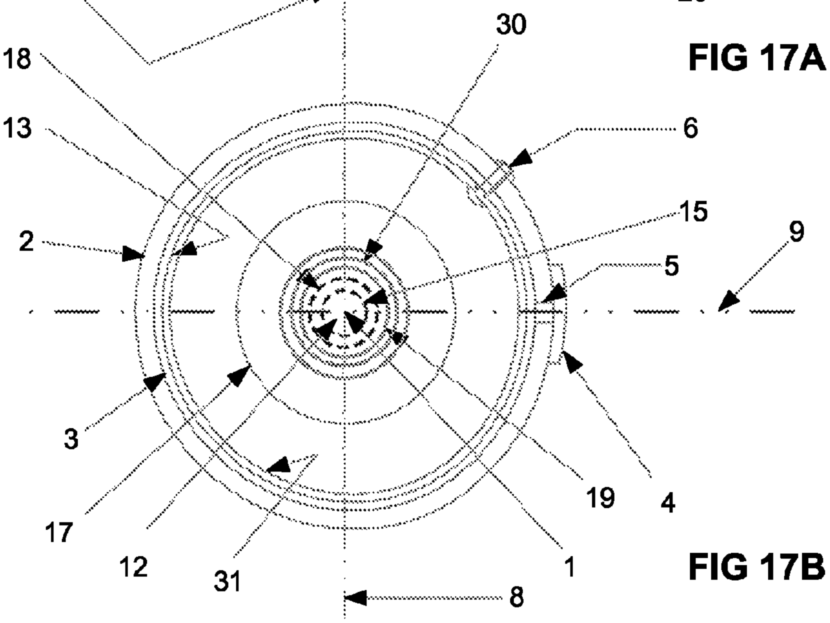
FIG. 17B is an end view section of the instrumented football.

FIG. 17A and FIG. 17B

The detailed physical elements disclosed in the instrumented high school league football drawings shown in FIG. 17A and FIG. 17B are identified as follows: 1 is the rechargeable battery pack located near the origin (0,0,0) of the instrumented football's three axis coordinate system (x,y,z). 2 is a prior art regulation cover modified with two machined and precision stitched holes coaxially bored into its vertices. 3 is the football's liner. 4 are the laces. 5 is the gap in the cover along the top of the instrumented football between the adjacent top two cover panels. 6 is the gas valve through which pressurized gas is pumped into the pre-formed bladder to inflate it. 7 are instrumentation package assembly electronics mounted close to the y-axis of the instrumented football. 8 is the z-axis. 9 is the x-axis. 10 is the gas used to inflate the pre-formed bladder. 11 and 12 are the optical windows. 13 is the pre-formed Type I bladder which props up the instrumented football's cover by pressing on its liner. 14 and 15 are the small diameter ends of the buffer plates which are pressed through the cover at both vertices of the instrumented football respectively. 16 and 17 are buffer plates used to mount the instrumentation package assembly to the football. 18 is a corrugated bellows section of the skin of the instrumentation package assembly. 19 is the smooth cylindrical section of the instrumentation package assembly. 20 and 21 are CCD sensor array cameras (or equivalent). 22 and 23 are air-tight and water-tight seals between the optical windows and the buffer plates. 24 and 25 are condenser microphones. 26 and 27 are camera lenses. 28 and 29 are the induction coils at either end of the instrumentation package assembly used to charge the battery pack. 30 is the hollow cavity of the pre-formed bladder which is pressing on the skin of the instrumentation package assembly. 31 is the pre-formed bladder which is pressing on the liner.

FIG. 17A is a side view section of the instrumented high school league football.

FIG. 17B is an end view section of the instrumented high school league football.

Referring to drawings FIG. 17A and FIG. 17B, in a preferred embodiment, an instrumented high school league football which is substantially of the same weight, balance, dynamic behavior, handling and general appearance as conventional high school league footballs, thereby making it a suitable replacement for the conventional football used in high school league football games, is disclosed. The shape of the instrumented high school league football is essentially a vesica piscis which is circularly symmetric about its y-axis 7.

A conventional high school league football such as an American football of conventional prolate spheroidal vesica piscis configuration comprises an inflated rubber pre-formed bladder 2 enclosed in a leather or synthetic leather-like cover 1 normally formed of four panels (not shown) joined at longitudinal seams (not shown). The longitudinal direction is defined herein as being parallel to the long axis of symmetry of the football known as its mechanical centerline 6. The bladder is inserted through a gap 4 in a seam and secured by laces 5. The football bladder is then inflated with air to the prescribed pressure.

In a preferred embodiment referred to in FIG. 17A and FIG. 17B, the instrumented high school league football is constructed with an instrumentation package assembly having a corrugated bellows skin, two Type III buffer plates, a Type I bladder, lightweight gas, modified prior art cover, and a lightweight liner. These unique elements are in addition to its conventional parts comprised of laces and gas valve stem which are identical to the parts used in a conventional football. Details of the corrugated bellows instrumentation package assembly are shown in FIG. 2A and FIG. 2B and FIG. 2C. Details of the Type I bladder are shown in FIG. 6A and FIG. 6B. Details of the Type III buffer plates are shown in FIG. 21E and FIG. 21F. The shape of the instrumented football is essentially a vesica piscis which is circularly symmetric about its y-axis 7.

The electronics 7 in the instrumentation package assembly are balanced and mounted close to the y-axis in order to minimize their moments of inertia. FIG. 23 is a block diagram that explains the detailed circuitry, flow of electrical signals and data in the general operation of the instrumentation package assembly electronics used for televising pictures and sounds, controlling the electrical and mechanical functions within the instrumentation package assembly, and charging the battery pack 1. FIG. 24 is a block diagram showing the circuitry, signals and data flows in the power supply and battery charging circuits inside the instrumentation package assembly.

An example explaining how the instrumentation package assembly 19 may be assembled into the instrumented football shown in FIG. 11 is discussed as follows: The football's cover/liner is first modified in the following way. Precision holes are coaxially bored in a prior art football cover/liner at each of its two vertices parallel to the y-axis. The holes are precision stitched to fit snuggly around the small diameter ends of the buffer plates 14 and 15 which will later be pressed through the holes in the cover and liner at both vertices of the instrumented football respectively. Bonding compound is then applied to the two identical buffer plates 16 and 17 on their slightly conical small diameter ends 14 and 15, and to their adjoining vesica piscis shaped surfaces. The two buffer plates are inserted into the football through the open seam gap 5 at the top of the football. The two identical buffer plates 16 and 17 are positioned at each of the football's two vertices, into each of the precision holes at each of the football's two vertices, with their optical windows 11 and 12 looking outward. A jack is inserted into the football through the open seam gap 5 and used to co-axially press the buffer plates into the machined holes in the football's cover at each of its vertices. The jack subsequently presses the buffer plates against the interior surfaces of the cover/liner vertices, and aligns and holds the plates as the bonding compound between the buffer plates and the cover/liner is curing. The jack is withdrawn from the interior of the football after the bonding compound that secures the buffer plates to the cover/liner sandwich 3 at each vertex is cured. The buffer plates are now permanently bonded into the football against the cover/lining sandwich 3 at each end of the football at their respective vertices.

Throwing, kicking, piling-on and punting of the football can all cause vibration and shock to the football.

Reduction of shock and vibration to the TV camera and electronics enclosure is achieved by nesting the enclosure in the pressured walls of the hollow cavity of the inflated bladder, thereby achieving a hammock effect and isolating the enclosure. As the bladder is inflated with gas, the bladder walls squeeze the enclosure.

In order to accomplish the second objective, the present invention uses a TV and electronics enclosure that can compress and fold, and become non-rigid and loose its stiffness for over half its length. This is achieved by forming the skin of the enclosure into a flexible corrugated bellows in the central region of its overall length. The instrumentation package assembly is referred to in FIG. 2A and FIG. 2B and FIG. 2C. The bellows allows the enclosure to compress and fold thereby absorbing shock and vibration.

Moisture can get in at the region around the football's laces. In order to mitigate the risk of moisture filling the region between the football's cover, liner and its bladder by way of the space between its laces, a thin sealing compound is administered to the inside surface of the football's cover and liner seam and the bladder near its laces, thereby effecting a positive moisture proof seal between the football's covering and its bladder at the opening. The covering itself must be waterproofed as well on its inside surface.

A variety of different camera lens types, with different lens setting capability, can be used providing they are small in size and weight. The auto iris setting permits the camera lens to automatically adjust for varying lighting conditions on the field. The auto focus setting permits the camera lens to adjust focus for varying distances of the players and action subjects on the field.

When the football has been thrown and is in flight on its trajectory from the quarterback to his intended receiver, the distance of the football from the quarterback is increasing, whereas the distance of the football to the intended receive is decreasing. Each camera can be independently and simultaneously commanded and controlled to auto focus on their respective subjects. The rearward camera is looking backward in the direction to where the football has been, and can retain its focus on the quarterback, while the forward camera is looking forward in the direction of its travel, and retains its focus on the receiver.

The functions of the camera lenses 26 and 27 such as focus adjustment settings and iris adjustment settings are controlled wirelessly by the cameraman from the remote base station by sending command and control signals from the remote base station to the instrumented football. The cameraman can also send command and control signals from the remote base station to the instrumented football to put these settings on automatic under the control of the camera electronics. The optical and electronic zoom functions of the camera lenses 26 and 27 are operated by the cameraman by sending command and control signals from the remote base station to the instrumented football. The cameraman can select from a wide variety of HD camera lenses. Wide angle lenses and ultra wide angle lenses are used in many venues to give the TV viewing audience the feeling of being there on the playing field amongst the players. In some venues the cameraman may choose to use camera lenses with more magnification and narrower fields of view to better cover certain plays. In some venues the cameraman may choose camera lenses with small f-numbers to deal with poorer lighting conditions. In many venues the cameraman will choose the camera lenses 26 and 27 to be identical to one another. In many venues the cameraman will choose to use identical settings in both lenses 26 and 27 so that the TV viewing audience will see the same from either end of the instrumented football.

Referring to the Preferred Embodiments Specified in FIG. 17A and FIG. 17B, the Instrumented High School Football Satisfies all of the Following Objectives:

It is an objective of the present invention to provide an instrumented football comprised of a cover, lightweight liner, laces, gap in the cover, gas valve, lightweight gas, pre-formed bladder, two optical windows, two buffer plates, instrumentation package assembly, corrugated bellows section of the instrumentation package assembly, smooth cylindrical section, two CCD sensor array cameras (or equivalent), air-tight and water-tight seals, two condenser microphones, electronics, two camera lenses, two induction coils, and rechargeable battery pack. It is an objective of the present invention to provide an instrumented high school football which is substantially of the same weight, balance, dynamic behavior, handling and general appearance as conventional high school footballs. It is an objective of the present invention to provide an instrumented football where the instrumentation package assembly enclosure can compress and fold, and become non-rigid and loose its stiffness for over half its length. It is an objective of the present invention to provide an instrumented football where the instrumentation package assembly has a corrugated bellows section of its skin which is springy and allows the instrumentation package assembly to be temporarily bent at its center to provide ease of facilitation while aligning and positioning its ends into the bores of the buffer plates.

It is an objective of the present invention to provide an instrumented football where the instrumentation package assembly sits between buffer plates that act as bearings that hold and restrain the instrumentation package assembly inside the football along its x, y and z axes. It is an objective of the present invention to provide an instrumented football where the instrumentation package assembly's corrugated bellows section allows the instrumentation package assembly to absorb shock and vibration by compressing and bending when the football is hit, caught, kicked or crushed during play. It is an objective of the present invention to provide an instrumented football where the instrumentation package assembly's corrugated bellows section allows the instrumentation package assembly to be gripped by the inflated bladder's central hollow cylindrical cavity. It is an objective of the present invention to provide an instrumented high school football which is substantially equivalent to the conventional high school football used in high school league football games. It is an objective of the present invention to provide an instrumented high school football which is substantially of the same weight, balance, dynamic behavior, handling and general appearance as conventional high school footballs used in high school league football games. It is an objective of the present invention to provide an instrumented high school football which has the same general outward appearance as conventional high school footballs used in high school league football games, training, practice, demonstrations, promotions, film making and parades. It is an objective of the present invention to reduce the shock and vibration to the instrumentation package assembly during the instrumented football's use in a sports event by providing isolation and by providing padding and air mattress-like suspension and cushioning. It is an objective of the present invention to provide an instrumentation package assembly that can be assembled (loaded) into the football through the conventional seam in the cover panels. It is an objective of the present invention to provide a permanent position and nesting place for the instrumentation package assembly inside the football. It is an objective of the present invention to maintain alignment of the instrumentation package assembly during usage of the instrumented football.

Figure 18A:
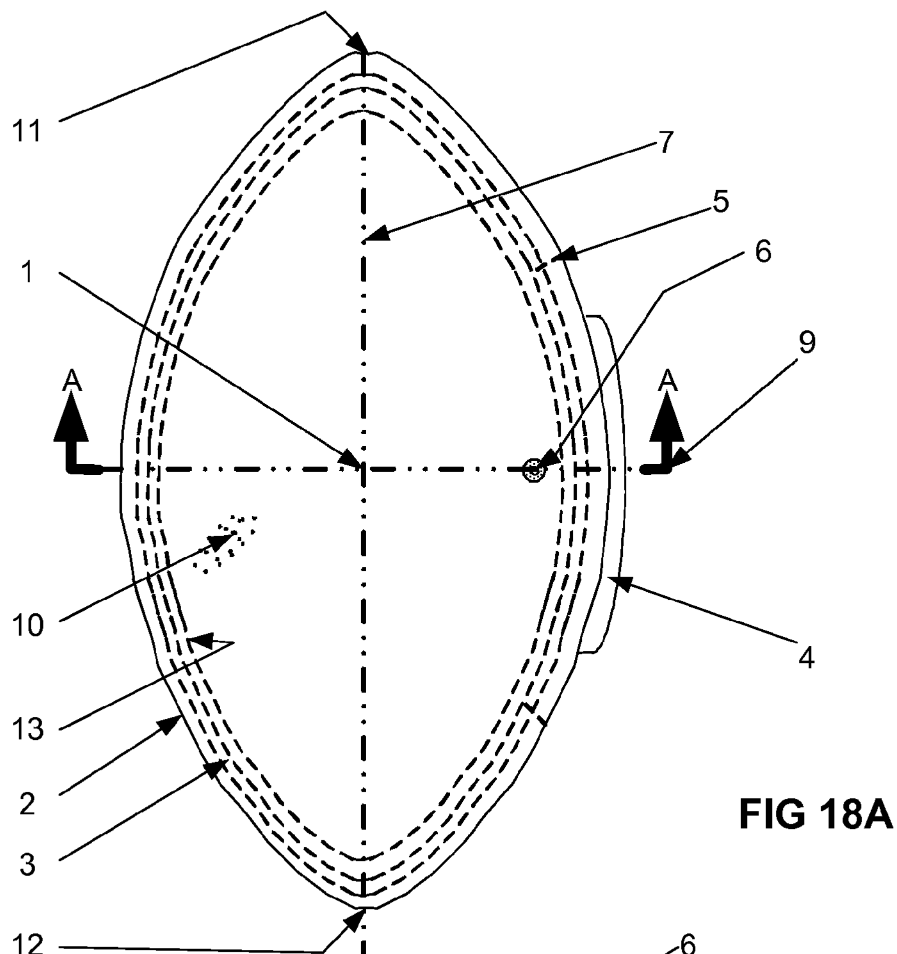
FIG. 18A shows the side view of a prior art conventional college league American football.
Figure 18B:
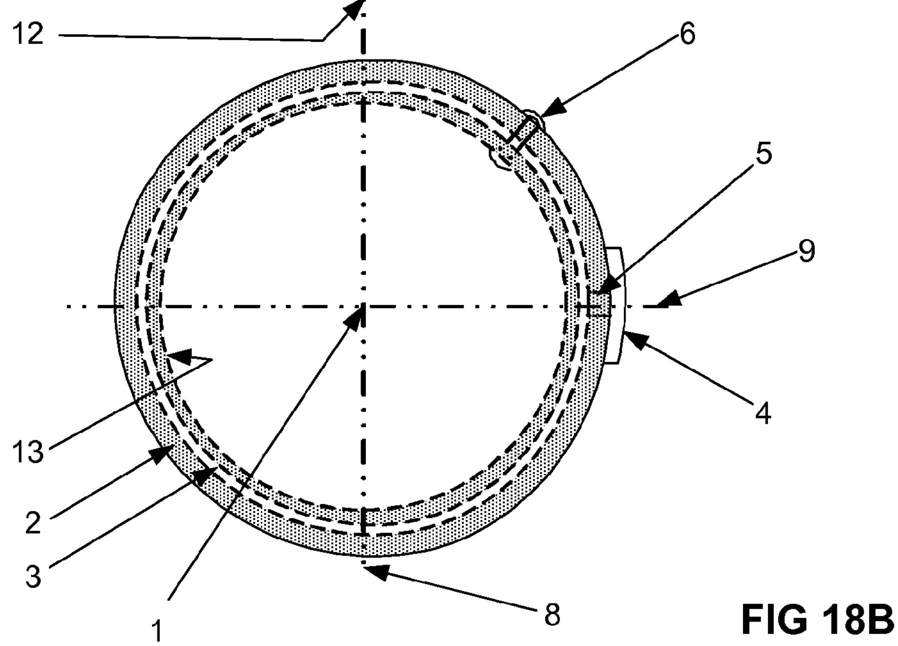
FIG. 18B shows the end view of a prior art conventional college league American football.

FIG. 18A and FIG. 18B

The detailed physical elements referenced in the conventional college league American football drawings shown in FIG. 18A and FIG. 18B are identified as follows: 1 is the origin (0,0,0) of the instrumented football's three axis coordinate system (x,y,z). 2 is football's cover. 3 is the football's liner. 4 are the laces. 5 is the gap in the cover along the top of the instrumented football between the adjacent top two cover panels. 6 is the gas valve through which pressurized gas is pumped into the pre-formed bladder to inflate it. 7 is the y-axis of the instrumented football. 8 is the z-axis. 9 is the x-axis. 10 is the air gas used to inflate the air-tight pre-formed bladder. 11 and 12 are the optical windows. 13 is the pre-formed air-tight bladder which props up the conventional football's cover. FIG. 18A and FIG. 18B are shown for reference purposes only.

FIG. 18A shows the side view of a prior art conventional college league American football.

FIG. 18B shows the end view of a prior art conventional college league American football.

Referring to drawings FIG. 18A and FIG. 18B, a sports ball such as a regulation prior art conventional college league American football is described that has a conventional prolate spheroidal configuration more closely resembling a vesica piscis and comprises an inflated rubber bladder 13 enclosed in a leather cover 2 and a synthetic lining 3 of predetermined thickness and weight, normally formed of four leather panels (not shown) joined at longitudinal seams (not shown) along the top of the football. Each panel is attached to an interior lining 3. The lining 3 is synthetic and is sewn to each panel 2. The lining 3 is composed of three layers of cross-laid fabric firmly cemented together. The lining prevents the panel 2 from stretching or growing out of shape during use. The four panels are stitched together. Two of the panels are perforated along adjoining edges at the top of the football so that they can be laced together. The edges with the lacing holes, however, are not stitched together thereby forming a seam with an open gap 5. One of these lacing panels receives an additional perforation and reinforcements in its center, to hold the air inflation valve 6. Generally, the ball is about 11 inches long and about 22 inches in circumference at the center. The leather panels are usually tanned to a natural brown color. The mechanical centerline 7 of the football is defined herein as being parallel to and coincident with the longitudinal axis of symmetry of the football defined herein as the football's x-axis 7. The geometrical center of symmetry (0, 0, 0) is the origin of the (x,y,z) coordinate system of the conventional football, and lies at the intersection of the y-axis 7 and z-axis 8 with the x-axis 9. The shape of the football is essentially a vesica piscis which is circularly symmetric about its y-axis 7.

Because the laces 4 and gas valve stem 6 add asymmetrical mass to the football, the center of gravity, also known as the center of mass of the football, is located slightly above the x-axis, being slightly closer to the laces 4 and valve 6.

The rubber bladder 13 is inserted into the conventional football through the seam gap 5. Polyvinyl chloride or leather laces 4 are inserted through the perforations around the seam gap 5 to provide a grip for holding, hiking and passing the football. The ball is laced and then inflated with air gas 10 to a pressure of not less than 12.5 lb per square inch, but no more than 13.5 lb per square inch. The bladder 13 has an air valve attached thereon whose valve stem 6 protrudes through a hole in the ball cover panel closest to the laces. The valve hole in the cover permits the entry of pressurized air gas through the valve stem 6 to inflate the bladder 13. The inflated bladder is disposed symmetrically within the ball cover and performs the function of propping up the ball cover after inflation by pressing on the interior walls of the cover's liner 3. The inflatable bladder 13 has a predetermined shape. Details of the bladder are shown in FIG. 6A and FIG. 6B.

Figure 19A:
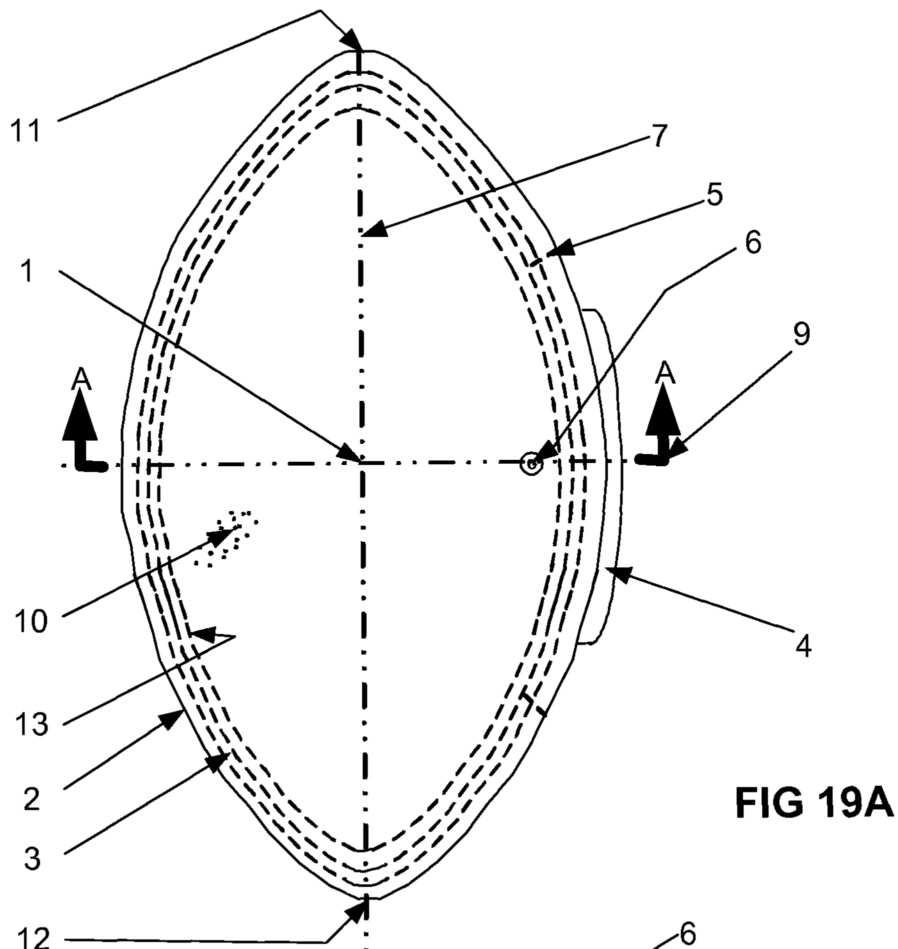
FIG. 19A shows the side view of a conventional high school league American football.
Figure 19B:
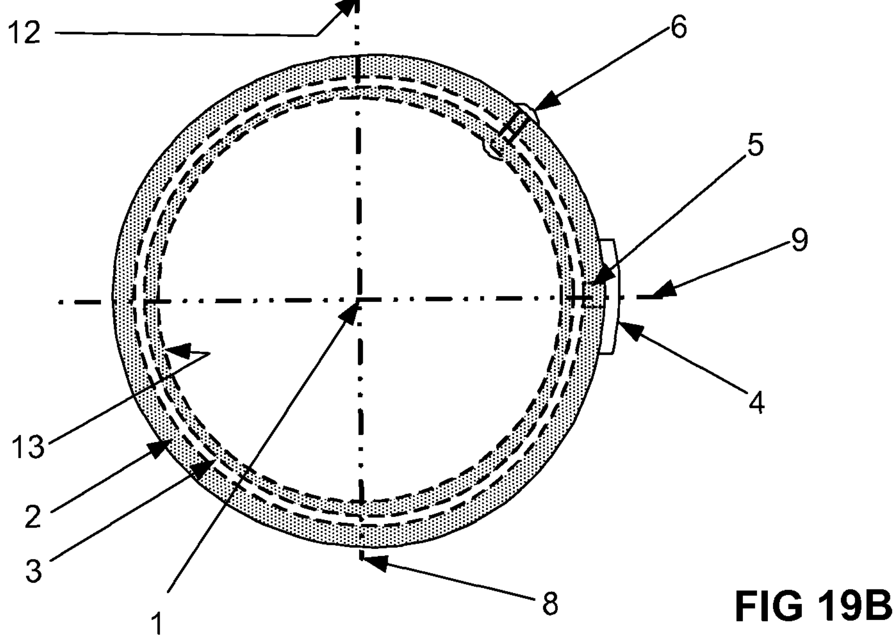
FIG. 19B shows the end view of a conventional high school league American football.

FIG. 19A and FIG. 19B

The detailed physical elements referenced in the prior art conventional high school American football drawings shown in FIG. 19A and FIG. 19B are identified as follows: 1 is the origin (0,0,0) of the football's three axis coordinate system (x,y,z). 2 is football's cover. 3 is the football's liner. 4 are the laces. 5 is the gap in the cover along the top of the football between the adjacent top two cover panels. 6 is the gas valve through which pressurized gas is pumped into the pre-formed bladder to inflate it. 7 is the y-axis of the instrumented football. 8 is the z-axis. 9 is the x-axis. 10 is the air gas used to inflate the air-tight pre-formed bladder. 11 and 12 are the optical windows. 13 is the pre-formed air-tight pre-formed bladder which props up the conventional football's cover. FIG. 19A and FIG. 19B are shown for reference purposes only.

FIG. 19A shows the side view of a conventional high school American football.

FIG. 19B shows the end view of a conventional high school American football.

Referring to drawings FIG. 19A and FIG. 19B, a sports ball such as a regulation prior art conventional high school American football is shown that has a conventional prolate spheroidal configuration more closely resembling a vesica piscis and comprises an inflated rubber bladder 13 enclosed in a leather cover 2 and a synthetic lining 3 of predetermined thickness and weight, normally formed of four leather panels (not shown) joined at longitudinal seams (not shown) along the top of the football. Each panel is attached to an interior lining 3. The lining 3 is synthetic and is sewn to each panel 2. The lining 3 is composed of three layers of cross-laid fabric firmly cemented together. The lining prevents the panel 2 from stretching or growing out of shape during use. The four panels are stitched together. Two of the panels are perforated along adjoining edges at the top of the football so that they can be laced together. The edges with the lacing holes, however, are not stitched together thereby forming a seam with an open gap 5. One of these lacing panels receives an additional perforation and reinforcements in its center, to hold the air inflation valve 6. Generally, the ball is about 11 inches long and about 22 inches in circumference at the center. The leather panels are usually tanned to a natural brown color. The mechanical centerline 7 of the football is defined herein as being parallel to and coincident with the longitudinal axis of symmetry of the football defined herein as the football's x-axis 7. The geometrical center of symmetry (0, 0, 0) is the origin of the (x, y, z) coordinate system of the conventional football, and lies at the intersection of the y-axis 7 and z-axis 8 with the x-axis 9. The shape of the football is essentially a vesica piscis circularly symmetric about its y-axis 7.

Because the laces 4 and gas valve stem 6 add asymmetrical mass to the football, the center of gravity, also known as the center of mass of the football, is located slightly above the x-axis, being slightly closer to the gap 5, laces 4 and valve 6.

The rubber bladder 13 is inserted into the conventional football through the seam gap 5. Polyvinyl chloride or leather laces 4 are inserted through the perforations around the seam gap 5 to provide a grip for holding, hiking and passing the football. The ball is laced and then inflated with air gas 10 to a pressure of not less than 12.5 lb per square inch, but no more than 13.5 lb per square inch. The bladder 13 has an air valve attached thereon whose valve stem 6 protrudes through a hole in the ball cover panel closest to the laces. The valve hole in the cover permits the entry of pressurized air gas through the valve stem 6 to inflate the bladder 13. The inflated bladder is disposed symmetrically within the ball cover and performs the function of propping up the ball cover after inflation by pressing on the interior walls of the cover's liner 3. The inflatable bladder 13 has a predetermined shape.

Figure 20A:
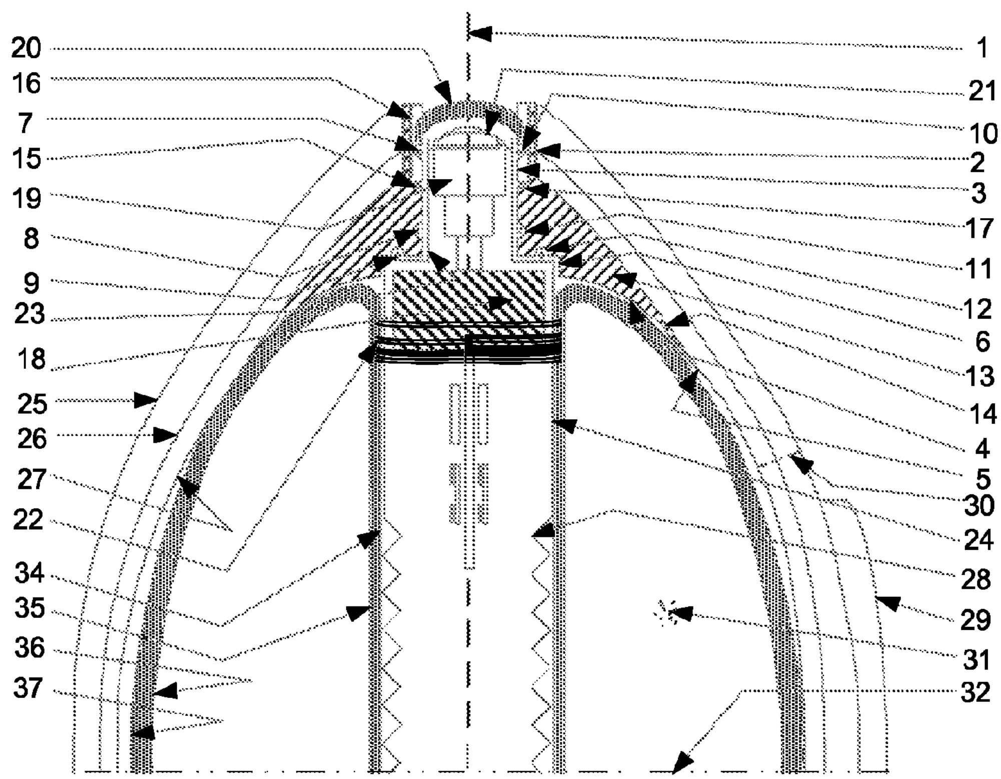
FIG. 20A is a side view section of the instrumented football.
Figure 20B:
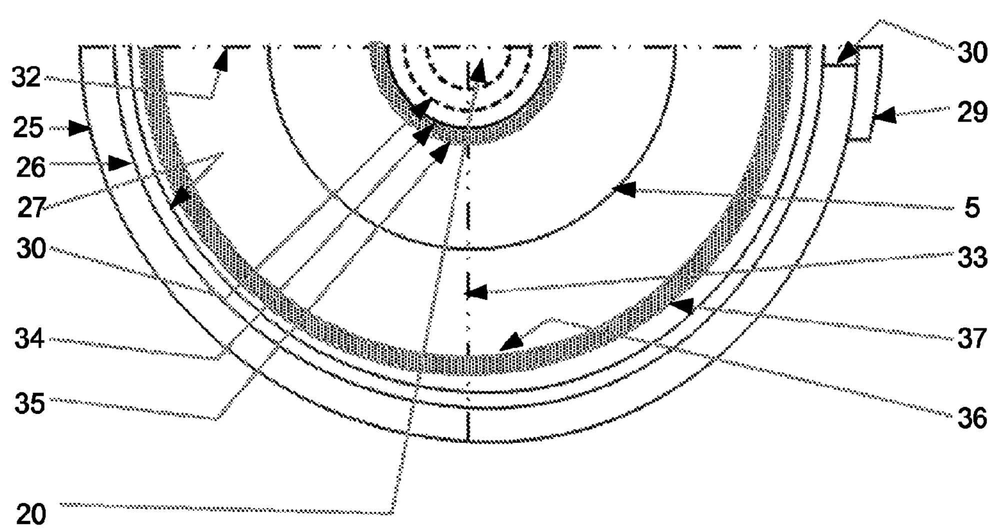
FIG. 20B is an end view section of the instrumented football.

FIG. 20A and FIG. 20B

The detailed physical elements disclosed in the instrumented football drawings using the Type I instrumentation package assembly that are shown in FIG. 20A and FIG. 20B are identified as follows: 1 is the y-axis of the instrumented football. 2 is the slightly conical small outside diameter end of the buffer plate pressed into a machined bore in the football's cover at its vertex. 3 is the small inside diameter of the buffer plate bore. 4 is the interior curved surface of the buffer plate. 5 is the tapered edge of the buffer plate. 6 is the large inside diameter of the buffer plate bore. 7 is an o-ring seal. 8 is an o-ring seal. 9 is an o-ring seal. 10 is a circular grove for mounting the o-ring. 11 is a circular grove for mounting the o-ring. 12 is a circular grove for mounting the o-ring. 13 is the body of the Type III buffer plate. 14 is the exterior curved surface of the buffer plate. 15 is an o-ring seal. 16 is the threaded portion of the small diameter end of the buffer plate. 17 is an o-ring seal and grove. 18 is the camera. 19 is the camera lens. 20 is the optical window mounted on and sealed to the small diameter end of the buffer plate. 21 is the 1$^{st}$ element of the camera lens. 22 is the battery pack's charging induction coil. 23 is the slightly conical small diameter end of the instrumentation package assembly. 24 is the outside diameter of the instrumentation package assembly's skin. 25 is the cover of the instrumented football. 26 is the liner. 27 is the pre-formed bladder. 28 is the corrugated bellows section of the instrumentation package assembly's skin. 29 are the laces. 30 is the open seam between adjacent cover panels. 31 is the gas inflating the bladder. 32 is the x-axis of the instrumented football. 33 is the z-axis of the instrumented football. 34 is the surface of the hollow cylindrical cavity region of the pre-formed bladder that presses against the instrumentation package assembly when the pre-formed. 35 is the hollow cylindrical region of the pre-formed blabber. 36 is the inside surface of the pre-formed bladder. 37 is the outside surface of the pre-formed bladder that presses against the liner when the bladder is inflated.

FIG. 20A is a side view section of the instrumented football.

FIG. 20B is an end view section of the instrumented football.

Referring to drawings FIG. 20A and FIG. 20B, in a preferred embodiment, an instrumented football using a Type I instrumentation package assembly is mounted into the instrumented football using a Type IV buffer plate 13, is disclosed. The Type I instrumentation package assembly is specified in FIG. 2A and FIG. 2B and FIG. 2C. The Type V buffer plates are specified in FIG. 21I and FIG. 21J and FIG. 21K.

The Type V buffer plates vesica piscis shaped curved surfaces 14 has four radial grooves (channels or slots) cut into it at ninety degree intervals around its y-axis 1. The purpose of the four slots is to provide clearance for any protuberances in the stitching along the seams between adjacent cover panels, including their liners, in the interior of the instrumented football at its two vertices which can cause an interference fit. These slots provide a nesting place for the stitching. When filled with bonding material, these slots will bond solidly to the cover panel stitching thereby producing a secure bond between the buffer plates and the instrumented football's cover panels. The slots avoid there being the possibility of an interference fit between the surface of the buffer plate 14 and the interior surface of the football vertices which the buffer plates need to bond to. This eliminates a misfit.

FIG. 20A shows only one end of the instrumented football. The bladder used is specified in FIG. 6A and FIG. 6B. It is understood that the instrumented football is symmetrical and that both ends of the instrumented football are identical. The shape of the football is essentially a vesica piscis which is circularly symmetric about its y-axis 1.

Two identical buffer plates 13 are coaxially disposed inside the instrumented football, one at either end of the instrumented football; to locate-seat-and align the instrumentation package assembly. The opposite ends of the instrumentation package assembly are slipped into the bores of the buffer plates at each of the vertices of the football. The buffer plates act as bearings for the instrumentation package assembly. Each of the buffer plate surfaces 4 is located and bonded against the interior walls of the football's cover/lining sandwich 27, at its vertices at both of the ends of the instrumented football. The bonding compound used is permanent and resilient and provides for an airtight and water-tight bond.

In order to remain unobtrusive to the players, the small outer diameter 2 of the buffer plate that faces outward from the cover vertex is made as small as possible while still retaining its ability to accommodate the size of the optical window 20 and the camera lens 19. It is contemplated that the approximate range of values for the small outer diameter of the buffer plate 2 be between ⅛ and ½ inch in order to accommodate a variety of camera lens types and still remain unobtrusive to the players.

Fogging in the space between the optical window 20 and the first element 21 of the camera lens, due to temperature variations experienced by the instrumented football on the field, is prevented by sealing the space from the outside moisture and filling the space with a dry helium gas or dry nitrogen gas. Sealing of the space is accomplished by the optical window 20 seal and o-rings 7, 8, 9, and 15.

In order to provide sufficient surface area for bonding to the cover/lining sandwich, it is contemplated that the tapered edges 5 of the buffer plate extend approximately two to three inches inward from the instrumented football's vertex to the interior lining wall 27. Since the cover is attached by bonding to its lining to form a sandwich, and the interior surface of the buffer plate 4 is pressed against and bonded to the interior wall of the lining, the cover/lining sandwich is made to conform to the shape of the buffer plate 4 when the buffer plate is pressed against it. The interior shape of the buffer plate 4 is made for example into a vesica piscis, so that the resulting cover's external surface curvature will be a match to the shape of the cover of a conventional American football, which is a vesica piscis, when the instrumented football is inflated and internal gas pressure is applied to its bladder.

In order to minimize its weight, the body of the buffer plate 13 is made of a light materials like, for example, plastic foam or polycarbonates or ABS. The buffer plate 13 is made stiff and rigid so that the cover 25 and its lining 27 will conform to the buffer plate's shape when the cover and its lining are bonded and sealed to the buffer plate 13. Furthermore, the buffer plates 13 are made stiff and rigid to prevent damage to the instrumentation package assembly when the football is subjected to shock, vibration and temperature variations during a game.

Each buffer plate has two concentric cylindrical bored holes 3 and 6. The inside diameter of 6 is larger than the inside diameter of 3. The end of the instrumentation package assembly 23 is slipped into these bores in the buffer plate. The diameter of the smaller cylindrical bore is slightly oversized compared to the outside diameter of the slightly conical small diameter end of the instrumentation package assembly 23 so that there is a slip fit between the two members when the end of the instrumentation package assembly is pushed into the small bore of the buffer plate. The small bore 3 of the buffer plate has two circumferential groves 10 and 11 which hold rubber o-ring seals 7 and 8. The purpose of the o-rings is to seal any gas from leaking out of the cavity of the football after the instrumentation package assembly is inserted and compresses the o-rings.

The o-rings 7 and 8 also prevent the passage of water, moisture and dirt from getting into the instrumentation package assembly, and provide for some isolation from shock and vibration. The diameter of the larger cylindrical bore 6 of the buffer plate is slightly oversized compared to the outside diameter of the larger diameter end 24 of the instrumentation package assembly, such that there is a slip fit between the two members when the end of the instrumentation package assembly 24 is pushed into the larger cylindrical bore 6 of the buffer plate. The buffer plate has another circumferential grove 12 cut into its shoulder. This circumferential grove also holds an o-ring 9. The purpose of this o-ring is also to seal the gas from leaking out of the cavity of the football and to prevent water, moisture and dirt from getting into the instrumentation package assembly. This seal is in effect when the larger diameter 24 of the instrumentation package assembly is inserted into the buffer plate's larger bore 6, thereby compressing the o-ring 9 against the shoulder 24 of the instrumentation package assembly.

The entire body of the buffer plate is circularly symmetric about the centerline of the bore holes. The buffer plate is rigid so as to maintain the shape of its surface 14 when it contacts the interior surface of the cover's lining. The relatively flexible surface of the cover/liner sandwich conforms to the surface of the buffer plate 14 as it presses against the buffer plate, thereby establishing a gas seal when sealing compound has been applied to the surfaces. The buffer plate is made to enable rigid alignment of the surface of the buffer plate 4 to that of the cover/liner sandwich. Axial pressure is exerted on the buffer plate by the flat shouldered end of the instrumentation package assembly, which derives this pressure from the effect of the compressed bellows 28. Additionally, the buffer plate surface 14 is forced against and into contact with the bladder which is inflated with gas.

A variety of different camera lens types, with different lens setting capability, can be used providing they are small in size and weight. The auto iris setting permits the camera lens to automatically adjust for varying lighting conditions on the field. The auto focus setting permits the camera lens to adjust focus for varying distances of the players and action subjects on the field.

When the football has been thrown and is in flight on its trajectory from the quarterback to his intended receiver, the distance of the football from the quarterback is increasing, whereas the distance of the football to the intended receive is decreasing. Each camera can be independently and simultaneously commanded and controlled to auto focus on their respective subjects. The rearward camera is looking backward in the direction to where the football has been, and can retain its focus on the quarterback, while the forward camera is looking forward in the direction of its travel, and retains its focus on the receiver.

The functions of the camera lenses 15, and its counterpart at the opposite vertex (not shown), such as focus adjustment settings and iris adjustment settings are controlled wirelessly by the cameraman from the remote base station by sending command and control signals from the remote base station to the instrumented football. The cameraman can also send command and control signals from the remote base station to the instrumented football to put these settings on automatic under the control of the camera electronics. The optical and electronic zoom functions of the camera lenses are operated by the cameraman by sending command and control signals from the remote base station to the instrumented football. The cameraman can select from a wide variety of HD camera lenses. Wide angle lenses and ultra wide angle lenses are used in many venues to give the TV viewing audience the feeling of being there on the playing field amongst the players. In some venues the cameraman may choose to use camera lenses with more magnification and narrower fields of view to better cover certain plays. In some venues the cameraman may choose camera lenses with small f-numbers to deal with poorer lighting conditions. In many venues the cameraman will choose the camera lenses to be identical to one another. In many venues the cameraman will choose to use identical settings in both lenses so that the TV viewing audience will see the same from either end of the instrumented football.

Referring to the Preferred Embodiments Specified in FIG. 20, the Instrumentation Package Assembly Satisfies all of the Following Objectives:

It is an objective of the current invention to provide an instrumented football that includes a slightly conical small outside diameter end of the buffer plate, is a prior art regulation cover modified with two machined and precision stitched holes coaxially bored into its vertices, a small inside diameter bore of the buffer plate, an the interior curved surface of the buffer plate, a large inside diameter bore of the buffer plate, o-ring seals, circular groves for mounting the o-rings, Type V buffer plate, vesica piscis exterior curved surface of the buffer plate with slots to prevent an interference fit with the interior cover panel stitching, threaded portion of the small diameter end of the buffer plate, two cameras, two camera lenses, two optical windows, rechargeable battery pack, two induction coils, slightly conical small diameter end of the instrumentation package assembly, cover, liner, pre-formed bladder, corrugated bellows section of the instrumentation package assembly, laces, gap (open seam), gas, and gas valve. It is an objective of the current invention to use buffer plates with clearance slots to prevent an interference fit with the cover panel interior stitching. It is an objective of the current invention to locate and firmly seat the instrumentation package assembly inside the football, and to provide a portal which is unobtrusive to the players through which the cameras can peer outward through the cover. It is an objective of the current invention to preserve the alignment of the instrumentation package assembly with the mechanical axis of the instrumented football, and to prevent damage to the instrumentation package assembly even when the football is subjected to shock, vibration, dirt, humidity, moisture, and temperature variations during a game.

FIG. 21A and FIG. 21B

The detailed physical elements disclosed in the Type I buffer plate drawings shown in FIG. 21A and FIG. 21B are identified as follows: 1 is the y-axis of the instrumented football. 2 is the bore in the cover for the slightly conical small outside diameter end of the buffer plate which is pressed into a machined bore in the cover of each of the instrumented football's vertices. 3 is the small inside diameter of the buffer plate bore. 4 is the interior curved surface of the buffer plate which is pressed against by the instrumented football's inflated bladder (not shown). 5 is the tapered edge of the buffer plate. 6 is the large inside diameter of the buffer plate bore. 7 is an o-ring seal. 8 is an o-ring seal. 9 is an o-ring seal. 10 is a circular grove for mounting the o-ring. 11 is a circular groove for mounting the o-ring. 12 is a circular groove for mounting the o-ring. 13 is the body of the Type I buffer plate. 14 is the exterior vesica piscis curved surface of the buffer plate bonded to the cover/liner sandwich. 15 is the cover of the instrumented football. 16 is the liner which is bonded to the cover to form a sandwich. 17 is the inflated pre-formed bladder. 18 is the camera. 19 is the camera lens. 20 is the 1$^{st}$ element of the camera lens acting as the optical window. 21 is the seal between the optical window and the small diameter end of the instrumentation package assembly. 22 is the induction coil for charging the battery pack. 23 is the slightly conical small diameter end of the instrumentation package assembly. 24 is the outside diameter of the instrumentation package assembly's skin.

FIG. 21A shows a side view section of the Type I buffer plate and instrumentation package assembly.

FIG. 21B shows a side view section of just the buffer plate alone.

Referring to drawings FIG. 21A and FIG. 21B, in a preferred embodiment, a Type I buffer plate assembly is disclosed.

One of the distinguishing characteristics of the present preferred embodiment is that the front lens element of the camera lens 19 acts as a protruding optical window 20 from the cover 15 providing a clear sealed path through which the camera 18 can peer outward through the instrumented football's cover 15. An advantage of this is that it allows an unobstructed field of view by the cover 15 and thereby gives an unvignetted field of view for the camera 18 when the camera uses extremely wide angle camera lenses 19.

FIG. 21A shows a side view section of the Type I buffer plate bonded to the cover/liner sandwich, with the buffer plate passing through the machined bore in the cover/liner sandwich at the vertex of the football, and the instrumentation package assembly inserted into the buffer plate bore. The buffer plates located at both vertices of the instrumented football act as bearings for mounting the instrumentation package assembly between them. The side view section shown in FIG. 21A looks the same on both ends of the instrumented football because the instrumented football is symmetrical from end to end. FIG. 21B shows a side view section of just the buffer plate alone. The buffer plate is circularly symmetric about its x-axis. The buffer plate is constructed of plastic foams, polycarbonates, ABS or fiber reinforced plastics to keep it strong but lite weight. The buffer plate is circularly symmetric about its y-axis.

The small diameter bore end 3 of the Type I buffer plate acts as a portal through the football's cover 15. The small diameter bore 3 end of the Type I buffer plate is inserted and pressed into the machined bore in the cover/liner sandwich at 2 at the football's vertex and is bonded and sealed to the inside diameter of the bore with a permanent resilient air-tight and water-tight compound. The outside diameter of the buffer plate 2 is made slightly conical so as to facilitate its easy passage into cover/liner's machined bore.

The buffer plate has a small 45 degree chamfer on its end on the outside to facilitate easy entry and passage through the cover's bore; and also provide a place for a bead of the bonding agent to affect a seal. The slightly conical small diameter end 23 of the instrumentation package assembly is inserted into the small diameter bore 3 end of the Type I buffer plate. The instrumentation package assembly houses a camera lens 19. The camera lens 19 serves a dual purpose. It serves as the focusing lens for the camera 18. It also acts as an optical window 20 providing a clear sealed path through which the camera 18 can peer outward through the cover 15. The camera lens 19 physically protrudes outward slightly from the end of the cover 15 and the buffer plate 13 in order to achieve the maximum field of view for the camera without vignetting the field of view by the cover 15 or the buffer plate.

The buffer plate accommodates three rubber (or equivalent) o-ring seals 7, 8, and 9. These o-rings are set into three circular coaxial groves 10, 11, and 12 in the buffer plate. When the slightly conical end of the instrumentation package assembly is inserted into the buffer plate, o-rings 7 and 8 are compressed between the inside diameter of the buffer plate and the outside diameter of the end of the instrumentation package assembly thereby forming two seals; o-ring 9 is also compressed between the shoulder of the instrumentation package assembly and the buffer plate thereby forming the third seal. The three seals are both air-tight and water-tight. The buffer plate has another small 45 degree chamfer at the entrance to its bore to facilitate easy entry and passage of the instrumentation package assembly when it is inserted into the buffer plate's bore. The buffer plate has an exterior curved surface 14 which resembles the circularly symmetric vesica piscis of a conventional football. This surface is stiff and non-compliant. This surface is bonded to the interior surface of the cover/liner sandwich. Its purpose is to provide a form to use to shape the cover/liner 15, 16 when the cover/liner is bonded to it; 14 causes the exterior shape of the instrumented football's cover's vertex to match the shape of the conventional football's cover vertex. The bond forms an air-tight and water-tight seal. The interior surface of the buffer plate 4 is gradually tapered to provide a smooth stiff surface touching the inflated bladder 17 against which the inflated bladder 17 may press. Pressure exerted by the bladder on 4 causes the buffer plate surface 14 to press against the cover/liner sandwich 15, 16. The buffer plate has a large diameter bore 6. The purpose of this bore is to securely seat the large outside diameter of the instrumentation package assembly's skin. There is another 45 degree chamfer at the entrance to bore 6. The purpose of this chamfer is to guide the outside diameter of the instrumentation package assembly's skin 24 into 6. The instrumentation package assembly 24 is restrained and isolated from vibration and shock in the x and z directions by 7 and 8; and restrained and isolated from vibration and shock in the y direction by 9.

Referring to the Preferred Embodiments Specified in Drawings FIG. 21A and FIG. 21B, the Type I Buffer Plate Assembly Satisfies all of the Following Further Objectives:

It is an objective of the current invention to provide a buffer plate assembly composed of Type I buffer plate body, small inside diameter of the buffer plate bore, interior curved surface of the buffer plate, large inside diameter of the buffer plate bore, o-ring seals, circular groves for mounting the o-ring, and exterior vesica piscis curved surface of the buffer plate. It is an objective of the current invention to provide a buffer plate assembly where the front lens element of the camera lens acts as a protruding optical window from the cover providing a clear sealed path through which the camera can peer outward through the instrumented football's cover without vignetting its field of view. It is an objective of the current invention to provide a stable mounting means for the instrumentation package assembly inside the instrumented football. It is an objective of the current invention to minimize the weight of the buffer plate assembly. It is an objective of the current invention to provide a means for the cameras inside the instrumentation package assembly to look out from both vertices of the instrumented football. It is an objective of the current invention not to block, absorb, or reflect the radio waves that are transmitted or received by the instrumented football. It is an objective of the current invention to provide a means to prevent moisture and dirt from entering the instrumented football and interfering with the functions of the instrumentation package assembly inside the football. It is an objective of the current invention to provide a means to prevent damage to the instrumentation package assembly from debris entering the instrumented football. It is an objective of the current invention to provide a means to isolate the instrumentation package assembly from the shock and vibration encountered by the instrumented football. It is an objective of the current invention to provide a means to prop up the instrumented football at its vertices to the same vesica piscis shape as the conventional football. It is an objective of the current invention to provide a straightforward means to permit damaged optical windows to be replaced easily. It is an objective of the present invention to provide clearance for any protuberance in the stitching along the seams between adjacent cover panels in the interior of the instrumented football at its two vertices. It is an objective of the present invention to provide a straightforward means to enable the interchange of optical windows where the windows have different curvatures ranging from plane flat surfaces to shell-like domed shaped concentric surfaces. It is an objective of the current invention to provide a stable mounting means for the instrumentation package assembly inside the instrumented football. It is an objective of the current invention to provide a means for the cameras inside the instrumentation package assembly to look out from both vertices of the instrumented football. It is an objective of the current invention to provide a means to prevent moisture and dirt from entering the instrumented football and interfering with the functions of the instrumentation package assembly inside the football. It is an objective of the current invention to provide a means to prevent damage to the instrumentation package assembly from debris entering the instrumented football. It is an objective of the current invention to provide a means to isolate the instrumentation package assembly from the shock and vibration encountered by the instrumented football. It is an objective of the current invention to provide a means to prop up the instrumented football at its vertices to the same vesica piscis shape as the conventional football. It is an objective of the current invention to provide a straightforward means to permit damaged optical windows to be replaced easily. It is an objective of the present invention to provide clearance for any protuberance in the stitching along the seams between adjacent cover panels in the interior of the instrumented football at its two vertices.

FIG. 21C and FIG. 21D

The detailed physical elements disclosed in the Type II buffer plate assembly drawings shown in FIG. 21C and FIG. 21D are identified as follows: 1 is the y-axis of the instrumented football. 2 is the bore in the cover for the slightly conical small outside diameter end of the buffer plate which is pressed into a machined bore in the cover of each of the instrumented football's vertices. 3 is the small inside diameter of the buffer plate bore. 4 is the interior curved surface of the buffer plate which is pressed against by the instrumented football's inflated bladder (not shown). 5 is the tapered edge of the buffer plate. 6 is the large inside diameter of the buffer plate bore. 7 is an o-ring seal. 8 is an o-ring seal. 9 is an o-ring seal. 10 is a circular grove for mounting the o-ring. 11 is a circular grove for mounting the o-ring. 12 is a circular grove for mounting the o-ring. 13 is the body of the Type II buffer plate. 14 is the exterior vesica piscis curved surface of the buffer plate bonded to the cover/liner sandwich. 15 is the cover of the instrumented football. 16 is the liner which is bonded to the cover to form a sandwich. 17 is the inflated pre-formed bladder. 18 is the camera. 19 is the camera lens 1$^{st}$ element of the camera lens. 20 is a separate optical element that acts as a optical window mounted on and sealed to the small end of the buffer plate. 21 is the 1$^{st}$ element of the camera lens. 22 is the battery pack charging induction coil. 23 is the slightly conical small diameter end of the instrumentation package assembly enclosure. 24 is the outside diameter of the instrumentation package assembly's enclosure skin.

FIG. 21C shows a side view section of the Type II buffer plate and instrumentation package assembly.

FIG. 21D shows a side view section of just the buffer plate alone.

Referring to drawings FIG. 21C and FIG. 21D, in a preferred embodiment, a Type II buffer plate assembly is disclosed. The buffer plate assembly is comprised of buffer plate 13, and optical window 20.

One of the distinguishing characteristics of the present preferred embodiment is that a separate optical element acts as a protruding spherical-shell like optical window 20 from the cover 15 provides a clear sealed path through which the camera 18 can peer outward through the instrumented football's cover 15. An advantage of this is that it provides protection for the camera lens 19 and also allows for an unobstructed field of view by the cover 15, and thereby gives an unvignetted field of view for the camera 18 when the camera uses extremely wide angle camera lenses 19.

FIG. 21C shows a side view section of the Type II buffer plate bonded to the cover/liner sandwich, with the buffer plate passing through the machined bore in the cover/liner sandwich, and the instrumentation package assembly inserted into the buffer plate bore. The side view section shown in FIG. 21C looks the same on both ends of the instrumented football. FIG. 21D shows a side view section of just the buffer plate alone. The buffer plate is constructed of plastic foams, polycarbonates, ABS or fiber reinforced plastics to keep it strong but lite weight. The buffer plate is circularly symmetric about its y-axis.

The primary difference between the preferred embodiment shown in FIG. 21C and FIG. 21D compared to the previous preferred embodiment shown in FIG. 21A and FIG. 21B is that FIG. 21C and FIG. 21D uses a protruding spherical-shell optical window rather than a protruding camera lens window.

The small diameter 3 bore end of the Type II buffer plate acts as a portal through the football's cover 15. The small diameter bore 3 end of the Type II buffer plate is inserted and pressed into the machined bore 2 in the cover/liner sandwich at the football's vertex and is bonded to the inside diameter of the bore with a permanent resilient air-tight and water-tight compound. The outside diameter of the buffer plate 2 is made slightly conical so as to facilitate its easy passage into cover/liner's machined bore.

The buffer plate has a small 45 degree chamfer on its end to facilitate easy entry and passage through the cover's bore; and also provide a place for a bead of the bonding agent to affect a seal. The slightly conical small diameter end 23 of the instrumentation package assembly is inserted into the small diameter 3 bore end of the Type II buffer plate. The instrumentation package assembly houses a camera lens 19. The camera lens 19 serves as the focusing lens for the camera 18. It provides a clear sealed path through which the camera 18 can peer outward through the cover 15 of the instrumented football. The optical window 20 physically protrudes outward slightly from the end of the cover 15 in order to achieve the maximum field of view for the camera without vignetting the field of view by the cover 15 or by the buffer plate 13.

The buffer plate accommodates three rubber (or equivalent) o-ring seals 7, 8, and 9. These o-rings are set into three circular coaxial groves 10, 11, and 12 in the buffer plate. When the slightly conical end of the instrumentation package assembly is inserted into the buffer plate, o-rings 7 and 8 are compressed between the inside diameter of the buffer plate and the outside diameter of the end of the instrumentation package assembly thereby forming two seals; o-ring 9 is also compressed between the shoulder of the instrumentation package assembly and the buffer plate thereby forming the third seal. The three seals are both air-tight and water-tight.

The buffer plate has another small 45 degree chamfer at the entrance to its bore to facilitate easy entry and passage of the instrumentation package assembly when it is inserted into the buffer plate's bore.

The buffer plate has an exterior curved surface 14 which resembles the circularly symmetric vesica piscis of a conventional football. This surface is stiff and non-compliant. This surface is bonded to the interior surface of the cover/liner sandwich. Its purpose is to provide a form to use to shape the cover/liner 15, 16 when the cover/liner is bonded to it; 14 causes the exterior shape of the instrumented football's cover's vertex to match the shape of the conventional football's cover vertex. The bond forms an air-tight and water-tight seal.

The interior surface of the buffer plate 4 is gradually tapered to provide a smooth stiff surface touching the bladder 17 against which the inflated bladder 17 may press. Pressure exerted by the bladder on 4 causes the buffer plate surface 14 to press against the cover/liner 15 and 16.

The buffer plate has a large diameter bore 6. The purpose of this bore is to seat the large outside diameter of the instrumentation package assembly's skin. There is another 45 degree chamfer at the entrance to bore 6. The purpose of this chamfer is to guide the outside diameter of the instrumentation package assembly's skin 24 into 6.

The window is a thin shell like lens made from low dispersion optical glass or optical plastic having substantially concentric spherical surfaces to minimize optical aberrations. The glass or plastic is hard and stain resistant and scratch resistant. An antireflection vacuum coating is used on its surfaces which are also hard and scratch and stain resistant. The coating has a brownish or neutral density tint to make it unobtrusive. The buffer plate accommodates three o-ring seals.

The buffer plate has a large diameter bore 6. The purpose of this bore is to securely seat the large outside diameter of the instrumentation package assembly's skin. There is another 45 degree chamfer at the entrance to bore 6. The purpose of this chamfer is to guide the outside diameter of the instrumentation package assembly's skin 24 into 6. The instrumentation package assembly 24 is restrained and isolated from vibration and shock in the x and z directions by 7 and 8; and restrained and isolated from vibration and shock in the y direction by 9.

Referring to the Preferred Embodiments Specified in Drawings FIG. 21C and FIG. 21D, the Type II Buffer Plate Assembly Satisfies all of the Following Further Objectives:

It is an objective of the current invention to provide a buffer plate assembly composed of Type II buffer plate body, separate optical element that acts as a protruding spherical-shell optical window, small inside diameter of the buffer plate bore, interior curved surface of the buffer plate, large inside diameter of the buffer plate bore, o-ring seals, circular groves for mounting the o-ring, and exterior vesica piscis curved surface of the buffer plate. It is an objective of the current invention to provide a buffer plate assembly where a separate optical element that acts as a protruding spherical-shell like optical window from the instrumented football's cover provides a clear sealed path through which the camera can peer outward through the instrumented football's cover. It is an objective of the current invention to provide a stable mounting means for the instrumentation package assembly inside the instrumented football. It is an objective of the current invention to provide a means for the cameras inside the instrumentation package assembly to look out from both vertices of the instrumented football. It is an objective of the current invention to provide a means to prevent moisture and dirt from entering the instrumented football and interfering with the functions of the instrumentation package assembly inside the football. It is an objective of the current invention to provide a means to prevent damage to the instrumentation package assembly from debris entering the instrumented football. It is an objective of the current invention to provide a means to isolate the instrumentation package assembly from the shock and vibration encountered by the instrumented football. It is an objective of the current invention to provide a means to prop up the instrumented football at its vertices to the same vesica piscis shape as the conventional football. It is an objective of the current invention to provide a straightforward means to permit damaged optical windows to be replaced easily. It is an objective of the present invention to provide optical windows having a range of curvatures appropriate to meet less than extremely wide fields of view requirements. It is an objective of the present invention to provide a buffer plate and an optical window which do not vignette extremely wide fields of view. It is an objective of the present invention to provide optical windows which do not produce optical aberrations for extremely wide fields of view. It is an objective of the present invention to provide clearance for any protuberance in the stitching along the seams between adjacent cover panels in the interior of the instrumented football at its two vertices. It is an objective of the present invention to provide a straightforward means to enable the interchange of optical windows where the windows have different curvatures ranging from plane flat surfaces to shell-like-domed shaped concentric surfaces.

FIG. 21E and FIG. 21F and FIG. 21K

The detailed physical elements disclosed in the Type III buffer plate assembly drawings shown in FIG. 21E and FIG. 21F are identified as follows: 1 is the y-axis of the instrumented football. 2 is the bore in the cover for the slightly conical small outside diameter end of the buffer plate which is pressed into a machined bore in the cover of each of the instrumented football's vertices. 3 is the small inside diameter of the buffer plate bore. 4 is the interior curved surface of the buffer plate which is pressed against by the instrumented football's inflated bladder (not shown). 5 is the tapered edge of the buffer plate. 6 is the large inside diameter of the buffer plate bore. 7 is an o-ring seal. 8 is an o-ring seal. 9 is an o-ring seal. 10 is a circular grove for mounting the o-ring. 11 is a circular grove for mounting the o-ring. 12 is a circular grove for mounting the o-ring. 13 is the body of the Type III buffer plate. 14 is the exterior vesica piscis curved surface of the buffer plate bonded to the cover/liner sandwich. 15 is the threaded cell-like sleeve for mounting the optical window to the buffer plate. 16 is the mating thread on the sleeve and buffer plate. 17 is an o-ring circular mounting grove. 18 is an o-ring seal. 19 is the camera lens. 20 is the optical window mounted on and sealed to the small diameter end of the threaded sleeve 16 of the buffer plate. 21 is the 1*st* element of the camera lens. 22 is the surface of the liner against which the pre-formed inflated bladder (not shown) presses. 23 is the slightly conical small diameter end of the instrumentation package assembly. 24 is battery pack charging induction coil. 25 is the camera. 26 is the cover. 27 is the liner which is bonded to the cover to form a cover/liner sandwich. 28 is the outside diameter of the instrumentation package assembly's skin.

FIG. 21E shows a side view section of the Type III buffer plate and instrumentation package assembly.

FIG. 21F shows a side view section of just the buffer plate alone.

FIG. 21K shows an end view of just the buffer plate alone.

Referring to drawings FIG. 21E and FIG. 21F, in a preferred embodiment, a Type III buffer plate assembly is disclosed which provides a straight-forward means to replace damaged optical windows. The buffer plate assembly is comprised of buffer plate 13, optical window 20, and threaded sleeve 15. An end view of the present buffer plate assembly looks the same as that shown in FIG. 21K except for the numbering of some elements. FIG. 21K is the end view of the Type III threaded buffer plate showing the slots that provide clearance for the protuberance in the interior cover/liner stitching at the football's two vertices.

Another distinguishing characteristic of the present preferred embodiment is that a protruding spherical-shell like optical window 20 from the cover 15 that provides a clear sealed path through which the camera 18 can peer outward through the instrumented football's cover 15, is mounted in a threaded cell-like sleeve 15. An advantage of this is that it allows the optical window 20 to be easily removed and replaced in case they are damaged during the game. The optical window 20 provides protection for the camera lens 19 and also allows for an unobstructed field of view by the cover 15, and thereby gives an unvignetted field of view for the camera 18 when the camera uses extremely wide angle camera lenses 19.

FIG. 21E shows a side view section of the Type III buffer plate 13 bonded to the cover/liner sandwich 26 and 27, with the buffer plate passing through the machined bore 2 in the cover/liner sandwich 26 and 27, and the instrumentation package assembly inserted into the buffer plate bore 3. From the football's symmetry, note that the side view section shown in FIG. 21E looks the same on both ends of the instrumented football. FIG. 21F shows a side view section of just the buffer plate alone. The buffer plate is constructed of plastic foams, polycarbonates, ABS or fiber reinforced plastics to keep it strong but lite weight. The buffer plate is circularly symmetric about its y-axis.

The small diameter 3 bore end of the Type III buffer plate acts as a portal through the football's cover 26. The small diameter 3 bore end of the Type III buffer plate is inserted and pressed into the machined bore in the cover/liner sandwich at the football's vertex and is bonded to the inside diameter of the bore with a permanent resilient air-tight and water-tight compound. The outside diameter of the buffer plate 2 is made slightly conical so as to facilitate its easy passage into cover/liner's machined bore.

The buffer plate 13 has a small 45 degree chamfer on its end to facilitate easy entry and passage of the end of the instrumentation package assembly 23 through the cover's bore; and also provide a place for a bead of the bonding agent to affect a seal.

The small diameter ends of the instrumentation package assembly 23 are made slightly conical so it can easily slip into the small diameter bore of the buffer plate 3. The slightly conical small diameter end 23 of the instrumentation package assembly is inserted into the small diameter bore end 3 of the Type III buffer plate. The instrumentation package assembly houses a camera lens 19. The camera lens 19 serves as the focusing lens for the camera 25. The optical window 20 provides a clear sealed path through which the camera 25 can peer outward through the cover/liner sandwich 26 and 27. The camera lens 19 physically protrudes outward slightly from the end of the cover 26 in order to achieve the maximum field of view for the camera without vignetting the field of view by the cover 26 or by the buffer plate bore 3.

The buffer plate accommodates three rubber (or equivalent material) o-ring seals 7, 8, and 9. These o-rings are set into three circular coaxial groves 10, 11, and 12 in the buffer plate. When the slightly conical end of the instrumentation package assembly 23 is inserted into the buffer plate, o-rings 7 and 8 are compressed between the inside diameter of the buffer plate 3 and the outside diameter of the end of the instrumentation package assembly 23 thereby forming two seals; o-ring 9 is also compressed. It is compressed between the shoulder of the instrumentation package assembly 28 and the buffer plate 13 thereby forming the third seal. The three seals are both air-tight and water-tight. They also provide a modicum of vibration isolation between external knocks to the optical window 20 and the instrumentation package assembly 28. The buffer plate has a small 45 degree chamfer 30 at the entrance to its bore 3 to facilitate easy entry and passage of the end of the instrumentation package assembly as it is inserted into the buffer plate's bore 3.

The buffer plate has another small 45 degree chamfer 29 at the entrance to its large diameter bore 6 to facilitate easy entry and passage of the instrumentation package assembly's 28 shoulder as it is inserted into the buffer plate's bore 6. The purpose of this bore is to seat the large outside diameter of the instrumentation package assembly 28.

The buffer plate has an exterior curved surface 14 which resembles the circularly symmetric vesica piscis of a conventional football's cover. This surface is stiff and non-compliant. The buffer plate is made from plastic foam, polycarbonates, ABS or fiber reinforced plastics. The plastic foam, polycarbonates, ABS and fiber reinforced plastics do not block, absorb, or reflect the radio waves that are transmitted or received by the instrumented football. The buffer plate's exterior surface 14 is pressed against and bonded to the interior surface of the cover/liner sandwich 26 and 27 at each of the vertices of the instrumented football. The purpose of 14 is to provide a form to use to shape the cover/liner 26 and 27 when the cover/liner is bonded to it; 14 causes the exterior shape of the instrumented football's cover's vertex to match the vesica piscis shape of the conventional football's cover vertex. The bond forms an air-tight and water-tight seal.

The interior surface of the buffer plate 4 is gradually tapered to provide a smooth stiff surface against which the inflated bladder 22 may press. The buffer plate's curved surface 4 resembles an oblate spheroid. The bladder 22 is in contact with the buffer plate over all of surface 4. Pressure exerted by the inflated bladder 22 on the buffer plate surface 4 causes the buffer plate's exterior surface 14 to press against the cover/liner sandwich 26 and 27 thereby forcing them together. The buffer plate surface 4 is gradually tapered to a smooth edge 5 where the buffer plate curved surface 4 smoothly meets the liner to make a seamless even transition between the two. The avoidance of sharp bumps in the transition enables the bladder to have a long life free from irregular wear.

The buffer plate has a large diameter bore 6. The purpose of this bore is to securely seat the large outside diameter of the instrumentation package assembly's skin. There is another 45 degree chamfer at the entrance to bore 6. The purpose of this chamfer is to guide the outside diameter of the instrumentation package assembly's skin 28 into 6. The instrumentation package assembly 28 is restrained and isolated from vibration and shock in the x and z directions by 7 and 8; and restrained and isolated from vibration and shock in the y direction by 9.

The window is a thin single element shell-like domed shaped lens 20 made from low dispersion optical glass (or optical plastic) having substantially concentric spherical surfaces to minimize optical aberrations. The glass (or plastic) is hard and stain resistant and scratch resistant. An antireflection vacuum coating is deposited on its surfaces which are also hard, and scratch, and stain resistant. The coating has a brownish or neutral density tint to make it look unobtrusive to the players. The optical windows 11 and 12 are shell-like and disposed one at either end of each of the buffer plates. The outer surfaces of the windows are spherical in shape and convex outward and shell-like domed shaped as is necessary to permit the cameras to see fields of view with extremely wide viewing angles approaching 90 degrees off the x-axis of the football. Shell-like domed shaped implies that the spherical surfaces of the optical windows are concentric. In applications where extremely wide viewing angles are not required, the optical window surfaces can be made flat and plane parallel.

An advantage of the Type III buffer plate embodiment over the Type I and Type II embodiments is that it permits damaged optical windows to be replaced easily. It also enables the easy interchange of optical windows having different curvatures ranging from plane flat surfaces to shell-like-domed shaped concentric surfaces. By screwing out the threaded sleeve containing the optical window, it also permits easy access for removal and exchange of camera lenses.

The window is mounted and sealed in a threaded sleeve 15 which can be screwed into or out from the end of the buffer plate. The combination is called a window/sleeve sub-assembly. The small diameter end of the buffer plate that faces outward from the cover is also threaded with a mating thread 16 to accommodate the threaded sleeve 15. This arrangement allows windows to be conveniently replaced and interchanged should a window be damaged, by simply unscrewing the sleeve/window sub-assembly, and replacing it with a fresh sub-assembly having a new undamaged window.

In an alternative preferred embodiment, the present invention is enhanced by adding the grooved features of FIG. 21K to the exterior vesica piscis curved surface 14 of the buffer plate. The exterior buffer plate vesica piscis curved surface 14 is given four radial grooves, channels or slots, like the ones shown in FIG. 21K that are cut into it at ninety degree intervals around its x-axis. These grooves/channels/slots are identical to the ones shown in FIG. 21K. The purpose of the four grooves/channels/slots is to provide clearance for any protuberances in the stitching along the seams between adjacent cover panels, including their liners, in the interior of the instrumented football at its two vertices. These slots provide a nesting place for the stitching. When filled with bonding material, these slots will bond solidly to the cover panel stitching thereby producing a secure bond between the buffer plates and the instrumented football's cover panels. The slots avoid there being the possibility of an interference fit between the surface of the buffer plate 14 and the interior surface of the football vertices which the buffer plates need to bond to. This eliminates a misfit. The depth of the slots depends on the depth dimension of the protuberance of the stitching. The depth of the slots is made slightly larger than the protuberance of the stitching. The width of the slots depends on the width dimension of the protuberance of the stitching. The width of the slots is made slightly larger than the width dimension of the protuberance of the stitching. For example, it is contemplated that a slot depth range of ⅛ to ¼ inch will be satisfactory to accommodate most factory manufactured stitching tolerances. It is also contemplated that a slot width range of ⅛ to ¼ inch will be satisfactory to accommodate most factory manufactured stitching tolerances.

Referring to the Preferred Embodiments Specified in Drawings FIG. 21E and FIG. 21F and FIG. 21K, the Type III Buffer Plate Assembly Satisfies all of the Following Further Objectives:

It is an objective of the current invention to provide a buffer plate assembly composed of Type III buffer plate body, protruding spherical-shell optical window, threaded cell-like sleeve mounting for the optical window, small inside diameter of the buffer plate bore, interior curved surface of the buffer plate, large inside diameter of the buffer plate bore, o-ring seals, circular groves for mounting the o-ring, and exterior vesica piscis curved surface of the buffer plate. It is an objective of the present invention that the TYPE I, TYPE II, TYPE III, TYPE IV, TYPE V, TYPE VI buffer plate assemblies are all interchangeable and may be exchanged and substituted for one another by virtue of their vesica piscis surfaces being of the same shape, and by virtue of their all accepting all of the instrumentation package assemblies shown in FIG. 2A and FIG. 2B and FIG. 2C, FIG. 3A and FIG. 3B and FIG. 3C, FIG. 4A and FIG. 4B and FIG. 4C, and FIG. 5A and FIG. 5B and FIG. 5C. It is an objective of the current invention to provide a buffer plate assembly where a protruding spherical-shell like optical window from the football's cover that provides a clear sealed path through which the camera can peer outward through the instrumented football's cover, is mounted in a threaded cell-like sleeve which allows the optical window to be easily removed and replaced. It is an objective of the current invention to provide a buffer plate assembly where the optical window provides protection for the camera lens and also allows for an unobstructed field of view by the cover, and thereby gives an unvignetted field of view for the camera when the camera uses extremely wide angle camera lenses. It is an objective of the current invention to provide a buffer plate assembly with a classic vesica piscis shape that is radially slotted at ninety degree intervals to match the stitching protuberances of the cover/liner panels inside the football in order to avoid an interference fit. It is an objective of the present invention to provide clearance for any protuberance in the stitching along the seams between adjacent cover panels in the interior of the instrumented football at its two vertices. It is an objective of the current invention to provide a buffer plate assembly with a classic vesica piscis shape that is radially slotted with grooves to match the stitching protuberances of the cover/liner panels inside the football in order to avoid an interference fit. It is an objective of the current invention to provide a stable mounting means for the instrumentation package assembly inside the instrumented football. It is an objective of the current invention to provide a means for the cameras inside the instrumentation package assembly to look out from both vertices of the instrumented football. It is an objective of the current invention to provide a means to prevent moisture and dirt from entering the instrumented football and interfering with the functions of the instrumentation package assembly inside the football. It is an objective of the current invention to provide a means to prevent damage to the instrumentation package assembly from debris entering the instrumented football. It is an objective of the current invention to provide a means to isolate the instrumentation package assembly from the shock and vibration encountered by the instrumented football. It is an objective of the current invention to provide a means to prop up the instrumented football at its vertices to the same vesica piscis shape as the conventional football. It is an objective of the current invention to provide a straightforward means to permit damaged optical windows to be replaced easily. It is an objective of the present invention to provide optical windows having a range of curvatures appropriate to meet less than extremely wide fields of view requirements. It is an objective of the present invention to provide a buffer plate and an optical window which do not vignette extremely wide fields of view. It is an objective of the present invention to provide optical windows which do not produce optical aberrations for extremely wide fields of view. It is an objective of the present invention to provide a straightforward means to enable the interchange of optical windows where the windows have different curvatures ranging from plane flat surfaces to shell-like-domed shaped concentric surfaces.

FIG. 21G and FIG. 21H

The detailed physical elements disclosed in the Type IV buffer plate assembly drawings shown in FIG. 21G and FIG. 21H are identified as follows: 1 is the y-axis of the instrumented football. 2 is the bore in the cover for the slightly conical small outside diameter end of the buffer plate which is pressed into a machined bore in the cover of each of the instrumented football's vertices. 3 is a circular grove for mounting the o-ring. 4 is the interior curved surface of the buffer plate which is pressed against by the instrumented football's inflated bladder (not shown). 5 is the tapered edge of the buffer plate. 6 is the large inside diameter of the buffer plate bore. 7 is an o-ring seal. 8 is an o-ring seal. 9 is an o-ring seal. 10 is a circular grove for mounting the o-ring. 11 is the small inside diameter of the buffer plate bore. 12 is a circular grove for mounting the o-ring. 13 is the body of the Type IV buffer plate. 14 is the exterior vesica piscis curved surface of the buffer plate bonded to the cover/liner sandwich. 15 is the threaded cell-like sleeve which mounts the optical window. 16 is the mounting grove for the optical window machined into the threaded sleeve. 17 is a circular o-ring groove. 18 is an o-ring seal. 19 is the camera lens. 20 is the optical window mounted on and sealed to the threaded sleeve. 21 is the 1$^{st}$ element of the camera lens. 22 is the surface of the liner against which the inflated pre-formed bladder (not shown) presses. 23 is the battery pack charging induction coil. 24 is the outside diameter of the instrumentation package assembly's skin. 25 is the camera. 26 is the cover of the instrumented football. 27 is the liner bonded to the cover to form a cover/liner sandwich.

FIG. 21G shows a side view section of the Type IV buffer plate and instrumentation package assembly.

FIG. 21H shows a side view section of just the buffer plate alone.

Referring to drawings FIG. 21G and FIG. 21H, in a preferred embodiment, a Type IV buffer plate assembly is disclosed which provides a straightforward means to replace damaged optical windows; and also provides for an optical window which is more unobtrusive and less exposed to the hostile playing field environment. The buffer plate assembly is comprised of buffer plate 13, optical window 20, and threaded sleeve 15.

A distinguishing characteristic of the present preferred embodiment is that the optical window 20 is recessed into the football's cover 26. An advantage of this is that recessing provides for more protection for the optical window from damage on the playing field. The recessed spherical-shell like optical window 20 provides a clear sealed path through which the camera 25 can peer outward through the instrumented football's cover 26. It is mounted in a threaded cell-like sleeve 15. An advantage of this is that it allows the optical window 20 to be easily removed and replaced. The optical window 20 provides protection for the camera lens 19 and also allows for an unobstructed field of view by the cover 26, and thereby gives an unvignetted field of view for the camera 25 when the camera uses extremely wide angle camera lenses 19.

FIG. 21G shows a side view section of the Type IV buffer plate bonded to the cover/liner sandwich, with the buffer plate passing through the machined bore in the cover/liner sandwich, and the instrumentation package assembly inserted into the buffer plate bore. The buffer plate accommodates a total of four o-ring seals. The seals are made of rubber (or equivalent). From the football's symmetry, note that the side view section shown in FIG. 21G looks the same on both ends of the instrumented football. FIG. 21H shows a side view section of just the buffer plate alone. The buffer plate is constructed of plastic foams, polycarbonates, ABS or fiber reinforced plastics to keep it strong but lite weight. The buffer plate is circularly symmetric about its y-axis. The small diameter bore end 2 of the Type IV buffer plate acts as a portal through the football's cover 15. The small diameter bore end 2 of the Type I buffer plate is inserted and pressed into the machined bore in the cover/liner sandwich 26, 27 at the football's vertex and is bonded to the inside diameter of the bore with a permanent resilient air-tight and water-tight compound. The outside diameter of the buffer plate is made slightly conical so as to facilitate its easy passage into cover/liner's machined bore.

The buffer plate has a small 45 degree chamfer on its end to facilitate easy entry and passage through the cover's bore; and also provide a place for a bead of the bonding agent to affect a seal. The small diameter ends of the instrumentation package assembly are made slightly conical so they can easily slip into the small diameter bore of the buffer plate 13. The slightly conical small diameter end 23 of the instrumentation package assembly is inserted into the small diameter bore end 2 of the Type III buffer plate. The instrumentation package assembly houses a camera lens 19. It serves as the focusing lens for the camera 18. It also acts as a clear sealed path through which the camera 18 can peer outward through the cover 26.

The buffer plate accommodates three rubber (or equivalent) o-ring seals 7, 8, and 9. These o-rings are set into three circular coaxial groves 10, 12, and 13 in the buffer plate. When the slightly conical end of the instrumentation package assembly is inserted into the buffer plate, o-rings 7 and 8 are compressed between the inside diameter of the buffer plate 11 and the outside diameter of the end of the instrumentation package assembly 28 thereby forming two seals; o-ring 9 is also compressed. It is compressed between the shoulder of the instrumentation package assembly 24 and the buffer plate 13 thereby forming the third seal. The three seals are both air-tight and water-tight. They also provide a modicum of vibration isolation between external knocks to the optical window and the instrumentation package assembly. The buffer plate has a small 45 degree chamfer (not shown) at the entrance to its bore 11 to facilitate easy entry and passage of the end of the instrumentation package assembly as it is inserted into the buffer plate's bore 11.

The buffer plate has another small 45 degree chamfer (not shown) at the entrance to its bore 6 to facilitate easy entry and passage of the instrumentation package assembly as it is inserted into the buffer plate's bore.

The buffer plate has a large diameter bore 6. The purpose of this bore is to securely seat the large outside diameter of the instrumentation package assembly's skin. There is another 45 degree chamfer at the entrance to bore 6. The purpose of this chamfer is to guide the outside diameter of the instrumentation package assembly's skin 24 into 6. The instrumentation package assembly 24 is restrained and isolated from vibration and shock in the x and z directions by 7 and 8; and restrained and isolated from vibration and shock in the y direction by 9.

The buffer plate has an exterior curved surface 14 which resembles the circularly symmetric vesica piscis of a conventional football's cover. This surface is stiff and non-compliant. The buffer plate is made from plastic foam, polycarbonates, ABS or fiber reinforced plastics. The polycarbonates, ABS and fiber reinforced plastics do not block, absorb, or reflect the radio waves that are transmitted or received by the instrumented football. The buffer plate's exterior surface 14 is pressed against and bonded to the interior surface of the cover/liner sandwich at each of the vertices of the instrumented football. The purpose of 14 is to provide a form to use to shape the cover/liner sandwich 15 and 16 when the cover/liner is bonded to it; 14 causes the exterior shape of the instrumented football's cover's vertex to match the vesica piscis shape of the conventional football's cover vertex. The bond forms an air-tight and water-tight seal.

The interior surface of the buffer plate 4 is gradually tapered to provide a smooth stiff surface against which the inflated bladder 27 may press. Pressure exerted by the bladder 27 on the buffer plate surface 4 causes the buffer plate's exterior surface 14 to press against the cover/liner sandwich 15 and 16 thereby forcing them together. The buffer plate surface 4 is gradually tapered to an edge 5 where the buffer plate curved surface 4 is smoothly joined to the liner to make a seamless even transition between the two. The avoidance of sharp bumps in the transition enables the bladder to have a long life free from irregular wear.

The buffer plate has a large diameter bore 6. The purpose of this bore is to seat the strong large outside diameter 24, of the instrumentation package assembly, in place in the buffer plate.

There is another 45 degree chamfer at the entrance to bore 6. The purpose of this chamfer is to guide the outside diameter 24 of the instrumentation package assembly into 6.

The outermost surface of the optical window 20 is physically flush or recessed inward from the end of the cover in order to be maximally unobtrusive and less exposed to the hostile playing field environment. The window is a thin single element shell like lens 20 made from low dispersion optical glass (or optical plastic) having substantially concentric spherical surfaces to minimize optical aberrations. The glass (or plastic) is hard and stain resistant and scratch resistant. An antireflection vacuum coating is deposited on its surfaces which are also hard, and scratch, and stain resistant. The coating has a brownish (or neutral density) tint to make it look like the leather cover and be unobtrusive to the players.

An advantage of the Type IV buffer plate embodiment over the Type I and Type II embodiments is that it permits damaged optical windows to be replaced easily. It also enables the easy interchange of optical windows having different curvatures ranging from plane flat surfaces to shell-like-domed shaped concentric surfaces.

The window is mounted and sealed in a threaded sleeve 15 which can be screwed into or out from the end of the buffer plate. The combination is called a window/sleeve sub-assembly. The small diameter end of the buffer plate that faces outward from the cover is also threaded with a mating thread to accommodate the threaded sleeve. This arrangement allows windows to be conveniently replaced and interchanged should a window be damaged, by simply unscrewing the sleeve/window sub-assembly, and replacing it with a fresh sub-assembly having a new undamaged window.

An advantage of the Type IV buffer plate embodiment over the Type I, Type II, and Type III buffer plate embodiments is that the optical window is less obtrusive to the players. The outermost surface of the optical window is physically flush or recessed inward from the end of the cover vertices in order to be both maximally unobtrusive to the players and less exposed to the hostile playing field environment and damage during a game.

An advantage of the Type IV buffer plate embodiment over the Type I and Type II embodiments is that it permits damaged optical windows to be replaced easily. It also enables the easy interchange of optical windows having different curvatures ranging from plane flat surfaces to shell-like-domed shaped concentric surfaces. By screwing out the threaded sleeve containing the optical window, it also permits easy access for removal and exchange of camera lenses. When using the Type IV buffer plate embodiment, the angular field of view of the camera relative to the Type I, Type II and Type III embodiments is reduced because its recessed optical window causes vignetting by the cover 26 and buffer plate bore 3. Therefore, the Type IV buffer plate embodiment will be used in instances where it is unnecessary to have the camera require extreme wide angle fields of view extending out to objects as far as 90 degrees off the optical axis of the instrumented football. In instances where extreme wide angle fields of view are not necessary, plane parallel flat optical windows may be employed.

Referring to the Preferred Embodiments Specified in FIG. 21G and FIG. 21H, the Type IV Buffer Plate Assembly Satisfies all of the Following Further Objectives:

It is an objective of the current invention to provide a buffer plate assembly composed of Type IV buffer plate body, recessed spherical-shell optical window, threaded cell-like sleeve mounting for the optical window, small inside diameter of the buffer plate bore, interior curved surface of the buffer plate, large inside diameter of the buffer plate bore, o-ring seals, circular groves for mounting the o-ring, and exterior vesica piscis curved surface of the buffer plate. It is an objective of the current invention to provide an optical window which is recessed into the football's cover to provide for more protection for the optical window from damage on the playing field. It is an objective of the current invention to provide a recessed spherical-shell like optical window which provides a clear sealed path through which the camera can peer outward through the instrumented football's cover. It is an objective of the current invention to provide a recessed spherical-shell like optical window which is mounted in a threaded cell-like sleeve to allow the optical window to be easily removed and replaced. It is an objective of the current invention to provide a recessed spherical-shell like optical window which provides protection for the camera lens and also allows for an unobstructed field of view by the cover, and thereby gives an unvignetted field of view for the camera when the camera uses extremely wide angle camera lenses. It is an objective of the current invention to provide a stable mounting means for the instrumentation package assembly inside the instrumented football. It is an objective of the current invention to provide a means for the cameras inside the instrumentation package assembly to look out from both vertices of the instrumented football. It is an objective of the current invention to provide a means to prevent moisture and dirt from entering the instrumented football and interfering with the functions of the instrumentation package assembly inside the football. It is an objective of the current invention to provide a means to prevent damage to the instrumentation package assembly from debris entering the instrumented football. It is an objective of the current invention to provide a means to isolate the instrumentation package assembly from the shock and vibration encountered by the instrumented football. It is an objective of the current invention to provide a means to prop up the instrumented football at its vertices to the same vesica piscis shape as the conventional football. It is an objective of the current invention to provide a straightforward means to permit damaged optical windows to be replaced easily. It is an objective of the present invention to provide optical windows suitable for less than extremely wide fields of view. It is an objective of the present invention to provide a buffer plate and an optical window which do not vignette extremely wide fields of view. It is an objective of the present invention to provide optical windows which do not produce optical aberrations for extremely wide fields of view. It is an objective of the present invention to provide clearance for any protuberance in the stitching along the seams between adjacent cover panels in the interior of the instrumented football at its two vertices.

It is an objective of the present invention to provide a straightforward means to enable the interchange of optical windows where the windows have different curvatures ranging from plane flat surfaces to shell-like-domed shaped concentric surfaces.

FIG. 21I and FIG. 21J and FIG. 21K

The detailed physical elements disclosed in the Type V buffer plate assembly drawings shown in FIG. 21I and FIG. 21J and FIG. 21K are identified as follows: 1 is the y-axis of the instrumented football. 2 is the bore in the cover for the slightly conical small outside diameter end of the buffer plate which is pressed into a machined bore in the cover of each of the instrumented football's vertices. 3 is a circular grove for mounting the o-ring. 4 is the interior curved surface of the buffer plate which is pressed against by the instrumented football's inflated bladder (not shown). 5 is the tapered edge of the buffer plate, 6 is the large inside diameter of the buffer plate bore. 7 is an o-ring seal. 8 is an o-ring seal. 9 is an o-ring seal. 10 is a circular grove for mounting the o-ring. 11 is the small inside diameter of the buffer plate bore. 12 is a circular grove for mounting the o-ring. 13 is the body of the Type IV buffer plate. 14 is the exterior vesica piscis curved surface of the buffer plate bonded to the cover/liner sandwich. 15 is the threaded cell-like sleeve portion of the small diameter end of the buffer plate. 16 is the threaded sleeve with machined mounting grove for the optical window. 17 is a circular o-ring groove. 18 is an o-ring seal. 19 is the camera lens. 20 is the shell-like domed shaped optical window mounted on and sealed to the threaded cell-like sleeve. 21 is the 1$^{st}$ element of the camera lens. 22 is the surface of the liner against which the inflated pre-formed bladder (not shown) presses. 23 is the battery pack charging induction coil. 24 is the outside diameter of the instrumentation package assembly's skin. 25 is the camera. 26 is the cover of the instrumented football. 27 is the liner bonded to the cover to form a cover/liner sandwich. 28 and 29 and 30 and 31 are grooves or slots or channels cut into the vesica piscis shaped surface of the buffer plate, to provide clearance for the protuberance in the stitching along the seams between adjacent panels, in the interior of the instrumented football at its two vertices.

FIG. 21I shows a side view section of the Type V buffer plate assembly and instrumentation package assembly.

FIG. 21J shows a side view section of just the buffer plate alone.

FIG. 21K shows an end view of just the buffer plate alone.

Referring to drawings FIG. 21I and FIG. 21J and FIG. 21K, in a preferred embodiment, a Type V buffer plate assembly is disclosed. The buffer plate assembly is comprised of buffer plate 13, optical window 20, and threaded cell-like sleeve 16.

A distinguishing characteristic of the present preferred embodiment is that the buffer plate assembly classic vesica piscis curved surface 14 is radially slotted 28, 29, 30 and 31 at ninety degree intervals to match the stitching protuberances of the cover/liner panels 26, 27 inside the football in order to avoid an interference fit when it is pressed into contact with the cover/liner sandwich. The radial slots or grooves 28, 29, 30 and 31 are specified in FIG. 21K. The radial slots 28, 29, 30 and 31 provide clearance for any protuberance in the stitching along the seams between adjacent cover panels in the interior of the instrumented football at its two vertices.

Another distinguishing characteristic of the present preferred embodiment is that the spherical-shell like optical window 20 is recessed into the football's cover 26. An advantage of this is that recessing provides for more protection for the optical window from damage on the playing field. The recessed spherical-shell like optical window 20 provides a clear sealed path through which the camera 25 can peer outward through the instrumented football's cover 26. It is mounted in a threaded cell-like sleeve 15. An advantage of this is that it allows the optical window 20 to be easily removed and replaced. The optical window 20 provides protection for the camera lens 19 and also allows for an unobstructed field of view by the cover 26, and thereby gives an unvignetted field of view for the camera 25 when the camera uses extremely wide angle camera lenses 19.

The buffer plate assembly is bonded to the cover/liner sandwich, with the buffer plate passing through the machined bore in the cover/liner sandwich, and the instrumentation package assembly inserted into the buffer plate bore. The buffer plate accommodates a total of four o-ring seals. The seals are made of rubber (or equivalent). From the football's symmetry, note that the side view section shown in FIG. 21I looks the same on both ends of the instrumented football. FIG. 21J shows a side view section of just the buffer plate alone. FIG. 21K is the front view of the Type V threaded buffer plate showing the slots that provide clearance for the protuberance in the interior cover/liner stitching at the football's two vertices. The buffer plate is constructed of lite weight plastic foams, polycarbonates, ABS or fiber reinforced plastics to keep it strong but lite weight.

The small diameter 11 bore end of the Type V buffer plate acts as a portal through the football's cover 15. The small diameter 11 bore end of the Type V buffer plate is inserted and pressed into the machined bore in the cover/liner sandwich 2 at the football's vertex and is bonded to the inside diameter of the bore with a permanent resilient air-tight and water-tight compound. The outside diameter of the buffer plate 2 is made slightly conical so as to facilitate its easy passage into cover/liner's machined bore. The buffer plate has a small 45 degree chamfer on its end to facilitate easy entry and passage through the cover's bore; and also provide a place for a bead of the bonding agent to affect a seal.

The small diameter ends of the instrumentation package assembly are made slightly conical so they can easily slip into the small diameter bore of the buffer plate 13. The slightly conical small diameter end 23 of the instrumentation package assembly is inserted into the small diameter bore end 11 of the Type V buffer plate. The instrumentation package assembly houses a camera lens 19. The camera lens 19 serves a dual purpose. It serves as the focusing lens for the camera 18. It also provides a clear sealed path through which the camera 25 can peer outward through the cover 26.

The buffer plate accommodates three rubber (or equivalent) o-ring seals 7, 8, and 9. These o-rings are set into three circular coaxial groves 10, 12, and 13 in the buffer plate. When the slightly conical end of the instrumentation package assembly is inserted into the buffer plate, o-rings 7 and 8 are compressed between the inside diameter of the buffer plate 11 and the outside diameter of the end of the instrumentation package assembly 23 thereby forming two seals; o-ring 9 is also compressed. It is compressed between the shoulder of the instrumentation package assembly 24 and the buffer plate 13 thereby forming the third seal. The three seals are both air-tight and water-tight.

They also provide a modicum of vibration isolation between external knocks to the optical window and the instrumentation package assembly. The buffer plate has a small 45 degree chamfer (not shown) at the entrance to its bore 3 to facilitate easy entry and passage of the end of the instrumentation package assembly as it is inserted into the buffer plate's bore 11.

The buffer plate has another small 45 degree chamfer (not shown) at the entrance to its bore 6 to facilitate easy entry and passage of the instrumentation package assembly as it is inserted into the buffer plate's bore.

The buffer plate has a large diameter bore 6. The purpose of this bore is to securely seat the large outside diameter of the instrumentation package assembly's skin. There is another 45 degree chamfer at the entrance to bore 6. The purpose of this chamfer is to guide the outside diameter of the instrumentation package assembly's skin 24 into 6. The instrumentation package assembly 24 is restrained and isolated from vibration and shock in the x and z directions by 7 and 8; and restrained and isolated from vibration and shock in the y direction by 9.

The buffer plate has an exterior curved surface 14 which resembles the circularly symmetric vesica piscis of a conventional football's cover. This surface is stiff and non-compliant. Since the buffer plate is made from plastic foam, polycarbonates, ABS or fiber reinforced plastics, the plastic foam, polycarbonates, ABS and fiber reinforced plastics do not block, absorb, or reflect the radio waves that are transmitted or received by the instrumented football. The buffer plate's exterior surface 14 is pressed against and bonded to the interior surface of the cover/liner sandwich at each of the vertices of the instrumented football. The purpose of 14 is to provide a form to use to shape the cover/liner sandwich 26 and 27 when the cover/liner is bonded to it; 14 causes the exterior shape of the instrumented football's cover's vertex to match the vesica piscis shape of the conventional football's cover vertex. The bond forms an air-tight and water-tight seal.

The curved surface 14 has four radial grooves (channels or slots) 28 and 29 and 30 and 31 cut into it at ninety degree intervals around its y-axis 1. The purpose of the four slots is to provide clearance for any protuberances in the stitching along the seams between adjacent cover panels, including their liners, in the interior of the instrumented football at its two vertices. These slots provide a nesting place for the stitching. When filled with bonding material, these slots will bond solidly to the cover panel stitching thereby producing a secure bond between the buffer plates and the instrumented football's cover panels. The slots avoid there being the possibility of an interference fit between the surface of the buffer plate 14 and the interior surface of the football vertices which the buffer plates need to bond to. This eliminates a misfit. The depth of the slots depends on the depth dimension of the protuberance of the stitching. The depth of the slots is made slightly larger than the protuberance of the stitching. The width of the slots depends on the width dimension of the protuberance of the stitching. The width of the slots is made slightly larger than the width dimension of the protuberance of the stitching. For example, it is contemplated that a slot depth range of ⅛ to ¼ inch will be satisfactory to accommodate most factory manufactured stitching tolerances. It is also contemplated that a slot width range of ⅛ to ¼ inch will be satisfactory to accommodate most factory manufactured stitching tolerances.

The interior surface of the buffer plate 4 is gradually tapered to provide a smooth stiff surface against which the inflated bladder 27 may press. Pressure exerted by the bladder 27 on the buffer plate surface 4 causes the buffer plate's exterior surface 14 to press against the cover/liner sandwich 15 and 16 thereby forcing them together. The buffer plate surface 4 is gradually tapered to an edge 5 where the buffer plate curved surface 4 is smoothly joined to the liner to make a seamless even transition between the two. The avoidance of sharp bumps in the transition enables the bladder to have a long life free from irregular wear. The buffer plate has a large diameter bore 6. The purpose of this bore is to seat the strong large outside diameter 24, of the instrumentation package assembly, in place in the buffer plate.

There is another 45 degree chamfer at the entrance to bore 6. The purpose of this chamfer is to guide the outside diameter 24 of the instrumentation package assembly into 6.

The outermost surface of the optical window 20 is physically flush or recessed inward from the end of the cover in order to be maximally unobtrusive and less exposed to the hostile playing field environment. The window is a thin single element shell like lens 20 made from low dispersion optical glass (or optical plastic) having substantially concentric spherical surfaces to minimize optical aberrations. The glass (or plastic) is hard and stain resistant and scratch resistant. An antireflection vacuum coating is deposited on its surfaces which are also hard, and scratch, and stain resistant. The coating has a brownish (or neutral density) tint to make it look like the leather cover and be unobtrusive to the players.

An advantage of the Type V buffer plate embodiment over the Type I, Type II, Type III, and Type IV embodiments is that the Type V buffer plate has four grooves cut into it to provide clearance for any excess panel/liner stitching protuberances (bulges) in the folded stitch-work holding the seams of the four panels together at the vertices inside the football. These grooves or channels prevent an interference fit between the surface of the Type V buffer plate and the protuberance formed by the bulged folded stitch-work. The protuberances of the bulged folded stitch-work of each of the four seams fit into the four clearance grooves cut into the Type V buffer plate and remain seated therein. The grooves are cut into the buffer plate at 90 degree intervals around its circumference to accommodate the seams in the panels. There is one groove on the top of the buffer plate, one on the bottom, and one on either side. The depth of the grooves is made slightly larger than the protuberance of the folded stitch-work bulge. The grooves in the Type V buffer plate provide clearance for the protuberances in the folded stitching bulges at the vertices of the football, and allows for a good fit to bond the vesica piscis surface of the buffer plate to the vesica piscis surface of the panels and lining inside the football.

The Type V buffer plate also has the same benefit as the Type IV buffer plate over the Type I, and Type II buffer plates in permitting damaged optical windows to be replaced easily. It also enables the easy interchange of optical windows having different curvatures ranging from plane flat surfaces to shell-like-domed shaped concentric surfaces.

Another advantage of the Type V buffer plate embodiment over the Type I and Type II embodiments is that it permits easy access for removal and exchange of camera lenses by screwing out the threaded sleeve containing the optical window.

The window is mounted and sealed in a threaded sleeve 15 which can be screwed into or out from the end of the buffer plate. The combination is called a window/sleeve sub-assembly. The small diameter end of the buffer plate that faces outward from the cover is also threaded with a mating thread to accommodate the threaded sleeve. This arrangement allows windows to be conveniently replaced and interchanged should a window be damaged, by simply unscrewing the sleeve/window sub-assembly, and replacing it with a fresh sub-assembly having a new undamaged window.

An advantage of the Type V buffer plate embodiment over the Type I, Type II, and Type III buffer plate embodiments is that the optical window is less obtrusive to the players. The outermost surface of the optical window is physically flush or recessed inward from the end of the cover vertices in order to be both maximally unobtrusive to the players and less exposed to the hostile playing field environment and damage during a game.

When using the Type V buffer plate embodiment, the angular field of view of the camera relative to the Type I, Type II and Type III embodiments is reduced because its recessed optical window causes vignetting by the cover 26 and buffer plate bore 11. Therefore, the Type V buffer plate embodiment will be used in instances where it is unnecessary to have the camera require extreme wide angle fields of view extending out to objects as far as 90 degrees off the optical axis of the instrumented football. In instances where extreme wide angle fields of view are not necessary, plane parallel flat optical windows may be employed.

Referring to the Preferred Embodiments Specified in Drawings FIG. 21I and FIG. 21J and FIG. 21K, the Type V Buffer Plate Assembly Satisfies all of the Following Further Objectives:

It is an objective of the current invention to provide a buffer plate assembly composed of Type V buffer plate body, recessed spherical-shell optical window, threaded cell-like sleeve mounting for the optical window, small inside diameter of the buffer plate bore, interior curved surface of the buffer plate, large inside diameter of the buffer plate bore, o-ring seals, circular groves for mounting the o-ring, and exterior radially notched/slotted vesica piscis curved surface of the buffer plate. It is an objective of the current invention to provide an optical window which is recessed into the football's cover to provide for more protection for the optical window from damage on the playing field. It is an objective of the current invention to provide a recessed spherical-shell like optical window which provides a clear sealed path through which the camera can peer outward through the instrumented football's cover. It is an objective of the current invention to provide a recessed spherical-shell like optical window which is mounted in a threaded sleeve to allow the optical window to be easily removed and replaced. It is an objective of the current invention to provide a recessed spherical-shell like optical window which provides protection for the camera lens and also allows for an unobstructed field of view by the cover, and thereby gives an unvignetted field of view for the camera when the camera uses extremely wide angle camera lenses. It is an objective of the current invention to provide a buffer plate assembly with a classic vesica piscis shape that is radially slotted at ninety degree intervals to match the stitching protuberances of the cover/liner panels inside the football in order to avoid an interference fit. It is an objective of the present invention to provide clearance for any protuberance in the stitching along the seams between adjacent cover panels in the interior of the instrumented football at its two vertices. It is an objective of the current invention to provide a buffer plate assembly with a classic vesica piscis shape that is slotted to match the stitching protuberances of the cover/liner panels inside the football in order to avoid an interference fit. It is an objective of the current invention to provide a stable mounting means for the instrumentation package assembly inside the instrumented football. It is an objective of the current invention to provide a means for the cameras inside the instrumentation package assembly to look out from both vertices of the instrumented football. It is an objective of the current invention to provide a means to prevent moisture and dirt from entering the instrumented football and interfering with the functions of the instrumentation package assembly inside the football. It is an objective of the current invention to provide a means to prevent damage to the instrumentation package assembly from debris entering the instrumented football. It is an objective of the current invention to provide a means to isolate the instrumentation package assembly from the shock and vibration encountered by the instrumented football. It is an objective of the current invention to provide a means to prop up the instrumented football at its vertices to the same vesica piscis shape as the conventional football. It is an objective of the current invention to provide a straightforward means to permit damaged optical windows to be replaced easily. It is an objective of the present invention to provide optical windows suitable for less than extremely wide fields of view. It is an objective of the present invention to provide a buffer plate and an optical window which do not vignette extremely wide fields of view. It is an objective of the present invention to provide optical windows which do not produce optical aberrations for extremely wide fields of view. It is an objective of the present invention to provide clearance for any protuberance in the stitching along the seams between adjacent cover panels in the interior of the instrumented football at its two vertices. It is an objective of the present invention to capture pictures from instrumented sports paraphernalia that can are formatted for viewing in 3-dimension by a viewing audience. It is an objective of the present invention to provide a straightforward means to enable the interchange of optical windows where the windows have different curvatures ranging from plane flat surfaces to shell-like-domed shaped concentric surfaces.

FIG. 21II and FIG. 21JJ

The detailed physical elements disclosed in the Type XV buffer plate assembly drawings shown in FIG. 21II and FIG. 21JJ are identified as follows: 1 is the y-axis of the instrumented football. 2 is the optical window mounted on the threaded cell-like sleeve. 3 is the threaded sleeve that carries the optical window. 4 is an o-ring seal. 5 is an o-ring seal. 6 is the small inside diameter of the buffer plate bore. 7 is the buffer plate's plug bore. 8 is an antenna element. 9 is a shoulder in the buffer plate. 10 is the buffer plate threaded plug. 11 small circular hole. 12 is the interior curved surface of the buffer plate which is pressed against by the instrumented football's inflated bladder (not shown). 13 is an antenna element. 14 is the exterior buffer plate vesica piscis shaped surface that is bonded to the cover/liner sandwich. 15 is the body of the Type XV buffer plate. 16 is the large threaded inside diameter of the buffer plate bore. 17 is a shoulder in the buffer plate. 18 is the inside diameter of the threaded cell-like sleeve which mounts the optical window. 19 is the bore in the cover for the slightly conical small outside diameter end of the buffer plate which is pressed into a machined bore in the cover of each of the instrumented football's vertices. 20 is the threaded sleeve that holds the optical window. 21 is the threaded small diameter end of the buffer plate. 22 is the camera lens. 23 is the instrumentation package assembly microphone and electronics. 24 is the camera. 25 is the instrumented football's cover. 26 is the tapered edge of the buffer plate. 27 is the battery pack charging induction coil. 28 is the instrumentation package assembly electronics and battery pack.

FIG. 21II shows a side view section of the Type XV buffer plate and instrumentation package assembly.

FIG. 21JJ shows a side view section of just the buffer plate alone.

Referring to drawings FIG. 21II and FIG. 21JJ, in a preferred embodiment, a Type XV buffer plate assembly is disclosed. The buffer plate assembly is comprised of buffer plate 15, optical window 2, and threaded sleeve 20, RF radio wave antennas elements 8 and 13. The buffer plate is circularly symmetric about its y-axis. An end view of the present buffer plate assembly looks the same as that shown in FIG. 21K except for the numbering of some elements. FIG. 21K is the end view of the Type XV threaded buffer plate showing the slots that provide clearance for the protuberances in the interior cover/liner stitching at the football's two vertices.

In the preferred embodiment, the instrumentation package assembly is comprised of camera 24, camera lens 22, battery pack 27, charging induction coil 27, microphone and electronics 23. The buffer plate is constructed of plastic foams, polycarbonates, ABS or fiber reinforced plastics to keep it strong but lite weight.

A distinguishing feature of the present preferred embodiment is that the Type XV buffer plate assembly body 15 contains the instrument package assembly inside itself. There are two separate instrumentation package assemblies in the instrumented football. There is an instrumentation package assembly at either vertex of the instrumented football. Each one is contained in its own buffer plate assembly body 15. The instruemntastion package assembly is packaged inside the buffer plate assembly body 15 shown in FIG. 21JJ. The space inside the buffer plate assembly body 15 is sealed at its front end with the spherical shell-like optical window 2 which is mounted on threaded sleeve 3 that permits easy removal and replacement of the optical window. The space inside the buffer plate assembly body 15 is sealed at its rear end with the threaded plug 10. The space inside the buffer plate assembly body is filled with pressurized dry nitrogen gas to keep dirt and moisture from interferring with the instrumentation package assembly components. The threaded plug 10 is part of the surface 12 which has pressed against it the inflated bladder (not shown) inside the football. The bladder is specified in FIG. 6AA and FIG. 6BB. The two radio communications antennas 7 and 17 are molded into the body of the buffer plate assembly to protect them from damage.

The exterior buffer plate vesica piscis curved surface 14 has four radial grooves, channels or slots, (not shown) cut into it at ninety degree intervals around its y-axis 1. These grooves/channels/slots are the same as the ones shown in FIG. 21K. The purpose of the four grooves/channels/slots is to provide clearance for any protuberances in the stitching along the seams between adjacent cover panels, including their liners, in the interior of the instrumented football at its two vertices. These slots provide a nesting place for the stitching. When filled with bonding material, these slots will bond solidly to the cover panel stitching thereby producing a secure bond between the buffer plates and the instrumented football's cover panels. The slots avoid there being the possibility of an interference fit between the surface of the buffer plate 14 and the interior surface of the football vertices which the buffer plates need to bond to. This eliminates a misfit. The depth of the slots depends on the depth dimension of the protuberance of the stitching. The depth of the slots is made slightly larger than the protuberance of the stitching. The width of the slots depends on the width dimension of the protuberance of the stitching. The width of the slots is made slightly larger than the width dimension of the protuberance of the stitching. For example, it is contemplated that a slot depth range of ⅛ to ¼ inch will be satisfactory to accommodate most factory manufactured stitching tolerances. It is also contemplated that a slot width range of ⅛ to ¼ inch will be satisfactory to accommodate most factory manufactured stitching tolerances.

Another distinguishing characteristic of the present preferred embodiment is that the spherical-shell like optical window 2 is recessed into the football's cover 25. An advantage of this is that recessing provides for more protection for the optical window from damage on the playing field. The recessed spherical-shell like optical window 2 provides a clear sealed path through which the camera 24 can peer outward through the instrumented football's cover 25. It is mounted in a threaded sleeve 3. An advantage of this is that it allows the optical window 2 to be easily removed and replaced. The optical window 2 provides protection for the camera lens 22 and also allows for an unobstructed field of view by the cover 25, and thereby gives an unvignetted field of view for the camera 24 when the camera uses extremely wide angle camera lenses 22.

The buffer plate assembly shown in FIG. 21II and FIG. 21JJ is constructed differently compared to previous preferred embodiments. The present preferred embodiment is constructed with the elements of the instrumentation package assembly inside it. This is done to conserve on space and weight.

The curvature of the buffer plate's interior surface 12 has a smooth surface to match the bladder which presses against it in the instrumented football. The bladder is shown in FIG. 6AA and FIG. 6BB.

The buffer plate assembly has limited space for its batteries, thereby requiring the batteries to be more frequently charged. Also, broadcast range will be limited because of power limitations.

The buffer plate assembly has a small cylindrical end 19 which is inserted, bonded and sealed into the holes at each of the footballs cover's vertices. The exterior surface 14 of the buffer plate has the classic vesica piscis shape. This shape matches the vesica piscis shape of the inside of the cover/liner sandwich 25, 26. The exterior surface 14 of the buffer plates is slotted to match the stitching protuberances of the cover/liner panels inside the football. The wireless radio antenna elements 8 and 13 are molded into the buffer plate assembly to protect them from water and dirt and make them immune to shock and vibration.

The plugs 10 in the buffer plate assembly are removable, enabling the instrumentation package assembly which contains the camera 24, camera lens 22, and the supporting electronics and battery pack 27, to be loaded into the buffer plate assembly or removed for service and maintenance.

A variety of different camera lens types 22, with different lens setting capability, can be used providing they are small in size and weight. The auto iris setting permits the camera lens to automatically adjust for varying lighting conditions on the field. The auto focus setting permits the camera lens to adjust focus for varying distances of the players and action subjects on the field.

When the football has been thrown and is in flight on its trajectory from the quarterback to his intended receiver, the distance of the football from the quarterback is increasing, whereas the distance of the football to the intended receive is decreasing. Each camera can be independently and simultaneously commanded and controlled by the remote base station (specified elsewhere in the present invention) to auto focus on their respective subjects. The rearward camera is looking backward in the direction to where the football has been, and can retain its focus on the quarterback, while the forward camera is looking forward in the direction of its travel, and retains its focus on the receiver.

The functions of the camera lenses 21 and 46 such as focus adjustment settings and iris adjustment settings are controlled wirelessly by the cameraman from the remote base station by sending command and control signals from the remote base station to the instrumented football. The cameraman can also send command and control signals from the remote base station to the instrumented football to put these settings on automatic under the control of the camera electronics. The optical and electronic zoom functions of the camera lenses 21 and 46 are operated by the cameraman by sending command and control signals from the remote base station to the instrumented football. The cameraman can select from a wide variety of HD camera lenses. Wide angle lenses and ultra wide angle lenses are used in many venues to give the TV viewing audience the feeling of being there on the playing field amongst the players. In some venues the cameraman may choose to use camera lenses with more magnification and narrower fields of view to better cover certain plays. In some venues the cameraman may choose camera lenses with small f-numbers to deal with poorer lighting conditions. In many venues the cameraman will choose the camera lenses 21 and 46 to be identical to one another. In many venues the cameraman will choose to use identical settings in both lenses 21 and 46 so that the TV viewing audience will see the same from either end of the instrumented football.

Referring to the Preferred Embodiments Specified in Drawings FIG. 21II and FIG. 21JJ, the Type XV Buffer Plate Assembly Satisfies all of the Following Further Objectives:

It is an objective of the current invention to provide a buffer plate assembly composed of Type XV buffer plate body, recessed spherical-shell optical window, threaded cell-like sleeve mounting for the optical window, small inside diameter of the buffer plate bore, interior curved surface of the buffer plate, large inside diameter of the buffer plate bore, o-ring seals, circular groves for mounting the o-ring, and exterior notched/slotted vesica piscis curved surface of the buffer plate, two molded RF radio antennas, threaded plug, and a hollow space inside the buffer plate to mount an instrumentation package assembly. It is an objective of the current invention to provide a buffer plate assembly body which contains an instrument package assembly. It is an objective of the current invention to provide the instrumented football with two buffer plate assemblies where each contains an instrumentation package assembly. It is an objective of the current invention to provide to mount each buffer plate assembly at either vertex of the instrumented football. It is an objective of the current invention to provide an instrumentation package assembly that is packaged inside each of the buffer plate assembly bodies. It is an objective of the present invention to provide an instrumentation package assembly at either vertex of the instrumented football. It is an objective of the current invention to provide a buffer plate assembly body where the space inside the buffer plate assembly body is sealed at its front end with the spherical shell-like optical window which is mounted on threaded cell-like sleeve that permits easy removal and replacement of the optical window, and at its rear end with a threaded plug. It is an objective of the current invention to provide a buffer plate assembly body where the threaded plug is part of the surface which has pressed against it the inflated bladder inside the football. It is an objective of the current invention to provide a nesting space for the instrumentation package assembly inside the buffer plate assembly in order to conserve space and minimize the weight. It is an objective of the current invention to provide a stable mounting means for the instrumentation package assembly inside the instrumented football. It is an objective of the current invention to provide a means for the cameras inside the instrumentation package assembly to look out from both vertices of the instrumented football. It is an objective of the current invention to provide a means to prevent moisture and dirt from entering the instrumented football and interfering with the functions of the instrumentation package assembly inside the football. It is an objective of the current invention to provide a means to prevent damage to the instrumentation package assembly from debris entering the instrumented football. It is an objective of the current invention to provide a means to isolate the instrumentation package assembly from the shock and vibration encountered by the instrumented football.

It is an objective of the current invention to provide a means to prop up the instrumented football at its vertices to the same vesica piscis shape as the conventional football. It is an objective of the current invention to provide a straightforward means to permit damaged optical windows to be replaced easily. It is an objective of the present invention to provide optical windows suitable for less than extremely wide fields of view. It is an objective of the present invention to provide a buffer plate and an optical window which does not vignette extremely wide fields of view.

It is an objective of the present invention to provide optical windows which do not produce optical aberrations for extremely wide fields of view. It is an objective of the present invention to provide clearance for any protuberance in the stitching along the seams between adjacent cover panels in the interior of the instrumented football at its two vertices. It is an objective of the current invention to provide a buffer plate assembly with a classic vesica piscis shape that is radially slotted at ninety degree intervals to match the stitching protuberances of the cover/liner panels inside the football in order to avoid an interference fit. It is an objective of the current invention to provide a buffer plate assembly with a classic vesica piscis shape that is slotted to match the stitching protuberances of the cover/liner panels inside the football in order to avoid an interference fit. It is an objective of the present invention to provide a straightforward means to enable the interchange of optical windows where the windows have different curvatures ranging from plane flat surfaces to shell-like-domed shaped concentric surfaces. It is an objective of the current invention to provide a buffer plate assembly with an instrumentation package assembly built into it to conserve on space and weight.

It is an objective of the current invention to provide a buffer plate assembly comprised of a buffer plate, optical window, and threaded sleeve, and RF radio wave antennas elements, where the buffer plate assembly contains an instrumentation package assembly comprised of a camera, camera lens, battery pack, charging induction coil, microphone and electronics. It is an objective of the current invention to provide a buffer plate whose weight is minimized. It is an objective of the current invention to provide a smooth surface to match the bladder which presses against it in the instrumented football. It is an objective of the current invention to provide a buffer plate assembly which has a small cylindrical end which when inserted, bonded and sealed into the holes at each of the footballs cover's vertices insures the stability of the instrumentation package assembly within.

It is an objective of the current invention to provide a buffer plate assembly with a classic vesica piscis shape to match the inside of the cover/liner sandwich. It is an objective of the current invention to provide a buffer plate assembly with a classic vesica piscis shape that is radially slotted at ninety degree intervals to match the stitching protuberances of the cover/liner panels inside the football in order to avoid an interference fit. It is an objective of the current invention to provide a buffer plate assembly with the wireless radio antenna elements molded into the buffer plate assembly to protect them from water and dirt and make them immune to shock and vibration. It is an objective of the current invention to provide a buffer plate assembly with removable plugs to enable the instrumentation package assembly which contains the camera, camera lens, and the supporting electronics and battery pack, to be loaded into the buffer plate assembly or removed for service and maintenance.

FIG. 21L and FIG. 21M and FIG. 21K

The detailed physical elements disclosed in the Type VI buffer plate assembly drawings shown in FIG. 21L and FIG. 21M and FIG. 21K are identified as follows: 1 is the y-axis of the instrumented football. 2 is the bore in the cover for the slightly conical small outside diameter end of the buffer plate which is pressed into a machined bore in the cover of each of the instrumented football's vertices. 3 is a circular grove for mounting the o-ring. 4 is the interior curved surface of the buffer plate which is pressed against by the instrumented football's inflated bladder (not shown). 5 is the tapered edge of the buffer plate. 6 is the large inside diameter of the buffer plate bore. 7 is an o-ring seal. 8 is an o-ring seal. 9 is an o-ring seal. 10 is a circular grove for mounting the o-ring. 11 is the small inside diameter of the threaded sleeve. 12 is a circular grove for mounting the o-ring. 13 is the body of the Type VI buffer plate. 14 is the exterior vesica piscis curved surface of the buffer plate bonded to the cover/liner sandwich. 15 is the threaded sleeve portion of the small diameter end of the buffer plate. 16 is the threaded sleeve that mounts the flat optical window. 17 is a circular o-ring groove. 18 is an o-ring seal. 19 is the camera lens. 20 is the flat optical window mounted on and sealed to the threaded cell-like sleeve. 21 is the 1$^{st}$ element of the camera lens. 22 is the surface of the liner against which the inflated pre-formed bladder (not shown) presses. 23 is the battery pack charging induction coil. 24 is the outside diameter of the instrumentation package assembly's skin. 25 is the camera. 26 is the cover of the instrumented football. 27 is the liner bonded to the cover to form a cover/liner sandwich. 28 and 29 and 30 and 31(refer to FIG. 21K) are grooves or slots or channels cut into the vesica piscis shaped surface of the buffer plate, to provide clearance for the protuberance in the stitching along the seams between adjacent panels, in the interior of the instrumented football at its two vertices.

FIG. 21L shows a side view section of the Type VI buffer plate and instrumentation package assembly.

FIG. 21M shows a side view section of just the buffer plate alone.

FIG. 21K shows an end view of just the buffer plate alone.

Referring to drawings FIG. 21L and FIG. 21M, in a preferred embodiment, a Type VI buffer plate assembly is disclosed. The buffer plate assembly is comprised of buffer plate 13, optical window 20, and threaded cell-like sleeve 16.

A distinguishing characteristic of the present preferred embodiment is that the buffer plate assembly classic vesica piscis curved surface 14 is radially slotted 28, 29, 30 and 31 at ninety degree intervals to match the stitching protuberances of the cover/liner panels 26, 27 inside the football in order to avoid an interference fit when it is pressed into contact with the cover/liner sandwich. The radial slots or grooves 28, 29, 30 and 31 are specified in FIG. 21K. The radial slots 28, 29, 30 and 31 provide clearance for any protuberance in the stitching along the seams between adjacent cover panels in the interior of the instrumented football at its two vertices.

Another distinguishing characteristic of the present preferred embodiment is that a plane-parallel-flat optical window 20 is flush with the football's cover 26. An advantage of this is that making it flush provides for more protection for the optical window 20 from damage on the playing field and insures that there is less dirt buildup around the optical window. The flush plane-parallel-flat optical window 20 provides a clear sealed path through which the camera 25 can peer outward through the instrumented football's cover 26. It is mounted in a threaded cell-like sleeve 15. An advantage of this is that it allows the optical window 20 to be easily removed and replaced. The optical window 20 provides protection for the camera lens 19 but also partially obstructs the field of view by the cover 26, and thereby gives a vignetted field of view for the camera 25 when the camera uses extremely wide angle camera lenses 19. The flush plane-parallel-flat optical window 20 is better suited for narrower field of view camera lenses 19.

The preferred embodiment disclosed in FIG. 21L and FIG. 21M is distinguished from previous preferred embodiments for buffer plate assemblies in that it uses a flat optical window 20 rather than a curved spherical domed shaped shell-like optical window. The flat optical window has an advantage over the curved spherical domed shaped shell-like optical window in that it is flush with the end of the buffer plate assembly and the football and doesn't allow dirt to collect around its perimeter.

The buffer plate assembly is bonded to the cover/liner sandwich 27, with the end of the buffer plate passing through the machined bore in the cover/liner sandwich 27, and the instrumentation package assembly inserted into the buffer plate bore via 28. The buffer plate accommodates a total of four o-ring seals 7, 8, 9 and 18. The seals are made of rubber (or equivalent). From the football's symmetry, note that the side view section shown in FIG. 21L looks the same on both ends of the instrumented football. FIG. 21M shows a side view section of just the buffer plate alone. FIG. 21K is the end view of the Type VI threaded buffer plate showing the slots that provide clearance for the protuberance in the interior cover/liner stitching at the football's two vertices. The buffer plate is constructed of lite weight plastic foams, polycarbonates, ABS or fiber reinforced plastics to keep it strong but lite weight. The buffer plate is circularly symmetric about its y-axis.

The small diameter 2 bore end of the Type VI buffer plate acts as a portal through the football's cover 15. The small diameter 2 bore end of the Type VI buffer plate is inserted and pressed into the machined bore in the cover/liner sandwich 27 at the football's vertex and is bonded to the inside diameter of the bore with a permanent resilient air-tight and water-tight compound. The outside diameter of the buffer plate 2 is made slightly conical so as to facilitate its easy passage into cover/liner's machined bore.

The buffer plate has a small 45 degree chamfer on its end to facilitate easy entry and passage through the cover's bore; and also provide a place for a bead of the bonding agent to affect a seal.

The small diameter ends of the instrumentation package assembly are made slightly conical so they can easily slip into the small diameter bore of the buffer plate 3. The slightly conical small diameter end 11 of the instrumentation package assembly is inserted into the small diameter bore end 11 of the Type VI buffer plate. The instrumentation package assembly houses a camera lens 19. The camera lens 19 serves a dual purpose. It serves as the focusing lens for the camera 25. It also acts as a clear sealed path through which the camera 25 can peer outward through the cover 26.

The buffer plate accommodates four rubber (or equivalent) o-ring seals 7, 8, 9 and 18. Three of these o-rings are set into three circular coaxial groves 10, 11, and 12 in the buffer plate. When the slightly conical end 28 of the instrumentation package assembly is inserted into the buffer plate, o-rings 7 and 8 are compressed between the inside diameter of the buffer plate 3 and the outside diameter of the end of the instrumentation package assembly 28 thereby forming two seals; o-ring 9 is also compressed. O-ring 18 is compressed between the shoulder of the instrumentation package assembly and the buffer plate thereby forming a seal. The four seals are both air-tight and water-tight.

The four seals also provide a modicum of vibration isolation between external knocks to the optical window and the instrumentation package assembly. The buffer plate has a small 45 degree chamfer (not shown) at the entrance to its bore 11 to facilitate easy entry and passage of the end of the instrumentation package assembly 28 as it is inserted into the buffer plate's bore 11.

The buffer plate has another small 45 degree chamfer (not shown) at the entrance to its bore 6 to facilitate easy entry and passage of the instrumentation package assembly as it is inserted into the buffer plate's bore.

The buffer plate has an exterior curved surface 14 which resembles the circularly symmetric vesica piscis of a conventional football's cover. This surface is stiff and non-compliant. The buffer plate is made from plastic foam, polycarbonates, ABS or fiber reinforced plastics. The plastic foam, polycarbonates, ABS and fiber reinforced plastics do not block, absorb, or reflect the radio waves that are transmitted or received by the instrumented football. The buffer plate's exterior surface 14 is pressed against and bonded to the interior surface of the cover/liner sandwich at each of the vertices of the instrumented football. The purpose of 14 is to provide a form to use to shape the cover/liner sandwich 26 and 27 when the cover/liner is bonded to it; 14 causes the interior shape of the instrumented football's cover's vertex to match the vesica piscis shape of the conventional football's cover vertex. The bond forms an air-tight and water-tight seal.

The curved surface 14 has four radial grooves (channels or slots) 28 and 29 and 30 and 31 cut into it at ninety degree intervals around its y-axis 1. The purpose of the four slots is to provide clearance for any protuberance in the stitching along the seams between adjacent cover panels in the interior of the instrumented football at its two vertices. These slots provide a nesting place for the stitching. When filled with bonding material, these slots will bond solidly to the cover panel stitching thereby producing a secure bond between the buffer plates and the instrumented football's cover panels. The slots avoid there being the possibility of an interference fit between the surface of the buffer plate 14 and the interior surface of the football vertices which the buffer plates need to bond to. The depth of the slots depends on the depth dimension of the protuberance of the stitching. The width of the slots depends on the width dimension of the protuberance of the stitching. For example, it is contemplated that a slot depth range of ⅛ to ¼ inch will be satisfactory to accommodate most factory manufactured stitching tolerances. It is also contemplated that a slot width range of ⅛ to ¼ inch will be satisfactory to accommodate most factory manufactured stitching tolerances.

The interior surface of the buffer plate 4 is gradually tapered to provide a smooth stiff surface against which the inflated bladder 27 may press. Pressure exerted by the bladder 27 on the buffer plate surface 4 causes the buffer plate's exterior surface 14 to press against the cover/liner sandwich 15 and 16 thereby forcing them together. The buffer plate surface 4 is gradually tapered to an edge 5 where the buffer plate curved surface 4 is smoothly joined to the liner to make a seamless even transition between the two. The avoidance of sharp bumps in the transition enables the bladder to have a long life free from irregular wear. The buffer plate has a large diameter bore 6. The purpose of this bore is to seat the strong large outside diameter 24, of the instrumentation package assembly, in place in the buffer plate.

There is another 45 degree chamfer at the entrance to bore 6. The purpose of this chamfer is to guide the outside diameter 24 of the instrumentation package assembly into 6.

The outermost surface of the optical window 20 is physically flush or recessed inward from the end of the cover in order to be maximally unobtrusive and less exposed to the hostile playing field environment. The window is a thin flat single element made from low dispersion optical glass (or optical plastic). The glass (or plastic) is hard and stain resistant and scratch resistant. An antireflection vacuum coating is deposited on its surfaces which are also hard, and scratch, and stain resistant. The coating has a brownish (or neutral density) tint to make it look like the leather cover and be unobtrusive to the players.

An advantage of the Type VI buffer plate embodiment over the Type I, Type II, Type III, Type IV and Type V embodiments is that the Type VI buffer plate has a plane-parallel-optical window which more easily prevents dirt from accumulating on and around its surface because its surface is flush with the vertex of the football. Like the Type V buffer plate, the Type VI buffer plate also has four grooves cut into it to provide clearance for any excess panel/liner stitching protuberances (bulges) in the folded stitch-work holding the seams of the four panels together at the vertices inside the football. These grooves or channels prevent an interference fit between the surface of the Type VI buffer plate and the protuberance formed by the bulged folded stitch-work. The protuberances of the bulged folded stitch-work of each of the four seams fit into the four clearance grooves cut into the Type VI buffer plate and remain seated therein. The grooves are cut into the buffer plate at 90 degree intervals around its circumference to accommodate the seams in the panels. There is one groove on the top of the buffer plate, one on the bottom, and one on either side. The depth of the grooves is made slightly larger than the protuberance of the folded stitch-work bulge. The grooves in the Type VI buffer plate provide clearance for the protuberances in the folded stitching bulges at the vertices of the football, and allows for a good fit to bond the vesica piscis surface of the buffer plate to the vesica piscis surface of the panels and lining inside the football. These clearance groves give the Type V and Type VI embodiments a benefit over the Type I, Type II, Type III, and Type IV embodiments.

The Type VI buffer plate also has the same benefit as the Type III and Type IV and Type V buffer plates over the Type I, and Type II buffer plates in permitting damaged optical windows to be replaced easily. It also enables the easy interchange of optical windows having different curvatures ranging from plane flat surfaces to shell-like-concentric surfaces. The window is mounted and sealed in a threaded sleeve 15 which can be screwed into or out from the end of the buffer plate. The combination is called a window/sleeve sub-assembly. The small diameter end of the buffer plate that faces outward from the cover is also threaded with a mating thread to accommodate the threaded sleeve. This arrangement allows windows to be conveniently replaced and interchanged should a window be damaged, by simply unscrewing the sleeve/window sub-assembly, and replacing it with a fresh sub-assembly having a new undamaged window.

An advantage of the Type VI buffer plate embodiment over the Type I, Type II, and Type III buffer plate embodiments is that the optical window is less obtrusive to the players. The outermost surface of the optical window is physically flush or recessed inward from the end of the cover vertices in order to be both maximally unobtrusive to the players and less exposed to the hostile playing field environment and damage during a game.

When using the Type VI buffer plate embodiment, the angular field of view of the camera relative to the Type I, Type II and Type III embodiments is reduced because its flat optical window causes vignetting by the cover 26 and buffer plate bore 3. Therefore, the Type VI buffer plate embodiment will be used in instances where it is unnecessary to have the camera require extreme wide angle fields of view extending out to objects as far as 90 degrees off the optical axis of the instrumented football. In instances where extreme wide angle fields of view are not necessary, plane parallel flat optical windows may be employed.

Referring to the Preferred Embodiments Specified in FIG. 21L and FIG. 21M and FIG. 21K, the Type VI Buffer Plate Assembly Satisfies all of the Following Further Objectives:

It is an objective of the current invention to provide a buffer plate assembly composed of Type V buffer plate body, flush plane-parallel-flat optical window, threaded sleeve mounting for the optical window, small inside diameter of the buffer plate bore, interior curved surface of the buffer plate, large inside diameter of the buffer plate bore, o-ring seals, circular groves for mounting the o-ring, and exterior radially notched/slotted vesica piscis curved surface of the buffer plate. It is an objective of the present invention to provide a plane-parallel-flat optical window which is recessed flush into the football's cover to provide for more protection for the optical window from damage on the playing field and insure for less dirt buildup around the window. It is an objective of the present invention to provide a flush plane-parallel-flat optical window which allows a clear sealed path through which the camera can peer outward through the instrumented football's cover. It is an objective of the present invention to provide a flush plane-parallel-flat optical window which is mounted in a threaded sleeve that allows the optical window to be easily removed and replaced. It is an objective of the present invention to provide a flush plane-parallel-flat optical window which provides protection for the camera lens. It is an objective of the present invention to provide an optical window which is better suited for narrower field of view camera lenses. It is an objective of the present invention to provide an optical window which can be easily exchanged for an alternate optical window with different curvatures. It is an objective of the present invention to provide clearance for any protuberance in the stitching along the seams between adjacent cover panels in the interior of the instrumented football at its two vertices. It is an objective of the current invention to provide a buffer plate assembly with a classic vesica piscis shape that is radially slotted at ninety degree intervals to match the stitching protuberances of the cover/liner panels inside the football in order to avoid an interference fit. It is an objective of the current invention to provide a buffer plate assembly with a classic vesica piscis shape that is slotted to match the stitching protuberances of the cover/liner panels inside the football in order to avoid an interference fit. It is an objective of the current invention to provide a stable mounting means for the instrumentation package assembly inside the baseball base. It is an objective of the current invention to provide a means for the cameras inside the instrumentation package assembly to look out from both vertices of the instrumented football. It is an objective of the current invention to provide a means to prevent moisture and dirt from entering the instrumented football and interfering with the functions of the instrumentation package assembly inside the football. It is an objective of the current invention to provide a means to prevent damage to the instrumentation package assembly from debris entering the instrumented football. It is an objective of the current invention to provide a means to isolate the instrumentation package assembly from the shock and vibration encountered by the instrumented football. It is an objective of the current invention to provide a means to prop up the instrumented football at its vertices to the same vesica piscis shape as the conventional football. It is an objective of the current invention to provide a straightforward means to permit damaged optical windows to be replaced easily. It is an objective of the present invention to provide optical windows suitable for less than extremely wide fields of view. It is an objective of the present invention to provide a straightforward means to enable the interchange of optical windows where the windows have different curvatures ranging from plane flat surfaces to shell-like-concentric surfaces. It is an objective of the present invention to provide a buffer plate assembly comprised of a buffer plate, optical window, and threaded sleeve. It is an objective of the current invention to provide a buffer plate assembly with a flat optical window that doesn't allow dirt to collect around its perimeter. It is an objective of the current invention to provide a buffer plate assembly with five seals to protect the elements of the instrumentation package assembly from moisture and dirt. It is an objective of the current invention to construct the buffer plate assembly from a lite weight material to minimize its weight. It is an objective of the buffer plate assembly to provide a clear sealed path through which the camera can peer outward through the cover. It is an objective of the buffer plate assembly to provide a vesica piscis shaped surface that is stiff and non-compliant to be used as a form to use to shape the cover/liner sandwich when the cover/liner is bonded to it. It is an objective of the buffer plate assembly to provide to provide an air-tight and water-tight seal when it is bonded to the cover/liner. It is an objective of the buffer plate assembly to provide an optical window that is physically flush with the end of the cover in order to be maximally unobtrusive to the players and less exposed to the hostile playing field environment.

FIG. 21LL and FIG. 21MM

The detailed physical elements disclosed in the Type XIV buffer plate assembly drawings shown in FIG. 21LL and FIG. 21MM and FIG. 21K are identified as follows: 1 is the y-axis of the instrumented football. 2 is the optical window mounted on and sealed to the threaded cell-like sleeve. 3 is the slightly conical small outside diameter end of the buffer plate which is pressed into a machined bore in the cover of each of the instrumented football's vertices. 4 is an o-ring seal. 5 is an o-ring seal. 6 is the small inside diameter of the buffer plate bore. 7 is an antenna element. 8 is a shoulder in the buffer plate. 9 is the large inside diameter of the buffer plate bore. 10 is the exterior buffer plate vesica piscis shaped surface of the buffer plate that will be bonded to the cover/liner sandwich (not shown). 11 is a circumferential coaxial groove in the interior surface of the buffer plate that seats the fold in the inflated bladder (not shown). 12 is the interior curved surface of the buffer plate which is pressed against by the instrumented football's inflated bladder (not shown). 13 is the bump on the interior of the buffer plate's surface that makes a dimple in the conventional inflated bladder. 14 is the buffer plate plug. 16 is the tapered edge of the buffer plate. 17 is an antenna element. 18 is the body of the Type XIV buffer plate. 19 is the inside diameter of the threaded cell-like sleeve which mounts the optical window. 20 is the small diameter end of the buffer plate. 21 is the threaded cell-like that mounts the optical window. 22 is the camera lens. 23 is the microphone and electronics, 24 is the tip of the instrumentation package assembly enclosure. 25 is the battery pack charging induction coil. 26 is the camera, 27 is the battery pack.

FIG. 21LL shows a side view section of the Type XIV buffer plate and instrumentation package assembly.

FIG. 21MM shows a side view section of just the buffer plate alone.

Referring to drawings FIG. 21LL and FIG. 21MM, in a preferred embodiment, a Type XIV buffer plate assembly is disclosed. The buffer plate assembly is comprised of buffer plate 18, optical window 2, and threaded sleeve 21, RF radio wave antennas 7 and 17, and instrumentation package assembly. The buffer plate is circularly symmetric about its y-axis. An end view of the present buffer plate assembly looks the same as that shown in FIG. 21K except for the numbering of some elements. FIG. 21K is the end view of the Type XIV threaded buffer plate showing the slots that provide clearance for the protuberances in the interior cover/liner stitching at the football's two vertices.

In the preferred embodiment shown in FIG. 21LL and FIG. 21MM, the instrumentation package assembly is comprised of camera 26, camera lens 22, battery pack 27, charging induction coil 25, microphone and electronics 23. The buffer plate is constructed of plastic foams, polycarbonates, ABS or fiber reinforced plastics to keep it strong but lite weight.

A distinguishing feature of the present preferred embodiment is that the Type XIV buffer plate assembly body 18 contains the instrumentation package assembly inside itself. There are two separate instrumentation package assemblies in the instrumented football. There is an instrumentation package assembly at either vertex of the instrumented football. Each one is contained in its own buffer plate assembly body 18. The instruemntastion package assembly is packaged inside the buffer plate assembly body 18 shown in FIG. 21LL. The space inside the buffer plate assembly body 18 is sealed at its front end with the spherical shell-like optical window 2 which is mounted on the threaded cell-like sleeve 21 that permits easy removal and replacement of the optical window. The space inside the buffer plate assembly body 18 is sealed at its rear end with the threaded plug 14. The space inside the buffer plate assembly body is filled with pressurized dry nitrogen gas to keep dirt and moisture from interfering with the instrumentation package assembly components. The threaded plug 14 is part of the vesica piscis shaped surface 13 which has pressed against it the inflated bladder dimple (not shown) inside the football. The bladder is specified in FIG. 7AA and FIG. 7BB and FIG. 7CC. The two radio communications antennas 7 and 17 are molded into the body of the buffer plate assembly to protect them from damage.

A distinguishing feature of the Type XIV buffer plate assembly is that its exterior curved surface 10 and its interior curved surface 12 are both vesica piscis shaped. 10 presses against the vesica piscis shaped interior of the cover/liner. 12 presses against the vesica piscis shaped bladder dimple.

The exterior buffer plate vesica piscis curved surface 10 has four radial grooves, channels or slots, cut into it at ninety degree intervals around its y-axis 1. These grooves/channels/slots are shown in FIG. 21K. The purpose of the four grooves/channels/slots is to provide clearance for any protuberances in the stitching along the seams between adjacent cover panels, including their liners, in the interior of the instrumented football at its two vertices. These slots provide a nesting place for the stitching. When filled with bonding material, these slots will bond solidly to the cover panel stitching thereby producing a secure bond between the buffer plates and the instrumented football's cover panels. The slots avoid there being the possibility of an interference fit between the surface of the buffer plate 10 and the interior surface of the football vertices which the buffer plates need to bond to. This eliminates a misfit. The depth of the slots depends on the depth dimension of the protuberance of the stitching. The depth of the slots is made slightly larger than the protuberance of the stitching. The width of the slots depends on the width dimension of the protuberance of the stitching. The width of the slots is made slightly larger than the width dimension of the protuberance of the stitching. For example, it is contemplated that a slot depth range of ⅛ to ¼ inch will be satisfactory to accommodate most factory manufactured stitching tolerances. It is also contemplated that a slot width range of ⅛ to ¼ inch will be satisfactory to accommodate most factory manufactured stitching tolerances.

Another distinguishing characteristic of the present preferred embodiment is that the spherical-shell like optical window 2 is recessed into the slightly conical small outside diameter end of the buffer plate 3 which is pressed into a machined bore in the cover (not shown) of each of the instrumented football's vertices. An advantage of this is that recessing provides for more protection for the optical window from damage on the playing field. The recessed spherical-shell like optical window 2 provides a clear sealed path through which the camera 26 can peer outward through the instrumented football's cover. The optical window 2 is mounted in a threaded sleeve 3. An advantage of this is that it allows the optical window 2 to be easily removed and replaced by unscrewing the threaded sleeve 3 from the buffer plate assembly and replacing it with another threaded sleeve and optical window. The optical window 2 provides protection for the camera lens 22 and also allows for an unobstructed field of view by the cover 25, and thereby gives an unvignetted field of view for the camera 24 when the camera uses extremely wide angle camera lenses 22.

The buffer plate assembly shown in FIG. 21LL and FIG. 21MM is constructed differently compared to some previous preferred embodiments. The present preferred embodiment is constructed with the elements of the instrumentation package assembly inside it. This is done to conserve on space and weight.

The curvature of the buffer plate's interior surface 12 has a smooth surface to match the bladder which presses against it in the instrumented football. The bladder is shown in FIG. 7AA and FIG. 7BB and FIG. 7CC.

The buffer plate assembly has limited space for its batteries, thereby requiring the batteries to be more frequently charged. Also, broadcast range will be limited because of power limitations.

The buffer plate assembly has a small cylindrical end which is inserted, bonded and sealed into the holes at each of the footballs cover's vertices 2. The exterior surface 10 of the buffer plate has the classic vesica piscis shape. This shape matches the vesica piscis shape of the inside of the cover/liner sandwich (not shown). The exterior surface 10 of the buffer plates is slotted to match the stitching protuberances of the cover/liner panels inside the football.

The wireless radio antenna elements 7 and 17 are molded into the buffer plate assembly to protect them from water and dirt and make them immune to shock and vibration.

The threaded plug 14 in the buffer plate assembly are removable, enabling the instrumentation package assembly which contains the camera 26, camera lens 22, and the supporting electronics and battery pack 27, to be loaded into the buffer plate assembly or removed for service and maintenance.

A variety of different camera lens types 22, with different lens setting capability, can be used providing they are small in size and weight. The auto iris setting permits the camera lens to automatically adjust for varying lighting conditions on the field. The auto focus setting permits the camera lens to adjust focus for varying distances of the players and action subjects on the field.

When the football has been thrown and is in flight on its trajectory from the quarterback to his intended receiver, the distance of the football from the quarterback is increasing, whereas the distance of the football to the intended receive is decreasing. Each camera can be independently and simultaneously commanded and controlled by the remote base station (specified elsewhere in the present invention) to auto focus on their respective subjects. The rearward camera is looking backward in the direction to where the football has been, and can retain its focus on the quarterback, while the forward camera is looking forward in the direction of its travel, and retains its focus on the receiver.

The functions of the camera lens 22 such as focus adjustment settings and iris adjustment settings are controlled wirelessly by the cameraman from the remote base station by sending command and control signals from the remote base station to the instrumented football. The cameraman can also send command and control signals from the remote base station to the instrumented football to put these settings on automatic under the control of the camera electronics. The optical and electronic zoom functions of the camera lens 22 are operated by the cameraman by sending command and control signals from the remote base station to the instrumented football. The cameraman can select from a wide variety of HD camera lenses. Wide angle lenses and ultra wide angle lenses are used in many venues to give the TV viewing audience the feeling of being there on the playing field amongst the players. In some venues the cameraman may choose to use camera lenses with more magnification and narrower fields of view to better cover certain plays. In some venues the cameraman may choose camera lenses with small f-numbers to deal with poorer lighting conditions. In many venues the cameraman will choose the camera lenses to be identical to one another. In many venues the cameraman will choose to use identical settings in both lenses so that the TV viewing audience will see the same from either end of the instrumented football.

Referring to the Preferred Embodiments Specified in Drawings FIG. 21LL and FIG. 21MM and FIG. 21K, the Type XIV Buffer Plate Assembly Satisfies all of the Following Further Objectives:

It is an objective of the current invention to provide a buffer plate assembly composed of Type XV buffer plate body, recessed spherical-shell optical window, threaded cell-like sleeve mounting for the optical window, small inside diameter of the buffer plate bore, interior curved surface of the buffer plate, large inside diameter of the buffer plate bore, o-ring seals, circular groves for mounting the o-ring, and exterior notched/slotted vesica piscis curved surface of the buffer plate, two molded RF radio antennas, plug, a hollow space inside the buffer plate to mount the instrumentation package assembly, and an internal vesica piscis surface to press against the bladder dimples. It is an objective of the present invention to provide a buffer plate assembly body that contains the instrumentation package assembly inside itself. It is an objective of the present invention to provide two separate instrumentation package assemblies in the instrumented football. It is an objective of the present invention to provide an instrumentation package assembly at either vertex of the instrumented football. It is an objective of the present invention for the space containing the instrumentation package assembly inside the buffer plate assembly to be sealed at both ends and filled with pressurized dry nitrogen gas. It is an objective of the present invention to provide a vesica piscis shaped surface plug which is used to press against it the inflated bladder dimple. It is an objective of the current invention to provide a buffer plate assembly with a vesica piscis shape on its external surface to match the cover's internal vesica piscis shape, and a vesica piscis shape on its internal surface to match the vesica piscis shape of the bladder's dimple. It is an objective of the current invention to provide a buffer plate assembly with a classic vesica piscis shape on its exterior surface that is slotted to match the stitching protuberances of the cover/liner panels inside the football in order to avoid an interference fit, and a vesica piscis shape on its internal surface that presses against the vesica piscis shape of the football bladder. It is an objective of the present invention to provide clearance for any protuberance in the stitching along the seams between adjacent cover panels in the interior of the instrumented football at its two vertices.

It is an objective of the current invention to provide a buffer plate assembly with a classic vesica piscis shape that is radially slotted at ninety degree intervals to match the stitching protuberances of the cover/liner panels inside the football in order to avoid an interference fit. It is an objective of the current invention to provide a buffer plate assembly with a classic vesica piscis shape that is slotted to match the stitching protuberances of the cover/liner panels inside the football in order to avoid an interference fit. It is an objective of the current invention to provide a nesting space for the instrumentation package assembly inside the buffer plate assembly in order to conserve space and minimize the weight. It is an objective of the current invention to provide a stable mounting means for the instrumentation package assembly inside the instrumented football. It is an objective of the current invention to provide a means for the cameras inside the instrumentation package assembly to look out from both vertices of the instrumented football. It is an objective of the current invention to provide a means to prevent moisture and dirt from entering the instrumented football and interfering with the functions of the instrumentation package assembly inside the football. It is an objective of the current invention to provide a means to prevent damage to the instrumentation package assembly from debris entering the instrumented football. It is an objective of the current invention to provide a means to isolate the instrumentation package assembly from the shock and vibration encountered by the instrumented football. It is an objective of the current invention to provide a means to prop up the instrumented football at its vertices to the same vesica piscis shape as the conventional football. It is an objective of the current invention to provide a straightforward means to permit damaged optical windows to be replaced easily.

It is an objective of the present invention to provide optical windows suitable for less than extremely wide fields of view. It is an objective of the present invention to provide a buffer plate and an optical window which does not vignette extremely wide fields of view. It is an objective of the present invention to provide optical windows which do not produce optical aberrations for extremely wide fields of view. It is an objective of the present invention to mold the radio antenna elements into the buffer plate assembly body. It is an objective of the present invention to provide clearance for any protuberance in the stitching along the seams between adjacent cover panels in the interior of the instrumented football at its two vertices. It is an objective of the present invention to provide a straightforward means to enable the interchange of optical windows where the windows have different curvatures ranging from plane flat surfaces to shell-like-domed shaped concentric surfaces. It is an objective of the current invention to provide a buffer plate assembly with an instrumentation package assembly built into it to conserve on space and weight. It is an objective of the current invention to provide a buffer plate assembly comprised of a buffer plate, optical window, and threaded sleeve, and RF radio wave antennas elements, where the buffer plate assembly contains an instrumentation package assembly comprised of a camera, camera lens, battery pack, charging induction coil, microphone and electronics. It is an objective of the current invention to provide a buffer plate whose weight is minimized. It is an objective of the current invention to provide a smooth surface to match the bladder which presses against it in the instrumented football. It is an objective of the current invention to provide a buffer plate assembly which has a small cylindrical end which when inserted, bonded and sealed into the holes at each of the footballs cover's vertices insures the stability of the instrumentation package assembly within. It is an objective of the current invention to provide a buffer plate assembly with a classic vesica piscis shape to match the inside of the cover/liner sandwich. It is an objective of the current invention to provide a buffer plate assembly with a classic vesica piscis shape that is slotted to match the stitching protuberances of the cover/liner panels inside the football in order to avoid an interference fit. It is an objective of the current invention to provide a buffer plate assembly with the wireless radio antenna elements molded into the buffer plate assembly to protect them from water and dirt and make them immune to shock and vibration. It is an objective of the current invention to provide a buffer plate assembly with removable plugs to enable the instrumentation package assembly which contains the camera, camera lens, and the supporting electronics and battery pack, to be loaded into the buffer plate assembly or removed for service and maintenance. It is an objective of the current invention to provide a stable mounting means for the instrumentation package assembly inside the instrumented football. It is an objective of the current invention to provide a means for the cameras inside the instrumentation package assembly to look out from both vertices of the instrumented football. It is an objective of the current invention to provide a means to prevent moisture and dirt from entering the instrumented football and interfering with the functions of the instrumentation package assembly inside the football. It is an objective of the current invention to provide a means to prevent damage to the instrumentation package assembly from debris entering the instrumented football. It is an objective of the current invention to provide a means to isolate the instrumentation package assembly from the shock and vibration encountered by the instrumented football. It is an objective of the current invention to provide a means to prop up the instrumented football at its vertices to the same vesica piscis shape as the conventional football. It is an objective of the current invention to provide a straightforward means to permit damaged optical windows to be replaced easily. It is an objective of the present invention to provide optical windows suitable for less than extremely wide fields of view. It is an objective of the present invention to provide a buffer plate and an optical window which do not vignette extremely wide fields of view. It is an objective of the present invention to provide optical windows which do not produce optical aberrations for extremely wide fields of view. It is an objective of the present invention to provide clearance for any protuberance in the stitching along the seams between adjacent cover panels in the interior of the instrumented football at its two vertices. It is an objective of the present invention to provide a straightforward means to enable the interchange of optical windows where the windows have different curvatures ranging from plane flat surfaces to shell-like-concentric surfaces.

Figure 21N:
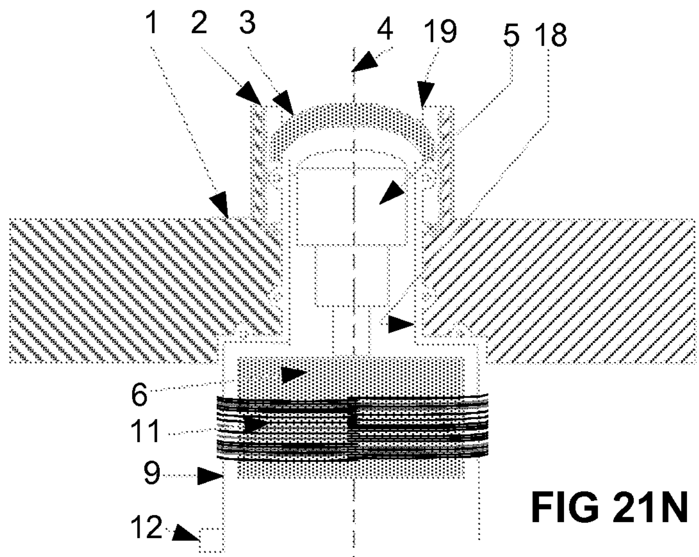
FIG. 21N shows a side view section of the Type VII buffer plate and instrumentation package assembly.
Figure 21O:
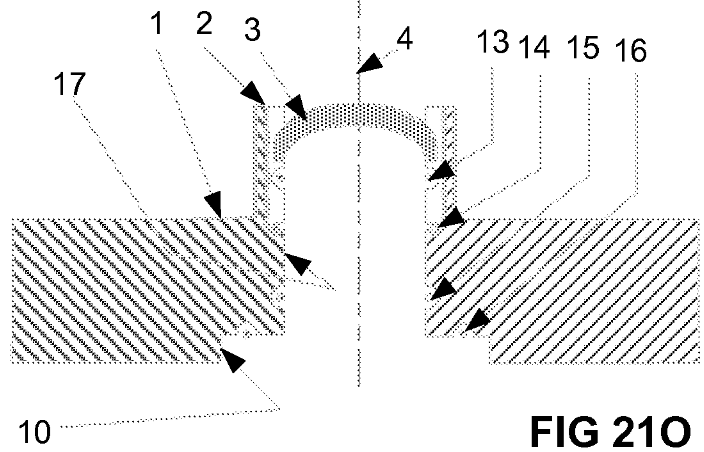
FIG. 21O shows a side view section of just the buffer plate alone.
Figure 21P:
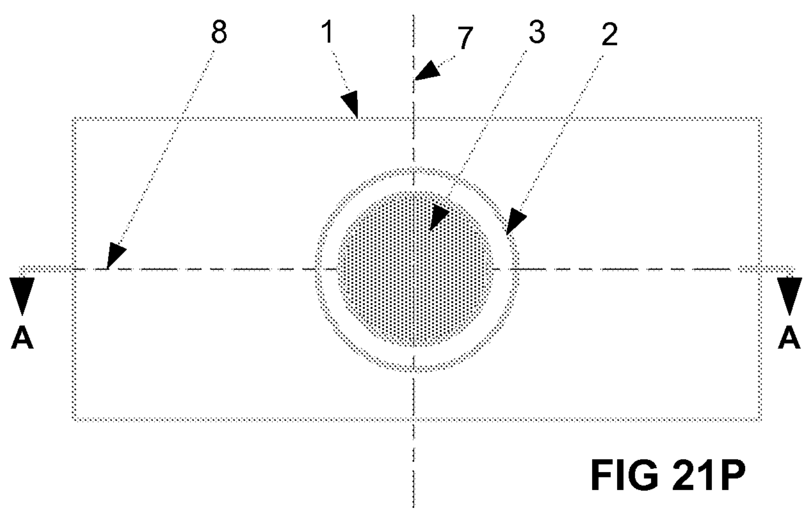
FIG. 21P shows an end view of just the buffer plate alone.

FIG. 21N and FIG. 21O and FIG. 21P

The detailed physical elements disclosed in the buffer plate assembly drawings shown in FIG. 21N and FIG. 21O and FIG. 21P are identified as follows: 1 is the body of the Type VII rectangular threaded buffer plate. 2 is the small cylindrical outside diameter end of the rectangular buffer plate. 3 is the shell-like-concentric optical window mounted on the threaded cell-like sleeve. 4 is the optical and mechanical y-axis of the camera and buffer plate. 5 is the camera lens. 6 is the camera. 7 is the z-axis of the camera and buffer plate. 8 is the x-axis of the camera and buffer plate. 9 is the cylindrical skin of the instrumentation package assembly element's enclosure. 10 is the buffer plate 1 bore's inside diameter. 11 is an induction coil. 12 is an electro-mechanical actuating mechanism. 13 is a bearing. 14 is an o-ring seal. 15 is a bearing. 16 is an o-ring seal. 17 is the small diameter bore in the buffer plate. 18 is the small diameter section of the instrumentation package assembly element's enclosure. 19 is the threaded cell-like sleeve which holds the optical window.

FIG. 21N shows a side view section of the Type VII buffer plate and instrumentation package assembly.

FIG. 21O shows a side view section of just the buffer plate alone.

FIG. 21P shows an end view of just the buffer plate alone.

Referring to drawings FIG. 21N and FIG. 21O and FIG. 21P, in a preferred embodiment, a Type VII buffer plate assembly is disclosed. The buffer plate assembly is comprised of buffer plate 1, optical window 3, and threaded cell-like sleeve 19.

A distinguishing feature of the present preferred embodiment is that the Type VII buffer plate assembly body 1 mounts a single instrumentation package assembly element. The buffer plate assembly 1 has a shell-like domed shaped thin concentric optical window recessed into its end 2 in a threaded cell-like sleeve 19.

FIG. 21N shows a side view section of the Type VII threaded buffer plate and the instrumentation package assembly element 9 inserted and seated into the buffer plate bores inside diameter 10. Similar to the Type III, Type IV, Type V, and Type VI buffer plate preferred embodiments, the Type VII buffer plate accommodates a total of two bearings 13 and 15 which permit the instrumentation package assembly element 9 to smoothly and precisely rotate about its mechanical axis 4. The rubber o-rings 14 and 16 seal the instrumentation package assembly element enclosure from moisture and dirt from the baseball playing field environment.

The two bearings and two o-rings are set into four machined circular coaxial circumferential grooves in the buffer plate 1. When the slightly conical end of the instrumentation package assembly element enclosure 9 is inserted and seated into the two bearings 13 and 15 of buffer plate 1, the instrumentation package assembly element's enclosure is free to precisely rotate about its mechanical axis 4.

The threaded cell-like sleeve 19 which carries the optical window 3, is threaded in and bottomed out against the buffer plate shoulder, and compresses o-ring 14 forming an air tight seal. When the instrumentation package assembly element 9 is pushed into large bore 10 and bottomed out against the buffer plate shoulder, o-ring 16 is lightly compressed thereby becoming a shock absorber. The buffer plate is constructed of plastic foams, polycarbonates, ABS or fiber reinforced plastics to keep it strong but lite weight.

FIG. 21O shows sides view section of just the Type VII threaded rectangular buffer plate 1 and the shell-like optical window 3.

FIG. 21P is the front view of the Type VII threaded rectangular buffer plate 1 showing the shell-like optical window 3 and the small cylindrical threaded end 2 of the buffer plate. The entire buffer plate is made large and strong enough to protect the instrumentation package assembly from being damaged by baseball players impacting the baseball base that it is mounted in. A typical example of buffer plate dimensions are approximately 3 inches×1½ inches×⅜ inch. The buffer plate can be made from a variety of materials including plastic foam, polycarbonates, ABS or fiber reinforced plastics.

The Type VII buffer plate is anchored inside the instrumented baseball base and forms a stable platform for mounting the instrumentation package assembly. There are a variety of ways to accomplish this. One method for example is to fill the instrumented baseball base with encapsulating shock absorbing padding material around the buffer plate, thereby permanently adhering the buffer plate to the shock absorbing padding of the instrumented baseball base. Another method for example is to cut or mold the shock absorbing instrumented baseball base material with cut-out areas to match the profile of the buffer plate. An example of encapsulating material is synthetic rubber.

The small diameter 2 bore end of the Type VII buffer plate acts as a portal through the instrumented baseball base cover. The small diameter 2 end of the Type VII buffer plate is inserted and pressed into the slightly undersized bore diameter in the shock absorbing padding of the instrumented baseball base to form a joint with a press fit. The bore in the instrumented baseball base passes through the cover of the base, thereby allowing the camera within the instrumentation package assembly 9 to see through the buffer plate 1 onto the baseball field of play. The buffer plate is bonded to the inside diameter of the bore of the instrumented baseball base with a permanent resilient air-tight and water-tight compound to form the joint. The shock absorbing padding of the instrumented baseball base can be made of a variety of materials like rubber or Styrofoam for example.

The buffer plate is also pressed into a cutout of equal size and shape in the shock absorbing padding of the instrumented baseball base in order to hold and locate the buffer plate and isolate the instrumentation package assembly 9 from shock and vibration. The buffer plate at the edge of the instrumented baseball base is bonded to the inside diameter of the bore in the instrumented baseball base with a permanent resilient air-tight and water-tight compound. The outside diameter of the buffer plate 2 is made slightly conical so as to facilitate its easy passage into the instrumented baseball base's bore.

Similar to the Type III, Type IV, Type V, and Type VI buffer plate preferred embodiments, the Type VII buffer plate has a small 45 degree chamfer (not shown) on its small diameter end 2 to facilitate easy entry and passage through the instrumented baseball base's bore; and to also provide a place for a bead of the bonding agent to affect a moisture and dirt seal.

The small diameter ends of the instrumentation package assembly are made slightly conical so they can easily slip into the small diameter bore of the buffer plate 1. The slightly conical small diameter end of the instrumentation package assembly is inserted into the small diameter bore end of the Type VII buffer plate. The instrumentation package assembly 9 houses a camera lens 5. The camera lens 5 serves as the image focusing lens for the camera 6. The optical window 3 provides a clear sealed path through which the camera 6 can peer outward through the cover in the side of the baseball base. The optical window 3 is physically flush with the baseball base's cover in order to achieve the maximum field of view for the camera 6 without vignetting the field of view by the cover or by the buffer plate 1.

Similar to the Type III, Type IV, Type V, and Type VI buffer plate preferred embodiments, the Type VII buffer plate accommodates four rubber (or equivalent) o-ring seals. These o-rings are set into three circular coaxial groves in the buffer plate. When the slightly conical end of the instrumentation package assembly 9 is inserted into the buffer plate, two of the o-rings are compressed between the inside diameter of the buffer plate 1 and the outside diameter of the end of the instrumentation package assembly 9 thereby forming two seals.

Another o-ring is also compressed. It is compressed between the shoulder of the instrumentation package assembly 9 and the buffer plate 1 thereby forming the third seal. The three seals are air-tight and water-tight. The seals also provide a modicum of vibration isolation between external knocks to the optical window and the instrumentation package assembly.

The Type VII buffer plate has a large diameter bore 10. The purpose of this bore is to seat the large outside diameter of the instrumentation package assembly 9 in place in the buffer plate. Similar to the Type III, Type IV, Type V, and Type VI buffer plate preferred embodiments, the Type VII buffer plate has a small 45 degree chamfer (not shown) at the entrance to its bore 10 to facilitate easy entry and passage of the instrumentation package assembly 9 as it is inserted into the buffer plate's bore 10.

The buffer plate has another small 45 degree chamfer (not shown) at the entrance to its smaller bore to facilitate easy entry and passage of the instrumentation package assembly as it is inserted into the buffer plate's smaller bore.

The outermost surface of the optical window 3 is flush or recessed inward from the end of the baseball base's cover to be unobtrusive and less exposed to the hostile baseball playing field environment. The window is a thin single element shell-like lens 3 made from low dispersion optical glass (or optical plastic) having substantially concentric spherical surfaces to minimize optical aberrations. The glass (or plastic) is chosen to be hard and stain resistant and scratch resistant.

An antireflection vacuum coating is deposited on its surfaces. The coating is also hard, and scratch, and stain resistant. The coating has a straw or neutral density tint to make it look like the cover and be unobtrusive to the baseball players. An example of such a coating is MgFl.

The Type VII buffer plate has the same benefit as the Type III and Type IV and Type V and Type VI buffer plates over the Type I, and Type II buffer plates, in that the Type VII buffer plate permits damaged optical windows to be replaced easily. It also enables the easy interchange of optical windows having different curvatures, where the curvatures range from plane flat surfaces to shell-like-concentric surfaces. Similar to the Type III, Type IV, Type V, and Type VI buffer plate preferred embodiments, the Type VII buffer plate has an optical window 3 mounted and sealed in a threaded sleeve which can be screwed into or out from the end 2 of the buffer plate 1. The combination of the optical window and the threaded sleeve is called a window/sleeve sub-assembly. The small diameter end 2 of the buffer plate 1 that faces outward from the cover of the baseball base is also threaded with a mating thread to accommodate the threaded sleeve. This arrangement allows windows to be conveniently replaced and interchanged should a window be damaged, by simply unscrewing the sleeve/window sub-assembly, and replacing it with a fresh sub-assembly having a new undamaged window.

The Type VII buffer plate has an advantage over the Type I, Type II, Type III, Type IV, Type V, and Type VI buffer plates in that its size and weight are less restricted. Fixed sports paraphernalia like baseball bases are less restrictive and sensitive to the size and weight of the buffer plates than mobile sports paraphernalia like footballs. The Type VII buffer plate is located inside an instrumented baseball base which is physically larger than an instrumented football, so there is more space for a larger buffer plate. The instrumented baseball base is fixed to the ground, so the weight of the Type VII buffer plate is less restricted. The Type VII buffer plate can be made larger and heavier when used in the context of a instrumented baseball base rather than in the context of an instrumented football, thereby enabling it to shield and safeguard the instrumentation package assembly from stronger shocks and vibrations and permitting the transfer of some of the shock and vibration energy of the game into the ground that the instrumented baseball base is mounted on.

Referring to the Preferred Embodiments Specified in FIG. 21N and FIG. 21O and FIG. 21P, the Type VII Buffer Plate Assembly Satisfies all of the Following Further Objectives:

It is an objective of the present invention to provide a buffer plate assembly composed of a Type VII rectangular threaded buffer plate body for a single camera, small cylindrical outside diameter end of the rectangular buffer plate body, recessed shell-like-concentric optical window mounted on the threaded cell-like sleeve and sealed to the small cylindrical diameter end of the rectangular buffer plate, o-ring seals, small diameter bore in the buffer plate, and threaded sleeve which holds the optical window. It is an objective of the present invention for the buffer plate assembly to hold one recessed shell-like optical window with one threaded cell-like sleeve. It is an objective of the current invention to provide a means to prevent moisture and dirt from entering the instrumentation package assembly. It is an objective of the current invention to provide a means to prevent misalignment and damage to the instrumentation package. It is an objective of the current invention to provide a means to isolate the instrumentation package assembly from the shock and vibration. It is an objective of the current invention to provide a straightforward means to permit damaged optical windows to be replaced easily. It is an objective of the present invention to provide optical windows suitable for less than extremely wide fields of view. It is an objective of the present invention to provide a buffer plate and an optical window which do not vignette extremely wide fields of view.

It is an objective of the present invention to provide optical windows which do not produce optical aberrations for extremely wide fields of view.

It is an objective of the present invention to provide a straightforward means to enable the interchange of optical windows where the windows have different curvatures ranging from plane flat surfaces to shell-like-concentric surfaces.

Figure 21Q:
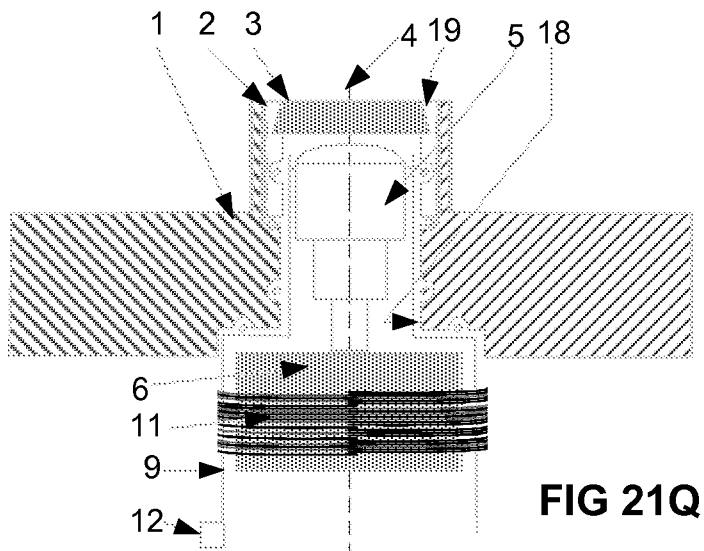
FIG. 21Q shows a side view section of the Type VIII buffer plate and instrumentation package assembly.
Figure 21R:
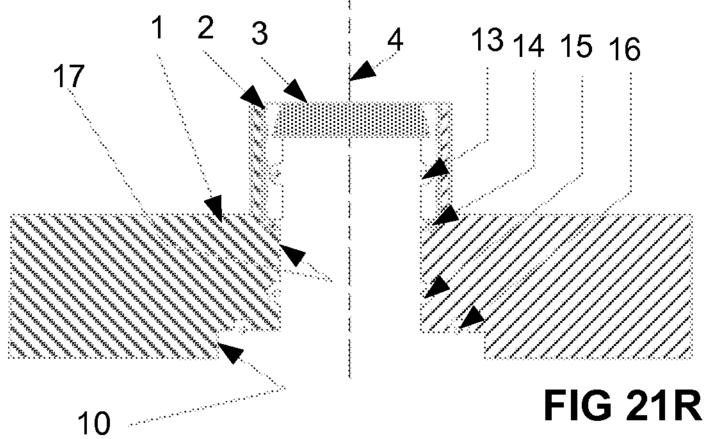
FIG. 21R shows a side view section of just the buffer plate alone.
Figure 21S:
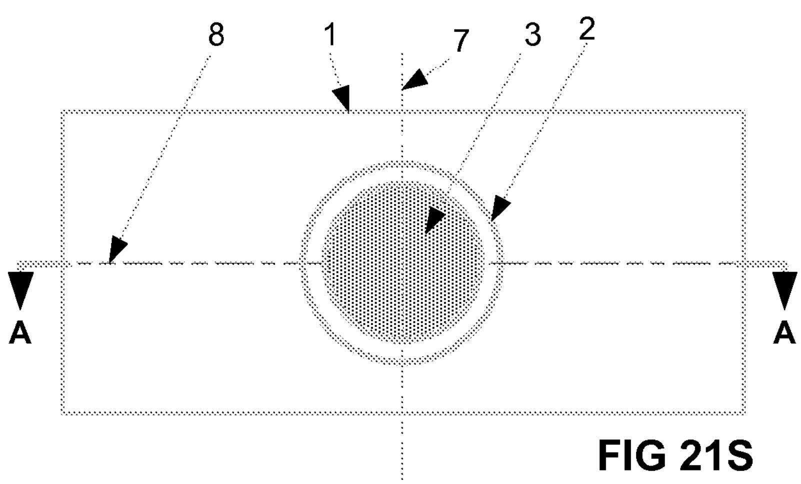
FIG. 21S shows an end view of just the buffer plate alone.
Figure 21Q:
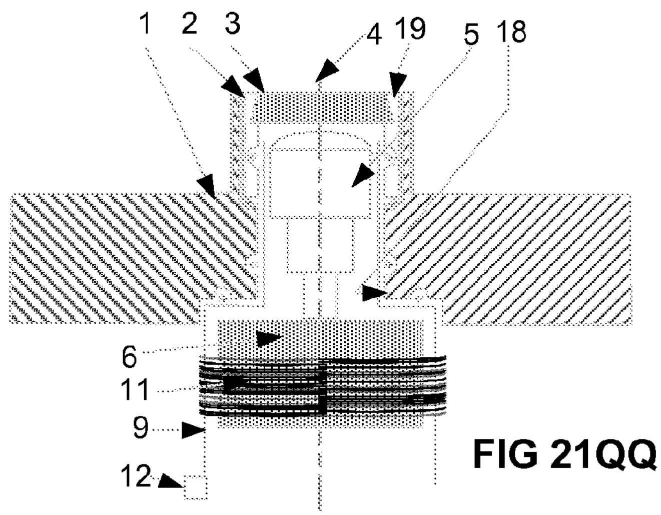
Figure 21R:
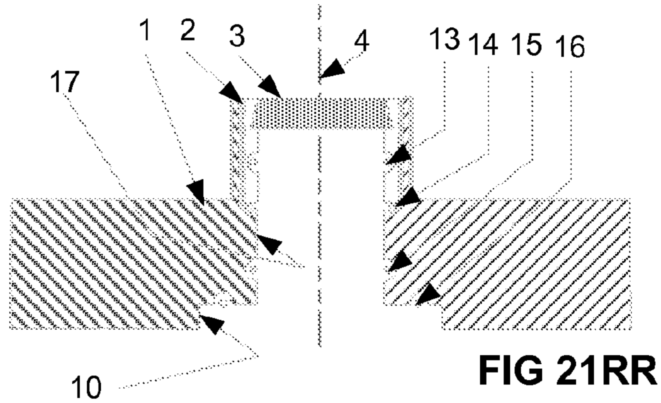
Figure 21S:
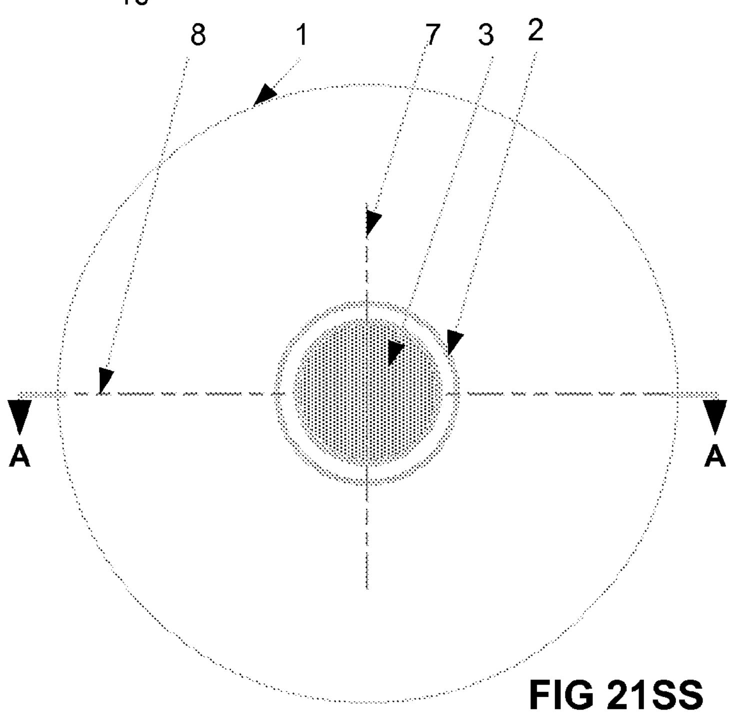

FIG. 21Q and FIG. 21R and FIG. 21S

The detailed physical elements disclosed in the buffer plate assembly drawings shown in FIG. 21Q and FIG. 21R and FIG. 21S are identified as follows: 1 is the body of the Type VIII rectangular buffer plate. 2 is the small cylindrical outside diameter end of the rectangular buffer plate. 3 is the plane-parallel-flat optical window mounted on and sealed to the threaded cell-like sleeve. 4 is the optical and mechanical y-axis of the camera and buffer plate. 5 is the camera lens. 6 is the camera. 7 is the z-axis of the camera and buffer plate. 8 is the x-axis of the camera and buffer plate. 9 is the cylindrical skin of the instrumentation package assembly element's enclosure. 10 is the buffer plate 1 bore's inside diameter. 11 is an induction coil. 12 is an electro-mechanical actuating mechanism. 13 is a bearing. 14 is an o-ring seal. 15 is a bearing. 16 is an o-ring seal. 17 is the small inside diameter of the buffer plate 1. 18 is the small diameter section of the instrumentation package assembly element's enclosure. 19 is the threaded cell-like sleeve which holds the optical window.

FIG. 21Q shows a side view section of the Type VIII buffer plate and instrumentation package assembly.

FIG. 21R shows a side view section of just the buffer plate alone.

FIG. 21S shows an end view of just the buffer plate alone.

Referring to drawings FIG. 21Q and FIG. 21R and FIG. 21S, in a preferred embodiment, a Type VIII buffer plate assembly is disclosed. The buffer plate assembly is comprised of buffer plate 1, optical window 3, and threaded cell-like sleeve 19.

A distinguishing feature of the present preferred embodiment is that the Type VIII buffer plate assembly body 1 is rectangular and mounts a single instrumentation package assembly element. The buffer plate assembly has a plane-parallel-flat optical windows mounted flush to its end in a threaded cell-like sleeve.

The only difference between the Type VIII buffer plate shown in FIG. 21Q and FIG. 21R and FIG. 2215, and the Type VII buffer plate shown in FIG. 21N and FIG. 21) and FIG. 21P, is that the Type VIII buffer plate employs a plane-parallel-flat optical window, where the Type VII buffer plate employs a shell-like optical window.

FIG. 21R shows sides view section of just the Type VIII buffer plate 1 and the shell-like optical window 3.

FIG. 21S is the front view of the Type VIII threaded rectangular buffer plate 1 showing the shell-like optical window 3 and the small cylindrical threaded end 2 of the buffer plate. The entire buffer plate is made large and strong enough to protect the instrumentation package assembly from being damaged by baseball players impacting the baseball base that it is mounted in.

A typical example of buffer plate dimensions are 3 inches×1½ inches×⅜ inch thick. The buffer plate is constructed of plastic foams, polycarbonates, ABS or fiber reinforced plastics to keep it strong but lite weight.

The Type VII buffer plate is anchored inside the instrumented baseball base and forms a stable platform for mounting the instrumentation package assembly. There are a variety of ways to accomplish this. One method for example is to fill the instrumented baseball base with shock absorbing encapsulating material around the buffer plate by using a moldable shock absorbing material like styrofoam, thereby permanently adhering the buffer plate to the shock absorbing padding of the instrumented baseball base. Another method for example is to cut or mold the shock absorbing instrumented baseball base material with cut-out areas to match the profile of the buffer plate The small diameter bore end 2 of the Type VIII buffer plate acts as a portal through the instrumented baseball base cover. The small diameter 2 end of the Type VIII buffer plate is inserted and pressed into the slightly undersized bore diameter in the shock absorbing padding of the instrumented baseball base to form a joint with a press fit. The bore in the instrumented baseball base passes through the cover of the base, thereby allowing the camera within the instrumentation package assembly 9 to see through the buffer plate 1 onto the baseball field of play. The buffer plate is bonded to the inside diameter of the bore of the instrumented baseball base with a permanent resilient air-tight and water-tight compound to form the joint.

The shock absorbing padding of the instrumented baseball base can be made of a variety of materials like rubber or Styrofoam for example.

The buffer plate is also pressed into a cutout of equal size and shape in the shock absorbing padding of the instrumented baseball base in order to hold and locate the buffer plate and isolate the instrumentation package assembly 9 from shock and vibration. The buffer plate at the edge of the instrumented baseball base is bonded to the inside diameter of the bore in the instrumented baseball base with a permanent resilient air-tight and water-tight compound. The outside diameter of the buffer plate 2 is made slightly conical so as to facilitate its easy passage into the instrumented baseball base's bore.

Similar to the Type III, Type IV, Type V, Type VI and Type VII buffer plate preferred embodiments, the Type VIII buffer plate has a small 45 degree chamfer (not shown) on its small diameter end 2 to facilitate easy entry and passage through the instrumented baseball base's bore; and to also provide a place for a bead of the bonding agent to affect a moisture and dirt seal.

The small diameter ends of the instrumentation package assembly are made slightly conical so they can easily slip into the small diameter bore of the buffer plate 1. The slightly conical small diameter end of the instrumentation package assembly is inserted into the small diameter bore end of the Type VIII buffer plate. The instrumentation package assembly 9 houses a camera lens 5. The camera lens 5 serves as the image focusing lens for the camera 6. The optical window 3 provides a clear sealed path through which the camera 6 can peer outward through the cover in the side of the instrumented baseball base. The optical window 3 is physically flush with the instrumented baseball base's cover in order to achieve the maximum field of view for the camera 6 without vignetting the field of view by the cover or by the buffer plate 1.

Similar to the Type III, Type IV, Type V, Type VI and Type VII buffer plate preferred embodiments, the Type VIII buffer plate accommodates four rubber (or equivalent) o-ring seals. These o-rings are set into three circular coaxial groves in the buffer plate. When the slightly conical end of the instrumentation package assembly 9 is inserted into the buffer plate, two of the o-rings are compressed between the inside diameter of the buffer plate 1 and the outside diameter of the end of the instrumentation package assembly 9 thereby forming two seals.

Another o-ring is also compressed. It is compressed between the shoulder of the instrumentation package assembly 9 and the buffer plate 1 thereby forming the third seal. The three seals are air-tight and water-tight. The seals also provide a modicum of vibration isolation between external knocks to the optical window and the instrumentation package assembly.

The Type VIII buffer plate has a large diameter bore 10. The purpose of this bore is to seat the large outside diameter of the instrumentation package assembly 9 in place in the buffer plate. Similar to the Type III, Type IV, Type V, Type VI and Type VII buffer plate preferred embodiments, the Type VIII buffer plate has a small 45 degree chamfer (not shown) at the entrance to its bore 10 to facilitate easy entry and passage of the instrumentation package assembly 9 as it is inserted into the buffer plate's bore 10. The buffer plate has another small 45 degree chamfer (not shown) at the entrance to its smaller bore to facilitate easy entry and passage of the instrumentation package assembly as it is inserted into the buffer plate's smaller bore.

The outermost surface of the optical window 3 is flush or recessed inward from the end of the instrumented baseball base's cover to be unobtrusive and less exposed to the hostile baseball playing field environment. The window is a thin single element shell-like lens 3 made from low dispersion optical glass (or optical plastic) having substantially concentric spherical surfaces to minimize optical aberrations. The glass (or plastic) is chosen to be hard and stain resistant and scratch resistant.

An antireflection vacuum coating is deposited on its surfaces. The coating is also hard, and scratch, and stain resistant. The coating has a straw or neutral density tint to make it look like the cover and be unobtrusive to the baseball players. The buffer plate is constructed of plastic foam, polycarbonates, ABS or fiber reinforced plastics.

An advantage of the Type VIII buffer plate embodiment over the Type VII embodiment is that the Type VIII buffer plate has a plane-parallel-optical window which more easily prevents dirt from accumulating on and around its outer surface because its outer surface is flush with the surface of the cover of the baseball base and has no niches on which dirt can collect.

The Type VIII buffer plate also has the same benefit as the Type III and Type IV and Type V and Type VI and Type VII buffer plates over the Type I, and Type II buffer plates, in that the Type VIII buffer plate permits damaged optical windows to be replaced easily. It also enables the easy interchange of optical windows having different curvatures, where the curvatures range from plane flat surfaces to shell-like-concentric surfaces. Similar to the Type III, Type IV, Type V, Type VI and Type VII buffer plate preferred embodiments, the Type VIII buffer plate has an optical window 3 mounted and sealed in a threaded sleeve which can be screwed into or out from the end 2 of the buffer plate 1. The combination of the optical window and the threaded sleeve is called a window/sleeve sub-assembly. The small diameter end 2 of the buffer plate 1 that faces outward from the cover of the baseball base is also threaded with a mating thread to accommodate the threaded sleeve. This arrangement allows windows to be conveniently replaced and interchanged should a window be damaged, by simply unscrewing the sleeve/window sub-assembly, and replacing it with a fresh sub-assembly having a new undamaged window.

An advantage of the Type VIII buffer plate embodiment over the Type VII buffer plate embodiment is that the optical window is less obtrusive to the players. The outermost surface of the optical window is physically flush or recessed inward from the end of the baseball base's cover in order to be both maximally unobtrusive to the baseball players and less exposed to the hostile baseball playing field environment and consequential damage during a game.

When using the Type VIII buffer plate embodiment, the angular field of view of the camera relative to the Type VII embodiment is reduced because its flat optical window causes vignetting by the baseball base's cover and buffer plate bore. Therefore, the Type VIII buffer plate embodiment will be used in instances where it is unnecessary to have the camera require extreme wide angle fields of view extending out to objects as far as 90 degrees off the optical axis of the instrumented football. Therefore, in instances where extreme wide angle fields of view are not necessary, plane parallel flat optical windows may be employed.

Like with the Type VII buffer plate, the Type VIII buffer plate has an advantage over the Type I, Type II, Type III, Type IV, Type V, and Type VI buffer plates in that its size and weight are less restricted. Fixed sports paraphernalia like baseball bases are less restrictive and sensitive to the size and weight of the buffer plates than mobile sports paraphernalia like footballs. The Type VIII buffer plate is located inside a baseball base which is physically larger than a football, so there is more space for a larger buffer plate. The baseball base is fixed to the ground, so the weight of the Type VII buffer plate is less restricted. The Type VIII buffer plate can be made larger and heavier when used in the context of a baseball base rather than in the context of a football, thereby enabling it to shield and safeguard the instrumentation package assembly from stronger shocks and vibrations and permitting the transfer of some of the shock and vibration energy of the game into the ground.

Referring to the Preferred Embodiments Specified in Drawings FIG. 21Q and FIG. 21R and FIG. 21S; the Type VIII Buffer Plate Assembly Satisfies all of the Following Further Objectives:

It is an objective of the present invention to provide a buffer plate assembly composed of the body of the Type VIII rectangular buffer plate for a single camera, small cylindrical outside diameter end of the rectangular buffer plate, flush plane-parallel-flat optical window mounted on and sealed to the small cylindrical diameter end of the rectangular buffer plate, buffer plate bore's inside diameter, o-ring seals, small inside diameter of the buffer plate, and threaded cell-like sleeve which holds the optical window. It is an objective of the present invention for the buffer plate assembly to hold one flat optical window flush with the buffer plate assembly with one threaded cell-like sleeve. It is an objective of the current invention to provide a means for the cameras inside the instrumentation package assembly to look out from the sports paraphernalia. It is an objective of the current invention to provide a means to prevent moisture and dirt from entering and interfering with the functions of the instrumentation package assembly. It is an objective of the current invention to provide a means to prevent damage to the instrumentation package assembly from debris.

It is an objective of the current invention to provide a means to isolate the instrumentation package assembly from the shock and vibration.

It is an objective of the current invention to provide a means to solidly hold the buffer plate assembly inside the sports paraphernalia. It is an objective of the current invention to provide a straightforward means to permit damaged optical windows to be replaced easily. It is an objective of the present invention to provide optical windows suitable for less than extremely wide fields of view. It is an objective of the present invention to provide optical windows which do not produce optical aberrations for extremely wide fields of view. It is an objective of the present invention to provide a straightforward means to enable the interchange of optical windows where the windows have different curvatures ranging from plane flat surfaces to shell-like-concentric surfaces and are mounted in threaded cell-like sleeves.

FIG. 21QQ and FIG. 21RR and FIG. 21SS

The detailed physical elements disclosed in the Type XIII buffer plate assembly drawings shown in FIG. 21QQ and FIG. 21RR and FIG. 21SS are identified as follows: 1 is the body of the Type XIII circular buffer plate. 2 is the small cylindrical outside diameter end of the circular buffer plate. 3 is the plane-parallel-flat optical window mounted on and sealed to the small cylindrical diameter end of the rectangular buffer plate. 4 is the optical and mechanical y-axis of the camera and buffer plate defined as the z-axis. 5 is the camera lens. 6 is the camera. 7 is the z-axis of the camera and buffer plate. 8 is the x-axis of the camera and buffer plate. 9 is the cylindrical skin of the instrumentation package assembly element's enclosure. 10 is the buffer plate 1 large bore's inside diameter. 11 is an induction coil. 12 is an electromechanical actuating mechanism. 13 is a bearing. 14 is an o-ring seal. 15 is a bearing. 16 is an o-ring seal. 17 is the small inside diameter of the buffer plate 1. 18 is the small diameter section of the instrumentation package assembly element's enclosure. 19 is the threaded sleeve that holds the optical window.

FIG. 21QQ shows a side view section of the Type XIII buffer plate and instrumentation package assembly.

FIG. 21RR shows a side view section of just the buffer plate alone.

FIG. 21SS shows an end view of just the buffer plate alone.

Referring to drawings FIG. 21QQ and FIG. 21RR and FIG. 21SS, in a preferred embodiment, a Type XIII buffer plate assembly is disclosed. The buffer plate assembly is comprised of buffer plate 1, flat optical window 3, and threaded sleeve 19. The buffer plate is constructed of plastic foams, polycarbonates, ABS or fiber reinforced plastics to keep it strong but lite weight.

A distinguishing feature of the present preferred embodiment is that the Type XIII buffer plate assembly body 1 is circular and mounts a single instrumentation package assembly element. The buffer plate assembly has one plane-parallel-flat optical window mounted flush to its end in a threaded cell-like sleeve.

The preferred embodiment shown in FIG. 21QQ and FIG. 21RR and FIG. 21SS is identical to the preferred embodiment shown in FIG. 21Q and FIG. 21R and FIG. 21S except it has a circular body rather than a rectangular body. The circular body makes it more appropriate for mounting instrumentation package assemblies in the geometry of instrumented baseball home plates and instrumented ice hockey pucks rather than in instrumented baseball bases.

Referring to the Preferred Embodiments Specified in Drawings FIG. 21QQ and FIG. 21RR and FIG. 21SS, the Type XIII Buffer Plate Assembly Satisfies all of the Following Further Objectives:

It is an objective of the present invention for the buffer plate assembly to be composed of the circular body of the Type XIII buffer plate for one camera, small cylindrical outside diameter end of the circular buffer plate, flush plane-parallel-flat optical window mounted on and sealed to the small cylindrical diameter end of the rectangular buffer plate, buffer plate large bore's inside diameter, o-ring seals, small inside diameter of the buffer plate, threaded sleeve that holds the optical window. It is an objective of the present invention for the circular buffer plate assembly to hold one flush plane-parallel-flat optical window with one threaded cell-like sleeve. It is an objective of the current invention to provide a means for the cameras inside the instrumentation package assembly to look out from the sports paraphernalia. It is an objective of the current invention to provide a means to prevent moisture and dirt from entering and interfering with the functions of the instrumentation package assembly. It is an objective of the current invention to provide a means to prevent damage to the instrumentation package assembly from debris. It is an objective of the current invention to provide a means to isolate the instrumentation package assembly from the shock and vibration. It is an objective of the current invention to provide a means to solidly hold the buffer plate assembly inside the sports paraphernalia. It is an objective of the current invention to provide a straightforward means to permit damaged optical windows to be replaced easily. It is an objective of the present invention to provide optical windows suitable for less than extremely wide fields of view. It is an objective of the present invention to provide optical windows which do not produce optical aberrations for extremely wide fields of view. It is an objective of the present invention to provide a straightforward means to enable the interchange of optical windows where the windows have different curvatures ranging from plane flat surfaces to shell-like-concentric surfaces.

Figure 21T:
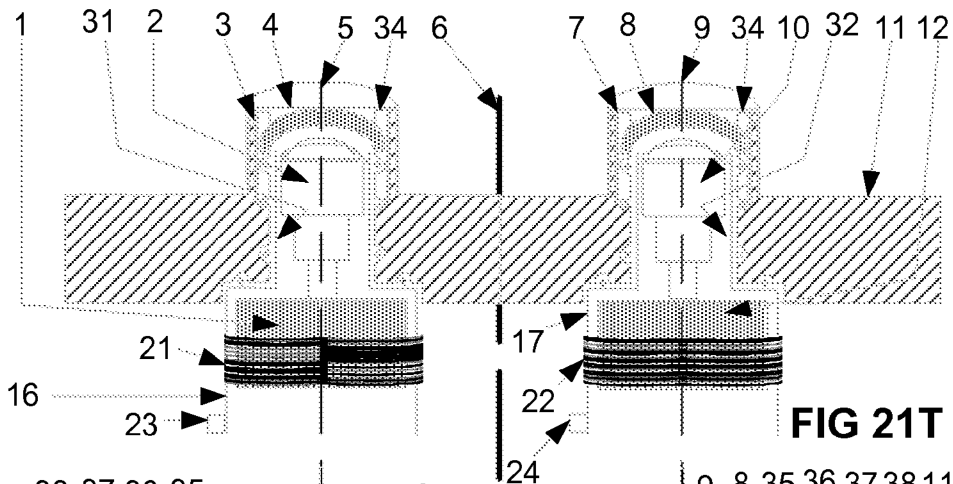
FIG. 21T shows a side view section of the Type IX buffer plate and instrumentation package assembly.
Figure 21U:
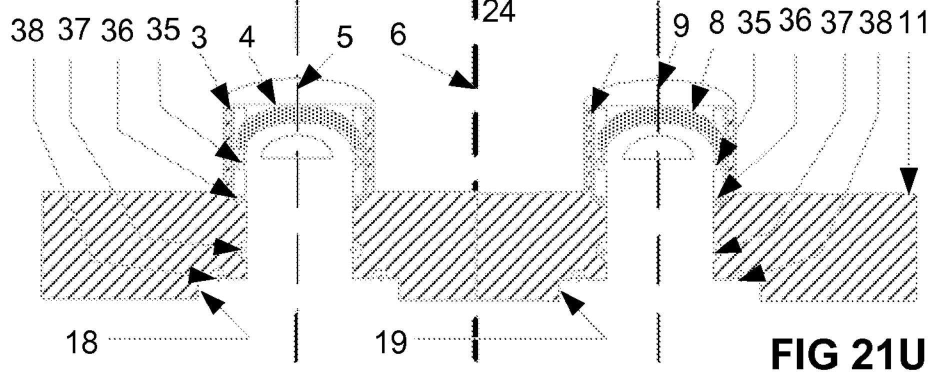
FIG. 21U shows a side view section of just the buffer plate alone.
Figure 21V:
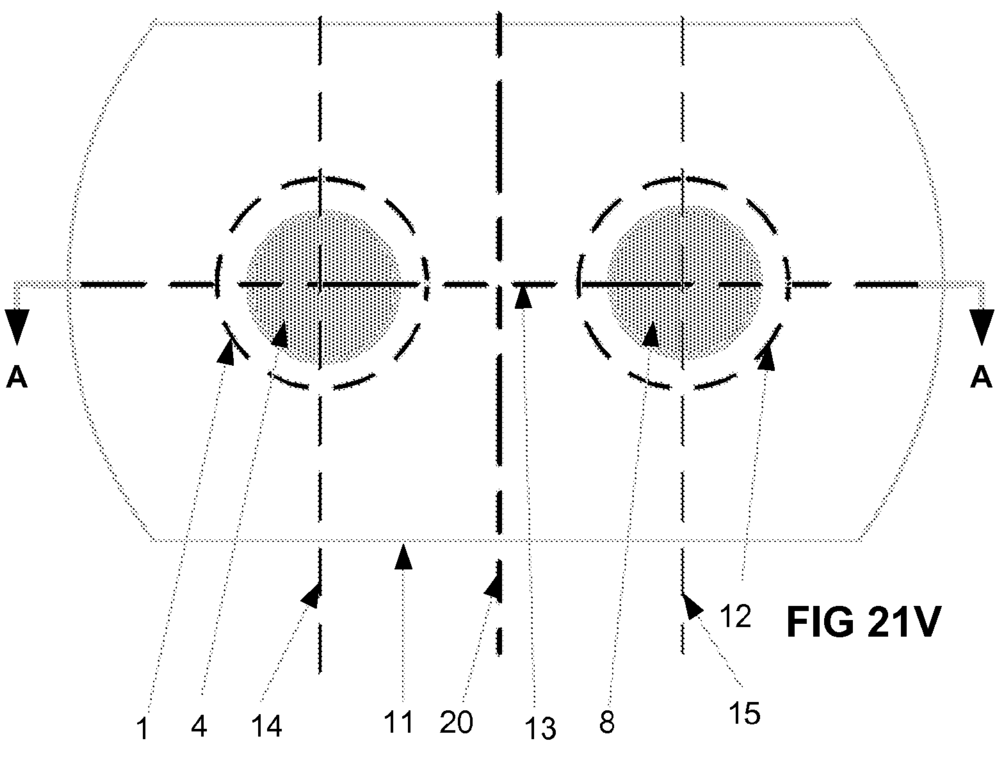
FIG. 21V shows an end view of just the buffer plate alone.

FIG. 21T and FIG. 21U and FIG. 21V

The detailed physical elements disclosed in the Type IX buffer plate assembly drawings shown in FIG. 21T and FIG. 21U and FIG. 21V are identified as follows: 1 is a camera. 2 is the camera lens. 3 is the small cylindrical outside diameter end of the buffer plate. 4 is the shell-like-domed shaped concentric optical window mounted on and sealed to the threaded cell-like sleeve. 5 is the optical and mechanical y-axis of the camera 1. 6 is the mechanical axis of symmetry of the Type IX buffer plate. 7 is the small cylindrical outside diameter end of the buffer plate. 8 is the shell-like-domed shaped concentric optical window mounted on and sealed to the small cylindrical diameter end of the buffer plate. 9 is the optical and mechanical y-axis of the camera 12. 10 is the camera lens. 11 is the body of the Type IX buffer plate. 12 is a camera. 13 is the x-axis of symmetry of the buffer plate and camera 1 and camera 12. 14 is the z-axis of camera 1. 15 is the z-axis of camera 12. 16 is the cylindrical skin section of the instrumentation package assembly element's enclosure that houses camera 1. 17 is the cylindrical skin section of the instrumentation package assembly element's enclosure that houses camera 12. 18 is the inside diameter of the large bore in the buffer plate for instrumentation package assembly element 16. 19 is the inside diameter of the large bore in the buffer plate for instrumentation package assembly element 17. 20 is the z-axis of symmetry of the buffer plate 11. 21 is an induction coil. 22 is an induction coil. 23 is an electro-mechanical actuating mechanism. 24 is an electro-mechanical actuating mechanism. 25 is a bearing. 26 is an o-ring seal. 27 is a bearing. 28 is an o-ring seal. 29 is the inside diameter of the buffer plate 11. 30 is the inside diameter of the buffer plate 11. 31 is the small diameter section of the instrumentation package assembly element 16. 32 is the small diameter section of the instrumentation package assembly element 17. 33 is a threaded sleeve that holds the optical window. 34 is a threaded cell-like sleeve that holds the optical window. 35 is a bearing. 36 is an o-ring seal. 37 is a bearing. 38 is an o-ring seal.

FIG. 21T shows a side view section of the Type IX buffer plate and instrumentation package assembly.

FIG. 21U shows a side view section of just the buffer plate alone.

FIG. 21V shows an end view of just the buffer plate alone.

Referring to drawings FIG. 21T and FIG. 21U and FIG. 21V, in a preferred embodiment, a Type IX buffer plate assembly is disclosed. The buffer plate assembly is comprised of buffer plate 11, optical windows 4 and 8, and threaded cell-like sleeves 34 and 34. The bores in the body of the buffer plate assembly are precisely machined parallel to one another to align the instrumentation package assembly elements for 3-D. In some cases, the bores are machined with a small angle between them to accommodate 3-D imagery of closer objects.

A distinguishing feature of the present preferred embodiment is that the Type IX buffer plate assembly body 11 mounts two instrumentation package assembly elements 16 and 17 which form a 3-D stereo camera pair. The buffer plate assembly body 11 has two shell-like domed shaped thin concentric optical windows 4 and 8 recessed into its ends in threaded cell-like sleeves 34.

FIG. 21T shows a side view section of the Type IX threaded buffer plate and two instrumentation package assembly elements 16 and 17 inserted and seated into the buffer plate bores' inside diameters 18 and 19 respectively. Similar to the Type III, Type IV, Type V, and Type VI buffer plate preferred embodiments, the Type IX buffer plate has bearings which permit the instrumentation package assembly elements 16 and 17 to smoothly and precisely rotate about their mechanical axis 5 and 9 respectively. The rubber o-rings 26, 28, 36 and 38 seal the instrumentation package assembly element enclosures from moisture and dirt from the baseball playing field environment.

The bearings 25, 27, 35 and 37 are set into machined circular seats in buffer plate 11. When the slightly conical ends of the instrumentation package assembly elements 16 and 17 are inserted into their respective bearings, for example 16 inserted into 25 and 27, and 17 inserted into 35 and 37, the instrumentation package assembly element's enclosures are free to precisely rotate about their mechanical axis 5 and 9 respectively.

The threaded sleeves 33 and 34 which carry the optical windows 4 and 8 respectively are threaded into and bottomed out against the buffer plate shoulders; they compress their o-rings 26 and 36 forming air tight seals. When the instrumentation package assembly elements 16 and 17 are pushed into their large bores 18 and 19, and bottomed out against their buffer plate shoulders, the o-ring seals 28 and 37 are lightly compressed thereby becoming shock absorbers. The buffer plate is constructed of plastic foams, polycarbonates, ABS or fiber reinforced plastics to keep it strong but lite weight.

The present Type IX buffer plate preferred embodiment enables 3-dimensional HD pictures to be captured from instrumented sports paraphernalia, like for example from instrumented baseball bases. Each Type IX buffer plate enables its two cameras to simultaneously look out from each side of the instrumented baseball base onto the baseball playing field. Each buffer plate 3-D stereo camera pair produces a 3-dimensional picture format. Each buffer plate holds the optical axes, of the two cameras that make up its 3-D stereo camera pair, parallel to one-another. There are four buffer plates per instrumented baseball base. Each camera pair looks out onto the baseball playing field from each side of the instrumented baseball base. The instrumented baseball bases are square. Therefore the horizontal angular line of sight of each of the adjacent 3-D stereo camera pairs is displaced by 90 degrees relative to one another. For example, if each 3-D stereo camera pair has a 90 degree angular field of view, then the set of four 3-D stereo camera pairs would cover a full 360 degrees angular field of view around the instrumented baseball base. In other words, the four 3-D stereo camera pairs would cover the entire baseball playing field in 3-dimension.

The Type IX buffer plate shown in FIG. 21T and FIG. 21U and FIG. 21V provides the camera lenses 2 and 10 with a suitable interpupillary distance to enable the cameras 1 and 12 to capture pictures from the sports paraphernalia which can be used to generate a 3-dimensional picture format for the viewing audience.

The Type IX buffer plate is anchored inside the instrumented baseball base and forms a stable platform for mounting the instrumentation package assemblies. There are a variety of ways to accomplish this. One method for example is to fill the instrumented baseball base with shock absorbing material around the buffer plate by using a moldable shock absorbing material, thereby permanently adhering the buffer plate to the shock absorbing padding of the baseball base. Another method for example is to cut or mold the shock absorbing instrumented baseball base material with cut-out areas to match the profile of the buffer plate. The buffer plate is constructed of plastic foam, polycarbonates, ABS or fiber reinforced plastics. The buffer plate is semi-rectangular in shape. The ends of the buffer plate are circular arcs. A typical example of the overall dimensions of the buffer plate is 9 inches by 1½ inches by ⅜ inch thick. The buffer plate can be made from a variety of materials including polycarbonates plastic foam, ABS of fiber reinforced plastics.

FIG. 21T shows a side view section of the Type IX threaded buffer plate 11 and the instrumentation package assemblies 16 and 17 inserted into the buffer plate bores 18 and 19 respectively. Similar to the Type III, Type IV, Type V, Type VI, Type VII and Type VIII buffer plate preferred embodiments, the Type IX buffer plate accommodates a total of four o-ring seals which seal the instrumentation package assembly from moisture and dirt from the baseball playing field environment. These o-rings are set into four machined circular coaxial circumferential grooves in the buffer plate. When the slightly conical end of the instrumentation package assembly 9 is inserted into the buffer plate 1, two of the o-rings are compressed between the inside diameter of the buffer plate 1 and the outside diameter of the end of the instrumentation package assembly 9 thereby forming two seals. The two seals are made of rubber (or equivalent). When the threaded sleeve which carries the optical window is threaded in and bottomed against the buffer plate shoulder, the third o-ring is compressed between the shoulder and the buffer plate thereby forming the third seal. When the instrumentation package assembly 9 is pushed into bore 10 and bottomed against the buffer plate shoulder, the fourth o-ring is compressed between the shoulder and the instrumentation package assembly 9, thereby forming the fourth seal.

FIG. 21U shows sides view section of just the Type VIII buffer plate 1 and the shell-like domed shaped optical window 3.

FIG. 21V is the front view of the Type VIII threaded rectangular buffer plate 1 showing the shell-like domed shaped optical window 3 and the small cylindrical threaded end 2 of the buffer plate. The entire buffer plate is made large and strong enough to protect the instrumentation package assembly from being damaged by baseball players impacting the instrumented baseball base that it is mounted in.

The preferred embodiment shown in FIGS. 21T and 21U and 21V shows two cameras 1 and 12 housed in their respective instrumentation package assemblys 16 and 17. The instrumentation package assemblys are mounted to the buffer plate 11. The buffer plate is constructed of polycarbonates, ABS or fiber reinforced plastics Unlike the embodiments where the buffer plates are mounted inside a football which is sensitive to weight, the weight of the buffer plate for the Type IX embodiment is less restricted because the instrumented baseball base, where the buffer plate is used therein, is inanimate and fixed to the ground.

The buffer plate embodiment shown in FIGS. 21T and 21U and 21V physically supports, separates and aligns the instrumentation package assemblys 16 and 17, which contain the two cameras 1 and 12, where each camera separately produces a conventional SD/HD image format, but as a pair produces a 3-dimensional stereo format of pictures of sports events suitable for viewing by an TV audience.

The linear distance separation of the optical axes 5 and 9 of the two camera lenses 2 and 10 is an important function of the buffer plate. For the Type IX buffer plate, the distance measured between axis 5 and axis 9 is defined as the interpupilarly distance between the camera lenses 2 and 10. We note here for reference that for modern commercial 3-dimensional cameras, the range of settings for the interpupillary distance is adjustable from 44 to 150 mm. Following the range of settings referenced for modern commercial 3-dimensional cameras, the size of the buffer plate shown in FIGS. 21T and 21U and 21V is made to accommodate an interpulilary distance range of 44 to 150 mm also. Therefore, the axial separation between each stereo pair of camera lenses 2 and 10 can vary from 44 to 150 mm.

How far you are intending to view the pictures from requires a certain separation between the cameras. This separation is called stereo base or stereo base line and results from the ratio of the distance to the image to the distance between your eyes. The mean interpupillary distance (IPD) is 63 mm (about 2.5 inches) for humans, but varies with age, race and gender. The vast majority of adults have IPDs in the range 50-75 mm. Almost all adults are in the range 45-80 mm. The minimum IPD for children as young as five is around 40 mm.

An advantage of the Type IX buffer plate embodiment over the previous Type I, Type II, Type III, Type IV, Type V, Type VI, Type VII, and Type VIII embodiments is that the Type IX buffer plate embodiment supports two instrumentation package assemblies with two cameras, separated by the proper interpupillary distance, and thereby enables two sets of pictures of the same object to be simultaneously captured from instrumented sports paraphernalia that the buffer plate is mounted therein, like for example a baseball base, to produce a 3-dimensional composite picture format for viewing by an audience. The Type I, Type II, Type III, Type IV, Type V, Type VI, Type VII, and Type VIII embodiments only support one instrumentation package assembly with one camera and consequently cannot produce 3-dimensional picture formats.

The Preferred Embodiments Specified in Drawings FIG. 21T and FIG. 21U and FIG. 21V, the Type IX Buffer Plate Satisfies all of the Following Further Objectives:

It is an objective of the present invention to provide a buffer plate assembly composed the rectangular arc Type IX buffer plate assembly body for two cameras, small cylindrical outside diameter end of the buffer plate, two recessed shell-like-domed shaped concentric optical window mounted on and sealed to the small cylindrical diameter end of the buffer plate, small cylindrical outside diameter end of the buffer plate, inside diameter of the large bore in the buffer plate, o-ring seals, inside diameter of the buffer plate, and threaded cell-like sleeves that holds the optical window. It is an objective of the present invention for the buffer plate assembly to hold and precisely separate and align two recessed spherical shell-like domed optical windows with two threaded cell-like sleeves. It is an objective of the present invention to provide a buffer plate assembly body that mounts two instrumentation package assembly elements which form a 3-D stereo camera pair. It is an objective of the current invention to provide a stable mounting means for the instrumentation package assembly inside the sports paraphernalia. It is an objective of the current invention to provide a means for the cameras inside the instrumentation package assembly to look out onto the playing field. It is an objective of the current invention to provide a means to prevent moisture and dirt from entering and interfering with the functions of the instrumentation package assembly. It is an objective of the current invention to provide a means to prevent damage to the instrumentation package assembly from debris.

It is an objective of the current invention to provide a means to isolate the instrumentation package assembly from the shock and vibration encountered in instrumented sports paraphernalia. It is an objective of the current invention to provide a straightforward means to permit damaged optical windows to be replaced easily. It is an objective of the present invention to provide optical windows suitable for less than extremely wide fields of view. It is an objective of the present invention to provide a buffer plate and an optical window which do not vignette extremely wide fields of view. It is an objective of the present invention to provide optical windows which do not produce optical aberrations for extremely wide fields of view. It is an objective of the present invention to capture pictures from instrumented sports paraphernalia that are formatted for viewing in 3-dimension by a viewing audience. It is an objective of the present invention to provide a straightforward means to enable the interchange of optical windows where the windows have different curvatures ranging from plane flat surfaces to shell-like-domed shaped concentric surfaces. It is an objective of the present invention to hold the interpupillary distance, of the optical and mechanical axis of each 3-dimension camera pair, to a value suitable for a 3-dimension format needed by a viewing audience, despite shocks and vibrations occurring during the game.

Figure 21W:
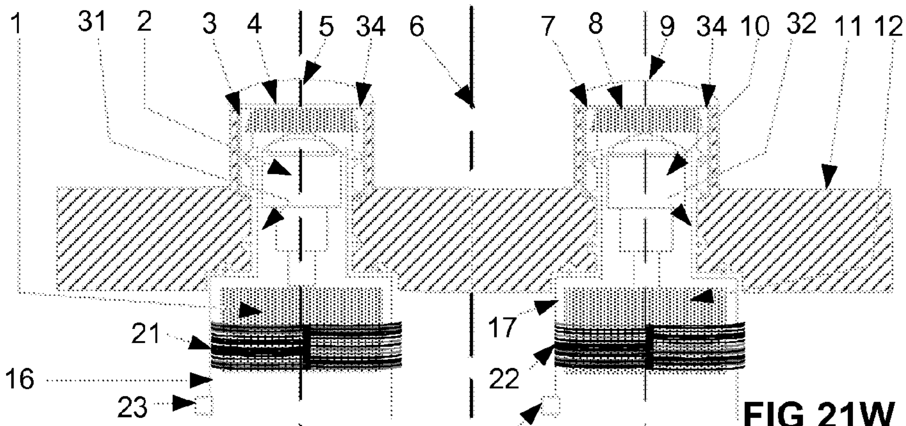
FIG. 21W shows a side view section of the Type X buffer plate and instrumentation package assembly.
Figure 21X:
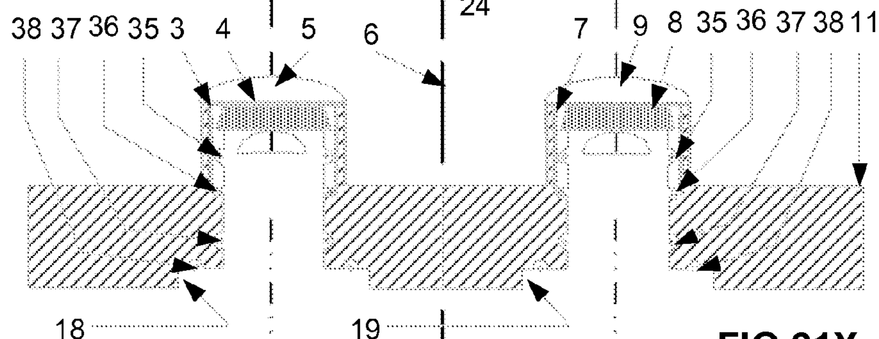
FIG. 21X shows a side view section of just the buffer plate alone.
Figure 21Y:
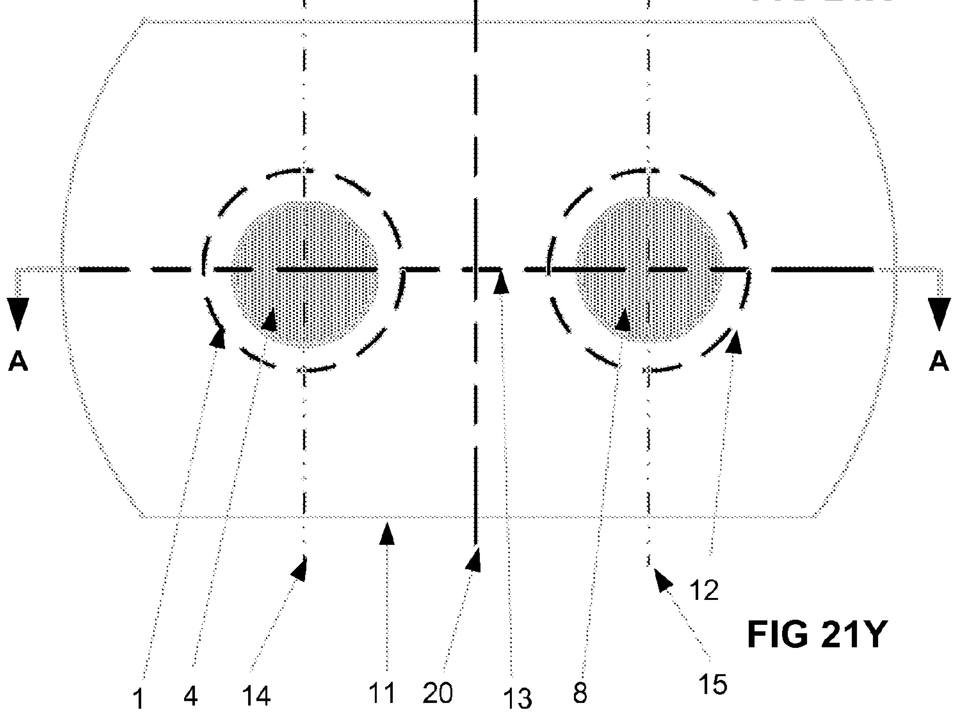
FIG. 21Y shows an end view of just the buffer plate alone.

FIG. 21W and FIG. 21X and FIG. 21Y

The detailed physical elements disclosed in the Type X buffer plate assembly drawings shown in FIG. 21W and FIG. 21X and FIG. 21Y are identified as follows: 1 is a camera. 2 is the camera lens. 3 is the small cylindrical outside diameter end of the buffer plate. 4 is the plane-parallel-flat optical window mounted on and sealed to the threaded cell-like sleeve. 5 is the optical and mechanical y-axis of the camera 1. 6 is the mechanical y-axis of symmetry of the Type X buffer plate. 7 is the small cylindrical outside diameter end of the buffer plate. 8 is plane-parallel-flat optical window mounted on and sealed to the small cylindrical diameter end of the buffer plate. 9 is the optical and mechanical y-axis of the camera 12. 10 is the camera lens. 11 is the body of the Type X buffer plate. 12 is a camera. 13 is the x-axis of symmetry of the buffer plate and camera 1 and camera 12. 14 is the z-axis of camera 1. 15 is the z-axis of camera 12. 16 is the cylindrical skin section of the instrumentation package assembly element's enclosure that houses camera 1. 17 is the cylindrical skin section of the instrumentation package assembly element's enclosure that houses camera 12. 18 is the inside diameter of the large bore in the buffer plate for instrumentation package assembly 16. 19 is the inside diameter of the large bore in the buffer plate for instrumentation package assembly 17. 20 is the z-axis of symmetry of the buffer plate 11. 21 is an induction coil, 22 is an induction coil. 23 is an electro-mechanical actuating mechanism. 24 is an electro-mechanical actuating mechanism. 25 is a bearing. 26 is an o-ring seal. 27 is a bearing. 28 is an o-ring seal. 29 is a bearing. 30 is an o-ring seal. 31 is a bearing. 32 is an o-ring seal. 33 is a threaded sleeve that holds the optical window. 34 is a threaded cell-like sleeve that holds the optical window.

FIG. 21W shows a side view section of the Type X buffer plate and instrumentation package assembly.

FIG. 21X shows a side view section of just the buffer plate alone.

FIG. 21Y shows an end view of just the buffer plate alone.

Referring to drawings FIG. 21W and FIG. 21X and FIG. 21Y, in a preferred embodiment, a Type X buffer plate assembly is disclosed. The buffer plate assembly is comprised of buffer plate 11, optical windows 4 and 8, and threaded cell-like sleeves 34 and 34. The bores in the body of the buffer plate assembly are precisely machined parallel to one another to align the instrumentation package assembly elements for 3-D. In some cases, the bores are machined with a small angle between them to accommodate 3-D imagery of closer objects.

A distinguishing feature of the present preferred embodiment is that the Type X buffer plate assembly body 11 mounts two instrumentation package assembly elements 16 and 17 which form a 3-D stereo camera pair. The buffer plate assembly body 11 has two flat optical windows mounted flush to its ends 3 and 7 in threaded cell-like sleeves 34.

The only difference between the Type X buffer plate and the Type IX buffer plate is that the Type X buffer plate employs a plane-parallel-flat optical window, whereas the Type IX buffer plate employs a shell-like domed shaped optical window.

Like the Type IX buffer plate, the present Type X buffer plate enables 3-dimensional pictures to be captured from instrumented sports paraphernalia, like for example instrumented baseball bases. Like the Type IX buffer plate, the Type X buffer plate enables two cameras to look out simultaneously at a common object on the baseball playing field, from the side of the instrumented baseball bases.

The present Type X buffer plate preferred embodiment enables 3-dimensional pictures to be captured from instrumented sports paraphernalia, like for example baseball bases. Each Type X buffer plate enables its two cameras to simultaneously look outward from each side of the instrumented baseball base onto the baseball playing field. Each buffer plate stereo camera pair produces a 3-dimensional picture format. There are four buffer plates per instrumented baseball base. Each buffer plate holds the optical axes of the two cameras that make up its stereo camera pair, parallel to one-another.

Each stereo camera pair looks out onto the baseball playing field from each side of the instrumented baseball base. The instrumented baseball bases are square. Therefore the horizontal angular line of sight of each of the adjacent camera pairs is displaced by 90 degrees relative to one another. For example, if each camera pair has a 90 degree angular field of view, then the set of four camera pairs would cover a full 360 degrees angular field of view around the instrumented baseball base. In other words, the four camera pairs would cover the entire baseball playing field in 3-dimension.

The preferred embodiment shown in FIG. 21W and FIG. 21X and FIG. 21Y shows two cameras 1 and 12 housed in their respective instrumentation package assemblies 16 and 17. The instrumentation package assemblies are mounted to the buffer plate 11. The buffer plate is constructed of plastic foams, polycarbonates, ABS or fiber reinforced plastics to keep it strong but lite weight.

Unlike the embodiments where the buffer plates are mounted inside a football whose handling is sensitive to weight, the weight of the buffer plate for the Type X embodiment is less restricted because the baseball base, where the buffer plate is used therein, is imobile and fixed to the ground.

The buffer plate embodiment shown in FIG. 21W and FIG. 21X and FIG. 21Y physically supports and separates the two instrumentation package assemblies elements which contain the two cameras that produce a conventional SD/HD image format which is suitable for producing 3-dimensional pictures of sports events to a viewing audience.

The linear distance separation of the optical axes of the two camera lenses that make up the stereo camera pair is an important function of the buffer plate. For the buffer plate, the distance measured between the axes is defined as the interpupilarly distance between the camera lenses.

We note here for reference that for modern commercial 3-dimensional cameras, the range of settings for the interpupillary distance is adjustable from 44 to 150 mm. Following the range of settings referenced for modern commercial 3-dimensional cameras, the size of the buffer plate interpupillary distance is made to accommodate an interpulilary distance range of 44 to 150 mm also. Therefore, the axial separation between each stereo pair of camera lenses can vary from 44 to 150 mm.

How far you are intending to view the pictures from requires a certain separation between the cameras. This separation is called stereo base or stereo base line and results from the ratio of the distance to the image to the distance between your eyes. The mean interpupillary distance (IPD) is 63 mm (about 2.5 inches) for humans, but varies with age, race and gender. The vast majority of adults have IPDs in the range 50-75 mm. Almost all adults are in the range 45-80 mm. The minimum IPD for children as young as five is around 40 mm.

The present invention captures pictures from instrumented sports paraphernalia that produce a 3-dimensional SD/HD image format for viewing by a TV audience. The buffer plate shown in FIG. 21W and FIG. 21X and FIG. 21Y provides the camera lenses 2 and 10 with a suitable interpupillary distance to enable the cameras 1 and 12 to capture pictures from the sports paraphernalia which can be used to generate a 3-dimensional SD/HD format for the TV viewing audience.

An advantage of the Type X buffer plate embodiment over the previous Type I, Type II, Type III, Type IV, Type V, Type VI, Type VII, and Type VIII embodiments is that the Type X buffer plate embodiment (like the Type IX embodiment) supports two instrumentation package assemblies with two cameras, separated by the proper interpupillary distance, and thereby enables two sets of pictures of the same object to be simultaneously captured from instrumented sports paraphernalia that the buffer plate is mounted therein, like for example an instrumented baseball base, to produce a 3-dimensional SD/HD composite picture format for viewing by an audience. The Type I, Type II, Type III, Type IV, Type V, Type VI, Type VII, and Type VIII embodiments only support one instrumentation package assembly with one camera and consequently cannot produce 3-dimensional picture formats.

Referring to the Preferred Embodiments Specified in Drawings FIG. 21W and FIG. 21X and FIG. 21Y, the Type X Buffer Plate Assembly Satisfies all of the Following Further Objectives:

It is an objective of the present invention to provide a buffer plate assembly composed of the rectangular arc Type X buffer plate body for two cameras, small cylindrical outside diameter end of the buffer plate, two flush plane-parallel-flat optical windows mounted on and sealed to the small cylindrical diameter end of the buffer plate, small cylindrical outside diameter end of the buffer plate, inside diameter of the large bore in the buffer plate, o-ring seals, threaded cell-like sleeve that holds the optical windows. It is an objective of the present invention for the buffer plate assembly to hold and precisely separate and align two flush plane-parallel-flat optical windows with two threaded cell-like sleeves. It is an objective of the present invention to provide a buffer plate assembly body that mounts two instrumentation package assembly elements which form a 3-D stereo camera pair.

It is an objective of the current invention to provide a stable mounting means for the instrumentation package assembly inside the sports paraphernalia. It is an objective of the current invention to provide a means for the cameras inside the instrumentation package assembly to look out onto the playing field. It is an objective of the current invention to provide a means to prevent moisture and dirt from entering and interfering with the functions of the instrumentation package assembly inside the sports paraphernalia. It is an objective of the current invention to provide a means to prevent damage to the instrumentation package assembly from debris entering the sports paraphernalia. It is an objective of the current invention to provide a means to isolate the instrumentation package assembly from the shock and vibration encountered by the sports paraphernalia. It is an objective of the current invention to provide a means to hold the buffer plate assembly solidly in place inside the sports paraphernalia. It is an objective of the current invention to provide a straightforward means to permit damaged optical windows to be replaced easily. It is an objective of the present invention to provide optical windows suitable for less than extremely wide fields of view. It is an objective of the present invention to provide optical windows which do not produce optical aberrations for extremely wide fields of view. It is an objective of the present invention to capture pictures from instrumented sports paraphernalia that are formatted for viewing in 3-dimension by a viewing audience. It is an objective of the present invention to provide a straightforward means to enable the interchange of optical windows where the windows have different curvatures ranging from plane flat surfaces to shell-like-domed shaped concentric surfaces. It is an objective of the present invention to hold the interpupillary distance, of the optical and mechanical axis of each 3-dimension camera pair, to a value suitable for a 3-dimension format needed by a viewing audience despite the shocks and vibrations encountered during the game.

Figure 21Z:
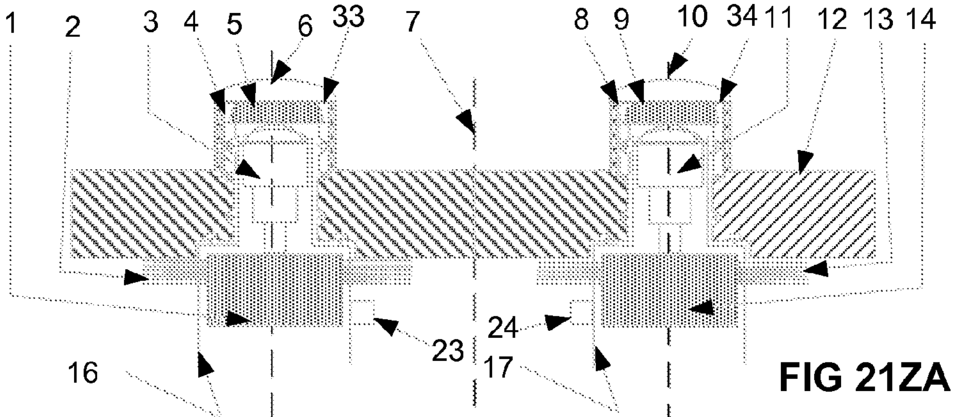
FIG. 21ZA shows a side view section of the Type XI buffer plate and instrumentation package assembly.
Figure 21Z:
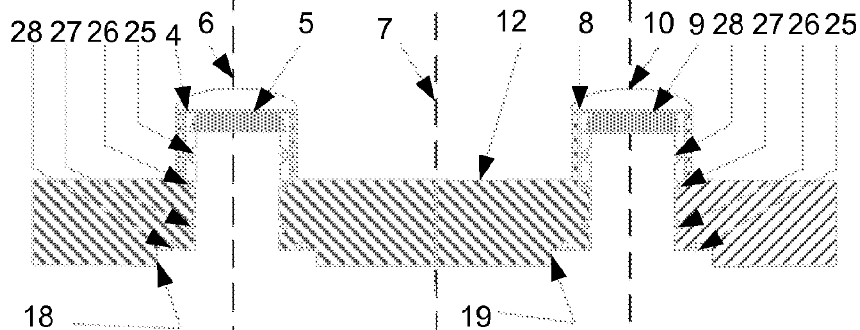
Figure 21Z:
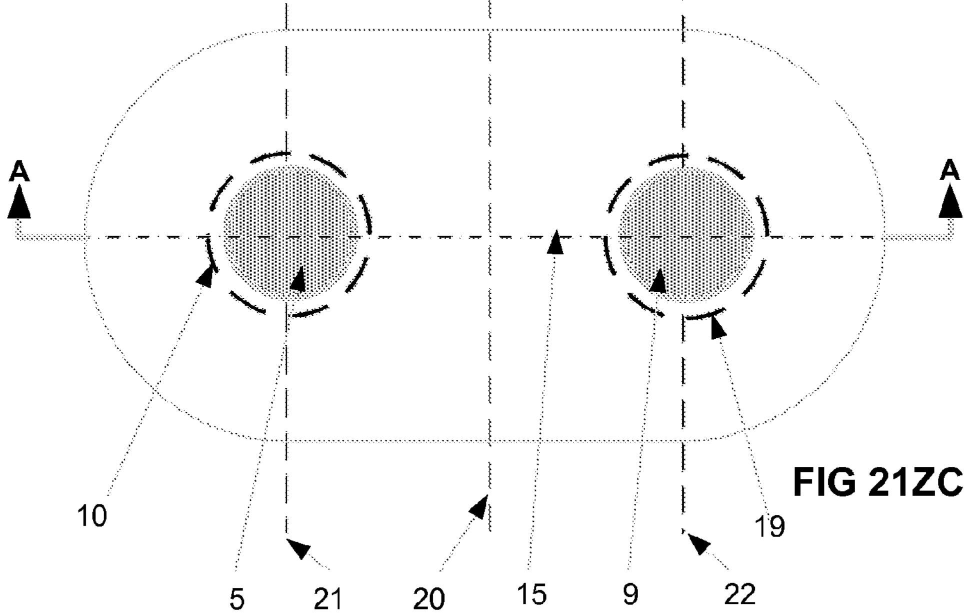

FIG. 21ZA and FIG. 21ZB and FIG. 21ZC

The detailed physical elements disclosed in the Type XI buffer plate assembly drawings shown in FIG. 21ZA and FIG. 21ZB and FIG. 21ZC are identified as follows: 1 is a camera. 2 is an induction coil for charging the battery pack. 3 is the camera lens. 4 is the small cylindrical outside diameter end of the buffer plate. 5 is the plane-parallel-flat optical window mounted on and sealed to the threaded cell-like sleeve. 6 is the optical and mechanical y-axis of the camera 1. 7 is the mechanical y-axis of symmetry of the Type XI buffer plate. 8 is the small cylindrical outside diameter end of the buffer plate. 9 is plane-parallel-flat optical window mounted on and sealed to the small cylindrical diameter end of the buffer plate. 10 is the optical and mechanical y-axis of the camera 12. 11 is the camera lens. 12 is the body of the Type XI buffer plate. 13 is an induction coil for charging the battery pack. 14 is a camera. 15 is the x-axis of symmetry of the buffer plate and the y-axis of camera 1 and camera 14. 16 is the cylindrical skin section of the instrumentation package assembly element's enclosure that houses camera 1. 17 is the cylindrical skin section of the instrumentation package assembly element's enclosure that houses camera 14. 18 is the inside diameter of the large bore in the buffer plate for instrumentation package assembly element 16. 19 is the inside diameter of the large bore in the buffer plate for instrumentation package assembly element 17. 20 is the z-axis of symmetry of the buffer plate 12. 21 is the z-axis of camera 1. 22 is the z-axis of camera 14. 23 is an electro-mechanical actuating device. 24 is an electro-mechanical actuating device. 25 is a bearing. 26 is an o-ring seal. 27 is a bearing. 28 is an o-ring seal. 29 is a bearing. 30 is an o-ring seal. 31 is a bearing. 32 is an o-ring seal. 33 is a threaded sleeve that holds the optical window. 34 is a threaded cell-like sleeve that holds the optical window.

FIG. 21ZA shows a side view section of the Type XI buffer plate and instrumentation package assembly.

FIG. 21ZB shows a side view section of just the buffer plate alone.

FIG. 21ZC shows an end view of just the buffer plate alone.

Referring to the drawings FIG. 21ZA and FIG. 21ZB and FIG. 21ZC, in a preferred embodiment, a Type XI buffer plate assembly is disclosed. The buffer plate assembly is comprised of buffer plate 12, optical windows 5 and 9, and threaded sleeves 33 and 34. The bores in the body of the buffer plate assembly are precisely machined parallel to one another to align the instrumentation package assembly elements for 3-D. In some cases, the bores are machined with a small angle between them to accommodate 3-D imagery of closer objects.

A distinguishing feature of the present preferred embodiment is that the Type XI buffer plate assembly body 12 mounts two instrumentation package assembly elements which form a 3-D stereo camera pair. The buffer plate assembly has two flat optical windows mounted flush to its end 4 in threaded cell-like sleeves.

Unlike the embodiments where the buffer plates are mounted inside an instrumented football whose handling is sensitive to weight, the weight of the buffer plate for the Type XI embodiment is less restricted because the instrumented baseball home plate where the buffer plate is used therein, is imobile and fixed to the ground.

Like the Type IX and Type X buffer plates, the Type XI buffer plate enables 3-dimensional pictures to be captured from instrumented sports paraphernalia, like for example instrumented baseball home plates. Like the Type X buffer plate, the Type XI buffer plate enables two cameras to look out simultaneously at a common object on the baseball playing field, from the top of the instrumented baseball home plate.

The buffer plate has bearings which permit the instrumentation package assembly elements to smoothly and precisely rotate about their mechanical axis respectively. The o-rings seal the instrumentation package assembly element enclosures from moisture and dirt from the baseball playing field environment.

Unlike its predecessors, the Type IX and Type X buffer plates that enable their 3-D stereo camera pairs to look out horizontally from the sides of the instrumented baseball bases, the Type XI buffer plate enables its 3-D stereo camera pair to look skyward from instrumented baseball home plates. From its vantage point at the instrumented baseball home plate, the 3-D stereo camera pairs (when using a 180 degree field angle fish eye lens) can simultaneously see the batter, the catcher, the pitcher, and the baseball being pitched.

The preferred embodiment shown in FIGS. 21ZA and 21ZB and 21ZC shows two cameras 1 and 14 housed in their respective instrumentation package assemblies 16 and 17. The instrumentation package assemblies are mounted to the buffer plate 12. The buffer plate is constructed of plastic foams, polycarbonates, ABS or fiber reinforced plastics to keep it strong but lite weight.

The Type XI buffer plate embodiment shown in FIGS. 21ZA and 21ZB and 21ZC physically supports and separates the two instrumentation package assemblies which contain the two cameras that each produce a conventional image format which taken as a pair is suitable for producing 3-dimensional pictures of sports events to a viewing audience.

The linear distance separation of the optical axes of the two camera lenses that make up the stereo camera pair is an important function of the buffer plate. For the buffer plate, the distance measured between the axes is defined as the interpupilarly distance between the camera lenses.

We note here for reference that for modern commercial 3-dimensional cameras, the range of settings for the interpupillary distance is adjustable from 44 to 150 mm. Following the range of settings referenced for modern commercial 3-dimensional cameras, the size of the buffer plate interpupillary distance is made to accommodate an interpulilary distance range of 44 to 150 mm also. Therefore, the axial separation between each stereo pair of camera lenses can vary from 44 to 150 mm.

How far you are intending to view the pictures from requires a certain separation between the cameras. This separation is called stereo base or stereo base line and results from the ratio of the distance to the image to the distance between your eyes. The mean interpupillary distance (IPD) is 63 mm (about 2.5 inches) for humans, but varies with age, race and gender. The vast majority of adults have IPDs in the range 50-75 mm. Almost all adults are in the range 45-80 mm. The minimum IPD for children as young as five is around 40 mm.

The present invention captures pictures from instrumented sports paraphernalia that produce a 3-dimensional image format for viewing by an audience. The buffer plate shown in FIG. 21ZA and FIG. 21ZB and FIG. 21ZC provides the camera lenses 3 and 11 with a suitable interpupillary distance to enable the cameras 1 and 14 to capture pictures from the sports paraphernalia which can be used to generate a 3-dimensional format for the TV viewing audience. The two cameras together make up a stereo camera pair. The buffer plate holds the optical axes of the two cameras parallel to one-another.

An advantage of the Type XI buffer plate embodiment over the previous Type I, Type II, Type III, Type IV, Type V, Type VI, Type VII, and Type VIII embodiments is that (like the Type X buffer plate embodiment) the Type XI buffer plate embodiment supports two instrumentation package assemblies with two cameras, separated by the proper interpupillary distance, and thereby enables two sets of pictures of the same object to be simultaneously captured from instrumented sports paraphernalia that the buffer plate is mounted therein, like for example an instrumented baseball home plate, produce a 3-dimensional composite SD/HD picture format for viewing by a TV audience. The Type I, Type II, Type III, Type IV, Type V, Type VI, Type VII, and Type VIII embodiments only support one instrumentation package assembly with one camera and consequently cannot produce 3-dimensional picture formats.

Referring to the Preferred Embodiments Specified in Drawings FIG. 21ZA and FIG. 21ZB and FIG. 21ZC, the Type XI Buffer Plate Assembly Satisfies all of the Following Further Objectives:

It is an objective of the present invention for the buffer plate assembly to be composed of the oval Type XI buffer plate assembly body for two cameras, small cylindrical outside diameter end of the buffer plate, two flush plane-parallel-flat optical windows mounted on and sealed to the small cylindrical diameter end of the buffer plate, small cylindrical outside diameter end of the buffer plate, inside diameter of the large bore in the buffer plate, o-ring seals, threaded cell-like sleeves that holds the optical windows. It is an objective of the present invention to provide a buffer plate assembly body that mounts two instrumentation package assembly elements which form a 3-D stereo camera pair. It is an objective of the present invention to provide a buffer plate assembly has two flat optical windows mounted flush to its ends. It is an objective of the present invention for the buffer plate assembly to hold and precisely separate and align two optical windows with two threaded cell-like sleeves. It is an objective of the present invention for the buffer plate assembly to enable 3-dimensional pictures to be captured from instrumented sports paraphernalia, like for example instrumented baseball home plates. It is an objective of the present invention for the buffer plate assembly to enable two cameras to look out simultaneously at a common object on the baseball playing field, from the top of the instrumented baseball home plate. It is an objective of the present invention for the buffer plate assembly to permit the instrumentation package assembly elements to smoothly and precisely rotate about their mechanical axis respectively. It is an objective of the present invention for the buffer plate assembly to seal the instrumentation package assembly element enclosures from moisture and dirt from the baseball playing field environment. It is an objective of the present invention for the buffer plate assembly to look skyward onto the playing field from instrumented baseball home plates. It is an objective of the present invention for the buffer plate assembly to physically support and separate the two instrumentation package assemblies by a precise interpulillary distance for producing 3-dimensional pictures of sports events to a viewing audience. It is an objective of the present invention for the buffer plate assembly to provide the camera lenses with a suitable interpupillary distance to enable the cameras to capture pictures from the sports paraphernalia which can be used to generate a 3-dimensional format for the TV viewing audience. It is an objective of the present invention for the buffer plate assembly to precisely align the instrumentation package assemblies and their cameras relative to one another.

FIG. 21ZZA and FIG. 21ZZB and FIG. 21ZZC

The detailed physical elements disclosed in the Type XII buffer plate assembly drawings shown in FIG. 21ZZA and FIG. 21ZZB and FIG. 21ZZC are identified as follows: 1 is a camera. 2 is a camera lens. 3 is the small cylindrical outside diameter end of the buffer plate. 4 is the plane-parallel-flat optical window mounted on and sealed to the small cylindrical diameter end of the buffer plate. 5 is the optical and mechanical y-axis of the camera 1. 6 is the mechanical y-axis of symmetry of the Type XI buffer plate. 7 is the small cylindrical outside diameter end of the buffer plate. 8 is plane-parallel-flat optical window mounted on and sealed to the small cylindrical diameter end of the buffer plate. 9 is the optical and mechanical y-axis of the camera 12. 10 is the camera lens. 11 is the body of the Type XI buffer plate. 12 is a camera. 13 (not shown). 14 (not shown), 15 is the z-axis of symmetry of the buffer plate. 16 is the cylindrical skin section of the instrumentation package assembly element that houses camera 1. 17 is the cylindrical skin section of the instrumentation package assembly element that houses camera 14. 18 is the inside diameter of the large bore in the buffer plate for instrumentation package assembly element 16. 19 is the inside diameter of the large bore in the buffer plate for instrumentation package assembly element 17. 20 is the flat optical window. 21 is the flat optical window. 22 is a camera. 23 is a camera. 24 is the z-axis of optical window 8 and camera 12. 25 is the z-axis of optical window 4 and camera 1. 26 is the x-axis of the buffer plate assembly 11. 27 is an induction coil for charging the battery pack. 28 is an induction coil for charging the battery pack. 29 is an electro-mechanical actuating mechanism. 30 is an electro-mechanical actuating mechanism. 31 is a bearing. 32 is an o-ring seal. 33 is a bearing. 34 is an o-ring seal. 35 is a bearing. 36 is an o-ring seal. 37 is a bearing. 38 is an o-ring seal. 39 is a threaded sleeve which holds the optical window 4. 40 is a threaded sleeve which holds the optical window 8.

FIG. 21ZZA shows a side view section of the Type XII buffer plate assembly and instrumentation package assembly.

FIG. 21ZZB shows a side view section of just the buffer plate assembly alone.

FIG. 21ZZC shows an end view of just the buffer plate assembly alone.

Referring to drawings FIG. 21ZZA and FIG. 21ZZB and FIG. 21ZZC, in a preferred embodiment, a Type XII buffer plate assembly is disclosed. The buffer plate assembly is comprised of buffer plate 11, optical windows 4, 8, 20 and 21, and threaded sleeves 39 and 40. The two remaining threaded sleeves that mount optical windows 20 and 21 are not shown. The bores in the body of the buffer plate assembly are precisely machined parallel to one another to align the instrumentation package assembly elements for 3-D. In some cases, the bores are machined with a small angle between them to accommodate 3-D imagery of closer objects.

A distinguishing feature of the present preferred embodiment is that the Type XII buffer plate assembly body 11 mounts four instrumentation package assembly elements which form two 3-D stereo camera pairs. The buffer plate assembly has four flat optical windows mounted flush to its ends in threaded cell-like sleeves.

The Type XII buffer plate enables two sets of 3-dimensional (3-D) pictures from two pairs of stereo 3-D cameras to be simultaneously captured from instrumented sports paraphernalia, like for example instrumented baseball home plates.

Like the Type XI buffer plate, the Type XII buffer plate 12 enables two sets of 3-D stereo camera pairs. For example, 1 and 12 constitute a 3-D stereo camera pair. For example, 22 and 23 constitute another 3-D stereo camera pair. Both 3-D stereo camera pairs look out, from the top of the instrumented baseball home plate simultaneously at a common object on the baseball playing field. Axes 5 and 9 are the optical/mechanical axes of the 3-D stereo camera pair 1 and 12 respectively. Axes 5 and 9 are mutually parallel to one another, and parallel to the mechanical axis 6 of the buffer plate 11. Unlike its predecessors the Type IX and Type X buffer plates that enable their 3-D stereo camera pairs to look out horizontally from the sides of the instrumented baseball bases, the Type XII buffer plate enables its two sets of 3-D stereo camera pairs to look skyward from the top of the instrumented baseball home plate.

From their vantage point inside the instrumented baseball home plate, the cameras 1, 8, 22 and 23 are all using identical 180 degree extremely wide field fish eye lenses (for example 2 and 10) to simultaneously see the batter, the catcher, the pitcher, and the baseball being pitched.

The buffer plate has bearings which permit the instrumentation package assembly elements to smoothly and precisely rotate about their mechanical axis respectively. The o-rings seal the instrumentation package assembly element enclosures from moisture and dirt from the baseball playing field environment.

The preferred embodiment shown in FIG. 21ZZA and FIG. 21ZZB and FIG. 21ZZC shows four cameras 1, 12, 22 and 23 housed in their respective instrumentation package assembly elements, 16 and 17 for example. There are four instrumentation package assembly elements mounted to the buffer plate 11. The buffer plate is a circular disc constructed of plastic foam, polycarbonates, ABS or fiber reinforced plastics. The buffer plate 11 serves to support and align the instrumentation package assembly elements to one another.

Unlike the embodiments where the buffer plates are mounted inside a football whose handling is sensitive to weight, the weight of the buffer plate for the Type XII embodiment is less restricted because the baseball home plate, where the buffer plate is used therein, is imobile and fixed to the ground.

The Type XII buffer plate 12 embodiment shown in FIGS. 21ZZA and 21ZZB and 21ZZC physically supports and separates the four instrumentation package assembly elements which contain the two 3-D stereo camera pairs that each produce the 3-D stereo pictures of sports events shown to the TV viewing audience.

The linear distance separation of the optical axes of the two camera lenses that make up the stereo camera pair is an important function of the buffer plate. For the buffer plate, the distance measured between the axes is defined as the interpupilarly distance between the camera lenses.

We note here for reference that for modern commercial 3-D cameras, the range of settings for the interpupillary distance is adjustable from 44 to 150 mm. Following the range of settings referenced for modern commercial 3-D cameras, the size of the buffer plate interpupillary distance is made to accommodate an interpulilary distance range of 44 to 150 mm also. Therefore, the axial separation between each of the cameas that comprise a 3-D stereo camera pair can vary from 44 to 150 mm.

How far you are intending to view the pictures from requires a certain separation between the cameras. This separation is called stereo base or stereo base line and results from the ratio of the distance to the image to the distance between your eyes. The mean interpupillary distance (IPD) is 63 mm (about 2.5 inches) for humans, but varies with age, race and gender. The vast majority of adults have IPDs in the range 50-75 mm. Almost all adults are in the range 45-80 mm.

The minimum IPD for children as young as five is around 40 mm. The present invention captures pictures from instrumented sports paraphernalia that simultaneously produce 3-dimensional image formats for the TV viewing audience. The buffer plate 12 shown in FIG. 21ZZA and FIG. 21ZZB and FIG. 21ZZC provides the camera lenses 3, 11 and 24, 25 with suitable interpupillary distances to enable the two camera pairs 1, 14 and 22, 23 to capture 3-D stereo pictures from the instrumented sports paraphernalia. The two cameras 1 and 14 together make up a 3-D stereo camera pair. The two cameras 22 and 23 together make up a 3-D stereo camera pair. The buffer plate 12 holds the optical axes 6, 10 and 30, 31 of the four cameras parallel to one-another. The buffer plate is constructed of plastic foams, polycarbonates, ABS or fiber reinforced plastics to keep it strong but lite weight.

An advantage of the Type XII buffer plate embodiment over the previous Type I, Type II, Type III, Type IV, Type V, Type VI, Type VII, Type VIII, Type IX, Type X, and Type XI embodiments is that the Type XII buffer plate 12 embodiment supports four instrumentation package assembly extensions with four cameras, separated by the proper interpupillary distance, and thereby enables two sets of 3-D stereo pictures of the same object to be simultaneously captured from the instrumented sports paraphernalia that the buffer plate is mounted therein, like for example an instrumented baseball home plate, to produce two 3-dimensional composite picture formats for viewing by a TV audience. The Type IX, Type X, and Type XI embodiments only support two instrumentation package assembly extensions each having only one camera, and consequently can produce only one 3-dimensional picture format to the TV viewing audience.

Referring to the Preferred Embodiments Specified in Drawings FIG. 21ZZA and FIG. 21ZZB and FIG. 21ZZC, the Type XII Buffer Plate Assembly Satisfies all of the Following Further Objectives:

It is an objective of the present invention for the buffer plate assembly to be composed of the circular body of the Type XII buffer plate for four cameras, small cylindrical outside diameter end of the buffer plate, four flush plane-parallel-flat optical windows mounted on and sealed to the small cylindrical diameter end of the buffer plate, inside diameter of the large bore in the buffer plate, o-ring seals, threaded sleeves which hold the optical windows. It is an objective of the present invention to provide a buffer plate assembly body that mounts four instrumentation package assembly elements which form two 3-D stereo camera pairs. It is an objective of the present invention to provide a buffer plate assembly has four flat optical windows mounted flush to its ends in threaded cell-like sleeves. It is an objective of the present invention for the buffer plate assembly to hold and precisely separate and align four optical windows with four threaded sleeves. It is an objective of the present invention for the buffer plate assembly to enable two sets of 3-dimensional (3-D) pictures from two pairs of stereo 3-D cameras to be simultaneously captured from instrumented sports paraphernalia, like for example instrumented baseball home plates. It is an objective of the present invention for the buffer plate assembly to enable both 3-D stereo camera pairs to look out, from the top of the instrumented baseball home plate simultaneously at a common object on the baseball playing field. It is an objective of the present invention for the buffer plate assembly to maintain the alignment of the optical/mechanical axes of the 3-D stereo camera pair respectively. It is an objective of the present invention for the buffer plate assembly to enable its two sets of 3-D stereo camera pairs to look skyward from the top of the instrumented baseball home plate. It is an objective of the present invention for the buffer plate assembly to enable the instrumentation package assembly to cameras using identical 180 degree extremely wide field fish eye lenses to simultaneously see the batter, the catcher, the pitcher, and the baseball being pitched. It is an objective of the present invention for the buffer plate assembly to permit the instrumentation package assembly elements to smoothly and precisely rotate about their mechanical axis respectively. It is an objective of the present invention for the buffer plate assembly to provide o-rings to seal the instrumentation package assembly element enclosures from moisture and dirt from the baseball playing field environment. It is an objective of the present invention for the buffer plate assembly to precisely hold and align the four cameras housed in their respective instrumentation package assembly elements relative to one another. It is an objective of the present invention for the buffer plate assembly to set the interpupilarly distance between the camera lenses. It is an objective of the present invention for the buffer plate assembly to enable the formation of six simultaneous 3-D stereo camera pairs.

Figure 22A:
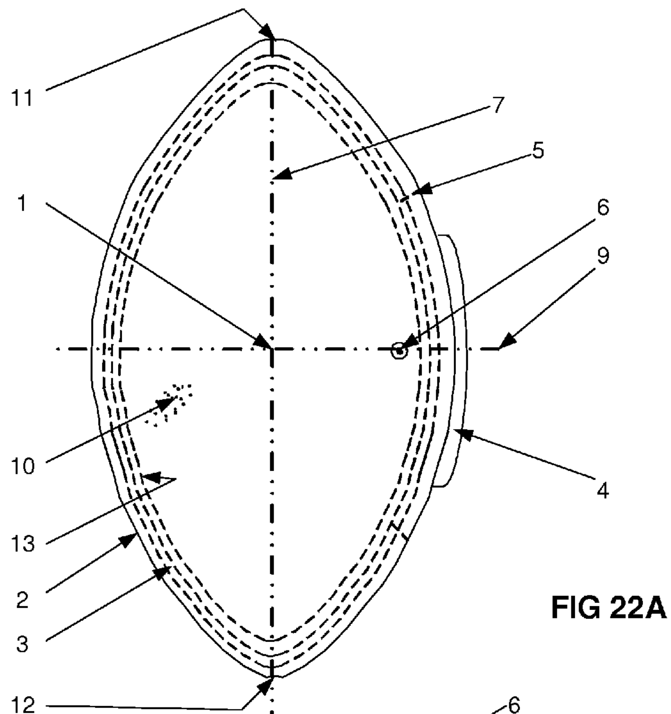
FIG. 22A shows the side view of a conventional professional league American football.
Figure 22B:
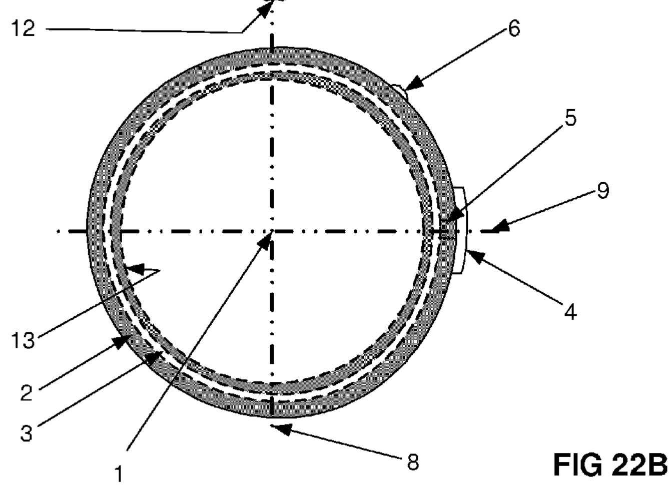
FIG. 22B shows the end view of a conventional professional league American football.

FIG. 22A and FIG. 22B

The detailed physical elements referenced in the prior art conventional professional league American football drawings shown in FIG. 22A and FIG. 22B are identified as follows: 1 is the origin (0,0,0) of the football's three axis coordinate system (x,y,z). 2 is football's cover. 3 is the football's liner. 4 are the laces. 5 is the gap in the cover along the top of the football between the adjacent top two cover panels. 6 is the gas valve through which pressurized gas is pumped into the pre-formed bladder to inflate it. 7 is the long axis or y-axis of the football. 8 is the z-axis. 9 is the x-axis. 10 is the air gas used to inflate the air-tight bladder. 11 and 12 are the optical windows. 13 is the pre-formed air-tight pre-formed bladder which props up the conventional football's cover. FIG. 22A and FIG. 22B is shown for reference purposes only FIG. 22A shows the side view of a conventional professional league American football.

FIG. 22B shows the end view of a conventional professional league American football.

Referring to drawings FIG. 22A and FIG. 22B, a sports ball such as a prior art conventional professional league American football is shown that has a conventional prolate spheroidal configuration more closely resembling a vesica piscis and comprises an inflated rubber bladder 13 enclosed in a leather cover 2 and a synthetic lining 3 of predetermined thickness and weight. The cover is normally formed of four leather panels (not shown) joined at longitudinal seams (not shown) along the top of the football. Each panel is attached to an interior lining 3. The lining 3 is synthetic and is sewn to each panel 2. The lining 3 is composed of three layers of cross-laid fabric firmly cemented together. The lining prevents the panel 2 from stretching or growing out of shape during use. The four panels are stitched together. Two of the panels are perforated along adjoining edges at the top of the football so that they can be laced together. The edges with the lacing holes, however, are not stitched together thereby forming a seam with an open gap 5. One of these lacing panels receives an additional perforation and reinforcements in its center, to hold the air inflation valve 6. Generally, the ball is about 11 inches long and about 22 inches in circumference at the center. The leather panels are usually tanned to a natural brown color. The mechanical centerline 7 of the football is defined herein as being parallel to and coincident with the longitudinal axis of symmetry of the football defined herein as the football's y-axis 7. The geometrical center of symmetry (0, 0, 0) is the origin of the (x, y, z) coordinate system of the conventional football, and lies at the intersection of the x-axis 9 and z-axis 8 with the y-axis 7.

Because the laces 4 and gas valve stem 6 add asymmetrical mass to the football, the center of gravity, also known as the center of mass of the football, is located on the x-axis 9 slightly closer to the laces 4 and valve 6.

The rubber bladder 13 is inserted into the conventional football through the seam gap 5. Polyvinyl chloride or leather laces 4 are inserted through the perforations around the seam gap 5 to provide a grip for holding, hiking and passing the football. The ball is laced and then inflated with air gas 10 to a pressure of not less than 12.5 lb per square inch, but no more than 13.5 lb per square inch. The bladder 13 has an air valve attached thereon whose valve stem 6 protrudes through a hole in the ball cover panel closest to the laces. The valve hole in the cover permits the entry of pressurized air gas through the valve stem 6 to inflate the bladder 13. The inflated bladder is disposed symmetrically within the ball cover and performs the function of propping up the ball cover after inflation by pressing on the interior walls of the cover's liner 3. The inflatable bladder 13 has a predetermined shape.

FIG. 23

The detailed physical elements disclosed in the instrumentation package assembly electronics signal and data circuitry drawing disclosed in FIG. 23 are identified as follows: 1 is a high definition SD/HD TV camera. 2 is a high definition SD/HD TV camera. 3 is MPEG compression hardware. 4 is MPEG compression hardware. 5 is a sound pickup microphone. 6 is a sound pickup microphone. 7 is an audio operational amplifier. 8 is an audio operational amplifier. 9 is an audio MPEG encoder. 10 is an audio MPEG Encoder. 11 is an MPEG stream encoder. 12 is a network transceiver. 13 is a microwave radio frequency antenna. 14 is a microwave radio frequency antenna. 15 is a CPU—microprocessor. 16 is a ROM—read only memory. 17 is a RAM—random access memory. 18 is a pitch gyroscopic encoder. 19 is a yaw gyroscopic encoder. 20 is a roll gyroscopic encoder. 21 is a master power on-off-standby power switching circuit. 22 is a power supply circuit regulator. 23 is a rechargeable battery pack. 24 is a 250 kHz tuning capacitor. 25 is a 250 kHz tuning capacitor. 26 is a data and power separator. 27 is an induction coil. 28 is an induction coil. 29 is the power and control interconnect interface.

FIG. 23 is a block diagram showing the circuitry, electronic signals and data flows in the instrumentation package assembly.

Referring to drawing FIG. 23, in a preferred embodiment, a block diagram showing the signals and data flows to and from the electronic components inside the instrumentation package assembly, which is mounted inside the instrumented football, is disclosed. Cameras 1 and 2 are identical Hi-Definition (SD/HD) 1080i CCD cameras, whose outputs are a broadcast grade HD-SDI format signal. These signals are fed to the inputs of compression hardware 3 and 4. Cameras 1 and 2 are also equipped with an auto-focus/iris feature set that may be over-ridden by commands from the system CPU 15. Cameras 1 and 2 are used during game play to photograph the action occurring around either end of the instrumented football that the instrumentation package assembly is contained within, and convey those photographs via network transceiver 12 and MPEG stream encoder 11 to the antenna array relay junction. The antenna array relay junction and the remote base station are specified in FIG. 62A and FIG. 62B and FIG. 62C and FIG. 62D and FIG. 62E. Compression hardware modules 3 and 4 are real time H.264 MPEG compression hardware modules. Hardware modules 3 and 4 compress the signals inputted to them from the cameras 1 and 2 into MPEG format using the H.264 Protocol and provide each captured image a separate stream via the encapsulation function of MPEG stream encoder 11. Compression is needed to reduce bandwidth requirements prior to transmission via radio using network transceiver 12 and microwave radio frequency antennas 13 and 14 respectively. Compression hardware modules 3 and 4, also receive commands from the CPU 15, which set the compression parameters associated with the H.264 protocol.

Alternatively, the aforementioned cameras 1 and 2 can contain part of or all the functions of compression hardware modules 3 and 4 as part of their own internal circuitry, thus saving some board space during manufacturing, in which case the additional control commands from CPU 15 would be sent to cameras 1 and 2 in-lieu of compression hardware modules 3 and 4.

Condenser microphones 5 and 6 are identical condenser microphones mounted inside the football near the vertices on each end. Microphones 5 and 6 capture the sounds around the football during game play and serve as the signal source for operational amplifiers 7 and 8. Operational amplifiers 7 and 8 are identical operational amplifiers configured as low noise high gain microphone pre-amplifiers. Operational amplifiers 7 and 8 amplify signals inputted from condenser microphones 5 and 6 and provide adequate voltage gain and equalization to drive the analog to digital converters inside MPEG Audio Encoder 9 and 10. MPEG Audio Encoder 9 and 10 further combines the two resultant elementary audio data packets into a single stream using the encapsulation function of MPEG stream encoder 11 prior to transmission to the remote base station by network transceiver 12.

Network Transceiver 12 is a complete microwave radio frequency network transceiver. This transceiver is inputted composite MPEG Stream image and audio data from 3, 4, 9 and 10 along with bi-directional system control status data packets to and from system control microprocessor 15. As an example in the present invention, Network transceiver 12 then transmits this data wirelessly using the 802.11(xx) protocol and intentional radiators 13 and 14 to the remote base station via the unlicensed 2.4 or 5.8 GHz radio spectrum. Network transceiver 12 also outputs control commands from the remote base station when they are received by items 13 and 14 using the 802.11(xx) protocol via the unlicensed 2.4 or 5.8 GHz radio spectrum. These control commands are inputted to system control microprocessor 15. System control microprocessor 15 is used to control the flow of system command functions. These command functions are used to adjust the operating parameters of the system based on instructions that it receives from the remote base station. Alternately, system command function instructions may be received by system control microprocessor 15 from battery charging and stand-by data separator circuit 26. This is needed to allow initialization of the instrumentation package assembly inside the football. System control microprocessor 15 utilizes an operating firmware stored at the time of manufacture on system ROM 16 and executes this firmware upon loading system RAM 17 with its contents.

In order to simplify the process of properly decoding and making upright for viewing the televised images captured by the football instrumentation package assembly, a dynamic means of determining the relative physical position of the football with respect to pitch, yaw and roll is provided by Real-time Gyroscopic encoders 18, 19, and 20 respectively. The resultant pitch, yaw and roll positional data from 18, 19 and 20 is sent to 15 and is subsequently transmitted along with the televised image data to the remote base station via 11 and 12 respectively.

Network transceiver 12 is used to provide a wireless RF link operating on the unlicensed 2.4 or 5.8 GHz radio spectrum between the instrumented football and the remote base station network transceiver, as an example utilizing the 802.11(xx) Protocol. Network transceiver 12 transmits and receives 802.11(xx) data packets to and from the remote base station. 12 also receives control commands from system control microprocessor 15. These control commands specify the exact RF channel frequency and RF channel power output that will be used during subsequent operation of the system. Signals traveling to and from 12 as RF signals are coupled to the atmosphere by an intentional radiators 13 and 14. Intentional radiators 13 and 14 comprise a phase array antenna system operating within the unlicensed 2.4 or 5.8 GHz radio spectrum. 13 and 14 together provide an isotropic gain of 3 db or better to reach the wireless network access point or base station network transceiver. The remote base station network transceiver is referred to in FIG. 25 which is the specification for the remote base station.

Intentional radiators 13 and 14 are used to capture and radiate the RF energy transmitted and/or received between the antenna array relay junction and the instrumented football. Intentional radiators 13 and 14 are physically located inside the instrumented football between cameras 1 and 2. Power supply 22 is a power supply that supplies power to all the elements shown in FIG. 23. Power supply 22 contains a rechargeable battery pack 23. 29 is the sound, imaging and communications interface electronics.

As an example, a lithium battery is used in the battery pack 23 because of its ability to be recharged and deliver the heavy current requirements expected during the length of time of a typical football game. The battery pack 23 delivers 3.3 volt dc to power supply 22. Power supply 22 supplies power to all the elements shown in FIG. 23. As the state of the art of battery technology changes, other batteries besides lithium batteries will become available. In the present invention, lightweight batteries are preferable to heavier ones.

FIG. 24 details the operation of the power supply and its associated electronics. FIG. 24 specifies the power supply electronics within the instrumentation package assembly in block diagram form. FIG. 24 specifies the detailed control data flow, failsafe mechanism, and battery pack charging circuitry, system status and administrative data management.

The power supply 22 contains a set of two inductive pickup coils 27 and 28 that are used to couple electrical energy from outside of the football to the battery pack 23 during the recharging of the battery pack via battery charging and stand-by data separator circuit 26. 27 and 28 are tuned by capacitors 24 and 25 so as to resonate at a frequency near 250 KHZ. Power supply 22 contains a switching circuit 21 that receives control commands from system control microprocessor 15. These commands instruct and enable power supply 22 to supply power to the rest of the system 29. These commands take power supply 22 out of the stand-by mode and put it in the power-on mode.

Figure 28A:
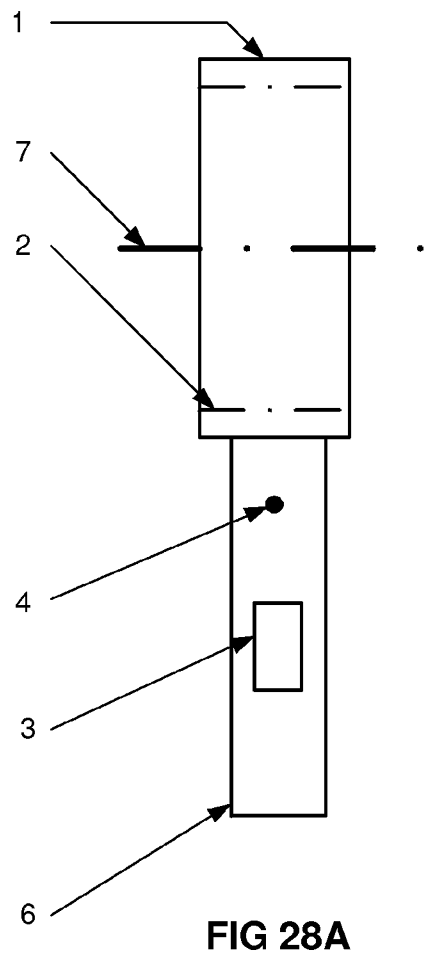
FIG. 28A shows a side view a hand-held remote control unit.
Figure 28B:
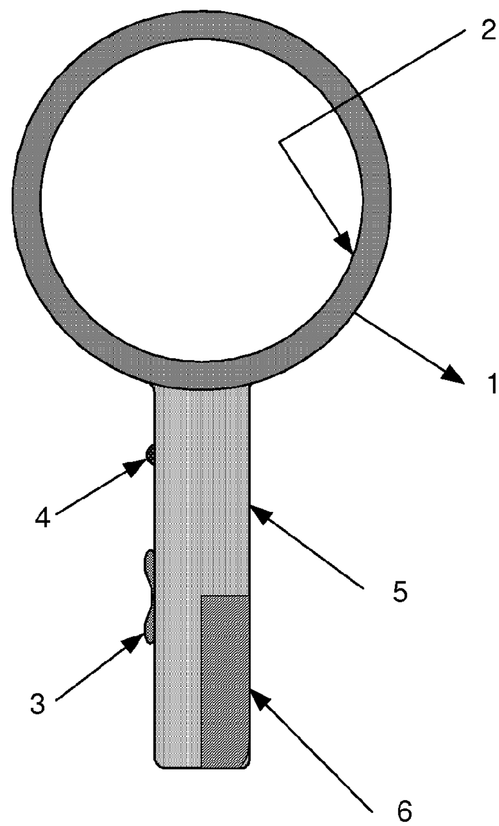
FIG. 28B shows a top view of a hand-held remote control unit.
Figure 29:
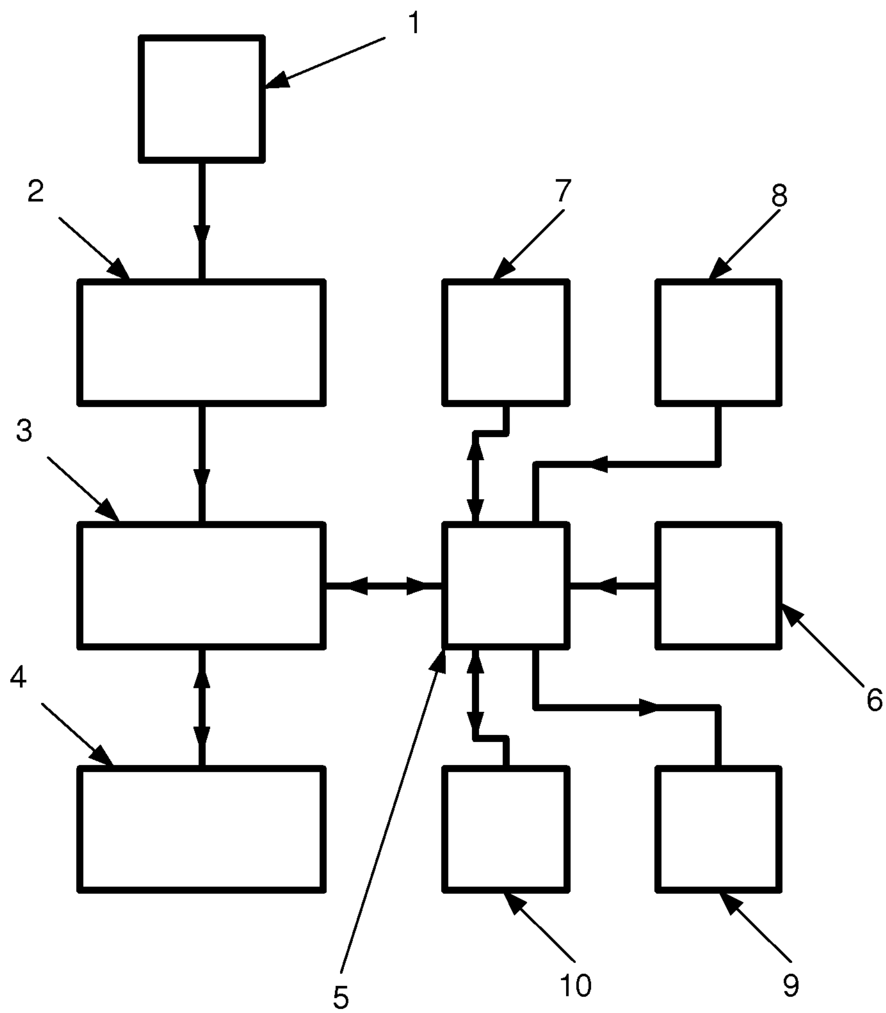
FIG. 29 is a block diagram showing the signal and data flow circuits inside the hand-held remote control unit in FIG. 28A and FIG. 28B.
Figure 30:
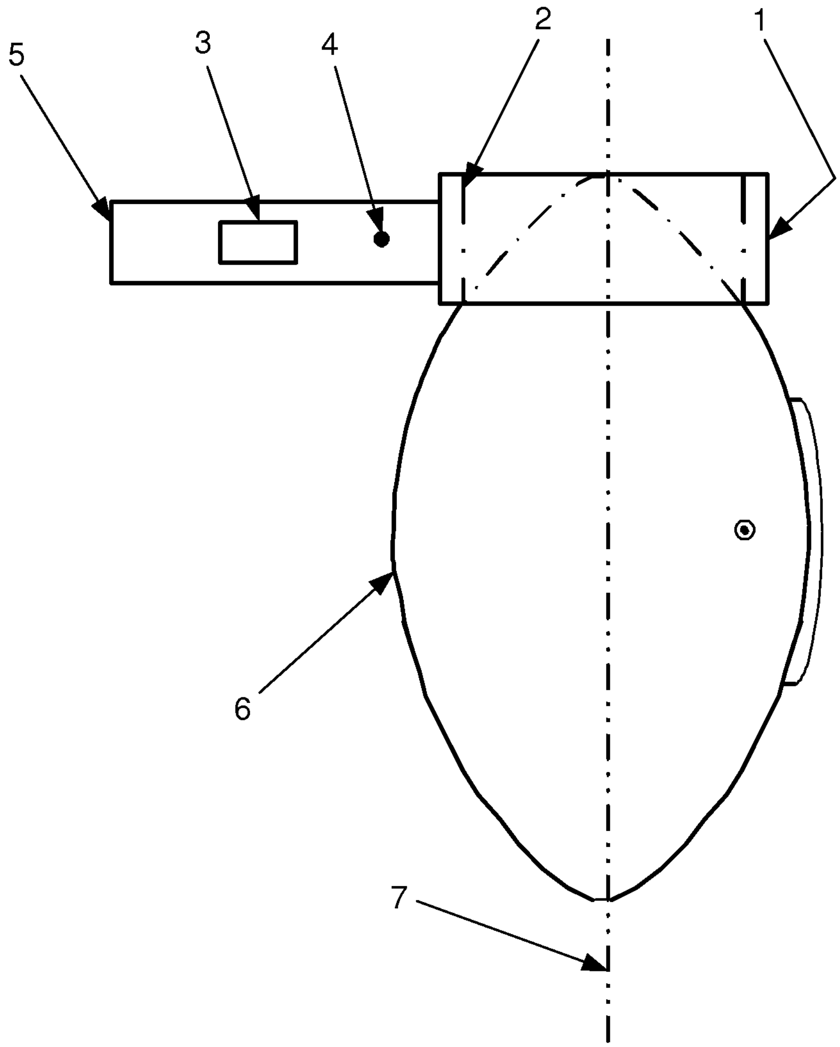
FIG. 30 is a side view of the hand-held remote control unit and the instrumented football.

A coded RF hand-held remote is disclosed in FIG. 28 and FIG. 29 and FIG. 30. The coded RF hand-held remote is used to initialize the electronics inside the instrumented football by taking the football electronics out of the standby-power mode and placing it in the power-on mode.

The battery pack charging station unit used to charge the battery pack contained in the instrumented football's instrumentation package assembly is disclosed in FIG. 31. The electronic circuitry disclosed in the battery pack charging station unit is specified in block diagram form in FIG. 32.

In FIG. 23 a self contained three-dimensional gyroscopic transducer comprised of three separate individual low power semiconductor based encoders 18, 19 and 20 is shown. Each of these three encoders is configured at the time of manufacture to respond to a pre-determined action of motion specific to the direction of rotation, forward or backward motion and rise or fall conditions of the instrumented football in real-time. The football's pitch, roll and yaw are encoded. Roll is associated with the spin of the ball about its y-axis as it is thrown above the field during game play. Each encoder provides a pulse coded binary data output that varies in accordance with the relative direction and rate of movement of the instrumented football. For example, during a typical football game the football will be thrown by a player causing the football to suddenly accelerate in a horizontal direction towards the goal post. The amplitude of this acceleration is perceived by the horizontal motion encoder and its resultant pulse coded data output is fed to an interrupt request port of microprocessor 15. The connection between 18, 19, 20 and 15 is such that each of the encoders will accurately convey information about the multiple possibilities of physical motions of the instrumented football during a typical game, as previously described above, to 15 for further transmission to the remote base station via the administrative data link established by components 12,13,14 and 15 respectively. At the time of boot-up, microprocessor 15 is instructed by the firmware contents contained within read only memory 16 to continually execute a routine check of the data presented to its interrupt ports at a sampling rate sufficiently high enough so as to accurately convey the resultant pulse coded data output that represents the direction of rotation, forward or backward motion and rise or fall conditions of the instrumented football in real-time to a computer at the remote base station for use by special software.

When the instrumented football is first initialized prior to use from an idle position, normally by a command sent over the administrative data link from the remote base station, microprocessor 15 according to its firmware instructions contained within read only memory 16 initializes the gyroscopic encoders in a zero motion state so that the remote base station's computer is able to synchronize the previously mentioned special software.

During a typical football game this computer simultaneously receives the image data streams transmitted by the instrumented football and automatically, using the previously mentioned special software, continuously calculates and applies to the received image data stream temporarily stored in memory the correct amount of counter adjustment necessary to hold the images in an upright stable unscrambled position when viewed on a hi definition display or monitor by the TV audience. The cameraman operating the remote base station computer also has the ability to manually issue commands that affect the amount of correction applied to the final image stream. Such commands are very useful in conjunction with other special effects often used during a televised football game.

The administrative data link referenced in FIG. 23 is a Bi-directional communications path over which control commands, as well as status data between the instrumented sports paraphernalia and the remote base station are conveyed. These commands and/or status data consist of data packets or streams that are independent in function of those that are used to convey image and/or sound information to the remote base station but share the same communications transport mechanism overall This communications transport mechanism is formed whenever the microprocessor within the instrumented sports paraphernalia communicates with the remote base station over the particular mode of communications connectivity that the stadium has been equipped for i.e. fiber optics, copper cable or wireless radio.

This microprocessor is connected via an I/O port to the network transceiver within the instrumented sports paraphernalia and periodically monitors this port for activity. When a data stream arrives at this port from the remote base station, the microprocessor executes a series of instructions contained in ROM in such a way that it will respond and act only on those commands that are correctly identified based on a unique identification integer code present in the signal that immediately precedes the control data stream contents. If the stream is identified as valid the microprocessor will execute the received command as determined by the firmware stored in ROM and transmit a status data acknowledgement to the remote base station.

Status data received by the remote base station transceiver is handled in a manner similar to that of the instrumented sports paraphernalia as previously described. When the remote base station transceiver intercepts an appropriately coded transmission over the particular mode of communications connectivity that the stadium has been equipped for i.e. fiber optics, copper cable or wireless radio, it will respond and act on it in the manner determined by the communications handling provisions of the special software running on the associated computer at the remote base station. The cameraman, in the remote base station, software selects the wireless mode of communication between the instrumented football and the remote base station. The cameraman uses the equipment (antenna array relay junction) that is installed in the football stadium with which to command and control his choice and communicate it to the instrumented football on the football stadium playing field. Refer to FIG. 62A, and FIG. 62B, and FIG. 62C, and FIG. 62D, and FIG. 62E, and FIG. 64A and FIG. 64C for disclosures regarding the remote base station and the antenna array relay junction.

The cameraman, selects items from a software menu of control commands that go to the network transceiver at the remote base station that are subsequently transmitted to the instrumented football for the purpose of adjusting various system initializations, operating parameters, radio frequency, polling system status data such as battery condition, and initiating remote mechanical adjustments such as camera focus, optical zoom, iris and movement to the cameras' field of view, etc over the selected bi-directional communications link i e wireless radio connectivity being used within the particular sports stadium.

These commands, when intercepted by the network transceiver 12 within the instrumented football are applied to its microprocessor 15, which then in turn upon executing the instructions stored within the contents of its firmware 16 applies a pulse coded control signal via the power and control interconnect interface 29 inside the instrumentation package to the corresponding electronics i.e. the mechanical actuators that provides optical focus and/or zoom adjustment of the cameras and microphone gain and selection, etc as desired by the cameraman and/or special software running on the computer at the remote base station. The power and control interconnect interface 29 as shown in FIG. 23, which is represented by dotted lines, consists of the electrical control wiring to and from the electronic components of the instrumented football that are being controlled.

Referring to the Preferred Embodiment Specified in FIG. 23, the Instrumentation Package Assembly Electronics Signal and Data Circuitry Satisfies all of the Following Further Objectives:

It is the an objective of the present invention to provide an instrumentation package assembly electronics circuitry comprised of two high definition SD/HD TV cameras, two MPEG compression hardware's, two sound pickup microphones, two audio operational amplifiers, two audio MPEG encoders, network transceiver, MPEG stream encoder, two microwave radio frequency antennas, CPU—microprocessor, ROM—read only memory, RAM—random access memory, pitch-yaw and roll gyroscopic encoders, master power on-off-standby power switching circuit, power supply circuit regulator, rechargeable battery pack, two 250 kHz tuning capacitors, data and power separator, two induction coils, and power and control interconnect interface. It is the an objective of the present invention to provide an instrumentation package assembly with onboard electronics contained within it to transmit TV pictures and sounds via its two radio antennas to a remote base station via an antenna array relay junction. It is an objective of the present invention to control the TV cameras and lenses from the remote base station. It is an objective of the present invention to control the power from the battery pack to the electronics. It is an objective of the present invention to stabilize the TV pictures using gyroscopic control. It is an objective of the present invention to control the charging of the battery pack. It is an objective of the present invention to monitor the battery pack charge status from the remote base station. It is the an objective of the present invention to provide an instrumentation package assembly with onboard electronics contained within it to produce outputs of a broadcast grade HD-SDI format signal. It is an objective of the present invention to provide an instrumentation package assembly with onboard electronics contained within it to compress the signals inputted to them from the cameras into a MPEG format using the H.264 Protocol and provide each an elementary MPEG stream. It is the an objective of the present invention to provide an instrumentation package assembly with onboard electronics contained within it to receive commands from the CPU in the remote base station, which sets the compression parameters associated with the H.264 protocol. It is the an objective of the present invention to provide an instrumentation package assembly with onboard electronics contained within it to contain part of or all the functions of compression hardware modules as part of the cameras own internal circuitry. It is the an objective of the present invention to provide an instrumentation package assembly with condenser microphones mounted inside the football near the vertices on each end. It is the an objective of the present invention to provide an instrumentation package assembly with onboard electronics contained within it to capture the sounds around the football during game play and serve as the signal source for operational amplifiers. It is the an objective of the present invention to provide an instrumentation package assembly with onboard electronics contained within it to combine the two resultant elementary audio data packets into a single stream prior to transmission to the remote base station. It is the an objective of the present invention to provide an instrumentation package assembly with onboard electronics contained within it to receive system command function instructions from the system control microprocessor. It is the an objective of the present invention to provide an instrumentation package assembly with onboard electronics contained within it to provide a dynamic means of determining the relative physical position of the football with respect to pitch, yaw and roll. It is the an objective of the present invention to provide an instrumentation package assembly with onboard electronics contained within it to provide pitch, yaw and roll positional data to be transmitted along with the televised image data to the remote base station. It is the an objective of the present invention to provide an instrumentation package assembly with onboard electronics contained within it to provide a network transceiver to wirelessly link the instrumented football by use of the 2.4 or 5.8 GHz radio spectrum, between the instrumented football and the remote base station, utilizing for example the 802.11(xx) Protocol. It is the an objective of the present invention to provide an instrumentation package assembly with onboard electronics contained within it to transmit and receive 802.11(xx) system control command packets for example, to and from the network transceiver. It is the an objective of the present invention to provide an instrumentation package assembly with a network transceiver within it to transmit and receive control commands to and from the system control microprocessor. It is the an objective of the present invention to provide an instrumentation package assembly where control commands specify the exact RF channel frequency and RF channel power output that will be used during subsequent operation of the system. It is the an objective of the present invention to provide an instrumentation package assembly with phase array antennas to couple RF signals to the atmosphere within the unlicensed 2.4 or 5.8 GHz radio spectrum. It is the an objective of the present invention to provide an instrumentation package assembly with antennas yielding an isotropic gain of 3 db or better to reach the remote base station network transceiver via the antenna array relay junction in the sports stadium. It is the an objective of the present invention to provide an instrumentation package assembly with two antennas physically located inside the instrumented football between the two cameras It is the an objective of the present invention to provide an instrumentation package assembly with power supply electronics that supplies power to all the elements shown in FIG. 23. It is the an objective of the present invention to provide an instrumentation package assembly with a set of two wireless inductive pickup coils that are used to couple electrical energy from outside of the football to the rechargeable battery pack. It is the an objective of the present invention to provide an instrumentation package assembly with a battery charging and stand-by data separator circuit tuned by capacitors to resonate at a frequency near 250 KHZ. It is the an objective of the present invention to provide an instrumentation package assembly with a power supply that contains a switching circuit that receives control commands from system control microprocessor which instructs and enables the power supply to supply power to the rest of the system. It is the an objective of the present invention to provide a coded RF hand-held remote to initialize the electronics inside the instrumented football by taking the football electronics out of the standby-power mode and placing it in the power-on mode. It is the an objective of the present invention to provide an instrumentation package assembly with a self contained three-dimensional gyroscopic transducer comprised of three separate individual low power semiconductor based encoders which are configured at the time of manufacture to respond to a pre-determined action of motion specific to the direction of pitch, roll and yaw rotation, forward or backward motion and rise or fall conditions of the instrumented football in real-time.

FIG. 24

The detailed physical elements disclosed in the instrumentation package assembly electronics signal and data circuitry drawing disclosed in FIG. 24 are identified as follows: 1 is an induction coil—250 KHz. 2 is an induction Coil—250 KHz. 3 is a rectifier/250 KHz matching diverter network/high-voltage failsafe. 4 is a battery charging circuit/power control. 5 is a 250 KHz data transceiver. 6 is a D/C power bus interconnects. 7 is a rechargeable lithium ion battery pack. 8 is a main power regulator. 9 is a power supply switch. 10 is a power control data bus line. 11 is a CPU. 12 is a ROM. 13 is a data bus line. 14 is a power control data bus line. 15 is a switched power bus. 16 is an instrumentation package assembly control data bus line. 17 is an instrumentation package assembly—i.e.: cameras, sound, mechanical actuators, etc.

FIG. 24 is a block diagram showing the signals and data flows in the power supply and battery charging circuits inside the instrumentation package assembly.

Referring to drawing FIG. 24, in a preferred embodiment, a block diagram showing the signals and data flows, to and from the electronic components of the power supply and battery charging circuits inside the instrumentation package assembly which is mounted inside the instrumented football, is disclosed.

The administrative data link is a Bi-directional communications path over which control commands, as well as status data between the instrumented sports paraphernalia and the remote base station are conveyed. These commands and/or status data consist of data packets or streams that are independent in function of those that are used to convey image and/or sound information to the remote base station but share the same communications transport mechanism overall This communications transport mechanism is formed whenever the microprocessor within the instrumented sports paraphernalia communicates with the remote base station over the particular mode of communications connectivity that the stadium has been equipped for i.e. fiber optics, copper cable or wireless radio.

This microprocessor is connected via an I/O port to the network transceiver within the instrumented sports paraphernalia and periodically monitors this port for activity.

When a data stream arrives at this port from the remote base station, the microprocessor executes a series of instructions contained in ROM in such a way that it will respond and act only on those commands that are correctly identified based on a unique identification integer code present in the signal that immediately precedes the control data stream contents. If the stream is identified as valid the microprocessor will execute the received command as determined by the firmware stored in ROM and transmit a status data acknowledgement to the remote base station Status data received by the remote base station transceiver is handled in a manner similar to that of the instrumented sports paraphernalia as previously described.

When the remote base station transceiver intercepts an appropriately coded transmission over the particular mode of communications connectivity that the stadium has been equipped for i.e. fiber optics, copper cable or wireless radio, it will respond and act on it in the manner determined by the communications handling provisions of the special software running on the associated computer at the remote base station.

FIG. 24 shows a set of identical light-weight air core induction coils 1 and 2 located onboard the football's instrumentation package assembly near each end respectively. 1 and 2 are wound of only a few turns of a relatively small gauge magnet wire with sufficient capacity to handle the required current to recharge the batteries onboard the football instrumentation package assembly with minimal temperature rise.

Impedance matching diverter 3 is connected to 1 and 2 forming a parallel resonant tank circuit tuned to approximately 250 kHz. When a football containing the football instrumentation package assembly is properly placed in the recharging station such that coils 1 and 2 are subject to the intense magnetic flux created by the coils within the recharging station, 3 will supply magnetically coupled electrical power from the recharging station via 1 and 2 to battery charging circuit 4. In addition, 3 also conveys a packet of administrative and control data signals between the recharging station, via 1 and 2, and data transceiver 5. Furthermore, 3 includes a high-stability fail-safe protection circuit which prevents 5 from being catastrophically destroyed by the high voltage present across 1 and 2 that is necessary during a typical recharging cycle.

In the event that the voltage level appearing at battery bus line 6 has fallen below the charging set-point threshold of 4, charging of rechargeable battery 7 will begin to commence automatically as charging current is applied to 7 via 4 and 6 whilst the football containing the football instrumentation package assembly is properly placed in the cradle of an active recharging station.

As the back voltage detected by 4 appearing at 7 rises abruptly above a set-point threshold of 4, charging current is automatically reduced to prevent over-charging of the batteries, this also protects the remainder of the football camera system 17 from damage due to over heating while its batteries are in the charging station.

Throughout a recharging cycle, main power supply 8, microprocessor 11 and 5 also receive dc power from 4 via 6 so as to avoid any unnecessary battery consumption until charging is complete.

Whenever dc power is supplied to 8 via 6, power to the remaining hardware 17 will remain in an off-state until a turn-on command is received by main power supply switch 9 from 11 via main power control data bus line 10. This will in turn cause 8 to energize switched power bus 15 and begin supplying regulated D/C power to the rest of the instrumentation package assembly 17. 8 will continue to supply such power until 8 receives a shutdown command from 11 via 10 or a failure of 7 occurs. As long as 8 is keeping 15 active 11 may issue commands to 17 via bi-directional instrumentation package assembly control data bus line 16. 16 is also used to collect status information about 17 including modes of failures which may occur throughout the use of the instrumentation package assembly. These failures in turn cause software parameters of 11 stored within 12 to be executed by 11 and communicate these fault indications back to the base station. Such indications are intended to alert personnel of the fault condition which might otherwise result in an embarrassment to personnel i.e.: an aging battery in need of recharging or a damaged camera.

Each football instrumentation package assembly is equipped with a unique identification code and operating firmware embedded in the read only memory 12 areas of 11. As soon as power to 11 via 6 becomes available initialization of 11 is commenced loading this id code and operating firmware into 11 via 12. Once this initialization of 11 is complete, synchronization of 5 with the recharging station's onboard data transceiver begins, via data transceiver bus line 13, thereby establishing an administrative and control data link between 11 and the recharging station's human interface panel via 1, 2, 3, 5 and 13 respectively.

The overall rate and length of time at which 4 will continue to supply charging current and hence recharge the batteries within the football camera instrumentation package assembly is dependent on the specific rating and initial condition of the battery, and the entries made in the user adjustable settings menu of the recharging station's human interface panel based on the operating parameters contained in 12 transferred to the microprocessor onboard the recharging station during synchronization of 5 as previously described.

As soon as a typical charging cycle is commenced, continuous fail-safe monitoring data of the charging current and voltage supplied by 4 is sent to 11 via Power control data bus line 14. If at any time a problem develops during a charging cycle that could result in catastrophic destruction of the football instrumentation package assembly, batteries and/or the recharging station, a total system shutdown sequence is initiated and personnel advisory warning displayed on the recharging station's human interface panel, thereby removing power and safeguarding the hardware as described.

While a football equipped with the football instrumentation package assembly is properly placed in the recharging station a series of self diagnostic and power consumption tests may be performed on 17. The results of which are forwarded to the human interface panel of the recharging station via 1, 2, 5, 11 and 12 respectively and are useful to personnel in evaluating the football camera instrumentation packages overall condition prior to its use in a game.

Since a typical football team may wish to use a finite number of n footballs equipped with the football instrumentation package assembly, a means of cataloging and archiving the charge, recharge, usage, power consumption and diagnostic testing cycles associated with each is provided by 11 via 12. This information is available to personnel via the human interface panel on the recharging station upon command from personnel and furthermore may be stored by a personal computer connected to the data logging port of the recharging station charging the football(s) concerned. As previously described, each football instrumentation package assembly contains a unique identification number; therefore the bookkeeping for each football involved is independent respectively.

After 7 has assumed a full and complete charge, the football instrumentation package assembly is placed into a powered-off state and except for a very small stand-by current through 5 and 11, battery consumption is minimized until future use is desired.

Prior to using the football instrumentation package assembly in a game 8 must be activated in order to supply dc power to 17. Upon receiving a power-on command from 11 via 10, 9 will take 8 out of the power-off state thus allowing 8 to supply dc power to 17.

Invocation of the power-on command by 11 may be accomplished by either of two methods: Firstly, if the football concerned is properly placed in the recharging station's cradle its human interface panel may be used to invoke a power-on command sequence to 11 via 1, 2, 5 and 13 respectively. Secondly, the football camera system's hand-held remote control device may be placed near either end of the football concerned to invoke this command to 11 via 1, 2, 5 and 13 if desired.

Activation of 8 by either method places the entire football instrumentation package assembly into a fully powered-on state and may then be synchronized with the base station hardware, tested and subsequently utilized in a football game.

While the football instrumentation package assembly is in a fully powered on state and not placed in the recharging station i.e. it is being used in a real football game, administrative data, Identification code and control signals along with photographic image and sound accompaniment will be transmitted and available to the base station hardware.

If throughout a game, a low battery condition, power supply or any other technical fault develops, 8 via 14 will cause 11 to transmit an appropriate warning message to the base station's human interface display via the 802.11(x) transceiver in 17.

False signaling and invocation of the football instrumentation package assembly by other nearby potential sources of interference is avoided by the decoding algorithm stored in 12 and used by 11 when communicating critical information over either of the two distinct administrative and control data link techniques utilized by the football instrumentation package assembly.

Until 7 falls to a low level set-point threshold within 8, The football instrumentation package assembly will remain in a fully powered-on state unless 8 is de-activated via 9 after a shutdown sequence is issued by a power-off command from 11.

To preserve the life of 7, upon completion of its use, i.e. at the end of a game, the football instrumentation package assembly should be placed into a powered-off state by causing 11 via 10 to issue a power-off signal to 8 via 9.

This may be accomplished in one of several methods: Firstly using the human interface hardware, display and software at the base station, personnel may transmit and invoke a power-off command to 11 via the 802.11(x) administrative and control data link of 17 via 14. Secondly, the personnel at the side lines of a typical football game may wish to conclude the operation of the instrumented football's instrumentation package assembly by conveniently placing its handheld remote control near either end of the football and depressing the power-off key on the human interface panel of said remote control invoking a power-off command to 11 via 1, 2, 3, 5 and 13 respectively.

Finally, personnel may place the football into the cradle of the recharging station. As described previously, whenever a football is properly placed into the cradle of an active recharging station the football instrumentation package assembly is automatically put into a powered-off state unless otherwise instructed by personnel using the human interface panel of the recharging station concerned whenever 5 is synchronized with the recharging station via 1, 2 and 3.

Confirmation in any of the methods just described that the football instrumentation package assembly has indeed been placed into a powered-off state is assured to personnel by both visual and audible indication from the human interface concerned when 11 via 1, 2, 3, 5 and 13 acknowledges receipt and execution of the power-off invocation.

FIG. 25A

Figure 25A:
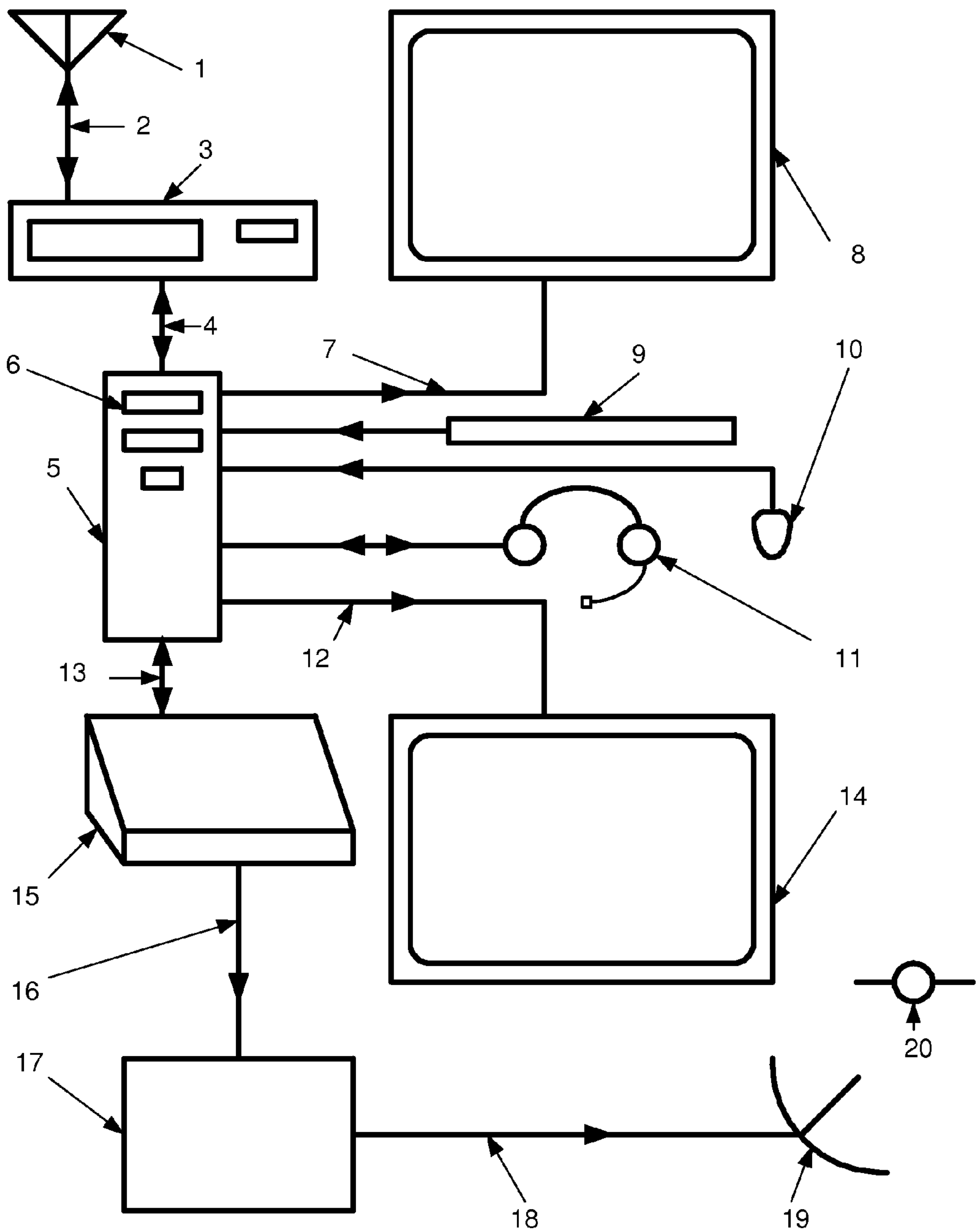
FIG. 25A is a block diagram showing the signals and data flows inside the remote base station.

The detailed physical elements disclosed in the signals and data flows in the remote base station drawing shown in FIG. 25A are identified as follows: 1 is the 24 db±2.4 or 5.8 GHz antenna or antenna array that communicates with the antenna array relay junction in the instrumented sports stadium. 2 is the coaxial cable assembly. 3 is the remote base station network transceiver. 4 is the Ethernet CAT5E or CAT6 Cable. 5 is the desktop PC. 6 is the special system software. 7 is the high definition monitor cable. 8 is the high definition monitor. 9 is the keyboard. 10 is the mouse. 11 are the headphones. 12 is the high definition monitor cable. 13 is the HD-SDI along with SPDIF fiber and talkback multi-cable assembly. 14 is the high definition monitor. 15 is the broadcast console. 16 is the typical satellite uplink cabling hardware. 17 is the typical satellite uplink transmission hardware. 18 is the typical satellite uplink feed line. 19 is the typical satellite uplink satellite antenna. 20 is the geosynchronous satellite orbiting the earth. 21 is the bi-directional fiber optics cable and/or copper cable link with the antenna array relay junction in the instrumented sports stadium.

FIG. 25A is a block diagram showing the signals and data flows inside the remote base station.

FIG. 25A is a block diagram showing the signals and data flows inside the remote base station referred to in FIG. 64A and referred to elsewhere in the specification for the present invention.

Referring to the drawing FIG. 64A, in a preferred embodiment a remote base station with means to wirelessly receive, decode, and process video and sound transmitted to it via an antenna array relay junction mounted in the instrumented stadium off the playing field, is disclosed. The RF antenna array relay junction is linked by RF signals with the dynamic sports paraphernalia, like for example instrumented footballs and instrumented ice hockey pucks, and with the static sports paraphernalia i.e. instrumented baseball bases, instrumented baseball home plates, and instrumented baseball pitcher's rubbers that are on the playing field. The remote base station has means to prepare the video and sounds that it receives via the antenna array relay junction, from the instrumented sports paraphernalia, for presentation to a live TV audience, i e make the pictures upright and stable regardless of the motions of the dynamic sports paraphernalia. In addition, the remote base station has means to command and control the electronic and optical functions inside the instrumented sports paraphernalia. The remote base station sends RF signals to the antenna array relay junction which in turn relays the RF signals to the instrumented sports paraphernalia on the playing field. Except for differences in processing software, the remote base stations specified in FIG. 59A and FIG. 59B and FIG. 60A and FIG. 60B and FIG. 61A and FIG. 61B and FIG. 62A and FIG. 62B and FIG. 62C and FIG. 62D and FIG. 62E and FIG. 64A and FIG. 64B are substantially identical to one another. The antenna array relay junction, which is also a part of the instrumented sports stadium, is specified in these same figures and discussed elsewhere in the present invention.

In FIG. 25A, 1 operates within either of the unlicensed 802.11(xx) 2.4 or 5.8 GHZ bands and has an isotropic gain of 15 db. During game-play, 1 is used to convey radio frequency signals between the instrumented football cameras and the remote base station network transceiver 3 via the antenna array relay junction. These signals contain various control data, system status, life span of battery information as well as the photographic images from the two cameras and sound picked up by microphones located inside the football. To ensure proper reception, 1 is typically placed close to the field of play at a suitable altitude above the field, for example 10 feet, so as to achieve a strong signal to noise ratio.

FIG. 25A shows the typical components of the remote base station. Network Transceiver 3 is used to buffer, convey and process the image, sound and control data signals traveling between the instrumented sports paraphernalia, transceiver 3 and the computer at the remote base station. This transceiver is equipped with an input/output port 21 to support the selected mode of connectivity utilized by the particular stadium i.e. fiber optic, copper cabling or wireless radio communication.

Network transceiver 3 consists of an 802.11(xx) protocol transceiver that operates in the radio frequency bands previously mentioned. The LAN Ethernet port of 3 is connected to desktop computer 5 via category-6 cable 4.

State of the art desktop computer 5 consists of a multi core CPU, several gigabytes of memory, video graphics card, sound card, high definition studio interface card and special system software 6. 5 is also equipped with traditional human interface hardware such as a keyboard 9, mouse 10 and headphones 11.

Receiving from 3, 5 in turn processes the photographic images and sounds captured by the cameras and microphones located inside the instrumented football.

Figure 26A:
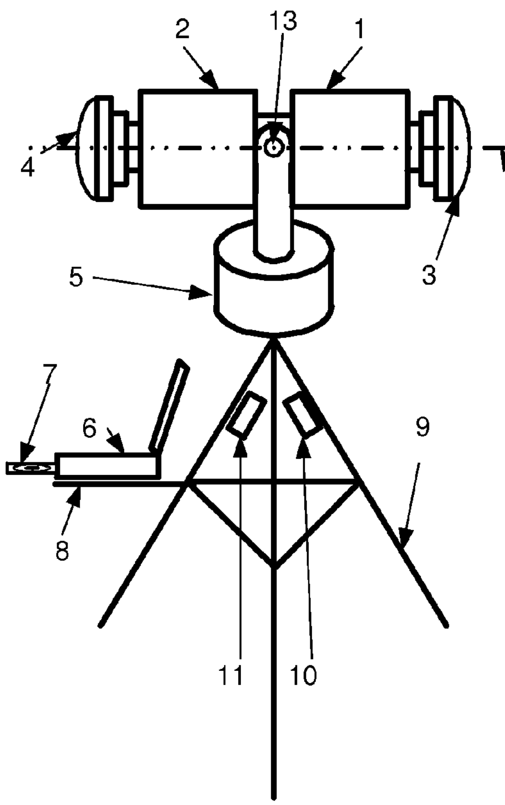
FIG. 26A is a right side mechanical diagram of the tripod mounted set-up camera system.
Figure 26B:
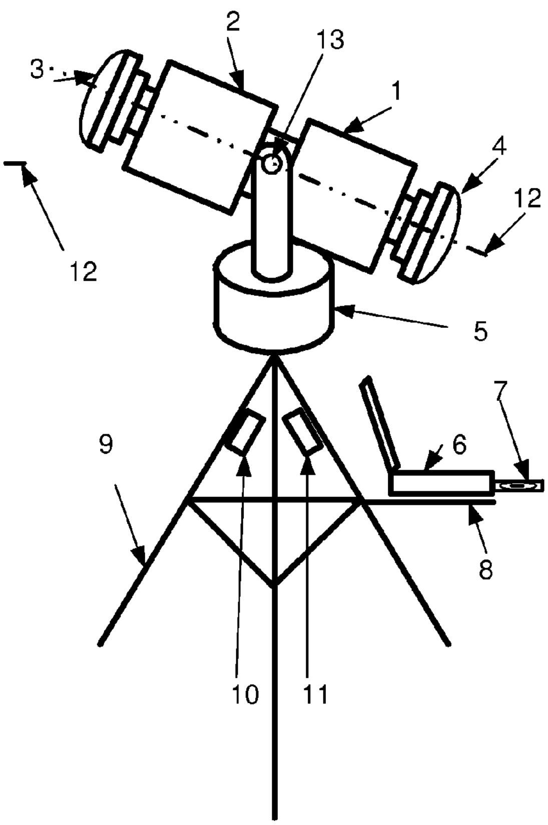
FIG. 26B is a left side mechanical diagram of the tripod mounted set-up camera system.

Prior to game-time the database of photographic images of the present playing field previously captured and stored by the set-up camera system disclosed in FIG. 26A and FIG. 26B are loaded onto the hard disk drive of 5. This database is subsequently used by 6 to establish reference points within the photographic image stream received by 5 from 3 as described earlier.

Whilst running on 5, 6 permits rapid real-time processing, enhancement and stabilization making upright the photographic images received from the instrumented football cameras during game-play despite the roll, pitch and yaw of the instrumented football. Therefore the photographic images viewed by a typical TV audience will be viewable in a coherent and intelligible form at the discretion of the remote base station operator.

Typically, as the system operates, 6 will frequently transmit required administrative commands via 5 and in turn 3 to the instrumentation package assembly inside the instrumented football. These commands may initiate a lens function change by either camera, i.e. focusing, as well as changes to the aspect, format and resolution, etc.

High definition multimedia interface cables 7 and 12 are used to interconnect the video graphics and sound card output of 5 to high definition TV monitors 8 and 14.

If over the course of a game the battery inside the football goes weak or there is a loss of a camera signal due to damage, the software onboard the instrumentation package assembly will transmit a warning message to 5 that will in turn alert base station operator both audibly and visually using 8, 11 and 14.

During game-play 8 and 14 in conjunction with 5 and 6 may be used as desired by the base station operator to: view before and after software image stabilization, edit and/or add special effects such as instant replay, to the photographic images received from the football cameras.

Additionally, the remote base station operator can use 11 to hear the sound picked up by the microphones located inside the instrumented football as received by 5 and prepare it for broadcast using 5 as desired.

An HD-SDI along with SPDIF fiber and talkback multi-cable assembly 13 is typically used to connect the output of 5 to the TV studio's broadcast console 15. It is also used to convey cueing and commentary between the remote base station operator via 5 and other TV studio personnel using 15.

Prior to passing through to the input of satellite uplink hardware 16, 17, 18, 19 and final broadcast by satellite 20, TV studio personnel may wish to perform further editing and/or add other functions such as time coding to the photographic images and/or sounds reaching 15 from 5. Such commands can be easily implemented by 6 using well-known broadcast equipment communication protocols.

Using 6, the remote base station described essentially decodes the motion video material acquired as imagery from the TV cameras aboard the football, and eliminates the effects that have been unintentionally encoded that render the pictures unintelligible to TV audiences because of the roll, pitch, and yaw motions of the instrumented football that carries the cameras. Processing in the remote base station eliminates the unintended and uncontrolled spinning of the pictures for example, that can cause dizzying effects and disorientation among the viewers. In a similar fashion, processing using 6 in the remote base station, eliminates the unintended and uncontrolled spinning of the pictures for instrumented ice hockey pucks disclosed in FIG. 66A and FIG. 66B and FIG. 66C as well to produce an upright stabilized picture for the TV viewing audience.

At the beginning of play on the field, before the instrumented football carrying the two TV cameras is in motion, the base station operator initially selects which TV camera is defined to be the forward TV camera, and which TV camera is defined to be the rearward TV camera. The remote base station operator makes this selection depending on which initial direction inside the football stadium the cameras face. Once the instrumented football is in motion, using 6, the TV camera that looks in the direction of the instrumented football's travel on the field is defined as the forward or front TV camera. Once the instrumented football is in motion, the TV camera that looks in the direction opposite to the direction of the instrumented football's travel on the field is defined as the rearward or rear TV camera.

In one preferred embodiment, the TV audience will always see an upright picture. In this embodiment, the image seen by the TV audience will be upright independent of the roll, pitch or yaw orientation of the instrumented football relative to the ground.

Also mounted inside the instrumented football are the TV camera's supporting electronics, which provide for the wireless radio transmission of the imagery of the game from the two TV cameras, from the vantage point of the instrumented football, to a remote ground station external to the instrumented football. In addition, the instrumented football's TV camera's supporting electronics are used to communicate command and control signals from the remote base station to the instrumented football, and thereby control the two TV camera's and their video and sound data transmitted to the remote base station from the instrumented football. External electronics and software, located at the remote base station, are used to transmit and communicate command and control signals to the two TV cameras inside the instrumented football, and process the transmitted data to and from the instrumented football. All of these components taken together are referred to herein as "the system".

Even though each camera is working independently of the other, the remote base station's software 6 upright stabilization algorithm knows that the roll angle R of each camera is identical but opposite in sign, and that the roll angle rate of change for both cameras is identical. The software 6 is coded/written so that the picture seen by the TV audience is upright and free of the effects of the instrumented football's roll on the picture.

In one preferred embodiment, the client instrumented football in play is activated by loading the client instrumented football's hosting software on the computer at the remote base station, by clicking an icon that opens the software program.

Now from a dropdown menu, a football is selected from the list of choices of available footballs that can be put into play; hit enter on the computer keyboard, and a signal is generated and sent over the wireless network to that particular football that has been selected, telling it to wake-up and turn on. Now the pictures of the field, from the two TV cameras on board the selected instrumented football will be seen on a monitor on the broadcaster's remote base station equipment console; and the sounds from the playing field can be heard on the broadcaster's remote base station equipment console, coming from the microphone on board the selected instrumented football.

The software in the remote base station computer can command and control the instrumented football's implementation of a variety of features such as still motion, full motion, camera #1, camera #2, both camera #1 and camera #2, automatic focus, automatic pupil setting, zoom-in, zoom-out, and fish-eye zoom selection. The software in the base station computer can implement features like special processing of the imagery transmitted from the instrumented football in play, to the remote base station. The user may select spin de-rotation of the imagery. The user may select various other image processing effects that make the images comfortably viewable by the TV audience.

In one preferred embodiment, in general, the variety of features set forth in the software to command and control the client football in play, is user selectable, and is activated by loading the client football's hosting software on the computer at the base station, and by clicking an icon that opens the software program on the remote base station computer.

Now, from a dropdown menu on the computer monitor's screen, the user selects features from the list of choices; hits enter on the computer keyboard, and a signal is generated and sent over the wireless network to that particular instrumented football that has been selected, telling it to implement those features on that selected instrumented football. Now the pictures of the field, from the two TV cameras executing those features, will be seen on a TV monitor on the broadcaster's equipment console; and the sounds from the playing field can also be heard on the broadcaster's equipment console, coming from the instrumented football's microphone executing those features.

The antenna array relay junction are hooked up to the wireless access point and must be strategically placed and centrally located close to the field of play in order to provide for the back and forth transmission of satisfactory signals from the remote base station to the instrumented football in play. The typical antenna can be about a foot in length, with at least a 9 db gain to cover the action on the full football field. The antennas can be placed on a twenty foot mast above the playing field. For optimized operation, the antenna placement height off the ground can be calculated for the worst case for each football stadium, to enable the antenna to cover the instrumented football during its maximum expected trajectory anywhere in the air above the ground.

In another preferred embodiment, the access point not only contains the wireless transceiver, but also contains the signal decoding hardware that can be controlled remotely, and can feed high definition video in whatever desirable format, into the base station's broadcast console, and be treated by the broadcast console like any other camera feed.

At the transmission frequencies used, there is so much signal bounce inside the football stadium, that the directivity of the remote base station's ground based antenna, is not a major problem.

In one preferred embodiment, a vertical antenna and a horizontal antenna, and a 45 degree antenna is used to insure a quality signal under less than ideal conditions.

In one preferred embodiment, the wireless access point is a box that fits into a standard 19 inch rack mount environment to interface with the remote base station's broadcast console equipment.

Figure 27:
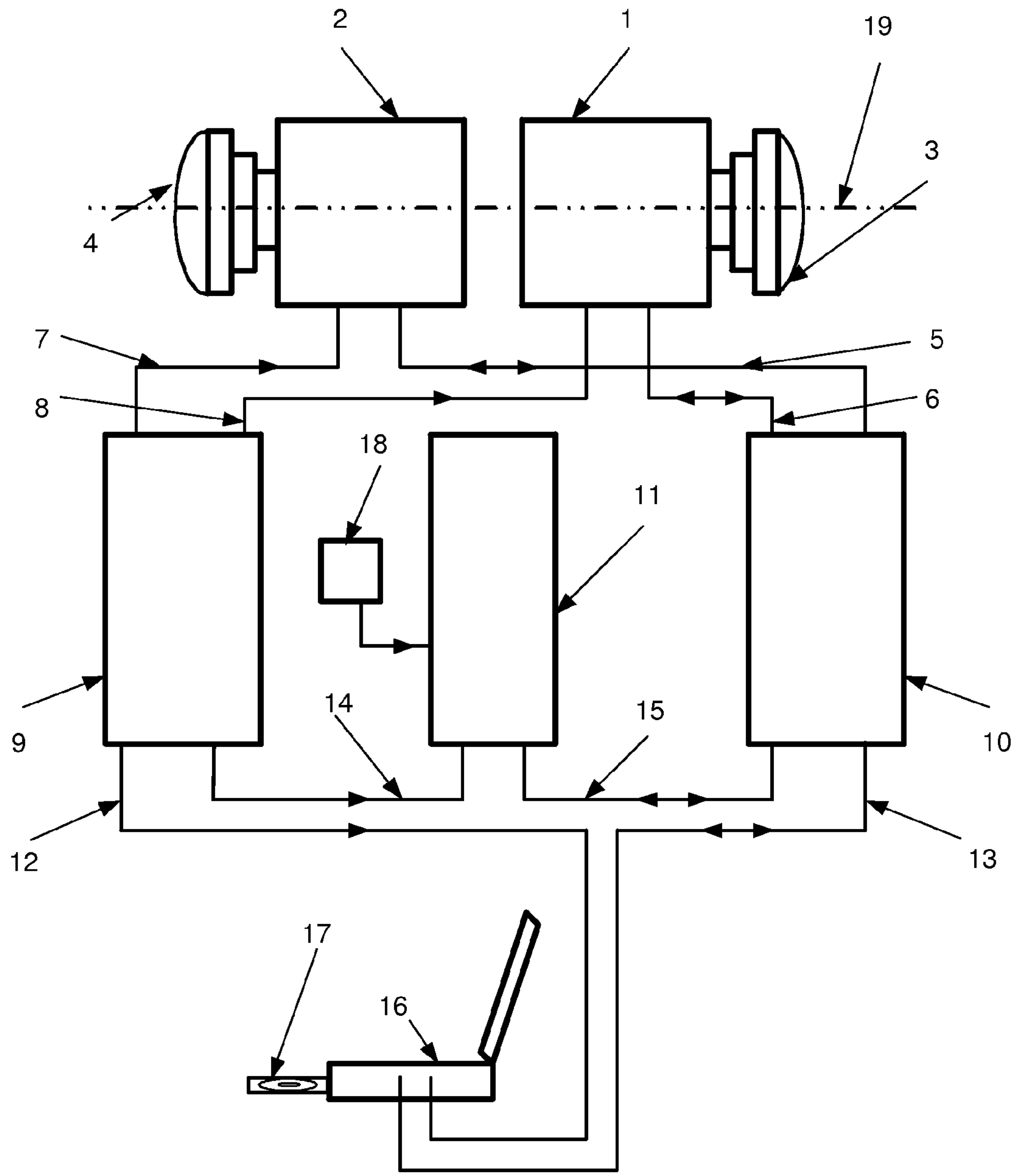
FIG. 27 is a block diagram showing the signal and data flows circuits in the tripod mounted set-up camera system shown in FIG. 26.

In a preferred embodiment, the remote base station computer will store all the pre-game data from the stadium that it has acquired from the flash memory cards created by the laptop computer disclosed in the tripod mounted set-up camera system shown in FIG. 26A and FIG. 26B, and FIG. 27. Using this data, it scales the visual aspects of the playing field, and establishes upright vertical references throughout the game using only the additional data from the instrumented football's cameras in play. The system establishes its own references by extracting them from the existing flash memory card data and correlating with the data from the instrumented football's cameras in play. This is done without the need for extensive site preparation, such as added backdrops, special lighting, and complex radio antenna configurations.

The remote base station computer contains image recognition software which has the ability to operate quickly and successively overlay and match image frames at speeds much higher than the frame rate from the high definition cameras. This enables the computer to do image processing during short time intervals compared to the camera frame rates, and thereby remove the effects of roll, pitch and yaw jitter from the pictures seen by the TV audience.

When the operator initiates a scan command, the tripod mounted set-up camera system shown in FIG. 26A and FIG. 26B, and FIG. 27 lets the system learn what the stadium looks like in the upright position of the cameras in all pitch and yaw angles for a roll angle of zero degrees.

From this data base, all of the required vertical upright references required data bases may be determined. It only has to do it only one time for that stadium. After that, it can supply all the other data the system requires to automatically stabilize a picture in pitch, yaw and roll of the instrumented football. The system overlays sequential images from each picture frame onto one another, thereby requiring very little site preparation to use the system.

In another preferred embodiment, the user at the remote base station console may point on his computer screen to objects that are off the center of the field of view of one or both cameras, and command the camera lenses to set the iris to accommodate the lighting on those objects, and focus on those objects. The user at the base station console may also use the remote base station's computer software to instantly zoom-in or zoom-out from those off-axis objects. In order to provide for flexibility and special effects, the user at the remote base station console may select a feature which allows varying degrees of picture rotation of the imagery received from one or both TV cameras mounted inside the instrumented football. This feature is used depending on the effect that the user at the remote base station wishes to convey to the TV audience, given the ways the players carry and handle the instrumented football. It is exciting to the TV audience to see pictures from the changing perspective of the instrumented football's different spatial attitudes, as it is passed from one player to the next, like when it is being hiked; or carried by a player who is running and being pursued and tackled by an opposing player.

When and after the instrumented football is hiked to the quarterback, the TV audience may see how being sacked looks to the quarterback from the vantage point of the football he is carrying. In most cases the TV audience will want to see an upright stabilized image of the player who is about to sack and crush the quarterback. In some cases the TV audience will want to see and hear the impact when the quarterback is sacked. In such cases, some jitter and rotation of the picture is useful at impact to produce the desired realistic effects of shock expected in a collision of this kind.

The fish-eye lens setting in each TV camera, essentially permits a solid viewing angle of 180 degrees for each TV camera. The combined effect of two back-to-back TV cameras is a near 360 degree solid viewing angle.

In one preferred embodiment, the combined effect of simultaneously using two fish-eye camera lenses, is that it facilitates the taking of pictures on the field with nearly a 360 degree solid angle coverage of uninterrupted view, thereby allowing the combined 360 degree camera angle to have an uninterrupted view of most immediate events on the field where the view is not blocked, independent of the instrumented football's angular and spatial orientation on the field. It also allows outdoor stadium's skyline horizon to be viewed independent of the angular and spatial orientation of the instrumented football on the playing field.

Of course, if a player or players are physically on top of the football, the TV audience will see a black picture because the field of view to both TV camera lenses is blocked simultaneously. The lack of pictures in this special case is ok and acceptable, since the TV audience expects this to happen when the football's view is physically covered.

When the instrumented football has been kicked to score a field goal, it may be tumbling around its pitch axis. An image of the rotating stadium's skyline horizon will occur at both the far right and far left hand sides of the picture. The system will lock onto this skyline horizon and use it as a field reference to stabilize the picture.

When the football is tumbling in flight when an attempt at a field goal has been kicked, and the football nears the goal posts, the TV audience will see the goal posts start near the center of the picture, and as they come closer they will move in from the front of the field of view, and pass by—one on the right, and—one on the left hand side of the TV screen. The TV audience will hear the rush of air past the football as it soars between the goal posts and strikes the netting, and hear the roar of the crowd as the goal is scored.

When the instrumented football has been kicked by a player to attempt a punt, it may be tumbling around its pitch axis. When the instrumented football is tumbling in flight and nears the opposing team's players, the TV audience will see the designated player catch the instrumented football, or see the player let the instrumented football hit, bounce and settle to the ground.

When the instrumented football is sitting motionlessly on the ground as the referees are measuring its location to determine a down, the TV audience will see the flag and chain as they are brought close to the instrumented football.

When the instrumented football is passed and fumbled, the TV audience will see up-close the players desperate scramble to recover the instrumented football. These pictures all come from the football's vantage point. The TV audience will hear the groans of the players as they are being heaped upon as they strain to protect the instrumented football. The TV audience will see the field of view grow black as the instrumented football and its handler are covered from view by the other players.

During play, the instrumented football can roll about it long axis, tumble around its pitch axis, and tumble around its yaw axis. A common vertical reference needs to be established for the imagery from each of the two TV cameras to be stabilized to render final pictures that are stable and upright without rotation to the TV audience.

In one preferred embodiment, each of the two TV cameras has a zoom lens equipped with fish-eye capability as its shortest focal length. Each of the fish-eyes produces an image with nearly a 180 degree solid angular field of view.

The focal length of the fish-eye is selected sufficient for its image to fill the pixels of the TV cameras imaging sensor array, thereby yielding maximum resolution per pixel for objects in the field of view. Both TV camera's sensor array axis are mechanically and optically aligned with one-another. Both TV cameras are mounted and aligned inside the football, so that when the football lies on the ground and its laces are on top and aligned skyward, both TV cameras simultaneously produce an upright image of the playing field. The fish-eye view of each TV camera yields the image of stadium's skyline horizon in real-time, with the sky on top, and the ground on the bottom.

Outdoor stadiums have a visible skyline horizon. In most situations, at least one of the TV camera zoom lenses is kept in the fish-eye mode in order to enable it to see the skyline horizon and provide the system with a real-time horizon with which to decode picture rotation and provide a final stable upright picture to the TV viewing audience. The real-time stadium skyline horizon which is present in the images received by the base station from the on-board TV cameras is used by the base station image pattern recognition software in the image processor, to establish when the picture is upright, and holds and stabilizes the picture in its upright position. Each frame, in sequence, is rotated electronically until it is upright using the stadium skyline horizon as reference. The frames are then broadcast or cabled in sequence to the TV and/or Internet and/or cell-phone audience. The remote base station console essentially decodes Motion Video Material that has been unintentionally and previously encoded and rendered unintelligible to TV audiences because of the pitch, roll and yaw motions of the instrumented football that carries the TV cameras.

The cameraman, in the remote base station, software selects either the wireless mode of communication, and/or the fiber optics/copper cable mode of communication between each of the instrumented sports paraphernalia (like for example, instrumented footballs, instrumented baseball bases, instrumented baseball home plates, instrumented baseball pitcher's rubbers, and instrumented ice hockey pucks) and the remote base station. The cameraman can use whichever equipment (antenna array relay junction or fiber optics cable/copper cable) is installed in the stadium/arena with which to command and control his choice and communicate it to the instrumented sports paraphernalia on the stadium/arena playing field/rink. These choices are also physically switch selectable by the cameraman with his access through the opening in the bottom of some of the instrumented sports paraphernalia. Refer to FIG. 59A and FIG. 59B, and FIG. 60A and FIG. 60B, and FIG. 61A and FIG. 61B, and FIG. 62A, and FIG. 62B, and FIG. 62C, and FIG. 62D, and FIG. 62E, FIG. 64A and FIG. 64B and FIG. 64C for further disclosures regarding the remote base station and the antenna array relay junction.

The cameraman selects items from a software menu of control commands that go to the network transceiver 3 at the remote base station that are subsequently transmitted to the instrumented sports paraphernalia for the purpose of adjusting various system initializations, operating parameters, radio frequency, polling system status data such as battery condition, and initiating remote mechanical adjustments such as camera focus, optical zoom, iris and movement to the cameras' field of view, etc over the selected bi-directional communications link i.e. wireless radio, fiber optics or copper cable connectivity being used within the particular sports stadium.

These commands, when intercepted by the network transceiver within the instrumented sports paraphernalia are applied to its microprocessor, which then in turn upon executing the instructions stored within the contents of its firmware applies a pulse coded control signal via the power and control interconnect interface inside the instrumentation package to the corresponding electronics i.e. the mechanical actuators that provides optical focus and/or zoom adjustment of the cameras and microphone gain and selection, etc as desired by the cameraman and/or special software running on the computer at the remote base station. The power and control interconnect interface as shown in FIG. 23 and FIG. 33E and FIG. 36D, which is represented by dotted lines, consists of the electrical control wiring to and from the electronic components of the instrumented sports paraphernalia that are being controlled.

The antenna array relay junction simultaneously receives the televised RF signals transmitted by each and all of the static instrumented sports paraphernalia on the ground. The televised RF signals from each of the instrumented sports paraphernalia have different carrier frequencies to differentiate them from one another and improve the S/N ratio. The antenna array relay junction 13 simultaneously relays these televised signals to the remote base station 15 over the bi-bidirectional communications link. Depending on the total number of HD TV cameras contained in the instrumented sports paraphernalia that are simultaneously on the playing field, and the noise levels in the air ways in the stadium, the cameraman in the remote base station can conserve bandwidth to insure the quality of the HD that is broadcast to the TV viewing audience by the remote base station. The cameraman can conserve bandwidth by transmitting a control signal to each of the instrumented sports paraphernalia instructing them to operate all their cameras in a low resolution mode. The cameraman then selects which of the instrumented sports paraphernalia's camera's video is going to be broadcast to the TV viewing audience, and sends a control signal to those instrumented sports paraphernalia cameras to televise their signals in the HD resolution mode. The instrumented sports paraphernalia then transmits its camera's HD video televised signal to the remote base station 15 via the antenna array relay junction. As an example, the low resolution mode can be realized using TDM (time division multiplexing) or FDM (frequency division multiplexing) or HDT (high definition thumbnails).

Referring to the Preferred Embodiments Specified in FIG. 25A, the Remote Base Station Satisfies all of the Following Further Objectives:

It is an objective of the current invention to provide the remote base station with a 24 db±2.4 or 5.8 GHz antenna or antenna array that communicates with the antenna array relay junction in the instrumented sports stadium, a coaxial cable assembly, a remote base station network transceiver, an Ethernet CAT5E or CAT6 Cable, a desktop PC, special system software, two high definition monitor cables, two high definition monitors, keyboard, mouse, headphones, HD-SDI along with SPDIF fiber and talkback multi-cable assembly, broadcast console, typical satellite uplink cabling hardware, typical satellite uplink transmission hardware, typical satellite uplink feed line, typical satellite uplink satellite antenna link to a geosynchronous satellite orbiting the earth, bi-directional fiber optics cable and/or copper cable link with the antenna array relay junction in the instrumented sports stadium. It is an objective of the current invention to provide the remote base station which has means to prepare the video and sounds that it receives via the antenna array relay junction, from the instrumented sports paraphernalia, for presentation to a live TV audience, and make the pictures upright and stable regardless of the motions of the dynamic sports paraphernalia. It is an objective of the current invention to provide the remote base station with software means to process, stabilize and make upright the video it receives from the dynamic instrumented sports paraphernalia, by using the gyroscopic encoder data it also receives from the instrumented sports paraphernalia to remove the pitch, yaw and roll motion effects of the instrumented sports paraphernalia on the video. It is an objective of the current invention to provide the remote base station with image recognition software means to process, stabilize and make upright the video it receives from the dynamic instrumented sports paraphernalia, by using the data it receives from the tripod mounted camera system to remove the pitch, yaw and roll motion effects of the instrumented sports paraphernalia on the video. It is an objective of the current invention to provide the remote base station with software means to combine the processing of the data received from the tripod mounted camera system with the data received from the gyroscopic encoders to jointly process, stabilize and make upright the video it receives from the dynamic instrumented sports paraphernalia. It is an objective of the current invention to provide the remote base station which has means to command and control the electronic and optical functions inside the instrumented sports paraphernalia by sending RF signals to the antenna array relay junction which in turn relays the RF signals to the instrumented sports paraphernalia on the playing field. It is an objective of the current invention to provide the remote base station which has means to wirelessly receive, decode, and process video and sound transmitted to it via an antenna array relay junction mounted in the instrumented stadium off the playing field. It is an objective of the current invention to provide the remote base station which an RF antenna array relay junction linked by RF signals with the dynamic sports paraphernalia, like for example instrumented footballs and instrumented ice hockey pucks, and with the static sports paraphernalia i.e. instrumented baseball bases, instrumented baseball home plates, and instrumented baseball pitcher's rubbers that are on the playing field. It is an objective of the current invention to provide the remote base station with means to wirelessly receive, decode and process pictures and sounds transmitted to it by the instrumented football, and prepare those pictures and sounds for presentation to a live TV audience. It is the an objective of the present invention to provide an instrumentation package assembly with onboard electronics contained within it to transmit TV pictures and sounds via radio antennas to a remote base station via an antenna array relay junction located in the sports stadium. It is an objective of the present invention to command and control the TV cameras and lenses from the remote base station via an antenna array relay junction located in the sports stadium. It is an objective of the present invention to command and control the power from the battery pack to the electronics from the remote base station via an antenna array relay junction located in the sports stadium. It is an objective of the present invention to stabilize the TV pictures using gyroscopic control. It is an objective of the present invention to control the charging of the battery pack from the remote base station via an antenna array relay junction located in the sports stadium. It is an objective of the present invention to monitor the battery pack charge status from the remote base station via an antenna array relay junction located in the sports stadium. It is a further objective of the current invention to provide the remote base station with means to prepare pictures and sounds for presentation to a live TV audience. It is a further objective of the current invention that, at the discretion of the remote base station operator, the TV audience will see stabilized upright pictures of the game despite the roll, pitch and yaw orientation of the instrumented football relative to the ground. It is a further objective to wirelessly command and control the functions within the instrumentation package assembly from the remote base station via an antenna array relay junction located in the sports stadium. It is an objective of the current invention to make the remote base station operator aware when the battery is charging properly, or when it is charging improperly. If the battery charges improperly, the instrumented football must be removed from the charger and repaired.

FIG. 25B

Figure 25B:
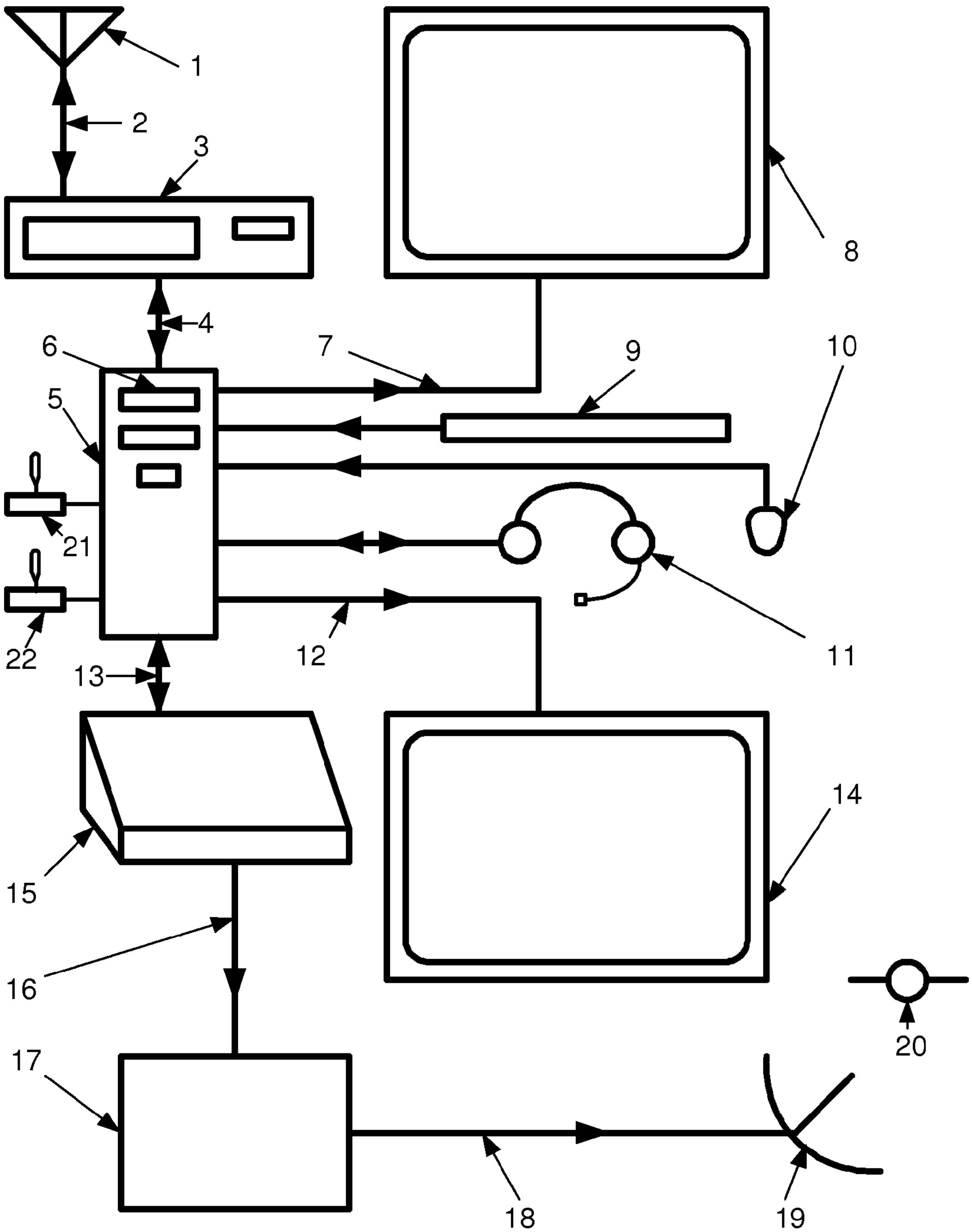
FIG. 25B is a block diagram showing the signals and data flows in the remote base station.

The detailed physical elements disclosed in the signals and data flows for the remote base station drawing shown in FIG. 25B are identified as follows: 1 is the 24 db±2.4 or 5.8 GHz antenna or antenna array. 2 is the coaxial cable assembly. 3 is the remote base station network transceiver. 4 is the Ethernet CAT5E or CAT6 Cable. 5 is the desktop PC. 6 is the special system software. 7 is the high definition monitor cable. 8 is the high definition monitor. 9 is the keyboard. 10 is the mouse. 11 are the headphones. 12 is the high definition monitor cable. 13 is the HD-SDI along with SPDIF fiber and talkback multi-cable assembly. 14 is the high definition monitor. 15 is the broadcast console. 16 is the typical satellite uplink cabling hardware. 17 is the typical satellite uplink transmission hardware. 18 is the typical satellite uplink feed line. 19 is the typical satellite uplink satellite antenna. 20 is the geosynchronous satellite orbiting the earth. 1 is a 180 degree directional circular polarized antenna. 21 is a dynamic tactical input device like a joystick. 22 is a dynamic tactical input device like a joystick. 23 is the bi-directional fiber optics cable and/or copper cable link with the antenna array relay junction in the instrumented sports stadium.

FIG. 25B is a block diagram showing the signals and data flows in the remote base station.

FIG. 25B is a block diagram showing the signals and data flows inside the remote base station referred to in FIG. 64B and referred to elsewhere in the specification for the present invention.

Referring to the drawing FIG. 64B, in a preferred embodiment, a remote base station with means to wirelessly receive, decode, and process video and sound transmitted to it via an antenna array relay junction mounted in the instrumented stadium off the playing field, is disclosed. The RF antenna array relay junction is linked by fiber optics cable/copper cable with the static sports paraphernalia i.e. instrumented baseball bases, instrumented baseball home plates, and instrumented baseball pitcher's rubbers that are on the playing field. The remote base station has means to prepare the video and sounds that it receives via the antenna array relay junction, from the instrumented sports paraphernalia on the playing field, for presentation to a live TV audience. In addition, the remote base station has means to command and control the electronic and optical functions inside the instrumented sports paraphernalia on the playing field. The remote base station sends RF signals to the antenna array relay junction which in turn relays the signals to the instrumented sports paraphernalia on the playing field by fiber optics cable/copper cable buried beneath the playing field. Except for differences in processing software, the remote base stations specified in FIG. 59A and FIG. 59B and FIG. 60A and FIG. 60B and FIG. 61A and FIG. 61B and FIG. 62A and FIG. 62B and FIG. 62C and FIG. 62D and FIG. 62E and FIG. 64A and FIG. 64B are substantially identical to one another. The antenna array relay junction, which is also a part of the instrumented sports stadium, is specified in these same figures and discussed elsewhere in the present invention.

The block diagram in FIG. 25B showing the signals and data flows in the remote base station is identical to the block diagram in FIG. 25A except for the addition of the joy sticks 21 and 22 in FIG. 25B.

A 180 degree directional circular polarized antenna 1 is shown in FIG. 25B. 1 operates within either of the unlicensed 802.11(xx) 2.4 or 5.8 GHz bands and has an isotropic gain of 15 dbi.

During game-play, 1 is used to convey radio frequency signals between the football cameras and the base station network transceiver 3 via coaxial cable 2. These signals contain various control data, system status, life span of battery information as well as the photographic images from the two cameras and sound picked up by microphones located inside the football. To ensure proper reception, 1 is typically placed close to the field of play at a suitable altitude so as to achieve a strong signal to noise ratio.

FIG. 25B shows the typical components of the remote base station. Network Transceiver 3 is used to buffer, convey and process the image, sound and control data signals traveling between the instrumented sports paraphernalia, transceiver 3 and the computer at the remote base station. This transceiver is equipped with an input/output port 23 to support the selected mode of connectivity utilized by the particular stadium i.e. fiber optic, copper cabling or wireless radio communication.

Network transceiver 3 consists of an 802.11(xx) protocol transceiver that operates in the radio frequency bands previously mentioned. The LAN Ethernet port of 3 is connected to desktop computer 5 via cat-6 cable 4.

State of the art Desktop computer 5 consists of a multi core CPU, several gigabytes of memory, video graphics card, sound card, high definition studio interface card and special system software 6. 5 is also equipped with traditional human interface hardware such as a keyboard 9, mouse 10 and headphones 11.

When the picture signals received by the remote base station from the cameras within the respective instrumentation package assembly (either wirelessly or via fiber optic connectivity) contain three dimensional images that are to be processed in turn by 5, it is necessary to ensure that these images be in proper alignment and have the correct orientation when viewed within the letterbox aspect ratio. To accomplish this function, 5 is additionally equipped with a set of dynamic tactile input joystick devices 21 and 22 which can be used by the cameraman to manually position each selected camera within the respective instrumentation package assembly. Alternately Special software operating within 5 can perform this function automatically as well as provide aid in the positioning of the respective images from the selected cameras to the cameraman.

Receiving from 3, 5 in turn processes the photographic images and sounds captured by the cameras and microphones located inside the football.

Prior to game-time the database of photographic images of the present playing field previously captured and stored by the set-up camera system are loaded onto the hard disk drive of 5. This database is subsequently used by 6 to establish reference points within the photographic image stream received by 5 from 3 as described earlier.

Whilst running on 5, 6 permits rapid real-time processing, enhancement and stabilization making upright the photographic images received from the football cameras during game-play.

Typically, as the system operates, 6 will frequently transmit required administrative commands via 5 and in turn 3 to the instrumentation package inside the football. These commands may initiate a lens change by either camera, focusing, as well as changes to the aspect, format and resolution, etc.

High definition multimedia interface cables 7 and 12 are used to interconnect the video graphics and sound card output of 5 to high definition TV monitors 8 and 14.

If over the course of a game the battery inside the football goes weak or there is a loss of a camera signal due to damage, the software onboard the instrumentation package will transmit a warning message to 5 that will in turn alert base station operator both audibly and visually using 8, 11 and 14.

During game-play 8 and 14 in conjunction with 5 and 6 may be used as desired by the base station operator to: view before and after software image stabilization, edit and/or add special effects such as instant replay, to the photographic images received from the football cameras.

Additionally, the base station operator can use 11 to hear the sound picked up by the microphones located inside the football as received by 5 and prepare it for broadcast using 5 as desired.

An HD-SDI along with SPDIF fiber and talkback multicable assembly 13 is typically used to connect the output of 5 to the TV studio's broadcast console 15 normally present at a televised football game. It is also used to convey cueing and commentary between the base station operator via 5 and other TV studio personnel using 15.

Prior to passing through to the input of satellite uplink hardware 16, 17, 18, 19 and final broadcast by satellite 20, TV studio personnel may wish to perform further editing and/or add other functions such as time coding to the photographic images and/or sounds reaching 15 from 5. Such commands can be easily implemented by 6 using well-known broadcast equipment communication protocols.

When an instrumented baseball home plate is equipped with an instrumentation package assembly containing four cameras is used to capture three dimensional images, any combination of two cameras out of the four may be selected at the remote base station manually by the cameraman and/or under the automatic control of special software. An instrumentation package assembly containing four such cameras is disclosed in FIG. 35A and FIG. 35B and FIG. 35C.

Additionally, the remote base station is equipped to issue control commands with a single or multiple joystick, control yoke or other dynamic tactile input device to facilitate the easy, rapid and smooth adjustment of each camera's rotational axis in real-time by camera personnel. This is necessary to ensure that the images from each of the two selected cameras will have the proper alignment and letterbox aspect ratio so as to produce the proper three-dimensional display irrespective of the line of sight's angular direction to the instrumented baseball home plate.

The control commands intended for each camera are conveyed to the instrumented home plate via an independent administrative data link that is established whenever the system is initialized and placed into operation This link is formed by the same bi-directional connection path either wirelessly or via a fiber optic cable system that conveys the picture and sound signals between the instrumented home plate and the remote base station depending on the selection made by personnel at the time of setup at the particular stadium.

Selection of the desired telecommunication path of (i.e. wireless or fiber optic connectivity) between each instrumented baseball base, instrumented baseball home plate and the remote base station at the time of setup can be made by personnel in one of three ways.

Firstly, a three position switch located within the respective instrumentation package assembly accessed merely by removing its access cover can be set such that when the system is operated it will always utilize the choice selected. Secondly, if the aforementioned switch is left in its neutral position the system will await a selection command from the remote base station via whichever telecommunications path is being used.

Thirdly, if the aforementioned switch is left in its neutral position the system will also respond to selection commands issued by the recharging station referenced in FIG. 37A over the administrative data link established via the 250 kHz induction coils. This is an especially useful feature for sports personnel who are using a common set of sports equipment i.e. instrumented home plates and play in a variety of baseball stadiums whose connectivity requirements vary.

Since the bi-directional administrative/control data link, picture and sound signal telecommunication paths of each camera are essentially independent with respect to their physical location on the stadium field relative to the remote base station, personnel can operate the system from a remote base station at a distant location such as from inside a broadcast equipment van in the stadium parking lot or a studio located many miles away from the stadium.

As an example, FIG. 60A and FIG. 60B show a typical baseball stadium equipped with an instrumented home plate connected to the remote base station via a series of fiber optic cables. This remote base station can be located inside the aforementioned broadcast equipment van.

The cameraman, in the remote base station, software selects either the wireless mode of communication, and/or the fiber optics/copper cable mode of communication between each of the instrumented sports paraphernalia (like for example, instrumented footballs, instrumented baseball bases, instrumented baseball home plates, instrumented baseball pitcher's rubbers, and instrumented ice hockey pucks) and the remote base station. The cameraman can use whichever equipment (antenna array relay junction or fiber optics cable/copper cable) is installed in the stadium/arena with which to command and control his choice and communicate it to the instrumented sports paraphernalia on the stadium/arena playing field/rink. These choices are also physically switch selectable by the cameraman with his access through the opening in the bottom of some of the instrumented sports paraphernalia. Refer to FIG. 59A and FIG. 59B, and FIG. 60A and FIG. 60B, and FIG. 61A and FIG. 61B, and FIG. 62A, and FIG. 62B, and FIG. 62C, and FIG. 62D, and FIG. 62E, FIG. 64A and FIG. 64B and FIG. 64C for further disclosures regarding the remote base station and the antenna array relay junction.

The cameraman selects items from a software menu of control commands that go to the network transceiver 3 at the remote base station that are subsequently transmitted to the instrumented sports paraphernalia for the purpose of adjusting various system initializations, operating parameters, radio frequency, polling system status data such as battery condition, and initiating remote mechanical adjustments such as camera focus, optical zoom, iris and movement to the cameras' field of view, etc over the selected bi-directional communications link i.e. wireless radio, fiber optics or copper cable connectivity being used within the particular sports stadium.

These commands, when intercepted by the network transceiver within the instrumented sports paraphernalia are applied to its microprocessor, which then in turn upon executing the instructions stored within the contents of its firmware applies a pulse coded control signal via the power and control interconnect interface inside the instrumentation package to the corresponding electronics i.e. the mechanical actuators that provides optical focus and/or zoom adjustment of the cameras and microphone gain and selection, etc as desired by the cameraman and/or special software running on the computer at the remote base station. The power and control interconnect interface as shown in FIG. 23 and FIG. 33E and FIG. 36D, which is represented by dotted lines, consists of the electrical control wiring to and from the electronic components of the instrumented sports paraphernalia that are being controlled.

The antenna array relay junction simultaneously receives the televised RF signals transmitted by each and all of the static instrumented sports paraphernalia on the ground. The televised RF signals from each of the instrumented sports paraphernalia have different carrier frequencies to differentiate them from one another and improve the S/N ratio. The antenna array relay junction simultaneously relays these televised signals to the remote base station over the bi-directional communications link. Depending on the total number of HD TV cameras contained in the instrumented sports paraphernalia that are simultaneously on the playing field, and the noise levels in the air ways in the stadium, the cameraman in the remote base station can conserve bandwidth to insure the quality of the HD that is broadcast to the TV viewing audience by the remote base station. The cameraman can conserve bandwidth by transmitting a control signal to each of the instrumented sports paraphernalia instructing them to operate all their cameras in a low resolution mode. The cameraman then selects which of the instrumented sports paraphernalia's camera's video is going to be broadcast to the TV viewing audience, and sends a control signal to those instrumented sports paraphernalia cameras to televise their signals in the HD resolution mode. The instrumented sports paraphernalia then transmits its camera's HD video televised signal to the remote base station via the antenna array relay junction. As an example, the low resolution mode can be realized using TDM (time division multiplexing) or FDM (frequency division multiplexing) or HDT (high definition thumbnails).

Referring to the Preferred Embodiments Specified in FIG. 25B, the Remote Base Station Satisfies all of the Following Objectives:

It is an objective of the current invention to provide the remote base station with a 24 db±2.4 or 5.8 GHz antenna or antenna array that communicates with the antenna array relay junction in the instrumented sports stadium, a coaxial cable assembly, a remote base station network transceiver, an Ethernet CAT5E or CAT6 Cable, a desktop PC, special system software, two high definition monitor cables, two high definition monitors, keyboard, mouse, headphones, HD-SDI along with SPDIF fiber and talkback multi-cable assembly, broadcast console, typical satellite uplink cabling hardware, typical satellite uplink transmission hardware, typical satellite uplink feed line, typical satellite uplink satellite antenna link to a geosynchronous satellite orbiting the earth, bi-directional fiber optics cable and/or copper cable link with the antenna array relay junction in the instrumented sports stadium, two dynamic tactical input devices like joysticks. It is an objective of the current invention to provide the remote base station which has means to prepare the video and sounds that it receives via the antenna array relay junction, from the instrumented sports paraphernalia, for presentation to a live TV audience, and make the pictures upright and stable regardless of the motions of the dynamic sports paraphernalia. It is an objective of the current invention to provide the remote base station with software means to process, stabilize and make upright the video it receives from the dynamic instrumented sports paraphernalia, by using the gyroscopic encoder data it also receives from the instrumented sports paraphernalia to remove the pitch, yaw and roll motion effects of the instrumented sports paraphernalia on the video. It is an objective of the current invention to provide the remote base station with image recognition software means to process, stabilize and make upright the video it receives from the dynamic instrumented sports paraphernalia, by using the data it receives from the tripod mounted camera system to remove the pitch, yaw and roll motion effects of the instrumented sports paraphernalia on the video. It is an objective of the current invention to provide the remote base station with software means to combine the processing of the data received from the tripod mounted camera system with the data received from the gyroscopic encoders to jointly process, stabilize and make upright the video it receives from the dynamic instrumented sports paraphernalia. It is an objective of the current invention to provide the remote base station which has means to command and control the electronic and optical functions inside the instrumented sports paraphernalia by sending RF signals to the antenna array relay junction which in turn relays the RF signals to the instrumented sports paraphernalia on the playing field. It is an objective of the current invention to provide the remote base station which has means to wirelessly receive, decode, and process video and sound transmitted to it via an antenna array relay junction mounted in the instrumented stadium off the playing field. It is an objective of the current invention to provide the remote base station which an RF antenna array relay junction linked by RF signals with the dynamic sports paraphernalia, like for example instrumented footballs and instrumented ice hockey pucks, and with the static sports paraphernalia i.e. instrumented baseball bases, instrumented baseball home plates, and instrumented baseball pitcher's rubbers that are on the playing field. It is an objective of the current invention to provide the remote base station with means to wirelessly receive, decode and process pictures and sounds transmitted to it by the instrumented football, and prepare those pictures and sounds for presentation to a live TV audience. It is the an objective of the present invention to provide an instrumentation package assembly with onboard electronics contained within it to transmit TV pictures and sounds via radio antennas to a remote base station via an antenna array relay junction located in the sports stadium. It is an objective of the present invention to command and control the TV cameras and lenses from the remote base station via an antenna array relay junction located in the sports stadium. It is an objective of the present invention to command and control the power from the battery pack to the electronics from the remote base station via an antenna array relay junction located in the sports stadium. It is an objective of the present invention to stabilize the TV pictures using gyroscopic control. It is an objective of the present invention to control the charging of the battery pack from the remote base station via an antenna array relay junction located in the sports stadium. It is an objective of the present invention to monitor the battery pack charge status from the remote base station via an antenna array relay junction located in the sports stadium. It is a further objective of the current invention to provide the remote base station with means to prepare pictures and sounds for presentation to a live TV audience. It is a further objective of the current invention that, at the discretion of the remote base station operator, the TV audience will see stabilized upright pictures of the game despite the roll, pitch and yaw orientation of the instrumented football relative to the ground. It is a further objective to wirelessly command and control the functions within the instrumentation package assembly from the remote base station via an antenna array relay junction located in the sports stadium. It is an objective of the current invention to make the remote base station operator aware when the battery is charging properly, or when it is charging improperly. If the battery charges improperly, the instrumented football must be removed from the charger and repaired.

FIG. 26A and FIG. 26B

The detailed physical elements disclosed in the tripod mounted set-up camera system drawings shown in FIG. 26A and FIG. 26B are disclosed as follows: 1 is a high definition camera. 2 is a high definition camera. 3 is a fish eye lens. 4 is a fish eye lens. 5 is a motorized tripod mount. 6 is a laptop computer. 7 is a special software package. 8 is a laptop support shelf—folding. 9 setup camera tripod. 10 is a rechargeable battery pack. 11 is a USB 3.0 high-speed hub. 12 is a optical centerline of cameras.

FIG. 26A is a right side mechanical diagram of the tripod mounted set-up camera system.

FIG. 26B is a left side mechanical diagram of the tripod mounted set-up camera system.

Referring to drawings FIG. 26A and FIG. 26B, in a preferred embodiment, the tripod mounted set-up camera system (also called the Pre-game Set-up Camera Apparatus) is used to gather sample photographic images from the playing fields/rinks of instrumented sports stadiums/arenas needed by the remote base station software to create an image database that is subsequently utilized by the remote base station software to enhance, stabilize and make upright the real-time images received from the instrumented sport's paraphernalia i.e. instrumented footballs, during game time, is disclosed. The remote base station is disclosed in FIG. 25A and FIG. 25B, FIG. 62A, FIG. 62B, FIG. 62C, FIG. 62D, FIG. 62E, FIG. 64A, FIG. 64B, and FIG. 64C. The same remote base station is a part of the instrumentation used to equip other typical instrumented sports stadiums besides football stadiums, for example ice hockey stadiums/arenas.

Tripod mounted set-up camera 1 is shown in FIG. 26. 1 is used prior to game time in order to gather sample photographic images needed by the remote base station software to create an image database that is subsequently utilized by the remote base station software to enhance, stabilize and/or make upright the real-time images received from the football's cameras during game time.

1 is equipped with dual high-definition imaging devices, compression hardware and optics including a set of fish-eye zoom lenses that are identical in function to those used by the cameras located inside the football. 1 is configured so that photographic images from opposite directions 180 degrees apart maybe output simultaneously. 1 may be used to photograph and output still non-motion images as well as those with motion in a multitude of image formats including hi-definition. 1 is mounted on the top of 2. 2 is a motorized camera mount that provides 1 with horizontal & vertical axis rotation as well as height adjustments. 1 & 2 are connected to 5 via 3 & 4. 3 & 4 are high-speed USB cables. 5 is a portable laptop computer. 5 is loaded with 6. 6 is a software package that when initialized by the set-up camera operator is used to determine and control the position of 1 via commands to 2 and in turn capture and store the photographic images output by 1 needed by the remote base station as previously described.

During operation, 1 receives commands from 6 via 5. These commands determine various operational parameters of 1 such as image format and resolution, aspect ratio, focus, bulb, shutter and iris settings as well as whether or not to apply additional optical features i.e. fish-eye zoom.

Photographic images output by 1 are subsequently captured and stored by 5 under the control of 6 respectively.

A human interface to 6 can be made by the set-up camera operator via the keyboard and mouse of 5. Various operating functions of 6 once initialized by the set-up camera operator may be executed by remote control or automatically. This permits the set-up camera operator to position himself/herself out of the field of view when using the set-up camera system. Typically during operation, 5 will be secured to 7 such that the set-up camera operator may access and views the laptop screen easily while the system acquires the required photographic images automatically. 7 is an adjustable shelf attached to the rear legs of 8. 8 is a collapsible three-legged tripod. 8 can be used in such a way as to allow 1 to photograph images at or near ground level. 9 is a rechargeable battery like a lithium-ion battery pack. 9 supply's electrical power to 1 & 2 via 10 & 11. 9 may also serve as a backup power source for 5 via 12. 9 is recharged whenever necessary by 13. 10, 11 and 12 are multi-pin power cables. 13 is a small switching type power supply used to convert utility mains power to that utilized by 9 while being recharged.

The setup camera basically surveys the stadium and takes pictures of the playing field and of the stadium at different pitch and yaw angles of the setup camera from a variety of pre-selected coordinate points on the playing field. The setup camera is stationed both at ground level on the playing field and six feet above the playing field. The pictures taken by the setup camera will be used by the remote base station processing software to run image recognition algorithms to establish the upright reference for each picture taken by the football used during a game.

Photographic samples are taken with the setup camera inside each stadium from on the playing field. The scanning and scaling is automatically done by the software in the setup camera.

The resultant bit maps are subsequently loaded into the remote base station by transmission from the setup camera to the remote base station using a wireless link or by memory card. The setup camera will take all the pictures that the system needs to establish a data base for the image recognition algorithms.

In a preferred embodiment, there is a bit map created for every stadium on a removable flash memory card. A bit map for every stadium played in the season is stored on a flash memory card. An operator comes to the stadium prior to game-time with the setup camera, and sets up the setup camera on the playing field on a tripod, at designated points on the field, by following the menus set forth in the associated software loaded into the operator's laptop computer. The setup camera is plugged into the laptop computer, which contains the scanning software the setup camera needs to acquire and store the playing field bit maps needed by the base station computer to create a virtual playing field database. The playing field bit maps stored in the laptop computer are subsequently loaded into the base station computer by transmission from the laptop computer to the base station computer using a wireless link, or by recording the bit maps in the laptop computer on flash memory cards, which can be removed from the laptop computer and plugged into the base station computer.

Closed indoor stadiums do not have real skyline horizons. In situations where a real skyline horizon is not available, the closed indoor stadium may be prepared before the game with horizontal stripes of paint, whose lengths and widths are sufficiently long and wide, and whose locations allow them to be conspicuous to the TV cameras. In closed indoor stadiums where there are sufficient horizontal structures in the stadium, like horizontal barrier walls and horizontal structural members, painted stripes may become unnecessary for the decoding system to perform. When the operator initiates a scan command, the tripod mounted set-up camera system shown in FIG. 26A and FIG. 26B, and FIG. 27 lets the system learn what the stadium looks like in the upright position of the cameras in all pitch and yaw angles for a roll angle of zero degrees. From this data base, all of the required vertical upright references required data bases may be determined. It only has to do it only one time for that stadium. After that, it can supply all the other data the system requires to automatically stabilize a picture in pitch, yaw and roll of the instrumented football. The system overlays sequential images from each picture frame onto one another, thereby requiring very little site preparation to use the system.

The same processing software that is used in the remote base station to stabilize and make upright the imagery from the instrumented footballs is used to stabilize and make upright the imagery from ice hockey pucks disclosed in FIG. 66A and FIG. 66B and FIG. 66C of the present invention.

Referring to the Preferred Embodiments Specified in FIG. 26A and FIG. 26B, the Tripod Mounted Set-Up Cameras Satisfy all of the Following Further Objectives:

It is an objective of the present invention to gather sample photographic images needed by the remote base station software from the tripod mounted set-up camera system comprised of a two high definition cameras, two fish eye camera lenses, a motorized tripod mount, a laptop computer, a special software package, a laptop support shelf—folding, setup camera tripod, a rechargeable battery pack, and a USB 3.0 high-speed hub. It is an objective of the present invention to gather sample photographic images to create an image database that is subsequently utilized by the remote base station software to enhance, stabilize and/or make upright the real-time images received from the football's cameras during game time. It is an objective of the present invention to gather sample photographic images to create an image database that is subsequently utilized by the remote base station software to enhance, stabilize and/or make upright the real-time images received from the instrumented sports paraphernalia cameras during game time. It is an objective of the present invention that the pre-game set-up camera apparatus be used for photographically scanning the sports event venue to build an archive of images to be utilized by the remote base station in processing encoded pictures received from the instrumented paraphernalia on the field of play to make them stable and upright to the TV viewing audience.

FIG. 27

The detailed physical elements disclosed in the signal and data flow circuits in the tripod mounted set-up camera system drawing shown in FIG. 27 are identified as follows: 1 is a high definition camera. 2 is a high definition camera. 3 is a camera fish eye lens. 4 is a camera fish eye lens. 5 is a high speed USB cable. 6 is a high speed USB cable. 7 is a camera dc power cable. 8 is a camera dc power cable. 9 is a dc power supply hub. 10 is a high speed USB hub. 11 is a rechargeable battery pack. 12 is a laptop computer dc power cable. 13 is a high speed laptop computer USB cable. 14 is a dc power cable. 15 is a dc power cable USB hub. 16 is a laptop computer. 17 is a special system software package.

FIG. 27 is a block diagram showing the signal and data flows circuits in the tripod mounted set-up camera system shown in FIG. 26.

Referring to FIG. 27, in a preferred embodiment, the signal and data flows circuits that comprise the tripod mounted set-up camera system shown in FIG. 26, are disclosed. 1 and 2 are two independent cameras identical in function to those located inside the instrumented football's instrumentation package assembly. 1 and 2 are also provided with Fish eye lenses 3 and 4 that may be utilized by the system software 17 whilst the set-up camera system is in operation.

High-speed USB cables 5 and 6 are used to interconnect 1 and 2 with high-speed USB hub 10. In order to enable automated positioning of 1 and 2 under the control of 17, a motorized tripod mount 11 is connected via high-speed USB cable 15 to 10.

A laptop computer 16 is connected to 10 via high-speed USB cable 13. During operation, 10 behaves as a junction box for 16. Since most laptop computers posses a maximum of two USB ports, 10 is needed. When the system is in operation, 17 may issue control commands to 1, 2 and 11. These control commands from 17 is conveyed between 16, 1, 2 and 11 using 5, 6, 10, 13 and 15 respectively. Photographic images captured by 1 and 2 are transferred to 16 via 5, 6, and 13 for further processing, storage and future use by the remote base station system software.

The set-up camera system is equipped with a high-capacity metal-hydride rechargeable battery pack 9. During operation, 9 supplies electrical power to 1, 2, 10, and 11. Back-up power for 16 is also provided by 9. Multi-pin dc power cables 7, 8, 12 and 14 are used to connect 9 to 1, 2, 10 and 16 respectively. 9 is recharged whenever necessary by small switching power supply 18.

18 is used to convert utility mains power to that utilized by 9 while being recharged.

Referring to the Preferred Embodiments Specified in FIG. 27, the Tripod Mounted Set-Up Camera Signal and Data Flow Circuits Satisfy all of the Following Further Objectives:

It is an objective of the present invention that the tripod mounted set-up camera system signal and data flow circuits consist of two high definition cameras, two fish eye camera lenses, two high speed USB cables, two camera dc power cables, dc power supply hub, high speed USB hub, a rechargeable battery pack, a laptop computer dc power cable, a high speed laptop computer USB cable, dc power cables, dc power cable USB hub, a laptop computer, and a special system software package.

FIG. 28A and FIG. 28B

The detailed physical elements disclosed in the hand-held remote control unit drawings shown in FIG. 28A and FIG. 28B are identified as follows: 1 is a hand-held remote control unit for the instrumented football. 2 is a 250 kHz induction coil. 3 is a multi function toggle switch. 4 is a LED/visual indicator. 5 is a handle. 6 is a rechargeable battery pack. 7 is a horizontal centerline of the hand-held remote control.

FIG. 28A shows a side view a hand-held remote control unit.

FIG. 28B shows a top view of a hand-held remote control unit.

Referring to drawings FIG. 28A and FIG. 28B, in a preferred embodiment, a hand-held remote control unit used to enable and disable the instrumentation package assembly mounted inside the instrumented football, is disclosed. 1 is a hand-held remote control unit used to enable and disable the instrumentation package assembly mounted inside the instrumented football. 2 is a 250 kHz induction coil used to magnetically couple the administrative/control data signals to and from the instrumentation package assembly mounted inside the instrumented football. The administrative/control data signals consist of control commands and status information that enable the field personnel to manipulate the various functions inside the instrumentation package assembly i.e. camera operating parameters, and obtain status information on the condition of the instrumentation package assembly i.e. battery life. The administrative/control data signals are also used to enable and disable the operation of the instrumentation package assembly inside the instrumented football, and to designate the desired wireless radio frequency. The administrative data link is accessible using either the 250 kHz coupling or the wireless capability of the instrumentation package assembly. 3 is a multi function toggle switch used to activate and deactivate the instrumentation package assembly mounted inside the instrumented football. 4 is a LED/visual indicator used to indicate the status of the instrumentation package assembly mounted inside the instrumented football, and the status of the battery inside 1. 5 is a handle used to be held by field personnel to hold the hand held remote control unit physically against the instrumented football. 6 is a rechargeable battery pack located inside the hand held remote control unit. 7 is a horizontal centerline of the hand-held remote control which lines up with the centerline of the instrumented football when the hand held remote control unit is placed physically against the instrumented football.

The administrative data link referenced in FIG. 28A and FIG. 28B is a bi-directional communications path over which control commands, as well as status data between the instrumented sports paraphernalia and the remote base station are conveyed. These commands and/or status data consist of data packets or streams that are independent in function of those that are used to convey image and/or sound information to the remote base station but share the same communications transport mechanism overall This communications transport mechanism is formed whenever the microprocessor within the instrumented sports paraphernalia communicates with the remote base station over the particular mode of communications connectivity that the stadium has been equipped for i.e. fiber optics, copper cable or wireless radio.

This microprocessor is connected via an I/O port to the network transceiver within the instrumented sports paraphernalia and periodically monitors this port for activity.

When a data stream arrives at this port from the remote base station, the microprocessor executes a series of instructions contained in ROM in such a way that it will respond and act only on those commands that are correctly identified based on a unique identification integer code present in the signal that immediately precedes the control data stream contents. If the stream is identified as valid the microprocessor will execute the received command as determined by the firmware stored in ROM and transmit a status data acknowledgement to the remote base station Status data received by the remote base station transceiver is handled in a manner similar to that of the instrumented sports paraphernalia as previously described.

When the remote base station transceiver intercepts an appropriately coded transmission over the particular mode of communications connectivity that the stadium has been equipped for i.e. fiber optics, copper cable or wireless radio, it will respond and act on it in the manner determined by the communications handling provisions of the special software running on the associated computer at the remote base station.

Referring to the Preferred Embodiments Specified in FIG. 28A and FIG. 28B, the Hand-Held Remote Control Unit Satisfies all of the Following Objectives:

It is an objective of the present invention that the hand-held remote control unit is composed of a hand-held remote control unit for the instrumented football, a 250 kHz induction coil, a multi function toggle switch, an LED/visual indicator, a handle, and a rechargeable battery pack.

It is an objective of the present invention to provide a hand-held remote control unit to enable and disable the instrumentation package assembly mounted inside the instrumented football. It is an objective of the present invention to provide a hand-held remote control unit with a 250 kHz induction coil used to magnetically couple or wirelessly link the administrative/control data signals to and from the instrumentation package assembly mounted inside the instrumented football. It is an objective of the present invention to provide a hand-held remote control unit that sends administrative/control data signals that consist of control commands and status information that enable the field personnel to manipulate the various functions inside the instrumentation package assembly i.e. camera operating parameters, and obtain status information on the condition of the instrumentation package assembly i.e. battery life. It is an objective of the present invention to provide a hand-held remote control unit that sends administrative/control data signals to enable and disable the operation of the instrumentation package assembly inside the instrumented football, and to designate the desired wireless radio frequency. It is an objective of the present invention to provide a hand-held remote control unit with a multi function toggle switch used to activate and deactivate the instrumentation package assembly mounted inside the instrumented football. It is an objective of the present invention to provide a hand-held remote control unit with a LED/visual indicator used to indicate the status of the instrumentation package assembly mounted inside the instrumented football, and the status of the battery. It is an objective of the present invention to provide a hand-held remote control unit with a handle to be held by field personnel to hold the hand held remote control unit physically against the instrumented football. It is an objective of the present invention to provide a hand-held remote control unit with a rechargeable battery pack located inside the hand held remote control unit. It is an objective of the present invention to provide a hand-held remote control unit with an administrative data link that is a bi-directional communications path over which control commands, as well as status data between the instrumented sports paraphernalia and the remote base station are conveyed, where the data consists of data packets or streams that are independent in function from those that are used to convey image and/or sound information to the remote base station but share the same communications transport mechanism overall It is an objective of the present invention to provide a hand-held remote control unit with a communications transport mechanism formed whenever the microprocessor within the instrumented sports paraphernalia communicates with the remote base station over the particular mode of communications connectivity that the stadium has been equipped for i.e. fiber optics, copper cable or wireless radio. It is an objective of the present invention to provide a hand-held remote control unit with a microprocessor connected via an I/O port to the network transceiver within the instrumented sports paraphernalia and periodically monitors this port for activity. It is an objective of the present invention to provide a hand-held remote control unit with a microprocessor that executes a series of instructions contained in ROM in such a way that it will respond and act only on those commands that are correctly identified based on a unique identification integer code present in the signal that immediately precedes the control data stream contents. It is an objective of the present invention to provide a hand-held remote control unit with a microprocessor that will execute the received command as determined by the firmware stored in ROM and transmit a status data acknowledgement to the remote base station when it receives a data stream that is identified as valid. It is an objective of the present invention to provide a hand-held remote control unit where the status data it receives from the remote base station transceiver is handled in a manner similar to that of the instrumented sports paraphernalia. It is an objective of the present invention to provide a hand-held remote control unit which when the remote base station transceiver intercepts an appropriately coded transmission over the particular mode of communications connectivity that the stadium has been equipped for i.e. fiber optics, copper cable or wireless radio, it will respond and act on it in the manner determined by the communications handling provisions of the special software running on the associated computer at the remote base station. It is an objective of the present invention to provide a hand-held remote control unit capable of wirelessly interrogating the status of the instrumented sports paraphernalia.

FIG. 29

The detailed physical elements disclosed in the hand-held remote control unit signal and data flow circuits drawing in FIG. 29 are identified as follows: 1 is a small switching power supply. 2 is a lithium-ion battery pack. 3 is a frequency converter. 4 is an induction coil. 5 is a microprocessor. 6 is a multi function toggle switch. 7 is a ROM—read only memory. 8 is a light emitting diode visual indicator. 9 is an audio transducer. 10 is a RAM random access memory.

FIG. 29 is a block diagram showing the signal and data flow circuits inside the hand-held remote control unit in FIG. 28A and FIG. 28B.

Referring to drawing FIG. 29, in a preferred embodiment, the signal and data flow circuits inside the hand-held remote control unit in FIG. 28A and FIG. 28B, are disclosed. A small switching power supply 1 is shown. 1 is used to recharge the lithium-ion battery pack 2 of the hand-held remote electronics package. This allows the hand-held remote to be used more conveniently and free of utility mains whilst activating or deactivating a instrumented football containing the instrumentation package assembly.

When 2 is sufficiently charged, low voltage dc power to operate frequency converter 3 and microprocessor 5 is available. By momentarily depressing multi-position toggle switch 6, 5 will initiate a boot-up sequence and load a firmware image stored at the time of manufacture on ROM 7 into RAM 10. If at the same time, whilst 6 is being depressed, induction coil 4 is placed in a position with sufficiently close contact to either end of the instrumented football containing the instrumentation package assembly then 5 will transmit an encoded signal command at a frequency near 250 kHz via 3 and 4 respectively to query the electronic identification number that is stored within the firmware ROM of the instrumentation package assembly. This step is necessary to eliminate the problems associated with unwanted interference from neighboring sources of radio frequencies that might otherwise occur resulting in the false activation or deactivation of said instrumented football(s).

Once 5 has successfully queried and received the said instrumented football's electronic identification number as mentioned previously, status light emitting diode display 8 is illuminated briefly following a short confirmation tone sounded by audio transducer 9 via a command from 5. At such time activation or deactivation of the instrumented football may be performed by again momentarily depressing 6 to the desired function whilst continuing to hold 4 in close contact with the desired end of said instrumented football and awaiting confirmation of the operation by a visual indication from 8. If no further operation is performed or 4 is moved a significant distance away from the end of the instrumented football for a time-out period previously loaded into 10, 5 will subsequently enter the self-shutdown sequence loaded in 10 placing the hand-held remote into a powered off state thus preserving the lifespan of 2.

In the event that an attempt to activate or deactivate said instrumented football is made while the instrumentation package assembly or the battery on-board said package is in a damaged, weakened or sub-discharged state, upon receiving such status data from the instrumentation package assembly 5 will alert personnel to this important condition by visual and audible indications from 8 and 9 respectively. This step will prevent field personnel from inadvertently using a instrumented football in need of attention by service personnel.

Referring to the Preferred Embodiments Specified in FIG. 29, the Hand-Held Remote Control Unit Satisfies all of the Following Further Objectives:

It is an objective of the present invention that the hand-held remote control unit circuits be composed of a small switching power supply, a lithium-ion battery pack, a frequency converter, an induction coil, a microprocessor, a multi function toggle switch, a ROM—read only memory, a light emitting diode visual indicator, an audio transducer, and a RAM random access memory. It is an objective of the present invention to provide a hand-held remote control unit circuit where by momentarily depressing a multi-position toggle switch it will initiate a boot-up sequence and load a firmware image stored at the time of manufacture on ROM into RAM. It is an objective of the present invention to provide a hand-held remote control unit circuit where if at the same time the multi-position toggle switch is being depressed, the induction coil is placed in a position with sufficiently close contact to either end of the instrumented football containing the instrumentation package assembly, then 5 will transmit an encoded signal command at a frequency near 250 kHz and respectively query the electronic identification number that is stored within the firmware ROM of the instrumentation package assembly. It is an objective of the present invention to provide a hand-held remote control unit circuit where once the microprocessor has successfully queried and received the instrumented football's electronic identification number, a status light emitting diode display is illuminated briefly following a short confirmation tone sounded by audio transducer via a command from microprocessor. It is an objective of the present invention to provide a hand-held remote control unit circuit where an attempt to activate or deactivate the instrumented football is made while the instrumentation package assembly or the battery on-board is in a damaged, weakened or sub-discharged state, upon receiving such status data from the instrumentation package assembly the microprocessor will alert personnel to this important condition by visual and audible indications from the light emitting diode visual indicator and an audio transducer. It is an objective of the present invention to provide a hand-held remote control unit circuits comprised of a small switching power supply, a lithium-ion battery pack, a frequency converter, an induction coil, a microprocessor, a multi function toggle switch, a ROM—read only memory, a light emitting diode visual indicator, an audio transducer, and a RAM random access memory.

FIG. 30

The detailed physical elements disclosed in the hand-held remote control unit and instrumented football drawing shown in FIG. 30 are identified as follows: 1 is an inductively coupled hand-held remote control unit. 2 is an inductive coil. 3 is a toggle switch. 4 is a light emitting diode. 5 is a rechargeable lithium ion battery. 6 is an instrumented football. 7 is the instrumented football centerline.

FIG. 30 is a side view of the hand-held remote control unit and the instrumented football.

Referring to drawing FIG. 30, in a preferred embodiment, the hand held control unit inductively coupled to and controlling the instrumented football, is disclosed. The inductively coupled hand-held remote unit 1 is used to activate and/or deactivate the instrumentation package assembly inside the instrumented football 6. 1 allows field personnel to conveniently and efficiently place the instrumented football camera system into operation as well as perform field-side testing of the instrumentation package assembly's batteries without the need to open the instrumented football.

When personnel wish to place 6 into operation or perform such testing as previously described a means of communication between 1 and the instrumentation package assembly inside 6 must first be established. This is accomplished by placing inductive coil 2 in close contact with either end of 6 as shown in FIG. 30 and simultaneously depressing toggle switch 3 momentarily. This momentary switch action causes the circuits inside 1 to energize via dc power supplied by rechargeable lithium ion battery 5 and establish a data communication link between themselves and the instrumentation package assembly inside 6 via 2 using a frequency modulated carrier operating near 250 kHz. 5 may be charged by a wall type power pack whenever 1 is not in service.

Confirmation that this data communication link has been properly established is provided audibly and visually by light emitting diode 4 and an internal audible transducer within 1. Once confirmation that the 6 has been placed in such an activated state by 1, communication between 6 and the remote base station: i.e. photographs and sound may be commenced.

Following a typical football game, 1 may also be used to de-activate 6 as desired by field side personnel thus inhibiting any further broadcasting of 6 by depressing 3 to the appropriate position momentarily whilst 6 is placed in close proximity to 2.

Referring to the Preferred Embodiments Specified in FIG. 30, the Hand-Held Remote Control Unit Satisfies all of the Following Objectives:

It is an objective of the present invention that the hand-held remote control unit be composed of a small switching power supply, a battery pack, a frequency converter, an induction coil, a microprocessor, a multi function toggle switch, a ROM—read only memory, a light emitting diode visual indicator, an audio transducer, and a RAM random access memory. It is an objective of the present invention to provide a hand-held remote control unit that by inductive coupling can control the instrumented football. It is an objective of the present invention to provide a hand-held remote control unit to activate and/or deactivate the instrumentation package assembly inside the instrumented football. It is an objective of the present invention to provide a hand-held remote control unit that allows field personnel to conveniently and efficiently place the instrumented football camera system into operation as well as perform field-side testing of the instrumentation package assembly's batteries without the need to open the instrumented football.

It is an objective of the present invention to provide a hand-held remote control unit which permits personnel to place the instrumentation package assembly into operation or perform testing. It is an objective of the present invention to provide a hand-held remote control unit which establishes a means of communication between the hand-held remote control unit and the instrumentation package assembly by placing the hand-held remote control unit inductive coil in close contact with either end of the instrumented football and simultaneously depressing the toggle switch momentarily. It is an objective of the present invention to provide a hand-held remote control unit which causes the circuits inside the instrumented football to energize via dc power supplied by its rechargeable lithium ion battery and establish a data communication link between the instrumentation package assembly and the hand-held remote control unit using a frequency modulated carrier operating near 250 kHz. It is an objective of the present invention to provide a hand-held remote control unit which visibly and audibly indicates that the instrumented football has been placed in an activated state and that data communication link between the instrumented football and the remote base station has been properly established. It is an objective of the present invention to provide a hand-held remote control unit which following a typical football game, may also be used to de-activate the instrumented football as desired by field side personnel thus inhibiting any further broadcasting by the instrumented football.

FIG. 31

The detailed physical elements disclosed in the instrumented football charging station unit drawing shown in FIG. 31 are identified as follows: 1 is the charging station unit for the instrumented football. 2 is the instrumented football containing the instrumentation package assembly. 3 is the charging station drawer side. 4 is the charging station unit drawer front. 5 is the charging station unit drawer bottom which is shown parallel to the ground. 6 is the football guide and holding mechanism for the instrumented football—right side. 7 is the football guide and holding mechanism for the instrumented football—left side. 8 is the charging station induction coil—left side. 9 is the charging station unit induction coil—right side. 10 is the instrumentation package assembly induction coil—right side. 11 is the instrumentation package assembly induction coil—left side. 12 is the instrumentation package assembly. 13 is the vertical axis of the instrumented football and is perpendicular to the ground. 14 is long axis of the instrumented football 2 and is parallel to the ground. 15 is the instrumented football's camera window aperture—left side. 16 is the instrumented football's camera window aperture—right side. 17 is the top of the instrumented football showing the laces on top. 18 is the charging station human interface control panel. 19 is the human interface data entry keypad. 20 is the master power switch. 21 is the charging station drawer release switch. 22 is the audible signaling device. 23 is the human interface status LCD. 24 is the external data storage and USB Panel. 25 is the SMIC memory card slot. 26 is the USB port #1. 27 is the USB port #2. 28 is the charging station main chassis. 29 is the 19" rack mount ears.

FIG. 31 is an isometric view showing the instrumented football being charged inside the charging station unit.

Referring to drawing FIG. 31, in a preferred embodiment, a charging station unit is disclosed. The charging station unit is a means used to provide a supply of wireless electrical power to charge the battery pack within the instrumented football's instrumentation package assembly quickly, conveniently, reliably and safely from a source external to the instrumented football. This means is called the charging station unit.

The charging station 1 is designed to easily hold the instrumented football 2; and allow charging, recharging and/or perform comprehensive software assisted diagnostic testing of a single instrumented football 2 equipped with an instrumentation package assembly 12, by field personnel in a typical broadcast or sports environment. Another preferred embodiment has the ability to simultaneously handle instrumented footballs in multiple quantities.

The instrumented football 2 is shown mounted horizontally in the draw 4 of the charging station 1. The long axis 14 of the instrumented football is parallel to the ground. 1 is utilized by placing 2 into a specially constructed electromagnetically shielded drawer comprised of sides 3, front 4 and bottom 5. The instrumented football is held between two cylindrical spring loaded guides and holding mechanisms 6 and 7 on the right and left ends of the instrumented football, such that the left and right air core induction coils 8 and 9 that are wound on the holding mechanisms coaxially encircle the left and right side induction coils 10 and 11 of 12. The left and right air core induction coils 8 and 9, inductively couple electricity into induction coils 10 and 11 of 12 to charge the battery pack in the instrumentation package assembly 12.

To aid and facilitate the easy and efficient use of 1 by personnel, 6 and 7 are further designed to provide optical test pattern targets that ensure proper alignment between the instrumentation package assembly 12 cameras and windows 15 and 16, and the vertical axis 13, and the horizontal optical axis 14 of 1.

This feature set provides 1, in addition to battery charging, a powerful means of quickly assessing the overall operating condition and optical quality of 12 inside of 2 without the need to remove 12 from 2.

When 1 is placed in operation, the commands which instruct the software within 1 to initialize power-up and execute its various operations and diagnostic routines may be issued by personnel through the use of the human interface control panel 18 via direct data entry keypad 19. Mains power to 1 is controlled by personnel via master power switch 20. Additionally 20 also operates a soft-start-stop configuration in conjunction with the internal software instructions of 1 that inhibits critical functions from commencing until several software and hardware fail-safe protocol have been satisfied. This feature ensures extended battery life of 12 and greatly reduces the possibility of embarrassment to field personnel should a defect with 12 exist.

Drawer release switch 21 may be used by the operator to manually open and/or close 3,4 and 5 as desired whenever 2 is to be inserted or removed from 1. Alternately, 21 may also be actuated automatically by the software internal to 1 if desired by personnel, thus allowing unattended operation.

In the event the during diagnostic testing a defect is found with 12, the software internal to 1 will sound a loud audible warning via audible signaling device 22 and also provide a visual indication to personnel via Human Interface Status LCD 23.

23 is a high-definition wide-screen format liquid crystal display capable of displaying all of the operational, fail-safe and diagnostic data—including real-time test pattern and/or stored video received from 12 whilst inserted in 3 of 1.

In some sporting events and training applications where real-time live transmission of photographic images received from 12 is impractical for any reason interrogation of the on-board C-MOS memory pack internal to 12 may be performed via 1.

These photographic images and/or Catalogue information relating to various parameters of 12 may be subsequently stored on a removable memory SMIC Card via SMIC card reader 25 and/or to a USB Card using either USB Port 26 or 27 respectively. Reviewing of Photographic images via 23 that were previously stored on said removable media may also be uploaded to the on-board memory of 12 to facilitate certain field tests where real-time photography is impractical.

If desired, a lap-top computer may be plugged into 26 or 27 giving personnel even greater cataloging, unsurpassed flexibility, system troubleshooting and data management possibilities—especially with large scale sports teams where many instrumented footballs equipped with an instrumentation package assembly exist.

In a typical Sports broadcasting and/or training environment it is well recognized that this type of environment may subject 1 to considerable abuse during normal periods of use—thus the main chassis 28 of 1 incorporates sturdy and rugged all metal construction wherever possible. Standard size Rack mounting ears 29 permit 1 to be easily located within an equipment van or portable cart suitable for use by sports personnel.

During the charging operation of an instrumented football containing the instrumentation package assembly, the instrumented football is placed into the charging station unit in such a way as to permit 6 and 7 to convey power wirelessly and non-intrusively to the receiving induction coils 10 and 11 located within the instrumented football's instrumentation package assembly, thus allowing it's batteries to be charged conveniently, reliably and safely.

Due to that fact that rechargeable batteries of the kind primarily used, by the instrumented football's instrumentation package assembly, can be made otherwise inoperative by under and/or over-charging, 12 within 9 incorporates several failsafe parameters amongst it's programming structure.

While the charging station is in use, these failsafe parameters allow 9 to monitor an administrative and control data link containing failsafe status information established between 9 and the football's instrumentation package assembly via 5, 6, 7 and 8 respectively. Should and event occur where one of these failsafe parameters is breached, a timely shutdown of the system will follow, thus protecting the instrumented football's system's batteries from catastrophic destruction.

The administrative data link referenced above is a bi-directional communications path over which control commands, as well as status data between the instrumented sports paraphernalia and the remote base station are conveyed. These commands and/or status data consist of data packets or streams that are independent in function of those that are used to convey image and/or sound information to the remote base station but share the same communications transport mechanism overall This communications transport mechanism is formed whenever the microprocessor within the instrumented sports paraphernalia communicates with the remote base station over the particular mode of communications connectivity that the stadium has been equipped for i.e. fiber optics, copper cable or wireless radio.

This microprocessor is connected via an I/O port to the network transceiver within the instrumented sports paraphernalia and periodically monitors this port for activity.

When a data stream arrives at this port from the remote base station, the microprocessor executes a series of instructions contained in ROM in such a way that it will respond and act only on those commands that are correctly identified based on a unique identification integer code present in the signal that immediately precedes the control data stream contents. If the stream is identified as valid the microprocessor will execute the received command as determined by the firmware stored in ROM and transmit a status data acknowledgement to the remote base station. Status data received by the remote base station transceiver is handled in a manner similar to that of the instrumented sports paraphernalia as previously described. When the remote base station transceiver intercepts an appropriately coded transmission over the particular mode of communications connectivity that the stadium has been equipped for i.e. fiber optics, copper cable or wireless radio, it will respond and act on it in the manner determined by the communications handling provisions of the special software running on the associated computer at the remote base station. The administrative and control data link previously discussed operates within the same 250 KHZ radio frequency spectrum as 4 by passing a frequency modulated signal containing the administrative and control data between the charging station's coils 8 and 9 and the induction coils 11 and 10 located in the instrumented football's instrumentation package assembly. Whilst the system is in use, 5 behaves as a mediator coordinating the complex transmit and receive functions in a manner similar to a pair of walkie-talkies in simplex mode. In addition to failsafe parameters, the administrative and control data link also contains information such as battery charging status, remaining lifespan and overall condition as well as fault warnings from the instrumented football's instrumentation package assembly that may be of interest to the recharging station operator. A visual human interface panel 10 is connected to 9 to display this information. At the discretion of the charging station operator, a human interface entry panel 11, also connected to 9, may be used to initialize, start, and stop the charging process. At anytime he or she may also perform interrogative diagnostic tests of the instrumented football's instrumentation package assembly such as battery condition monitoring, length of charge remaining, instrumented football's instrumentation package assembly serial number, charge logging, etc.

Referring to the Preferred Embodiments Specified in FIG. 31, the Football Charging Station Unit Satisfies all of the Following Objectives:

It is an objective of the present invention that the football charging station unit be composed of a drawer side, drawer front, drawer bottom, guide and holding mechanism for the right and left side, station induction coil—left side, induction coil—right side, charging station human interface control panel, human interface data entry keypad, master power switch, drawer release switch, audible signaling device, human interface status LCD, external data storage and USB Panel, SMIC memory card slot, USB port #1, USB port #2, main chassis, and 19" rack mount ears. It is an objective of the present invention to provide a means to wirelessly supply electrical power to charge the battery within the instrumented football's instrumentation package assembly quickly, conveniently, reliably and safely from a source external to the instrumented football and keep the instrumented footballs fully charged. It is an objective of the present invention to wirelessly command and control the operation of the power supply within the football's instrumentation package assembly from the charging station unit during the charging operation. It is an objective of the present invention to provide a football charging station unit to easily hold the instrumented football, allow charging, recharging and/or perform comprehensive software assisted diagnostic testing of a single instrumented football. It is an objective of the present invention to provide a football charging station unit which can be loaded with an instrumented football by field personnel in a typical broadcast or sports environment. It is an objective of the present invention to provide a football charging station unit which has the ability to simultaneously handle the charging, recharging and/or perform comprehensive software assisted diagnostic testing of instrumented footballs in multiple quantities. It is an objective of the present invention to provide a football charging station unit which holds the instrumented football between two cylindrical spring loaded guides and holding mechanisms on the right and left ends of the instrumented football, such that the left and right air core induction coils that are wound on the holding mechanisms coaxially encircle the left and right side induction coils of the instrumented football to inductively couples electricity into instrumented football's induction coils to charge the battery pack in its instrumentation package assembly. It is an objective of the present invention to provide a football charging station unit which provides optical test pattern targets that are used to test and ensure proper optical alignment between the instrumentation package assembly cameras and windows. It is an objective of the present invention to provide a football charging station unit with means of quickly assessing the overall operating condition and optical quality of the instrumentation package assembly inside the instrumented football without the need to remove it from the instrumented football. It is an objective of the present invention to provide a football charging station unit where the commands which instruct the software within the instrumented football to initialize power-up and execute its various operations and diagnostic routines may be issued by personnel through the use of the human interface control panel via the direct data entry keypad. It is an objective of the present invention to provide a football charging station unit which is controlled by personnel to operate a soft-start-stop configuration in conjunction with its internal software instructions that inhibits critical functions from commencing until several software and hardware fail-safe protocols have been satisfied. It is an objective of the present invention to provide a football charging station unit which if during diagnostic testing of the instrumented football it finds a defect; its software will sound a loud audible warning and provide a visual indication to personnel via the human interface status LCD. It is an objective of the present invention to provide a football charging station unit which can interrogate the on-board C-MOS memory pack internal to the instrumentation package assembly. It is an objective of the present invention to provide a football charging station unit which can store photographic images and/or catalogue information relating to various parameters of the instrumentation package on a removable memory SMIC Card via the SMIC card reader and/or a USB Card using either USB Port respectively. It is an objective of the present invention to provide a football charging station unit with a lap-top computer to give greater cataloging, unsurpassed flexibility, and system troubleshooting and data management capabilities. It is an objective of the present invention to provide a football charging station unit which while the charging station is in use, has failsafe parameters that allow its charging coils to monitor an administrative and control data link containing failsafe status information established between the charging coils and the instrumented football's instrumentation package assembly. It is an objective of the present invention to provide a football charging station unit which will shut down when a failsafe parameter is breached. It is an objective of the present invention to provide a football charging station unit that has an administrative data link which is a bi-directional communications path over which control commands, as well as status data between the instrumented sports paraphernalia and the remote base station are conveyed. It is an objective of the present invention to provide a football charging station unit which has an administrative and control data link, which operates within the 250 KHZ radio frequency spectrum that passes frequency modulated signals containing the administrative and control data between the charging station's coils and the induction coils located in the instrumented football's instrumentation package assembly. It is an objective of the present invention to provide a football charging station unit which has an administrative and control data link that contains information such as battery charging status, remaining lifespan and overall condition as well as fault warnings from the instrumented football's instrumentation package assembly that may be of interest to the recharging station operator. It is an objective of the present invention to provide a football charging station unit which can perform interrogative diagnostic tests of the instrumented football's instrumentation package assembly such as battery condition monitoring, length of charge remaining, instrumented football's instrumentation package assembly serial number, charge logging, etc.

FIG. 32

Figure 32:
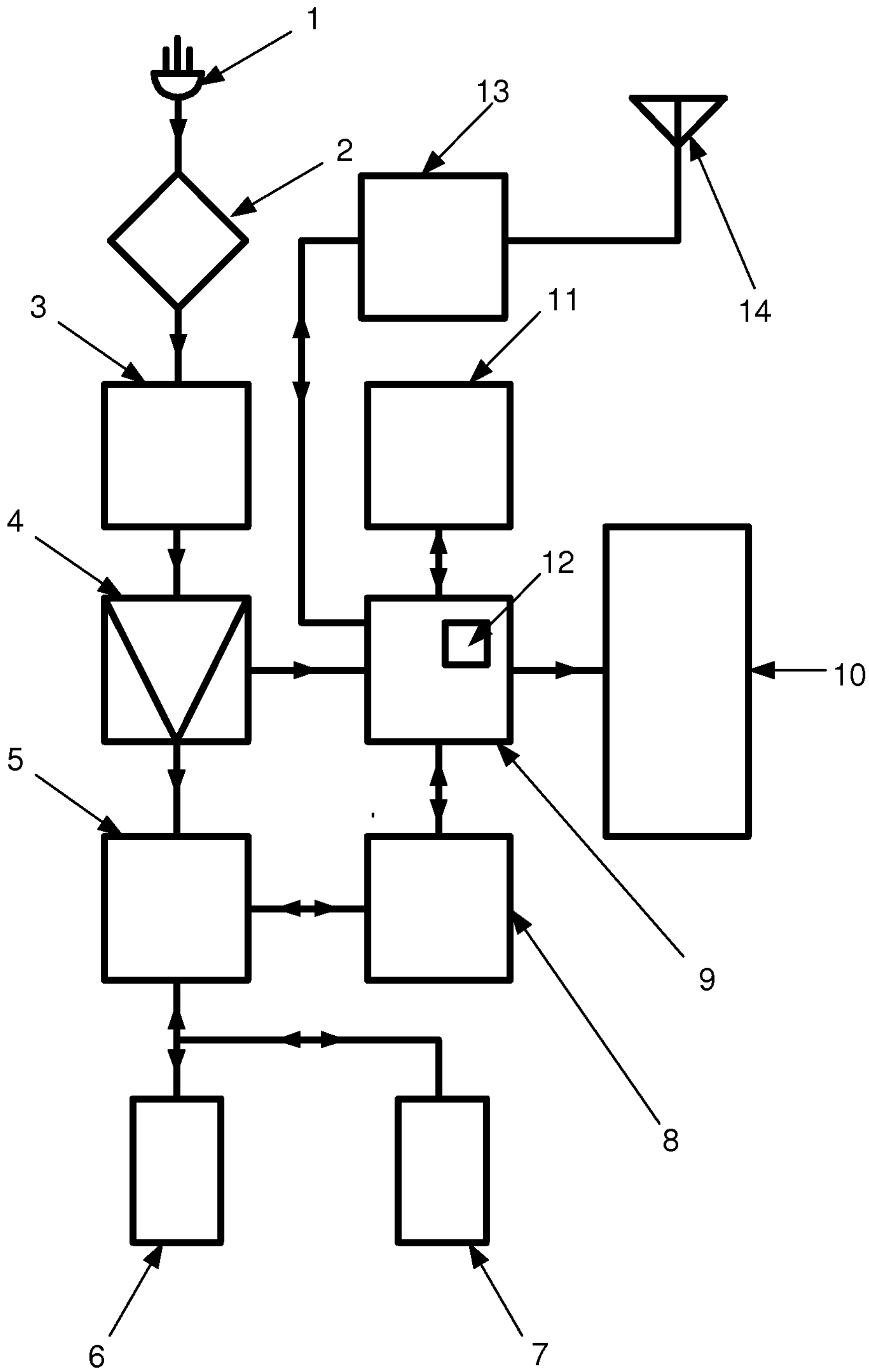
FIG. 32 is a block diagram showing the signal and data flow circuits inside the charging station unit shown in FIG. 31.

The detailed physical elements disclosed in the charging station signal and data flow circuits drawing shown in FIG. 32 are identified as follows: 1 is the mains power electric plug. 2 is the rectifier bridge. 3 is the filter capacitor network. 4 is the frequency converter. 5 is the impedance matching and switching network. 6 is the charging station induction coil. 7 is the charging station induction coil. 8 is the administrative data transceiver. 9 is the microprocessor. 10 is the visual human LCD interface panel. 11 is the human interface data entry keypad panel. 12 is a firmware image.

FIG. 32 is a block diagram showing the signal and data flow circuits inside the charging station unit shown in FIG. 31.

Referring to drawing FIG. 32, in a preferred embodiment, the charging station signal and data flow circuits, are disclosed. 1 shows an electric plug used to supply ac mains power to the football charging station. When 1 is connected to a live electrical receptacle, ac mains power is supplied to full-wave rectifier bridge 2. The output of 2 supplies pulsating dc current to filter capacitor network 3. After removing most of the ripple content, a current at approximately 200 volts dc from 3 is fed to the input of frequency converter 4. A high frequency standard of approximately 250 kHz is produced and power amplified by 4 and is subsequently applied to impedance matching and switching network 5. A modest amount of low voltage dc power to operate microprocessor 9 is also supplied by 4. Onboard non-volatile system read only memory within 9 contains a firmware image 12 that is loaded during boot-up time when mains power to the system is first applied. 12 via 9 manages the charging station's operation such that by a command from 9, 5 via administrative data transceiver 8 will convey 250 kHz power produced by 4 to the charging station induction coils 6 and 7.

In 1 FIG. 32 shows an electric plug used to supply ac mains power to the football charging station. When 1 is connected to a live electrical receptacle ac mains power is supplied to full-wave rectifier bridge 2. The output of 2 supplies pulsating dc current to filter capacitor network 3. After removing most of the ripple content, a current at approximately 200 volts dc from 3 is fed to the input of frequency converter 4. A high frequency standard of approximately 250 kHz is produced and power amplified by 4 and is subsequently applied to impedance matching and switching network 5. A modest amount of low voltage dc power to operate microprocessor 9 is also supplied by 4. Onboard non-volatile system read only memory within 9 contains a firmware image 12 that is loaded during boot-up time when mains power to the system is first applied. 12 via 9 manages the charging station's operation such that by a command from 9, 5 via administrative data transceiver 8 will convey 250 kHz power produced by 4 to transmitter coils 6 and 7.

During the charging operation of a football containing the instrumentation package assembly, the said football is placed into the charging station in such a way as to permit 6 and 7 to convey power wirelessly and non-intrusively to the receiving coils located within the football camera instrumentation package, thus allowing it's batteries to be recharged conveniently, reliably and safely.

Due to that fact that rechargeable batteries of the kind primarily used, by the football camera instrumentation package, can be made otherwise inoperative by under and/or overcharging, 12 within 9 incorporates several failsafe parameters amongst it's programming structure.

While the recharging station is in use, these failsafe parameters allow 9 to monitor an administrative and control data link containing failsafe status information established between 9 and the football camera instrumentation package via 5, 6, 7 and 8 respectively. Should and event occur where one of these failsafe parameters is breached, a timely shutdown of the system will follow, thus protecting the football camera system's batteries from catastrophic destruction.

The administrative data link referenced above is a bi-directional communications path over which control commands, as well as status data between the instrumented sports paraphernalia and the remote base station are conveyed. These commands and/or status data consist of data packets or streams that are independent in function of those that are used to convey image and/or sound information to the remote base station but share the same communications transport mechanism overall This communications transport mechanism is formed whenever the microprocessor within the instrumented sports paraphernalia communicates with the remote base station over the particular mode of communications connectivity that the stadium has been equipped for i.e. fiber optics, copper cable or wireless radio.

This microprocessor is connected via an I/O port to the network transceiver within the instrumented sports paraphernalia and periodically monitors this port for activity.

When a data stream arrives at this port from the remote base station, the microprocessor executes a series of instructions contained in ROM in such a way that it will respond and act only on those commands that are correctly identified based on a unique identification integer code present in the signal that immediately precedes the control data stream contents. If the stream is identified as valid the microprocessor will execute the received command as determined by the firmware stored in ROM and transmit a status data acknowledgement to the remote base station Status data received by the remote base station transceiver is handled in a manner similar to that of the instrumented sports paraphernalia as previously described.

When the remote base station transceiver intercepts an appropriately coded transmission over the particular mode of communications connectivity that the stadium has been equipped for i.e. fiber optics, copper cable or wireless radio, it will respond and act on it in the manner determined by the communications handling provisions of the special software running on the associated computer at the remote base station.

The administrative and control data link previously discussed operates within the same 250 kHz radio frequency spectrum as 4 by passing a frequency modulated signal containing the administrative and control data between the recharging station's coils 6 and 7 and those located inside the football's instrumentation package assembly. Whilst the system is in use 5 behaves as a mediator coordinating the complex transmit and receive functions in a manner similar to a pair of walkie-talkies in simplex mode.

In addition to failsafe parameters, the administrative and control data link also contains information such as battery charging status, remaining lifespan and overall condition as well as fault warnings from the football's instrumentation package assembly that may be of interest to the recharging station operator. A visual human interface panel 10 is connected to 9 to display this information. At the discretion of the recharging station operator, a human interface entry panel 11, also connected to 9, may be used to initialize, start, and stop the recharging process. At anytime he or she may also perform interrogative diagnostic tests of the football camera instrumentation package such as battery condition monitoring, length of charge remaining, football's instrumentation package assembly serial number, charge logging, etc.

Referring to the Preferred Embodiments Specified in FIG. 32, the Football Charging Station Unit Electric Circuits Satisfy all of the Following Further Objectives:

It is an objective of the present invention that the charging station electric circuits be composed of a mains power electric plug, rectifier bridge, a filter capacitor network, a frequency converter, a impedance matching and switching network, two charging station induction coils, a administrative data transceiver, a microprocessor, a visual human LCD interface panel, a human interface data entry keypad panel, and a ROM firmware image. It is an objective of the present invention to provide a charging station with electric circuits that incorporate failsafe parameters amongst its programming structure. It is an objective of the present invention to provide a charging station with electric circuits to monitor an administrative and control data link containing failsafe status information established between the microprocessor and the football camera instrumentation package. It is an objective of the present invention to provide a charging station electric circuits to protect the football camera system's batteries from catastrophic destruction by implementing a timely shutdown of the system while the recharging station is in use, should an event occur where one of the failsafe parameters is breached. It is an objective of the present invention to provide a charging station electric circuits where the microprocessor executes a series of instructions contained in ROM only on those data stream commands from the remote base station that are correctly identified based on a unique identification integer code present in the signal that immediately precedes the control data stream contents, and then transmits a status data acknowledgement to the remote base station. It is an objective of the present invention that when the remote base station transceiver intercepts an appropriately coded transmission over the particular mode of communications connectivity that the stadium has been equipped for i.e. fiber optics, copper cable or wireless radio, it will respond and act on it in the manner determined by the communications handling provisions of the special software running on the associated computer at the remote base station. It is an objective of the present invention that the administrative and control data link operates within the same 250 kHz radio frequency spectrum as the frequency converter by passing a frequency modulated signal containing the administrative and control data between the recharging station's coils and those located inside the football's instrumentation package assembly.

It is an objective of the present inventions that while the system is in use the impedance matching and switching network behaves as a mediator coordinating the complex transmit and receive functions in a manner similar to a pair of walkie-talkies in simplex mode. It is an objective of the present invention that the administrative and control data link also contains information such as battery charging status, remaining lifespan and overall condition as well as fault warnings from the football's instrumentation package assembly that may be of interest to the recharging station operator. It is an objective of the present invention that the discretion recharging station operator can initialize, start, and stop the recharging process at anytime, and can perform interrogative diagnostic tests of the football instrumentation package assembly such as battery condition monitoring, length of charge remaining, football's instrumentation package assembly serial number, charge logging, etc.

Figure 33A:
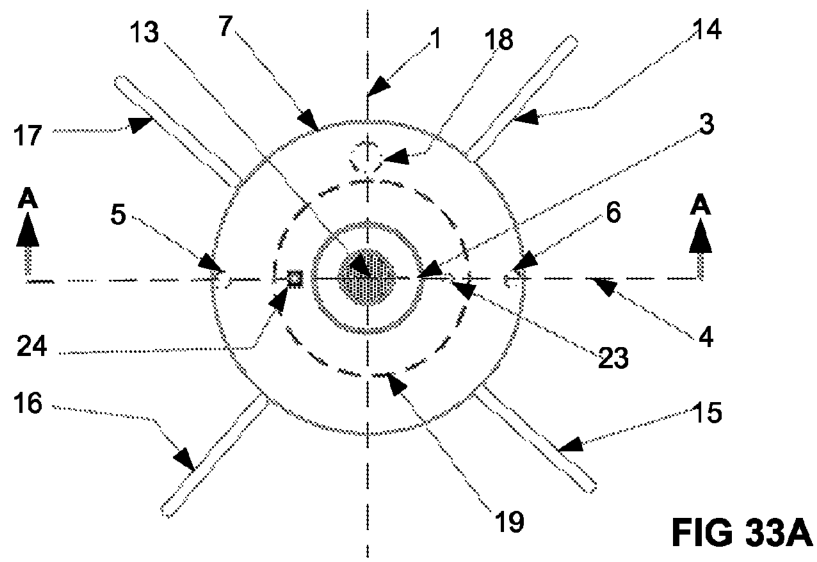
FIG. 33A is the top view of the one camera instrumentation package assembly.
Figure 33B:
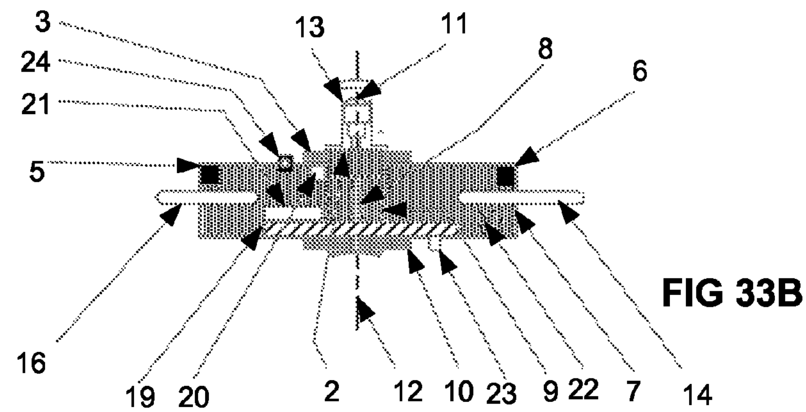
FIG. 33B is a side view of the one camera wireless instrumentation package assembly.
Figure 33C:
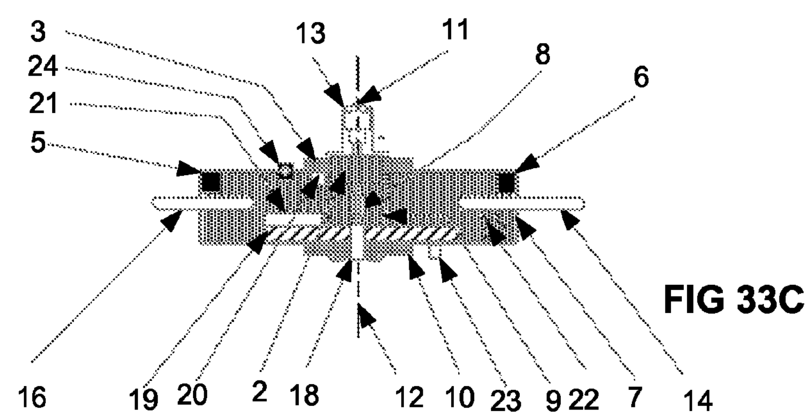
FIG. 33C is a side view of the one camera wireless, fiber optics and bi-directional high speed copper network communications instrumentation package assembly.

FIG. 33A and FIG. 33B and FIG. 33C

The detailed physical elements disclosed in the home plate and ice hockey puck instrumentation package assembly drawings shown in FIG. 33A and FIG. 33B and FIG. 33C are identified as follows: 1 is the y-axis of symmetry of the instrumentation package assembly. 2 is a camera. 3 is the top induction coil for charging the battery. 4 is the x-axis of symmetry of the instrumentation package assembly. 5 is a microphone. 6 is a microphone. 7 is the instrumentation package assembly. 8 is the electronics. 9 is an instrumentation package assembly element showing a corrugated bellows segment. 10 is the bottom induction coil for charging the battery. 11 is the camera lens. 12 is the z-axis of symmetry of the instrumentation package assembly. 13 is the camera lens seal. 14 is a radio antenna. 15 is a radio antenna. 16 is a radio antenna. 17 is a radio antenna. 18 is the fiber optics and copper cable connector. 19 is the bottom lid heat sink of the instrumentation package assembly. 20 is the camera and camera lens electro-mechanical actuating device. 21 is the battery. 22 is dry nitrogen gas. 23 is the gas valve. 24 is the microphone connector.

FIG. 33A is the top view of the one camera instrumentation package assembly.

FIG. 33B is a side view of the one camera wireless instrumentation package assembly.

FIG. 33C is a side view of the one camera wireless, fiber optics and bi-directional high speed copper network communications cable instrumentation package assembly.

Referring to drawings FIG. 33A and FIG. 33B and FIG. 33C, in two preferred embodiments, two different instrumentation package assemblies, are disclosed. The present invention contemplates each instrumentation package assembly to be equipped with a single TV camera, a TV camera lens, and two microphones, supporting electronics, battery pack, two induction coils, a mechanical actuating device and four antennas.

Figure 33D:
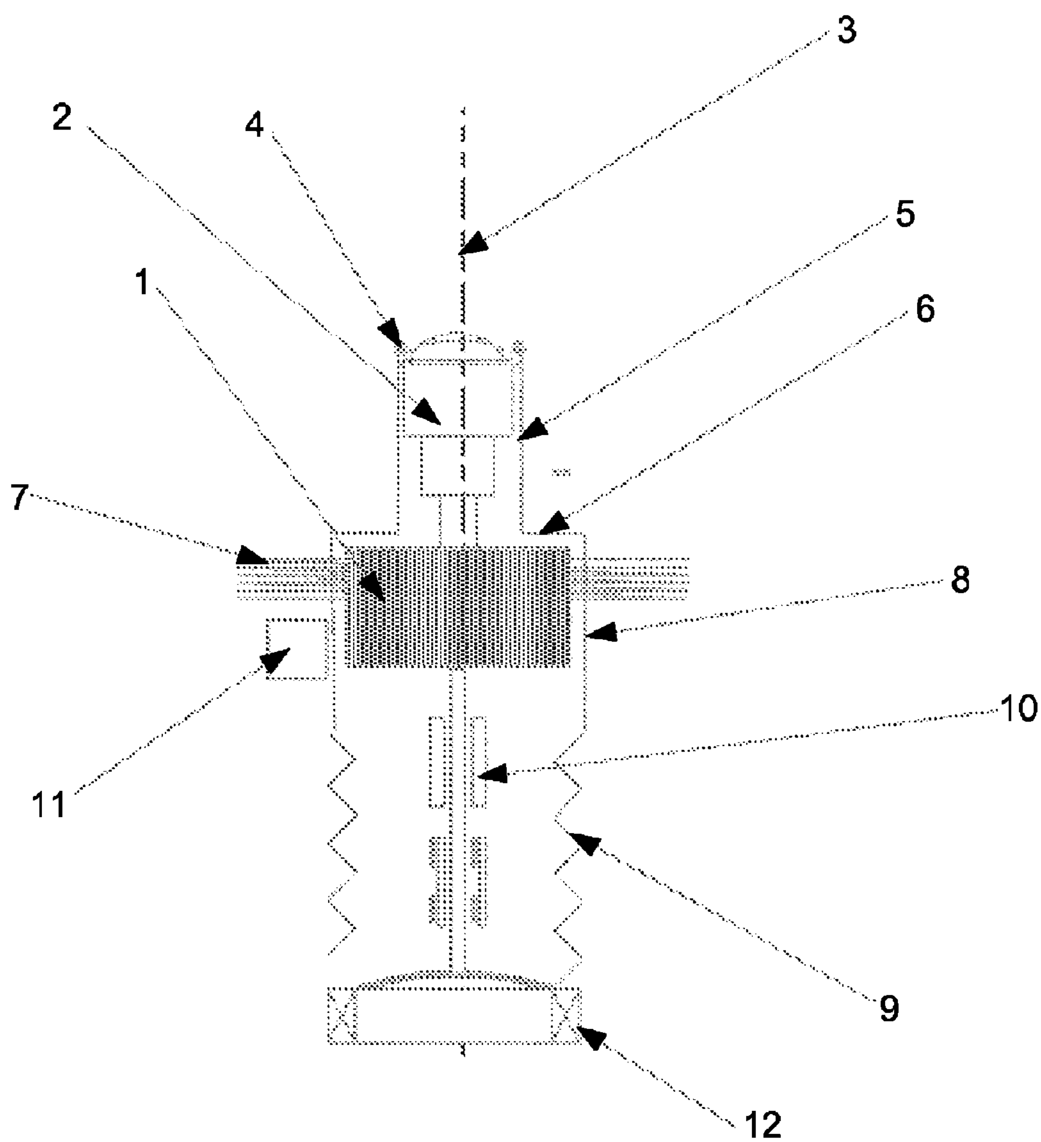
FIG. 33D is a side view of an instrumentation package assembly element.
Figure 33E:
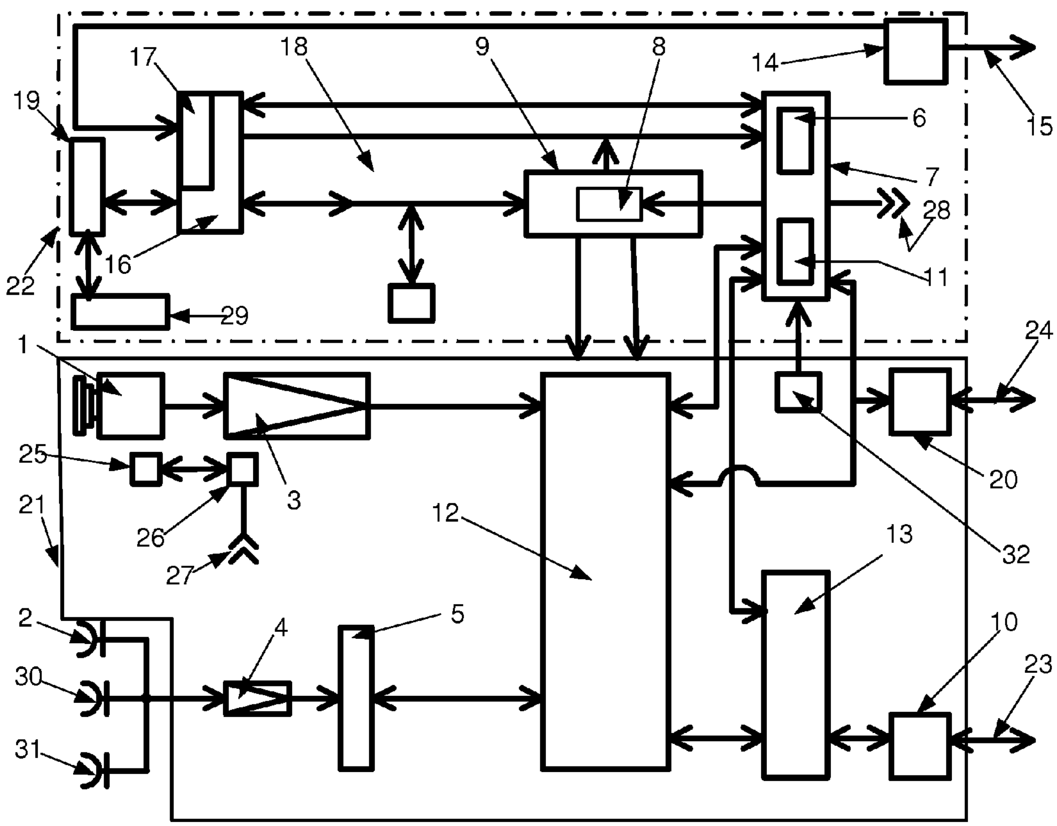
FIG. 33E is an instrumented baseball home plate and ice hockey puck instrumentation package assembly element signal and data electronics block diagram.

The single TV camera, single TV camera lens, supporting electronics, induction coil, mechanical actuating device and corrugated bellows segment are the parts of the instrumentation package assembly element disclosed in FIG. 33D which is a primary part of each of the two different instrumentation package assemblies. The instrumentation package assembly preferred embodiment contains one instrumentation package assembly element as disclosed in FIG. 33D.

The instrumentation package assembly is used to instrument the baseball home plate by mounting it inside the baseball home plate. A baseball home plate instrumented with an instrumentation package assembly is referred to as an instrumented baseball home plate.

The instrumentation package assembly can be used to instrument ice hockey pucks and other sports paraphernalia as well.

The preferred embodiment shown in FIG. 33B uses wireless RF radio transmission to televise pictures and sounds. The preferred embodiment shown in FIG. 33C uses both wireless, fiber optics and bi-directional high speed copper network communications cable transmission to televise pictures and sounds from the baseball playing field. The only difference between the two embodiments is that FIG. 33B has wireless capability only, whereas FIG. 33C has both wireless, fiber optics and bi-directional high speed copper network communications cable capabilities. The one that has wireless capability only is cheaper to produce than the one that has wireless, fiber optics and bi-directional high speed copper network communications cable capabilities thereby giving it a cost advantage for venues with lower budgets, like for example some colleges and high schools. The one with wireless, fiber optics and bi-directional high speed copper network communications cable capabilities has better bandwidth and lower noise.

It is contemplated in the present invention in FIG. 33B that the instrumentation package assembly is an autonomous module designed as a sealed unit for being mounted inside a baseball home plate (henceforth to be called an instrumented baseball home plate), and making the instrumented baseball home plate capable of wirelessly televising baseball games from its instrumentation package assembly cameras and microphones, to a remote base station.

A baseball stadium instrumented for wirelessly televising baseball games from instrumented baseball home plates is shown in FIG. 59A and FIG. 59B and FIG. 59C. A baseball stadium instrumented for televising baseball games from instrumented baseball home plates via fiber optics cable and/or copper cable buried beneath the playing field is shown in FIG. 60A and FIG. 60B, and FIG. 61A and FIG. 61B, and FIG. 64A and FIG. 64B, and FIG. 64C, and FIG. 64D.

The alternate preferred embodiment shown in FIG. 33C televises baseball games to the remote base station from its cameras and microphones via a fiber optics communication link and bi-directional high speed copper network communications cable. The fiber optics and copper cable connector built into the bottom of the instrumentation package assembly, which is mounted inside the instrumented baseball home plate, is connected to fiber optics cable and/or copper cable buried in the ground of the baseball playing field. The fiber optics cable and/or copper cable that is buried in the ground is connected to the remote base station via an antenna array junction. Refer to FIG. 60A and FIG. 60B and FIG. 61A and FIG. 61B for the specification of the antenna array junction and the remote base station.

The preferred embodiment shown in FIG. 33B uses wireless radio wave transmission of the televised pictures and sounds. The preferred embodiment shown in FIG. 33C uses fiber optics and/or copper cable transmission. It also has the capability of televising pictures and sounds by wireless transmission.

It is contemplated in the present invention in FIG. 33B that the instrumentation package assembly is an autonomous module designed as a sealed unit for being mounted inside a baseball home plate (henceforth to be called an instrumented baseball home plate), and making the instrumented baseball home plate capable of wirelessly televising baseball games from its cameras and microphones contained within the instrumentation package assembly, to a remote base station.

The instrumentation package assembly has one instrumentation package assembly element. The instrumentation package assembly element is disclosed in FIG. 33D. The TV camera, TV camera lens, supporting electronics, induction coil and mechanical actuating device are the primary parts of the instrumentation package assembly element.

It is understood that as the state of the art in TV camera technology advances, that there will be other better TV cameras that use other than CCD technology. The present invention will work equally well with them as they become available. Therefore, the present invention uses CCD TV cameras as an example of TV cameras that may be used simply because they are the best that today's technology offers, and is not confined only to their sole use in the future.

Referring to the instrumentation package assembly shown in FIG. 33A and FIG. 33B, FIG. 33A is a top view of the instrumentation package assembly, FIG. 33B is an A-A section view of the instrumentation package assembly, FIG. 33C is an A-A section view of the alternative instrumentation package assembly preferred embodiment showing the fiber optics cable and copper cable connector 18. The instrumentation package assembly element 9 is disclosed in FIG. 33D.

The instrumentation package assembly 7 contains all the electronics for wirelessly televising pictures and sounds. The picture and sounds are taken directly by the instrumentation package assembly's camera 2 and microphones 5 and 6. The instrumentation package assembly is mounted within the instrumented baseball home plate shown in FIG. 44 and FIG. 48. Both preferred embodiments shown in FIG. 34B and FIG. 34C communicate the pictures and sounds from the instrumented baseball home plates on the field to a remote base station located near the field for final processing and dissemination.

Figures 36A, 36B, 36C:
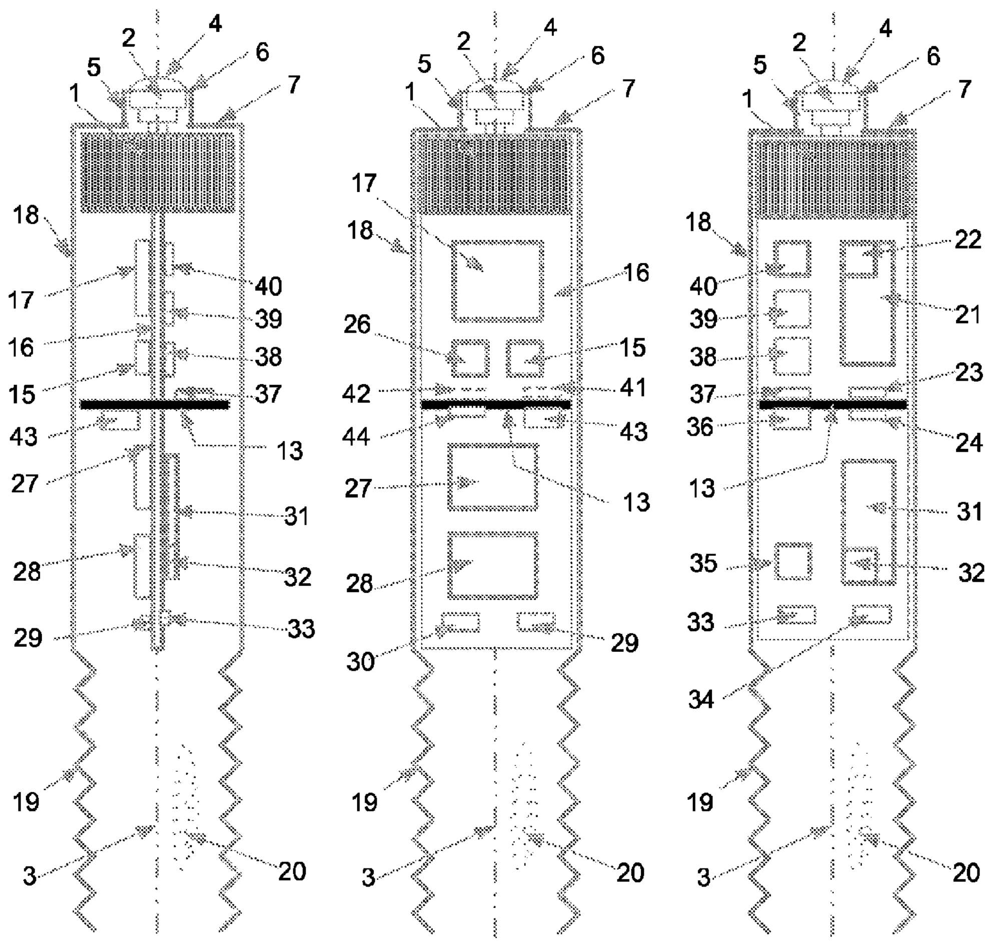
Figure 36D:
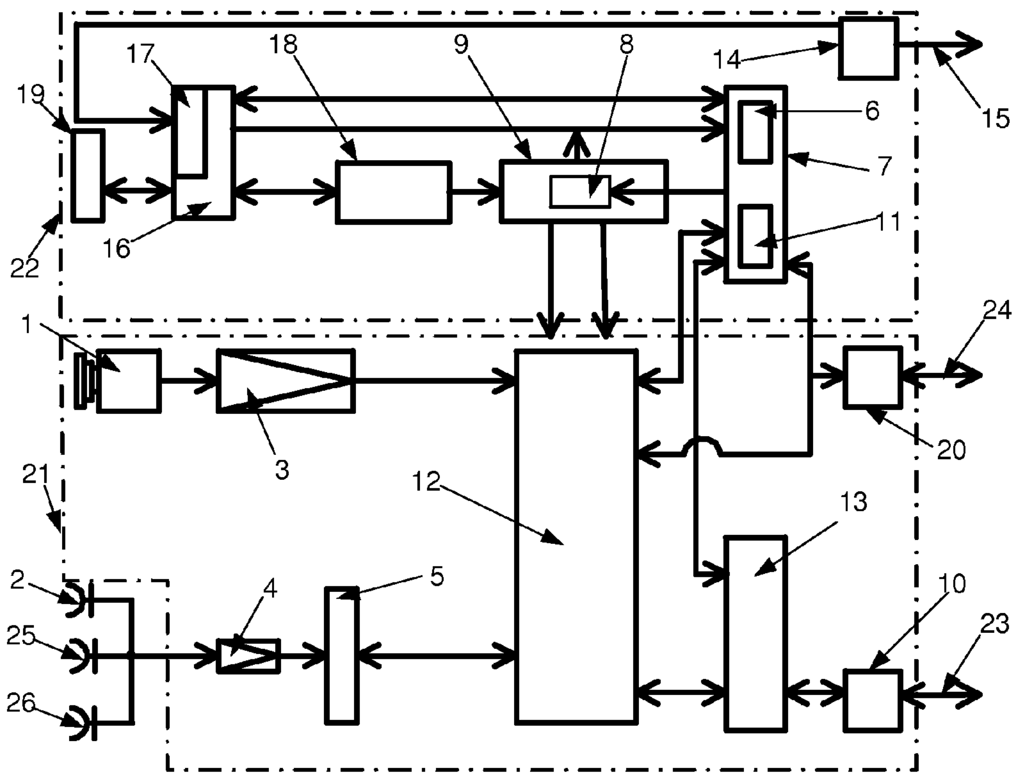
Figure 36E:
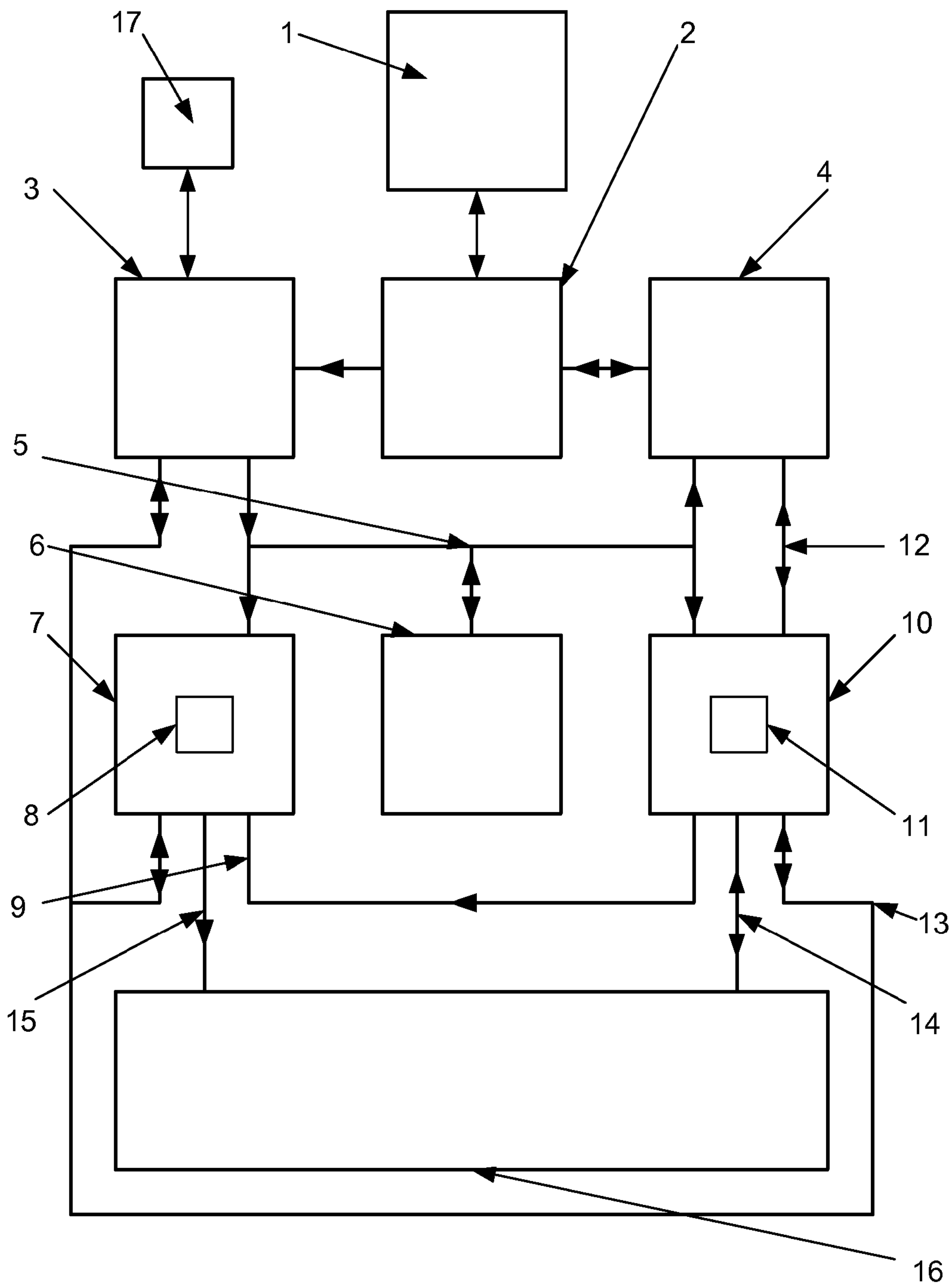

The instrumentation package assembly electronics showing the detailed flow of electrical signals and data in the instrumentation package assembly is shown in the preferred embodiment given in FIG. 36D and FIG. 36E.

The instrumentation package assembly 7 is a compressed assemblage of all the optical and electronic components that gather and transmit TV pictures and sounds into a single enclosure. The main body of the instrumentation package assembly 7 is essentially a short cylinder about ½ inch or more high that resembles a can of tuna fish. It is made strong to resist being crushed. Material examples such as polycarbonates, ABS and fiber reinforced plastics are used in its construction. The x-axis of symmetry of the instrumentation package assembly 7 is 4. The y-axis of symmetry of the instrumentation package assembly 7 is 1. The center of the instrumentation package assembly 7 is located at the intersection of the x-axis and the y-axis. The z-axis 12 of the main body of the instrumentation package assembly 7 is mutually orthogonal to 4 and 1.

The instrumentation package assembly 7 contains cameras 2, camera lens 11, supporting electronics 8, induction coils 3 and 10, battery pack 19, radio antennas 14, 15, 16, and 17, electro-mechanical actuating device 20, corrugated bellows section 9, microphones 5 and 6, and bottom lid 19.

The part of the instrumentation package assembly 7 that contains the camera 2, camera lens 11, supporting electronics 8, induction coil 3, electro-mechanical actuating device 20, and corrugated bellows section 9 is the instrumentation package assembly element specified and shown enlarged in FIG. 33D.

Camera 2, camera lens 11, supporting electronics 8, induction coil 3, electro-mechanical actuating device 20, and corrugated bellows section 9 shown in FIG. 33B are identical to camera 2, camera lens 11, supporting electronics 8, induction coil 3, electro-mechanical actuating device 20, and corrugated bellows section 9 shown in FIG. 33C.

The supporting electronics 8 shown in FIG. 33B are different from the supporting electronics shown in FIG. 33C. The supporting electronics shown in FIG. 33C have an additional capability beyond that specified for the supporting electronics shown in FIG. 33B. The supporting electronics in FIG. 33B can only televise wirelessly to the remote base station. The supporting electronics shown in FIG. 33C can televise pictures and sounds via a fiber optics cable link and by copper cable to the remote base station, as well as televise wirelessly to the remote base station.

The picture and sounds are taken directly by the camera 2 and microphones 5 and 6 inside the instrumentation package assembly 7. The instrumentation package assembly 7 is mounted within the instrumented baseball home plate that is in play on the baseball field. The instrumentation package assembly may wirelessly or by fiber optics or by copper cable communicate and televise the pictures and sounds from inside the instrumented baseball home plate to a remote base station located near the baseball field for final processing and dissemination.

The instrumentation package assembly 7 contains all the electronics 8 for wirelessly televising pictures and sounds. The camera 2, camera lens 11, and electronics 8 are joined to the main body of the instrumentation package assembly by the corrugated bellows segment.

In FIG. 33B, the instrumentation package assembly 7 contains all the electronics 8 for wirelessly televising pictures and sounds. The electronics 8 is identical to the electronics 27 in FIG. 33B.

In FIG. 33C, the instrumentation package assembly 7 contains all the electronics 8 for televising pictures and sounds using a fiber optics cable link and/or copper cable link, in addition to televising pictures and sounds wirelessly like in FIG. 33B.

In a preferred embodiment where we have disclosed a baseball playing field with a fiber optics cable link and/or copper cable link buried beneath the ground, and in particular beneath the instrumented baseball home plate and beneath the three instrumented baseball bases, and where the fiber optics cable link and/or copper cable link is connected to the remote base station at its other end, and where the electronics in FIG. 33C includes the capability to televise baseball games from inside the instrumented baseball home plate to the remote base station via the fiber optics/copper cable link by connecting to the fiber optics/copper cable link using the fiber optics/copper cable connector 18. The instrumentation package assembly 7 in the preferred embodiment shown in FIG. 33C uses a fiber optics cable/copper cable connector 18 with which to connect to a fiber optics/copper cable link buried beneath the baseball playing field grounds and beneath the instrumented baseball home plate.

The diameter of the instrumentation package assembly is kept to a minimum in order to minimize its footprint inside the instrumented baseball home plate. The dimension of the outside diameter of the instrumentation package assembly is governed largely by the physical diagonal dimension of the largest components within the instrumentation package assembly, like the SD/HD camera's CCD sensor array and the battery package.

The instrumentation package assembly is mounted inside the instrumented baseball home plate using a buffer plate that acts as a bearing for the instrumentation package assembly. The buffer plate supports the upper end of the instrumentation package assembly.

The instrumentation package assembly 7 contains one miniature SD/HD TV camera 2 and two condenser microphones 5 and 6 and supporting electronics. The camera, microphones 5 and 6 and supporting electronics are housed together within the enclosure cavity of the instrumentation package assembly 7. The condenser microphones 5 and 6 are attached to the top interior wall of the instrumentation package assembly. The microphones 5 and 6 hear any sounds produced by physical contact of the instrumented baseball home plate with any external thing, including for example air currents felt on the instrumented baseball home plate during the baseball's flight in the air over the instrumented baseball home plate when it is pitched.

Microphone electrical connector 24 is mounted on the instrumentation package assembly. 24 mates with an electrical connector which is wired by a cable to a third condenser microphone. This microphone protrudes through the top of the instrumented baseball home plate. Refer to instrumented baseball home plate embodiments shown in drawings FIG. 44A and FIG. 44B, and FIG. 48A and FIG. 48B and FIG. 48C and FIG. 48D. This microphone listens for sounds of the game that occur on the baseball playing field above the top of the instrumented baseball home plate and above the ground. The microphone cable carries electrical sound signals from the microphone to the microphone electrical connector which is plugged into its mating electrical connector 24 on the instrumentation package assembly shown in the referenced drawings.

The instrumentation package assembly 7 is a sealed unit and is filled with a dry pressurized gas like nitrogen to prevent the entry of moisture or dirt. Seals between the lid 19 and main body of the instrumentation package assembly 7 prevent the dry gas from leaking out of the instrumentation package assembly enclosure. A desiccant is disposed near the SD/HD lenses and cameras to collect and prevent any moisture build-up within the instrumentation package assembly 7. The lid 19 is a heat sink used to cool the contents of the instrumentation package assembly.

The diameter of the instrumentation package assembly 7 is kept to a minimum in order to minimize the space taken up inside the instrumented baseball home plate. The dimension of the outside diameter of the instrumentation package assembly is governed largely by the physical diagonal dimensions of its largest components like the quad antennas 14, 15, 16 and 17 and the battery pack 21.

The line of sight of camera 2 is mutually perpendicular to the top of the instrumentation package assembly 7. Camera 2 looks out perpendicularly from the top of the instrumentation package assembly 7.

The optical axis of the camera 2 is aligned perpendicular to the top of the instrumentation package assembly 7. Therefore its line of sight is perpendicular to the top of the instrumentation package assembly 7.

The optical axis of camera 2 within the instrumentation package assembly 7 is aligned to be coaxial with the instrumentation package assembly's 7 mechanical z-axis 12. The camera 2 is positioned at the top of the instrumentation package assembly and looks out through the camera lens 11 which is positioned above it.

The camera lens 11 is positioned at the very top of the instrumentation package assembly 7, with the camera 2 directly beneath it. The camera essentially looks out of the top of the instrumentation package assembly 7.

The camera lens 11 provides imagery to camera 2. The camera lens 11 images the objects it sees onto camera 2. The optical and mechanical axis of camera 2 and camera lens 11 is 12.

The camera lens 11 has an o-ring seal 13. The purpose of the seal 13 is to hold and prevent leakage of the pressurized dry nitrogen gas from the cavity of the instrumentation package assembly. The seal prevents dirt and moisture from entering the cavity and damaging and interfering with the performance of its contents. The seal 13 is made from rubber. The seal 13 is located between the front of the camera lens 11 and the camera lens cylindrical mounting.

In variants of the present preferred embodiment, a variety of different camera lens types with different lens setting capability can be used providing they are small in size (so as not to be prominent and conspicuous to the players) and also physically fit within the instrumentation package assembly. The auto iris setting permits the camera lens to automatically adjust for varying lighting conditions on the field. The auto focus setting permits the camera lens to adjust focus for varying distances of the players and action subjects on the field.

The functions of the camera lens 13 such as focus adjustment settings and iris adjustment settings are controlled wirelessly by the cameraman from the remote base station by sending command and control signals from the remote base station to the instrumentation package assembly inside the instrumented sports paraphernalia. The cameraman can also send command and control signals from the remote base station to the instrumentation package assembly to put these settings on automatic under the control of the camera electronics. The optical and electronic zoom functions of the camera lens 13 are operated by the cameraman by sending command and control signals from the remote base station to the instrumentation package assembly. The cameraman can select from a wide variety of HD camera lenses. Wide angle lenses and ultra wide angle lenses are used in many venues to give the TV viewing audience the feeling of being there on the playing field amongst the players. In some venues the cameraman may choose to use camera lenses with more magnification and narrower fields of view to better cover certain plays. In some venues the cameraman may choose camera lenses with small f-numbers to deal with poorer lighting conditions.

When a baseball is hit and a player is rounding the bases, the distance of a player from one base may be decreasing while the distance to another base may be increasing. The camera 2 can be independently and simultaneously commanded and controlled to auto focus on their respective players. If the player slides into the instrumented sports paraphernalia carrying the instrumentation package assembly, the camera 2 will catch the slide up close. The microphones 5 and 6 will capture all the sounds of the action. While the player is running, his pictures and sounds are wirelessly being transmitted by the instrumentation package assembly 7 inside the instrumented sports paraphernalia.

A block diagram showing the detailed flow of electrical signals and data in the instrumentation package assembly electronic circuits is shown in the preferred embodiment given in FIG. 35D. The instrumentation package assembly's network transceiver is part of the electronics in 8. The network transceiver wirelessly transmits real-time pictures and sounds from the camera 2 and microphones 5 and 6 via quad antenna array elements 14, 15, 16 and 17, also known as intentional radiators, to the remote base station. The quad antenna array elements 14, 15, 16 and 17 are mounted radially between the two circular circuit boards that comprise 8.

As is shown in the alternative preferred embodiment in FIG. 33C, a fiber optics/copper cable connector 18 is employed to connect to a fiber optics cable link buried in the playing field grounds beneath the instrumented baseball home plate, to televise the pictures and sounds of the game to the remote base station which is connected to the fiber optics cable link at its other end. Should fiber optics/copper cable buried in the playing field grounds not exist in a baseball stadium, the baseball games may be televised wirelessly using radio signals and antennas 14, 15, 16 and 17 using the preferred embodiment shown in FIG. 33B. It is clear that the preferred embodiment shown in FIG. 33C is superior in this regard because it is capable of televising baseball games by both methods i.e. either wirelessly or by a fiber optics/copper cable link The preferred embodiment shown in FIG. 33C is more expensive to manufacture than the preferred embodiment shown in FIG. 33B because its electronics 8 must provide for the additional fiber optics and/or copper cable related electronic functions.

In an alternate preferred embodiment, the quad antenna array elements 14, 15, 16 and 17 are replaced with a helix antenna (not shown) with similar dimensions wound on the inside diameter of the instrumentation package assembly 7.

The battery's charging coils 3 and 10 are wound on the outside at both the top and bottom of the instrumentation package assembly 7 and act electrically as a transformer's secondary winding. The coils are wound on the outside of the instrumentation package assembly 7 to keep any heat they may produce away from the contents of the instrumentation package assembly 7 while the battery pack is being charged. The number of turns in each charging coil 3 and 10 is made large enough to inductively couple a sufficient number of magnetic lines of flux from the primary coil of the external battery charging unit so as to charge the battery pack in a reasonably short time before games. When the external charging unit is placed on top of the instrumented baseball base, the charging coils 3 and 10 receive electrical energy inductively coupled from the primary coils of the external charging unit.

Induction coil 3 is located on the top of the instrumentation package assembly 7. Induction coil 10 is located on the bottom of the instrumentation package assembly 7. Induction coil 26 is located on the top of the instrumentation package assembly 7. Induction coil 19 is located on the bottom of the instrumentation package assembly 7. The purpose of the induction coils 3, 10 and 19, 26 is to inductively couple electrical energy into the instrumentation package assembly 7 to charge the battery pack 21. The induction coils 3 and 10 are located on the exterior of the enclosure so as to minimize their heat transfer into the instrumentation package assembly 7 enclosure cavity that would raise the temperature of the electronics within the enclosure cavity. The induction coils 3 and 10 are electrically connected through the enclosure walls to the electronics inside the enclosure cavity.

When the instrumentation package assembly 7 is mounted inside the host sports paraphernalia, such as an instrumented baseball home plates, an external electrical induction coil which is part of a battery pack charging unit is used to magnetically inductively couple electrical power into induction coils 3 and 10 through the instrumented baseball home plate and into the instrumentation package assembly 7 for the purpose of charging the battery pack 21. A block diagram showing the electrical battery charging circuit involving the induction coils 3 and 10 and the battery pack 21 are shown in FIG. 37. A source of electrical power from the charging unit, which is external to the instrumentation package assembly 7, is inductively coupled into these induction coils 3 and 10 by laying the external induction coil of the charging unit flat on the top of the host sports paraphernalia coaxially above coils 3 and 10. The induction coils 3 and 10 feed this power to the battery pack 21 in order to charge it.

The main body of the instrumentation package assembly 7 houses the battery pack which supplies electrical power to each of the elements within the instrumentation package assembly that requires electrical power.

The instrumentation package assembly's battery pack 21 is inductively wirelessly charged before games on an as needed basis, by an external primary winding placed on the top of the instrumented baseball home plate. Charging of the battery pack 21 is accomplished wirelessly by inductive coupling. The instrumentation package assembly's inductive pickup coils 3 and 10 act as the secondary windings on an air core transformer with an external primary winding as their power source. Inductively coupled time varying magnetic flux is furnished to 3 and 10 by the external primary winding placed on the top of the instrumented baseball home plate.

The instrumentation package assembly's battery pack 21 is wirelessly charged before games on an as needed basis, using the charging station disclosed in preferred embodiment FIG. 37A and FIG. 37B and FIG. 37C. The battery pack charging station is placed on the top of the instrumented baseball home plate when it is charging the battery pack 21. Charging of the battery pack 21 is accomplished wirelessly by inductive coupling. The instrumented baseball base's two inductive pickup coils 3 and 10 act as the secondary windings on an air core transformer. Time varying magnetic flux is furnished to 3 and 10 by the primary windings of the battery charging station unit FIG. 37A and FIG. 37B and FIG. 37C.

The battery's 19 charging coils 27 and 28 are wound on the outside of the instrumentation package assembly's 7 and act electrically as a transformer's secondary winding. The coils are wound on the outside of the instrumentation package assembly 7 to keep any heat they may produce away from the contents of the instrumentation package assembly 7 while the battery 19 is being charged. The number of turns in each charging coil is made large enough to inductively couple a sufficient number of magnetic lines of flux from the external primary coil so as to charge the battery in a reasonably short time before games. When the external primary coil is placed on top of the instrumentation package assembly the charging coils 3 and 10 receive electrical energy inductively coupled from the primary coils.

The instrumentation package assembly's network transceiver electronics 8 wirelessly transmits real-time pictures and sounds from the instrumentation package assembly's camera and microphones via quad antenna array elements 14, 15, 16 and 17 also known as intentional radiators, to the remote base station disclosed in FIG. 59A and FIG. 59B and FIG. 61A and FIG. 61B. The quad antenna array elements 14, 15, 16 and 17 are mounted in a horizontal plane 90 degrees apart from one another and extend outward through the cylindrical wall of the main body of the instrumentation package assembly 7.

As is shown in the alternative preferred embodiment in FIG. 33C, a fiber optics/copper cable connector 18 is employed to connect to a fiber optics/copper cable link buried in the playing field grounds beneath the instrumented baseball home plate, to televise the pictures and sounds of the game to the remote base station which is connected to the fiber optics/copper cable link at its other end. The fiber optics/copper cable is brought up from the ground beneath the instrumented baseball home plate and connected to the instrumented baseball home plate via the fiber optics/copper cable connector 18. Should fiber optics/copper cable buried in the playing field grounds not exist in a baseball stadium, the baseball games may be televised wirelessly using radio signals and antennas 14, 15, 16 and 17 using the preferred embodiment shown in FIG. 33B. It is clear that the preferred embodiment shown in FIG. 33C is superior in this regard because it is capable of televising baseball games by both methods i.e. either wirelessly or by a fiber optics/copper cable link. The preferred embodiment shown in FIG. 33C is more expensive to manufacture than the preferred embodiment shown in FIG. 33B because its electronics 8 must provide for the additional fiber optics/copper related electronic functions.

In an alternate preferred embodiment, the quad antenna array 14, 15, 16 and 17 can be replaced with a helix antenna (not shown) with similar dimensions wound on the inside diameter of the instrumentation package assembly 7 down the length of its cylindrical wall.

An antenna array relay junction shown in FIG. 59A and FIG. 59B is deployed in the baseball stadium and receives radio signals from the quad antenna array 14, 15, 16 and 17. Antenna array elements 14, 15, 16 and 17 are in quadrature to radiate radio signals to the antenna array relay junction with sufficient gain so as to overcome RF noise, and provide a large enough gain bandwidth product to accommodate real-time SD/HD picture quality requirements. The instrumentation package assembly's network transceiver electronics 8 also provides a wireless means for the instrumentation package assembly's in the instrumented baseball home plate to receive command and control radio signals from the remote base station's antenna.

The corrugated bellows segment 9 acts to mechanically connect the camera lens 11, camera 2 and electronics 8 to the main body of the instrumentation package assembly. The corrugated bellows segment 9 is mechanically flexible. This flexibility allows the optical axis of the camera 2 and its lens 11 to be mechanically tilted relative to the z-axis 12 of the main body of the instrumentation package assembly 7 and pre-set in place if so desired by the cameraman at the time the instrumentation package assembly 7 is encapsulated inside the host sports paraphernalia.

The corrugated bellows section 9 of the instrumentation package assembly is flexible and allows the section containing the camera 2 and its camera lens 11 to be bent in order to tilt the line of sight of the camera 2 and its lens 11 relative to the top of the instrumentation package assembly if so desired by the cameraman. Additionally, the corrugated section 9 allows the instrumentation package assembly 7 to act as a spring and absorb shocks and compress or expand its length without damaging the contents of the instrumentation package assembly. When circumstances arise where the players tend to crush the instrumentation package assembly 7, it will compress or expand.

The instrumentation package assembly 7 has a flexible corrugated bellows section 9. The corrugated bellows section 9 of the instrumentation package assembly 7 allows for the part of the instrumentation package assembly 7 containing camera 2 and its lens 11 to flex and bend, stretch and compress when it is impacted. This enables the instrumentation package assembly 7 to resist shock and vibration. Additionally, the corrugated bellows section 9 allows the instrumentation package assembly 7 to act as a spring and compress or expand its length without damaging the contents of the instrumentation package assembly 7. When circumstances arise where the baseball players tend to crush the instrumented baseball home plate, the instrumentation package assembly 7 will compress or expand instead of breaking.

A antenna array relay junction shown in FIG. 59A and FIG. 59B is deployed in the baseball stadium and receives radio signals from the instrumented baseball base's antenna array elements 14, 15, 16 and 17. Antenna array elements 14, 15, 16 and 17 are in quadrature to radiate radio signals to the antenna array relay junction with sufficient gain so as to overcome RF noise and provide for a large enough gain bandwidth product to accommodate real-time SD/HD picture quality requirements. The instrumentation package assembly's network transceiver electronics which is part of 8 also provides a wireless means for the instrumented baseball base to receive command and control radio signals from the remote base station.

The two condenser microphones 5 and 6 enable the viewing audience to hear real-time contacts, impacts and shocks to the instrumented baseball base. Simultaneously live SD/HD TV pictures are taken by the TV camera 2 of its field of view of the live action on the playing field. Condenser microphones have good fidelity for their small size, weight and power consumption. In the future higher quality small sized microphones are likely to become available as the state of the art improves. It is anticipated that we will use these microphones as they become available.

The instrumentation package assembly 7 is filled with a dry pressurized gas 22 like nitrogen to prevent the entry of moisture or dirt into its cavity. The o-ring seal 24 between the bottom lid 19 and the enclosure prevents the dry gas from leaking out of the enclosure. Dry nitrogen gas 22 is inserted into the instrumentation package assembly 7 through gas valve 23. A desiccant is also disposed inside the cavity to collect moisture and prevent any moisture build-up.

The instrumentation package assembly 7 has a removable lid 19 on its bottom to allow access to the contents inside the cavity of the instrumentation package assembly 7. The lid 19 allows access to the battery pack 21 for servicing. The removable lid 19 also allows access to camera 2, camera lens 11, electronics 8, quad antennas 14, 15, 16 and 17, and mechanical actuating device 19 for servicing. The lower inductive coil 10 is attached to the bottom outside of the lid 19. The fiber optics/copper cable connector 18 is attached through the bottom of lid 19. The lid 19 has a gas valve 23 mounted on it to allow dry nitrogen gas 22 to be injected into the cavity to pressurize the enclosure of the instrumentation package assembly after the lid 19 is closed. The purpose of the dry nitrogen gas is to protect the contents of the instrumentation package assembly from moisture. There is an o-ring seal around lid 19 to prevent the pressurized dry nitrogen gas from escaping from the cavity of the instrumentation package assembly 7 enclosure.

The instrumentation package assembly element described in FIG. 33D is assembled into the instrumentation package assembly hub 7 by loading the corrugated bellows enclosure segment 9 with the sealed roller bearing 12 into a mating machined seat in the hub 7. Assembling the instrumentation package assembly element into the instrumentation package assembly hub 7 in this manner assures that the optical/mechanical axis of the instrumentation package assembly element is coincident with the mechanical axis 12. The angular position of the 1st primary mechanical stop is now adjusted to be aligned with the y-axis 1 angular direction on the hub 7. In particular, the 1st primary mechanical stop is set at twelve o'clock in FIG. 33A and then locked in place on the hub 7. The previous alignment procedure assures that camera 2 will now produce precisely centered upright images of any objects that lie along the y-axis 1 in the twelve o'clock direction relative to the hub 7 of the instrumentation package assembly. The fiber optic/copper s cable connector 18 is offset at a distance of about ¾ of the hub radius from the center of hub 7 at twelve o'clock along the hub's y-axis and is accessible from the bottom of the instrumentation package assembly. The fiber optics/copper cable connector 18 lies along side the instrumentation package assembly element which it is electrically connected to. Prior to the time when the instrumentation package assembly 7 is encapsulated inside the mold of the instrumented baseball home plate, the mechanical/optical axis 17 of the instrumentation package assembly is carefully positioned in the mold, and then aligned normal to the top of the mold. The instrumentation package assembly 7 is then precisely aligned in rotation in the mold about its mechanical/optical axis 17 so that its $1^{st}$ primary stop is aligned with the y-axis's twelve o'clock direction of the instrumented baseball home plate. The previous alignment procedure assures that the four primary stops of the electro-mechanical actuator inside the instrumentation package assembly are aligned to the vertex, side 14 and side 5 of the instrumented baseball home plate respectively, and that the camera 2 will now produce precisely centered upright images of any objects that lie along the y-axis 1 in the twelve o'clock direction relative to the instrumented baseball home plate. When the instrumented baseball home plate is placed horizontally on the baseball playing field at its traditional location on the baseball diamond, it is then carefully positioned so its y-axis is aligned with the centerline of the baseball diamond running from the instrumented baseball home plate to second base. Now, whenever the cameraman in the remote base station commands the camera 1 to rotate and go to the 1st mechanical stop, the electro-mechanical actuator 20 drives the enclosure against the 1st mechanical stop and locks it there. When using an extremely wide field camera lens, the TV audience will see a picture of the pitcher standing upright on the pitcher's mound of the baseball playing field.

Referring to the Preferred Embodiments Specified in FIG. 33A and FIG. 33B and FIG. 33C, the Instrumented Baseball Home Plate Instrumentation Package Assembly Satisfies all of the Following Further Objectives:

It is an objective of the present invention not to block, absorb or reflect radio waves that are transmitted or received by the instrumentation package assembly. It is an objective of the present invention that the instrumentation package assembly is composed of a camera, a top induction coil, two microphones, electronics, instrumentation package assembly element, corrugated bellows segment, bottom induction coil, camera lens, camera lens seal, four radio antennas, fiber optics and copper cable connector, bottom lid, electro-mechanical actuating device, battery, dry nitrogen gas, gas valve, and microphone connector. It is an objective of the present invention to provide an instrumentation package assembly an instrumentation package assembly element. It is an objective of the present invention to provide an instrumentation package assembly that can be used to instrument baseball home plates, ice hockey pucks and other sports paraphernalia as well. It is an objective of the present invention to provide an instrumentation package assembly that uses wireless RF radio transmission to televise pictures and sounds from inside sports paraphernalia on the playing field. It is an objective of the present invention to provide an instrumentation package assembly that uses wireless, fiber optics and bi-directional high speed copper network communications cable transmission to televise pictures and sounds from inside instrumented baseball plates on the baseball playing field. It is an objective of the present invention to provide an instrumentation package assembly that is a sealed unit. It is an objective of the present invention to provide an instrumentation package assembly that is a sealed autonomous unit for being mounted inside a baseball home plate and making the instrumented baseball home plate capable of wirelessly televising baseball games from its cameras and microphones, to a remote base station. It is an objective of the present invention to provide an instrumentation package assembly that is a sealed autonomous unit for being mounted inside a baseball home plate and making the instrumented baseball home plate capable of televising baseball games from its cameras and microphones, to a remote base station via a fiber optics communication link and bi-directional high speed copper network communications cable. It is an objective of the present invention to provide an instrumentation package assembly that is a sealed autonomous unit for being mounted inside a baseball home plate and making the instrumented baseball home plate capable of televising baseball games from its cameras and microphones, to a remote base station via a fiber optics communication link and bi-directional high speed copper network communications cable buried in the ground of the baseball playing field and connected to the remote base station via an antenna array relay junction. It is an objective of the present invention to provide an instrumentation package assembly with improved state of the art TV camera technology as it becomes available. It is an objective of the present invention to provide an instrumentation package assembly with all the electronics for wirelessly televising pictures and sounds taken directly by the instrumentation package assembly's camera and microphones and communicating the pictures and sounds from the instrumented baseball home plates on the playing field to a remote base station located near the field for final processing and dissemination. It is an objective of the present invention to provide an instrumentation package assembly with a fiber optics cable link and/or copper cable link buried beneath the ground, and beneath the instrumented baseball home plate, and where the fiber optics cable link and/or copper cable link is connected to the remote base station at its other end, and where the electronics includes the capability to televise baseball games from inside the instrumented baseball home plate to the remote base station via the fiber optics/copper cable link by connecting to the fiber optics/copper cable link using the fiber optics/copper cable connector. It is an objective of the present invention to mount the instrumentation package assembly inside the instrumented baseball home plate using a buffer plate that supports the upper end of the instrumentation package assembly and acts as a bearing for the instrumentation package assembly. It is an objective of the present invention to hear any sounds produced by physical contact of the instrumented baseball home plate with any external thing, including for example air currents felt on the instrumented baseball home plate during the baseball's flight in the air over the instrumented baseball home plate when it is pitched. It is an objective of the present invention to listen for sounds of the game that occur on the baseball playing field above the top of the instrumented baseball home plate and above the ground. It is an objective of the present invention to seal the instrumentation package assembly and fill it with a dry pressurized gas to prevent the entry of moisture or dirt, and dispose a desiccant near the SD/HD lenses and cameras to collect and prevent any moisture build-up within the instrumentation package assembly. It is an objective of the present invention to align the optical axis of the camera perpendicular to the top of the instrumentation package assembly and the instrumented baseball home plate and any other sports paraphernalia that it is mounted into. It is an objective of the present invention that the electronics in the instrumentation package assembly are configured so that the functions of the camera lens such as focus adjustment settings, zoom settings and iris adjustment settings are controlled wirelessly by the cameraman from the remote base station by sending command and control signals from the remote base station to the instrumentation package assembly inside the instrumented sports paraphernalia. It is an objective of the present invention that the electronics in the instrumentation package assembly are configured so that the cameraman sends command and control signals from the remote base station to the instrumentation package assembly to put camera lens settings on automatic under the control of the camera electronics. It is an objective of the present invention that the electronics in the instrumentation package assembly are configured so that the optical and electronic zoom functions of the camera lens are operated by the cameraman by sending command and control signals from the remote base station to the instrumentation package assembly. It is an objective of the present invention that the electronics in the instrumentation package assembly are configured so that the battery's charging coils are wound on the outside at both the top and bottom of the instrumentation package assembly and act electrically as a transformer's secondary windings and keep any heat they may produce away from the contents of the instrumentation package assembly 7 while the battery pack is being charged. It is an objective of the present invention that the electronics in the instrumentation package assembly are configured so that the number of turns in each charging coil is made large enough to inductively couple a sufficient number of magnetic lines of flux from the primary coil of the external battery charging unit so as to charge the battery pack in a reasonably short time before games when the external charging unit is placed on top of the instrumented baseball base. It is an objective of the present invention that the electronics in the instrumentation package assembly be configured with a battery pack which supplies electrical power to each of the elements within the instrumentation package assembly that requires electrical power. It is an objective of the present invention that the antenna array elements are in quadrature to radiate radio signals to the antenna array relay junction with sufficient gain so as to overcome RF noise, and provide a large enough gain bandwidth product to accommodate real-time SD/HD picture quality requirements. It is an objective of the present invention that the corrugated bellows segment be flexible and act to mechanically connect the camera lens, camera and electronics to the main body of the instrumentation package assembly, and permit the instrumentation package assembly elements to be mechanically tilted relative to the z-axis of the main body of the instrumentation package assembly, and be pre-set in place at the time the instrumentation package assembly is encapsulated inside the host sports paraphernalia. It is an objective of the present invention that the corrugated bellows segment is flexible to act as a spring and absorb shocks and compress or expand its length to resist shock and vibration without damaging the contents of the instrumentation package assembly and its elements. It is an objective of the present invention that the condenser microphones enable the viewing audience to hear real-time contacts, impacts and shocks to the instrumented baseball base.

FIG. 33D

The detailed physical elements disclosed in the instrumented baseball home plate and ice hockey puck instrumentation package assembly element drawing shown in FIG. 33D are identified as follows: 1 is a camera. 2 is the camera lens. 3 is the optical axis of the camera and camera lens. 4 is the lens seal. 5 is the small diameter cylindrical segment of the instrumentation package assembly element enclosure. 6 is the enclosure shoulder. 7 is the top induction coil for recharging the battery pack in the instrumentation package assembly. 8 is the cylindrical segment of the enclosure. 9 is the corrugated bellows segment of the enclosure. 10 is the electronics. 11 is an electro-mechanical actuating device. 12 is a sealed roller bearing.

FIG. 33D is a side view of an instrumentation package assembly element.

Referring to drawing FIG. 33D, in a preferred embodiment, an instrumentation package assembly element is disclosed. The instrumentation package assembly element is a primary component of the instrumentation package assembly which is mounted inside the instrumented baseball home plate and ice hockey puck.

The present invention contemplates the instrumentation package assembly element to be equipped with a single TV camera, a single TV camera lens, supporting electronics, one induction coil, a mechanical actuating device and one corrugated bellows segment. The TV camera, TV camera lens, supporting electronics, induction coil and mechanical actuating device and corrugated bellows segment are the primary parts of the instrumentation package assembly element.

The instrumentation package assembly, shown in FIG. 33A and FIG. 33B and FIG. 33C has one of these instrumentation package assembly elements. The instrumentation package assembly, shown in FIG. 34A and FIG. 34B and FIG. 34C has two of these instrumentation package assembly elements. The instrumentation package assembly, shown in FIG. 35A and FIG. 35B and FIG. 35C has four of these instrumentation package assembly elements.

It is understood that the state of the art in TV camera technology is changing rapidly and as it advances there will be other better TV cameras that use other than CCD technology. The present invention will work equally well with them as they become available. Therefore, the present invention uses CCD TV cameras as an example of TV cameras that may be used at this time simply because they are the best that today's technology offers, and is not confined only to their sole use in the future.

An enlarged side view A-A section of just the instrumentation package assembly element of the instrumentation package assembly that is disclosed in FIG. 33A is shown in FIG. 33D.

The instrumentation package assembly element contains all the electronics 10 for wirelessly televising pictures and sounds, as well as all the electronics for televising pictures and sounds using/copper cable.

The pictures are taken directly by the instrumentation package assembly element camera 1. The video signals from camera 1 are fed to the electronics 10 within the instrumentation package assembly element which communicates the video to the remote base station by either a wireless transmission network or by a fiber optics/copper cable transmission network. Refer to FIG. 59A and FIG. 59B for the wireless transmission network specification, and to FIG. 60A and FIG. 60B and FIG. 61A and FIG. 61B for the fiber optics/copper cable transmission network specification.

Figure 33F:
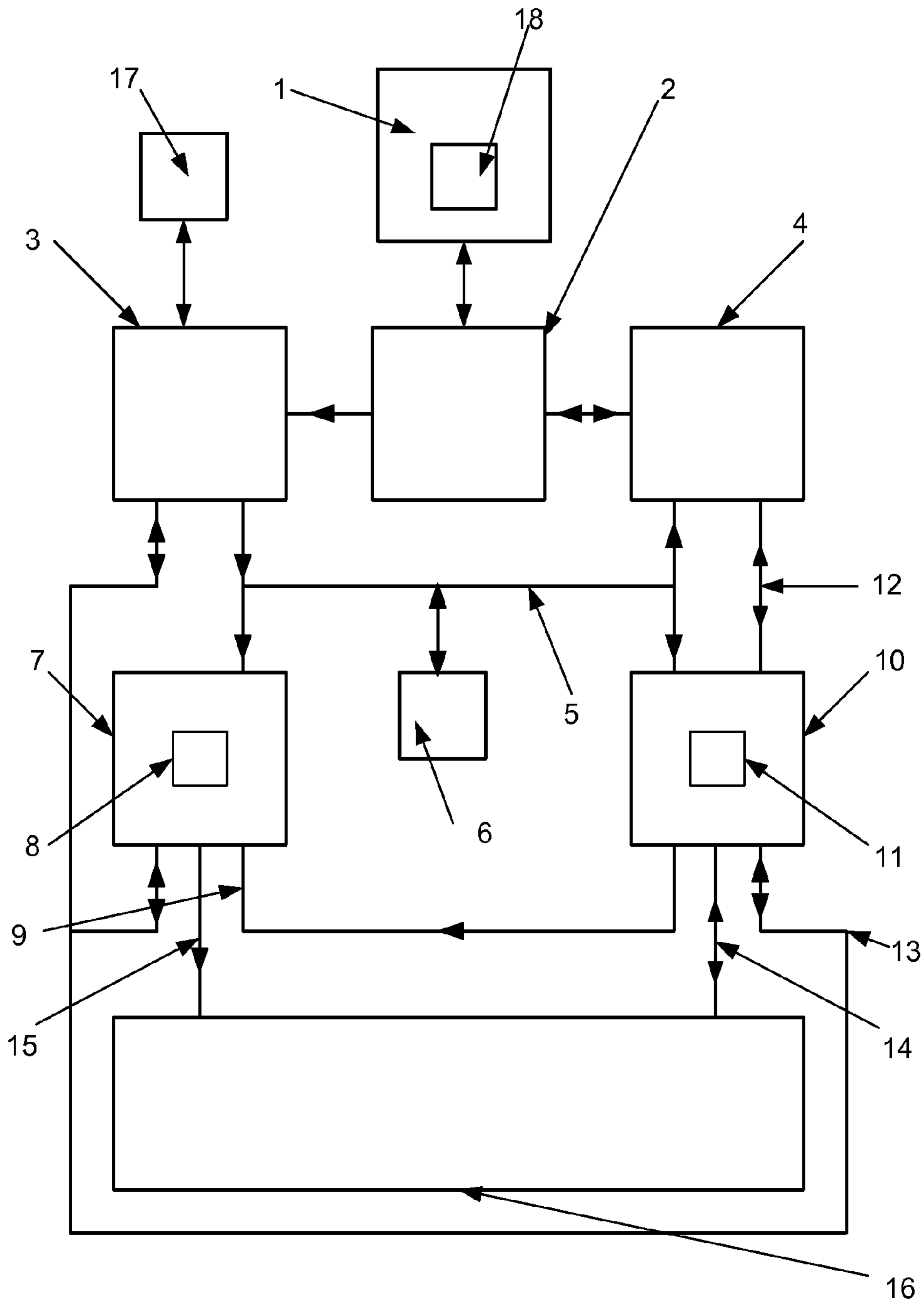
FIG. 33F is an instrumented baseball home plate and ice hockey puck instrumentation package assembly element, power electronics block diagram.

The detailed flow of electrical signals and data in the instrumentation package assembly element's electronics 10 is shown in the preferred embodiment given in FIG. 33E and FIG. 33F. The electronics 10 derives its electrical power from a battery pack that is external to the instrumentation package assembly element. The battery pack, like the instrumentation package assembly element, are principal parts of the instrumentation package assembly which contains them both.

FIG. 33E is a block diagram that explains the detailed circuitry, flow of electrical signals and data in the general operation of the instrumentation package assembly element electronics used for televising pictures and sounds, controlling the electrical and mechanical functions within the instrumentation package assembly element, and charging the battery pack. FIG. 33F is a block diagram showing the signals and data flows in the power supply and battery charging circuits inside the instrumentation package assembly element.

The instrumentation package assembly element is a compressed assemblage of all the optical components camera 1 and camera lens 2 that gather TV pictures, and the electronic 10 components that transmit the TV pictures. The electronic components 10 also receive electrical signals from two microphones that are external to the instrumentation package assembly element but housed within the instrumentation package assembly. The electronic components 10 transmit those signals along with the TV picture signals to the wireless transmission network or the fiber optics/copper cable transmission network. The electronics 10 also do all the command and control bi-directional handshaking between the remote base station and the instrumented baseball base. The electronics 10 also does all the battery pack power control and management. All these functions are done in the instrumentation package assembly element's single contiguous enclosure.

The instrumentation package assembly element enclosure is essentially a short cylinder about one inch or more long that is comprised of three sections. The first section is a small diameter cylinder 5 that contains the camera lens 2. The second section is a larger diameter cylinder 8 that contains the camera 1. The shoulder section 6 connects 5 and 8. The third section is a corrugated bellows segment 9 that contains the electronics 10. The electronics 10 are mounted on a common multilayer printed circuit board down the center of the instrumentation package assembly element. The third section 9 is connected to a sealed air tight roller bearing 12. All the section connections are air tight including the roller bearing. When the instrumentation package assembly element is mounted into a mating seat in any one of the instrumentation package assemblies specified in FIG. 33A and FIG. 33B and FIG. 33C and FIG. 34A and FIG. 34B and FIG. 34C and FIG. 35A and FIG. 35B and FIG. 35C, the instrumentation package assembly element is air tight. It is then pressurized with a dry gas like dry nitrogen in order to keep out dirt and moisture.

The instrumentation package assembly element enclosure is made strong to protect its contents from shock and vibration and resist being crushed. Material examples such as polycarbonates, ABS and fiber reinforced plastics are used in its construction.

The camera 1 is a HD TV CCD sensor arrayed camera. The camera 1 uses a camera lens 2 which images objects along the camera's optical axis and line of sight 3 onto the camera's CCD sensor array. There is a rubber O-ring seal 4 between the camera lens 2 and the instrumentation package assembly element's enclosure 5. 5 is the small diameter cylindrical end segment of the instrumentation package assembly element's cylindrical enclosure.

The enclosure has a sealed roller bearing 12 attached to the corrugated bellows segment 9 of the enclosure. The sealed roller bearing 12 permits the entire enclosure to rotate around its axis 3. The enclosure houses the camera lens 2, camera 1, and electronics 10. The electro-mechanical actuator 11 precisely rotates the camera 1 and its letterbox shaped CCD sensor array around its picture frame's center about the optical/mechanical axis 3 of the camera 1 and its lens 2. The electro-mechanical actuator 11 precisely rotates the entire enclosure containing the camera and its lens around its mechanical axis 3. Camera 1 and camera lens 2 have optical axis 3. Therefore, when the electro-mechanical actuator 11 rotates the enclosure, it rotates the camera 1 and its lens 2 together inside the enclosure as a unit around their optical/mechanical axis 3. The electro-mechanical actuator 11 has a sequence of eight precision detented mechanical stops that are forty-five degrees apart positioned sequentially around the axis 3.

The electro-mechanical actuator 11 is powered electrically by the electronics 10 to servo on command to any one of the eight detented mechanical stops. The cameraman in the remote base station controls the electro-mechanical actuator 11. The cameraman controls which of the eight detented mechanical stops the electro-mechanical actuator 11 rotates the camera 1 and lens 2 to, and then stops at. An example of the electro-mechanical actuation mechanism 11, which physically rotates the camera and camera lens together, is a geared micro-motor drive with indexed micro switch stops. An alternate example of an electro-mechanical actuation mechanism is the relay-ratchet. In either case, smooth precise rotation about axis 3 is achieved using the sealed precision roller bearing 12 which is attached to the corrugated bellows 9 end of the instrumentation package assembly element's enclosure.

Four of the eight mechanical stops are primary mechanical stops and are set precisely ninety degrees apart from one another around the optical and mechanical axis 3. The remaining four mechanical stops are secondary stops and are positioned at forty-five degrees between the primary stops.

The primary mechanical stops are electronically labeled and recorded in memory in counter-clockwise order as the $1^{st}$, the 3rd, the 5th and the $7^{th}$ primary stops. The secondary mechanical stops are electronically labeled and recorded in memory in counter-clockwise order as the 2nd, the 4th, the 6th and the 8th secondary stops. The labeling of these mechanical stops assists the software in the remote base station to know precisely how the camera images are rotationally oriented in space relative to reference points in the instrumentation package assembly element, instrumentation package assembly, and the instrumented baseball home plate.

The camera 1 is positioned in rotation inside the cylindrical enclosure segment 8 so that the line of its vertical pixels that run through the precise electronic image center of the CCD sensor array picture frame will align precisely with the 1st primary mechanical stop.

The sealed precision roller bearing 12 is used to connect and seat the instrumentation package assembly's element into the main central hub of the instrumentation package assembly. The sealed roller bearing 12 is used to seal the joint between the corrugated bellows 9 and the main central hub of the instrumentation package assembly. The sealed bearing 12 holds pressurized dry nitrogen gas inside the instrumentation package assembly element, and prevents dirt and moisture from entering its cavity which might damage its contents. The bearing 12 rotation axis is made coincident with the optical/mechanical axis 3 of camera 1 and camera lens 2. Elsewhere in the present invention, the instrumentation package assembly's element's small diameter cylindrical ends of the enclosure 5 are shown plugged into a buffer plate assembly. Also elsewhere in the present invention, the instrumentation package assembly's element's are also shown attached at their corrugated bellows' open end 13 to the hub of their instrumentation package assembly. The small diameter cylindrical end 5 allows the camera lens 2 to peer through the buffer plate assembly when 5 it is plugged into and mounted in the buffer plate assembly. An example of the instrumentation package assembly's element's small diameter cylindrical end of the enclosure 5 being plugged into a buffer plate assembly is shown in FIG. 44A and FIG. 44B. The instrumentation package assembly's element's corrugated bellows end of the enclosure 9 attached to the hub of its instrumentation package assembly's is also shown in FIG. 44A and FIG. 44B. The shoulder 6 of the large diameter section of the enclosure nests and seats itself against the seals in the large diameter bore of the buffer plate assembly.

The top induction coil 7 is wound around the outside of the large diameter cylindrical section 8 of the enclosure close to the enclosure's upper end, to put it in close proximity to the top of the instrumented baseball home plate and instrumented ice hockey puck to improve its magnetic coupling efficiency with the battery pack charging unit. Also, the top induction coil 7 is wound around the outside of the large diameter cylindrical section 8 of the enclosure to minimize the heat flow into the enclosure that is generated in its turns while the battery pack is charging. The top induction coil 7 is wired to the electronics 10 inside the enclosure which handles battery charging and power management. The purpose of induction coil 7 is to act as an air core secondary winding to magnetically couple to the time varying lines of flux introduced from the primary winding of the battery pack charging unit which is placed flat on top of the instrumented baseball home plate and instrumented ice hockey puck while charging the battery pack. The battery pack charging unit is disclosed in FIG. 37A and FIG. 37B and FIG. 37C.

The electronics 10 is also wired to the lower induction coil (not shown) which is not a part of the instrumentation package assembly element. The lower induction coil is mounted on the outside of the access lid heat sink of the instrumentation package assembly and is external to the instrumentation package assembly element. The lower induction coil is also used to charge the battery pack. For example, the lower induction coil is shown in FIG. 33B and FIG. 33C.

In variants of the present preferred embodiment, a variety of different camera lens types, with different lens setting capability, can be used providing they are small in size (so as not to be prominent and conspicuous to the players) and also physically fit within the instrumentation package assembly. The auto iris setting permits the camera lenses to automatically adjust for varying lighting conditions on the field. The auto focus setting permits the camera lenses to adjust focus for varying distances of the players and action subjects on the field.

A variety of different camera lens types, with different lens setting capability, can be used providing they are small in size and weight. The auto iris setting permits the camera lens to automatically adjust for varying lighting conditions on the field. The auto focus setting permits the camera lens to adjust focus for varying distances of the players and action subjects on the field.

The functions of the camera lens 2 such as zoom, focus adjustment settings and iris adjustment settings are controlled wirelessly by the cameraman from the remote base station by sending command and control signals from the remote base station to the instrumentation package assembly inside the instrumented sports paraphernalia. The cameraman can also send command and control signals from the remote base station to the instrumentation package assembly to put these settings on automatic under the control of the camera electronics. The optical and electronic zoom functions of the camera lens 2 are operated by the cameraman by sending command and control signals from the remote base station to the instrumentation package assembly. The cameraman can select from a wide variety of HD camera lenses. Wide angle lenses and ultra wide angle lenses are used in many venues to give the TV viewing audience the feeling of being there on the playing field amongst the players. In some venues the cameraman may choose to use camera lenses with more magnification and narrower fields of view to better cover certain plays. In some venues the cameraman may choose camera lenses with small f-numbers to deal with poorer lighting conditions.

Referring to the Preferred Embodiments Specified in FIG. 33D, the Instrumentation Package Assembly Element Satisfies all of the Following Further Objectives:

It is an objective of the present invention that the instrumentation package assembly element be composed of one camera, one camera lens, one lens seal, one small diameter cylindrical enclosure segment, one enclosure shoulder, one top induction coil, one cylindrical enclosure segment, one enclosure corrugated bellows segment, one electronics, one electro-mechanical actuating device, and one sealed roller bearing. It is an objective of the present invention for the instrumentation package assembly element to act as a common building block for construction of all the instrumented baseball home plate's instrumentation package assemblies, all the instrumented baseball pitcher's rubber's instrumentation package assemblies, and all the instrumented ice hockey puck's instrumentation package assemblies. It is an objective of the present invention to make images of objects that appear below the center of the TV picture frame, appear upright to the TV viewing audience. It is an objective of the present invention for the instrumentation package assembly element to align and provide a stable mounting means for its optical, electronic and mechanical components. It is an objective of the current invention to provide a means to hold the cameras inside the instrumentation package assembly to look out from the top of the instrumentation package assembly. It is an objective of the current invention to provide a means to prevent moisture and dirt from entering the instrumentation package assembly. It is an objective of the current invention to provide a means to prevent damage to the instrumentation package assembly from dirt, moisture and debris encountered during baseball games and ice hockey games. It is an objective of the current invention to provide a means to isolate the instrumentation package assembly from the shock and vibration encountered by the instrumentation package assembly during baseball games and ice hockey games. It is an objective of the current invention to provide a means to align and hold the instrumentation package assembly inside the instrumented baseball home plate, instrumented baseball pitcher's rubber, and instrumented ice hockey puck. It is an objective of the current invention to provide straightforward access to permit servicing of the component parts of the instrumentation package assembly. It is an objective of the present invention to provide the instrumentation package assembly with a means to mechanically mount and be aligned to a buffer plate. It is an objective of the present invention to instrument sports paraphernalia such as footballs, basket balls, soccer balls, volleyballs, hockey pucks, baseball's 1st and $2^{nd}$ and 3rd bases and home plates, baseball pitcher's rubbers, etc. It is an objective of the present invention that the instrumentation package assembly must be made physically small so it can be mounted inside sports paraphernalia without changing the appearance or functionality of the sports paraphernalia to the players and field crews. It is an objective of the present invention to produce an instrumented baseball home plate having substantially the same weight, balance, appearance and playing qualities of a conventional professional league baseball home plate, so as to be accepted by the leagues and qualify it to substitute for conventional professional league home plates in the game. It is an objective of the present invention to provide a means to wirelessly transmit pictures and sounds, from sports paraphernalia used on the field of play during major league games, sports events and training sessions, to a remote base station. It is an objective of the present invention to provide a means to wirelessly transmit pictures and sounds, from sports paraphernalia used on or off the field of play during sports events, training sessions, demonstrations, and promotions to a remote base station. It is an objective of the present invention to provide a means to transmit pictures and sounds of the game by fiber optics/copper cable buried in the baseball field, from sports paraphernalia used on the field of play during major league games, sports events and training sessions, to a remote base station. It is an objective of the present invention to enable the camera and other components within the instrumentation package assembly to be protected from the hazards on the baseball playing field such as ice, snow, rain, dirt and physical impacts. It is an objective of the present invention that the packaging design used to mount the electronic components inside the instrumentation package assembly element be as light-weight as possible. It is an objective of the present invention to arrange the instrumentation package assembly elements in pairs to make 3-D stereo camera pairs. It is an objective of the present invention to hold the interpupillary distance, of the optical and mechanical axes of each 3-D stereo camera pair to a value suitable for a 3-dimension format needed by the TV viewing audience.

FIG. 33E

The detailed physical elements disclosed in the instrumented baseball home plate and ice hockey puck instrumentation package assembly element signal and data electronics block diagram shown in FIG. 33F are identified as follows: 1 is a high definition camera. 2 is a condenser microphone. 3 is a video MPEG encoder. 4 is an audio operational amplifier. 5 is an audio MPEG encoder. 6 is a random access memory. 7 is a microprocessor. 8 is a power control switch. 9 is a power regulator. 10 is an RF antenna phasing and impedance matching module. 11 is a firmware read only memory. 12 is an MPEG stream encoder. 13 is a network transceiver. 14 is a dc power over fiber line interface. 15 is a dc power from fiber optics/copper port. 16 is a battery recharging and data isolation network. 17 is a 250 kHz tuning capacitor. 18 is a rechargeable battery. 19 is an induction coil interface. 20 is a fiber optics/copper line driver interface. 21 is a main image, sound and RF components. 22 is a control, power supply and battery charging components. 23 is an RF feed line to antenna assembly. 24 is a fiber optic feed line to fiber optic receptacle. 25 is a camera position actuator. 26 is a camera position driver. 27 is an actuator mating plug. 28 is an actuator mating receptacle. 29 is a 250 kHz induction coil. 30 is a condenser microphone. 31 is a condenser microphone.

FIG. 33E is an instrumented baseball home plate and ice hockey puck instrumentation package assembly element signal and data electronics block diagram.

Referring to drawing FIG. 33E, in a preferred embodiment, the instrumented baseball home plate and ice hockey puck instrumentation package assembly element electronics is disclosed. The instrumented baseball home plate instrumentation package assembly element is specified in FIG. 33D.

Camera 1 is a Hi-Definition 1080i CCD Camera, whose output is a broadcast grade HD-SDI format signal. In this embodiment this 1 has a native 16:9 letter-box aspect ratio. The signal of 1 is fed to the input of video MPEG encoder compression hardware 3. 1 is also equipped with an auto-focus/iris feature set that can be over-ridden by commands from the system CPU 7 in turn issued by the remote base station system software. During game play 1 is used to capture the action occurring around either end of the instrumented baseball base or instrumented home plate and convey these captured pictures and sounds via MPEG stream encoder 12 and network transceiver 13 to the remote base station for further processing. Compression hardware 3 is a real time H.264 MPEG compression hardware module. Compression hardware module 3 compresses the signals inputted to them from 1 into MPEG format using the H.264 Protocol and provides an elementary MPEG stream to the input of MPEG stream encoder 12. Compression is needed to reduce the bandwidth requirements prior to transmission via radio using network transceiver 13. Compression hardware module 3, also receives commands from the CPU 7, which set the compression parameters associated with the H.264 protocol. Alternatively camera 1 may contain part of or all the functions of compression hardware module 3 as part of their own internal circuitry, thus saving some board space during manufacturing, in which case the additional control commands from CPU 7 would be sent directly to cameras 1 in-lieu of compression hardware module 3.

Remote rotational movement of the camera 1 about its y-axis is achieved by actuator 25. Actuator 25 in turn receives a set of instructions from microprocessor 7 via actuator driver 26 whenever a positioning command is received by 7 from the remote base station. 25 operates in the form of a closed-loop servo mechanism and is equipped with an encoder to convey its instantaneous position information to the remote base station via 7, thus enabling the remote base station to know the physical position of the camera 1 relative to its point of mounting within the instrumented baseball home plate. 25 is connected to 7 via an actuator mating plug 27 and actuator receptacle 28.

A set of three condenser microphones, 2, 30 and 31 are shown in FIG. 33E located inside the instrumented baseball home plate. Their purpose is to capture the ambient sounds of players around the baseball base or home plate as well as the sound of players striking or sliding into the instrumented baseball base or instrumented home plate itself. These microphones used during game play serves as the signal source for operational amplifier 4. 4 is configured as a low noise high gain microphone pre-amplifier. 4 amplifies the signals inputted from the condenser microphones and provides adequate voltage gain and equalization to drive the analog to digital converters inside MPEG Audio Encoder 5. which further combines the resultant elementary audio data packets into a single stream and applies them to MPEG stream encoder 12 where they are combined with the MPEG stream supplied by 3 prior to transmission to the remote base station by 13.

13 is a network transceiver. This transceiver is inputted composite encapsulated MPEG Stream image and audio data from 3 and 5 along with system control status data packets from system control microprocessor 7. Network transceiver 13 then transmits this data, for example, using the 802.11(xx) protocol via the unlicensed 2.4 or 5.8 GHz radio spectrum via radio using 13 and an antenna located within the instrumentation package assembly of the instrumented baseball base or instrumented home plate to the remote base station, 13 also outputs control commands from the remote base station when they are received by this antenna via the unlicensed 2.4 or 5.8 GHz radio spectrum. These control commands are inputted to 7. 7 is used to control the flow of system command functions. These command functions are used to adjust the operating parameters of the system based on instructions that it receives from the remote base station.

Additionally, 13 will also communicate and convey high quality picture and sound information data packets along with the aforementioned system control commands over a fiber optic and/or copper cable connection via fiber optics/copper line driver interface 20 via a fiber optic feed line 24 which is interconnected with a fiber optic receptacle located on the bottom of the instrumented baseball base or instrumented home plate. Use of such a fiber optic connection between the instrumented baseball base or instrumented home plate completely eliminates bandwidth and/or interference issues that are sometimes encountered with a solely RF based system. Stadium owners can also benefit by using fiber optic connectivity since it permits easier future systems upgrades.

System command function instructions can alternately be received by 7 from battery charging and stand-by data separator circuit 16. This is needed to allow initialization of the instrumentation package inside the instrumented baseball base or instrumented home plate. 7 utilizes an operating firmware stored at the time of manufacture on system ROM 11 and executes this firmware upon loading system RAM 6 with its contents. 13 is a network transceiver. 13 is used to provide a wireless RF link operating on the unlicensed 2.4 or 5.8 GHz radio spectrum between the instrumented base or instrumented home plate and the remote base station, utilizing, for example, the 802.11(xx) Protocol. 13 transmits MPEG stream data packets from 12 and also transmits and receives control commands from system control microprocessor 7. These control commands specify the exact RF channel frequency, RF channel power output and antenna phasing via an impedance matching and phase shift network 10 when an instrumented baseball base or instrumented home plate equipped with a phased antenna array is being used.

Signals traveling to and from 13 as RF signals are coupled, via an RF feed line 23 and impedance matching network 30, to the atmosphere by an antenna system located within the instrumented baseball base or instrumented home plate. This antenna system, operating within the unlicensed 2.4 or 5.8 GHz radio spectrum, provides an isotropic gain of 3 db or better is used to capture and radiate the RF energy transmitted and/or received between the remote base station and an instrumented baseball base or instrumented home plate so equipped with an instrumentation package assembly.

Referred to in FIG. 44A the instrumentation package assembly utilizing a phased antenna array is shown. A phased array is desirable since it permits a finite adjustment of the transmitted and/or received RF propagation pattern such that an optimum RF path between the remote base station and the instrumented home plate is maintained. This allows interference issues which can occur in some stadiums to be resolved.

Power supply regulator 9 supplies power to all the elements showed in FIG. 36D. 9 receives power from a rechargeable battery pack 18 located within the instrumentation package assembly. In a preferred embodiment, a lithium ion battery pack is used because of the heavy current requirements expected during the length of time of a typical baseball game. Alternately 9 can receive dc power from a dc power port of a fiber optics/copper receptacle located on the bottom of the instrumented baseball base or instrumented home plate via fiber optics/copper dc power interface 14 and dc power feed line 15 from the aforementioned fiber optics/copper receptacle.

The rechargeable battery pack 18 delivers 3.3 volt dc to 9 which in turn supplies power to all the elements shown in FIG. 36D. However, to ensure long battery life, the main functional electronic components shown within the boundaries of dotted lines 21 receive dc power in a reduced state or can be switched off.

The control, power supply and battery charging electronic components within the dotted line boundaries of 22, receive dc power from 18 whenever 18 is sufficiently charged to place the components of 22 into a steady stand-by state.

The instrumentation package assembly also contains a set of inductive pickup coils 29 that are used to couple electrical energy from outside of the instrumented baseball base or instrumented home plate via induction coil interface 19 to the aforementioned battery pack during the recharging of the battery pack via battery charging and stand-by data separator circuit 22. The aforementioned inductive pickup coil is tuned by a capacitor 17 so as to resonate at a frequency near 250 kHz. 22 contains a switching circuit 8 that receives control commands from system control microprocessor 7. These commands instruct and enable 22 to supply power to the rest of the electronic components that comprise FIG. 36D. These commands take 9 out of the stand-by mode and put it in the power-on mode.

The instrumented ice hockey puck disclosed in FIG. 66A and FIG. 66B and FIG. 66C uses the instrumentation package assembly shown in FIG. 35A and FIG. 35B and FIG. 35C. The instrumentation package assembly shown in FIG. 35A and FIG. 35B and FIG. 35C uses four of the instrumentation package assembly elements shown in FIG. 33D. The instrumentation package assembly elements shown in FIG. 33D use gyroscopic transducers which are specified in the present electronics block diagram FIG. 33E.

A detailed example of the operation of the gyroscopic transducers follows as applied to instrumented ice hockey pucks. Referring to FIG. 33E, a self contained three-dimensional gyroscopic transducer 32 is shown. This transducer consists of three separate individual low power semiconductor based encoders. Each of these three encoders is configured at the time of manufacture to respond to a pre-determined action of motion specific to the direction of rotation, forward or backward motion and rise or fall conditions of the instrumented hockey puck in real-time. The hockey puck's pitch, roll and yaw are encoded. Roll is associated with the spin of the puck on the ice about its vertical z-axis.

Each encoder provides a pulse coded binary data output that varies in accordance with the relative direction and rate of movement of the instrumented hockey puck. For example, during a typical hockey game the puck will be struck by a player's stick causing the puck to suddenly accelerate in a horizontal direction towards the goal net. The amplitude of this acceleration is perceived by the horizontal motion encoder and its resultant pulse coded data output is fed to an interrupt request port of microprocessor 7. The connection between 32 and 7 is such that each of the encoders will accurately convey information about the multiple possibilities of physical motions of the instrumented hockey puck during a typical game, as previously described above, to 7 for further transmission to the remote base station via the administrative data link established by components 7,10,13 and 23 respectively. At the time of boot-up, microprocessor 7 is instructed by the firmware contents contained within read only memory 6 to continually execute a routine check of the data presented to its interrupt ports at a sampling rate sufficiently high enough so as to accurately convey the resultant pulse coded data output that represents the direction of rotation, forward or backward motion and rise or fall conditions of the instrumented hockey puck in real-time to a computer at the remote base station for use by special software.

The administrative data link referenced above is a bi-directional communications path over which control commands, as well as status data between the instrumented sports paraphernalia and the remote base station are conveyed. These commands and/or status data consist of data packets or streams that are independent in function of those that are used to convey image and/or sound information to the remote base station but share the same communications transport mechanism overall This communications transport mechanism is formed whenever the microprocessor within the instrumented sports paraphernalia communicates with the remote base station over the particular mode of communications connectivity that the stadium has been equipped for i.e. fiber optics, copper cable or wireless radio.

This microprocessor is connected via an I/O port to the network transceiver within the instrumented sports paraphernalia and periodically monitors this port for activity.

When a data stream arrives at this port from the remote base station, the microprocessor executes a series of instructions contained in ROM in such a way that it will respond and act only on those commands that are correctly identified based on a unique identification integer code present in the signal that immediately precedes the control data stream contents. If the stream is identified as valid the microprocessor will execute the received command as determined by the firmware stored in ROM and transmit a status data acknowledgement to the remote base station.

Status data received by the remote base station transceiver is handled in a manner similar to that of the instrumented sports paraphernalia as previously described.

When the remote base station transceiver intercepts an appropriately coded transmission over the particular mode of communications connectivity that the stadium has been equipped for i.e. fiber optics, copper cable or wireless radio, it will respond and act on it in the manner determined by the communications handling provisions of the special software running on the associated computer at the remote base station.

For example, when the instrumented ice hockey puck is first initialized prior to use from an idle position, normally by a command sent over the administrative data link from the remote base station, microprocessor 7 according to its firmware instructions contained within read only memory 6 initializes the gyroscopic encoders in a zero motion state so that the remote base station's computer is able to synchronize the previously mentioned special software.

During a typical hockey game this computer simultaneously receives the image data streams transmitted by the instrumented hockey puck and automatically, using the previously mentioned special software, continuously calculates and applies to the received image data stream temporarily stored in memory the correct amount of counter adjustment necessary to hold the images in an upright stable unscrambled position when viewed by the TV audience on a hi definition display or monitor. The cameraman operating the remote base station computer also has the ability to manually issue commands that affect the amount of correction applied to the final image stream. Such commands are very useful in conjunction with other special effects often used during a televised hockey game.

The cameraman, in the remote base station, software selects either the wireless mode of communication, and/or the fiber optics/copper cable mode of communication between each of the instrumented sports paraphernalia and the remote base station. The cameraman can use whichever equipment (antenna array relay junction or fiber optics cable/copper cable) is installed in the stadium/arena with which to command and control his choice and communicate it to the instrumented sports paraphernalia on the stadium/arena playing field/rink. These choices are also physically switch selectable by the cameraman with his access through the opening in the bottom of some of the instrumented sports paraphernalia. Refer to FIG. 59A and FIG. 59B, and FIG. 60A and FIG. 60B, and FIG. 61A and FIG. 61B, and FIG. 64A and FIG. 64B and FIG. 64C for disclosures regarding the remote base station and the antenna array relay junction.

The cameraman selects items from a software menu of control commands that go to the network transceiver at the remote base station that are subsequently transmitted to the instrumented sports paraphernalia for the purpose of adjusting various system initializations, operating parameters, radio frequency, polling system status data such as battery condition, and initiating remote mechanical adjustments such as camera focus, optical zoom, iris and movement to the cameras' field of view, etc over the selected bi-directional communications link i.e. wireless radio, fiber optics or copper cable connectivity being used within the particular sports stadium/arena.

These commands, when intercepted by the network transceiver 13 within the instrumented sports paraphernalia are applied to its microprocessor 7, which then in turn upon executing the instructions stored within the contents of its firmware 6 applies a pulse coded control signal via the power and control interconnect interface 21 inside the instrumentation package to the corresponding electronics i.e. the mechanical actuators that provides optical focus and/or zoom adjustment of the cameras and microphone gain and selection, etc as desired by the cameraman and/or special software running on the computer at the remote base station. The power and control interconnect interface 21 as shown in FIG. 33E, which is represented by dotted lines, consists of the electrical control wiring to and from the electronic components of the instrumented sports paraphernalia that are being controlled.

Referring to the Preferred Embodiment Specified in FIG. 33E, the Instrumentation Package Assembly Element Signal and Data Electronics Satisfies all of the Following Further Objectives:

It is an objective of the present invention that the instrumentation package assembly element electronics be composed of a high definition camera, three condenser microphone inputs, a video MPEG encoder, an audio operational amplifier, an audio MPEG encoder, a random access memory, a microprocessor, a power control switch, a power regulator, an RF antenna phasing and impedance matching module, a firmware read only memory, an MPEG stream encoder, a network transceiver, a dc power over fiber line interface, dc power from a fiber optics/copper port (if available), a battery recharging and data isolation network, a 250 kHz tuning capacitor, a rechargeable battery pack, an induction coil interface, a fiber optics/copper line driver interface, main image-sound and RF components, a control, power supply and battery charging components, an RF feed line to antenna assembly, a fiber optic feed line to fiber optic receptacle, a camera position actuator, a camera position driver, an actuator mating plug, an actuator mating receptacle, and a 250 kHz induction coil, and power and control interconnect interface.

FIG. 33F

The detailed physical elements disclosed in the instrumented baseball home plate and ice hockey puck instrumentation package assembly element power supply electronics drawing shown in FIG. 33F are identified as follows: 1 is an induction coil interface. 2 is an impedance matching data and power isolation network. 3 is a battery charging circuit. 4 is a 250 kHz data modem. 5 is a dc power bus. 6 is a rechargeable lithium ion battery pack. 7 is a power supply regulator circuit. 8 power control switch. 9 is a power control data bus. 10 is a microprocessor. 11 is a read only memory. 12 is a communications data bus. 13 is a status information data bus. 14 is a system control data bus. 15 switched dc power bus. 16 switched components block. 17 is a dc power receptacle within fiber optic jack assembly. 18 is a 250 kHz induction coil.

FIG. 33F is a block diagram of the instrumented baseball and ice hockey puck home plate instrumentation package assembly element, power electronics.

Referring to drawing FIG. 33F, in a preferred embodiment, the instrumented baseball home plate and ice hockey puck instrumentation package assembly element electronics are disclosed. The instrumented baseball home plate instrumentation package assembly element is specified in FIG. 33D.

FIG. 33F shows a light-weight air core induction coil 1 located onboard the baseball instrumentation package assembly. 1 is wound of only a few turns of a relatively small gauge magnet wire with sufficient capacity to handle the required current to recharge the batteries also onboard the baseball instrumentation package assembly with minimal temperature rise.

Impedance matching diverter 2 is connected to 1 forming a parallel resonant tank circuit tuned to approximately 250 kHz. When a baseball base or home plate containing the instrumentation package assembly is properly placed on the recharging station such that coil 1 is subject to the intense magnetic flux created by the coil within the recharging station, 2 will supply magnetically coupled electrical power from the recharging station via 1 and 2 to battery charging circuit 3. In addition, 2 also conveys a packet of administrative and control data signals between the recharging station, via 1 and 2, and Data transceiver 4. Furthermore, 2 includes a high-stability fail-safe protection circuit which prevents 4 from being catastrophically destroyed by the high voltage present across 1 that is necessary during a typical recharging cycle. Circuits 1, 2 and 3 are so arranged that whenever the baseball base or home plate containing the instrumentation package assembly is not placed or is improperly placed on the recharging station or is being used in a game, the circuits comprised of 1, 2 and 3 do not present an electrical load on 7. This feature set also ensures the longest possible life of the battery during idle periods of no-use by not permitting unnecessary loading of 7 by 1, 2 and 3

In the event that the voltage level appearing at battery bus line 5 has fallen below the charging set-point threshold of 3, charging of rechargeable battery 6 will begin to commence automatically as charging current is applied to 6 via 3 and 5 whilst the base or plate containing the instrumentation package is properly placed on an active recharging station.

As the back voltage detected by 3 appearing at 6 rises abruptly above a set-point threshold of 3, charging current is automatically reduced to prevent over-charging of the batteries, this also protects the remainder of the base or plate camera system 16 from damage due to over heating while its batteries are in the charging station.

Throughout a recharging cycle, main power supply 7, microprocessor 10 and 4 also receive dc power from 3 via 5 so as to avoid any unnecessary battery consumption until charging is complete.

Whenever dc power is supplied to 7 via 5, power to the remaining hardware 16 will remain in an off-state until a turn-on command is received by main power supply switch 8 from 10 via main power control data bus line 9. This will in turn cause 8 to energize Switched Power Bus 14 and begin supplying regulated DC power to the rest of the instrumentation package 16. 8 will continue to supply such power until 8 receives a shutdown command from 10 via 9 or a failure of 6 occurs. As long as 8 is keeping 14 active 10 may issue commands to 16 via bi-directional Instrumentation Package Control Data Bus Line 15. 15 is also used to collect status information about 16 including modes of failures which may occur throughout the use of the instrumentation package assembly. These failures in turn cause software parameters of 10 stored within 11 to be executed by 10 and communicate these fault indications back to the base station. Such indications are intended to alert personnel of the fault condition which might otherwise result in an embarrassment to personnel i.e.: an aging battery in need of recharging or a damaged camera.

Each base or plate camera instrumentation package is equipped with a unique identification code and operating firmware embedded in the read only memory 11 areas of 10. As soon as power to 10 via 5 becomes available initialization of 10 is commenced loading this id code and operating firmware into 10 via 11. Once this initialization of 10 is complete, synchronization of 4 with the recharging station's onboard data transceiver begins, via data transceiver bus line 12, thereby establishing an administrative and control data link between 10 and the recharging station's human interface panel via 1, 2, 3, 4 and 12 respectively.

The overall rate and length of time at which 3 will continue to supply charging current and hence recharge the batteries within the base or plate camera instrumentation package is dependent on the specific rating and initial condition of the battery, and the entries made in the user adjustable settings menu of the recharging station's human interface panel based on the operating parameters contained in 11 transferred to the microprocessor onboard the recharging station during synchronization of 4 as previously described.

As soon as a typical charging cycle is commenced, continuous fail-safe monitoring data of the charging current and voltage supplied by 3 is sent to 10 via Power control data bus line 13. If at any time a problem develops during a charging cycle that could result in catastrophic destruction of the base or plate camera instrumentation package, batteries and/or the recharging station, a total system shutdown sequence is initiated and personnel advisory warning displayed on the recharging station's human interface panel, thereby removing power and safeguarding the hardware as described.

While a base or plate equipped with the base or plate camera instrumentation package is properly placed in the recharging station a series of self diagnostic and power consumption tests may be performed on 16. The results of which are forwarded to the human interface panel of the recharging station via 1, 2, 4, 10 and 11 respectively and are useful to personnel in evaluating the base or plate camera instrumentation packages overall condition prior to its use in a game.

Since a typical base or plate team may wish to use a finite number of n bases or plates equipped with the camera instrumentation package, a means of cataloging and archiving the charge, recharge, usage, power consumption and diagnostic testing cycles associated with each is provided by 10 via 11. This information is available to personnel via the human interface panel on the recharging station upon command from personnel and furthermore may be stored by a Personal Computer connected to the data logging port of the recharging station charging the base or plate(s) concerned. As previously described, each base or plate camera instrumentation package contains a unique identification number; therefore the bookkeeping for each base or plate involved is independent respectively.

After 6 has assumed a full and complete charge, the base or plate camera instrumentation package is placed into a powered-off state and except for a very small stand-by current through 4 and 10, battery consumption is minimized until future use is desired.

Prior to using the base or plate camera instrumentation package in a game 8 must be activated in order to supply dc power to 16. Upon receiving a power-on command from 10 via 9 and 10 will take 8 out of the power-off state thus allowing 7 to supply dc power to 16.

Invocation of the power-on command by 10 may be accomplished by either of two methods: Firstly, if the base or plate concerned is properly placed on a recharging station its human interface panel (if so equipped) may be used to invoke a power-on command sequence to 10 via 1, 2, 4 and 12 respectively. Secondly, the base or plate camera system's hand-held remote control device may be placed near either end of the base or plate concerned to invoke this command to 10 via 1, 2, 4 and 12 if desired.

Activation of 8 by either method places the entire base or plate camera instrumentation package into a fully powered-on state and may then be synchronized with the base station hardware, tested and subsequently utilized in a base or plate game.

While the base or plate camera instrumentation package is in a fully powered on state and not placed in the recharging station i.e. it is being used in a real base or plate game, administrative data, Identification code and control signals along with photographic image and sound accompaniment will be transmitted and available to the base station hardware.

If throughout a game, a low battery condition, power supply or any other technical fault develops, 7 via 13 will cause 10 to transmit an appropriate warning message to the base station's human interface display via the 802.11(x) transceiver in 16.

False signaling and invocation of the base or plate camera instrumentation package by other nearby potential sources of interference is avoided by the decoding algorithm stored in 11 and used by 10 when communicating critical information over either of the two distinct administrative and control data link techniques utilized by the base or plate camera instrumentation package. Until 6 falls to a low level set-point threshold within 7, The base or plate camera instrumentation package will remain in a fully powered-on state unless 7 is de-activated via 8 after a shutdown sequence is issued by a power-off command from 10. To preserve the life of 6, upon completion of its use, i.e. at the end of a game, the base or plate camera instrumentation package should be placed into a powered-off state by causing 10 to issue a power-off signal to 7 via 8 and 9.

This may be accomplished in one of several methods: Firstly using the human interface hardware, display and software at the base station, personnel may transmit and invoke a power-off command to 10 via the 802.11(x) administrative and control data link of 16 via 13. Secondly, the personnel at the side lines of a typical base or plate game may wish to conclude the operation of the instrumented baseball base or plate instrumentation package by conveniently placing the handheld remote control near either end of the instrumented base or plate and depressing the power-off key on the human interface panel of said remote control invoking a power-off command to 10 via 1, 2, 3, 4 and 12 respectively.

Finally, personnel may place the base or plate into the cradle of the recharging station. As described previously, whenever a base or plate is properly placed into the cradle of an active recharging station the base or plate camera instrumentation package is automatically put into a powered-off state unless otherwise instructed by personnel using the human interface panel of the recharging station concerned whenever 4 is synchronized with the recharging station via 1, 2 and 3.

Confirmation in any of the methods just described that the base or plate camera instrumentation package has indeed been placed into a powered-off state is assured to personnel by both visual and audible indication from the human interface concerned when 10 via 1, 2, 3, 4 and 12 acknowledges receipt and execution of the power-off invocation.

Referring to the Preferred Embodiments Specified in FIG. 33F, the Instrumentation Package Assembly Element Power Supply Electronics Satisfies all of the Following Further Objectives:

It is an objective of the present invention that the instrumentation package assembly element power supply electronics be composed of an induction coil interface, an impedance matching data and power isolation network, a battery charging circuit, a 250 kHz data modem, a dc power bus, a rechargeable battery pack, a power supply regulator circuit, power control switch, a power control data bus, a microprocessor, a read only memory, a communications data bus, a status information data bus, a system control data bus, switched dc power bus, switched components block, a dc power receptacle within fiber optic jack assembly, and a 250 kHz induction coil.

Figure 34A:
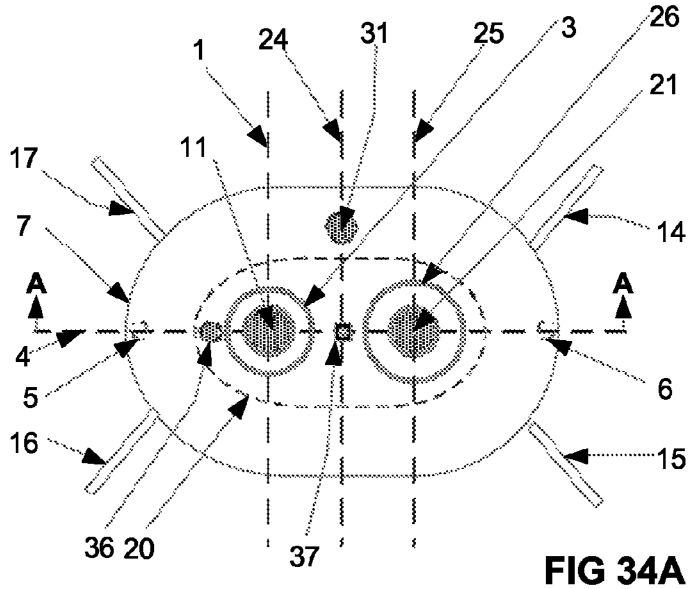
FIG. 34A is a top view of the two camera wireless, fiber optics and bi-directional high speed copper network communications instrumentation package assembly.
Figure 34B:
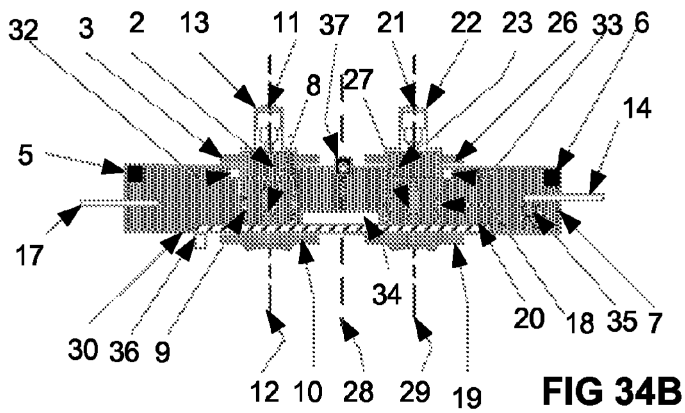
FIG. 34B is a side view of the two camera wireless instrumentation package assembly.
Figure 34C:
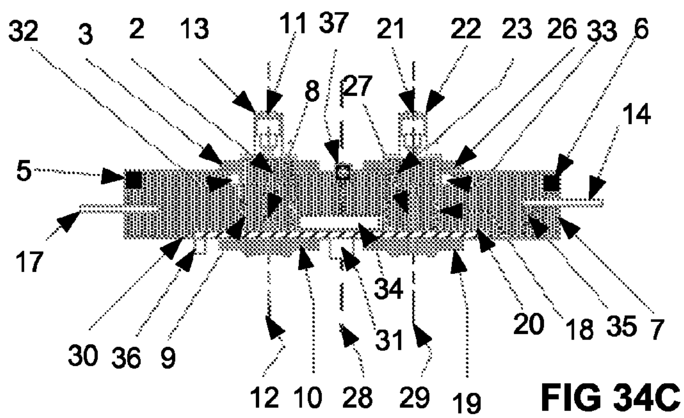
FIG. 34C is a side view of the two camera wireless, fiber optics and bi-directional high speed copper network communications instrumentation package assembly.

FIG. 34A and FIG. 34B and FIG. 34C

The detailed physical elements disclosed in the instrumented baseball home plate instrumentation package assembly drawing shown in FIG. 34A and FIG. 34B and FIG. 34C are identified as follows: 1 is the y-axis of camera 3. 2 is a camera. 3 is a top induction coil for charging the battery. 4 is the x-axis of symmetry of the instrumentation package assembly. 5 is a microphone. 6 is a microphone. 7 is the instrumentation package assembly. 8 is the electronics. 9 is the instrumentation package assembly element showing the corrugated bellows segment. 10 is a bottom induction coil for charging the battery pack 34. 11 is a camera lens. 12 is the optical axis of camera 2. 13 is a camera lens. 14 is a radio antenna. 15 is a radio antenna. 16 is a radio antenna. 17 is a radio antenna. 18 is the instrumentation package assembly element showing the corrugated bellows segment. 19 is a bottom induction coil for charging the battery pack. 20 is the bottom lid heat sink of the instrumentation package assembly. 21 is a camera lens. 22 is a camera lens seal. 23 is a camera. 24 is the y-axis of symmetry of the instrumentation package assembly. 25 is the y-axis of camera 23. 26 is a top induction coil for charging the battery. 27 is the electronics. 28 is the z-axis of symmetry for the instrumentation package assembly. 29 is the optical axis of camera 23. 30 is the bottom of the instrumentation package assembly. 31 is the fiber optics/copper cable connector. 32 is a camera and camera lens actuating device. 33 is a camera and camera lens actuating device. 34 is the battery pack. 35 is dry nitrogen gas. 36 is a gas valve. 37 is the microphone connector.

FIG. 34A is a top view of the two camera and fiber optics/copper instrumentation package assembly.

FIG. 34B is a side view of the two camera wireless instrumentation package assembly.

FIG. 34C is a side view of the two camera wireless and fiber optics/copper cable instrumentation package assembly.

Referring to drawings FIG. 34A and FIG. 34B and FIG. 34C, two different instrumentation package assembly preferred embodiments are disclosed. The only difference between the two embodiments is that one has wireless capability only, whereas the other has both wireless and fiber optics/copper cable capabilities. The one that has wireless capability only is cheaper to produce than the one that has both wireless and fiber optics/copper cable capabilities thereby giving it a cost advantage for venues with lower budgets, like for example some colleges and high schools. The one with both wireless and fiber optics/copper cable capabilities have better bandwidth and lower noise.

The present invention contemplates each instrumentation package assembly embodiment to be equipped with two TV cameras, two TV camera lenses, two microphones, two supporting electronics, one battery pack, four induction coils, two mechanical actuating devices and four antennas.

Each of the instrumentation package assembly preferred embodiments each contains two instrumentation package assembly elements disclosed in FIG. 33D. The single TV camera, single TV camera lens, supporting electronics, induction coil, mechanical actuating device and corrugated bellows segment are the parts of the instrumentation package assembly element disclosed in FIG. 33D which is a primary part of the instrumentation package assembly.

The instrumentation package assembly is used to instrument the baseball home plate by mounting it inside the baseball home plate. A baseball home plate instrumented with an instrumentation package assembly is referred to as an instrumented baseball home plate.

The present invention contemplates the instrumentation package assembly to be equipped with two TV cameras, two TV camera lenses, two microphones, four induction coils, two mechanical actuating devices, supporting electronics, a battery pack and four antennas. The instrumentation package assembly has two instrumentation package assembly elements. The instrumentation package assembly element is disclosed in FIG. 33D. The TV camera, TV camera lens, supporting electronics, one induction coil and mechanical actuating device are the primary parts of each of the instrumentation package assembly elements.

The preferred embodiment shown in FIG. 34B televises its pictures and sounds using wireless transmission. The alternate preferred embodiment shown in FIG. 34C televises its pictures and sounds using fiber optics/copper cable transmission. It also has the capability of televising picture and sounds by wireless transmission.

It is contemplated in the present invention in FIG. 34B that the instrumentation package assembly is an autonomous module designed as a sealed unit for being mounted inside a baseball home plate (henceforth to be called an instrumented baseball home plate), and making the instrumented baseball home plate capable of wirelessly televising baseball games from its cameras and microphones contained within the instrumentation package assembly, to a remote base station.

The alternate preferred embodiment shown in FIG. 34C televises baseball games to the remote base station from its camera and microphones via a fiber optics/copper cable communication link. The fiber optics/copper cable connector built into the bottom of the instrumentation package assembly which is mounted inside the instrumented baseball home plate, is connected to fiber optics/copper cable buried in the ground of the baseball field. The fiber optics/copper cable buried in the ground is connected to the remote base station.

It is understood that as the state of the art in TV camera technology advances, that there will be other better TV cameras that use other than CCD technology. The present invention will work equally well with them as they become available. Therefore, the present invention uses CCD TV cameras as an example of TV cameras that may be used simply because they are the best that today's technology offers, and is not confined only to their sole use in the future.

Referring to the instrumentation package assembly 7 shown in FIG. 34A and FIG. 34B and FIG. 34C, FIG. 34A is a top view of the instrumentation package assembly, FIG. 34B is an A-A section view of the instrumentation package assembly 7, FIG. 34C is an A-A section view of the alternative instrumentation package assembly 7, preferred embodiment showing the fiber optics/copper cable connector 31.

The instrumentation package assembly 7 shown in FIG. 34B contains all the electronics for wirelessly televising pictures and sounds. The instrumentation package assembly 7 shown in FIG. 34C contains all the electronics for televising pictures and sounds using fiber optics/copper cable.

The instrumentation package assembly 7 shown in FIG. 34A and FIG. 34B and FIG. 34C contains two instrumentation package assembly elements 9 and 18. The instrumentation package assembly elements are disclosed in FIG. 33D.

The picture and sounds are taken directly by the instrumentation package assembly's two cameras 2 and 23 and microphones 5 and 6. The instrumentation package assembly 7 is mounted within the instrumented baseball home plates shown in FIG. 45 and FIG. 49 and FIG. 51 and FIG. 52. Both preferred embodiments shown in FIG. 34B and FIG. 34C communicate the pictures and sounds from the instrumentation package assembly 7 mounted inside the instrumented baseball home plates on the field to a remote base station located near the field for final processing and dissemination. The remote base station is disclosed in FIG. 59A and FIG. 59B and FIG. 60A and FIG. 60B and FIG. 61A and FIG. 61B.

Microphone electrical connector 37 is mounted on the instrumentation package assembly. 24 mates with an electrical connector which is wired by a cable to a third condenser microphone. This microphone protrudes through the top of the instrumented baseball home plate. Refer to instrumented baseball home plate embodiments shown in drawings FIG. 45A and FIG. 45B, and FIG. 49A and FIG. 49B and FIG. 49C and FIG. 49D, and FIG. 51A and FIG. 51B and FIG. 51C and FIG. 51D, and FIG. 52A and FIG. 52B and FIG. 52C and FIG. 52D. This microphone listens for sounds of the game that occur on the baseball playing field above the top of the instrumented baseball home plate and above the ground. The microphone cable carries electrical sound signals from the microphone to the microphone electrical connector which is plugged into its mating electrical connector 37 on the instrumentation package assembly shown in the referenced drawings.

The instrumentation package assembly 7 is a compressed assemblage of all the optical and electronic components that gather and transmit TV pictures and sounds, into a single enclosure. The main body of the instrumentation package assembly 7 is essentially a short cylinder roughly about ½ inch or more high that resembles a can of tuna fish. It is made strong to resist being crushed. Material examples such as polycarbonates, ABS and fiber reinforced plastics are used in its construction. The x-axis of symmetry of the instrumentation package assembly 7 is 4. The y-axis of symmetry of the instrumentation package assembly 7 is 24. The center of the instrumentation package assembly 7 is located at the intersection of the x-axis and the y-axis. The z-axis 28 of the main body of the instrumentation package assembly 7 is mutually orthogonal to 4 and 24.

The instrumentation package assembly 7 contains cameras 2 and 23, camera lenses 11 and 21, supporting electronics 8 and 27, induction coils 3, 10, 26 and 19, battery pack 34, radio antennas 14, 15, 16, and 17, mechanical actuating devices 32 and 33, corrugated bellows sections 9 and 18, microphones 5 and 6, bottom lid 20, and fiber optics/copper cable connector 31.

In FIG. 34B, the part of the instrumentation package assembly 7 that contains the camera 2, camera lens 11, supporting electronics 8, induction coil 3, mechanical actuating device 32, and corrugated bellows section 9 is shown enlarged in FIG. 33D.

In FIG. 34B, the part of the instrumentation package assembly 7 that contains the cameras 23, camera lens 21, supporting electronics 27, induction coil 3, mechanical actuating device 33, and corrugated bellows section 18 is shown enlarged in FIG. 33D.

In FIG. 34B, camera 2 is identical to camera 23. Camera lens 11 is identical to camera lens 21. Induction coil 3 is identical to induction coil 26. Mechanical actuating device 32 is identical to mechanical actuating device 33. The corrugated bellows segment 9 is identical to corrugated bellows segment 18.

In FIG. 34C, the part of the instrumentation package assembly 7 that contains the camera 2, camera lens 11, supporting electronics 8, induction coil 3, mechanical actuating device 32, and corrugated bellows section 9 is shown enlarged in FIG. 33D. FIG. 33D is the instrumentation package assembly element.

In FIG. 34C, the part of the instrumentation package assembly 7 that contains the cameras 23, camera lens 21, supporting electronics 27, induction coil 3, mechanical actuating device 33, and corrugated bellows section 18 is shown enlarged in FIG. 33D.

In FIG. 34C, Camera 2 is identical to camera 23. Camera lens 11 is identical to camera lens 21. Supporting electronics 8 are identical to supporting electronics 27. Induction coil 3 is identical to induction coil 26. Mechanical actuating device 32 is identical to mechanical actuating device 33. The corrugated bellows segment 9 is identical to corrugated bellows segment 18.

The supporting electronics 8 and 27 shown in FIG. 34B are different from the supporting electronics 8 and 27 shown in FIG. 34C. The supporting electronics 8 and 27 shown in FIG. 34C have an additional capability beyond that specified for the supporting electronics 8 and 27 shown in FIG. 34B. The supporting electronics 8 and 27 in FIG. 34B can only televise wirelessly to the remote base station; whereas the supporting electronics 8 and 27 shown in FIG. 34C can televise pictures and sounds via a fiber optics/copper cable link to the remote base station, as well as televise wirelessly to the remote base station is disclosed in FIG. 59A and FIG. 59B and FIG. 61A and FIG. 61B.

The picture and sounds are taken directly by the cameras 2 and 23 and microphones 5 and 6 inside the instrumentation package assembly 7. The instrumentation package assembly 7 is mounted within the instrumented baseball home plate that is in play on the baseball field. The instrumentation package assembly may wirelessly or by fiber optics/copper cable communicate and televise the pictures and sounds from inside the instrumented baseball home plate to a remote base station located near the baseball field for final processing and dissemination.

In FIG. 34B, the instrumentation package assembly 7 contains all the electronics 8 and 27 for wirelessly televising pictures and sounds. The electronics 8 is identical to the electronics 27 in FIG. 34B.

In FIG. 34C, the instrumentation package assembly 7 contains all the electronics 8 and 27 for televising pictures and sounds using fiber optics/copper cable in addition to televising pictures and sounds wirelessly like FIG. 34B. The electronics 8 is identical to the electronics 27 in FIG. 34C.

Comparing the electronics in FIG. 34B with those in FIG. 34C, the electronics in FIG. 34C includes additional functions for televising baseball games using a fiber optics/copper cable link to the remote base station.

In FIG. 34C, the instrumentation package assembly 7 contains all the electronics 8 and 27 for televising pictures and sounds using a fiber optics/copper cable link, in addition to televising pictures and sounds wirelessly like in FIG. 34B.

In a preferred embodiment where we have disclosed a baseball playing field with a fiber optics cable/copper cable link buried beneath the ground, and in particular beneath the instrumented baseball home plate and beneath the three instrumented baseball bases, and where the fiber optics cable/copper cable link is connected to the remote base station at its other end, and where the electronics in FIG. 34C includes the capability to televise baseball games from inside the instrumented baseball home plate to the remote base station via the fiber optics cable/copper cable link by connecting to the fiber optics cable/copper cable link using the fiber optics cable/copper cable connector 31. The instrumentation package assembly 7 in the preferred embodiment shown in FIG. 33C uses a fiber optics cable/copper cable connector 31 with which to connect to a fiber optics cable/copper cable link buried beneath the baseball playing field grounds and beneath the instrumented baseball home plate.

The cameras 2 and 23, camera lenses 11 and 21, and electronics 8 and 27 are joined to the main body of the instrumentation package assembly by the corrugated bellows segments 9 and 18.

Cameras 2 and 23 are identical to one another. Camera lenses 11 and 21 are identical to one another. Mechanical actuating devices 32 and 33 are identical to one another.

The diameter of the instrumentation package assembly 7 is kept to a minimum in order to minimize its footprint inside the instrumented baseball home plate. The dimension of the outside diameter of the instrumentation package assembly 7 is governed largely by the physical diagonal dimension of the largest components within the instrumentation package assembly 7, like the SD/HD camera's 2 and 23 CCD sensor arrays and the battery pack 34.

The instrumentation package assembly 7 is mounted inside the instrumented baseball home plate using a buffer plate that acts as a bearing for the instrumentation package assembly 7. The buffer plate supports the upper end of the instrumentation package assembly 7.

The instrumentation package assembly 7 contains two miniature SD/HD TV cameras 2 and 23, two condenser microphones 5 and 6 and supporting electronics 8 and 27. The cameras 2 and 23, microphones 5 and 6, and supporting electronics 8 and 27, are housed together within the enclosure cavity of the instrumentation package assembly 7. The condenser microphones 5 and 6 are attached to the top interior wall of the main body of the instrumentation package assembly 7. The microphones 5 and 6 hear any sounds produced by physical contact of the instrumented baseball home plate with any external thing, including for example air currents felt on the instrumented baseball home plate during the baseball's flight in the air over the instrumented baseball home plate when it is pitched.

The instrumentation package assembly 7 is filled with a dry pressurized gas like nitrogen to prevent the entry of moisture or dirt. The seals between the lid heat sink 20 and main body of the instrumentation package assembly 7 prevent the dry gas from leaking out of the instrumentation package assembly enclosure. A desiccant is disposed near the SD/HD lenses and cameras to collect and prevent any moisture build-up within the instrumentation package assembly 7. The lid heat sink 20 cools the contents of the instrumentation package assembly.

The diameter of the instrumentation package assembly 7 is kept to a minimum in order to minimize the space taken up inside the instrumented baseball home plate. The dimension of the outside diameter of the instrumentation package assembly is governed largely by the physical diagonal dimensions of its largest components like the quad antennas 14, 15, 16 and 17 and the battery pack 19.

The lines of sight 12 and 29 of the cameras 2 and 23 are parallel to one another and the mechanical axis 29 of the instrumentation package assembly.

The camera lenses 11 and 21 are positioned at the very top of the instrumentation package assembly 7, with the cameras 2 and 23 directly beneath them. The cameras essentially look out of the top of the instrumentation package assembly 7 through camera lenses 11 and 21.

The camera lenses 11 and 21 provide imagery to cameras 2 and 23. The camera lenses 11 and 21 image the objects they see onto cameras 2 and 23. The optical and mechanical axis of cameras 2 and 23 and camera lenses 11 and 21 are parallel to one another.

The camera lenses 11 and 21 have o-ring seals 13 and 22. The purpose of the seals 13 and 22 is to hold and prevent leakage of the pressurized dry nitrogen gas from the cavity of the instrumentation package assembly. The seals 13 and 22 prevent dirt and moisture from entering the cavity and damaging and interfering with the performance of its contents. The seal 13 and 22 are made from rubber. The seals 13 and 22 are located between the front of the camera lenses 11 and 21 and the camera lens' cylindrical mounting.

In variants of the present preferred embodiment, a variety of different camera lens types, with different lens setting capability, can be used providing they are small in size (so as not to be prominent and conspicuous to the players) and also physically fit within the instrumentation package assembly. The auto iris setting permits the camera lenses to automatically adjust for varying lighting conditions on the field. The auto focus setting permits the camera lenses to adjust focus for varying distances of the players and action subjects on the field.

The functions of the camera lenses 11 and 21 such as focus adjustment settings and iris adjustment settings are controlled wirelessly by the cameraman from the remote base station by sending command and control signals from the remote base station to the instrumentation package assembly inside the instrumented sports paraphernalia. The cameraman can also send command and control signals from the remote base station to the instrumentation package assembly to put these settings on automatic under the control of the camera electronics. The optical and electronic zoom functions of the camera lenses 11 and 21 are operated by the cameraman by sending command and control signals from the remote base station to the instrumentation package assembly. The cameraman can select from a wide variety of HD camera lenses. Wide angle lenses and ultra wide angle lenses are used in many venues to give the TV viewing audience the feeling of being there on the playing field amongst the players. In some venues the cameraman may choose to use camera lenses with more magnification and narrower fields of view to better cover certain plays. In some venues the cameraman may choose camera lenses with small f-numbers to deal with poorer lighting conditions. For HD 3-D effects where cameras 2 and 23 form a 3-D stereo camera pair, the camera lenses 11 and 21 are chosen by the cameraman to be identical and identical lens settings are used for each.

When a baseball is hit and a player is rounding the bases, the distance of a player from one base may be decreasing while the distance to another base may be increasing. The camera 2 can be independently and simultaneously commanded and controlled to auto focus on their respective players. If the player slides into the instrumented baseball home plate, the cameras 2 and 23 will catch the slide action up close. The microphones 5 and 6 will capture all the sounds of the action. While the player is running, his pictures and sounds are wirelessly being transmitted by the instrumentation package assembly 7 inside the instrumented baseball home plate.

The instrumentation package assembly electronics showing the detailed flow of electrical signals and data in the instrumentation package assembly is shown in the preferred embodiment given in FIG. 36D and FIG. 36E.

The instrumentation package assembly's network transceiver is part of the electronics 8 and 27.

In FIG. 34B, the network transceiver wirelessly transmits real-time pictures and sounds from the cameras 2 and 23 and microphones 5 and 6 via quad antenna array elements 14, 15, 16 and 17, also known as intentional radiators, to the remote base station. The quad antenna array elements 14, 15, 16 and 17 are mounted radially in a horizontal plane 90 degrees apart from one another and extend outward through the cylindrical wall of the main body of the instrumentation package assembly 7.

In an alternate preferred embodiment to FIG. 34B, the quad antenna array elements 14, 15, 16 and 17 can be replaced with a helix antenna (not shown) with similar dimensions wound on the inside diameter of the instrumentation package assembly 7.

The battery's charging coils 3, 10 and 19, 26 are wound on the outside at both the top and bottom of the instrumentation package assembly 7 and act electrically as a transformer's secondary winding. The coils are wound on the outside of the instrumentation package assembly 7 to keep any heat they may produce away from the contents of the instrumentation package assembly 7 while the battery pack is being charged. The number of turns in each of the charging coils 3, 10 and 19, 26 is made large enough to inductively couple a sufficient number of magnetic lines of flux from the primary coil of the external battery charging unit so as to charge the battery pack in a reasonably short time before games. When the charging unit is placed on top of the instrumented baseball base, the charging coils 3, 10 and 19, 26 receive electrical energy inductively coupled from the primary coils of the external charging unit.

Induction coil 3 is located on the top of the instrumentation package assembly 7.

Induction coil 10 is located on the bottom of the instrumentation package assembly 7.

The purpose of the induction coils 3, 10 and 19, 26 is to inductively couple electrical energy into the instrumentation package assembly 7 to charge the battery pack 34. The induction coils 3, 10 and 19, 26 are located on the exterior of the enclosure so as to minimize their heat transfer into the instrumentation package assembly 7 enclosure cavity that would raise the temperature of the electronics within the enclosure cavity. The induction coils 3, 10 and 19, 26 are electrically connected through the enclosure walls to the electronics inside the enclosure.

When the instrumentation package assembly 7 is mounted inside the host sports paraphernalia, such as an instrumented baseball home plate, an external electrical induction coil, which is part of a battery pack charging unit, is used to magnetically inductively couple electrical power into induction coils through the instrumented baseball home plate and into the instrumentation package assembly 7 for the purpose of charging the battery pack 34. A block diagram showing the electrical battery charging circuit involving the induction coils 3, 10 and 19, 26 and the battery pack 34 are shown in FIG. 37. A source of electrical power from the charging unit, which is external to the instrumentation package assembly 7, is inductively coupled into these induction coils 3, 10 and 19, 26 by laying the external induction coil of the charging unit flat on the top of the host sports paraphernalia coaxially above coils 3, 10 and 19, 26. The induction coils 3, 10 and 19, 26 feed this power to the battery pack 34 in order to charge it.

The main body of the instrumentation package assembly 7 houses the battery pack 34 which supplies electrical power to each of the elements within the instrumentation package assembly that requires electrical power.

The instrumentation package assembly's battery pack 34 is inductively wirelessly charged before games on an as needed basis, by an external primary winding placed on the top of the instrumented baseball home plate. Charging of the battery pack 34 is accomplished wirelessly by inductive coupling. The instrumentation package assembly's inductive pickup coils 3, 10 and 19, 26 act as the secondary windings on an air core transformer with an external primary winding as their power source. Inductively coupled time varying magnetic flux is furnished to coils 3, 10 and 19, 26 by the external primary winding placed on the top of the instrumented baseball home plate.

The instrumentation package assembly's battery pack 34 is wirelessly charged by magnetic induction before baseball games on an as needed basis, using the charging station unit shown in preferred embodiment shown in FIG. 37A and FIG. 37B and FIG. 37C. The charging station is placed on the top of the instrumented baseball home plate when it is charging the battery pack 34. Charging of the battery pack 34 is accomplished wirelessly by inductive coupling. The instrumented baseball base's four inductive pickup coils 3, 10 and 19, 26 act as the secondary windings on an air core transformer. Time varying magnetic flux is furnished to 3, 10, 19 and 26 by the primary windings of the charging station FIG. 37A and FIG. 37B and FIG. 37C.

The battery's 34 charging coils 3, 10 and 19, 26 are wound on the outside of the instrumentation package assembly's 7 and act electrically as a transformer's secondary winding. The coils 3, 10 and 19, 26 are wound on the outside of the instrumentation package assembly 7 to keep any heat they may produce away from the contents of the instrumentation package assembly 7 while the battery pack 34 is being charged. The number of turns in each charging coil is made large enough to inductively couple a sufficient number of magnetic lines of flux from the external primary coil so as to charge the battery pack 34 in a reasonably short time before games. When the external primary coil is placed on top of the instrumentation package assembly the charging coils 3, 10 and 19, 26 receive electrical energy inductively coupled from the primary coils.

The instrumentation package assembly's network transceiver electronics 8 and 27 wirelessly transmits real-time pictures and sounds from the instrumentation package assembly's cameras 2 and 23 and microphones 5 and 6 via quad antenna array elements 14, 15, 16 and 17 also known as intentional radiators, to the remote base station. The quad antenna array elements 14, 15, 16 and 17 are mounted in a horizontal plane 90 degrees apart from one another and extend outward through the cylindrical wall of the main body of the instrumentation package assembly 7.

As is shown in the alternative preferred embodiment in FIG. 34C, a fiber optics cable/copper cable connector 31 is employed to connect to a fiber optics cable link buried in the playing field grounds beneath the instrumented baseball home plate, to televise the pictures and sounds of the game to the remote base station which is connected to the fiber optics cable/copper cable link at its other end. The fiber optics cable/copper cable is brought up from the ground beneath the instrumented baseball home plate and connected to the instrumented baseball home plate via the fiber optics cable connector 31. Should fiber optics cable or copper cable buried in the playing field grounds not exist in a baseball stadium, the baseball games may be televised wirelessly using radio signals and antennas 14, 15, 16 and 17 using the preferred embodiment shown in FIG. 34B. It is clear that the preferred embodiment shown in FIG. 34C is superior in this regard because it is capable of televising baseball games by both methods i.e. either wirelessly or by a fiber optics cable/copper cable link. The preferred embodiment shown in FIG. 34C is more expensive to manufacture than the preferred embodiment shown in FIG. 34B because its electronics 8 and 27 must provide for the additional fiber optics/copper cable related electronic functions.

In an alternate preferred embodiment, the quad antenna array 14, 15, 16 and 17 can be replaced with a helix antenna (not shown) with similar dimensions wound on the inside diameter of the instrumentation package assembly down the length of its cylindrical wall.

A antenna array relay junction shown in FIG. 59A and FIG. 59B is deployed in the baseball stadium and receives radio signals from the quad antenna array 14, 15, 16 and 17. Antenna array elements 14, 15, 16 and 17 are in quadrature to radiate radio signals to the antenna array relay junction with sufficient gain so as to overcome RF noise, and provide a large enough gain bandwidth product to accommodate real-time SD/HD picture quality requirements. The instrumentation package assembly's network transceiver electronics 8 also provides a wireless means for the instrumentation package assembly's in the instrumented baseball home plate to receive command and control radio signals from the remote base station's antenna.

The corrugated bellows segment 9 acts to mechanically connect the camera lens 11, camera 2 and electronics 8 to the main body of the instrumentation package assembly. The corrugated bellows segment 9 is mechanically flexible. This flexibility allows the optical axis of the camera 2 and its lens 11 to be mechanically tilted relative to the z-axis 28 of the main body of the instrumentation package assembly 7 and pre-set in place if so desired by the cameraman at the time the instrumentation package assembly 7 is encapsulated inside the host sports paraphernalia.

The corrugated bellows segment 18 acts to mechanically connect the camera lens 21, camera 23 and electronics 27 to the main body of the instrumentation package assembly. The corrugated bellows segment 18 is mechanically flexible. This flexibility allows the optical axis of the camera 23 and its lens 21 to be mechanically tilted relative to the z-axis 28 of the main body of the instrumentation package assembly 7 and pre-set in place if so desired by the cameraman at the time the instrumentation package assembly 7 is encapsulated inside the host sports paraphernalia.

The corrugated bellows sections 9 and 18 of the instrumentation package assembly are flexible and allow the sections containing the cameras 2 and 23 and their camera lenses 11 and 21 to be bent together in order to tilt the lines of sight of the cameras 2 and 23 and their lenses 11 and 21 relative to the top of the instrumentation package assembly if so desired by the cameraman. Additionally, the corrugated sections 9 and 18 allow the instrumentation package assembly 7 to act as a spring and absorb shocks and compress or expand its length without damaging the contents of the instrumentation package assembly. When circumstances arise where the players tend to crush the instrumentation package assembly 7, it will compress or expand.

The instrumentation package assembly 7 has flexible corrugated bellows sections 9 and 18. The corrugated bellows sections 9 and 18 of the instrumentation package assembly 7 allow for the part of the instrumentation package assembly 7 containing cameras 2 and 23 and their lenses 11 and 21 to flex and bend, stretch and compress when it is impacted. This enables the instrumentation package assembly 7 to resist shock and vibration. Additionally, the corrugated bellows sections 9 and 18 allow the instrumentation package assembly 7 to act as a spring and compress or expand its length without damaging the contents of the instrumentation package assembly 7. When circumstances arise where the baseball players tend to crush the instrumented baseball home plate, the instrumentation package assembly 7 will compress or expand instead of breaking.

A antenna array relay junction shown in FIG. 59A and FIG. 59B is deployed in the baseball stadium and receives radio signals from the instrumented baseball base's antenna array elements 14, 15, 16 and 17. Antenna array elements 14, 15, 16 and 17 are in quadrature to radiate radio signals to antenna array relay junction with sufficient gain so as to overcome RF noise and provide for a large enough gain bandwidth product to accommodate real-time SD/HD picture quality requirements. The instrumentation package assembly's network transceiver electronics which is part of 8 also provides a wireless means for the instrumented baseball base to receive command and control radio signals from the base station. The two condenser microphones 5 and 6 enable the viewing audience to hear real-time contacts, impacts and shocks to the instrumented baseball base. Simultaneously live SD/HD TV pictures are taken by the TV camera 2 of its field of view of the live action on the playing field.

Condenser microphones have good fidelity for their small size, weight and power consumption. In the future higher quality small sized microphones are likely to become available as the state of the art improves. It is anticipated that we will use these microphones as they become available.

The instrumentation package assembly 7 is filled with a dry pressurized gas 22 like nitrogen to prevent the entry of moisture or dirt into its cavity. The o-ring seal 24 between the bottom lid 19 and the enclosure prevents the dry gas from leaking out of the enclosure. Dry nitrogen gas 22 is inserted into the instrumentation package assembly 7 through gas valve 23. A desiccant is also disposed inside the cavity to collect moisture and prevent any moisture build-up.

The instrumentation package assembly 7 has a removable lid 19 on its bottom to allow access to the contents inside the cavity of the instrumentation package assembly 7. The lid 19 allows access to the battery pack 21 for servicing. The removable lid 19 also allows access to camera 2, camera lens 11, electronics 8, quad antennas 14, 15, 16 and 17, and mechanical actuating device 19 for servicing. The lower inductive coil 10 is attached to the bottom outside of the lid 19. The fiber optics/copper cable connector 18 is attached through the bottom of lid 19. The lid 19 has a gas valve 36 mounted on it to allow dry nitrogen gas 22 to be injected into the cavity to pressurize the enclosure of the instrumentation package assembly after the lid 19 is closed. The purpose of the dry nitrogen gas is to protect the contents of the instrumentation package assembly from moisture. There is an o-ring seal around lid 19 to prevent the pressurized dry nitrogen gas from escaping from the cavity of the instrumentation package assembly 7 enclosure.

In many venues, the two cameras are chosen to be identical to each other. However, there are occasions when they may be chosen to be different from one another when in order to accomplish their joint mission of maximizing the entertainment of the viewing audience. The cameraman can choreograph the playing field coverage and set up the cameras and their respective lens combinations like a symphony orchestra to maximize the entertainment and viewing pleasure of the on-looking television audience.

Two of the instrumentation package assembly elements, described in FIG. 33D are assembled into the instrumentation package assembly hub 7 by loading their two corrugated bellows enclosure segments 9 and 18 into two mating machined seats in the hub 7 using their roller bearing ends of the enclosures. Assembling the instrumentation package assembly elements into the instrumentation package assembly hub 7 in this manner assures that the optical/mechanical axes of the instrumentation package assembly elements is coincident with the mechanical axes 12 and 29 of the hub 7 respectively. The angular position of the 1st primary mechanical stop for each of the instrumentation package assembly elements is now adjusted to be aligned with the y-axis 24 direction on the hub 7. In particular, the 1st primary mechanical stop for each of the instrumentation package assembly elements is precisely set at twelve o'clock and then locked in place on the hub 7. This alignment procedure assures that cameras 2 and 23 will now produce precisely centered upright images of any objects that lie along the y-axis 24 of the hub 7 in the twelve o'clock direction relative to the hub 7 of the instrumentation package assembly. This alignment procedure also assures that the 3-D stereo picture frames of both cameras 34 and 35 are mutually congruent at each of the eight mechanical stop positions.

The fiber optics cable/copper cable connector 31 is offset at a distance of about ¾ of the hub radius from the center of hub 7 at twelve o'clock along the hub's y-axis 24 and is accessible from the bottom of the instrumentation package assembly. The fiber optics cable/copper cable connector 31 lies along side and between the instrumentation package assembly elements which it is electrically connected to.

The cameraman, in the remote base station, software selects either the wireless mode of communication, and/or the fiber optics/copper cable mode of communication between each of the instrumented sports paraphernalia (for example, instrumented baseball home plates and instrumented ice hockey pucks) and the remote base station. The cameraman can use whichever equipment (antenna array relay junction or fiber optics cable/copper cable) is installed in the stadium/arena with which to command and control his choice and communicate it to the instrumented sports paraphernalia on the stadium playing field. These choices are also physically switch selectable by the cameraman with his access through the opening in the bottom of some of the instrumented sports paraphernalia. Refer to FIG. 59A and FIG. 59B, and FIG. 60A and FIG. 60B, and FIG. 61A and FIG. 61B, and FIG. 64A and FIG. 64B and FIG. 64C for disclosures regarding the remote base station and the antenna array relay junction.

The cameraman selects items from a software menu of control commands that go to the network transceiver at the remote base station that are subsequently transmitted to the instrumented sports paraphernalia for the purpose of adjusting various system initializations, operating parameters, radio frequency, polling system status data such as battery condition, and initiating remote mechanical adjustments such as camera focus, optical zoom, iris and movement to the cameras' field of view, etc over the selected bi-directional communications link i.e. wireless radio, fiber optics or copper cable connectivity being used within the particular sports stadium.

These commands, when intercepted by the network transceiver within the instrumented sports paraphernalia are applied to its microprocessor, which then in turn upon executing the instructions stored within the contents of its firmware applies a pulse coded control signal via the power and control interconnect interface inside the instrumentation package to the corresponding electronics i.e. the mechanical actuators that provides optical focus and/or zoom adjustment of the cameras and microphone gain and selection, etc as desired by the cameraman and/or special software running on the computer at the remote base station. The power and control interconnect interface as shown in FIG. 33E (item 21), which is represented by dotted lines, consists of the electrical control wiring to and from the electronic components of the instrumented baseball base that are being controlled.

Referring to the Preferred Embodiments Specified in FIG. 34A and FIG. 34B and FIG. 34C, the Instrumentation Package Assembly Satisfies all of the Following Objectives:

It is an objective of the present invention that the instrumentation package assembly is composed of two microphones, two instrumentation package assembly elements, two bottom induction coils, four radio antenna elements, bottom lid, fiber optics/copper cable connector, battery pack, dry nitrogen gas, gas valve, and a microphone connector. It is an objective of the present invention not to block, absorb or reflect radio waves that are transmitted or received by the instrumentation package assembly.

FIG. 35A and FIG. 35B and FIG. 35C

The detailed physical elements disclosed in the instrumented baseball home plate and instrumented ice hockey instrumentation package assembly drawing shown in FIG. 35A and FIG. 35B and FIG. 35C are identified as follows: 1 is the y-axis of camera 43. 2 is the y-axis of symmetry of the instrumentation package assembly. 3 is the y-axis of camera 44. 4 is the fiber optics/copper cable connector. 5 is an upper induction coil. 6 is an upper induction coil. 7 is a camera lens. 8 is a camera lens seal. 9 is a camera lens seal. 10 is a camera lens. 11 is the instrumentation package assembly. 12 is the bottom lid heat sink of the instrumentation package assembly. 13 is the electronics. 14 is the electronics. 15 is the x-axis of symmetry of the instrumentation package assembly, 16 is the bottom of the instrumentation package assembly. 17 is the actuating device for camera 44 and camera lens 7. 18 is the actuating device for camera 43 and camera lens 10. 19 is the actuating device for camera 41 and camera lens 45. 20 is the actuating device for camera 42 and camera lens 46. 21 is the electronics. 22 is the electronics. 23 is a microphone. 24 is a microphone. 25 is a radio antenna. 26 is a radio antenna. 27 is a radio antenna. 28 is a radio antenna. 29 is the optical axis of camera 43. 30 is the z-axis of symmetry of the instrumentation package assembly. 31 is the optical axis of camera 44. 32 is an instrumentation package assembly element showing a corrugated bellows segment. 33 is an upper induction coil. 34 is an upper induction coil. 35 is the camera lens 45 seal. 36 is the camera lens 46 seal. 37 is the optical axis of camera 41. 38 is the optical axis of camera 42. 39 is an instrumentation package assembly element showing a corrugated bellows segment. 40 is an instrumentation package assembly element showing a corrugated bellows segment. 41 is a camera. 42 is a camera. 43 is a camera. 44 is a camera. 45 is a camera lens for camera 41. 46 is a camera lens for camera 42. 47 is dry nitrogen gas. 48 is a gas valve. 49 is an instrumentation package assembly element showing a corrugated bellows segment. 50 is the battery pack. 51 is the microphone connector.

FIG. 35A is a top view of the four camera and fiber optics/copper cable instrumentation package assembly.

FIG. 35B is a side view of the four camera wireless instrumentation package assembly.

FIG. 35C is a side view of the four camera wireless and fiber optics/copper cable instrumentation package assembly.

Referring to drawings FIG. 35A and FIG. 35B and FIG. 35C, two different instrumentation package assembly preferred embodiments are disclosed. The only difference between the two embodiments is that one has wireless communications capability only, whereas the other has both wireless and fiber optics cable/copper cable communications capabilities. The one that has wireless capability only, is cheaper to produce than the one that has both wireless and fiber optics or copper cable capabilities thereby giving it a cost advantage for venues with lower budgets, like for example some colleges and high schools. The instrumentation package assembly shown in FIG. 35B, which has only wireless capability, is used to instrument ice hockey pucks. The one with both wireless and fiber optics/copper cable capabilities has better bandwidth and lower noise and is used to instrument baseball home plates.

The present invention contemplates each of the instrumentation package assembly embodiments to be equipped with four TV cameras, four TV camera lenses, two microphones, four supporting electronics, one battery pack, eight induction coils, four mechanical actuating devices and four antennas.

Each of the present instrumentation package assembly preferred embodiments contains four instrumentation package assembly elements disclosed in FIG. 33D. The single TV camera, single TV camera lens, supporting electronics, induction coil, mechanical actuating device and corrugated bellows segment are the parts of the instrumentation package assembly element disclosed in FIG. 33D which is a primary part of the instrumentation package assembly.

The preferred embodiment shown in FIG. 35B televises its pictures and sounds using wireless RF transmission. The alternate preferred embodiment shown in FIG. 35C televises its pictures and sounds using both fiber optics cable/copper cable transmission and wireless RF transmission.

It is contemplated in the present invention in FIG. 35B that the instrumentation package assembly is an autonomous module designed as a sealed unit for being mounted inside a baseball home plate (henceforth to be called an instrumented baseball home plate), and making the instrumented baseball home plate capable of wirelessly televising baseball games from its cameras and microphones contained within the instrumentation package assembly, to a remote base station. The remote base station is disclosed in FIG. 59A and FIG. 59B and FIG. 60A and FIG. 60B and FIG. 61A and FIG. 61B.

The alternate preferred embodiment shown in FIG. 35C televises baseball games to the remote base station from its camera and microphones via a fiber optics/copper cable communication link. The fiber optics/copper cable connector built into the bottom of the instrumentation package assembly which is mounted inside the instrumented baseball home plate, is connected to fiber optics cable/copper cable buried in the ground of the baseball field. The fiber optics cable/copper cable buried in the ground is connected to the remote base station.

It is understood that as the state of the art in TV camera technology advances, that there will be other better TV cameras that use other than CCD technology. The present invention will work equally well with them as they become available. Therefore, the present invention uses CCD TV cameras as an example of TV cameras that may be used simply because they are the best that today's technology offers, and is not confined only to their sole use in the future.

Referring to the instrumentation package assembly shown in FIG. 35A and FIG. 35B and FIG. 35C, FIG. 35A is a top view of the instrumentation package assembly, FIG. 35B is an A-A section view of the instrumentation package assembly, FIG. 35C is an A-A section view of the alternative instrumentation package assembly preferred embodiment showing the fiber optics/copper cable connector 4.

The instrumentation package assembly 11 shown in FIG. 35B contains all the electronics for wirelessly televising pictures and sounds. The instrumentation package assembly 11 shown in FIG. 35C contains all the electronics for televising pictures and sounds using fiber optics cable/copper cable.

The picture and sounds are taken directly by the instrumentation package assembly's two cameras 41, 42, 43 and 44 and microphones 23 and 24. The instrumentation package assembly 11 is mounted within the instrumented baseball home plates shown in FIG. 53 and FIG. 54. Both preferred embodiments shown in FIG. 35B and FIG. 35C communicate the pictures and sounds from the instrumentation package assembly 11 mounted inside the instrumented baseball home plates on the field to a remote base station located near the field for final processing and dissemination.

The instrumentation package assembly 11 is a compressed assemblage of all the optical and electronic components that gather and transmit TV pictures and sounds, into a single enclosure. The main body of the instrumentation package assembly 11 is essentially a short cylinder about ½ inch or more high that resembles a can of tuna fish. It is made strong to resist being crushed. Material examples such as polycarbonates, ABS and fiber reinforced plastics are used in its construction. The x-axis of symmetry of the instrumentation package assembly 11 is 15. The y-axis of symmetry of the instrumentation package assembly 11 is 2. The center of the instrumentation package assembly 11 is located at the intersection of the x-axis and the y-axis. The z-axis 30 of the main body of the instrumentation package assembly 11 is mutually orthogonal to 4 and 24.

The instrumentation package assembly 11 contains cameras 41, 42, 43 and 44, camera lenses 11 and 21, supporting electronics 21, 22, 14, and 13, induction coils 5, 6, 33, and 34, radio antennas 25, 26, 27, and 28, mechanical actuating devices 19, 20, 18, and 17, corrugated bellows sections 40, 39, 32, and 49, microphones 23 and 24, bottom lid 12, fiber optics cable/copper cable connector 4, gas valve 48, dry gas 47, and the battery pack 50.

In FIG. 35B, the part of the instrumentation package assembly 11 that contains the camera 43, camera lens 10, supporting electronics 14, induction coil 5, mechanical actuating device 18, and corrugated bellows section 32 is shown enlarged in FIG. 33D.

In FIG. 35B, the part of the instrumentation package assembly 11 that contains the cameras 44, camera lens 7, supporting electronics 13, induction coil 6, mechanical actuating device 17, and corrugated bellows section 49 is shown enlarged in FIG. 33D.

In FIG. 35B, camera 41 is identical to camera 42. Camera lens 45 is identical to camera lens 46. Supporting electronics 14 is identical to supporting electronics 13. Induction coil 33 is identical to induction coil 34. Mechanical actuating device 18 is identical to mechanical actuating device 17. The corrugated bellows segment 32 is identical to corrugated bellows segment 49.

In FIG. 35C, the part of the instrumentation package assembly 11 that contains the camera 41, camera lens 45, supporting electronics 21, induction coil 33, mechanical actuating device 19, and corrugated bellows section 40 is shown enlarged in FIG. 33D.

In FIG. 35C, the part of the instrumentation package assembly 11 that contains the camera 42, camera lens 46, supporting electronics 22, induction coil 34, mechanical actuating device 20, and corrugated bellows section 39 is shown enlarged in FIG. 33D.

In FIG. 35C, camera 41 is identical to camera 42. Camera lens 45 is identical to camera lens 46. All the induction coils 5, 6, 33 and 34 are identical. Mechanical actuating device 19 is identical to mechanical actuating device 20. The corrugated bellows segment 40 is identical to corrugated bellows segment 39.

In FIG. 35C, the part of the instrumentation package assembly 11 that contains the camera 43, camera lens 10, supporting electronics 14, induction coil, mechanical actuating device 18, and corrugated bellows section 32 is shown enlarged in FIG. 33D.

In FIG. 35C, the part of the instrumentation package assembly 11 that contains the camera 44, camera lens 7, supporting electronics 13, induction coil, mechanical actuating device 17, and corrugated bellows section 49 is shown enlarged in FIG. 33D.

In FIG. 35C, Camera 43 is identical to camera 44. Camera lens 10 is identical to camera lens 7. Supporting electronics 14 are identical to supporting electronics 13. Induction coil is identical to induction coil. Mechanical actuating device 18 is identical to mechanical actuating device 17. The corrugated bellows segment 32 is identical to corrugated bellows segment 49.

The supporting electronics 14 and 13 shown in FIG. 35B are different from the supporting electronics 21 and 22 shown in FIG. 35C. The supporting electronics 21 and 22 shown in FIG. 35C have an additional capability beyond that specified for the supporting electronics 14 and 13 shown in FIG. 35B. The supporting electronics 21 and 27 in FIG. 35B can only televise wirelessly to the remote base station; whereas the supporting electronics 14 and 13 shown in FIG. 35C can televise pictures and sounds via a fiber optics cable/copper cable link to the remote base station, as well as televise wirelessly to the remote base station.

The picture and sounds are taken directly by the cameras 41, 42, 43 and 44 and microphones 23 and 24 inside the instrumentation package assembly 11. The instrumentation package assembly 11 is mounted within the instrumented baseball home plate that is in play on the baseball field. The instrumentation package assembly may wirelessly or by fiber optics/copper cable communicate and televise the pictures and sounds from inside the instrumented baseball home plate to a remote base station located near the baseball field for final processing and dissemination.

Microphone electrical connector 51 is mounted on the instrumentation package assembly. 51 mates with an electrical connector which is wired by a cable to a third condenser microphone. This microphone protrudes through the top of the instrumented baseball home plate. Refer to instrumented baseball home plate embodiments shown in drawings FIG. 53A and FIG. 53B and FIG. 53C, and FIG. 54A and FIG. 54B and FIG. 54C. This microphone listens for sounds of the game that occur on the baseball playing field above the top of the instrumented baseball home plate and above the ground. The microphone cable carries electrical sound signals from the microphone to the microphone electrical connector which is plugged into its mating electrical connector 51 on the instrumentation package assembly shown in the referenced drawings.

In FIG. 35B, the instrumentation package assembly 11 contains all the electronics 14 and 13 for wirelessly televising pictures and sounds. The electronics 14 is identical to the electronics 13 in FIG. 35B.

In FIG. 35C, the instrumentation package assembly 11 contains all the electronics 21 and 22 for televising pictures and sounds using fiber optics cable/copper cable in addition to televising pictures and sounds wirelessly like FIG. 35B. The electronics 21 is identical to the electronics 22 in FIG. 35C.

Comparing the electronics in FIG. 35B with those in FIG. 35C, the electronics in FIG. 35C includes additional functions for televising baseball games using a fiber optics cable/copper cable link to the remote base station.

In FIG. 35C, the instrumentation package assembly 11 contains all the electronics 21 and 22 for televising pictures and sounds using a fiber optics cable/copper cable link, in addition to televising pictures and sounds wirelessly by radio like in FIG. 35B.

In a preferred embodiment where we have disclosed a baseball playing field with a fiber optics cable/copper cable link buried beneath the ground, and in particular beneath the instrumented baseball home plate and beneath the three instrumented baseball bases, and where the fiber optics cable/copper cable link is connected to the remote base station at its other end, and where the electronics in FIG. 35C includes the capability to televise baseball games from inside the instrumented baseball home plate to the remote base station via the fiber optics cable/copper cable link by connecting to the fiber optics cable/copper cable link using the fiber optics cable/copper cable connector 4. The instrumentation package assembly 11 in the preferred embodiment shown in FIG. 35C uses a fiber optics cable/copper cable connector 31 with which to connect to a fiber optics cable/copper cable link buried beneath the baseball playing field grounds and beneath the instrumented baseball home plate.

The cameras 41 and 42, camera lenses 45 and 46, and electronics 21 and 22 are joined to the main body of the instrumentation package assembly 11 by the corrugated bellows segments 40 and 39.

The cameras 43 and 44, camera lenses 10 and 7, and electronics 14 and 13 are joined to the main body of the instrumentation package assembly 11 by the corrugated bellows segments 32 and 49.

Cameras 41 and 42 are identical to one another. Camera lenses 45 and 46 are identical to one another. Mechanical actuating devices 19 and 20 are identical to one another.

Cameras 43 and 44 are identical to one another. Camera lenses 10 and 7 are identical to one another. Mechanical actuating devices 18 and 17 are identical to one another.

In variants of the present preferred embodiment, a variety of different camera lens types, with different lens setting capability, can be used providing they are small in size (so as not to be prominent and conspicuous to the players) and also physically fit within the instrumentation package assembly.

The auto iris setting permits the camera lenses to automatically adjust for varying lighting conditions on the field. The auto focus setting permits the camera lenses to adjust focus for varying distances of the players and action subjects on the field.

The functions of the camera lenses such as focus adjustment settings and iris adjustment settings are controlled wirelessly by the cameraman from the remote base station by sending command and control signals from the remote base station to the instrumentation package assembly inside the instrumented sports paraphernalia. The cameraman can also send command and control signals from the remote base station to the instrumentation package assembly to put these settings on automatic under the control of the camera electronics. The optical and electronic zoom functions of the camera lenses are operated by the cameraman by sending command and control signals from the remote base station to the instrumentation package assembly. The cameraman can select from a wide variety of HD camera lenses. Wide angle lenses and ultra wide angle lenses are used in many venues to give the TV viewing audience the feeling of being there on the playing field amongst the players. In some venues the cameraman may choose to use camera lenses with more magnification and narrower fields of view to better cover certain plays. In some venues the cameraman may choose camera lenses with small f-numbers to deal with poorer lighting conditions. For HD 3-D effects where cameras form a 3-D stereo camera pair, the camera lenses are chosen by the cameraman to be identical and identical lens settings are used for each.

The diameter of the instrumentation package assembly 11 is kept to a minimum in order to minimize its footprint inside the instrumented baseball home plate. The dimension of the outside diameter of the instrumentation package assembly 11 is governed largely by the physical diagonal dimension of the largest components within the instrumentation package assembly 11, like the SD/HD camera's 41, 42, 43, and 44 CCD sensor arrays and the battery pack 50.

The instrumentation package assembly 11 is mounted inside the instrumented baseball home plate using a buffer plate that acts as a bearing for the instrumentation package assembly 11. The buffer plate supports the upper end of the instrumentation package assembly 11.

The instrumentation package assembly 11 contains four miniature SD/HD TV cameras 41, 42, 43, and 44, two condenser microphones 23 and 24 and supporting electronics 21, 22, 14, and 13. The cameras 41, 42, 43, and 44, microphones 23 and 24, and supporting electronics 21, 22, 14, and 13, are housed together within the enclosure cavity of the instrumentation package assembly 11. The condenser microphones 23 and 24 are attached to the top interior wall of the main body of the instrumentation package assembly 11. The microphones 23 and 24 hear any sounds produced by physical contact of the instrumented baseball home plate with any external thing, including for example air currents felt on the instrumented baseball home plate during the baseball's flight in the air over the instrumented baseball home plate when it is pitched.

The instrumentation package assembly 11 is filled with a dry pressurized gas like nitrogen to prevent the entry of moisture or dirt. The rubber o-ring seals between the lid 12 and main body of the instrumentation package assembly 11 prevent the dry gas from leaking out of the instrumentation package assembly enclosure. A desiccant is disposed near the SD/HD lenses 45, 46, 10, and 7 and cameras 41, 42, 43, and 44 to collect and prevent any moisture build-up within the instrumentation package assembly 11.

The diameter of the instrumentation package assembly 11 is kept to a minimum in order to minimize the space taken up inside the instrumented baseball home plate. The dimension of the outside diameter of the instrumentation package assembly is governed largely by the physical diagonal dimensions of its largest components like the quad antennas 14, 15, 16 and 17 and the battery pack 50.

The lines of sight of the cameras 41 and 42 are parallel to one another.

The lines of sight of the cameras 43 and 44 are parallel to one another.

The camera lenses 45, 46, 10 and 7 are positioned at the very top of the instrumentation package assembly 11, with the cameras 41, 42, 43, and 44 directly beneath them. The cameras 41, 42, 43, and 44 essentially look out of the top of the instrumentation package assembly 11 through camera lenses 45, 46, 10 and 7.

The camera lenses 45, 46, 10 and 7 provide imagery to cameras 41, 42, 43, and 44. The camera lenses 45, 46, 10 and 7 image the objects they see onto cameras 41, 42, 43, and 44. The optical and mechanical axis of cameras 41 and 42 and camera lenses 45 and 46 are parallel and coaxial to one another.

The camera lenses 45, 46, 10 and 7 have o-ring seals 35, 36, 9 and 8 respectively. The purpose of the seals 35, 36, 9 and 8 is to hold and prevent leakage of the pressurized dry nitrogen gas from the cavity of the instrumentation package assembly. The seals 35, 36, 9 and 8 prevent dirt and moisture from entering the cavity and damaging and interfering with the performance of its contents. The seals 35, 36, 9 and 8 are made from rubber. The seals 35, 36, 9 and 8 are located between the front of the camera lenses 45, 46, 10 and 7 and the camera lens' cylindrical mountings.

In variants of the present preferred embodiment, a variety of different camera lens types, with different lens setting capability, can be used providing they are small in size (so as not to be prominent and conspicuous to the players) and also physically fit within the instrumentation package assembly. The auto iris setting permits the camera lenses to automatically adjust for varying lighting conditions on the field. The auto focus setting permits the camera lenses to adjust focus for varying distances of the players and action subjects on the field.

When a baseball is hit and a player is rounding the bases, the distance of a player from one base may be decreasing while the distance to another base may be increasing. The camera 2 can be independently and simultaneously commanded and controlled to auto focus on their respective players. If the player slides into the instrumented baseball home plate, the cameras 41, 42, 43, and 44 will catch the slide action up close. The microphones 23 and 24 will capture all the sounds of the action. While the player is running, his pictures and sounds are wirelessly being transmitted by the instrumentation package assembly 7 inside the instrumented baseball home plate.

The instrumentation package assembly electronics showing the detailed flow of electrical signals and data in the instrumentation package assembly is shown in the preferred embodiment given in FIG. 36D and FIG. 36E.

The instrumentation package assembly's network transceiver is part of the electronics 21, 22, 14 and 13.

In FIG. 35B, the network transceiver wirelessly transmits real-time pictures and sounds from the cameras 41, 42, 43, and 44 and microphones 23 and 24 via quad antenna array elements 14, 15, 16 and 17, also known as intentional radiators, to the remote base station. The remote base station is disclosed in FIG. 59A and FIG. 59B and FIG. 61A and FIG. 61B.

The quad antenna array elements 25, 26, 27 and 28 are mounted radially in a horizontal plane 90 degrees apart from one another and extend outward through the cylindrical wall of the main body of the instrumentation package assembly 11.

In an alternate preferred embodiment to FIG. 35B, the quad antenna array elements 25, 26, 27 and 28 can be replaced with a helix antenna (not shown) with similar dimensions wound on the inside diameter of the instrumentation package assembly 11.

The battery's charging coils 5, 6, 33, and 34 are wound on the outside at both the top and bottom of the instrumentation package assembly 11 and act electrically as a transformer's secondary winding. The coils are wound on the outside of the instrumentation package assembly 11 to keep any heat they may produce away from the contents of the instrumentation package assembly 11 while the battery pack is being charged. The number of turns in each of the charging coils 5, 6, 33, and 34 is made large enough to inductively couple a sufficient number of magnetic lines of flux from the primary coil of the external battery charging unit so as to charge the battery pack in a reasonably short time before games. When the charging unit is placed on top of the instrumented baseball base, the charging coils 5, 6, 33, and 34 receive electrical energy inductively coupled from the primary coils of the external charging unit.

Induction coil 5 is located on the bottom of the instrumentation package assembly 11.

Induction coil 6 is located on the bottom of the instrumentation package assembly 11.

The purpose of the induction coils 5, 6, 33, and 34 is to inductively couple electrical energy into the instrumentation package assembly 11 to charge the battery pack 50. The induction coils 5, 6, 33, and 34 are located on the exterior of the enclosure so as to minimize their heat transfer into the instrumentation package assembly 11 enclosure cavity that would raise the temperature of the electronics within the enclosure cavity. The induction coils 5, 6, 33, and 34 are electrically connected through the enclosure walls to the electronics inside the enclosure.

When the instrumentation package assembly 11 is mounted inside the host sports paraphernalia, such as an instrumented baseball home plates, an external electrical induction coil, which is part of a battery pack charging unit, is used to magnetically inductively couple electrical power into induction coils through the instrumented baseball home plate and into the instrumentation package assembly 11 for the purpose of charging the battery pack 50. A block diagram showing the electrical battery charging circuit involving the induction coils 5, 6, 33, and 30 and the battery pack 50 are shown in FIG. 37. A source of electrical power from the charging unit, which is external to the instrumentation package assembly 11, is inductively coupled into these induction coils 5, 6, 33, and 34 by laying the external induction coil of the charging unit flat on the top of the host sports paraphernalia coaxially above coils 5, 6, 33, and 34. The induction coils 5, 6, 33, and 34 feed this power to the battery pack 50 in order to charge it.

The main body of the instrumentation package assembly 11 houses the battery pack 50 which supplies electrical power to each of the elements within the instrumentation package assembly that requires electrical power.

The instrumentation package assembly's battery pack 50 is inductively wirelessly charged before games on an as needed basis, by an external primary winding placed on the top of the instrumented baseball home plate. Charging of the battery pack 50 is accomplished wirelessly by inductive coupling. The instrumentation package assembly's inductive pickup coils 5, 6, 33, and 34 act as the secondary windings on an air core transformer with an external primary winding as their power source. Inductively coupled time varying magnetic flux is furnished to coils 5, 6, 33, and 34 by the external primary winding placed on the top of the instrumented baseball home plate.

The instrumentation package assembly's battery pack 50 is wirelessly charged by magnetic induction before baseball games on an as needed basis, using the charging station unit shown in preferred embodiment shown in FIG. 37A and FIG. 37B and FIG. 37C. The charging station is placed on the top of the instrumented baseball home plate when it is charging the battery pack 50. Charging of the battery pack 50 is accomplished wirelessly by inductive coupling. The instrumented baseball base's four inductive pickup coils 5, 6, 33, and 34 act as the secondary windings on an air core transformer. Time varying magnetic flux is furnished to 5, 6, 33, and 34 by the primary windings of the charging station unit FIG. 37A and FIG. 37B and FIG. 37C.

The battery's 50 charging coils 5, 6, 33, and 34 are wound on the outside of the instrumentation package assembly 11 and act electrically as a transformer's secondary winding. The coils 5, 6, 33, and 34 are wound on the outside of the instrumentation package assembly 11 to keep any heat they may produce away from the contents of the instrumentation package assembly 11 while the battery pack 50 is being charged. The number of turns in each charging coil is made large enough to inductively couple a sufficient number of magnetic lines of flux from the external primary coil so as to charge the battery pack 50 in a reasonably short time before games. When the external primary coil is placed on top of the instrumentation package assembly the charging coils 5, 6, 33, and 34 receive electrical energy inductively coupled from the primary coils.

The instrumentation package assembly's network transceiver electronics 21, 22, 14 and 13 wirelessly transmits real-time pictures and sounds from the instrumentation package assembly's cameras 41, 42, 43, and 44 and microphones 23 and 24 via quad antenna array elements 25, 26, 27 and 28 also known as intentional radiators, to the remote base station. The quad antenna array elements 25, 26, 27 and 28 are mounted in a horizontal plane 90 degrees apart from one another and extend outward through the cylindrical wall of the main body of the instrumentation package assembly 11.

As is shown in the alternative preferred embodiment in FIG. 35C, a fiber optics cable/copper cable connector 4 is employed to connect to a fiber optics cable/copper cable link buried in the playing field grounds beneath the instrumented baseball home plate, to televise the pictures and sounds of the game to the remote base station which is connected to the fiber optics cable/copper cable link at its other end. Should fiber optics cable/copper cable buried in the playing field grounds not exist in a baseball stadium, the baseball games may be televised wirelessly using radio signals and antennas 25, 26, 27 and 28 using the preferred embodiment shown in FIG. 35B. It is clear that the preferred embodiment shown in FIG. 35C is superior in this regard because it is capable of televising baseball games by both methods i.e. either wirelessly or by a fiber optics cable/copper cable link The preferred embodiment shown in FIG. 35C is more expensive to manufacture than the preferred embodiment shown in FIG. 35B because its electronics 21 and 22 must provide for the additional fiber optics/copper cable related electronic functions.

In an alternate preferred embodiment, the quad antenna array 25, 26, 27 and 28 can be replaced with a helix antenna (not shown) with similar dimensions wound on the inside diameter of the instrumentation package assembly down the length of its cylindrical wall.

A antenna array relay junction shown in FIG. 59A and FIG. 59B is deployed in the baseball stadium and receives radio signals from the quad antenna array 25, 26, 27 and 28. Antenna array elements 25, 26, 27 and 28 are in quadrature to radiate radio signals to the antenna array relay junction with sufficient gain so as to overcome RF noise, and provide a large enough gain bandwidth product to accommodate real-time SD/HD picture quality requirements. The instrumentation package assembly's network transceiver electronics 8 also provides a wireless means for the instrumentation package assembly's in the instrumented baseball home plate to receive command and control radio signals from the remote base station's antenna.

The corrugated bellows segment 40 acts to mechanically connect the camera lens 45, camera 41 and electronics 21 to the main body of the instrumentation package assembly. The corrugated bellows segment 40 is mechanically flexible. This flexibility allows the optical axis of the camera 41 and its lens 45 to be mechanically tilted relative to the z-axis 30 of the main body of the instrumentation package assembly 11 and be pre-set in place if so desired by the cameraman at the time the instrumentation package assembly 11 is encapsulated inside the host sports paraphernalia.

The corrugated bellows segment 39 acts to mechanically connect the camera lens 46, camera 42 and electronics 22 to the main body of the instrumentation package assembly. The corrugated bellows segment 39 is mechanically flexible. This flexibility allows the optical axis of the camera 42 and its lens 46 to be mechanically tilted relative to the z-axis 30 of the main body of the instrumentation package assembly 11 and be pre-set in place if so desired by the cameraman at the time the instrumentation package assembly 11 is encapsulated inside the host sports paraphernalia.

The corrugated bellows sections 40 and 39 of the instrumentation package assembly are flexible and allow the sections containing the cameras 41 and 42 and their camera lenses 45 and 46 to be bent together in order to tilt the lines of sight of the camera 41 and 42 and their lenses 45 and 46 relative to the top of the instrumentation package assembly if so desired by the cameraman. Additionally, the corrugated sections 40 and 39 allow the instrumentation package assembly 11 to act as a spring and absorb shocks and compress or expand its length without damaging the contents of the instrumentation package assembly. When circumstances arise where the players tend to crush the instrumentation package assembly 11, it will compress or expand.

The corrugated bellows segment 32 acts to mechanically connect the camera lens 10, camera 43 and electronics 14 to the main body of the instrumentation package assembly. The corrugated bellows segment 32 is mechanically flexible. This flexibility allows the optical axis of the camera 43 and its lens 10 to be mechanically tilted relative to the z-axis 30 of the main body of the instrumentation package assembly 11 and be pre-set in place if so desired by the cameraman at the time the instrumentation package assembly 11 is encapsulated inside the host sports paraphernalia.

The corrugated bellows segment 49 acts to mechanically connect the camera lens 7, camera 44 and electronics 13 to the main body of the instrumentation package assembly. The corrugated bellows segment 49 is mechanically flexible. This flexibility allows the optical axis of the camera 44 and its lens 7 to be mechanically tilted relative to the z-axis 30 of the main body of the instrumentation package assembly 11 and be pre-set in place if so desired by the cameraman at the time the instrumentation package assembly 11 is encapsulated inside the host sports paraphernalia.

The corrugated bellows sections 32 and 49 of the instrumentation package assembly are flexible and allow the sections containing the cameras 43 and 44 and their camera lenses 10 and 7 to be bent together in order to tilt the lines of sight of the camera 43 and 44 and their lenses 10 and 7 relative to the top of the instrumentation package assembly if so desired by the cameraman. Additionally, the corrugated bellows sections 32 and 49 allow the instrumentation package assembly 11 to act as a spring and absorb shocks and compress or expand its length without damaging the contents of the instrumentation package assembly. When circumstances arise where the players tend to crush the instrumentation package assembly 11, it will compress or expand.

The instrumentation package assembly 11 has flexible corrugated bellows sections 40 and 39. The corrugated bellows section 40 and 39 of the instrumentation package assembly 11 allow for the part of the instrumentation package assembly 11 containing cameras 41 and 42 and its lens 45 and 46 to flex and bend, stretch and compress when it is impacted. This enables the instrumentation package assembly 11 to resist shock and vibration. Additionally, the corrugated bellows sections 40 and 39 allow the instrumentation package assembly 11 to act as a spring and compress or expand its length without damaging the contents of the instrumentation package assembly 11. When circumstances arise where the baseball players tend to crush the instrumented baseball home plate, the instrumentation package assembly 11 will compress or expand instead of breaking.

A antenna array relay junction shown in FIG. 59A and FIG. 59B is deployed in the baseball stadium and receives radio signals from the instrumented baseball base's antenna array elements 25, 26, 27 and 28. Antenna array elements 25, 26, 27 and 28 are in quadrature to radiate radio signals to the antenna array relay junction with sufficient gain so as to overcome RF noise and provide for a large enough gain bandwidth product to accommodate real-time SD/HD picture quality requirements. The instrumentation package assembly's network transceiver electronics which is part of electronics 21, 22, 14 and 13 also provides a wireless radio transmission means for the instrumented baseball base to receive command and control radio signals from the base station.

The two condenser microphones 23 and 24 enable the viewing audience to hear real-time contacts, impacts and shocks to the instrumented baseball base. Simultaneously live SD/HD TV pictures are taken by the TV cameras 41, 32, 43 and 44 of their field of view of the live action on the playing field.

Microphone electrical connector 51 is mounted on the instrumentation package assembly. 51 mates with an electrical connector which is wired by a cable to a third condenser microphone. This microphone protrudes through the top of the instrumented baseball home plate. Refer to instrumented baseball home plate embodiments shown in drawings FIG. 45A and FIG. 45B, and FIG. 53A and FIG. 53B and FIG. 53C, and FIG. 54A and FIG. 54B and FIG. 54C, and FIG. 52A. This microphone listens for sounds of the game that occur on the baseball playing field above the top of the instrumented baseball home plate and above the ground. The microphone cable carries electrical sound signals from the microphone to the microphone electrical connector which is plugged into its mating electrical connector 51 on the instrumentation package assembly shown in the referenced drawings.

The instrumentation package assembly 11 is filled with a dry pressurized gas 47 like nitrogen to prevent the entry of moisture or dirt into its cavity. The o-ring seal between the bottom lid 12 and the enclosure prevents the dry gas 47 from leaking out of the enclosure. Dry nitrogen gas 47 is inserted into the instrumentation package assembly 11 through gas valve 48. A desiccant is also disposed inside the cavity of 11 to collect moisture and prevent any moisture build-up.

The instrumentation package assembly 11 has a removable lid heat sink 12 on its bottom to allow access to the contents inside the cavity of the instrumentation package assembly 11. The lid heat sink 12 allows access to the battery pack 50 for servicing. The removable lid heat sink 12 also allows access to cameras 41,42, 43 and 44, camera lenses 45, 46, 10 and 7, electronics 21, 22, 14 and 13, quad antennas 25, 26, 27 and 28, and mechanical actuating devices 19, 20, 18 and 17 for servicing. The lower inductive coils 5, 6, 33 and 34 are attached to the bottom outside of the lid heat sink 12. The lid heat sink 12 cools the contents of the instrumentation package assembly.

The fiber optics cable/copper cable connector 4 is attached to the electronics through the bottom of lid heat sink 12. The lid heat sink 12 has a gas valve 48 mounted on it to allow dry nitrogen gas 47 to be injected into the cavity to pressurize the enclosure of the instrumentation package assembly after the lid heat sink 12 is closed. The purpose of the dry nitrogen gas 47 is to protect the contents of the instrumentation package assembly from moisture, dirt and any foreign contaminants. There is an o-ring seal around lid heat sink 12 to prevent the pressurized dry nitrogen gas from escaping from the cavity of the instrumentation package assembly 11 enclosure.

In many venues, the four cameras are chosen to be identical to each other. However, there are occasions when one or more of the four cameras may be chosen to be different from the others in order to accomplish their joint mission of maximizing the entertainment of the viewing audience. For example, the view of different baseball stadiums may be covered more optimally by using a special 3-D stereo camera pair. The cameraman can choreograph the playing field coverage and set up the cameras and their respective lens combinations like a symphony orchestra to maximize the entertainment and viewing pleasure of the on-looking television audience.

Condenser microphones have good fidelity, low weight and low power consumption for their small size. In the future higher quality small sized microphones are likely to become available as the state of the art improves. It is anticipated that we will use these microphones as they become available.

Four of the instrumentation package assembly elements, described in FIG. 33D are assembled into the instrumentation package assembly hub 16 by loading their four corrugated bellows enclosure segments 32, 49, 39 and 40 into four mating machined seats in the hub 16 using their roller bearing ends of the enclosures. Assembling the instrumentation package assembly elements into the instrumentation package assembly hub 16 in this manner assures that the optical/mechanical axes of the instrumentation package assembly elements is coincident with the mechanical axes 29, 31, 38 and 37 of the hub 16 respectively. The angular position of the 1st primary mechanical stop for each of the instrumentation package assembly elements is now adjusted to be aligned with the y-axis 2 direction on the hub 16. In particular, the 1st primary mechanical stop for each of the instrumentation package assembly elements is precisely set at twelve o'clock and then locked in place on the hub 16. This alignment procedure assures that cameras 43, 44, 42 and 41 will now produce precisely centered upright images of any objects that lie along the y-axis 2 of the hub 16 in the twelve o'clock direction relative to the hub 16 of the instrumentation package assembly. This alignment procedure also assures that the picture frames of all six possible combinations of the four cameras 43, 44, 42 and 41 that make up the 3-D stereo camera pairs, are mutually congruent at each of the eight stop positions. The six possible 3-D stereo camera pairs are 41 and 42, 41 and 43, 41 and 44, 42 and 43, 42 and 44, and 43 and 44.

The fiber optics cable/copper cable connector 4 is offset at a distance of about ¾ of the hub radius from the center of hub 16 at twelve o'clock along the hub's y-axis 2 and is accessible from the bottom of the instrumentation package assembly. The fiber optics cable/copper cable connector 4 lies along side and between the instrumentation package assembly elements which it is electrically connected to.

The cameraman, in the remote base station, software selects either the wireless mode of communication, and/or the fiber optics/copper cable mode of communication between each of the instrumented sports paraphernalia (for example, instrumented baseball home plates and instrumented ice hockey pucks) and the remote base station. The cameraman can use whichever equipment (antenna array relay junction or fiber optics cable/copper cable) is installed in the stadium/arena with which to command and control his choice and communicate it to the instrumented sports paraphernalia on the stadium playing field. These choices are also physically switch selectable by the cameraman with his access through the opening in the bottom of some of the instrumented sports paraphernalia. Refer to FIG. 59A and FIG. 59B, and FIG. 60A and FIG. 60B, and FIG. 61A and FIG. 61B, and FIG. 64A and FIG. 64B and FIG. 64C for disclosures regarding the remote base station and the antenna array relay junction.

The cameraman selects items from a software menu of control commands that go to the network transceiver at the remote base station that are subsequently transmitted to the instrumented sports paraphernalia for the purpose of adjusting various system initializations, operating parameters, radio frequency, polling system status data such as battery condition, and initiating remote mechanical adjustments such as camera focus, optical zoom, iris and movement to the cameras' field of view, etc over the selected bi-directional communications link i.e. wireless radio, fiber optics or copper cable connectivity being used within the particular sports stadium.

These commands, when intercepted by the network transceiver within the instrumented sports paraphernalia are applied to its microprocessor, which then in turn upon executing the instructions stored within the contents of its firmware applies a pulse coded control signal via the power and control interconnect interface inside the instrumentation package to the corresponding electronics i.e. the mechanical actuators that provides optical focus and/or zoom adjustment of the cameras and microphone gain and selection, etc as desired by the cameraman and/or special software running on the computer at the remote base station. The power and control interconnect interface as shown in FIG. 33E (item 21), which is represented by dotted lines, consists of the electrical control wiring to and from the electronic components of the instrumented baseball base that are being controlled.

Referring to the Preferred Embodiments Specified in FIG. 35A and FIG. 35B and FIG. 35C, the Instrumentation Package Assembly Satisfies all of the Following Objectives:

It is an objective of the present invention that the instrumentation package assembly is composed of a fiber optics/copper cable connector, four instrumentation package assembly elements, bottom lid, two microphones, four radio antenna elements, four lower induction coils, four instrumentation package assembly elements, dry nitrogen gas, gas valve, battery pack, and microphone connector. It is an objective of the present invention not to block, absorb or reflect radio waves that are transmitted or received by the instrumentation package assembly. It is an objective of the present invention to enable the cameraman in the remote base station to electronically command and control any combination of any two of the four cameras in the instrumented baseball home plate to act as a 3-D stereo camera pair FIG. 36A and FIG. 36B and FIG. 36C The detailed physical elements disclosed in the instrumentation package assembly element drawing shown in FIG. 36A and FIG. 36B and FIG. 36C are identified as follows: 1 is the high definition camera. 2 is the camera lens system. 3 is the optical center line of camera. 4 is the front lens element of the camera lens system. 5 is the front end of the instrumentation package assembly element enclosure containing the camera lens. 6 is the camera lens o-ring seal. 7 is the shoulder of the instrumentation package assembly element enclosure. 8 is the not shown. 9 is not shown. 10 is not shown. 11 is not shown. 12 is not shown. 13 is the vertically mounted pc board section. 14 is the not shown. 15 is the random access memory. 16 is the horizontally mounted printed circuit section. 17 is the Microprocessor. 18 is the solid outer casing section of the instrumentation package assembly element enclosure. 19 is the flexible bellows section of the instrumentation package assembly element enclosure. 20 is the dry gas—nitrogen. 21 is the video MPEG encoder. 22 is the audio MPEG encoder. 23 is the power control switch. 24 is the power regulator. 25 is not shown. 26 is the firmware read only memory. 27 is the MPEG stream encoder. 28 is the network transceiver. 29 is the fiber optics/copper cable line interface. 30 is the impedance matching network. 31 is the antenna phase shift network. 32 is the battery recharging and data isolation network. 33 is the 250 kHz tuning capacitor. 34 is the audio operational amplifier. 35 is an unused slot for future electronic functions. 36 is an unused slot for future electronic functions. 37 is an unused slot for future electronic functions. 38 is an unused slot for future electronic functions. 39 is an unused slot for future electronic functions. 40 is an unused slot for future electronic functions. 41 is an unused slot for future electronic functions. 42 is an unused slot for future electronic functions. 43 is an unused slot for future electronic functions. 44 is an unused slot for future electronic functions.

FIG. 36A shows a side view section of the instrumentation package assembly element for instrumented baseball bases.

FIG. 36B shows a top view section of the instrumentation package assembly element instrumented baseball bases.

FIG. 36C shows a bottom view section of the instrumentation package assembly element instrumented baseball bases.

Referring to drawings FIG. 36A and FIG. 36B and FIG. 37C, in a preferred embodiment, the instrumentation package assembly element which is used in the instrumentation package assembly of the instrumented baseball bases, is disclosed. The instrumentation package assembly element is a primary component of the instrumentation package assembly which is mounted inside the instrumented baseball bases.

FIG. 36D is a block diagram that explains the detailed circuitry, flow of electrical signals and data in the general operation of the instrumentation package assembly element electronics used for televising pictures and sounds, controlling the electrical and mechanical functions within the instrumentation package assembly element, and charging the battery pack. FIG. 36E is a block diagram showing the signals and data flows in the power supply and battery charging circuits inside the instrumentation package assembly element.

The camera 1 is a Hi-Definition 1080i CCD Camera, whose output is a broadcast grade HD-SDI format signal. In this embodiment 1 has a native 16:9 letter-box aspect ratio. The signal of 1 is fed to the input of compression hardware 21. 1 is also equipped with an auto-focus/iris feature set that may be over-ridden by commands from the system CPU 17. During game play 1 is used to capture the visual action occurring around the sides of the instrumented baseball bases and the instrumented baseball home plate equipped with a instrumentation package assembly and convey those pictures via MPEG stream encoder 27 and network transceiver 28 to the remote base station for further processing. Compression hardware 21 is a real time H.264 MPEG compression hardware module. Compression hardware module 21 compresses the signals inputted to them from 1 into MPEG format using the H.264 Protocol and applies this elementary stream to MPEG stream encoder 27. Compression is needed to reduce bandwidth requirements prior to transmission via radio using network transceiver 28. Compression hardware module 21, also receives commands from the CPU 17, which set the compression parameters associated with the H.264 protocol.

In another preferred embodiment, camera 1 contains part of or all the functions of compression hardware module 21 as part of its own internal circuitry, thus saving some board space during manufacturing, in which case the additional control commands from CPU 17 would be sent directly to cameras 1 in-lieu of compression hardware module 21.

A microphone referred to in FIG. 36D that is used during game play serves as the signal source for operational amplifiers 34. 34 is configured as a low noise high gain microphone pre-amplifier. 34 amplifies signals inputted from the condenser microphone and provides adequate voltage gain and equalization to drive the analog to digital converters inside MPEG Audio Encoder 22. which further combines the resultant elementary audio data packets into a single elementary stream and applies it to MPEG stream encoder 27 prior to transmission to the remote base station by 28.

28 is a network transceiver. This transceiver is inputted composite IP MPEG Stream image and audio data from 27 along with system control status data packets from system control microprocessor 17. Network transceiver 28 then transmits this data using, for example, the 802.11(xx) protocol via the unlicensed 2.4 or 5.8 GHz radio spectrum via radio using an antenna located within the instrumentation package assembly to the remote base station. 28 also transmits and receives control commands to and from the remote base station when they are intercepted by this antenna using the via the unlicensed 2.4 or 5.8 GHz radio spectrum. This control commands are coupled to and from 17. 17 is used to control the flow of system command functions. This command functions are used to adjust the operating parameters of the system based on instructions that it receives from the remote base station.

Additionally, 28 will also communicate and convey high quality picture and sound information data packets along with the aforementioned system control commands over a fiber optic connection via fiber optics/copper cable line driver interface 29. Use of such a fiber optic/copper cable connection between the instrumented baseball base or instrumented home plate completely eliminates bandwidth and/or interference issues that are sometimes encountered with a solely RF based system. Stadium owners can also benefit by using fiber optic connectivity since it permits easier future systems upgrades. System command function instructions are received by 17 from battery charging and stand-by data isolation network circuit 32. This is needed to allow initialization of the instrumentation package inside the instrumented baseball base or instrumented home plate.

17 utilizes an operating firmware stored at the time of manufacture on system ROM 26 and executes this firmware upon loading system RAM 15 with its contents. 28 is a network transceiver. 28 is used to provide a wireless RF link operating on the unlicensed 2.4 or 5.8 GHz radio spectrum between the instrumented base or instrumented home plate and the base station, utilizing for example the 802.11(xx) Protocol. 28 transmits and receives control commands from system control microprocessor 17. These control commands specify the exact RF channel frequency, RF channel power output and antenna phasing via phase shift network 31 when an instrumented baseball base or instrumented home plate equipped with a phased antenna array is being used. Signals traveling to and from 28 as RF signals are coupled, via an impedance matching network 30, to the atmosphere by an antenna system located within the instrumented baseball base or instrumented home plate. This antenna system, operating within the unlicensed 2.4 or 5.8 GHz radio spectrum, provides an isotropic gain of 3 db or better is used to capture and radiate the RF energy transmitted and/or received between the remote base station and an instrumented baseball base or instrumented home plate so equipped with a instrumentation package assembly.

Referred to in FIG. 44A, the instrumentation package assembly utilizing a phased antenna array is shown. A phased array is desirable since it permits a finite adjustment of the transmitted and/or received RF propagation pattern such that an optimum RF path between the remote base station and the instrumented home plate is maintained. This allows interference issues which can occur in some stadiums to be resolved.

Power supply regulator 24 supplies power to all the elements shown in FIG. 36A, FIG. 36B and FIG. 36C. 24 receives power from a rechargeable battery pack located within the instrumentation package. In a preferred embodiment, a lithium ion battery pack is used because of the heavy current requirements expected during the length of time of a typical baseball game.

Alternately 24 can receive dc power from a dc power port from a fiber optics/copper cable receptacle located on the bottom of the instrumented baseball base or instrumented baseball home plate. The battery pack or aforementioned dc power port delivers 3.3 volt dc to 24 which in turn supplies power to all the elements shown in FIG. 36A, FIG. 36B and FIG. 36C.

The instrumentation package assembly also contains a set of inductive pickup coils that are used to couple electrical energy from outside of the instrumented baseball base or instrumented home plate to the aforementioned battery pack during the recharging of the battery pack via battery charging and stand-by data separator circuit 32. The aforementioned inductive pickup coil is tuned by a capacitor 33 so as to resonate at a frequency near 250 kHz. 24 contains a switching circuit 23 that receives control commands from system control microprocessor 17. These commands instruct and enable 24 to supply power to the rest of the electronic components that comprise FIG. 36A, FIG. 36B and FIG. 36C. These commands take 24 out of the stand-by mode and put it in the power-on mode.

A condenser microphone and an antenna array are parts of the instrumentation package assembly, but are not part of the instrumentation package assembly element. They are mounted separately and external to the instrumentation package assembly element's enclosure 18. The condenser microphone and the antenna array are electrically connected to the electronics inside the instrumentation package assembly element's enclosure 18.

The purpose of the condenser microphone located inside the instrumentation package assembly is to capture the sounds of the players striking or sliding into the instrumented baseball bases and instrumented baseball home plate equipped with the instrumentation package assembly. The condenser microphone which is used during game play serves as the signal source for operational amplifiers 34. 34 is configured as low noise high gain microphone pre-amplifier. 34 amplifies signals inputted from the condenser microphone and provides adequate voltage gain and equalization to drive the analog to digital converters inside MPEG Audio Encoder 22 which further combines the resultant elementary audio data packets into a single stream and applies them to the input of 27 prior to transmission to the antenna array relay junction referred to in FIG. 59A and FIG. 59B by 28.

Condenser microphones have good fidelity for their small size, weight and power consumption. In the future higher quality smaller sized microphones are likely to become available as the state of the art improves. It is anticipated that we will use these microphones as they become available.

27 is an MPEG stream encoder whose function is to combine the resultant individual elementary MPEG streams that represent the images and sounds into a single MPEG stream prior to transmission to the remote base station via network transceiver 28. This transceiver is inputted composite MPEG stream image and audio data from 27 along with system control status data packets from system control microprocessor 17. Network transceiver 28 then transmits this data using, for example, the 802.11(xx) protocol via the unlicensed 2.4 or 5.8 GHz radio spectrum via radio using 28 and an antenna located within the instrumentation package assembly to the antenna array relay junction referred to in FIG. 59A and FIG. 59B. 28 also outputs control commands from the remote base station when they are received by this antenna via the unlicensed 2.4 or 5.8 GHz radio spectrum. This control commands are inputted to 17. 17 is used to control the flow of system command functions. This command functions are used to adjust the operating parameters of the system based on instructions that it receives from the antenna array relay junction.

Alternately, system command function instructions may be received by 17 from the battery charging and stand-by data separator circuit 32. This is needed to allow initialization of the instrumentation package inside the instrumented baseball base and instrumented baseball home plate. 17 utilizes an operating firmware stored at the time of manufacture on system ROM 26 and executes this firmware upon loading system RAM 15 with its contents.

28 is a network transceiver. 28 is used to provide a wireless RF link operating on the unlicensed 2.4 or 5.8 GHz radio spectrum between the instrumented baseball bases and instrumented baseball home plates and the antenna array relay junction, utilizing, for example, the 802.11(xx) Protocol. 28 transmits the MPEG stream from 27 and also transmits and receives control commands to and from system control microprocessor 17. These control commands specify the exact RF channel frequency and RF channel power output that will be used during subsequent operation of the system. Signals traveling to and from 28 as RF signals are coupled to the atmosphere by an antenna within the instrumentation package assembly inside the instrumented baseball bases and instrumented baseball home plates. This antenna system, operating within the unlicensed 2.4 or 5.8 GHz radio spectrum, provides an isotropic gain of 3 db or better to reach the remote base station's antenna's wireless network access point referred to in FIG. 59A and FIG. 59B.

The instrumented baseball base and instrumented baseball home plate antennas are used to capture and radiate the RF energy transmitted and/or received between the antenna array relay junction and the instrumented baseball bases and instrumented baseball home plate so equipped with the instrumentation package assembly.

Power supply regulator 24 supplies power to all the elements shown in FIG. 36A and FIG. 36B and FIG. 36C. 24 receives power from a rechargeable battery pack located within the instrumentation package assembly. In a preferred embodiment, a lithium ion battery pack is used because of the heavy current requirements expected during the length of time of a typical baseball game. This battery pack delivers 3.3 volt dc to 24 which in turn supplies power to all the electrical elements.

The instrumentation package assembly also contains inductive pickup coils that are used to couple electrical energy from outside of the instrumented baseball base and instrumented baseball home plate to the battery pack during the charging of the battery pack via battery charging and stand-by data separator circuit 32. The inductive pickup coils are tuned by a capacitor 33 so as to resonate at a frequency near 250 kHz. 24 contains a switching circuit 23 that receives control commands from system control microprocessor 17. These commands instruct and enable 24 to supply power to the rest of the electronic components in the instrumentation package assembly. These commands take 24 out of the stand-by mode and put it in the power-on mode.

The instrumentation package assembly element has an air-tight enclosure that houses all of its components. The enclosure is contiguous and constructed from polycarbonates, ABS and fiber reinforced plastics. The enclosure has three sections. 5 is the small diameter cylindrical section. 18 is the large diameter cylindrical section. 19 is the flexible corrugated bellows section.

Camera lens 2 is mechanically and electrically attached to camera 1. Camera lens 2 images objects in its field of view onto the CCD sensor array of camera 1. Camera 1 is mounted inside the large diameter cylindrical enclosure section 18. The camera lens 2 is mounted within the small diameter cylindrical section 5. The camera lens 2 is sealed inside 5 with the o-ring seal 6. O-ring seal 6 is air-tight and moisture proof. The supporting electronics components 13, 17, 21, 22, 23, 24, 27, 28, 31, 32, 33 and 34 are all mounted inside the cylindrical enclosure 18 and electrically connected to camera 1.

The corrugated bellows section 19 allows the instrumentation package assembly element to flex, stretch and compress and absorb shock and vibration. The corrugated bellows section 19 is attached to the main center hub of the instrumentation package assembly (not shown) with an air-tight seal. The optical and mechanical axes of camera 1, camera lens 2, section 5 and section 18 is 3.

It is desirable to keep the size and weight of the instrumentation package assembly elements as small as possible. The diameter of section 18 is dependent on the size of the largest physical component that is contained inside 18. In today's technology, camera 1 is the largest physical component. Today Camera 1 keeps the minimum diameter of section 18 to about ¾ inch. As the technology for HD-SDI TV cameras improves, camera 1 will become physically smaller, and the ¾ inch diameter will be reduced.

The diameter of section 5 is dependent on the size of the largest physical component that is contained inside 5. The largest physical component that is contained inside 5 is camera lens 2. In today's technology, camera lens 2 is about ⅛ to ⅜ inch in diameter. As the technology for both HD-SDI TV cameras and lenses improves, miniaturization will improve and camera lens 2 will become physically smaller, and the diameter of section 5 will be reduced. It is desirable to keep the diameter of section 5 as small as possible in order to keep the diameter of the circular opening in the baseball base's cover as small as possible to make the openings unobtrusive to the baseball players.

The cavities of enclosure sections 5, 18 and 19 are filled with dry nitrogen gas 20 under pressure to prevent dirt and moisture from entering the enclosure.

Camera lens 2 is chosen by the cameraman. A variety of camera lens types can be chosen for camera lens 2. These types range from extremely wide angle lenses to more standard lens types with narrower fields of view. Extremely wide angle lenses of the fish-eye variety and ones with nearly 180 degree fields of view are accommodated by 5.

Different camera lens types, with different lens setting capability, can be used providing they are small in size (so as not to be prominent and conspicuous to the players) and also physically fit within the instrumentation package assembly. The auto iris setting permits the camera lenses to automatically adjust for varying lighting conditions on the field. The auto focus setting permits the camera lenses to adjust focus for varying distances of the players and action subjects on the field.

The functions of the camera lens 2 such as zoom, focus adjustment settings and iris adjustment settings are controlled wirelessly by the cameraman from the remote base station by sending command and control signals from the remote base station to the instrumentation package assembly inside the instrumented sports paraphernalia. The cameraman can also send command and control signals from the remote base station to the instrumentation package assembly to put these settings on automatic under the control of the camera electronics. The optical and electronic zoom functions of the camera lens 2 are operated by the cameraman by sending command and control signals from the remote base station to the instrumentation package assembly. The cameraman can select from a wide variety of HD camera lenses. Wide angle lenses and ultra wide angle lenses are used in many venues to give the TV viewing audience the feeling of being there on the playing field amongst the players. In some venues the cameraman may choose to use camera lenses with more magnification and narrower fields of view to better cover certain plays. In some venues the cameraman may choose camera lenses with small f-numbers to deal with poorer lighting conditions. Items 35, 36, 37, 38, 39, 40, 41, 42, 43 and 44 are unused slots for future expansion of electronic functions.

Referring to the Preferred Embodiment Specified in FIG. 36A and FIG. 36B and FIG. 36C, the Instrumentation Package Assembly Element Satisfies all of the Following Objectives:

It is an objective of the present invention that the instrumentation package assembly element is composed of a high definition camera, camera lens system, enclosure, camera lens shell o-ring seal, shoulder of the enclosure, vertically mounted pc board section, random access memory, horizontally mounted printed circuit section, microprocessor, solid outer casing section of the enclosure, flexible bellows section of the enclosure, dry gas, video MPEG encoder, audio MPEG encoder, power control switch, power regulator, firmware read only memory, MPEG stream encoder, network transceiver, fiber optics/copper cable line interface, impedance matching network, antenna phase shift network, battery recharging and data isolation network, 250 kHz tuning capacitor, audio operational amplifier, unused slots for future electronic functions. It is an objective of the present invention not to block, absorb or reflect radio waves that are transmitted or received by the instrumentation package assembly.

FIG. 36D

The detailed physical elements disclosed in the baseball base instrumentation package assembly element electronics block diagram shown in FIG. 36D are identified as follows: 1 is a high definition camera. 2 is a condenser microphone. 3 is a video MPEG encoder. 4 is a audio operational amplifier. 5 is a audio MPEG encoder. 6 is a random access memory. 7 is a microprocessor. 8 is a power control switch. 9 is a power regulator. 10 is a rf antenna phasing and impedance matching module. 11 is a firmware read only memory. 12 is an MPEG stream encoder. 13 is a network transceiver. 14 is a dc power over fiber line interface. 15 is a dc power from fiber optics/copper cable port. 16 is a battery recharging and data isolation network. 17 is a 250 kHz tuning capacitor. 18 is a rechargeable battery. 19 is a induction coil interface. 20 is a fiber optics/copper cable line driver interface. 21 is the power and control interconnect interface for image, sound and RF components etc. 22 is a control, power supply and battery charging components. 23 RF feed line to antenna assembly. 24 is a fiber optic/copper cable feed line to a fiber optic/copper cable receptacle located in the bottom of the instrumented baseball base. 25 is a condenser microphone. 26 is a condenser microphone.

FIG. 36D is a block diagram of the instrumented baseball base instrumentation package assembly element electronics circuits.

Referring to FIG. 36D, in a preferred embodiment, the electronic circuits within the instrumentation package assembly element specified in FIG. 36A and FIG. 36B and FIG. 36C is disclosed. The signals and data flows in the electronic circuits are specified.

Camera 1 is a Hi-Definition 1080i CCD camera, whose output is a broadcast grade HD-SDI format signal. In this embodiment this 1 has a native 16:9 letter-box aspect ratio. The signal of 1 is fed to the input of video MPEG encoder compression hardware 3. 1 is also equipped with an auto-focus/iris feature set that can be over-ridden by commands from the system CPU 7 in turn issued by the remote base station system software. During game play 1 is used to capture the action occurring around either end of the instrumented baseball base or instrumented home plate and convey these captured pictures and sounds via MPEG stream encoder 12 and network transceiver 13 to the remote base station for further processing. Compression hardware 3 is a real time H.264 MPEG compression hardware module. Compression hardware module 3 compresses the signals inputted to them from 1 into MPEG format using the H.264 Protocol and applies the resultant elementary MPEG stream to 12. Compression is needed to reduce the bandwidth requirements prior to transmission via radio using network transceiver 13. Compression hardware module 3, also receives commands from the CPU 7, which set the compression parameters associated with the H.264 protocol.

Camera 1 may contain part of or all the functions of compression hardware module 3 as part of their own internal circuitry, thus saving some board space during manufacturing, in which case the additional control commands from CPU 7 would be sent directly to cameras 1 in-lieu of compression hardware module 3.

A set of three condenser microphones, shown as 2, 30 and 31 in FIG. 36D are located inside the instrumented baseball bases. Their purpose is to capture the ambient sounds of players around the baseball bases as well as the sound of players striking or sliding into the instrumented baseball base itself. These microphones used during game play serve as the signal source for operational amplifier 4. 4 is configured as a low noise high gain microphone pre-amplifier. 4 amplifies the signals inputted from the condenser microphones and provides adequate voltage gain and equalization to drive the analog to digital converters inside MPEG Audio Encoder 5 which further combines the resultant elementary audio data packets into a single stream and applies it to MPEG stream encoder 12 prior to transmission to the remote base station by 13.

A condenser microphone, 2 shown in FIG. 36D is located inside the instrumented baseball base or instrumented home plate. Its purpose is to capture the sounds of players striking or sliding into the instrumented baseball base or instrumented home plate. This microphone used during game play serves as the signal source for operational amplifiers 4. 4 is configured as low noise high gain microphone pre-amplifier. 4 amplifies signals inputted from the condenser microphone and provides adequate voltage gain and equalization to drive the analog to digital converters inside MPEG Audio Encoder r 5 which further combines the resultant elementary audio data packets into a single stream and applies it to MPEG stream encoder 12 prior to transmission to the remote base station by 13.

13 is a network transceiver. This transceiver is inputted composite MPEG Stream image and audio data from 12 along with system control status data IP packets from system control microprocessor 7. Network transceiver 13 then transmits this data using, for example, the 802.11(xx) protocol via the unlicensed 2.4 or 5.8 GHz radio spectrum via radio using an antenna located within the instrumentation package assembly of the instrumented baseball base or instrumented home plate to the remote base station; 13 also outputs control commands from the remote base station when they are received by this antenna via the unlicensed 2.4 or 5.8 GHz radio spectrum. These control commands are inputted to 7. 7 is used to control the flow of system command functions. These command functions are used to adjust the operating parameters of the system based on instructions that it receives from the remote base station.

Additionally, 13 can communicate and convey high quality picture and sound information data packets along with the aforementioned system control commands over a fiber optic and/or copper cable connection via fiber optics/copper cable line driver interface 20 via a fiber optic/copper cable feed line 24 which is interconnected with a fiber optic/copper cable receptacle located on the bottom of the instrumented baseball base or instrumented home plate. Use of such a fiber optic/copper cable connection between the instrumented baseball base or instrumented baseball home plate completely eliminates bandwidth and/or interference issues that are sometimes encountered with a solely RF based system. Stadium owners can also benefit by using fiber optic connectivity since it permits easier future systems upgrades.

System command function instructions can alternately be received by 7 from battery charging and stand-by data separator circuit 16. This is needed to allow initialization of the instrumentation package inside the instrumented baseball base or instrumented home plate. 7 utilizes an operating firmware stored at the time of manufacture on system ROM 11 and executes this firmware upon loading system RAM 6 with its contents. 13 is a network transceiver. 13 is used to provide a wireless RF link operating on the unlicensed 2.4 or 5.8 GHz radio spectrum between the instrumented base or instrumented home plate and the remote base station, utilizing, for example, the 802.11(xx) Protocol. 13 transmits the MPEG stream from 12 and also transmits and receives control commands to and from system control microprocessor 7. These control commands specify the exact RF channel frequency, RF channel power output and antenna phasing via an impedance matching and phase shift network 10 when an instrumented baseball base or instrumented home plate equipped with a phased antenna array is being used.

Signals traveling to and from 13 as RF signals are coupled, via an RF feed line 23 and impedance matching network 30, to the atmosphere by an antenna system located within the instrumented baseball base or instrumented home plate. This antenna system, operating within the unlicensed 2.4 or 5.8 GHz radio spectrum, provides an isotropic gain of 3 db or better is used to capture and radiate the RF energy transmitted and/or received between the remote base station and an instrumented baseball base or instrumented home plate so equipped with a instrumentation package assembly.

Referred to in FIG. 44A the instrumentation package assembly utilizing a phased antenna array is shown. A phased array is desirable since it permits a finite adjustment of the transmitted and/or received RF propagation pattern such that an optimum RF path between the remote base station and the instrumented home plate be maintained. This allows interference issues which can occur in some stadiums to be resolved.

Power supply regulator 9 supplies power to all the elements showed in FIG. 36D. 9 receives power from a rechargeable battery pack 18 located within the instrumentation package assembly. In a preferred embodiment, a lithium ion battery pack is used because of the heavy current requirements expected during the length of time of a typical baseball game. Alternately 9 can receive dc power from a dc power port of a fiber optics/copper cable receptacle located on the bottom of the instrumented baseball base or instrumented home plate via fiber optics/copper cable dc power interface 14 and dc power feed line 15 from the aforementioned fiber optics/copper cable receptacle.

The rechargeable battery pack 18 delivers 3.3 volt dc to 9 which in turn supplies power to all the elements shown in FIG. 36D. However, to ensure Long Battery Life, the main functional electronic components shown within the boundaries of dotted lines 21 receive dc power in a reduced state or can be switched off.

The control, power supply and battery charging electronic components within the dotted line boundaries of 22 receive dc power from 18 whenever 18 is sufficiently charged to place the components of 22 into a steady stand-by state.

The instrumentation package assembly also contains a set of inductive pickup coils that is used to couple electrical energy from outside of the instrumented baseball base or instrumented home plate via induction coil interface 19 to the battery pack during the recharging of the battery pack via battery charging and stand-by data separator circuit 22. The aforementioned inductive pickup coil is tuned by a capacitor 17 so as to resonate at a frequency near 250 kHz. 22 contains a switching circuit 8 that receives control commands from system control microprocessor 7. These commands instruct and enable 22 to supply power to the rest of the electronic components that comprise FIG. 36D. These commands take 9 out of the stand-by mode and put it in the power-on mode.

A condenser microphone 5 shown in FIG. 36D is located inside the instrumentation package assembly whose purpose is to capture the sounds of players striking or sliding into the base or plate so equipped with the instrumentation package assembly. This microphone used during game play serves as the signal source for operational amplifiers 34. 34 is configured as low noise high gain microphone pre-amplifier. 34 amplifies signals inputted from the condenser microphone and provides adequate voltage gain and equalization to drive the analog to digital converters inside MPEG Audio Encoder 22. which further combines the resultant elementary audio data packets into a single stream and applies it to MPEG stream encoder 27 prior to transmission to the remote base station by 28.

28 is a network transceiver. This transceiver is inputted the composite MPEG Stream image and audio data from 27 along with system control status data from system control microprocessor 17. Network transceiver 28 then transmits this data using, for example, the 802.11(xx) protocol via the unlicensed 2.4 or 5.8 GHz radio spectrum via radio using an antenna located within the instrumentation package assembly to the remote base station 28 also outputs control commands from the remote base station when they are received by this antenna using the 802.11(xx) protocol via the unlicensed 2.4 or 5.8 GHz radio spectrum. This control commands are inputted to 17. 17 is used to control the flow of system command functions. This command functions are used to adjust the operating parameters of the system based on instructions that it receives from the remote base station.

Alternately, system command function instructions may be received by 17 from battery charging and stand-by data separator circuit 32. This is needed to allow initialization of the instrumentation package assembly inside the base or home plate. 17 utilizes an operating firmware stored at the time of manufacture on system ROM 26 and executes this firmware upon loading system RAM 15 with its contents. 28 is a network transceiver. 28 is used to provide a wireless RF link operating on the unlicensed 2.4 or 5.8 GHz radio spectrum between the instrumented base or instrumented home plate and the remote base station, utilizing, for example, the 802.11 (xx) Protocol. 28 transmits the MPEG stream from 27 and also receives control commands from system control microprocessor 17. These control commands specify the exact RF channel frequency and RF channel power output that will be used during subsequent operation of the system. Signals traveling to and from 28 as RF signals are coupled to the atmosphere by an antenna within the instrumentation package assembly equipped base or home plate. This antenna system, operating within the unlicensed 2.4 or 5.8 GHz radio spectrum, provides an isotropic gain of 3 db or better to reach the remote base station's wireless network access point transceiver. The antenna is used to capture and radiate the RF energy transmitted and/or received between the remote base station and an instrumented base or instrumented home plate so equipped with a instrumentation package assembly.

Power supply regulator 24 supplies power to all the elements shown in FIG. 36D. 24 receives power from a rechargeable battery pack located within the instrumentation package assembly. In a preferred embodiment, a lithium ion battery pack is used because of the heavy current requirements expected during the length of time of a typical baseball game. This battery pack delivers 3.3 volt dc to 24 which in turn supplies power to all the elements shown in FIG. 36D.

The instrumentation package assembly also contains an inductive pickup coils that is used to couple electrical energy from outside of the base or home plate so equipped with the instrumentation package assembly to the aforementioned battery pack during the recharging of the battery pack via battery charging and stand-by data separator circuit 32. The aforementioned inductive pickup coil is tuned by a capacitor 33 so as to resonate at a frequency near 250 kHz. 24 contains a switching circuit 23 that receives control commands from system control microprocessor 17. These commands instruct and enable 24 to supply power to the rest of the electronic components that comprise FIG. 36D. These commands take 24 out of the stand-by mode and put it in the power-on mode.

The cameraman, in the remote base station, software selects either the wireless mode of communication, and/or the fiber optics/copper cable mode of communication between each of the instrumented sports paraphernalia and the remote base station. The cameraman can use whichever equipment (antenna array relay junction or fiber optics cable/copper cable) is installed in the stadium/arena with which to command and control his choice and communicate it to the instrumented sports paraphernalia on the stadium/arena playing field/rink. These choices are also physically switch selectable by the cameraman with his access through the opening in the bottom of some of the instrumented sports paraphernalia i.e bases, plates and pitcher's rubbers. Refer to FIG. 59A and FIG. 59B, and FIG. 60A and FIG. 60B, and FIG. 61A and FIG. 61B, and FIG. 64A and FIG. 64B and FIG. 64C for disclosures regarding the remote base station and the antenna array relay junction.

The cameraman selects items from a software menu of control commands that go to the network transceiver at the remote base station that are subsequently transmitted to the instrumented sports paraphernalia for the purpose of adjusting various system initializations, operating parameters, radio frequency, polling system status data such as battery condition, and initiating remote mechanical adjustments such as camera focus, optical zoom, iris and movement to the cameras' field of view, etc over the selected bi-directional communications link i.e. wireless radio, fiber optics or copper cable connectivity being used within the particular sports stadium.

These commands, when intercepted by the network transceiver 13 within the instrumented sports paraphernalia are applied to its microprocessor 7, which then in turn upon executing the instructions stored within the contents of its firmware 6 applies a pulse coded control signal via the power and control interconnect interface 21 inside the instrumentation package to the corresponding electronics i.e. the mechanical actuators that provides optical focus and/or zoom adjustment of the cameras and microphone gain and selection, etc as desired by the cameraman and/or special software running on the computer at the remote base station. The power and control interconnect interface 21 as shown in FIG. 36D, which is represented by dotted lines, consists of the electrical control wiring to and from the electronic components of the instrumented sports paraphernalia that are being controlled.

Referring to the Preferred Embodiment Specified in FIG. 36D, the Instrumentation Package Assembly Element Electronics Satisfies all of the Following Objectives:

It is an objective of the present invention that the instrumentation package assembly element electronics be composed of a high definition camera, three condenser microphone connectors, a video MPEG encoder, an audio operational amplifier, audio MPEG encoder, random access memory, microprocessor, power control switch, power regulator, rf antenna phasing and impedance matching module, firmware read only memory, MPEG stream encoder, network transceiver, dc power/fiber line interface, dc power from fiber optics/copper cable port, battery recharging and data isolation network, 250 kHz tuning capacitor, rechargeable battery, induction coil interface, fiber optics/copper cable line driver interface, main image/sound and RF components, control/power supply and battery charging components, RF feed line to antenna assembly, fiber optic/copper cable feed line to a fiber optic/copper cable receptacle, and power and control interconnect interface.

FIG. 36E

The detailed physical elements disclosed in the instrumentation package assembly element power supply and battery charging circuits drawing shown in FIG. 36E are identified as follows:

1 is the induction coil interface. 2 is the impedance matching data and power isolation network. 3 is the battery charging circuit. 4 is the 250 kHz data modem. 5 is the dc power bus. 6 is the rechargeable lithium ion battery pack. 7 is the power supply regulator circuit. 8 is the power control switch. 9 is the power control data bus. 10 is the microprocessor. 11 is the read only memory. 12 is the communications data bus. 13 is the status information data bus. 14 is the system control data bus. 15 is the switched dc power bus. 16 is the switched components block. 17 fiber optics/copper communications cable and dc power connector.

FIG. 36E is a block diagram of the power supply and battery charging circuits inside the instrumentation package assembly used inside instrumented baseball bases.

Referring to drawing FIG. 36E, in a preferred embodiment, the power supply and battery charging circuits common to all the instrumentation package assembly embodiments specified for instrumented baseball bases is disclosed. The signals and data flows to and from the power supply and battery charging electronic circuits are specified.

FIG. 36E shows an induction coil interface 1 whose purpose is to convey electrical energy from a light-weight air core induction coil located onboard the instrumented baseball base. The coil is wound of only a few turns of a relatively small gauge magnet wire with sufficient capacity to handle the required current to recharge the batteries also onboard the instrumentation package assembly with minimal temperature rise.

Impedance matching diverter 2 is connected to 1 forming a parallel resonant tank circuit with the aforementioned induction coil tuned to approximately 250 kHz. When a baseball base containing the instrumentation package assembly is properly placed on the recharging station such that coil is subject to the intense magnetic flux created by the coil within the recharging station, 2 will supply magnetically coupled electrical power from the recharging station via 1 and 2 to battery charging circuit 3. In addition, 1 and 2 also convey a packet of administrative and control data signals between the recharging station and Data transceiver 4. Furthermore, 2 includes a high-stability fail-safe protection circuit which prevents 4 from being catastrophically destroyed by the high voltage present across 1 that is necessary during a typical recharging cycle. Circuits 1, 2 and 3 are so arranged that whenever the baseball base containing the instrumentation package assembly is not placed or is improperly placed on the recharging station or is being used in a game, the circuits comprised of 1, 2 and 3 do not present an electrical load on 7. This feature set also ensures the longest possible life of the battery during idle periods of no-use by not permitting unnecessary loading of 7 by 1, 2 and 3

In the event that the voltage level appearing at battery bus line 5 has fallen below the charging set-point threshold of 3, charging of rechargeable battery 6 will begin to commence automatically as charging current is applied to 6 via 3 and 5 whilst the base or plate containing the instrumentation package is properly placed on an active recharging station.

As the back voltage detected by 3 appearing at 6 rises abruptly above a set-point threshold of 3, charging current is automatically reduced to prevent over-charging of the batteries, this also protects the remainder of the base or plate camera system 16 from damage due to over heating while its batteries are in the charging station.

Throughout a recharging cycle, main power supply 7, microprocessor 10 and 4 also receive dc power from 3 via 5 so as to avoid any unnecessary battery consumption until charging is complete.

Whenever dc power is supplied to 7 via 5, power to the remaining hardware 16 will remain in an off-state until a turn-on command is received by main power supply switch 8 from 10 via main power control data bus line 9. This will in turn cause 8 to energize Switched Power Bus 14 and begin supplying regulated D/C power to the rest of the instrumentation Package 16. 8 will continue to supply such power until 8 receives a shutdown command from 10 via 9 or a failure of 6 occurs. As long as 8 is keeping 14 active 10 may issue commands to 16 via Bi-directional Instrumentation Package Control Data Bus Line 15. 15 is also used to collect status information about 16 including modes of failures which may occur throughout the use of the instrumentation package. These failures in turn cause software parameters of 10 stored within 11 to be executed by 10 and communicate these fault indications back to the base station. Such indications are intended to alert personnel of the fault condition which might otherwise result in an embarrassment to personnel i.e.: an aging battery in need of recharging or a damaged camera.

Each base instrumentation package is equipped with a unique identification code and operating firmware embedded in the read only memory 11 areas of 10. As soon as power to 10 via 5 becomes available initialization of 10 is commenced loading this id code and operating firmware into 10 via 11. Once this initialization of 10 is complete, synchronization of 4 with the recharging station's onboard data transceiver begins, via data transceiver bus line 12, thereby establishing an administrative and control data link between 10 and the recharging station's human interface panel via 1,2,3,4 and 12 respectively.

The overall rate and length of time at which 3 will continue to supply charging current and hence recharge the batteries within the base instrumentation package is dependent on the specific rating and initial condition of the battery, and the entries made in the user adjustable settings menu of the recharging station's human interface panel based on the operating parameters contained in 11 transferred to the microprocessor onboard the recharging station during synchronization of 4 as previously described.

As soon as a typical charging cycle is commenced, continuous fail-safe monitoring data of the charging current and voltage supplied by 3 is sent to 10 via Power control data bus line 13. If at any time a problem develops during a charging cycle that could result in catastrophic destruction of the base instrumentation package, batteries and/or the recharging station, a total system shutdown sequence is initiated and personnel advisory warning displayed on the recharging station's human interface panel, thereby removing power and safeguarding the hardware as described.

While a base equipped with the instrumentation package is properly placed in the recharging station a series of self diagnostic and power consumption tests may be performed on 16. The results of which are forwarded to the human interface panel of the recharging station via 1,2, 4, 10 and 11 respectively and are useful to personnel in evaluating the base or plate camera instrumentation packages overall condition prior to its use in a game.

Since a typical baseball team may wish to use a finite number of n bases equipped with the instrumentation package, a means of cataloging and archiving the charge, recharge, usage, power consumption and diagnostic testing cycles associated with each is provided by 10 via 11. This information is available to personnel via the human interface panel on the recharging station upon command from personnel and furthermore may be stored by a Personal Computer connected to the data logging port of the recharging station charging the base(s) concerned. As previously described, each base instrumentation package contains a unique identification number; therefore the book-keeping for each base involved is independent respectively.

After 6 has assumed a full and complete charge, the base instrumentation package is placed into a powered-off state and except for a very small stand-by current through 4 and 10, battery consumption is minimized until future use is desired.

Prior to using the base instrumentation package in a game 8 must be activated in order to supply dc power to 16. Upon receiving a power-on command from 10 via 9 and 10 will take 8 out of the power-off state thus allowing 7 to supply dc power to 16.

Invocation of the power-on command by 10 may be accomplished by either of two methods: Firstly, if the base concerned is properly placed on a recharging station its human interface panel (if so equipped) may be used to invoke a power-on command sequence to 10 via 1, 2, 4 and 12 respectively. Secondly, the base's system's hand-held remote control device may be placed near either end of the base or plate concerned to invoke this command to 10 via 1, 2, 4 and 12 if desired.

Activation of 8 by either method places the entire base instrumentation package into a fully powered-on state and may then be synchronized with the base station hardware, tested and subsequently utilized in a base or plate game.

While the base instrumentation package is in a fully powered on state and not placed in the recharging station i.e. it is being used in a real baseball game, administrative data, Identification code and control signals along with photographic image and sound accompaniment will be transmitted and available to the base station hardware.

If throughout a game, a low battery condition, power supply or any other technical fault develops, 7 via 13 will cause 10 to transmit an appropriate warning message to the base station's human interface display via the 802.11(x) transceiver in 16.

False signaling and invocation of the base instrumentation package by other nearby potential sources of interference is avoided by the decoding algorithm stored in 11 and used by 10 when communicating critical information over either of the two distinct administrative and control data link techniques utilized by the base instrumentation package.

Until 6 falls to a low level set-point threshold within 7, The base instrumentation package will remain in a fully powered-on state unless 7 is de-activated via 8 after a shutdown sequence is issued by a power-off command from 10.

To preserve the life of 6, upon completion of its use, i.e. at the end of a game, the base instrumentation package should be placed into a powered-off state by causing 10 to issue a power-off signal to 7 via 8 and 9.

This may be accomplished in one of several methods: Firstly using the human interface hardware, display and software at the base station, personnel may transmit and invoke a power-off command to 10 via the 802.11(x) administrative and control data link of 16 via 13. Secondly, the personnel at the side lines of a typical baseball game may wish to conclude its operation by conveniently placing the handheld remote control near the instrumented base and depressing the power-off key on the human interface panel of said remote control invoking a power-off command to 10 via 1,2,3,4 and 12 respectively.

Finally, personnel may place the instrumented baseball base beneath or onto the recharging station. As described previously, whenever an instrumented baseball base is properly placed beneath or on to an active recharging station the instrumented baseball base instrumentation package is automatically put into a powered-off state unless otherwise instructed by personnel using the human interface panel of the recharging station concerned whenever 4 is synchronized with the recharging station via 1, 2 and 3.

Confirmation in any of the methods just described that the base instrumentation package has indeed been placed into a powered-off state is assured to personnel by both visual and audible indication from the human interface concerned when 10 via 1,2,3,4 and 12 acknowledges receipt and execution of the power-off invocation.

Referring to the Preferred Embodiments Specified in FIG. 36E, the Instrumentation Package Assembly Element Power Supply and Battery Charging Circuits Satisfy all of the Following Objectives:

It is an objective of the present invention that the instrumentation package assembly power supply and battery charging circuits be composed of an induction coil interface, impedance matching data and power isolation network, battery charging circuit, 250 kHz data modem, dc power bus, rechargeable battery pack, power supply regulator circuit, power control switch, power control data bus, microprocessor, read only memory, communications data bus, status information data bus, system control data bus, switched dc power bus, switched components block, fiber optics/copper communications cable and dc power connector.

FIG. 37A and FIG. 37B and FIG. 37C

The detailed physical elements disclosed in the instrumented baseball home plate battery pack charging unit drawings shown in FIG. 37A and FIG. 37B and FIG. 37C are identified as follows: 1 is the top of the instrumented baseball home plate. 2 is the side of the instrumented baseball home plate facing the pitcher. 3 is the side of the instrumented baseball home plate facing the right handed batter. 4 is a side of the apex of the instrumented baseball home plate. 5 is a side of the apex of the instrumented baseball home plate. 6 is the side of the instrumented baseball home plate facing a left handed batter. 7 is the bottom of the instrumented baseball home plate. 8 is the x-axis of the instrumented baseball home plate. 9 is the y-axis of the instrumented baseball home plate. 10 is the primary induction coil winding inside the battery pack charging unit. 11 is the top edge of the instrumented baseball home plate. 12 is a side edge of the instrumented baseball home plate facing a left handed batter. 13 is the apex of the instrumented baseball home plate. 14 is the z-axis of the instrumented baseball home plate. 15 is the battery pack charging unit. 16 is the instrumented baseball home plate battery pack. 17 is the upper induction coil. 18 is the lower induction coil. 19 is the instrumentation package assembly.

FIG. 37A is a diagram of the top view of the battery pack charging unit sitting on top of and charging the instrumented baseball home plate.

FIG. 37B is a diagram of the side view of the battery pack charging unit sitting on top of and charging the instrumented baseball home plate.

FIG. 37C is a diagram of the front view of the battery pack charging unit sitting on top of and charging the instrumented baseball home plate.

Referring to drawings FIG. 37A and FIG. 37B and FIG. 37C, in a preferred embodiment, a battery pack charging unit used to wirelessly charge the battery pack inside the instrumented baseball home plate, is disclosed. This same battery pack charging unit is used to wirelessly charge the battery pack inside the instrumented baseball bases shown in FIG. 37D and FIG. 37E and FIG. 37F.

The battery pack charging unit 15 is shown sitting flat on the top 1 of the instrumented baseball home plate. The battery pack charging unit 15 may be placed on the instrumented baseball home plate while the instrumented baseball home plate is either on or off the baseball playing field. The purpose of the battery pack charging unit 15 is to wirelessly charge the battery pack 16 inside the instrumented baseball home plate. The battery pack charging unit 15 has its own source of electrical energy. This source may be either internal or external to the battery pack charging unit 15. The battery pack charging unit has its own electronics (not shown).

The battery pack 16 is part of the instrumentation package assembly 19 electronics power circuitry inside the instrumented baseball home plate. The battery pack charging unit 15 has a primary induction coil winding 10 inside it. The instrumented baseball home plate has an upper secondary induction coil winding 17, and a lower secondary induction coil winding 18 inside it. The upper secondary induction coil winding 17 and a lower secondary induction coil winding 18 are part of the instrumentation package assembly 19.

The primary induction coil winding 10 of the battery pack charging unit 15 induces a 250 kHz time varying magnetic flux down into the instrumented baseball home plate which sits below it. The magnetic flux goes through the top 1 of the instrumented baseball home plate and links the two secondary induction coil windings 17 and 18 which are part of the instrumentation package assembly 19 battery charging circuitry. This field induces a voltage across the two secondary induction coil windings 17 and 18 to form an air core transformer. This voltage is used to charge the battery pack 16. For circuit details, refer to FIG—which discloses the battery pack charging circuitry.

When the battery pack charging unit 15 is placed on top 1 of the instrumented baseball home plate, it is aligned so that its z-axis coincides with the z-axis 14 of the instrumented baseball home plate. This assures that the primary induction coil winding 10 in the battery pack charging unit 15 will be coaxial with the secondary induction coil windings 17 and 18 inside the instrumented baseball home plate to maximize the flux linkage between them and the efficiency of the wireless energy transfer.

The battery pack charging unit's 15 footprint is no larger than the footprint of the instrumented baseball home plate 1.

Referring to the Preferred Embodiments Specified in FIG. 37A and FIG. 37B and FIG. 37C, the Instrumented Baseball Plate Charging Station Unit Satisfies all of the Following Objectives:

It is an objective of the present invention that the instrumented baseball plate charging station unit is composed of an enclosure, primary induction coil winding, electronics (not shown). It is an objective of the present invention to wirelessly charge the battery pack inside the instrumented baseball home plate. It is an objective of the present invention that the same charging station unit be used to charge the battery packs in the instrumented baseball bases, instrumented baseball home plates, instrumented baseball pitcher's rubbers, and instrumented ice hockey pucks.

FIG. 37D and FIG. 37E and FIG. 37F

The physical elements disclosed in the instrumented baseball base charging station unit drawings shown in FIG. 37D and FIG. 37E and FIG. 37F are identified as follows: 1 is the top of the instrumented baseball base. 2 is the side of the instrumented baseball base. 3 is the side of the instrumented baseball base. 4 is the z-axis of the instrumented baseball base. 5 is a side of the instrumented baseball base. 6 is the side of the instrumented baseball base. 7 is the bottom of the instrumented baseball base. 8 is the y-axis of the instrumented baseball base. 9 is the x-axis of the instrumented baseball base. 10 is the primary induction coil inside the battery pack charging unit. 11 is the battery pack charging unit. 12 is the battery pack. 13 is the upper induction coil. 14 is the lower induction coil. 15 is the instrumentation package assembly.

FIG. 37D is a diagram of the top view of the battery pack charging unit sitting on top of and charging the instrumented baseball base.

FIG. 37E is a diagram of the side view of the battery pack charging unit sitting on top of and charging the instrumented baseball base.

FIG. 37F is a diagram of the front view of the battery pack charging unit sitting on top of and charging the instrumented baseball base.

Referring to drawings FIG. 37D and FIG. 37E and FIG. 37F, in a preferred embodiment, a battery pack charging unit used to wirelessly charge the battery pack inside the instrumented baseball base, is disclosed. This same battery pack charging unit is used to wirelessly charge the battery pack inside the instrumented baseball home plate shown in FIG. 37A and FIG. 37B and FIG. 37C.

The battery pack charging unit 11 is shown sitting flat on the top 1 of the instrumented baseball base. The battery pack charging unit 11 may be placed on top of the instrumented baseball base while the instrumented baseball base is either on or off the baseball playing field. The purpose of the battery pack charging unit 11 is to wirelessly charge the battery pack 12 inside the instrumented baseball base. The battery pack charging unit 11 has its own source of electrical energy. This source may be either internal or external to the battery pack charging unit 11.

The battery pack 11 is part of the instrumentation package assembly 15 electronics power circuitry inside the instrumented baseball base. The battery pack charging unit 11 has a primary induction coil winding 10 inside it. The instrumented baseball base has an upper secondary induction coil winding 13, and a lower secondary induction coil winding 14 inside it. The upper secondary induction coil winding 13 and a lower secondary induction coil winding 14 are part of the instrumentation package assembly 15.

The primary induction coil winding 10 in the battery pack charging unit 11 induces a 250 kHz time varying magnetic flux down into the instrumented baseball base which sits below it. The magnetic flux goes through the top 1 of the instrumented baseball base and links the two secondary induction coil windings 17 and 18 which are part of the instrumentation package assembly 19 battery charging circuitry. This field induces a voltage across the two secondary induction coil windings 17 and 18 to form an air core transformer. This voltage is used to charge the battery pack 16. For circuit details, refer to FIG—which discloses the battery pack charging circuitry.

When the battery pack charging unit 15 is placed on top 1 of the instrumented baseball base, it is aligned so that its z-axis coincides with the z-axis 14 of the instrumented baseball base. This assures that the primary induction coil winding 10 in the battery pack charging unit 15 will be coaxial with the secondary induction coil windings 17 and 18 inside the instrumented baseball base to maximize the flux linkage between them and the efficiency of the wireless energy transfer.

The battery pack charging unit's 11 footprint is no larger than the footprint of the instrumented baseball base 1.

Referring to the Preferred Embodiments Specified in FIG. 37D and FIG. 37E and FIG. 37F, the Instrumented Baseball Plate Charging Station Unit Satisfies all of the Following Objectives:

It is an objective of the present invention that the instrumented baseball plate charging station unit is composed of an enclosure, primary induction coil winding, electronics (not shown). It is an objective of the present invention to wirelessly charge the battery pack inside the instrumented baseball home plate. It is an objective of the present invention that the same charging station unit be used to charge the battery packs in the instrumented baseball bases, instrumented baseball home plates, instrumented baseball pitcher's rubbers, and instrumented ice hockey pucks.

FIG. 37G

The physical elements disclosed in the charging station unit electronic circuits block diagram shown in FIG. 37G are identified as follows: 1 is the mains power electric plug. 2 is the rectifier bridge. 3 is the filter capacitor network 4 is the frequency converter. 5 is the impedance matching and switching network. 6 is the induction coil. 7 is the administrative data transceiver. 8 is the microprocessor. 9 is the visual human interface LCD panel. 10 is the human interface data entry panel keypad. 11 is the firmware image.

FIG. 37G is a block diagram showing the electronic circuits inside the charging station unit used to charge the battery pack inside the instrumented baseball bases and instrumented baseball home plate.

Referring to drawing FIG. 37G, in a preferred embodiment, the electronic circuits within the charging station unit specified in FIG. 37A and FIG. 37B and FIG. 37C, and FIG. 37D and FIG. 37E and FIG. 37F, are disclosed. The signals and data flows to and from the power supply and battery charging electronic circuits are specified. The electronic circuits inside the charging station unit are used to charge the battery pack inside both the instrumented baseball bases and the instrumented baseball home plate.

1 is an electric plug used to supply ac mains power to the baseball camera instrumentation package assembly charging station. When 1 is connected to a live electrical receptacle ac mains power is supplied to full-wave Rectifier Bridge 2. The output of 2 supplies pulsating dc current to filter capacitor network 3. After removing most of the ripple content, a current at approximately 200 volts dc from 3 is fed to the input of frequency converter 4. A high frequency standard of approximately 250 kHz is produced and power amplified by 4 and is subsequently applied to impedance matching and switching network 5. A modest amount of low voltage dc power to operate microprocessor 9 is also supplied by 4. Onboard non-volatile system read only memory within 9 contains a firmware image 11 that is loaded during boot-up time when mains power to the system is first applied. 11, via 9, manages the charging station's operation such that by a command from 9, 5 via Administrative data transceiver 8 will convey 250 kHz power produced by 4 to induction coil 6.

During the charging operation of an instrumented baseball base or instrumented baseball home plate containing the instrumentation package assembly, the instrumented baseball base or instrumented baseball home plate is placed beneath the charging station in such a way so as to permit 6 to convey power wirelessly and non-intrusively to the receiving coils located within the instrumented baseball base or instrumented baseball home plate equipped with an instrumentation package assembly, thus allowing it's batteries to be charged conveniently, reliably and safely.

Due to that fact that rechargeable batteries of the kind primarily used, by the baseball camera instrumentation package assembly, can be made otherwise inoperative by under and/or over-charging, 11 within 8 incorporates several failsafe parameters amongst it's programming structure.

While the charging station is in use, these failsafe parameters allow 8 to monitor an administrative and control data link containing failsafe status information established between 8 and the baseball camera instrumentation package assembly via 5, 6 and 7 respectively. Should and event occur where one of these failsafe parameters is breached, a timely shutdown of the system will follow, thus protecting the instrumentation package assembly's batteries from catastrophic destruction.

The administrative and control data link previously discussed operates within the same 250 kHz radio frequency spectrum as 4 by passing a frequency modulated signal containing the administrative and control data between the recharging station's coil 6 and those located inside the instrumentation package assembly. Whilst the system is in use 5 behaves as a mediator coordinating the complex transmit and receive functions in a manner similar to a pair of walkie-talkies in simplex mode.

In addition to failsafe parameters, the administrative and control data link also contains information such as battery charging status, remaining lifespan and overall condition as well as fault warnings from the instrumentation package assembly that may be of interest to the charging station operator. A visual human interface panel 9 is connected to 8 to display this information. At the discretion of the charging station operator, a human interface entry panel 10, also connected to 8, may be used to initialize, start, and stop the charging process. At anytime he or she may also perform interrogative diagnostic tests of the instrumentation package assembly such as battery condition monitoring, length of charge remaining, instrumentation package assembly serial number, recharge logging, etc.

Referring to the Preferred Embodiments Specified in FIG. 37G, the Instrumented Baseball Base and Instrumented Baseball Home Plate Charging Station Unit Satisfies all of the Following Objectives:

It is an objective of the present invention to wirelessly charge the battery pack inside the instrumented baseball bases and the instrumented baseball home plate. It is an objective of the present invention that the charging station unit be composed of a mains power electric plug, rectifier bridge, filter capacitor network, frequency converter, impedance matching and switching network, induction coil, administrative data transceiver, microprocessor, visual human interface LCD panel, human interface data entry panel keypad, and firmware image.

FIG. 38A and FIG. 38B

The detailed physical elements disclosed in the instrumented baseball base drawing shown in FIG. 38A and FIG. 38B are identified as follows: 1 is the central body of a four camera instrumentation package assembly. 2 is the typical instrumentation package assembly electronics. 3 corrugated bellows segment of an instrumentation package assembly element. 4 is an instrumentation package assembly element. 5 is a camera. 6 is a Type VIII buffer plate. 7 is the slightly conical small diameter end of the buffer plate 6. 8 is a camera lens. 9 is the optical and mechanical axis of the camera contained in the instrumentation package assembly element 4. 10 is an optical window. 11 is shock absorbing padding encapsulation material. 12 is a side cover of the instrumented baseball base. 13 is the battery pack. 14 is an induction coil for wirelessly charging the battery package. 15 corrugated bellows segment of an instrumentation package assembly element. 16 is an instrumentation package assembly element. 17 is a miniature SD/HD TV camera. 18 is a Type VIII buffer plate. 19 is the slightly conical small diameter end of the buffer plate 18. 20 is a camera lens. 21 is the optical and mechanical axis of the camera contained in the instrumentation package assembly element 37. 22 is an optical window. 23 is the corrugated bellows segment of an instrumentation package assembly element. 24 is an instrumentation package assembly element. 25 is a camera. 26 is a side cover of the instrumented baseball base. 27 is shock absorbing padding encapsulation material. 28 is a Type VIII buffer plate. 29 is the slightly conical small diameter end of the buffer plate 28. 30 is a camera lens. 31 is the optical and mechanical axis of the camera contained in the instrumentation package assembly element 24. 32 is an optical window. 33 is the threaded sleeve carrying the optical window. 34 is shock absorbing padding encapsulation material. 35 is a side cover of the instrumented baseball base. 36 corrugated bellows segment of an instrumentation package assembly element. 37 is an instrumentation package assembly element. 38 is a camera. 39 is a Type VIII buffer plate. 40 is the slightly conical small diameter end of the buffer plate 39. 41 is a camera lens. 42 is the optical and mechanical axis of the camera contained in the instrumentation package assembly element 37. 43 is an optical window. 44 is shock absorbing padding encapsulation material. 45 is a side cover of the instrumented baseball base. 46 is the z-axis of the instrumented baseball base. 47 is an induction coil for wirelessly charging the battery package. 48 is the bottom surface of the instrumented baseball base. 49 is the upper protective cover plate. 50 is the lower protective cover plate. 51 is the canvas top of the instrumented baseball base. 52 is the access lid heat sink on the bottom of the instrumentation package assembly. 53 is the radio antenna. 54 is a microphone. 55 is a microphone, 56 is a microphone. 57 is a microphone. 58 is an access opening in the bottom protective cover plate shield. 59 is a gas valve. 60 is a fiber optics cable/copper cable connector.

FIG. 38A is a top view of a instrumented baseball base.

FIG. 38B is a side view of a instrumented baseball base.

Referring to drawings FIG. 38A and FIG. 38B, in a preferred embodiment, an instrumented baseball base is disclosed. The instrumented baseball base is instrumented with an instrumentation package assembly that is mounted inside the baseball base. A baseball base which is instrumented with an instrumentation package assembly will be referred to as an instrumented baseball base. The present invention disclosed in FIG. 38A and FIG. 38B specifies such a baseball base.

In the preferred embodiment, the present invention contemplates an instrumented baseball base, which when stationed on any baseball playing field at any or all of the traditional $1^{st}$, $2^{nd}$ and $3^{rd}$ base locations, can wirelessly and autonomously televise baseball games under the command and control of the cameraman in the remote base station. The remote base station is disclosed in FIG. 59A and FIG. 59B and FIG. 60A and FIG. 60B and FIG. 61A and FIG. 61B. There is an advantage gained in the synergy of having each of the bases operating together and televising from multiple points on the baseball playing field. The cameraman can choose from the best of the overlapping shots that cover the essence of each unique play.

Referring to the preferred embodiments disclosed in FIG. 60A and FIG. 60B, and FIG. 61A and FIG. 61B the baseball stadium is also equipped with bi-directional multi-function fiber optic cable communication links to televise baseball games from sports paraphernalia i.e. $1^{st}$, $2^{nd}$, $3^{rd}$ bases to a remote base station. The instrumentation package assembly 1 has bi-directional multi-function fiber optic cable/copper cable connectivity with the remote base station via these cables. The fiber optics cable/copper cable, which is run beneath the ground of the baseball stadium playing field, enters the bottom of the instrumented baseball base through the base's access opening 58. The fiber optic/copper cable's connector is connected to its mating instrumentation package assembly 1 connector 60 in the bottom of the instrumented baseball bases. The instrumentation package assembly connector 60 is wired to the instrumentation package assembly electronics 2.

Referring to the drawings FIG. 38A and FIG. 38B, the instrumented baseball base employs a four camera instrumentation package assembly substantially identical to the instrumentation package assembly shown in FIG. 42E and FIG. 42F except that it uses the Type VIII buffer plate assemblies shown in FIG. 21Q and FIG. 21R and FIG. 21S rather than the Type VII buffer plate assemblies shown in FIG. 21N and FIG. 21O and FIG. 21P.

Each one of the four cameras 5, 17, 25 and 38 is housed in each of the four instrumentation package assembly elements 4, 16, 24 and 37 of which there are four instrumentation package assembly elements in the instrumentation package assembly. Details of the four instrumentation package assembly elements which are principal parts of the instrumentation package assembly are shown in FIG. 36A and FIG. 36B and FIG. 36C.

The preferred embodiment that specifies the RF radio transmission link is disclosed in FIG. 59A and FIG. 59B.

The baseball stadium fiber optic cable nm includes copper cabling which furnishes an alternate source of low voltage dc power to the instrumented baseball base.

The instrumented baseball base is instrumented with the instrumentation package assembly disclosed in FIG. 42E and FIG. 42F.

The instrumentation package assembly is shown mounted in a TYPE VII buffer plate assembly in FIG. 42C and FIG. 42D.

The only difference between the Type VIII buffer plate assemblies and the Type VII buffer plate assemblies shown in FIG. 42C and FIG. 42D is that the Type VIII buffer plates use a plane-parallel-flat optical window rather than the shell-like domed shaped optical window used in the Type VII buffer plate assemblies. The plane-parallel-flat optical window is more unobtrusive to the baseball players, and is less exposed to the hostile playing field environment, and is more dirt free.

It is understood that as the state of the art in TV camera technology advances, that there will be other better TV cameras that use other than CCD technology. The present invention will work equally well with them as they become available. Therefore, the present invention uses CCD TV cameras as an example of TV cameras that may be used simply because they are the best that today's technology offers, and is not confined only to their sole use in the future.

The instrumentation package assembly is comprised of a central hub 1 and four instrumentation package assembly elements 4, 16, 24 and 37 arranged around the hub 90 degrees apart in four quadrants and mechanically mounted by being plugged into the buffer plate assemblies 6, 18, 28 and 39. The central hub 1 serves as the main body of the instrumentation package assembly. The instrumentation package assembly has four microphones 56, 14, 54 and 55 and an antenna array 53 mounted above the top of the hub 1.

Each of the instrumentation package assembly elements 4, 16, 24 and 37 are identical. The instrumentation package assembly elements are disclosed in FIG. 36A and FIG. 36B and FIG. 36C.

The canvas covers of the instrumented baseball base and the conventional baseball base are identical, both having the same color, texture, size and shape. In venues where a synthetic canvas cover is used on the conventional baseball bases rather than canvas, the same cover will be used in the present invention in order to maintain their look-alike quality.

Beneath the cover of the instrumented baseball base is its interior. The interior of the instrumented baseball base is filled with a soft encapsulating material 11, 27, 34 and 44 like synthetic foam. The encapsulating material 11, 27, 34 and 44 serves to hold the instrumentation package assembly hub and instrumentation package assembly elements aligned in their places, and also acts as shock absorbing padding to the instrumentation package assembly hub and instrumentation package assembly elements which it encapsulates.

Referring to the disclosed instrumented baseball base shown in FIG. 38A and FIG. 38B, the instrumented baseball base has four instrumentation package assembly elements 16, 24, 37 and 4 mounted inside the base. Details of instrumentation package assembly are shown in FIG. 36A and FIG. 36B and FIG. 36C and FIG. 42C and FIG. 42D. Except for the optical windows, the external appearance of both the instrumented baseball base and the conventional baseball base are essentially identical, both having the same size and shape. The optical windows peer out from the sides of the base through clearance holes in the bases cover.

In FIG. 38A and FIG. 38B the instrumentation package assemblies' carry four CCD sensor arrayed cameras 5, 17, 25 and 38 and four microphones 54, 55, 56 and 57. The four cameras 5, 17, 25 and 38 have optical axes 9, 21, 31 and 42. The cameras look outward from the four sides of the instrumented baseball base along their respective optical axes 9, 21, 31 and 42. The instrumentation package assembly has four camera lenses 8, 20, 30 and 41. The cameraman can choose all four lenses to be identical to one another. The cameraman can choose some of the four lenses to be identical to one another. The cameraman can choose all of four lenses to be different from one another. The cameraman makes these choices based on the art, venue and the entertainment value of each choice to the TV viewing audience.

The four sides of the baseball base form a square. The plane of the square sits horizontally on the baseball playing field. The four optical axes of the four cameras are coplanar and are angularly displaced at 90 degree intervals from each other around the instrumented baseball base. Each of the optical axes is perpendicular to its respective side of the baseball base. Each of the four cameras is aligned within its individual instrumentation package assembly so that each of the cameras yields a wirelessly transmitted upright image. The instrumented baseball base is oriented in space so its z-axis is perpendicular to the baseball field and pointing skyward.

Each of the four instrumentation package assemblies is supported at its end by identical buffer plates. The buffer plates have been permanently attached, by bonding, to the inside of the instrumented baseball base in proximity to each of the sides of the base. The small outside diameter of the cylindrical ends of the buffer plates are made slightly conical. The slightly conical small diameter ends of each of the buffer plates are press fitted into clearance holes in each of the sides of the instrumented baseball base' shock absorbing padding and cover. Except for the optical windows, the outward appearance of both the instrumented baseball base and the conventional baseball base shown in FIG. 40 are essentially identical.

The cylindrical ends of the buffer plates are made slightly conical so as to facilitate their smooth entry into the clearance holes in the instrumented baseball base.

The conical cylindrical ends of the buffer plates are sealed and bonded to the shock absorbing padding around the circumference of these clearance holes with a permanent resilient bonding compound that is air-tight and water-tight. Inside the baseball base, the buffer plates are also sealed and bonded to the interior walls of the baseball base.

The four buffer plates that are mounted and bonded inside the baseball base are identical to one another. The mechanical axes of each of the bores of each of the buffer plates are perpendicular to their respective sides of the baseball base. The ends of the instrumentation package assemblies are inserted into their respective bores in the buffer plates, thereby aligning the instrumentation package assemblies' perpendicular to their respective sides of the baseball base.

The buffer plates act as bearings for the instrumentation package assemblies, and thereby restrict and restrain the motion of the instrumentation package assembly inside the instrumented baseball base. Besides functioning as bearings to support the instrumentation package assembly within the instrumented baseball base, the buffer plates provide hollow portals through which the cameras inside the instrumentation package assemblies may peer out at the baseball playing field.

Instrumented baseball bases whose outward appearance looks substantially the same as the conventional professional league baseball bases, the college league baseball bases, and the high school league baseball bases, meet the official requirements for these venues and are interchangeable with conventional bases in these venues.

The basic structure of the instrumented baseball base is constructed substantially in the same manner as the conventional professional league baseball base shown and specified in FIG. 40 unless otherwise specified elsewhere.

The optical windows are sealed to the small diameter cylindrical ends of the buffer plates. The seals are airtight and waterproof to protect the cameras, microphones and electronics within the instrumentation package assemblies.

The optical windows permit the cameras mounted inside the instrumented baseball base to look out through their respective windows onto the playing field during a game from each side of the instrumented baseball base, and be protected from hazards such as rain, dirt and physical impacts.

When a player is running toward a base, the camera on his side (the forward camera) can see where he is coming from, and as he is passing the base, the camera on that side (the rear camera) can see where he is going. From the vantage point of the forward camera, the viewing audience can see the strained player darting for the base. The viewing audience can see the player's feet as he attempts to slide into the base. The viewing audience can see close-up the opposing player's attempt to tag him with the ball. As the baseball is thrown to the instrumented baseball base, the viewing audience can see the receiving player reach down for it close to the instrumented baseball base. The camera's vantage point at the instrumented baseball base gives the audience a viewing angle of the game not seen before in the prior art. The instrumented baseball base cameras give the viewing audience unending contemporaneous front and rear shots that get across a sense of the action that prior art cameras looking on from outside the field cannot get across.

The optical windows are made strong to protect the cameras. The optical windows are hard coated by vapor deposition with materials such as MgFl or SiO2 to help prevent the outer-most window surfaces from being scratched during the game. The window material itself is chosen to be strong. It is made from hard optical glass such as barium lanthanum borate glasses, or hard optical plastic like acrylic or polycarbonate, both of which are scratch resistant.

The optical windows are made small to make them inconspicuous, and substantially preserve the instrumented baseball base's look-alike quality with the conventional baseball base, while still retaining sufficient clear aperture for the camera lenses to see events on the playing field in prevailing light. Typical optical windows range in size from about ⅛ inch to ⅜ inches in diameter. Besides their small size, the windows are made additionally inconspicuous by very lightly tinting them brown to match the coloration of the conventional baseball base canvas cover. The four holes in the sides of the instrumented baseball base, through which the optical windows peer, are made just large enough to prevent vignetting of the cameras field of view.

The optical windows are plane-parallel-flat and disposed one at either side of the instrumented baseball base on each of the buffer plates. The outer surfaces of the windows are spherical domed in shape and convex outward and shell-like domed shaped as is necessary to permit the cameras to see fields of view with extremely wide viewing angles approaching 90 degrees off the optical axis of the cameras. The window is a thin single element shell-like domed shaped lens made from low dispersion optical glass (or optical plastic) having substantially concentric spherical surfaces to minimize optical aberrations. Shell-like implies that the spherical surfaces of the optical windows are concentric. In applications where extremely wide viewing angles are not required, the optical window surfaces can be made flat and plane parallel.

The shell-like-domes shaped windows enable the cameras to use lenses that have extremely wide viewing angles approaching 90 degrees off the optical axis of the cameras without introducing bothersome optical aberrations and vignetting. The domed shell-like domed shaped shape of the windows also imparts increased physical strength to the windows.

For the instrumented baseball base, having its weight identical to the weight of a conventional baseball base within a narrow margin is not necessary because the base is immobile and anchored to the ground.

The instrumented baseball base's cover is substantially the same canvas material/or other material as used in conventional baseball bases. 51 is the top of the instrumented baseball base and is covered with the canvas cover. 51 is shown flat in FIG. 38A and FIG. 38B. In another preferred embodiment, the top 51 of the instrumented baseball base is rounded, tapered toward the edge and domed shaped as it is on many of the current baseball bases on baseball stadium playing fields.

The present invention contemplates the instrumented baseball base to be non-intrusive to the game. The instrumented baseball base is constructed to produce substantially no audible noise to the players. The only noise producing element in the instrumented baseball base's instrumentation package assembly is the camera lens. Changes in the optical power, optical focus, and f-number settings of the camera lens are accomplished mechanically. The mechanism used to adjust these settings produces sounds that are inaudible to the players who are outside the instrumented baseball base because of sound absorption, muffling, baffling and damping features designed into the instrumented baseball base.

The central body 1 of the four instrumentation package assemblies acts as a hub and radially connects all four of the instrumentation package assembly elements 4, 16, 24, and 37 together. Each of the four instrumentation package assembly elements 4, 16, 24, and 37 are identical to one another. The center of the hub is located at the intersection of the x-axis and the y-axis of the baseball base. Each instrumentation package assembly element 4, 16, 24, and 37 contains it own camera lens, camera, and supporting electronics 2 for example. The battery pack 11 supplies electrical power to the entire instrumentation package assembly and is housed in the center of 1. The central body of the instrumentation package assembly 1 is constructed symmetrically in each of its four quadrants. It is essentially a short cylinder, for example about one inch high, that resembles a can of tuna fish. It is made strong to resist being crushed. Material examples such as polycarbonates, ABS and fiber reinforced plastics are used in its construction. These materials are particularly suitable in that they do not block, absorb, or reflect radio waves that are transmitted or received by the instrumented package assembly.

Induction coil 14 is located on top of the central hub assembly. Induction coil 47 is located on the bottom of the central hub assembly. An external electrical induction coil is used to inductively couple power into induction coils 14 and 47 for the purpose of charging the battery pack 11. A block diagram showing the electrical battery charging circuit involving the induction coils and the battery pack is shown in FIG. 24. A source of electrical power which is external to the baseball base is inductively coupled into these induction coils 14 and 47 by laying the external induction coil flat on the top of the baseball base coaxially above coils 14 and 47. The induction coils 14 and 47 feed this power to the battery pack 13 in order to charge it.

The instrumentation package assembly electronics, for example 2, is identical in each of the four instrumentation package assembly elements 4, 16, 24, and 37. A block diagram of the electronics is shown in FIG. 36D and FIG. 36E.

The four corrugated bellows segments 3, 13, 21 and 30 of the instrumentation package assembly elements 4, 14, 22 and 31 act to connect their respective instrumentation package assembly elements to the central body of the instrumentation package assembly 1 which acts as their hub. The connections are sealed with o-rings (not shown) and are air-tight.

Cameras 5, 15, 23 and 32 are mounted in their respective instrumentation package assembly elements 4, 16, 24, and 37. In many venues the four cameras are chosen to be identical to each other. However, there are occasions when one or more of the four cameras may be chosen to be different from the others in order to accomplish their joint mission of maximizing the entertainment of the viewing audience. For example, the view of different baseball stadiums may be covered more optimally by using a special camera(s) on one or more of the sides of the baseball base. Since it is contemplated that there will be three instrumented baseball bases in use most of the time, for example at $1^{st}$, $2^{nd}$ and $3^{rd}$ bases, the cameraman can choreograph the playing field coverage and set up the cameras and their respective lens combinations like a symphony orchestra to maximize the entertainment and viewing pleasure of the on-looking television audience. The optical axes of the four cameras are coplanar and are arranged at ninety degree intervals to one another around the sides of the baseball base. This arrangement permits the four cameras to look out from the sides of the instrumented baseball bases and cover a field of view covering four quadrants of the playing field.

The buffer plates 8, 21, 24 and 36 are all Type VIII buffer plates and are shown in FIG. 21Q and FIG. 21R and FIG. 21S. The slightly conical small diameter end 7 of the buffer plate 6 is pressed into the bore of the side of the baseball base.

Camera lenses 8, 20, 30, and 41 look out thru their respective instrumentation package assembly elements 4, 16, 24, and 37; from their respective sides of the instrumented baseball base 12, 26, 35, and 45; through their respective optical windows 10, 22, 32, and 43; at objects along their respective lines of sight 9, 21, 31, and 42; and they image the objects onto their respective cameras 5, 15, 23 and 32.

The optical and mechanical axis 9, 21, 31, and 42 of the cameras 5, 15, 23 and 32 respectively, are coplanar and mutually perpendicular to each other, and look out perpendicularly from their respective four sides of the instrumented baseball base onto the playing field.

Optical windows 10, 22, 32, and 43 are plane-parallel and flat. There is one optical window attached to each of the four buffer plates 6, 18, 28, and 39 on each of the sides of the baseball base. These optical windows provide portals in the four buffer plates for the four cameras lenses 8, 20, 30, and 41 and their respective cameras 5, 15, 23 and 32 to see out onto the playing field from their respective sides 12, 26, 35, and 45 of the instrumented baseball base.

Shock absorbing padding 11, 27, 34 and 44 is located between the outer canvas cover of the instrumented baseball base and the buffer plates. Its purpose is to cushion the blows to the instrumented baseball base that would otherwise result in shock and vibration to the instrumentation package assembly and its contents. The padding 11, 27, 34 and 44 is encapsulation material which is injected into a square shaped mold containing the components of the instrumented baseball base. The encapsulation material seals the components from moisture and the environment. The outer covering of the baseball base completely covers the baseball base. It is on its four sides 12, 26, 35, and 45 and on its top 45 and its bottom 48. The outer cover is canvas (or its equivalent) and is identical to that used in conventional baseball bases. A conventional baseball base is shown in FIG. 40.

The threaded sleeve 33 carrying the optical window. 46 is the z-axis of the instrumented baseball base. It is normal to the top and bottom of the baseball base. It is orthogonal to the x and y axes of the baseball base.

In a preferred embodiment, the present invention contemplates the instrumented baseball base to be equipped with an instrumentation package assembly shown in FIG. 42C and FIG. 42D, that is mounted inside the instrumented baseball base shown in FIG. 38A and FIG. 38B, which is capable of wirelessly televising baseball games from its cameras and microphones contained therein.

Each of the four instrumentation package assembly elements contains all the electronics for wirelessly televising pictures and sounds. Each of the four instrumentation package assembly elements disclosed in FIG. 36A and FIG. 36B and FIG. 36C is joined at the center of the instrumentation package assembly by a central hub which constitutes the main body of the instrumentation package assembly. The central hub houses the battery pack which supplies electrical power to each of the instrumentation package assembly elements. The instrumentation package assemblies are like spokes on a wheel. The picture and sounds are taken directly by the instrumentation package assembly's cameras and microphones. The instrumentation package assembly is mounted within the instrumented baseball base that is in play on the baseball field. Each of the instrumentation package assembly elements wirelessly communicates the pictures and sounds from the instrumented baseball base to a antenna array relay junction located near the baseball playing field. The antenna array relay junction then relays the pictures and sounds to the remote base station for final processing and dissemination. The optical axes of the four cameras within the instrumentation package assembly are aligned to be coplanar with the instrumentation package assembly's x-y plane. Each camera is positioned respectively at the end of each of the four instrumentation package assembly elements and looks out through the instrumented baseball base's sides. The x-y plane of each instrumentation package assembly element is aligned normal to the z-axis of the instrumented baseball base and perpendicular to each of the instrumentation package assembly element's respective sides of the instrumented baseball base.

Each camera is positioned respectively at the end of each of the four instrumentation package assembly elements and looks out through the instrumented baseball base's sides.

The mechanical x-y plane of each instrumentation package assembly element is aligned normal to the mechanical z-axis of the instrumented baseball base and perpendicular to each of the instrumentation package assembly element's respective side of the instrumented baseball base. The instrumentation package assemblies are mounted inside the instrumented baseball base using four buffer plates that act as bearings for the instrumentation package assembly. There is one buffer plate supporting each end of each instrumentation package assembly element. The buffer plates are shown supporting the instrumentation package assembly in FIG. 21Q and FIG. 21R and FIG. 21S.

Each instrumentation package assembly element contains a miniature SD/HD TV camera 5, 17, 25 and 38 and four condenser microphone 54, 55, 56 and 57 and supporting electronics. The cameras, microphones and supporting electronics are housed together within the skins 4, 16, 24 and 37 of the instrumentation package assembly elements which is mounted inside the instrumented baseball base. Each one of the four TV cameras and four microphones are located at their respective sides of the instrumented baseball base. The TV cameras are aligned within the instrumentation package assembly so they yield upright images of the baseball field, each one looking out in a different quadrant from the instrumented baseball base. The condenser microphones are attached to the top interior wall of the instrumentation package assembly. The microphones hear any sounds produced by physical contact of the instrumented baseball base's cover with any external thing, including for example air currents felt on the cover from wind on the baseball field or by a player trampling on the instrumented baseball base. The sounds received from each of the microphones by the remote base station are processed using special software to produce surround sound which is broadcast to the TV viewing audience. Condenser microphones offer the best trade off today given their small size, weight, reliability and power consumption. As the state of the art changes and superior microphones become available, these newer microphone types will be employed and replace the condenser microphones. The instrumentation package assemblies' skin is made of polycarbonates, ABS and fiber reinforced plastics. Polycarbonates, ABS and fiber reinforced plastics are strong and are non-conductors of electricity. It is necessary to use a skin made of a non-conducting material so as to allow radio signals to radiate thru it from the antenna elements for the purpose of televising signals by wireless communications to and from the remote base station.

The instrumentation package assembly's network transceiver wirelessly transmits real-time pictures and sounds from the instrumented baseball base's cameras and microphones via duel parallel antenna array elements 53, also known as intentional radiators, to a remote base station. The duel parallel antenna array elements are mounted above the instrumentation package assembly.

In an alternative preferred embodiment, the duel parallel antenna array elements 53 shown in the instrumentation package assembly in FIG. 38 are replaced with a helix antenna (not shown) with similar dimensions wound on the inside diameter of each instrumentation package assembly element. This alternative preferred embodiment has an advantage in that the helix antennas are self contained within the body of each instrumentation package assembly element and therefore are better protected from physical damage.

The antenna array relay junction array shown in FIG. 59A and FIG. 59B is deployed in the baseball stadium and receives radio signals from the instrumented baseball base's antenna array elements 53 shown in FIG. 38A and FIG. 38B. Antenna array elements 53 are in quadrature to radiate radio signals to antenna array relay junction disclosed in FIG. 59A and FIG. 59B with sufficient gain so as to overcome RF noise and provide for a large enough gain bandwidth product to accommodate real-time SD/HD picture quality requirements. The instrumentation package assembly's network transceiver also provides a wireless means for the instrumented baseball base to receive command and control radio signals from the remote base station.

The instrumentation package assembly's battery pack 13 is wirelessly charged before and during games on an as needed basis, using the charging station unit shown in preferred embodiment shown in FIG. 37D and FIG. 37E and FIG. 37F. The charging station is placed on the top of the instrumented baseball base when it is charging the battery pack. Charging of the battery pack 13 is accomplished wirelessly by inductive coupling. The instrumented baseball base's two inductive pickup coils 14 and 47 act as the secondary windings on an air core transformer. Time varying magnetic flux is furnished to 14 and 47 by the primary windings of the charging station unit disclosed in FIG. 37D and FIG. 37E and FIG. 37F.

Each TV camera looks out in opposite directions perpendicular to its respective side of the instrumented baseball base. Each of the four microphones listens for sounds from the playing field from their respective sides of the f instrumented baseball base. The four condenser microphones enable the viewing audience to hear real-time contacts, impacts and shocks to the instrumented baseball base. Simultaneously live TV pictures are taken by each of the four TV cameras of their respective fields of view of the live action on the playing field.

A block diagram showing the detailed flow of electrical signals and data in the instrumentation package assembly is shown in the preferred embodiment given in FIG. 23 and FIG. 24.

In a preferred embodiment the present invention contemplates the instrumented football's battery pack being wirelessly charged by a charging station shown in FIG. 31.

The instrumentation package assembly elements have flexible corrugated bellows skin sections 3, 15, 23 and 36 and cylindrically smooth sections like 4, 16, 24 and 37. The length of each of the instrumentation package assembly elements is approximately ⅓ the length of a side of the instrumented baseball base.

The diameter of the instrumentation package assembly is kept to a minimum in order to minimize its footprint inside the instrumented baseball base. The dimension of the outside diameter of the corrugated skins 3, 15, 23 and 36 of the instrumentation package assembly elements is governed largely by the physical diagonal dimension of the largest components within the instrumentation package assembly, like the SD/HD camera's CCD sensor array and the battery.

The battery's charging coils 14 and 47 are wound on the outside diameter at both top and bottom of the central hub of the instrumentation package assembly and act electrically as a transformer's secondary winding. The coils are wound on the outside diameter of the instrumentation package assembly to keep any heat they may produce away from the contents of the instrumentation package assembly while the battery pack is being charged. The number of turns in each charging coil is made large enough to inductively couple a sufficient number of magnetic lines of flux from the primary coil of the battery charging station disclosed in FIG. 37D and FIG. 37E and FIG.

37F so as to charge the battery pack in a reasonably short time before games. When the charging station unit is placed on top of the instrumented baseball base, the charging coils 14 and 47 receive electrical energy inductively coupled from the primary coils of the charging station.

The lower coil 47 is wound on the outside of the access lid heat sink 52 on the bottom of the instrumentation package assembly 1. The access lid heat sink 52 is a circular plate. The access lid heat sink 52 can be removed in order to service the instrumentation package assembly 1. There is a circular opening 58 in the lower protective cover plate shield 50. The purpose of this opening is to allow a technician to reach up into the bottom of the instrumented baseball base through the opening 58 to remove the access lid heat sink 52, and service the instrumentation package assembly 1.

The access opening 58 in the lower protective cover shield 50 allows the access lid heat sink 52 to be reached from the bottom of the instrumented baseball base so the access lid heat sink 52 can be removed and replaced as needed.

The corrugated bellows sections 3, 15, 23 and 36 of the instrumentation package assembly's skin allow the four instrumentation package assembly elements 4, 16, 24 and 37 to flex, stretch and compress when the instrumented baseball base is impacted. This enables the four instrumentation package assembly elements to resist shock and vibration. Additionally, the corrugated section allows the instrumentation package assembly elements to act as a spring and compress or expand its length without damaging the contents of the instrumentation package assembly elements. When circumstances arise where the players tend to crush the instrumented baseball base, the instrumentation package assembly elements will compress or expand.

The corrugated bellows segments 3, 13, 21 and 30 also put longitudinal mechanical pressure on the instrumentation package assembly elements along their mechanical axes 9, 19, 27 and 36, thereby pushing them against their respective buffer plates 6, 16, 24 and 33 and maintaining contact between them despite shocks and vibrations.

Buffer plates disclosed in FIG. 21N and FIG. 21O and FIG. 21P and FIG. 21Q and FIG. 21R and FIG. 21S are cast or machined from a light-weight rigid plastic material like polycarbonates, ABS or fiber reinforced plastics in order to prop up the instrumented baseball base's cover to a pre-formed shape matching that of the conventional baseball base.

The four buffer plates are mounted and permanently encapsulated to the inside of the instrumented baseball base. The top and bottom of the instrumentation package assembly is covered with a sheet of polycarbonate, ABS or fiber reinforced plastic. The purpose of these sheets 49 and 50 is to protect the instrumentation package assembly from being crushed when a player steps on the instrumented baseball base. The square sheets 49 and 50 are separated and mechanically isolated from the buffer plates 6, 18, 28 and 39 with shock absorbing padding material 11 like Styrofoam or rubber encapsulating material.

In summary the buffer plates 6, 18, 28 and 39 are multipurposed. They provide a pre-formed surface against which the instrumented baseball base cover will conform. They absorb any shock to the sides of the instrumented baseball base's cover. They protect the instrumentation package assembly elements from becoming misaligned relative to the sides of the instrumented baseball base's portals which the cameras peer out of the instrumented baseball base. They provide bearing surfaces with which to mount the instrumentation package assembly elements.

The instrumentation package assembly is filled with a dry pressurized gas like nitrogen to prevent the entry of moisture or dirt. The seal between the optical windows and the buffer plates prevents the dry gas from leaking out of the instrumentation package assembly. A desiccant is disposed near the SD/HD lenses and optical windows to collect and prevent any moisture build-up.

A variety of different camera lens types, with different lens setting capability, can be used providing they are small in size. The auto iris setting permits the camera lens to automatically adjust for varying lighting conditions on the field. The auto focus setting permits the camera lens to adjust focus for varying distances of the players and action subjects on the field.

When a baseball is hit and a player is rounding the bases, the distance of a player from one base may be decreasing while the distance to another base may be increasing. Each camera can be independently and simultaneously commanded and controlled to auto focus on their respective players. One camera may be looking at the back of a player while the other camera may be looking at the front of the player. If the player slides into an instrumented baseball base, one of the base cameras will catch the slide up close. The instrumented baseball base's two microphones will capture all the action sounds. While the player is running, his pictures and sounds are wirelessly being transmitted from the instrumented baseball base to the remote base station for processing.

Each of the four instrumentation package assembly elements that contain the four cameras are attached at their lower ends via their corrugated bellows segments 3, 15, 23 and 36 to the instrumentation package assembly central hub 11. The connections are sealed with rubber o-rings (not shown). They are supported at their ends by buffer plates 6, 18, 28 and 39. The buffer plates 6, 18, 28 and 39 are permanently attached inside the instrumented baseball base by the encapsulating material which forms the shock absorbing padding 11, 27, 34 and 44 inside the instrumented baseball base. The small outside diameter of the cylindrical ends of the buffer plates 6, 18, 28 and 39 are fitted into the clearance holes in the canvas sides of the instrumented baseball base so that the cameras 5, 17, 25 and 38 may see out through their respective optical windows 10, 22, 32 and 43.

The optical windows 10, 22, 32 and 43 are plane-parallel and flat. The optical windows are attached to the cylindrical ends of the buffer plates 6, 18, 28 and 39 respectively. The buffer plates 6, 18, 28 and 39 provide portals through which the cameras see out onto the playing field through their respective optical windows 10, 22, 32 and 43. Although flat optical windows are shown in this embodiment, spherically dome shaped windows can be used in other preferred embodiments.

Shock absorbing padding 11, 27, 34 and 44 formed by the cured Styrofoam or rubber encapsulating material, is located between the outermost covering of the instrumented baseball base and all the contents of the instrumented baseball base. Its purpose is to cushion the blows to the instrumented baseball base that would otherwise result in shock and vibration to the main body of the instrumentation package assembly 1, and its instrumentation package assembly element 4, 16, 24 and 37.

The four sides of the instrumented baseball base form a square. The plane of the square sits horizontally on the baseball playing field. The four optical axes 9, 21, 31 and 42 of the four cameras 5, 17, 25 and 38 are coplanar and are angularly displaced at 90 degree intervals from each other around the instrumented baseball base. Each of the optical axes 9, 21, 31 and 42 is perpendicular to its respective side of the instrumented baseball base. Each of the four cameras 5, 17, 25 and 38 is aligned within its individual instrumentation package assembly element 4, 16, 24 and 37 so that each of the cameras 5, 17, 25 and 38 yields a wirelessly transmitted upright image. The instrumented baseball base is oriented in space so its z-axis is perpendicular to the baseball playing field and pointing skyward.

Each of the four instrumentation package assembly elements 4, 16, 24 and 37 is supported at its end by an identical buffer plate 6, 18, 28 and 39. The buffer plates 6, 18, 28 and 39 have been permanently encapsulated inside the instrumented baseball base in proximity to each of the sides 12, 26, 35 and 45 of the instrumented baseball base. The small outside diameter of the cylindrical ends of the buffer plates 6, 18, 28 and 39 are made slightly conical. The slightly conical small diameter ends of each of the buffer plates 6, 18, 28 and 39 are encapsulated into each of the sides 12, 26, 35 and 45 of the instrumented baseball base' shock absorbing padding 11, 27, 34 and 44 and cover.

In many venues, the four cameras are chosen by the cameraman to be identical to each other. However, there are occasions when one or more of the four cameras may be chosen to be different from the others in order to accomplish their joint mission of maximizing the entertainment of the viewing audience. For example, the view of different baseball stadiums may be covered more optimally by using special cameras and special camera lenses on one or more of the sides of the instrumented baseball base. Since it is contemplated that there will be three instrumented baseball bases in use most of the time, for example at $1^{st}$, $2^{nd}$ and $3^{rd}$ bases, the cameraman can choreograph the playing field coverage and set up the cameras and their respective lens combinations like a symphony orchestra to maximize the entertainment and viewing pleasure of the on-looking television audience. The optical axes of the four cameras are coplanar and are arranged at ninety degree intervals to one another around the sides of the baseball base. This arrangement permits the four cameras to look out from the sides of the baseball base and cover a field of view covering four quadrants of the playing field.

In another preferred embodiment (not shown in a separate drawing), the shape of the top 51 of the instrumented baseball base is rounded downward and domed shaped as it is on many of the current baseball bases on baseball stadium playing fields. For example, some colleges use honeycombed solid plastic bases that are rounded and domed shaped and tapered. The upper protective cover plate 49 just beneath the top of the base is also rounded downward and domed shaped. Domed shaped protective cover plates shown in FIG. 55A and FIG. 55B and FIG. 55C, and FIG. 56A and FIG. 56B and FIG. 56C, FIG. 57A and FIG. 57B and FIG. 57C, and FIG. 58A and FIG. 58B and FIG. 58C are used. The space between the top of the base and the top of the upper protective cover plate is filled with encapsulation padding. The upper protective cover plate 49 is shaped congruent with the top 51.

Beneath the cover of the instrumented baseball base is its interior. The interior of the instrumented baseball base is filled with a soft encapsulating material 11, 27, 34 and 44 like synthetic foam. The encapsulating material 11, 27, 34 and 44 serves to hold the instrumentation package assembly hub and instrumentation package assembly elements aligned in their places, and also acts as shock absorbing padding to the instrumentation package assembly hub and instrumentation package assembly elements which it encapsulates.

The cameraman, in the remote base station, software selects either the wireless mode of communication, and/or the fiber optics/copper cable mode of communication between each of the instrumented baseball base and the remote base station. The cameraman can use whichever equipment (antenna array relay junction or fiber optics cable/copper cable) is installed in the stadium/arena with which to command and control his choice and communicate it to the instrumented baseball base on the stadium playing field. These choices are also physically switch selectable by the cameraman with his access through the opening in the bottom of the instrumented baseball base. Refer to FIG. 59A and FIG. 59B, and FIG. 60A and FIG. 60B, and FIG. 61A and FIG. 61B, and FIG. 64A and FIG. 64B and FIG. 64C for disclosures regarding the remote base station and the antenna array relay junction.

The cameraman selects items from a software menu of control commands that go to the network transceiver at the remote base station that are subsequently transmitted to the instrumented sports paraphernalia for the purpose of adjusting various system initializations, operating parameters, radio frequency, polling system status data such as battery condition, and initiating remote mechanical adjustments such as camera focus, optical zoom, iris and movement to the cameras' field of view, etc over the selected bi-directional communications link i.e. wireless radio, fiber optics or copper cable connectivity being used within the particular sports stadium.

These commands, when intercepted by the network transceiver within the instrumented baseball base are applied to its microprocessor, which then in turn upon executing the instructions stored within the contents of its firmware applies a pulse coded control signal via the power and control interconnect interface inside the instrumentation package to the corresponding electronics i.e. the mechanical actuators that provides optical focus and/or zoom adjustment of the cameras and microphone gain and selection, etc as desired by the cameraman and/or special software running on the computer at the remote base station. The power and control interconnect interface as shown in FIG. 36D (item 21), which is represented by dotted lines, consists of the electrical control wiring to and from the electronic components of the instrumented baseball base that are being controlled.

Referring to the Preferred Embodiments Specified in FIG. 38A and FIG. 38B, the Instrumented Baseball Base Satisfies all of the Following Objectives:

It is an objective of the present invention that the instrumented baseball base be composed of an four camera instrumentation package assembly, four buffer plate assemblies, encapsulation shock-proofing padding, upper protective cover plate, and lower protective cover plate. It is an objective of the present invention that the instrumented baseball base has a top, and an upper protective cover plate, that are both flat and rounded downward near their edges and where the upper protective cover plate is spaced just beneath the top of the base. It is an objective of the present invention that the instrumented baseball base has a top, and an upper protective cover plate, that is both congruent and rounded downward and domed shaped where the upper protective cover plate is spaced just beneath the top of the base. It is an objective of the present invention to take pictures from the instrumented baseball base with extremely wide viewing angles. It is an objective of the present invention to make the weight and center of gravity location of the instrumented base the same as the conventional bases. It is an objective of the present invention to fill the volume of the instrumented baseball base beneath its cover in its interior with a soft encapsulating material like synthetic foam to hold all the contents of the instrumented baseball base aligned in their places, and act as a shock absorbing padding for the instrumentation package assembly hub, instrumentation package assembly elements, buffer plate assemblies, upper protective cover plate, and lower protective cover plate. It is an objective of the present invention to enable the cameraman in the remote base station to software select either the wireless mode of communication, and/or the fiber optics/copper cable mode of communication between the instrumented baseball bases and the remote base station by sending a control signal to the baseball base. It is an objective of the present invention to enable the cameraman to select either the wireless mode of communication, and/or the fiber optics/copper cable mode of communication between the instrumented baseball bases and the remote base station by physically setting a switch in the bottom of the instrumented baseball base with access through the bottom of the instrumented baseball base.

FIG. 39A and FIG. 39B

The detailed physical elements disclosed in the instrumented baseball base drawings shown in FIG. 39A and FIG. 39B are identified as follows: 1 is the optical and mechanical axis of the camera 69. 2 is an induction coil for charging the battery pack. 3 is the mechanical axis of symmetry of the Type X buffer plate. 4 is the small cylindrical outside diameter end of the buffer plate 9. 5 is the optical and mechanical axis of the camera 11. 6 is the plane-parallel-flat optical window mounted on and sealed to the small cylindrical diameter end of the buffer plate. 7 is the small cylindrical outside diameter end of the buffer plate. 8 is the camera lens for camera 11. 9 is the body of the Type X buffer plate. 10 is the side of the instrumented baseball base. 11 is a camera paired for 3-D with camera 69. 12 is the cylindrical skin of the instrumentation package assembly element containing camera 11. 13 is the corrugated bellows segment of an instrumentation package assembly element. 14 is the side of the instrumented baseball base. 15 is the central body of the instrumentation package assembly. 16 is the corrugated bellows segment of an instrumentation package assembly element. 17 is the camera. 18 is the camera lens. 19 is the shock-proofing baseball base padding. 20 is the small cylindrical outside diameter end of the buffer plate 27. 21 is the optical and mechanical axis of the camera 17. 22 is plane-parallel-flat optical window mounted on and sealed to the small cylindrical diameter end of the buffer plat. 23 is the small cylindrical outside diameter end of the buffer plate. 24 is the optical and mechanical axis of the camera 26. 25 is the camera lens of camera 26. 26 is a camera paired for 3-D with camera 17. 27 is the body of the Type X buffer plate. 28 is the corrugated bellows segment of an instrumentation package assembly element. 29 is the central body of the instrumentation package assembly. 30 is the corrugated bellows segment of an instrumentation package assembly element. 31 is the shock-proofing baseball base padding encapsulation material. 32 is the body of the Type X buffer plate. 33 is a camera paired for 3-D with camera 43. 34 is the camera lens for camera 33. 35 is the optical and mechanical axis of the camera 33. 36 is the plane-parallel-flat optical window mounted on and sealed to the small cylindrical diameter end of the buffer plate. 37 is the small cylindrical outside diameter end of the buffer plate 32. 38 is the mechanical axis of symmetry of the Type X buffer plate. 39 is the small cylindrical outside diameter end of the buffer plate. 40 is plane-parallel-flat optical window mounted on and sealed to the small cylindrical diameter end of the buffer plate. 41 is the optical and mechanical axis of the camera 43. 42 is the camera lens of camera 43. 43 is a camera paired for 3-D with camera 33. 44 is the corrugated bellows segment of an instrumentation package assembly element. 45 is the shock-proofing baseball base padding encapsulation material. 46 is the central body of the instrumentation package assembly. 47 is the corrugated bellows segment of an instrumentation package assembly element. 48 is a camera paired for 3-D with camera 61. 49 is the body of the Type X buffer plate. 50 is the small cylindrical outside diameter end of the buffer plate 49. 51 is the plane-parallel-flat optical window mounted on and sealed to the small cylindrical diameter end of the buffer plate. 52 is the optical and mechanical axis of the camera 48. 53 is the camera lens for camera 48. 54 is the mechanical axis of symmetry of the Type X buffer plate. 55 is the central body of the instrumentation package assembly. 56 is the small cylindrical outside diameter end of the buffer plate. 57 is the optical and mechanical axis of the camera 61. 58 is plane-parallel-flat optical window mounted on and sealed to the small cylindrical diameter end of the buffer plate. 59 is the camera lens of camera 61. 60 is the side of the baseball base. 61 is a camera paired for 3-D with camera 48. 62 is the cylindrical segment of the instrumentation package assembly. 63 is the corrugated bellows segment of an instrumentation package assembly element. 64 is the central body of the instrumentation package assembly. 65 is an induction coil for charging the battery pack. 66 is the corrugated bellows segment of an instrumentation package assembly element. 67 is the cylindrical skin of the camera 69 instrumentation package assembly. 68 is the shock-proofing baseball base padding. 69 is a camera paired for 3-D with camera 11. 70 is the camera lens. 71 is the plane-parallel-flat optical window mounted on and sealed to the small cylindrical diameter end of the buffer plate. 72 is the plane-parallel-flat optical window mounted on and sealed to the small cylindrical diameter end of the buffer plate. 73 is a side of the instrumented baseball base. 74 is the intersection of the y and z axes of symmetry of the instrumented baseball base. 75 is the optical and mechanical z-axis of camera 33. 76 is an induction coil for charging the battery pack. 77 is the z-axis of symmetry of the buffer plate 32. 78 is the z-axis of camera 43. 79 is the corner of the upper protective cover plate shield. 80 is the lower protective cover plate shield. 81 is the upper protective cover plate shield. 82 is the canvas top of the instrumented baseball base. 83 is the access lid heat sink on the bottom of the instrumentation package assembly. 84 is the radio antenna. 85 is a microphone. 86 is a microphone. 87 is a microphone. 88 is a microphone. 89 is the access opening in the bottom protective cover plate shield. 90 is a gas valve. 91 is a fiber optics cable/copper cable connector.

FIG. 39A is the top view of an eight camera instrumented baseball base.

FIG. 39B is the side view of an eight camera instrumented baseball base.

Referring to drawings FIG. 39A and FIG. 39B, in a preferred embodiment, an instrumented baseball base is disclosed. The instrumented baseball base is instrumented with an instrumentation package assembly that is mounted inside the baseball base. A baseball base which is instrumented with an instrumentation package assembly will be referred to as an instrumented baseball base. The present invention disclosed in FIG. 39A and FIG. 39B specifies such a baseball base.

In the preferred embodiment, the present invention contemplates an instrumented baseball base, which when stationed on any baseball playing field at any or all of the traditional $1^{st}$, $2^{nd}$ and $3^{rd}$ base locations can wirelessly and autonomously televise baseball games under the command and control of the remote base station. The remote base station is disclosed in FIG. 59A and FIG. 59B and FIG. 60A and FIG. 60B and FIG. 61A and FIG. 61B.

Referring to the preferred embodiments disclosed in FIG. 60A and FIG. 60B, and FIG. 61A and FIG. 61B the baseball stadium is also equipped with bi-directional multi-function fiber optic cable communication links to televise baseball games from sports paraphernalia i.e. $1^{st}$, $2^{nd}$, $3^{rd}$ bases to a remote base station. The instrumentation package assembly has bi-directional multi-function fiber optic cable/copper cable connectivity with the remote base station via these cables. The fiber optics cable/copper cable, which is run beneath the ground of the baseball stadium playing field, enters the bottom of the instrumented baseball base through the base's access opening 89. The fiber optic/copper cable's connector is connected to its mating instrumentation package assembly connector 91 in the bottom of the instrumented baseball bases. The instrumentation package assembly connector 91 is wired to the instrumentation package assembly electronics.

In a preferred embodiment shown in FIG. 39A and FIG. 39B, an instrumented baseball base is disclosed. The instrumented baseball base meets all of the preceding objectives.

In a preferred embodiment, the present invention contemplates the instrumented baseball base to be equipped with an instrumentation package assembly shown in FIG. 43E and FIG. 43F, that is mounted inside the instrumented baseball base, which wirelessly televises baseball games in 3-D from each of its four 3-D stereo camera pairs and its two microphones. There is an advantage gained in the synergy of having each of the instrumented baseball bases operating together and televising in 3-D from multiple points on the baseball playing field. The cameraman can choose from the best of the overlapping shots that cover the essence of each unique play. The present invention has the advantage over the preferred embodiment disclosed in FIG. 38A and FIG. 38B because 3-D offers more excitement to the audience and a greater feeling of being there on the baseball playing field with the players than 2-D does.

In a preferred embodiment, the present invention contemplates the instrumented baseball's base's battery pack being wirelessly charged by a charging station.

The instrumented baseball base employs an eight camera instrumentation package assembly substantially identical to the instrumentation package assembly shown in FIG. 43C and FIG. 43D except that it uses four Type X buffer plate assemblies instead, rather than the four Type IX buffer plate assemblies disclosed in FIG. 43C and FIG. 43D.

Each one of the eight cameras 69, 11, 17, 26, 33, 43, 48 and 61 is housed in each of the eight instrumentation package assembly elements 67, 12, 16, 28, 30, 44, 47 and 62 of which there are eight instrumentation package assembly elements in the instrumentation package assembly. Details of each of the eight instrumentation package assembly elements which are principal parts of the instrumentation package assembly are shown in FIG. 36A and FIG. 36B and FIG. 36C.

The preferred embodiment specifying the radio transmission link is disclosed in FIG. 59A and FIG. 59B.

The instrumented baseball base is instrumented with the instrumentation package assembly disclosed in FIG. 43E and FIG. 43F.

The instrumentation package assembly is shown mounted in a TYPE VII buffer plate assembly in FIG. 43C and FIG. 43D.

The Type IX buffer plate assemblies are disclosed in FIG. 21T and FIG. 21U and FIG. 21V.

The Type X buffer plate assemblies are disclosed in FIG. 21W and FIG. 21X and FIG. 21Y.

The only difference between the Type X buffer plate assembly used in the present preferred embodiment, and the Type IX buffer plate assembly used in FIG. 43C and FIG. 43D, is that the Type X buffer plates use a plane-parallel-flat shaped optical windows rather than the shell-like-domed shaped optical windows used in the Type IX buffer plate assemblies. The plane-parallel-flat optical window is more unobtrusive to the baseball players; and is less exposed to the hostile playing field environment, and is more dirt free.

It is understood that as the state of the art in TV camera technology advances, that there will be other better TV cameras that use other than CCD technology. The present invention will work equally well with them as they become available. Therefore, the present invention uses CCD TV cameras as an example of TV cameras that may be used simply because they are the best that today's technology offers, and is not confined only to their sole use in the future.

The instrumentation package assembly is comprised of a central hub 55 and eight instrumentation package assembly elements 66, 13, 16, 28, 30, 44, 47, and 63 arranged around the hub 90 degrees apart in four quadrants and mechanically mounted by being plugged into the buffer plate assemblies 9, 27, 32 and 49. The central hub 55 serves as the main body of the instrumentation package assembly. The instrumentation package assembly has four microphones 88, 85, 86 and 87 and an antenna array 84 mounted above the top of the hub 55.

Each of the instrumentation package assembly elements 66, 13, 16, 28, 30, 44, 47 and 63 are identical. The instrumentation package assembly elements are disclosed in FIG. 36A and FIG. 36B and FIG. 36C.

The canvas covers of the instrumented baseball base and the conventional baseball base are identical, both having the same color, texture, size and shape. In venues where a synthetic canvas cover is used on the conventional baseball bases rather than canvas, the same cover will be used in the present invention in order to maintain their look-alike quality. The optical windows peer out from the sides of the base through clearance holes in the bases cover.

Beneath the cover of the instrumented baseball base is its interior. The interior of the instrumented baseball base is filled with a soft encapsulating material 19, 31, 45 and 68 like synthetic foam. The encapsulating material 19, 31, 45 and 68 serves to hold the instrumentation package assembly hub and instrumentation package assembly elements aligned in their places, and also acts as shock absorbing padding to the instrumentation package assembly hub and instrumentation package assembly elements which it encapsulates. The encapsulating material is injected into a square mold around the components inside the instrumented baseball base.

Referring to the disclosed instrumented baseball base shown in FIG. 39A and FIG. 39B, the instrumented baseball base has an instrumentation package assembly 55 mounted inside the instrumented baseball base. Details of instrumentation package assembly 55 are disclosed in FIG. 43C and FIG. 43D.

Eight optical windows 71, 6, 72, 22, 36, 40, 51 and 58 peer though the four sides 10, 14, 73 and 50 of the instrumented baseball base so the eight SD/HD cameras 69, 11, 17, 26, 33, 43, 48 and 61 within the instrumented baseball base can see through them onto the baseball playing field. The instrumented baseball base is covered with canvas similar to the covering on conventional baseball bases. The eight holes in the sides of the instrumented baseball base, through which the optical windows peer, are made just large enough to prevent vignetting of the cameras field of view.

The instrumented baseball base's cover is substantially the same canvas material/or other synthetic material as used in conventional baseball bases. 82 is the top of the instrumented baseball base and is covered with the canvas cover. 82 is shown flat in FIG. 39A and FIG. 39B. In another preferred embodiment, the top 82 of the instrumented baseball base is rounded and domed shaped as it is on many of the current baseball bases on baseball stadium playing fields.

The canvas covers of the instrumented baseball base and the conventional baseball base are identical, both having the same color, texture, size and shape. In venues where a synthetic canvas cover is used on the conventional baseball bases rather than canvas, the same cover will be used in the present invention in order to maintain their look-alike quality.

All the contents of the instrumented baseball base are encapsulated inside it beneath its canvas cover. The encapsulation material fills the voids between the outer canvas cover of the instrumented baseball base and its physical contents.

Shock absorbing padding encapsulation material 31, 45, 68 and 19 is located throughout the instrumented baseball base between the canvas covering and the buffer plates and all of the contents of the instrumented baseball base. Shock absorbing padding, formed by the cured encapsulating material, is located between the outer canvas cover of the instrumented baseball base and the buffer plates. The purpose of the shock absorbing encapsulation padding material 68, 19, 31, and 45 is to cushion the blows to the instrumented baseball base that would otherwise result in shock and vibration damage to the instrumentation package assembly and its contents. Examples of encapsulation materials are Styrofoam and rubber. These materials not only cushion the blows, but are transparent to the radio waves used to televise the baseball games from the instrumentation package assembly contained inside the instrumented baseball base, and protect the instrumentation package assembly from moisture and the environment.

Referring to the disclosed instrumented baseball base shown in FIG. 39A and FIG. 39B, the instrumentation package assembly has eight instrumentation package assembly elements 66, 13, 16, 28, 30, 44, 47 and 63 which are joined at the main body 55 which is the central hub of the instrumentation package assembly. Details of instrumentation package assembly 55 are shown in FIG. 43C and FIG. 43D. Details of individual instrumentation package assembly elements are shown in FIG. 36A and FIG. 36B and FIG. 38C.

The center of the hub of the main body 55 of the instrumentation package assembly is located at the intersection of the x-axis 54 and the y-axis 3 of the instrumented baseball base. Each instrumentation package assembly element 67, 12, 16, 28, 30, 44, 47 and 62 contains its own camera lens, camera, and supporting electronics. The battery pack 4 supplies electrical power to the entire instrumentation package assembly and is housed in the center of 55. The main body 55 of the instrumentation package assembly is constructed symmetrically in each of its four quadrants. It is essentially a short cylinder, for example about one inch or more high, which resembles a can of tuna fish. It is made strong to resist being crushed. Materials like polycarbonates, ABS and fiber reinforced plastics are used in its construction.

The eight instrumentation package assembly elements are arranged in pairs. There are four pairs of instrumentation package assembly elements. Each pair looks out onto the baseball field from its side of the baseball base, for example 66 and 13. Each instrumentation package assembly element pair acts as a 3-D stereo pair. Each member of the 3-D stereo pair has the identical camera and lens combination in order to deliver a 3-dimension format. For example, the instrumentation package assembly element pair 66 and 13 use two identical lenses 70 and 8, and use two identical cameras 69 and 11 to make up their stereo camera pair. Each pair of instrumentation package assembly elements is part of a Type X buffer plate assembly shown in FIG. 21W and FIG. 21X and FIG. 21Y. There are four buffer plates 9, 27, 32 and 49. The optical axes, for example 1 and 5, of each camera in a stereo camera pair are parallel to one another Each of the four 3-D stereo camera pairs looks out perpendicularly through their respective side of the instrumented baseball base. Each of the two microphones listens for sounds from the playing field from their respective sides of the instrumented baseball base. The two condenser microphones enable the viewing audience to hear real-time contacts, impacts and shocks to the instrumented baseball base. Simultaneously live 3-D TV pictures are taken by each of the four 3-D stereo camera pairs of their respective fields of view of the live action on the playing field.

The outer canvas covering of the instrumented baseball base completely covers the instrumented baseball base. The outer canvas covering is on the four sides 10, 14, 73, and 60 and on the top 80 and bottom 79 of the instrumented baseball base. The canvas outer cover is identical to that used in conventional baseball bases. A conventional baseball base is shown in FIG. 40.

The canvas cover's of both the instrumented baseball base and the conventional baseball base are identical canvas material, both having the same size, texture, color and shape. The canvas cover covers the top 80 and bottom 79 and all four sides of the instrumented baseball base. There are two holes on the canvas cover on each of the four sides 10, 14, 73 and 60 of the instrumented baseball base. An optical window 71, 6, 72, 22, 36, 40, 51 and 58 peers through each hole in the instrumented baseball base's canvas cover and is flush with the canvas of each hole. Except for the eight holes in its four sides 10, 14, 73 and 60, you cannot tell the instrumented baseball base apart from the conventional baseball base referenced in FIG. 40.

Except for the eight holes in the canvas cover for the optical windows 71, 6, 72, 22, 36, 40, 51 and 58, the canvas cover of the instrumented baseball base shown in FIG. 39 is essentially made identical to that of the conventional baseball base shown in FIG. 40.

The eight optical windows permit the eight cameras mounted inside the instrumented baseball base to look out through their respective optical windows onto the playing field during a game from each side of the instrumented baseball base, and be protected from hazards such as rain, dirt and physical impacts.

The optical windows are made small to make them inconspicuous, and substantially preserve the instrumented football's look-alike quality with the conventional football, while still retaining sufficient clear aperture for the camera lenses to see events on the playing field in prevailing light. Typical optical windows range in size from about ⅛ inch to ⅜ inches in diameter. Besides their small size, the windows are made additionally inconspicuous by very lightly tinting them brown to match the tan coloration of the conventional baseball base canvas cover.

The eight optical windows 71, 6, 72, 22, 36, 40, 51 and 58 are plane-parallel and flat and disposed two on each side of the instrumented baseball base. There are two optical windows attached to each of the four buffer plates. These optical windows 71, 6, 72, 22, 36, 40, 51 and 58 provide portals in the four buffer plates 6, 18, 28, 38 for the eight lenses 70, 8, 18, 25, 34, 42, 53 and 59 of the four stereo camera pairs 69, 11 and 17, 26 and 33, 43 and 48, 61 respectively to see out onto the playing field from their respective sides of the instrumented baseball base. In an alternate preferred embodiment, the optical windows are spherical domes in shape rather than plane-parallel-flat.

The eight optical windows are sealed to the small diameter cylindrical ends of the four buffer plates. The seals are airtight and waterproof to protect the cameras, microphones and electronics within the instrumentation package assemblies.

The eight optical windows are made strong to protect the cameras. The optical windows are hard coated by vapor deposition with materials such as MgFl or SiO2 to help prevent the outer-most window surfaces from being scratched during the game. The window material itself is chosen to be strong. It is made from hard optical glass such as barium lanthanum borate glasses, or hard optical plastic like acrylic or polycarbonate, both of which are scratch resistant.

The instrumented baseball base's outward appearance looks substantially the same as the conventional professional league base and the conventional college league baseball base, and the conventional high school league baseball base; and it meets the official requirements for these venues, and is interchangeable with them in these venues.

The present invention contemplates the instrumented baseball base to be non-intrusive to the game. Besides its look-alike quality to the conventional professional league bases et al, the instrumented baseball base is constructed to produce substantially no audible noise to the players. The only noise producing element in the instrumented baseball base's instrumentation package assembly is the camera lens. Changes in the optical power, optical focus, and f-number settings of the camera lens are accomplished mechanically. The mechanism used to adjust these settings produces sounds that are inaudible to the players who are outside the instrumented baseball base because of sound absorption, muffling, baffling and damping features designed into the instrumented baseball base.

The basic structure of the instrumented baseball base is constructed substantially in the same manner as the conventional professional league baseball base shown and specified in FIG. 40 unless otherwise specified elsewhere.

The z-axis of the instrumented baseball base is normal to the top and bottom of the instrumented baseball base. It is orthogonal to the x and y axes, 54 and 3 respectively, of the instrumented baseball base.

The location of the center of gravity of both the instrumented baseball base and the conventional baseball base are both in substantially the same place. The center of gravity for both is at the center of symmetry at the intersection of the x, y and z axes, i.e. 54, 3, and 77.

The four sides 10, 14, 73 and 60 of the instrumented baseball base form a square. The plane of the square sits horizontally on the baseball playing field. The eight optical axes 1, 5 and 21, 24 and 35, 41 and 52, 57 of the four 3-D stereo camera pairs are coplanar. The four 3-D stereo camera pairs are angularly displaced at 90 degree intervals from each other around the instrumented baseball base. Each of the optical axes of each camera is perpendicular to its respective side of the instrumented baseball base. Each of the eight cameras is aligned within its individual instrumentation package assembly so that each of the cameras yields a wirelessly transmitted upright image. Each of the two cameras that make up one of the four 3-D stereo camera pairs is aligned to each other inside their instrumentation package assembly elements so that their SD/HD letter box 3-D formats are aligned together. The instrumented baseball base is oriented in space so its z-axis is perpendicular to the baseball playing field and pointing skyward.

In the preferred embodiment, details of the instrumentation package assembly are shown in FIG. 43C and FIG. 43D. Four 3-D stereo camera pairs 47, 9 and 14, 20 and 25, 31 and 35, 43 and two microphones are housed within the instrumentation package assembly.

In FIG. 39A and FIG. 39B the instrumentation package assembly 55 carries eight CCD sensor arrayed SD/HD cameras 69, 11, 17, 26, 33, 43, 48 and 61 and four microphones 85, 86, 87 and 88. The eight cameras 69, 11, 17, 26, 33, 43, 48 and 61 have optical axes 1, 5, 21, 24, 35, 41, 52 and 57. The cameras 69, 11, 17, 26, 33, 43, 48 and 61 look outward from the four sides 10, 14, 73 and 60 of the instrumented baseball base along their respective optical axes 1, 5, 21, 24, 35, 41, 52 and 57. The eight cameras are arranged into four 3-D stereo camera pairs 69, 11 and 17, 26 and 33, 43, 48, 61 respectively with one 3-D stereo camera pair to a side 10, 14, 73 and 60 respectively.

The instrumentation package assembly electronics, for example 2, is identical in each of the eight instrumentation package assembly elements 66, 13, 16, 28, 30, 44, 47 and 63. Each of the eight instrumentation package assembly elements are identical to one another. A block diagram of the electronics in each of the eight instrumentation package assembly elements is disclosed in FIG. 36D and FIG. 36E.

The instrumentation package assembly elements are arranged in pairs. The four pairs are 66, 13 and 16, 28 and 30, 44 and 47, 63. Each pair looks out onto the baseball playing field from its respective side 10, 14, 73 and 60 of the instrumented baseball base. Each pair of the instrumentation package assembly elements contains a 3-D stereo pair of cameras. Each member of the 3-D stereo pair has the identical camera and lens combination, in order to televise a 3-D format. For example, the instrumentation package assembly element pair 67 and 12 use two identical lenses 70 and 8, and use two identical cameras 69 and 11 to make up their 3-D stereo camera pair. Each pair of instrumentation package assembly elements is physically supported by a Type X buffer plate assembly disclosed in FIG. 21W and FIG. 21X and FIG. 21Y. There are four buffer plates 9, 27, 32 and 49. The optical axes, for example 1 and 5 of each camera in a 3-D stereo camera pair are parallel to one another.

Even though the two cameras of a 3-D stereo camera pair are always made identical to one another, and the two camera lenses of the 3-D stereo camera pair are always made identical to one another, the cameraman may choose the two identical camera lenses of one of the 3-D stereo camera pairs to be different from the two identical camera lenses of another 3-D stereo camera pair. The cameraman can choose all eight camera lenses to be identical to one another if he wishes. The cameraman can even choose all of four 3-D stereo camera lens pairs to be different from one another. The cameraman makes these choices based on the art, venue, entertainment value of each choice, and wanting to get different 3-D effects from each of the 3-D stereo camera pairs for the enjoyment and awe of the TV viewing audience. The optical axes 1,5 and 21, 24 and 35, 41 and 52, 57 of the four 3-D stereo camera pairs within the instrumentation package assembly are aligned to be coplanar with the instrumentation package assembly's x-y plane. Each camera is positioned respectively at the end of each of the eight instrumentation package assembly elements and looks out perpendicularly through the instrumented baseball base's sides 10, 14, 73 and 60. The x-y plane of the instrumentation package assembly is aligned normal to the z-axis 77 of the instrumented baseball base and perpendicular to each of the eight instrumentation package assembly's elements respective sides of the instrumented baseball base. The eight instrumentation package assembly elements are mounted inside the instrumented baseball base using four buffer plates 9, 27, 32 and 49 that act as bearings for the instrumentation package assembly. There is one buffer plate supporting each pair of instrumentation package assembly elements.

Each of the eight instrumentation package assembly elements contains all the electronics for wirelessly televising 3-D pictures and sounds. The pictures and sounds are taken directly by the instrumentation package assembly's cameras and microphones. The instrumentation package assembly is mounted within the instrumented baseball base that is in play on the baseball field. Each of the instrumentation package assembly element pairs wirelessly communicates the 3-D pictures and sounds from the instrumented baseball base to a antenna array relay junction located near the baseball playing field, to the remote base station for final processing and dissemination. The remote base station is disclosed in FIG. 59A and FIG. 59B.

The electronics is identical in each of the eight instrumentation package assembly elements. A block diagram of the electronics and the flow of electrical signals and data in the instrumentation package assembly is disclosed in the preferred embodiment given in FIG. 36D and FIG. 36E.

The instrumentation package assembly elements network transceiver electronics wirelessly transmits real-time pictures and sounds from the cameras and microphones via duel parallel antenna array elements 84, also known as intentional radiators, to a antenna array relay junction disclosed in FIG. 59A and FIG. 59B. The duel parallel antenna array elements are mounted above the instrumentation package assembly.

As an alternative preferred embodiment, the duel parallel antenna array 84 shown in the instrumentation package assembly is replaced with a helix antenna (not shown) with similar dimensions wound on the inside diameter of the instrumentation package assembly. The helix antenna has an advantage in that it is not as exposed to be physically damaged.

Each of the eight instrumentation package assembly elements contains a miniature SD/HD TV camera and supporting electronics. The cameras 69, 11, 17, 26, 33, 43, 48 and 61 and supporting electronics are housed together within the skins of the instrumentation package assembly elements. The eight instrumentation package assembly elements are attached to the main body 55 of the instrumentation package assembly via their corrugated bellows segments 66, 13, 16, 28, 30, 44, 47 and 63.

The eight cameras are grouped into four pairs 69, 11 and 17, 26 and 33, 43 and 48, 61. Each pair looks out of its respective side 10, 14, 73 and 60 of the instrumented baseball base onto the baseball playing field. Each pair of cameras comprises a 3-D stereo camera pair capable of delivering pictures with a SD/HD 3-D stereo letterbox format.

Each one of the four 3-D stereo camera pairs are located at their respective sides 10, 14, 73 and 60 of the instrumented baseball base. The SD/HD letterbox picture format of each TV camera, which is a member of a 3-D stereo camera pair, is aligned with its mate. The TV cameras are aligned within their respective instrumentation package assembly elements so yield upright images of the baseball playing field. Each 3-D stereo camera pair is looking out in a different quadrant from the instrumented baseball base at the baseball playing field.

The two condenser microphones are attached to the top interior wall of the main body 55 of the instrumentation package assembly. The microphones hear any sounds produced by physical contact to the instrumented baseball base's cover by any external thing, including for example air currents felt on the cover from wind on the baseball playing field, or by a player trampling on the instrumented baseball base, or the thud of the baseball as it hits the ground. The sounds received from each of the microphones by the remote base station are processed using special software to produce surround sound which is broadcast to the TV viewing audience. Condenser microphones offer the best trade off today given their small size, weight, reliability and power consumption. As the state of the art changes and superior microphones become available, these newer microphone types will be employed and replace the condenser microphones.

The main body 55 of the instrumentation package assembly acts as a hub and connects all eight of the instrumentation package assembly elements 67, 12 and 16, 28 and 30, 44 and 47, 62 together. Each of the eight instrumentation package assembly elements 67, 12, 16, 28, 30, 44, 47 and 62 are identical to one another. The main body 55 which is the center of the hub is located at the intersection of the x-axis 54 and the y-axis 3 of the instrumented baseball base. Each instrumentation package assembly element contains its own camera lens, camera, and supporting electronics. The battery pack 4 supplies electrical power to the entire instrumentation package assembly and is housed in the center of 55.

Each of the eight instrumentation package assembly elements are attached at their inner ends to the main body 55 of the instrumentation package assembly via their corrugated bellows segments. They are supported at their upper ends by a buffer plate. The buffer plate is permanently attached and encapsulated in the encapsulating material which forms the shock absorbing padding 68, 18, 31 and 45 inside the instrumented baseball base.

The diameter of the instrumentation package assembly is kept to a minimum in order to minimize its footprint inside the instrumented baseball base. The dimension of the outside diameter of the corrugated bellows 66, 13, 16, 28, 30, 44, 47 and 63 of the instrumentation package assembly elements is governed largely by the physical diagonal dimension of the largest components within the instrumentation package assembly, like the SD/HD camera's CCD sensor array and the battery.

The instrumentation package assembly is filled with a dry pressurized gas like nitrogen to prevent the entry of moisture or dirt. The seals 7, 20, 23, 37, 39, 50 and 56 between the optical windows and the instrumentation package assembly element enclosures prevent the dry gas from leaking out of the enclosure. A desiccant (not shown) is disposed near the SD/HD lenses and optical windows to collect and prevent any moisture build-up.

The main body 55 of the instrumentation package assembly is constructed symmetrically in each of its four quadrants. It is essentially a short cylinder, for example about one inch high, that resembles a can of tuna fish. The can is made strong to resist being crushed. Material examples such as polycarbonates, ABS and fiber reinforced plastics are used in its construction.

Polycarbonates, ABS or fiber reinforced plastics are strong and are non-conductors of electricity. It is necessary to use a skin made of a non-conducting material so as to allow radio signals to radiate thru it from the antenna elements within the instrumentation package assembly, for the purpose of televising signals by wireless communications to and from the remote base station.

There is a lid 83 on the bottom of the instrumentation package assembly 55. The lid 83 can be opened to permit replacement of the battery pack 4 and service the instrumentation package assembly.

There is a gas valve 90 on the lid 83. The gas valve 90 is used to put pressurized dry nitrogen gas into the instrumentation package assembly cavity. Pressurization of the cavity keeps moisture and dirt from entering the cavity, and thereby protects the contents of the cavity.

The canvas top 82 and bottom 79 of the instrumented baseball base has a protective sheet of polycarbonate, ABS or fiber reinforced plastic beneath it. There is a volume of rubber encapsulation 68, 19, 31 and 45 padding in the space between the canvas top 82 of the instrumented baseball base and the top protective sheet 81. There is a volume of rubber encapsulation 68, 19, 31 and 45 padding in the space between the canvas bottom 79 of the instrumented baseball base and the bottom protective sheet 80. The purpose of these sheets is to protect the instrumentation package assembly from being crushed when a player steps on the instrumented baseball base.

The protective sheets 80 and 81 are separated and mechanically isolated from the four buffer plates 9, 27, 32 and 49 with shock absorbing padding encapsulation material 68, 19, 31 and 45. The bottom protective sheet 80 has a rectangular opening in its center to enable technicians to gain access to the lid 83 on the bottom of the instrumentation package assembly. The canvas covering on the bottom 79 of the instrumented baseball base has a similar opening for the same purpose.

The eight cameras 69, 11, 17, 26, 33, 43, 48, and 61 are mounted in their eight respective instrumentation package assembly elements 66, 13, 16, 28, 30, 44 and 63. The eight cameras are arranged into four 3-D stereo camera pairs. Each pair peers out from its respective side of the instrumented baseball base. The two cameras and lenses that comprise a 3-D stereo camera pair are always identical to one another. However, there are occasions when the cameras from pair to pair may be chosen to be different from the others in order to accomplish their joint mission of maximizing the entertainment of the viewing audience. For example, the view of different baseball stadiums may be covered more optimally by using a special stereo camera pair on one or more of the sides of the baseball base. Since it is contemplated that there will be three instrumented baseball bases in use most of the time, for example at $1^{st}$, $2^{nd}$ and $3^{rd}$ bases, the cameraman can choreograph the playing field coverage and set up the stereo camera pairs and their respective lens combinations like a symphony orchestra to maximize the entertainment and viewing pleasure of the on-looking television audience. The optical axes of the four stereo camera pairs are coplanar and are arranged at ninety degree intervals to one another around the sides of the baseball base. This arrangement permits the four stereo camera pairs to look out from their respective sides of the baseball base and cover a field of view covering the four quadrants of the playing field around the instrumented baseball base.

The optical and mechanical axis of the 3-D stereo camera pairs 69, 11 and 17, 26 and 33, 43 and 48, 61 respectively are coplanar and mutually perpendicular to each other, and look out perpendicularly from their respective four sides of the instrumented baseball base onto the playing field. The 3-D stereo camera pairs look outward from the four sides of the instrumented baseball base along their respective optical axes 1, 5 and 21, 24 and 35, 41 and 52 and 57.

When a player is running toward the instrumented home plate from third base for example, the instrumented baseball base cameras can see where he is coming from. The instrumented baseball base cameras can see the player if he runs and touches the instrumented baseball home plate. The instrumented baseball base cameras can see the player if he is sliding into the instrumented baseball home plate. The instrumented baseball base cameras can see the catcher if he tags the player before he touches the instrumented baseball home plate.

From the vantage point of the instrumented baseball $3^{rd}$ base, the viewing audience can see the strained player darting for the instrumented baseball $3^{rd}$ base. The TV audience will see and hear the player's cleats as they hit the instrumented baseball $3^{rd}$ base. The viewing audience can see the player's feet as he attempts to slide into the instrumented baseball $3^{rd}$ base. The viewing audience can see close-up the third baseman's attempt to tag him with the ball. As the baseball is thrown to third base, the viewing audience can see a close-up of the third baseman tag the player. The camera's vantage point at third base gives the audience a viewing angle of the game not seen before. The instrumented baseball base cameras give the viewing audience unending contemporaneous close-up front and rear shots that get across a sense of the action that prior art cameras looking on from outside the baseball playing field cannot get across.

Each of the four 3-D stereo camera pairs looks out perpendicularly to its respective side of the instrumented baseball base. Each of the two microphones listens for sounds from the playing field from their respective sides of the instrumented baseball base. The two condenser microphones enable the viewing audience to hear real-time contacts, impacts and shocks to the instrumented baseball base. Simultaneously live 3-D TV pictures are taken by each of the four 3-D stereo camera pairs of their respective fields of view of the live action on the playing field.

The optical axes of the four 3-D stereo camera pairs within the instrumentation package assembly are aligned to be coplanar with the instrumentation package assembly's x-y plane. Each camera is positioned respectively at the end of each of the eight instrumentation package assembly elements and looks out perpendicularly through the instrumented baseball base's sides. The x-y plane of the instrumentation package assembly is aligned normal to the z-axis of the instrumented baseball base and perpendicular to each of the instrumentation package assembly's respective sides of the instrumented baseball base. The eight instrumentation package assembly elements are mounted inside the instrumented baseball base using four buffer plates that act as bearings for the instrumentation package assembly.

The eight instrumentation package assembly elements are arranged into four identical pairs. Each pair contains cameras that look out onto the baseball playing field from their respective side of the instrumented baseball base, for example 69 and 11. Each pair of instrumentation package assembly elements, for example 67 and 12, holds a 3-D stereo camera pair. The main body 55 of the instrumentation package assembly acts as a hub and connects all four pairs of instrumentation package assembly elements 67, 12 and 16, 28 and 30, 44 and 47, 62 together.

Each member of the 3-D stereo camera pair has the identical camera and lens combination in order to deliver a 3-D format. For example, the pair of instrumentation assembly package elements 67 and 12 use two identical lenses 70 and 8, and use two identical cameras 69 and 11 to make up their 3-D stereo camera pair. Each pair of instrumentation package assembly elements is part of a Type X buffer plate assembly shown in FIG. 21W and FIG. 21X and FIG. 21Y. There are four buffer plates 9, 27, 32 and 49 inside each instrumented baseball base. The optical axes, for example 1 and 5, of each camera in a 3-D stereo camera pair are parallel to one another. Optical axes 21 and 24 are parallel to one another. Optical axes 35 and 41 are parallel to one another. Optical axes 52 and 57 are parallel to one another. The optical axes 1, 5, 21, 24, 35, 41, 52 and 57 of the cameras 69, 11, 17, 26, 33, 43, 48, 61 and camera lenses 70, 8, 17, 26, 33, 43, 48 and 61 respectively, are coplanar.

The camera lenses look out thru their respective instrumentation package assembly elements; from their respective sides of the instrumented baseball base; through their respective optical windows; at objects along their respective lines of sight; and they image the objects onto their respective cameras.

For example, camera lenses 70 and 8 look out thru their respective optical windows 71 and 6 from their respective side 10 of the instrumented baseball base, at objects along their respective lines of sight 1 and 5. They image these objects onto their respective cameras 69 and 11.

A variety of different camera lens types, with different lens setting capability, can be used providing they are small in size. The auto iris setting permits the camera lens to automatically adjust for varying lighting conditions on the field. The auto focus setting permits the camera lens to adjust focus for varying distances of the players and action subjects on the field. When a baseball is hit and a player is rounding the bases, the distance of a player from one base may be decreasing while the distance to another base may be increasing. Each individual 3-D stereo camera pair is equipped with the same identical camera lens, although different stereo camera pairs can use a different lens. Each 3-D stereo camera pair can be independently and simultaneously commanded and controlled to auto focus on their respective players. The rearward stereo camera pair may be looking at the back of a player while the forward stereo camera pair may be looking at the front of the player. If the player slides into the forward instrumented baseball bas, the forward stereo camera pair will catch the slide up close. The forward instrumented baseball base stereo camera pair and microphones will capture all the action. While the player is running, his pictures and sounds are wirelessly being transmitted from the instrumented baseball base to the remote base station for processing.

There are a total of four buffer plates 9, 27, 32 and 49 inside the instrumented baseball base. There are a total of eight instrumentation package assembly elements inside the instrumented baseball base. Each buffer plate mechanically supports two of the eight instrumentation package assembly elements. The four buffer plates act as bearings for the instrumentation package assembly elements. The eight instrumentation package assembly elements are part of the instrumentation package assembly 55. Therefore, the four buffer plates There is one buffer plate mechanically supporting each pair of instrumentation package assembly elements. For example, buffer plate 9 supports instrumentation package assembly elements 66 and 13.

The eight instrumentation package assembly elements are mounted inside the instrumented baseball base using four buffer plate assemblies. There is one buffer plate supporting each pair of instrumentation package assembly elements. The buffer plates 9, 27, 32 and 49 are shown supporting the instrumentation package assembly elements in FIG. 43C and FIG. 43D.

Each of the four pairs of instrumentation package assembly elements are supported at their ends by a buffer plates 9, 27, 32 and 49. Buffer plates 9, 27, 32 and 49 are all identical to one another. The buffer plates are permanently encapsulated to the inside of the instrumented baseball base in proximity to each of the canvas sides 10, 14, 73 and 60 of the instrumented baseball base. The small outside diameter of the cylindrical ends of the buffer plates 9, 27, 32 and 49 are made slightly conical. The slightly conical small diameter ends of each of the buffer plates 9, 27, 32 and 49 are fitted into the clearance holes in each of the canvas sides of the The small outside diameter of the cylindrical ends of the buffer plates are made slightly conical. The slightly conical small diameter ends of each of the buffer plates are fitted into clearance holes in each of the canvas covered sides of the instrumented baseball base. The cylindrical ends of the buffer plates are made slightly conical so as to facilitate their smooth entry into the clearance holes in the instrumented baseball base. The buffer plates are then encapsulated in place by the Styrofoam or rubber shock absorbing padding encapsulation material 19, 31, 45 and 68 of the instrumented baseball base.

Except for the optical windows, the canvas cover of the instrumented baseball base is essentially made identical to that of the conventional baseball base shown in FIG. 40.

The buffer plates 9, 27, 32 and 49 are all Type X buffer plates and are shown in FIG. 21W and FIG. 21X and FIG. 21Y. The four buffer plates 9, 27, 32 and 49 that are mounted and encapsulated inside the instrumented baseball base are identical to one another. The mechanical axes of each of the bores of each of the buffer plates are perpendicular to their respective sides of the instrumented baseball base. The ends of the instrumentation package assembly elements are inserted into their respective bores in the buffer plates, thereby aligning the instrumentation package assembly elements perpendicular to their respective sides of the instrumented baseball base.

The conical cylindrical ends of the buffer plates are sealed and bonded to the shock absorbing padding around the circumference of the clearance holes with the encapsulation material which is air-tight and water-tight. Inside the instrumented baseball base, the buffer plates are sealed and bonded to the interior canvas walls of the instrumented baseball base.

The four buffer plates are cast or machined from a lightweight rigid plastic material like polycarbonates, ABS or fiber reinforced plastics in order to prop up the instrumented baseball base's cover to a pre-formed shape matching that of the conventional baseball base.

The eight portals in the buffer plates permit the 3-D stereo camera pairs to see out onto the playing field from the four sides of the instrumented baseball base.

Each of the four pairs of instrumentation package assembly elements is supported at their ends by a buffer plate. All four buffer plates are identical. The buffer plates have been permanently attached by encapsulation to the inside of the instrumented baseball base in proximity to each of the canvas sides of the base.

The buffer plates act as bearings for the eight instrumentation package assembly elements, and thereby restrict and restrain the motion of the instrumentation package assembly elements inside the instrumented baseball base. Besides functioning as bearings to support the instrumentation package assembly elements within the instrumented baseball base, the buffer plates provide hollow portals through which the cameras inside the instrumentation package assembly elements may peer out at the baseball playing field.

In summary the buffer plates are multi-purposed. They provide a pre-formed surface against which the instrumented baseball base canvas cover will conform. They absorb any shock to the sides of the instrumented baseball base's cover. They protect the instrumentation package assembly elements from becoming misaligned relative to the sides and portals of the instrumented baseball bases which the cameras peer out of.

Induction coil 65 is located on top of the central hub of the main body 55. Induction coil 76 is located on the bottom of the main body 55 of the instrumentation package assembly. An external electrical primary induction coil which is part of an inductive battery charging unit disclosed in FIG. 37D and FIG. 37E and FIG. 37F, is used to inductively couple power into induction coils 65 and 76 for the purpose of charging the battery pack 4. A block diagram showing the electrical battery pack charging unit is disclosed in FIG. 37D and FIG. 37E and FIG. 37F. A source of electrical power from the battery pack charging unit which is external to the instrumented baseball base is inductively coupled into induction coils 65 and 76 by laying the battery pack charging unit flat on the top of the instrumented baseball base, with its primary coil coaxially above coils 65 and 76. The induction coils 65 and 76 then feed the power inductively coupled from the battery pack charging unit to charge the battery pack 4 via power electronics in each of the instrumentation package assembly elements. An external charging unit for wirelessly charging the battery pack 4 is disclosed in FIG. 37D and FIG. 37E and FIG. 37F.

The battery's charging coils 65 and 76 are wound on the outside diameter at both top and bottom of the central hub of the instrumentation package assembly and act electrically as a transformer's secondary winding. The coils are wound on the outside diameter of the instrumentation package assembly to keep any heat they may produce away from the contents of the instrumentation package assembly while the battery pack is being charged. The number of turns in each charging coil is made large enough to inductively couple a sufficient number of magnetic lines of flux from the primary coil of the battery charging station unit so as to charge the battery pack in a reasonably short time before games. When the charging station unit is placed on top of the instrumented baseball base, the charging coils 65 and 76 receive electrical energy inductively coupled from the primary coils of the charging station. The induction coils feed this power to the battery pack in order to charge it. The battery charging station unit is disclosed in FIG. 37.

The lower coil 76 is wound on the outside of the access lid heat sink 83 on the bottom of the instrumentation package assembly 1. The access lid heat sink 83 is a circular plate. The access lid heat sink 83 can be removed in order to service the instrumentation package assembly 55. There is a circular opening 89 in the lower protective cover plate shield 80. The purpose of this opening is to allow a technician to reach up into the bottom of the instrumented baseball base through the opening 89 to remove the access lid heat sink 83, and service the instrumentation package assembly 1. The eight corrugated bellows segments 66, 13, 16, 28, 30, 44 and 63 of the eight instrumentation package assembly elements like 67 and 12, act to connect their respective instrumentation package assembly elements to the main central body 55 of the instrumentation package assembly which acts as their hub. The connections are sealed with o-rings (not shown) and are airtight.

The instrumentation package assembly elements have flexible corrugated bellows skin sections like 66 and cylindrically smooth sections like 67 which contain the camera and its lenses. The length of the instrumentation package assembly elements is approximately ⅓ the length of a side of the instrumented baseball base. The corrugated bellows sections of the instrumentation package assembly elements' allows the eight instrumentation package assembly elements to flex, stretch and compress when the instrumented baseball base is impacted. This enables the eight instrumentation package assembly elements to resist shock and vibration. Additionally, the corrugated bellows sections allow the instrumentation package assembly elements to act as a springs and compress or expand their length without damaging the contents of the instrumentation package assembly or its eight elements. When circumstances arise where the players tend to crush the instrumented baseball base, the corrugated bellows permit the instrumentation package assembly elements to bend, compress or expand and absorb shock and vibration.

The corrugated bellows segments 66, 13, 16, 28, 30, 44, 47 and 63 also put longitudinal mechanical pressure on the instrumentation package assembly elements along their mechanical axes 1, 5, 21, 24, 35, 41, 44, 47 and 62 thereby pushing them against their respective buffer plates 9, 27, 32 and 49 and maintaining contact between them despite shocks and vibrations.

The dimension of the outside diameter of the corrugated bellows segments 66, 13, 16, 28, 30, 44, 47 and 63 of the instrumentation package assembly elements is governed largely by the physical diagonal dimension of the largest components within the instrumentation package assembly elements, like the SD/HD camera's CCD sensor array. The battery pack is the largest single component inside the instrumentation package assembly.

The instrumentation package assembly battery pack 4 is wirelessly charged before and during games on an as needed basis, using the charging station unit shown in the preferred embodiment disclosed in FIG. 37D and FIG. 37E and FIG. 37F. The charging station unit is placed on the top of the instrumented baseball base when it is charging the battery pack. Charging of the battery pack 4 is accomplished wirelessly by inductive coupling. The instrumented baseball base's two inductive pickup coils 65 and 76 act as the secondary windings on an air core transformer. Time varying magnetic flux is furnished to pickup coils 65 and 76 by the primary windings of the charging station unit.

The battery pack 4 supplies electrical power to the entire instrumentation package assembly and is housed in the bottom center of 55. The main body 55 of the instrumentation package assembly is constructed symmetrically in each of its four quadrants. It is essentially a short cylinder, for example about one inch high, that resembles a can of tuna fish. It is made strong to resist being crushed. Material examples such as polycarbonates, ABS and fiber reinforced plastics are used in its construction.

A antenna array relay junction shown in FIG. 59A and FIG. 59B is deployed in the baseball stadium and receives radio signals from the instrumented baseball base's antenna array elements 84. Antenna array elements 84 are in quadrature to radiate radio signals to the antenna array relay junction shown in FIG. 59A and FIG. 59B with sufficient gain so as to overcome RF noise and provide for a large enough gain bandwidth product to accommodate real-time SD/HD picture quality requirements. The instrumentation package assembly's network transceiver referred to in FIG. 36D provides also a wireless means for the instrumented baseball base to receive command and control radio signals from the antenna array relay junction.

In another preferred embodiment (not shown in a separate drawing), the shape of the top 82 of the instrumented baseball base is rounded downward and domed shaped as it is on many of the current baseball bases on baseball stadium playing fields. For example, some colleges use honeycombed solid plastic bases that are rounded and domed shaped and tapered. The upper protective cover plate 81 just beneath the top of the base is also rounded downward and domed shaped. Domed shaped protective cover plates shown in FIG. 55A and FIG. 55B and FIG. 55C, and FIG. 56A and FIG. 56B and FIG. 56C, FIG. 57A and FIG. 57B and FIG. 57C, and FIG. 58A and FIG. 58B and FIG. 58C are used. The space between the top of the base and the top of the upper protective cover plate is filled with encapsulation padding. The upper protective cover plate 81 is shaped congruent with the top 82.

Beneath the cover of the instrumented baseball base is its interior. The interior of the instrumented baseball base is filled with a soft encapsulating material 19, 31, 45 and 68 like synthetic foam. The encapsulating material 19, 31, 45 and 68 serves to hold the instrumentation package assembly hub and instrumentation package assembly elements aligned in their places, and also acts as shock absorbing padding to the instrumentation package assembly hub and instrumentation package assembly elements which it encapsulates.

The cameraman in the remote base station software selects either the wireless mode of communication, and/or the fiber optics/copper cable mode of communication between each of the instrumented baseball bases and the remote base station. The cameraman can use whichever equipment (antenna arrays or fiber optics cable/copper cable) is installed in the baseball stadium with which to command and control his choice and communicate it to the instrumented baseball bases on the baseball stadium playing field. These choices are also physically switch selectable by the cameraman with access through the opening in the bottom of the instrumented baseball bases.

The cameraman selects items from a software menu of control commands that go to the network transceiver at the remote base station that are subsequently transmitted to the instrumented sports paraphernalia for the purpose of adjusting various system initializations, operating parameters, radio frequency, polling system status data such as battery condition, and initiating remote mechanical adjustments such as camera focus, optical zoom, iris and movement to the cameras' field of view, etc over the selected bi-directional communications link i.e. wireless radio, fiber optics or copper cable connectivity being used within the particular sports stadium.

These commands, when intercepted by the network transceiver within the instrumented sports paraphernalia are applied to its microprocessor, which then in turn upon executing the instructions stored within the contents of its firmware applies a pulse coded control signal via the power and control interconnect interface inside the instrumentation package to the corresponding electronics i.e. the mechanical actuators that provides optical focus and/or zoom adjustment of the cameras and microphone gain and selection, etc as desired by the cameraman and/or special software running on the computer at the remote base station. The power and control interconnect interface as shown in FIG. 36D (item 21), which is represented by dotted lines, consists of the electrical control wiring to and from the electronic components of the instrumented sports paraphernalia that are being controlled.

Referring to the Preferred Embodiments Specified in FIG. 39A and FIG. 39B, the Instrumented Baseball Base Satisfies all of the Following Objectives:

It is an objective of the present invention that the instrumented baseball base be composed of an eight camera instrumentation package assembly, four buffer plate assemblies, encapsulation shock-proofing padding, upper protective cover plate, and lower protective cover plate. It is an objective of the present invention that the instrumented baseball base has a top, and an upper protective cover plate, that are both flat and rounded downward near their edges and where the upper protective cover plate is spaced just beneath the top of the base. It is an objective of the present invention that the instrumented baseball base has a top, and an upper protective cover plate, that is both congruent and rounded downward and domed shaped where the upper protective cover plate is spaced just beneath the top of the base. It is an objective of the present invention that the instrumented baseball base be equipped with four 3-D stereo camera pairs. It is an objective of the present invention that the instrumented baseball base be equipped with four 3-D stereo camera pairs, where each pair looks out of its respective side of the instrumented baseball base onto the playing field. It is an objective of the present invention that the instrumented baseball base communicates with the remote base station via fiber optics cable/copper cable. It is an objective of the present invention to process pictures captured by the eight cameras inside the instrumented baseball base, and makes them appear upright to the viewing audience. It is an objective of the present invention to process pictures captured by the four 3-D stereo camera pairs inside the instrumented baseball base, and makes each pair of pictures appear upright to the viewing audience. It is an objective of the present invention to process pictures captured by the four 3-D stereo camera pairs inside the instrumented baseball base, and make the SD/HD letter box format of the pair of pictures be aligned with one another. It is an objective of the present invention to fill the volume of the instrumented baseball base beneath its cover in its interior with a soft encapsulating material like synthetic foam to hold all the contents of the instrumented baseball base aligned in their places, and act as a shock absorbing padding for the instrumentation package assembly hub, instrumentation package assembly elements, buffer plate assemblies, upper protective cover plate, and lower protective cover plate. It is an objective of the present invention to enable the cameraman in the remote base station to software select either the wireless mode of communication, and/or the fiber optics/copper cable mode of communication between the instrumented baseball bases and the remote base station by sending a control signal to the baseball base. It is an objective of the present invention to enable the cameraman to select either the wireless mode of communication, and/or the fiber optics/copper cable mode of communication between the instrumented baseball bases and the remote base station by physically setting a switch in the bottom of the instrumented baseball base with access through the bottom of the instrumented baseball base.

FIG. 40A and FIG. 40B and FIG. 40C

The detailed physical elements referenced in the standard conventional major league baseball base drawings shown in FIG. 40A and FIG. 40B and FIG. 40C are identified as follows: 1 is the top of the base. 2 is the side of the base. 3 is the side of the base. 4 is the z-axis of the base. 5 is the side of the base. 6 is the side of the base. 7 is the bottom of the base. 8 is the y-axis of symmetry of the base. 9 is the x-axis of symmetry of the base.

FIG. 40A is a top view of a standard conventional baseball base.

FIG. 40B is a side view of a standard conventional baseball base.

FIG. 40C is a side view of a standard conventional baseball base.

FIG. 40A and FIG. 40B and FIG. 40C, is an example of a standard conventional baseball base which is shown for reference.

Referring to drawings FIG. 40A and FIG. 40B and FIG. 40C, the standard conventional baseball base is used as sports paraphernalia on the baseball field as the first, second and third bases during baseball games in sports stadiums and on training fields.

Referring to the standard conventional baseball base shown in FIG. 40A and FIG. 40B and FIG. 40C, the standard conventional baseball base is made in the form of a square bag with a white covering. The covering is often made of canvas, natural rubber or a synthetic material. The canvas for example covers the base's top, bottom and sides. The bases are sometimes tapered downward like a four sided pyramid making the center of the base thicker than the edges. The base is filled with a soft material like a foam core. The base is secured to the ground at its designated first, second and third base locations on the field using a variety of anchoring mechanisms.

The top of the base is 1. The sides of the base are 2, 3, 5, and 6. The bottom of the base is 7. The sides of the base 2, 3, 5, and 6 are each 15 inches long. The bases are 15 inches square and filled with soft material. The distance between the top surface 1 and the bottom surface 7 is the thickness of the base. The thickness of the standard conventional baseball base used for major league games is between 1½ and 5 inches.

The y-axis of symmetry of the base is 8. The x-axis of symmetry of the base is 9. All the sides of the base that form its square shape are identical to each other. The top of the base 1 sits horizontally on the baseball playing field. The standard conventional baseball base is oriented in space on the baseball field so its z-axis 4 is perpendicular to the baseball field and pointing skyward. When used on the baseball field as sports paraphernalia for the first, second and third bases, the standard conventional baseball base is securely attached to the ground using a variety of anchoring means. The center of gravity of the base lies at the intersection of its x and y axes of symmetry, and a point that is halfway down inside the base.

The top 1 of the conventional baseball bases is sometimes made flat and sometimes made dome shaped. 82 is the top of the instrumented baseball base and is covered with the canvas cover. 82 is shown flat in FIG. 40A and FIG. 40B.

FIG. 41A and FIG. 41B and FIG. 41C

The detailed physical elements referenced in the standard conventional major league home plate drawings shown in FIG. 41A and FIG. 41B and FIG. 41C are identified as follows: 1 is the top of the plate. 2 is the side of the plate facing the pitcher. 3 is the left side of the plate. 4 is the side of the plate facing the catcher. 5 is the side of the plate facing the catcher. 6 is the right side of the plate. 7 is the bottom of the plate. 8 is the x-axis of symmetry of the plate. 9 is the y-axis of symmetry of the plate. 10 is the z-axis of the plate. 11 is the bevel edge around the top of the plate. 12 is the intersection of sides 5 and 6. 13 is the intersection of sides 4 and 5.

FIG. 41A is a top view of a standard conventional major league home plate.

FIG. 41B is a side view of a standard conventional major league home plate.

FIG. 41C is a side view of a standard conventional major league home plate.

FIG. 41A and FIG. 41B and FIG. 41C, is an example of a standard conventional major league home plate which is shown for reference.

Referring to drawings FIG. 41A and FIG. 41B and FIG. 41C, the standard conventional major league home plate is used as sports paraphernalia on the baseball field as home plate during baseball games in sports stadiums and on training fields.

The referenced standard conventional baseball home plate shown in FIG. 41A and FIG. 41B and FIG. 41C, the standard conventional baseball home plate is made in the form of a five sided slab of whitened rubber. The top of the home plate is 1. The sides of the home plate are 2, 3, 4, 5 and 6. The bottom of the home plate is 7. Side 2 is 17 inches long and faces the pitcher on the baseball field. Side 6 is the right hand side and is 8½ inches long. Side 3 is the left hand side and is 8½ inches long. The sides 4 and 5 are each 12 inches long and come to a point at a right angle at edge 13 that faces the catcher on the baseball field. The top edges 11 of all the sides of the home plate are beveled at 45 degrees so that the edge is not potentially dangerous for the players to slide against it. The thickness of the standard conventional major league baseball home plate is uniform. Its center of gravity is about 6.6 inches from side 2 toward the middle of the plate and lies on the y-axis 9.

Right handed batters stand on side 3, and left handed batters stand on side 6 of the plate.

The distance between the top surface 1 and the bottom surface 6 is the thickness of the home plate. The thickness of the standard conventional major league baseball home plate used for major league games is between 2 and 6 inches.

The y-axis of symmetry of the base is 9. The x-axis of symmetry of the base is 8. The plane of the top surface 1 of the home plate sits horizontally on the baseball playing field and level with the ground. The standard conventional major league baseball home plate is oriented in space on the baseball field so its z-axis 10 is perpendicular to the baseball field and pointing skyward. When used on the baseball field as sports paraphernalia for the home plate, the standard conventional major league baseball home plate is securely attached and buried in the ground. The home plate is buried such that its top surface 1 is level and flush with the ground. Its y-axis runs forward out to the pitcher, and backwards toward the catcher.

FIG. 42A and FIG. 42B

The detailed physical elements disclosed in the instrumented baseball base drawings shown in FIG. 42A and FIG. 42B are identified as follows: 1 is the central body of the four instrumentation package assembly elements. 2 is an example of the typical instrumentation package assembly element electronics. 3 is the corrugated bellows segment of the skin of the instrumentation package assembly element. 4 is the cylindrical segment of the skin of an instrumentation package assembly element. 5 is a TV camera. 6 is a Type VII buffer plate. 7 is the slightly conical small diameter end of the buffer plate 6. 8 is a camera lens. 9 is the optical and mechanical axis of the camera contained in the instrumentation package assembly element 4. 10 is an optical window. 11 is shock absorbing padding. 12 is a side cover of the instrumented baseball base. 13 is the battery pack. 14 is an induction coil for wirelessly charging the battery package. 15 corrugated bellows segment of an instrumentation package assembly element. 16 is the cylindrical segment of the skin of an instrumentation package assembly element. 17 is a TV camera. 18 is a Type VII buffer plate. 19 is the slightly conical small diameter end of the buffer plate 18 pressed into the outer bore of the baseball base. 20 is a camera lens. 21 is the optical and mechanical axis of the camera contained in the instrumentation package assembly element 37 of the instrumented baseball base. 22 is an optical window. 23 corrugated bellows segment of an instrumentation package assembly element. 24 is the cylindrical segment of the skin of an instrumentation package assembly element. 25 is a TV camera. 26 is a side cover of the instrumented baseball base. 27 is shock absorbing padding. 28 is a Type VII buffer plate. 29 is the slightly conical small diameter end of the buffer plate 28 pressed into the outer bore of the baseball base. 30 is a camera lens. 31 is the optical and mechanical axis of the camera contained in an instrumentation package assembly element 24. 32 is an optical window. 33 is the threaded sleeve carrying the optical window. 34 is shock absorbing padding. 35 is a side cover of the instrumented baseball base. 36 corrugated bellows segment of an instrumentation package assembly element, 37 is the cylindrical segment of the skin of an instrumentation package assembly element. 38 is a TV camera. 39 is a Type VII buffer plate. 40 is the slightly conical small diameter end of the buffer plate 39. 41 is a camera lens, 42 is the optical and mechanical axis of the camera contained in an instrumentation package assembly element 37. 43 is an optical window. 44 is shock absorbing padding. 45 is a side canvas cover of the instrumented baseball base. 46 is the z-axis of the instrumented baseball base. 47 is the top canvas cover. 48 is the lower protective cover plate shield. 49 is the upper protective cover plate shield. 50 is the access lid heat sink on the bottom of the instrumentation package assembly. 51 (not shown). 52 is the radio antenna. 53 is a microphone. 54 is a microphone. 55 is a microphone. 56 is a microphone. 57 is a gas valve. 58 is a circular access opening in the lower protective cover plate shield. 59 is the fiber optics cable/copper cable connector.

FIG. 42A is a top view of a four camera instrumented baseball base.

FIG. 42B is a side view of a four camera instrumented baseball base.

Referring to drawings FIG. 42A and FIG. 42B, in a preferred embodiment, an instrumented baseball base is disclosed. The instrumented baseball base is instrumented with an instrumentation package assembly that is mounted inside the baseball base. A baseball base which is instrumented with an instrumentation package assembly will be referred to as an instrumented baseball base. The present invention disclosed in FIG. 42A and FIG. 42B specifies such a baseball base.

In the preferred embodiment, the present invention contemplates an instrumented baseball base, which when stationed on any baseball playing field at any or all of the traditional $1^{st}$, $2^{nd}$ and $3^{rd}$ base locations can wirelessly and autonomously televise baseball games under the command and control of the remote base station. The remote base station is disclosed in FIG. 59A and FIG. 59B and FIG. 60A and FIG. 60B and FIG. 61A and FIG. 61B.

Referring to the preferred embodiments disclosed in FIG. 60A and FIG. 60B, and FIG. 61A and FIG. 61B the baseball stadium is also equipped with bi-directional multi-function fiber optic cable communication links to televise baseball games from sports paraphernalia i.e. $1^{st}$, $2^{nd}$, $3^{rd}$ bases to a remote base station. The instrumentation package assembly 1 has bi-directional multi-function fiber optic cable/copper cable connectivity with the remote base station via these cables. The fiber optics cable/copper cable, which is run beneath the ground of the baseball stadium playing field, enters the bottom of the instrumented baseball base through the base's access opening 58. The fiber optic/copper cable's connector is connected to its mating instrumentation package assembly 1 connector 59 in the bottom of the instrumented baseball bases. The instrumentation package assembly connector 59 is wired to the instrumentation package assembly electronics 2.

The instrumented baseball base is instrumented with the instrumentation package assembly disclosed in FIG. 42E and FIG. 423F.

Each one of the four cameras 5, 17, 25 and 38 is housed in each of the four instrumentation package assembly elements 4, 16, 24 and 37. There are four instrumentation package assembly elements in the instrumentation package assembly. Details of each of the four instrumentation package assembly elements which are principal parts of the instrumentation package assembly are shown in FIG. 36A and FIG. 36B and FIG. 36C. This is the identical instrumentation package assembly used in the instrumented baseball base disclosed in FIG. 38A and FIG. 38B.

The instrumented baseball base disclosed in FIG. 42A and FIG. 42B is identical to the instrumented baseball base disclosed in FIG. 38A and FIG. 38B, except that the preferred embodiment in FIG. 42A and FIG. 42B uses a Type VII buffer plate assembly to mount the instrumentation package assembly, whereas the preferred embodiment in FIG. 38A and FIG. 38B uses a Type VIII buffer plate assembly.

The Type VII buffer plate assembly is disclosed in FIG. 21N and FIG. 21O and FIG. 21P. The Type VIII buffer plate assembly is disclosed in FIG. 21Q and FIG. 21R and FIG. 21S.

The only difference between the Type VII and Type VIII buffer plate assemblies is that the Type VII buffer plate assembly used in FIG. 42A and FIG. 42B uses a shell-like-domed shaped optical window, whereas the Type VIII buffer plate assembly used in FIG. 38A and FIG. 38B uses a plane-parallel-flat shaped optical window.

The shell-like-domed shaped optical windows in the current preferred embodiment in FIG. 42A and FIG. 42B have a distinct advantage over the plane-parallel-flat shaped optical windows used in the previous preferred embodiment in FIG. 38A and FIG. 38B. The shell-like-domed shaped optical windows permit the use of camera lenses with extremely wide fields of view, like 180 degrees for example.

The shell-like-domed shaped windows have some disadvantages however compared to the flat windows. The shell-like domed shaped optical windows are more obtrusive to the baseball players because their hemispheres bulge above the canvas cover a little and are therefore a little more visible to the baseball players. Also therefore, the shell-like-domed windows are a little more exposed to the hostile baseball playing field environment than the flat windows because they bulge above the canvas cover whereas the flat windows are flush. They also accumulate more dirt than the plane-parallel-flat optical windows. The optical windows peer out from the sides of the base through clearance holes in the bases cover.

It is understood that as the state of the art in TV camera technology advances, that there will be other better TV cameras that use other than CCD technology. The present invention will work equally well with them as they become available. Therefore, the present invention uses CCD TV cameras as an example of TV cameras that may be used simply because they are the best that today's technology offers, and is not confined only to their sole use in the future.

The instrumented baseball base's cover is substantially the same canvas material/or other material as used in conventional baseball bases. 47 is the top of the instrumented baseball base and is covered with the canvas cover. 47 is shown flat in FIG. 42A and FIG. 42B. In another preferred embodiment, the top 47 of the instrumented baseball base is rounded and domed shaped as it is on many of the current baseball bases on baseball stadium playing fields.

Beneath the cover of the instrumented baseball base is its interior. The interior of the instrumented baseball base is filled with a soft encapsulating material 11, 27, 34 and 44 like synthetic foam. The encapsulating material 11, 27, 34 and 44 serves to hold the instrumentation package assembly hub and instrumentation package assembly elements aligned in their places, and also acts as shock absorbing padding to the instrumentation package assembly hub and instrumentation package assembly elements which it encapsulates.

In another preferred embodiment (not shown in a separate drawing), the shape of the top 47 of the instrumented baseball base is rounded downward and domed shaped as it is on many of the current baseball bases on baseball stadium playing fields. For example, some colleges use honeycombed solid plastic bases that are rounded and domed shaped and tapered. The upper protective cover plate 49 just beneath the top of the base is also rounded downward and domed shaped. Domed shaped protective cover plates shown in FIG. 55A and FIG. 55B and FIG. 55C, and FIG. 56A and FIG. 56B and FIG. 56C, FIG. 57A and FIG. 57B and FIG. 57C, and FIG. 58A and FIG. 58B and FIG. 58C are used. The space between the top of the base and the top of the upper protective cover plate is filled with encapsulation padding. The upper protective cover plate 49 is shaped congruent with the top 47.

The cameraman in the remote base station software selects either the wireless mode of communication, and/or the fiber optics/copper cable mode of communication between each of the instrumented baseball bases and the remote base station. The cameraman can use whichever equipment (antenna arrays or fiber optics cable/copper cable) is installed in the baseball stadium with which to command and control his choice and communicate it to the instrumented baseball bases on the baseball stadium playing field. These choices are also physically switch selectable by the cameraman with access through the opening in the bottom of the instrumented baseball bases.

The cameraman selects items from a software menu of control commands that go to the network transceiver at the remote base station that are subsequently transmitted to the instrumented sports paraphernalia for the purpose of adjusting various system initializations, operating parameters, radio frequency, polling system status data such as battery condition, and initiating remote mechanical adjustments such as camera focus, optical zoom, iris and movement to the cameras' field of view, etc over the selected bi-directional communications link i.e. wireless radio, fiber optics or copper cable connectivity being used within the particular sports stadium.

These commands, when intercepted by the network transceiver within the instrumented sports paraphernalia are applied to its microprocessor, which then in turn upon executing the instructions stored within the contents of its firmware applies a pulse coded control signal via the power and control interconnect interface inside the instrumentation package to the corresponding electronics i.e. the mechanical actuators that provides optical focus and/or zoom adjustment of the cameras and microphone gain and selection, etc as desired by the cameraman and/or special software running on the computer at the remote base station. The power and control interconnect interface as shown in FIG. 36D (item 21), which is represented by dotted lines, consists of the electrical control wiring to and from the electronic components of the instrumented sports paraphernalia that are being controlled.

Referring to the Preferred Embodiments Specified in FIG. 42A and FIG. 42B, the Instrumented Baseball Base Satisfies all of the Following Objectives:

It is an objective of the present invention that the instrumented baseball base be composed of an four camera instrumentation package assembly, four buffer plate assemblies, encapsulation shock-proofing padding, upper protective cover plate, and lower protective cover plate. It is an objective of the present invention that the instrumented baseball base, be stationed on any baseball playing field at any or all of the traditional 1$^{st}$, 2$^{nd}$ and 3$^{rd}$ base locations. It is an objective of the present invention that the instrumented baseball base, which when stationed on any baseball playing field at any or all of the traditional 1$^{st}$, 2$^{nd}$ and 3$^{rd}$ base locations, wirelessly and autonomously televise baseball games under the command and control of the remote base station. It is an objective of the present invention that the instrumented baseball base has a top, and an upper protective cover plate, that are both flat and rounded downward near their edges and where the upper protective cover plate is spaced just beneath the top of the base. It is an objective of the present invention that the instrumented baseball base has a top, and an upper protective cover plate, that is both congruent and rounded downward and domed shaped where the upper protective cover plate is spaced just beneath the top of the base. It is an objective of the present invention to fill the volume of the instrumented baseball base beneath its cover in its interior with a soft encapsulating material like synthetic foam to hold all the contents of the instrumented baseball base aligned in their places, and act as a shock absorbing padding for the instrumentation package assembly hub, instrumentation package assembly elements, buffer plate assemblies, upper protective cover plate, and lower protective cover plate. It is an objective of the present invention to enable the cameraman in the remote base station to software select either the wireless mode of communication, and/or the fiber optics/copper cable mode of communication between the instrumented baseball bases and the remote base station by sending a control signal to the baseball base. It is an objective of the present invention to enable the cameraman to select either the wireless mode of communication, and/or the fiber optics/copper cable mode of communication between the instrumented baseball bases and the remote base station by physically setting a switch in the bottom of the instrumented baseball base with access through the bottom of the instrumented baseball base.

FIG. 42C and FIG. 42D

The detailed physical elements disclosed in the instrumentation package assembly drawings shown in FIG. 42C and FIG. 42D are identified as follows: 1 is the main central body hub of the instrumentation package assembly. 2 is the instrumentation package assembly element's typical electronics. 3 is the corrugated bellows segment of the instrumentation package assembly element. 4 is a instrumentation package assembly element. 5 is a TV camera. 6 is a Type VII buffer plate. 7 is the slightly conical small diameter end of the buffer plate 6. 8 is a camera lens. 9 is the optical and mechanical axis of the camera contained in the instrumentation package assembly element 4 of the instrumented baseball base. 10 is an optical window. 11 is the battery pack. 12 is the top induction coil for wirelessly charging the battery package. 13 is the bellows segment of instrumentation package assembly element 14. 14 is a instrumentation package assembly element. 15 is a TV camera. 16 is a Type VII buffer plate. 17 is the slightly conical small diameter end of the buffer plate. 18 is a TV camera. 18 is a Type VII buffer plate. 19 is the optical and mechanical axis of the camera contained in the instrumentation package assembly element. 20 is an optical window. 21 is the corrugated bellows segment of the instrumentation package assembly element. 22 is a instrumentation package assembly element. 23 is a TV camera. 24 (not shown). 25 is the slightly conical small diameter end of the buffer plate. 26 is a camera lens. 27 is the optical and mechanical axis of the camera contained in the instrumentation package assembly element. 28 is the circular top of the hub 1. 29 is an optical window. 30 is a corrugated bellows segment of the instrumentation package assembly element. 31 is an instrumentation package assembly element. 32 is a TV camera. 33 is a Type VII buffer plate. 34 is the slightly conical small diameter end of the buffer plate. 35 is a camera lens. 36 is the optical and mechanical axis of the camera contained in the instrumentation package assembly element. 37 is an optical window. 38 is the z-axis of the instrumentation package assembly. 39 is the bottom induction coil. 40 is the bottom lid heat sink of 1. 41 is a microphone. 42 is a microphone. 43 is a microphone. 44 is a microphone. 45 is a radio antenna. 46 is a gas valve. 47 is the fiber optics cable/copper cable connector.

FIG. 42C is a top view of a four camera instrumentation package assembly mounted in buffer plate assemblies.

FIG. 42D is a side view of a four camera instrumentation package assembly mounted in buffer plate assemblies.

Referring to drawings FIG. 42C and FIG. 42D, in a preferred embodiment, an instrumentation package assembly is disclosed which is shown mounted in four buffer plate assemblies. The instrumentation package assembly is mechanically mounted inside the instrumented baseball base by using the four buffer plate assemblies 6, 16, 24 and 33.

The buffer plate assemblies 6, 16, 24 and 33 are disclosed in FIG. 21N and FIG. 21O and FIG. 21P. The buffer plate assemblies 6, 16, 24 and 33 disclosed are the Type VII. The Type VII buffer plate assembly uses a shell-like-domed shaped optical window which allows for an extremely wide angular field of view for its cameras.

The instrumentation package assembly is comprised of four instrumentation package assembly elements 4, 14, 22 and 31 connected to a central hub 1 The instrumentation package assembly elements 4, 14, 22 and 31 each contain a camera, camera lens, and supporting electronics. The instrumentation package assembly elements are disclosed in FIG. 36A and FIG. 36B and FIG. 36C.

There is an optical window 10, 20, 29 and 37 attached and sealed to each of the four buffer plate assemblies 6, 16, 24 and 33 respectively. The instrumentation package assembly elements 4, 14, 22 and 31 are shown mounted in four buffer plate assemblies 6, 16, 24 and 33 respectively.

Each of the instrumentation package assembly elements 4, 14, 22 and 31 are identical. The instrumentation package assembly elements are disclosed in FIG. 36A and FIG. 36B and FIG. 36C.

The camera lenses 8, 18, 26 and 35 look through the optical windows 10, 20, 29 and 37 respectively at objects within its field of view, and image the objects onto the at objects, and image the objects onto the CCD sensor arrays of the cameras 5, 15, 23 and 32 respectively.

The instrumentation package assembly is comprised of a central hub 1 and four instrumentation package assembly elements 4, 14, 22 and 31 arranged around the hub 90 degrees apart in four quadrants and mechanically mounted by being plugged into the buffer plate assemblies 6, 16, 24 and 33. The central hub 1 serves as the main body of the instrumentation package assembly.

The main body 1 of the instrumentation package assembly is constructed symmetrically in each of its four quadrants. It is essentially a short cylinder, for example about ¾ inch or more high that resembles a can of tuna fish. Its diameter is about 2 inches or more. It is made strong to resist being crushed. Material examples for the central hub 1 are polycarbonates, ABS or fiber reinforced plastics.

The central hub 1 connects all four of the instrumentation package assembly elements 4, 14, 22 and 31 together. The four instrumentation package assembly elements 4, 14, 22 and 31 are joined to the hub with their flexible bellows segments 3, 13, 21 and 30. The center of the hub is located at the intersection of the x-axis and the y-axis of the instrumented baseball base.

The instrumentation package assembly's skin is made of polycarbonates, ABS and fiber reinforced plastics which are non-conductors of electricity. The buffer plate assemblies 6, 16, 24 and 33 are also made of polycarbonates, ABS and fiber reinforced plastics. It is necessary to use non-conducting materials so as to allow radio signals to radiate thru them and not reflect or obstruct radio signals from the antenna 45 which might interfere with wirelessly televising to and from the remote base station. The remote base station and the antenna array relay junction are disclosed in FIG. 59A and FIG. 59B.

The four instrumentation package assembly elements 4, 14, 22 and 31 are mounted inside the instrumented baseball base using four buffer plates 6, 16, 24 and 33 that act as bearings for the instrumentation package assembly elements 4, 14, 22 and 31. There is one buffer plate supporting each end of each instrumentation package assembly elements 4, 14, 22 and 31. The buffer plates are disclosed in FIG. 21N and FIG. 21O and FIG. 21P.

The corrugated bellows segments 3, 13, 21 and 30 put longitudinal mechanical pressure on the instrumentation package assembly elements along their mechanical axes 9, 19, 27 and 36, thereby pushing the instrumentation package assembly elements against their respective buffer plates 6, 16, 24 and 33 and maintaining alignment and contact between them despite shocks and vibrations.

The four instrumentation package assembly elements are like spokes on a wheel.

The corrugated bellows sections 3, 13, 21 and 30 of the instrumentation package assembly's elements 4, 14, 22 and 31 skin allows the four instrumentation package assembly elements 4, 14, 22 and 31 to flex, stretch and compress when the instrumented baseball base is impacted. This enables the four instrumentation package assembly elements 4, 14, 22 and 31 to resist shock and vibration. Additionally, the corrugated bellows sections 3, 13, 21 and 30 allow the instrumentation package assembly 1 to act as a spring and compress or expand its length without damaging the contents of the instrumentation package assembly elements 4, 14, 22 and 31. When circumstances arise where the players tend to crush the instrumented baseball base, the instrumentation package assembly 1 will compress or expand instead of breaking. The corrugated bellows segments 3, 13, 21 and 30 also put longitudinal mechanical pressure on the instrumentation package assembly elements along their mechanical axes 9, 19, 27 and 36, thereby pushing them against their respective buffer plates 6, 16, 24 and 33 and maintaining contact between them despite shocks and vibrations.

Optical windows 10, 20, 29 and 37 are spherical-shell-like and domed shaped. There is one optical window attached to each of the four buffer plates 6, 16, 24, and 33 on each of the sides of the instrumented baseball base. These optical windows provide portals in the four buffer plates 6, 16, 24, and 33 for the four camera lenses 8, 18, 26, and 35 and their respective cameras 5, 15, 23 and 32 to see out onto the playing field from their respective sides of the instrumented baseball base.

The optical axes 9, 19, 27 and 36 of the four cameras 5, 15, 23 and 32 are coplanar and are arranged at ninety degree intervals to one another around the sides of the instrumented baseball base. This arrangement permits the four cameras 5, 15, 23 and 32 to look out from the four sides of the instrumented baseball base and cover a field of view covering four quadrants of the playing field.

Each one of the four TV cameras is located at its respective side of the instrumented baseball base. The TV cameras are aligned within the instrumentation package assembly elements 4, 14, 22 and 31 so they yield upright images of the baseball playing field. Each camera is looking out at a different quadrant from the instrumentation package assembly 1 and the instrumented baseball base.

The optical and mechanical axis 9, 19, 27 and 36 of the cameras 5, 15, 23 and 32 respectively, are coplanar and mutually perpendicular to each other, and look out perpendicularly from their respective four sides of the instrumented baseball base onto the playing field.

The optical axes 9, 19, 27 and 36 of the four cameras 5, 15, 23 and 32 within the instrumentation package assembly are aligned to be coplanar with the instrumentation package assembly assembly's x-y plane. Each camera 5, 15, 23 and 32 and its lenses 8, 18, 26 and 35 are positioned respectively near the ends of each of the four instrumentation package assembly elements 4, 14, 22 and 31 and looks out through the instrumented baseball base's sides. Camera lenses 8, 20, 30, and 41 look out thru their respective instrumentation package assembly elements 4, 14, 22 and 31, through their respective optical windows 10, 22, 32, and 43, at objects along their respective lines of sight 9, 21, 31, and 42; and they image the objects onto their respective cameras 5, 15, 23 and 32.

The instrumentation package assembly is filled with a dry pressurized gas like nitrogen to prevent the entry of moisture or dirt. The seals 7, 17, 25 and 34 between the optical windows 10, 20, 29 and 37 and the four buffer plates 6, 16, 24 and 33 prevent the dry gas from leaking out of the instrumentation package assembly 1 enclosure. A desiccant is disposed near the SD/HD camera lenses 8, 18, 26 and 37 and optical windows 10, 20, 29 and 37 to collect and prevent any moisture build-up within the instrumentation package assembly 1.

The buffer plates 8, 21, 24 and 36 are all Type VII buffer plates and are shown in FIG. 21N and FIG. 21O and FIG. 21P.

The buffer plates 6, 16, 24 and 33 are cast or machined from polycarbonates, ABS or fiber reinforced plastics.

The buffer plates are multi-purposed. They absorb any shock to the sides of the instrumented baseball base's cover. They protect the instrumentation package assembly elements 4, 14, 22 and 31 from becoming damaged or misaligned relative to the sides of the instrumented baseball base's portals which the cameras peer out of. They act as bearings to mount the instrumentation package assembly inside the instrumented baseball base.

The lid heat sink 40 cools the contents of the instrumentation package assembly.

The radio antenna 45 is phased to aim the radiation lobe toward the antenna array relay junction to improve the S/N ratio of radio transmissions to and from the instrumented baseball base.

FIG. 42E and FIG. 42F

The detailed physical elements disclosed in the instrumentation package assembly drawings shown in FIG. 42E and FIG. 42F are identified as follows: 1 is the central hub of the main body of the instrumentation package assembly. 2 is the typical supporting electronics. 3 is the corrugated bellows segment. 4 is the instrumentation package assembly element. 5 is the camera. 6 is the seal between the camera lens and the small diameter end of the instrumentation package assembly element. 7 is the small diameter end of the instrumentation package assembly element. 8 is the camera lens. 9 is the y-axis of the instrumentation package assembly element and the optical axis of camera 5. 10 is the shoulder of the small diameter end of the instrumentation package assembly element. 11 is the battery pack. 12 is the upper induction coil. 13 is the corrugated bellows segment. 14 is the instrumentation package assembly element. 15 is the camera. 16 is the shoulder of the small diameter end of the instrumentation package assembly element. 17 is the small diameter end of the instrumentation package assembly element. 18 is the camera lens. 19 is the x-axis of the instrumentation package assembly element and the optical axis of camera 15. 20 is the typical supporting electronics. 21 is the corrugated bellows segment. 22 is the instrumentation package assembly element. 23 is the camera. 24 is the shoulder of the small diameter end of the instrumentation package assembly element. 25 is the small diameter end of the instrumentation package assembly element. 26 is the camera lens. 27 is the y-axis of the instrumentation package assembly element and the optical axis of camera 23. 28 is the o-ring seal. 29 is the typical supporting electronics. 30 is the corrugated bellows segment. 31 is the instrumentation package assembly element. 32 is the camera. 33 is the shoulder of the small diameter end of the instrumentation package assembly element. 34 is the small diameter end of the instrumentation package assembly element. 35 is the camera lens. 36 is the x-axis of the instrumentation package assembly element and the optical axis of camera 32. 37 is the typical supporting electronics. 38 is the z-axis of the instrumentation package assembly. 39 is the lower induction coil. 40 is the access lid heat sink. 41 is a microphone. 42 is a microphone. 43 is a microphone. 44 is a microphone. 45 is the radio antenna. 46 is the gas valve. 47 is the fiber optics cable/copper cable connector.

FIG. 42E is a top view of a four camera instrumentation package assembly.

FIG. 42F is a side view of a four camera instrumentation package assembly.

Referring to drawings FIG. 42E and FIG. 42F, in a preferred embodiment, an instrumentation package assembly is disclosed.

The instrumentation package assembly has the ability to wirelessly and autonomously televise SD/HD TV, from inside an instrumented baseball base positioned on the baseball playing field, under the command and control of the remote base station. The remote base station is disclosed in FIG. 59A and FIG. 59B and FIG. 60A and FIG. 60B and FIG. 61A and FIG. 61B.

The buffer plate assemblies are disclosed in FIG. 21N and FIG. 21O and FIG. 21P. The buffer plate assemblies disclosed are the Type VII. The Type VII buffer plate assembly uses a shell-like-domed shaped optical window which allows for an extremely wide angular field of view for its cameras.

It is understood that as the state of the art in TV camera technology advances, that there will be other better TV cameras that use other than CCD technology. The present invention will work equally well with them as they become available. Therefore, the present invention uses CCD TV cameras as an example of TV cameras that may be used simply because they are the best that today's technology offers, and is not confined only to their sole use in the future.

Referring to FIG. 42E and FIG. 42F, the instrumentation package assembly is comprised of four instrumentation package assembly elements 4, 14, 22 and 31 connected to a central hub 1; four microphones 41, 42, 43 and 44 mounted above and connected to the central hub 1; and a radio antenna array 45 mounted above and connected to the central hub 1. The instrumentation package assembly elements 4, 14, 22 and 31 each contain a camera, camera lens, and supporting electronics 2, 20, 29 and 37. The instrumentation package assembly elements are disclosed in FIG. 36A and FIG. 36B and FIG. 36C.

The cameras 5, 15, 23 and 32 are specified in FIG. 36D. The microphones 41, 42, 43 and 44 are specified in FIG. 36D. The antenna 45 is specified in FIG. 36D. The supporting electronics 2, 20, 29 and 37 are specified in FIG. 36D and FIG. 36E.

There is an optical window 10, 20, 29 and 37 attached and sealed to each of the four buffer plate assemblies 6, 16, 24 and 33 respectively. The optical windows 10, 20, 29 and 37 are specified in FIG. 21N and FIG. 21O and FIG. 21P. The instrumentation package assembly elements 4, 14, 22 and 31 are shown mounted into four buffer plate assemblies 6, 16, 24 and 33 respectively. The camera lenses 8, 18, 26 and 35 look through the optical windows 10, 20, 29 and 37 respectively at objects within their respective fields of view and image the objects onto the CCD sensor arrays of the cameras 5, 15, 23 and 32 respectively.

The instrumentation package assembly is comprised of a central hub 1 and four instrumentation package assembly elements 4, 14, 22 and 31 arranged around the hub 90 degrees apart from one another in four quadrants and mechanically mounted by being plugged into the buffer plate assemblies 6, 16, 24 and 33. The central hub 1 serves as the main body of the instrumentation package assembly. The instrumentation package assembly has four microphones 41, 42, 43 and 44 and an antenna array 45 mounted above the top of the hub 1.

Each of the instrumentation package assembly elements 4, 14, 22 and 31 are identical. The instrumentation package assembly elements 4, 14, 22 and 31 are disclosed in FIG. 36A and FIG. 36B and FIG. 36C.

The main body 1 of the instrumentation package assembly is constructed symmetrically in each of its four quadrants. It is essentially a short cylinder, for example about ¾ inch or more high that resembles a can of tuna fish. Its diameter is about 2 inches or more. It is made strong to resist being crushed. Material examples for the central hub 1 are polycarbonates, ABS or fiber reinforced plastics. The height of hub 1 can be reduced as the diameter of the cameras 5, 15, 23 and 32 become smaller in the future as the art improves the technology.

The central hub 1 connects all four of the instrumentation package assembly elements 4, 14, 22 and 31 together. The four instrumentation package assembly elements 4, 14, 22 and 31 are joined to the hub and sealed around their flexible bellows segments 3, 13, 21 and 30.

The center of the hub is located at the intersection of the x-axis and the y-axis of the instrumented baseball base. The battery pack 11 supplies electrical power to the entire instrumentation package assembly and is housed in the center of hub 1.

The instrumentation package assembly electronics, for example 2, is identical in each of the four instrumentation package assembly elements 4, 14, 22 and 31. A block diagram of the electronics is shown in FIG. 36D and FIG. 36E.

The instrumentation package assembly hub 1 skin is made of polycarbonates, ABS and fiber reinforced plastics which are non-conductors of electricity. It is necessary to use a skin made of a non-conducting material so as to allow radio signals to radiate thru it and not reflect or obstruct radio signals from the antenna 45 which might interfere with wirelessly televising to and from the remote base station. The remote base station and the antenna array relay junction are both disclosed in FIG. 59A and FIG. 59B.

The instrumentation package assembly's network transceiver electronics within the four instrumentation package assembly's elements 4, 14, 22 and 31 wirelessly transmit real-time pictures and sounds from the four cameras 5, 14, 23 and 32 and four microphones 41, 42, 43 and 44 via the antenna array elements 45, also known as intentional radiators, to the antenna array relay junction.

A antenna array relay junction disclosed in FIG. 59A and FIG. 59B is deployed in the baseball stadium and receives radio signals from the instrumented baseball base's antenna array 45. The antenna array 45 elements are in quadrature to radiate radio signals to the antenna array relay junction with sufficient gain so as to overcome RF noise and provide for a large enough gain bandwidth product to accommodate real-time SD/HD picture quality requirements. The antenna 45 is a quad antenna array. The instrumentation package assembly's 1 network transceivers also provide a wireless means for the instrumented baseball base to receive command and control radio signals from the remote base station.

The televised picture and sounds are taken directly by the instrumentation package assembly's four cameras 5, 15, 23 and 32 and microphones 41, 42, 43, and 44. The instrumentation package assembly 1 is mounted within the instrumented baseball base that is in play on the baseball playing field. The instrumentation package assembly 1 wirelessly communicates the pictures and sounds from the instrumented baseball base to a antenna array relay junction located near the baseball playing field inside the baseball stadium. The picture and sounds are then relayed from the antenna array relay junction to the remote base station for final processing and broadcast dissemination.

A block diagram showing the detailed flow of electrical signals and data in the instrumentation package assembly is disclosed in the preferred embodiment of the present invention shown in FIG. 36D and FIG. 36E.

Each of the four instrumentation package assembly elements 4, 14, 22 and 31 contains all the electronics for wirelessly televising pictures. The four instrumentation package assembly elements 4, 14, 22 and 31 are mounted inside the instrumented baseball base using four buffer plates 6, 16, 24 and 33 that act as bearings for the instrumentation package assembly elements 4, 14, 22 and 31. There is one buffer plate supporting each end of each instrumentation package assembly elements 4, 14, 22 and 31. The buffer plates are disclosed in FIG. 21N and FIG. 21O and FIG. 21P.

Each instrumentation package assembly element 4, 14, 22 and 31 contains a miniature SD/HD TV camera 5, 15, 23 and 32 and supporting electronics 2, 20, 29 and 37. The cameras 5, 15, 23 and 32 and supporting electronics 2, 20, 29 and 37 are housed together within the instrumentation package assembly element 4, 14, 22 and 31.

The x-y plane of each instrumentation package assembly element 4, 14, 22 and 31 is aligned normal to the z-axis of the instrumented baseball base and perpendicular to each of its respective side of the instrumented baseball base. Each camera 5, 15, 23 and 32 is positioned respectively at the end of each of the four instrumentation package assembly elements 4, 14, 22 and 31 and looks out through the instrumented baseball base's sides.

The instrumentation package assembly elements 4, 14, 22 and 31 have flexible corrugated bellows skin sections 3, 13, 21, and 30. The length of the instrumentation package assembly elements 4, 14, 22 and 31 are each approximately ⅓ the length of a side of the instrumented baseball base. The diameter of the instrumentation package assembly elements 4, 14, 22 and 31 is kept to a minimum in order to minimize their footprint inside the instrumented baseball base. The dimension of the outside diameter of the corrugated skins 3, 13, 21, and 30 of the instrumentation package assembly elements 4, 14, 22 and 31 is governed largely by the physical diagonal dimension of the largest components within the instrumentation package assembly elements 4, 14, 22 and 31, like the SD/HD camera's CCD sensor array.

The four corrugated bellows segments 3, 13, 21 and 30 of the instrumentation package assembly elements 4, 14, 22 and 31 act to connect their respective instrumentation package assembly elements to the central body 1 of the instrumentation package assembly which acts as their hub 1. The connection is sealed with o-rings (not shown) and is air-tight. The corrugated bellows segments 3, 13, 21 and 30 also put longitudinal mechanical pressure on the instrumentation package assembly elements along their mechanical axes 9, 19, 27 and 36, thereby pushing and pre-load the instrumentation package assembly elements against their respective buffer plates (not shown in this figure) and maintaining alignment and contact between them despite shocks and vibrations.

The four corrugated bellows segments 3, 13, 21 and 30 of the four instrumentation package assembly elements 4, 14, 22 and 31 are joined at the center of the instrumentation package assembly 1 at the central hub. The central hub houses the battery pack 11 which supplies electrical power to each of the instrumentation package assembly elements 4, 14, 22 and 31 and their electronic circuits. The four instrumentation package assembly elements are like spokes on a wheel.

The corrugated bellows sections 3, 13, 21 and 30 of the instrumentation package assembly's elements 4, 14, 22 and 31 skin allows the four instrumentation package assembly elements 4, 14, 22 and 31 to flex, stretch and compress when the instrumented baseball base is impacted. This enables the four instrumentation package assembly elements 4, 14, 22 and 31 to resist shock and vibration. Additionally, the corrugated bellows sections 3, 13, 21 and 30 allow the instrumentation package assembly 1 to act as a spring and compress or expand its length without damaging the contents of the instrumentation package assembly elements 4, 14, 22 and 31. When circumstances arise where the players tend to crush the instrumented baseball base, the instrumentation package assembly 1 will compress or expand instead of breaking. The corrugated bellows segments 3, 13, 21 and 30 also put longitudinal mechanical pressure on the instrumentation package assembly elements along their mechanical axes 9, 19, 27 and 36, thereby pushing them against their respective buffer plates 6, 16, 24 and 33 and maintaining contact between them despite shocks and vibrations. Cameras 5, 15, 23 and 32 are mounted in their respective instrumentation package assembly elements 4, 14, 22 and 31. In many venues, the four cameras 5, 15, 23 and 32 are chosen to be identical to each other. However, there are occasions when one or more of the four cameras 5, 15, 23 and 32 may be chosen to be different from the others in order to accomplish their joint mission of maximizing the entertainment of the viewing audience. For example, the view of different baseball stadiums may be covered more optimally by using a special camera(s) on one or more of the sides of the baseball base. Since it is contemplated that there will be three instrumented baseball bases in use most of the time, for example at $1^{st}$, $2^{nd}$ and $3^{rd}$ bases, the cameraman can choreograph the playing field coverage and set up the cameras 5, 15, 23 and 32 and their respective lens combinations 8, 18, 26 and 35 like a symphony orchestra to maximize the entertainment and viewing pleasure of the on-looking television audience. The field of view and the magnification for example may be mixed. The optical axes of the four cameras 9, 19, 27 and 36 are coplanar and are arranged at ninety degree intervals to one another around the sides of the instrumented baseball base. This arrangement permits the four cameras 5, 15, 23 and 32 to look out from the sides of the instrumented baseball base and cover a field of view covering four quadrants of the playing field.

Each one of the four TV cameras 5, 15, 23 and 32 is located at its respective side of the instrumented baseball base. The TV cameras 5, 15, 23 and 32 are aligned within the instrumentation package assembly elements 4, 14, 22 and 31 so they yield upright images of the baseball playing field. Each camera 5, 15, 23 and 32 is looking out at a different quadrant from the instrumentation package assembly 1 and the instrumented baseball base.

The optical and mechanical axis 9, 19, 27 and 36 of the cameras 5, 15, 23 and 32 respectively, are coplanar and mutually perpendicular to each other, and look out perpendicularly from their respective four sides of the instrumented baseball base onto the playing field.

The optical axes 9, 19, 27 and 36 of the four cameras 5, 15, 23 and 32 within the instrumentation package assembly are aligned to be coplanar with the instrumentation package assembly assembly's x-y plane. Each camera 5, 15, 23 and 32 and its lenses 8, 18, 26 and 35 are positioned respectively near the ends of each of the four instrumentation package assembly elements 4, 14, 22 and 31 and looks out through the instrumented baseball base's sides.

Camera lenses 8, 18, 26 and 35 look out thru their respective instrumentation package assembly elements 4, 14, 22 and 31, through their respective optical windows (not shown in this figure), at objects along their respective lines of sight 9, 19, 27 and 36 and they image the objects onto their respective cameras 5, 15, 23 and 32.

A variety of different camera lens 8, 18, 26 and 35 types, with different lens setting capability, can be used providing they are small in size. The auto iris setting permits the camera lenses 8, 18, 26 and 35 to automatically adjust for varying lighting conditions on the field. The auto focus setting permits the camera lenses 8, 18, 26 and 35 to adjust focus for varying distances of the players and action subjects on the field.

When a baseball is hit and a player is rounding the bases, the distance of a player from one base may be decreasing while the distance to another base may be increasing. Each camera lens 8, 18, 26 and 35 can be independently and simultaneously commanded and controlled to auto focus on their respective players. The rearward camera may be looking at the back of a player while the forward camera may be looking at the front of the player. If the player slides into the instrumented baseball base, the forward base camera will catch the slide up close. The forward instrumented baseball base camera and microphones will capture all the action. While the player is running, his pictures and sounds are wirelessly being transmitted from the instrumented baseball base Each of the four microphones 41, 42, 43 and 44 listens for sounds from the playing field from their vantage points above the hub and main body of the instrumentation package assembly 1 inside the instrumented baseball base. The four condenser microphones 41, 42, 43 and 44 enable the viewing audience to hear real-time contacts, impacts and shocks to the instrumented baseball base. The sounds received from each of the microphones by the remote base station are processed using special software to produce surround sound which is broadcast to the TV viewing audience. Simultaneously live TV pictures are taken by each of the four TV cameras of their respective fields of view of the live action on the playing field from each of the instrumentation package assembly elements 4, 14, 22 and 31.

The condenser microphones 41, 42, 43 and 44 and antenna 45 are attached above the top 28 of the instrumentation package assembly 1. The microphones hear any sounds produced by physical contact of the instrumented baseball base's cover with any external thing, including for example air currents felt on the cover from wind on the baseball field or by a player trampling on the instrumented baseball base.

The condenser microphones offer the best trade off today given their small size, weight, reliability and power consumption. As the state of the art changes and superior microphones become available, these newer microphone types will be employed and replace the condenser microphones.

For disclosure details of the wireless communication link between the remote base station and the instrumented baseball base, refer to FIG. 59A and FIG. 59B.

Antenna 45 is used to wirelessly transmit TV signals from each of the cameras 5, 15, 23 and 32 and microphones 41, 42, 43 and 44 in each of the instrumentation package assembly elements 4, 14, 22 and 31 respectively to the remote base station via the antenna array relay junction. Antenna 45 transmits the TV signals to the antenna array relay junction which relays the TV signals to the remote base station for final processing and dissemination. The remote base station is disclosed in FIG. 59A and FIG. 59B. Antenna 45 is a dual parallel antenna array. The antenna 45 is phased to aim the radiation lobe toward the antenna array relay junction to improve the S/N ratio of radio transmissions to and from the instrumented baseball base. The remote base station relays control signals to instrumentation package assembly 1 via the antenna array relay junction, which in turn transmits the control signals to antenna 45. These control signals control the electronic and mechanical functions inside the instrumentation package assembly.

As an alternative example, the antenna array 45 could be replaced with a helix antenna (not shown) with similar dimensions wound on the inside diameter of the instrumentation package assembly.

The instrumentation package assembly's 1 battery pack 11 is wirelessly charged before and during games on an as needed basis, using the battery pack charging station unit disclosed in the preferred embodiment shown in FIG. 37D and FIG. 37E and FIG. 37F. The battery pack charging station unit is placed on the top of the instrumented baseball base when it is charging the battery pack 11. Charging of the battery pack 11 is accomplished wirelessly by inductive coupling. The instrumented baseball base's two inductive pickup coils 12 and 39 act as the secondary windings on an air core transformer. Time varying magnetic flux is furnished to 12 and 39 by the primary windings of the battery pack charging station unit.

The bottom induction coil 39 is attached to the bottom of access lid heat sink 40. Its wiring is routed up into the main body 1 of the instrumentation package assembly through the bottom lid heat sink 40. The lower coil 39 is wound on the outside of the access lid heat sink 40 on the bottom of the instrumentation package assembly 1. The access lid heat sink 40 is a circular plate. The access lid heat sink 40 can be removed in order to service the instrumentation package assembly 1. The access lid heat sink 20 cools the contents of the instrumentation package assembly.

There is a seal (not shown) around the access lid heat sink 40 which is air-tight. There is a gas valve 46 mounted on the access lid heat sink 40. The purpose of the gas valve 46 is to permit pressurized dry nitrogen gas to be pumped into the instrumentation package assembly's cavity to prevent the entry of moisture and dirt which would impair the function of the optics, mechanics and electronics inside the cavity.

Induction coil 39 is located on the bottom of the central hub assembly 1. Induction coil 12 is located on the top of the central hub assembly 1. A source of electrical power which is external to the instrumented baseball base is inductively coupled into the induction coils 12 and 39. An external electrical primary induction coil unit is used to inductively couple power into induction coils 12 and 39 for the purpose of charging the battery pack 12. The primary induction coil is housed in a battery pack charging unit disclosed in FIG. 37D and FIG. 37E and FIG. 37F. The battery pack charging unit is placed flat on top of the instrumented baseball base coaxially above coils 12 and 39.

A block diagram showing the electrical battery charging circuit involving the induction coils 12 and 39 and the battery pack is shown in FIG. 24. The induction coils 12 and 39 feed this power to the battery pack 11 in order to charge it. The battery's charging coils 12 and 39 are wound on the outside diameter at both top and bottom of the central hub of the instrumentation package assembly 1 and act electrically as a transformer's secondary winding. The coils 12 and 39 are wound on the outside diameter of the instrumentation package assembly to keep any heat they may produce away from the contents of the instrumentation package assembly while the battery pack 11 is being charged.

The number of turns in each charging coil 12 and 39 is made large enough to inductively couple a sufficient number of magnetic lines of flux from the primary coil of the battery charging station unit so as to charge the battery pack 11 in a reasonably short time before games. When the battery pack charging station unit is placed on top of the instrumented baseball base, the charging coils 12 and 39 receive electrical energy inductively coupled from the primary coils of the battery pack charging station unit disclosed in FIG. 37D and FIG. 37E and FIG. 37F.

Access lid heat sink 40 can be removed from the bottom of the instrumentation package assembly in order to service the contents of the instrumentation package assembly, such as its cameras, camera lenses, microphones, antenna, electronics and battery pack.

The instrumentation package assembly is filled with a dry pressurized gas like nitrogen to prevent the entry of moisture or dirt. A desiccant is disposed near the SD/HD camera lenses 8, 18, 26 and 35 to collect and prevent any moisture build-up within the instrumentation package assembly 1.

FIG. 43A and FIG. 43B

The detailed physical elements disclosed in the instrumented baseball base drawings shown in FIG. 43A and FIG. 43B are identified as follows: 1 is the optical and mechanical axis of the camera 47. 2 is the typical electronics housed in each of the eight instrumentation package assembly elements. 3 is the x-axis of symmetry of the Type IX buffer plate. 4 is the optical axis of the camera 9. 5 is a typical of eight optical windows mounted on and sealed to the small cylindrical diameter end of their buffer plates. 6 is the small cylindrical outside diameter end of the buffer plate 8. 7 is the lens for camera 9. 8 is the body of the Type IX buffer plate assembly. 9 is a camera which is part of a stereo camera pair for 3-D with camera 47. 10 is a typical instrumentation package assembly element. 11 is the bellows segment of an instrumentation package assembly element. 12 is an induction coil for charging the battery pack. 13 is the bellows segment of an instrumentation package assembly element. 14 is a camera. 15 is the camera lens for camera 14. 16 is the optical axis for camera 14. 17 is the y-axis of symmetry of the instrumented baseball base. 18 is the optical axis of camera 20. 19 is the camera lens for camera 20. 20 is a camera. 21 is the body of the Type IX buffer plate. 22 is the bellows segment of the instrumentation package assembly element. 23 is the bellows segment of the instrumentation package assembly element. 24 is the body of the Type IX buffer plate. 25 is a camera. 26 is a camera lens for camera 25. 27 is the optical axis for camera 25. 28 is the central body hub of the instrumentation package assembly. 29 is the optical axis for camera 31. 30 is the lens for camera 31. 31 is a camera. 32 is the bellows segment of the instrumentation package assembly element. 33 is the battery pack for the instrumentation package assembly. 34 is the bellows segment of the instrumentation package assembly element. 35 is a camera. 36 is the body of the Type IX buffer plate. 37 is the optical axis of lens 35. 38 is the camera lens of camera 35. 39 is the x-axis of the instrumented baseball base and the instrumentation package assembly. 40 is the cylindrical wall of the central body hub of the instrumentation package assembly. 41 is the optical axis of the camera 43. 42 is the camera lens of camera 43. 43 is a camera paired for 3-D with camera 33, 44 is the bellows segment of the instrumentation package assembly element. 45 is the cylindrical wall of the central body hub of the instrumentation package assembly. 46 is the bellows segment of the instrumentation package assembly element, 47 is a camera. 48 is a camera lens for camera 47. 49 is the z-axis of camera 31. 50 is the z-axis of symmetry of the baseball base. 51 is an induction coil for charging the battery pack 33. 52 is the z-axis of camera 25. 53 is the small cylindrical outside diameter end of the buffer plate. 54 is the side of the instrumented baseball base. 55 is the side of the instrumented baseball base. 56 is a gas valve. 57 is the bottom surface of the instrumented baseball base. 58 is the side of the instrumented baseball base. 59 is the top surface of the instrumented baseball base near the upper cover plate shield. 60 is the side of the baseball base. 61 is the side of the baseball base. 62 is the shock absorbing padding. 63 is the shock absorbing padding. 64 is the shock absorbing padding. 65 is the shock absorbing padding. 66 is the access lid heat sink on the bottom of the instrumentation package assembly. 67 is the radio antenna. 68 is a microphone. 69 is a microphone. 70 is a microphone. 71 is a microphone. 72 is the access opening in the lower protective cover plate shield. 73 is a gas valve. 74 is the fiber optics cable/copper cable connector.

FIG. 43A is the top view of an eight camera instrumented baseball base.

FIG. 43B is the side view of an eight camera instrumented baseball base.

Referring to drawings FIG. 43A and FIG. 43B, in the preferred embodiment, the present invention contemplates an instrumented baseball base, which when stationed on any baseball playing field at any or all of the traditional $1^{st}$, $2^{nd}$ and $3^{rd}$ base locations can wirelessly and autonomously televise baseball games under command and control of the remote base station. The remote base station is disclosed in FIG. 59A and FIG. 59B and FIG. 60A and FIG. 60B and FIG. 61A and FIG. 61B.

Referring to the preferred embodiments disclosed in FIG. 60A and FIG. 60B, and FIG. 61A and FIG. 61B the baseball stadium is also equipped with bi-directional multi-function fiber optic cable communication links to televise baseball games from sports paraphernalia i.e. $1^{st}$, $2^{nd}$, $3^{rd}$ bases to a remote base station. The instrumentation package assembly 28 has bi-directional multi-function fiber optic cable/copper cable connectivity with the remote base station via these cables. The fiber optics cable/copper cable, which is run beneath the ground of the baseball stadium playing field, enters the bottom of the instrumented baseball base through the base's access opening 72. The fiber optic/copper cable's connector is connected to its mating instrumentation package assembly 28 connector 74 in the bottom of the instrumented baseball bases. The instrumentation package assembly connector 74 is wired to the instrumentation package assembly electronics 2.

The instrumented baseball base is instrumented with the instrumentation package assembly disclosed in FIG. 43E and FIG. 43F.

Each one of the eight cameras 47, 9, 14, 20, 25, 31, 35 and 43 is housed in each of the eight instrumentation package assembly elements 46, 10, 13, 22, 23, 32, 34 and 44 of which there are eight instrumentation package assembly elements in the instrumentation package assembly. Details of each of the eight instrumentation package assembly elements which are principal parts of the instrumentation package assembly are shown in FIG. 36A and FIG. 36B and FIG. 36C.

This is the identical instrumentation package assembly used in the instrumented baseball base disclosed in FIG. 39A and FIG. 39B.

The instrumented baseball base disclosed in FIG. 43A and FIG. 43B is identical to the instrumented baseball base disclosed in FIG. 39A and FIG. 39B, except that the preferred embodiment disclosed in FIG. 43A and FIG. 43B uses a Type IX buffer plate assembly to mount the instrumentation package assembly, whereas the preferred embodiment in FIG. 39A and FIG. 39B uses a Type X buffer plate assembly.

The Type X buffer plate assembly is disclosed in FIG. 21W and FIG. 21X and FIG. 21Y.

The Type IX buffer plate assembly is disclosed in FIG. 21T and FIG. 21U and FIG. 21V The only difference between the Type IX and the Type X buffer plate assemblies is that the Type IX buffer plate assembly used in FIG. 43A and FIG. 43B uses spherical shell-like-domed shaped optical windows, whereas the Type X buffer plate assembly used in FIG. 39A and FIG. 39B uses plane-parallel-flat shaped optical windows.

The spherical shell-like-domed shaped optical windows in the current preferred embodiment in FIG. 43A and FIG. 43B have a distinct advantage over the plane-parallel-flat shaped optical windows used in the previous preferred embodiment in FIG. 39A and FIG. 39B. The shell-like-domed shaped optical windows permit the use of camera lenses with extremely wide fields of view, like 180 degrees for example. The optical windows peer out from the sides of the base through clearance holes in the bases cover.

The shell-like-domed windows have some disadvantages however compared to the flat windows. The shell-like optical windows are more obtrusive to the baseball players because their hemispheres bulge above the canvas cover a little and are therefore a little more visible to the baseball players. Also therefore, the shell-like-domed windows are a little more exposed to the hostile baseball playing field environment than the flat windows because they bulge above the canvas cover whereas the flat windows are flush. They also accumulate more dirt than the plane-parallel-flat optical windows.

It is understood that as the state of the art in TV camera technology advances, that there will be other better TV cameras that use other than CCD technology. The present invention will work equally well with them as they become available. Therefore, the present invention uses CCD TV cameras as an example of TV cameras that may be used simply because they are the best that today's technology offers, and is not confined only to their sole use in the future. SD/HD Cameras 47, 914, 20, 25, 31, 35 and 43 look through their respective camera lenses 48, 7, 15, 19, 26, 30, 38 and 42 out through their respective optical windows, from their respective sides of the instrumented baseball base at objects along their respective lines of sight 1, 4, 16, 18, 26, 29, 37 and 41. SD/HD Camera lenses 48, 7, 15, 19, 26, 30, 38 and 42 image the objects onto their respective cameras 47, 914, 20, 25, 31, 35 and 43.

The optical axis 1, 4, 16, 18, 27, 29, 37 and 42 of the cameras 47, 9, 14, 20, 25, 31, 35 and 43 respectively, are coplanar and look out perpendicularly from their respective four sides of the instrumented baseball base onto the baseball playing field.

Even though the two cameras of a 3-D stereo camera pair are always made identical to one another, and the two camera lenses of the 3-D stereo camera pair are always made identical to one another, the cameraman may choose the two identical camera lenses of one of the 3-D stereo camera pairs to be different from the two identical camera lenses of another 3-D stereo camera pair. The cameraman can choose all eight camera lenses to be identical to one another if he wishes. The cameraman can even choose all of four 3-D stereo camera lens pairs to be different from one another. The cameraman makes these choices based on the art, venue, entertainment value of each choice, and wanting to get different 3-D effects from each of the 3-D stereo camera pairs for the enjoyment and awe of the TV viewing audience.

The optical windows are spherical shell-like domed shaped. The windows are thin hemispheric shells with concentric spherical surfaces. There are two optical windows attached to each of the four buffer plates 8, 21, 24 and 36 on each of the four sides of the instrumented baseball base. These optical windows provide portals in the four buffer plates for the four stereo camera pairs to see out onto the baseball playing field from their respective sides 54, 55, 60, and 61 of the instrumented baseball base. The eight holes in the sides of the instrumented baseball base, through which the optical windows peer, are made just large enough to prevent vignetting of the cameras field of view.

The optical windows are made strong to protect the cameras. The optical windows are hard coated by vapor deposition with materials such as MgFl or SiO2 to help prevent the outer-most spherical window surfaces from being scratched during the game. The window material itself is chosen to be strong. It is made from hard optical glass such as barium lanthanum borate glasses, or hard optical plastic like acrylic or polycarbonate, both of which are scratch resistant.

The optical windows are made small to make them inconspicuous, and substantially preserve the instrumented baseball base's look-alike quality with the conventional baseball bases, while still retaining sufficient clear aperture for the camera lenses to see events on the playing field in prevailing light. Typical optical windows range in size from about ⅛ inch to ⅜ inches in diameter. Besides their small size, the optical windows are made additionally inconspicuous by very lightly tinting them brown to match the tan coloration of the conventional baseball base cover.

There are two optical windows on each side of the instrumented baseball base. The windows protrude from the canvas cover by a distance approximately equal to one half their diameters.

The instrumented baseball base's cover is substantially the same canvas material/or other material as used in conventional baseball bases. 59 is the top of the instrumented baseball base just above the upper protective cover plate shield. The top is covered with a canvas or synthetic canvas cover. 59 is shown flat in FIG. 43A and FIG. 43B.

In another preferred embodiment (not shown in a separate drawing), the shape of the top of the instrumented baseball base is rounded downward and domed shaped as it is on many of the current baseball bases on baseball stadium playing fields. For example, some colleges use honeycombed solid plastic bases that are rounded and domed shaped and tapered. The upper protective cover plate 59 just beneath the top of the base is also rounded downward and domed shaped. Domed shaped protective cover plates shown in FIG. 55A and FIG. 55B and FIG. 55C, and FIG. 56A and FIG. 56B and FIG. 56C, FIG. 57A and FIG. 57B and FIG. 57C, and FIG. 58A and FIG. 58B and FIG. 58C are used. The space between the top of the base and the top of the upper protective cover plate is filled with encapsulation padding. The upper protective cover plate 59 is shaped congruent with the top.

Beneath the cover of the instrumented baseball base is its interior. The interior of the instrumented baseball base is filled with a soft encapsulating material 62, 63, 64 and 65 like synthetic foam. The encapsulating material 62, 63, 64 and 65 serves to hold the instrumentation package assembly hub and instrumentation package assembly elements aligned in their places, and also acts as shock absorbing padding to the instrumentation package assembly hub and instrumentation package assembly elements which it encapsulates.

The cameraman in the remote base station software selects either the wireless mode of communication, and/or the fiber optics/copper cable mode of communication between each of the instrumented baseball bases and the remote base station. The cameraman can use whichever equipment (antenna arrays or fiber optics cable/copper cable) is installed in the baseball stadium with which to command and control his choice and communicate it to the instrumented baseball bases on the baseball stadium playing field. These choices are also physically switch selectable by the cameraman with access through the opening in the bottom of the instrumented baseball bases.

The cameraman selects items from a software menu of control commands that go to the network transceiver at the remote base station that are subsequently transmitted to the instrumented sports paraphernalia for the purpose of adjusting various system initializations, operating parameters, radio frequency, polling system status data such as battery condition, and initiating remote mechanical adjustments such as camera focus, optical zoom, iris and movement to the cameras' field of view, etc over the selected bi-directional communications link i.e. wireless radio, fiber optics or copper cable connectivity being used within the particular sports stadium.

These commands, when intercepted by the network transceiver within the instrumented sports paraphernalia are applied to its microprocessor, which then in turn upon executing the instructions stored within the contents of its firmware applies a pulse coded control signal via the power and control interconnect interface inside the instrumentation package to the corresponding electronics i.e. the mechanical actuators that provides optical focus and/or zoom adjustment of the cameras and microphone gain and selection, etc as desired by the cameraman and/or special software running on the computer at the remote base station. The power and control interconnect interface as shown in FIG. 36D (item 21), which is represented by dotted lines, consists of the electrical control wiring to and from the electronic components of the instrumented sports paraphernalia that are being controlled.

Referring to the Preferred Embodiments Specified in FIG. 43A and FIG. 43B, the Instrumentation Package Assembly Satisfies all of the Following Objectives:

It is an objective of the present invention that the instrumented baseball base be composed of an eight camera instrumentation package assembly, four buffer plate assemblies, encapsulation shock-proofing padding, upper protective cover plate, canvas cover, and lower protective cover plate. It is an objective of the present invention that the instrumented baseball base has a top, and an upper protective cover plate, that are both flat and rounded downward near their edges and where the upper protective cover plate is spaced just beneath the top of the base. It is an objective of the present invention that the instrumented baseball base be equipped with four 3-D stereo camera pairs. It is an objective of the present invention that the instrumented baseball base is equipped with four 3-D stereo camera pairs, where each pair looks out of its respective side of the instrumented baseball base onto the playing field. It is an objective of the present invention that the instrumented baseball base has a top, and an upper protective cover plate, that is both congruent and rounded downward and domed shaped where the upper protective cover plate is spaced just beneath the top of the base. It is an objective of the present invention to fill the volume of the instrumented baseball base beneath its cover in its interior with a soft encapsulating material like synthetic foam to hold all the contents of the instrumented baseball base aligned in their places, and act as a shock absorbing padding for the instrumentation package assembly hub, instrumentation package assembly elements, buffer plate assemblies, upper protective cover plate, and lower protective cover plate. It is an objective of the present invention to enable the cameraman in the remote base station to software select either the wireless mode of communication, and/or the fiber optics/copper cable mode of communication between the instrumented baseball bases and the remote base station by sending a control signal to the baseball base. It is an objective of the present invention to enable the cameraman to select either the wireless mode of communication, and/or the fiber optics/copper cable mode of communication between the instrumented baseball bases and the remote base station by physically setting a switch in the bottom of the instrumented baseball base with access through the bottom of the instrumented baseball base.

FIG. 43C and FIG. 43D

The detailed physical elements disclosed in the instrumentation package assembly drawings shown in FIG. 43C and FIG. 43D are identified as follows: 1 is the optical and mechanical axis of the camera 47. 2 is the typical electronics housed in each of the eight instrumentation package assembly elements of the instrumentation package assembly 40. 3 is the y-axis of symmetry of the instrumentation package assembly. 4 is the optical and mechanical axis of the camera 9. 5 is the shell-like optical window mounted on and sealed to the small cylindrical diameter end of the buffer plate. 6 is the small cylindrical outside diameter end of the buffer plate 8. 8 is the body of the Type IX buffer plate. 9 is a camera which is part of a stereo camera pair for 3-D with camera 47. 10 is the large cylinder diameter segment of the instrumentation package assembly element. 11 is the bellows segment of the instrumentation package assembly element. 12 is an induction coil for charging the battery pack. 13 is the bellows segment of the instrumentation package assembly element. 14 is the camera. 15 is the camera lens for camera 14. 16 is the optical axis of camera 14. 17 is the mechanical axis of symmetry of the Type IX buffer plate 21 and the x-axis of symmetry of the instrumentation package assembly. 18 is the optical axis of camera 20. 19 is the camera lens for camera 20. 20 is the camera. 21 is the Type IX buffer plate assembly. 22 is the bellows segment of an instrumentation package assembly element. 23 is the bellows segment of an instrumentation package assembly element. 24 is the body of the Type IX buffer plate. 25 is a camera paired for 3-D with camera 14. 26 is the camera lens of camera 25. 27 is the optical and mechanical axis of the camera 25. 28 is the bellows segment of an instrumentation package assembly element. 29 is the optical axis of camera 31. 30 is the lens for camera 31. 31 is a camera. 32 is the bellows segment of an instrumentation package assembly element. 33 is the battery pack for the instrumentation pack age assembly. 34 is the bellows segment of an instrumentation package assembly element. 35 is a camera. 36 is a Type IX buffer plate. 37 is the optical and mechanical axis of the camera 35. 38 is the camera lens for camera 35. 39 is the x-axis of symmetry of the instrumentation package assembly and the mechanical axis of symmetry of the Type IX buffer plate 36. 40 is the cylindrical wall of the central body hub of the instrumentation package assembly. 41 is the optical and mechanical axis of the camera 43. 42 is the camera lens of camera 43. 43 is a camera paired for 3-D with camera 35. 44 is the bellows segment of an instrumentation package assembly element. 45 is the cylindrical wall of the hub of the instrumentation package assembly. 46 is the bellows segment of an instrumentation package assembly element. 47 is a camera paired for 3-D with camera 9 to make a stereo pair. 49 is the z-axis of camera 31. 50 is the z-axis of symmetry of the instrumentation package assembly. 51 is an induction coil for charging the battery pack 33. 52 is the z-axis of camera 25. 53 is a seal. 54 is a microphone. 55 is a microphone. 56 is a microphone. 57 is a microphone. 58 is a radio antenna. 59 is the bottom access lid heat sink on the instrumentation package assembly. 60 is a gas valve. 61 is the central hub of the instrumentation package assembly. 62 is the large cylinder diameter segment of the instrumentation package assembly element. 63 is the fiber optics cable/copper cable connector.

FIG. 43C is the top view of an instrumentation package assembly for an eight camera instrumented baseball base, mounted in buffer plate assemblies.

FIG. 43D is the side view of an instrumentation package assembly for an eight camera instrumented baseball base, mounted in buffer plate assemblies.

Referring to drawings FIG. 43C and FIG. 43D, in a preferred embodiment, an instrumentation package assembly is disclosed. The instrumentation package assembly has the ability to wirelessly and autonomously televise SD/HD TV from inside an instrumented baseball base in which it is mechanically mounted. The instrumentation package assembly performs its functions under the command and control of the remote base station while the instrumented baseball base is on the playing field. The remote base station is disclosed in FIG. 59A and FIG. 59B and FIG. 60A and FIG. 60B and FIG. 61A and FIG. 61B.

The instrumentation package assembly is used in the instrumented baseball base disclosed in FIG. 43A and FIG. 43B.

This is the same instrumentation package assembly used in the instrumented baseball base disclosed in FIG. 39A and FIG. 39B.

The instrumentation package assembly is mechanically mounted inside the instrumented baseball base using four buffer plate assemblies.

FIG. 43C and FIG. 43D shows the instrument package assembly's eight instrumentation package assembly elements mounted to four Type IX buffer plate assemblies. The Type IX buffer plate assembly is disclosed in FIG. 21T and FIG. 21U and FIG. 21V.

The Type IX buffer plate assembly uses spherical shell-like-domed shaped optical windows.

Each one of the eight cameras 47, 9, 14, 20, 25, 31, 35 and 43 is housed in each of the eight instrumentation package assembly elements 46, 10, 13, 22, 23, 32, 34 and 44 of which there are eight instrumentation package assembly elements in the instrumentation package assembly. Details of each of the eight instrumentation package assembly elements which are principal parts of the instrumentation package assembly are shown in FIG. 36A and FIG. 36B and FIG. 36C.

The spherical shell-like-domed shaped optical windows have a distinct advantage over the plane-parallel-flat shaped optical windows. The shell-like-domed shaped optical windows permit the use of camera lenses with extremely wide fields of view, like 180 degrees for example.

The shell-like-domed windows have some disadvantages however compared to the flat windows. The shell-like optical windows are more obtrusive to the baseball players because their hemispheres bulge above the canvas cover a little and are therefore a little more visible to the baseball players. Also therefore, the shell-like-domed windows are a little more exposed to the hostile baseball playing field environment than the flat windows because they bulge above the canvas cover whereas the flat windows are flush. They also accumulate more dirt than the plane-parallel-flat optical windows.

The instrumentation package assembly is comprised of eight instrumentation package assembly elements 46, 11, 13, 22, 23, 32, 34 and 45 connected to a central hub 61; four microphones 54, 55, 56 and 57 mounted above and connected to the central hub 61; and a radio antenna array 58 mounted above and connected to the central hub 61. The instrumentation package assembly elements 46, 11, 13, 22, 23, 32, 34 and 45 each contain a camera, camera lens, and supporting electronics.

The instrumentation package assembly elements are disclosed in FIG. 36A and FIG. 36B and FIG. 36C. The cameras are specified in FIG. 36D. The microphones are specified in FIG. 36D. The antenna is specified in FIG. 36D. The supporting electronics are specified in FIG. 36D and FIG. 36E.

There is an optical window attached and sealed to each of the four buffer plate assemblies 8, 21, 24 and 36 respectively. The instrumentation package assembly elements 46, 11, 13, 22, 23, 32, 34 and 45 are shown mounted in four buffer plate assemblies 6, 16, 24 and 33 respectively. The camera lenses 8, 18, 26 and 35 look through the optical windows 10, 20, 29 and 37 respectively at objects within its field of view, and image the objects onto the CCD sensor arrays of the cameras 5, 15, 23 and 32 respectively.

The buffer plate assemblies are specified in FIG. 21T and FIG. 21U and FIG. 21V.

The instrumentation package assembly elements are shown mounted in four buffer plate assemblies 8, 21, 24 and 36.

The instrumentation package assembly is comprised of a central hub 61 and eight instrumentation package assembly elements 46, 11, 13, 22, 23, 32, 34 and 44 arranged around the hub 90 degrees apart in four quadrants and mechanically mounted by being plugged into the buffer plate assemblies 8, 21, 24 and 36. The central hub 61 serves as the main body of the instrumentation package assembly. The instrumentation package assembly has four microphones 54, 55, 56 and 57 and an antenna array 67 mounted above the top of the hub 61.

Each of the instrumentation package assembly elements 46, 11, 13, 22, 23, 32, 34 and 44 are identical. The instrumentation package assembly elements are disclosed in FIG. 36A and FIG. 36B and FIG. 36C.

The main body 61 of the instrumentation package assembly is constructed symmetrically in each of its four quadrants. It is essentially a short cylinder, for example about ¾ inch or more high that resembles a can of tuna fish. Its diameter is about 2 inches or more. It is made strong to resist being crushed. Material examples for the central hub 61 are polycarbonates, ABS or fiber reinforced plastics.

The main body 61 is cylindrical in shape. Typical cylindrical surfaces of the main body 61 are shown as items 45 and 40.

The central hub 61 connects all eight of the instrumentation package assembly elements 46, 11, 13, 22, 23, 32, 34 and 44 together. The eight instrumentation package assembly elements 46, 11, 13, 22, 23, 32, 34 and 44 are joined to the hub with their flexible bellows segments 46, 11, 13, 22, 23, 32, 34 and 44.

The center of the hub 61 is located at the intersection of the x-axis and the y-axis of the instrumented baseball base. The battery pack 33 supplies electrical power to the entire instrumentation package assembly and is housed in the center of 61.

The instrumentation package assembly electronics, for example 2, is identical in each of the four instrumentation package assembly elements 46, 11, 13, 22, 23, 32, 34 and 44. A block diagram of the electronics is shown in FIG. 36D and FIG. 36E.

The four instrumentation package assembly elements 46, 11, 13, 22, 23, 32, 34 and 44 are mounted inside the instrumented baseball base using four buffer plates 8, 21, 24 and 36 that act as bearings for the instrumentation package assembly elements 46, 11, 13, 22, 23, 32, 34 and 44. The buffer plate mechanically supports the ends of each instrumentation package assembly elements 46, 11, 13, 22, 23, 32, 34 and 44. One buffer plate supports two instrumentation package assembly elements. For example, buffer plate 8 supports instrumentation package assembly elements 46 and 11. The buffer plates are disclosed in FIG. 21N and FIG. 21O and FIG. 21P.

Each instrumentation package assembly element 46, 11, 13, 22, 23, 32, 34 and 44 contains a miniature SD/HD TV camera and supporting electronics. The cameras 47, 9, 14, 20, 25, 31, 35 and 43 and supporting electronics are housed together within the instrumentation package assembly element 46, 11, 13, 22, 23, 32, 34 and 44.

The x-y plane of each instrumentation package assembly element 46, 11, 13, 22, 23, 32, 34 and 44 is aligned normal to the z-axis of the instrumented baseball base and perpendicular to each of its respective side of the instrumented baseball base. Each camera 47, 9, 14, 20, 25, 31, 35 and 43 is positioned respectively at the end of each of the four instrumentation package assembly elements 46, 11, 13, 22, 23, 32, 34 and 44 looks out through the instrumented baseball base's sides.

The instrumentation package assembly elements 46, 11, 13, 22, 23, 32, 34 and 44 have flexible corrugated bellows skin sections 46, 11, 13, 22, 23, 32, 34 and 44. The length of the instrumentation package assembly elements 46, 11, 13, 22, 23, 32, 34 and 44 are each approximately ⅓ the length of a side of the instrumented baseball base.

The eight corrugated bellows segments 46, 11, 13, 22, 23, 32, 34 and 44 of the instrumentation package assembly elements 46, 11, 13, 22, 23, 32, 34 and 44 act to connect their respective instrumentation package assembly elements to the central body 61 of the instrumentation package assembly which acts as their hub. The connection is sealed with o-rings (not shown) and is air-tight.

The corrugated bellows segments 46, 11, 13, 22, 23, 32, 34 and 44 also put longitudinal mechanical pressure on the instrumentation package assembly elements along their mechanical axes 1, 4, 16, 18, 27, 29, 37 and 41 thereby pushing the instrumentation package assembly elements against their respective buffer plates 8, 21, 24 and 36 and maintaining alignment and contact between them despite shocks and vibrations.

The eight corrugated bellows segments 46, 11, 13, 22, 23, 32, 34 and 44 of the eight instrumentation package assembly elements 46, 11, 13, 22, 23, 32, 34 and 44 are joined at the center of the instrumentation package assembly 61 at the central hub. The eight instrumentation package assembly elements are like spokes on a wheel.

The corrugated bellows sections 46, 11, 13, 22, 23, 32, 34 and 44 of the instrumentation package assembly's elements 46, 11, 13, 22, 23, 32, 34 and 44 skin allows the eight instrumentation package assembly elements 46, 11, 13, 22, 23, 32, 34 and 44 to flex, stretch and compress when the instrumented baseball base is impacted. This enables the four instrumentation package assembly elements 46, 11, 13, 22, 23, 32, 34 and 44 to resist shock and vibration. Additionally, the corrugated bellows sections 46, 11, 13, 22, 23, 32, 34 and 44 allow the instrumentation package assembly 61 to act as a spring and compress or expand its length without damaging the contents of the instrumentation package assembly elements 46, 11, 13, 22, 23, 32, 34 and 44. When circumstances arise where the players tend to crush the instrumented baseball base, the instrumentation package assembly 61 will compress or expand instead of breaking. The corrugated bellows segments 46, 11, 13, 22, 23, 32, 34 and 44 also put longitudinal mechanical pressure on the instrumentation package assembly elements along their mechanical axes 1, 4, 16, 18, 27, 29, 37 and 41 thereby pushing them against their respective buffer plates 8, 21, 24 and 36 and maintaining contact between them despite shocks and vibrations.

There are a total of eight optical windows. There are two optical windows attached to each buffer plate assembly. For example, optical window 5 is part of buffer plate assembly 8. The optical windows are spherical-shell-like and domed shaped. There are two optical windows on each of the sides of the instrumented baseball base. These optical windows provide portals in the four buffer plates 8, 21, 24 and 36 for the eight camera lenses 48, 7, 15, 19, 26, 30, 38 and 42 and their respective cameras 47, 9, 14, 20, 25, 31, 35 and 43 to see out onto the playing field from their respective sides of the instrumented baseball base. The eight holes in the sides of the instrumented baseball base, through which the optical windows peer, are made just large enough to prevent vignetting of the cameras field of view.

Each one of the eight TV cameras is located at its respective side of the instrumented baseball base. The TV cameras 47, 9, 14, 20, 25, 31, 35 and 43 are aligned within the instrumentation package assembly elements 46, 11, 13, 22, 23, 32, 34 and 44 so they yield upright images of the baseball playing field. Each camera is looking out at a different quadrant from the instrumentation package assembly 61 and the instrumented baseball base.

The optical and mechanical axis 1, 4, 16, 18, 27, 29, 37 and 41 of the cameras 47, 9, 14, 20, 25, 31, 35 and 43 respectively, are coplanar and mutually perpendicular to each other, and look out perpendicularly from their respective four sides of the instrumented baseball base onto the playing field.

The optical axes 1, 4, 16, 18, 27, 29, 37 and 41 of the eight cameras 47, 9, 14, 20, 25, 31, 35 and 43 within the instrumentation package assembly are aligned to be coplanar with the instrumentation package assembly assembly's x-y plane. Each camera 47, 9, 14, 20, 25, 31, 35 and 43 and its lenses 48, 7, 15, 19, 26, 30, 38 and 42 respectively are positioned respectively near the ends of each of the eight instrumentation package assembly elements 46, 11, 13, 22, 23, 32, 34 and 44 and look out through the instrumented baseball base's sides.

Camera lenses 48, 7, 15, 19, 26, 30, 38 and 42 look out thru their respective instrumentation package assembly elements 46, 11, 13, 22, 23, 32, 34 and 44, through their respective optical windows. For example, camera lens 7 looks through buffer plate assembly 8 through optical window 5. The camera lenses 48, 7, 15, 19, 26, 30, 38 and 42 look out at objects along their respective lines of sight 1, 4, 16, 18, 27, 29, 37 and 41; and they image the objects onto their respective cameras 47, 9, 14, 20, 25, 31, 35 and 43.

The buffer plates are multi-purposed. They absorb any shock to the sides of the instrumented baseball base's cover. They protect the instrumentation package assembly elements 46, 11, 13, 22, 23, 32, 34, and 44 from becoming damaged or misaligned relative to the sides of the instrumented baseball base's portals which the cameras 47, 9, 14, 20, 25, 31, 35 and 43 peer out of.

Referring to the Preferred Embodiments Specified in FIG. 43C and FIG. 43D, the Instrumentation Package Assembly Satisfies all of the Following Objectives:

It is an objective of the present invention to enable the cameraman in the remote base station to align the 3-D stereo camera picture frames with one another. It is an objective of the present invention to enable the cameraman in the remote base station to align the 3-D stereo camera picture frames with the horizon. It is an objective of the present invention to enable the cameraman in the remote base station to align the 3-D stereo camera picture frames with the outfield horizon. It is an objective of the present invention to enable the cameraman in the remote base station to align the 3-D stereo camera picture frames with the centerline of the baseball diamond between 2$^{nd}$ base and home plate. It is an objective of the present invention to enable the cameraman in the remote base station to align the 3-D stereo camera picture frames with one another. It is an objective of the present invention to enable the cameraman in the remote base station to align the 3-D stereo camera picture frames with the horizon. It is an objective of the present invention to enable the cameraman in the remote base station to align the 3-D stereo camera picture frames with the outfield horizon. It is an objective of the present invention to enable the cameraman in the remote base station to align the 3-D stereo camera picture frames with the centerline of the baseball diamond between 2$^{nd}$ base and home plate.

FIG. 43E and FIG. 43F

The detailed physical elements disclosed in the instrumentation package assembly drawings shown in FIG. 43E and FIG. 43F are identified as follows: 1 is the optical axis of camera 47. 2 is the supporting electronics. 3 is the y-axis of the instrumentation package assembly element. 4 is the optical axis of camera 9. 5 is an instrumentation package assembly element. 6 is the small diameter end of the instrumentation package assembly element. 7 is a camera lens. 8 is the small diameter end of the instrumentation package assembly element. 9 is a camera. 10 is the instrumentation package assembly element. 11 is the corrugated bellows segment. 12 is the upper induction coil. 13 is the corrugated bellows segment. 14 is a camera. 15 is the camera lens. 16 is the optical axis of camera 14. 17 is the x-axis of the instrumentation package assembly. 18 is the x-axis of the camera 20. 19 is the camera lens. 20 is a camera. 21 is the small diameter end of the instrumentation package assembly element. 22 is the corrugated bellows segment. 23 is a corrugated bellows segment. 24 is a instrumentation package assembly element. 25 is a camera. 26 is the camera lens. 27 is the optical axis of camera 25. 28 is a instrumentation package assembly element. 29 is the optical axis of camera 25. 30 is the camera lens. 31 is a camera. 32 is a corrugated bellows segment. 33 is the battery pack. 34 is a corrugated bellows segment. 35 is a camera. 36 is the instrumentation package assembly element. 37 is the optical axis of camera 35. 38 is a camera lens. 39 is the small diameter end of the instrumentation package assembly element. 40 is the cylindrical wall of the hub of the instrumentation package assembly. 41 is the optical axis of camera 43. 42 is a camera lens. 43 is a camera. 44 is a corrugated bellows segment. 45 is the cylindrical wall of the hub of the instrumentation package assembly. 46 is a corrugated bellows segment. 47 is a camera. 48 is a camera lens. 49 is the z-axis of camera 47. 50 is the z-axis of the instrumentation package assembly. 51 is the lower induction coil. 52 is the z-axis of camera 9. 53 is the small diameter end of the instrumentation package assembly element. 54 is a microphone. 55 is a microphone. 56 is a microphone. 57 is a microphone. 58 is the radio antenna. 59 is the access lid heat sink. 60 is the gas valve. 61 is the central hub of the main body of the instrumentation package assembly. 62 is the small diameter end of the instrumentation package assembly element. 63 is the small diameter end of the instrumentation package assembly element. 64 is the supporting electronics. 65 is the supporting electronics. 66 is the supporting electronics. 67 is the supporting electronics. 68 is the supporting electronics. 69 is the supporting electronics. 70 is the bottom of the central hub of the main body of the instrumentation package assembly. 71 is the instrumentation package assembly element. 72 is the instrumentation package assembly element. 73 is the shoulder of the instrumentation package assembly element. 74 is the shoulder of the instrumentation package assembly element. 75 is the fiber optics cable/copper cable connector.

FIG. 43E is the top view of an instrumentation package assembly for an eight camera instrumented baseball base.

FIG. 43F is the side view of an instrumentation package assembly for an eight camera instrumented baseball base.

Referring to drawings FIG. 43E and FIG. 43F, in a preferred embodiment, an instrumentation package assembly is disclosed. The instrumentation package assembly has the ability to wirelessly and autonomously televise SD/HD TV from inside an instrumented baseball base in which it is mechanically mounted. The instrumentation package assembly performs its functions under the command and control of the remote base station while the instrumented baseball base is positioned on a baseball playing field. The remote base station is disclosed in FIG. 59A and FIG. 59B and FIG. 60A and FIG. 60B and FIG. 61A and FIG. 61B.

The instrumentation package assembly is used in the instrumented baseball base disclosed in FIG. 43A and FIG. 43B.

This is the same instrumentation package assembly used in the instrumented baseball base disclosed in FIG. 39A and FIG. 39B.

The instrumentation package assembly is mechanically mounted inside the instrumented baseball base using four buffer plate assemblies.

FIG. 43C and FIG. 43D shows the instrument package assembly's eight instrumentation package assembly elements mounted to four Type IX buffer plate assemblies. The Type IX buffer plate assembly is disclosed in FIG. 21T and FIG. 21U and FIG. 21V.

Each one of the eight cameras 47, 9, 14, 20, 25, 31, 35 and 71 is housed in each of the eight instrumentation package assembly elements 46, 10, 13, 22, 23, 32, 34 and 44 of which there are eight instrumentation package assembly elements in the instrumentation package assembly. Details of each of the eight instrumentation package assembly elements which are principal parts of the instrumentation package assembly are shown in FIG. 36A and FIG. 36B and FIG. 36C.

The Type IX buffer plate assembly uses spherical shell-like-domed shaped optical windows.

The spherical shell-like-domed shaped optical windows have a distinct advantage over the plane-parallel-flat shaped optical windows. The shell-like-domed shaped optical windows permit the use of camera lenses with extremely wide fields of view, like 180 degrees for example.

The shell-like-domed windows have some disadvantages however compared to the flat windows. The shell-like optical windows are more obtrusive to the baseball players because their hemispheres bulge above the canvas cover a little and are therefore a little more visible to the baseball players. Also therefore, the shell-like-domed windows are a little more exposed to the hostile baseball playing field environment than the flat windows because they bulge above the canvas cover whereas the flat windows are flush. They also accumulate more dirt than the plane-parallel-flat optical windows.

Referring to FIG. 43E and FIG. 43F, the instrumentation package assembly is comprised of eight instrumentation package assembly elements 46, 11, 13, 22, 23, 32, 34 and 44 connected to a central hub 61; four microphones 54, 55, 56 and 57 mounted above and connected to the central hub 61; and a radio antenna array 58 mounted above and connected to the central hub 61. The instrumentation package assembly elements 46, 11, 13, 22, 23, 32, 34 and 44 each contain a camera, camera lens, and supporting electronics. The radio antenna 58 is phased to aim the radiation lobe toward the antenna array relay junction to improve the S/N ratio of radio transmissions to and from the instrumented baseball base.

The instrumentation package assembly elements are disclosed in FIG. 36A and FIG. 36B and FIG. 36C.

The cameras are specified in FIG. 36D. The microphones are specified in FIG. 36D. The antenna is specified in FIG. 36D. The supporting electronics are specified in FIG. 36D and FIG. 36E.

The instrumentation package assembly is comprised of a central hub 61 and eight instrumentation package assembly elements 46, 11, 13, 22, 23, 32, 34 and 44 arranged around the hub 90 degrees apart in four quadrants. The central hub 61 serves as the main body of the instrumentation package assembly. The instrumentation package assembly has four microphones 54, 55, 56 and 57 and an antenna array 58 mounted above the top of the hub 61.

Each of the instrumentation package assembly elements 46, 11, 13, 22, 23, 32, 34 and 44 are identical to one another.

The main body 61 of the instrumentation package assembly is constructed symmetrically in each of its four quadrants. It is essentially a short cylinder, for example about ¾ inch or more high that resembles a can of tuna fish. Its diameter is about 2 inches or more. It is made strong to resist being crushed. Material examples for the central hub 61 are polycarbonates, ABS or fiber reinforced plastics. The diameter and height of the tuna fish can be made smaller as the technology for the camera and the battery pack enables them to be manufactured and become available in smaller sizes.

The main body 61 is cylindrical in shape. Typical cylindrical surfaces of the main body 61 are shown as items 45 and 40.

The central hub 61 connects all eight of the instrumentation package assembly elements 46, 11, 13, 22, 23, 32, 34 and 44 together. The eight instrumentation package assembly elements 46, 11, 13, 22, 23, 32, 34 and 44 are joined to the hub with their flexible bellows segments.

The center of the hub 61 is located at the intersection of the x-axis and the y-axis of the instrumented baseball base. The battery pack 33 supplies electrical power to the entire instrumentation package assembly and is housed in the center of 61. The battery pack is located at the center of the instrumentation package assembly in order to achieve balance and easy serviceability via access lid heat sink 59. 59 serves as an access lid and as a heat sink to cool the electronics in the instrumentation package assembly.

The instrumentation package assembly electronics, for example 2, is identical in each of the eight instrumentation package assembly elements 46, 11, 13, 22, 23, 32, 34 and 44. A block diagram of the electronics is shown in FIG. 36D and FIG. 36E.

The instrumentation package assembly's skin is made of polycarbonates, ABS and fiber reinforced plastics which are non-conductors of electricity. It is necessary to use a skin made of a non-conducting material so as to allow radio signals to radiate thru it and not reflect or obstruct radio signals from the antenna 58 which might interfere with wirelessly televising to and from the remote base station. The remote base station and the antenna array relay junction are disclosed in FIG. 59A and FIG. 59B.

The instrumentation package assembly's network transceiver electronics within the eight instrumentation package assembly's elements 46, 11, 13, 22, 23, 32, 34 and 44 wirelessly transmit real-time pictures and sounds from the eight cameras 47, 9, 14, 20, 25, 31, 35 and 43 and four microphones 54, 55, 56, and 57 via the antenna array elements 58, also known as intentional radiators, to the antenna array relay junction.

A remote base station antenna disclosed in FIG. 59A and FIG. 59B is deployed in the baseball stadium and receives radio signals from the instrumented baseball base's antenna array 58. The antenna array elements 58 are in quadrature to radiate radio signals to the antenna array relay junction with sufficient gain so as to overcome RF noise and provide for a large enough gain bandwidth product to accommodate real-time SD/HD picture quality requirements. The antenna array 58 is a dual parallel antenna array. The instrumentation package assembly's network transceivers also provide a wireless means for the instrumented baseball base to receive command and control radio signals from the remote base station.

The televised pictures and sounds are taken directly by the instrumentation package assembly's eight cameras 47, 9, 14, 20, 25, 31, 35 and 43 and microphones 54, 55, 56 and 57. The instrumentation package assembly hub 61 is mounted within the instrumented baseball base that is in play on the baseball playing field. The instrumentation package assembly 61 wirelessly communicates the pictures and sounds from the instrumented baseball base to the antenna array relay junction located near the baseball playing field inside the baseball stadium. The picture and sounds are then relayed from the antenna array relay junction to the remote base station for final processing and dissemination. The sounds received from each of the microphones by the remote base station are processed using special software to produce surround sound which is broadcast to the TV viewing audience.

A block diagram showing the detailed flow of electrical signals and data in the instrumentation package assembly is disclosed in the preferred embodiment of the present invention shown in FIG. 36D and FIG. 36E.

Each instrumentation package assembly element 46, 11, 13, 22, 23, 32, 34 and 44 contains it own camera lens, camera, and supporting electronics. Each of the four instrumentation package assembly elements 46, 11, 13, 22, 23, 32, 34 and 44 contains all the electronics for wirelessly televising pictures. Four microphones 54, 55, 56 and 57 are located above the instrumentation package assembly 61 to televise sound. The antenna array 58 is also located above the instrumentation package assembly 61.

The eight instrumentation package assembly elements 46, 11, 13, 22, 23, 32, 34 and 44 are mounted inside the instrumented baseball base using four buffer plates 8, 21, 24 and 36 that act as bearings for the instrumentation package assembly elements 46, 11, 13, 22, 23, 32, 34 and 45. The buffer plate mechanically supports the ends of each instrumentation package assembly elements 46, 11, 13, 22, 23, 32, 34 and 44. One buffer plate supports two instrumentation package assembly elements. For example, buffer plate 8 supports instrumentation package assembly elements 46 and 11. The buffer plates are disclosed in FIG. 21N and FIG. 21O and FIG. 21P.

Each instrumentation package assembly element 46, 11, 13, 22, 23, 32, 34 and 44 contains a miniature SD/HD TV camera and supporting electronics. The cameras 47, 9, 14, 20, 25, 31, 35 and 43 and supporting electronics are housed together within the instrumentation package assembly element 46, 11, 13, 22, 23, 32, 34 and 44.

The x-y plane of each instrumentation package assembly element 46, 11, 13, 22, 23, 32, 34 and 45 is aligned normal to the z-axis of the instrumented baseball base and perpendicular to each of its respective side of the instrumented baseball base. Each camera 47, 9, 14, 20, 25, 31, 35 and 43 is positioned respectively at the end of each of the four instrumentation package assembly elements 46, 11, 13, 22, 23, 32, 34 and 44 looks out through the instrumented baseball base's sides.

The instrumentation package assembly elements 46, 11, 13, 22, 23, 32, 34 and 44 have flexible corrugated bellows skin sections 46, 11, 13, 22, 23, 32, 34 and 44. The length of the instrumentation package assembly elements 46, 11, 13, 22, 23, 32, 34 and 44 are each approximately ⅓ the length of a side of the instrumented baseball base.

The diameter of the instrumentation package assembly elements 46, 11, 13, 22, 23, 32, 34 and 44 is kept to a minimum in order to minimize their footprint inside the instrumented baseball base. The dimension of the outside diameter of the eight corrugated bellows skins 46, 11, 13, 22, 23, 32, 34 and 44 of the instrumentation package assembly elements is governed largely by the physical diagonal dimension of the largest components within the instrumentation package assembly elements 46, 11, 13, 22, 23, 32, 34 and 44, like the SD/HD camera's CCD sensor array.

The eight corrugated bellows segments 46, 11, 13, 22, 23, 32, 34 and 44 of the instrumentation package assembly elements act to connect their respective instrumentation package assembly elements to the central body 61 of the instrumentation package assembly which acts as their hub. The connection is sealed with o-rings (not shown) and is air-tight.

The corrugated bellows segments 46, 11, 13, 22, 23, 32, 34 and 44 also put longitudinal mechanical pressure on the instrumentation package assembly elements along their mechanical axes 1, 4, 16, 18, 27, 29, 37 and 41 thereby pushing the instrumentation package assembly elements against their respective buffer plates 8, 21, 24 and 36 and maintaining alignment and contact between them despite shocks and vibrations.

The eight corrugated bellows segments 46, 11, 13, 22, 23, 32, 34 and 44 of the eight instrumentation package assembly elements 46, 11, 13, 22, 23, 32, 34 and 44 are joined at the center of the instrumentation package assembly 61 at the central hub. The central hub houses the battery pack 33 which supplies electrical power to each of the instrumentation package assembly elements 46, 11, 13, 22, 23, 32, 34 and 44 and their electronic circuits. The eight instrumentation package assembly elements are like spokes on a wheel.

The corrugated bellows sections 46, 11, 13, 22, 23, 32, 34 and 44 of the instrumentation package assembly's elements skin allows the eight instrumentation package assembly elements to flex, stretch and compress when the instrumented baseball base is impacted during handling and/or by players during the game. This enables the instrumentation package assembly elements to resist shock and vibration. Additionally, the corrugated bellows sections 46, 11, 13, 22, 23, 32, 34 and 44 allow the instrumentation package assembly to act as a spring and compress or expand its length without damaging the contents of the instrumentation package assembly. When circumstances arise where the players tend to crush the instrumented baseball base, the instrumentation package assembly will compress or expand instead of breaking. The corrugated bellows segments 46, 11, 13, 22, 23, 32, 34 and 44 also put a pre-loaded longitudinal mechanical pressure on the instrumentation package assembly elements along their mechanical axes 1, 4, 16, 18, 27, 29, 37 and 41 thereby pushing them against their respective buffer plates 8, 21, 24 and 36 and maintaining contact between them despite shocks and vibrations.

Cameras 47, 9, 14, 20, 25, 31, 35 and 43 are mounted in their respective instrumentation package assembly elements 46, 11, 13, 22, 23, 32, 34 and 44. In many venues, the eight cameras 47, 9, 14, 20, 25, 31, 35 and 43 are chosen to be identical to each other. However, there are occasions when one or more of the eight cameras 47, 9, 14, 20, 25, 31, 35 and 43 may be chosen to be different from the others in order to accomplish their joint mission of maximizing the entertainment of the viewing audience. For example, the view of different baseball stadiums may be covered more optimally by using a special camera(s) on one or more of the sides of the baseball base. Since it is contemplated that there will be three instrumented baseball bases in use most of the time, for example at $1^{st}$, $2^{nd}$ and $3^{rd}$ bases, the cameraman can choreograph the playing field coverage and set up the cameras 47, 9, 14, 20, 25, 31, 35 and 43 and their respective lens combinations 48, 7, 15, 19, 26, 30, 38 and 42 like a symphony orchestra to maximize the entertainment and viewing pleasure of the on-looking television audience. The field of view and the magnification for example may be mixed. The optical axes of the eight cameras 47, 9, 14, 20, 25, 31, 35 and 43 are coplanar and are arranged at ninety degree intervals to one another around the sides of the instrumented baseball base. This arrangement permits the eight cameras 47, 9, 14, 20, 25, 31, 35 and 43 to look out from the sides of the instrumented baseball base and cover a field of view covering four quadrants of the playing field.

Each one of the eight TV cameras is located at its respective side of the instrumented baseball base. The TV cameras 47, 9, 14, 20, 25, 31, 35 and 43 are aligned within the instrumentation package assembly elements 46, 11, 13, 22, 23, 32, 34 and 44 so they yield upright images of the baseball playing field. Each camera is looking out at a different quadrant from the instrumentation package assembly 61 and the instrumented baseball base.

The optical and mechanical axis 1, 4, 16, 18, 27, 29, 37 and 41 of the cameras 47, 9, 14, 20, 25, 31, 35 and 43 respectively, are coplanar and mutually perpendicular to each other, and look out perpendicularly from their respective four sides of the instrumented baseball base onto the playing field.

The optical axes 1, 4, 16, 18, 27, 29, 37 and 41 of the eight cameras 47, 9, 14, 20, 25, 31, 35 and 43 within the instrumentation package assembly are aligned to be coplanar with the instrumentation package assembly assembly's x-y plane. Each camera 47, 9, 14, 20, 25, 31, 35 and 43 and its lenses 48, 7, 15, 19, 26, 30, 38 and 42 respectively are positioned respectively near the ends of each of the eight instrumentation package assembly elements 46, 11, 13, 22, 23, 32, 34 and 44 and look out through the instrumented baseball base's sides.

Camera lenses 48, 7, 15, 19, 26, 30, 38 and 42 look out thru their respective instrumentation package assembly elements 46, 11, 13, 22, 23, 32, 34 and 44, through their respective optical windows. For example, camera lens 7 looks through buffer plate assembly 8 through optical window 5. The camera lenses 48, 7, 15, 19, 26, 30, 38 and 42 look out at objects along their respective lines of sight 1, 4, 16, 18, 27, 29, 37 and 41; and they image the objects onto their respective cameras 47, 9, 14, 20, 25, 31, 35 and 43.

A variety of different camera lens 48, 7, 15, 19, 26, 30, 38 and 42 types, with different lens setting capability, can be used providing they are small in size. The auto iris setting permits the camera lenses 48, 7, 15, 19, 26, 30, 38 and 42 to automatically adjust for varying lighting conditions on the field. The auto focus setting permits the camera lenses 48, 7, 15, 19, 26, 30, 38 and 42 to adjust focus for varying distances of the players and action subjects on the field.

When a baseball is hit and a player is rounding the bases, the distance of a player from one base may be decreasing while the distance to another base may be increasing. Each camera lens 48, 7, 15, 19, 26, 30, 38 and 42 can be independently and simultaneously commanded and controlled to auto focus on their respective players. The rearward camera may be looking at the back of a player while the forward camera may be looking at the front of the player. If the player slides into the forward instrumented baseball bas, the forward base camera will catch the slide up close. The forward instrumented baseball base camera and microphones will capture all the action. While the player is running, his pictures and sounds are wirelessly being transmitted from the instrumented baseball base.

In certain venues where stereo 3-D is not required from every side of the four sides of the instrumented baseball base, the stereo 3-D camera pair that typically has two identical lenses on a side of the instrumented baseball base may be replaced with two dissimilar lenses having different focal length ranges and fields of view for example. Under these same circumstances, the identical cameras of the 3-D stereo camera pair may be replaced with two dissimilar cameras on a side of the instrumented baseball base. For example, the 3-D stereo camera pair that faces the crowd of spectators from the side of an instrumented 3$^{rd}$ base along the third base line may be considered to be non-essential by the cameraman. The camera man may elect to set two dissimilar focal lengths into the lenses used on that side of the instrumented 3$^{rd}$ base facing the crowd of spectators. One lens may be set to a long focal length for close-up facial expressions of the crowd, where the other lens may be set to a short focal length for wider shots of the crowd.

Each of the four microphones 54, 55, 56 and 57 listens for sounds from the playing field from their vantage points above the hub and main body of the instrumentation package assembly inside the instrumented baseball base. The four condenser microphones 54, 55, 56 and 57 enable the viewing audience to hear real-time contacts, impacts and shocks to the instrumented baseball base. Simultaneously live TV pictures are taken by each of the four TV cameras of their respective fields of view of the live action on the playing field from each of the instrumentation package assembly elements 46, 11, 13, 22, 23, 32, 34 and 44.

The condenser microphones 54, 55, 56 and 57 and antenna 58 are attached above the top of the instrumentation package assembly 61. The microphones 54, 55, 56, and 57 hear any sounds produced by physical contact of the instrumented baseball base's cover with any external thing, including for example air currents felt on the cover from wind on the baseball field or by a player trampling on the instrumented baseball base.

Antenna 58 is used to wirelessly transmit TV signals from each of the cameras 47, 9, 14, 20, 25, 31, 35 and 43 and microphones 54, 55, 56 and 57 in each of the instrumentation package assembly elements 46, 11, 13, 22, 23, 32, 34 and 44 respectively to the remote base station via the antenna array relay junction. Antenna 58 transmits the TV signals to the remote base station antenna which relays the TV signals to the remote base station for final processing and dissemination.

The remote base station relays control signals to the instrumentation package assembly via the antenna array relay junction, which in turn transmits the control signals to antenna 58. These control signals control the electronic and mechanical functions inside the instrumentation package assembly.

As an alternative example, the antenna array 58 could be replaced with a helix antenna (not shown) with similar dimensions wound on the inside diameter of the instrumentation package assembly.

The instrumentation package assembly's 61 battery pack 33 is wirelessly charged by magnetic induction before games on an as needed basis, using the battery pack charging station unit disclosed in the preferred embodiment shown in FIG. 37D and FIG. 37E and FIG. 37F. The battery pack charging station unit is placed on the top of the instrumented baseball base when it is charging the battery pack 33.

Charging of the battery pack 33 is accomplished wirelessly by inductive coupling. The instrumented baseball base's two inductive pickup coils 12 and 51 act as the secondary windings on an air core transformer. Time varying magnetic flux is furnished to 12 and 39 by the primary windings of the battery pack charging station unit.

The bottom induction coil 51 is attached to the bottom of access lid heat sink 59. Its wiring is routed up into the main body 61 of the instrumentation package assembly through the bottom access lid heat sink 59. The lower coil 51 is wound on the outside of the access lid heat sink 59 on the bottom of the instrumentation package assembly 61. The access lid 59 heat sink is a circular plate. The access lid heat sink 59 can be removed in order to service the instrumentation package assembly 61.

There is a seal (not shown) around the access lid heat sink 59 which is air-tight. There is a gas valve 60 mounted on the access lid heat sink 59. The access lid heat sink 59 serves as an access lid and as a heat sink to cool the electronics in the instrumentation package assembly. The purpose of the gas valve 60 is to permit pressurized dry nitrogen gas to be pumped into the instrumentation package assembly's cavity to prevent the entry of moisture and dirt which would impair the function of the optics, mechanics and electronics inside the cavity.

Induction coil 51 is located on the bottom of the central hub assembly 61. Induction coil 12 is located on the top of the central hub assembly 61. A source of electrical power which is external to the instrumented baseball base is inductively coupled into the induction coils 12 and 51. An external electrical primary induction coil unit is used to inductively couple power into induction coils 12 and 51 for the purpose of charging the battery pack 33. The primary induction coil is housed in a battery pack charging unit disclosed in FIG. 37D and FIG. 37E and FIG. 37F. The battery pack charging unit is placed flat on top of the instrumented baseball base coaxially above coils 12 and 51. A block diagram showing the electrical battery charging circuit involving the induction coils 12 and 51 and the battery pack 33 is shown in FIG. 24. The induction coils 12 and 51 feed this power to the battery pack 33 in order to charge it. The battery's charging coils 12 and 51 are wound on the outside diameter at both top and bottom of the central hub of the instrumentation package assembly 61 and act electrically as a transformer's secondary winding. The coils 12 and 51 are wound on the outside diameter of the instrumentation package assembly to keep any heat they may produce away from the contents of the instrumentation package assembly while the battery pack 33 is being charged. The number of turns in each charging coil 12 and 51 is made large enough to inductively couple a sufficient number of magnetic lines of flux from the primary coil of the battery charging station unit so as to charge the battery pack 33 in a reasonably short time before games. When the battery pack charging station unit is placed on top of the instrumented baseball base, the charging coils 12 and 51 receive electrical energy inductively coupled from the primary coils of the battery pack charging station unit disclosed in FIG. 37D and FIG. 37E and FIG. 37F. Access lid heat sink 59 can be removed from the bottom of the instrumentation package assembly in order to service the contents of the instrumentation package assembly, such as its cameras, camera lenses, microphones, antenna, electronics and battery pack. The instrumentation package assembly is filled with a dry pressurized gas like nitrogen to prevent the entry of moisture or dirt. The seals between the eight optical windows and the four buffer plates, for example seal 6 between optical window 5 and the small diameter cylindrical end of buffer plate 8, prevent the dry gas from leaking out of the instrumentation package assembly 61 enclosure through the window and the buffer plate. desiccant is disposed near the SD/HD camera lenses 48, 7, 15, 19, 26, 30, 38 and 42 and optical windows 10, 20, 29 and 37 to collect and prevent any moisture build-up within the instrumentation package assembly 61.

FIG. 44A and FIG. 44B

The detailed physical elements disclosed in the instrumented baseball home plate drawings shown in FIG. 44A and FIG. 44B are identified as follows: 1 is the y-axis of symmetry of the instrumented baseball home plate. 2 is the instrumented baseball home plate. 3 is the upper induction coil used to charge the battery pack inside the instrumentation package assembly. 4 is the x-axis of symmetry of the instrumented baseball home plate. 5 is the left side of the instrumented baseball home plate. 6 is the top of the instrumented baseball home plate. 7 is the central body of the instrumentation package assembly. 8 is the Type VIII buffer plate assembly. 9 is the bellows segment of the instrumentation package assembly. 10 is the lower induction coil used to charge the battery pack inside the instrumentation package assembly. 11 is the bottom of the instrumented baseball home plate. 12 is the right side of the instrumented baseball home plate. 13 is the plane-parallel-flat optical window. 14 is the side of the instrumented baseball home plate that faces the pitcher. 15 is the side of the instrumented baseball home plate. 16 is the shock absorbing encapsulating material. 17 is the z-axis of the instrumented baseball home plate and the optical z-axis of the instrumentation package assembly and camera 24. 18 is the upper protective cover plate shield. 19 is the lower protective cover plate shield. 20 is a wireless radio antenna. 21 is a wireless radio antenna. 22 is a wireless radio antenna. 23 is a wireless radio antenna. 24 is the camera. 25 is the camera lens. 26 is the beveled edge around the top of the home plate. 27 is a microphone. 28 is a microphone. 29 is a gas valve. 30 is an access lid heat sink. 31 is the battery pack. 32 is the electronics. 33 is a microphone. 34 is a microphone connector.

FIG. 44A is a top view of a one camera instrumented baseball home plate.

FIG. 44B is a side view of a one camera instrumented baseball home plate.

Referring to drawings FIG. 44A and FIG. 44B, in a preferred embodiment, an instrumented baseball home plate is disclosed. The instrumented baseball home plate employs a single camera instrumentation package assembly 7 substantially identical to the instrumentation package assembly shown in FIG. 33A and FIG. 33B and FIG. 33C. It uses the Type VIIIB buffer plate assembly shown in FIG. 21QQ and FIG. 21RR and FIG. 21SS.

The present invention contemplates an instrumented baseball home plate, which when stationed on any baseball playing field at any traditional home plate location, can wirelessly and autonomously televise baseball games under command and control of the remote base station. The remote base station is disclosed in FIG. 59A and FIG. 59B and FIG. 60A and FIG. 60B and FIG. 61A and FIG. 61B.

The present invention also contemplates the instrumented baseball home plate to be equipped with an instrumentation package assembly 7 that is mounted and encapsulated inside the instrumented baseball home plate, which wirelessly televises pictures and sounds of baseball games from its camera 24 and its microphones 27, 28 and 33 contained therein. The camera 24 is housed in an instrumentation package assembly element 9 which is a principal part of the instrumentation package assembly. Details of the instrumentation package assembly is shown in FIG. 33A and FIG. 33B. The instrumentation package assembly uses the identical instrumentation package assembly element disclosed in FIG. 33D.

It is understood that as the state of the art in TV camera 24 technology advances, that there will be other better TV cameras that use other than CCD technology. The present invention will work equally well with them as they become available. Therefore, the present invention uses CCD TV cameras as an example of TV cameras that may be used simply because they are the best that today's technology offers, and therefore the present invention is not confined only to their sole use in the future.

Referring to the disclosed instrumented baseball home plate shown in FIG. 44A and FIG. 44B, the instrumented baseball home plate has a single instrumentation package assembly 7 mounted inside the instrumented baseball home plate. The instrumentation package assembly 7 is encapsulated inside the instrumented baseball home plate using a shock absorbing white rubber encapsulating material 16 that fills the entire cavity of the instrumented baseball home plate.

Details of instrumentation package assembly 7 are shown in FIG. 33A and FIG. 33B and FIG. 33C. The instrumentation package assembly 7 has a single instrumentation package assembly element which is one of its principal components and is disclosed in FIG. 33D. The instrumentation package assembly 7 carries a single CCD sensor arrayed camera 24 and two microphones 27 and 28. The camera 24, camera lens 25 and electronics 32 are parts of the instrumentation package assembly element disclosed in FIG. 33D.

The instrumentation package assembly 7 is mechanically mounted inside the instrumented baseball home plate using the buffer plate assembly 8. The upper small diameter end of the instrumentation package assembly element is shown plugged into the buffer plate assembly 8. The buffer plate assembly 8 is embedded and encapsulated into the instrumented baseball home plate using the shock absorbing material 16. The instrumentation package assembly 7 is mechanically protected inside the instrumented baseball home plate using an upper and lower protective cover shields 18 and 19 respectively.

The two protective cover plates 18 and 19 are embedded and molded into the instrumented baseball home plate using the shock absorbing material 16. Protective cover plate 18 is on the top and protective cover plate 19 is on the bottom of the instrumented baseball home plate. The top protective cover plate 18 is referred to as the upper protective cover plate. It is shown in FIG. 56. The bottom protective cover plate 19 is referred to as the lower protective cover plate. These protective cover plates 18 and 19 sandwich the instrumentation package assembly 7 between them and protect it and its contents from being damaged.

Except for the optical windows, the external appearance of both the instrumented baseball home plate and the conventional baseball home plate are identical, both being made of the same white rubber material 16. In addition, their size, shape, color and texture are identical. The weights of the instrumented baseball home plate and the conventional baseball home plate are nearly identical. Details of the conventional baseball home plate are shown in FIG. 41.

The instrumentation package assembly 7 is sandwiched between the top and bottom protective cover plates 18 and 19. The purpose of these protective cover plates 18 and 19 is to act as mechanical shields to protect the instrumentation package assembly 7 from being damaged by impacts during the game. During the normal course of the game, the top of the instrumented baseball home plate will be hit and crushed by the players and by their equipment. For example, the players may step on the instrumented baseball home plate or slide into it. They may even drop their bats on it. The two protective cover plates 18 and 19 protect the instrumentation package assembly 7 within the instrumented baseball home plate from physical damage due to these hits.

The outermost body region of the top protective cover plate 18 is made substantially spherically dome shaped. There is a flat region in the middle of the upper protective cover plate 18 surrounding the clearance bore for camera 24. The entire body of the bottom or lower protective cover plate 19 is made flat. The top and bottom protective cover plates 18 and 19 both have rounded outer edges. The edges are rounded to insure that the baseball players will not be injured by them if the players crash into the instrumented baseball home plate.

A variety of materials can be chosen for the protective cover plates 18 and 19 in the present preferred embodiment. Material examples are polycarbonates, ABS, and fiber reinforced plastics. These materials have the advantage that they are lightweight and stiff, enabling the thickness of the cover plates to remain thin while still delivering the significant stiffness needed to perform their protective function of mechanical shielding the instrumentation package assembly in the limited space they can occupy within the instrumented baseball home plate. They have the additional advantage in that they are transparent to the transmitted and received radio waves which need to move to and from the wireless radio antennas 20, 21, 22, and 23 inside the instrumented baseball home plate without absorption or reflection therein.

The space between the top, bottom and sides of the instrumented baseball home plate and the protective cover plates 18 and 19 is filled with encapsulating material 16. Synthetic rubber is an example of encapsulating material that is used. When cured, this encapsulating material 16 acts as cushioning to absorb shock and vibration to the instrumented baseball home plate that may be transferred to the instrumentation package assembly 7. The molding material 16 encapsulates the upper and lower protective cover plates and maintains their positions inside the molded instrumented baseball home plate. The space between the protective cover plates and the instrumentation package assembly 7 is also filled with the same encapsulating material 16. When cured, this encapsulating material acts as cushioning to absorb shock and vibration to the instrumentation package assembly 7. The molting material encapsulates the instrument package assembly 7 inside the instrumented baseball home plate and thereby maintains its position inside the molded instrumented baseball home plate. The top edge 26 of the instrumented baseball plate is beveled at 45 degrees the same as the standard conventional professional league baseball plate shown in FIG. 41 in order to protect the players who hit against it.

The top protective cover plate 18 is spherically dome shaped in its outer region, and flattened in its inner region close to the optical window 13. The purpose of making it flattened near the optical window 13 is to provide maximum protection for the optical window 13 whose surface is at the very top of the instrumented baseball home plate. The flattened shape enables the protective cover plate 18 to surround the optical window 13 at the top of the instrumented baseball home plate where the optical window 13 is most likely to be exposed to the greatest threat of damage due to hits to the top of the instrumented baseball home plate. The upper protective cover plate 18 is buried in encapsulating material at the center top of the instrumented baseball home plate around the optical window 13. The dome shape enables the upper protective cover plate 18 to come very close to the top center of the instrumented baseball home plate where the players will have only grazing contact with its surface 6 if they crash into the instrumented baseball home plate, thereby eliminating the threat of injury to the players if they hit the top of the instrumented baseball home plate.

The spherical shape of the upper protective cover plate 18 causes its edge to be rounded downward and away from the top of the outer skin and places the edge well below the top surface 6 of the outer skin of the instrumented baseball home plate and away from the players.

The lower protective cover plate 19 is flat and is buried in the encapsulating material 16 just above the bottom surface 11 of the instrumented baseball home plate. The body of the lower protective cover plate 19 can be made flat because it is buried in the ground and there is no danger of the baseball players coming into violent contact with it. The flat shape is easier to make and less expensive to manufacture. It can also be made thicker than the upper protective cover plate 18 because there is more free space near the bottom of the instrumented baseball home plate that it can occupy. Its thickness is not physically restrained because of its location, as is the case with the upper protective cover plate 18 which is physically located between the top surface 6 and the buffer plate 8.

In both cases, the rounded edges of the protective cover plates 18 and 19 are substantially distant from the top 6 of the instrumented baseball home plate to protect the players from impacting against them. The top protective cover plate 18 is detailed in FIG. 56. The edge of the top protective cover plate 18 is rounded and all sharp corners are removed so as to make it safe to the players if they press violently against the instrumented baseball home plate.

The outer body of the top protective cover plate 18 is made spherically dome shaped. The spherical top of the dome faces upward. The top protective cover plate 18 has a bored hole in it. The purpose of the bore is to permit the cylindrical end of the buffer plate 8 containing the camera 24 optical window 13 to pass through it, and through the encapsulating material 16, and through the top 6 of the instrumented baseball home plate. The top protective cover plate 18 is made flat in its inner region near to its circular bore so it can surround the optical window 13 near the very top of the instrumented baseball home plate and shelter it from hits, while its spherical dome shape in its outer region keeps the edge of the protective cover plate 18 far down below the top of the instrumented baseball home plate and well below the surface of the playing field within the ground, so the edge would not be felt by the players if they impacted on the top surface of the instrumented baseball home plate. The body of the bottom protective cover plate 19 is made flat and has rounded corners like the top protective cover plate 18 for the same reason.

The upper protective cover plate 18 protects the instrumentation package assembly 7 from being crushed and damaged by the players during the game. The instrumentation package assembly is located below the upper protective cover plate 18 inside of the instrumented baseball home plate. In order to achieve its purpose, the upper protective cover plate 18 must be stiff. The entire volume between the top 6 of the instrumented baseball home plate 2 and the upper protective cover plate 18 is filled with a resilient encapsulation padding material 16. The entire volume between the upper protective cover plate 18 and the instrumentation package assembly 7 is filled with the same resilient encapsulation padding material 16. The domed shape of the upper protective cover plate 18 is very important. It completely covers and wraps the instrumentation package assembly 7 and its radio antennas 20, 21, 22, and 23, which are below it, and diverts trauma and forces that occur to the top 6 of the instrumented baseball home plate 2 during the game away from the instrumentation package assembly 7 and its antennas 20, 21, 22, and 23. The outer edge of the upper protective cover plate 18 is bent downward and past the outermost tips of the radio antennas 20, 21, 22, and 23 to protect them. The curvature of the upper protective 18 cover plate 18 is made large enough so that the dome completely covers around them. The dome shape allows the thickness of the padding 16 between the top 6 of the instrumented baseball home plate 2 and the upper protective cover plate 18 to increase as the radial distance from the center 13 of the instrumented home plate 2 increases outwardly.

The optical window 13 permits the camera 24 mounted inside the instrumentation package assembly 7 of the instrumented baseball home plate 2 to look out through the top 6 of the instrumented baseball home plate 2 onto the playing field during a baseball game and be protected from hazards such as rain, dirt and physical impacts. The hole in the top 6 of the instrumented baseball home plate 2 is made just large enough to prevent vignetting of the camera's field of view.

The optical window 13 is sealed to the small diameter cylindrical end of the buffer plate 8. The seals are airtight and waterproof to protect the camera 24, microphones 27 and 28, and the electronics within the instrumentation package assembly 7.

The optical window 13 is made strong to protect the camera lens 25 and camera 24 that are located beneath it. The optical window 13 is hard coated by vapor deposition with materials such as MgFl or SiO2 to help prevent the outer-most window 13 surface from being scratched during the game. The optical window 13 material itself is chosen to be strong. It is made from hard optical glass such as barium lanthanum borate glasses, or hard optical plastic like acrylic or polycarbonate, both of which are scratch resistant.

The optical window 13 is made small to make it inconspicuous to the players, and substantially preserve the instrumented baseball home plate's look-alike quality with the conventional major league home plate shown in FIG. 41; while still retaining sufficient clear aperture for the camera lens 25 to see events with SD/HD resolution on the playing field in prevailing light. A typical optical window 13 ranges in size from about ⅛ inch to ½ inches in diameter. Besides its small size, the optical window 13 is made additionally inconspicuous by making its antireflection coating a straw color to match the tan coloration of the ground dust around the instrumented baseball home plate.

The optical window 13 is plane-parallel-flat. It is disposed at the intersection of the x-axis and y-axis of the instrumented baseball home plate. The optical window 13 is positioned on the top of the instrumented baseball home plate so it is aligned with the chin line of the average batter, and roughly at the same location as the center of gravity of the conventional major league home plate shown in FIG. 41.

Optical windows having a spherical dome shape can also be used when a larger field of view is desired. The flat optical window can be easily unscrewed from the front of the buffer plate assembly 8 and replaced with a spherically domed shaped window. In another preferred embodiment, the outer surface of the window is spherical in shape and convex outward and shell-like as is necessary to permit the camera to see fields of view with extremely wide viewing angles approaching 90 degrees off the optical axis of the cameras. Shell-like implies that the inner and outer spherical surfaces of the optical window are concentric. In applications where extremely wide viewing angles are not required, the optical window surfaces can be made flat and plane parallel. The shell-like windows enable the camera to use lenses that have extremely wide viewing angles approaching 90 degrees off the optical axis of the camera lens without introducing bothersome optical aberrations and vignetting. The shell-like shape of the windows also imparts increased physical strength to the windows.

The optical window 13 is attached to buffer plate 8. The optical window 13 provides a portal through which cameras lens 25 can see out onto the playing field from inside the instrumented baseball home plate. The encapsulating material 16 provides shock absorbing padding between the outer top surface 6 of the instrumented baseball home plate and the protective cover plate 18. The encapsulating material 16 provides shock absorbing padding between the protective cover plate 18 and the buffer plate 8.

Camera lens 25 looks out thru the top 6 of the instrumented baseball home plate through its optical window 13 at objects angularly spread out around its respective axial line of sight 13 and images the objects it sees onto camera 24.

A variety of different camera lens 25 types with different lens setting capabilities, focal lengths and fields of view can be used. When enabled by the operator/cameraman in the remote base station, the auto iris setting permits the camera lens 25 to automatically adjust for varying lighting conditions on the field. The auto focus setting permits the camera lens 25 to adjust focus for varying distances of the players and action subjects on the field. The cameraman may elect to control the functions of the camera lenses himself from the remote base station by sending command and control signals from the remote base station to the instrumented baseball home plate. The cameraman can zoom, focus, and control the iris settings of the camera lenses from the remote base station.

For example, when a baseball is hit, and a player is rounding the bases, the distance of a player from home plate may be increasing or decreasing. The camera 24 within the instrumented baseball home plate can be independently and simultaneously commanded and controlled to auto focus on the player. As the player is rounding third base, if he decides to run for home plate, the instrumented baseball home plate's camera 24 and microphones 27 and 28 will capture all the action. While the player is running, his pictures and sounds are being wirelessly transmitted from the instrumentation package assembly 7 inside the instrumented baseball home plate to the remote base station for processing. The sounds received from each of the microphones by the remote base station are processed using special software to produce surround sound which is broadcast to the TV viewing audience.

If the player decides to slide into home plate, the instrumented baseball home plate camera 24 will enable the viewing audience to see the player slide into home plate, up close. The camera 24 will catch a detailed image of the player's sharp cleats as they strike the plate. The TV audience will experience the flight of chunks of dirt being thrown onto the plate. The microphones 27 and 28 will enable the TV viewing audience to hear the scraping and the thud of the cleats as they hit the plate. The TV audience will hear the chunks of dirt as they hit the plate. The TV viewing audience will see the face and the hand of the umpire as he reaches down to sweep the plate. The TV audience will hear and see the bristles of the umpire's brush as he sweeps the dirt off the plate.

Camera 24 is mounted inside the instrumentation package assembly 7. The optical axis 17 of the camera 24 is perpendicular to the top 6 of the instrumented baseball home plate. This arrangement permits the camera 24 to look upward and around its z-axis 17 from out of the top 6 of the instrumented baseball home plate. Utilization of an extremely wide angle lens 25 allows the TV viewing audience to see past the pitcher and down to the horizon of the baseball stadium.

When a player is running toward the instrumented baseball home plate from third base, the camera 24 can see where he is coming from. The camera 24 can see the player as he runs and touches the instrumented baseball home plate. The camera 24 can see the player as he is sliding into the instrumented baseball home plate. The TV audience will see and hear the player's cleats as they hit the instrumented baseball home plate. The camera 24 can see the catcher as he tags the player before the player touches the instrumented baseball home plate and scores a run. From the vantage point of the instrumented baseball home plate, the viewing audience can see the strained player darting for the instrumented baseball home plate. The viewing audience can see details of the player's feet as he attempts to slide into the instrumented baseball home plate. The viewing audience can see a close-up of the opposing team's catcher's attempt to tag him with the ball. As the baseball is thrown home, the viewing audience can see the catcher reach down for it close to the plate. The camera 24 vantage point at the instrumented baseball home plate gives the audience a viewing angle of the game never seen before by television viewing audiences. The instrumented baseball home plate's camera 24 gives the TV viewing audience unending contemporaneous shots that get across a sense of the action of being there—like a player in the game, which prior art cameras looking on from their disadvantaged viewing points from outside the playing field cannot get across.

The top 6 of the instrumented baseball home plate sits horizontally flat on the baseball playing field. The optical axis 17 of the camera 24 is the z-axis of the instrumentation package assembly 7 and the z-axis of the instrumented baseball home plate. Axis 17 is perpendicular to the top 6 of the instrumented baseball home plate. The instrumented baseball home plate is oriented in space so its z-axis 17 is perpendicular to the baseball field and pointing skyward.

The camera 24 looks upward out from the top 6 of the instrumented baseball home plate along and around its optical axis 17 through optical window 13. The camera 24 is aligned within the instrumentation package assembly 7 so that the camera 24 yields a wirelessly transmitted upright image to the TV viewing audience via radio antennas 20, 21, 22 and 23.

In the present preferred embodiment, camera 24 uses an extremely wide angle lens 25 with zoom capability. Even though camera 24 is pointed skyward, it can see past the pitcher along y-axis 1 right down to the outfield stadium horizon because of its near 180 degree field of view. This is a distinct advantage of extremely wide angle lenses over other types of lenses. However, it should be pointed out that the cameraman may elect to use a variety of camera lenses 25 with different capabilities depending on the visual effects he wishes to convey to the TV viewing audience. For example, the cameraman may elect to use a camera lens 25 with a narrower field of view in order to concentrate the attention of the TV viewing audience on the batter's taut and sweaty stubble face.

The camera 24 is aligned within its instrumentation package assembly 7 so that it yields wirelessly transmitted upright images of objects that appear in the TV picture frame between the center and the bottom of the TV picture frame. This alignment is controlled remotely from the remote base station by the cameraman. This can be accomplished in any one of four different primary modes. Each of these modes conveys its own spectacular viewing angle of the game to the TV viewing audience. Each of these four modes is achieved by physically rotating the camera 24 and its lens 25 about the z-axis 17 by using a electro-mechanical actuating device that is mechanically coupled to the camera 24 and lens 25 inside the instrumentation package assembly element.

Refer to FIG. 33D for the specification of the instrumentation package assembly element, and the electro-mechanical actuating device and its eight mechanical stops. The electro-mechanical actuating device has four primary stops that are mechanically detented 90 degrees apart from one another. The mechanical actuating device has four secondary mechanical stops that are mechanically detented 90 degrees apart from one another, and are angularly located 45 degrees between the primary mechanical stops. The electro-mechanical actuating device is housed within the instrumentation package assembly 7. The electro-mechanical actuating device can rotate and detent the camera 24 and lens 25 together to any one of its eight stops. The cameraman in the remote base station selects which of the eight mechanical stops is to be used, and sends a signal to the instrumentation package assembly 7 to set the camera 24 and lens 25 to the desired mechanical stop he selected.

The horizontal space around the center of the instrumented baseball home plate's instrumentation package assembly is indexed electronically into a counter-clockwise sequence of eight angular directions. Each angular direction is forty-five degrees apart from its sequential predecessor. The center of the instrumentation package assembly is where the x-axis 4 intersects the y-axis 1 and the z-axis 17. The x-axis 4, y-axis 1, and the z-axis 17 are orthogonal to one another.

In order of their sequence, the eight angular directions are the pitcher, forty-five degrees counter-clockwise from the pitcher, the right handed batter, forty-five degrees counter-clockwise from the right handed batter, the catcher, forty-five degrees counter-clockwise from the catcher, the left handed batter, and forty-five degrees counter-clockwise from the left handed batter.

The eight angular directions are referenced to the parts of the instrumented baseball home plate as follows: side 14, forty-five degrees counter-clockwise from side 14, side 5, side 2, the apex, side 15, side 12, and forty-five degrees counter-clockwise from side 12.

Of the eight angular directions, the four primary angular directions are as follows: the pitcher, the right handed batter, the catcher, and the left handed batter. These will be referred to as the $1^{st}$, $3^{rd}$, $5^{th}$ and $7^{th}$ angular directions. The four secondary angular directions are as follows: forty-five degrees counter-clockwise from the pitcher, forty-five degrees counter-clockwise from the right handed batter, forty-five degrees counter-clockwise from the catcher, and forty-five degrees counter-clockwise from the left handed batter. These will be referred to as the $2^{nd}$, $4^{th}$, $6^{th}$ and $8^{th}$ angular directions.

The numbering scheme for the eight mechanical stops of the instrumentation package assembly 7 is made to concur with the numbering scheme for the eight angular directions around the instrumented baseball home plate.

In preparation for the time when the instrumentation package assembly 7 is encapsulated inside the mold of the instrumented baseball home plate, the instrumentation package assembly 7 is first plugged into and aligned in buffer plate assembly 8. The instrumentation package assembly 7 and buffer plate assembly 8 are then loaded into the mold on top of the lower cover plate shield 19. The instrumentation package assembly is carefully positioned in the mold, and then aligned with its mechanical z-axis 17 normal to the top 6 of the mold. The instrumentation package assembly 7 is then precisely aligned in rotation in the mold about its mechanical axis 17 so that its $1^{st}$ primary stop for its instrumentation package assembly element is aligned with the y-axis's 1 six o'clock angular direction, toward side 14, of the instrumented baseball home plate. The mold is then filled with encapsulating material 16 with the upper cover plate shield 18 placed on top of the buffer plate assembly 8.

The previous alignment procedure assures that after the encapsulating material 16 has cured, the four primary stops of the electro-mechanical actuator inside the instrumentation package assembly are aligned to side 14, side 5, apex, and side 12 of the instrumented baseball home plate respectively. Side 14 faces the pitcher, side 5 faces a right handed batter, the apex faces the catcher, and side 12 faces a left handed batter. Also, the $4^{th}$ secondary stop will be aligned to side 2, and the $6^{th}$ secondary stop will be aligned to side 15.

Now, whenever the electro-mechanical actuating device is driven to the $1^{st}$ primary stop, camera 24 will now produce precisely centered upright images of any objects that lie along the y-axis 1 in the six o'clock angular direction toward side 14 of the instrumented baseball home plate and the pitcher.

Whenever the electro-mechanical actuating device is driven to the 3rd primary stop, camera 24 will now produce precisely centered upright images of any objects that lie along the x-axis 4 in the three o'clock angular direction toward side 5 of the instrumented baseball home plate and a right handed batter.

Whenever the electro-mechanical actuating device is driven to the $5^{th}$ primary stop, camera 24 will now produce precisely centered upright images of any objects that lie along the y-axis 1 in the twelve o'clock angular direction toward the apex of the instrumented baseball home plate and the catcher.

Whenever the electro-mechanical actuating device is driven to the 7th primary stop, camera 24 will now produce precisely centered upright images of any objects that lie along the x-axis 4 in the nine o'clock angular direction toward side 12 of the instrumented baseball home plate and a left handed batter.

When the instrumented baseball home plate is placed horizontally on the baseball playing field at its traditional location on the baseball diamond, it is then carefully positioned so its y-axis is aligned with the centerline of the baseball diamond running from the instrumented baseball home plate to second base.

Now, whenever the cameraman in the remote base station commands the camera 24 to rotate and go to the 1st mechanical stop, the electro-mechanical actuator specified in FIG. 33B and FIG. 33C drives the camera's 24 enclosure against the 1st mechanical stop and detents it there. When using an extremely wide field camera lens, the TV audience will see a picture of the pitcher standing upright on the pitcher's mound of the baseball playing field in the lower half of the TV viewer's screen.

Whenever the cameraman in the remote base station commands the camera 24 to rotate and go to the 3rd mechanical stop, the electro-mechanical actuator specified in FIG. 33B and FIG. 33C drives the camera's enclosure against the 3rd mechanical stop and detents it there. When using an extremely wide field camera lens, the TV audience will see a picture of the right handed batter standing upright on the baseball playing field in the lower half of the TV viewer's screen.

Whenever the cameraman in the remote base station commands the camera 24 to rotate and go to the 5th mechanical stop, the electro-mechanical actuator specified in FIG. 33B and FIG. 33C drives the camera's enclosure against the 5th mechanical stop and detents it there. When using an extremely wide field camera lens, the TV audience will see a picture of the catcher squatted upright on the baseball playing field in the lower half of the TV viewer's screen.

Whenever the cameraman in the remote base station commands the camera 24 to rotate and go to the 7th mechanical stop, the electro-mechanical actuator specified in FIG. 33B and FIG. 33C drives the camera's enclosure against the 7th mechanical stop and detents it there. When using an extremely wide field camera lens, the TV audience will see a picture of the left handed batter standing upright on the baseball playing field in the lower half of the TV viewer's screen.

In the first primary mode where the cameraman selects the $1^{st}$ primary mechanical stop, the camera 24 and lens 25 are aligned in rotation inside its instrumentation package assembly 7 by the electro-mechanical actuating device so that the TV viewing audience sees the stadium horizon in the outfield near the bottom edge of the TV picture frame. (This is equivalent to what a person would see visually if he were laying flat down on the playing field with his head resting on the instrumented baseball home plate and looking upward with his feet facing the pitcher on side 14 of the instrumented baseball home plate.) The stadium outfield horizon appears horizontal in the TV picture frame at the bottom center of the TV picture frame. The pitcher appears to be standing upright on his mound just above the bottom of the TV picture frame. When the pitcher throws the baseball to the catcher, the TV audience will see the baseball approaching the center of the TV picture frame from the bottom of the TV picture frame. The size of the baseball grows larger as it gets closer to the camera inside the instrumented baseball home plate and the batter. Since the camera 24 is physically located below the batter inside the instrumented baseball home plate, an image of the underside of a right handed batter's chin and sweaty arm pits will appear just left of the center of the TV picture frame.

In the second primary mode, where the cameraman selects the 2$^{nd}$ primary mechanical stop, the camera 24 and lens 25 are aligned in rotation inside its instrumentation package assembly 7 by the electro-mechanical actuating device so that the TV viewing audience sees the stadium horizon in the outfield at the right side of the TV picture frame. (This is equivalent to what a person would see visually if he were laying flat down on the playing field with his head resting on the instrumented baseball home plate and looking upward with his feet facing a right handed batter on side 5 of the instrumented baseball home plate.). The pitcher appears to be standing on his mound toward the right hand side of the TV picture frame. When the pitcher throws the baseball to the catcher, the TV audience will see the baseball approaching the center of the TV picture frame from the image of the pitcher's hand which is right of center of the TV picture frame. The size of the baseball grows larger as it gets closer to the instrumented baseball home plate and the right handed batter. Since camera 24 is below the batter, an image of the underside of batter's chin and sweaty arm pits will occupy the space below the center of the TV picture frame. The right handed batter will appear to be standing near the bottom of the TV picture frame.

Camera 24 will enable the TV audience to see the baseball as it travels outward from the crack of the bat onto the playing field. The TV audience will see the baseball get smaller as it gets further away from the instrumented home plate and the batter. The image of the baseball will move from near the center of the TV picture frame toward the right of the TV picture frame if it is hit toward the outfield. The audience will see the batter drop the bat and scramble toward first base. The image of the bat will grow in size and appear to the TV viewing audience as though it was going to hit them in the face as it careens down on and strikes the instrumented baseball home plate. Members of the TV viewing audience will duck to avoid being hit by the bat. The microphones 27 and 28 enable the TV audience to hear the thud of the bat after the batter releases it and it hits the instrumented baseball home plate. The TV audience will hear the scraping by the batter's cleats on the ground as he scrambles to first base. The TV audience will see the size of the batter grow smaller as he runs toward first base and gets further from home plate.

In the third primary mode, where the cameraman selects the 3rd primary mechanical stop, the camera 24 and lens 25 are aligned in rotation inside its instrumentation package assembly 7 by the electro-mechanical actuating device so that the TV viewing audience sees the stadium horizon in the outfield at the top of the TV picture frame. The catcher appears to be squatting upright above the bottom of the picture. (This is equivalent to what a person would see visually if he were laying flat down on the playing field with his head resting on the instrumented baseball home plate and looking upward with his feet facing the catcher toward the apex of the instrumented baseball home plate) The baseball stadium outfield horizon appears horizontal in the picture frame at the top of the TV picture frame. When the pitcher throws the baseball to the catcher, the TV audience will see the baseball approaching the center of the TV picture frame from the image of the pitcher's hand which is near the center top of the TV picture frame. The size of the baseball grows larger as it gets closer to the instrumented baseball home plate and the batter. Since the camera 24 is below the batter, an image of the underside of batter's chin and sweaty arm pits will occupy the center right of the TV picture frame. The TV audience will hear the whoosh of air as the baseball passes above the instrumented baseball home plate. The TV audience will see the batter swing his bat, up close, to strike the baseball as it whizzes by. The TV audience will hear the rush of the air as the batter swings his bat. The TV audience will hear the loud crack of the bat as it strikes the baseball. The TV audience will see the baseball the moment it is hit by the bat. This will be an action packed event never before witnessed by a TV audience. Each of the pitched baseballs will produce breath taking excitement and expectations by the TV viewing audience. The TV audience will see the baseball as it travels outward from the crack of the bat onto the playing field. The TV audience will see the baseball get smaller as it gets further away from the instrumented home plate and the batter. The image of the baseball will move away from the center of the TV picture frame after it is hit. The audience will see the batter drop the bat and scramble toward first base. The image of the bat will grow in size and appear to the TV viewing audience as though it was going to hit them in the face as it careens down on and strikes the instrumented baseball home plate. Members of the TV viewing audience will duck to avoid being hit by the bat. The TV audience will hear the thud of the bat after the batter releases it and it hits the instrumented baseball home plate. The TV audience will hear the scraping by the batter's cleats on the ground as he scrambles to first base. The TV audience will see the size of the batter grow smaller as he runs toward first base and gets further from the instrumented baseball home plate.

In the fourth primary mode, where the cameraman selects the 4th primary mechanical stop, the camera 24 and lens 25 are aligned in rotation inside its instrumentation package assembly 7 by the electro-mechanical actuating device so that the TV viewing audience sees the baseball stadium horizon in the outfield at the left side of the TV picture frame. (This is equivalent to what a person would see visually if he were laying flat down on the playing field with his head resting on the instrumented baseball home plate and looking upward with his feet facing a left handed batter on side 12 of the instrumented baseball home plate.) The baseball stadium horizon outfield appears in the TV picture frame at the left hand side of the TV picture frame. The pitcher appears to be standing on his mound near the left hand side of the TV picture frame. When the pitcher throws the baseball to the catcher, the TV audience will see the baseball approaching the center of the TV picture frame from the image of the pitcher's hand which is left of center of the TV picture frame. The size of the baseball grows larger as it gets closer to the instrumented baseball home plate and the left handed batter. Since the camera is below the batter, an image of the underside of batter's chin and sweaty arm pits will be below the center of the TV picture frame. A left handed batter would appear to be standing upright with his feet near the bottom of the TV picture frame. The TV audience will hear the whoosh of air as the baseball passes above the instrumented baseball home plate. The TV audience will see the batter swing his bat, up close, to strike the baseball as it whizzes by. The TV audience will hear the rush of the air as he swings his bat. The TV audience will hear the loud crack of the bat as it strikes the baseball. The TV audience will see the baseball the moment it is hit by the bat. This will be an action packed event never before witnessed by a TV audience. Each of the pitched baseballs will produce breath taking excitement and expectations by the TV viewing audience. The TV audience will see the baseball as it travels outward from the crack of the bat onto the playing field. The TV audience will see the baseball get smaller as it gets further away from the instrumented home plate and the batter. The image of the baseball will move away from the center of the TV picture frame after it is hit. The audience will see the batter drop the bat and scramble toward first base. The image of the bat will grow in size and appear to the TV viewing audience as though it was going to hit them in the face as it careens down on and strikes the instrumented baseball home plate. Members of the TV viewing audience will duck to avoid being hit by the bat. The TV audience will hear the thud of the bat after the batter releases it and it hits the instrumented baseball home plate. The TV audience will hear the scraping by the batter's cleats on the ground as he scrambles to first base. The TV audience will see the size of the batter grow smaller as he runs toward first base and gets further from home plate. In an alike fashion to those modes presented above, the cameraman may select any of the secondary mechanical stops.

The instrumentation package assembly 7 is supported at its upper end by a buffer plate 8. The instrumentation package assembly 7 and the buffer plate 8 are permanently encapsulated inside of the instrumented baseball home plate as the encapsulating material 16 around them cures. After the encapsulating material 16 sets, it becomes a weatherproof shock absorbing padding material 16. The small diameter end of the buffer plate 8 peers through the top 6 and upper protective cover plate 18 of the instrumented baseball home plate. The small diameter end of the buffer plate 8 is sealed and molded into the shock absorbing padding 16 around its circumference. The encapsulating material 16 is a permanent resilient compound that is air-tight and water-tight.

The buffer plate 8 is encapsulated by the encapsulating material 16 inside the instrumented baseball home plate. The z-axis 17 of the bore in the buffer plate is perpendicular to the top of the instrumented baseball home plate. The end of the instrumentation package assembly 7 is inserted into the bore in the buffer plate 8, thereby aligning the z-axis 17 of the instrumentation package assembly 7 perpendicular to the top of the instrumented baseball home plate.

The buffer plate 8 acts as a bearing for the instrumentation package assembly 7, and thereby restricts and restrains the motion of the instrumentation package assembly 7 inside the instrumented baseball home plate. Besides functioning as a bearing to support the instrumentation package assembly 7 within the instrumented baseball home plate, the buffer plate provides a hollow portal through which the camera 24 inside the instrumentation package assembly 7 may peer out of the instrumented baseball home plate at the baseball playing field.

The instrumented baseball home plate's outward appearance looks substantially the same as the conventional professional league baseball home plate and the conventional high school league baseball home plate, and meets the official requirements for these venues and is interchangeable with them in these venues.

The buffer plate 8 is a Type VIII buffer plate and is shown in FIG. 21Q and FIG. 21R and FIG. 21S. The buffer plate 8 is molded into the instrumented baseball home plate using the white rubber encapsulating material 16. The small diameter end of the buffer plate 8 passes through the upper cover protective cover plate 18 and protrudes through the molded rubber top 6 of the instrumented baseball home plate. The buffer plate carries the optical window 13. The flat surface of optical window 13 is flush with the top 6 of the instrumented baseball home plate.

If the cameraman chooses to use a spherical concentric dome shaped optical window 13 instead of the flat window in order to minimize the vignetting at the extreme 180 degree field of view of an extremely wide angle lens 25, then the flat window can be unscrewed from the front of the buffer plate assembly 8 and replaced with a spherical domed shaped window. The spherical domed shaped optical window will protrude above 6 by about one half the diameter of the spherical optical window.

Buffer plate 8 is shown in detail in FIG. 21QQ and FIG. 21RR and FIG. 21 SS. It is made from a light-weight rigid polycarbonate, ABS or fiber reinforced plastic material. It is used to prop up and position the instrumented baseball home plate's upper protective cover plate 18. The buffer plate 8 is mounted and permanently encapsulated to the inside of the instrumented baseball home plate. The top of the buffer plate 8 is covered by upper protective cover plate 18. The purpose of upper protective cover plate 18 is to protect the instrumentation package assembly 7 which is below it from being crushed when a player steps on the instrumented baseball home plate.

In summary, the buffer plate 8 is multi-purposed. It provides a mounting surface against which the upper protective cover plate 18 rests. It protects the instrumentation package assembly 7 from becoming misaligned relative to the portal through which camera 24 peers out from the top surface 6 of the instrumented baseball home plate.

The instrumented baseball home plate has five sides just like the standard conventional baseball home plate. Their dimensions are identical to the dimensions of the standard conventional baseball home plate shown in FIG. 41. Side 14 is closest to the pitcher and is 17 inches long. Sides 2 and 15 form the apex of the instrumented baseball home plate. They are each 12.021 inches long, and join at right angles to one another at the apex of the instrumented baseball home plate.

It is not necessary to make the weight of the instrumented baseball home plate exactly identical to the weight of the conventional major league home plate shown in FIG. 41 because the instrumented baseball home plate will be immobile and anchored in the ground.

There are reasons however to make the weight of the instrumented baseball home plate approximately the same as that of the conventional major league home plate shown in FIG. 41. The first reason is so that when a player hits it, the instrumented baseball home plate will feel and react the same as the conventional major league home plate. Accordingly, the location of the center of gravity of the instrumented baseball home plate base and the conventional major league baseball home plate are both in roughly the same place. The second reason is so the field crew that maintains the playing field can handle the instrumented baseball home plate in the same way as they handle the conventional major league home plate.

The present invention contemplates the instrumented baseball home plate to be non-intrusive to the players in the game. The instrumented baseball home plate is constructed to produce substantially no audible noise that the player's may hear and be distracted by. The rubber encapsulating material absorbs the sound of the moving parts inside the instrumented baseball home plate. The sounds are made inaudible to the players who are outside the instrumented baseball home plate by sound absorption, muffling, baffling and damping methods designed into the instrumented baseball home plate.

The central body of the instrumentation package assembly 7 is essentially a cylindrical can that contains the battery pack. The bottom of the can has a removable lid. The lid can be removed in order to change out battery packs when the battery packs loose their ability to charge properly. Access to the bottom of the cylindrical can is through the circular aperture in the bottom 11 of the instrumented baseball home plate.

The instrumentation package assembly 7 is shown in FIG. 33A and FIG. 33B and FIG. 33C. The z-axis 17 is the axis of symmetry of the instrumentation package assembly 7. The instrumentation package assembly 7 contains its own camera lens 25, camera 24, and supporting electronics. The battery pack supplies electrical power to the entire instrumentation package assembly 7. The instrumentation package assembly 7 is essentially a short cylindrical can like a tuna fish can. It is made strong to resist being crushed. Materials such as polycarbonates, ABS and fiber reinforced plastics are used in its construction.

Induction coils 3 and 10 are located on the top and on the bottom of the instrumentation package assembly 7 central hub. The electrical induction coils 3 and 10 are used to inductively couple power into the battery pack from a power source located outside the instrumented baseball home plate. A block diagram showing the electrical battery charging circuit involving the induction coils and the battery pack is shown in FIG. 24. An induction coil which is external to the instrumented baseball home plate is a source of electrical power which inductively couples electrical current into these induction coils 3 and 10. The external induction coil is laid flat on the top of the instrumented baseball home plate coaxially above coils 3 and 10 during the battery charging process. Electrical current which is induced into the induction coils 3 and 10 is fed into the battery pack in order to charge it.

A block diagram of the instrumentation package assembly 7 electronics is shown in FIG. 23 and FIG. 24. Four antennas 21, 22, 23, and 24 are used to accomplish the wireless transmission and reception of signals between the instrumented baseball home plate and the antenna array relay junction. The same four antennas 21, 22, 23, and 24 are used by the instrumented baseball home plate to both transmit video signals to the remote base station and receive control commands back from the remote base station.

The instrumentation package assembly's can is made of polycarbonate, ABS or fiber reinforced plastic which are strong and are non-conductors of electricity. It is necessary to use a non-conducting material so as to allow the transmitted and received radio signals to radiate thru it from the antenna elements within the instrumentation package assembly 7 for the purpose of televising signals by wireless communications to and from the remote base station. The instrumentation package assembly's network transceiver electronics wirelessly transmits real-time pictures and sounds from the instrumentation package assembly 7 camera 24 and microphones 27 and 28 via the duel parallel antenna array elements 20, 21, 22, and 23, also known as intentional radiators, to the antenna array relay junction. The remote base station and the antenna array relay junction are specified in FIG. 59A and FIG. 59B.

In an alternative preferred embodiment, the quad antenna array elements 20, 21, 22 and 23 shown in the instrumentation package assembly 7 are replaced with a helix antenna (not shown) with similar dimensions wound on the inside diameter of the instrumentation package assembly.

A antenna array relay junction shown in FIG. 59A and FIG. 59B is deployed in the baseball stadium and receives radio signals from the instrumented baseball home plate's antenna array elements 20, 21, 22, and 23. Antenna array elements 20, 21, 22, and 23 are in quadrature to radiate radio signals to the antenna array relay junction with sufficient gain so as to overcome RF noise and provide for a large enough gain bandwidth product to accommodate real-time SD/HD picture quality requirements.

The instrumentation package assembly's network transceiver referred to in FIG. 36D also provides a wireless means for the instrumented baseball home plate to receive command and control radio signals from the base station. The instrumentation package assembly assembly's 7 battery pack is wirelessly inductively charged before and during games on an as needed basis, using the charging station shown in preferred embodiment shown in FIG. 37A and FIG. 37B and FIG. 37C. The charging station is placed on the top of the instrumented baseball home plate when it is charging the battery pack. Charging of the battery pack 31 is accomplished wirelessly by inductive coupling. The instrumented baseball home plate's two inductive pickup coils 3 and 10 act as the secondary windings on an air core transformer. Time varying magnetic flux at about 250 MHz is furnished to pickup coils 3 and 10 by the primary windings of the charging station unit referred to in FIG. 37A and FIG. 37B and FIG. 37C.

The antennas 21, 22, 23, and 24 are deployed below the upper protective cover plate 18 inside the instrumented baseball home plate. The antennas form a phased array. The radiation pattern from the phased array antennas 21, 22, 23, and 24 can be maximized to radiate and receive preferentially in the direction of the pickup antenna used by the remote base station. This reduces the noise in the transmission link. The instrumentation package assembly 7 has a flexible corrugated bellows skin section 9. The height of the instrumentation package assembly 7 is approximately ⅓ the thickness of the instrumented baseball home plate.

The corrugated bellows segment 9 of the instrumentation package assembly 7 connects the outer portion of the instrumentation package assembly 7 with its central body hub. The connections are sealed with o-rings and are air-tight.

The corrugated section 9 of the instrumentation package assembly assembly's skin allows the instrumentation package assembly to flex, stretch and compress when the instrumented baseball home plate is impacted. This enables the instrumentation package assembly to resist shock and vibration. Additionally, the corrugated section allows the instrumentation package assembly to act as a spring and compress or expand its length without damaging its contents. When circumstances arise where the players tend to crush the instrumented baseball home plate, the instrumentation package assembly will compress or expand and take the shock without damaging or misaligning its contents.

The rubber encapsulating material 16 provides shock absorbing padding between the upper protective cover plate 18 and the instrumentation package assembly 7. A purpose of the encapsulating material is to cushion the blows to the instrumented baseball home plate that would otherwise result in damaging shock and vibration to the instrumentation package assembly 7 and its contents. The rubber encapsulating material 16 also provides protection for the instrumentation package assembly 7 from dirt, moisture and the environment.

The z-axis 17 of the instrumented baseball home plate is orthogonal to the x and y axes 4 and 1 respectively, of the instrumented baseball home plate.

Each of the microphones 27 and 28 listens for sounds from their respective sides of the instrumented baseball home plate. The condenser microphones enable the viewing audience to hear real-time contacts, impacts and shocks to the instrumented baseball home plate. Microphones 27 and 28 enable the TV audience to hear sounds that result from air or any physical contacts or vibrations to the instrumented baseball home plate; like for example, the crash of a player sliding into the instrumented baseball home plate or the thud of a baseball as it hits the playing field. The sounds received from each of the microphones by the remote base station are processed using special software to produce surround sound which is broadcast to the TV viewing audience.

Microphone 33 protrudes through a hole in the top of the instrumented baseball home plate. Microphone 33 enables the TV audience to hear sounds that occur on the baseball playing field.

Microphone 33 enables the TV audience to hear the whoosh of air as a pitched baseball passes above the instrumented baseball home plate.

Simultaneously live TV pictures are taken by the TV camera 24 of its respective field of view of the live action on the playing field. Camera 24 will enable the TV audience to see a right or left handed batter swing his bat, up close, to strike the baseball as it whizzes bye above the instrumented baseball home plate. Microphone 33 enables the TV audience to hear sounds like the rush of the air as the batter swings his bat. The TV audience will hear the loud high fidelity crack of the bat as it strikes the baseball. The TV audience will see the baseball come toward them from the pitcher's hand as if the audience themselves were standing at the plate. The TV audience will see a close-up of the baseball right in front of them the moment it is hit by the bat. It will seem to the audience like they themselves hit the baseball. This will be an action packed event never before witnessed by a TV audience. Some members of the TV audience will flinch as the baseball is pitched near to them. Each of the pitched baseballs will produce breath taking excitement and expectations by the TV viewing audience. The TV audience will see the baseball as it travels outward from the bat onto the playing field. The TV audience will see the baseball get smaller as it gets further away from the instrumented baseball home plate and the batter. The audience will see and hear the batter drop his bat and scramble toward first base. The TV audience will hear the thud of the bat after the batter releases it and it hits the ground. The TV audience will hear the scraping by the batter's cleats on the ground as he scrambles to first base. The TV audience will see the size of the batter grow smaller as he runs toward first base and gets further away from home plate.

A block diagram showing the detailed flow of electrical signals and data in the instrumentation package assembly 7 is shown in the preferred embodiment given in FIG. 36D and FIG. 36E. The present invention contemplates the instrumented baseball home plate's battery pack being wirelessly charged by a charging station shown in FIG. 37A and FIG. 37B and FIG. 37C.

The diameter of the instrumentation package assembly 7 is kept to a minimum in order to minimize its footprint inside the instrumented baseball home plate. The dimension of the outside diameter of the instrumentation package assembly 7 (not including the four antennas) is governed largely by the physical diagonal dimension of the largest components within the instrumentation package assembly 7, like the SD/HD camera's CCD sensor array and the battery.

The battery's charging coils 3 and 10 are wound on the outside diameter of the instrumentation package assembly 7 at both top and bottom of its central hub and act electrically as a transformer's secondary winding. The coils are wound on the outside diameter of the instrumentation package assembly 7 to keep any heat they may produce away from the contents of the instrumentation package assembly 7 while the battery pack is being charged. The number of turns in each charging coil is made large enough to enable them to inductively couple a sufficient number of magnetic lines of flux from the primary coil of the battery charging station so as to charge the battery pack in a reasonably short time before games. When the charging station is placed on top 6 of the instrumented baseball home plate, the charging coils 3 and 10 receive electrical energy inductively coupled from the primary coils of the charging station, and use this energy to charge the battery pack.

In a further preferred embodiment, the present invention referring to FIG. 44A and FIG. 44B contemplates an instrumented baseball home plate, which when stationed off of any baseball playing field i.e. at the traditional home plate location in the pitcher's bullpen, can wirelessly and autonomously televise baseball pitching practice and warm-up sessions under command and control of the remote base station. The remote base station is disclosed in FIG. 59A and FIG. 59B and FIG. 60A and FIG. 60B and FIG. 61A and FIG. 61B. In addition to adding an element to the entertainment of the TV viewing audience, the embodiment serves to aid the pitchers and the pitching coaches in evaluating the quality of the pitcher's progress, prowess, fitness and "stuff".

The instrumented baseball home plate is an example of a static instrumented sports paraphernalia. For televising games from off the playing field, for example in the pitcher's bullpen, refer to FIG. 64C which is a top view of a general sports stadium that has been configured and equipped for use with both static and dynamic instrumented sports paraphernalia, using both bi-directional wireless radio wave communication links and/or bi-directional fiber optics cable/copper cable communication links.

The cameraman, in the remote base station, software selects either the wireless mode of communication, and/or the fiber optics/copper cable mode of communication between each of the instrumented baseball home plates and the remote base station. The cameraman can use whichever equipment (antenna array relay junction or fiber optics cable/copper cable) is installed in the stadium with which to command and control his choice and communicate it to the instrumented baseball home plates on the stadium playing field. These choices are also physically switch selectable by the cameraman with his access through the opening in the bottom of the instrumented baseball home plates. Refer to FIG. 59A and FIG. 59B, and FIG. 60A and FIG. 60B, and FIG. 61A and FIG. 61B, and FIG. 64A and FIG. 64B and FIG. 64C for disclosures regarding the remote base station and the antenna array relay junction.

The cameraman selects items from a software menu of control commands that go to the network transceiver at the remote base station that are subsequently transmitted to the instrumented baseball home plates for the purpose of adjusting various system initializations, operating parameters, radio frequency, polling system status data such as battery condition, and initiating remote mechanical adjustments such as camera focus, optical zoom, iris and movement to the cameras' field of view, etc over the selected bi-directional communications link i.e. wireless radio, fiber optics or copper cable connectivity being used within the particular sports stadium.

These commands, when intercepted by the network transceiver within the instrumented baseball home plates are applied to its microprocessor, which then in turn upon executing the instructions stored within the contents of its firmware applies a pulse coded control signal via the power and control interconnect interface inside the instrumentation package to the corresponding electronics i.e. the mechanical actuators that provides optical focus and/or zoom adjustment of the cameras and microphone gain and selection, etc as desired by the cameraman and/or special software running on the computer at the remote base station. The power and control interconnect interface as shown in FIG. 33E (item 21), which is represented by dotted lines, consists of the electrical control wiring to and from the electronic components of the instrumented baseball home plates that are being controlled.

Referring to the Preferred Embodiments Specified in FIG. 44A and FIG. 44B, the Instrumented Baseball Home Plate Satisfies all of the Following Objectives:

It is an objective of the present invention to instrument a baseball home plate composed of an one camera instrumentation package assembly, buffer plate assembly, encapsulation cushioning material, upper protective cover plate, additional microphone on the top, and lower protective cover plate. It is an objective of the present invention to process the pictures captured by the camera inside the instrumented baseball home plate and make them appear upright to the viewing audience. It is an objective of the present invention to take pictures from the instrumented baseball home plate with extremely wide viewing angles. It is an objective of the present invention that the instrumented baseball home plate has an upper protective cover plate that is rounded downward and domed shaped. It is an objective of the present invention to take pictures from the instrumented baseball home plate with extremely wide viewing angles. It is an objective of the present invention to make the weight and center of gravity location of the instrumented base the same as the conventional bases. It is an objective of the present invention to fill the volume of the instrumented baseball base beneath its top surface in its interior with a resilient encapsulating material like synthetic foam rubber to hold all the contents of the instrumented baseball home plate aligned in their places, and act as a shock absorbing padding for the instrumentation package assembly, buffer plate assembly, upper protective cover plate, and lower protective cover plate. It is an objective of the present invention to enable the cameraman in the remote base station to software selects either the wireless mode of communication, and/or the fiber optics/copper cable mode of communication, between the instrumented baseball home plate and the remote base station by sending control signals to the instrumented baseball home plate. It is an objective of the present invention to enable the cameraman to select either the wireless mode of communication, and/or the fiber optics/copper cable mode of communication between the instrumented baseball home plate and the remote base station by physically setting a switch in the bottom of the instrumented baseball home plate with his access through the bottom of the instrumented baseball home plate. It is an objective of the present invention to enable coaches who are on the sidelines during training sessions to hear the spoken dialog of their team's players from on the baseball playing field. It is an objective of the present invention to enable coaches who are on the sidelines during training sessions to view details of the team's players during training sessions on the baseball playing field. It is an objective of the present invention to enable umpires who are on and off the field during games to review details of the game from the cameras onboard the instrumented baseball paraphernalia by instant replay. It is an objective of the present invention to equip the instrumentation package assembly to capture video and sounds on the playing field from the top of the instrumented baseball home plate. It is an objective of the present invention to enable the instrumentation package assembly with a means to wirelessly televise the captured video and sounds to a remote base station via an antenna array relay junction stationed off the playing field but within (and around) the space of the instrumented sports stadium. It is an objective of the present invention to equip the antenna array relay junction to relay the televised video and sounds it receives from the instrumented baseball home plate to the remote base station located within the instrumented sports stadium or its vicinity. It is an objective of the present invention that the instrumented baseball home plate is under the command and control of a cameraman in the remote base station. It is an objective of the present invention to enable the instrumentation package assembly to be mounted inside the instrumented baseball home plate in a manner permitting its cameras and three microphones to see and hear out from the top of the instrumented baseball home plate. It is an objective of the present invention to enable the instrumentation package assembly to be mounted inside the instrumented baseball home plate in a manner permitting the instrumentation package assembly to be protected from damage during the game. It is an objective of the present invention to enable the instrumentation package assembly to be mounted inside the instrumented baseball home plate in a manner permitting it to maintain its mechanical and optical alignment during the game. It is an objective of the present invention to provide a permanent position and nesting place for the instrumentation package assembly inside the instrumented baseball home plate. It is an objective of the present invention to provide an upper protective cover plate, buffer plate assembly, instrumentation package assembly, additional microphone and lower protective cover plate to be sized and assembled together inside the instrumented baseball home plate. It is an objective of the present invention to provide an instrumentation package assembly whose components including, camera lens, battery pack and electronics are easily repaired, replaced and maintained. It is an objective of the present invention to provide an instrumentation package assembly that carries its own rechargeable battery pack. It is an objective of the present invention to provide an instrumentation package assembly that carries its own rechargeable battery pack that carries sufficient energy to power the cameras, lenses, antennas and electronics for the duration of the baseball game. It is an objective of the present invention to provide an instrumentation package assembly that carries its own battery pack that is recharged wirelessly by induction using a charging station unit placed on the instrumented baseball home plate. It is an objective of the present invention to provide instrumentation package assembly electronics that require little power to operate and are lightweight. It is an objective of the present invention to provide an instrumented baseball home plate carrying an instrumentation package assembly that can withstand axial and tangential compression and decompression loads exerted on it during play. It is an objective of the present invention to provide an instrumented baseball home plate whose total weight, and center of gravity is identical to regulation conventional baseball home plates. It is an objective of the present invention to provide an instrumented baseball home plate who's playing qualities, and handling qualities are identical to those in prior art conventional regulation baseball home plate. It is an objective of the present invention that the instrumentation package assembly withstands dirt and weather conditions. It is an objective of the present invention that the optical windows be made small to be unobtrusive to the game without vignetting the field of view of the cameras in the instrumented baseball home plate under the prevailing lighting conditions. It is an objective of the present invention that the optical windows withstand heavy blows received during the game and protect the instrumentation package assembly. It is an objective of the present invention that the optical windows be easily removed and replaced. It is an objective of the present invention that the camera lenses be easily removed and replaced through the top of the instrumented baseball home plate. It is an objective of the present invention to equip the instrumented baseball home plate with a single camera that looks out from inside the top of the instrumented baseball home plate onto the baseball playing field. It is an objective of the present invention to equip the instrumented baseball home plate with three microphones that listen for sounds of the game, in, and on, and above the playing field. It is an objective of the present invention to equip the instrumented baseball home plate to wirelessly and/or by fiber optics/copper cable communication links, televise baseball games under the command and control of the remote base station when stationed on any baseball playing field at any traditional home plate location.

It is an objective of the present invention to equip the instrumented baseball home plate with an instrumentation package assembly and additional microphone that are mounted and encapsulated inside the instrumented baseball home plate, which wirelessly televises pictures and sounds of baseball games from its camera and its three microphones contained therein. It is an objective of the present invention to equip the instrumented baseball home plate with state of the art TV cameras as technology advances. It is an objective of the present invention to equip instrumented sports paraphernalia with a single or multiple instrumentation package assemblies, additional microphones, and a single or multiple buffer plate assemblies, and single or multiple protective cover plates. It is an objective of the present invention to equip the instrumented baseball home plate with encapsulation shock absorbing material that protects and stabilizes the contents of the instrumented baseball home plate by holding, cushioning and maintaining the alignment of the instrumentation package assembly, additional microphone, buffer plate assembly, and upper and lower protective cover plates inside the instrumented baseball home plate. It is an objective of the present invention to equip the instrumented baseball home plate with an instrumentation package assembly that includes a single CCD sensor arrayed camera and two microphones. It is an objective of the present invention to equip the instrumented baseball home plate with an instrumentation package assembly that is mechanically mounted inside the instrumented baseball home plate using a buffer plate assembly. It is an objective of the present invention to equip the instrumented baseball home plate with a buffer plate assembly which is embedded and encapsulated into the instrumented baseball home plate using a shock absorbing encapsulation material. It is an objective of the present invention to equip the instrumented baseball home plate with upper and lower protective cover plate shields to protect the other contents of the instrumented baseball home plate. It is an objective of the present invention to equip the instrumented baseball home plate with an instrumentation package assembly that has a fiber optics/copper cable connector which is connected to a fiber optics/copper cable buried in the ground beneath the baseball playing field, which acts as an electric power and communications link to the remote base station via the antenna array relay junction. It is an objective of the present invention to equip the instrumented baseball home plate with two protective cover plate shields that are embedded and molded into the instrumented baseball home plate using encapsulation shock absorbing material. It is an objective of the present invention to equip the instrumented baseball home plate with two protective cover plates shields that sandwich the instrumentation package assembly between them and protect it and its contents from being damaged by the game and by the environment. It is an objective of the present invention that the external appearance and playability of the instrumented baseball home plate be substantially the same as the conventional regulation baseball home plate. It is an objective of the present invention that there is a flat region in the middle of the upper protective cover plate surrounding the clearance bore for the optical windows. It is an objective of the present invention that the optical windows permit the cameras mounted inside the instrumentation package assembly of the instrumented baseball home plate to look out through the top of the instrumented baseball home plate onto the playing field during a baseball game, and be protect the camera lenses and cameras from hazards such as rain, dirt and physical impacts. It is an objective of the present invention that the optical window is sealed to the small diameter cylindrical end of the buffer plate to protect the camera lenses, cameras, microphones and the electronics within the instrumentation package assembly. It is an objective of the present invention that the optical windows are made small to make them inconspicuous to the players, and substantially preserve the instrumented baseball home plate's look-alike quality with the conventional major league home plate while still retaining sufficient clear aperture for the camera lenses to see events with SD/HD resolution on the playing field in prevailing light. It is an objective of the present invention that the optical windows have a spherical dome shape when a larger field of view is desired. It is an objective of the present invention that the functions (i.e. zoom, focus, and iris settings) of the camera lenses are controlled by the cameraman in the remote base station by sending command and control signals from the remote base station to the instrumented baseball home plate. It is an objective of the present invention that the cameras use extremely wide angle lenses with zoom capability so that even though camera is pointed skyward, it can see past the pitcher right down to the outfield stadium horizon because of its near 180 degree field of view. It is an objective of the present invention that the camera is aligned within its instrumentation package assembly so that it yields wirelessly transmitted upright images of objects that appear in the TV picture frame between the center and the bottom of the TV picture frame by using the electro-mechanical actuating device that is mechanically coupled to the camera and its lens inside the instrumentation package assembly element. It is an objective of the present invention that the electro-mechanical actuating device can rotate and detent the camera and its lens together to any one of eight mechanical angular stop locations. It is an objective of the present invention that the cameraman in the remote base station selects which of the eight mechanical stops is to be used and sends a signal to the instrumentation package assembly to set the camera and lens to the desired mechanical stop he selected.

FIG. 45A and FIG. 45B

The detailed physical elements disclosed in the instrumented baseball home plate drawings shown in FIG. 45A and FIG. 45B are identified as follows: 1 is the optical axis of the instrumentation package assembly containing camera 23. 2 is the y-axis of symmetry of the instrumented baseball home plate. 3 is the optical axis of the instrumentation package assembly containing camera 24. 4 is the instrumented baseball home plate. 5 is the upper induction coil used to charge the battery pack inside the instrumentation package assembly. 6 is the upper induction coil used to charge the battery pack inside the instrumentation package assembly. 7 is the plane-parallel-flat optical window. 8 is the left side of the instrumented baseball home plate. 9 is the side of the instrumented baseball home plate. 10 is the side 8 of the instrumented baseball home plate. 11 is the central hub of the instrumentation package assembly containing the battery pack. 12 is the Type XI buffer plate. 13 is the bottom of the instrumented baseball home plate. 14 is the bellows segment of the instrumentation package assembly. 15 is the x-axis of symmetry of the instrumented baseball plate. 16 is the bottom of the instrumentation package assembly. 17 is the side of the central instrumentation package assembly. 18 is the top of the central instrumentation package assembly. 19 is the shock absorbing white rubber encapsulating material of the instrumented baseball home plate. 20 is the plane-parallel-flat optical window. 21 is the side of the instrumented baseball plate closest to the pitcher. 22 is the right side of the instrumented baseball plate. 23 is the upper protective cover plate shield. 24 is the lower protective cover plate shield. 25 is the wireless radio antenna. 26 is the wireless radio antenna. 27 is the wireless radio antenna. 28 is the wireless radio antenna. 29 is the z-axis of the camera with optical window 20. 30 is the z-axis of symmetry of the instrumented baseball home plate and the instrumentation package assembly. 31 is the z-axis of the camera with optical window 7. 32 is a microphone. 33 is a microphone. 34 is a camera. 35 is a camera. 36 is a camera lens. 37 is a camera lens. 38 is the top surface of the instrumented baseball home plate. 39 is a gas valve. 40 is an access lid heat sink. 41 (not shown). 42 is the battery pack. 43 is the electronics. 44 is the electronics. 45 is a microphone. 46 is a microphone connector.

FIG. 45A is a top view of a two camera instrumented baseball home plate.

FIG. 45B is a side view of a two camera instrumented baseball home plate.

Referring to drawings FIG. 45A and FIG. 45B, in a preferred embodiment, the present invention contemplates an instrumented baseball home plate, which when stationed on any baseball playing field at any traditional home plate location, can wirelessly and autonomously televise baseball games under the command and control of the remote base station. The remote base station is disclosed in FIG. 59A and FIG. 59B and FIG. 60A and FIG. 60B and FIG. 61A and FIG. 61B.

The only substantial difference between the instrumented baseball home plate shown in FIG. 45A and FIG. 45B and the one shown previously in FIG. 44A and FIG. 44B is that the instrumented baseball home plate shown in FIG. 45A and FIG. 45B has a 3-D stereo camera pair comprised of two identical cameras and two identical camera lenses, whereas the instrumented baseball home plate shown in FIG. 44A and FIG. 44B has only one camera and one camera lens. Consequently, the present preferred embodiment shown in FIG. 45A and FIG. 45B has the distinct advantage over the previous preferred embodiment shown in FIG. 44A and FIG. 44B in that it provides the TV viewing audience with 3-D stereo pictures as well as stereophonic sound. Stereophonic sound is provided by the same two microphones in both embodiments.

The instrumented baseball home plate employs a two camera 34 and 35 instrumentation package assembly identical to the instrumentation package assembly shown in FIG. 34A and FIG. 34B. It uses the Type XI buffer plate assembly shown in FIG. 21ZA and FIG. 21ZB and FIG. 21ZC. The instrumentation package assembly uses the identical instrumentation package assembly elements disclosed in FIG. 33D.

Each one of the two cameras 34 and 35 is housed in each of the instrumentation package assembly elements which are part of the instrumentation package assembly.

It is understood that as the state of the art in TV camera technology advances, that there will be other better TV cameras that use other than CCD technology. The present invention will work equally well with them as they become available. Therefore, the present invention uses CCD TV cameras as an example of TV cameras that may be used simply because they are the best that today's technology offers, and is not confined only to their sole use in the future.

Referring to the disclosed instrumented baseball home plate shown in FIG. 45A and FIG. 45B, the instrumented baseball home plate has one instrumentation package assembly 11 mounted inside the instrumented baseball home plate. Details of instrumentation package assembly 11 are shown in FIG. 34A and FIG. 34B and FIG. 34C. Except for the optical windows, the outermost appearance of both the instrumented baseball home plate and the conventional baseball home plate shown in FIG. 41 are the same, each having the same material, size, shape, color and texture. Consequently both have the same identical appearance as seen by the players.

The instrumentation package assembly 11 carries two CCD sensor arrayed TV cameras 34 and 35 and two microphones 32 and 33. The two cameras 34 and 35 are arranged side by side and form a 3-D stereo camera pair. The two cameras 34 and 35 and their lenses 36 and 37 are separated by an interpupillary distance. The range of interpupillary distances is 35 to 150 millimeters in this preferred embodiment. The interpupillary distance of the average adult male human eyes is 65 millimeters. It is understood that a variety of interpupillary distances may be used to produce different 3-D effects. For example, a larger interpupillary distance will produce more striking 3-D effects. The two cameras have optical axes 29 and 31. The interpupillary distance is the distance between the two axes 29 and 31. The cameras look straight upward from the top of the instrumented baseball home plate along their respective optical axes 29 and 31 but have useful fields of view on either side of the optical axis. Optical axes 29 and 31 are parallel to one another and normal to the top of the instrumented baseball home plate. The cameras have optical windows 20 and 7 respectively.

The instrumented baseball home plate has five sides. The top 38 of the instrumented baseball home plate sits horizontally on the baseball playing field approximately at ground level which is customary in the game of baseball. The instrumented baseball home plate is oriented in space so its z-axis 30 is perpendicular to the baseball field and pointing skyward. The side 21 of the instrumented baseball home plate faces the pitcher as is customary in the game of baseball.

The two cameras 34 and 35 are identical to each other. The two cameras 34 and 35 use the same identical lenses 36 and 37. Even though the cameras 34 and 35 are pointed skyward, they can see right down to the outfield horizon because lenses having extremely wide fields of view approaching 180 degrees may be used. The horizon appears on the bottom center of the TV picture frame to the TV viewing audience. Each of the two cameras 34 and 35 is aligned within its instrumentation package assembly 11 so that each of the cameras 34 and 35 yields wirelessly transmitted upright images of objects at the center of the field of view. Both cameras 35 and 36 are aligned inside the instrumentation package assembly so that the TV viewing audience sees the distant stadium horizon in the outfield, towards the bottom and sides of the picture frame.

A variety of different camera lens types with different lens setting capabilities, focal lengths and fields of view can be used. For example, extremely wide angle lenses that can see down to the horizon can be used. These lens types give the TV viewing audience a dramatic 3-D effect. When enabled by the operator/cameraman in the remote base station, the auto iris setting permits the camera lens to automatically adjust for varying lighting conditions on the field. The auto focus setting permits the camera lens to adjust focus for varying distances of the players and action subjects on the field. The cameraman may elect to control the functions of the camera lenses himself from the remote base station by sending command and control signals from the remote base station to the instrumented baseball home plate. The cameraman can zoom, focus, and control the iris settings of the camera lenses from the remote base station.

Referring to the disclosed instrumented baseball home plate shown in FIG. 45A and FIG. 45B, the instrumented baseball home plate has two instrumentation package assembly elements mounted inside the instrumented baseball home plate. The instrumentation package assembly 11 which contains the two instrumentation package assembly elements is encapsulated inside the instrumented baseball home plate using a shock absorbing white rubber encapsulating material 19 that fills the entire cavity of the instrumented baseball home plate.

Details of instrumentation package assembly 11 are shown in FIG. 34A and FIG. 34B and FIG. 34C. The instrumentation package assembly 11 carries two CCD sensor arrayed cameras 34 and 35 and two microphones 32 and 33. The instrumentation package assembly 11 is mechanically mounted inside the instrumented baseball home plate using a buffer plate assembly 12. The instrumentation package assembly 11 is mechanically protected inside the instrumented baseball home plate using an upper and a lower protective cover plate shield 23 and 24 respectively.

The two protective cover plates 23 and 24 are embedded and molded into the instrumented baseball home plate using the shock absorbing material 19. Protective cover plate 23 is on the top and protective cover plate 24 is on the bottom of the instrumented baseball home plate. The top protective cover plate 23 is referred to as the upper protective cover plate. It is shown in FIG. 55. The bottom protective cover plate 24 is referred to as the lower protective cover plate. These protective cover plates 23 and 24 sandwich the instrumentation package assembly 11 between them and protect it and its contents from being damaged.

Except for the optical windows, the external appearance of both the instrumented baseball home plate and the conventional baseball home plate are identical, both being made of the same material 16. In addition, their size, shape, color and texture are identical. The weights of the instrumented baseball home plate and the conventional baseball home plate are nearly identical. Details of the conventional baseball home plate are shown in FIG. 41.

The instrumentation package assembly 11 is sandwiched between the top and bottom protective cover plates 23 and 24. The purpose of these protective cover plates 23 and 24 is to act as mechanical shields to protect the instrumentation package assembly 11 from being damaged by impacts during the game. During the normal course of the game, the top of the instrumented baseball home plate will be hit and crushed by the players and by their equipment. For example, the players may step on the instrumented baseball home plate or slide into it. They may even drop their bats on it. The two protective cover plates 23 and 24 protect the instrumentation package assembly 11 within the instrumented baseball home plate from physical damage due to these hits.

The outermost body region of the top protective cover plate 23 is made substantially spherically dome shaped. There is a flat region in the middle of the upper protective cover plate 23 surrounding the clearance bores for cameras 34 and 35. The entire body of the bottom or lower protective cover plate 24 is made flat. The top and bottom protective cover plates 23 and 24 both have rounded outer edges. The edges are rounded to insure that the baseball players will not be injured by them if the players crash into the instrumented baseball home plate A variety of materials can be chosen for the protective cover plates 23 and 24 in the present preferred embodiment. Material examples are polycarbonates, ABS, and fiber reinforced plastics. These materials have the advantage that they are lightweight and stiff, enabling the thickness of the cover plates to remain thin while still delivering the significant stiffness needed to perform their protective function of mechanical shielding the instrumentation package assembly in the limited space they can occupy within the instrumented baseball home plate. They have the additional advantage in that they are transparent to the transmitted and received radio waves which need to move to and from the wireless radio antennas 25, 26, 27, and 28 inside the instrumented baseball home plate without absorption or reflection therein.

The space between the top, bottom and sides of the instrumented baseball home plate and the protective cover plates 23 and 24 is filled with encapsulating material 19. Synthetic rubber is an example of encapsulating material that is used. When cured, this encapsulating material 19 acts as cushioning to absorb shock and vibration to the instrumented baseball home plate that may be transferred to the instrumentation package assembly 11. The molting material 19 encapsulates the upper and lower protective cover plates and maintains their positions inside the molded instrumented baseball home plate. The space between the protective cover plates and the instrumentation package assembly 11 is also filled with the same encapsulating material 19. When cured, this encapsulating material acts as cushioning to absorb shock and vibration to the instrumentation package assembly 11. The molting material encapsulates the instrument package assembly 11 inside the instrumented baseball home plate and thereby maintains its position inside the molded instrumented baseball home plate. The top 38 of the instrumented baseball home plate edge is beveled at 45 degrees the same as the standard conventional professional league baseball plate shown in FIG. 41 in order to protect the players who hit against it.

The top protective cover plate 23 is spherically dome shaped in its outer region, and flattened in its inner region close to the optical windows 7 and 20. The purpose of making it flattened near the optical windows 7 and 20 is to provide maximum protection for the optical windows 7 and 20 whose surfaces are flush at the very top 38 of the instrumented baseball home plate. The flattened shape enables the protective cover plate 23 to surround the optical windows 7 and 20 at the top 38 of the instrumented baseball home plate where the optical windows 7 and 20 are most likely to be exposed to the greatest threat of damage due to hits to the top of the instrumented baseball home plate by the baseball players or their equipment. The upper protective cover plate 23 is buried in encapsulating material 19 at the center top of the instrumented baseball home plate around the optical windows 7 and 20. The dome shape enables the upper protective cover plate 23 to come very close to the top center of the instrumented baseball home plate where the players will have only grazing contact with its surface 38 if they crash into the instrumented baseball home plate, thereby eliminating the threat of injury to the players if they hit the top 38 of the instrumented baseball home plate.

The spherical shape of the upper protective cover plate 23 causes its edge to be rounded downward and away from the top 38 of the instrumented baseball home plate and away from the players.

The upper protective cover plate 23 protects the instrumentation package assembly 11 from being crushed and damaged by the players during the game. The instrumentation package assembly is located below the upper protective cover plate 18 inside of the instrumented baseball home plate. In order to achieve its purpose, the upper protective cover plate 18 must be stiff. The entire volume between the top 8 of the instrumented baseball home plate 4 and the upper protective cover plate 23 is filled with a resilient encapsulation padding material 19. The entire volume between the upper protective cover plate 23 and the instrumentation package assembly 11 is filled with the same resilient encapsulation padding material 19. The domed shape of the upper protective cover plate 23 is very important. It completely covers and wraps the instrumentation package assembly 11 and its radio antennas 25, 26, 27, and 28, which are below it, and diverts trauma and forces that occur to the top 8 of the instrumented baseball home plate 4 during the game away from the instrumentation package assembly 11 and its antennas 25, 26, 27, and 28. The outer edge of the upper protective cover plate 23 is bent downward and past the outermost tips of the radio antennas 25, 26, 27, and 28 to protect them. The curvature of the upper protective cover plate 23 is made large enough so that the dome completely covers around them. The dome shape allows the thickness of the padding 19 between the top 8 of the instrumented baseball home plate 4 and the upper protective cover plate 23 to increase as the radial distance from the center of the instrumented home plate 4 increases outwardly.

The lower protective cover plate 24 is flat and is buried in the encapsulating material 19 just above the bottom surface 13 of the instrumented baseball home plate. The body of the lower protective cover plate 23 can be made flat because it is buried in the ground and there is no danger of the baseball players coming into violent contact with it. The flat shape is easier to make and less expensive to manufacture. It can also be made thicker than the upper protective cover plate 23 because there is more free space near the bottom of the instrumented baseball home plate that it can occupy. Its thickness is not physically restrained because of its location, as is the case with the upper protective cover plate 23 which is physically located between the top surface 38 and the buffer plate 12.

In both cases, the rounded edges of the protective cover plates 23 and 24 are substantially distant from the top 38 of the instrumented baseball home plate to protect the players from impacting against them. The top protective cover plate 23 is detailed in FIG. 55. The edge of the upper protective cover plate 23 is rounded and all sharp corners are removed so as to make it safe to the players if they press violently against the instrumented baseball home plate.

The outer body of the upper protective cover plate 23 is made spherically dome shaped. The spherical top of the dome faces upward. The upper protective cover plate 23 has two bored holes in it. The purpose of the bores is to permit the cylindrical ends of the buffer plate 12 containing the optical windows 7 and 20 to pass through them, and through the encapsulating material 19, and through the top 38 of the instrumented baseball home plate. The upper protective cover plate 23 is made flat in its inner region near to its circular bores so it can surround the optical windows 7 and 20 near the very top of the instrumented baseball home plate and shelter them from hits; while its spherical dome shape in its outer region keeps the edge of the protective cover plate 23 far down below the top of the instrumented baseball home plate and well below the surface of the playing field within the ground, so the edge would not be felt by the players if they impacted on the top surface 38 of the instrumented baseball home plate. The body of the lower protective cover plate 24 is made flat and has rounded corners like the upper protective cover plate 23 for the same reason.

The optical windows 7 and 20 permit the cameras 35 and 34 mounted inside the instrumentation package assembly 11 of the instrumented baseball home plate to look out through the top 38 of the instrumented baseball home plate onto the playing field during a baseball game and be protected from hazards such as rain, dirt and physical impacts. The optical windows 7 and 20 are sealed to the small diameter cylindrical end of the buffer plate 12. The seals are airtight and waterproof to protect the cameras 34 and 35, lenses 36 and 37, microphones 32 and 33, and the electronics within the instrumentation package assembly 11.

The optical windows 7 and 20 are made strong to protect the camera lenses 36 and 37 and cameras 34 and 35 that are located beneath it. The optical windows 7 and 20 are hard coated by vapor deposition with materials such as MgFl or SiO2 to help prevent the outer-most optical window surfaces from being scratched during the game. The optical window material itself is chosen to be strong. It is made from hard optical glass such as barium lanthanum borate glasses, or hard optical plastic like acrylic or polycarbonate, both of which are scratch resistant.

The optical windows 7 and 20 are made small to make them inconspicuous to the players, and substantially preserve the instrumented baseball home plate's look-alike quality with the conventional major league home plate shown in FIG. 41; while still retaining sufficient clear aperture for the camera lenses 36 and 37 to see events with SD/HD resolution on the playing field in prevailing light. Typical optical windows 7 and 20 range in size from about ⅛ inch to ½ inches in diameter. Besides their small size, the optical windows 7 and 20 are made additionally inconspicuous by making their antireflection coatings a straw color to match the tan coloration of the ground dust around the instrumented baseball home plate.

The optical window 7 and 20 are plane-parallel-flat. They are disposed at the intersection of the x-axis and y-axis of the instrumented baseball home plate. The optical window 7 and 20 are positioned on the top 38 of the instrumented baseball home plate so they are aligned roughly with the chin line of the average batter, and roughly at the same location as the center of gravity of the conventional major league home plate shown in FIG. 41.

Optical windows having a spherical dome shape can also be used when a larger field of view is desired. In another preferred embodiment, the outer surface of the window is spherical in shape and convex outward and shell-like as is necessary to permit the camera to see fields of view with extremely wide viewing angles approaching 90 degrees off the optical axis of the cameras. Shell-like implies that the inner and outer spherical surfaces of the optical window are concentric. In applications where extremely wide viewing angles are not required, the optical window surfaces can be made flat and plane parallel. The shell-like windows enable the camera to use lenses that have extremely wide viewing angles approaching 90 degrees off the optical axis of the camera lens without introducing bothersome optical aberrations and vignetting. The shell-like shape of the windows also imparts increased physical strength to the windows.

The optical windows 7 and 20 are attached to buffer plate 12. The optical windows 7 and 20 provide a portal through which cameras lenses 36 and 37 can see out onto the playing field from inside the instrumented baseball home plate. The encapsulating material 19 provides shock absorbing padding between the outer top surface 38 of the instrumented baseball home plate and the protective cover plate 23. The encapsulating material 19 provides shock absorbing padding between the protective cover plate 23 and the buffer plate 12.

Camera lenses 36 and 37 look out thru the top 38 of the instrumented baseball home plate through their respective optical windows 7 and 20 at objects angularly spread out around their respective axial lines of sight 31 and 29 and image the objects they see onto cameras 35 and 34 respectively. The lines of sight 31 and 29 of the two cameras 36 and 37 are parallel to one another. The two cameras 35 and 36 that form the 3-D stereo camera pair have optical windows 7 and 20. The two holes in the top 38 of the instrumented baseball home plate are made just large enough to prevent vignetting of the cameras field of view.

A variety of different camera lens types with different lens setting capabilities can be used. When enabled by the operator in the remote base station, the auto iris setting permits the camera lenses 36 and 37 to automatically adjust for varying lighting conditions on the field. The auto focus setting permits the camera lenses 36 and 37 to adjust focus for varying distances of the players and action subjects on the field.

For example, when a baseball is hit, and a player is rounding the bases, the distance of a player from home plate may be increasing or decreasing. The cameras 36 and 37 within the instrumented baseball home plate can be independently and simultaneously commanded and controlled to auto focus on the player. As the player is rounding third base, if he decides to run for home plate, the instrumented baseball home plate's cameras 36 and 37 and microphones 32 and 33 will capture all the action. While the player is running, his pictures and sounds are being wirelessly transmitted from the instrumentation package assembly 11 inside the instrumented baseball home plate to the remote base station for processing.

If the player decides to slide into home plate, the instrumented baseball home plate cameras 34 and 35 will enable the viewing audience to see the player slide into home plate, up close. The camera 34 and 35 will catch a detailed image of the player's sharp cleats as they strike the plate. The TV audience will experience the flight of chunks of dirt being thrown onto the plate in 3-D. The microphones 32 and 33 will enable the TV viewing audience to hear the scraping and the thud of the cleats as they hit the plate. The TV audience will hear the chunks of dirt as they hit the plate. The TV viewing audience will see the face and the hand of the umpire as he reaches down to sweep the plate. The TV audience will hear and see the bristles of the umpire's brush as he sweeps the dirt off the plate. The sounds received from each of the microphones by the remote base station are processed using special software to produce surround sound which is broadcast to the TV viewing audience.

Cameras 34 and 35 are mounted inside the instrumentation package assembly 11. The optical axes 29 and 31 of cameras 34 and 35 are perpendicular to the top 38 of the instrumented baseball home plate. This arrangement permits the cameras 34 and 35 to look upward and around their z-axes 29 and 31 from out of the top 38 of the instrumented baseball home plate. Utilization of an extremely wide angle lenses 36 and 37 allow the TV viewing audience to see past the pitcher and down to the horizon of the baseball stadium.

When a player is running toward the instrumented baseball home plate from third base, the cameras 34 and 35 can see where he is coming from. The cameras 34 and 35 can see the player as he runs and touches the instrumented baseball home plate. The cameras 34 and 35 can see the player as he is sliding into the instrumented baseball home plate. The TV audience will see and hear the player's cleats as they hit the instrumented baseball home plate. The cameras 34 and 35 can see the catcher as he tags the player before the player touches the instrumented baseball home plate and scores a run. From the vantage point of the instrumented baseball home plate, the viewing audience can see the strained player darting for the instrumented baseball home plate. The viewing audience can see details of the player's feet as he attempts to slide into the instrumented baseball home plate. The viewing audience can see a close-up of the opposing team's catcher's attempt to tag him with the ball. As the baseball is thrown home, the viewing audience can see the catcher reach down for it close to the plate. The cameras 34 and 35 vantage point at the instrumented baseball home plate gives the audience a viewing angle of the game never seen before by television viewing audiences. The instrumented baseball home plate's cameras 34 and 35 gives the TV viewing audience unending contemporaneous shots that get across a sense of the action of being there—like a player in the game, that prior art cameras looking on from their disadvantaged viewing points from outside the playing field cannot get across.

The top 38 of the instrumented baseball home plate sits horizontally flat on the baseball playing field. The optical axes 29 and 31 of the cameras 34 and 35 are parallel to the z-axis of the instrumentation package assembly 11 and the z-axis 30 of the instrumented baseball home plate. Axes 29 and 31 are perpendicular to the top 38 of the instrumented baseball home plate. The instrumented baseball home plate is oriented in space so its z-axis 30 is perpendicular to the baseball field and pointing skyward. The cameras 34 and 35 look upward out from the top 38 of the instrumented baseball home plate along and around their optical axes 29 and 31 through optical windows 20 and 7. The cameras 34 and 35 are aligned within the instrumentation package assembly 11 so that the cameras 34 and 35 yield a wirelessly transmitted upright 3-D images to the TV viewing audience via radio antennas 25, 26, 27 and 28.

In the present preferred embodiment, cameras 34 and 35 use extremely wide angle lenses 36 and 37 with zoom capability. Even though cameras 34 and 35 are pointed skyward, they can see off axis past the pitcher along y-axis 2 right down to the outfield stadium horizon because of their near 180 degree field of view. This is a distinct advantage of extremely wide angle lenses over other types of lenses. However, it should be pointed out that the cameraman may elect to use a variety of camera lens stereo 3-D pairs 36 and 37 with other capabilities depending on the visual effects he wishes to convey to the TV viewing audience. For example, the cameraman may elect to use a camera lens stereo 3-D pair 36 and 37 with a narrower field of view in order to concentrate the attention of the TV viewing audience on the batter's taut and sweaty stubble covered face.

The horizontal space around the center of the instrumented baseball home plate's instrumentation package assembly is electronically indexed into a counter-clockwise sequence of eight angular directions. Each angular direction is forty-five degrees apart from its sequential predecessor. The center of the instrumentation package assembly is where the x-axis 15 intersects the y-axis 2 and the z-axis 30. The x-axis 15, y-axis 2, and the z-axis 30 are orthogonal to one another.

In order of their sequence, the eight angular directions are the pitcher, forty-five degrees counter-clockwise from the pitcher, the right handed batter, forty-five degrees counter-clockwise from the right handed batter, the catcher, forty-five degrees counter-clockwise from the catcher, the left handed batter, and forty-five degrees counter-clockwise from the left handed batter.

The eight angular directions are referenced to the parts of the instrumented baseball home plate as follows: side 21, forty-five degrees counter-clockwise from side 21, side 10, side 4, the apex, side 9, side 22, and forty-five degrees counter-clockwise from side 22.

Of the eight angular directions, the four primary angular directions are as follows: the pitcher, the right handed batter, the catcher, and the left handed batter. These will be referred to as the $1^{st}$, $3^{rd}$, $5^{th}$ and $7^{th}$ angular directions. The four secondary angular directions are as follows: forty-five degrees counter-clockwise from the pitcher, forty-five degrees counter-clockwise from the right handed batter, forty-five degrees counter-clockwise from the catcher, and forty-five degrees counter-clockwise from the left handed batter. These will be referred to as the $2^{nd}$, $4^{th}$, $6^{th}$ and $8^{th}$ directions. The numbering scheme for the eight mechanical stops is made to concur with the numbering scheme for the eight angular directions.

The CCD sensor array of camera 34 produces a picture frame format for its images. The CCD sensor array of camera 35 produces a picture frame for its images. For example, the CCD sensor array of HD cameras is a letterbox format. The two camera's 34 and 35 are each aligned to one another within the instrumentation package assembly 11, so that their wirelessly transmitted picture frames are congruent and aligned to one another so they register properly. Also, the two camera's 34 and 35 are each aligned to one another within the instrumentation package assembly 11, so that all objects whose images appear between the center and bottom of the TV screen are upright.

The picture frames, of the two cameras that make up the 3-D stereo camera pair, are made to overlay and register onto one another independent of the camera's direction. This is a critical requirement for 3-D stereo television where the televised picture frame images must overlay and register properly onto one another. Proper registration of the picture frames requires that the CCD sensor arrays of both cameras 34 and 35 be rotationally in alignment with one another.

Rotational alignment is accomplished by simultaneously controlling each of the two electro-mechanical actuating devices to drive and hold the two cameras to the same angular direction at the same time. The rotational motions of the cameras are synced together to simultaneously detent and hold the cameras at the same angular direction on command by the cameraman in the remote base station.

For example, when a TV viewing audience sees a picture of an object taken with a 3-D stereo pair of two identical HD cameras that are aligned together in the same angular direction, their letterbox picture frames will appear perfectly registered and overlapped together on the viewer's TV screen.

Each of the two electro-mechanical actuating devices has eight mechanically detented stops. Each one of the eight mechanically detented stops allows the electro-mechanical actuating device to precisely rotationally position both cameras to any one of the eight angular directions and hold it there.

Each of the two electro-mechanical actuating devices has four primary mechanical stops that are mechanically detented 90 degrees apart from one another. The electro-mechanical actuating devices each has four secondary mechanical stops that are mechanically detented 90 degrees apart from one another, and are angularly located 45 degrees between the four primary mechanical stops. The electro-mechanical actuating device can rotate and detent the camera 34 and its lens 36 together to any one of its eight mechanical stops.

The cameraman in the remote base station selects which of the eight angular directions the cameras are to be rotated to. The cameraman sends a signal to the instrumentation package assembly 7 to slew the cameras 34 and 35 to the desired angular direction he selected. When the electro-mechanical devices drive the cameras to the angular direction selected by the cameraman, the mechanical stop for that angular direction is reached, and the cameras stop rotating and are detented into their precise positions against the mechanical stops.

These objectives are achieved by making a mold for the instrumented baseball home plate and encapsulating the instrumentation package assembly inside the mold. The sequence of events that occur in preparation for the time when the instrumentation package assembly 11 is encapsulated inside the mold of the instrumented baseball home plate, the instrumentation package assembly 11 it is first plugged into and aligned in buffer plate assembly 12. The instrumentation package assembly 11 and buffer plate assembly 12 are then loaded into the mold on top of the lower cover plate shield 24. The mechanical 30 of the instrumentation package assembly is carefully positioned in the mold, and then aligned normal to the top 8 of the mold. The instrumentation package assembly 11 is then precisely aligned in rotation in the mold about its mechanical axis 30 so that its $1^{st}$ primary stop for both of its instrumentation package assembly elements is aligned with the y-axis's 2 six o'clock direction, toward side 21, of the instrumented baseball home plate. The mold is then filled with encapsulating material 19 with the upper cover plate shield 23 placed on top of the buffer plate assembly 12. The instrumentation package assembly is encapsulated inside the instrumented baseball home plate for several reasons. The first reason is to protect the instrumentation package assembly from shock, vibration, dirt and the weather. The second reason is to maintain the alignment of the instrumentation package assembly inside the instrumented baseball home plate.

This alignment procedure assures that after the encapsulating material 19 has cured, the eight mechanical stops of the cameras are aligned to the eight angular directions of the instrumented baseball home plate which are as follows: side 21, forty-five degrees counter-clockwise from side 21, side 10, side 4, the apex, side 9, side 22, and forty-five degrees counter-clockwise from side 22. Now, whenever the electro-mechanical actuating device is driven to the $1^{st}$ primary stop, cameras 34 and 35 will now produce precisely centered and congruent upright images of any objects that lie along the y-axis 1 in the six o'clock direction toward side 21 of the instrumented baseball home plate and the pitcher.

Whenever the electro-mechanical actuating device is driven to the 2nd primary stop, camera 34 and 35 will now produce precisely centered and congruent upright images of any objects that lie along the x-axis 15 in the three o'clock direction toward side 10 of the instrumented baseball home plate and a right handed batter.

Whenever the electro-mechanical actuating device is driven to the 3rd primary stop, camera 34 and 35 will now produce precisely centered and congruent upright images of any objects that lie along the y-axis 2 in the twelve o'clock direction toward the apex of the instrumented baseball home plate and the catcher.

Whenever the electro-mechanical actuating device is driven to the 4th primary stop, camera 34 and 35 will now produce precisely centered and congruent upright images of any objects that lie along the x-axis 15 in the nine o'clock direction toward side 22 of the instrumented baseball home plate and a left handed batter.

When the instrumented baseball home plate is placed horizontally on the baseball playing field at its traditional location on the baseball diamond, it is then carefully positioned so its y-axis 2 is aligned with the centerline of the baseball diamond running from the instrumented baseball home plate to second base.

Now, whenever the cameraman in the remote base station commands the camera 34 and 35 to rotate and go to the 1st mechanical stop, the electro-mechanical actuator specified in FIG. 33B and FIG. 33C drives the camera's enclosure against the 1st mechanical stop and detents it there. When using an extremely wide field camera lens, the TV audience will see a picture of the pitcher standing upright on the pitcher's mound of the baseball playing field.

Whenever the cameraman in the remote base station commands the camera 34 and 35 to rotate and go to the 2nd mechanical stop, the electro-mechanical actuator drives the camera's enclosure against the 2nd mechanical stop and detents it there. When using an extremely wide field camera lens, the TV audience will see a picture of the right handed batter standing upright on the baseball playing field.

Whenever the cameraman in the remote base station commands the camera 34 and 35 to rotate and go to the 3rd mechanical stop, the electro-mechanical actuator drives the camera's enclosure against the 3rd mechanical stop and detents it there. When using an extremely wide field camera lens, the TV audience will see a picture of the catcher squatted upright on the baseball playing field.

Whenever the cameraman in the remote base station commands the camera 34 and 35 to rotate and go to the 4th mechanical stop, the electro-mechanical actuator drives the camera's enclosure against the 4th mechanical stop and detents it there. When using an extremely wide field camera lens, the TV audience will see a picture of the left handed batter standing upright on the baseball playing field. The cameraman in the remote base station selects which of the eight directions is to be televised from the instrumented baseball home plate, and sends a command and control signal to the instrumentation package assembly 7 inside the instrumented baseball home plate to set the cameras 34 and 35 to the desired direction he selected.

For example, if the cameraman selects the $1^{st}$ direction, the cameras 34 and 35 are aligned in rotation inside the instrumentation package assembly 7 by the electro-mechanical actuating devices so that the TV viewing audience sees the stadium horizon in the outfield near the bottom edge of the TV picture frame. (This is equivalent to what a person would see visually if he were laying flat down on the playing field with his head resting on the instrumented baseball home plate and looking upward with his feet facing the pitcher.) The stadium outfield horizon appears horizontal in the TV picture frame at the bottom center of the TV picture frame. The pitcher appears to be standing upright on his mound just above the bottom of the TV picture frame. When the pitcher throws the baseball to the catcher, the TV audience will see the baseball approaching the center of the TV picture frame from the bottom of the TV picture frame. The size of the baseball grows larger as it gets closer to the camera inside the instrumented baseball home plate and the batter. Since the cameras 34 and 35 are physically located below the batter inside the instrumented baseball home plate, an image of the underside of a right handed batter's chin and sweaty arm pits will appear just left of the center of the TV picture frame.

For example, if the cameraman selects the 5th direction, the cameras 34 and 35 are aligned in rotation inside its instrumentation package assembly 7 by the electro-mechanical actuating devices so that the TV viewing audience sees the stadium horizon in the outfield at the top of the TV picture frame. The catcher appears to be squatting upright above the bottom center of the picture frame. (This is equivalent to what a person would see visually if he were laying flat down on the playing field with his head resting on the instrumented baseball home plate and looking upward with his feet facing the catcher toward the apex of the instrumented baseball home plate) The stadium outfield horizon appears horizontal in the picture frame at the top of the TV picture frame. When the pitcher throws the baseball to the catcher, the TV audience will see the baseball approaching the center of the TV picture frame from the image of the pitcher's hand which is near the top of the TV picture frame.

The size of the baseball grows larger as it gets closer to the instrumented baseball home plate and the batter. Since the cameras 34 and 35 are below the right hand batter, an image of the underside of batter's chin and sweaty arm pits will occupy the center right of the TV picture frame. The TV audience will hear the whoosh of air as the baseball passes above the instrumented baseball home plate. The TV audience will see the batter swing his bat, up close, to strike the baseball as it whizzes by. The TV audience will hear the rush of the air as the batter swings his bat. The TV audience will hear the loud crack of the bat as it strikes the baseball. The TV audience will see the baseball the moment it is hit by the bat. This will be an action packed event never before witnessed by a TV audience.

Each of the pitched baseballs will produce breath taking excitement and expectations by the TV viewing audience. The TV audience will see the baseball as it travels outward from the crack of the bat onto the playing field. The TV audience will see the baseball get smaller as it gets further away from the instrumented home plate and the batter. The image of the baseball will move away from the center of the TV picture frame after it is hit. The audience will see the batter drop the bat and scramble toward first base. The image of the bat will grow in size and appear to the TV viewing audience as though it was going to hit them in the face as it careens down on and strikes the instrumented baseball home plate. Members of the TV viewing audience will duck to avoid being hit by the bat. The TV audience will hear the thud of the bat after the batter releases it and it hits the instrumented baseball home plate. The TV audience will hear the scraping by the batter's cleats on the ground as he scrambles to first base. The TV audience will see the size of the batter grow smaller as he runs toward first base and gets further from the instrumented baseball home plate.

The instrumentation package assembly 11 is supported at its upper end by a buffer plate 12. The instrumentation package assembly 11 and the buffer plate 12 are permanently encapsulated inside of the instrumented baseball home plate as the encapsulating material 19 around them cures. After the encapsulating material 19 sets, it becomes a weatherproof shock absorbing padding material 19. The small diameter end of the buffer plate 12 peers through the top 38 and upper protective cover plate 23 of the instrumented baseball home plate. The small diameter end of the buffer plate 12 is sealed and molded into the shock absorbing padding 16 around its circumference. The encapsulating material 19 is a permanent resilient compound that is air-tight and water-tight. The buffer plate 12 is encapsulated by the encapsulating material 19 inside the instrumented baseball home plate. The z-axes 29 and 31 of the bores in the buffer plate 12 are perpendicular to the top 38 of the instrumented baseball home plate. The end of the instrumentation package assembly 11 is inserted into the bores in the buffer plate 12, thereby aligning the z-axes 29 and 31 of the instrumentation package assembly 11 perpendicular to the top 38 of the instrumented baseball home plate.

The buffer plate 12 acts as a bearing for the instrumentation package assembly 11, and thereby restricts and restrains the motion of the instrumentation package assembly 11 inside the instrumented baseball home plate. Besides functioning as a bearing to support the instrumentation package assembly 11 within the instrumented baseball home plate, the buffer plate 12 provides a hollow portal through which the cameras 34 and 35 inside the instrumentation package assembly 11 may peer out of the instrumented baseball home plate at the baseball playing field.

The instrumented baseball home plate's outward appearance looks substantially the same as the conventional professional league baseball home plate and the conventional high school league baseball home plates shown in FIG. 41; and meets the official requirements for these venues and is interchangeable with them in these venues.

The buffer plate 12 is a Type XI buffer plate and is shown in FIG. 21ZA and FIG. 21ZB and FIG. 21ZC. The buffer plate 12 is molded into the instrumented baseball home plate using the white rubber encapsulating material 19. The small diameter end of the buffer plate 12 passes through the upper protective cover plate 23 and protrudes through the molded rubber top 38 of the instrumented baseball home plate. The buffer plate carries the optical windows 7 and 20. The flat surface of optical windows 7 and 20 are flush with the top 38 of the instrumented baseball home plate.

If the cameraman chooses to use spherical concentric dome shaped optical windows 7 and 20 instead of the flat ones in order to minimize the vignetting at the extreme 180 degree field of view of extremely wide angle lenses 36 and 37, then the spherical optical windows will protrude above 38 by about one half the diameter of the spherical optical window.

Buffer plate 12 is shown in detail in FIG. 21. It is made from a light-weight rigid polycarbonate, ABS or fiber reinforced plastic material. It is used to prop up and position the instrumented baseball home plate's upper protective cover plate 23. The buffer plate 12 is mounted and permanently encapsulated to the inside of the instrumented baseball home plate. The top of the buffer plate 12 is covered by upper protective cover plate 23. The purpose of upper protective cover plate 23 is to protect the instrumentation package assembly 11, which is below it, from being crushed when a player steps or slides into the instrumented baseball home plate.

In summary the buffer plate 12 is multi-purposed. It provides a mounting surface against which the upper protective cover plate 23 rests. It protects the instrumentation package assembly 11 from becoming misaligned relative to the portal through which cameras 34 and 35 peer out from the top surface 38 of the instrumented baseball home plate.

The instrumented baseball home plate has five sides just like the standard conventional baseball home plate. Their dimensions are identical to the dimensions of the standard conventional baseball home plate shown in FIG. 41. Side 21 is closest to the pitcher and is 17 inches long. Sides 4 and 9 form the apex of the instrumented baseball home plate. They are each 12.021 inches long, and join at right angles to one another at the apex of the instrumented baseball home plate.

It is not necessary to make the weight of the instrumented baseball home plate exactly identical to the weight of the conventional major league home plate shown in FIG. 41 because the instrumented baseball home plate will be immobile and will be anchored in the ground.

There are reasons however to make the weight of the instrumented baseball home plate approximately the same as that of the conventional major league home plate shown in FIG. 41. The first reason is so that when a player hits it, the instrumented baseball home plate will feel and react the same as the conventional major league home plate. Accordingly, the location of the center of gravity of the instrumented baseball home plate base and the conventional major league baseball home plate are both in roughly the same place. The second reason is so the field crew that maintains the playing field can handle the instrumented baseball home plate in the same way as they handle the conventional major league home plate.

The present invention contemplates the instrumented baseball home plate to be non-intrusive to the players in the game. The instrumented baseball home plate is constructed to produce substantially no audible noise that the player's may hear and be distracted by. The rubber encapsulating material absorbs the sound of the moving parts inside the instrumented baseball home plate. The sounds from inside the instrumented baseball home plate are made inaudible to the players who are outside the instrumented baseball home plate by sound absorption, muffling, baffling and damping methods designed into the instrumented baseball home plate.

The central body of the instrumentation package assembly 11 is essentially a cylindrical can and contains the battery pack. The bottom of the can has a removable lid. The lid can be removed in order to change out battery packs when the battery packs loose their ability to charge properly. Access to the bottom of the cylindrical can is through the circular aperture in the bottom 13 of the instrumented baseball home plate.

The z-axis 30 is the axis of symmetry of the instrumentation package assembly 11. The instrumentation package assembly 11 contains camera lenses 36 and 37, cameras 34 and 35, and supporting electronics. The battery pack supplies electrical power to the entire instrumentation package assembly 11. The instrumentation package assembly 11 is essentially a short cylindrical can like a tuna fish can. It is made strong to resist being crushed. Materials such as polycarbonates, ABS and fiber reinforced plastics are used in its construction.

Induction coil pairs 5 and 6 are located on the top and bottom of the instrumentation package assembly 11 central hub. The electrical induction coils 5 and 6 are used to inductively couple power into the battery pack from a power source located outside the instrumented baseball home plate. A block diagram showing the electrical battery charging circuit involving the induction coils and the battery pack is shown in FIG. 24. An induction coil which is external to the instrumented baseball home plate acts as a primary winding and is a source of electrical power which inductively couples electrical current into these induction coils 5 and 6. The external induction coil is laid flat on the top of the instrumented baseball home plate coaxially above coils 5 and 6 during the battery charging process. Electrical current which is induced into the induction coils 5 and 6 is fed into the battery pack in order to charge it.

A block diagram of the instrumentation package assembly 11 electronics is shown in FIG. 23 and FIG. 24. Four antennas 21, 22, 23, and 24 are used to accomplish the wireless transmission and reception of signals between the instrumented baseball home plate and the antenna array relay junction. The same four antennas 25, 26, 27, and 28 are used by the instrumented baseball home plate to both transmit video signals to the remote base station and receive control commands back from the remote base station.

In the preferred embodiment shown, the present invention contemplates the instrumented baseball home plate to be equipped with an instrumentation package assembly 11 that is mounted and encapsulated inside the instrumented baseball home plate, which is capable of wirelessly televising pictures and sounds of baseball games from its cameras 34 and 35 and its microphones 32 and 33 contained therein.

The instrumentation package assembly's 11 can is made of polycarbonate, ABS or fiber reinforced plastic which are strong and are non-conductors of electricity. It is necessary to use a non-conducting material so as to allow the transmitted and received radio signals to radiate thru it from the antenna elements 25, 26, 27 and 28 within the instrumentation package assembly 11 for the purpose of televising signals by wireless communications to and from the remote base station. The instrumentation package assembly assembly's network transceiver referred to in FIG. 36D wirelessly transmits real-time pictures and sounds from the instrumentation package assembly 11 cameras and microphones via the duel parallel antenna array element 25, 26, 27 and 28 also known as intentional radiators, to the antenna array relay junction.

As an alternative preferred embodiment, the duel parallel antenna array 25, 26, 27, and 28 shown in the instrumentation package assembly 11 is replaced with a helix antenna (not shown) with similar dimensions wound on the inside diameter of the instrumentation package assembly.

A antenna array relay junction referred to in FIG. 59A and FIG. 59B is deployed in the baseball stadium and receives radio signals from the instrumented baseball home plate's antenna array elements 25, 26, 27, and 28. Antenna array elements 25, 26, 27, and 28 are in quadrature to radiate radio signals to the antenna array relay junction with sufficient gain so as to overcome RF noise and provide for a large enough gain bandwidth product to accommodate real-time SD/HD picture quality requirements. The antenna array is a dual parallel antenna array.

The instrumentation package assembly's network transceiver referred to in FIG. 36D also provides a wireless means for the instrumented baseball home plate to receive command and control radio signals from the base station. The instrumentation package assembly assembly's 11 battery pack is wirelessly inductively charged before and during games on an as needed basis, using the charging station unit shown in preferred embodiment shown in FIG. 37A and FIG. 37B and FIG. 37C. The charging station unit is placed on the top of the instrumented baseball base when it is charging the battery pack. Charging of the battery pack 41 is accomplished wirelessly by inductive coupling. The instrumented baseball base's two pairs of inductive pickup coils 5 and 6 act as the secondary windings of an air core transformer. Time varying magnetic flux is furnished to 5 and 6 by the primary windings of the charging station unit.

The antennas 25, 26, 27, and 28 are deployed below the upper protective cover plate 23 inside the instrumented baseball home plate. The antennas form a phased array. The radiation pattern from the phased array antennas 25, 26, 27, and 28 can be maximized to radiate and receive preferentially in the direction of the pickup antenna used by the remote base station. This reduces the noise in the transmission link.

The instrumentation package assembly 11 has two flexible corrugated bellows skin sections like 14. The height of the instrumentation package assembly 11 is approximately ⅓ the thickness of the instrumented baseball home plate.

The two corrugated bellows segments like 14 of the instrumentation package assembly 11 connect the outer portion of the instrumentation package assembly 11 with its central body hub. The two corrugated sections like 14 of the instrumentation package assembly 11 allows the instrumentation package assembly 11 to flex, stretch and compress when the instrumented baseball home plate is impacted. This enables the instrumentation package assembly 11 to resist shock and vibration. Additionally, the two corrugated sections allow the instrumentation package assembly 11 to act as a spring and compress or expand its length without damaging its contents. When circumstances arise where the players tend to crush the instrumented baseball home plate, the instrumentation package assembly will compress or expand and take the shock without damaging or misaligning its contents.

The rubber encapsulating material 19 provides shock absorbing padding between the upper protective cover plate 23 and the instrumentation package assembly 11. A purpose of the encapsulating material is to cushion the blows to the instrumented baseball home plate that would otherwise result in damaging shock and vibration to the instrumentation package assembly 11 and its contents. The rubber encapsulating material 19 also provides protection for the instrumentation package assembly 11 from dirt, moisture and the environment.

The z-axis 30 of the instrumented baseball home plate is orthogonal to the x and y axes 15 and 2 respectively, of the instrumented baseball home plate.

Each of the microphones 32 and 33 listens for sounds from their respective sides of the instrumented baseball home plate. The condenser microphones enable the viewing audience to hear real-time contacts, impacts and shocks to the instrumented baseball home plate. Microphones 32 and 33 enable the TV audience to hear sounds that result from air or any physical contacts or vibrations to the instrumented baseball home plate; like for example, the crash of a player sliding into the instrumented baseball home plate.

Microphone 45 protrudes through a hole in the top of the instrumented baseball home plate. Microphone 45 enables the TV audience to hear sounds that occur on the baseball playing field. Microphone 45 enables the TV audience to hear the whoosh of air as a pitched baseball passes above the instrumented baseball home plate.

Simultaneously live 3D TV pictures are taken by the TV cameras 34 and 35 of their respective field of views of the live action on the playing field. Cameras 34 and 35 will enable the TV audience to see a right or left handed batter swing his bat, up close, to strike the baseball as it whizzes bye above the instrumented baseball home plate. Microphone 45 enables the TV audience to hear sounds like the rush of the air as the batter swings his bat. The TV audience will hear the loud high fidelity crack of the bat as it strikes the baseball. The TV audience will see the baseball come toward them from the pitcher's hand as if the audience themselves were standing at the plate. The TV audience will see a close-up of the baseball right in front of them the moment it is hit by the bat. It will seem to the audience like they themselves hit the baseball. This will be an action packed event never before witnessed by a TV audience. Some members of the TV audience will flinch as the baseball is pitched near to them. Each of the pitched baseballs will produce breath taking excitement and expectations by the TV viewing audience. The TV audience will see the baseball as it travels outward from the bat onto the playing field. The TV audience will see the baseball get smaller as it gets further away from the instrumented baseball home plate and the batter. The audience will see and hear the batter drop his bat and scramble toward first base. The TV audience will hear the thud of the bat after the batter releases it and it hits the ground. The TV audience will hear the scraping by the batter's cleats on the ground as he scrambles to first base. The TV audience will see the size of the batter grow smaller as he runs toward first base and gets further away from home plate. In summary, the instrumented baseball home plate provides video and sound to the viewing audience that is so exciting and realistic that it makes the individual members of the audience feel that they are at bat and in the game. In many ways this is more exciting than viewing the game in person from the stands of the baseball stadium.

A block diagram showing the detailed flow of electrical signals and data in the instrumentation package assembly 11 is shown in the preferred embodiment given in FIG. 36D and FIG. 36E. The present invention contemplates the instrumented baseball home plate's battery pack being wirelessly charged by a charging station shown in FIG. 37A and FIG. 37B and FIG. 37C. The diameter of the instrumentation package assembly 11 is kept to a minimum in order to minimize its footprint inside the instrumented baseball home plate. The dimension of the outside diameter of the instrumentation package assembly 11 (not including the four antennas) is governed largely by the physical diagonal dimension of the largest components within the instrumentation package assembly 11, like the SD/HD camera's CCD sensor array and the battery pack.

The battery's charging coil pairs 5 and 6 are wound on the outside diameter of the instrumentation package assembly 11 at both the top and bottom of its central hub and act electrically as a transformer's secondary windings. The coils are wound on the outside diameter of the instrumentation package assembly 11 to keep any heat they may produce away from the contents of the instrumentation package assembly 11 while the battery pack is being charged. The number of turns in each charging coil pair 5 and 6 is made large enough to enable them to inductively couple a sufficient number of magnetic lines of flux from the primary coil of the battery charging station so as to charge the battery pack in a reasonably short time before games. When the charging station is placed on top 38 of the instrumented baseball home plate, the charging coil pairs 5 and 6 receive electrical energy inductively coupled from the primary coils of the charging station, and use this energy to charge the battery pack.

In certain venues where stereo 3-D is not required from the instrumented baseball plate, the stereo 3-D camera pair that typically has two identical lenses 36 and 37 may be replaced with two dissimilar lenses having different focal length ranges and fields of view for example. Under these same circumstances, the identical cameras 34 and 35 of the 3-D stereo camera pair may be replaced with two dissimilar cameras. For example, the 3-D stereo camera pair that faces the batter from the top of an instrumented baseball home plate may be considered to be non-essential by the cameraman. Instead, the cameraman may elect to set two dissimilar focal lengths into the lenses 36 and 37 facing the batter. One lens, 36 for example, may be set to a long focal length for close-up facial expressions of the batter, where the other lens 37 may be set to a short focal length for wider shots.

In a further preferred embodiment, the present invention referring to FIG. 45A and FIG. 45B contemplates an instrumented baseball home plate, which when stationed off of any baseball playing field i.e. at the traditional home plate location in the pitcher's bullpen can wirelessly and autonomously televise baseball pitching practice and warm-up sessions under command and control of the remote base station. The remote base station is disclosed in FIG. 59A and FIG. 59B and FIG. 60A and FIG. 60B and FIG. 61A and FIG. 61B. In addition to adding an element to the entertainment of the TV viewing audience, the embodiment serves to aid the pitchers and the pitching coaches in evaluating the quality of the pitcher's progress, prowess, fitness and "stuff".

The instrumented baseball home plate is an example of a static instrumented sports paraphernalia. For televising games from off the playing field, for example in the pitcher's bullpen, refer to FIG. 64C which is a top view of a general sports stadium that has been configured and equipped for use with both static and dynamic instrumented sports paraphernalia, using both bi-directional wireless radio wave communication links and/or bi-directional fiber optics cable/copper cable communication links.

The cameraman, in the remote base station, software selects either the wireless mode of communication, and/or the fiber optics/copper cable mode of communication between each of the instrumented baseball home plates and the remote base station. The cameraman can use whichever equipment (antenna array relay junction or fiber optics cable/copper cable) is installed in the stadium with which to command and control his choice and communicate it to the instrumented baseball home plates on the stadium playing field. These choices are also physically switch selectable by the cameraman with his access through the opening in the bottom of the instrumented baseball home plates. Refer to FIG. 59A and FIG. 59B, and FIG. 60A and FIG. 60B, and FIG. 61A and FIG. 61B, and FIG. 64A and FIG. 64B and FIG. 64C for disclosures regarding the remote base station and the antenna array relay junction.

The cameraman selects items from a software menu of control commands that go to the network transceiver at the remote base station that are subsequently transmitted to the instrumented baseball home plates for the purpose of adjusting various system initializations, operating parameters, radio frequency, polling system status data such as battery condition, and initiating remote mechanical adjustments such as camera focus, optical zoom, iris and movement to the cameras' field of view, etc over the selected bi-directional communications link i.e. wireless radio, fiber optics or copper cable connectivity being used within the particular sports stadium.

These commands, when intercepted by the network transceiver within the instrumented baseball home plates are applied to its microprocessor, which then in turn upon executing the instructions stored within the contents of its firmware applies a pulse coded control signal via the power and control interconnect interface inside the instrumentation package to the corresponding electronics i.e. the mechanical actuators that provides optical focus and/or zoom adjustment of the cameras and microphone gain and selection, etc as desired by the cameraman and/or special software running on the computer at the remote base station. The power and control interconnect interface as shown in FIG. 33E (item 21), which is represented by dotted lines, consists of the electrical control wiring to and from the electronic components of the instrumented baseball home plates that are being controlled.

Referring to the Preferred Embodiments Specified in FIG. 45A and FIG. 45B, the Instrumented Baseball Home Plate Satisfies all of the Following Objectives:

It is an objective of the present invention to instrument a baseball home plate composed of an instrumentation package assembly, buffer plate assembly, encapsulation cushioning material, upper protective cover plate, and lower protective cover plate. It is an objective of the present invention to protect the instrumentation package assembly from shock, vibration, dirt and the weather inside the instrumented baseball home plate. It is an objective of the present invention to maintain the alignment of the instrumentation package assembly inside the instrumented baseball home plate. It is an objective of the present invention to make the picture frames, of the two cameras that make up the 3-D stereo camera pair, congruent and register onto one another independent of the camera's direction.

FIG. 46A and FIG. 46B

The detailed physical elements disclosed in the instrumented baseball base drawings shown in FIG. 46A and FIG. 46B are identified as follows: 1 is the central body of the instrumentation package assembly. 2 is the typical electronics of an instrumentation package assembly element. 3 corrugated bellows segment of an instrumentation package assembly element. 4 is an instrumentation package assembly element. 5 is a camera. 6 is a Type VIII buffer plate. 7 is the slightly conical small diameter end of the buffer plate 6. 8 is a camera lens. 9 is the optical and mechanical axis of the camera contained in the instrumentation package assembly element 4. 10 is an optical window. 11 is shock absorbing padding. 12 is a side cover of the instrumented baseball base. 13 is the battery pack. 14 is an induction coil for wirelessly charging the battery package. 15 corrugated bellows segment of an instrumentation package assembly element. 16 is an instrumentation package assembly element. 17 is a miniature SD/HD TV camera. 18 is a Type VIII buffer plate. 19 is the slightly conical small diameter end of the buffer plate 18. 20 is a camera lens. 21 is the mechanical x-axis of the instrumentation package assembly. 22 is an optical window. 23 is the corrugated bellows segment of an instrumentation package assembly element. 24 is a instrumentation package assembly element. 25 is a camera. 26 is a side cover of the instrumented baseball base. 27 is shock absorbing padding. 28 is a Type VIII buffer plate. 29 is the slightly conical small diameter end of the buffer plate 28 pressed into the bore of the baseball base. 30 is a camera lens. 31 is the optical and mechanical axis of the camera contained in the instrumentation package assembly element 24. 32 is an optical window. 33 is the threaded sleeve carrying the optical window. 34 is shock absorbing padding. 35 is a side cover of the instrumented baseball base. 36 corrugated bellows segment of an instrumentation package assembly element. 37 is a instrumentation package assembly element. 38 is a camera. 39 is a Type VIII buffer plate. 40 is the slightly conical small diameter end of the buffer plate 39. 41 is a camera lens. 42 is the x-axis of the instrumented baseball base and the instrumentation package assembly. 43 is an optical window. 44 is shock absorbing padding. 45 is a side cover of the instrumented baseball base. 46 is the z-axis of the instrumented baseball base. 47 is an induction coil for wirelessly charging the battery package. 48 is the bottom surface of the instrumented baseball base. 49 is the upper protective cover plate shield. 50 is the lower protective cover plate shield. 51 is the top surface of the instrumented baseball base. 52 is the tilted optical axis of camera lens 41. 53 is the tilted optical axis of camera lens 20. 54 is the bottom access lid heat sink on the instrumentation package assembly. 55 is the access opening in the lower protective cover plate shield. 56 is the radio antenna. 57 is a microphone. 58 is a microphone. 59 is a microphone. 60 is a microphone. 61 is a gas valve. 62 is the fiber optics cable/copper cable connector.

FIG. 46A is a top view of a four tilted camera instrumented baseball base.

FIG. 46B is a side view of a four tilted camera instrumented baseball base.

Referring to drawings FIG. 46A and FIG. 46B, in a preferred embodiment, the present invention contemplates an instrumented baseball base, which when stationed on any baseball playing field at any or all of the traditional $1^{st}$, $2^{nd}$ and $3^{rd}$ base locations can wirelessly and autonomously televise baseball games under the command and control of the remote base station. The remote base station is disclosed in FIG. 59A and FIG. 59B and FIG. 60A and FIG. 60B and FIG. 61A and FIG. 61B.

Referring to the preferred embodiments disclosed in FIG. 60A and FIG. 60B, and FIG. 61A and FIG. 61B the baseball stadium is also equipped with bi-directional multi-function fiber optic cable communication links to televise baseball games from sports paraphernalia i.e. $1^{st}$, $2^{nd}$, $3^{rd}$ bases to a remote base station. The instrumentation package assembly 1 has bi-directional multi-function fiber optic cable/copper cable connectivity with the remote base station via these cables. The fiber optics cable/copper cable, which is run beneath the ground of the baseball stadium playing field, enters the bottom of the instrumented baseball base through the base's access opening 55. The fiber optic/copper cable's connector is connected to its mating instrumentation package assembly 1 connector 62 in the bottom of the instrumented baseball bases. The instrumentation package assembly connector 62 is wired to the instrumentation package assembly electronics 2.

The only substantial difference between the instrumented baseball base shown in FIG. 46A and FIG. 46B and the one shown in FIG. 38A and FIG. 38B is that two of the cameras in FIG. 46A and FIG. 46B are tilted upward, whereas all the cameras in FIG. 38A and FIG. 38B are looking horizontally.

The instrumented baseball base employs a four camera instrumentation package assembly substantially identical to the instrumentation package assembly shown in FIG. 42E and FIG. 42F; except that it uses the Type VIII buffer plate assemblies rather than the Type VII buffer plate assemblies.

The Type VII buffer plate assemblies are shown in FIG. 21N and FIG. 21O and FIG. 21P.

The Type VIII buffer plate assemblies are shown in FIG. 21Q and FIG. 21R and FIG. 21S.

The only difference between the Type VIII buffer plate assemblies and the Type VII buffer plate assemblies shown in FIG. 42C and FIG. 42D is that the Type VIII buffer plates use a plane-parallel-flat optical window rather than the shell-like-domed optical window used in the Type VII buffer plate assemblies.

The plane-parallel-flat optical window is more unobtrusive to the baseball players; and is less exposed to the hostile playing field environment, and is more dirt free. The optical windows peer out from the sides of the base through clearance holes in the bases cover.

Each one of the four cameras 5, 17, 25 and 38 is housed in each of the four instrumentation package assembly elements 4, 16, 24 and 37 of which there are four instrumentation package assembly elements in the instrumentation package assembly. Details of each of the four instrumentation package assembly elements which are principal parts of the instrumentation package assembly are shown in FIG. 36A and FIG. 36B and FIG. 36C.

It is understood that as the state of the art in TV camera technology advances, that there will be other better TV cameras that use other than CCD technology. The present invention will work equally well with them as they become available. Therefore, the present invention uses CCD TV cameras as an example of TV cameras that may be used simply because they are the best that today's technology offers, and is not confined only to their sole use in the future.

Each of the instrumentation package assembly elements 4, 16, 24 and 37 are identical. The instrumentation package assembly elements are disclosed in FIG. 36A and FIG. 36B and FIG. 36C.

Referring to the disclosed instrumented baseball base shown in FIG. 46A and FIG. 46B, the instrumented baseball base has an instrumentation package assembly containing four instrumentation package assembly elements mounted inside the instrumented baseball base. Details of instrumentation package assembly are shown in FIG. 42E and FIG. 42F. Details of instrumentation package assembly elements are shown in FIG. 36A and FIG. 36B and FIG. 36C. The outer covering i.e. canvas of both the instrumented baseball base and the conventional baseball base are made identical, both having the same size, shape, color and texture.

The instrumentation package assembly 1 carries four CCD sensor arrayed cameras 5, 17, 25 and 38, and four microphones 57, 58, 59 and 60, and a radio antenna 56. The four cameras 5, 17, 25 and 38 have optical axes 9, 21, 31 and 42. The cameras look outward from the four sides of the instrumented baseball base along their respective optical axes 9, 21, 31 and 42. In order to maximize the viewing pleasure of the TV audience, it is sometimes necessary to individually aim each of the cameras 5, 17, 25 and 38 with their lines of sight 9, 21, 31 and 42 above the horizon by varying degrees. This need varies depending on the location of each of the instrumented baseball bases on the baseball playing field and the shape of the baseball playing field at the particular baseball stadium venue where the baseball game is being held. The angles of each of the cameras' lines of sight 9, 21, 31 and 42 above the horizon can be pre-set into the instrumented baseball base prior to a game during the encapsulation process. For example, camera 17 can be tilted upward so that its line of sight changes from 21 to 53. Each of the cameras 5, 17, 25 and 38 contained in the instrumentation package assembly can be adjusted using their flexible bellows sections 3, 15, 23 and 36 respectively.

The instrumentation package assembly 1 has four camera lenses 8, 20, 30 and 41. The cameraman can choose all four lenses to be identical to one another. The cameraman can choose some of the four lenses to be identical to one another. The cameraman can choose all of four lenses to be different from one another. The cameraman makes these choices based on the art, venue and the entertainment value of each choice to the TV viewing audience.

The instrumented baseball base is formed in an encapsulating process. The instrumented baseball base is molded from white rubber. When the rubber cures, it behaves like a cushion. The instrumentation package assembly is placed into the base's mold. When the rubber cures, it acts as a cushion 11 and 27 and 34 and 44 for the instrumentation package assembly that is encapsulated inside the molded base. The cushioning material acts to shield and insulate the instrumentation package assembly contained therein from shock, vibration and the weather.

As an example, FIG. 46B shows cameras 17 and 38 tilted upward. The bellows section 36 of the instrumentation package assembly is pre-bent by a prescribed amount prior to encapsulation, thereby enabling the angle between the axes 42 and 52 to be pre-set to a chosen value. The bellows section 15 of the instrumentation package assembly is pre-bent by a prescribed amount prior to encapsulation, thereby enabling the angle between the axes 21 and 53 to be pre-set to a chosen value. These angles are encapsulated in place when the cushioning encapsulating material that forms the instrumented baseball base cures in the interior of the base around the instrumentation package assembly during the encapsulating process. For example, the encapsulating material 44, 11, 27 and 34 surrounds the buffer plate assemblies 39, 6, 18 and 28 and the bellows sections 36, 3, 15 and 23, and as it cures it holds the cameras 38, 5, 17 and 25 in place.

Tilting of the cameras and their respective camera lenses has advantages over aiming them horizontally. When the cameras are aimed horizontally from their respective sides of their instrumented baseball bases, about one half of the field of view is obscured by the ground level. As the cameras are tilted upward, more of the field of view becomes un-obscured by the ground and becomes useful.

The instrumented baseball base's cover is substantially the same canvas material/or other synthetic material as used in conventional baseball bases. 51 is the top of the instrumented baseball base and is covered with the canvas cover et al. 51 is shown flat in FIG. 46A and FIG. 46B.

In another preferred embodiment (not shown in a separate drawing), the shape of the top 51 of the instrumented baseball base is rounded downward and domed shaped as it is on many of the current baseball bases on baseball stadium playing fields. For example, some colleges use honeycombed solid plastic bases that are rounded and domed shaped and tapered. The upper protective cover plate 49 just beneath the top of the base is also rounded downward and domed shaped. Domed shaped protective cover plates shown in FIG. 55A and FIG. 55B and FIG. 55C, and FIG. 56A and FIG. 56B and FIG. 56C, FIG. 57A and FIG. 57B and FIG. 57C, and FIG. 58A and FIG. 58B and FIG. 58C are used. The space between the top of the base and the top of the upper protective cover plate is filled with encapsulation padding. The upper protective cover plate 49 is shaped congruent with the top 51.

Beneath the cover of the instrumented baseball base is its interior. The interior of the instrumented baseball base is filled with a soft encapsulating material 11, 27, 34 and 44 like synthetic foam. The encapsulating material 11, 27, 34 and 44 serves to hold the instrumentation package assembly hub and instrumentation package assembly elements aligned in their places, and also acts as shock absorbing padding to the instrumentation package assembly hub and instrumentation package assembly elements which it encapsulates.

The cameraman in the remote base station software selects either the wireless mode of communication, and/or the fiber optics/copper cable mode of communication between each of the instrumented baseball bases and the remote base station. The cameraman can use whichever equipment (antenna arrays or fiber optics cable/copper cable) is installed in the baseball stadium with which to command and control his choice and communicate it to the instrumented baseball bases on the baseball stadium playing field. These choices are also physically switch selectable by the cameraman with access through the opening in the bottom of the instrumented baseball bases.

The cameraman selects items from a software menu of control commands that go to the network transceiver at the remote base station that are subsequently transmitted to the instrumented sports paraphernalia for the purpose of adjusting various system initializations, operating parameters, radio frequency, polling system status data such as battery condition, and initiating remote mechanical adjustments such as camera focus, optical zoom, iris and movement to the cameras' field of view, etc over the selected bi-directional communications link i.e. wireless radio, fiber optics or copper cable connectivity being used within the particular sports stadium.

These commands, when intercepted by the network transceiver within the instrumented sports paraphernalia are applied to its microprocessor, which then in turn upon executing the instructions stored within the contents of its firmware applies a pulse coded control signal via the power and control interconnect interface inside the instrumentation package to the corresponding electronics i.e. the mechanical actuators that provides optical focus and/or zoom adjustment of the cameras and microphone gain and selection, etc as desired by the cameraman and/or special software running on the computer at the remote base station. The power and control interconnect interface as shown in FIG. 36D (item 21), which is represented by dotted lines, consists of the electrical control wiring to and from the electronic components of the instrumented sports paraphernalia that are being controlled.

Referring to the Preferred Embodiments Specified in FIG. 46A and FIG. 46B, the Instrumented Baseball Base Satisfies all of the Following Objectives:

It is an objective of the present invention that the instrumented baseball base be composed of a four camera instrumentation package assembly, four buffer plate assemblies, encapsulation shock-proofing padding, upper protective cover plate, canvas cover and lower protective cover plate. It is an objective of the present invention to enable the cameraman to set the tilt angle of the cameras of the instrumentation package assembly so that their lines of sight is angled above the ground level of the baseball playing field. It is an objective of the present invention that the instrumented baseball base has a top, and an upper protective cover plate, that are both flat and rounded downward near their edges and where the upper protective cover plate is spaced just beneath the top of the base. It is an objective of the present invention that the instrumented baseball base has a top, and an upper protective cover plate, that is both congruent and rounded downward and domed shaped where the upper protective cover plate is spaced just beneath the top of the base. It is an objective of the present invention to fill the volume of the instrumented baseball base beneath its cover in its interior with a soft encapsulating material like synthetic foam to hold all the contents of the instrumented baseball base aligned in their places, and act as a shock absorbing padding for the instrumentation package assembly hub, instrumentation package assembly elements, buffer plate assemblies, upper protective cover plate, and lower protective cover plate. It is an objective of the present invention to enable the cameraman in the remote base station to software select either the wireless mode of communication, and/or the fiber optics/copper cable mode of communication between the instrumented baseball bases and the remote base station by sending a control signal to the baseball base. It is an objective of the present invention to enable the cameraman to select either the wireless mode of communication, and/or the fiber optics/copper cable mode of communication between the instrumented baseball bases and the remote base station by physically setting a switch in the bottom of the instrumented baseball base with access through the bottom of the instrumented baseball base.

FIG. 47A and FIG. 47B

The detailed physical elements disclosed in the instrumented baseball base drawings show in FIG. 47A and FIG. 47B are identified as follows: 1 is the optical and mechanical axis of the camera 69. 2 is an induction coil for charging the battery pack. 3 is the mechanical axis of symmetry of the Type X buffer plate. 4 is the small cylindrical outside diameter end of the buffer plate 9. 5 is the optical and mechanical axis of the camera 11. 6 is the plane-parallel-flat optical window mounted on and sealed to the small cylindrical diameter end of the buffer plate. 7 is the small cylindrical outside diameter end of the buffer plate. 8 is the camera lens for camera 11. 9 is the body of the Type X buffer plate. 10 is the side of the instrumented baseball base. 11 is a camera paired for 3-D with camera 69. 12 is the cylindrical skin of the instrumentation package assembly element containing camera 11. 13 is the bellows segment of an instrumentation package assembly element. 14 is the side of the instrumented baseball base. 15 is the central body of the instrumentation package assembly. 16 is the bellows segment of an instrumentation package assembly element. 17 is the camera. 18 is the camera lens. 19 is the shock-proofing baseball base padding. 20 is the small cylindrical outside diameter end of the buffer plate 27. 21 is the optical and mechanical axis of the camera 17. 22 is plane-parallel-flat optical window mounted on and sealed to the small cylindrical diameter end of the buffer plate. 23 is the small cylindrical outside diameter end of the buffer plate. 24 is the mechanical axis of the instrumentation package assembly. 25 is the camera lens of camera 26. 26 is a camera. 27 is the body of the Type X buffer plate. 28 is the bellows segment of an instrumentation package assembly element. 29 is the central body of the instrumentation package assembly. 30 is the bellows segment of an instrumentation package assembly element. 31 is the shock-proofing baseball base padding. 32 is the body of the Type X buffer plate. 33 is a camera paired for 3-D with camera 43. 34 is the camera lens for camera 33. 35 is the optical and mechanical axis of the camera 33. 36 is the plane-parallel-flat optical window mounted on and sealed to the small cylindrical diameter end of the buffer plate. 37 is the small cylindrical outside diameter end of the buffer plate 32. 38 is the mechanical axis of symmetry of the Type X buffer plate. 39 is the small cylindrical outside diameter end of the buffer plate. 40 is plane-parallel-flat optical window mounted on and sealed to the small cylindrical diameter end of the buffer plate. 41 is the optical and mechanical axis of the camera 43. 42 is the camera lens of camera 43. 43 is a camera paired for 3-D with camera 33. 44 is the bellows segment of an instrumentation package assembly element. 45 is the shock-proofing baseball base padding. 46 is the central body of the instrumentation package assembly. 47 is the bellows segment of an instrumentation package assembly element. 48 is a camera paired for 3-D with camera 61. 49 is the body of the Type X buffer plate. 50 is the small cylindrical outside diameter end of the buffer plate 49. 51 is the plane-parallel-flat optical window mounted on and sealed to the small cylindrical diameter end of the buffer plate. 52 is the optical and mechanical axis of the camera 48. 53 is the camera lens for camera 48. 54 is the mechanical axis of symmetry of the Type X buffer plate. 55 is the central body of the instrumentation package assembly. 56 is the small cylindrical outside diameter end of the buffer plate. 57 is the optical and mechanical axis of the camera 61. 58 is plane-parallel-flat optical window mounted on and sealed to the small cylindrical diameter end of the buffer plate. 59 is the camera lens of camera 61. 60 is the side of the baseball base. 61 is a camera paired for 3-D with camera 48. 62 is the cylindrical segment of the instrumentation package assembly element. 63 is the bellows segment of an instrumentation package assembly element. 64 is the central body of the instrumentation package assembly. 65 is an induction coil for charging the battery pack. 66 is the bellows segment of an instrumentation package assembly element. 67 is the cylindrical skin of an instrumentation package assembly element. 68 is the shock-proofing baseball base padding. 69 is a camera paired for 3-D with camera 11. 70 is the camera lens. 71 is the plane-parallel-flat optical window mounted on and sealed to the small cylindrical diameter end of the buffer plate. 72 is the plane-parallel-flat optical window mounted on and sealed to the small cylindrical diameter end of the buffer plate. 73 is the side surface of the instrumented baseball base. 74 is the intersection of the x and y and z axes of symmetry of the instrumented baseball base and the instrumentation package assembly. 75 is the optical and mechanical z-axis of camera 33. 76 is an induction coil for charging the battery pack. 77 is the z-axis of symmetry of the buffer plate 32. 78 is the z-axis of camera 42. 79 is the bottom surface of the instrumented baseball base. 80 is the lower protective cover plate shield. 81 is the upper protective cover plate shield. 82 is the tilted optical axis of the 3-D stereo camera pair comprised of cameras 17 and 26. 83 is the tilted optical axis of the 3-D stereo camera pair comprised of cameras 48 and 61. 84 is the bottom access lid heat sink to the instrumentation package assembly. 85 is a radio antenna. 86 is a microphone. 87 is a microphone. 88 is a microphone. 89 is a microphone. 90 is the access opening in the lower protective cover plate shield of instrumented baseball base. 91 is a gas valve. 92 is the fiber optics cable/copper cable connector.

FIG. 47A is a top view of an eight tilted camera instrumented baseball base.

FIG. 47B is a side view of an eight tilted camera instrumented baseball base.

Referring to drawings FIG. 47A and FIG. 47B, in a preferred embodiment, the present invention contemplates an instrumented baseball base, which when stationed on any baseball playing field at any or all of the traditional 1st, 2nd and 3rd base locations can wirelessly and autonomously televise baseball games under the command and control of the remote base station. The remote base station is disclosed in FIG. 59A and FIG. 59B and FIG. 60A and FIG. 60B and FIG. 61A and FIG. 61B.

Referring to the preferred embodiments disclosed in FIG. 60A and FIG. 60B, and FIG. 61A and FIG. 61B the baseball stadium is also equipped with bi-directional multi-function fiber optic cable communication links to televise baseball games from sports paraphernalia i.e. 1st, 2nd, 3rd bases to a remote base station. The instrumentation package assembly 29 has bi-directional multi-function fiber optic cable/copper cable connectivity with the remote base station via these cables. The fiber optics cable/copper cable, which is run beneath the ground of the baseball stadium playing field, enters the bottom of the instrumented baseball base through the base's access opening 60. The fiber optic/copper cable's connector is connected to its mating instrumentation package assembly 29 connector 92 in the bottom of the instrumented baseball bases. The instrumentation package assembly connector 92 is wired to the instrumentation package assembly electronics.

The only substantial difference between the instrumented baseball base shown in FIG. 47A and FIG. 47B and the one shown in FIG. 39A and FIG. 39B is that four of the cameras (i.e. two 3-D stereo camera pairs) in FIG. 47A and FIG. 47B are tilted upward, whereas all the cameras in FIG. 39A and FIG. 39B are looking horizontally.

The instrumented baseball base employs an eight camera instrumentation package assembly substantially identical to the instrumentation package assembly shown in FIG. 43E and FIG. 43F; except that it uses four of the Type X buffer plate assemblies rather than four of the Type IX buffer plate assemblies.

The Type IX buffer plate assemblies are shown in FIG. 21T and FIG. 21U and FIG. 21V.

The Type X buffer plate assemblies are shown in FIG. 21W and FIG. 21X and FIG. 21Y.

The only difference between the Type X buffer plate assemblies and the Type IX buffer plate assemblies is that the Type X buffer plates use a plane-parallel-flat shaped optical window rather than the shell-like-domed shaped optical window used in the Type IX buffer plate assemblies.

The plane-parallel-flat optical window is more unobtrusive to the baseball players; and is less exposed to the hostile playing field environment, and is more dirt free. It has a distinct disadvantage however in that it can not handle camera lenses with extremely wide fields of view, like the spherical-domed shaped windows can, without vignetting. The optical windows peer out from the sides of the base through clearance holes in the bases cover.

Each one of the eight cameras 69, 11, 17, 26, 33, 43, 48 and 61 is housed in each of the eight instrumentation package assembly elements 67, 12, 16, 28, 30, 44, 47 and 62 of which there are eight instrumentation package assembly elements in the instrumentation package assembly. Details of each of the eight instrumentation package assembly elements which are principal parts of the instrumentation package assembly are shown in FIG. 36A and FIG. 36B and FIG. 36C.

It is understood that as the state of the art in TV camera technology advances, that there will be other better TV cameras that use other than CCD technology. The present invention will work equally well with them as they become available. Therefore, the present invention uses CCD TV cameras as an example of TV cameras that may be used simply because they are the best that today's technology offers, and is not confined only to their sole use in the future.

Each of the instrumentation package assembly elements 66, 13, 16, 28, 30, 44, 47 and 63 are identical. The instrumentation package assembly elements are disclosed in FIG. 36A and FIG. 36B and FIG. 36C.

Referring to the disclosed instrumented baseball base shown in FIG. 47A and FIG. 47B, the instrumented baseball base has an instrumentation package assembly containing eight instrumentation package assembly elements mounted inside the instrumented baseball base. Details of instrumentation package assembly are shown in FIG. 43E and FIG. 43F.

Details of instrumentation package assembly elements are shown in FIG. 36A and FIG. 36B and FIG. 36C. The outer covering i.e. canvas of both the instrumented baseball base and the conventional baseball base are made identical, both having the same size, shape, color and texture.

The instrumented baseball base's cover is substantially the same canvas material/or other synthetic material as used in conventional baseball bases. 10 is the top of the instrumented baseball base and is covered with the canvas cover. 10 is shown flat in FIG. 47A and FIG. 47B. In another preferred embodiment, the top 10 of the instrumented baseball base is rounded and domed shaped as it is on many of the current baseball bases on baseball stadium playing fields.

Beneath the cover of the instrumented baseball base is its interior. The interior of the instrumented baseball base is filled with a soft encapsulating material 19, 31, 45 and 68 like synthetic foam. The encapsulating material 19, 31, 45 and 68 serves to hold the instrumentation package assembly hub and instrumentation package assembly elements aligned in their places, and also acts as shock absorbing padding to the instrumentation package assembly hub and instrumentation package assembly elements which it encapsulates.

The instrumentation package assembly 55 carries eight CCD sensor arrayed cameras 69, 11, 17, 26, 33, 43, 48 and 61 and four microphones 88, 89, 86, and 87 and a radio antenna 85. The eight cameras 69, 11, 17, 26, 33, 43, 48 and 61 look outward from the four sides of the instrumented baseball base along their respective optical axes. The eight cameras are grouped into four 3-D stereo camera pairs. The pairs are 69 and 11, 17 and 26, 33 and 43, 48 and 61. Each 3-D stereo camera pair looks outward respectively from each of the four sides of the instrumented baseball base.

In order to maximize the viewing pleasure of the TV audience, it is sometimes necessary to individually aim each of the 3-D stereo camera pairs, for example 17 and 26, upward above the ground level with their lines of sight above the horizon. For example, cameras 17 and 26 are tilted upward so their line of sight changes from 24 to 82. This need varies depending on the location of each of the instrumented baseball bases on the baseball playing field and the shape of the baseball playing field at the baseball stadium venue where the baseball game is being held. The angles of each of the 3-D stereo camera pairs' line of sight above the horizon can be pre-set into the instrumented baseball base prior to a game during the encapsulation process. Each of the tilt angles of each 3-D stereo camera pairs may be set different from the others. Each 3-D stereo camera pair has two flexible corrugated bellows segments. For example, 3-D stereo camera pair 17 and 26 has two corrugated bellows sections 16 and 28 respectively. Each of the tilt angles of each 3-D stereo camera pair contained in the instrumentation package assembly can be adjusted using their two flexible corrugated bellows sections.

The instrumented baseball base is formed in an encapsulating process. The instrumented baseball base is molded from white rubber. When the rubber cures, it behaves like a cushion. The instrumentation package assembly is placed into the base's mold. When the rubber cures, it acts as a cushion for example 68, 31 and 45 for the instrumentation package assembly that is encapsulated inside the molded base. The cushioning material acts to shield and insulate the instrumentation package assembly contained therein from shock, vibration and the weather.

As an example, FIG. 47B shows cameras 17 and 26 tilted upward. The corrugated bellows section 16 of the instrumentation package assembly is pre-bent by a prescribed amount prior to encapsulation, thereby enabling the angle between the axes 24 and 82 to be pre-set to a chosen value. The bellows section 16 of the instrumentation package assembly is pre-bent by a prescribed amount prior to encapsulation, thereby enabling the angle between the axes 24 and 82 to be pre-set to a chosen value. These angles are encapsulated in place when the cushioning encapsulating material that forms the instrumented baseball base cures in the interior of the instrumented baseball base around the instrumentation package assembly during the encapsulating process. For example, the encapsulating material 68, 31 and 45 surrounds the four buffer plate assemblies 9, 27, 32 and 49 and the eight corrugated bellows sections 66, 13, 16, 28, 30, 44, 47 and 63 and as it cures it holds the cameras 69, 11, 17, 26, 33, 43, 48 and 61 in place.

Tilting of the cameras and their respective camera lenses has advantages over aiming them horizontally. When the cameras are aimed horizontally as they look out from their respective sides of their instrumented baseball bases, about one half of the field of view is obscured by the ground level. As the cameras are tilted upward, more of the field of view becomes un-obscured by the ground and becomes useful.

Even though the two cameras of a 3-D stereo camera pair are always made identical to one another, and the two camera lenses of the 3-D stereo camera pair are always made identical to one another, the cameraman may choose the two identical camera lenses of one of the 3-D stereo camera pairs to be different from the two identical camera lenses of another 3-D stereo camera pair. The cameraman can choose all eight camera lenses to be identical to one another if he wishes. The cameraman can even choose all of four 3-D stereo camera lens pairs to be different from one another. The cameraman makes these choices based on the art, venue, entertainment value of each choice, and wanting to get different 3-D effects from each of the 3-D stereo camera pairs for the enjoyment and awe of the TV viewing audience.

In another preferred embodiment (not shown in a separate drawing), the shape of the top 10 of the instrumented baseball base is rounded downward and domed shaped as it is on many of the current baseball bases on baseball stadium playing fields. For example, some colleges use honeycombed solid plastic bases that are rounded and domed shaped and tapered. The upper protective cover plate 81 just beneath the top of the base is also rounded downward and domed shaped. Domed shaped protective cover plates shown in FIG. 55A and FIG. 55B and FIG. 55C, and FIG. 56A and FIG. 56B and FIG. 56C, FIG. 57A and FIG. 57B and FIG. 57C, and FIG. 58A and FIG. 58B and FIG. 58C are used. The space between the top of the base and the top of the upper protective cover plate is filled with encapsulation padding. The upper protective cover plate 81 is shaped congruent with the top 10.

Beneath the cover of the instrumented baseball base is its interior. The interior of the instrumented baseball base is filled with a soft encapsulating material 19, 31, 45 and 68 like synthetic foam. The encapsulating material 19, 31, 45 and 68 serves to hold the instrumentation package assembly hub and instrumentation package assembly elements aligned in their places, and also acts as shock absorbing padding to the instrumentation package assembly hub and instrumentation package assembly elements which it encapsulates.

The cameraman in the remote base station software selects either the wireless mode of communication, and/or the fiber optics/copper cable mode of communication between each of the instrumented baseball bases and the remote base station. The cameraman can use whichever equipment (antenna arrays or fiber optics cable/copper cable) is installed in the baseball stadium with which to command and control his choice and communicate it to the instrumented baseball bases on the baseball stadium playing field. These choices are also physically switch selectable by the cameraman with access through the opening in the bottom of the instrumented baseball bases.

The cameraman selects items from a software menu of control commands that go to the network transceiver at the remote base station that are subsequently transmitted to the instrumented sports paraphernalia for the purpose of adjusting various system initializations, operating parameters, radio frequency, polling system status data such as battery condition, and initiating remote mechanical adjustments such as camera focus, optical zoom, iris and movement to the cameras' field of view, etc over the selected bi-directional communications link i.e. wireless radio, fiber optics or copper cable connectivity being used within the particular sports stadium.

These commands, when intercepted by the network transceiver within the instrumented sports paraphernalia are applied to its microprocessor, which then in turn upon executing the instructions stored within the contents of its firmware applies a pulse coded control signal via the power and control interconnect interface inside the instrumentation package to the corresponding electronics i.e. the mechanical actuators that provides optical focus and/or zoom adjustment of the cameras and microphone gain and selection, etc as desired by the cameraman and/or special software running on the computer at the remote base station. The power and control interconnect interface as shown in FIG. 36D (item 21), which is represented by dotted lines, consists of the electrical control wiring to and from the electronic components of the instrumented sports paraphernalia that are being controlled.

Referring to the Preferred Embodiments Specified in FIG. 47A and FIG. 47B, the Instrumented Baseball Base Satisfies all of the Following Objectives:

It is an objective of the present invention that the instrumented baseball base is composed of an eight camera instrumentation package assembly, four buffer plate assemblies, encapsulation shock-proofing padding, upper protective cover plate shield, lower protective cover plate shield, base cover, access lid heat sink, radio antenna, four microphones, access opening, gas valve, canvas cover and a fiber optics cable/copper cable connector. It is an objective of the present invention that the instrumented baseball base be equipped with four 3-D stereo camera pairs. It is an objective of the present invention that the instrumented baseball base is equipped with four 3-D stereo camera pairs, where each pair looks out of its respective side of the instrumented baseball base onto the playing field. It is an objective of the present invention to enable the cameraman to set the tilt angle of the 3-D cameras of the instrumentation package assembly so that their lines of sight is angled above the ground level of the baseball playing field. It is an objective of the present invention that the instrumented baseball base has a top, and an upper protective cover plate, that are both flat and rounded downward near their edges and where the upper protective cover plate is spaced just beneath the top of the base. It is an objective of the present invention to enable the cameraman to set the tilt angle of the cameras of the instrumentation package assembly so that their line of sight is angled above the ground level of the baseball playing field. It is an objective of the present invention that the instrumented baseball base has a top, and an upper protective cover plate, that is both congruent and rounded downward and domed shaped where the upper protective cover plate is spaced just beneath the top of the base. It is an objective of the present invention to fill the volume of the instrumented baseball base beneath its cover in its interior with a soft encapsulating material like synthetic foam to hold all the contents of the instrumented baseball base aligned in their places, and act as a shock absorbing padding for the instrumentation package assembly hub, instrumentation package assembly elements, buffer plate assemblies, upper protective cover plate, and lower protective cover plate. It is an objective of the present invention to enable the cameraman in the remote base station to software select either the wireless mode of communication, and/or the fiber optics/copper cable mode of communication between the instrumented baseball bases and the remote base station by sending a control signal to the baseball base. It is an objective of the present invention to enable the cameraman to select either the wireless mode of communication, and/or the fiber optics/copper cable mode of communication between the instrumented baseball bases and the remote base station by physically setting a switch in the bottom of the instrumented baseball base with access through the bottom of the instrumented baseball base.

FIG. 47C and FIG. 47D

The detailed physical elements disclosed in the instrumented baseball base drawings show in FIG. 47C and FIG. 47D are identified as follows: 1 is the optical and mechanical axis of the camera 69. 2 is an induction coil for charging the battery pack. 3 is the mechanical axis of symmetry of the Type X buffer plate. 4 is the small cylindrical outside diameter end of the buffer plate 9. 5 is the optical and mechanical axis of the camera 11. 6 is the plane-parallel-flat optical window mounted on and sealed to the small cylindrical diameter end of the buffer plate. 7 is the small cylindrical outside diameter end of the buffer plate. 8 is the camera lens for camera 11. 9 is the body of the Type X buffer plate. 10 is the side of the instrumented baseball base. 11 is a camera paired for 3-D with camera 69. 12 is the cylindrical skin of the instrumentation package assembly element containing camera 11. 13 is the bellows segment of an instrumentation package assembly element. 14 is the side of the instrumented baseball base. 15 is the central body of the instrumentation package assembly. 16 is the bellows segment of an instrumentation package assembly element. 17 is the camera. 18 is the camera lens. 19 is the shock-proofing baseball base padding. 20 is the small cylindrical outside diameter end of the buffer plate 27. 21 is the optical and mechanical axis of the camera 17. 22 is plane-parallel-flat optical window mounted on and sealed to the small cylindrical diameter end of the buffer plate. 23 is the small cylindrical outside diameter end of the buffer plate. 24 is the mechanical axis of the instrumentation package assembly. 25 is the camera lens of camera 26. 26 is a camera. 27 is the body of the Type X buffer plate. 28 is the bellows segment of an instrumentation package assembly element. 29 is the central body of the instrumentation package assembly. 30 is the bellows segment of an instrumentation package assembly element. 31 is the shock-proofing baseball base padding. 32 is the body of the Type X buffer plate. 33 is a camera paired for 3-D with camera 43. 34 is the camera lens for camera 33. 35 is the optical and mechanical axis of the camera 33. 36 is the plane-parallel-flat optical window mounted on and sealed to the small cylindrical diameter end of the buffer plate. 37 is the small cylindrical outside diameter end of the buffer plate 32. 38 is the mechanical axis of symmetry of the Type X buffer plate. 39 is the small cylindrical outside diameter end of the buffer plate. 40 is plane-parallel-flat optical window mounted on and sealed to the small cylindrical diameter end of the buffer plate. 41 is the optical and mechanical axis of the camera 43. 42 is the camera lens of camera 43. 43 is a camera paired for 3-D with camera 33. 44 is the bellows segment of an instrumentation package assembly element. 45 is the shock-proofing baseball base padding. 46 is the central body of the instrumentation package assembly. 47 is the bellows segment of an instrumentation package assembly element. 48 is a camera paired for 3-D with camera 61. 49 is the body of the Type X buffer plate. 50 is the small cylindrical outside diameter end of the buffer plate 49. 51 is the plane-parallel-flat optical window mounted on and sealed to the small cylindrical diameter end of the buffer plate. 52 is the optical and mechanical axis of the camera 48. 53 is the camera lens for camera 48. 54 is the mechanical axis of symmetry of the Type X buffer plate. 55 is the central body of the instrumentation package assembly. 56 is the small cylindrical outside diameter end of the buffer plate. 57 is the optical and mechanical axis of the camera 61. 58 is plane-parallel-flat optical window mounted on and sealed to the small cylindrical diameter end of the buffer plate. 59 is the camera lens of camera 61. 60 is the side of the baseball base. 61 is a camera paired for 3-D with camera 48. 62 is the cylindrical segment of the instrumentation package assembly element. 63 is the bellows segment of an instrumentation package assembly element. 64 is the central body of the instrumentation package assembly. 65 is an induction coil for charging the battery pack. 66 is the bellows segment of an instrumentation package assembly element. 67 is the cylindrical skin of an instrumentation package assembly element. 68 is the shock-proofing baseball base padding. 69 is a camera paired for 3-D with camera 11. 70 is the camera lens. 71 is the plane-parallel-flat optical window mounted on and sealed to the small cylindrical diameter end of the buffer plate. 72 is the plane-parallel-flat optical window mounted on and sealed to the small cylindrical diameter end of the buffer plate. 73 is the side surface of the instrumented baseball base. 74 is the intersection of the x and y and z axes of symmetry of the instrumented baseball base and the instrumentation package assembly. 75 is the optical and mechanical z-axis of camera 33. 76 is an induction coil for charging the battery pack. 77 is the z-axis of symmetry of the buffer plate 32. 78 is the z-axis of camera 42. 79 is the bottom surface of the instrumented baseball base. 80 is the lower protective cover plate shield. 81 is the upper protective cover plate shield. 82 is the tilted optical axis of the 3-D stereo camera pair comprised of cameras 17 and 26. 83 is the tilted optical axis of the 3-D stereo camera pair comprised of cameras 48 and 61. 84 is the bottom access lid heat sink to the instrumentation package assembly. 85 is a radio antenna. 86 is a microphone. 87 is a microphone. 88 is a microphone. 89 is a microphone. 90 is the access opening in the lower protective cover plate shield of instrumented baseball base. 91 is a gas valve. 92 is the fiber optics cable/copper cable connector. 93 is a typical clearance hole bored through the side of the baseball base for the camera 17 to see out of onto the playing field. 94 is a typical clearance hole bored through the side of the baseball base for the camera 26 to see out of onto the playing field. 95 is a typical clearance hole bored through the side of the baseball base for the camera 48 to see out of onto the playing field. 96 is a typical clearance hole bored through the side of the baseball base for the camera 11 to see out of onto the playing field.

FIG. 47C is a top view of an eight tilted camera instrumented baseball base.

FIG. 47D is a corner view of an eight tilted camera instrumented baseball base.

Referring to drawings FIG. 47C and FIG. 47D, in a preferred embodiment, the present invention contemplates an instrumented baseball base, which when stationed on any baseball playing field at any or all of the traditional 1st, 2nd and 3rd base locations can wirelessly and autonomously televise baseball games under the command and control of the remote base station. The remote base station is disclosed in FIG. 59A and FIG. 59B and FIG. 60A and FIG. 60B and FIG. 61A and FIG. 61B.

Referring to the preferred embodiments disclosed in FIG. 60A and FIG. 60B, and FIG. 61A and FIG. 61B the baseball stadium is also equipped with bi-directional multi-function fiber optic cable communication links to televise baseball games from sports paraphernalia i.e. 1st, 2nd, 3rd bases to a remote base station. The instrumentation package assembly 15 has bi-directional multi-function fiber optic cable/copper cable connectivity with the remote base station via these cables. The fiber optics cable/copper cable, which is run beneath the ground of the baseball stadium playing field, enters the bottom of the instrumented baseball base through the base's access opening 90. The fiber optic/copper cable's connector is connected to its mating instrumentation package assembly 15 connector 92 in the bottom of the instrumented baseball bases. The instrumentation package assembly connector 92 is wired to the instrumentation package assembly electronics.

The only substantial difference between the instrumented baseball base shown in FIG. 47C and FIG. 47D and the one shown in FIG. 47A and FIG. 47B is that all the instrumentation inside the instrumented baseball base shown in FIG. 47C and FIG. 47D has been rotated by 45 degrees about its z-axis 77 relative to the body of the baseball base. The lines of sight of the TV cameras look out from the four corners of the instrumented baseball base rather than perpendicularly from its four sides. This orientation of the cameras looking out from the corners of the instrumented baseball base, rather than perpendicularly from its sides, enables the cameras to view the playing field from a different perspective. The cameraman sets the tilt angle of the cameras of the instrumentation package assembly so that their line of sight is above the ground level of the baseball playing field. The cameraman sets these angles just prior to the time when the instrumentation package assembly is encapsulated/molded in place when the instrumented baseball base is formed.

For example, with an instrumented baseball base specified in FIG. 47C and FIG. 47D stationed on the playing field at the traditional 2nd base position, two of its cameras (let's say cameras 17 and 26 for example) that constitute a 3-D stereo camera pair on the corner of the base, are tilted to have a line of sight that directly faces the pitcher-home plate-and the batter together. From their vantage point at 2nd base, the 3-D stereo camera pair's picture frame will include the pitcher, batter, catcher, umpire and home plate. The pitcher appears closest to the cameras. When the pitcher pitches the baseball to the batter, the TV viewing audience will witness a live sight never before seen by a TV audience. Since the cameras are low to the ground at second base and tilted upward toward the batter, the TV audience will see the baseball move as the pitcher sees it move. For example, they will clearly see the downward and sideward curves in the baseballs trajectory as the pitcher sees it. The preferred embodiment shown in FIG. 47A and FIG. 47B cannot produce this effect because none of its TV cameras looks directly at the pitcher lined up with home plate.

Additionally for example, with an instrumented baseball base specified in FIG. 47C and FIG. 47D stationed on the playing field at the traditional 1st base position, two of its cameras (let's say cameras 17 and 26 for example) that constitute a 3-D stereo camera pair on the corner of the base, are tilted to have a line of sight that directly faces the pitcher with third base in the background. From their vantage point at 1st base, the 3-D stereo camera pair's picture frame will include the pitcher and third base. The pitcher appears closest to the cameras. The TV audience will witness the pitcher winding up as he pitches the baseball to the batter. If there is a runner at third base, the TV audience will see how the runner prepares to run home, and how the third baseman positions himself on the playing field to counter this eventuality. Moreover, if there is a runner at 1st base, the TV audience will see the pitcher's steely penetrating eyes look directly at the cameras at 1st base as he checks out the runner before he makes his pitch. The TV audience will see the pitcher throw the baseball directly at the 1st cameras to reach the first baseman to get the runner out before he steals second base. This camera angle affords a view to the TV audience that is unique and exciting entertainment. The TV audience will see and hear the thud on 1st base as the runner hits it as he returns to 1st base.

Furthermore for example, with an instrumented baseball base specified in FIG. 47C and FIG. 47D stationed on the playing field at the traditional 3rd base position, two of its cameras (let's say cameras 17 and 26 for example) that constitute a 3-D stereo camera pair on the corner of the base, are tilted to have a line of sight that directly faces the pitcher with first base in the background. From their vantage point at 3rd base, the 3-D stereo camera pair's picture frame will include the pitcher and first base. The pitcher appears closest to the cameras. The TV audience will witness the pitcher winding up as he pitches the baseball to the batter. If there is a runner at first base, the TV audience will see how the runner prepares to set up to steal second base, and how the first baseman positions himself on the playing field to counter this eventuality. The pitcher, runner and first baseman will all be framed in this shot. This camera angle affords a view to the TV audience that is unique and exciting entertainment.

The preferred embodiment shown in FIG. 47C and FIG. 47D provides unique entertaining views of the game and therefore has an advantage over the preferred embodiment shown in FIG. 47A and FIG. 47B and the prior art. Even though the two cameras of a 3-D stereo camera pair are always made identical to one another, and the two camera lenses of the 3-D stereo camera pair are always made identical to one another, the cameraman may choose the two identical camera lenses of one of the 3-D stereo camera pairs to be different from the two identical camera lenses of another 3-D stereo camera pair. The cameraman can choose all eight camera lenses to be identical to one another if he wishes. The cameraman can even choose all of four 3-D stereo camera lens pairs to be different from one another. The cameraman makes these choices based on the art, venue, entertainment value of each choice, and wanting to get different 3-D effects from each of the 3-D stereo camera pairs for the enjoyment and awe of the TV viewing audience.

In another preferred embodiment (not shown in a separate drawing), the shape of the top 10 of the instrumented baseball base is rounded downward and domed shaped as it is on many of the current baseball bases on baseball stadium playing fields. For example, some colleges use honeycombed solid plastic bases that are rounded and domed shaped and tapered. The upper protective cover plate 81 just beneath the top of the base is also rounded downward and domed shaped. Domed shaped protective cover plates shown in FIG. 55A and FIG. 55B and FIG. 55C, and FIG. 56A and FIG. 56B and FIG. 56C, FIG. 57A and FIG. 57B and FIG. 57C, and FIG. 58A and FIG. 58B and FIG. 58C are used. The space between the top of the base and the top of the upper protective cover plate is filled with encapsulation padding. The upper protective cover plate 81 is shaped congruent with the top 10.

Beneath the cover of the instrumented baseball base is its interior. The interior of the instrumented baseball base is filled with a soft encapsulating material 31, 45, and 68 like synthetic foam. The encapsulating material 31, 45 and 68 serves to hold the instrumentation package assembly hub and instrumentation package assembly elements aligned in their places, and also acts as shock absorbing padding to the instrumentation package assembly hub and instrumentation package assembly elements which it encapsulates.

The cameraman in the remote base station software selects either the wireless mode of communication, and/or the fiber optics/copper cable mode of communication between each of the instrumented baseball bases and the remote base station. The cameraman can use whichever equipment (antenna arrays or fiber optics cable/copper cable) is installed in the baseball stadium with which to command and control his choice and communicate it to the instrumented baseball bases on the baseball stadium playing field. These choices are also physically switch selectable by the cameraman with access through the opening in the bottom of the instrumented baseball bases.

The cameraman selects items from a software menu of control commands that go to the network transceiver at the remote base station that are subsequently transmitted to the instrumented sports paraphernalia for the purpose of adjusting various system initializations, operating parameters, radio frequency, polling system status data such as battery condition, and initiating remote mechanical adjustments such as camera focus, optical zoom, iris and movement to the cameras' field of view, etc over the selected bi-directional communications link i.e. wireless radio, fiber optics or copper cable connectivity being used within the particular sports stadium.

These commands, when intercepted by the network transceiver within the instrumented sports paraphernalia are applied to its microprocessor, which then in turn upon executing the instructions stored within the contents of its firmware applies a pulse coded control signal via the power and control interconnect interface inside the instrumentation package to the corresponding electronics i.e. the mechanical actuators that provides optical focus and/or zoom adjustment of the cameras and microphone gain and selection, etc as desired by the cameraman and/or special software running on the computer at the remote base station. The power and control interconnect interface as shown in FIG. 36D (item 21), which is represented by dotted lines, consists of the electrical control wiring to and from the electronic components of the instrumented sports paraphernalia that are being controlled.

Referring to the Preferred Embodiments Specified in FIG. 47C and FIG. 47D, the Instrumented Baseball Base Satisfies all of the Following Further Objectives:

It is an objective of the present invention that the instrumented baseball base be composed of an eight camera instrumentation package assembly, four buffer plate assemblies, encapsulation shock-proofing padding, upper protective cover plate, canvas cover and lower protective cover plate. It is an objective of the present invention that the instrumented baseball base be equipped with four 3-D stereo camera pairs. It is an objective of the present invention that the instrumented baseball base is equipped with four 3-D stereo camera pairs, where each pair looks out of its respective side of the instrumented baseball base onto the playing field. It is an objective of the present invention to enable the cameraman to set the tilt angle of the 3-D cameras of the instrumentation package assembly so that their line of sight is angled above the ground level of the baseball playing field. It is an objective of the present invention to televise baseball games from a vantage point at 2nd base, giving the pitcher's perspective of his baseball pitches to the batter standing at home plate. It is an objective of the present invention that the instrumented baseball base has a top, and an upper protective cover plate, that are both flat and where the upper protective cover plate is spaced just beneath the top of the base, and the space is filled with encapsulation padding material. It is an objective of the present invention that the instrumented baseball base has a top that is rounded downward and domed shaped, and an upper protective cover plate that is congruent and rounded downward and domed shaped where the upper protective cover plate is spaced just beneath the top of the base. It is an objective of the present invention to fill the volume of the instrumented baseball base beneath its cover in its interior with a soft encapsulating material like synthetic foam to mold and hold all the contents of the instrumented baseball base aligned in their places, and act as a shock absorbing padding for the instrumentation package assembly hub, instrumentation package assembly elements, buffer plate assemblies, upper protective cover plate, and lower protective cover plate. It is an objective of the present invention to enable the cameraman in the remote base station to software select either the wireless mode of communication, and/or the fiber optics/copper cable mode of communication between the instrumented baseball bases, the antenna array relay junction and the remote base station by sending a control signal to the instrumented baseball base and to the antenna array relay junction. It is an objective of the present invention to enable the cameraman to select either the wireless mode of communication, and/or the fiber optics/copper cable mode of communication between the instrumented baseball bases, the antenna array relay junction and the remote base station by physically setting a switch in the bottom of the instrumented baseball base with access through the bottom of the instrumented baseball base. It is an objective of the present invention that the TV cameras look out from the four corners of the instrumented baseball base rather than perpendicularly from its four sides. It is an objective of the present invention to televise baseball games from a vantage point at 1st base, giving the first baseman's perspective of the pitcher and third baseman. It is an objective of the present invention to televise baseball games from a vantage point at 3rd base, giving the third baseman's perspective of the pitcher and first baseman. It is an objective of the present invention for the cameraman to choose the eight camera lenses. It is an objective of the present invention to televise baseball games from a vantage point at 2nd base, giving the pitcher's perspective of his baseball pitches to the batter standing at home plate. It is an objective of the present invention to televise baseball games from a vantage point at 1st base. It is an objective of the present invention to televise baseball games from a vantage point at 3rd base. It is an objective of the present invention for the cameraman, in the remote base station, to software selects either the wireless mode of communication, and/or the fiber optics/copper cable mode of communication between each of the instrumented baseball bases and the antenna array relay junction. It is an objective of the present invention for the cameraman, in the remote base station, to software selects either the wireless mode of communication, and/or the fiber optics/copper cable mode of communication between each of the remote base station and the antenna array relay junction. It is an objective of the present invention for the cameraman to physically switch selects either the wireless mode of communication, and/or the fiber optics/copper cable mode of communication between the antenna array relay junction and the instrumented baseball bases by his access through the opening in the bottom of the instrumented baseball bases. It is an objective of the present invention for the cameraman, in the remote base station, to software select the adjustment of various system initializations, operating parameters, radio frequency, polling system status data such as battery condition, and initiating remote mechanical adjustments such as camera focus, optical zoom, iris and movement to the cameras' field of view, etc over the selected bi-directional communications link i.e. wireless radio, fiber optics or copper cable connectivity being used within the particular sports stadium.

FIG. 48A and FIG. 48B and FIG. 48C and FIG. 48D

The detailed physical elements disclosed in the instrumented baseball home plate drawings shown in FIG. 48A and FIG. 48B and FIG. 48C and FIG. 48D are identified as follows: 1 is the x-axis of symmetry of the instrumented baseball home plate. 2 is the instrumented baseball home plate. 3 is the upper induction coil used to charge the battery pack inside the instrumentation package assembly. 4 is the y-axis of symmetry of the instrumented baseball home plate. 5 is the left side of the instrumented baseball home plate. 6 is the top of the instrumented baseball home plate. 7 is the central body of the instrumentation package assembly. 8 is the Type VIII buffer plate assembly. 9 is the bellows segment of the instrumentation package assembly. 10 is the lower induction coil used to charge the battery pack inside the instrumentation package assembly. 11 is the bottom of the instrumented baseball home plate. 12 is the right side of the instrumented baseball home plate. 13 is the plane-parallel-flat optical window. 14 (not shown). 15 (not shown. 16 is the shock absorbing material. 17 is the optical z-axis of the instrumentation package assembly. 18 is the top protective cover plate. 19 is the bottom protective cover plate. 20 is a wireless radio antenna. 21 is a wireless radio antenna. 22 is a wireless radio antenna. 23 is a wireless radio antenna. 24 is the tilted optical axis of camera 25. 25 is the camera. 26 is the camera lens. 27 is the side of the plate facing the pitcher. 28 is a microphone. 29 is a microphone. 30 is a gas valve. 31 is an access lid heat sink. 32 is a microphone. 34 is the microphone connector.

FIG. 48A is a top view of a one tilted camera instrumented baseball home plate.

FIG. 48B is a side view of a one tilted camera instrumented baseball home plate.

FIG. 48C is a side view of a one tilted camera instrumented baseball home plate.

FIG. 48D is a side view of a one tilted camera instrumented baseball home plate.

Referring to drawings FIG. 48A and FIG. 48B and FIG. 48C and FIG. 48D, in a preferred embodiment, an instrumented baseball home plate is disclosed.

The only substantial difference between the instrumented baseball home plate shown in FIG. 48A and FIG. 48B and FIG. 48C and FIG. 48D, and the one shown in FIG. 44A and FIG. 44B, is that the camera (along with its lens and buffer plate) in FIG. 48A and FIG. 48B is tilted away from and toward the pitcher respectively, whereas the camera (along with its lens and buffer plate) in FIG. 44A and FIG. 44B is looking vertically. In the same manner, using identical components, another preferred embodiment can just as easily be constructed with the camera (along with its lens and buffer plate) tilted away from and toward the batter respectively.

In the preferred embodiment, the present invention contemplates an instrumented baseball home plate, which when stationed on any baseball playing field at any traditional home plate location, can wirelessly and autonomously televise baseball games under command and control of the remote base station. The remote base station is disclosed in FIG. 59A and FIG. 59B and FIG. 60A and FIG. 60B and FIG. 61A and FIG. 61B.

The instrumented baseball home plate employs a single camera instrumentation package assembly identical to the instrumentation package assembly shown in FIG. 33A and FIG. 33B. It uses the Type VIIIB buffer plate assembly shown in FIG. 21QQ and FIG. 21RR and FIG. 21SS. The instrumentation package assembly uses the identical instrumentation package assembly element disclosed in FIG. 33D.

It is understood that as the state of the art in TV camera technology advances, that there will be other better TV cameras that use other than CCD technology. The present invention will work equally well with them as they become available. Therefore, the present invention uses CCD TV cameras as an example of TV cameras that may be used simply because they are the best that today's technology offers, and is not confined only to their sole use in the future.

Referring to the disclosed instrumented baseball home plate shown in FIG. 48A and FIG. 48B, and FIG. 48C and FIG. 48D, the instrumented baseball home plate has a single instrumentation package assembly 7 mounted inside the instrumented baseball home plate. The instrumentation package assembly 7 is encapsulated inside the instrumented baseball home plate using a shock absorbing white rubber encapsulating material 16 that fills the entire cavity of the instrumented baseball home plate.

Details of instrumentation package assembly 7 are shown in FIG. 33A and FIG. 33B and FIG. 33C. Details of the instrumentation package assembly elements are shown in FIG. 33D.

The instrumented baseball home plate is symmetrical about its y-axis 1. The instrumented baseball home plate has five sides. To conserve drawing space, only sides 2, 5, 12, and 27 are shown in the figures. The top 6 of the instrumented baseball home plate sits horizontally on the baseball playing field. The mechanical z-axis of the instrumentation package assembly 7 is 13. 13 is normal to top 6. The optical axis 24 of the camera 25 is shown tilted from the normal 13 in FIG. 48C and FIG. 48D. FIG. 48D shows 24 tilted toward the pitcher on side 27. FIG. 48C shows 24 tilted toward the catcher at the apex. The z-axis 17 of the instrumented baseball home plate is oriented in space so it is perpendicular to the baseball playing field and pointing skyward. The mechanical z-axis 13 and z-axis 17 are aligned to be coincident with one another.

Camera 25 is mounted inside the instrumentation package assembly 7. The optical axis 24 of camera 25 is tilted relative to the top 6 of the instrumented baseball home plate. In FIG. 48D, the tilt arrangement shown permits camera 25 to look more toward the pitcher from out of the top 6 of the instrumented baseball home plate. When extremely wide angle camera lenses are used, this brings the image of the pitcher closer to the center of the TV picture frame and makes him look closer and larger. Utilization of an extremely wide angle lens 25 allows the TV viewing audience to see past the pitcher and down to the horizon of the baseball stadium outfield.

In FIG. 48C, the tilt arrangement shown permits the camera 25 to look more toward the catcher from out of the top 6 of the instrumented baseball home plate. This brings the image of the catcher closer to the center of the TV picture frame and makes him look closer and larger. Utilization of an extremely wide angle lens 25 allows the TV viewing audience to see past the catcher and down to baseball stadium behind the catcher.

Tilting of the camera axis 24 is accomplished by using the bellows section 9 of the instrumentation package assembly 7. The corrugated bellows section 9 is flexible. Tilt of 24 is accomplished by tilting buffer plate assembly 8. The corrugated bellows section 9, which connects the buffer plate assembly 8 to the instrumentation package assembly 7, is bent to the desired tilt angle of the camera's 25 optical axis 24. After the desired tilt angle is set by bending the corrugated bellows section 9, all the components inside the instrumented baseball home plate are encapsulated in place using the rubber encapsulating compound 16. The optical axis 24 is the common axis for camera 25, lens 26, optical window 13, and buffer plate 8.

Keeping in mind that the optical axis 24 is the common axis for camera 25, lens 26, optical window 13, and buffer plate 8, it follows from the specification discussed above for FIG. 48C and for FIG. 48D that the optical axis 24 of camera 25, lens 26, optical window 13, and buffer plate 8 can be tilted in an alike manner, towards or away from the right handed batter on side 14, by bending the corrugated bellows section 9 toward or away from side 14. Tilting 24 towards the batter would bring the image of the batter closer to the center of the TV picture frame and make him look closer and larger. Tilting 24 away from the batter would move the image of the batter away from the center of the TV picture frame and make him look further away and smaller Utilization of an extremely wide angle lens 25 allows the TV viewing audience to see down past the batter and down past the horizon of the baseball stadium behind the batter.

The top 6 of the instrumented baseball home plate sits horizontally flat on the baseball playing field. The optical axis 24 of the camera 25 is tilted with respect to the z-axis 17 of the instrumentation package assembly 7 and the z-axis 17 of the instrumented baseball home plate. Axis 17 is perpendicular to the top 6 of the instrumented baseball home plate. The instrumented baseball home plate is oriented in space so its z-axis 17 is perpendicular to the baseball field and pointing skyward. The hole in the top 6 of the instrumented baseball home plate is made just large enough to prevent vignetting of the camera's field of view.

The buffer plate 8 is encapsulated by the encapsulating material 16 inside the instrumented baseball home plate. Synthetic rubber is an example of encapsulating material that is used. The mechanical axis 24 of the bore in the buffer plate is tilted to the top 6 of the instrumented baseball home plate. The end of the instrumentation package assembly 7 is inserted into the bore in the buffer plate 8, thereby tilting the mechanical axis of the end of instrumentation package assembly 7 to the top 6 of the instrumented baseball home plate.

The buffer plate 8 is a Type VIIIB buffer plate and is shown in FIG. 21QQ and FIG. 21RR and FIG. 21SS. The buffer plate 8 is molded into the instrumented baseball home plate using the white rubber encapsulating material 16. The small diameter end of the buffer plate 8 passes through the upper cover protective cover plate 18 and protrudes through the molded rubber top 6 of the instrumented baseball home plate. The buffer plate carries the optical window 13. The optical window 13 tilts with the buffer plate 8. The flat surface of optical window 13 is tilted and relatively flush with the top 6 of the instrumented baseball home plate.

The camera 25 looks out of the top 6 of the instrumented baseball home plate, along its respective optical axis 24 The camera 25 is aligned within its instrumentation package assembly 7 so that the camera 25 yields a wirelessly transmitted upright image to the TV viewing audience for objects appearing in the lower half of the TV viewer's screen.

The instrumentation package assembly 7 is mechanically mounted inside the instrumented baseball home plate using a buffer plate assembly 8. The instrumentation package assembly 7 is mechanically protected inside the instrumented baseball home plate using an upper and a lower protective cover plate shield 18 and 19 respectively.

The two protective cover plates 18 and 19 are embedded and molded into the instrumented baseball home plate using the shock absorbing material 16. Protective cover plate 18 is on the top and protective cover plate 19 is on the bottom of the instrumented baseball home plate. The top protective cover plate 18 is referred to as the upper protective cover plate. It is shown in FIG. 56. The bottom protective cover plate 19 is referred to as the lower protective cover plate. These protective cover plates 18 and 19 sandwich the instrumentation package assembly 7 between them and protect it and its contents from being damaged.

Except for the optical windows, the external appearance of both the instrumented baseball home plate and the conventional baseball home plate are identical, both being made of the same rubber material 16. In addition, their size, shape, color and texture are identical. The weights of the instrumented baseball home plate and the conventional baseball home plate are nearly identical. Details of the conventional baseball home plate are shown in FIG. 41.

The instrumentation package assembly 7 is sandwiched between the top and bottom protective cover plates 18 and 19. The purpose of these protective cover plates 18 and 19 is to act as mechanical shields to protect the instrumentation package assembly 7 from being damaged by impacts during the game. During the normal course of the game, the top of the instrumented baseball home plate will be hit and crushed by the players and by their equipment. For example, the players may step on the instrumented baseball home plate or slide into it. They may even drop their bats on it. The two protective cover plates 18 and 19 protect the instrumentation package assembly 7 within the instrumented baseball home plate from physical damage due to these hits.

The outermost body region of the top protective cover plate 18 is made substantially spherically dome shaped. There is a flat region in the middle of the upper protective cover plate 18 surrounding the clearance bore for camera 25. The entire body of the bottom or lower protective cover plate 19 is made flat. The top and bottom protective cover plates 18 and 19 both have rounded outer edges. The edges are rounded to insure that the baseball players will not be injured by them if the players crash into the instrumented baseball home plate A variety of materials can be chosen for the protective cover plates 18 and 19 in the present preferred embodiment. Material examples are polycarbonates, ABS, and fiber reinforced plastics. These materials have the advantage that they are lightweight and stiff, enabling the thickness of the cover plates to remain thin while still delivering the significant stiffness needed to perform their protective function of mechanical shielding the instrumentation package assembly in the limited space they can occupy within the instrumented baseball home plate. They have the additional advantage in that they are transparent to the transmitted and received radio waves which need to move to and from the wireless radio antennas 20, 21, 22, and 23 inside the instrumented baseball home plate without absorption or reflection therein.

The top protective cover plate 18 is spherically dome shaped in its outer region, and flattened in its inner region close to the optical window 13. The purpose of making it flattened near the optical window 13 is to provide maximum protection for the optical window 13 whose surface is at the very top of the instrumented baseball home plate. The flattened shape enables the protective cover plate 18 to closely surround the optical window 13 at the top of the instrumented baseball home plate where the optical window 13 is most likely to be exposed to the greatest threat of damage due to hits to the top of the instrumented baseball home plate. The upper protective cover plate 18 is buried in encapsulating material at the center top 6 of the instrumented baseball home plate around the optical window 13. The dome shape enables the upper protective cover plate 18 to come very close to the top 6 center of the instrumented baseball home plate where the players will have only grazing contact with its surface if they crash into the instrumented baseball home plate, thereby eliminating the threat of injury to the players if they hit the top of the instrumented baseball home plate.

The spherical shape of the upper protective cover plate 18 causes its edge to be rounded downward and away from the top of the outer skin and places the edge well below the top surface 6 of the outer skin of the instrumented baseball home plate and away from the players.

The lower protective cover plate 19 is flat and is buried in the encapsulating material 16 just above the bottom surface 11 of the instrumented baseball home plate. The body of the lower protective cover plate 19 can be made flat because it is buried in the ground and there is no danger of the baseball players coming into violent contact with it. The flat shape is easier to make and less expensive to manufacture. It can also be made thicker than the upper protective cover plate 18 because there is more free space near the bottom of the instrumented baseball home plate that it can occupy. Its thickness is not physically restrained because of its location, as is the case with the upper protective cover plate 18 which is physically squeezed between the top surface 6 and the buffer plate 8.

In both cases, the rounded edges of the protective cover plates 18 and 19 are substantially distant from the top 6 of the instrumented baseball home plate to protect the players from impacting against them. The top protective cover plate 18 is detailed in FIG. 56. The edge of the top protective cover plate 18 is rounded and all sharp corners are removed so as to make it safe to the players if they press violently against the instrumented baseball home plate.

The outer body of the top protective cover plate 18 is made spherically dome shaped. The spherical top of the dome faces upward. The top protective cover plate 18 has a central bored hole in it. The purpose of the bore is to permit the cylindrical end of the buffer plate 8 containing the camera 25 optical window 13 to pass through it, and through the encapsulating material 16, and through the top 6 of the instrumented baseball home plate. The top protective cover plate 18 is made flat in its inner region near to its circular bore so it can surround the optical window 13 near the very top of the instrumented baseball home plate and shelter it from hits, while its spherical dome shape in its outer region keeps the edge of the protective cover plate 18 far down below the top of the instrumented baseball home plate and well below the surface of the playing field within the ground, so the edge would not be felt by the players if they impacted on the top surface of the instrumented baseball home plate. The body of the bottom protective cover plate 19 is made flat and has rounded corners like the top protective cover plate 18 for the same reason.

The upper protective cover plate 18 protects the instrumentation package assembly 7 from being crushed and damaged by the players during the game. The instrumentation package assembly is located below the upper protective cover plate 18 inside of the instrumented baseball home plate. In order to achieve its purpose, the upper protective cover plate 18 must be stiff. The entire volume between the top 6 of the instrumented baseball home plate 2 and the upper protective cover plate 18 is filled with a resilient encapsulation padding material 16. The entire volume between the upper protective cover plate 18 and the instrumentation package assembly 7 is filled with the same resilient encapsulation padding material 16. The domed shape of the upper protective cover plate 18 is very important. It completely covers and wraps the instrumentation package assembly 7 and its radio antennas 20, 21, 22, and 23, which are below it, and diverts trauma and forces that occur to the top 6 of the instrumented baseball home plate 2 during the game away from the instrumentation package assembly 7 and its antennas 20, 21, 22, and 23. The outer edge of the upper protective cover plate 18 is bent downward and past the outermost tips of the radio antennas 20, 21, 22, and 23 to protect them. The curvature of the upper protective 18 cover plate 18 is made large enough so that the dome completely covers around them. The dome shape allows the thickness of the padding 16 between the top 6 of the instrumented baseball home plate 2 and the upper protective cover plate 18 to increase as the radial distance from the center of the instrumented home plate 2 increases outwardly.

The optical window 13 permits the camera 25 mounted inside the instrumentation package assembly 7 of the instrumented baseball home plate to look out through the top 6 of the instrumented baseball home plate onto the playing field during a baseball game and be protected from hazards such as rain, dirt and physical impacts. The optical window 13 is sealed to the small diameter cylindrical end of the buffer plate 8. The seals are airtight and waterproof to protect the camera 25, microphones 28 and 29, and the electronics within the instrumentation package assembly 7.

The optical window 13 is made strong to protect the camera lens 26 and camera 25 that are located beneath it. The optical window 13 is hard coated by vapor deposition with materials such as MgFl or SiO2 to help prevent the outer-most window 13 surface from being scratched during the game. The optical window 13 material itself is chosen to be strong. It is made from hard optical glass such as barium lanthanum borate glasses, or hard optical plastic like acrylic or polycarbonate, both of which are scratch resistant.

The optical window 13 is made small to make it inconspicuous to the players, and substantially preserve the instrumented baseball home plate's look-alike quality with the conventional major league home plate shown in FIG. 41; while still retaining sufficient clear aperture for the camera lens 26 to see events with SD/HD resolution on the playing field in prevailing light. A typical optical window 13 ranges in size from about ⅛ inch to ½ inches in diameter. Besides its small size, the optical window 13 is made additionally inconspicuous by making its antireflection coating a straw color to match the tan coloration of the ground dust around the instrumented baseball home plate.

The optical window 13 is plane-parallel-flat. It is disposed at the intersection of the x-axis and y-axis of the instrumented baseball home plate. The optical window 13 is positioned on the top of the instrumented baseball home plate so it is aligned with the chin line of the average batter, and roughly at the same location as the center of gravity of the conventional major league home plate shown in FIG. 41.

Optical windows having a spherical dome shape can also be used when a larger field of view is desired. In another preferred embodiment, the outer surface of the window is spherical in shape and convex outward and shell-like as is necessary to permit the camera to see fields of view with extremely wide viewing angles approaching 90 degrees off the optical axis of the cameras. Shell-like implies that the inner and outer spherical surfaces of the optical window are concentric. In applications where extremely wide viewing angles are not required, the optical window surfaces can be made flat and plane parallel. The shell-like windows enable the camera to use lenses that have extremely wide viewing angles approaching 90 degrees off the optical axis of the camera lens without introducing bothersome optical aberrations and vignetting. The shell-like shape of the windows also imparts increased physical strength to the windows.

The optical window 13 is attached to buffer plate 8. The optical window 13 provides a portal through which cameras lens 26 can see out onto the playing field from inside the instrumented baseball home plate. The encapsulating material 16 provides shock absorbing padding between the outer top surface 6 of the instrumented baseball home plate and the protective cover plate 18. The encapsulating material 16 provides shock absorbing padding between the protective cover plate 18 and the buffer plate 8.

Camera lens 25 looks out thru the top 6 of the instrumented baseball home plate through its optical window 13 at objects angularly spread out around its respective axial line of sight 13 and images the objects it sees onto camera 24.

A variety of different camera lens 26 types with different lens setting capabilities can be used. When enabled by the operator in the remote base station, the auto iris setting permits the camera lens 25 to automatically adjust for varying lighting conditions on the field. The auto focus setting permits the camera lens 25 to adjust focus for varying distances of the players and action subjects on the field.

For example, when a baseball is hit, and a player is rounding the bases, the distance of a player from home plate may be increasing or decreasing. The camera 25 within the instrumented baseball home plate can be independently and simultaneously commanded and controlled to auto focus on the player. As the player is rounding third base, if he decides to run for home plate, the instrumented baseball home plate's camera 25 and microphones 28 and 29 will capture all the action. While the player is running, his pictures and sounds are being wirelessly transmitted from the instrumentation package assembly 7 inside the instrumented baseball home plate to the remote base station for processing. The sounds received from each of the microphones by the remote base station are processed using special software to produce surround sound which is broadcast to the TV viewing audience.

If the player decides to slide into home plate, the instrumented baseball home plate camera 25 will enable the viewing audience to see the player slide into home plate, up close. The camera 25 will catch a detailed image of the player's sharp cleats as they strike the plate. The TV audience will experience the flight of chunks of dirt being thrown onto the plate. The microphones 28 and 29 will enable the TV viewing audience to hear the scraping and the thud of the cleats as they hit the plate. The TV audience will hear the chunks of dirt as they hit the plate. The TV viewing audience will see the face and the hand of the umpire as he reaches down to sweep the plate. The TV audience will hear and see the bristles of the umpire's brush as he sweeps the dirt off the plate.

When a player is running toward the instrumented baseball home plate from third base, the camera 25 can see where he is coming from. The camera 25 can see the player as he runs and touches the instrumented baseball home plate. The camera 25 can see the player as he is sliding into the instrumented baseball home plate. The TV audience will see and hear the player's cleats as they hit the instrumented baseball home plate. The camera 25 can see the catcher as he tags the player before the player touches the instrumented baseball home plate and scores a run. From the vantage point of the instrumented baseball home plate, the viewing audience can see the strained player darting for the instrumented baseball home plate. The viewing audience can see details of the player's feet as he attempts to slide into the instrumented baseball home plate. The viewing audience can see a close-up of the opposing team's catcher's attempt to tag him with the ball. As the baseball is thrown home, the viewing audience can see the catcher reach down for it close to the plate. The camera 25 vantage point at the instrumented baseball home plate gives the audience a viewing angle of the game never seen before by television viewing audiences. The instrumented baseball home plate's camera 25 gives the TV viewing audience unending contemporaneous shots that get across a sense of the action of being there—like a player in the game that prior art cameras looking on from their disadvantaged viewing points from outside the playing field cannot get across.

The camera 25 looks outward from the top 6 of the instrumented baseball home plate along and around its optical axis 24 through optical window 13. The camera 25 is aligned within the instrumentation package assembly 7 so that the camera 25 yields a wirelessly transmitted upright image to the TV viewing audience via radio antennas 20, 21, 22 and 23 of objects occupying the space between the center and the bottom of the TV picture frame.

In the present preferred embodiment, camera 25 uses an extremely wide angle lens 26 with zoom capability. Even though camera 25 is pointed outward from the top 6 of the instrumented baseball home plate, it can see past the pitcher along y-axis 1 right down to the outfield stadium horizon because of its near 180 degree field of view. This is a distinct advantage of extremely wide angle lenses over other types of lenses. However, it should be pointed out that the cameraman may elect to use a variety of other camera lenses 25 with different capabilities depending on the visual effects he wishes to convey to the TV viewing audience. For example, the cameraman may elect to use a camera lens 25 with a narrower field of view in order to concentrate the attention of the TV viewing audience on the batter's taut and sweaty stubble filled face.

A variety of different camera lens types with different lens setting capabilities, focal lengths and fields of view can be used. For example, extremely wide angle lenses that can see down to the horizon can be used. These lens types give the TV viewing audience a dramatic 3-D effect. When enabled by the operator/cameraman in the remote base station, the auto iris setting permits the camera lens to automatically adjust for varying lighting conditions on the field. The auto focus setting permits the camera lens to adjust focus for varying distances of the players and action subjects on the field. The cameraman may elect to control the functions of the camera lenses himself from the remote base station by sending command and control signals from the remote base station to the instrumented baseball home plate. The cameraman can zoom, focus, and control the iris settings of the camera lenses from the remote base station.

The camera 25 is aligned in rotation about the z-axis 17 within its instrumentation package assembly 7 so that it yields wirelessly transmitted upright images of objects that appear in the lower half of the TV picture frame. This can be accomplished in any one of eight different modes. Each of these modes conveys its own spectacular viewing angle of the game to the TV viewing audience. Each of these eight modes is achieved by physically rotating the camera 25 and its lens 26 about the z-axis 17 by using an actuating device that is mechanically coupled to the camera 25 and lens 26 inside the instrumentation package assembly 7. The mechanical actuating device has four stops that are mechanically detented 90 degrees apart from one another. The mechanical actuating device is housed within the camera's instrumentation package assembly 7. The mechanical actuating device can rotate the camera 25 and lens 26 together to any one of its four stops. The cameraman in the remote base station selects which of the four modes is to be employed, and sends a signal to the instrumentation package assembly 7 to set the camera 25 and lens 26 to the desired mode he selected.

In the first mode, the camera 25 and lens 26 are aligned in rotation inside its instrumentation package assembly 7 by the mechanical actuating device so that the TV viewing audience sees the stadium horizon in the outfield near the bottom edge of the TV picture frame. (This is equivalent to what a person would see visually if he were laying flat down on the playing field with his head resting on the instrumented baseball home plate and looking upward with his feet facing the pitcher.) The stadium outfield horizon appears horizontal in the TV picture frame at the bottom center of the TV picture frame. The pitcher appears to be standing upright on his mound just above the bottom of the TV picture frame. When the pitcher throws the baseball to the catcher, the TV audience will see the baseball approaching the center of the TV picture frame from the bottom of the TV picture frame. The size of the baseball grows larger as it gets closer to the camera inside the instrumented baseball home plate and the batter. Since the camera 25 is physically located below the batter inside the instrumented baseball home plate, an image of the underside of a right handed batter's chin and sweaty arm pits will appear just left of the center of the TV picture frame.

In the second mode, the camera 25 and lens 26 are aligned in rotation inside its instrumentation package assembly 7 by the mechanical actuating device so that the TV viewing audience sees the stadium horizon in the outfield at the right side of the TV picture frame. (This is equivalent to what a person would see visually if he were laying flat down on the playing field with his head resting on the instrumented baseball home plate and looking upward with his feet facing a right handed batter on side 5 of the instrumented baseball home plate.). The pitcher appears to be standing on his mound toward the right hand side of the TV picture frame. When the pitcher throws the baseball to the catcher, the TV audience will see the baseball approaching the center of the TV picture frame from the image of the pitcher's hand which is right of center of the TV picture frame. The size of the baseball grows larger as it gets closer to the instrumented baseball home plate and the right handed batter. Since camera 24 is below the batter, an image of the underside of batter's chin and sweaty arm pits will occupy the space below the center of the TV picture frame. The right handed batter will appear to be standing near the bottom of the TV picture frame. The microphones 27 and 28 will enable the TV audience to hear the whoosh of air as the baseball passes above the instrumented baseball home plate. Camera 25 will enable the TV audience to see the right handed batter swing his bat, up close, to strike the baseball as it whizzes by above the instrumented baseball home plate. The microphones 27 and 28 will enable the TV audience to hear the rush of the air as he swings his bat. The TV audience will hear the loud crack of the bat as it strikes the baseball. The TV audience will see the baseball the moment it is hit by the bat. This will be an action packed event never before witnessed by a TV audience. Each of the pitched baseballs will produce breath taking excitement and expectations by the TV viewing audience.

Camera 25 will enable the TV audience to see the baseball as it travels outward from the crack of the bat onto the playing field. The TV audience will see the baseball get smaller as it gets further away from the instrumented home plate and the batter. The image of the baseball will move from near the center of the TV picture frame toward the right of the TV picture frame if it is hit toward the outfield. The audience will see the batter drop the bat and scramble toward first base. The image of the bat will grow in size and appear to the TV viewing audience as though it was going to hit them in the face as it careens down on and strikes the instrumented baseball home plate. Members of the TV viewing audience will duck to avoid being hit by the bat. The microphones 27 and 28 enable the TV audience to hear the thud of the bat after the batter releases it and it hits the instrumented baseball home plate. The TV audience will hear the scraping by the batter's cleats on the ground as he scrambles to first base. The TV audience will see the size of the batter grow smaller as he runs toward first base and gets further from home plate.

In the third mode, the camera 25 and lens 26 are aligned in rotation inside its instrumentation package assembly 7 by the mechanical actuating device so that the TV viewing audience sees the stadium horizon in the outfield at the top side of the TV picture frame. The catcher appears to be squatting upright above the bottom center of the picture. (This is equivalent to what a person would see visually if he were laying flat down on the playing field with his head resting on the instrumented baseball home plate and looking upward with his feet facing the catcher toward the apex of the instrumented baseball home plate) The stadium outfield horizon appears horizontal in the picture frame at the top side of the TV picture frame. When the pitcher throws the baseball to the catcher, the TV audience will see the baseball approaching the center of the TV picture frame from the image of the pitcher's hand which is near the center top of the TV picture frame. The size of the baseball grows larger as it gets closer to the instrumented baseball home plate and the batter. Since the camera 25 is below the batter, an image of the underside of batter's chin and sweaty arm pits will occupy the center right of the TV picture frame. The TV audience will hear the whoosh of air as the baseball passes above the instrumented baseball home plate. The TV audience will see the batter swing his bat, up close, to strike the baseball as it whizzes by. The TV audience will hear the rush of the air as the batter swings his bat. The TV audience will hear the loud crack of the bat as it strikes the baseball. The TV audience will see the baseball the moment it is hit by the bat. This will be an action packed event never before witnessed by a TV audience. Each of the pitched baseballs will produce breath taking excitement and expectations by the TV viewing audience. The TV audience will see the baseball as it travels outward from the crack of the bat onto the playing field. The TV audience will see the baseball get smaller as it gets further away from the instrumented home plate and the batter. The image of the baseball will move away from the center of the TV picture frame after it is hit. The audience will see the batter drop the bat and scramble toward first base. The image of the bat will grow in size and appear to the TV viewing audience as though it was going to hit them in the face as it careens down on and strikes the instrumented baseball home plate. Members of the TV viewing audience will duck to avoid being hit by the bat. The TV audience will hear the thud of the bat after the batter releases it and it hits the instrumented baseball home plate. The TV audience will hear the scraping by the batter's cleats on the ground as he scrambles to first base. The TV audience will see the size of the batter grow smaller as he runs toward first base and gets further from the instrumented baseball home plate.

In the fourth mode, the camera 25 and lens 26 are aligned in rotation inside its instrumentation package assembly 7 by the mechanical actuating device so that the TV viewing audience sees the stadium horizon in the outfield at the left side of the TV picture frame. (This is equivalent to what a person would see visually if he were laying flat down on the playing field with his head resting on the instrumented baseball home plate and looking upward with his feet facing a left handed batter on side 12 of the instrumented baseball home plate.) The stadium horizon appears in the TV picture frame at the left hand side of the TV picture frame. The pitcher appears to be standing on his mound near the left hand side of the TV picture frame. When the pitcher throws the baseball to the catcher, the TV audience will see the baseball approaching the center of the TV picture frame from the image of the pitcher's hand which is left of center of the TV picture frame. The size of the baseball grows larger as it gets closer to the instrumented baseball home plate and the batter. Since the camera is below the batter, an image of the underside of batter's chin and sweaty arm pits will be below the center of the TV picture frame. A left handed batter would appear to be standing upright with his feet near the bottom of the TV picture frame. The TV audience will hear the whoosh of air as the baseball passes above the instrumented baseball home plate. The TV audience will see the batter swing his bat, up close, to strike the baseball as it whizzes by. The TV audience will hear the rush of the air as he swings his bat. The TV audience will hear the loud crack of the bat as it strikes the baseball. The TV audience will see the baseball the moment it is hit by the bat. This will be an action packed event never before witnessed by a TV audience. Each of the pitched baseballs will produce breath taking excitement and expectations by the TV viewing audience. The TV audience will see the baseball as it travels outward from the crack of the bat onto the playing field. The TV audience will see the baseball get smaller as it gets further away from the instrumented home plate and the batter. The image of the baseball will move away from the center of the TV picture frame after it is hit. The audience will see the batter drop the bat and scramble toward first base. The image of the bat will grow in size and appear to the TV viewing audience as though it was going to hit them in the face as it careens down on and strikes the instrumented baseball home plate. Members of the TV viewing audience will duck to avoid being hit by the bat. The TV audience will hear the thud of the bat after the batter releases it and it hits the instrumented baseball home plate. The TV audience will hear the scraping by the batter's cleats on the ground as he scrambles to first base. The TV audience will see the size of the batter grow smaller as he runs toward first base and gets further from home plate.

The instrumentation package assembly 7 is supported at its upper end by a buffer plate 8. The instrumentation package assembly 7 and the buffer plate 8 are permanently encapsulated inside of the instrumented baseball home plate as the encapsulating material 16 around them cures. After the encapsulating material 16 sets, it becomes a weatherproof shock absorbing padding material 16. The small diameter end of the buffer plate 8 peers through the top 6 and upper protective cover plate 18 of the instrumented baseball home plate. The small diameter end of the buffer plate 8 is sealed and molded into the shock absorbing padding 16 around its circumference. The encapsulating material 16 is a permanent resilient compound that is air-tight and water-tight.

The buffer plate 8 acts as a bearing for the instrumentation package assembly 7, and thereby restricts and restrains the motion of the instrumentation package assembly 7 inside the instrumented baseball home plate. Besides functioning as a bearing to support the instrumentation package assembly 7 within the instrumented baseball home plate, the buffer plate provides a hollow portal through which the camera 25 inside the instrumentation package assembly 7 may peer out of the instrumented baseball home plate at the baseball playing field along optical axis 24.

The instrumented baseball home plate's outward appearance looks substantially the same as the conventional professional league baseball home plate and the conventional high school league baseball home plate, and meets the official requirements for these venues and is interchangeable with them in these venues.

If the cameraman chooses to use a spherical concentric dome shaped optical window 13 in order to minimize the vignetting of the extreme 180 degree field of view of the extremely wide angle lens 26, then the spherical optical window will protrude above 6 by about one half the diameter of the spherical optical window.

Buffer plate 8 is shown in detail in FIG. 21QQ and FIG. 21RR and FIG. 21SS. It is made from a light-weight rigid polycarbonate, ABS or fiber reinforced plastic material. It is used to prop up and position the instrumented baseball home plate's upper protective cover plate 18. The buffer plate 8 is mounted and permanently encapsulated to the inside of the instrumented baseball home plate. The top of the buffer plate 8 is covered by upper protective cover plate 18. The purpose of upper protective cover plate 18 is to protect the instrumentation package assembly 7 which is below it from being crushed when a player steps on the instrumented baseball home plate.

In summary the buffer plate 8 is multi-purposed. It provides a mounting surface against which the upper protective cover plate 18 rests. It protects the instrumentation package assembly 7 from becoming misaligned relative to the portal through which camera 25 peers out from the top surface 6 of the instrumented baseball home plate.

The instrumented baseball home plate has five sides just like the standard conventional baseball home plate. Their dimensions are identical to the dimensions of the standard conventional baseball home plate shown in FIG. 41. Side 27 is closest to the pitcher and is 17 inches long. Sides 2 and 15 form the apex of the instrumented baseball home plate. They are each 12.021 inches long, and join at right angles to one another at the apex of the instrumented baseball home plate.

It is not necessary to make the weight of the instrumented baseball home plate exactly identical to the weight of the conventional major league home plate shown in FIG. 41 because the instrumented baseball home plate will be immobile and anchored in the ground.

There are reasons however to make the weight of the instrumented baseball home plate approximately the same as that of the conventional major league home plate shown in FIG. 41. The first reason is so that when a player hits it, the instrumented baseball home plate will feel and react the same as the conventional major league home plate. Accordingly, the location of the center of gravity of the instrumented baseball home plate base and the conventional major league baseball home plate are both in roughly the same place. The second reason is so the field crew that maintains the playing field can handle the instrumented baseball home plate in the same way as they handle the conventional major league home plate.

The present invention contemplates the instrumented baseball home plate to be non-intrusive to the players in the game. The instrumented baseball home plate is constructed to produce substantially no audible noise that the player's may hear and be distracted by. The rubber encapsulating material absorbs the sound of the moving parts inside the instrumented baseball home plate. The sounds are made inaudible to the players who are outside the instrumented baseball home plate by sound absorption, muffling, baffling and damping methods designed into the instrumented baseball home plate.

The central body of the instrumentation package assembly 7 is essentially a cylindrical can that contains the battery pack. The bottom of the can has a removable lid. The lid can be removed in order to change out battery packs when the battery packs loose their ability to charge properly. Access to the bottom of the cylindrical can is through the circular aperture in the bottom 11 of the instrumented baseball home plate.

The z-axis 17 is the axis of symmetry of the instrumentation package assembly 7. The instrumentation package assembly 7 contains its own camera lens 25, camera 26, and supporting electronics. The battery pack supplies electrical power to the entire instrumentation package assembly 7. The instrumentation package assembly 7 is essentially a short cylindrical can like a tuna fish can. It is made strong to resist being crushed. Materials such as polycarbonates, ABS and fiber reinforced plastics are used in its construction.

Induction coils 3 and 10 are located on the top and on the bottom of the instrumentation package assembly 7 central hub. The electrical induction coils 3 and 10 are used to inductively couple power into the battery pack from a power source located outside the instrumented baseball home plate. A block diagram showing the electrical battery charging circuit involving the induction coils and the battery pack is shown in FIG. 24. An induction coil which is external to the instrumented baseball home plate is a source of electrical power which inductively couples electrical current into these induction coils 3 and 10. The external induction coil is laid flat on the top of the instrumented baseball home plate coaxially above coils 3 and 10 during the battery charging process. Electrical current which is induced into the induction coils 3 and 10 is fed into the battery pack in order to charge it.

A block diagram of the instrumentation package assembly 7 electronics is shown in FIG. 23 and FIG. 24. Four antennas 20, 21, 22, and 23 are used to accomplish the wireless transmission and reception of signals between the instrumented baseball home plate and the antenna array relay junction. The same four antennas 20, 21, 22, and 23 are used by the instrumented baseball home plate to both transmit video signals to the remote base station and receive control commands back from the remote base station.

In the preferred embodiment shown, the present invention contemplates the instrumented baseball home plate to be equipped with an instrumentation package assembly 7 disclosed in FIG. 33A and FIG. 33B and FIG. 33C, that is mounted and encapsulated inside the instrumented baseball home plate, which is capable of wirelessly televising pictures and sounds of baseball games from its camera 25 and its microphones 28 and 29 contained therein.

The instrumentation package assembly's can structure is made of polycarbonate, ABS or fiber reinforced plastic which are strong and are non-conductors of electricity. It is necessary to use a non-conducting material so as to allow the transmitted and received radio signals to radiate thru it from the antenna elements within the instrumentation package assembly 7 for the purpose of televising signals by wireless communications to and from the remote base station. The instrumentation package assembly assembly's network transceiver electronics specified in FIG. 36D, wirelessly transmits real-time pictures and sounds from the instrumentation package assembly 7 camera and microphones 27 and 28 via the quad antenna array elements 20, 21, 22, and 23, also known as intentional radiators, to the antenna array relay junction. The remote base station is disclosed in FIG. 59A and FIG. 59B.

In an alternative preferred embodiment, the antenna array 20, 21, 22 and 23 shown in the instrumentation package assembly 7 is replaced with a helix antenna (not shown) with similar dimensions wound on the inside diameter of the instrumentation package assembly.

A antenna array relay junction disclosed in FIG. 59A and FIG. 59B is deployed in the baseball stadium and receives radio signals from the instrumented baseball home plate's antenna array elements 20, 21, 22, and 23. Antenna array elements 20, 21, 22, and 23 are in quadrature to radiate radio signals to the antenna array relay junction with sufficient gain so as to overcome RF noise and provide for a large enough gain bandwidth product to accommodate real-time SD/HD picture quality requirements.

The instrumentation package assembly's network transceiver electronics also provides a wireless means for the instrumented baseball home plate to receive command and control radio signals from the base station. The instrumentation package assembly assembly's 7 battery pack is wirelessly inductively charged before and during games on an as needed basis, using the charging station unit shown in preferred embodiment in FIG. 37A and FIG. 37B and FIG. 37C. The charging station is placed on the top of the instrumented baseball base when it is charging the battery pack. The battery pack is shown in the instrumentation package assembly specified in FIG. 33A and FIG. 33B and FIG. 33C. Charging of the battery pack is accomplished wirelessly by inductive coupling. The instrumented baseball base's two inductive pickup coils 10 and 3 act as the secondary windings on an air core transformer. Time varying magnetic flux is furnished to 10 and 3 by the primary windings of the charging station unit.

The antennas 20, 21, 22, and 23 are deployed below the upper protective cover plate 18 inside the instrumented baseball home plate. The antennas form a phased array. The radiation pattern from the phased array antennas 20, 21, 22, and 23 can be maximized to radiate and receive preferentially in the direction of the pickup antenna used by the remote base station. This reduces the noise in the transmission link.

The instrumentation package assembly 7 has a flexible corrugated bellows skin section 9. The height of the instrumentation package assembly 7 is approximately ⅓ the thickness of the instrumented baseball home plate.

The corrugated bellows segment 9 of the instrumentation package assembly 7 connects the outer portion of the instrumentation package assembly 7 containing the camera 25 and the lens 26 with its central body hub.

The corrugated section 9 of the instrumentation package assembly assembly's skin allows the instrumentation package assembly to flex, stretch and compress when the instrumented baseball home plate is impacted. This enables the instrumentation package assembly to resist shock and vibration. Additionally, the corrugated section allows the instrumentation package assembly to act as a spring and compress or expand its length without damaging its contents. When circumstances arise where the players tend to crush the instrumented baseball home plate, the instrumentation package assembly will compress or expand and take the shock without damaging or misaligning its contents.

The rubber encapsulating material 16 provides shock absorbing padding between the upper protective cover plate 18 and the instrumentation package assembly 7. A purpose of the encapsulating material is to cushion the blows to the instrumented baseball home plate that would otherwise result in damaging shock and vibration to the instrumentation package assembly 7 and its contents. The rubber encapsulating material 16 also provides protection for the instrumentation package assembly 7 from dirt, moisture and the environment.

The z-axis 17 of the instrumented baseball home plate is orthogonal to the x and y axes 4 and 1 respectively, of the instrumented baseball home plate.

Each of the microphones 28 and 29 listens for sounds from their respective sides of the instrumented baseball home plate. The condenser microphones enable the viewing audience to hear real-time contacts, impacts and shocks to the instrumented baseball home plate. Microphones 28 and 29 enable the TV audience to hear sounds that result from air or any physical contacts or vibrations to the instrumented baseball home plate; like for example, the crash of a player sliding into the instrumented baseball home plate. The sounds received from each of the microphones by the remote base station are processed using special software to produce surround sound which is broadcast to the TV viewing audience.

Microphone 33 protrudes through a hole in the top of the instrumented baseball home plate. Microphone 33 enables the TV audience to hear sounds that occur on the baseball playing field.

Microphone 33 enables the TV audience to hear the whoosh of air as a pitched baseball passes above the instrumented baseball home plate.

Simultaneously live TV pictures are taken by the TV camera 25 of its respective field of view of the live action on the playing field. Camera 25 will enable the TV audience to see a right or left handed batter swing his bat, up close, to strike the baseball as it whizzes bye above the instrumented baseball home plate. Microphone 33 enables the TV audience to hear sounds like the rush of the air as the batter swings his bat. The TV audience will hear the loud high fidelity crack of the bat as it strikes the baseball. The TV audience will see the baseball come toward them from the pitcher's hand as if the audience themselves were standing at the plate. The TV audience will see a close-up of the baseball right in front of them the moment it is hit by the bat. It will seem to the audience like they themselves hit the baseball. This will be an action packed event never before witnessed by a TV audience. Some members of the TV audience will flinch as the baseball is pitched near to them. Each of the pitched baseballs will produce breath taking excitement and expectations by the TV viewing audience. The TV audience will see the baseball as it travels outward from the bat onto the playing field. The TV audience will see the baseball get smaller as it gets further away from the instrumented baseball home plate and the batter. The audience will see and hear the batter drop his bat and scramble toward first base. The TV audience will hear the thud of the bat after the batter releases it and it hits the ground. The TV audience will hear the scraping by the batter's cleats on the ground as he scrambles to first base. The TV audience will see the size of the batter grow smaller as he runs toward first base and gets further away from home plate. A block diagram showing the detailed flow of electrical signals and data in the instrumentation package assembly 7 is shown in the preferred embodiment given in FIG. 36D and FIG. 36E. The present invention contemplates the instrumented baseball home plate's battery pack being wirelessly charged by a charging station unit shown in FIG. 37A and FIG. 37B and FIG. 37C.

The diameter of the instrumentation package assembly 7 is kept to a minimum in order to minimize its footprint inside the instrumented baseball home plate. The dimension of the outside diameter of the instrumentation package assembly 7 (not including the four antennas) is governed largely by the physical diagonal dimension of the largest components within the instrumentation package assembly 7, like the SD/HD camera's CCD sensor array and the battery.

The battery's charging coils 3 and 10 are wound on the outside diameter of the instrumentation package assembly 7 at both top and bottom of its central hub and act electrically as a transformer's secondary winding. The coils are wound on the outside diameter of the instrumentation package assembly 7 to keep any heat they may produce away from the contents of the instrumentation package assembly 7 while the battery pack is being charged. The number of turns in each charging coil is made large enough to enable them to inductively couple a sufficient number of magnetic lines of flux from the primary coil of the battery charging station so as to charge the battery pack in a reasonably short time before games. When the charging station is placed on top 6 of the instrumented baseball home plate, the charging coils 3 and 10 receive electrical energy inductively coupled from the primary coils of the charging station, and use this energy to charge the battery pack.

The objectives of the present invention are achieved by making a mold for the instrumented baseball home plate and encapsulating the instrumentation package assembly inside the mold. The sequence of events that occur in preparation for the time when the instrumentation package assembly 7 is encapsulated inside the mold of the instrumented baseball home plate are as follows: The instrumentation package assembly 7 it is first plugged into and aligned in buffer plate assembly 8. The instrumentation package assembly 7 and buffer plate assembly 8 are then loaded into the mold on top of the lower cover plate shield 19. The instrumentation package assembly is carefully positioned in the mold, and then aligned with its mechanical z-axis 17 normal to the top 6 of the mold. The instrumentation package assembly 7 is then precisely aligned in rotation in the mold about its mechanical axis 17 so that its $1^{st}$ primary stop for its instrumentation package assembly element is aligned with the y-axis's 1 six o'clock angular direction, toward side 27, of the instrumented baseball home plate. The mold is then filled with encapsulating material 16 with the upper cover plate shield 18 placed on top of the buffer plate assembly 7. The instrumentation package assembly is encapsulated inside the instrumented baseball home plate for several reasons. The first reason is to protect the instrumentation package assembly from shock, vibration, dirt and the weather. The second reason is to maintain the alignment of the instrumentation package assembly inside the instrumented baseball home plate.

This alignment procedure assures that after the encapsulating material 16 has cured, the eight mechanical stops of the cameras are aligned to the eight angular directions of the instrumented baseball home plate which are as follows: side 27, forty-five degrees counter-clockwise from side 27, side 14, side 2, the apex, side (not shown), side 12, and forty-five degrees counter-clockwise from side 12.

The space between the top, bottom and sides of the instrumented baseball home plate and the protective cover plates 18 and 19 is filled with white rubber encapsulating material 16. When cured, this encapsulating material 16 acts as cushioning to absorb shock and vibration to the instrumented baseball home plate that may be transferred to the instrumentation package assembly 7. The molting material 16 encapsulates the upper and lower protective cover plates 18 and 19 and maintains their positions inside the molded instrumented baseball home plate. The space between the protective cover plates 18 and 19 and the instrumentation package assembly 7 is also filled with the same encapsulating material 16. When cured, this encapsulating material acts as cushioning to absorb shock and vibration to the instrumentation package assembly 7. The molting material encapsulates the instrument package assembly 7 inside the instrumented baseball home plate and thereby maintains its position inside the molded instrumented baseball home plate. The top edge 26 of the instrumented baseball home plate is beveled at 45 degrees the same as the standard conventional professional league baseball plate shown in FIG. 41 in order to protect the players who hit against it.

In a further preferred embodiment, the present invention referring to FIG. 48A and FIG. 48B contemplates an instrumented baseball home plate, which when stationed off of any baseball playing field i.e. at the traditional home plate location in the pitcher's bullpen can wirelessly and autonomously televise baseball pitching practice and warm-up sessions under command and control of the remote base station. The remote base station is disclosed in FIG. 59A and FIG. 59B and FIG. 60A and FIG. 60B and FIG. 61A and FIG. 61B. In addition to adding an element to the entertainment of the TV viewing audience, the embodiment serves to aid the pitchers and the pitching coaches in evaluating the quality of the pitcher's progress, prowess, fitness and "stuff".

The instrumented baseball home plate is an example of a static instrumented sports paraphernalia. For televising games from off the playing field, for example in the pitcher's bullpen, refer to FIG. 64C which is a top view of a general sports stadium that has been configured and equipped for use with both static and dynamic instrumented sports paraphernalia, using both bi-directional wireless radio wave communication links and/or bi-directional fiber optics cable/copper cable communication links.

The cameraman, in the remote base station, software selects either the wireless mode of communication, and/or the fiber optics/copper cable mode of communication between each of the instrumented baseball home plates and the remote base station. The cameraman can use whichever equipment (antenna array relay junction or fiber optics cable/copper cable) is installed in the stadium with which to command and control his choice and communicate it to the instrumented baseball home plates on the stadium playing field. These choices are also physically switch selectable by the cameraman with his access through the opening in the bottom of the instrumented baseball home plates. Refer to FIG. 59A and FIG. 59B, and FIG. 60A and FIG. 60B, and FIG. 61A and FIG. 61B, and FIG. 64A and FIG. 64B and FIG. 64C for disclosures regarding the remote base station and the antenna array relay junction.

The cameraman selects items from a software menu of control commands that go to the network transceiver at the remote base station that are subsequently transmitted to the instrumented baseball home plates for the purpose of adjusting various system initializations, operating parameters, radio frequency, polling system status data such as battery condition, and initiating remote mechanical adjustments such as camera focus, optical zoom, iris and movement to the cameras' field of view, etc over the selected bi-directional communications link i.e. wireless radio, fiber optics or copper cable connectivity being used within the particular sports stadium.

These commands, when intercepted by the network transceiver within the instrumented baseball home plates are applied to its microprocessor, which then in turn upon executing the instructions stored within the contents of its firmware applies a pulse coded control signal via the power and control interconnect interface inside the instrumentation package to the corresponding electronics i.e. the mechanical actuators that provides optical focus and/or zoom adjustment of the cameras and microphone gain and selection, etc as desired by the cameraman and/or special software running on the computer at the remote base station. The power and control interconnect interface as shown in FIG. 33E (item 21), which is represented by dotted lines, consists of the electrical control wiring to and from the electronic components of the instrumented baseball home plates that are being controlled.

Referring to the Preferred Embodiments Specified in FIG. 48A and FIG. 48B, the Instrumented Baseball Home Plate Satisfies all of the Following Objectives:

It is an objective of the present invention to instrument a baseball home plate composed of an instrumentation package assembly, buffer plate assembly, encapsulation cushioning material, upper protective cover plate, and lower protective cover plate. It is an objective of the present invention to instrument the pitcher's bullpen with an instrumented baseball home plate. It is an objective of the present invention to protect the instrumentation package assembly from shock, vibration, dirt and the weather inside the instrumented baseball home plate. It is an objective of the present invention to maintain the alignment of the instrumentation package assembly inside the instrumented baseball home plate. It is an objective of the present invention to protect the instrumentation package assembly from shock, vibration, dirt and the weather inside the instrumented baseball home plate. It is an objective of the present invention to maintain the alignment of the instrumentation package assembly inside the instrumented baseball home plate.

FIG. 49A and FIG. 49B and FIG. 49C and FIG. 49D

The detailed physical elements disclosed in the instrumented baseball home plate drawings shown in FIG. 49A and FIG. 49B and FIG. 49C and FIG. 49D are identified as follows: 1 (not shown). 2 is the y-axis of symmetry of the instrumented baseball home plate. 3 is the optical axis of the instrumentation package assembly containing camera 24. 4 is the side of the instrumented baseball home plate. 5 is a lower induction coil used to charge the battery pack inside the instrumentation package assembly. 6 is a lower induction coil used to charge the battery pack inside the instrumentation package assembly. 7 is the plane-parallel-flat optical window. 8 is the top of the instrumented baseball home plate. 9 (not shown). 10 is the left side of the instrumented baseball home plate. 11 is the central hub of the instrumentation package assembly containing the battery pack. 12 is the Type XI buffer plate. 13 is the bottom of the instrumented baseball home plate. 14 is the bellows segment of the instrumentation package assembly. 15 is the x-axis of symmetry of the instrumented baseball plate. 16 is the bottom of the central instrumentation package assembly. 17 is the interior of the central instrumentation package assembly. 18 is the top of the central instrumentation package assembly. 19 is the white rubber encapsulation material that fills the instrumented baseball home plate. 20 is the plane-parallel-flat optical window. 21 is the side of the instrumented baseball plate. 22 is the top protective cover plate of the instrumented baseball plate. 23 is the bottom protective cover plate of the instrumented baseball plate. 24 is the optical axis of the tilted 3-D stereo camera pair whose optical windows are 7 and 20. 25 is a wireless radio antenna. 26 is a wireless radio antenna. 27 is the z-axis of the camera whose optical window is 20. 28 is the z-axis of the camera whose optical window is 7. 29 is a wireless radio antenna. 30 is the z-axis of the instrumentation package assembly and the instrumented baseball home plate. 31 is the open aperture in the bottom of the instrumented baseball home plate. 32 is the right side of the instrumented baseball home plate. 33 is a microphone. 34 is a microphone. 35 is a camera. 36 is a camera. 37 is a camera lens. 38 is a camera lens. 39 is a wireless radio antenna. 40 is the bellows segment of the instrumentation package assembly. 41 is a gas valve. 42 is an access lid heat sink. 43 is a microphone. 44 is the microphone connector. 45 is the microphone cable.

FIG. 49A is a top view of a two tilted camera instrumented baseball home plate.

FIG. 49B is a side view of a two tilted camera instrumented baseball home plate.

FIG. 49C is a side view of a one tilted camera instrumented baseball home plate.

FIG. 49D is a side view of a one tilted camera instrumented baseball home plate.

Referring to drawings FIG. 49A and FIG. 49B and FIG. 49C and FIG. 49D, in a preferred embodiment, the present invention contemplates an instrumented baseball home plate, which when stationed on any baseball playing field at any traditional home plate location, can wirelessly and autonomously televise baseball games under the command and control of the remote base station, is disclosed.

The remote base station is disclosed in FIG. 59A and FIG. 59B and FIG. 60A and FIG. 60B and FIG. 61A and FIG. 61B.

The only substantial difference between the instrumented baseball home plate shown in FIG. 49A and FIG. 49B and FIG. 49C and FIG. 49D, and the one shown in FIG. 45A and FIG. 45B is that the cameras in FIG. 49C and FIG. 49D are shown, tilted away from, and toward the pitcher respectively, whereas the cameras in FIG. 45A and FIG. 45B are looking vertically straight up. As with the previous preferred embodiment shown in FIG. 45A and FIG. 45B, the present preferred embodiment shown in FIG. 49A and FIG. 49B and FIG. 49C provides the TV viewing audience with 3-D stereo pictures and stereophonic sound.

Using identical components, another preferred embodiment can just as easily be constructed with the cameras (along with their lenses and buffer plate) tilted away from and toward the batter respectively.

The instrumented baseball home plate employs a two camera instrumentation package assembly identical to the instrumentation package assembly shown in FIG. 34A and FIG. 34B. It uses the Type XI buffer plate assembly shown in FIG. 21ZA and FIG. 21ZB and FIG. 21ZC. The instrumentation package assembly uses the identical instrumentation package assembly elements disclosed in FIG. 33D.

Referring to the disclosed instrumented baseball home plate shown in FIG. 49A and FIG. 49B and FIG. 49C, the instrumented baseball home plate has one instrumentation package assembly 11 mounted inside the instrumented baseball home plate. Details of instrumentation package assembly are shown in FIG. 34A and FIG. 34B and FIG. 34C. Details of the instrumentation package assembly elements are shown in FIG. 33D.

Except for the optical windows, the exterior appearance of both the instrumented baseball home plate and the conventional baseball home plate shown in FIG. 41 are identical, both having the same size, shape, color and texture. Consequently, both have the same identical appearance as seen by the baseball players.

The instrumentation package assembly 11 carries two CCD sensor arrayed cameras 35 and 36 and two microphones 33 and 34. The two cameras 35 and 36 are arranged side by side and form a 3-D stereo camera pair. The two cameras 35 and 36 are separated by an interpupillary distance.

The linear distance separation of the optical axes of the two camera lenses that make up the 3-D stereo camera pair is an important function of the buffer plate. For the buffer plate, the distance measured between the axes is defined as the interpupilarly distance between the camera lenses.

We note here for reference that for modern commercial 3-dimensional cameras, the range of settings for the interpupillary distance is adjustable from 44 to 150 mm. Following the range of settings referenced for modern commercial 3-dimensional cameras, the size of the buffer plate interpupillary distance is made to accommodate an interpulilary distance range of 44 to 150 mm also. Therefore, the axial separation between each stereo pair of camera lenses can vary from 40 to 150 mm.

How far you are intending to view the pictures from requires a certain separation between the cameras. This separation is called stereo base or stereo base line and results from the ratio of the distance to the image to the distance between your eyes. The mean interpupillary distance (IPD) is 63 mm (about 2.5 inches) for humans, but varies with age, race and gender. The vast majority of adults have IPDs in the range 50-75 mm. Almost all adults are in the range 45-80 mm. The minimum IPD for children as young as five is around 40 mm.

It is understood that other alternative preferred embodiment's interpupillary distances may be used to produce other alternative 3-D effects. For example, larger interpupillary distance will produce more striking 3-D effects. The range of interpupillary distances that can be used is 40 to 150 millimeters.

The two cameras 35 and 36 that form the 3-D stereo camera pair have optical windows 7 and 20. The two cameras 35 and 36 that form the 3-D stereo camera pair have the same line of sight 24. The two cameras 35 and 36 that form the 3-D stereo camera pair have optical windows 7 and 20. The line of sight 24 of the 3-D stereo camera pair is tilted relative to axes 27 and 28. Axes 27 and 28 are perpendicular to the top 19 of the instrumented baseball home plate. The interpupillary distance is the distance between 27 and 28 which is the distance between the optical axes of camera lenses 37 and 38. The line of sight 24 of the cameras 35 and 36 that form the 3-D stereo camera pair is tilted away from the vertical. The line of sight 24 of the cameras 35 and 36 that form the 3-D stereo camera pair is tilted away from the vertical and toward the catcher in FIG. 49C. The line of sight of the cameras 35 and 36 that form the 3-D stereo camera pair is tilted away from the vertical and toward the pitcher in FIG. 49D.

The baseball home plate has five sides. As is customary in the game of baseball, 21 is the side of the baseball home plate that faces the pitcher. The top of the home plate sits horizontally on the baseball playing field. The optical axes of the two cameras 35 and 36 are parallel to each other and are tilted relative to the top 19 of the instrumented baseball home plate. The instrumented baseball home plate is oriented in space so its z-axis 30 is perpendicular to the surface of the baseball field and pointing skyward.

The two cameras 35 and 36 are identical to each other. The two cameras 35 and 36 use the same two identical extremely wide angle lenses 37 and 38. At times, in order to produce more dramatic shots of the pitcher during the game, the cameraman may want to pre-orchestrate the positioning of the 3-D camera's line of sight 24 before the baseball game begins. This can be accomplished by pre-tilting, and encapsulating in-place, the 3-D cameras 35 and 36 inside the instrumented baseball home plate in advance of the game when the field is being prepared before the game. The 3-D stereo camera's line of sight 24 shown in FIG. 49D is tilted toward the pitcher in order to raise the image of the pitcher above the lower edge of the TV picture frame and produce a larger picture of the pitcher. This produces the dramatic effect of making the pitcher seem closer to the TV viewing audience.

The 3-D stereo camera pair's 35 and 36 line of sight 24 shown in FIG. 49C is tilted away from the pitcher and toward the catcher in order to lower the image of the catcher from the upper edge of the TV picture frame to bring him closer to the center of the TV picture frame and produce a larger picture of the catcher. This produces the dramatic effect of making the catcher and his mitt seem closer to the TV viewing audience. If the batter swings at a pitch and misses, the TV viewing audience will see up-close the baseball hit the crater in the catcher's mitt as it is being caught. The TV viewing audience will hear a loud crack as the baseball slaps the catcher's leather mitt.

Each of the two cameras 35 and 36 comprising the 3-D stereo camera pair is aligned within the instrumentation package assembly 11 so that each of the cameras 35 and 36 yields wirelessly transmitted upright images of objects that appear between the center and the bottom of the TV picture frame. Both cameras 35 and 36 are aligned inside the instrumentation package assembly so that the TV viewing audience sees the distant stadium horizon in the outfield towards the bottom of the TV picture frame. The distant stadium horizon that is behind the pitcher appears horizontal in the picture frame at the bottom of the picture frame. The pitcher appears to be standing upright just above the bottom center of the picture frame.

When the pitcher throws the baseball to the catcher, the TV audience will see the baseball approaching the center of the TV picture from the bottom center of the picture. The size of the baseball grows larger as it gets closer to the instrumented home plate and the batter. Since the cameras are directly below the batter, an image of the batter's chin will occupy the center of the TV picture. The size of the baseball will appear to be at its biggest as it passes directly over the instrumented baseball home plate. The TV audience will hear the whoosh of air in microphones 33 and 34 as the baseball passes over the instrumented home plate. The TV audience will see the batter swing his bat, up close, to strike the baseball as it whizzes by. The TV audience will hear the rush and whiz of the air in microphones 33 and 34 as the batter swings his bat. The TV audience will hear the loud crack and explosion of the bat as it strikes the baseball. The TV audience will see the baseball up-close as it is hit by the bat. The TV audience will see the baseball as it travels outward from the bat onto the playing field. The TV audience will see the baseball get smaller as it gets further away from the instrumented home plate.

The audience will see the batter drop the bat and scramble toward first base on the right hand side of the screen. The TV audience will hear the thud of the bat in microphones 33 and 34 after the batter drops it and it hits the ground. The TV audience will hear the rustle and scraping of the batter's cleats on the ground in microphones 33 and 34 as he scrambles to first base. The sounds received from each of the microphones by the remote base station are processed using special software to produce surround sound which is broadcast to the TV viewing audience. The TV audience will see the size of the batter grow smaller as he scampers toward first base into the distance. In summary, the instrumented baseball home plate provides video and sound to the viewing audience that is so exciting and realistic that it makes the individual members of the audience feel that they are at bat and in the game. In many ways this is more exciting than viewing the game in person from the stands of the baseball stadium. Therefore, the instrumented baseball home plate not only provides a step forward in entertainment, but it also provides a great training tool to prospective baseball players by giving them the true life visual and auditory sensations and feelings of being at the plate without actually being there.

The instrumented baseball home plate is symmetrical about its y-axis 2. The instrumented baseball home plate has five sides. Only sides 4, 10, 21, and 32 are shown in the figures. The top 6 of the instrumented baseball home plate sits horizontally on the baseball playing field. The line of sight 24 of the camera's 35 and 36 is shown in FIG. 48C and FIG. 48D. The z-axis 30 of the instrumented baseball home plate is perpendicular to the top 8 of the instrumented baseball home plate, and is oriented in space so it is perpendicular to the baseball field and pointing skyward. The line of sight 24 of camera's 35 and 36 is tilted toward the pitcher in FIG. 48D. The line of sight 24 of the camera's 35 and 36 is tilted toward the catcher in FIG. 48C.

The camera's 35 and 36 look out of the top 8 of the instrumented baseball home plate, along their respective line of sight 24. The camera 35 and 36 are aligned within their instrumentation package assembly 11 so that the camera's 35 and 36 yield a wirelessly transmitted upright image to the TV viewing audience of objects in the center of the field of view.

Camera's 35 and 36 are mounted inside the instrumentation package assembly 11. The line of sight 24 of camera's 35 and 36 are tilted relative to the top 8 of the instrumented baseball home plate. In FIG. 48D, the tilt arrangement shown permits camera's 35 and 36 to look more toward the pitcher from out of the top 8 of the instrumented baseball home plate. This brings the image of the pitcher closer to the center of the TV picture frame and makes him look closer and larger. Utilization of an extremely wide angle lenses 37 and 38 allow the TV viewing audience to see past the pitcher and down past the horizon of the baseball stadium outfield.

In FIG. 49C, the tilt arrangement shown permits the camera's 35 and 36 to look more toward the catcher from out of the top 8 of the instrumented baseball home plate. This brings the image of the catcher closer to the center of the TV picture frame and makes him look closer and larger. Utilization of extremely wide angle lenses 37 and 38 allows the TV viewing audience to see past the catcher and down past the horizon of the baseball stadium behind the catcher.

Tilting of the 3-D stereo camera pair 35 and 36 line of sight 24 is accomplished by using the bellows sections 14 and 40 of the instrumentation package assembly 11. The bellows sections 14 and 40 are flexible. The bellows sections 14 and 40, which connect the buffer plate assembly 12 to the instrumentation package assembly 11, is bent to the desired tilt angle for the camera's 35 and 36 line of sight 24. After the desired tilt angle is set by bending the bellows sections 14 and 40, all the components inside the instrumented baseball home plate are encapsulated in place using the rubber encapsulating compound 19. The tilted line of sight 24 is common for camera's 35 and 36, lenses 37 and 38, optical window's 20 and 7, and buffer plate 12.

Keeping in mind that the line of sight 24 is common for camera's 35 and 36, lenses 37 and 38, optical window's 20 and 7, and buffer plate 12 for FIG. 49C and for FIG. 49D, it follows from the specification discussed above that the line of sight 24 of camera's 35 and 36, lenses 37 and 38, optical window's 20 and 7, and buffer plate 12 can be tilted in a like manner, towards or away from the batter as well, by bending the bellows sections 14 and 40 as before. Tilting 24 towards the batter would bring the image of the batter closer to the center of the TV picture frame and make him look closer and larger. Tilting 24 away from the batter would move the image of the batter away from the center of the TV picture frame and make him look further away and smaller Utilization of extremely wide angle lenses 37 and 38 allows the TV viewing audience to see down past the batter and down past the horizon of the baseball stadium behind the batter.

When a player is running toward the instrumented baseball home plate from third base, the 3-D stereo camera pair 35 and 36 can see where he is coming from. The cameras 35 and 36 can see the player as he runs and touches the instrumented baseball home plate. The cameras 35 and 36 can see the player as he is sliding into the instrumented baseball home plate. The TV audience will see and hear the player's cleats as they hit the instrumented baseball home plate. The cameras 35 and 36 can see the catcher as he tags the player before the player touches the instrumented baseball home plate and scores a run. From the vantage point of the instrumented baseball home plate, the viewing audience can see the strained player darting for the instrumented baseball home plate. The viewing audience can see details of the player's feet as he attempts to slide into the instrumented baseball home plate. The viewing audience can see a close-up of the opposing team's catcher's attempt to tag him with the ball. As the baseball is thrown home, the viewing audience can see the catcher reach down for it close to the plate. The camera's 35 and 36 vantage point at the instrumented baseball home plate gives the audience a viewing angle of the game never seen before by television viewing audiences. The instrumented baseball home plate's cameras 35 and 36 gives the TV viewing audience unending contemporaneous shots that get across a sense of the action of being there—like a player in the game that prior art cameras looking on from their disadvantaged viewing points from outside the playing field cannot get across.

The top 8 of the instrumented baseball home plate sits horizontally flat on the baseball playing field. The common line of sight 24 of the cameras 35 and 36 is tilted with respect to the z-axis 30 of the instrumentation package assembly 11 and the z-axis 30 of the instrumented baseball home plate. Axis 30 is perpendicular to the top 8 of the instrumented baseball home plate. The instrumented baseball home plate is oriented in space so its z-axis 30 is perpendicular to the surface of the baseball field and pointing skyward.

The cameras 35 and 36 look outward from the top 8 of the instrumented baseball home plate along and around their common line of sight 24 through optical windows 20 and 7. The cameras 35 and 36 are aligned within the instrumentation package assembly 11 so that the cameras 35 and 36 yield a wirelessly transmitted upright image to the TV viewing audience via wireless radio antennas 25, 26, 29 and 39. The two holes in the top 8 of the instrumented baseball home plate are made just large enough to prevent vignetting of the cameras field of view.

In the present preferred embodiment, cameras 35 and 36 use a common extremely wide angle lens 37 and 38 with zoom capability. Even though cameras 35 and 36 are pointed outward from the top 8 of the instrumented baseball home plate, they can see past the pitcher along y-axis 2 right down to the outfield stadium horizon because of their near 180 degree field of view. This is a distinct advantage of extremely wide angle lenses over other types of lenses. However, it should be pointed out that the cameraman may elect to use a variety of other camera lens pairs 37 and 38 with different capabilities depending on the visual effects he wishes to convey to the TV viewing audience. For example, the cameraman may elect to use a camera lens pair 37 and 38 with a narrower field of view in order to concentrate the attention of the TV viewing audience on the batter's taut and sweaty stubble filled face.

The instrumentation package assembly 11 is supported at its upper end by a buffer plate 12. The instrumentation package assembly 11 and the buffer plate 12 are permanently encapsulated inside of the instrumented baseball home plate as the encapsulating material 19 around them cures. After the encapsulating material 19 sets, it becomes a weatherproof shock absorbing padding material 19. The small diameter end of the buffer plate 12 peers through the top 8 and upper protective cover plate 22 of the instrumented baseball home plate. The small diameter end of the buffer plate 12 is sealed and molded into the shock absorbing padding 19 around its circumference. The encapsulating material 19 is a permanent resilient compound that is air-tight and water-tight.

The buffer plate 12 is encapsulated by the encapsulating material 19 inside the instrumented baseball home plate. Synthetic rubber is an example of encapsulating material that is used. The mechanical axes 27 and 28 of the bores in the buffer plate are tilted to the top 8 of the instrumented baseball home plate. The ends of the instrumentation package assembly 11 are inserted into the bores in the buffer plate 12, thereby tilting the mechanical axis of the end of instrumentation package assembly 11 to the top 8 of the instrumented baseball home plate.

The buffer plate 12 acts as a bearing for the instrumentation package assembly 11, and thereby restricts and restrains the motion of the instrumentation package assembly 7 inside the instrumented baseball home plate. Besides functioning as a bearing to support the instrumentation package assembly 11 within the instrumented baseball home plate, the buffer plate provides a hollow portal through which the cameras 35 and 36 inside the instrumentation package assembly 11 may peer out of the instrumented baseball home plate at the baseball playing field along line of sight 24.

The instrumented baseball home plate's outward appearance looks substantially the same as the conventional professional league baseball home plate and the conventional high school league baseball home plate, and meets the official requirements for these venues and is interchangeable with them in these venues.

The buffer plate 12 is a Type XI buffer plate and is shown in FIG. 21ZA and FIG. 21ZB and FIG. 21ZC. The buffer plate 12 is molded into the instrumented baseball home plate using the white rubber encapsulating material 19. The small diameter end of the buffer plate 12 passes through the upper cover protective cover plate 22 and protrudes through the molded rubber top 8 of the instrumented baseball home plate. The buffer plate carries the optical windows 20 and 7. The optical windows 20 and 7 tilt with the buffer plate 12. The flat surfaces of optical windows 20 and 7 are tilted and relatively flush with the top 8 of the instrumented baseball home plate.

The cameras 35 and 36 are aligned together within the instrumentation package assembly 11 so that they yield wirelessly transmitted upright 3-D images of the pitcher and of the outfield of the baseball stadium. This can be accomplished in any one of two different modes. Each of these two modes conveys its own spectacular viewing angle of the game to the TV viewing audience. Each of these two modes is achieved by physically rotating the cameras 35 and 36 and their lenses 37 and 38 about their optical axes respectively by using an actuating device that is mechanically coupled to the cameras 35 and 36 and lenses 37 and 38 inside the instrumentation package assembly 11. The mechanical actuating device has two stops that are mechanically detented 180 degrees apart from one another. The mechanical actuating device is housed within the camera's instrumentation package assembly 11. The mechanical actuating device can rotate the cameras 35 and 36 and lenses 37 and 38 together to any one of the two stops about their optical axes respectively. The cameraman in the remote base station selects which of the two modes is to be employed, and sends a signal to the instrumentation package assembly 11 to set the cameras 35 and 36 and lenses 37 and 38 to the desired mode he selected.

In the first mode, the cameras 35 and 36 and lenses 37 and 38 are aligned in rotation about their optical axes respectively inside its instrumentation package assembly 11 by the mechanical actuating device so that the TV viewing audience sees the stadium horizon in the outfield near the bottom edge of the 3-D TV picture frame. (This is equivalent to what a person would see visually if he were laying flat down on the playing field with his head resting on the instrumented baseball home plate and looking upward with his feet facing the pitcher.) The stadium outfield horizon appears horizontal in the picture frame at the very bottom center of the TV picture frame. The pitcher appears to be standing upright on his mound just above the bottom center of the picture. When the pitcher throws the baseball to the catcher, the TV audience will see the baseball approaching the center of the TV picture frame from above the bottom center of the picture frame. The size of the baseball grows larger as it gets closer to the instrumented baseball home plate and the batter. Since the cameras 35 and 36 are physically located below the batter inside the instrumented baseball home plate, an image of the underside of batter's chin and sweaty arm pits will occupy the left center of the TV picture frame.

The batter appears standing upright in the picture frame with his head near the left center and his feet at the left side of the SD/HD letterbox 3-D TV picture frame. When the pitcher throws the baseball to the catcher, the TV audience will see the baseball approaching the center of the TV picture frame from the image of the pitcher's hand which is near the bottom center of the picture frame. The size of the baseball grows larger as it gets closer to the instrumented baseball home plate and the batter. Since cameras 35 and 36 are below the batter, an 3-D image of the underside of batter's chin and sweaty arm pits will be near the center left of the TV picture. The microphones 33 and 34 will enable the TV audience to hear the whoosh 35 and 36 of air as the baseball passes above the instrumented baseball home plate. Cameras 34 and 35 will enable the TV audience to see the batter swing his bat, up close, to strike the baseball as it whizzes by above the instrumented baseball home plate. The microphones 33 and 34 will enable the TV audience to hear the rush of the air as he swings his bat. The TV audience will hear the loud crack of the bat as it strikes the baseball. The TV audience will see the baseball the moment it is hit by the bat. This will be an action packed event never before witnessed by a TV audience. Each of the pitched baseballs will produce breath taking excitement and expectations by the TV viewing audience.

Cameras 35 and 36 will enable the TV audience to see the baseball as it travels outward from the crack of the bat onto the playing field. The TV audience will see the baseball get smaller as it gets further away from the instrumented home plate and the batter. The image of the baseball will move away from near the center of the TV picture frame after it is hit. The audience will see the batter drop the bat and scramble toward first base which is on the right side of center in the TV picture frame. The image of the bat will grow in size and appear to the TV viewing audience as though it was going to hit them in the face as it is dropped and careens down onto and strikes the instrumented baseball home plate. Members of the TV viewing audience will duck to avoid being hit by the bat. The TV audience will hear the thud of the bat after the batter releases it and it hits the instrumented baseball home plate. The microphones 33 and 34 will enable the TV audience to hear the scraping by the batter's cleats on the ground as he scrambles to first base. The TV audience will see the size of the batter grow smaller as he runs toward first base and gets further from home plate.

In the second mode, the cameras 35 and 36 and lenses 37 and 38 are aligned in rotation inside its instrumentation package assembly 11 by the mechanical actuating device so that the TV viewing audience sees the catcher squatting upright with his feet near the bottom of the TV picture frame. (This is equivalent to what a person would see visually if he were laying flat down on the playing field with his head resting on the instrumented baseball home plate and looking upward with his feet facing the catcher at the apex of the instrumented baseball home plate). The stadium horizon appears horizontal at the top of the TV picture frame. The pitcher appears on his mound toward the top center of the TV picture frame. When the pitcher throws the baseball to the catcher, the TV audience will see the baseball approaching the center of the TV picture frame from the image of the pitcher's hand which is top of center of the TV picture frame. The size of the baseball grows larger as it gets closer to the instrumented baseball home plate and the batter. Since the camera is below the batter, an image of the underside of batter's chin and sweaty arm pits will occupy the center right of the TV picture frame. The TV audience will hear the whoosh of air as the baseball passes above the instrumented baseball home plate. The TV audience will see the batter swing his bat, up close, to strike the baseball as it whizzes by. The TV audience will hear the rush of the air as the batter swings his bat. The TV audience will hear the loud crack of the bat as it strikes the baseball. The TV audience will see the baseball the moment it is hit by the bat. This will be an action packed event never before witnessed by a TV audience. Each of the pitched baseballs will produce breath taking excitement and expectations by the TV viewing audience. The TV audience will see the baseball as it travels outward from the crack of the bat onto the playing field. The TV audience will see the baseball get smaller as it gets further away from the instrumented home plate and the batter. The image of the baseball will move from the center of the TV picture frame after it is hit. The audience will see the batter drop the bat and scramble toward first base. The image of the bat will grow in size and appear to the TV viewing audience as though it was going to hit them in the face as it careens down onto and strikes the instrumented baseball home plate. Members of the TV viewing audience will duck to avoid being hit by the bat. The TV audience will hear the thud of the bat after the batter releases it and it hits the instrumented baseball home plate. The TV audience will hear the scraping by the batter's cleats on the ground as he scrambles to first base. The TV audience will see the size of the batter grow smaller as he runs toward first base and gets further from home plate.

The instrumentation package assembly 11 is mechanically mounted inside the instrumented baseball home plate using a buffer plate assembly 12. The instrumentation package assembly 11 is mechanically protected inside the instrumented baseball home plate using an upper and a lower protective cover plate shield 22 and 23 respectively.

The two protective cover plates 22 and 23 are embedded and molded into the instrumented baseball home plate using the shock absorbing white rubber material 19. Protective cover plate 22 is on the top, and protective cover plate 23 is on the bottom of the instrumented baseball home plate. The top protective cover plate 22 is referred to as the upper protective cover plate. Details of it are shown in FIG. 56. The bottom protective cover plate 23 is referred to as the lower protective cover plate. These protective cover plates 22 and 23 sandwich the instrumentation package assembly 11 between them and protect it and its contents from being damaged.

Except for the optical windows, the external appearance of both the instrumented baseball home plate and the conventional baseball home plate are identical, both being made of the same white rubber material 19. In addition, their size, shape, color and texture are identical. The weights of the instrumented baseball home plate and the conventional baseball home plate are nearly identical. Details of the conventional baseball home plate are shown in FIG. 41.

The instrumentation package assembly 11 is sandwiched between the top and bottom protective cover plates 22 and 23. The purpose of these protective cover plates 22 and 23 is to act as mechanical shields to protect the instrumentation package assembly 11 from being damaged by impacts during the game. During the normal course of the game, the top of the instrumented baseball home plate will be hit and crushed by the players and by their equipment. For example, the players may step on the instrumented baseball home plate or slide into it. They may even drop their bats on it. The two protective cover plates 22 and 23 protect the instrumentation package assembly 11 within the instrumented baseball home plate from physical damage due to these hits.

The outermost body region of the top protective cover plate 22 is made substantially spherically dome shaped. There is a flat region in the middle of the upper protective cover plate 22 surrounding the two clearance bore for camera's 35 and 36. The entire body of the bottom or lower protective cover plate 23 is made flat. The top and bottom protective cover plates 22 and 23 both have rounded outer edges. The edges are rounded to insure that the baseball players will not be injured by them if the players crash into the instrumented baseball home plate.

A variety of materials can be chosen for the protective cover plates 22 and 23 in the present preferred embodiment. Material examples are polycarbonates, ABS, and fiber reinforced plastics. These materials have the advantage that they are lightweight and stiff, enabling the thickness of the cover plates to remain thin while still delivering the significant stiffness needed to perform their protective function of mechanical shielding the instrumentation package assembly in the limited space they can occupy within the instrumented baseball home plate. They have the additional advantage in that they are transparent to the transmitted and received radio waves which need to move to and from the wireless radio antennas 25, 26, 29, and 39 inside the instrumented baseball home plate without absorption or reflection therein.

The space between the top, bottom and sides of the instrumented baseball home plate and the protective cover plates 22 and 23 is filled with white rubber encapsulating material 16. When cured, this encapsulating material 19 acts as cushioning to absorb shock and vibration to the instrumented baseball home plate that may be transferred to the instrumentation package assembly 11. The molting material 19 encapsulates the upper and lower protective cover plates and maintains their positions inside the molded instrumented baseball home plate. The space between the protective cover plates 22 and 23 and the instrumentation package assembly 11 is also filled with the same encapsulating material 19. When cured, this encapsulating material acts as cushioning to absorb shock and vibration to the instrumentation package assembly 11. The molting material encapsulates the instrument package assembly 11 inside the instrumented baseball home plate and thereby maintains its position inside the molded instrumented baseball home plate. The top 8 of the instrumented baseball home plate is beveled all around on its edge at 45 degrees the same as the standard conventional professional league baseball plate shown in FIG. 41 in order to protect the players who hit against it.

The top protective cover plate 22 is spherically dome shaped in its outer region, and flattened in its inner region close to the optical window 13. The purpose of making it flattened near the optical window 13 is to provide maximum protection for the optical window 13 whose surface is at the very top of the instrumented baseball home plate. The flattened shape enables the protective cover plate 22 to closely surround the optical windows 7 and 20 at the top 8 of the instrumented baseball home plate where the optical windows 7 and 20 are most likely to be exposed to the greatest threat of damage due to hits to the top of the instrumented baseball home plate. The upper protective cover plate 22 is buried in encapsulating material at the center top 8 of the instrumented baseball home plate around the optical windows 7 and 20. The dome shape enables the upper protective cover plate 22 to come very close to the top 8 center of the instrumented baseball home plate where the players will have only grazing contact with its surface if they crash into the instrumented baseball home plate, thereby eliminating the threat of injury to the players if they hit the top of the instrumented baseball home plate.

The spherical shape of the upper protective cover plate 22 causes its edge to be rounded downward and away from the top of the outer skin and places the edge well below the top surface 8 of the outer skin of the instrumented baseball home plate and away from the players.

The upper protective cover plate 22 protects the instrumentation package assembly 11 from being crushed and damaged by the players during the game. The instrumentation package assembly is located below the upper protective cover plate 18 inside of the instrumented baseball home plate. In order to achieve its purpose, the upper protective cover plate 18 must be stiff. The entire volume between the top 8 of the instrumented baseball home plate 4 and the upper protective cover plate 22 is filled with a resilient encapsulation padding material 19. The entire volume between the upper protective cover plate 22 and the instrumentation package assembly 11 is filled with the same resilient encapsulation padding material 19. The domed shape of the upper protective cover plate 22 is very important. It completely covers and wraps the instrumentation package assembly 11 and its radio antennas 25, 26, 27, and 28, which are below it, and diverts trauma and forces that occur to the top 8 of the instrumented baseball home plate 4 during the game away from the instrumentation package assembly 11 and its antennas 25, 26, 27, and 28. The outer edge of the upper protective cover plate 22 is bent downward and past the outermost tips of the radio antennas 25, 26, 27, and 28 to protect them. The curvature of the upper protective 18 cover plate 18 is made large enough so that the dome completely covers around them. The dome shape allows the thickness of the padding 19 between the top 8 of the instrumented baseball home plate 4 and the upper protective cover plate 22 to increase as the radial distance from the center 13 of the instrumented home plate 4 increases outwardly.

The lower protective cover plate 23 is flat and is buried in the encapsulating material 19 just above the bottom surface 13 of the instrumented baseball home plate. The body of the lower protective cover plate 23 can be made flat because it is buried in the ground and there is no danger of the baseball players coming into violent contact with it. The flat shape is easier to make and less expensive to manufacture. It can also be made thicker than the upper protective cover plate 18 because there is more free space near the bottom of the instrumented baseball home plate that it can occupy. Its thickness is not physically restrained because of its location, as is the case with the upper protective cover plate 22 which is physically squeezed between the top surface 8 and the buffer plate 12.

In both cases, the rounded edges of the protective cover plates 22 and 23 are substantially distant from the top 8 of the instrumented baseball home plate to protect the players from impacting against them. The top protective cover plate 22 is detailed in FIG. 56. The edge of the top protective cover plate 22 is rounded and all sharp corners are removed so as to make it safe to the players if they press violently against the instrumented baseball home plate.

The outer body of the top protective cover plate 22 is made spherically dome shaped. The spherical top of the dome faces upward. The top protective cover plate 22 has two bored holes in it on either side of center. The purpose of the bores is to permit the cylindrical ends of the buffer plate 12 containing the camera's 35 and 36 optical window's 20 and 7 respectively to pass through it, and through the encapsulating material 19, and through the top 8 of the instrumented baseball home plate. The top protective cover plate 22 is made flat in its inner region near to its circular bores so it can surround the optical window's 20 and 7 near the very top center of the instrumented baseball home plate and shelter them from hits; while its spherical dome shape in its outer region keeps the edge of the protective cover plate 22 far down below the top of the instrumented baseball home plate and well below the surface of the playing field within the ground, so the edge would not be felt by the players if they impacted on the top surface of the instrumented baseball home plate. The body of the bottom protective cover plate 23 is made flat and has rounded corners like the top protective cover plate 22 for the same reason.

The optical window's 20 and 7 permit the camera's 35 and 36 that are mounted inside the instrumentation package assembly 11 of the instrumented baseball home plate to look out through the top 8 of the instrumented baseball home plate onto the playing field during a baseball game and be protected from hazards such as rain, dirt and physical impacts.

The optical window's 20 and 7 are sealed to the small diameter cylindrical end of the buffer plate 12. The seals are airtight and waterproof to protect the camera's 35 and 36, camera lenses 37 and 38, microphones 33 and 34, and the electronics within the instrumentation package assembly 11.

The optical window's 20 and 7 are made strong to protect the camera lenses 37 and 38 and camera's 35 and 36 that are located beneath it. The optical window's 20 and 7 are hard coated by vapor deposition with materials such as MgFl or SiO2 to help prevent the outer-most window's 20 and 7 surfaces from being scratched during the game. The optical window's 20 and 7 material itself is chosen to be strong. It is made from hard optical glass such as barium lanthanum borate glasses, or hard optical plastic like acrylic or polycarbonate, both of which are scratch resistant.

The optical window's 20 and 7 are made small to make them inconspicuous to the players, and substantially preserve the instrumented baseball home plate's look-alike quality with the conventional major league home plate shown in FIG. 41; while still retaining sufficient clear aperture for the camera lenses 37 and 38 to see events with SD/HD resolution on the playing field in prevailing light. A typical optical window's 20 and 7 range in size from about ⅛ inch to ½ inches in diameter. Besides their small size, the optical window's 20 and 7 are made additionally inconspicuous by making their antireflection coatings a straw color to match the tan coloration of the ground dust around the instrumented baseball home plate.

The optical window's 20 and 7 are plane-parallel-flat. They are disposed equidistant around the intersection of the x-axis 15 and y-axis 2 of the instrumented baseball home plate. The optical window's 20 and 7 are positioned on the top 8 of the instrumented baseball home plate so they are aligned roughly with the chin line of the average batter, and roughly at the same location as the center of gravity of the conventional major league home plate shown in FIG. 41.

Optical windows having a spherical dome shape can also be used when a larger field of view is desired. In another preferred embodiment, the outer surface of the window is spherical in shape and convex outward and shell-like as is necessary to permit the camera to see fields of view with extremely wide viewing angles approaching 90 degrees off the optical axis of the cameras. Shell-like implies that the inner and outer spherical surfaces of the optical window are concentric. In applications where extremely wide viewing angles are not required, the optical window surfaces can be made flat and plane parallel. The shell-like windows enable the camera to use lenses that have extremely wide viewing angles approaching 90 degrees off the optical axis of the camera lens without introducing bothersome optical aberrations and vignetting. The shell-like shape of the windows also imparts increased physical strength to the windows. The optical window 20 and 7 are attached to buffer plate 12. The optical window's 20 and 7 provide adjacent portals through which cameras lenses 37 and 38 can see out onto the playing field from inside the instrumented baseball home plate. The encapsulating material 19 provides shock absorbing padding between the outer top surface 8 of the instrumented baseball home plate and the upper protective cover plate 22. The encapsulating material 19 provides shock absorbing padding between the upper protective cover plate 22 and the buffer plate 12.

Camera lenses 37 and 38 look out thru the top 8 of the instrumented baseball home plate through their respective optical window's 22 and 23 at objects angularly spread out around their respective line of sight 24, and image the objects they see onto camera's 35 and 36.

A variety of different camera lens 37 and 38 types with different lens setting capabilities can be used. When enabled by the operator in the remote base station, the auto iris setting permits the camera lenses 237 and 38 to automatically adjust for varying lighting conditions on the field. The auto focus setting permits the camera lenses 37 and 38 to adjust focus for varying distances of the players and action subjects on the field.

For example, when a baseball is hit, and a player is rounding the bases, the distance of a player from home plate may be increasing or decreasing. The camera's 35 and 36 within the instrumented baseball home plate can be independently and simultaneously commanded and controlled to auto focus on the player. As the player is rounding third base, if he decides to run for home plate, the instrumented baseball home plate's camera's 35 and 36 and microphones 33 and 34 will capture all the action. While the player is running, his pictures and sounds are being wirelessly transmitted from the instrumentation package assembly 11 inside the instrumented baseball home plate to the remote base station for processing.

If the player decides to slide into home plate, the instrumented baseball home plate camera's 35 and 36 will enable the viewing audience to see the player slide into home plate, up close. The camera's 35 and 36 will catch a detailed image of the player's sharp cleats as they strike the plate. The TV audience will experience the flight of chunks of dirt being thrown onto the plate. The microphones 33 and 34 will enable the TV viewing audience to hear the scraping and the thud of the cleats as they hit the plate. The TV audience will hear the chunks of dirt as they hit the plate. The TV viewing audience will see the face and the hand of the umpire as he reaches down to sweep the plate. The TV audience will hear and see the bristles of the umpire's brush as he sweeps the dirt off the plate.

If the cameraman chooses to use spherical concentric dome shaped optical windows 20 and 7 in order to minimize the vignetting of the extreme 180 degree field of view of extremely wide angle lenses 37 and 38, then the spherical optical windows will protrude above 8 by about one half the diameter of the spherical optical window.

Buffer plate 12 is shown in detail in FIG. 21QQ and FIG. 21RR and FIG. 21SS. It is made from a light-weight rigid polycarbonate, ABS or fiber reinforced plastic material. It is used to prop up and position the instrumented baseball home plate's upper protective cover plate 22. The buffer plate 12 is mounted and permanently encapsulated to the inside of the instrumented baseball home plate. The top of the buffer plate 12 is covered by upper protective cover plate 22. The purpose of upper protective cover plate 22 is to protect the instrumentation package assembly 11 which is below it from being crushed when a player steps on the instrumented baseball home plate.

In summary the buffer plate 12 is multi-purposed. It provides a mounting surface against which the upper protective cover plate 22 rests. It protects the instrumentation package assembly 11 from becoming misaligned relative to the portal through which cameras 35 and 36 peer out from the top surface 8 of the instrumented baseball home plate.

The instrumented baseball home plate has five sides just like the standard conventional baseball home plate. Their dimensions are identical to the dimensions of the standard conventional baseball home plate shown in FIG. 41. Side 21 is closest to the pitcher and is 17 inches long. Sides 4 and (not shown) form the apex of the instrumented baseball home plate. They are each 12.021 inches long, and join at right angles to one another at the apex of the instrumented baseball home plate.

It is not necessary to make the weight of the instrumented baseball home plate exactly identical to the weight of the conventional major league home plate shown in FIG. 41 because the instrumented baseball home plate will be immobile and anchored in the ground.

There are reasons however to make the weight of the instrumented baseball home plate approximately the same as that of the conventional major league home plate shown in FIG. 41. The first reason is so that when a player hits it, the instrumented baseball home plate will feel and react the same as the conventional major league home plate. Accordingly, the location of the center of gravity of the instrumented baseball home plate base and the conventional major league baseball home plate are both in roughly the same place. The second reason is so the field crew that maintains the playing field can handle the instrumented baseball home plate in the same way as they handle the conventional major league home plate.

The present invention contemplates the instrumented baseball home plate to be non-intrusive to the players in the game. The instrumented baseball home plate is constructed to produce substantially no audible noise that the player's may hear and be distracted by. The rubber encapsulating material absorbs the sound of the moving parts inside the instrumented baseball home plate. The sounds are made inaudible to the players who are outside the instrumented baseball home plate by sound absorption, muffling, baffling and damping methods designed into the instrumented baseball home plate.

The central body of the instrumentation package assembly 11 is essentially a cylindrical can that contains the battery pack. The bottom of the can has a removable lid. The lid can be removed in order to change out battery packs when the battery packs loose their ability to charge properly. Access to the bottom of the cylindrical can is through the circular aperture in the bottom 13 of the instrumented baseball home plate.

The z-axis 30 is the axis of symmetry of the instrumentation package assembly 11. The instrumentation package assembly 11 contains camera lenses 37 and 38, camera 35 and 36, and supporting electronics. The battery pack supplies electrical power to the entire instrumentation package assembly 11. The instrumentation package assembly 11 is essentially a short cylindrical can like a tuna fish can. It is made strong to resist being crushed. Materials such as polycarbonates, ABS and fiber reinforced plastics are used in its construction.

Induction coils 5 and 6 are located on the top and on the bottom of the instrumentation package assembly 11 central hub. The electrical induction coils 5 and 6 are used to inductively couple power into the battery pack from a power source located outside the instrumented baseball home plate. A block diagram showing the electrical battery charging circuit involving the induction coils and the battery pack is shown in FIG. 24. An induction coil which is external to the instrumented baseball home plate is a source of electrical power which inductively couples electrical current into these induction coils 5 and 6. The external induction coil is laid flat on the top of the instrumented baseball home plate coaxially above coils 5 and 6 during the battery charging process. Electrical current which is induced into the induction coils 5 and 6 is fed into the battery pack in order to charge it.

A block diagram of the instrumentation package assembly 11 electronics is shown in FIG. 23 and FIG. 24. Four antennas 25, 26, 29, and 39 are used to accomplish the wireless transmission and reception of signals between the instrumented baseball home plate and the antenna array relay junction. The same four antennas 25, 26, 29, and 39 are used by the instrumented baseball home plate to both transmit video signals to the remote base station and receive control commands back from the remote base station.

In the preferred embodiment shown, the present invention contemplates the instrumented baseball home plate to be equipped with an instrumentation package assembly 11 specified in FIG. 34A and FIG. 34B and FIG. 34C, that is mounted and encapsulated inside the instrumented baseball home plate, which is capable of wirelessly televising pictures and sounds of baseball games from its cameras 35 and 36 and its microphones 33 and 34 contained therein.

The instrumentation package assembly's can is made of polycarbonate, ABS or fiber reinforced plastic which are strong and are non-conductors of electricity. It is necessary to use a non-conducting material so as to allow the transmitted and received radio signals to radiate thru it from the antenna elements within the instrumentation package assembly 7 for the purpose of televising signals by wireless communications to and from the remote base station. The instrumentation package assembly assembly's network transceiver electronics specified in FIG. 36D and FIG. 36E, wirelessly transmits real-time pictures and sounds from the instrumentation package assembly 11 cameras 35 and 36 and microphones 33 and 34 via the antenna array elements 25, 26, 29, and 39 also known as intentional radiators, to the antenna array relay junction. The remote base station is disclosed in FIG. 59A and FIG. 59B.

As an alternative example, the antenna array 25, 26, 29, and 39 shown in the instrumentation package assembly 11 could be replaced with a helix antenna (not shown) with similar dimensions wound on the inside diameter of the instrumentation package assembly down the length of its interior skin.

A antenna array relay junction disclosed in FIG. 59A and FIG. 59B is deployed in the baseball stadium and receives radio signals from the instrumented baseball home plate's antenna array elements 25, 26, 29, and 39. Antenna array elements 25, 26, 29, and 39 are a quad array and are in quadrature to radiate radio signals to the antenna array relay junction with sufficient gain so as to overcome RF noise and provide for a large enough gain bandwidth product to accommodate real-time SD/HD picture quality requirements.

The instrumentation package assembly's network transceiver electronics also provides a wireless means for the instrumented baseball home plate to receive command and control radio signals from the remote base station. The instrumentation package assembly assembly's 11 battery pack is wirelessly inductively charged before and during games on an as needed basis, using the battery pack charging station unit disclosed in the preferred embodiment specified in FIG. 37A and FIG. 37B and FIG. 37C. The battery pack charging station is placed on the top of the instrumented baseball home plate when it is charging the battery pack. Charging of the battery pack specified in FIG. 34A and FIG. 34B and FIG. 34C is accomplished wirelessly by inductive coupling. The instrumented baseball base's two pairs of inductive pickup coils act as the secondary windings on an air core transformer. Time varying magnetic flux is furnished to the two pairs of inductive pickup coils by the primary windings of the battery pack charging station unit.

The antennas 25, 26, 29, and 39 are deployed below the upper protective cover plate 22 inside the instrumented baseball home plate. The antennas form a phased array. The radiation pattern from the phased array antennas 25, 26, 29, and 39 can be maximized to radiate and receive preferentially in the direction of the pickup antenna used by the remote base station. This reduces the noise in the transmission link.

The instrumentation package assembly 11 has a flexible corrugated bellows skin section 9. The height of the instrumentation package assembly 7 is approximately ⅓ the thickness off the instrumented baseball home plate.

The corrugated bellows segments 14 and 40 of the instrumentation package assembly 11 connects the outer portion of the instrumentation package assembly 11 containing the cameras 35 and 36 and the lenses 37 and 38 with its central body hub.

The corrugated bellows sections 14 and 40 of the instrumentation package assembly assembly's skin allow the instrumentation package assembly 11 to flex, stretch and compress when the instrumented baseball home plate is impacted. This enables the instrumentation package assembly 11 to resist shock and vibration. Additionally, the corrugated section allows the instrumentation package assembly to act as a spring and compress or expand its length without damaging its contents. When circumstances arise where the players tend to crush the instrumented baseball home plate, the instrumentation package assembly will compress or expand and take the shock without damaging or misaligning its contents.

The rubber encapsulating material 19 provides shock absorbing padding between the upper protective cover plate 22 and the instrumentation package assembly 11. A purpose of the encapsulating material is to cushion the blows to the instrumented baseball home plate that would otherwise result in damaging shock and vibration to the instrumentation package assembly 11 and its contents. The rubber encapsulating material 19 also provides protection for the instrumentation package assembly 11 from dirt, moisture and the environment.

The z-axis 30 of the instrumented baseball home plate is orthogonal to the x and y axes 15 and 2 respectively, of the instrumented baseball home plate. The microphones 33 and 34 inside the instrumented baseball home plate enable the TV audience to hear the whoosh of the air as the ball is pitched. The TV audience will hear the whoosh of air as the baseball passes above the instrumented baseball home plate. The TV audience will see the batter swing his bat, up close, to strike the baseball as it whizzes by. The TV audience will hear the rush of the air as the batter swings his bat. The TV audience will hear the loud crack of the bat as it strikes the baseball. The TV audience will see the baseball as it is hit by the bat. The TV audience will see the baseball as it travels outward from the bat onto the playing field. The TV audience will see the baseball get smaller as it gets further away from the instrumented home plate and the batter. The audience will see the batter drop the bat and scramble toward first base. The TV audience will hear the thud of the bat after the batter releases it and it hits the ground. The TV audience will hear the scraping by the batter's cleats on the ground as he scrambles to first base. The sounds received from each of the microphones by the remote base station are processed using special software to produce surround sound which is broadcast to the TV viewing audience. The TV audience will see the size of the batter grow smaller as he runs toward first base and gets further away from home plate.

Each of the microphones 33 and 34 listens for sounds from the playing field from their respective sides of the instrumented baseball home plate. The condenser microphones enable the viewing audience to hear real-time contacts, impacts and shocks to the instrumented baseball home plate. Simultaneously live TV pictures are taken by the TV camera of its respective field of view of the live action on the playing field. A block diagram showing the detailed flow of electrical signals and data in the instrumentation package assembly 11 is shown in the preferred embodiment given in FIG. 36D and FIG. 36E. The present invention contemplates the instrumented baseball home plate's battery pack being wirelessly charged by a charging station shown in FIG. 37A and FIG. 37B and FIG. 37C.

The diameter of the instrumentation package assembly 11 is kept to a minimum in order to minimize its footprint inside the instrumented baseball home plate. The dimension of the outside diameter of the instrumentation package assembly 11 (not including the four antennas) is governed largely by the physical diagonal dimension of the largest components within the instrumentation package assembly 11, like the 35 and 36 SD/HD camera's CCD sensor array, and the battery.

The battery's charging coils 5 and 6 are wound on the outside diameter of the instrumentation package assembly 11 at both top and bottom of its central hub and act electrically as a transformer's secondary winding. The coils are wound on the outside diameter of the instrumentation package assembly 11 to keep any heat they may produce away from the contents of the instrumentation package assembly 11 while the battery pack is being charged. The number of turns in each charging coil is made large enough to enable them to inductively couple a sufficient number of magnetic lines of flux from the primary coil of the battery charging station so as to charge the battery pack in a reasonably short time before games. When the charging station is placed on top 8 of the instrumented baseball home plate, the charging coils 5 and 6 receive electrical energy inductively coupled from the primary coils of the charging station, and use this energy to charge the battery pack.

The instrumented baseball home plate has two protective cover plates 22 and 23 embedded and molded into it. One protective cover plate is on the top and one is on the bottom of the instrumented baseball home plate. The body of the top protective cover plate 22 is made spherically dome shaped. The body of the bottom protective cover plate 23 is made flat and has rounded edges like the edges on the top protective plate.

The materials chosen for the protective cover plates in the present preferred embodiment are polycarbonates, ABS and fiber reinforced plastics, although a variety of other materials would function almost equally as well. These materials have an advantage in that they are lightweight and stiff, enabling its thickness to remain thin while still delivering the significant stiffness needed to perform its shielding function in the limited space it can occupy within the instrumented baseball home plate. They have the additional advantage in that they are transparent to the transmitted and received radio waves which need to move to and from the antennas inside the instrumented baseball home plate without absorption or reflection.

The instrumentation package assembly 11 is sandwiched between the top and bottom protective cover plates. The purpose of these protective cover plates is to act as a shield to protect the instrumentation package assembly 11 from being damaged during the game. During the normal course of the game, the top of the instrumented baseball home plate will be hit and crushed by the players and by their equipment. For example, the players may step on the instrumented baseball home plate or slide into it. They may even drop their bat on it. The two protective cover plates protect the instrumentation package assembly 11 within the instrumented baseball home plate from physical damage due to these hits.

Around the top, bottom and sides of the instrumented baseball home plate, the space between the top 8 and the protective cover plates 22 and 23 is filled with encapsulating material 19. When cured, this encapsulating material acts as cushioning to absorb shock and vibration to the instrumented baseball home plate. The encapsulating material 19 encapsulates the upper and lower protective cover plates 22 and 23 and maintains their positions inside the molded instrumented baseball home plate. The space between the protective cover plates and the instrumentation package assembly 11 is also filled with the same encapsulating material 19. When cured, this encapsulating material acts as cushioning to absorb shock and vibration to the instrumentation package assembly 11. The molting material 19 encapsulates the instrumentation package assembly 11 inside the instrumented baseball home plate and thereby maintains its position inside the molded instrumented baseball home plate.

The top protective cover plate 22 is flat in its central region. The purpose of making it flat is to provide maximum protection for the optical windows 20 and 7 whose surfaces are at the very top of the instrumented baseball home plate. The flat shape enables the protective cover plate 22 to surround the optical windows 20 and 7 at the top of the instrumented baseball home plate where the optical windows 20 and 7 are most likely to be exposed to the greatest threat of damage due to hits to the top of the instrumented baseball home plate. The upper protective cover plate 22 is buried in encapsulating material 19 at the center top of the instrumented baseball home plate around the optical windows 20 and 7 by approximately 1/32 inch below the outer skin. The dome shape enables the upper protective cover plate 22 to come very close to the top center of the instrumented baseball home plate where the players will have only grazing contact with its curved surface if they crash into the instrumented baseball home plate, thereby eliminating the threat of injury to the players if they hit the top of the instrumented baseball home plate. The spherical shape of the protective cover plate 22 causes its edges to be curved downward away from the top of the outer skin and places them approximately 1 inch or more below the top surface of the outer skin of the instrumented baseball home plate.

The lower protective cover plate 23 is flat and is buried in encapsulating material approximately ¼ inch or more above the bottom surface of the instrumented baseball home plate. The body of the lower protective cover plate 23 is made flat because it is buried in the ground and there is no danger of the players coming into violent contact with it. The flat shape is easier to make and less expensive to manufacture. Its thickness is also made in the range of approximately ¼ inch or more. However, its thickness is not physically restrained because of its location, as is the case with the upper protective cover plate 22.

In all cases, the edges of the protective cover plates come within no less than ¼ inches from all sides of the instrumented baseball home plate.

The instrumentation package assembly 11 carries two CCD sensor arrayed TV cameras 35 and 36 and two microphones 33 and 34. The two cameras 35 and 36 are arranged side by side and form a 3-D stereo camera pair. The two cameras 35 and 36 and their lenses 37 and 38 are separated by an interpupillary distance.

The linear distance separation of the optical axes of the two camera lenses that make up the stereo camera pair is an important function of the buffer plate. For the buffer plate, the distance measured between the axes is defined as the interpupilarly distance between the camera lenses.

We note here for reference that for modern commercial 3-dimensional cameras, the range of settings for the interpupillary distance is adjustable from 44 to 150 mm. Following the range of settings referenced for modern commercial 3-dimensional cameras, the size of the buffer plate interpupillary distance is made to accommodate an interpulilary distance range of 44 to 150 mm also. Therefore, the axial separation between each stereo pair of camera lenses can vary from 44 to 150 mm.

How far you are intending to view the pictures from requires a certain separation between the cameras. This separation is called stereo base or stereo base line and results from the ratio of the distance to the image to the distance between your eyes. The mean interpupillary distance (IPD) is 63 mm (about 2.5 inches) for humans, but varies with age, race and gender. The vast majority of adults have IPDs in the range 50-75 mm. Almost all adults are in the range 45-80 mm. The minimum IPD for children as young as five is around 40 mm.

It is understood that other alternative interpupillary distances may be used to produce other alternative 3-D effects. For example, a larger interpupillary distance will produce more striking 3-D effects. The interpupillary distance is the distance between the two axes 27 and 28. The cameras look upward along a line of sight 24 which is tilted relative to the top 8 of the instrumented baseball home plate. Both cameras 35 and 36 have a common line of sight 24. The line of sight 24 is tilted toward or away from the pitcher as shown in FIG. 48D and FIG. 49C respectively. The cameras have optical windows 20 and 7 respectively.

The instrumented baseball home plate has five sides. The top 8 of the instrumented baseball home plate sits horizontally on the baseball playing field approximately at ground level which is customary in the game of baseball. The instrumented baseball home plate is oriented in space so its z-axis 30 is perpendicular to the baseball field and pointing skyward. The side 21 of the instrumented baseball home plate faces the pitcher as is customary in the game of baseball.

The two cameras 35 and 36 are identical to each other. The two cameras 35 and 36 use the same identical extremely wide angle lenses 34 and 35. Even though the cameras 35 and 36 are pointed skyward, they can see right down to the outfield horizon because their lenses are extremely wide angle lenses each having a 180 degree field of view. The horizon appears on the bottom center of the TV picture frame to the TV viewing audience. Each of the two cameras 35 and 36 is aligned within its instrumentation package assembly 11 so that each of the cameras 35 and 36 yields a transmitted upright image of the outfield of the stadium. Both cameras 35 and 36 are aligned inside the instrumentation package assembly 11 so that the TV viewing audience sees the pitcher and the outfield's horizon near the bottom center of the picture frame. The stadium horizon appears horizontal in the picture frame at the bottom center of the picture.

The outermost body region of the top protective cover plate 22 is made substantially spherically dome shaped. There is a flat region in the middle of the upper protective cover plate 22 surrounding the clearance bores for cameras 35 and 36. The entire body of the bottom or lower protective cover plate 23 is made flat. The shape of the lower protective cover plate follows the dotted line outline shown in 23 of FIG. 49A. The top and bottom protective cover plates 22 and 23 both have rounded outer edges. The edges are rounded to insure that the baseball players will not be injured by them if the players crash into the instrumented baseball home plate.

The top protective cover plate 22 is spherically dome shaped in its outer region, and flattened in its inner region close to the optical windows 7 and 20. The purpose of making it flattened near the optical windows 7 and 20 is to provide maximum protection for the optical windows 7 and 20 whose surfaces are flush at the very top 8 of the instrumented baseball home plate. The flattened shape enables the protective cover plate 22 to surround the optical windows 7 and 20 at the top 8 of the instrumented baseball home plate where the optical windows 7 and 20 are most likely to be exposed to the greatest threat of damage due to hits to the top of the instrumented baseball home plate by the baseball players or their equipment. The upper protective cover plate 22 is buried in encapsulating material 19 at the center top of the instrumented baseball home plate around the optical windows 7 and 20. The dome shape enables the upper protective cover plate 22 to come very close to the top center of the instrumented baseball home plate where the players will have only grazing contact with its surface 8 if they crash into the instrumented baseball home plate, thereby eliminating the threat of injury to the players if they hit the top 8 of the instrumented baseball home plate.

The spherical shape of the upper protective cover plate 22 causes its edge to be rounded downward and away from the top 8 of the instrumented baseball home plate and away from the players.

The upper protective cover plate 22 protects the instrumentation package assembly 11 from being crushed and damaged by the players during the game. The instrumentation package assembly is located below the upper protective cover plate 22 inside of the instrumented baseball home plate. In order to achieve its purpose, the upper protective cover plate 22 must be stiff. The entire volume between the top 8 of the instrumented baseball home plate 4 and the upper protective cover plate 22 is filled with a resilient encapsulation padding material 19. The entire volume between the upper protective cover plate 22 and the instrumentation package assembly 11 is filled with the same resilient encapsulation padding material 19. The domed shape of the upper protective cover plate 22 is very important. It completely covers and wraps the instrumentation package assembly 11 and its radio antennas 25, 26, 27, and 28, which are below it, and diverts trauma and forces that occur to the top 8 of the instrumented baseball home plate 4 during the game away from the instrumentation package assembly 11 and its antennas 25, 26, 27, and 28. The outer edge of the upper protective cover plate 22 is bent downward and past the outermost tips of the radio antennas 25, 26, 27, and 28 to protect them. The curvature of the upper protective 22 cover plate 22 is made large enough so that the dome completely covers around them. The dome shape allows the thickness of the padding 19 between the top 8 of the instrumented baseball home plate 4 and the upper protective cover plate 22 to increase as the radial distance from the center of the instrumented home plate 4 increases outwardly.

The lower protective cover plate 23 is flat and is buried in the encapsulating material 19 just above the bottom surface 13 of the instrumented baseball home plate. The body of the lower protective cover plate 23 can be made flat because it is buried in the ground and there is no danger of the baseball players coming into violent contact with it. The flat shape is easier to make and less expensive to manufacture. It can also be made thicker than the upper protective cover plate 22 because there is more free space near the bottom of the instrumented baseball home plate that it can occupy. Its thickness is not physically restrained because of its location, as is the case with the upper protective cover plate 22 which is physically located between the top surface 8 and the buffer plate 12.

In both cases, the rounded edges of the protective cover plates 22 and 23 are substantially distant from the top 8 of the instrumented baseball home plate to protect the players from impacting against them. The top protective cover plate 22 is detailed in FIG. 55. The edge of the upper protective cover plate 22 is rounded and all sharp corners are removed so as to make it safe to the players if they press violently against the instrumented baseball home plate.

The outer body of the upper protective cover plate 22 is made spherically dome shaped. The spherical top of the dome faces upward. The upper protective cover plate 22 has two bored holes in it. The purpose of the bores is to permit the cylindrical ends of the buffer plate 12 containing the optical windows 7 and 20 to pass through them, and through the encapsulating material 19, and through the top 8 of the instrumented baseball home plate. The upper protective cover plate 22 is made flat in its inner region near to its circular bores so it can surround the optical windows 7 and 20 near the very top of the instrumented baseball home plate and shelter them from hits; while its spherical dome shape in its outer region keeps the edge of the protective cover plate 22 far down below the top of the instrumented baseball home plate and well below the surface of the playing field within the ground, so the edge would not be felt by the players if they impacted on the top surface 8 of the instrumented baseball home plate. The body of the lower protective cover plate 23 is made flat and has rounded corners like the upper protective cover plate 22 for the same reason.

The optical windows 7 and 20 permit the cameras 35 and 36 mounted inside the instrumentation package assembly 11 of the instrumented baseball home plate to look out through the top 8 of the instrumented baseball home plate onto the playing field during a baseball game and be protected from hazards such as rain, dirt and physical impacts.

The optical windows 7 and 20 are sealed to the small diameter cylindrical end of the buffer plate 12. The seals are airtight and waterproof to protect the cameras 35 and 36, lenses 37 and 38, microphones 33 and 34, and the electronics within the instrumentation package assembly 11.

The optical windows 7 and 20 are made strong to protect the camera lenses 37 and 38 and cameras 35 and 36 that are located beneath it. The optical windows 7 and 20 are hard coated by vapor deposition with materials such as MgFl or SiO2 to help prevent the outer-most optical window surfaces from being scratched during the game. The optical window material itself is chosen to be strong. It is made from hard optical glass such as barium lanthanum borate glasses, or hard optical plastic like acrylic or polycarbonate, both of which are scratch resistant.

The optical windows 7 and 20 are made small to make them inconspicuous to the players, and substantially preserve the instrumented baseball home plate's look-alike quality with the conventional major league home plate shown in FIG. 41; while still retaining sufficient clear aperture for the camera lenses 37 and 38 to see events with SD/HD resolution on the playing field in prevailing light. Typical optical windows 7 and 20 range in size from about ⅛ inch to ½ inches in diameter. Besides their small size, the optical windows 7 and 20 are made additionally inconspicuous by making their anti-reflection coatings a straw color to match the tan coloration of the ground dust around the instrumented baseball home plate.

The optical windows 7 and 20 are plane-parallel-flat. They are disposed at the intersection of the x-axis and y-axis of the instrumented baseball home plate. The optical windows 7 and 20 are positioned on the top 8 of the instrumented baseball home plate so they are aligned roughly with the chin line of the average batter, and roughly at the same location as the center of gravity of the conventional major league home plate shown in FIG. 41.

Optical windows having a spherical dome shape can also be used when a larger field of view is desired. In another preferred embodiment, the outer surface of the windows are spherical in shape and convex outward and shell-like as is necessary to permit the camera to see fields of view with extremely wide viewing angles approaching 90 degrees off the optical axis of the camera lenses. Shell-like implies that the inner and outer spherical surfaces of the optical windows are concentric. In applications where extremely wide viewing angles are not required, the optical window surfaces can be made flat and plane parallel. The shell-like windows enable the cameras to use lenses that have extremely wide viewing angles approaching 90 degrees off the optical axis of the camera lenses without introducing bothersome optical aberrations and vignetting. The shell-like shape of the windows also imparts increased physical strength to the windows. The optical windows 7 and 20 are attached to buffer plate 12. The optical windows 7 and 20 provide a portal through which cameras lenses 37 and 38 can see out onto the playing field from inside the instrumented baseball home plate. The encapsulating material 19 provides shock absorbing padding between the outer top surface 8 of the instrumented baseball home plate and the protective cover plate 22. The encapsulating material 19 provides shock absorbing padding between the protective cover plate 22 and the buffer plate 12.

Camera lenses 37 and 38 look out thru the top 8 of the instrumented baseball home plate through their respective optical windows 20 and 7 at objects angularly spread out around their common line of sight 24 and image the objects they see onto cameras 35 and 36 respectively.

A variety of different camera lens types with different lens setting capabilities can be used. When enabled by the operator in the remote base station, the auto iris setting permits the camera lenses 37 and 38 to automatically adjust for varying lighting conditions on the field. The auto focus setting permits the camera lenses 37 and 38 to adjust focus for varying distances of the players and action subjects on the field.

For example, when a baseball is hit, and a player is rounding the bases, the distance of a player from home plate may be increasing or decreasing. The cameras 35 and 36 within the instrumented baseball home plate can be independently and simultaneously commanded and controlled to auto focus on the player. As the player is rounding third base, if he decides to run for home plate, the instrumented baseball home plate's cameras 35 and 36 and microphones 33 and 34 will capture all the action. While the player is running, his pictures and sounds are being wirelessly transmitted from the instrumentation package assembly 11 inside the instrumented baseball home plate to the remote base station for processing.

If the player decides to slide into home plate, the instrumented baseball home plate cameras 35 and 36 will enable the viewing audience to see the player slide into home plate, up close. The cameras 35 and 36 will catch a detailed image of the player's sharp cleats as they strike the plate. The TV audience will experience the flight of chunks of dirt being thrown onto the plate in 3-D. The microphones 33 and 34 will enable the TV viewing audience to hear the scraping and the thud of the cleats as they hit the plate. The TV audience will hear the chunks of dirt as they hit the plate. The TV viewing audience will see the face and the hand of the umpire as he reaches down to sweep the plate. The TV audience will hear and see the bristles of the umpire's brush as he sweeps the dirt off the plate.

Cameras 35 and 36 are mounted inside the instrumentation package assembly 11. When a player is running toward the instrumented baseball home plate from third base, the cameras 35 and 36 can see where he is coming from. The cameras 35 and 36 can see the player as he runs and touches the instrumented baseball home plate. The cameras 35 and 36 can see the player as he is sliding into the instrumented baseball home plate. The TV audience will see and hear the player's cleats as they hit the instrumented baseball home plate. The cameras 35 and 36 can see the catcher as he tags the player before the player touches the instrumented baseball home plate and scores a run. From the vantage point of the instrumented baseball home plate, the viewing audience can see the strained player darting for the instrumented baseball home plate. The viewing audience can see details of the player's feet as he attempts to slide into the instrumented baseball home plate. The viewing audience can see a close-up of the opposing team's catcher's attempt to tag him with the ball. As the baseball is thrown home, the viewing audience can see the catcher reach down for it close to the plate. The cameras 35 and 36 vantage point at the instrumented baseball home plate gives the audience a viewing angle of the game never seen before by television viewing audiences. The instrumented baseball home plate's cameras 35 and 36 gives the TV viewing audience unending contemporaneous shots that get across a sense of the action of being there—like a player in the game, that prior art cameras looking on from their disadvantaged viewing points from outside the playing field cannot get across.

The top 8 of the instrumented baseball home plate sits horizontally flat on the baseball playing field. The instrumented baseball home plate is oriented in space so its z-axis 30 is perpendicular to the baseball field and pointing skyward.

In the present preferred embodiment, cameras 35 and 36 use extremely wide angle lenses 37 and 38 with zoom capability. Even though cameras 35 and 36 are pointed skyward, they can see off axis past the pitcher along y-axis 2 right down to the outfield stadium horizon because of their near 180 degree field of view. This is a distinct advantage of extremely wide angle lenses over other types of lenses. However, it should be pointed out that the cameraman may elect to use a variety of camera lens stereo 3-D pairs 37 and 38 with other capabilities depending on the visual effects he wishes to convey to the TV viewing audience. For example, the cameraman may elect to use a camera lens stereo 3-D pair 37 and 38 with a narrower field of view in order to concentrate the attention of the TV viewing audience on the batter's taut and sweaty stubble covered face.

The instrumentation package assembly 11 is supported at its upper end by a buffer plate 12. The instrumentation package assembly 11 and the buffer plate 12 are permanently encapsulated inside of the instrumented baseball home plate as the encapsulating material 19 around them cures. After the encapsulating material 19 sets, it becomes a weatherproof shock absorbing padding material 19. The small diameter end of the buffer plate 12 peers through the top 8 and upper protective cover plate 22 of the instrumented baseball home plate. The small diameter end of the buffer plate 12 is sealed and molded into the shock absorbing padding 19 around its circumference. The encapsulating material 19 is a permanent resilient compound that is air-tight and water-tight.

The buffer plate 12 is encapsulated by the encapsulating material 19 inside the instrumented baseball home plate. The mechanical axes of the bores in the buffer plate 12 are tilted relative to the top 8 of the instrumented baseball home plate. The ends of the instrumentation package assembly 11 are inserted into the bores in the buffer plate 12, thereby aligning the cameras 35 and 36, camera lenses 37 and 38, and optical windows 20 and 7 all along the common line of sight 24.

The buffer plate 12 acts as a bearing for the instrumentation package assembly 11, and thereby restricts and restrains the motion of the instrumentation package assembly 11 inside the instrumented baseball home plate. Besides functioning as a bearing to support the instrumentation package assembly 11 within the instrumented baseball home plate, the buffer plate 12 provides a hollow portal through which the cameras 35 and 36 inside the instrumentation package assembly 11 may peer out of the instrumented baseball home plate at the baseball playing field.

The instrumented baseball home plate's outward appearance looks substantially the same as the conventional professional league baseball home plate and the conventional high school league baseball home plates shown in FIG. 41; and meets the official requirements for these venues and is interchangeable with them in these venues.

The buffer plate 12 is a Type XI buffer plate and is shown in FIG. 21ZA and FIG. 21ZB and FIG. 21ZC. The buffer plate 12 is molded into the instrumented baseball home plate using the white rubber encapsulating material 19. The small diameter end of the buffer plate 12 passes through the upper protective cover plate 22 and protrudes through the molded rubber top 8 of the instrumented baseball home plate. The buffer plate carries the optical windows 7 and 20. The flat surface of optical windows 7 and 20 are tilted but roughly flush with the top 8 of the instrumented baseball home plate.

If the cameraman chooses to use spherical concentric dome shaped optical windows 7 and 20 instead of the flat ones in order to minimize the vignetting at the extreme 180 degree field of view of extremely wide angle lenses 37 and 38, then the spherical optical windows 20 and 7 will protrude above 8 by about one half the diameter of the spherical optical window.

Buffer plate 12 is shown in detail in FIG. 21. It is made from a light-weight rigid polycarbonate, ABS or fiber reinforced plastic material. It is used to prop up and position the instrumented baseball home plate's upper protective cover plate 22. The buffer plate 12 is mounted and permanently encapsulated to the inside of the instrumented baseball home plate. The top of the buffer plate 12 is covered by upper protective cover plate 22. The purpose of upper protective cover plate 22 is to protect the instrumentation package assembly 11, which is below it, from being crushed when a player steps or slides into the instrumented baseball home plate.

In summary the buffer plate 12 is multi-purposed. It provides a mounting surface against which the upper protective cover plate 22 rests. It protects the instrumentation package assembly 11 from becoming misaligned relative to the portal through which cameras 35 and 36 peer out from the top surface 8 of the instrumented baseball home plate.

The instrumented baseball home plate has five sides just like the standard conventional baseball home plate. Their dimensions are identical to the dimensions of the standard conventional baseball home plate shown in FIG. 41. Side 21 is closest to the pitcher and is 17 inches long. Sides 4 and 9 form the apex of the instrumented baseball home plate. They are each 12.021 inches long, and join at right angles to one another at the apex of the instrumented baseball home plate. The thickness of the instrumented baseball home plate is made similar to the thickness of conventional major league home plates. The typical thickness range is between 2 and 6 inches.

It is not necessary to make the weight of the instrumented baseball home plate exactly identical to the weight of the conventional major league home plate shown in FIG. 41 because the instrumented baseball home plate will be immobile and will be anchored in the ground.

There are reasons however to make the weight of the instrumented baseball home plate approximately the same as that of the conventional major league home plate shown in FIG. 41. The first reason is so that when a player hits it, the instrumented baseball home plate will feel and react the same as the conventional major league home plate.

Accordingly, the location of the center of gravity of the instrumented baseball home plate base is made to be roughly in the same place as the conventional major league baseball home plate. The second reason is so the field crew that maintains the playing field can handle the instrumented baseball home plate roughly the same way as they handle the conventional major league home plate.

The present invention contemplates the instrumented baseball home plate to be non-intrusive to the players in the game. The instrumented baseball home plate is constructed to produce substantially no audible noise that the player's may hear and be distracted by. The rubber encapsulating material absorbs the sound of the moving parts inside the instrumented baseball home plate. The sounds from inside the instrumented baseball home plate are made inaudible to the players who are outside the instrumented baseball home plate by sound absorption, muffling, baffling and damping methods designed into the instrumented baseball home plate.

The central body of the instrumentation package assembly 11 is essentially a cylindrical can and contains the battery pack. The bottom of the can has a removable lid. The lid can be removed in order to change out battery packs when the battery packs loose their ability to charge properly. Access to the bottom of the cylindrical can is through the circular aperture in the bottom 13 of the instrumented baseball home plate.

The z-axis 30 is the axis of symmetry of the instrumentation package assembly 11. The instrumentation package assembly 11 contains camera lenses 37 and 38, cameras 35 and 36, and supporting electronics. The battery pack supplies electrical power to the entire instrumentation package assembly 11. The instrumentation package assembly 11 is essentially a short cylindrical can like a tuna fish can. It is made strong to resist being crushed. Materials such as polycarbonates, ABS and fiber reinforced plastics are used in its construction.

Induction coil pairs 5 and 6 are located on the top and bottom of the instrumentation package assembly 11 central hub. The electrical induction coils 5 and 6 are used to inductively couple power into the battery pack from a power source located outside the instrumented baseball home plate. A block diagram showing the electrical battery charging circuit involving the induction coils and the battery pack is shown in FIG. 24. An induction coil which is external to the instrumented baseball home plate acts as a primary winding and is a source of electrical power which inductively couples electrical current into these induction coils 5 and 6. The external induction coil is laid flat on the top of the instrumented baseball home plate coaxially above coils 5 and 6 during the battery charging process. Electrical current which is induced into the induction coils 5 and 6 is fed into the battery pack in order to charge it.

A block diagram of the instrumentation package assembly 11 electronics is shown in FIG. 23 and FIG. 24. Four antennas 25, 26, 29 and 39 are used to accomplish the wireless transmission and reception of signals between the instrumented baseball home plate and the antenna array relay junction. The same four antennas 25, 26, 29 and 39 are used by the instrumented baseball home plate to both transmit video signals to the remote base station and receive control commands back from the remote base station.

In the preferred embodiment shown, the present invention contemplates the instrumented baseball home plate to be equipped with an instrumentation package assembly 11 that is mounted and encapsulated inside the instrumented baseball home plate, which is capable of wirelessly televising pictures and sounds of baseball games from its cameras 35 and 36 and its microphones 33 and 34 contained therein.

The instrumentation package assembly's 11 can is made of polycarbonate, ABS or fiber reinforced plastic which are strong and are non-conductors of electricity. It is necessary to use a non-conducting material so as to allow the transmitted and received radio signals to radiate thru it from the antenna elements 25, 26, 29 and 39 within the instrumentation package assembly 11 for the purpose of televising signals by wireless communications to and from the remote base station. The instrumentation package assembly assembly's network transceiver electronics wirelessly transmits real-time pictures and sounds from the instrumentation package assembly 11 cameras and microphones via the quad antenna array elements 25, 26, 29 and 39 also known as intentional radiators, to the antenna array relay junction. The remote base station is disclosed in FIG. 59A and FIG. 59B.

In an alternative preferred embodiment, the antenna array 25, 26, 29 and 39 shown in the instrumentation package assembly 11, is replaced with a helix antenna (not shown) with similar dimensions wound on the inside diameter of the instrumentation package assembly.

A antenna array relay junction disclosed in FIG. 59A and FIG. 59B is deployed in the baseball stadium and receives radio signals from the instrumented baseball home plate's antenna array elements 25, 26, 29 and 39. Antenna array elements 25, 26, 29 and 39 are in quadrature to radiate radio signals to the antenna array relay junction with sufficient gain so as to overcome RF noise and provide for a large enough gain bandwidth product to accommodate real-time SD/HD picture quality requirements.

The instrumentation package assembly's network transceiver electronics also provides a wireless means for the instrumented baseball home plate to receive command and control radio signals from the remote base station. The instrumentation package assembly's 11 battery pack is wirelessly inductively charged before and during games on an as needed basis, using the battery pack charging station unit disclosed in the preferred embodiment shown in FIG. 37A and FIG. 37B and FIG. 37C. The battery pack charging station unit is placed on the top of the instrumented baseball home plate when it is charging the battery pack. Charging of the battery pack shown in the instrumentation package assembly specified in FIG. 34A and FIG. 34B and FIG. 34C is accomplished wirelessly by inductive coupling. The instrumented baseball home plate's two pairs of inductive pickup coils act as the secondary windings of an air core transformer. Time varying magnetic flux is furnished to the two pairs of inductive pickup coils by the primary windings of the battery pack charging station unit.

The antennas 25, 26, 29 and 39 are deployed below the upper protective cover plate 22 inside the instrumented baseball home plate. The antennas form a phased array. The radiation pattern from the phased array antennas 25, 26, 29 and 39 can be maximized to radiate and receive preferentially in the direction of the pickup antenna used by the remote base station. This reduces the noise in the transmission link.

The instrumentation package assembly 11 has two flexible corrugated bellows skin sections like 14 and 40. The height of the instrumentation package assembly 11 is approximately ⅓ the thickness off the instrumented baseball home plate.

The two corrugated bellows segments like 14 and 40 of the instrumentation package assembly 11 connect the outer portion of the instrumentation package assembly 11 with its central body hub.

The two corrugated sections like 14 and 40 of the instrumentation package assembly 11 allows the instrumentation package assembly 11 to flex, stretch and compress when the instrumented baseball home plate is impacted. This enables the instrumentation package assembly 11 to resist shock and vibration. Additionally, the two corrugated sections allow the instrumentation package assembly 11 to act as a spring and compress or expand its length without damaging its contents. When circumstances arise where the players tend to crush the instrumented baseball home plate, the instrumentation package assembly will compress or expand and take the shock without damaging or misaligning its contents.

The rubber encapsulating material 19 provides shock absorbing padding between the upper protective cover plate 22 and the instrumentation package assembly 11. A purpose of the encapsulating material is to cushion the blows to the instrumented baseball home plate that would otherwise result in damaging shock and vibration to the instrumentation package assembly 11 and its contents. The rubber encapsulating material 19 also provides protection for the instrumentation package assembly 11 from dirt, moisture and the environment.

The z-axis 30 of the instrumented baseball home plate is orthogonal to the x and y axes 15 and 2 respectively, of the instrumented baseball home plate.

Each of the microphones 33 and 34 listens for sounds from their respective sides of the instrumented baseball home plate. The condenser microphones enable the viewing audience to hear real-time contacts, impacts and shocks to the instrumented baseball home plate. Microphones 33 and 34 enable the TV audience to hear sounds that result from air or any physical contacts or vibrations to the instrumented baseball home plate; like for example, the crash of a player sliding into the instrumented baseball home plate. The sounds received from each of the microphones by the remote base station are processed using special software to produce surround sound which is broadcast to the TV viewing audience.

Microphone 43 protrudes through a hole in the top of the instrumented baseball home plate.

Microphone 43 is connected by cable 45 to electrical connector 44. 44 is connected to the electronics in the instrumentation package assembly 18.

Microphone 43 enables the TV audience to hear sounds that occur on the baseball playing field.

Microphone 43 enables the TV audience to hear the whoosh of air as a pitched baseball passes above the instrumented baseball home plate.

Simultaneously live 3D TV pictures are taken by the TV cameras 35 and 36 of their respective field of views of the live action on the playing field. Cameras 35 and 36 will enable the TV audience to see a right or left handed batter swing his bat, up close, to strike the baseball as it whizzes bye above the instrumented baseball home plate. Microphone 43 enables the TV audience to hear sounds like the rush of the air as the batter swings his bat. The TV audience will hear the loud high fidelity crack of the bat as it strikes the baseball. The TV audience will see the baseball come toward them from the pitcher's hand as if the audience themselves were standing at the plate. The TV audience will see a close-up of the baseball right in front of them the moment it is hit by the bat. It will seem to the audience like they themselves hit the baseball. This will be an action packed event never before witnessed by a TV audience. Some members of the TV audience will flinch as the baseball is pitched near to them. Each of the pitched baseballs will produce breath taking excitement and expectations by the TV viewing audience. The TV audience will see the baseball as it travels outward from the bat onto the playing field. The TV audience will see the baseball get smaller as it gets further away from the instrumented baseball home plate and the batter. The audience will see and hear the batter drop his bat and scramble toward first base. The TV audience will hear the thud of the bat after the batter releases it and it hits the ground. The TV audience will hear the scraping by the batter's cleats on the ground as he scrambles to first base. The TV audience will see the size of the batter grow smaller as he runs toward first base and gets further away from home plate. In summary, the instrumented baseball home plate provides video and sound to the viewing audience that is so exciting and realistic that it makes the individual members of the audience feel that they are at bat and in the game. In many ways this is more exciting than viewing the game in person from the stands of the baseball stadium.

A block diagram showing the detailed flow of electrical signals and data in the instrumentation package assembly 11 is shown in the preferred embodiment given in FIG. 36D and FIG. 36E. The present invention contemplates the instrumented baseball home plate's battery pack being wirelessly charged by a charging station shown in FIG. 37A and FIG. 37B and FIG. 37C.

The diameter of the instrumentation package assembly 11 is kept to a minimum in order to minimize its footprint inside the instrumented baseball home plate. The dimension of the outside diameter of the instrumentation package assembly 11 (not including the four antennas) is governed largely by the physical diagonal dimension of the largest components within the instrumentation package assembly 11, like the SD/HD camera's CCD sensor array and the battery pack.

The battery's charging coil pairs 5 and 6 are wound on the outside diameter of the instrumentation package assembly 11 at both the top and bottom of its central hub and act electrically as a transformer's secondary windings. The coils are wound on the outside diameter of the instrumentation package assembly 11 to keep any heat they may produce away from the contents of the instrumentation package assembly 11 while the battery pack is being charged. The number of turns in each charging coil pair 5 and 6 is made large enough to enable them to inductively couple a sufficient number of magnetic lines of flux from the primary coil of the battery charging station so as to charge the battery pack in a reasonably short time before games. When the charging station is placed on top 8 of the instrumented baseball home plate, the charging coil pairs 5 and 6 receive electrical energy inductively coupled from the primary coils of the charging station, and use this energy to charge the battery pack.

In a further preferred embodiment, the present invention referring to FIG. 49A and FIG. 49B contemplates an instrumented baseball home plate, which when stationed off of any baseball playing field i.e. at the traditional home plate location in the pitcher's bullpen can wirelessly and autonomously televise baseball pitching practice and warm-up sessions under command and control of the remote base station. The remote base station is disclosed in FIG. 59A and FIG. 59B and FIG. 60A and FIG. 60B and FIG. 61A and FIG. 61B. In addition to adding an element to the entertainment of the TV viewing audience, the embodiment serves to aid the pitchers and the pitching coaches in evaluating the quality of the pitcher's progress, prowess, fitness and "stuff".

The instrumented baseball home plate is an example of a static instrumented sports paraphernalia. For televising games from off the playing field, for example in the pitcher's bullpen, refer to FIG. 64C which is a top view of a general sports stadium that has been configured and equipped for use with both static and dynamic instrumented sports paraphernalia, using both bi-directional wireless radio wave communication links and/or bi-directional fiber optics cable/copper cable communication links.

The cameraman, in the remote base station, software selects either the wireless mode of communication, and/or the fiber optics/copper cable mode of communication between each of the instrumented baseball home plates and the remote base station. The cameraman can use whichever equipment (antenna array relay junction or fiber optics cable/copper cable) is installed in the stadium with which to command and control his choice and communicate it to the instrumented baseball home plates on the stadium playing field. These choices are also physically switch selectable by the cameraman with his access through the opening in the bottom of the instrumented baseball home plates. Refer to FIG. 59A and FIG. 59B, and FIG. 60A and FIG. 60B, and FIG. 61A and FIG. 61B, and FIG. 64A and FIG. 64B and FIG. 64C for disclosures regarding the remote base station and the antenna array relay junction.

The cameraman selects items from a software menu of control commands that go to the network transceiver at the remote base station that are subsequently transmitted to the instrumented baseball home plates for the purpose of adjusting various system initializations, operating parameters, radio frequency, polling system status data such as battery condition, and initiating remote mechanical adjustments such as camera focus, optical zoom, iris and movement to the cameras' field of view, etc over the selected bi-directional communications link i.e. wireless radio, fiber optics or copper cable connectivity being used within the particular sports stadium.

These commands, when intercepted by the network transceiver within the instrumented baseball home plates are applied to its microprocessor, which then in turn upon executing the instructions stored within the contents of its firmware applies a pulse coded control signal via the power and control interconnect interface inside the instrumentation package to the corresponding electronics i.e. the mechanical actuators that provides optical focus and/or zoom adjustment of the cameras and microphone gain and selection, etc as desired by the cameraman and/or special software running on the computer at the remote base station. The power and control interconnect interface as shown in FIG. 33E (item 21), which is represented by dotted lines, consists of the electrical control wiring to and from the electronic components of the instrumented baseball home plates that are being controlled.

Referring to the Preferred Embodiments Specified in FIG. 48A and FIG. 48B and FIG. 48C and FIG. 48D, the Instrumented Baseball Home Plate Satisfies all of the Following Objectives:

It is an objective of the present invention to instrument a baseball home plate composed of an instrumentation package assembly, buffer plate assembly, encapsulation cushioning material, upper protective cover plate, and lower protective cover plate. It is an objective of the present invention to instrument the pitcher's bullpen with an instrumented baseball base. It is an objective of the present invention to provide the TV viewing audience with 3-D stereo pictures and stereophonic sound.

FIG. 50A and FIG. 50B

The detailed physical elements disclosed in the instrumented baseball base drawings shown in FIG. 50A and FIG. 50B are identified as follows: 1 is the optical and mechanical axis of the camera 69. 2 is an induction coil for charging the battery pack. 3 is the mechanical y-axis of symmetry of the instrumented baseball base. 4 is the small cylindrical outside diameter end of the buffer plate 9. 5 is the optical and mechanical axis of the camera 11. 6 is the plane-parallel-flat optical window mounted on and sealed to the small cylindrical diameter end of the buffer plate. 7 is the small cylindrical outside diameter end of the buffer plate. 8 is the camera lens for camera 11. 9 is the body of the Type X buffer plate. 10 is the side of the instrumented baseball base. 11 is a camera paired for 3-D with camera 69. 12 is the cylindrical skin of the instrumentation package assembly element containing camera 11. 13 is the corrugated bellows segment of an instrumentation package assembly element. 14 is the side of the instrumented baseball base. 15 is the central body of the instrumentation package assembly. 16 is the corrugated bellows segment of an instrumentation package assembly element. 17 is the camera. 18 is the camera lens. 19 is the shock-proofing baseball base padding. 20 is the small cylindrical outside diameter end of the buffer plate 27. 21 is the optical and mechanical axis of the camera 17. 22 is plane-parallel-flat optical window mounted on and sealed to the small cylindrical diameter end of the buffer plate. 23 is the small cylindrical outside diameter end of the buffer plate. 24 is the optical and mechanical axis of the camera 26. 25 is the camera lens of camera 26. 26 is a camera paired for 3-D with camera 17. 27 is the body of the Type X buffer plate. 28 is the corrugated bellows segment of the instrumentation package assembly element. 29 is the central body of the instrumentation package assembly. 30 is the corrugated bellows segment of the instrumentation package assembly element, 31 is the shock-proofing baseball base padding. 32 is the body of the Type X buffer plate. 33 is a camera paired for 3-D with camera 43. 34 is the camera lens for camera 33. 35 is the optical and mechanical axis of the camera 33. 36 is the plane-parallel-flat optical window mounted on and sealed to the small cylindrical diameter end of the buffer plate. 37 is the small cylindrical outside diameter end of the buffer plate 32. 38 is the mechanical axis of symmetry of the Type X buffer plate. 39 is the small cylindrical outside diameter end of the buffer plate. 40 is plane-parallel-flat optical window mounted on and sealed to the small cylindrical diameter end of the buffer plate. 41 is the optical and mechanical axis of the camera 43. 42 is the camera lens of camera 43. 43 is a camera paired for 3-D with camera 33. 44 is the corrugated bellows segment of an instrumentation package assembly element. 45 is the shock-proofing baseball base padding. 46 is the central body of the instrumentation package assembly. 47 is the corrugated bellows segment of an instrumentation package assembly element. 48 is a camera paired for 3-D with camera 61. 49 is the body of the Type X buffer plate. 50 is the small cylindrical outside diameter end of the buffer plate 49. 51 is the plane-parallel-flat optical window mounted on and sealed to the small cylindrical diameter end of the buffer plate. 52 is the optical and mechanical axis of the camera 48. 53 is the camera lens for camera 48. 54 is the mechanical x-axis of symmetry of the instrumented baseball base and instrumentation package assembly. 55 is the cylindrical wall of the central body of the instrumentation package assembly. 56 is the small cylindrical outside diameter end of the buffer plate. 57 is the optical and mechanical axis of the camera 61. 58 is plane-parallel-flat optical window mounted on and sealed to the small cylindrical diameter end of the buffer plate. 59 is the camera lens of camera 61. 60 is the side of the baseball base. 61 is a camera paired for 3-D with camera 48. 62 is the cylindrical segment of an instrumentation package assembly element. 63 is the corrugated bellows segment of an instrumentation package assembly element. 64 is the central body of the instrumentation package assembly. 65 is an induction coil for charging the battery pack. 66 is the corrugated bellows segment of an instrumentation package assembly element. 67 is the cylindrical skin of the camera 69 instrumentation package assembly element. 68 is the shock-proofing baseball base padding. 69 is a camera paired for 3-D with camera 11. 70 is the camera lens. 71 is the plane-parallel-flat optical window mounted on and sealed to the small cylindrical diameter end of the buffer plate. 72 is the plane-parallel-flat optical window mounted on and sealed to the small cylindrical diameter end of the buffer plate. 73 (blank). 74 is the intersection of the x and y and z axes of symmetry of the instrumented baseball base. 75 is the optical and mechanical z-axis of camera 33. 76 is an induction coil for charging the battery pack. 77 is the z-axis of symmetry of the buffer plate 32. 78 is the z-axis of camera 43. 79 is the bottom surface of the instrumented baseball base. 80 is the lower protective cover plate. 81 is the upper protective cover plate. 82 is the optical axis of the tilted 3-D stereo camera pair comprised of cameras 17 and 26. 83 is the optical axis of the tilted 3-D stereo camera pair comprised of cameras 46 and 61. 84 is the fiber optics/copper cable connector. 85 is the open aperture in the bottom of the instrumented baseball base. 86 is the open aperture in the lower protective cover plate. 87 is the bottom access lid heat sink of the instrumentation package assembly. 88 is the radio antenna. 89 is a microphone. 90 is a microphone. 91 is a microphone. 92 is a microphone. 93 is a gas valve.

FIG. 50A is a top view of an eight tilted camera instrumented baseball base.

FIG. 50B is a side view of an eight tilted camera instrumented baseball base.

Referring to drawings FIG. 50A and FIG. 50B, in the preferred embodiment, the present invention contemplates an instrumented baseball base, which when stationed on any baseball playing field at any or all of the traditional 1$^{st}$, 2$^{nd}$ and 3$^{rd}$ base locations can wirelessly and autonomously televise baseball games under the command and control of the remote base station. The remote base station is disclosed in FIG. 59A and FIG. 59B and FIG. 60A and FIG. 60B and FIG. 61A and FIG. 61B.

Referring to the preferred embodiments disclosed in FIG. 60A and FIG. 60B, and FIG. 61A and FIG. 61B the baseball stadium is also equipped with bi-directional multi-function fiber optic cable communication links to televise baseball games from sports paraphernalia i.e. 1$^{st}$, 2$^{nd}$, 3$^{rd}$ bases to a remote base station. The instrumentation package assembly 15 has bi-directional multi-function fiber optic cable/copper cable connectivity with the remote base station via these cables. The fiber optics cable/copper cable, which is run beneath the ground of the baseball stadium playing field, enters the bottom of the instrumented baseball base through the base's access opening 86. The fiber optic/copper cable's connector is connected to its mating instrumentation package assembly 15 connector 84 in the bottom of the instrumented baseball bases. The instrumentation package assembly connector 84 is wired to the instrumentation package assembly electronics.

The remote base station is disclosed in FIG. 59A and FIG. 59B and FIG. 60A and FIG. 60B and FIG. 61A and FIG. 61B.

The instrumented baseball base shown in FIG. 50A and FIG. 50B and the embodiment disclosed in FIG. 47A and FIG. 47B both are equipped to use both a fiber optics/copper cable transmission link and/or a radio transmission link between the instrumented baseball base and the remote base station.

The preferred embodiment specifying the radio transmission link is disclosed in FIG. 59A and FIG. 59B.

The instrumented baseball base is instrumented with the instrumentation package assembly disclosed in FIG. 43E and FIG. 43F.

The instrumentation package assembly is shown mounted in the buffer plate assembly in FIG. 43C and FIG. 43D. Details of instrumentation package assembly elements are shown in FIG. 36A and FIG. 36B and FIG. 36C.

The fiber optics/copper cable transmission link is disclosed in the preferred embodiment shown in FIG. 60A and FIG. 60B. The fiber optics/copper cable transmission link is also disclosed in another preferred embodiment shown in FIG. 61A and FIG. 61B.

Each one of the eight cameras 69, 11, 17, 26, 33, 43, 48 and 61 is housed in each of the eight instrumentation package assembly elements 67, 12, 16, 28, 30, 44, 47 and 62 of which there are eight instrumentation package assembly elements in the instrumentation package assembly. Details of each of the eight instrumentation package assembly elements which are principal parts of the instrumentation package assembly are shown in FIG. 36A and FIG. 36B and FIG. 36C.

It is understood that as the state of the art in TV camera technology advances, that there will be other better TV cameras that use other than CCD technology. The present invention will work equally well with them as they become available. Therefore, the present invention uses CCD TV cameras as an example of TV cameras that may be used simply because they are the best that today's technology offers, and is not confined only to their sole use in the future.

Each of the instrumentation package assembly elements 67, 13, 16, 28, 30, 44, 47 and 62 are identical. The instrumentation package assembly elements are disclosed in FIG. 36A and FIG. 36B and FIG. 36C.

The instrumented baseball base's cover is substantially the same canvas material/or other synthetic material as used in conventional baseball bases. 10 is the top of the instrumented baseball base and is covered with the canvas cover. 10 is shown flat in FIG. 50A and FIG. 50B. In another preferred embodiment, the top 10 of the instrumented baseball base is rounded and domed shaped as it is on many of the current baseball bases on baseball stadium playing fields. The optical windows peer out from the sides of the base through clearance holes in the base's cover.

Beneath the cover of the instrumented baseball base is its interior. The interior of the instrumented baseball base is filled with a soft encapsulating material 19, 31, 45 and 68 like synthetic foam. The encapsulating material 19, 31, 45 and 68 serves to hold the instrumentation package assembly hub and instrumentation package assembly elements aligned in their places, and also acts as shock absorbing padding to the instrumentation package assembly hub and instrumentation package assembly elements which it encapsulates.

Even though the two cameras of a 3-D stereo camera pair are always made identical to one another, and the two camera lenses of the 3-D stereo camera pair are always made identical to one another, the cameraman may choose the two identical camera lenses of one of the 3-D stereo camera pairs to be different from the two identical camera lenses of another 3-D stereo camera pair. The cameraman can choose all eight camera lenses to be identical to one another if he wishes. The cameraman can even choose all of four 3-D stereo camera lens pairs to be different from one another. The cameraman makes these choices based on the art, venue, entertainment value of each choice, and wanting to get different 3-D effects from each of the 3-D stereo camera pairs for the enjoyment and awe of the TV viewing audience.

In another preferred embodiment (not shown in a separate drawing), the shape of the top 10 of the instrumented baseball base is rounded downward and domed shaped as it is on many of the current baseball bases on baseball stadium playing fields. For example, some colleges use honeycombed solid plastic bases that are rounded and domed shaped and tapered. The upper protective cover plate 81 just beneath the top of the base is also rounded downward and domed shaped. Domed shaped protective cover plates shown in FIG. 55A and FIG. 55B and FIG. 55C, and FIG. 56A and FIG. 56B and FIG. 56C, FIG. 57A and FIG. 57B and FIG. 57C, and FIG. 58A and FIG. 58B and FIG. 58C are used. The space between the top of the base and the top of the upper protective cover plate is filled with encapsulation padding. The upper protective cover plate 81 is shaped congruent with the top 10.

Beneath the cover of the instrumented baseball base is its interior. The interior of the instrumented baseball base is filled with a soft encapsulating material 19, 31, 45 and 68 like synthetic foam. The encapsulating material 19, 31, 45 and 68 serves to hold the instrumentation package assembly hub and instrumentation package assembly elements aligned in their places, and also acts as shock absorbing padding to the instrumentation package assembly hub and instrumentation package assembly elements which it encapsulates.

The cameraman in the remote base station software selects either the wireless mode of communication, and/or the fiber optics/copper cable mode of communication between each of the instrumented baseball bases and the remote base station. The cameraman can use whichever equipment (antenna arrays or fiber optics cable/copper cable) is installed in the baseball stadium with which to command and control his choice and communicate it to the instrumented baseball bases on the baseball stadium playing field. These choices are also physically switch selectable by the cameraman with access through the opening in the bottom of the instrumented baseball bases.

The cameraman selects items from a software menu of control commands that go to the network transceiver at the remote base station that are subsequently transmitted to the instrumented sports paraphernalia for the purpose of adjusting various system initializations, operating parameters, radio frequency, polling system status data such as battery condition, and initiating remote mechanical adjustments such as camera focus, optical zoom, iris and movement to the cameras' field of view, etc over the selected bi-directional communications link i.e. wireless radio, fiber optics or copper cable connectivity being used within the particular sports stadium.

These commands, when intercepted by the network transceiver within the instrumented sports paraphernalia are applied to its microprocessor, which then in turn upon executing the instructions stored within the contents of its firmware applies a pulse coded control signal via the power and control interconnect interface inside the instrumentation package to the corresponding electronics i.e. the mechanical actuators that provides optical focus and/or zoom adjustment of the cameras and microphone gain and selection, etc as desired by the cameraman and/or special software running on the computer at the remote base station. The power and control interconnect interface as shown in FIG. 36D (item 21), which is represented by dotted lines, consists of the electrical control wiring to and from the electronic components of the instrumented sports paraphernalia that are being controlled.

Referring to the Preferred Embodiments Specified in FIG. 50A and FIG. 50B, the Instrumented Baseball Base Satisfies all of the Following Objectives:

It is an objective of the present invention that the instrumented baseball base be composed of an eight camera instrumentation package assembly, four buffer plate assemblies, encapsulation shock-proofing padding, upper protective cover plate, canvas cover and lower protective cover plate. It is an objective of the present invention that the instrumented baseball base be equipped with four 3-D stereo camera pairs. It is an objective of the present invention that the instrumented baseball base is equipped with four 3-D stereo camera pairs, where each pair looks out of its respective side of the instrumented baseball base onto the playing field. It is an objective of the present invention to enable the cameraman to set the tilt angle of the 3-D cameras of the instrumentation package assembly so that their line of sight is angled above the ground level of the baseball playing field. It is an objective of the present invention to enable the cameraman in the remote base station to software select either the wireless mode of communication, and/or the fiber optics/copper cable mode of communication between the instrumented baseball bases and the remote base station by sending a control signal to the baseball base. It is an objective of the present invention to enable the cameraman to select either the wireless mode of communication, and/or the fiber optics/copper cable mode of communication between the instrumented baseball bases and the remote base station by physically setting a switch in the bottom of the instrumented baseball base with access through the bottom of the instrumented baseball base. It is an objective of the present invention that the instrumented baseball base has a top, and an upper protective cover plate, that are both flat and rounded downward near their edges and where the upper protective cover plate is spaced just beneath the top of the base. It is an objective of the present invention that the instrumented baseball base has a top, and an upper protective cover plate, that is both congruent and rounded downward and domed shaped where the upper protective cover plate is spaced just beneath the top of the base. It is an objective of the present invention to fill the volume of the instrumented baseball base beneath its cover in its interior with a soft encapsulating material like synthetic foam to hold all the contents of the instrumented baseball base aligned in their places, and act as a shock absorbing padding for the instrumentation package assembly hub, instrumentation package assembly elements, buffer plate assemblies, upper protective cover plate, and lower protective cover plate.

FIG. 51A and FIG. 51B and FIG. 51C and FIG. 51D

The detailed physical elements disclosed in the instrumented baseball home plate drawings shown in FIG. 51A and FIG. 51B and FIG. 51C and FIG. 51D are identified as follows: 1 (not shown). 2 is the axis of symmetry of the instrumented baseball home plate. 3 is the y-axis of the instrumentation package assembly containing camera 36. 4 is the side of the instrumented baseball home plate. 5 is the induction coil used to charge the battery pack inside the instrumentation package assembly. 6 is the induction coil used to charge the battery pack inside the instrumentation package assembly. 7 is the plane-parallel-flat optical window. 8 is the left side of the instrumented baseball home plate. 9 (item not shown), 10 is the side 8 of the instrumented baseball home plate. 11 is the central hub of the instrumentation package assembly containing the battery pack. 12 is the Type XI buffer plate. 13 is the bottom of the instrumented baseball home plate. 14 is the bellows segment of the instrumentation package assembly. 15 is the y-axis of symmetry of the instrumented baseball plate. 16 is the bottom of the instrumentation package assembly. 17 is the interior of the instrumentation package assembly. 18 is the top of the instrumentation package assembly. 19 is the top of the instrumented baseball home plate. 20 is the plane-parallel-flat optical window. 21 is the side of the instrumented baseball plate that faces the pitcher. 22 is the upper protective cover plate. 23 is the lower protective cover plate. 24 is the optical axis direction of cameras 35 and 36 after they are tilted together. 25 is the top protective plate. 26 is the bottom protective plate. 27 is the z-axis of the camera whose optical window is 20. 28 is the z-axis of the camera whose optical window is 7. 29 is a wireless radio antenna. 30 is the z-axis of the instrumentation package assembly and the instrumented baseball home plate. 31 is the open aperture in the bottom of the instrumented baseball home plate. 32 is the fiber optics/copper cable connector in the bottom of the instrumentation package assembly. 33 is a microphone. 34 is a microphone. 35 is a camera. 36 is a camera. 37 is a camera lens. 38 is a camera lens. 39 is a wireless radio antenna element. 40 is the bellows segment of the instrumentation package assembly. 41 is a wireless radio antenna element. 42 is an access lid heat sink. 43 is the gas valve. 44 is the battery pack. 45 is the right side of the instrumented baseball home plate. 46 is the microphone. 47 is the microphone cable. 48 is the microphone connector.

FIG. 51A is the top view of a two tilted camera instrumented baseball home plate.

FIG. 51B is the side view of a two tilted camera instrumented baseball home plate.

FIG. 51C is a side view of a two tilted camera instrumented baseball home plate.

FIG. 51D is a side view of a two tilted camera instrumented baseball home plate.

Referring to drawings FIG. 51A and FIG. 51B and FIG. 51C and FIG. 51D, in a preferred embodiment, the present invention contemplates an instrumented baseball home plate, which when stationed on any baseball playing field at any traditional home plate location, can both wirelessly and/or by using fiber optics/copper cable connectivity, autonomously televise baseball games under the command and control of the remote base station. The remote base station is disclosed in FIG. 59A and FIG. 59B and FIG. 60A and FIG. 60B and FIG. 61A and FIG. 61B.

The only substantial difference between the instrumented baseball home plate shown in FIG. 51A and FIG. 51B and FIG. 51C and FIG. 51D and the one shown in FIG. 49A and FIG. 49B and FIG. 49C and FIG. 49D, is that the instrumented baseball home plate in FIG. 51A and FIG. 51B and FIG. 51C and FIG. 51D is equipped to use both a fiber optics cable/copper cable transmission link and/or a radio transmission link between the instrumented baseball home plate and the remote base station, whereas the instrumented baseball home plate in FIG. 49A and FIG. 49B and FIG. 49C is equipped to use a radio transmission link only between the instrumented baseball home plate and the remote base station.

The preferred embodiment specifying the fiber optics/copper cable transmission link is disclosed in FIG. 60A and FIG. 60B and FIG. 61A and FIG. 61B.

The preferred embodiment specifying the radio transmission link is disclosed in FIG. 59A and FIG. 59B.

The instrumented baseball home plate is instrumented with the instrumentation package assembly disclosed in FIG. 34A and FIG. 34C. Details of instrumentation package assembly elements are shown in FIG. 33D.

As with the previous preferred embodiment shown in FIG. 49A and FIG. 49B and FIG. 49C and FIG. 49D, the present preferred embodiment shown in FIG. 51A and FIG. 51B and FIG. 51C and FIG. 51D provides the TV viewing audience with 3-D stereo pictures and stereophonic sound.

The fiber optics/copper cable transmission link is disclosed in the preferred embodiment shown in FIG. 60A and FIG. 60B. The fiber optics/copper cable transmission link is also disclosed in another preferred embodiment shown in FIG. 61A and FIG. 61B.

Using identical components, another preferred embodiment can just as easily be constructed with the cameras (along with its lens and buffer plate) tilted away from and toward the batter respectively.

The instrumented baseball home plate employs a two camera instrumentation package assembly substantially identical to the instrumentation package assembly shown in FIG. 34A and FIG. 34B and FIG. 34C. It uses the Type XI buffer plate assembly shown in FIG. 21ZA and FIG. 21ZB and FIG. 21ZC. Details of the instrumentation package assembly elements are shown in FIG. 33D.

It is understood that as the state of the art in TV camera technology advances, that there will be other better TV cameras that use other than CCD technology. The present invention will work equally well with them as they become available. Therefore, the present invention uses CCD TV cameras as an example of TV cameras that may be used simply because they are the best that today's technology offers, and is not confined only to their sole use in the future.

Referring to the disclosed instrumented baseball home plate shown in FIG. 51A and FIG. 51B and FIG. 51C and FIG. 51D, the instrumented baseball home plate has one instrumentation package assembly 11 mounted inside the instrumented baseball home plate. Details of instrumentation package assembly are shown in FIG. 11. Except for the optical windows, the outer appearance of both the instrumented baseball home plate and the conventional baseball home plate shown in FIG. 41 are identical, both being made of the same white rubber material 19 having the same size, shape, color and texture. Consequently both have nearly the same identical appearance as seen by the player's.

The instrumentation package assembly 11 carries two CCD sensor arrayed cameras 35 and 36 and two microphones 33 and 34. The two cameras 35 and 36 are arranged side by side and form a 3-D stereo camera pair. The two cameras 35 and 36 are separated by a interpupillary distance.

The linear distance separation of the optical axes of the two camera lenses that make up the stereo camera pair is an important function of the buffer plate. For the buffer plate, the distance measured between the axes is defined as the interpupilarly distance between the camera lenses.

We note here for reference that for modern commercial 3-dimensional cameras, the range of settings for the interpupillary distance is adjustable from 44 to 150 mm. Following the range of settings referenced for modern commercial 3-dimensional cameras, the size of the buffer plate interpupillary distance is made to accommodate an interpulilary distance range of 44 to 150 mm also. Therefore, the axial separation between each stereo pair of camera lenses can vary from 44 to 150 mm.

How far you are intending to view the pictures from requires a certain separation between the cameras. This separation is called stereo base or stereo base line and results from the ratio of the distance to the image to the distance between your eyes. The mean interpupillary distance (IPD) is 63 mm (about 2.5 inches) for humans, but varies with age, race and gender. The vast majority of adults have IPDs in the range 50-75 mm. Almost all adults are in the range 45-80 mm. The minimum IPD for children as young as five is around 40 mm.

It is understood that other alternative interpupillary distances may be used to produce other alternative 3-D effects. For example, larger interpupillary distance will produce more striking 3-D effects.

The two cameras 35 and 36 that form the 3-D stereo camera pair 35 and 36 have optical windows 7 and 20. The interpupillary distance is the distance between the two camera's 35 and 36 optical axes. The cameras 35 and 36 that form the 3-D stereo camera pair 35 and 36 look upward from the top of the instrumented baseball home plate along their common line of sight 24 which is tilted relative to the normal 30 to the top 8 of the instrumented baseball home plate.

The instrumented baseball home plate has five sides. As is customary in the game of baseball, side 21 faces the pitcher. The top 8 of the instrumented baseball home plate sits horizontally on the baseball playing field, and is made level with the playing field as is customary. The bottom 13 of the instrumented baseball home plate is buried underneath the ground.

The instrumented baseball home plate is oriented in space so its z-axis 30 is perpendicular to the baseball field. The z-axis 30 is perpendicular to the top 8 of the instrumented baseball home plate. The line of sight 24 of the two cameras 35 and 36 that form the 3-D stereo camera pair is tilted relative to the z-axis 30. In FIG. 49C the line of sight 24 is tilted toward the catcher.

In FIG. 49D the line of sight 24 is tilted toward the pitcher.

The two cameras 35 and 36 that form the 3-D stereo camera pair 35 and 36 are identical to each other. The two cameras 35 and 36 use the same identical lenses 37 and 38. In the present preferred embodiment these lenses 37 and 38 are extremely wide angle lenses. These lenses have nearly 180 degree fields of view. It is noted that in other preferred embodiments, other lens types can be employed with other fields of view. An advantage of the extremely wide angle lenses is that even though the cameras are pointed skyward, they can see right down to the outfield horizon which is at the edge of their fields of view. The view that the TV audience will get is similar to the view that you would get if you were laying flat on your back on the playing field, with your head on the instrumented baseball home plate, and your feet facing the pitcher. Your right eye would be closest to side 33 of the instrumented home plate, and your left eye would be closest to side 10 of the instrumented home plate; and each of your two eyes would be analogous to the two cameras inside the instrumented baseball base. For the present invention we herein define side 33 as the right hand side of the instrumented baseball home plate, and side 10 as the left hand side of the instrumented home plate.

The two cameras 35 and 36 that form the 3-D stereo camera pair have optical windows 7 and 20. The two cameras 35 and 36 that form the 3-D stereo camera pair have the same line of sight 24. The two cameras 35 and 36 that form the 3-D stereo camera pair have optical windows 7 and 20. The line of sight 24 of the 3-D stereo camera pair is tilted relative to axes 27 and 28. Axes 27 and 28 are perpendicular to the top 19 of the instrumented baseball home plate. The interpupillary distance is the distance between 27 and 28 which is the distance between the optical axes of camera lenses 37 and 38. The line of sight 24 of the cameras 35 and 36 that form the 3-D stereo camera pair is tilted away from the vertical. The line of sight 24 of the cameras 35 and 36 that form the 3-D stereo camera pair is tilted away from the vertical and toward the catcher in FIG. 49C. The line of sight of the cameras 35 and 36 that form the 3-D stereo camera pair is tilted away from the vertical and toward the pitcher in FIG. 49D.

The instrumented baseball home plate has five sides. As is customary in the game of baseball, 21 is the side of the baseball home plate that faces the pitcher. The top of the home plate sits horizontally on the baseball playing field. The optical axes of the two cameras 35 and 36 are parallel to each other and are tilted relative to the top 19 of the instrumented baseball home plate. The instrumented baseball home plate is oriented in space so its z-axis 30 is perpendicular to the surface of the baseball field and pointing skyward.

The two cameras 35 and 36 are identical to each other. The two cameras 35 and 36 use the same two identical extremely wide angle lenses 37 and 38. At times, in order to produce more dramatic shots of the pitcher during the game, the cameraman may want to pre-orchestrate the positioning of the 3-D camera's line of sight 24 before the baseball game begins. This can be accomplished by pre-tilting, and encapsulating in-place, the 3-D cameras 35 and 36 inside the instrumented baseball home plate in advance of the game when the field is being prepared before the game. The 3-D stereo camera's line of sight 24 shown in FIG. 49D is tilted toward the pitcher in order to raise the image of the pitcher above the lower edge of the TV picture frame and produce a larger picture of the pitcher. This produces the dramatic effect of making the pitcher seem closer to the TV viewing audience.

The 3-D stereo camera pair's 35 and 36 line of sight 24 shown in FIG. 49C is tilted away from the pitcher and toward the catcher in order to lower the image of the catcher from the upper edge of the TV picture frame to bring him closer to the center of the TV picture frame and produce a larger picture of the catcher. This produces the dramatic effect of making the catcher and his mitt seem closer to the TV viewing audience. If the batter swings at a pitch and misses, the TV viewing audience will see up-close the baseball hit the crater in the catcher's mitt as it is being caught. The TV viewing audience will hear a loud crack as the baseball slaps the catcher's leather mitt.

Each of the two cameras 35 and 36 comprising the 3-D stereo camera pair is aligned within the instrumentation package assembly 11 so that each of the cameras 35 and 36 yields wirelessly transmitted upright images of objects that appear between the center and the bottom of the TV picture frame. Both cameras 35 and 36 are aligned inside the instrumentation package assembly so that the TV viewing audience sees the distant stadium horizon in the outfield towards the bottom of the TV picture frame. The distant stadium horizon that is behind the pitcher appears horizontal in the picture frame at the bottom of the picture frame. The pitcher appears to be standing upright just above the bottom center of the picture frame.

When the pitcher throws the baseball to the catcher, the TV audience will see the baseball approaching the center of the TV picture from the bottom center of the picture. The size of the baseball grows larger as it gets closer to the instrumented home plate and the batter. Since the cameras are directly below the batter, an image of the batter's chin will occupy the center of the TV picture. The size of the baseball will appear to be at its biggest as it passes directly over the instrumented baseball home plate. The TV audience will hear the whoosh of air in microphones 33 and 34 as the baseball passes over the instrumented home plate. The TV audience will see the batter swing his bat, up close, to strike the baseball as it whizzes by. The TV audience will hear the rush and whiz of the air in microphones 33 and 34 as the batter swings his bat. The sounds received from each of the microphones by the remote base station are processed using special software to produce surround sound which is broadcast to the TV viewing audience. The TV audience will hear the loud crack and explosion of the bat as it strikes the baseball. The TV audience will see the baseball up-close as it is hit by the bat. The TV audience will see the baseball as it travels outward from the bat onto the playing field. The TV audience will see the baseball get smaller as it gets further away from the instrumented home plate.

The audience will see the batter drop the bat and scramble toward first base on the right hand side of the screen. The TV audience will hear the thud of the bat in microphones 33 and 34 after the batter drops it and it hits the ground. The TV audience will hear the rustle and scraping of the batter's cleats on the ground in microphones 33 and 34 as he scrambles to first base. The TV audience will see the size of the batter grow smaller as he scampers toward first base into the distance. In summary, the instrumented baseball home plate provides video and sound to the viewing audience that is so exciting and realistic that it makes the individual members of the audience feel that they are at bat and in the game. In many ways this is more exciting than viewing the game in person from the stands of the baseball stadium. Therefore, the instrumented baseball home plate not only provides a step forward in entertainment, but it also provides a great training tool to prospective baseball players by giving them the true life visual and auditory sensations and feelings of being at the plate without actually being there.

The instrumented baseball home plate is symmetrical about its y-axis 2. The instrumented baseball home plate has five sides. Only sides 4, 10, 21, and 32 are shown in the figures. The top 6 of the instrumented baseball home plate sits horizontally on the baseball playing field. The line of sight 24 of the camera's 35 and 36 is shown in FIG. 48C and FIG. 48D. The z-axis 30 of the instrumented baseball home plate is perpendicular to the top 8 of the instrumented baseball home plate, and is oriented in space so it is perpendicular to the baseball field and pointing skyward. The line of sight 24 of camera's 35 and 36 is tilted toward the pitcher in FIG. 48D. The line of sight 24 of the camera's 35 and 36 is tilted toward the catcher in FIG. 48C.

The camera's 35 and 36 look out of the top 8 of the instrumented baseball home plate, along their respective line of sight 24. The camera 35 and 36 are aligned within their instrumentation package assembly 11 so that the camera's 35 and 36 yield a wirelessly transmitted upright image to the TV viewing audience of objects in the center of the field of view. The two holes in the top 8 of the instrumented baseball home plate are made just large enough to prevent vignetting of the cameras field of view.

Camera's 35 and 36 are mounted inside the instrumentation package assembly 11. The line of sight 24 of camera's 35 and 36 are tilted relative to the top 8 of the instrumented baseball home plate. In FIG. 48D, the tilt arrangement shown permits camera's 35 and 36 to look more toward the pitcher from out of the top 8 of the instrumented baseball home plate. This brings the image of the pitcher closer to the center of the TV picture frame and makes him look closer and larger. Utilization of an extremely wide angle lenses 37 and 38 allow the TV viewing audience to see past the pitcher and down past the horizon of the baseball stadium outfield.

In FIG. 49C, the tilt arrangement shown permits the camera's 35 and 36 to look more toward the catcher from out of the top 8 of the instrumented baseball home plate. This brings the image of the catcher closer to the center of the TV picture frame and makes him look closer and larger. Utilization of extremely wide angle lenses 37 and 38 allows the TV viewing audience to see past the catcher and down past the horizon of the baseball stadium behind the catcher.

Tilting of the 3-D stereo camera pair 35 and 36 line of sight 24 is accomplished by using the bellows sections 14 and 40 of the instrumentation package assembly 11. The bellows sections 14 and 40 are flexible. The bellows sections 14 and 40, which connect the buffer plate assembly 12 to the instrumentation package assembly 11, is bent to the desired tilt angle for the camera's 35 and 36 line of sight 24. After the desired tilt angle is set by bending the bellows sections 14 and 40, all the components inside the instrumented baseball home plate are encapsulated in place using the rubber encapsulating compound 19. The tilted line of sight 24 is common for camera's 35 and 36, lenses 37 and 38, optical window's 20 and 7, and buffer plate 12.

Keeping in mind that the line of sight 24 is common for camera's 35 and 36, lenses 37 and 38, optical window's 20 and 7, and buffer plate 12 for FIG. 49C and for FIG. 49D, it follows from the specification discussed above that the line of sight 24 of camera's 35 and 36, lenses 37 and 38, optical window's 20 and 7, and buffer plate 12 can be tilted in a like manner, towards or away from the batter as well, by bending the bellows sections 14 and 40 as before. Tilting 24 towards the batter would bring the image of the batter closer to the center of the TV picture frame and make him look closer and larger. Tilting 24 away from the batter would move the image of the batter away from the center of the TV picture frame and make him look further away and smaller Utilization of extremely wide angle lenses 37 and 38 allows the TV viewing audience to see down past the batter and down past the horizon of the baseball stadium behind the batter.

When a player is running toward the instrumented baseball home plate from third base, the 3-D stereo camera pair 35 and 36 can see where he is coming from. The cameras 35 and 36 can see the player as he runs and touches the instrumented baseball home plate. The cameras 35 and 36 can see the player as he is sliding into the instrumented baseball home plate. The TV audience will see and hear the player's cleats as they hit the instrumented baseball home plate. The cameras 35 and 36 can see the catcher as he tags the player before the player touches the instrumented baseball home plate and scores a run. From the vantage point of the instrumented baseball home plate, the viewing audience can see the strained player darting for the instrumented baseball home plate. The viewing audience can see details of the player's feet as he attempts to slide into the instrumented baseball home plate. The viewing audience can see a close-up of the opposing team's catcher's attempt to tag him with the ball. As the baseball is thrown home, the viewing audience can see the catcher reach down for it close to the plate. The camera's 35 and 36 vantage point at the instrumented baseball home plate gives the audience a viewing angle of the game never seen before by television viewing audiences. The instrumented baseball home plate's cameras 35 and 36 gives the TV viewing audience unending contemporaneous shots that get across a sense of the action of being there—like a player in the game that prior art cameras looking on from their disadvantaged viewing points from outside the playing field cannot get across.

The top 8 of the instrumented baseball home plate sits horizontally flat on the baseball playing field. The common line of sight 24 of the cameras 35 and 36 is tilted with respect to the z-axis 30 of the instrumented baseball home plate. Z-Axis 30 is perpendicular to the top 8 of the instrumented baseball home plate. The instrumented baseball home plate is oriented in space so its z-axis 30 is perpendicular to the surface of the baseball field and pointing skyward.

The cameras 35 and 36 look outward from the top 8 of the instrumented baseball home plate along and around their common line of sight 24 through optical windows 20 and 7. The cameras 35 and 36 are aligned within the instrumentation package assembly 11 so that the cameras 35 and 36 yield a wirelessly transmitted upright image of objects appearing between the center and the bottom of the TV picture frame via wireless radio antennas 25, 26, 29 and 39.

In the present preferred embodiment, cameras 35 and 36 use common extremely wide angle lenses 37 and 38 with zoom capability. Even though cameras 35 and 36 are pointed outward from the top 8 of the instrumented baseball home plate, they can see past the pitcher along y-axis 2 right down to the outfield stadium horizon because of their near 180 degree field of view. This is a distinct advantage of extremely wide angle lenses over other types of lenses. However, it should be pointed out that the cameraman may elect to use a variety of other camera lens pairs 37 and 38 with different capabilities depending on the visual effects he wishes to convey to the TV viewing audience. For example, the cameraman may elect to use a camera lens pair 37 and 38 with a narrower field of view in order to concentrate the attention of the TV viewing audience on the batter's taut and sweaty stubble filled face.

The instrumentation package assembly 11 is supported at its upper end by a buffer plate 12. The instrumentation package assembly 11 and the buffer plate 12 are permanently encapsulated inside of the instrumented baseball home plate as the encapsulating material 19 around them cures. After the encapsulating material 19 sets, it becomes a weatherproof shock absorbing padding material 19. The small diameter end of the buffer plate 12 peers through the top 8 and upper protective cover plate 22 of the instrumented baseball home plate. The small diameter end of the buffer plate 12 is sealed and molded into the shock absorbing padding 19 around its circumference. The encapsulating material 19 is a permanent resilient compound that is air-tight and water-tight.

The buffer plate 12 is encapsulated by the encapsulating material 19 inside the instrumented baseball home plate. Synthetic rubber is an example of encapsulating material that is used. The mechanical axes of the bores in the buffer plate are tilted to the top 8 of the instrumented baseball home plate so that they have a common line of sight 24. The ends of the instrumentation package assembly 11 are inserted into the bores in the buffer plate 12, thereby tilting the mechanical axis of the end of instrumentation package assembly 11 to the top 8 of the instrumented baseball home plate.

The buffer plate 12 acts as a bearing for the instrumentation package assembly 11, and thereby restricts and restrains the motion of the instrumentation package assembly 7 inside the instrumented baseball home plate. Besides functioning as a bearing to support the instrumentation package assembly 11 within the instrumented baseball home plate, the buffer plate provides a hollow portal through which the cameras 35 and 36 inside the instrumentation package assembly 11 may peer out of the instrumented baseball home plate at the baseball playing field along line of sight 24.

The instrumented baseball home plate's outward appearance looks substantially the same as the conventional professional league baseball home plate and the conventional high school league baseball home plate, and meets the official requirements for these venues and is interchangeable with them in these venues.

The buffer plate 12 is a Type XI buffer plate and is shown in FIG. 21ZA and FIG. 21ZB and FIG. 21ZC. The buffer plate 12 is molded into the instrumented baseball home plate using the white rubber encapsulating material 19. The small diameter end of the buffer plate 12 passes through the upper cover protective cover plate 22 and protrudes through the molded rubber top 8 of the instrumented baseball home plate. The buffer plate carries the optical windows 20 and 7. The optical windows 20 and 7 tilt with the buffer plate 12. The flat surfaces of optical windows 20 and 7 are tilted and relatively flush with the top 8 of the instrumented baseball home plate.

The cameras 35 and 36 are aligned together within the instrumentation package assembly 11 so that they yield wirelessly transmitted upright 3-D images of objects that appear between the center and bottom of the TV picture frame. This can be accomplished in any one of two different modes. Each of these two modes conveys its own spectacular viewing angle of the game to the TV viewing audience. Each of these two modes is achieved by physically rotating the cameras 35 and 36 and their lenses 37 and 38 about their optical axes respectively by using an actuating device that is mechanically coupled to the cameras 35 and 36 and lenses 37 and 38 inside the instrumentation package assembly 11. The mechanical actuating device has two stops that are mechanically detented 180 degrees apart from one another. The mechanical actuating device is housed within the camera's instrumentation package assembly 11. The mechanical actuating device can rotate the cameras 35 and 36 and lenses 37 and 38 together to any one of the two stops about their optical axes respectively. The cameraman in the remote base station selects which of the two modes is to be employed, and sends a signal to the instrumentation package assembly 11 to set the cameras 35 and 36 and lenses 37 and 38 to the desired mode he selected.

In the first mode, the cameras 35 and 36 and lenses 37 and 38 are aligned in rotation about their optical axes respectively inside its instrumentation package assembly 11 by the mechanical actuating device so that the TV viewing audience sees the stadium horizon in the outfield near the bottom edge of the 3-D TV picture frame. (This is equivalent to what a person would see visually if he were laying flat down on the playing field with his head resting on the instrumented baseball home plate and looking upward with his feet facing the pitcher.) The stadium outfield horizon appears horizontal in the picture frame at the very bottom center of the TV picture frame. The pitcher appears to be standing upright on his mound just above the bottom center of the picture. When the pitcher throws the baseball to the catcher, the TV audience will see the baseball approaching the center of the TV picture frame from above the bottom center of the picture frame. The size of the baseball grows larger as it gets closer to the instrumented baseball home plate and the batter. Since the cameras 35 and 36 are physically located below the batter inside the instrumented baseball home plate, an image of the underside of batter's chin and sweaty arm pits will occupy the left center of the TV picture frame.

The batter appears standing upright in the picture frame with his head near the left center and his feet at the left side of the SD/HD letterbox 3-D TV picture frame. When the pitcher throws the baseball to the catcher, the TV audience will see the baseball approaching the center of the TV picture frame from the image of the pitcher's hand which is near the bottom center of the picture frame. The size of the baseball grows larger as it gets closer to the instrumented baseball home plate and the batter. Since cameras 35 and 36 are below the batter, an 3-D image of the underside of batter's chin and sweaty arm pits will be near the center left of the TV picture. The microphones 33 and 34 will enable the TV audience to hear the whoosh 35 and 36 of air as the baseball passes above the instrumented baseball home plate. Cameras 34 and 35 will enable the TV audience to see the batter swing his bat, up close, to strike the baseball as it whizzes by above the instrumented baseball home plate. The microphones 33 and 34 will enable the TV audience to hear the rush of the air as he swings his bat. The TV audience will hear the loud crack of the bat as it strikes the baseball. The TV audience will see the baseball the moment it is hit by the bat. This will be an action packed event never before witnessed by a TV audience. Each of the pitched baseballs will produce breath taking excitement and expectations by the TV viewing audience.

Cameras 35 and 36 will enable the TV audience to see the baseball as it travels outward from the crack of the bat onto the playing field. The TV audience will see the baseball get smaller as it gets further away from the instrumented home plate and the batter. The image of the baseball will move away from near the center of the TV picture frame after it is hit. The audience will see the batter drop the bat and scramble toward first base which is on the right side of center in the TV picture frame. The image of the bat will grow in size and appear to the TV viewing audience as though it was going to hit them in the face as it is dropped and careens down onto and strikes the instrumented baseball home plate. Members of the TV viewing audience will duck to avoid being hit by the bat. The TV audience will hear the thud of the bat after the batter releases it and it hits the instrumented baseball home plate. The microphones 33 and 34 will enable the TV audience to hear the scraping by the batter's cleats on the ground as he scrambles to first base. The TV audience will see the size of the batter grow smaller as he runs toward first base and gets further from home plate.

In the second mode, the cameras 35 and 36 and lenses 37 and 38 are aligned in rotation inside its instrumentation package assembly 11 by the mechanical actuating device so that the TV viewing audience sees the catcher squatting upright with his feet near the bottom of the TV picture frame. (This is equivalent to what a person would see visually if he were laying flat down on the playing field with his head resting on the instrumented baseball home plate and looking upward with his feet facing the catcher at the apex of the instrumented baseball home plate). The stadium horizon appears horizontal at the top of the TV picture frame. The pitcher appears to be standing on his mound near the top of the TV picture frame. When the pitcher throws the baseball to the catcher, the TV audience will see the baseball approaching the center of the TV picture frame from the image of the pitcher's hand which is top of center of the TV picture frame. The size of the baseball grows larger as it gets closer to the instrumented baseball home plate and the batter. Since the camera is below the batter, an image of the underside of batter's chin and sweaty arm pits will occupy the center right of the TV picture frame. The TV audience will hear the whoosh of air as the baseball passes above the instrumented baseball home plate. The TV audience will see the batter swing his bat, up close, to strike the baseball as it whizzes by. The TV audience will hear the rush of the air as the batter swings his bat. The TV audience will hear the loud crack of the bat as it strikes the baseball. The TV audience will see the baseball the moment it is hit by the bat. This will be an action packed event never before witnessed by a TV audience. Each of the pitched baseballs will produce breath taking excitement and expectations by the TV viewing audience. The TV audience will see the baseball as it travels outward from the crack of the bat onto the playing field. The TV audience will see the baseball get smaller as it gets further away from the instrumented home plate and the batter. The image of the baseball will move from the center of the TV picture frame after it is hit. The audience will see the batter drop the bat and scramble toward first base. The image of the bat will grow in size and appear to the TV viewing audience as though it was going to hit them in the face as it careens down onto and strikes the instrumented baseball home plate. Members of the TV viewing audience will duck to avoid being hit by the bat. The TV audience will hear the thud of the bat after the batter releases it and it hits the instrumented baseball home plate. The TV audience will hear the scraping by the batter's cleats on the ground as he scrambles to first base. The TV audience will see the size of the batter grow smaller as he runs toward first base and gets further from home plate.

Each of the two cameras 35 and 36 is arranged within its instrumentation package assembly 11 so that each of the cameras 35 and 36 yields a fiber optics/copper cable transmitted upright 3-D image of objects appearing between the center and the bottom of the TV picture frame. Both cameras 35 and 36 are aligned the instrumentation package assembly 11 so that the TV viewing audience sees the pitcher standing on the pitcher's mound near the bottom center of the TV picture frame. Also, the stadium's outfield appears horizontal in the TV picture frame across the bottom of the frame. The pitcher appears to be standing upright on his mound just above the bottom center of the picture. When the pitcher throws the baseball to the catcher, the TV audience will see the baseball approaching the center of the TV picture from the bottom center of the picture.

Since the TV picture that the TV audience sees is in 3-D, the TV audience will duck their heads as the size of the baseball grows larger as it gets closer to the instrumented baseball home plate and the batter. Since the cameras are directly below the batter and looking upward, an image of the batter's chin will occupy the center of the TV picture. The TV audience will see the baseball as it passes between the batter's chin and the top of the instrumented baseball home plate. The TV audience will hear the loud whoosh of air as the baseball passes above the instrumented baseball home plate and below the batter's chin. The TV audience will move their heads to avoid being hit (figuratively speaking) by the ball. The TV audience will see the batter swing his bat up close, to strike the baseball as it whizzes by. The TV audience will hear the rush of the air as he swings his bat. The TV audience will hear the loud crack of the bat as it strikes the baseball. The TV audience will see the baseball as it is hit by the bat. The TV audience will see the baseball as it travels outward from the bat onto the playing field. The TV audience will see the baseball get smaller as it gets further away from the instrumented baseball home plate. The audience will see the batter drop his bat and scramble toward first base. The TV audience will hear the thud of the bat hit the ground after the batter drops it. The TV audience will hear the scraping by the batter's cleats on the ground as the batter scrambles to first base. The TV audience will see the numbers on the batter's back and see his size grow smaller as he scampers toward first base. In summary, the instrumented baseball home plate gives the TV viewing audience pictures and sounds of the game that are so exciting and realistic that it makes them feel that they themselves are in the game at bat.

The instrumented baseball home plate has two protective cover plates 22 and 23 embedded and molded into it. One protective cover plate 22 is on the top and one is on the bottom of the instrumented baseball home plate. The outer body of the top protective cover plate 22 is made spherically dome shaped. The entire body of the bottom protective cover plate 23 is made flat and has rounded edges like the edges on the top protective plate 22.

The materials chosen for the protective cover plates 22 and 23 in the present preferred embodiment are polycarbonates, ABS, or fiber reinforced plastics. Although a variety of other materials would function almost equally as well, these have an advantage in that they are lightweight and stiff, enabling the thickness of the protective cover plates 22 and 23 to remain thin while still delivering the significant stiffness needed to perform their mechanical shielding function in the limited space they can occupy within the instrumented baseball home plate. These materials have an additional advantage in that they are transparent to the transmitted and received radio waves which need to move to and from the antennas inside the instrumented baseball home plate without absorption or reflection.

The instrumentation package assembly 11 is sandwiched between the top and bottom protective cover plates. The purpose of these protective cover plates 22 and 23 is to act as a shield to protect the instrumentation package assembly 11 from being damaged during the game. During the normal course of the game, the top of the instrumented baseball home plate will be hit and crushed by the players and by their equipment. For example, the players may step on the instrumented baseball home plate or slide into it. They may even drop their bat on it. The two protective cover plates 22 and 23 protect the instrumentation package assembly 11 within the instrumented baseball home plate from physical damage due to these hits.

Around the top, bottom and sides of the instrumented baseball home plate, the space between the outer covering and the protective cover plates 22 and 23 is filled with white rubber encapsulating material 19. When cured, this encapsulating material 19 acts as cushioning to absorb shock and vibration to the instrumented baseball home plate. The molting material 19 encapsulates the upper and lower protective cover plates 22 and 23 and maintains their positions inside the molded instrumented baseball home plate. The space between the protective cover plates 22 and 23 and the instrumentation package assembly 11 is also filled with the same encapsulating material 19. When cured, this encapsulating material 19 acts as cushioning to absorb shock and vibration to the instrumentation package assembly 11. The molting material 19 encapsulates the instrumentation package assembly 11 inside the instrumented baseball home plate and thereby maintains its position inside the molded instrumented baseball home plate.

The top protective cover plate 22 is spherically dome shaped in its outer region. The purpose of making it spherically dome shaped is to provide maximum protection for the optical windows 20 and 7 whose surfaces are at the very top of the instrumented baseball home plate. The upper protective cover plate is flat in its inner region close to the optical windows 20 and 7. The flat shape enables the upper protective cover plate 22 to surround the optical windows 20 and 7 at the top 8 of the instrumented baseball home plate where the optical windows 20 and 7 are most likely to be exposed to the greatest threat of damage due to hits to the top 8 of the instrumented baseball home plate. The upper protective cover plate 22 is buried in molding material 19 at the center top 8 of the instrumented baseball home plate around the optical windows 20 and 7 by approximately 1/32 to 1/8 inch below the top 8. The dome shape enables the upper protective cover plate 22 to come very close to the top 8 center of the instrumented baseball home plate where the players will have only grazing contact with its curved surface if they crash into the instrumented baseball home plate, thereby eliminating the threat of injury to the players if they hit the top of the instrumented baseball home plate. The spherical shape of the protective cover plate 22 causes its edges to be curved downward away from the top of the outer skin and places them approximately over 1 inch below the top surface 8 of the instrumented baseball home plate.

The upper protective cover plate 22 protects the instrumentation package assembly 11 from being crushed and damaged by the players during the game. The instrumentation package assembly is located below the upper protective cover plate 18 inside of the instrumented baseball home plate. In order to achieve its purpose, the upper protective cover plate 18 must be stiff. The entire volume between the top 8 of the instrumented baseball home plate 4 and the upper protective cover plate 22 is filled with a resilient encapsulation padding material 19. The entire volume between the upper protective cover plate 22 and the instrumentation package assembly 11 is filled with the same resilient encapsulation padding material 19. The domed shape of the upper protective cover plate 22 is very important. It completely covers and wraps the instrumentation package assembly 11 and its radio antennas 25, 26, 27, and 28, which are below it, and diverts trauma and forces that occur to the top 8 of the instrumented baseball home plate 4 during the game away from the instrumentation package assembly 11 and its antennas 25, 26, 27, and 28. The outer edge of the upper protective cover plate 22 is bent downward and past the outermost tips of the radio antennas 25, 26, 27, and 28 to protect them. The curvature of the upper protective 18 cover plate 18 is made large enough so that the dome completely covers around them. The dome shape allows the thickness of the padding 19 between the top 8 of the instrumented baseball home plate 4 and the upper protective cover plate 18 to increase as the radial distance from the center 13 of the instrumented home plate 4 increases outwardly.

The lower protective cover plate 23 is entirely flat and is buried in encapsulating material 19 approximately ¼ inch or more above the bottom surface of the instrumented baseball home plate. The body of the lower protective cover plate 23 is made flat because it is buried in the ground and there is no danger of the players coming into violent contact with it. The flat shape is easier to make and less expensive to manufacture. Its thickness is also made in the range of approximately ⅛ to ½ inches. However, its thickness is not physically restrained because of its location, as is the case with the upper protective cover plate 22. In all cases, the edges of the protective cover plates 22 and 23 come within no less than ¼ inches from all sides of the instrumented baseball home plate.

Each of the microphones 33 and 34 listens for sounds from their respective sides of the instrumented baseball home plate. The condenser microphones enable the viewing audience to hear real-time contacts, impacts and shocks to the instrumented baseball home plate. Microphones 33 and 34 enable the TV audience to hear sounds that result from air or any physical contacts or vibrations to the instrumented baseball home plate; like for example, the crash of a player sliding into the instrumented baseball home plate.

Microphone 46 protrudes through a hole in the top of the instrumented baseball home plate.

Microphone 46 is mounted through a hole in the upper protective cover plate. Microphone 46 is connected by cable 47 to electrical connector 48. 48 is connected to the electronics in the instrumentation package assembly 18. Microphone 46 enables the TV audience to hear sounds that occur on the baseball playing field. Microphone 46 enables the TV audience to hear the whoosh of air as a pitched baseball passes above the instrumented baseball home plate.

Simultaneously live 3D TV pictures are taken by the TV cameras 35 and 36 of their respective field of views of the live action on the playing field. Cameras 35 and 36 will enable the TV audience to see a right or left handed batter swing his bat, up close, to strike the baseball as it whizzes bye above the instrumented baseball home plate. Microphone 46 enables the TV audience to hear sounds like the rush of the air as the batter swings his bat. The TV audience will hear the loud high fidelity crack of the bat as it strikes the baseball. The TV audience will see the baseball come toward them from the pitcher's hand as if the audience themselves were standing at the plate. The TV audience will see a close-up of the baseball right in front of them the moment it is hit by the bat. It will seem to the audience like they themselves hit the baseball. This will be an action packed event never before witnessed by a TV audience. Some members of the TV audience will flinch as the baseball is pitched near to them. Each of the pitched baseballs will produce breath taking excitement and expectations by the TV viewing audience. The TV audience will see the baseball as it travels outward from the bat onto the playing field. The TV audience will see the baseball get smaller as it gets further away from the instrumented baseball home plate and the batter. The audience will see and hear the batter drop his bat and scramble toward first base. The TV audience will hear the thud of the bat after the batter releases it and it hits the ground. The TV audience will hear the scraping by the batter's cleats on the ground as he scrambles to first base. The TV audience will see the size of the batter grow smaller as he runs toward first base and gets further away from home plate. In summary, the instrumented baseball home plate provides video and sound to the viewing audience that is so exciting and realistic that it makes the individual members of the audience feel that they are at bat and in the game. In many ways this is more exciting than viewing the game in person from the stands of the baseball stadium.

In a further preferred embodiment, the present invention referring to FIG. 51A and FIG. 51B contemplates an instrumented baseball home plate, which when stationed off of any baseball playing field i.e. at the traditional home plate location in the pitcher's bullpen can wirelessly and autonomously televise baseball pitching practice and warm-up sessions under command and control of the remote base station. The remote base station is disclosed in FIG. 59A and FIG. 59B and FIG. 60A and FIG. 60B and FIG. 61A and FIG. 61B. In addition to adding an element to the entertainment of the TV viewing audience, the embodiment serves to aid the pitchers and the pitching coaches in evaluating the quality of the pitcher's progress, prowess, fitness and "stuff".

The instrumented baseball home plate is an example of a static instrumented sports paraphernalia. For televising games from off the playing field, for example in the pitcher's bullpen, refer to FIG. 64C which is a top view of a general sports stadium that has been configured and equipped for use with both static and dynamic instrumented sports paraphernalia, using both bi-directional wireless radio wave communication links and/or bi-directional fiber optics/copper cable communication links.

The cameraman, in the remote base station, software selects either the wireless mode of communication, and/or the fiber optics/copper cable mode of communication between each of the instrumented baseball home plates and the remote base station. The cameraman can use whichever equipment (antenna array relay junction or fiber optics cable/copper cable) is installed in the stadium with which to command and control his choice and communicate it to the instrumented baseball home plates on the stadium playing field. These choices are also physically switch selectable by the cameraman with his access through the opening in the bottom of the instrumented baseball home plates. Refer to FIG. 59A and FIG. 59B, and FIG. 60A and FIG. 60B, and FIG. 61A and FIG. 61B, and FIG. 64A and FIG. 64B and FIG. 64C for disclosures regarding the remote base station and the antenna array relay junction.

The cameraman selects items from a software menu of control commands that go to the network transceiver at the remote base station that are subsequently transmitted to the instrumented baseball home plates for the purpose of adjusting various system initializations, operating parameters, radio frequency, polling system status data such as battery condition, and initiating remote mechanical adjustments such as camera focus, optical zoom, iris and movement to the cameras' field of view, etc over the selected bi-directional communications link i.e. wireless radio, fiber optics or copper cable connectivity being used within the particular sports stadium. These commands, when intercepted by the network transceiver within the instrumented baseball home plates are applied to its microprocessor, which then in turn upon executing the instructions stored within the contents of its firmware applies a pulse coded control signal via the power and control interconnect interface inside the instrumentation package to the corresponding electronics i.e. the mechanical actuators that provides optical focus and/or zoom adjustment of the cameras and microphone gain and selection, etc as desired by the cameraman and/or special software running on the computer at the remote base station. The power and control interconnect interface as shown in FIG. 33E (item 21), which is represented by dotted lines, consists of the electrical control wiring to and from the electronic components of the instrumented baseball home plates that are being controlled.

Referring to the Preferred Embodiments Specified in FIG. 51A and FIG. 51B and FIG. 51C and FIG. 51D; the Instrumented Baseball Home Plate Satisfies all of the Following Objectives:

It is an objective of the present invention to instrument a baseball home plate composed of an instrumentation package assembly, buffer plate assembly, encapsulation cushioning material, upper protective cover plate, and lower protective cover plate. It is an objective of the present invention to instrument the pitcher's bullpen with an instrumented baseball home plate. It is an objective of the present invention to enable an instrumented baseball home plate, which when stationed on any baseball playing field at any traditional home plate location, can both wirelessly and/or by using fiber optics/copper cable connectivity, and autonomously televise baseball games under the command and control of a remote base station. The remote base station is disclosed in FIG. 59A and FIG. 59B and FIG. 60A and FIG. 60B and FIG. 61A and FIG. 61B. It is an objective of the present invention to enable the cameraman in a remote base station to select either the wireless mode of communication and/or the fiber optics/copper cable mode of communication for the instrumented baseball home plate. The cameraman can use whichever equipment (antenna arrays or fiber optics cable/copper cable) is installed in the baseball stadium with which to command and control his choice and communicate it to the instrumented baseball home plate on the baseball stadium playing field. These choices are also physically switch selectable with access from inside through the bottom of the instrumented baseball home plate.

FIG. 52A and FIG. 52B

The detailed physical elements disclosed in the instrumented baseball home plate drawings shown in FIG. 52A and FIG. 52B are identified as follows: 1 is the y-axis of the instrumentation package assembly containing camera 35. 2 is the axis of symmetry of the instrumented baseball home plate. 3 is the y-axis of the instrumentation package assembly containing camera 36. 4 is the instrumented baseball home plate. 5 is the upper and lower induction coil pair used to charge the battery pack inside the instrumentation package assembly. 6 is the upper and lower induction coil pair used to charge the battery pack inside the instrumentation package assembly. 7 is the plane-parallel-flat optical window. 8 is the top of the instrumented baseball home plate. 9 is the side of the instrumented baseball home plate. 10 is the side that faces the pitcher. 11 is the instrumentation package assembly. 12 is the Type XI buffer plate. 13 is the bottom of the instrumented baseball home plate. 14 is the bellows segment of the instrumentation package assembly. 15 is the x-axis of the instrumented baseball home plate and the instrumentation package assembly. 16 is the bottom of the instrumentation package assembly. 17 is the interior of the instrumentation package assembly. 18 is the top of the instrumentation package assembly. 19 is the white rubber encapsulating material. 20 is the plane-parallel-flat optical window. 21 is the side of the instrumented baseball home plate that faces the pitcher. 22 is the right side of the instrumented baseball home plate. 23 is the upper protective cover plate. 24 is the lower protective cover plate. 25 is the wireless radio antenna. 26 is the wireless radio antenna. 27 is the left side of the instrumented baseball home plate. 28 is the wireless radio antenna. 29 is the optical axis of camera 35 whose optical window is 20. 30 is the z-axis of the instrumentation package assembly and the instrumented baseball home plate. 31 is the optical axis of the camera 36 whose optical window is 7. 32 is the fiber optics/copper cable connector in the bottom of the instrumentation package assembly and the instrumented baseball home plate. 33 is a microphone. 34 is a microphone. 35 is a camera. 36 is a camera. 37 is a camera lens. 38 is a camera lens. 39 is the access lid heat sink. 40 is the bellows segment of the instrumentation package assembly. 41 is the left side of the instrumented baseball home plate. 42 is the gas valve. 43 is a microphone. 44 is a microphone connector.

FIG. 52A is the top view of a two camera instrumented baseball home plate.

FIG. 52B is the side view of a two camera instrumented baseball home plate.

Referring to drawings FIG. 52A and FIG. 52B, in a preferred embodiment, the present invention contemplates an instrumented baseball home plate, which when stationed on any baseball playing field at any traditional home plate location, can both wirelessly and/or by using fiber optics/copper cable connectivity, and autonomously televise baseball games under the command and control of the remote base station. The remote base station is disclosed in FIG. 59A and FIG. 59B and FIG. 60A and FIG. 60B and FIG. 61A and FIG. 61B.

The instrumented baseball home plate employs a two camera instrumentation package assembly identical to the instrumentation package assembly shown in FIG. 34A and FIG. 34C. It uses the Type XI buffer plate assembly shown in FIG. 21ZA and FIG. 21ZB and FIG. 21ZC. The instrumentation package assembly uses the identical instrumentation package assembly elements disclosed in FIG. 33D.

The only substantial differences between the instrumented baseball home plate shown in FIG. 52A and FIG. 52B and the one shown in FIG. 45A and FIG. 45B is that the instrumented baseball home plate shown in FIG. 52A and FIG. 52B is equipped to use both a fiber optics cable/copper cable transmission link and/or a radio transmission link, whereas the instrumented baseball home plate in FIG. 45A and FIG. 45B is equipped to use a radio transmission link only; and the 3-D stereo camera pair is arranged to look sideways at the pitcher and catcher, rather than directly at the pitcher and catcher.

The preferred embodiment specifying the fiber optics/copper cable transmission link is disclosed in FIG. 60A and FIG. 60B and FIG. 61A and FIG. 61B.

The preferred embodiment specifying the radio transmission link is disclosed in FIG. 59A and FIG. 59B.

The instrumented baseball home plate is instrumented with the instrumentation package assembly disclosed in FIG. 34A and FIG. 34C.

Details of instrumentation package assembly elements are shown in FIG. 33D.

As with the previous preferred embodiment shown in FIG. 51A and FIG. 51B and FIG. 51C and FIG. 51D, the present preferred embodiment shown in FIG. 52A and FIG. 52B provides the TV viewing audience with 3-D stereo pictures and stereophonic sound.

The fiber optics/copper cable transmission link is disclosed in the preferred embodiment shown in FIG. 60A and FIG. 60B. The fiber optics/copper cable transmission link is disclosed in another preferred embodiment shown in FIG. 61A and FIG. 61B.

It is understood that as the state of the art in TV camera technology advances, that there will be other better TV cameras that use other than CCD technology. The present invention will work equally well with them as they become available. Therefore, the present invention uses CCD TV cameras as an example of TV cameras that may be used simply because they are the best that today's technology offers, and is not confined only to their sole use in the future.

Referring to the disclosed instrumented baseball home plate shown in FIG. 52A and FIG. 52B, the instrumented baseball home plate has one instrumentation package assembly 11 mounted inside the instrumented baseball home plate. Details of instrumentation package assembly 11 are shown in FIG. 34. Except for the optical windows 20 and 7, the outward appearance of both the instrumented baseball home plate and the conventional baseball home plate shown in FIG. 41 are identical, both being made of the same white rubber material 19 having the same size, shape, color and texture. Consequently both have the same identical appearance as seen by the players.

In FIG. 34 the instrumentation package assembly 11 carries two CCD sensor arrayed cameras 35 and 36 and two microphones 33 and 34. The two cameras 37 and 38 are arranged side by side and form a 3-D stereo camera pair. The two cameras 35 and 36 are separated by a interpupillary distance.

The linear distance separation of the optical axes of the two camera lenses that make up the stereo camera pair is an important function of the buffer plate. For the buffer plate, the distance measured between the axes is defined as the interpupilarly distance between the camera lenses.

We note here for reference that for modern commercial 3-dimensional cameras, the range of settings for the interpupillary distance is adjustable from 44 to 150 mm. Following the range of settings referenced for modern commercial 3-dimensional cameras, the size of the buffer plate interpupillary distance is made to accommodate an interpulilary distance range of 44 to 150 mm also. Therefore, the axial separation between each stereo pair of camera lenses can vary from 44 to 150 mm.

How far you are intending to view the pictures from requires a certain separation between the cameras. This separation is called stereo base or stereo base line and results from the ratio of the distance to the image to the distance between your eyes. The mean interpupillary distance (IPD) is 63 mm (about 2.5 inches) for humans, but varies with age, race and gender. The vast majority of adults have IPDs in the range 50-75 mm. Almost all adults are in the range 45-80 mm. The minimum IPD for children as young as five is around 40 mm.

It is understood that other alternative interpupillary distances may be used to produce other alternative 3-D effects. For example, larger interpupillary distance will produce more striking 3-D effects.

The two cameras 35 and 36 that form the 3-D stereo camera pair have optical windows 7 and 20, and have optical axes 29 and 31 respectively. The interpupillary distance is the distance between the two camera's optical axes 29 and 31. The cameras 35 and 36 that form the 3-D stereo camera pair look upward from the top 8 of the instrumented baseball home plate along their respective optical axes 31 and 29. The optical axes 29 and 31 are parallel to each other. The two holes in the top 8 of the instrumented baseball home plate are made just large enough to prevent vignetting of the cameras field of view.

The instrumented baseball home plate has two protective cover plates 23 and 24 embedded and molded into it using the white rubber encapsulating material 19. One protective cover plate 23 is on the top and one is on the bottom of the instrumented baseball home plate. The body of the top protective cover plate 23 is made spherically dome shaped in its outer region. The body of the bottom protective cover plate 24 is made entirely flat and has rounded edges like the edges on the top protective cover plate 23. The edges are made round so they will not injure the players if the players hit the instrumented baseball home plate.

The materials chosen for the protective cover plates 23 and 24 in the present preferred embodiment are polycarbonates, ABS, or fiber reinforced plastics. Although a variety of other materials would function almost equally as well, these have an advantage in that they are lightweight and stiff, enabling its thickness to remain thin while still delivering the significant stiffness needed to perform their mechanical shielding function in the limited space the protective cover plates 23 and 24 can occupy within the instrumented baseball home plate. They have an additional advantage in that they are transparent to the transmitted and received radio waves which need to move to and from the antennas 25, 26, 27 and 28 inside the instrumented baseball home plate without absorption or reflection.

The instrumentation package assembly 11 is sandwiched between the top and bottom protective cover plates 23 and 24. The purpose of these protective cover plates 23 and 24 is to act as mechanical shields to protect the instrumentation package assembly 11 from being damaged during the game. During the normal course of the game, the top 8 of the instrumented baseball home plate will be hit and crushed by the players and by their equipment. For example, the players may step on the instrumented baseball home plate or slide into it. They may even drop their bat on it. The two protective cover plates 23 and 24 protect the instrumentation package assembly 11 within the instrumented baseball home plate from physical damage due to these hits.

Around the top 8, bottom 13, sides and inside of the instrumented baseball home plate, the space is filled with encapsulating material 19. When cured, this encapsulating material 19 acts as cushioning to absorb shock and vibration to the instrumented baseball home plate. The molting material 19 encapsulates the upper and lower protective cover plates 23 and 24 and maintains their positions inside the molded instrumented baseball home plate. The space between the protective cover plates 23 and 24 and the instrumentation package assembly 11 is also filled with the same encapsulating material 19. When cured, this encapsulating material 19 acts as cushioning to absorb shock and vibration to the instrumentation package assembly 11. The material 19 encapsulates the instrumentation package assembly 11 inside the instrumented baseball home plate and thereby maintains its position inside the molded instrumented baseball home plate.

The top protective cover plate 23 is spherically dome shaped in its outer region. The purpose of making it spherically dome shaped is to provide maximum protection for the optical windows 20 and 7 whose surfaces are at the very top 8 of the instrumented baseball home plate. The top protective cover plate 23 is made flat in its inner region where its two bored clearance holes surround and protect the optical windows 20 and 7. The flat shape enables the protective cover plate 23 to surround and protect the optical windows 20 and 7 at the top of the instrumented baseball home plate where the optical windows 20 and 7 are most likely to be exposed to the greatest threat of damage due to hits to the top of the instrumented baseball home plate. The upper protective cover plate 23 is buried in encapsulating material 19 at the center top of the instrumented baseball home plate around the optical windows 20 and 7 by approximately 1/32 to 1/4 inch below the top 8. The domed spherical shape of the outer region of the upper protective cover plate 23 enables the upper protective cover plate 23 to come very close to the top center of the instrumented baseball home plate where the players will have only grazing contact with its surface if they crash into the instrumented baseball home plate while keeping its edge deep inside the instrumented baseball home plate, thereby eliminating the threat of injury to the players if they hit the top 8 of the instrumented baseball home plate.

The spherical shape of the upper protective cover plate 23 causes its rounded edge to be curved downward away from the top 8 and places its edge approximately 1 inch or more below the top 8 surface of the of the instrumented baseball home plate.

The upper protective cover plate 23 protects the instrumentation package assembly 11 from being crushed and damaged by the players during the game. The instrumentation package assembly 11 is located below the upper protective cover plate 23 inside of the instrumented baseball home plate 4. In order to achieve its purpose, the upper protective cover plate 23 must be stiff. The entire volume between the top 8 of the instrumented baseball home plate 4 and the upper protective cover plate 23 is filled with a resilient encapsulation padding material 19. The entire volume between the upper protective cover plate 23 and the instrumentation package assembly 11 is filled with the same resilient encapsulation padding material 19. The domed shape of the upper protective cover plate 23 is very important. It completely covers and wraps the instrumentation package assembly 11 and its radio antennas 25, 26, 27, and 28, which are below it, and diverts trauma and forces that occur to the top 8 of the instrumented baseball home plate 4 during the game away from the instrumentation package assembly 11 and its antennas 25, 26, 27, and 28. The outer edge of the upper protective cover plate 23 is bent downward and past the outermost tips of the radio antennas 25, 26, 27, and 28 to protect them. The curvature of the upper protective cover plate 18 is made large enough so that the dome completely covers around them. The dome shape allows the thickness of the padding 19 between the top 8 of the instrumented baseball home plate 4 and the upper protective cover plate 23 to increase as the radial distance from the center of the instrumented home plate 4 increases outwardly.

The lower protective cover plate 24 is entirely flat and is buried in encapsulating material 19 approximately 1/4 inch or more above the bottom surface 13 of the instrumented baseball home plate. The body of the lower protective cover plate 24 is made flat because the instrumented baseball home plate it is buried in the ground and there is no danger of the players coming into violent contact with 24. The flat shape is easier to make and less expensive to manufacture. Its thickness is also made in the range of approximately 1/4 inches or more. However, its thickness is not physically restrained because of its location, as is the case with the upper protective cover plate 23.

In all cases, the edges of the protective cover plates 23 and 24 come within no less than 1/4 inches from all sides of the instrumented baseball home plate.

In FIG. 34 the instrumentation package assembly 11 carries two CCD sensor arrayed TV cameras 35 and 36 and two microphones 33 and 34. The two cameras 35 and 36 are arranged side by side and form a 3-D stereo camera pair. The two cameras 35 and 36 and their lenses 37 and 38 are separated by an interpupillary distance.

The linear distance separation of the optical axes of the two camera lenses that make up the stereo camera pair is an important function of the buffer plate. For the buffer plate, the distance measured between the axes is defined as the interpupilarly distance between the camera lenses.

We note here for reference that for modern commercial 3-dimensional cameras, the range of settings for the interpupillary distance is adjustable from 44 to 150 mm. Following the range of settings referenced for modern commercial 3-dimensional cameras, the size of the buffer plate interpupillary distance is made to accommodate an interpulilary distance range of 44 to 150 mm also. Therefore, the axial separation between each stereo pair of camera lenses can vary from 44 to 150 mm.

How far you are intending to view the pictures from requires a certain separation between the cameras. This separation is called stereo base or stereo base line and results from the ratio of the distance to the image to the distance between your eyes. The mean interpupillary distance (IPD) is 63 mm (about 2.5 inches) for humans, but varies with age, race and gender. The vast majority of adults have IPDs in the range 50-75 mm. Almost all adults are in the range 45-80 mm. The minimum IPD for children as young as five is around 40 mm.

It is understood that other alternative interpupillary distances may be used to produce other alternative 3-D effects. For example, a larger interpupillary distance will produce more striking 3-D effects.

The two cameras have optical axes 29 and 31. The interpupillary distance is the distance between the two axes 29 and 31. The cameras look straight upward from the top of the instrumented baseball home plate along their respective optical axes 29 and 31. Optical axes 29 and 31 are parallel to one another and normal to the top of the instrumented baseball home plate. The cameras have optical windows 20 and 7 respectively.

The instrumented baseball home plate has five sides. The top 8 of the instrumented baseball home plate sits horizontally on the baseball playing field approximately at ground level which is customary in the game of baseball. The instrumented baseball home plate is oriented in space so its z-axis 30 is perpendicular to the baseball field and pointing skyward. The side 21 of the instrumented baseball home plate faces the pitcher as is customary in the game of baseball.

The two cameras 35 and 36 are identical to each other. The two cameras 35 and 36 use the same identical extremely wide angle lenses 37 and 38. Even though the cameras 35 and 36 are pointed skyward, they can see right down to the outfield horizon because their lenses are extremely wide angle lenses each having a 180 degree field of view. The horizon appears on the bottom center of the TV picture frame to the TV viewing audience. Each of the two cameras 35 and 36 is aligned within its instrumentation package assembly 11 so that each of the cameras 35 and 36 yields wirelessly transmitted upright images of objects at the center of the field of view. Both cameras 35 and 36 are aligned inside the instrumentation package assembly so that the TV viewing audience sees the distant stadium horizon in the outfield, towards the bottom and sides of the picture frame.

Referring to the disclosed instrumented baseball home plate shown in FIG. 52A and FIG. 52B, the instrumented baseball home plate has a single instrumentation package assembly 11 mounted inside the instrumented baseball home plate. The instrumentation package assembly 11 is encapsulated inside the instrumented baseball home plate using a shock absorbing white rubber encapsulating material 19 that fills the entire cavity of the instrumented baseball home plate.

Details of instrumentation package assembly 11 are shown in FIG. 34. As shown in FIG. 34 the instrumentation package assembly 11 carries two CCD sensor arrayed cameras 35 and 36 and two microphones 33 and 34. The instrumentation package assembly 11 is mechanically mounted inside the instrumented baseball home plate using a buffer plate assembly 12. The instrumentation package assembly 11 is mechanically protected inside the instrumented baseball home plate using an upper and a lower protective cover plate shield 23 and 24 respectively.

The two protective cover plates 23 and 24 are embedded and molded into the instrumented baseball home plate using the shock absorbing material 19. Protective cover plate 23 is on the top and protective cover plate 24 is on the bottom of the instrumented baseball home plate. The top protective cover plate 23 is referred to as the upper protective cover plate. It is shown in FIG. 55. The bottom protective cover plate 24 is referred to as the lower protective cover plate. These protective cover plates 23 and 24 sandwich the instrumentation package assembly 11 between them and protect it and its contents from being damaged.

Except for the optical windows 20 and 7, the external appearance of both the instrumented baseball home plate and the conventional baseball home plate are identical, both being made of the same material 19. In addition, their size, shape, color and texture are identical. The weights of the instrumented baseball home plate and the conventional baseball home plate are nearly identical. Details of the conventional baseball home plate are shown in FIG. 41.

The instrumentation package assembly 11 is sandwiched between the top and bottom protective cover plates 23 and 24. The purpose of these protective cover plates 23 and 24 is to act as mechanical shields to protect the instrumentation package assembly 11 from being damaged by impacts during the game. During the normal course of the game, the top of the instrumented baseball home plate will be hit and crushed by the players and by their equipment. For example, the players may step on the instrumented baseball home plate or slide into it. They may even drop their bats on it. The two protective cover plates 23 and 24 protect the instrumentation package assembly 11 within the instrumented baseball home plate from physical damage due to these hits.

The outermost body region of the top protective cover plate 23 is made substantially spherically dome shaped. There is a flat region in the middle of the upper protective cover plate 23 surrounding the clearance bores for cameras 35 and 36. The entire body of the bottom or lower protective cover plate 24 is made flat. The top and bottom protective cover plates 23 and 24 both have rounded outer edges. The edges are rounded to insure that the baseball players will not be injured by them if the players crash into the instrumented baseball home plate A variety of materials can be chosen for the protective cover plates 23 and 24 in the present preferred embodiment. Material examples are polycarbonates, ABS, and fiber reinforced plastics. These materials have the advantage that they are lightweight and stiff, enabling the thickness of the cover plates to remain thin while still delivering the significant stiffness needed to perform their protective function of mechanical shielding the instrumentation package assembly in the limited space they can occupy within the instrumented baseball home plate. They have the additional advantage in that they are transparent to the transmitted and received radio waves which need to move to and from the wireless radio antennas 25, 26, 27, and 28 inside the instrumented baseball home plate without absorption or reflection therein.

The space between the top, bottom and sides of the instrumented baseball home plate and the protective cover plates 23 and 24 is filled with encapsulating material 19. Synthetic rubber is an example of the encapsulating material that is used. When cured, this encapsulating material 19 acts as cushioning to absorb shock and vibration to the instrumented baseball home plate that may be transferred to the instrumentation package assembly 11. The molting material 19 encapsulates the upper and lower protective cover plates and maintains their positions inside the molded instrumented baseball home plate. The space between the protective cover plates and the instrumentation package assembly 11 is also filled with the same encapsulating material 19. When cured, this encapsulating material acts as cushioning to absorb shock and vibration to the instrumentation package assembly 11. The molting material encapsulates the instrument package assembly 11 inside the instrumented baseball home plate and thereby maintains its position inside the molded instrumented baseball home plate. The top 38 of the instrumented baseball home plate edge is beveled at 45 degrees the same as the standard conventional professional league baseball plate shown in FIG. 41 in order to protect the players who hit against it.

The top protective cover plate 23 is spherically dome shaped in its outer region, and flattened in its inner region close to the optical windows 7 and 20. The purpose of making it flattened near the optical windows 7 and 20 is to provide maximum protection for the optical windows 7 and 20 whose surfaces are flush at the very top 8 of the instrumented baseball home plate 4. The flattened shape enables the protective cover plate 23 to surround the optical windows 7 and 20 at the top 8 of the instrumented baseball home plate 4 where the optical windows 7 and 20 are most likely to be exposed to the greatest threat of damage due to hits to the top of the instrumented baseball home plate by the baseball players or their equipment. The upper protective cover plate 23 is buried in encapsulating material 19 at the center top of the instrumented baseball home plate 4 around the optical windows 7 and 20. The dome shape enables the upper protective cover plate 23 to come very close to the top center of the instrumented baseball home plate where the players will have only grazing contact with its surface 8 if they crash into the instrumented baseball home plate, thereby eliminating the threat of injury to the players if they hit the top 8 of the instrumented baseball home plate 4. The spherical shape of the upper protective cover plate 23 causes its edge to be rounded downward and away from the top 8 of the instrumented baseball home plate 4 and away from the players.

The lower protective cover plate 24 is flat and is buried in the encapsulating material 19 just above the bottom surface 13 of the instrumented baseball home plate. The body of the lower protective cover plate 24 can be made flat because it is buried in the ground and there is no danger of the baseball players coming into violent contact with it. The flat shape is easier to make and less expensive to manufacture. It can also be made thicker than the upper protective cover plate 23 because there is more free space near the bottom of the instrumented baseball home plate that it can occupy. Its thickness is not physically restrained because of its location, as is the case with the upper protective cover plate 23 which is physically located between the top surface 8 and the buffer plate 12.

In both cases, the rounded edges of the protective cover plates 23 and 24 are substantially distant from the top 8 of the instrumented baseball home plate to protect the players from impacting against them. The top protective cover plate 23 is detailed in FIG. 55. The edge of the upper protective cover plate 23 is rounded and all sharp corners are removed so as to make it safe to the players if they press violently against the instrumented baseball home plate.

The outer body of the upper protective cover plate 23 is made spherically dome shaped. The spherical top of the dome faces upward. The upper protective cover plate 23 has two bored holes in it. The purpose of the bores is to permit the cylindrical ends of the buffer plate 12 containing the optical windows 7 and 20 to pass through them, and through the encapsulating material 19, and through the top 8 of the instrumented baseball home plate. The upper protective cover plate 23 is made flat in its inner region near to its circular bores so it can surround the optical windows 7 and 20 near the very top of the instrumented baseball home plate and shelter them from hits; while its spherical dome shape in its outer region keeps the edge of the protective cover plate 23 far down below the top of the instrumented baseball home plate and well below the surface of the playing field within the ground, so the edge would not be felt by the players if they impacted on the top surface 8 of the instrumented baseball home plate. The body of the lower protective cover plate 24 is made flat and has rounded corners like the upper protective cover plate 23 for the same reason.

The optical windows 7 and 20 permit the cameras 35 and 36 mounted inside the instrumentation package assembly 11 of the instrumented baseball home plate to look out through the top 8 of the instrumented baseball home plate onto the playing field during a baseball game and be protected from hazards such as rain, dirt and physical impacts.

The optical windows 7 and 20 are sealed to the small diameter cylindrical end of the buffer plate 12. The seals are airtight and waterproof to protect the cameras 35 and 36, lenses 37 and 38, microphones 33 and 34, and the electronics within the instrumentation package assembly 11.

The optical windows 7 and 20 are made strong to protect the camera lenses 37 and 38 and cameras 35 and 36 that are located beneath it. The optical windows 7 and 20 are hard coated by vapor deposition with materials such as MgFl or SiO2 to help prevent the outer-most optical window surfaces from being scratched during the game. The optical window material itself is chosen to be strong. It is made from hard optical glass such as barium lanthanum borate glasses, or hard optical plastic like acrylic or polycarbonate, both of which are scratch resistant.

The optical windows 7 and 20 are made small to make them inconspicuous to the players, and substantially preserve the instrumented baseball home plate's look-alike quality with the conventional major league home plate shown in FIG. 41; while still retaining sufficient clear aperture for the camera lenses 37 and 38 to see events with SD/HD resolution on the playing field in prevailing light. Typical optical windows 7 and 20 range in size from about ⅛ inch to ½ inches in diameter. Besides their small size, the optical windows 7 and 20 are made additionally inconspicuous by making their anti-reflection coatings a straw color to match the tan coloration of the ground dust around the instrumented baseball home plate.

The optical window 7 and 20 are plane-parallel-flat. They are disposed at the intersection of the x-axis and y-axis of the instrumented baseball home plate. The optical window 7 and 20 are positioned on the top 8 of the instrumented baseball home plate so they are aligned roughly with the chin line of the average batter, and roughly at the same location as the center of gravity of the conventional major league home plate shown in FIG. 41.

Optical windows having a spherical dome shape can also be used when a larger field of view is desired. In another preferred embodiment, the outer surface of the window is spherical in shape and convex outward and shell-like as is necessary to permit the camera to see fields of view with extremely wide viewing angles approaching 90 degrees off the optical axis of the cameras. Shell-like implies that the inner and outer spherical surfaces of the optical window are concentric. In applications where extremely wide viewing angles are not required, the optical window surfaces can be made flat and plane parallel. The shell-like windows enable the camera to use lenses that have extremely wide viewing angles approaching 90 degrees off the optical axis of the camera lens without introducing bothersome optical aberrations and vignetting. The shell-like shape of the windows also imparts increased physical strength to the windows.

The optical windows 7 and 20 are attached to buffer plate 12. The optical windows 7 and 20 provide a portal through which cameras lenses 37 and 38 can see out onto the playing field from inside the instrumented baseball home plate. The encapsulating material 19 provides shock absorbing padding between the top surface 8 of the instrumented baseball home plate and the protective cover plate 23. The encapsulating material 19 provides shock absorbing padding between the protective cover plate 23 and the buffer plate 12.

Camera lenses 37 and 38 look out thru the top 8 of the instrumented baseball home plate through their respective optical windows 7 and 20 at objects angularly spread out around their respective axial lines of sight 31 and 29 and image the objects they see onto cameras 35 and 36 respectively. The lines of sight 31 and 29 of the two cameras 35 and 36 are parallel to one another. The two cameras 35 and 36 that form the 3-D stereo camera pair have optical windows 7 and 20.

A variety of different camera lens types with different lens setting capabilities can be used. When enabled by the operator in the remote base station, the auto iris setting permits the camera lenses 37 and 38 to automatically adjust for varying lighting conditions on the field. The auto focus setting permits the camera lenses 37 and 38 to adjust focus for varying distances of the players and action subjects on the field.

For example, when a baseball is hit, and a player is rounding the bases, the distance of a player from home plate may be increasing or decreasing. The cameras 35 and 36 within the instrumented baseball home plate can be independently and simultaneously commanded and controlled to auto focus on the player. As the player is rounding third base, if he decides to run for home plate, the instrumented baseball home plate's cameras 35 and 36 and microphones 33 and 34 will capture all the action. While the player is running, his pictures and sounds are being wirelessly transmitted from the instrumentation package assembly 11 inside the instrumented baseball home plate to the remote base station for processing. The sounds received from each of the microphones by the remote base station are processed using special software to produce surround sound which is broadcast to the TV viewing audience.

If the player decides to slide into home plate, the instrumented baseball home plate cameras 35 and 36 will enable the viewing audience to see the player slide into home plate, up close. The cameras 35 and 36 will catch a detailed image of the player's sharp cleats as they strike the plate. The TV audience will experience the flight of chunks of dirt being thrown onto the plate in 3-D. The microphones 33 and 34 will enable the TV viewing audience to hear the scraping and the thud of the cleats as they hit the plate. The TV audience will hear the chunks of dirt as they hit the plate. The TV viewing audience will see the face and the hand of the umpire as he reaches down to sweep the plate. The TV audience will hear and see the bristles of the umpire's brush as he sweeps the dirt off the plate.

Cameras 35 and 36 are mounted inside the instrumentation package assembly 11. The optical axes 29 and 31 of cameras 35 and 36 are perpendicular to the top 38 of the instrumented baseball home plate. This arrangement permits the cameras 35 and 36 to look upward and around their z-axes 29 and 31 from out of the top 38 of the instrumented baseball home plate. Utilization of an extremely wide angle lenses 36 and 37 allow the TV viewing audience to see past the pitcher and down to the horizon of the baseball stadium.

When a player is running toward the instrumented baseball home plate from third base, the cameras 35 and 36 can see where he is coming from. The cameras 35 and 36 can see the player as he runs and touches the instrumented baseball home plate. The cameras 35 and 36 can see the player as he is sliding into the instrumented baseball home plate. The TV audience will see and hear the player's cleats as they hit the instrumented baseball home plate. The cameras 35 and 36 can see the catcher as he tags the player before the player touches the instrumented baseball home plate and scores a run. From the vantage point of the instrumented baseball home plate, the viewing audience can see the strained player darting for the instrumented baseball home plate. The viewing audience can see details of the player's feet as he attempts to slide into the instrumented baseball home plate. The viewing audience can see a close-up of the opposing team's catcher's attempt to tag him with the ball. As the baseball is thrown home, the viewing audience can see the catcher reach down for it close to the plate. The cameras 35 and 36 vantage point at the instrumented baseball home plate gives the audience a viewing angle of the game never seen before by television viewing audiences. The instrumented baseball home plate's cameras 35 and 36 gives the TV viewing audience unending contemporaneous shots that get across a sense of the action of being there—like a player in the game, that prior art cameras looking on from their disadvantaged viewing points from outside the playing field cannot get across.

The top 8 of the instrumented baseball home plate sits horizontally flat on the baseball playing field. The optical axes 29 and 31 of the cameras 35 and 36 are parallel to the z-axis of the instrumentation package assembly 11 and the z-axis 30 of the instrumented baseball home plate. Axes 29 and 31 are perpendicular to the top 38 of the instrumented baseball home plate. The instrumented baseball home plate is oriented in space so its z-axis 30 is perpendicular to the baseball field and pointing skyward. The cameras 35 and 36 look upward out from the top 38 of the instrumented baseball home plate along and around their optical axes 29 and 31 through optical windows 20 and 7. The cameras 35 and 36 are aligned within the instrumentation package assembly 11 so that the cameras 35 and 36 yield a wirelessly transmitted upright 3-D images to the TV viewing audience via radio antennas 25, 26, 27 and 28.

In the present preferred embodiment, cameras 35 and 36 use extremely wide angle lenses 37 and 38 with zoom capability. Even though cameras 35 and 36 are pointed skyward, they can see off axis past the pitcher along y-axis 2 right down to the outfield stadium horizon because of their near 180 degree field of view. This is a distinct advantage of extremely wide angle lenses over other types of lenses. However, it should be pointed out that the cameraman may elect to use a variety of camera lens stereo 3-D pairs 36 and 37 with other capabilities depending on the visual effects he wishes to convey to the TV viewing audience. For example, the cameraman may elect to use a camera lens stereo 3-D pair 36 and 37 with a narrower field of view in order to concentrate the attention of the TV viewing audience on the batter's taut and sweaty stubble covered face.

The cameras 35 and 36 are aligned within the instrumentation package assembly 11 so that it yields wirelessly transmitted upright images of objects that appear in the TV picture frame between the center and the bottom of the TV picture frame. This can be accomplished in any one of four different modes. Each of these modes conveys its own spectacular viewing angle of the game to the TV viewing audience. Each of these four modes is achieved by physically rotating the cameras 35 and 36 with their lenses 37 and 38 respectively about their optical axes 29 and 31 respectively using an actuating device that is mechanically coupled to the cameras 35 and 36 and lenses 37 and 38 inside the instrumentation package assembly 11. The mechanical actuating device has two stops that are mechanically detented 180 degrees apart from one another. The mechanical actuating device is housed within the camera's instrumentation package assembly 11. The mechanical actuating device can rotate the cameras 35 and 36 and lenses 37 and 38 together to any one of its two stops. The cameraman in the remote base station selects which of the two modes is to be employed, and sends a signal to the instrumentation package assembly 11 to set the camera 35 and 36 and lenses 37 and 38 to the desired mode he selected.

In the first mode, the cameras 35 and 36 and lenses 37 and 38 are aligned in rotation inside its instrumentation package assembly 11 by the mechanical actuating device so that the TV viewing audience sees the stadium horizon in the outfield at the right side of the TV picture frame. (This is equivalent to what a person would see visually if he were laying flat down on the playing field with his head resting on the instrumented baseball home plate and looking upward with his feet facing a right handed batter on side 41 of the instrumented baseball home plate.). The pitcher appears to be standing on his mound toward the right hand side of the TV picture frame. When the pitcher throws the baseball to the catcher, the TV audience will see the baseball approaching the center of the TV picture frame from the image of the pitcher's hand which is right of center of the TV picture frame. The size of the baseball grows larger as it gets closer to the instrumented baseball home plate and the right handed batter. Since camera 35 and 36 are below the batter, an image of the underside of batter's chin and sweaty arm pits will occupy the space below the center of the TV picture frame. The right handed batter will appear to be standing near the bottom of the TV picture frame. The microphones 33 and 34 will enable the TV audience to hear the whoosh of air as the baseball passes above the instrumented baseball home plate. Cameras 35 and 36 will enable the TV audience to see the right handed batter swing his bat, up close, to strike the baseball as it whizzes by above the instrumented baseball home plate. The microphones 33 and 34 will enable the TV audience to hear the rush of the air as he swings his bat. The TV audience will hear the loud crack of the bat as it strikes the baseball. The TV audience will see the baseball the moment it is hit by the bat. This will be an action packed event never before witnessed by a TV audience. Each of the pitched baseballs will produce breath taking excitement and expectations by the TV viewing audience.

Camera 35 and 36 will enable the TV audience to see the baseball as it travels outward from the crack of the bat onto the playing field. The TV audience will see the baseball get smaller as it gets further away from the instrumented home plate and the batter. The image of the baseball will move from near the center of the TV picture frame toward the right of the TV picture frame if it is hit toward the outfield. The audience will see the batter drop the bat and scramble toward first base. The image of the bat will grow in size and appear to the TV viewing audience as though it was going to hit them in the face as it careens down on and strikes the top 8 of the instrumented baseball home plate. Members of the TV viewing audience will duck to avoid being hit by the bat. The microphones 33 and 34 enable the TV audience to hear the thud of the bat after the batter releases it and it hits the instrumented baseball home plate. The TV audience will hear the scraping by the batter's cleats on the ground as he scrambles to first base. The TV audience will see the size of the batter grow smaller as he runs toward first base and gets further from home plate.

In the second mode, the cameras 35 and 36 and lenses 37 and 38 are aligned in rotation inside its instrumentation package assembly 11 by the mechanical actuating device so that the TV viewing audience sees the stadium horizon in the outfield at the left side of the TV picture frame. (This is equivalent to what a person would see visually if he were laying flat down on the playing field with his head resting on the instrumented baseball home plate and looking upward with his feet facing a left handed batter on side 22 of the instrumented baseball home plate.) The stadium horizon appears in the TV picture frame at the left hand side of the TV picture frame. The pitcher appears to be standing on his mound near the left hand side of the TV picture frame. When the pitcher throws the baseball to the catcher, the TV audience will see the baseball approaching the center of the TV picture frame from the image of the pitcher's hand which is left of center of the TV picture frame. The size of the baseball grows larger as it gets closer to the instrumented baseball home plate and the batter. Since the cameras are below the batter, an image of the underside of batter's chin and sweaty arm pits will be below the center of the TV picture frame. A left handed batter would appear to be standing upright with his feet near the bottom of the TV picture frame. The TV audience will hear the whoosh of air as the baseball passes above the instrumented baseball home plate. The TV audience will see the batter swing his bat, up close, to strike the baseball as it whizzes by. The TV audience will hear the rush of the air as he swings his bat. The TV audience will hear the loud crack of the bat as it strikes the baseball. The TV audience will see the baseball the moment it is hit by the bat. This will be an action packed event never before witnessed by a TV audience. Each of the pitched baseballs will produce breath taking excitement and expectations by the TV viewing audience. The TV audience will see the baseball as it travels outward from the crack of the bat onto the playing field. The TV audience will see the baseball get smaller as it gets further away from the instrumented home plate and the batter. The image of the baseball will move away from the center of the TV picture frame after it is hit. The audience will see the batter drop the bat and scramble toward first base. The image of the bat will grow in size and appear to the TV viewing audience as though it was going to hit them in the face as it careens down on and strikes the instrumented baseball home plate. Members of the TV viewing audience will duck to avoid being hit by the bat. The TV audience will hear the thud of the bat after the batter releases it and it hits the instrumented baseball home plate. The TV audience will hear the scraping by the batter's cleats on the ground as he scrambles to first base. The TV audience will see the size of the batter grow smaller as he runs toward first base and gets further from home plate.

The instrumentation package assembly 11 is supported at its upper end by a buffer plate 12. The instrumentation package assembly 11 and the buffer plate 12 are permanently encapsulated inside of the instrumented baseball home plate as the encapsulating material 19 around them cures. After the encapsulating material 19 sets, it becomes a weatherproof shock absorbing padding material 19. The small diameter end of the buffer plate 12 peers through the top 8 and upper protective cover plate 23 of the instrumented baseball home plate. The small diameter end of the buffer plate 12 is sealed and molded into the shock absorbing padding 16 around its circumference. The encapsulating material 19 is a permanent resilient compound that is air-tight and water-tight.

The buffer plate 12 is encapsulated by the encapsulating material 19 inside the instrumented baseball home plate. The z-axes 29 and 31 of the bores in the buffer plate 12 are perpendicular to the top 8 of the instrumented baseball home plate. The end of the instrumentation package assembly 11 is inserted into the bores in the buffer plate 12, thereby aligning the z-axes 29 and 31 of the instrumentation package assembly 11 perpendicular to the top 8 of the instrumented baseball home plate.

The buffer plate 12 acts as a bearing for the instrumentation package assembly 11, and thereby restricts and restrains the motion of the instrumentation package assembly 11 inside the instrumented baseball home plate. Besides functioning as a bearing to support the instrumentation package assembly 11 within the instrumented baseball home plate, the buffer plate 12 provides a hollow portal through which the cameras 35 and 36 inside the instrumentation package assembly 11 may peer out of the instrumented baseball home plate at the baseball playing field.

The instrumented baseball home plate's outward appearance looks substantially the same as the conventional professional league baseball home plate and the conventional high school league baseball home plates shown in FIG. 41; and meets the official requirements for these venues and is interchangeable with them in these venues.

The buffer plate 12 is a Type XI buffer plate and is shown in FIG. 21ZA and FIG. 21ZB and FIG. 21ZC. The buffer plate 12 is encapsulated into the instrumented baseball home plate using the white rubber encapsulating material 19. The small diameter end of the buffer plate 12 passes through the upper protective cover plate 23 and protrudes through the molded rubber top 8 of the instrumented baseball home plate. The buffer plate carries the optical windows 7 and 20. The flat surface of optical windows 7 and 20 are flush with the top 8 of the instrumented baseball home plate.

If the cameraman chooses to use spherical concentric dome shaped optical windows 7 and 20 instead of the flat ones in order to minimize the vignetting at the extreme 180 degree field of view of extremely wide angle lenses 37 and 38, then the spherical optical windows will protrude above top 8 by about one half the diameter of the spherical optical window.

Buffer plate 12 is shown in detail in FIG. 21. It is made from a light-weight rigid polycarbonate, ABS or fiber reinforced plastic material. It is used to prop up and position the instrumented baseball home plate's upper protective cover plate 23. The buffer plate 12 is mounted and permanently encapsulated to the inside of the instrumented baseball home plate. The top of the buffer plate 12 is covered by upper protective cover plate 23. The purpose of upper protective cover plate 23 is to protect the instrumentation package assembly 11, which is below it, from being crushed when a player steps or slides into the instrumented baseball home plate.

In summary the buffer plate 12 is multi-purposed. It provides a mounting surface against which the upper protective cover plate 23 rests. It protects the instrumentation package assembly 11 from becoming misaligned relative to the portal through which cameras 35 and 36 peer out from the top surface 8 of the instrumented baseball home plate.

The instrumented baseball home plate has five sides just like the standard conventional baseball home plate. Their dimensions are identical to the dimensions of the standard conventional baseball home plate shown in FIG. 41. Side 21 is closest to the pitcher and is 17 inches long. Sides 4 and 9 form the apex of the instrumented baseball home plate. They are each 12.021 inches long, and join at right angles to one another at the apex of the instrumented baseball home plate.

It is not necessary to make the weight of the instrumented baseball home plate exactly identical to the weight of the conventional major league home plate shown in FIG. 41 because the instrumented baseball home plate will be immobile and will be anchored in the ground.

There are reasons however to make the weight of the instrumented baseball home plate approximately the same as that of the conventional major league home plate shown in FIG. 41. The first reason is so that when a player hits it, the instrumented baseball home plate will feel and react the same as the conventional major league home plate. Accordingly, the location of the center of gravity of the instrumented baseball home plate base and the conventional major league baseball home plate are both in roughly the same place. The second reason is so the field crew that maintains the playing field can handle the instrumented baseball home plate in the same way as they handle the conventional major league home plate.

The present invention contemplates the instrumented baseball home plate to be non-intrusive to the players in the game. The instrumented baseball home plate is constructed to produce substantially no audible noise that the player's may hear and be distracted by. The rubber encapsulating material absorbs the sound of the moving parts inside the instrumented baseball home plate. The sounds from inside the instrumented baseball home plate are made inaudible to the players who are outside the instrumented baseball home plate by sound absorption, muffling, baffling and damping methods designed into the instrumented baseball home plate.

The central body of the instrumentation package assembly 11 is essentially a cylindrical can and contains the battery pack. The bottom of the can has a removable lid. The lid can be removed in order to change out battery packs when the battery packs loose their ability to charge properly. Access to the bottom of the cylindrical can is through the circular aperture in the bottom 13 of the instrumented baseball home plate.

The z-axis 30 is the axis of symmetry of the instrumentation package assembly 11. The instrumentation package assembly 11 contains camera lenses 37 and 38, cameras 35 and 36, and supporting electronics. The battery pack supplies electrical power to the entire instrumentation package assembly 11. The instrumentation package assembly 11 is essentially a short cylindrical can like a tuna fish can. It is made strong to resist being crushed. Materials such as polycarbonates, ABS and fiber reinforced plastics are used in its construction.

Induction coil pairs 5 and 6 are located on the top and bottom of the instrumentation package assembly 11 central hub. The electrical induction coils 5 and 6 are used to inductively couple power into the battery pack from a power source located outside the instrumented baseball home plate. A block diagram showing the electrical battery charging circuit involving the induction coils and the battery pack is shown in FIG. 24. An induction coil which is external to the instrumented baseball home plate acts as a primary winding and is a source of electrical power which inductively couples electrical current into these induction coils 5 and 6. The external induction coil is laid flat on the top of the instrumented baseball home plate coaxially above coils 5 and 6 during the battery charging process. Electrical current which is induced into the induction coils 5 and 6 is fed into the battery pack in order to charge it.

A block diagram of the instrumentation package assembly 11 electronics is shown in FIG. 23 and FIG. 24. Four antennas 21, 22, 23, and 24 are used to accomplish the wireless transmission and reception of signals between the instrumented baseball home plate and the antenna array relay junction. The same four antennas 25, 26, 27, and 28 are used by the instrumented baseball home plate to both transmit video signals to the remote base station and receive control commands back from the remote base station.

In the preferred embodiment shown, the present invention contemplates the instrumented baseball home plate to be equipped with an instrumentation package assembly 11 that is mounted and encapsulated inside the instrumented baseball home plate, which is capable of wirelessly televising pictures and sounds of baseball games from its cameras 35 and 36 and its microphones 33 and 34 contained therein.

The instrumentation package assembly's 11 can is made of polycarbonate, ABS or fiber reinforced plastic which are strong and are non-conductors of electricity. It is necessary to use a non-conducting material so as to allow the transmitted and received radio signals to radiate thru it from the antenna elements 25, 26, 27 and 28 within the instrumentation package assembly 11 for the purpose of televising signals by wireless communications to and from the remote base station. The instrumentation package assembly assembly's network transceiver electronics wirelessly transmits real-time pictures and sounds from the instrumentation package assembly 11 cameras and microphones 33 and 34 via the quad parallel antenna array element 25, 26, 27 and 28 also known as intentional radiators, to the antenna array relay junction.

As an alternative example, the antenna array 25, 26, 27, and 28 shown in the instrumentation package assembly 11 could be replaced with a helix antenna (not shown) with similar dimensions wound on the inside diameter of the instrumentation package assembly.

A antenna array relay junction disclosed in FIG. 59A and FIG. 59B is deployed in the baseball stadium and receives radio signals from the instrumented baseball home plate's antenna array elements 25, 26, 27, and 28. Antenna array elements 25, 26, 27, and 28 are in quadrature to radiate radio signals to the antenna array relay junction with sufficient gain so as to overcome RF noise and provide for a large enough gain bandwidth product to accommodate real-time SD/HD picture quality requirements.

The instrumentation package assembly's network transceiver electronics also provides a wireless means for the instrumented baseball home plate to receive command and control radio signals from the remote base station. The remote base station is disclosed in FIG. 59A and FIG. 59B and FIG. 61A and FIG. 61B. The instrumentation package assembly assembly's 11 battery pack is wirelessly inductively charged before and during games on an as needed basis, using the battery pack charging station units disclosed in the preferred embodiment shown in FIG. 37A and FIG. 37B and FIG. 37C. The battery pack charging station unit is placed on the top of the instrumented baseball base when it is charging the battery pack. Charging of the battery pack specified in FIG. 34A and FIG. 34B and FIG. 34C is accomplished wirelessly by inductive coupling. The instrumented baseball home plate's two pairs of inductive pickup coils act as the secondary windings of an air core transformer. Time varying magnetic flux is furnished to the two pairs of inductive pickup coils by the primary windings of the battery pack charging station unit.

The antennas 25, 26, 27, and 28 are deployed below the upper protective cover plate 23 inside the instrumented baseball home plate. The antennas form a phased array. The radiation pattern from the phased array antennas 25, 26, 27, and 28 can be maximized to radiate and receive preferentially in the direction of the pickup antenna used by the remote base station. This reduces the noise in the transmission link.

The instrumentation package assembly 11 has two flexible corrugated bellows skin sections like 14. The height of the instrumentation package assembly 11 is approximately ⅓ the thickness of the instrumented baseball home plate.

The two corrugated bellows segments like 14 of the instrumentation package assembly 11 connect the outer portion of the instrumentation package assembly 11 with its central body hub. The two corrugated sections like 14 of the instrumentation package assembly 11 allows the instrumentation package assembly 11 to flex, stretch and compress when the instrumented baseball home plate is impacted. This enables the instrumentation package assembly 11 to resist shock and vibration. Additionally, the two corrugated sections allow the instrumentation package assembly 11 to act as a spring and compress or expand its length without damaging its contents. When circumstances arise where the players tend to crush the instrumented baseball home plate, the instrumentation package assembly will compress or expand and take the shock without damaging or misaligning its contents.

The rubber encapsulating material 19 provides shock absorbing padding between the upper protective cover plate 23 and the instrumentation package assembly 11. A purpose of the encapsulating material is to cushion the blows to the instrumented baseball home plate that would otherwise result in damaging shock and vibration to the instrumentation package assembly 11 and its contents. The rubber encapsulating material 19 also provides protection for the instrumentation package assembly 11 from dirt, moisture and the environment.

The z-axis 30 of the instrumented baseball home plate is orthogonal to the x and y axes 2 and 15 respectively, of the instrumented baseball home plate.

Each of the microphones 33 and 34 listens for sounds from their respective sides of the instrumented baseball home plate. The condenser microphones enable the viewing audience to hear real-time contacts, impacts and shocks to the instrumented baseball home plate. Microphones 33 and 34 enable the TV audience to hear sounds that result from air or any physical contacts or vibrations to the instrumented baseball home plate; like for example, the crash of a player sliding into the instrumented baseball home plate.

Microphone 43 protrudes through a hole in the top of the instrumented baseball home plate.

Microphone 43 is mounted through a hole in the upper protective cover plate. Microphone 46 is connected by cable to electrical connector 44. 44 is connected to the electronics in the instrumentation package assembly 18. Microphone 43 enables the TV audience to hear sounds that occur on the baseball playing field. Microphone 43 enables the TV audience to hear the whoosh of air as a pitched baseball passes above the instrumented baseball home plate.

Simultaneously live 3D TV pictures are taken by the TV cameras 35 and 36 of their respective field of views of the live action on the playing field. Cameras 35 and 36 will enable the TV audience to see a right or left handed batter swing his bat, up close, to strike the baseball as it whizzes bye above the instrumented baseball home plate. Microphone 43 enables the TV audience to hear sounds like the rush of the air as the batter swings his bat. The TV audience will hear the loud high fidelity crack of the bat as it strikes the baseball. The TV audience will see the baseball come toward them from the pitcher's hand as if the audience themselves were standing at the plate. The TV audience will see a close-up of the baseball right in front of them the moment it is hit by the bat. It will seem to the audience like they themselves hit the baseball. This will be an action packed event never before witnessed by a TV audience. Some members of the TV audience will flinch as the baseball is pitched near to them. Each of the pitched baseballs will produce breath taking excitement and expectations by the TV viewing audience. The TV audience will see the baseball as it travels outward from the bat onto the playing field. The TV audience will see the baseball get smaller as it gets further away from the instrumented baseball home plate and the batter. The audience will see and hear the batter drop his bat and scramble toward first base. The TV audience will hear the thud of the bat after the batter releases it and it hits the ground. The TV audience will hear the scraping by the batter's cleats on the ground as he scrambles to first base. The TV audience will see the size of the batter grow smaller as he runs toward first base and gets further away from home plate. In summary, the instrumented baseball home plate provides video and sound to the viewing audience that is so exciting and realistic that it makes the individual members of the audience feel that they are at bat and in the game. In many ways this is more exciting than viewing the game in person from the stands of the baseball stadium.

The present invention contemplates the instrumented baseball home plate's battery pack being wirelessly charged by a charging station unit shown in FIG. 37A and FIG. 37B and FIG. 37C.

The diameter of the instrumentation package assembly 11 is kept to a minimum in order to minimize its footprint inside the instrumented baseball home plate. The dimension of the outside diameter of the instrumentation package assembly 11 (not including the four antennas) is governed largely by the physical diagonal dimension of the largest components within the instrumentation package assembly 11, like the SD/HD camera's CCD sensor array and the battery pack.

The battery's charging coil pairs 5 and 6 are wound on the outside diameter of the instrumentation package assembly 11 at both the top and bottom of its central hub and act electrically as a transformer's secondary windings. The coils are wound on the outside diameter of the instrumentation package assembly 11 to keep any heat they may produce away from the contents of the instrumentation package assembly 11 while the battery pack is being charged. The number of turns in each charging coil pair 5 and 6 is made large enough to enable them to inductively couple a sufficient number of magnetic lines of flux from the primary coil of the battery charging station so as to charge the battery pack in a reasonably short time before games. When the charging station is placed on top 8 of the instrumented baseball home plate, the charging coil pairs 5 and 6 receive electrical energy inductively coupled from the primary coils of the charging station, and use this energy to charge the battery pack.

In certain venues where stereo 3-D is not required from the instrumented baseball plate, the stereo 3-D camera pair that typically has two identical lenses 37 and 38 may be replaced with two dissimilar lenses having different focal length ranges and fields of view for example. Under these same circumstances, the identical cameras 35 and 36 of the 3-D stereo camera pair may be replaced with two dissimilar cameras. For example, the 3-D stereo camera pair that faces the batter from the top of an instrumented baseball home plate may be considered to be non-essential by the cameraman. Instead, the cameraman may elect to set two dissimilar focal lengths into the lenses 37 and 38 facing the batter. One lens, 37 for example, may be set to a long focal length for close-up facial expressions of the batter, where the other lens 38 may be set to a short focal length for wider shots.

In a further preferred embodiment, the present invention referring to FIG. 52A and FIG. 52B contemplates an instrumented baseball home plate, which when stationed off of any baseball playing field i.e. at the traditional home plate location in the pitcher's bullpen, can wirelessly and/or by fiber optics cable and/or by copper coaxial cable communication links, autonomously televise baseball pitching practice and warm-up sessions under command and control of the remote base station. The remote base station is disclosed in FIG. 59A and FIG. 59B and FIG. 60A and FIG. 60B and FIG. 61A and FIG. 61B, and FIG. 64A and FIG. 64B, and FIG. 64C. In addition to adding an element to the entertainment of the TV viewing audience, the embodiment serves to aid the pitchers and the pitching coaches in evaluating the quality of the pitcher's progress, prowess, fitness and "stuff".

The instrumented baseball home plate is an example of static instrumented sports paraphernalia. For televising games from off the playing field, for example in the pitcher's bullpen, refer to FIG. 64C which is a top view of a general sports stadium that has been configured and equipped for use with both static and dynamic instrumented sports paraphernalia, using both bi-directional wireless radio wave communication links and/or bi-directional fiber optics cable/copper cable communication links.

The cameraman, in the remote base station, software selects either the wireless mode of communication, and/or the fiber optics/copper cable mode of communication between each of the instrumented baseball home plates and the remote base station. The cameraman can use whichever equipment (antenna array relay junction or fiber optics cable/copper cable) is installed in the stadium with which to command and control his choice and communicate it to the instrumented baseball home plates on the stadium playing field. These choices are also physically switch selectable by the cameraman with his access through the opening in the bottom of the instrumented baseball home plates. Refer to FIG. 59A and FIG. 59B, and FIG. 60A and FIG. 60B, and FIG. 61A and FIG. 61B, and FIG. 64A and FIG. 64B and FIG. 64C for disclosures regarding the remote base station and the antenna array relay junction.

The cameraman selects items from a software menu of control commands that go to the network transceiver at the remote base station that are subsequently transmitted to the instrumented baseball home plates for the purpose of adjusting various system initializations, operating parameters, radio frequency, polling system status data such as battery condition, and initiating remote mechanical adjustments such as camera focus, optical zoom, iris and movement to the cameras' field of view, etc over the selected bi-directional communications link i.e. wireless radio, fiber optics or copper cable connectivity being used within the particular sports stadium.

These commands, when intercepted by the network transceiver within the instrumented baseball home plates are applied to its microprocessor, which then in turn upon executing the instructions stored within the contents of its firmware applies a pulse coded control signal via the power and control interconnect interface inside the instrumentation package to the corresponding electronics i.e. the mechanical actuators that provides optical focus and/or zoom adjustment of the cameras and microphone gain and selection, etc as desired by the cameraman and/or special software running on the computer at the remote base station. The power and control interconnect interface as shown in FIG. 33E (item 21), which is represented by dotted lines, consists of the electrical control wiring to and from the electronic components of the instrumented baseball home plates that are being controlled.

Referring to the Preferred Embodiments Specified in FIG. 52A and FIG. 52B, the Instrumented Baseball Home Plate Satisfies all of the Following Objectives:

It is an objective of the present invention to instrument a baseball home plate composed of an instrumentation package assembly, buffer plate assembly, encapsulation cushioning material, upper protective cover plate, and lower protective cover plate. It is an objective of the present invention to instrument the pitcher's bullpen with an instrumented baseball home plate. It is an objective of the present invention to provide the TV viewing audience with 3-D stereo pictures and stereophonic sound.

FIG. 53A and FIG. 53B and FIG. 53C

The detailed physical elements disclosed in the instrumented baseball home plate drawings shown in FIG. 53A and FIG. 53B and FIG. 53C are identified as follows: 1 is the y-axis of camera 43. 2 is the y-axis of symmetry of the instrumented baseball home plate. 3 is the y-axis of camera 44. 4 is the instrumented baseball home plate. 5 is a lower induction coil used to charge the battery pack inside the instrumentation package assembly. 6 is a lower induction coil used to charge the battery pack inside the instrumentation package assembly. 7 is a plane-parallel-flat optical window. 8 is the top of the instrumented baseball home plate. 9 is the side of the instrumented baseball home plate. 10 is the side of the instrumented baseball home plate. 11 is the central hub of the instrumentation package assembly containing the battery pack. 12 is the Type XI buffer plate. 13 is the bottom of the instrumented baseball home plate. 14 is the bellows segment of the instrumentation package assembly. 15 is the x-axis of symmetry of the instrumented baseball home plate. 16 is the bottom of the central instrumentation package assembly. 17 is the side of the central instrumentation package assembly. 18 is the top of the central instrumentation package assembly. 19 is the top of the instrumented baseball home plate. 20 is the plane-parallel-flat optical window. 21 is the front side of the instrumented baseball plate and faces the pitcher. 22 is the right side of the instrumented baseball plate. 23 is the upper protective cover plate. 24 is the lower protective cover plate. 25 is a wireless radio antenna. 26 is a wireless radio antenna. 27 is a wireless radio antenna. 28 is a wireless radio antenna, 29 is the z-axis of the camera whose optical window is 20. 30 is the z-axis of the instrumentation package assembly and the instrumented baseball home plate. 31 is the z-axis of the camera whose optical window is 7. 32 is a fiber optics/copper cable connector in the bottom of the instrumentation package assembly. 33 is a lower induction coil. 34 is a lower induction coil. 35 is an optical window. 36 is an optical window. 37 is the z-axis of the camera whose optical window is 35. 38 is the z-axis of the camera whose optical window is 36. 39 is the bellows section of the instrumentation package assembly belonging to optical window 36. 40 is the bellows section of the instrumentation package assembly belonging to optical window 35. 41 is a camera. 42 is a camera. 43 is a camera. 44 is a camera. 45 is a camera lens. 46 is a camera lens. 47 is a camera lens. 48 is a camera lens. 49 is a microphone. 50 is a microphone. 51 is a gas valve. 52 is an access lid heat sink. 53 is a microphone. 54 is the microphone cable. 55 is the microphone connector. 56 is the battery pack.

FIG. 53A is the top view of a four camera instrumented baseball home plate.

FIG. 53B is the side view of a four camera instrumented baseball home plate.

FIG. 53C is the side view of a four camera instrumented baseball home plate.

Referring to drawings FIG. 53A and FIG. 53B and FIG. 53C, in a preferred embodiment, the present invention contemplates an instrumented baseball home plate, which when stationed on any baseball playing field at any traditional home plate location, can both wirelessly and/or by using fiber optics/copper cable connectivity, and autonomously televise baseball games under the command and control of the remote base station. The remote base station is disclosed in FIG. 59A and FIG. 59B and FIG. 60A and FIG. 60B and FIG. 61A and FIG. 61B.

The only substantial difference between the instrumented baseball home plate shown in FIG. 53A and FIG. 53B and FIG. 53C and the one shown in FIG. 52A and FIG. 52B is that the instrumented baseball home plate in FIG. 53A and FIG. 53B and FIG. 53C uses four cameras rather than two, where the cameras shown in FIG. 53A and FIG. 53B and FIG. 53C are arranged into two 3-D stereo camera pairs rather than one.

The instrumented baseball home plate employs a four camera instrumentation package assembly substantially identical to the instrumentation package assembly shown in FIG. 35A and FIG. 35B and FIG. 35C. It uses the Type XII buffer plate assembly shown in FIG. 21ZZA and FIG. 21ZZB and FIG. 21ZZC. It uses the upper protective cove plate shown in FIG. 58. Four instrumentation package assembly elements are primary parts of the instrumentation package assembly. The instrumentation package assembly uses the identical instrumentation package assembly elements disclosed in FIG. 33D.

The preferred embodiment specifying the fiber optics cable/copper cable transmission link is disclosed in FIG. 60A and FIG. 60B and FIG. 61A and FIG. 61B.

The preferred embodiment specifying the radio transmission link is disclosed in FIG. 59A and FIG. 59B.

The instrumented baseball home plate is instrumented with the instrumentation package assembly disclosed in FIG. 35A and FIG. 35B and FIG. 35C.

Details of instrumentation package assembly elements are shown in FIG. 33D.

As with the previous preferred embodiment shown in FIG. 52A and FIG. 52B, the present preferred embodiment shown in FIG. 53A and FIG. 53B and FIG. 53C provides the TV viewing audience with 3-D stereo pictures and stereophonic sound.

The fiber optics cable/copper cable transmission link is disclosed in the preferred embodiment shown in FIG. 60A and FIG. 60B. The fiber optics cable/copper cable transmission link is disclosed in another preferred embodiment shown in FIG. 61A and FIG. 61B.

It is understood that as the state of the art in TV camera technology advances, that there will be other better TV cameras that use other than CCD technology. The present invention will work equally well with them as they become available. Therefore, the present invention uses CCD TV cameras as an example of TV cameras that may be used simply because they are the best that today's technology offers, and is not confined only to their sole use in the future.

Referring to the disclosed instrumented baseball home plate shown in FIG. 53A and FIG. 53B and FIG. 53C, the instrumented baseball home plate has one instrumentation package assembly 11 mounted inside the plate. Details of instrumentation package assembly 11 are specified in FIG. 35A and FIG. 35B and FIG. 35C. The white rubber top 8 of both the instrumented baseball home plate and the conventional baseball home plate are identical, having the same size, shape, color and texture.

The instrumentation package assembly 11 carries four CCD sensor arrayed cameras 41, 42, 43, and 44. The instrumentation package assembly 11 carries two microphones 49 and 50. The four cameras 41, 42, 43, and 44 in the instrumentation package assembly 11 are arranged into two pairs 41, 42 and 43, 44. The first 3-D stereo camera pair is comprised of cameras 41 and 42. The second 3-D stereo camera pair is comprised of cameras 43 and 44. The pairs of cameras 41, 42 and 43, 44 act electronically and independently to simultaneously produce two 3-D stereo TV pictures of the game. Each of the cameras 41 and 42 that form the first 3-D stereo camera pair 41, 42 are separated by an interpupillary distance. Each of the cameras 43 and 44 that form the second 3-D stereo camera pair 43, 44 are separated by an interpupillary distance.

The linear distance separation of the optical axes of the two camera lenses that make up the stereo camera pair is an important function of the buffer plate. For the buffer plate, the distance measured between the axes is defined as the interpupilarly distance between the camera lenses.

We note here for reference that for modern commercial 3-dimensional cameras, the range of settings for the interpupillary distance is adjustable from 44 to 150 mm. Following the range of settings referenced for modern commercial 3-dimensional cameras, the size of the buffer plate interpupillary distance is made to accommodate an interpulilary distance range of 44 to 150 mm also. Therefore, the axial separation between each stereo pair of camera lenses can vary from 44 to 150 mm. How far you are intending to view the pictures from requires a certain separation between the cameras. This separation is called stereo base or stereo base line and results from the ratio of the distance to the image to the distance between your eyes. The mean interpupillary distance (IPD) is 63 mm (about 2.5 inches) for humans, but varies with age, race and gender. The vast majority of adults have IPDs in the range 50-75 mm. Almost all adults are in the range 45-80 mm. The minimum IPD for children as young as five is around 40 mm.

It is understood that other alternative interpupillary distances may be used to produce other alternative 3-D effects. For example, larger interpupillary distance will produce more striking 3-D effects.

The 3-D stereo camera pair 41 and 42 in the instrumentation package assembly 11 that forms the first 3-D stereo camera pair, has optical windows 35 and 36 respectively. The 3-D stereo camera pair 43 and 44 in the instrumentation package assembly 11 that forms the second 3-D stereo camera pair has optical windows 20 and 7 respectively. The two cameras 41 and 42 in the instrumentation package assembly 11 that form the first 3-D stereo camera pair have optical axes 37 and 38. The two cameras 43 and 44 in the instrumentation package assembly 11 that form the second 3-D stereo camera pair have optical axes 29 and 31. The interpupillary distance for both of the 3-D stereo camera pairs is identical.

It should be noted here that it is not mandatory that the interpupillary distances for the first and second 3-D stereo camera pairs be made identical in all embodiments. In another preferred embodiment, they are deliberately made different in order to produce a deliberate difference in 3-D sensations as experienced by the TV viewing audience. Referring to FIG. 53B and FIG. 53C, the lines of sight of the first and of the second 3-D stereo camera pairs, are both looking straight upward from the top 8 of the instrumented baseball home plate along their respective optical axes. Their lines of sight are all parallel to one another.

The SD/HD letter box picture formats of cameras 41 and 42 are aligned together. The SD/HD letter box picture formats of cameras 43 and 44 are aligned together.

The instrumented baseball home plate has two protective cover plates 23 and 24 embedded and molded into it. One protective cover plate 23 is on the top and one 24 is on the bottom of the instrumented baseball home plate. The outer body of the top protective cover plate 23 is made spherically dome shaped. The entire body of the bottom protective cover plate 24 is made flat and has rounded edges like the edges on the top protective cover plate 23.

The materials chosen for the protective cover plates 23 and 24 in the present preferred embodiment are polycarbonates, ABS or fiber reinforced plastics. Although a variety of other materials would function almost equally as well. Polycarbonates, ABS or fiber reinforced plastics have an advantage in that they are lightweight and stiff, enabling their thickness to remain thin while still delivering the significant stiffness needed to perform their mechanical shielding function in the limited space they can occupy within the instrumented baseball home plate. They have an additional advantage in that they are transparent to the transmitted and received radio waves which need to move to and from the antennas 25, 26, 27 and 28 inside the instrumented baseball home plate without absorption or reflection.

The instrumentation package assembly 11 is sandwiched between the top and bottom protective cover plates 23 and 24. The purpose of these protective cover plates 23 and 24 is to act as mechanical shields to protect the instrumentation package assembly 11 from being damaged during the game. During the normal course of the game, the top 8 of the instrumented baseball home plate will be hit and crushed by the players and by their equipment. For example, the players may step on the instrumented baseball home plate or slide into it. They may even drop their bat on it. The two protective cover plates 23 and 24 protect the instrumentation package assembly 11 within the instrumented baseball home plate from physical damage due to these hits.

The space between the top 8, bottom 13 and sides of the instrumented baseball home plate and the protective cover plates 23 and 24 is filled with white rubber encapsulating material 19. Synthetic rubber is an example of encapsulating material that is used. When cured, this encapsulating material 19 acts as cushioning to absorb shock and vibration to the instrumented baseball home plate. The material 19 encapsulates the upper and lower protective cover plates 23 and 24 and maintains their positions inside the molded instrumented baseball home plate. The space between the protective cover plates 23 and 24 and the instrumentation package assembly 11 is also filled with the same encapsulating material. When cured, this encapsulating material 19 acts as cushioning to absorb shock and vibration to the instrumentation package assembly 11. The material 19 encapsulates the instrument package assembly 11 inside the instrumented baseball home plate and thereby maintains its position inside the molded instrumented baseball home plate.

The top protective cover plate 23 is made flat in its innermost region close to the optical windows 35, 36 and 20, 7. The purpose of making it flat in its innermost region is to provide maximum protection for the optical windows 35, 36 and 20, 7 whose surfaces are at the very top 8 of the instrumented baseball home plate. The flat shape enables the protective cover plate 23 to surround the optical windows 35, 36 and 20, 7 at the top 8 of the instrumented baseball home plate where the optical windows 5, 36 and 20, 7 are most likely to be exposed to the greatest threat of damage due to hits to the top of the instrumented baseball home plate. The upper protective cover plate 23 is buried in encapsulating material at the center top of the instrumented baseball home plate around the optical windows 35, 36 and 20, 7 by approximately 1/32 inch or more below the top 8. The dome shape enables the upper protective cover plate 23 to come very close to the top center of the instrumented baseball home plate where the players will have only grazing contact with its curved surface if they crash into the instrumented baseball home plate, thereby eliminating the threat of injury to the players if they hit the top of the instrumented baseball home plate. Furthermore, the spherical shape of the protective cover plate 23 causes its edge to be rounded downward away from the top 8 and places it approximately 1 inch or more below the top surface 8 of the instrumented baseball home plate.

The upper protective cover plate 23 protects the instrumentation package assembly 11 from being crushed and damaged by the players during the game. The instrumentation package assembly is located below the upper protective cover plate 23 inside of the instrumented baseball home plate. In order to achieve its purpose, the upper protective cover plate 23 must be stiff. The entire volume between the top 8 of the instrumented baseball home plate 4 and the upper protective cover plate 23 is filled with a resilient encapsulation padding material 19. The entire volume between the upper protective cover plate 23 and the instrumentation package assembly 11 is filled with the same resilient encapsulation padding material 19. The domed shape of the upper protective cover plate 23 is very important. It completely covers and wraps the instrumentation package assembly 11 and its radio antennas 25, 26, 27, and 28, which are below it, and diverts trauma and forces that occur to the top 8 of the instrumented baseball home plate 4 during the game away from the instrumentation package assembly 11 and its antennas 25, 26, 27, and 28. The outer edge of the upper protective cover plate 23 is bent downward and past the outermost tips of the radio antennas 25, 26, 27, and 28 to protect them. The curvature of the upper protective 23 cover plate 23 is made large enough so that the dome completely covers around them. The dome shape allows the thickness of the padding 19 between the top 8 of the instrumented baseball home plate 4 and the upper protective cover plate 23 to increase as the radial distance from the center 13 of the instrumented home plate 4 increases outwardly.

The lower protective cover plate 24 is entirely flat and is buried in encapsulating material 19 approximately ½ inch or more above the bottom surface of the instrumented baseball home plate. The body of the lower protective cover plate 24 is made flat because it is buried in the ground and there is no danger of the players coming into violent contact with it. The flat shape is easier to make and less expensive to manufacture. Its thickness is also made in the range of approximately ¼ to ½ inches. The thickness of the lower protective cover plate 24 is not physically restrained because of its location, as is the case with the upper protective cover plate 23.

In all cases, the rounded edges of the protective cover plates 23 and 24 come within no less than ¼ inch or more from all sides of the instrumented baseball home plate.

The first 3-D stereo camera pair 41 and 42 is aligned together within their instrumentation package assembly 11 so that they yield wirelessly transmitted upright 3-D stereo images of objects which appear between the center and the bottom of the TV picture frame. The second 3-D stereo camera pair 43 and 44 is aligned together within their instrumentation package assembly 11 so that they yield wirelessly transmitted upright 3-D stereo images of objects which appear between the center and the bottom of the TV picture frame. This can be accomplished in any one of four different modes. Each of these modes conveys its own spectacular viewing angle of the game to the TV viewing audience. The first two of these four modes is achieved by physically rotating the cameras 41 and 42 and their lenses 45 and 46 about their optical axes 37 and 38 respectively by using an actuating device that is mechanically coupled to the cameras 41 and 42 and lenses 45 and 46 inside the instrumentation package assembly 11. The second two of these four modes is achieved by physically rotating the cameras 43 and 44 and their lenses 47 and 48 about their optical axes 29 and 31 respectively by using an actuating device that is mechanically coupled to the cameras 43 and 44 and lenses 47 and 48 inside the instrumentation package assembly 11. Two different mechanical actuating devices are used. The first mechanical actuating device controls the two modes of the first 3-D stereo camera pair. The second mechanical actuating device controls the two modes of the second 3-D stereo camera pair. The first mechanical actuating device that controls the two modes of the first 3-D stereo camera pair has two detented positions that are 180 degrees apart. The second mechanical actuating device that controls the two modes of the second 3-D stereo camera pair has two detented positions that are 180 degrees apart. The mechanical actuating devices are housed within the camera's instrumentation package assembly 11. The first mechanical actuating device can rotate the cameras 41 and 42 and lenses 45 and 46 together to any one of its two stops. The second mechanical actuating device can rotate the cameras 43 and 44 and lenses 47 and 48 together to any one of its two stops. The cameraman in the remote base station selects which of the two modes is to be employed for the first 3-D stereo camera pair, and sends a signal to the instrumentation package assembly 11 to set the cameras 41 and 42 and lenses 45 and 46 to the desired mode he selected. The cameraman in the remote base station selects which of the two modes is to be employed for the second 3-D stereo camera pair, and sends a signal to the instrumentation package assembly 11 to set the cameras 43 and 44 and lenses 47 and 48 to the desired mode he selected.

In the first mode, the cameras 41 and 42 and lenses 45 and 46 are aligned in rotation inside their instrumentation package assembly 11 by the first mechanical actuating device so that the TV viewing audience sees the stadium horizon in the outfield near the bottom edge of the 3-D TV picture frame. (This is equivalent to what a person having two eyes would see visually if he were laying flat down on the playing field with his head resting on the instrumented baseball home plate and looking upward with his feet facing the pitcher.) The stadium horizon appears horizontal in the picture frame at the very bottom center of the TV picture frame. The pitcher appears to be standing upright on his mound just above the bottom center of the picture. When the pitcher throws the baseball to the catcher, the TV audience will see the baseball approaching the center of the TV picture frame from the bottom center of the 3-D TV picture frame. The size of the baseball grows larger as it gets closer to the instrumented baseball home plate and the batter. Since the cameras 41 and 42 are physically located below the batter inside the instrumented baseball home plate, an image of the underside of batter's chin and sweaty arm pits will occupy the center of the 3-D TV picture frame.

In the second mode, the cameras 43 and 44 and lenses 47 and 48 are aligned in rotation inside their instrumentation package assembly 11 by the second mechanical actuating device so that the TV viewing audience sees the stadium horizon in the outfield near the right side of the 3-D TV picture frame. (This is equivalent to what a person having two eyes would see visually if he were laying flat down on the playing field with his head resting on the instrumented baseball home plate and looking upward with his feet facing a right handed batter standing on side 52 of the instrumented baseball home plate.) The right handed batter appears to be standing upright with his feet just above the bottom of the 3-D TV picture frame. When the pitcher throws the baseball to the catcher, the TV audience will see the baseball approaching the center of the 3-D TV picture frame from the right of the 3-D TV picture frame. The size of the baseball grows larger as it gets closer to the instrumented baseball home plate and the batter. Since the cameras 43 and 44 are physically located below the batter inside the instrumented baseball home plate, an image of the underside of batter's chin and sweaty arm pits will occupy the center of the 3-D TV picture frame.

In the third mode, the cameras 41 and 42 and lenses 45 and 46 are aligned in rotation inside its instrumentation package assembly 11 by the first mechanical actuating device so that the TV viewing audience sees the stadium horizon in the outfield at the top of the 3-D TV picture frame. (This is equivalent to what a person would see visually if he were laying flat down on the playing field with his head resting on the instrumented baseball home plate and looking upward with his feet facing the catcher.) The stadium outfield horizon appears horizontal in the 3-D TV picture frame at the top of the 3-D TV picture frame. The pitcher appears to be standing on his mound with his feet near the top of the 3-D TV picture frame. When the pitcher throws the baseball to the catcher, the TV audience will see the baseball approaching the center of the TV picture frame from the image of the pitcher's hand which is near the top of the 3-D TV picture frame. The size of the baseball grows larger as it gets closer to the instrumented baseball home plate and the batter. Since cameras 41 and 42 are below the batter, a 3-D image of the underside of batter's chin and sweaty arm pits will occupy the right side of the 3-D TV picture frame. The microphones 32 and 33 will enable the TV audience to hear the whoosh of air as the baseball passes above the instrumented baseball home plate. Cameras 41 and 42 will enable the TV audience to see the batter swing his bat, up close, to strike the baseball as it whizzes by above the instrumented baseball home plate. The microphones 49 and 50 will enable the TV audience to hear the rush of the air as he swings his bat. The TV audience will hear the loud crack of the bat as it strikes the baseball. The TV audience will see the baseball the moment it is hit by the bat. This will be an action packed event never before witnessed by a TV audience. Each of the pitched baseballs will produce breath taking excitement and expectations by the TV viewing audience.

Cameras 41 and 42 will enable the TV audience to see the baseball as it travels outward from the crack of the bat onto the playing field. The TV audience will see the baseball get smaller as it gets further away from the instrumented home plate and the batter. The image of the baseball will move away from the center of the TV picture frame after it is hit. The TV audience will see the batter drop the bat and scramble toward first base. The image of the bat will grow in size and appear to the TV viewing audience as though it was going to hit them in the face as it careens down on and strikes the instrumented baseball home plate. Members of the TV viewing audience will duck to avoid being hit by the bat. The TV audience will hear the thud of the bat after the batter releases it and it hits the instrumented baseball home plate. The TV audience will hear the scraping by the batter's cleats on the ground as he scrambles to first base. The TV audience will see the size of the batter grow smaller as he runs toward first base and gets further from home plate.

In the fourth mode, the cameras 43 and 44 and lenses 47 and 48 are aligned in rotation inside its instrumentation package assembly 11 by the second mechanical actuating device so that the TV viewing audience sees the stadium horizon in the outfield at the left side of the 3-D TV picture frame. (This is equivalent to what a person would see visually if he were laying flat down on the playing field with his head resting on the instrumented baseball home plate and looking upward with his feet facing a left handed batter standing on side 22 of the instrumented baseball home plate.) The pitcher appears to be standing on his mound toward the left hand side of the 3-D TV picture frame. When the pitcher throws the baseball to the catcher, the TV audience will see the baseball approaching the center of the TV picture frame from the image of the pitcher's hand which is left of center of the TV picture frame. The size of the baseball grows larger as it gets closer to the instrumented baseball home plate and the batter. Since the camera is below the batter, an image of the underside of batter's chin and sweaty arm pits will appear below the center of the 3-D TV picture frame. Microphones 49 and 50 will enable the TV audience will hear the whoosh of air as the baseball passes above the instrumented baseball home plate. The TV audience will see the batter swing his bat, up close, to strike the baseball as it whizzes by. The TV audience will hear the rush of the air as the batter swings his bat. The TV audience will hear the loud crack of the bat as it strikes the baseball. The TV audience will see the baseball the moment it is hit by the bat. This will be an action packed event never before witnessed by a TV audience. Each of the pitched baseballs will produce breath taking excitement and expectations by the TV viewing audience. The TV audience will see the baseball as it travels outward from the crack of the bat onto the playing field. The TV audience will see the baseball get smaller as it gets further away from the instrumented home plate and the batter. The image of the baseball will move away from the center of the 3-D TV picture frame after it is hit. The audience will see the batter drop the bat and scramble toward first base. The image of the bat will grow in size and appear to the TV viewing audience as though it was going to hit them in the face as it careens down on and strikes the instrumented baseball home plate. Members of the TV viewing audience will duck to avoid being hit by the bat. The TV audience will hear the thud of the bat after the batter releases it and it hits the instrumented baseball home plate. The TV audience will hear the scraping by the batter's cleats on the ground as he scrambles to first base. The TV audience will see the size of the batter grow smaller as he runs toward first base and gets further from home plate.

In another preferred embodiment, the same four cameras 41, 42, 43, and 44 specified in the previous preferred embodiment in FIG. 53 are used, but instead of arranging the cameras into the two 3-D stereo camera pairs described previously as the first and second 3-D stereo camera pairs, where 41 and 42 constituted the first 3-D stereo camera pair, and where 43 and 44 constituted the second 3-D stereo camera pair, the cameras 41, 42, 43, and 44 are grouped into four additional unique 3-D stereo camera pairs. The four additional 3-D stereo camera pairs are cameras 41 and 43; cameras 43 and 42, cameras 42 and 44; cameras 44 and 41. We will call 41 and 43 the third 3-D stereo camera pair. We will call 43 and 42 the fourth 3-D stereo camera pair. We will call 42 and 44 the fifth 3-D stereo camera pair. We will call 44 and 41 the sixth 3-D stereo camera pair.

As before in the previous embodiment for the first and second 3-D stereo camera pairs, in order to use the 3-D composite pictures from any one of these four additional 3-D stereo camera pairs, the cameras and their lenses that make up the 3-D stereo camera pair must be previously rotated about their optical axes by their respective mechanical actuating mechanisms to pre-set detented positions 180 degrees apart, to align their letterbox formats together before televising the TV pictures. The cameraman in the remote base station will be able to verify that the letterbox formats of the pictures from the two cameras that make up each 3-D stereo camera pair are aligned. The letterbox formats must be aligned so that the resultant composite 3-D picture made up of the pictures from the two 3-D stereo cameras will overlay with proper parallax to produce the required 3-D sensation in the TV viewing audience.

The additional four 3-D stereo pairs of cameras act electronically and independently to simultaneously produce four additional 3-D stereo TV pictures of the game. They use the same electronics as before, and the same lenses as before as in the previous preferred embodiment.

In the previous preferred embodiment, each of the cameras 41 and 42 that formed the first 3-D stereo camera pair 41, 42 are separated by a 75 millimeter interpupillary distance. Each of the cameras 43 and 44 that formed the second 3-D stereo camera pair 43, 44 are separated by 75 millimeters.

It can be seen from simple geometry in FIG. 53A that the interpupillary distance for the third, fourth, fifth and sixth 3-D stereo camera pairs is equal to one half the square root of two times the interpupillary distance for either the first or second 3-D stereo camera pairs. For example, if the interpupillary distance for the first 3-D stereo camera pair is 75 millimeters, then the interpupillary distance for the third 3-D stereo camera pair would be 0.707 times 75 millimeters or 53.03 millimeters.

75 millimeters is the maximum interpupillary distance of the average human's eyes. It is understood that other alternative interpupillary distances may be used to produce other alternative 3-D effects. For example, larger interpupillary distance will produce more striking 3-D effects.

The 3-D stereo camera pair 41 and 43 in the instrumentation package assembly 11 that forms the third 3-D stereo camera pair, has optical windows 35 and 34 respectively.

The 3-D stereo camera pair 43 and 42 in the instrumentation package assembly 11 that forms the fourth 3-D stereo camera pair has optical windows 34 and 36 respectively.

The 3-D stereo camera pair 42 and 44 in the instrumentation package assembly 11 that forms the fifth 3-D stereo camera pair, has optical windows 36 and 7 respectively.

The 3-D stereo camera pair 44 and 41 in the instrumentation package assembly 11 that forms the sixth 3-D stereo camera pair has optical windows 7 and 35 respectively.

The two cameras 41 and 43 in the instrumentation package assembly 11 that form the third 3-D stereo camera pair have optical axes 37 and 29 respectively.

The two cameras 43 and 42 in the instrumentation package assembly 11 that form the fourth 3-D stereo camera pair have optical axes 29 and 38 respectively.

The two cameras 42 and 44 in the instrumentation package assembly 11 that form the fifth 3-D stereo camera pair have optical axes 38 and 31 respectively.

The two cameras 44 and 41 in the instrumentation package assembly 11 that form the sixth 3-D stereo camera pair have optical axes 31 and 37 respectively.

Electronically, mechanically, and optically all of these 3-D stereo camera pairs operate simultaneously. An advantage occurs when an optical window of one of the cameras is obscured by dirt; the remaining cameras can be paired remotely by the operator in the remote base station to continue to produce 3-D imagery for the TV viewers.

Referring to FIG. 53B and FIG. 53C, the lines of sight of the first, second, third, fourth, fifth and sixth 3-D stereo camera pairs are all looking straight upward from the top 8 of the instrumented baseball home plate along their respective optical axes which are all parallel to one another. Their lines of sight are all parallel to one another. The four holes in the top 8 of the instrumented baseball home plate are made just large enough to prevent vignetting of the cameras field of view.

In certain venues where stereo 3-D is not required or deemed useful from the instrumented baseball home plate, a stereo 3-D camera pair that typically has two identical lenses, for example 47 and 48, may be replaced with two dissimilar lenses having different lens settings, focal lengths and fields of view for example. Under these same circumstances, the identical cameras, for example 43 and 44 of the 3-D stereo camera pair may also be replaced with two dissimilar cameras. The 3-D stereo camera pair 43 and 44 that faces the batter from the top of an instrumented baseball home plate may be considered to be non-essential by the cameraman. Instead, the cameraman may elect to set two dissimilar focal lengths into the zoom lenses 47 and 48 facing the batter. One lens, 47 for example, may be set to a long focal length for close-up facial expressions of the batter, where the other lens 48 may be set to a short focal length for wider shots of the batter.

It should be noted at this point, that in general any combination of any two of the four cameras can be electronically commanded and controlled by the cameraman from the remote base station to act as 3-D stereo camera pairs, for example 41 and 42, 41 and 43, 41 and 44, 42 and 43, 42 and 44, 43 and 44.

Each of the microphones 49 and 50 listens for sounds from their respective sides of the instrumented baseball home plate. The condenser microphones enable the viewing audience to hear real-time contacts, impacts and shocks to the instrumented baseball home plate. Microphones 49 and 50 enable the TV audience to hear sounds that result from air or any physical contacts or vibrations to the instrumented baseball home plate; like for example, the crash of a player sliding into the instrumented baseball home plate. The sounds received from each of the microphones by the remote base station are processed using special software to produce surround sound which is broadcast to the TV viewing audience.

Microphone 53 protrudes through a hole in the top of the instrumented baseball home plate. Microphone 53 is mounted through a hole in the upper protective cover plate. Microphone 53 is connected by cable to electrical connector 55. 55 is connected to the electronics in the instrumentation package assembly 18. Microphone 53 enables the TV audience to hear sounds that occur on the baseball playing field. Microphone 53 enables the TV audience to hear the whoosh of air as a pitched baseball passes above the instrumented baseball home plate.

Simultaneously live 3D TV pictures are taken by the TV cameras 41, 42, 43 and 44 of their respective field of views of the live action on the playing field. Cameras 41, 42, 43 and 44 will enable the TV audience to see a right or left handed batter swing his bat, up close, to strike the baseball as it whizzes bye above the instrumented baseball home plate. Microphone 53 enables the TV audience to hear sounds like the rush of the air as the batter swings his bat. The TV audience will hear the loud high fidelity crack of the bat as it strikes the baseball. The TV audience will see the baseball come toward them from the pitcher's hand as if the audience themselves were standing at the plate. The TV audience will see a close-up of the baseball right in front of them the moment it is hit by the bat. It will seem to the audience like they themselves hit the baseball. This will be an action packed event never before witnessed by a TV audience. Some members of the TV audience will flinch as the baseball is pitched near to them. Each of the pitched baseballs will produce breath taking excitement and expectations by the TV viewing audience. The TV audience will see the baseball as it travels outward from the bat onto the playing field. The TV audience will see the baseball get smaller as it gets further away from the instrumented baseball home plate and the batter. The audience will see and hear the batter drop his bat and scramble toward first base. The TV audience will hear the thud of the bat after the batter releases it and it hits the ground. The TV audience will hear the scraping by the batter's cleats on the ground as he scrambles to first base. The TV audience will see the size of the batter grow smaller as he runs toward first base and gets further away from home plate. In summary, the instrumented baseball home plate provides video and sound to the viewing audience that is so exciting and realistic that it makes the individual members of the audience feel that they are at bat and in the game. In many ways this is more exciting than viewing the game in person from the stands of the baseball stadium. In a further preferred embodiment, the present invention referring to FIG. 53A and FIG. 53B contemplates an instrumented baseball home plate, which when stationed off of any baseball playing field i.e. at the traditional home plate location in the pitcher's bullpen can wirelessly and autonomously televise baseball pitching practice and warm-up sessions under command and control of the remote base station. The remote base station is disclosed in FIG. 59A and FIG. 59B and FIG. 60A and FIG. 60B and FIG. 61A and FIG. 61B. In addition to adding an element to the entertainment of the TV viewing audience, the embodiment serves to aid the pitchers and the pitching coaches in evaluating the quality of the pitcher's progress, prowess, fitness and "stuff".

The instrumented baseball home plate is an example of a static instrumented sports paraphernalia. For televising games from off the playing field, for example in the pitcher's bullpen, refer to FIG. 64C which is a top view of a general sports stadium that has been configured and equipped for use with both static and dynamic instrumented sports paraphernalia, using both bi-directional wireless radio wave communication links and/or bi-directional fiber optics cable/copper cable communication links.

A variety of different camera lens types with different lens setting capabilities, focal lengths and fields of view can be used by the cameraman. For example, extremely wide angle lenses that can see down to the horizon can be used. These lens types give the TV viewing audience a dramatic 3-D effect. When enabled by the operator/cameraman in the remote base station, the auto iris setting permits the camera lens to automatically adjust for varying lighting conditions on the field. The auto focus setting permits the camera lens to adjust focus for varying distances of the players and action subjects on the field. The cameraman may elect to control the functions of the camera lenses himself from the remote base station by sending command and control signals from the remote base station to the instrumented baseball home plate.

The cameraman can zoom, focus, and control the iris settings of the camera lenses himself at will from the remote base station.

The cameraman, in the remote base station, software selects either the wireless mode of communication, and/or the fiber optics/copper cable mode of communication between each of the instrumented baseball home plates and the remote base station. The cameraman can use whichever equipment (antenna array relay junction or fiber optics cable/copper cable) is installed in the stadium with which to command and control his choice and communicate it to the instrumented baseball home plates on the stadium playing field. These choices are also physically switch selectable by the cameraman with his access through the opening in the bottom of the instrumented baseball home plates. Refer to FIG. 59A and FIG. 59B, and FIG. 60A and FIG. 60B, and FIG. 61A and FIG. 61B, and FIG. 64A and FIG. 64B and FIG. 64C for disclosures regarding the remote base station and the antenna array relay junction. The cameraman selects items from a software menu of control commands that go to the network transceiver at the remote base station that are subsequently transmitted to the instrumented baseball home plates for the purpose of adjusting various system initializations, operating parameters, radio frequency, polling system status data such as battery condition, and initiating remote mechanical adjustments such as camera focus, optical zoom, iris and movement to the cameras' field of view, etc over the selected bi-directional communications link i.e. wireless radio, fiber optics or copper cable connectivity being used within the particular sports stadium. These commands, when intercepted by the network transceiver within the instrumented baseball home plates are applied to its microprocessor, which then in turn upon executing the instructions stored within the contents of its firmware applies a pulse coded control signal via the power and control interconnect interface inside the instrumentation package to the corresponding electronics i.e. the mechanical actuators that provides optical focus and/or zoom adjustment of the cameras and microphone gain and selection, etc as desired by the cameraman and/or special software running on the computer at the remote base station. The power and control interconnect interface as shown in FIG. 33E (item 21), which is represented by dotted lines, consists of the electrical control wiring to and from the electronic components of the instrumented baseball home plates that are being controlled.

Referring to the Preferred Embodiments Specified in FIG. 53A and FIG. 53B and FIG. 53C, the Instrumented Baseball Home Plate Satisfies All Of The Following Objectives:

It is an objective of the present invention to instrument a baseball home plate composed of a four camera instrumentation package assembly, buffer plate assembly, encapsulation cushioning material, upper protective cover plate, and lower protective cover plate. It is an objective of the present invention to instrument the pitcher's bullpen with an instrumented baseball home plate. It is an objective of the present invention to enable the cameraman in the remote base station to electronically command and control any combination of any two of the four cameras in the instrumented baseball home plate to act as 3-D stereo camera pairs. It is an objective of the present invention that instrumentation package assembly, having a selection of different interpupiliary distances, is chosen by the cameraman before the instrumentation package assembly is encapsulated into the instrumented baseball home plate. It is an objective of the present invention to instrument a baseball home plate composed of an instrumentation package assembly, buffer plate assembly, encapsulation cushioning material, upper protective cover plate, and lower protective cover plate. It is an objective of the present invention to enable the cameraman in the remote base station to electronically command and control any combination of any two of the four cameras in the instrumented baseball home plate to act as a 3-D stereo camera pair. It is an objective of the present invention to align together the cameras that make up a 3-D stereo camera pair within their instrumentation package assembly so that they yield upright 3-D stereo images of objects which appear between the center and the bottom of the TV picture frame by electronically rotating the letterbox picture frames of the cameras about their optical axes using the circular sensor CCD chips disclosed in FIG. 63A and FIG. 63B and FIG. 63C. It is an objective of the present invention to align together the cameras that make up a 3-D stereo camera pair within their instrumentation package assembly so that they yield upright 3-D stereo images of objects which appear between the center and the bottom of the TV picture frame by physically rotating the cameras and their lenses about their optical axes using the actuating device that is mechanically coupled to the cameras and their lenses inside the instrumentation package assembly. It is an objective of the present invention to instrument the pitcher's bullpen with an instrumented baseball home plate. It is an objective of the present invention to televise from the pitcher's bullpen with an instrumented baseball home plate. It is an objective of the present invention to enable coaches who are on the sidelines during training sessions to hear the spoken dialog of their team's players from on the instrumented baseball home plate. It is an objective of the present invention to enable coaches who are on the sidelines during training sessions to view details of the team's players during training sessions on the instrumented baseball home plate. It is an objective of the present invention to enable referees who are on and off the playing field during games to review details of the game from the four cameras onboard the instrumented baseball home plate by instant replay. It is an objective of the present invention to cover and wrap the instrumentation package assembly and its four radio antennas with a domed shaped upper protective cover plate, which is bent downward and past the outermost tips of the radio antennas, to divert trauma and forces that occur to the top of the instrumented baseball home plate away from the instrumentation package assembly during the game in order to protect it. It is an objective of the present invention to equip the instrumentation package assembly to capture video and sounds on the playing field from the instrumented baseball home plate. It is an objective of the present invention to equip the instrumented baseball home plate with an instrumentation package assembly that has four TV cameras, three microphones, four wireless antenna elements, battery pack and supporting electronics housed inside its enclosure. It is an objective of the present invention to equip the instrumentation package assembly inside the instrumented baseball home plate with means to wirelessly televise the captured video and sounds to a remote base station via an antenna array relay junction stationed off the playing field but within (and around) the space of the instrumented sports stadium/arena. The antenna array relay junction is equipped to relay the video and sounds to the remote base station. The remote base station is located within the instrumented sports stadium/arena or its vicinity. It is an objective of the present invention that the instrumented baseball home plate is under the command and control of a cameraman in the remote base station. It is an objective of the present invention to enable the instrumentation package assembly to be mounted inside the instrumented baseball home plate in a manner permitting its four cameras and three microphones to see and hear out of the instrumented baseball home plate. It is an objective of the present invention to enable the instrumentation package assembly to be mounted inside the instrumented baseball home plate in a manner permitting the instrumentation package assembly to be protected from damage during the game. It is an objective of the present invention to enable the instrumentation package assembly to be mounted inside the instrumented baseball home plate in a manner permitting it to maintain its mechanical and optical alignment during the game. It is an objective of the present invention to provide a permanent position and nesting place for the instrumentation package assembly inside the instrumented baseball home plate. It is an objective of the present invention to provide means to permit easy assembly and alignment of the instrumentation package assembly in the instrumented baseball home plate. It is an objective of the present invention to provide the instrumented baseball home plate with the identical handling and playability qualities as conventional regulation baseball home plates. It is an objective of the present invention to provide means to permit the instrumentation package assembly to be nested, cradled and isolated from shock and vibration inside the instrumented baseball home plate. It is an objective of the present invention to provide an instrumentation package assembly that is sized so that it can be easily loaded and assembled into the instrumented baseball home plate. It is an objective of the present invention to provide the instrumented baseball home plate with an instrumentation package assembly that carries its own rechargeable battery pack. It is an objective of the present invention to provide the instrumented baseball home plate with an instrumentation package assembly that carries its own rechargeable battery pack that has sufficient energy to power the cameras, lenses, antennas and electronics for the duration of the game. It is an objective of the present invention to charge the battery pack of the instrumented baseball home plate using the same charging unit as used for instrumented baseball bases; other instrumented baseball home plates, instrumented ice hockey pucks, and instrumented pitcher's rubbers. It is an objective of the present invention to provide the instrumented baseball home plate with instrumentation package assembly electronics that require little power to operate and are lightweight. It is an objective of the present invention to provide the instrumented baseball home plate with an instrumentation package assembly that carries its own battery pack that is recharged wirelessly by induction. It is an objective of the present invention to provide the instrumented baseball home plate with an instrumentation package assembly that can withstand axial and tangential compression and decompression loads exerted on it during play. It is an objective of the present invention that the instrumented baseball home plate will withstand dirt, water, ice and weather conditions. It is an objective of the present invention that the instrumented baseball home plate encapsulation will provide cushioning to protect the instrumentation package assembly from shock and vibration damage. It is an objective of the present invention to provide the instrumented baseball home plate with provisions for holding the instrumentation package assembly in alignment and for cushioning and isolating the instrumentation package assembly from shocks received by the instrumented baseball home plate during the game. It is an objective of the present invention that the optical windows are made small to be unobtrusive to the game without vignetting the field of view of the cameras under the prevailing lighting conditions on the playing field. It is an objective of the present invention that the optical windows withstand heavy blows received during the game and protect the instrumentation package assembly. It is an objective of the present invention that the optical windows be easily removed, replaced and exchanged with substitutes and alternates, and permit the camera lenses to be exchanged with substitutes and alternates as well.

FIG. 54A and FIG. 54B and FIG. 54C

The detailed physical elements disclosed in the instrumented baseball home plate drawings shown in FIG. 54A and FIG. 54B and FIG. 54C are identified as follows: 1 is the y-axis of the camera whose optical window is 20. 2 is the y-axis of symmetry of the instrumented baseball home plate. 3 is the y-axis of the camera whose optical window is 7. 4 is the instrumented baseball home plate. 5 is an upper induction coil used to charge the battery pack inside the instrumentation package assembly. 6 is an upper induction coil used to charge the battery pack inside the instrumentation package assembly. 7 is the plane-parallel-flat optical window. 8 is the left side of the instrumented baseball home plate. 9 is the side of the instrumented baseball home plate. 10 is the side of the instrumented baseball home plate. 11 is the central hub of the instrumentation package assembly containing the battery pack. 12 is the Type XII buffer plate. 13 is the open aperture in the bottom of the instrumented baseball home plate. 14 is the bellows segment of the instrumentation package assembly. 15 (item not shown), 16 is the bottom of the central instrumentation package assembly. 17 is the side of the central instrumentation package assembly. 18 is the top of the central instrumentation package assembly. 19 is the cushioning material inside the instrumented baseball home plate. 20 is the plane-parallel-flat optical window. 21 is the pitcher's side of the instrumented baseball home plate. 22 is the right side of the instrumented baseball home plate. 23 is the upper protective cover plate. 24 is the lower protective cover plate. 25 is a wireless radio antenna. 26 is a wireless radio antenna. 27 is a wireless radio antenna. 28 is a wireless radio antenna. 29 is the optical axis of the camera 50 and whose optical window is 20. 30 is the z-axis of the instrumentation package assembly and the instrumented baseball home plate. 31 is the optical axis of camera 52 whose optical window is 7. 32 is the fiber optics/copper cable connector inside the bottom of the instrumentation package assembly. 33 is an upper induction coil for charging the battery. 34 is an upper induction coil for charging the battery. 35 is an optical window. 36 is an optical window. 37 is the z-axis of camera 41 whose optical window is 35. 38 is the z-axis of camera 42 whose optical window is 36. 39 is the bellows section of the camera whose optical window is 36. 40 is the bellows section of the camera whose optical window is 35. 41 is a camera. 42 is a camera. 43 is a camera. 44 is the tilted optical axis of camera 43. (There is another camera, a fourth camera hidden behind camera 43). 45 is a microphone. 46 is a microphone. 47 is a camera lens seal. 48 is a camera lens seal. 49 is a bellows section. 50 is a camera. 51 is a camera lens. 52 is a camera. 53 is a camera lens. 54 is a camera lens. 55 is the left side of the instrumented baseball home plate. 56 is a gas valve. 57 is an access lid heat sink. 58 is a microphone. 59 is the microphone cable. 60 is the microphone connector. 61 is a battery pack.

FIG. 54A is the top view of a four camera tilted instrumented baseball home plate.

FIG. 54B is the side view of a four camera tilted instrumented baseball home plate.

FIG. 54C is the side view of a four camera tilted instrumented baseball home plate.

Referring to drawings FIG. 54A and FIG. 54B and FIG. 54C, in a preferred embodiment, the present invention contemplates an instrumented baseball base, which when stationed on any baseball playing field at any traditional home plate location, can both wirelessly and/or by using fiber optics/copper cable connectivity, and autonomously televise baseball games under the command and control of the remote base station. The remote base station is disclosed in FIG. 59A and FIG. 59B and FIG. 60A and FIG. 60B and FIG. 61A and FIG. 61B.

The instrumented baseball home plate employs a four camera instrumentation package assembly identical to the instrumentation package assembly shown in FIG. 35A and FIG. 35B and FIG. 35C. It uses the Type XII buffer plate assembly shown in FIG. 21ZZA and FIG. 21ZZB and FIG. 21ZZC. It uses the upper protective cove plate shown in FIG. 58.

Four instrumentation package assembly elements are principal parts of the instrumentation package assembly. The instrumentation package assembly uses the identical instrumentation package assembly elements disclosed in FIG. 33D.

The only substantial difference between the instrumented baseball home plate shown in FIG. 54A and FIG. 54B and FIG. 54C and the one shown in FIG. 53A and FIG. 53B and FIG. 53C is that the instrumented baseball home plate in FIG. 54A and FIG. 54B and FIG. 54C shows one of the two 3-D stereo camera pairs tilted toward the pitcher, whereas FIG. 53A and FIG. 53B and FIG. 53C shows the two 3-D stereo camera pairs pointing straight up. The tilted 3-D stereo camera pair shown can just as easily be tilted toward the catcher. In an alike manner, the remaining 3-D stereo camera pair (shown un-tilted in the drawing) can also just as easily be tilted toward or away from the batter. FIG. 54A and FIG. 54B and FIG. 54C uses two separate buffer plates whereas FIG. 53A and FIG. 53B and FIG. 53C uses only one buffer plate.

The preferred embodiment specifying the fiber optics/copper cable transmission link is disclosed in FIG. 60A and FIG. 60B and FIG. 61A and FIG. 61B.

The preferred embodiment specifying the radio transmission link is disclosed in FIG. 59A and FIG. 59B.

The instrumented baseball home plate is instrumented with the instrumentation package assembly disclosed in FIG. 35A and FIG. 35B and FIG. 35C.

Details of instrumentation package assembly elements are shown in FIG. 33D.

As with the previous preferred embodiment shown in FIG. 53A and FIG. 53B and FIG. 53C, the present preferred embodiment shown in FIG. 54A and FIG. 54B and FIG. 54C provides the TV viewing audience with 3-D stereo pictures and stereophonic sound.

The fiber optics cable/copper cable transmission link is disclosed in the preferred embodiment shown in FIG. 60A and FIG. 60B. The fiber optics/copper cable transmission link is disclosed in another preferred embodiment shown in FIG. 61A and FIG. 61B.

It is understood that as the state of the art in TV camera technology advances, that there will be other better TV cameras that use other than CCD technology. The present invention will work equally well with them as they become available. Therefore, the present invention uses CCD TV cameras as an example of TV cameras that may be used simply because they are the best that today's technology offers, and is not confined only to their sole use in the future.

Referring to the disclosed instrumented baseball home plate shown in FIG. 54A and FIG. 54B and FIG. 54C, the instrumented baseball home plate has one instrumentation package assembly 11 mounted inside the instrumented baseball home plate. Details of instrumentation package assembly 11 are shown in FIG. 35. The white rubber top 8 material 19 of both the instrumented baseball home plate and the conventional baseball home plate are identical having the same size, shape, color and texture. In FIG. 35 the instrumentation package assembly 11 carries four CCD sensor arrayed cameras 41, 42, 50 and 52 and two microphones 45 and 46. The two cameras 41 and 42 in instrumentation package assemblies 11 are arranged side by side and form the first 3-D stereo camera pair. The two cameras 50 and 52 in instrumentation package assembly 11 are arranged side by side and form the second 3-D stereo camera pair. The two cameras 41 and 42 in instrumentation package assemblies 11 that are arranged side by side are separated by an interpupillary distance. The two cameras 50 and 52 in instrumentation package assembly 11 that are arranged side by side are separated by an interpupillary distance. The interpupillary distance is the distance between their two axes 37 and 38.

The linear distance separation of the optical axes of the two camera lenses that make up the stereo camera pair is an important function of the buffer plate. For the buffer plate, the distance measured between the axes is defined as the interpupilarly distance between the camera lenses.

We note here for reference that for modern commercial 3-dimensional cameras, the range of settings for the interpupillary distance is adjustable from 44 to 150 mm. Following the range of settings referenced for modern commercial 3-dimensional cameras, the size of the buffer plate interpupillary distance is made to accommodate an interpulilary distance range of 44 to 150 mm also. Therefore, the axial separation between each stereo pair of camera lenses can vary from 44 to 150 mm.

How far you are intending to view the pictures from requires a certain separation between the cameras. This separation is called stereo base or stereo base line and results from the ratio of the distance to the image to the distance between your eyes. The mean interpupillary distance (IPD) is 63 mm (about 2.5 inches) for humans, but varies with age, race and gender. The vast majority of adults have IPDs in the range 50-75 mm. Almost all adults are in the range 45-80 mm. The minimum IPD for children as young as five is around 40 mm.

The two cameras 41 and 42 are shown having their lines of sight 44 tilted relative to the normal 30 which is perpendicular to the top 8 of the instrumented baseball home plate. The two cameras 50 and 52 are shown having their optical axes 29 and 31 respectively normal to the top 8 of the instrumented baseball home plate. In order for the first 3-D stereo camera pair to be tilted relative to the second 3-D stereo camera pair, the two 3-D stereo camera pairs require two separate buffer plates. For cameras 41 and 42, their interpupillary distance is the distance between their two axes 37 and 38. For cameras 50 and 52, their interpupillary distance is the distance between their two axes 29 and 31. The four holes in the top 8 of the instrumented baseball home plate are made just large enough to prevent vignetting of the cameras field of view.

It is understood that other alternative interpupillary distances may be used to produce other alternative 3-D effects. For example, larger interpupillary distance will produce more striking 3-D effects. In the present preferred embodiment, the interpupillary distances are the same. It is understood that the interpupillary distances of the two 3-D stereo camera pairs in other preferred embodiments do not necessarily have to be the same and may deliberately be chosen to be different in order for the cameraman to achieve different 3-D sensations in the TV viewing audience.

Referring to FIG. 54B, the line of sight 44 of the first 3-D stereo camera pair 41 and 42 whose optical windows are 35 and 36, is tilted toward the pitcher.

As is customary in the game of baseball, side 21 of the instrumented baseball home plate faces the pitcher. The line of sight of the second 3-D stereo camera pair 50 and 52, whose optical windows are 7 and 20, is looking straight upward normal to the top 8 of the instrumented baseball home plate along their respective optical axes 29 and 31.

The instrumented baseball home plate has two protective cover plates 23 and 24 embedded and encapsulated into it. One protective cover plate 23 is on the top and one is on the bottom of the instrumented baseball home plate. The outer body of the top protective cover plate 23 is made spherically dome shaped. The entire body of the bottom protective cover plate 24 is made flat and has rounded edges like the edges on the top protective plate 23.

The materials chosen for the protective cover plates 23 and 24 in the present preferred embodiment are polycarbonates, ABS and fiber reinforced plastics. Other materials would function almost equally as well. Polycarbonates, ABS and fiber reinforced plastics have an advantage in that they are lightweight and stiff, enabling their thickness to remain thin while still delivering the significant stiffness needed to perform their mechanical shielding function in the limited space they can occupy within the instrumented baseball home plate. They have the additional advantage in that they are transparent to the transmitted and received radio waves which need to move to and from the antennas inside the instrumented baseball home plate without absorption or reflection.

The instrumentation package assembly 11 is sandwiched between the top and bottom protective cover plates 23 and 24. The purpose of these protective cover plates 23 and 24 is to act as a shield to protect the instrumentation package assembly 11 from being damaged during the game. During the normal course of the game, the top 8 of the instrumented baseball home plate will be hit and crushed by the players and by their equipment. For example, the players may step on the instrumented baseball home plate or slide into it. They may even drop their bat on it. The two protective cover plates 23 and 24 protect the instrumentation package assembly 11 within the instrumented baseball home plate from physical damage due to these hits.

Around the top 8, bottom 6 and sides of the instrumented baseball home plate, the space between them and the protective cover plates 23 and 24 is filled with encapsulating synthetic white rubber material 19. When cured, this encapsulating material 19 acts as cushioning to absorb shock and vibration to the instrumented baseball home plate. The material 19 encapsulates the upper and lower protective cover plates 23 and 24 and maintains their positions inside the instrumented baseball home plate. The space between the protective cover plates 23 and 24 and the instrumentation package assembly 11 is also filled with the same encapsulating material 19. When cured, this encapsulating material 19 acts as cushioning to absorb shock and vibration to the instrumentation package assembly 11. The material 19 encapsulates the instrument package assembly 11 inside the instrumented baseball home plate and thereby maintains its position inside the instrumented baseball home plate.

The top protective cover plate 23 is spherically dome shaped in its outer region. The purpose of making it spherically dome shaped is to provide maximum protection for the optical windows whose surfaces are at the very top of the instrumented baseball home plate. The inner region of the upper protective cover plate 23 is flat. The flat shape enables the protective cover plate 23 to surround the optical windows 7, 20, 35 and 36 at the top 8 of the instrumented baseball home plate where the optical windows 7, 20, 35 and 36 are most likely to be exposed to the greatest threat of damage due to hits to the top 8 of the instrumented baseball home plate. The upper protective cover plate 23 is buried in encapsulating material 19 at the center top of the instrumented baseball home plate around the optical windows 7, 20, 35 and 36 by approximately 1/32 inch or more below the top 8. The dome shape enables the upper protective cover plate 23 to come very close to the top 8 center of the instrumented baseball home plate where the players will have only grazing contact with its surface if they crash into the instrumented baseball home plate, thereby eliminating the threat of injury to the players if they hit the top 8 of the instrumented baseball home plate.

The spherical shape of the protective cover plate 23 causes its edge to be rounded downward away from the top 8 and places it approximately 1 inch or more below the top 8 surface of the instrumented baseball home plate.

The upper protective cover plate 23 protects the instrumentation package assembly 11 from being crushed and damaged by the players during the game. The instrumentation package assembly is located below the upper protective cover plate 23 inside of the instrumented baseball home plate. In order to achieve its purpose, the upper protective cover plate 23 must be stiff. The entire volume between the top 8 of the instrumented baseball home plate 4 and the upper protective cover plate 23 is filled with a resilient encapsulation padding material 19. The entire volume between the upper protective cover plate 23 and the instrumentation package assembly 11 is filled with the same resilient encapsulation padding material 19. The domed shape of the upper protective cover plate 23 is very important. It completely covers and wraps the instrumentation package assembly 11 and its radio antennas 25, 26, 27, and 28, which are below it, and diverts trauma and forces that occur to the top 8 of the instrumented baseball home plate 4 during the game away from the instrumentation package assembly 11 and its antennas 25, 26, 27, and 28. The outer edge of the upper protective cover plate 23 is bent downward and past the outermost tips of the radio antennas 25, 26, 27, and 28 to protect them. The curvature of the upper protective 23 cover plate 23 is made large enough so that the dome completely covers around them. The dome shape allows the thickness of the padding 19 between the top 8 of the instrumented baseball home plate 4 and the upper protective cover plate 23 to increase as the radial distance from the center of the instrumented home plate 4 increases outwardly.

The lower protective cover plate 24 is flat and is buried in encapsulating material 19 approximately ¼ inch or more above the bottom surface of the instrumented baseball home plate. The body of the lower protective cover plate 24 is made flat because it is buried in the ground and there is no danger of the players coming into violent contact with it. The flat shape is easier to make and less expensive to manufacture. Its thickness is also made in the range of approximately ¼ inches or more. The thickness of the lower protective cover plate 24 is not physically restrained because of its location, as is the case with the upper protective cover plate 23.

In all cases, the edges of the protective cover plates 23 and 24 come to within no less than ¼ inches from all sides of the instrumented baseball home plate.

Referring to the disclosed instrumented baseball home plate shown in FIG. 54A and FIG. 54B and FIG. 54C, the instrumented baseball home plate has one instrumentation package assembly 11 mounted inside it. Details of instrumentation package assembly 11 are shown in FIG. 35. The white rubber material 19 used to construct the instrumented baseball home plate and the conventional baseball home plate is the same. The white rubber top 8 of both the instrumented baseball home plate and the conventional baseball home plate are identical, having the same size, shape, color and texture.

It should be noted here that it is not mandatory that the interpupillary distances for the first and second 3-D stereo camera pairs be made identical in all embodiments. In another preferred embodiment they are deliberately made different in order to produce a deliberate difference in 3-D sensations as experienced by the TV viewing audience.

The 3-D SD/HD letter box picture formats of cameras 41 and 42 are aligned together. The SD/HD letter box picture formats of cameras 50 and 52 are aligned together.

In all cases, the rounded edges of the protective cover plates 23 and 24 come within no less than ¼ inch or more from all sides of the instrumented baseball home plate.

The first camera pair 41 and 42 are aligned together within their instrumentation package assembly 11 so that they yield wirelessly transmitted upright 3-D stereo images of objects which appear between the center and the bottom of the 3-D TV picture frame. The second camera pair 50 and 52 is aligned together within their instrumentation package assembly 11 so that they yield wirelessly transmitted upright 3-D stereo images of objects which appear between the center and the bottom of the 3-D TV picture frame. This can be accomplished in any one of four different modes. Each of these modes conveys its own spectacular viewing angle of the game to the TV viewing audience. The first two of these four modes is achieved by physically rotating the cameras 41 and 42 and their lenses 47 and 48 about their optical axes 37 and 38 respectively by using an actuating device that is mechanically coupled to the cameras 41 and 42 and lenses 47 and 48 inside the instrumentation package assembly 11. The second two of these four modes is achieved by physically rotating the cameras 50 and 52 and their lenses 51 and 53 about their optical axes 29 and 31 respectively by using an actuating device that is mechanically coupled to the cameras 50 and 52 and lenses 51 and 53 inside the instrumentation package assembly 11. Two different mechanical actuating devices are used; one for each 3-D stereo camera pair. The first mechanical actuating device controls the two modes of the first 3-D stereo camera pair. The second mechanical actuating device controls the two modes of the second 3-D stereo camera pair. The first mechanical actuating device that controls the two modes of the first 3-D stereo camera pair has two detented positions that are 180 degrees apart. The second mechanical actuating device that controls the two modes of the second 3-D stereo camera pair has two detented positions that are 180 degrees apart. The mechanical actuating devices are housed within the camera's instrumentation package assembly 11 detailed in FIG. 35.

The first mechanical actuating device can rotate the cameras 41 and 42 and lenses 47 and 48 together to either one of its two stops. The second mechanical actuating device can rotate the cameras 50 and 52 and lenses 51 and 53 respectively together to either one of its two stops. The cameraman in the remote base station selects which of the two modes is to be employed for the first 3-D stereo camera pair 41 and 42, and sends a signal to the instrumentation package assembly 11 to set the cameras 41 and 42 and lenses 47 and 48 to the desired mode he selected. The cameraman in the remote base station selects which of the two modes is to be employed for the second 3-D stereo camera pair 50 and 52, and sends a signal to the instrumentation package assembly 11 to set the cameras 50 and 52 and lenses 51 and 53 to the desired mode he selected.

In the first mode, the cameras 41 and 42 comprising the first 3-D stereo camera pair, and lenses 47 and 48 are aligned in rotation inside their instrumentation package assembly 11 by the first mechanical actuating device so that the TV viewing audience sees the stadium horizon in the outfield near the bottom of the 3-D TV picture frame. (This is equivalent to what a person having two eyes would see visually if he were laying flat down on the playing field with his head resting on the instrumented baseball home plate and looking upward with his feet facing the pitcher.) The outfield stadium horizon appears horizontal in the 3-D TV picture frame at the very bottom of the 3-D TV picture frame. The pitcher appears to be standing upright on his mound just above the bottom center of the picture. When the pitcher throws the baseball to the catcher, the TV audience will see the baseball approaching the center of the TV picture frame from the bottom center of the 3-D TV picture frame. The size of the baseball grows larger as it gets closer to the instrumented baseball home plate and the batter. Since the cameras 41 and 42 are physically located below the batter inside the instrumented baseball home plate, an image of the underside of batter's chin and sweaty arm pits will appear left of the center of the 3-D TV picture frame.

In the second mode, the cameras 50 and 52 comprising the second 3-D stereo camera pair, and lenses 51 and 53 are aligned in rotation inside their instrumentation package assembly 11 by the second mechanical actuating device so that the TV viewing audience sees the stadium horizon in the outfield near the right side of the 3-D TV picture frame. (This is equivalent to what a person having two eyes would see visually if he were laying flat down on the playing field with his head resting on the instrumented baseball home plate and looking upward with his feet facing a right handed batter standing on side 55 of the instrumented baseball home plate.) The right handed batter appears to be standing upright with his feet just above the bottom of the 3-D TV picture frame. When the pitcher throws the baseball to the catcher, the TV audience will see the baseball approaching the center of the 3-D TV picture frame from the right of the 3-D TV picture frame. The size of the baseball grows larger as it gets closer to the instrumented baseball home plate and the batter. Since the cameras 50 and 52 are physically located below the batter inside the instrumented baseball home plate, an image of the underside of batter's chin and sweaty arm pits will appear below the center of the 3-D TV picture frame.

In the third mode, the cameras 41 and 42 comprising the first 3-D stereo camera pair, and lenses 47 and 48 are aligned in rotation inside its instrumentation package assembly 11 by the first mechanical actuating device so that the TV viewing audience sees the stadium horizon in the outfield at the top of the 3-D TV picture frame. (This is equivalent to what a person would see visually if he were laying flat down on the playing field with his head resting on the instrumented baseball home plate and looking upward with his feet facing the catcher.) The stadium outfield horizon appears horizontal in the 3-D TV picture frame at the top of the 3-D TV picture frame. The pitcher appears to be standing on his mound with his feet near the top of the 3-D TV picture frame. When the pitcher throws the baseball to the catcher, the TV audience will see the baseball approaching the center of the 3-D TV picture frame from the image of the pitcher's hand which is near the top of the 3-D TV picture frame. The size of the baseball grows larger as it gets closer to the instrumented baseball home plate and the batter. Since cameras 41 and 42 are below the batter, a 3-D image of the underside of batter's chin and sweaty arm pits will occupy the right side of the 3-D TV picture frame. The microphones 45 and 46 will enable the TV audience to hear the whoosh of air as the baseball passes above the instrumented baseball home plate. Cameras 41 and 42 will enable the TV audience to see the batter swing his bat, up close, to strike the baseball as it whizzes by above the instrumented baseball home plate. The microphones 45 and 46 will enable the TV audience to hear the rush of the air as he swings his bat. The TV audience will hear the loud crack of the bat as it strikes the baseball. The TV audience will see the baseball the moment it is hit by the bat. This will be an action packed event never before witnessed by a TV audience. Each of the pitched baseballs will produce breath taking excitement and expectations by the TV viewing audience.

Cameras 41 and 42 will enable the TV audience to see the baseball as it travels outward from the crack of the bat onto the playing field. The TV audience will see the baseball get smaller as it gets further away from the instrumented home plate and the batter. The image of the baseball will move away from the center of the 3-D TV picture frame after it is hit. The TV audience will see the batter drop the bat and scramble toward first base. The image of the bat will grow in size and appear to the TV viewing audience as though it was going to hit them in the face as it careens down on and strikes the instrumented baseball home plate. Members of the TV viewing audience will duck to avoid being hit by the bat. The TV audience will hear the thud of the bat after the batter releases it and it hits the instrumented baseball home plate. The TV audience will hear the scraping by the batter's cleats on the ground as he scrambles to first base. The TV audience will see the size of the batter grow smaller as he runs toward first base and gets further from home plate.

In the fourth mode, the cameras 50 and 52 comprising the second 3-D stereo camera pair, and lenses 51 and 53 respectively are aligned in rotation inside its instrumentation package assembly 11 by the second mechanical actuating device so that the 3-D TV viewing audience sees the stadium horizon in the outfield at the left side of the 3-D TV picture frame. (This is equivalent to what a person would see visually if he were laying flat down on the playing field with his head resting on the instrumented baseball home plate and looking upward with his feet facing a left handed batter standing on side 22 of the instrumented baseball home plate.) The pitcher appears to be standing on his mound toward the left hand side of the 3-D TV picture frame. When the pitcher throws the baseball to the catcher, the TV audience will see the baseball approaching the center of the 3-D TV picture frame from the image of the pitcher's hand which is left of center of the 3-D TV picture frame. The size of the baseball grows larger as it gets closer to the instrumented baseball home plate and the batter. Since the cameras 50 and 52 are below the batter, an image of the underside of batter's chin and sweaty arm pits will appear above the center of the 3-D TV picture frame. Microphones 45 and 46 will enable the TV audience will hear the whoosh of air as the baseball passes above the instrumented baseball home plate. The TV audience will see the batter swing his bat, up close, to strike the baseball as it whizzes by. The TV audience will hear the rush of the air as the batter swings his bat. The TV audience will hear the loud crack of the bat as it strikes the baseball. The TV audience will see the baseball the moment it is hit by the bat. This will be an action packed event never before witnessed by a TV audience. Each of the pitched baseballs will produce breath taking excitement and expectations by the TV viewing audience. The TV audience will see the baseball as it travels outward from the crack of the bat onto the playing field. The TV audience will see the baseball get smaller as it gets further away from the instrumented baseball home plate and the batter. The image of the baseball will move away from the center of the 3-D TV picture frame after it is hit. The audience will see the batter drop the bat and scramble toward first base. The image of the bat will grow in size and appear to the TV viewing audience as though it was going to hit them in the face as it careens down on and strikes the instrumented baseball home plate. Members of the TV viewing audience will duck to avoid being hit by the bat. The TV audience will hear the thud of the bat after the batter releases it and it hits the instrumented baseball home plate. The TV audience will hear the scraping by the batter's cleats on the ground as he scrambles to first base. The TV audience will see the size of the batter grow smaller as he runs toward first base and gets further from home plate.

It should be noted at this point, that in general a combination of any two of the four cameras can be electronically commanded and controlled by the cameraman in the remote base station to act as 3-D stereo camera pairs.

In certain venues where stereo 3-D is not required or deemed useful from the instrumented baseball home plate, a stereo 3-D camera pair that typically has two identical wide angle zoom lenses, for example 51 and 53, may be replaced with two dissimilar lenses or lens settings having different focal lengths and fields of view for example. Under these same circumstances, the identical cameras, for example 50 and 52 of the 3-D stereo camera pair may also be replaced with two dissimilar cameras. The 3-D stereo camera pair 50 and 52 that faces the batter from the top of an instrumented baseball home plate may be considered to be non-essential by the cameraman. Instead, the cameraman may elect to set two dissimilar focal lengths into the zoom lenses 51 and 53 facing the batter. One lens, 51 for example, may be set to a long focal length for close-up facial expressions of the batter, where the other lens 53 may be set to a short focal length for wider shots of the batter. The cameraman may also set all four of the camera lenses to different focal lengths if he so desires.

Each of the microphones 45 and 46 listens for sounds from their respective sides of the instrumented baseball home plate. The condenser microphones enable the viewing audience to hear real-time contacts, impacts and shocks to the instrumented baseball home plate. Microphones 45 and 46 enable the TV audience to hear sounds that result from air or any physical contacts or vibrations to the instrumented baseball home plate; like for example, the crash of a player sliding into the instrumented baseball home plate. The sounds received from each of the microphones by the remote base station are processed using special software to produce surround sound which is broadcast to the TV viewing audience.

Microphone 58 protrudes through a hole in the top of the instrumented baseball home plate. Microphone 58 is mounted through a hole in the upper protective cover plate. Microphone 58 is connected by cable 59 to electrical connector 60. 60 is connected to the electronics in the instrumentation package assembly 8. Microphone 58 enables the TV audience to hear sounds that occur on the baseball playing field. Microphone 58 enables the TV audience to hear the whoosh of air as a pitched baseball passes above the instrumented baseball home plate.

Simultaneously live 3D TV pictures are taken by the TV cameras 41, 42, 50 and 52 of their respective field of views of the live action on the playing field. Cameras 41, 42, 50 and 52 will enable the TV audience to see a right or left handed batter swing his bat, up close, to strike the baseball as it whizzes bye above the instrumented baseball home plate. Microphone 58 enables the TV audience to hear sounds like the rush of the air as the batter swings his bat. The TV audience will hear the loud high fidelity crack of the bat as it strikes the baseball. The TV audience will see the baseball come toward them from the pitcher's hand as if the audience themselves were standing at the plate. The TV audience will see a close-up of the baseball right in front of them the moment it is hit by the bat. It will seem to the audience like they themselves hit the baseball. This will be an action packed event never before witnessed by a TV audience. Some members of the TV audience will flinch as the baseball is pitched near to them. Each of the pitched baseballs will produce breath taking excitement and expectations by the TV viewing audience. The TV audience will see the baseball as it travels outward from the bat onto the playing field. The TV audience will see the baseball get smaller as it gets further away from the instrumented baseball home plate and the batter. The audience will see and hear the batter drop his bat and scramble toward first base. The TV audience will hear the thud of the bat after the batter releases it and it hits the ground. The TV audience will hear the scraping by the batter's cleats on the ground as he scrambles to first base. The TV audience will see the size of the batter grow smaller as he runs toward first base and gets further away from home plate. In summary, the instrumented baseball home plate provides video and sound to the viewing audience that is so exciting and realistic that it makes the individual members of the audience feel that they are at bat and in the game. In many ways this is more exciting than viewing the game in person from the stands of the baseball stadium.

In a further preferred embodiment, the present invention referring to FIG. 54A and FIG. 54B contemplates an instrumented baseball home plate, which when stationed off of any baseball playing field at the traditional home plate location in the pitcher's bullpen can wirelessly and autonomously televise baseball pitching practice and warm-up sessions under command and control of the remote base station. The remote base station is disclosed in FIG. 59A and FIG. 59B and FIG. 60A and FIG. 60B and FIG. 61A and FIG. 61B. In addition to adding an element to the entertainment of the TV viewing audience, the embodiment serves to aid the pitchers and the pitching coaches in evaluating the quality of the pitcher's progress, prowess, fitness and "stuff".

The instrumented baseball home plate is an example of a static instrumented sports paraphernalia. For televising games from off the playing field, for example in the pitcher's bullpen, refer to FIG. 64C which is a top view of a general sports stadium that has been configured and equipped for use with both static and dynamic instrumented sports paraphernalia, using both bi-directional wireless radio wave communication links and/or bi-directional fiber optics cable/copper cable communication links.

A variety of different camera lens types with different lens setting capabilities, focal lengths and fields of view can be used by the cameraman. For example, extremely wide angle lenses that can see down to the horizon can be used. These lens types give the TV viewing audience a dramatic 3-D effect. When enabled by the operator/cameraman in the remote base station, the auto iris setting permits the camera lens to automatically adjust for varying lighting conditions on the field. The auto focus setting permits the camera lens to adjust focus for varying distances of the players and action subjects on the field. The cameraman may elect to control the functions of the camera lenses himself from the remote base station by sending command and control signals from the remote base station to the instrumented baseball home plate. The cameraman can zoom, focus, and control the iris settings of the camera lenses himself at will from the remote base station.

The cameraman, in the remote base station, software selects either the wireless mode of communication, and/or the fiber optics/copper cable mode of communication between each of the instrumented baseball home plates and the remote base station. The cameraman can use whichever equipment (antenna array relay junction or fiber optics cable/copper cable) is installed in the stadium with which to command and control his choice and communicate it to the instrumented baseball home plates on the stadium playing field. These choices are also physically switch selectable by the cameraman with his access through the opening in the bottom of the instrumented baseball home plates. Refer to FIG. 59A and FIG. 59B, and FIG. 60A and FIG. 60B, and FIG. 61A and FIG. 61B, and FIG. 64A and FIG. 64B and FIG. 64C for disclosures regarding the remote base station and the antenna array relay junction.

The cameraman selects items from a software menu of control commands that go to the network transceiver at the remote base station that are subsequently transmitted to the instrumented baseball home plates for the purpose of adjusting various system initializations, operating parameters, radio frequency, polling system status data such as battery condition, and initiating remote mechanical adjustments such as camera focus, optical zoom, iris and movement to the cameras' field of view, etc over the selected bi-directional communications link i.e. wireless radio, fiber optics or copper cable connectivity being used within the particular sports stadium.

These commands, when intercepted by the network transceiver within the instrumented baseball home plates are applied to its microprocessor, which then in turn upon executing the instructions stored within the contents of its firmware applies a pulse coded control signal via the power and control interconnect interface inside the instrumentation package to the corresponding electronics i.e. the mechanical actuators that provides optical focus and/or zoom adjustment of the cameras and microphone gain and selection, etc as desired by the cameraman and/or special software running on the computer at the remote base station. The power and control interconnect interface as shown in FIG. 33E (item 21), which is represented by dotted lines, consists of the electrical control wiring to and from the electronic components of the instrumented baseball home plates that are being controlled.

Referring to the Preferred Embodiments Specified in FIG. 54A and FIG. 54B and FIG. 54C, the Instrumented Baseball Home Plate Satisfies all of the Following Objectives:

It is an objective of the present invention to instrument a baseball home plate composed of an four camera instrumentation package assembly, buffer plate assembly, encapsulation cushioning material, upper protective cover plate, and lower protective cover plate. It is an objective of the present invention to enable the cameraman in the remote base station to electronically command and control any combination of any two of the four cameras in the instrumented baseball home plate to act as a 3-D stereo camera pair. It is an objective of the present invention that instrumentation package assembly, having a selection of different interpupiliary distances, is chosen by the cameraman before the instrumentation package assembly is encapsulated into the instrumented baseball home plate. It is an objective of the present invention to tilt the line of sight of one of the 3-D stereo camera pairs upward toward the pitcher or toward the catcher, and in an alike manner, tilt the line of sight of the other remaining 3-D stereo camera pair toward or away from the batter. It is an objective of the present invention to align together the cameras that make up a 3-D stereo camera pair within their instrumentation package assembly so that they yield upright 3-D stereo images of objects which appear between the center and the bottom of the TV picture frame by physically rotating the cameras and their lenses about their optical axes using the actuating device that is mechanically coupled to the cameras and their lenses inside the instrumentation package assembly. It is an objective of the present invention to align together the cameras that make up a 3-D stereo camera pair within their instrumentation package assembly so that they yield upright 3-D stereo images of objects which appear between the center and the bottom of the TV picture frame by electronically rotating the letterbox picture frames of the cameras about their optical axes using the circular sensor CCD chips disclosed in FIG. 63A and FIG. 63B and FIG. 63C. It is an objective of the present invention to instrument the pitcher's bullpen with an instrumented baseball home plate. It is an objective of the present invention to televise from the pitcher's bullpen with an instrumented baseball home plate. It is an objective of the present invention to enable coaches who are on the sidelines during training sessions to hear the spoken dialog of their team's players from on the instrumented baseball home plate. It is an objective of the present invention to enable coaches who are on the sidelines during training sessions to view details of the team's players during training sessions on the instrumented baseball home plate. It is an objective of the present invention to enable referees who are on and off the playing field during games to review details of the game from the four cameras onboard the instrumented baseball home plate by instant replay. It is an objective of the present invention to cover and wrap the instrumentation package assembly and its four radio antennas with a domed shaped upper protective cover plate, which is bent downward and past the outermost tips of the radio antennas, to divert trauma and forces that occur to the top of the instrumented baseball home plate away from the instrumentation package assembly during the game in order to protect it. It is an objective of the present invention to equip the instrumentation package assembly to capture video and sounds on the playing field from the instrumented baseball home plate. It is an objective of the present invention to equip the instrumented baseball home plate with an instrumentation package assembly that has four TV cameras, three microphones, four wireless antenna elements, battery pack and supporting electronics housed inside its enclosure. It is an objective of the present invention to equip the instrumentation package assembly inside the instrumented baseball home plate with means to wirelessly televise the captured video and sounds to a remote base station via an antenna array relay junction stationed off the playing field but within (and around) the space of the instrumented sports stadium/arena. The antenna array relay junction is equipped to relay the video and sounds to the remote base station. The remote base station is located within the instrumented sports stadium/arena or its vicinity. It is an objective of the present invention that the instrumented baseball home plate is under the command and control of a cameraman in the remote base station. It is an objective of the present invention to enable the instrumentation package assembly to be mounted inside the instrumented baseball home plate in a manner permitting its four cameras and three microphones to see and hear out of the instrumented baseball home plate. It is an objective of the present invention to enable the instrumentation package assembly to be mounted inside the instrumented baseball home plate in a manner permitting the instrumentation package assembly to be protected from damage during the game. It is an objective of the present invention to enable the instrumentation package assembly to be mounted inside the instrumented baseball home plate in a manner permitting it to maintain its mechanical and optical alignment during the game. It is an objective of the present invention to provide a permanent position and nesting place for the instrumentation package assembly inside the instrumented baseball home plate. It is an objective of the present invention to provide means to permit easy assembly and alignment of the instrumentation package assembly in the instrumented baseball home plate. It is an objective of the present invention to provide the instrumented baseball home plate with the identical handling and playability qualities as conventional regulation baseball home plates. It is an objective of the present invention to provide means to permit the instrumentation package assembly to be nested, cradled and isolated from shock and vibration inside the instrumented baseball home plate. It is an objective of the present invention to provide an instrumentation package assembly that is sized so that it can be easily loaded and assembled into the instrumented baseball home plate. It is an objective of the present invention to provide the instrumented baseball home plate with an instrumentation package assembly that carries its own rechargeable battery pack. It is an objective of the present invention to provide the instrumented baseball home plate with an instrumentation package assembly that carries its own rechargeable battery pack that has sufficient energy to power the cameras, lenses, antennas and electronics for the duration of the game. It is an objective of the present invention to charge the battery pack of the instrumented baseball home plate using the same charging unit as used for instrumented baseball bases; other instrumented baseball home plates, instrumented ice hockey pucks, and instrumented pitcher's rubbers. It is an objective of the present invention to provide the instrumented baseball home plate with instrumentation package assembly electronics that require little power to operate and are lightweight. It is an objective of the present invention to provide the instrumented baseball home plate with an instrumentation package assembly that carries its own battery pack that is recharged wirelessly by induction. It is an objective of the present invention to provide the instrumented baseball home plate with an instrumentation package assembly that can withstand axial and tangential compression and decompression loads exerted on it during play. It is an objective of the present invention that the instrumented baseball home plate will withstand dirt, water, ice and weather conditions. It is an objective of the present invention that the instrumented baseball home plate encapsulation will provide cushioning to protect the instrumentation package assembly from shock and vibration damage. It is an objective of the present invention to provide the instrumented baseball home plate with provisions for holding the instrumentation package assembly in alignment and for cushioning and isolating the instrumentation package assembly from shocks received by the instrumented baseball home plate during the game. It is an objective of the present invention that the optical windows are made small to be unobtrusive to the game without vignetting the field of view of the cameras under the prevailing lighting conditions on the playing field. It is an objective of the present invention that the optical windows withstand heavy blows received during the game and protect the instrumentation package assembly. It is an objective of the present invention that the optical windows be easily removed, replaced and exchanged with substitutes and alternates, and permit the camera lenses to be exchanged with substitutes and alternates as well.

FIG. 55A and FIG. 55B and FIG. 55C

The detailed physical elements disclosed in the upper protective cover plate drawings shown in FIG. 55A and FIG. 55B and FIG. 55C are identified as follows: 1 is the y-axis of the upper protective cover plate. 2 is the y-axis of the bored clearance hole 9. 3 is the y-axis of the bored clearance hole 8. 4 is the x-axis of clearance holes 8 and 9 and of the upper protective cover plate. 5 is the z-axis of clearance hole 8. 6 is the z-axis of the upper protective cover plate. 7 is the z-axis of clearance hole 9. 8 is a bored clearance hole in the upper protective cover plate. 9 is a bored clearance hole in the upper protective cover plate, 10 is the rounded edge of the upper protective cover plate. 11 is the top spherical surface of the upper protective cover plate. 12 is the flattened region of the upper protective cover plate. 13 is a microphone and the mounting hole for the microphone. 14 is the microphone cable. 15 is a microphone connector.

FIG. 55A is the top view of an upper protective cover plate with two windows.

FIG. 55B is the front view of an upper protective cover plate with two windows.

FIG. 55C is the side view of an upper protective cover plate with two windows.

Referring to drawings FIG. 55A and FIG. 55B and FIG. 55C, in a preferred embodiment, the upper protective cover plate of the instrumented baseball home plate, is disclosed. The upper protective cover plate is used as a vital part of the instrumented baseball home plates shown in the preferred embodiments FIG. 45, FIG. 49 and FIG. 51 in order to protect their respective instrumentation package assemblies, which are contained inside them, from damage during the baseball game.

Referring to the disclosed upper protective cover plate shown in FIG. 55A and FIG. 55B and FIG. 55C, the upper protective cover plate has a circular edge 10 and a dome-like shaped spherical top in its outer region 11. The circular edge 10 is rounded. The diameter of the upper protective cover plate is made large enough to cover the tips of the radio antennas in the instrumented baseball home plates shown in preferred embodiments FIG. 45, FIG. 49 and FIG. 51. The top center region 12 of the upper protective cover plate is flattened in the neighborhood of the clearance holes 8 and 9. The upper protective cover plate becomes spherically curved in the region 11 outside of these holes. The z-axis of symmetry of the upper protective cover plate is 6. The y-axis of symmetry is 1, and the x-axis of symmetry is 4. The spherical top of the dome 11 faces upward in the positive z-axis 6 direction. The upper protective cover plate is thin but rigid. There are two bored holes 8 and 9 in the top 12 of the upper protective cover plate that are equidistant around its center. The z-axis of hole 8 is 5, and the z-axis of hole 9 is 7. The y-axis of hole 8 is 3, and the y-axis of hole 9 is 2. The distance between centers of holes 8 and 9 is made equal to the interpupillary distance for the referenced instrumented baseball home plates. In the present embodiment this distance is approximately 25 millimeters, although it can be set to any other interpupillary distance we choose.

The upper protective cover plate has three major purposes. The first purpose is to provide the two clearance holes 8 and 9 made large enough through which the optical windows on top of the instrumented baseball home plate (shown in reference FIGS. 45, 49 and 51) to protrude through, and thereby mechanically surround the optical windows on top of the instrumented baseball home plate so as to protect them from damage during the game. The second purpose is to protect the instrumentation package assembly which is located below the upper protective cover plate inside of the instrumented baseball home plate from physical damage during the baseball game. The third purpose of the upper protective cover plate is to mount and support the microphone 13 which protrudes above the upper surface of the upper protective cover plate.

With regard to its first purpose, the upper protective cover plate surrounds the optical windows on the top of the instrumented baseball home plate and shelters them from hits to the instrumented baseball home plate during the game. The top surface of the upper protective cover plate is stationed just below and in close proximity to the top of the instrumented baseball home plate. Refer to drawings FIG. 45A and FIG. 45B, and FIG. 49A and FIG. 49B and FIG. 49C and FIG. 49D, and FIG. 51A and FIG. 51B and FIG. 51C and FIG. 51D, FIG. 52A and FIG. 52B for examples of two camera instrumented baseball home plate preferred embodiments that use this upper protective cover plate. The two clearance holes 8 and 9 bored in the top of the upper protective cover plate provide apertures through which the two optical windows in the referenced instrumented baseball home plates may protrude, and therefore the optical windows are protected from damage during the game by the shielding of the walls of these clearance holes. In order to shelter the optical windows from damage, the protective cover plate must be made of a stiff resilient material with little give.

With regard to its second purpose, the upper protective cover plate protects the instrumentation package assembly from being crushed and damaged by the players during the game. Refer to drawings FIG. 34A and FIG. 34B and FIG. 34C for examples of the two camera instrumentation package assembly. The instrumentation package assembly is located below the upper protective cover plate inside of the instrumented baseball home plate. In order to achieve its purpose, the upper protective cover plate must be stiff. The entire volume between the top of the instrumented baseball home plate and the upper protective cover plate is filled with a resilient encapsulation padding material. The entire volume between the upper protective cover plate and the instrumentation package assembly is filled with the same resilient encapsulation padding material. The domed shape of the upper protective cover plate is very important. It completely covers and wraps the instrumentation package assembly and its radio antennas, which are below it, and diverts trauma and forces that occur to the top of the instrumented baseball home plate during the game away from the instrumentation package assembly and its antennas. The edge 10 of the upper protective cover plate is bent downward and past the outermost tips of the radio antennas to protect them. The curvature of the upper protective cover plate is made large enough so that the dome completely covers them. The dome shape allows the thickness of the padding between the top of the instrumented baseball home plate and the upper protective cover plate to increase as the radial distance from the center of the instrumented home plate increases outwardly.

With regard to its third purpose, the upper protective cover plate is used to mount and support the microphone 13 which protrudes above the upper surface of the upper protective cover plate and into a hole in the top of the instrumented baseball home plate. Microphone 13 listens for sounds of the game that occur on the baseball playing field above the top of the instrumented baseball home plate and above the ground. Microphone cable 14 carries electrical sound signals from microphone 13 to the microphone electrical connector 15. 15 is plugged into its mating electrical connector on the instrumentation package assembly shown in the referenced drawings.

The top protective cover plate is made dome shaped so the walls of its bores can surround the optical windows near the very top of the instrumented baseball home plate and shelter them from hits, while still keeping the edge of the protective cover plate far down below the top of the instrumented baseball home plate and well below the surface of the playing field in the ground, so the edge can not be felt by the players if the players impact the top surface of the instrumented baseball home plate.

The materials chosen for the protective cover plates in the present preferred embodiment are polycarbonates, ABS or fiber reinforced plastics. Although a variety of other materials would function almost equally as well, polycarbonates, ABS and fiber reinforced plastics have an advantage in that they are lightweight and stiff enabling the thickness of the protective cover plates to remain thin while still delivering the significant stiffness needed to perform their shielding function in the limited space they can occupy within the instrumented baseball home plate. They have an additional advantage in that they are transparent to the transmitted and received radio waves which need to move to and from the antennas inside the instrumented baseball home plate without absorption or reflection.

The thickness range of the upper protective cover plate is approximately 1/16 to 3/16 inches. It is made thin in order to make it fit between the top surface of the molded instrumented baseball home plate and the top surface of the buffer plate which is just beneath it. The upper protective cover plate is given a spherical dome shape in order to increase its stiffness. In addition, the upper protective cover plate is made spherically dome shaped in order to keep its edge buried inside the molded instrumented baseball home plate, and curved down and away from the top surface of the instrumented baseball home plate where it could otherwise be collided with by the players. Even though the circular edge 10 of the upper protective cover plate is buried deep into the molded instrumented baseball home plate, it is nevertheless rounded off so it can cause no injury to the players.

FIG. 56A and FIG. 56B and FIG. 56C

The detailed physical elements shown in the upper protective cover plate drawings disclosed in FIG. 56A and FIG. 56B and FIG. 56C are identified as follows: 1 is the y-axis of the upper protective cover plate and the bored clearance hole 5. 2 is the rounded circular edge of the upper protective cover plate. 3 is the z-axis of the upper protective cover plate and the bored clearance hole 5. 4 is the x-axis of the upper protective cover plate and the bored clearance hole 5. 5 is the bored clearance hole. 6 is the top spherical surface region of the upper protective cover plate. 7 is the flattened surface region of the upper protective cover plate.

8 is a microphone and the mounting hole for the microphone. 9 is the microphone cable. 10 is a microphone connector.

FIG. 56A is the top view of an upper protective cover plate with one window.

FIG. 56B is the front view of an upper protective cover plate with one window.

FIG. 56C is the side view of an upper protective cover plate with one window.

Referring to drawings FIG. 56A and FIG. 56B and FIG. 56C, in a preferred embodiment, the upper protective cover plate of the instrumented baseball home plate, is disclosed. The upper protective cover plate is used as a vital part of the instrumented baseball home plates shown in preferred embodiments FIG. 44 and FIG. 48 in order to protect their respective instrumentation package assembly assemblies, which are contained inside them, from damage during the baseball game.

Referring to the disclosed upper protective cover plate shown in FIG. 56A and FIG. 56B and FIG. 56C, the upper protective cover plate has a rounded circular edge 2 and a dome-like shaped spherical top 6. The diameter of the upper protective cover plate is made large enough to cover the tips of the radio antennas in the instrumented baseball home plates shown in preferred embodiments FIG. 44 and FIG. 48. The z-axis of symmetry of the upper protective cover plate is 3. The y-axis of symmetry is 1, and the x-axis of symmetry is 4. The top center of the upper protective cover plate is flattened in the neighborhood of the bored clearance hole 5. The upper protective cover plate becomes spherically curved downward in the region outside of this hole. The spherical top of the dome faces upward in the positive z-axis 3 direction. The upper protective cover plate is thin but rigid. The bored clearance hole 5 in the top of the upper protective cover plate is at its center. The z-axis of hole 5 is 3. The y-axis of hole 5 is 1.

The upper protective cover plate has three major purposes. The first purpose is to provide the clearance hole 5 made large enough through which the optical window on top of the instrumented baseball home plate (shown in reference FIGS. 44 and 48) may protrude, and surround the optical window on top of the instrumented baseball home plate with its walls so as to protect it from damage during the game. The second purpose is to protect the instrumentation package assembly which is located below the upper protective cover plate inside of the instrumented baseball home plate. The third purpose of the upper protective cover plate is to mount and support the microphone 8 which protrudes above the upper surface of the upper protective cover plate.

With regard to its first purpose, the upper protective cover plate surrounds the optical window on the top of the instrumented baseball home plate and shelters it from hits to the instrumented baseball home plate during the game. The top surface of the upper protective cover plate is stationed just below and in close proximity to the top of the instrumented baseball home plate. Refer to drawings FIG. 44A and FIG. 44B, and FIG. 48A and FIG. 48B and FIG. 48C and FIG. 48D, and FIG. 51A and FIG. 51B and FIG. 51C and FIG. 51D for examples of single camera instrumented baseball home plate preferred embodiments that use this upper protective cover plate. The clearance hole 5 bored in the top of the upper protective cover plate provides an aperture through which the optical window in the referenced instrumented baseball home plates may protrude; and therefore the optical window is protected from damage during the game by the shielding of the wall of the hole. In order to shelter the optical window from damage, the protective cover plate must be made of a stiff resilient material with little give.

With regard to its second purpose, the upper protective cover plate protects the instrumentation package assembly from being crushed and damaged by the players during the game. Refer to drawings FIG. 33A and FIG. 33B and FIG. 33C for examples of the instrumentation package assembly. The instrumentation package assembly is located below the upper protective cover plate inside of the instrumented baseball home plate. In order to achieve its purpose, the upper protective cover plate must be stiff.

With regard to its third purpose, the upper protective cover plate is used to mount and support the microphone 8 which protrudes above the upper surface of the upper protective cover plate and into a hole in the top of the instrumented baseball home plate. Microphone 8 listens for sounds of the game that occur on the baseball playing field above the top of the instrumented baseball home plate and above the ground. Microphone cable 9 carries electrical sound signals from microphone 8 to the microphone electrical connector 10. 10 is plugged into its mating electrical connector on the instrumentation package assembly shown in the referenced drawings.

The top protective cover plate is made dome shaped so the walls of its bore can mechanically surround the optical window near the very top of the instrumented baseball home plate and shelter it from hits, while still keeping the edge of the protective cover plate far down below the top of the instrumented baseball home plate and well below the surface of the playing field in the ground, so the edge can not be felt by the players if the players impact the top surface of the instrumented baseball home plate.

The thickness range of the upper protective cover plate is approximately 1/16 to 3/16 inches. It is made thin in order to make it fit between the top surface of the molded instrumented baseball home plate and the top surface of the buffer plate which is just beneath it. The upper protective cover plate is given a spherical dome shape in order to increase its stiffness. In addition, the upper protective cover plate is made spherically dome shaped in order to keep its edge buried inside the molded instrumented baseball home plate, and curved down and away from the top surface of the instrumented baseball home plate where it could otherwise be collided with by the players. Even though the circular edge 2 of the upper protective cover plate is buried deep into the molded instrumented baseball home plate, it is nevertheless rounded off so it can cause no injury to the players.

The materials chosen for the protective cover plates in the present preferred embodiment are polycarbonates, ABS or fiber reinforced plastics. Although a variety of other materials would function almost equally as well, polycarbonates, ABS and fiber reinforced plastics have an advantage in that they are lightweight and stiff enabling the thickness of the protective cover plates to remain thin while still delivering the significant stiffness needed to perform their shielding function in the limited space they can occupy within the instrumented baseball home plate. They have an additional advantage in that they are transparent to the transmitted and received radio waves which need to move to and from the antennas inside the instrumented baseball home plate without absorption or reflection.

Referring to the Preferred Embodiments Specified in FIG. 56A and FIG. 56B and FIG. 56C, the Upper Protective Cover Plate Satisfies all of the Following Objectives:

Refer to drawings FIG. 44A and FIG. 44B, and FIG. 45A and FIG. 45B, and FIG. 48A and FIG. 48B and FIG. 48C and FIG. 48D, and FIG. 49A and FIG. 49B and FIG. 49C and FIG. 49C and FIG. 49D, and FIG. 51A and FIG. 51B and FIG. 51C and FIG. 51D, and FIG. 52A and FIG. 52B, and FIG. 53A and FIG. 53B and FIG. 53C, and FIG. 54A and FIG. 54B and FIG. 54C for examples of instrumented baseball home plate preferred embodiments.

FIG. 57A and FIG. 57B and FIG. 57C

The detailed physical elements shown in the upper protective cover plate drawings disclosed in FIG. 57A and FIG. 57B and FIG. 57C are identified as follows: 1 is the y-axis of the upper protective cover plate. 2 is the y-axis of the bored clearance hole 9. 3 is the y-axis of the bored clearance hole 8. 4is the x-axis of clearance holes 8 and 9 and of the upper protective cover plate. 5 is the z-axis of clearance hole 8. 6 is the z-axis of the upper protective cover plate. 7 is the z-axis of clearance hole 9. 8 is a bored clearance hole in the upper protective cover plate. 9 is a bored clearance hole in the upper protective cover plate. 10 is the rounded circular edge of the upper protective cover plate. 11 is the top spherical surface region of the upper protective cover plate. 12 is the flattened surface region of the upper protective cover plate. 13 is a microphone and the mounting hole for the microphone. 14 is the microphone cable. 15 is the microphone connector.

FIG. 57A is the top view of an upper protective cover plate with two windows.

FIG. 57B is the front view of an upper protective cover plate with two windows.

FIG. 57C is the side view of an upper protective cover plate with two windows.

Referring to drawings FIG. 57A and FIG. 57B and FIG. 57C, in a preferred embodiment, the upper protective cover plate of the instrumented baseball home plate, is disclosed. The upper protective cover plate is used as a vital part of the instrumented baseball home plates shown in preferred embodiment FIG. 52 in order to protect its instrumentation package assembly assemblies which is contained inside it, from damage during the baseball game.

Referring to the disclosed upper protective cover plate shown in FIG. 57A and FIG. 57B and FIG. 57C, the upper protective cover plate has a rounded circular edge 10 and a dome-like shaped spherical top in its outer region 11. The diameter of the upper protective cover plate is made large enough to cover the tips of the radio antennas in the instrumented baseball home plates shown in preferred embodiments FIG. 45, FIG. 49, FIG. 51 and FIG. 52. The z-axis of symmetry of the upper protective cover plate is 6. The y-axis of symmetry is 1, and the x-axis of symmetry is 4. The top center region 12 of the upper protective cover plate is flattened in the neighborhood of the clearance holes 8 and 9. The upper protective cover plate then becomes spherically curved downward in the region 11 outside of these holes. The spherical top of the dome faces upward in the positive z-axis 6 direction. The upper protective cover plate is thin but rigid. There are two bored holes 8 and 9 in the top of the upper protective cover plate equidistant around its center. The z-axis of hole 8 is 5, and the z-axis of hole 9 is 7. The y-axis of hole 8 is 3, and the y-axis of hole 9 is 2. The distance between centers of holes 8 and 9 is made equal to the interpupillary distance for the referenced instrumented baseball home plates. In the present embodiment this distance is set to between 44 and 150 millimeters, although it can be set to any other interpupillary distance we choose to get different 3-D stereo effects.

The linear distance separation of the optical axes of the two camera lenses that make up the stereo camera pair is an important function of the buffer plate. For the buffer plate, the distance measured between the axes is defined as the interpupilarly distance between the camera lenses.

We note here for reference that for modern commercial 3-dimensional cameras, the range of settings for the interpupillary distance is adjustable from 44 to 150 mm. Following the range of settings referenced for modern commercial 3-dimensional cameras, the size of the buffer plate interpupillary distance is made to accommodate an interpulilary distance range of 44 to 150 mm also. Therefore, the axial separation between each stereo pair of camera lenses can vary from 44 to 150 mm.

How far you are intending to view the pictures from requires a certain separation between the cameras. This separation is called stereo base or stereo base line and results from the ratio of the distance to the image to the distance between your eyes. The mean interpupillary distance (IPD) is 63 mm (about 2.5 inches) for humans, but varies with age, race and gender. The vast majority of adults have IPDs in the range 50-75 mm. Almost all adults are in the range 45-80 mm. The minimum IPD for children as young as five is around 40 mm.

The upper protective cover plate has three major purposes. The first purpose is to provide the two clearance holes 8 and 9 made large enough through which the optical windows on top of the instrumented baseball home plate (shown in reference FIG. 45, FIG. 49, FIG. 51 and FIG. 52) may protrude, and thereby mechanically surround the optical windows on top of the instrumented baseball home plate so as to protect them from damage during the game. The second purpose is to protect the instrumentation package assembly which is located below the upper protective cover plate inside of the instrumented baseball home plate. The third purpose of the upper protective cover plate is to mount and support the microphone 13 which protrudes above the upper surface of the upper protective cover plate 11.

With regard to its first purpose, the upper protective cover plate surrounds the optical windows on the top of the instrumented baseball home plate and shelters them from hits to the instrumented baseball home plate during the game. The top surface of the upper protective cover plate 11 is stationed just below and in close proximity to the top of the instrumented baseball home plate. Refer to drawings FIG. 45A and FIG. 45B, and FIG. 49A and FIG. 49B and FIG. 49C and FIG. 49D, and FIG. 51A and FIG. 51B and FIG. 51C and FIG. 51D, and FIG. 52A and FIG. 52B for examples of two camera instrumented baseball home plate preferred embodiments that use this embodiment of the upper protective cover plate. The two clearance holes 8 and 9 bored in the top of the upper protective cover plate provide apertures through which the two optical windows in the referenced instrumented baseball home plates may protrude, therefore protecting the optical windows from damage during the game by shielding them within the walls of these holes. In order to shelter the optical windows from damage, the protective cover plate must be made of a stiff resilient material with little give.

With regard to its second purpose, the upper protective cover plate protects the instrumentation package assembly from being crushed and damaged by the players during the game. Refer to drawings FIG. 34A and FIG. 34B and FIG. 34C for examples of the two camera instrumentation package assembly. The instrumentation package assembly is located below the upper protective cover plate inside of the instrumented baseball home plate. In order to achieve its purpose, the upper protective cover plate must be stiff.

With regard to its third purpose, the upper protective cover plate is used to mount and support the microphone 13 which protrudes above the upper surface of the upper protective cover plate 11 and into a hole in the top of the instrumented baseball home plate. Microphone 13 listens for sounds of the game that occur on the baseball playing field above the top of the instrumented baseball home plate and above the ground. Microphone cable 14 carries electrical sound signals from microphone 13 to the microphone electrical connector 15. 15 is plugged into its mating electrical connector on the instrumentation package assembly shown in the referenced drawings.

The materials chosen for the protective cover plates in the present preferred embodiment are polycarbonates, ABS and fiber reinforced plastic. Although a variety of other materials would function almost equally as well, these have an advantage in that they are lightweight and stiff enabling their thickness to remain thin while still delivering the significant stiffness needed to perform their shielding function in the limited space they can occupy within the instrumented baseball home plate. They have an additional advantage in that they are transparent to the transmitted and received radio waves which need to move to and from the antennas inside the instrumented baseball home plate without absorption or reflection.

The top protective cover plate is made dome shaped so the walls of its bores can surround the optical window near the very top of the instrumented baseball home plate and shelter it from hits, while still keeping its the edge far down below the top of the instrumented baseball home plate and well below the surface of the playing field in the ground, so the edges can not be felt by the players if the players impact the top surface of the instrumented baseball home plate.

The thickness range of the upper protective cover plate is approximately 1/16 to 3/16 inches. It is made thin in order to make it fit between the top surface of the molded instrumented baseball home plate and the top surface of the buffer plate which is just beneath it. The upper protective cover plate is given a spherical dome shape in order to increase its stiffness. In addition, the upper protective cover plate is made spherically dome shaped in order to keep its edge buried inside the molded instrumented baseball home plate, and curved down and away from the top surface of the instrumented baseball home plate where it could otherwise be collided with by the players. Even though the circular edge 10 of the upper protective cover plate is buried deep into the molded instrumented baseball home plate, it is nevertheless rounded off so it can cause no injury to the players.

FIG. 58A and FIG. 58B and FIG. 58C

The detailed physical elements disclosed in the upper protective cover plate drawings shown in FIG. 58A and FIG. 58B and FIG. 58C are identified as follows: 1is the y-axis of the upper protective cover plate. 2 is the y-axis of the bored clearance hole 9. 3 is the y-axis of the bored clearance hole 8. 4 is the x-axis of clearance holes 8 and 9 and of the upper protective cover plate. 5 is the z-axis of clearance hole 8. 6 is the z-axis of the upper protective cover plate. 7 is the z-axis of clearance hole 9. 8 is a bored clearance hole in the upper protective cover plate. 9 is a bored clearance hole in the upper protective cover plate. 10 is the rounded edge of the upper protective cover plate. 11 is the top spherical surface region of the upper protective cover plate. 12 is a bored clearance hole in the upper protective cover plate. 13 is a bored clearance hole in the upper protective cover plate. 14 is the x-axis of the bored clearance hole 12. 15 is the x-axis of the bored clearance hole 13. 16is the z-axis of bored clearance hole 12. 17 is the z-axis of bored clearance hole 13. 18 is the flattened surface region of the upper protective cover plate. 19 is the z-axis of clearance hole 12, 20 is the z-axis of clearance hole 13. 21 is a microphone and the mounting hole for the microphone. 22 is the microphone cable. 23 is the microphone connector.

FIG. 58A is the top view of an upper protective cover plate with four windows.

FIG. 58B is the front view of an upper protective cover plate with four windows.

FIG. 58C is the side view of an upper protective cover plate with four windows.

Referring to the drawings FIG. 58A and FIG. 58B and FIG. 58C, in a preferred embodiment, an upper protective cover plate is disclosed. The upper protective cover plate is used as a vital part of the instrumented baseball home plates shown in preferred embodiments FIG. 53 and FIG. 54 in order to protect their respective instrumentation package assemblies which are contained inside them, from damage during the baseball game.

The upper protective cover plate has a circular edge 10 and a dome-like shaped spherical top 11. The diameter of the upper protective cover plate is made large enough to cover the tips of the radio antennas in the instrumented baseball home plates shown in preferred embodiments FIG. 53 and FIG. 54. The z-axis of symmetry of the upper protective cover plate is 6. The y-axis of symmetry is 1, and the x-axis of symmetry is 4. The top center region of the upper protective cover plate is flattened in the neighborhood of the clearance holes 8, 9, 12 and 13. The upper protective cover plate then becomes spherically curved downward in the region 11 outside of these holes. The spherical top of the dome faces upward in the positive z-axis 6 direction.

The upper protective cover plate is thin but rigid. There are four bored holes 8, 9, 12 and 13 in the top of the upper protective cover plate equidistant around its center. The z-axis of hole 8 is 5, and the z-axis of hole 9 is 7. The z-axis of hole 12 is 16, and the z-axis of hole 13 is 17. The y-axis of hole 8 is 3, and the y-axis of hole 9 is 2. The y-axis of holes 12 and 13 is 1. The x-axis of hole 12 is 14, and the x-axis of hole 13 is 15. The distance between centers of holes 8 and 9 is made equal to the interpupillary distance for the referenced instrumented baseball home plates. The distance between centers of holes 12 and 13 is also made equal to the interpupillary distance for the referenced instrumented baseball home plates. In the present embodiment this distance is set to between 44 and 150 millimeters, although it can be set to any other interpupillary distance we choose.

The upper protective cover plate has three major purposes. The first purpose is to provide the four clearance holes 8, 9, 12 and 13 made large enough through which the optical windows on top of the instrumented baseball home plate (shown in reference FIG. 53 and FIG. 54) may protrude, and thereby mechanically surround the optical windows on top of the instrumented baseball home plate so as to protect them from damage during the game. The holes in the top of the baseball home plate are made large enough as well to prevent vignetting of the cameras field of view. The second purpose is to protect the instrumentation package assembly which is located below the upper protective cover plate inside of the instrumented baseball home plate. The third purpose of the upper protective cover plate is to mount and support the microphone 21 which protrudes above the upper surface of the upper protective cover plate 11.

With regard to its first purpose, the upper protective cover plate surrounds the optical windows on the top of the instrumented baseball home plate and shelters them from hits to the instrumented baseball home plate during the game. The top surface of the upper protective cover plate 11 is stationed just below and in close proximity to the top of the instrumented baseball home plate. Refer to drawings FIG. 53A and FIG. 53B and FIG. 53C, and FIG. 54A and FIG. 54B and FIG. 54C for examples of four camera instrumented baseball home plate preferred embodiments that use this embodiment of the upper protective cover plate. The four clearance holes 8, 9, 12 and 13 bored in the top of the upper protective cover plate provides apertures through which the four optical windows in the referenced instrumented baseball home plates may protrude, and therefore the optical windows are protected from damage during the game by the shielding of the walls of these holes. In order to shelter the optical windows from damage, the upper protective cover plate must be made of a stiff resilient material with little give.

With regard to its second purpose, the upper protective cover plate protects the instrumentation package assembly from being crushed and damaged by the players during the game. Refer to drawings FIG. 35A and FIG. 35B and FIG. 35C for examples of the four camera instrumentation package assembly. The instrumentation package assembly is located below the upper protective cover plate inside of the instrumented baseball home plate. In order to achieve its purpose, the upper protective cover plate must be stiff.

With regard to its third purpose, the upper protective cover plate is used to mount and support the microphone 21 which protrudes above the upper surface of the upper protective cover plate 11 and into a hole in the top of the instrumented baseball home plate. Microphone 21 listens for sounds of the game that occur on the baseball playing field above the top of the instrumented baseball home plate and above the ground. Microphone cable 22 carries electrical sound signals from microphone 21 to the microphone electrical connector 23. 23 is plugged into its mating electrical connector on the instrumentation package assembly shown in the referenced drawings.

The materials chosen for the protective cover plates in the present preferred embodiment are polycarbonates, ABS and fiber reinforced plastics. Although a variety of other materials would function almost equally as well, these have an advantage in that they are lightweight and stiff enabling their thickness to remain thin while still delivering the significant stiffness needed to perform their mechanical shielding function in the limited space they can occupy within the instrumented baseball home plate. They have an additional advantage in that they are transparent to the transmitted and received radio waves which need to move to and from the antennas inside the instrumented baseball home plate without absorption or reflection.

The top protective cover plate is made dome shaped so the walls of its bores can surround the optical windows near the very top of the instrumented baseball home plate and shelter it from hits, while still keeping its corners at the edge of the protective cover plate far down below the top of the instrumented baseball home plate and well below the surface of the playing field in the ground, so the edges can not be felt by the players if the players impact the top surface of the instrumented baseball home plate.

The thickness range of the upper protective cover plate is approximately 1/16 to 3/16 inches. It is made thin in order to make it fit between the top surface of the molded instrumented baseball home plate and the top surface of the buffer plate which is just beneath it. The upper protective cover plate is given a spherical dome shape in order to increase its stiffness. In addition, the upper protective cover plate is made spherically dome shaped in order to keep its edge buried inside the molded instrumented baseball home plate, and curved down and away from the top surface of the instrumented baseball home plate where it could otherwise be collided with by the players. Even though the circular edge 10 of the upper protective cover plate is buried deep into the molded instrumented baseball home plate, it is nevertheless rounded off so it can cause no injury to the players.

FIG. 59A and FIG. 59B

The detailed physical elements disclosed in the typical instrumented baseball stadium drawings shown in FIG. 59A and FIG. 59B and FIG. 59C are identified as follows: 1 is the baseball playing field ground. 2 is the standard baseball diamond. The distance between the instrumented baseball home plate 3 and the instrumented baseball first base 5 is 90 feet. The distance between the instrumented baseball first base 5 and the instrumented baseball second base 7 is 90 feet. The distance between the instrumented baseball second base 7 and the instrumented baseball third base 9 is 90 feet. The distance between the instrumented baseball third base 9 and the instrumented baseball home plate 3 is 90 feet. 3 is the instrumented baseball home plate equipped with an instrumentation package assembly 4. 4 is the instrumentation package assembly of home plate. 5 is the instrumented first base equipped with an instrumentation package assembly 6. 6 is the instrumentation package assembly of first base. 7 is the instrumented second base equipped with an instrumentation package assembly. 8 is the instrumentation package assembly of second base. 9 is the instrumented third base equipped with an instrumentation package assembly. 10 is the instrumentation package assembly of third base. 11 is the ground level beneath the antenna array relay junction. 12 is the height level of antenna array relay junction above ground. 13 is the antenna array relay junction located within the stadium but outside the limits of the baseball playing field. 14 is the bi-directional fiber optic/copper communications cable between the remote base station and the antenna array relay junction. 15 is the remote base station. 16 is an instrumentation package assembly of the pitcher's rubber. 17 is the pitcher's rubber. 18 is an instrumentation package assembly of the pitcher's rubber.

FIG. 59A is a diagram of the top view of a typical instrumented baseball stadium equipped to wirelessly televise baseball games from instrumented sports paraphernalia on the baseball playing field.

FIG. 59B is a diagram of the side view of a typical instrumented baseball stadium equipped to wirelessly televise baseball games from instrumented sports paraphernalia on the baseball playing field.

Referring to drawings FIG. 59A and FIG. 59B, in a preferred embodiment, a typical instrumented baseball stadium equipped to wirelessly televise baseball games from instrumented sports paraphernalia located on the baseball playing field, employing single point non-diversity reception techniques, is disclosed.

FIGS. 59A and 59B illustrate a typical instrumented baseball stadium playing field 1 whose instrumented home plate, instrumented bases, and instrumented pitcher's rubber 3, 5, 7, 9 and 17 located about the baseball diamond 2 are each equipped with instrumentation package assemblies 4, 6, 8, 10, 16 and 18 respectively.

Typical instrumented baseball bases are disclosed in FIG. 38A and FIG. 38B, FIG. 39A and FIG. 39B, FIG. 42A and FIG. 42B, FIG. 43A and FIG. 43B, FIG. 46A and FIG. 46B, FIG. 47A and FIG. 47B, FIG. 47C and FIG. 47D, and FIG. 50A and FIG. 50B.

Typical instrumented baseball plates are disclosed in FIG. 44A and FIG. 44B, FIG. 45A and FIG. 45B, FIG. 48A and FIG. 48B and FIG. 48C and FIG. 48C, FIG. 49A and FIG. 49B and FIG. 49C and FIG. 49D, FIG. 51A and FIG. 51B and FIG. 51C and FIG. 51D, FIG. 52A and FIG. 52B, FIG. 53A and FIG. 53B and FIG. 53C, and FIG. 54A and FIG. 54B and FIG. 54C. A typical baseball pitcher's rubber is disclosed in FIG. 65A and FIG. 65B and FIG. 65C.

In this embodiment 4, 6, 8, 10, 16 and 18 are configured to operate and communicate wirelessly with the remote base station 15 employing single point non-diversity reception techniques via a fixed point multi-directional RF antenna array relay junction 13 and bi-directional cable communications cable 14. Because of its simplicity, this feature set enables the complete system to be used in virtually any baseball stadium or training field environment unobtrusively i.e. no underground cabling or trenching of the field and with only a minimal amount of set-up time required prior to use.

At the time the complete system comprised of 3 thru 10, 16, 17, 18, and 13 thru 15 is initially placed into operation at a given stadium or training ball field testing to determine the very best received signal strength, location and optimal placement of 13 relative to 3 thru 10 should be performed by field-side personnel familiar with the system.

FIG. 59B further depicts the aerial position of 13 mounted above 12 the ground level 11 beneath. This step is important to ensure that during a typical baseball game or training session personnel situated at 15 may operate and receive the high quality photographic images made in real-time from 4, 6, 8, 10, 16 and 18 individually or in multiple simultaneously.

The antenna array relay junction 13 simultaneously receives the televised RF signals transmitted by each and all of the static instrumented sports paraphernalia on the ground i.e. 3, 5, 7, 9 and 17 . The televised RF signals from each of the instrumented sports paraphernalia have different carrier frequencies to differentiate them from one another and improve the S/N ratio. The antenna array relay junction 13 simultaneously relays these televised signals to the remote base station 15 over the bi-directional communications link 14. Depending on the total number of HD TV cameras contained in the instrumented sports paraphernalia 3, 5, 7, 9 and 17 that are simultaneously on the playing field, and the noise levels in the air ways in the stadium, the cameraman in the remote base station 15 can conserve bandwidth to insure the quality of the HD that is broadcast to the TV viewing audience by the remote base station 15. The cameraman can conserve bandwidth by transmitting a control signal to each of the instrumented sports paraphernalia 3, 5, 7, 9 and 17 instructing them to operate all their cameras in a low resolution mode. The cameraman then selects which of the instrumented sports paraphernalia's camera's video is going to be broadcast to the TV viewing audience, and sends a control signal to those instrumented sports paraphernalia cameras to televise their signals in the HD resolution mode. The instrumented sports paraphernalia then transmits its camera's HD video televised signal to the remote base station 15 via the antenna array relay junction 13. As an example, the low resolution mode can be realized using TDM (time division multiplexing) or FDM (frequency division multiplexing) or HDT (high definition thumbnails).

Single point non diversity reception refers to a wireless communication technique whereby a single physical repeater antenna array location within a sports stadium is used to convey the radio frequency signals traveling to and from the instrumented sports paraphernalia and the remote base station. The quality and reliability of the signals received at the remote base station when using this technique relies heavily on the assumption that a decent signal to noise ratio is attainable even while the sports paraphernalia is in moved throughout such a stadium, i.e. during a game.

Referring to the Preferred Embodiments Specified in FIG. 59A and FIG. 59B, the Wireless Baseball Stadium Satisfies all of the Following Further Objectives:

It is an objective of the present invention to replace existing prior art non-instrumented sports paraphernalia like baseball bases, baseball home plates, and pitcher's rubbers that are currently on existing playing fields with substitute instrumented sports paraphernalia like instrumented baseball bases, instrumented baseball home plates and instrumented baseball pitcher's rubbers. It is an objective of the present invention to equip existing prior art sports stadiums with instrumented sports paraphernalia systems comprised of instrumented sports paraphernalia (like instrumented sports paraphernalia like instrumented baseball bases, instrumented baseball home plates and instrumented baseball pitcher's rubbers), an antenna array relay junction, bi-directional communication links, and a remote base station, to improve the quality of the stadium's sports TV broadcasts. It is an objective of the present invention that a baseball stadium used to wirelessly televise baseball games from baseball sports paraphernalia be instrumented with an instrumented baseball first base, an instrumented baseball second base, an instrumented baseball third base, an instrumented baseball home plate, and an instrumented pitcher's rubber, an antenna array relay junction located within the stadium but outside the limits of the baseball playing field, a bi-directional communications cable between the remote base station and the antenna array relay junction, and a remote base station. It is an objective of the present invention to equip a baseball stadium to wirelessly televise baseball games from sports paraphernalia i.e. $1^{st}$, $2^{nd}$, $3^{rd}$ bases, pitcher's rubber, and home plate located on the baseball playing field to a remote base station via an antenna array relay junction, and then to the TV viewing audience. It is an objective of the present invention to use this system in virtually any baseball stadium or training field environment unobtrusively with only a minimal amount of set-up time required prior to use. It is an objective of the present invention to locate and optimally place the antenna array relay junction to achieve the very best received signal strength. It is an objective of the present invention to operate and receive high quality photographic images made in real-time from all of the instrumented sports paraphernalia in multiple simultaneously.

It is an objective of the present invention that the antenna array relay junction receive televised signals simultaneously from a multiplicity of static instrumented sports paraphernalia (like for example instrumented baseball bases, instrumented baseball home plates and instrumented baseball pitcher's rubbers) that are on the playing field. It is an objective of the present invention that the antenna array relay junction receives televised signals simultaneously from a multiplicity of instrumented sports paraphernalia that are on the playing field and relays them simultaneously to the remote base station. It is an objective of the present invention that the antenna array relay junction receives command and control signals from the remote base station and relays them to a single static instrumented sports paraphernalia that is on the playing field. It is an objective of the present invention that the antenna array relay junction receives command and control signals from the remote base station and relays them simultaneously to a multiplicity of static instrumented sports paraphernalia that are on the playing field.

It is an objective of the present invention to equip any sports stadium with a fiber optics/copper cable bidirectional communication link between the antenna array relay junction and the remote base station, an antenna array relay junction, a bidirectional wireless radio wave communication link between the instrumented sports paraphernalia (like instrumented baseball bases, instrumented baseball home plates, and baseball pitcher's rubber) and the antenna array relay junction, a remote base station, and an antenna array relay junction. It is an objective of the present invention to equip any sport stadium/arena with instrumented sports paraphernalia, an antenna array relay junction, wireless and/or fiber optics/copper cable communication links, and a remote base station. It is an objective of the present invention to equip any sport stadium to simultaneously wirelessly televise sports games from a multiplicity of both dynamic and static sports paraphernalia i.e. 1$^{st}$, 2$^{nd}$, 3$^{rd}$ baseball bases, pitcher's rubbers, and baseball home plates located on the playing field to a remote base station. It is an objective of the present invention to equip any sport stadium to simultaneously wirelessly televise sports activity from a multiplicity of static sports paraphernalia i.e. pitcher's rubbers and baseball home plates located off the playing field in a bullpen to a remote base station. It is an objective of the present invention to configure and equip any sports training field to both wirelessly/and by use of fiber optics cable/copper cable, simultaneously televise sports games from a multiplicity of static sports paraphernalia i.e. 1$^{st}$, 2$^{nd}$, 3$^{rd}$ baseball bases and baseball home plates located on the playing field, to a remote base station. It is an objective of the present invention to configure and equip any sport stadium to simultaneously televise sports games using both wireless and bi-directional fiber optics/copper cable communications links from a multiplicity of static sports paraphernalia i.e. pitcher's rubbers and baseball home plates, located off the playing field i.e. pitcher's bullpen, to a remote base station. It is an objective of the present invention to provide the remote base station with an automatic means and/or manual means to select any two of the four cameras that are parts of an instrumentation package assembly, to be a 3-D stereo camera pair. It is an objective of the present invention to enable the remote base station to adjust the rotational axis of each camera in the 3-D stereo camera pair in real-time to have the proper alignment and letterbox aspect ratio to produce the proper three-dimensional display irrespective of the camera's line of sight angular direction relative to the instrumented baseball home plate. It is an objective of the present invention that the antenna array relay junction receive televised signals simultaneously from a multiplicity of static instrumented sports paraphernalia that are on the playing field. It is an objective of the present invention that the antenna array relay junction receive televised signals from a single dynamic instrumented sports paraphernalia that is on the playing field. It is an objective of the present invention that the antenna array relay junction receives televised signals simultaneously from a multiplicity of instrumented sports paraphernalia that are on the playing field and relays them simultaneously to the remote base station. It is an objective of the present invention that the antenna array relay junction receives command and control signals from the remote base station and relays them to a single static instrumented sports paraphernalia that is on the playing field. It is an objective of the present invention that the antenna array relay junction receives command and control signals from the remote base station and relays them simultaneously to a multiplicity of static instrumented sports paraphernalia that are on the playing field.

FIG. 60A and FIG. 60B

The detailed physical elements disclosed in the typical instrumented baseball stadium drawings shown in FIG. 60A and FIG. 60B are identified as follows: 1 is the baseball playing field ground. 2 is the baseball diamond. The distance between the instrumented baseball home plate 3 and the instrumented baseball first base 5 is 90 feet. The distance between the instrumented baseball first base 5 and the instrumented baseball second base 7 is 90 feet. The distance between the instrumented baseball second base 7 and the instrumented baseball third base 9 is 90 feet. The distance between the instrumented baseball third base 9 and the instrumented baseball home plate 3 is 90 feet. 4 is the instrumentation package assembly of the instrumented baseball home plate. 4 is equipped for fiber optic/copper connection with a fiber optics cable/copper cable connector. 5 is the instrumentation package assembly of the first instrumented baseball base. 6 is the instrumentation package assembly equipped for fiber optic connection with a fiber optics cable/copper cable connector. 7 is the instrumentation package assembly of the second instrumented baseball base. 8 is the instrumentation package assembly equipped for fiber optic connection with a fiber optics cable/copper cable connector. 9 is the instrumentation package assembly of the third instrumented baseball base. 10 is the instrumentation package assembly equipped for fiber optic connection with a fiber optics cable/copper cable connector. 11 is the bi-directional multi-function fiber optic communication cable to home plate and second base IPA. 12 is the bi-directional multi-function fiber optic communication cable to first base IPA. 13 is the bi-directional multi-function fiber optic communication cable to the pitcher's rubber and second base IPA. 14 is the bi-directional multi-function fiber optic communication cable to third base instrumentation package assembly. 15 is the field-side fiber optic/copper multi-function junction box termination point for all instrumentation package assemblies (also known as the antenna array relay junction). It is located within the stadium but outside the limits of the baseball playing field. 16 is the bi-directional multi-function fiber optic/copper cables between 15 and the remote base station. 17 is the remote base station employing bi-directional fiber optic/copper connectivity. 18 is the instrumentation package assembly in the pitcher's rubber. 19 is the pitcher's rubber. 20 is the instrumentation package assembly in the pitcher's rubber.

FIG. 60A is a diagram of the top view of a typical instrumented baseball stadium equipped to televise baseball games via fiber optics cable/copper cable from instrumented sports paraphernalia on the baseball playing field. FIG. 60B is a diagram of the side view of a typical instrumented baseball stadium equipped to televise baseball games via fiber optics cable from instrumented sports paraphernalia on the baseball playing field.

Referring to drawings FIG. 60A and FIG. 60B, in a preferred embodiment, a typical instrumented baseball stadium equipped to televise baseball games via fiber optics cable/copper cable from instrumented sports paraphernalia located on the baseball playing field, to a remote base station, is disclosed.

FIG. 60A and FIG. 60B shows a typical instrumented baseball stadium equipped with a fiber optics cable/copper cable communications link used to televise baseball games from sports paraphernalia i.e. $1^{st}$, $2^{nd}$, $3^{rd}$ bases, pitcher's rubber and home plate located on the baseball playing field, to a remote base station.

Typical instrumented baseball bases are disclosed in FIG. 38A and FIG. 38B, FIG. 39A and FIG. 39B, FIG. 42A and FIG. 42B, FIG. 43A and FIG. 43B, FIG. 46A and FIG. 46B, FIG. 47A and FIG. 47B, FIG. 47C and FIG. 47D, and FIG. 50A and FIG. 50B.

Typical instrumented baseball plates are disclosed in FIG. 44A and FIG. 44B, FIG. 45A and FIG. 45B, FIG. 48A and FIG. 48B and FIG. 48C and FIG. 48C, FIG. 49A and FIG. 49B and FIG. 49C and FIG. 49D, FIG. 51A and FIG. 51B and FIG. 51C and FIG. 51D, FIG. 52A and FIG. 52B, FIG. 53A and FIG. 53B and FIG. 53C, and FIG. 54A and FIG. 54B and FIG. 54C.

A typical baseball pitcher's rubber is disclosed in FIG. 65A and FIG. 65B and FIG. 65C.

Referring to the preferred embodiments disclosed in FIG. 60A and FIG. 60B a typical instrumented baseball stadium equipped for baseball camera system operation employing bi-directional multi-function fiber optic cable connectivity is specified.

Referring to the preferred embodiment disclosed in FIG. 60A and FIG. 60B the typical instrumented baseball stadium is equipped with bi-directional multi-function fiber optic cable communication links to televise baseball games from sports paraphernalia i.e. $1^{st}$, $2^{nd}$, $3^{rd}$ bases and home plate located on the baseball playing field, to a remote base station. The instrumentation package assembly has bi-directional multi-function fiber optic cable connectivity with the remote base station via these cables. The fiber optics cable/copper cable from beneath the ground of the baseball stadium playing field, enters the bottom of the instrumented baseball home plate/instrumented baseball base through its access opening. The fiber optics cable/copper cable connector is connected to its mating instrumentation package assembly connector in the bottom of the instrumented baseball home plate/instrumented baseball bases. The instrumentation package assembly connector is wired to the instrumentation package assembly electronics. The baseball stadium fiber optic cable/copper cable run includes copper cabling which furnishes an alternate source of low voltage dc power to the instrumented baseball home plate/instrumented baseball base.

FIG. 60A illustrates a baseball stadium using bases 5,7 and 9 and a home plate 3 each equipped with instrumentation package assemblies 4,6, 8 and 10 employing bi-directional multi-function fiber optic cable connectivity between all instrumentation package assemblies and the remote base station 17 employing bi-directional fiber optic connectivity.

Some baseball stadiums are located in geographical areas prone to radio frequency emissions that could be disruptive to a wireless camera instrumentation system. In such cases of extreme radio frequency interference an implementation of a hard-wired system is best to ensure that the high quality photographic images captured in real-time by 4, 6, 8 and 10 are conveyed to 17 without degradation and to reduce the time required by personnel during setup i.e. particularly in stadiums whereby frequent patterns of use would be anticipated. To do this, such a system requires an underground installation be made comprised of bi-directional multi-function fiber optic communication cables 11, 12, 13 and 14 between 4, 6, 8 and 10 and a field-side fiber optic multi-function junction box termination point 16 must be used.

FIG. 60A and FIG. 60B additionally show a preferred approach of how 11, 12, 13 and 14 could be positioned when it is desirable to use multiple under ground trenches beneath the outer perimeter of 2 at the time of installation. Since such a system is permanently installed within 1, personnel operating 17 need only connect bi-directional multi-function fiber optic cables 16 between 15 and 17 prior to a game or training session—making set-up simple and easy.

The underground fiber optics cable/copper cable is laid in three separate underground trenches. The first trench extends from the fiber optics junction box 15 to the instrumented baseball home plate 3 and continues on to the instrumented $2^{nd}$ base 7. The second trench extends from 15 to the instrumented $1^{st}$ base 5. The third trench extends from 15 to the instrumented 3rd base 9.

The instrumented baseball home plate 3, instrumented $1^{st}$ base 5, instrumented $2^{nd}$ base 7, and instrumented 3rd base 9 are each connected to the fiber optics cable/copper cable using their respective fiber optics/copper cable connectors. The fiber optics cables/copper cables 11, 12, 13 and 14 are connected to their respective instrumentation package assemblies 4, 6, 8 and 10 via the fiber optics/copper cable connectors.

The fiber optics cables/copper cables 11, 12, 13 and 14 are routed up from under the ground and up through the anchoring device of the instrumented baseball home plate and each $1^{st}$, $2^{nd}$ and 3rd instrumented baseball base respectively. The respective fiber optics cable/copper cable with its connector enters the bottom of the instrumented baseball home plate and each instrumented baseball base respectively through the access openings thereon. The fiber optics cables/copper cables 11, 12, 13 and 14 are each connected to their mating connectors of the instrumentation package assemblies 4, 6, 8, and 10 in the instrumented baseball home plate 3 and the three instrumented baseball bases 5, 7 and 9 respectively. Some modification of the existing prior art anchoring devices may be required in order to provide a clear path for the routing of the cable. In an alternative preferred embodiment the fiber optics cable/copper cable is routed around the outside of the anchoring device and connected to the fiber optics connector. The value of this alternative preferred embodiment is that it doesn't require altering the existing prior art anchoring devices.

Stadiums employing the use of fiber optics cable/copper cable based system like that shown in FIG. 60A have some additional features otherwise unavailable in a completely wireless system. First these features include the ability to send dc power to 4, 6, 8 and 10 via 11, 12, 13 and 14 supplied by 17 via 15 and 16 respectively. Secondly, 3, 5, 8 and 10 may be upgraded or replaced to incorporate additional camera angles easily at the discretion of the system operator. Finally, but not limited to: the high quality photographic images in full hi-definition may be simultaneously received by 17 from any combination of 4, 6, 8 and 10 respectively without the need of high radio frequency bandwidth Referring to the Preferred Embodiments Specified in FIG. 60A and FIG. 60B, the Baseball Stadium Satisfies all of the Following Further Objectives:

It is an objective of the present invention to equip a baseball stadium to televise baseball games using a fiber optics communications link and/or a high speed copper cable communications link from sports paraphernalia i.e. $1^{st}$, $2^{nd}$, $3^{rd}$ bases, baseball pitcher's rubber and home plate located on the baseball playing field to a remote base station. It is an objective of the present invention to equip a baseball stadium to televise baseball games using a fiber optics communications link and/or a high speed copper cable communications link from each individual sports paraphernalia i.e. $1^{st}$, $2^{nd}$, $3^{rd}$ bases, baseball pitcher's rubber and home plate located on the baseball playing field, to an antenna array relay junction, which relays the televised signals to a remote base station using a fiber optics and/or a high speed copper cable communications link. It is an objective of the present invention to equip a baseball stadium to televise baseball games using bi-directional multi-function fiber optic cable communication links and/or bi-directional multi-function high speed copper cable communication links buried beneath the ground of the baseball stadium playing field, that enter the bottom of the instrumented baseball sports paraphernalia located at their traditional positions on the playing field, through an access opening. It is an objective of the present invention to equip a baseball stadium with fiber optics cable/copper cable connector that are connected to their mating instrumentation package assembly connectors in the bottom of the instrumented baseball sports paraphernalia on the playing field. It is an objective of the present invention to equip a baseball stadium with fiber optic cable/copper cable runs that includes copper cabling which furnishes an alternate source of low voltage dc power to the instrumented baseball sports paraphernalia located at their traditional positions on the playing field, that enters the bottom of the instrumented baseball sports paraphernalia through an access opening. It is an objective of the present invention to replace existing prior art non-instrumented sports paraphernalia like baseball bases, baseball home plates, and pitcher's rubbers that are currently on existing playing fields with substitute instrumented sports paraphernalia like instrumented baseball bases, instrumented baseball home plates and instrumented baseball pitcher's rubbers. It is an objective of the present invention to equip existing prior art sports stadiums with instrumented sports paraphernalia systems comprised of instrumented sports paraphernalia (like instrumented sports paraphernalia like instrumented baseball bases, instrumented baseball home plates and instrumented baseball pitcher's rubbers), an antenna array relay junction, bi-directional communication links, and a remote base station, to improve the quality of the stadium's sports TV broadcasts. It is an objective of the present invention that a baseball stadium used to televise baseball games using fiber optics cable/copper cable from baseball sports paraphernalia be instrumented with an instrumented baseball first base, an instrumented baseball second base, an instrumented baseball third base, an instrumented baseball home plate, and an instrumented pitcher's rubber, an antenna array relay junction located within the stadium but outside the limits of the baseball playing field, a bi-directional communications cable between the remote base station and the antenna array relay junction, and a remote base station. It is an objective of the present invention to equip a baseball stadium to televise baseball games from sports paraphernalia i.e. $1^{st}$, $2^{nd}$, $3^{rd}$ bases, pitcher's rubber, and home plate using fiber optics cable/copper cable to a remote base station via an antenna array relay junction. It is an objective of the present invention to use the instrumented sports paraphernalia system in virtually any baseball stadium or training field environment unobtrusively with only a minimal amount of set-up time required prior to use. It is an objective of the present invention to locate and optimally place the antenna array relay junction to achieve the shortest cable runs. It is an objective of the present invention to operate and receive high quality photographic images made in real-time from a multiplicity of instrumented sports paraphernalia simultaneously. It is an objective of the present invention that the antenna array relay junction receive televised signals simultaneously from a multiplicity of static instrumented sports paraphernalia (like for example instrumented baseball bases, instrumented baseball home plates and instrumented baseball pitcher's rubbers) that are on the playing field, by fiber optics cable/copper cable buried beneath the playing field. It is an objective of the present invention that the antenna array relay junction receives televised signals simultaneously from a multiplicity of instrumented sports paraphernalia that are on the playing field and relay them simultaneously to the remote base station by fiber optics cable/copper cable. It is an objective of the present invention that the antenna array relay junction receives command and control signals from the remote base station by fiber optics cable/copper cable bi-directional communications links, and relay them simultaneously in parallel to each of the instrumented sports paraphernalia that are on the playing field. It is an objective of the present invention that the antenna array relay junction receives command and control signals from the remote base station and relays them simultaneously to a multiplicity of static instrumented sports paraphernalia that are on the playing field. It is an objective of the present invention to equip existing sports stadium with a parallel fiber optics/copper cable bi-directional communication link beneath the ground between the antenna array relay junction and instrumented sports paraphernalia (like instrumented baseball bases, instrumented baseball home plates, and baseball pitcher's rubber) on the playing field. It is an objective of the present invention to equip every sport stadium/arena with instrumented sports paraphernalia, an antenna array relay junction, wireless and/or fiber optics/copper cable communication links, and a remote base station to improve the quality of its sports TV broadcasting of games. It is an objective of the present invention to equip any sport stadium to simultaneously wirelessly televise sports games from a multiplicity of static sports paraphernalia i.e. $1^{st}$, $2^{nd}$, $3^{rd}$ baseball bases, pitcher's rubbers, and baseball home plates located on the playing field to a remote base station. It is an objective of the present invention to equip any sport stadium to simultaneously wirelessly televise sports activity from a multiplicity of static sports paraphernalia i.e. pitcher's rubbers and baseball home plates located off the playing field in a bullpen to a remote base station. It is an objective of the present invention to configure and equip any sports training field to use fiber optics cable/copper cable, to simultaneously televise sports games from a multiplicity of static sports paraphernalia i.e. $1^{st}$, $2^{nd}$, $3^{rd}$ baseball bases and baseball home plates located on the playing field, to a remote base station. It is an objective of the present invention to configure and equip any sport stadium to simultaneously televise sports games using bi-directional fiber optics/copper cable communications links from a multiplicity of static sports paraphernalia i.e. pitcher's rubbers and baseball home plates, located off the playing field i.e. pitcher's bullpen, to a remote base station. It is an objective of the present invention to provide the remote base station with an automatic means and/or manual means to select any two of the four cameras that are parts of an instrumentation package assembly, to be a 3-D stereo camera pair.

It is an objective of the present invention to enable the remote base station to adjust the rotational axis of each camera in the 3-D stereo camera pair in real-time to have the proper alignment and letterbox aspect ratio to produce the proper three-dimensional display irrespective of the camera's line of sight angular direction relative to the instrumented baseball home plate. It is an objective of the present invention that the antenna array relay junction receive televised signals simultaneously from a multiplicity of static instrumented sports paraphernalia that are on the playing field. It is an objective of the present invention that the antenna array relay junction receive televised signals from a single static instrumented sports paraphernalia that are on the playing field. It is an objective of the present invention that the antenna array relay junction receives televised signals simultaneously from a multiplicity of instrumented sports paraphernalia that are on the playing field and relays them simultaneously to the remote base station. It is an objective of the present invention that the antenna array relay junction receives command and control signals from the remote base station and relays them to a single static instrumented sports paraphernalia that is on the playing field. It is an objective of the present invention that the antenna array relay junction receives command and control signals from the remote base station and relays them simultaneously to a multiplicity of static instrumented sports paraphernalia that are on the playing field.

FIG. 61A and FIG. 61B

The detailed physical elements disclosed in the typical instrumented baseball stadium drawings shown in FIG. 61A and FIG. 61B are identified as follows: 1 is the baseball playing field ground. 2 is the baseball diamond. The distance between the instrumented baseball home plate 3 and the instrumented baseball first base 5 is 90 feet. The distance between the instrumented baseball first base 5 and the instrumented baseball second base 7 is 90 feet. The distance between the instrumented baseball second base 7 and the instrumented baseball third base 9 is 90 feet. The distance between the instrumented baseball third base 9 and the instrumented baseball home plate 3 is 90 feet. The distance between the third base 9 and the pitcher's rubber 23 is 63 feet. 3 is the instrumented baseball home plate equipped with the instrumentation package assembly. 4 is the instrumentation package assembly equipped for fiber optic/copper cable connection. 5 is the first instrumented baseball base equipped with the instrumentation package assembly. 6 is the instrumentation package assembly equipped for fiber optic/copper cable connection. 7 is the second instrumented baseball base equipped with the instrumentation package assembly. 8 is the instrumentation package assembly of second base so equipped for fiber optics/copper cable connection. 9 is the third instrumented baseball base equipped with the instrumentation package assembly. 10 is the instrumentation package assembly equipped for fiber optic/copper cable connection. 11 is the bi-directional multi-function fiber optic communication cable to home and all other base IPAs. 12 is the bi-directional multi-function fiber optic/copper communication cable between home plate and first base. 13 is the bi-directional multi-function fiber optic/copper communication cable between first and second base. 14 is the bi-directional multi-function fiber optic communication cable between second and s third base. 15 is the field-side fiber optic/copper multi-function junction box termination point for all IPAs (also known as the antenna array relay junction). It is located within the stadium but outside the limits of the baseball playing field. 16 is the bi-directional multi-function fiber optic/copper cables between 15 and the remote base station. 17 is the remote base station employing bi-directional fiber optic/copper connectivity. 18 is the bi-directional multi-function fiber optic/copper communication cable to home IPA. 19 is the bi-directional multi-function fiber optic communication cable to first base. 20 is the bi-directional multi-function fiber optic/copper communication cable to second base. 21 is the bi-directional multi-function fiber optic/copper communication cable to third base. 22 is the bi-directional multi-function fiber optic/copper communication cable between third base and the pitcher's rubber. 23 is the pitcher's rubber. 24 is the instrumentation package assembly equipped for fiber optic/copper connection. 25 is the instrumentation package assembly equipped for fiber optic/copper connection.

FIG. 61A is a diagram of the top view of a typical instrumented baseball stadium equipped to televise baseball games via fiber optics cable/copper cable from instrumented sports paraphernalia on the baseball playing field.

FIG. 61B is a diagram of the side view of a typical instrumented baseball stadium equipped to televise baseball games via fiber optics cable/copper cable from instrumented sports paraphernalia on the baseball playing field.

Referring to drawings FIG. 61A and FIG. 61B, in a preferred embodiment, a typical instrumented baseball stadium equipped to televise baseball games via fiber optics cable/copper cable from instrumented sports paraphernalia located on the baseball playing field to a remote base station is disclosed.

FIG. 61A and FIG. 61B shows a typical instrumented baseball stadium equipped with a fiber optics cable/copper cable communications link to televise baseball games from sports paraphernalia i.e. $1^{st}$, $2^{nd}$, $3^{rd}$ bases, pitcher's rubber and home plate located on the baseball playing field, to a remote base station.

Typical instrumented baseball bases are disclosed in FIG. 38A and FIG. 38B, FIG. 39A and FIG. 39B, FIG. 42A and FIG. 42B, FIG. 43A and FIG. 43B, FIG. 46A and FIG. 46B, FIG. 47A and FIG. 47B, FIG. 47C and FIG. 47D, and FIG. 50A and FIG. 50B.

Typical instrumented baseball plates are disclosed in FIG. 44A and FIG. 44B, FIG. 45A and FIG. 45B, FIG. 48A and FIG. 48B and FIG. 48C and FIG. 48C, FIG. 49A and FIG. 49B and FIG. 49C and FIG. 49D, FIG. 51A and FIG. 51B and FIG. 51C and FIG. 51D, FIG. 52A and FIG. 52B, FIG. 53A and FIG. 53B and FIG. 53C, and FIG. 54A and FIG. 54B and FIG. 54C. A typical baseball pitcher's rubber is disclosed in FIG. 65A and FIG. 65B and FIG. 65C.

The only substantial difference between the preferred embodiment disclosed in FIG. 61A and FIG. 61B, and the preferred embodiment disclosed in FIG. 60A and FIG. 60B is that the bidirectional multi-function fiber optics cable/copper cable is connected to the fiber optics/copper cable junction box sequentially to home plate and $1^{st}$, $2^{nd}$ and $3^{rd}$ bases respectively, rather than directly to home plate, $1^{st}$, $2^{nd}$ and $3^{rd}$ base. Some stadiums may favor one or the other method to facilitate easier installation of the fiber optics system.

Referring to the preferred embodiment disclosed in FIG. 61A and FIG. 61B a baseball stadium equipped for baseball camera system operation employing bi-directional multi-function fiber optic cable connectivity is specified. The underground fiber optics cable/copper cable is laid in a single contiguous underground trench. The trench that contains fiber optics cable 11 extends from the fiber optics/copper cable junction box 15 to the instrumented baseball home plate 3 and continues as fiber optics cable/copper cable 12 on to the instrumented 1st base 5; and continues as fiber optics cable/copper cable 13 on to the instrumented $2^{nd}$ base 7; and continues as fiber optics cable/copper cable 14 on to the instrumented 3$^{rd}$ base 9. The instrumented baseball home plate 3, instrumented 1$^{st}$ base 5, instrumented 2$^{nd}$ base 7, and instrumented 3rd base 9 are each connected to the contiguous fiber optics cable/copper cable using their respective fiber optics/copper cable connectors. The fiber optics cables/copper cables 11, 12, 13 and 14 are connected to their respective instrumentation package assemblies 4, 6, 8 and 10 respectively via the mating fiber optics/copper cable connectors on each.

The fiber optics cables 11, 12, 13 and 14 are routed up from under the ground and up through the anchoring device of the instrumented baseball home plate and each instrumented baseball base respectively. The respective fiber optics cable/copper cable with its connector enters the bottom of the instrumented baseball home plate and each instrumented baseball base respectively through the access openings therein. Some modification of the existing anchoring devices may be required in order to provide a clear path for the routing of the cable. In an alternative preferred embodiment the fiber optics/copper cable is routed around the outside of the anchoring device and connected to the fiber optics/copper cable connector. The value of this alternative preferred embodiment is that it doesn't require altering the existing anchoring devices.

Referring to the Preferred Embodiments Specified in FIG. 61A and FIG. 61B, the Fiber Optics/Copper Cable Baseball Stadium Satisfies all of the Following Objectives:

It is an objective of the present invention to equip existing prior art sports stadiums with instrumented sports paraphernalia systems comprised of instrumented sports paraphernalia (like instrumented baseball bases, instrumented baseball home plates and instrumented baseball pitcher's rubbers), an antenna array relay junction, bi-directional communication links, and a remote base station, to improve the quality of the stadium's sports TV broadcasts. It is an objective of the present invention to replace existing prior art non-instrumented sports paraphernalia like baseball bases, baseball home plates, and pitcher's rubbers that are currently on existing playing fields with substitute instrumented sports paraphernalia like instrumented baseball bases, instrumented baseball home plates and instrumented baseball pitcher's rubbers. It is an objective of the present invention to equip a baseball stadium to televise baseball games using a serial fiber optics/copper cable communications link that runs sequentially between the instrumented sports paraphernalia i.e. instrumented home plate, instrumented first base, instrumented second base, instrumented third base and the instrumented pitcher's rubber, and to the antenna array relay junction which relays the televised signals by a fiber optics/copper cable communications link to the remote base station. It is an objective of the present invention to equip a baseball stadium to televise baseball games using a fiber optics/copper cable communications link from sports paraphernalia i.e. 1$^{st}$, 2$^{nd}$, 3$^{rd}$ bases, pitcher's rubber and home plate located on the baseball playing field, to a remote base station via an antenna array relay junction. It is an objective of the present invention to equip a baseball stadium to televise baseball games using a serial fiber optics communications link and/or a high speed serial copper cable communications link from sports paraphernalia i.e. 1$^{st}$, 2$^{nd}$, 3$^{rd}$ bases, baseball pitcher's rubber and home plate located on the baseball playing field to a remote base station via an antenna array relay junction. It is an objective of the present invention to equip a baseball stadium with a bidirectional multi-function fiber optics cable/copper cable connected to the fiber optics/copper cable junction box (antenna array relay junction) sequentially to home plate, 1$^{st}$, 2$^{nd}$, and 3$^{rd}$ bases and the pitcher's rubber respectively.

It is an objective of the present invention to equip a baseball stadium to televise baseball games using bi-directional multi-function fiber optic cable communication links and/or bi-directional multi-function high speed copper cable communication links buried beneath the ground of the baseball stadium playing field, that enters the bottom of the instrumented baseball sports paraphernalia located at their traditional positions on the playing field, through an access opening. It is an objective of the present invention to equip a baseball stadium with fiber optics cable/copper cable connectors that are connected to their mating instrumentation package assembly connectors in the bottom of the instrumented baseball sports paraphernalia on the playing field. It is an objective of the present invention to equip a baseball stadium with fiber optic cable/copper cable runs that includes copper cabling which furnishes an alternate source of low voltage dc power to the instrumented baseball sports paraphernalia located at their traditional positions on the playing field, that enters the bottom of the instrumented baseball sports paraphernalia through an access opening.

It is an objective of the present invention that a baseball stadium used to televise baseball games using fiber optics cable/copper cable from baseball sports paraphernalia be instrumented with an instrumented baseball first base, an instrumented baseball second base, an instrumented baseball third base, an instrumented baseball home plate, and an instrumented pitcher's rubber, an antenna array relay junction located within the stadium but outside the limits of the baseball playing field, a bi-directional communications cable between the remote base station and the antenna array relay junction, and a remote base station. It is an objective of the present invention to equip a baseball stadium to televise baseball games from sports paraphernalia i.e. 1$^{st}$, 2$^{nd}$, 3$^{rd}$ bases, pitcher's rubber, and home plate using fiber optics cable/copper cable to a remote base station via an antenna array relay junction. It is an objective of the present invention to use the instrumented sports paraphernalia system in virtually any baseball stadium or training field environment unobtrusively with only a minimal amount of set-up time required prior to use. It is an objective of the present invention to locate and optimally place the antenna array relay junction to achieve the shortest cable runs. It is an objective of the present invention to operate and receive high quality photographic images made in real-time from a multiplicity of instrumented sports paraphernalia simultaneously.

It is an objective of the present invention that the antenna array relay junction receive televised signals simultaneously from a multiplicity of static instrumented sports paraphernalia (like for example instrumented baseball bases, instrumented baseball home plates and instrumented baseball pitcher's rubbers) that are on the playing field, by fiber optics cable/copper cable buried beneath the playing field. It is an objective of the present invention that the antenna array relay junction receives televised signals simultaneously from a multiplicity of instrumented sports paraphernalia that are on the playing field and relay them simultaneously to the remote base station by fiber optics cable/copper cable. It is an objective of the present invention that the antenna array relay junction receives command and control signals from the remote base station by fiber optics cable/copper cable bi-directional communications links, and relay them simultaneously in serial to each of the instrumented sports paraphernalia that are on the playing field. It is an objective of the present invention that the antenna array relay junction receives command and control signals from the remote base station and relays them simultaneously to a multiplicity of static instrumented sports paraphernalia that are on the playing field.

It is an objective of the present invention to equip existing sports stadium with a parallel fiber optics/copper cable bi-directional communication link beneath the ground between the antenna array relay junction and instrumented sports paraphernalia (like instrumented baseball bases, instrumented baseball home plates, and baseball pitcher's rubber) on the playing field. It is an objective of the present invention to equip every sport stadium/arena with instrumented sports paraphernalia, an antenna array relay junction, wireless and/or fiber optics/copper cable communication links, and a remote base station to improve the quality of its sports TV broadcasting of games. It is an objective of the present invention to provide an instrumented sports paraphernalia system to improve the broadcast quality of any sports stadium by quipping the sport stadium to simultaneously wirelessly televise sports games from a multiplicity of static sports paraphernalia i.e. $1^{st}$, $2^{nd}$, $3^{rd}$ baseball bases, pitcher's rubbers, and baseball home plates located on the playing field to a remote base station. It is an objective of the present invention to equip any sport stadium to simultaneously wirelessly televise sports activity from a multiplicity of static sports paraphernalia i.e. pitcher's rubbers and baseball home plates located off the playing field in a bullpen to a remote base station. It is an objective of the present invention to configure and equip any sports training field to use fiber optics cable/copper cable, to simultaneously televise sports games from a multiplicity of static sports paraphernalia i.e. $1^{st}$, $2^{nd}$, $3^{rd}$ baseball bases and baseball home plates located on the playing field, to a remote base station. It is an objective of the present invention to configure and equip any sport stadium to simultaneously televise sports games using bi-directional fiber optics/copper cable communications links from a multiplicity of static sports paraphernalia i.e. pitcher's rubbers and baseball home plates, located off the playing field i.e. pitcher's bullpen, to a remote base station. It is an objective of the present invention to provide the remote base station with an automatic means and/or manual means to select any two of the four cameras that are parts of an instrumentation package assembly, to be a 3-D stereo camera pair. It is an objective of the present invention to enable the remote base station to adjust the rotational axis of each camera in the 3-D stereo camera pair in real-time to have the proper alignment and letterbox aspect ratio to produce the proper three-dimensional display irrespective of the camera's line of sight angular direction relative to the instrumented baseball home plate. It is an objective of the present invention that the antenna array relay junction receive televised signals simultaneously from a multiplicity of static instrumented sports paraphernalia that are on the playing field. It is an objective of the present invention that the antenna array relay junction receive televised signals from a single static instrumented sports paraphernalia that are on the playing field. It is an objective of the present invention that the antenna array relay junction receives televised signals simultaneously from a multiplicity of instrumented sports paraphernalia that are on the playing field and relays them simultaneously to the remote base station. It is an objective of the present invention that the antenna array relay junction receives command and control signals from the remote base station and relays them to a single static instrumented sports paraphernalia that is on the playing field. It is an objective of the present invention that the antenna array relay junction receives command and control signals from the remote base station and relays them simultaneously to a multiplicity of static instrumented sports paraphernalia that are on the playing field.

FIG. 62A

The detailed physical elements disclosed in the typical instrumented football stadium drawing shown in FIG. 62A are identified as follows: 1 is the football playing field. 2 is the remote base station. 3 is the bi-directional communications cable to first antenna location. 4 is the first antenna location. 5 is the bi-directional communications cable junction of first antenna location. 6 is the bi-directional communications cable to second antenna location. 7 is the second antenna location. 8 is the bi-directional communications cable junction of second antenna location. 9 is the bi-directional communications cable to third antenna location. 10 is the bi-directional communications cable junction of third antenna location. 11 is the third antenna location. 12 is the bi-directional communications cable to fourth antenna location. 13 is the bi-directional communications cable junction of fourth antenna location. 14 is the fourth antenna location. 15 is the bi-directional communications cable to fifth antenna location. 16 is the bi-directional communications cable junction of fifth antenna location. 17 is the fifth antenna location. 18 is the bi-directional communications cable to sixth antenna location. 19 is the sixth antenna location. 20 is the linear dimension of the distance measured across the field of play diagonally. 21 is the instrumented football.

FIG. 62A is a diagram of a typical instrumented football stadium equipped with a wireless RF bi-directional communications link to televise football games from an instrumented football, which is in play on the football playing field, and a remote base station.

Referring to the preferred embodiment specified in FIG. 62A, a typical instrumented football stadium equipped to televise football games from instrumented footballs on the stadium playing field to a remote base station is disclosed.

Typical instrumented footballs are disclosed in FIG. 1A and FIG. 1B and FIG. 1C and FIG. 1D, FIG. 9A and FIG. 9B, FIG. 9C and FIG. 9D, FIG. 9E, FIG. 9F, FIG. 10A and FIG. 10B, FIG. 11A and FIG. 11B, FIG. 12A and FIG. 12B, FIG. 13A and FIG. 13B, FIG. 14A and FIG. 14B, FIG. 15A and FIG. 15B, FIG. 16A and FIG. 16B, and FIG. 17A and FIG. 17B;

FIG. 62A shows a typical instrumented football stadium playing field 1 with the stadium equipped for televising pictures and sound from instrumented football 21 employing multipoint diversity reception techniques.

Some football stadiums are located in areas where only a poor signal to noise ratio can be achieved due to radio frequency interference from other sources within the vicinity while attempting to receive real-time televised images and sounds from an instrumented football 21 using systems that employ only a single antenna point.

Six antenna arrays 4, 7, 11, 14, 17 and 19 are each equipped with electronics that facilitate high-speed real-time bi-directional communication, with the instrumented football 21 using the 802.11(xx0 protocol operating within the unlicensed 2.4 ghz or 5.8 ghz spectrum, and the remote base station 2 via Ethernet or fiber optic cabling. The communication link between the antenna arrays and the instrumented football is wireless, whereas the communication link between the antenna arrays and the remote base station 2 is hard wired.

The remote base station 2 receives the high quality real-time pictures and sound captured by the instrumented football 21 during game play using multiple antenna arrays placed at strategic points. These points may be located near the ground level or at a substantial height above the field of play depending on the radio frequency architecture and/or noise floor and interference characteristics of the particular stadium.

In this preferred embodiment, a set of bi-directional communications cables 3, 6, 9, 12, 15 and 18 are used to connect each of the six antenna arrays 4, 7, 11, 14, 17 and 19 to the remote base station 2 via bi-directional communications cable junctions 5, 8, 10, 13, and 16.

Each of 3, 6, 9, 12, 15 and 18 consist of a separate category six UTP unshielded twisted pair cable assembly. Due to the large area of a football stadium throughout which 3, 6, 9, 12, 15 and 18 must span, category six cables should be used since they are capable of handling the required bandwidth with minimal losses to the signal path. Other types of cabling can also be used including multi-function fiber optic cable assemblies, provided such cabling can handle the required signal bandwidth.

The cabling system segments and related hardware 3, 5, 6, 8, 9, 10, 12, 13, 15, 16 and 18 are also used to convey electric power supplied by electronic hardware within the remote base station 2 to the electronics within each antenna array 4, 7, 11, 14, 17 and 19.

Bi-directional communications cable junctions 5, 8, 10, 13, and 16 are points in the cable installation that facilitate ease of access to 3, 6, 9, 12, 15 and 18 by personnel in the event servicing or future upgrades of the wired network is required.

Installation of 3, 5, 6, 8, 9, 10, 12, 13, 15, 16 and 18 within the stadium structure can be accomplished in several ways depending on the stadium's architecture. For example a run of electrical conduit containing 3, 6, 9, 12, 15 and 18 can be used between each antenna array location and the remote base station 2.

It is also possible that an existing wired or optical data network, already present within the stadium, be used in lieu of 3, 5, 6, 8, 9, 10, 12, 13, 15, 16 and 18, provided such existing network is capable of handling the required bandwidth and power.

The electronics within each antenna array 4, 7, 11, 14, 17 and 19, convey to the electronic hardware located at the remote base station 2, received signal strength indication and status data information along with the specific payload data packet which consists primarily of the image and audio data captured previously by the instrumented football The electronic hardware located at the remote base station 2 executes an algorithm that in real-time continuously monitors and compares the received signal strength indication and status data information from each of the corresponding antenna arrays 4, 7, 11, 14, 17 and 19 and determines dynamically which antenna array to use to receive the best overall specific payload data packet from the instrumented football 21.

Additionally, the electronic hardware located at the remote base station 2 executes an algorithm that in real-time continuously monitors, compares and determines dynamically the radio frequency, gain, polarization and error correction that should be applied by the antenna array's electronics to receive the best overall specific payload data packet from the instrumented football 21.

By proper real-time selection of the radio frequency, gain and polarization the electronics hardware at remote base station 2 can ensure that the images and sounds captured by the instrumented football 6 will be of high quality and will have sufficient stability to allow additional decoding and post processing of the payload data packet by the other electronics hardware and software located at remote base station 2.

By proper real-time selection of the correct antenna arrays, the electronics hardware at remote base station 2 can ensure that the images and sounds captured by the instrumented football 21 will be of high quality and will have sufficient stability to allow additional decoding and post processing of the payload data packet by the other electronics hardware and software located at remote base station 2.

Single point non diversity reception refers to a wireless communication technique whereby a single physical repeater antenna array location within a sports stadium is used to convey the radio frequency signals traveling to and from the instrumented sports paraphernalia and the remote base station. The quality and reliability of the signals received at the remote base station when using this technique relies heavily on the assumption that a decent signal to noise ratio is attainable even while the sports paraphernalia is in moved throughout such a stadium, i.e. during a game.

Multipoint diversity reception refers to a wireless communication technique whereby a network of multiple physical repeater antenna arrays are located within a sports stadium and are used to convey the radio frequency signals traveling to and from the instrumented sports paraphernalia and the remote base station. The signals intercepted at each repeater location are individually compared by the network transceiver at the remote base station and the strongest signal with the best signal to noise ratio is automatically selected for application to the other electronics at the remote base station. The quality and reliability of the signals received at the remote base station when using this technique is far less dependent on the assumption that a decent signal to noise ratio is attainable from what a single repeater antenna array location would achieve even while the sports paraphernalia is in moved throughout such a stadium, i.e. during a game.

Referring to the Preferred Embodiments Specified in FIG. 62A, the Wireless Football Stadium Satisfies all of the Following Further Objectives:

It is an objective of the present invention to equip existing prior art football stadiums with instrumented sports paraphernalia systems comprised of instrumented sports paraphernalia, an antenna array relay junction, bi-directional communication links, and a remote base station to improve the quality of the stadium's sports TV broadcasts. It is an objective of the present invention to provide a low cost version for low budget users like, for example sandlot players and high school leagues. It is an objective of the present invention to equip a football stadium to televise football games using a wireless bi-directional communications link between instrumented footballs in play on the stadium football playing field and a remote base station via an antenna array relay junction. It is an objective of the present invention to equip a football stadium with an instrumented sports paraphernalia system employing six antenna arrays to overcome poor signal to noise ratios in those football stadiums having radio frequency interference. It is an objective of the present invention to equip a football stadium with an instrumented sports paraphernalia system employing six antenna arrays linked by hard wiring to the remote base station. It is an objective of the present invention to equip a football stadium with an instrumented sports paraphernalia system employing a remote base station having hardware that executes a real time algorithm that continuously monitors and compares the received signal strength indication and status data information from each of the corresponding six antenna arrays and determines dynamically which antenna array to use to receive the best overall specific payload data packet from the instrumented football. It is an objective of the present invention to equip a football stadium with an instrumented sports paraphernalia system employing a remote base station having hardware that executes a real time algorithm that continuously monitors, compares and determines dynamically the radio frequency, gain, polarization and error correction that should be applied by the six antenna array's electronics to receive the best overall specific payload data packet from the instrumented football.

FIG. 62B

The detailed physical elements disclosed in the typical instrumented football stadium drawing shown in FIG. 62B are identified as follows: 1 is the football stadium playing field. 2 is the remote base station. 3 is the bi-directional communications cable to antenna array relay junction. 4 is the antenna array relay junction. 5 is the linear dimension of the distance measured across the field of play diagonally. 6 is the instrumented football.

FIG. 62B shows a typical instrumented football stadium equipped with a wireless bi-directional RF communications link to televise football games from an instrumented football, which is in play on the football playing field, and a remote base station.

Referring to the preferred embodiments specified in FIG. 62B, a typical instrumented football stadium equipped to televise football games from instrumented footballs on the stadium playing field to a remote base station is disclosed.

Typical instrumented footballs are disclosed in FIG. 1A and FIG. 1B and FIG. 1C and FIG. 1D, FIG. 9A and FIG. 9B, FIG. 9C and FIG. 9D, FIG. 9E, FIG. 9F, FIG. 10A and FIG. 10B, FIG. 11A and FIG. 11B, FIG. 12A and FIG. 12B, FIG. 13A and FIG. 13B, FIG. 14A and FIG. 14B, FIG. 15A and FIG. 15B, FIG. 16A and FIG. 16B, and FIG. 17A and FIG. 17B;

FIG. 62B shows a typical instrumented football stadium playing field 1 with the stadium equipped for televising pictures and sound from instrumented football 6 employing single-point non-diversity reception techniques.

The disclosed preferred embodiment uses only a single antenna point. This becomes practical in football stadiums that are located in areas where a good signal to noise ratio can be achieved, due to reduced and/or non-existent radio frequency interference from other sources within the vicinity, while attempting to receive real-time televise images and sounds from an instrumented football 6

The antenna array 4 is equipped with electronics that facilitates high-speed real-time bi-directional communication, with the instrumented football 6 using the 802.11(xx0 protocol operating within the unlicensed 2.4 GHz or 5.8 GHz spectrum, and the remote base station 2 via Ethernet or fiber optic cabling. The communication link between the antenna array 4 and the instrumented football 6 is wireless, whereas the communication link between the antenna array and the remote base station 2 is hard wired.

A remote base station 2 receives the high quality real-time pictures and sound captured by the instrumented football 6 during game play using a single antenna array 4 placed at a strategic point. This point may be located near the ground level or at a substantial height above the field of play depending on the radio frequency architecture and/or noise floor and interference characteristics of the particular stadium.

In this preferred embodiment, a bi-directional communications cable 3 is used to connect the antenna array 4 to the remote base station 2. There is no need to have multiple junctions because there is only one cable with two ends.

Cable 3 consists of a separate category six UTP unshielded twisted pair cable assembly. Due to the large area of a typical football stadium the length of 3 can be large depending on the distance between the antenna array 4 and the remote base station 2.

Category six cables are used since they are capable of handling the required bandwidth with minimal losses to the signal path and can carry power. Other types of cabling can also be used including multi-function fiber optic cable assemblies, provided such cabling can handle the required signal bandwidth and can carry power.

The cabling system has only a single segment 3 and is used to convey both bi-directional data as well as power to the antenna array 4. Because only a single segment is used, implementation of the complete hardware setup is easy to place into operation. The reduced complexity is a useful advantage to personnel setting up this equipment at football sporting events or training sessions.

Installation of 3 within the stadium structure can be accomplished in several ways depending on the stadium's architecture. For example a run of electrical conduit containing 3 can be used between the antenna array and the remote base station 2.

It is also possible that an existing wired or optical data network that may already be present within the stadium be used in lieu of 3 provided the existing network is capable of handling the required bandwidth and power. The electronics within the antenna array 4 conveys to the electronic hardware located at the remote base station 2 information including received signal strength indication and status data along with the specific payload data packet which consists primarily of the image and audio data captured previously by the instrumented football 6.

The electronic hardware located at the remote base station 2 executes an algorithm that in real-time continuously monitors and compares the received signal strength indication and status data information from the antenna array 4 with an algorithm and determines dynamically the radio frequency, gain, polarization and error correction that should be applied by the antenna array electronics to receive the best overall specific payload data packet from the instrumented football 6.

By proper real-time selection of the radio frequency, gain and polarization the electronics hardware at remote base station 2 can ensure that the images and sounds captured by the instrumented football 6 will be of high quality and will have sufficient stability to allow additional decoding and post processing of the payload data packet by the other electronics hardware and software located at remote base station 2.

Single point non diversity reception refers to a wireless communication technique whereby a single physical repeater antenna array location within a sports stadium is used to convey the radio frequency signals traveling to and from the instrumented sports paraphernalia and the remote base station. The quality and reliability of the signals received at the remote base station when using this technique relies heavily on the assumption that a decent signal to noise ratio is attainable even while the sports paraphernalia is in moved throughout such a stadium, i.e. during a game.

Multipoint diversity reception refers to a wireless communication technique whereby a network of multiple physical repeater antenna arrays are located within a sports stadium and are used to convey the radio frequency signals traveling to and from the instrumented sports paraphernalia and the remote base station. The signals intercepted at each repeater location are individually compared by the network transceiver at the remote base station and the strongest signal with the best signal to noise ratio is automatically selected for application to the other electronics at the remote base station. The quality and reliability of the signals received at the remote base station when using this technique is far less dependent on the assumption that a decent signal to noise ratio is attainable from what a single repeater antenna array location would achieve even while the sports paraphernalia is in moved throughout such a stadium, i.e. during a game.

If high quality sound and video are not rigid requirements (as they are in professional sports broadcasts for example), and if some small picture instability and jitter are acceptable, the system shown in FIG. 62B can be made to lend itself nicely to ordinary sandlot players and high schools leagues where budgets are tight and only simple recordings of the game as seen and heard by the instrumented football are desired. An instrumented football such as the one shown in FIG. 9F would be applicable because it can be produced more easily at lower cost.

Referring to the Preferred Embodiments Specified in FIG. 62B, the Wireless Football Stadium Satisfies all of the Following Objectives:

It is an objective of the present invention to equip existing prior art football stadiums with instrumented sports paraphernalia systems comprised of an instrumented football, an antenna array relay junction, bi-directional communication links, and a remote base station to improve the quality of the stadium's sports TV broadcasts. It is an objective of the present invention to provide a low cost version for low budget users like, for example sandlot players and high school leagues. It is an objective of the present invention to equip a football stadium to televise football games using a wireless bi-directional communications link between instrumented footballs in play on the stadium football playing field and a remote base station via an antenna array relay junction. It is an objective of the present invention to equip a football stadium with an instrumented sports paraphernalia system employing a single antenna array relay junction in those football stadiums having low radio frequency interference. It is an objective of the present invention to equip a football stadium with an antenna array relay junction that looks at the entire football field, receives wireless RF televised signals from the instrumented football from anywhere on the football field, and transmits wireless RF signals to the instrumented football from the remote base station. It is an objective of the present invention to equip a football stadium with an instrumented sports paraphernalia system employing a single antenna array relay junction linked by hard wiring to the remote base station. It is an objective of the present invention to equip a football stadium with an instrumented sports paraphernalia system employing a remote base station having hardware that executes a real time algorithm that continuously monitors and compares the received signal strength indication and status data information from the antenna array relay junction and determines dynamically the condition of the payload data packet from the instrumented football to help the cameraman to anticipate the next break. It is an objective of the present invention to equip a football stadium with an instrumented sports paraphernalia system employing a remote base station having hardware that executes a real time algorithm that continuously monitors, compares and determines dynamically the radio frequency, gain, polarization and error correction that should be applied by the antenna array relay junction's electronics to receive the best overall specific payload data packet from the instrumented football.

FIG. 62C

The detailed physical elements disclosed in the typical instrumented football stadium drawing shown in FIG. 62C are identified as follows: 1 is the football stadium playing field. 2 is the remote base station. 3 is the bi-directional communications cable. 4 is the bi-directional communications cable. 5 is the instrumented football servo tracking actuator. 6 is the bi-directional communications cable. 7 is the instrumented football tracking camera. 8 is the bi-directional communications cable. 9 is the instrumented football tracking antenna array. 10 is the diagonal distance measured across the field of play. 11 is an instrumented football.

FIG. 62C shows a typical instrumented football stadium equipped with a wireless bi-directional RF communications link to televise football games from an instrumented football which is in play on the football playing field, and a remote base station.

Referring to the preferred embodiment specified in FIG. 62C, a typical instrumented football stadium equipped to televise football games from instrumented footballs on the stadium playing field is disclosed.

Typical instrumented footballs are disclosed in FIG. 1A and FIG. 1B and FIG. 1C and FIG. 1D, FIG. 9A and FIG. 9B, FIG. 9C and FIG. 9D, FIG. 9E, FIG. 9F, FIG. 10A and FIG. 10B, FIG. 11A and FIG. 11B, FIG. 12A and FIG. 12B, FIG. 13A and FIG. 13B, FIG. 14A and FIG. 14B, FIG. 15A and FIG. 15B, FIG. 16A and FIG. 16B, and FIG. 17A and FIG. 17B.

FIG. 62C shows a typical instrumented football stadium playing field 1 with the stadium equipped for televising pictures and sound from instrumented football 11 employing single-point non-diversity reception techniques aided by a single gimbaled antenna array 9 and instrumented football tracking camera 7.

Pictures taken by camera 7 of the instrumented football 11 on the playing field 1 are relayed to the remote base station 2 via bi-directional communications cable 6. The pictures are used by the remote base station 2 to calculate the location of the instrumented football 11 on the field 1 during the game using image recognition techniques.

The calculated location of the instrumented football 11 is fed from the remote base station 2 to the servo actuator 5 which in turn drives the gimbaled mounted antenna array 9 to point at the instrumented football 11. The gimbal mounted antenna array 9 is used to wirelessly receive televised pictures and sound radio signals from the instrumented football 11 and relay these to the remote base station 2 for processing. Bi-directional control signals are also relayed by the antenna array 9 between the remote base station 2 and the instrumented football 11. The antenna array 9 has a narrow beam width and high front to back ratio. This type antenna array 9 is used to reduce potential radio interference from extraneous sources in order to improve the signal to noise ratio of the communications link.

The tracking camera 7 simultaneously views the entire football playing field 1 to see the instrumented football 11. The tracking camera 7 is mounted high up over the football playing field 1 in order to simultaneously see the football playing field 1 in its entirety.

The disclosed preferred embodiment uses only a single antenna 9 point. This becomes practical in football stadiums that are located in areas where a good signal to noise ratio can not be achieved due to increased noise and/or radio frequency interference from other sources within the vicinity, while attempting to receive real-time televised images and sounds from an instrumented football 11.

The antenna arrays 9 is equipped with electronics that facilitates high-speed real-time bi-directional communication, with the instrumented football 11 using the 802.11(xx0 protocol operating within the unlicensed 2.4 ghz or 5.8 ghz spectrum, and the remote base station 2 via Ethernet or fiber optic cabling. The communication link between the antenna array 9 and the instrumented football 11 is wireless, whereas the communication link between the antenna array and the remote base station 2 is hard wired.

A remote base station 2 receives the high quality real-time pictures and sound captured by the instrumented football 11 during game play using a single antenna array 9 placed at a strategic point. This point may be located near the ground level or at a substantial height above the field of play depending on the radio frequency architecture and/or noise floor and interference characteristics of the particular stadium.

In this preferred embodiment, a bi-directional communications cable 8 is used to connect the antenna array 9 to the remote base station 2.

The cabling system has three cable segments 4, 6 and 8 that are used to convey both bi-directional data as well as power between the antenna array 9, servo actuator 5, tracking camera 7 and the remote base station 2.

3 is a cable bundle comprised of three separate category six UTP unshielded twisted pair cable assemblies. Due to the large area of a typical football stadium the length of these cables 3, 4, 6 and 8 can be large depending on the distance between the gimbaled antenna array 9 and servo actuator 5, and tracking camera 7 and the remote base station 2.

Category six cables are used since they are capable of handling the required bandwidth with minimal losses to the signal path and can carry power. Other types of cabling can also be used including multi-function fiber optic cable assemblies, provided such cabling can handle the required signal bandwidth and can carry power.

Because the optimum location for the tracking camera 7 may not be the best location for the antenna 9 due to a poor signal to noise ratio, three separate segments are used so that the tracking camera 7 can be positioned at a remote distance which is different from the gimbaled antenna array 9. This preferred embodiment has an advantage over the embodiment shown in FIG. 62A because it uses only one antenna array versus six.

Installation of cables 3, 4, 6 and 8 within the stadium structure can be accomplished in several ways depending on the stadium's architecture. For example a run of electrical conduit containing 3, 4, 6 and 8 can be used between the antenna array 9, servo actuator 7 and tracking camera 7 and the remote base station 2.

It is also possible that an existing wired or optical data network that may already be present within the stadium be used in lieu of 3, 4, 6 and 8 provided the existing network is capable of handling the required bandwidth and power. The electronics within the antenna array 9 conveys to the electronic hardware located at the remote base station 2 information including received signal strength indication and status data along with the specific payload data packet which consists primarily of the image and audio data captured previously by the instrumented football 11. The electronic hardware located at the remote base station 2 executes an algorithm that in real-time continuously monitors and compares the received signal strength indication and status data information from the antenna array 9 with an algorithm and determines dynamically the radio frequency, gain, polarization and error correction that should be applied by the antenna array electronics to receive the best overall specific payload data packet from the instrumented football 11.

By proper real-time selection of the radio frequency, gain and polarization the electronics hardware at remote base station 2 can ensure that the images and sounds captured by the instrumented football 11 will be of high quality and will have sufficient stability to allow additional decoding and post processing of the payload data packet by the other electronics hardware and software located at remote base station 2.

Single point non diversity reception refers to a wireless communication technique whereby a single physical repeater antenna array location within a sports stadium is used to convey the radio frequency signals traveling to and from the instrumented sports paraphernalia and the remote base station. The quality and reliability of the signals received at the remote base station when using this technique relies heavily on the assumption that a decent signal to noise ratio is attainable even while the sports paraphernalia is in moved throughout such a stadium, i.e. during a game.

Multipoint diversity reception refers to a wireless communication technique whereby a network of multiple physical repeater antenna arrays are located within a sports stadium and are used to convey the radio frequency signals traveling to and from the instrumented sports paraphernalia and the remote base station. The signals intercepted at each repeater location are individually compared by the network transceiver at the remote base station and the strongest signal with the best signal to noise ratio is automatically selected for application to the other electronics at the remote base station. The quality and reliability of the signals received at the remote base station when using this technique is far less dependent on the assumption that a decent signal to noise ratio is attainable from what a single repeater antenna array location would achieve even while the sports paraphernalia is in moved throughout such a stadium, i.e. during a game.

Referring to the Preferred Embodiments Specified in FIG. 62C, the Wireless Football Stadium Satisfies all of the Following Further Objectives:

It is an objective of the present invention to equip existing prior art football stadiums with instrumented sports paraphernalia systems to improve the quality of the stadium's sports TV broadcasts. It is an objective of the present invention to replace current prior art American footballs with substitute instrumented footballs on the football stadium playing field. It is an objective of the present invention to equip a football stadium with an instrumented sports paraphernalia system comprised of a remote base station, bi-directional communications cables, instrumented football servo tracking actuator, an instrumented football tracking camera, an instrumented football tracking antenna array, an instrumented football and a remote base station to televise football games wirelessly from instrumented footballs in play on the football stadium playing field. It is an objective of the present invention to equip a football stadium with a bi-directional RF communications link to televise football games from an instrumented football which is in play on the football playing field. It is an objective of the present invention to equip a football stadium for televising pictures and sound from the instrumented football employing single-point non-diversity reception techniques aided by a single gimbaled antenna array and instrumented football tracking camera. It is an objective of the present invention to equip a football stadium with a remote base station that uses pictures taken by the cameras in the instrumented football to calculate the location of the instrumented football on the field during the game using image recognition techniques. It is an objective of the present invention to equip a football stadium with a remote base station that feeds the calculated location of the instrumented football to the servo actuator which in turn drives the gimbaled mounted antenna array to point at the instrumented football. It is an objective of the present invention to equip a football stadium with a gimbal mounted antenna array to use to wirelessly receive televised pictures and sound radio signals from the instrumented football and relay these to the remote base station for processing. It is an objective of the present invention to equip a football stadium with the remote base station to send control signals via the antenna array to the instrumented football. It is an objective of the present invention to equip a football stadium with a tracking camera that simultaneously views the entire football playing field to see the instrumented football. It is an objective of the present invention to equip a football stadium with only a single antenna point. It is an objective of the present invention to equip a football stadium with an antenna tracking system to overcome the poor S/N ratios and radio frequency interference in some stadiums. It is an objective of the present invention to equip a football stadium with three separate antenna segments so that the tracking camera can be positioned at a remote distance which is different from the gimbaled antenna array. It is an objective of the present invention to equip a football stadium with electronics within the antenna array that conveys to the electronic hardware located at the remote base station information including received signal strength indication and status data along with the specific payload data packet which consists primarily of the image and audio data captured previously by the instrumented football. It is an objective of the present invention to equip a football stadium with electronic hardware located at the remote base station that executes an algorithm that in real-time continuously monitors and compares the received signal strength indication and status data information from the antenna array with an algorithm and determines dynamically the radio frequency, gain, polarization and error correction that should be applied by the antenna array electronics to receive the best overall specific payload data packet from the instrumented football. It is an objective of the present invention to equip a football stadium with electronics hardware at remote base station to make real-time selection of the radio frequency, gain and polarization to ensure that the images and sounds captured by the instrumented football will be of high quality and will have sufficient stability to allow additional decoding and post processing of the payload data packet by the other electronics hardware and software located at remote base station.

FIG. 62D

The detailed physical elements disclosed in the typical instrumented football stadium drawing shown in FIG. 62D are identified as follows: 1 is the football stadium playing field. 2 is the remote base station. 3 is the bi-directional communications cable. 4 is the remote base station repeater antenna. 5 is the remote repeater antenna. 6 is the bi-directional communications cable bundle. 7 is the bi-directional communications cable. 8 is the gimbal servo actuator. 9 is the bi-directional communications cable. 10 is the football tracking camera. 11 is the bi-directional communications cable. 12 is the gimbaled tracking antenna array. 13 is the linear diagonal distance measured across the field of play. 14 is the instrumented football.

FIG. 62D shows a typical instrumented football stadium equipped with a wireless bi-directional communications link to televise football games from an instrumented football which is in play on the football playing field, and a remote base station.

Referring to the preferred embodiment specified in FIG. 62D, a typical instrumented football stadium equipped to televise football games from instrumented footballs on the stadium playing field 1 is disclosed.

Typical instrumented footballs are disclosed in FIG. 1A and FIG. 1B and FIG. 1C and FIG. 1D, FIG. 9A and FIG. 9B, FIG. 9C and FIG. 9D, FIG. 9E, FIG. 9F, FIG. 10A and FIG. 10B, FIG. 11A and FIG. 11B, FIG. 12A and FIG. 12B, FIG. 13A and FIG. 13B, FIG. 14A and FIG. 14B, FIG. 15A and FIG. 15B, FIG. 16A and FIG. 16B, and FIG. 17A and FIG. 17B;

FIG. 62D shows a typical instrumented football stadium playing field 1 with the stadium equipped for televising pictures and sound from instrumented football 14 employing single-point non-diversity reception techniques aided by a single gimbaled antenna array 12 and instrumented football tracking camera 10.

Pictures taken by tracking camera 10 of the instrumented football 14 on the playing field 1 are relayed to the remote base station 2 via bi-directional network repeaters 4 and 5.

The pictures are used by the remote base station 2 to calculate the location of the instrumented football 14 on the field 1 during the game using image recognition techniques.

The calculated location of the instrumented football 14 is fed from the remote base station 2 to the gimbal servo actuator 8 via bi-directional network repeaters 4 and 5 which in turn drives the gimbaled mounted antenna array 12 to point at the instrumented football 14. The gimbal mounted antenna array 12 is used to wirelessly receive televised pictures and sound radio signals from the instrumented football 14 and relay these to the remote base station 2 via bi-directional network repeaters 4 and 5 for processing. Bi-directional control signals are also relayed by the antenna array 12 between the remote base station 2 via bi-directional network repeaters 4 and 5 .and the instrumented football 14.

The antenna array 12 has a narrow beam width and high front to back ratio. This type antenna array 12 is used to reduce potential radio interference from extraneous sources in order to improve the signal to noise ratio of the communications link.

The tracking camera 10 simultaneously views the entire football playing field 1 to see the instrumented football 14. The tracking camera 10 is mounted high up over the football playing field 1 in order to simultaneously see the football playing field 1 in its entirety.

The disclosed preferred embodiment uses only a single antenna 12 point. This becomes practical in football stadiums that are located in areas where a good signal to noise ratio can not be achieved due to increased noise and/or radio frequency interference from other sources within the vicinity, while attempting to receive real-time televised images and sounds from an instrumented football 14.

The antenna array 12 is equipped with electronics that facilitates high-speed real-time bi-directional communication, with the instrumented football 14 using the 802.11(xx0 protocol operating within the unlicensed 2.4 ghz or 5.8 ghz spectrum, and the remote base station 2 via bi-directional network repeaters 4 and 5. The communication link between the antenna array 12 and the instrumented football 14 is wireless. The repeater communication link comprised of repeaters 4 and 5 between the antenna array 12 and the remote base station 2 is also wireless.

A remote base station 2 in turn receives the high quality real-time pictures and sound captured by the instrumented football 14 during game play using a single antenna array 12 placed at a strategic point. This point may be located near the ground level or at a substantial height above the field of play depending on the radio frequency architecture and/or noise floor and interference characteristics of the particular stadium.

In this preferred embodiment, a bi-directional communications cable 3 is used to connect the repeater 4 to the remote base station 2.

The cabling system has three cable segments 7, 9 and 11 that are used to convey both bi-directional data as well as power between the antenna array 12, servo actuator 8, tracking camera 10 and repeater 5.

6 is a cable bundle comprised of three separate category six UTP unshielded twisted pair cable assemblies. Due to the large area of a typical football stadium the length of these cables 6, 7, 9 and 11 can be large depending on the distance between the gimbaled antenna array 12 and servo actuator 8, and tracking camera 10 and repeater 5.

Category six cables are used since they are capable of handling the required bandwidth with minimal losses to the signal path and can carry power. Other types of cabling can also be used including multi-function fiber optic cable assemblies, provided such cabling can handle the required signal bandwidth and can carry power.

Because the optimum location for the tracking camera 10 may not be the best location for the antenna 12 due to a poor signal to noise ratio, three separate segments are used so that the tracking camera 10 can be positioned at a remote distance which is different from the gimbaled antenna array 12. This preferred embodiment has an advantage over the embodiment shown in FIG. 62A because it uses only one antenna array versus six.

Installation of cables 6, 7, 9 and 11 within the stadium structure can be accomplished in several ways depending on the stadium's architecture. For example a run of electrical conduit containing 6, 7, 9 and 11 can be used between the antenna array 12, gimbal servo actuator 8 and tracking camera 10 and the repeater 5. It is also possible that an existing wired or optical data network that may already be present within the stadium be used in lieu of 6, 7, 9 and 11 provided the existing network is capable of handling the required bandwidth and power.

The electronics within the antenna array 12 in turn conveys to the electronic hardware located at the remote base station 2 information including received signal strength indication and status data along with the specific payload data packet which consists primarily of the image and audio data captured previously by the instrumented football 14.

The electronic hardware located at the remote base station 2 executes an algorithm that in real-time continuously monitors and compares the received signal strength indication and status data information from the antenna array 12 with an algorithm and determines dynamically the radio frequency, gain, polarization and error correction that should be applied by the antenna array electronics to receive the best overall specific payload data packet from the instrumented football 14.

By proper real-time selection of the radio frequency, gain and polarization the electronics hardware at remote base station 2 can ensure that the images and sounds captured by the instrumented football 14 will be of high quality and will have sufficient stability to allow additional decoding and post processing of the payload data packet by the other electronics hardware and software located at remote base station 2.

Single point non diversity reception refers to a wireless communication technique whereby a single physical repeater antenna array location within a sports stadium is used to convey the radio frequency signals traveling to and from the instrumented sports paraphernalia and the remote base station. The quality and reliability of the signals received at the remote base station when using this technique relies heavily on the assumption that a decent signal to noise ratio is attainable even while the sports paraphernalia is in moved throughout such a stadium, i.e. during a game.

Multipoint diversity reception refers to a wireless communication technique whereby a network of multiple physical repeater antenna arrays are located within a sports stadium and are used to convey the radio frequency signals traveling to and from the instrumented sports paraphernalia and the remote base station. The signals intercepted at each repeater location are individually compared by the network transceiver at the remote base station and the strongest signal with the best signal to noise ratio is automatically selected for application to the other electronics at the remote base station. The quality and reliability of the signals received at the remote base station when using this technique is far less dependent on the assumption that a decent signal to noise ratio is attainable from what a single repeater antenna array location would achieve even while the sports paraphernalia is in moved throughout such a stadium, i.e. during a game.

Referring to the Preferred Embodiments Specified in FIG. 62D, the Wireless Football Stadium Satisfies all of the Following Further Objectives:

It is an objective of the present invention to replace existing prior art non-instrumented footballs that are currently on existing football playing fields with substitute instrumented footballs. It is an objective of the present invention to equip a football stadium with an instrumented football system for the improvement of the TV broadcast quality of football games. It is an objective of the present invention to equip a football stadium with an instrumented football system comprised of a remote base station, a bi-directional communications cables, remote base station repeater antenna, a remote repeater antenna, a bi-directional communications cable bundle, a bi-directional communications cable, a gimbal servo actuator, football tracking camera, and gimbaled tracking antenna array. It is an objective of the present invention to equip a typical instrumented football stadium with a wireless bi-directional communications link to televise football games from an instrumented football which is in play on the football playing field, and a remote base station. It is an objective of the present invention to equip a typical instrumented football stadium for televising pictures and sound from an instrumented football employing single-point non-diversity reception techniques aided by a single gimbaled antenna array and an instrumented football tracking camera. It is an objective of the present invention to relay pictures taken by the tracking camera of the instrumented football on the playing field, to the remote base station which uses its processing software to calculate the location of the instrumented football on the field during the game, using image recognition processing techniques on the pictures via the archived data base from the tripod mounted set-up camera.

It is an objective of the present invention for the remote base station to use the calculated location of the instrumented football to send a control signal to the gimbal servo actuator via bi-directional network repeaters to drive the gimbaled mounted antenna array to point at the instrumented football. It is an objective of the present invention for the gimbal mounted antenna array to wirelessly receive televised pictures and sound radio signals from the instrumented football and relay these to the remote base station via the bi-directional network repeaters for processing. It is an objective of the present invention for the gimbaled tracking camera to simultaneously view the entire football playing field to see the instrumented football. It is an objective of the present invention for the gimbaled tracking camera system to overcome the S/N ratio in stadiums where increased noise and/or radio frequency interference is an obstacle to receiving real-time televised images and sounds from an instrumented football. It is an objective of the present invention for the remote base station's electronic hardware to measure the received signal strength and status data, along with the specific payload data packet which consists primarily of the image and audio data captured previously by the instrumented football, and execute an algorithm that in real-time continuously monitors and compares the received signal strength indication and status data information from the antenna array with an algorithm and determines dynamically the radio frequency, gain, polarization and error correction that should be applied by the antenna array electronics to receive the best overall specific payload data packet from the instrumented football. It is an objective of the present invention that the determination of the real-time selection of the radio frequency, gain and polarization at the remote base station ensures that the images and sounds captured by the instrumented football are of high HD quality and will have sufficient stability to allow additional decoding and post processing of the payload data packet by the other electronics hardware and software located at remote base station.

FIG. 62E

The detailed physical elements disclosed in the typical instrumented football stadium drawing shown in FIG. 62E are identified as follows: 1 is the football stadium playing field. 2 is the remote base station. 3 is the bi-directional communications cable. 4 is the antenna array relay junction. 5 is the repeater antenna. 6 is the repeater antenna. 7 is the repeater antenna. 8 is the repeater antenna. 9 is the repeater antenna. 10 is the repeater antenna. 11 is the linear diagonal dimension of the distance measured across the playing field. 12 is the instrumented football.

FIG. 62E shows a typical instrumented football stadium equipped with a wireless bi-directional communications link to televise football games from an instrumented football which is in play on the football playing field, and a remote base station.

In the preferred embodiment for the typical instrumented football stadium configuration disclosed in FIG. 62E, it is an objective of the present invention to equip a football stadium to televise football games using a wireless RF bi-directional communications link between an instrumented football in play on the football playing field and a remote base station.

Referring to the preferred embodiment specified in FIG. 62E, a typical instrumented football stadium equipped to televise football games from instrumented footballs on the playing field is disclosed.

Typical instrumented footballs are disclosed in FIG. 1A and FIG. 1B and FIG. 1C and FIG. 1D, FIG. 9A and FIG. 9B, FIG. 9C and FIG. 9D, FIG. 9E, FIG. 9F, FIG. 10A and FIG. 10B, FIG. 11A and FIG. 11B, FIG. 12A and FIG. 12B, FIG. 13A and FIG. 13B, FIG. 14A and FIG. 14B, FIG. 15A and FIG. 15B, FIG. 16A and FIG. 16B, and FIG. 17A and FIG. 17B.

FIG. 62E shows a typical football stadium playing field 1 with the stadium equipped for televising pictures and sound from instrumented football 12 relayed wirelessly to remote base station 2 employing multipoint diversity reception techniques.

Some football stadiums may be located in areas where only a poor signal to noise ratio can be achieved, due to radio frequency interference from other sources within the vicinity, while attempting to receive real-time televised images and sounds from an instrumented football 12 using systems that employ only a single antenna point.

A multiplicity of repeater antenna arrays (for example, six repeater antenna arrays 5, 6,7, 8, 9 and 10) are each equipped with electronics that facilitate high-speed real-time bi-directional communication, with the instrumented football 12 using for example the 802.11(xx0 protocol operating within the unlicensed 2.4 Ghz or 5.8 Ghz spectrum, and the remote base station 2. The communication link between the repeater antenna arrays 5, 6,7, 8, 9 and 10, the instrumented football 12 and the remote base station 2 is wireless.

A remote base station 2 receives the high quality real-time pictures and sound captured by the instrumented football 12 during game play using multiple repeater antenna arrays 5, 6, 7, 8, 9 and 10 placed at strategic points. These points may be located near the ground level or at a substantial height above the field of play depending on the radio frequency architecture and/or noise floor and interference characteristics of the particular stadium.

In this preferred embodiment, a bi-directional communications cable 3 is used to connect antenna array 4 to the remote base station 2.

3 consists of a single category six UTP unshielded twisted pair cable assembly. Due to the large area of a football stadium throughout which 3 spans, a category six cable should be used since it is capable of handling the required bandwidth with minimal losses to the signal path. Other types of cabling can also be used including multi-function fiber optic cable assemblies, provided such cabling can handle the required signal bandwidth. The cabling system segment and related hardware is also used to convey electric power supplied by electronic hardware within the remote base station 2 to the electronics within antenna array 4.

Installation of 3 within the stadium structure can be accomplished in several ways depending on the stadium's architecture. For example a run of electrical conduit containing 3 can be used between the antenna array 4 and the remote base station 2.

It is also possible that an existing wired or optical data network, already present within the stadium, be used in lieu of 3 provided such existing network is capable of handling the required bandwidth and power.

The electronics within each antenna array 4 convey to the electronic hardware located at the remote base station 2 the received signal strength indication and status data information along with the specific payload data packet which consists primarily of the image and audio data captured previously by the instrumented football The electronic hardware located at the remote base station 2 executes an algorithm that in real-time continuously monitors and compares the received signal strength indication and status data information from each of the corresponding antenna arrays 5, 6, 7, 8, 9, and 10 and determines dynamically which antenna array to use to receive the best overall specific payload data packet from the instrumented football 12.

Additionally, the electronic hardware located at the remote base station 2 executes an algorithm that in real-time continuously monitors, compares and determines dynamically the radio frequency, gain, polarization and error correction that should be applied by the antenna array's electronics to receive the best overall specific payload data packet from the instrumented football 12.

By proper real-time selection of the radio frequency, gain and polarization the electronics hardware at remote base station 2 can ensure that the images and sounds captured by the instrumented football 12 will be of high quality and will have sufficient stability to allow additional decoding and post processing of the payload data packet by the other electronics hardware and software located at remote base station 2.

By proper real-time selection of the correct antenna arrays, the electronics hardware at remote base station 2 can ensure that the images and sounds captured by the instrumented football 12 will be of high quality and will have sufficient stability to allow additional decoding and post processing of the payload data packet by the other electronics hardware and software located at remote base station 2.

Single point non diversity reception refers to a wireless communication technique whereby a single physical repeater antenna array location within a sports stadium is used to convey the radio frequency signals traveling to and from the instrumented sports paraphernalia and the remote base station. The quality and reliability of the signals received at the remote base station when using this technique relies heavily on the assumption that a decent signal to noise ratio is attainable even while the sports paraphernalia is in moved throughout such a stadium, i.e. during a game.

Multipoint diversity reception refers to a wireless communication technique whereby a network of multiple physical repeater antenna arrays are located within a sports stadium and are used to convey the radio frequency signals traveling to and from the instrumented sports paraphernalia and the remote base station. The signals intercepted at each repeater location are individually compared by the network transceiver at the remote base station and the strongest signal with the best signal to noise ratio is automatically selected for application to the other electronics at the remote base station. The quality and reliability of the signals received at the remote base station when using this technique is far less dependent on the assumption that a decent signal to noise ratio is attainable from what a single repeater antenna array location would achieve even while the sports paraphernalia is in moved throughout such a stadium, i.e. during a game.

Referring to the Preferred Embodiments Specified in FIG. 62E, the Instrumented Football Stadium Satisfies all of the Following Further Objectives:

It is an objective of the present invention to replace existing prior art non-instrumented footballs that are currently on existing football playing fields with substitute instrumented footballs. It is an objective of the present invention to equip existing prior art football stadiums with the instrumented football system to improve the TV broadcast quality of football games. It is an objective of the present invention to equip a football stadium with an instrumented football system comprised of an instrumented football, a wireless bi-directional communications air ways link, a multiplicity of repeater antennas, an antenna array relay junction, a bi-directional communications cable, and a remote base station. It is an objective of the present invention to equip a football stadium to televise football games using a wireless RF bi-directional communications link between an instrumented football in play on the football playing field and a remote base station. It is an objective of the present invention to equip a football stadium for televising pictures and sound from instrumented footballs that are relayed wirelessly to a remote base station employing multipoint diversity reception techniques. It is an objective of the present invention to equip a football stadium to overcome the poor signal to noise ratio in a stadium due to radio frequency interference from sources within the vicinity of the stadium. It is an objective of the present invention to equip a football stadium with multiple repeater antenna arrays. It is an objective of the present invention to equip a football stadium with a remote base station having hardware to execute algorithms that in real-time continuously monitors, compares and determines dynamically the radio frequency, gain, polarization and error correction that should be applied by the antenna array's electronics to receive the best overall specific payload data packet from the instrumented football to ensure that the images and sounds captured by the instrumented football will be of HD high quality and will have sufficient stability to allow additional decoding and post processing of the payload data packet by the other electronics hardware and software located at remote base station. It is an objective of the present invention to equip a football stadium with a remote base station to make real-time selection of the correct antenna arrays to ensure that the images and sounds captured by the instrumented football will be of HD high quality and will have sufficient stability to allow additional decoding and post processing of the payload data packet by the other electronics hardware and software located at remote base station.

It is an objective of the present invention to stabilize the imagery obtained from the instrumented football in an upright condition in the picture frame, regardless of the pitch, roll or yaw of the ice football, as viewed by a live TV audience in the HD CCD letterbox picture format. It is an objective of the present invention to stabilize the imagery obtained from the instrumented football in an upright condition in the picture frame, regardless of the pitch, roll or yaw of the football, as viewed by a live TV audience in the HD CCD letterbox picture format by using gyroscopic encoders. It is an objective of the present invention to stabilize the imagery obtained from the instrumented football in an upright condition in the picture frame, regardless of the pitch, roll or yaw of the ice hockey puck, as viewed by a live TV audience in the HD CCD letterbox picture format by image recognition processing. It is an objective of the present invention to stabilize the imagery obtained from the instrumented football in an upright condition in the picture frame, regardless of the pitch, roll or yaw of the instrumented football, as viewed by a live TV audience in the HD CCD letterbox picture format by using gyroscopic encoders and image recognition processing. It is an objective of the present invention to stabilize the imagery obtained from the instrumented football in an upright condition in the picture frame, regardless of the pitch, roll or yaw of the football, as viewed by a live TV audience in the HD CCD letterbox picture format by using image recognition processing of the archived data base derived from the tripod mounted set-up camera system used in the football stadium venue. It is an objective of the present invention to stabilize the imagery obtained from the instrumented football in an upright condition in the picture frame, regardless of the pitch, roll or yaw of the football, as viewed by a live TV audience in the HD CCD letterbox picture format by using image recognition processing of the archived data base derived from the tripod mounted set-up camera system in the remote base station. It is an objective of the present invention to provide views of the game not seen before during broadcasts by real time TV audiences. It is an objective of the present invention to provide views of the game from the instrumented football. It is an objective of the present invention to provide views of the game as seen from the vertices of the instrumented football; for example, views in front of the instrumented football as it is being passed forwardly, views in back of the instrumented football as it is being passed forwardly. It is an objective of the present invention to provide sounds of the game not heard before during broadcasts by real time TV audiences. It is an objective of the present invention to provide sounds of the game as heard by the instrumented football as it is handled. It is an objective of the present invention to provide sounds heard from the football as it is passed from player to player and hits the goal net. It is an objective of the current invention that the electronics components needed to carry out all the electronic functions of the instrumentation package assembly defined above, be packaged into the confined space of the instrumentation package assembly inside the instrumented football and that the weight limitations, center of gravity and moment of inertia considerations set out for the instrumentation package assembly be adhered to. It is an objective of the present invention to enable coaches who are on the sidelines during training sessions to hear the spoken dialog of their team's players from on the football field. It is an objective of the present invention to enable coaches who are on the sidelines during training sessions to view details of the team's players during training sessions on the football field. It is an objective of the present invention to enable referees who are on and off the football field during games to review details of the game from the two cameras onboard the instrumented football by instant replay. It is an objective of the present invention to equip the instrumentation package assembly to capture video and sounds on the football field from the instrumented football. It is an objective of the present invention to equip the instrumented football with an instrumentation package assembly that has two TV cameras, two microphones, two wireless antenna elements, battery pack and supporting electronics housed inside its enclosure. It is an objective of the present invention to equip the instrumentation package assembly inside the instrumented football with means to wirelessly televise the captured video and sounds to a remote base station via an antenna array relay junction stationed off the playing field but within (and around) the space of the instrumented football stadium. The antenna array relay junction is equipped to relay the video and sounds to the remote base station. The remote base station is located within the instrumented football stadium or its vicinity. It is an objective of the present invention that the instrumented football is under the command and control of a cameraman in the remote base station. It is an objective of the present invention to enable the instrumentation package assembly to be mounted inside the instrumented football in a manner permitting its two cameras and two microphones to see and hear out of the instrumented football. It is an objective of the present invention to enable the instrumentation package assembly to be mounted inside the instrumented football in a manner permitting the instrumentation package assembly to be protected from damage during the game on the playing field. It is an objective of the present invention to enable the instrumentation package assembly to be mounted inside the instrumented football in a manner permitting it to maintain its mechanical and optical alignment during the game on the playing field. It is an objective of the present invention to provide a permanent position and nesting place for the instrumentation package assembly inside the instrumented football. It is an objective of the present invention to provide the instrumented football with the identical handling and playability qualities as conventional regulation footballs. It is an objective of the present invention to provide a means to permit the instrumentation package assembly to be nested, cradled and isolated from shock and vibration inside the instrumented football. It is an objective of the present invention to provide an instrumentation package assembly that is sized so that it can be easily loaded and assembled into the instrumented football. It is an objective of the present invention to provide the instrumented football with an instrumentation package assembly that carries its own rechargeable battery pack. It is an objective of the present invention to provide the instrumented football with an instrumentation package assembly that carries its own rechargeable battery pack that has sufficient energy to power the cameras, lenses, antennas and electronics for the duration of the football game. It is an objective of the present invention to charge the battery pack of the instrumented football wirelessly using the charging unit. It is an objective of the present invention to provide the instrumented football with instrumentation package assembly electronics that require little power to operate and are lightweight. It is an objective of the present invention to provide the instrumented football with an instrumentation package assembly that carries its own battery pack that is recharged wirelessly by induction. It is an objective of the present invention to provide the instrumented football with an instrumentation package assembly that can withstand axial and tangential compression and decompression loads exerted on it during play. It is an objective of the present invention to provide the instrumented football with physical characteristics such as total weight, center of gravity and moments of inertia that are identical to regulation conventional football. It is an objective of the present invention to provide instrumented football with playing qualities and handling qualities that are identical to those in prior art conventional regulation football playing fields. It is an objective of the present invention that the instrumented football will withstand dirt, water, ice and weather conditions. It is an objective of the present invention that the instrumented football encapsulation will provide cushioning to protect the instrumentation package assembly from shock and vibration damage. It is an objective of the present invention to provide the instrumented football with provisions for holding the instrumentation package assembly in alignment and for cushioning and isolating the instrumentation package assembly from shocks received by the instrumented football during the game. It is an objective of the present invention that the optical windows are made small to be unobtrusive to the game without vignetting the field of view of the cameras under the prevailing lighting conditions on the rink in the arena. It is an objective of the present invention that the optical windows withstand heavy blows received during the game and protect the instrumentation package assembly. It is an objective of the present invention that the optical windows be easily removed and replaced. It is an objective of the present invention to simplify the instrumented football and reduce its cost for low budget venues by using only a single TV camera instead of the two camera preferred embodiment. It is an objective of the present invention for the simplified one camera instrumented football to operate in the same sports stadium and use the same remote base station, wireless communication links and antenna array relay junction as the four camera preferred embodiment. It is an objective of the present invention for the simplified one camera instrumented football to have the same appearance, playability and handling qualities as the conventional regulation footballs.

FIG. 63A and FIG. 63B and FIG. 63C

The detailed physical elements disclosed in the circular HD CCD TV camera sensor chip drawings shown in FIG. 63A and FIG. 63B are identified as follows: 1 is the top view of a flat circular HD CCD sensor chip of radius dimension R. 1 is constructed as a circular pattern of etched pixel elements. The pixel elements are arranged on the chip as an (x, y) Cartesian matrix of points into a sensor mosaic as with conventional CCD sensors. All the pixel elements in the mosaic that are on the surface of the chip within the circle are active. There are a total of 3, 811,378 pixel elements in the (x, y) mosaic on the entire circular chip. The pixel elements are read in scan lines parallel to the chip's x-axis 2.

FIG. 63A is a top view of the circular CCD camera sensor chip showing the scanned letterbox picture frame format superimposed on it at an angular direction of zero degrees.

FIG. 63B is a top view of a virtual instrumented baseball home plate showing the generalized orientation of the circular CCD camera's sensor chip with the electronically scanned letterbox format superimposed on it at an arbitrary angular direction.

FIG. 63C is a top view of a virtual instrumented baseball home plate showing the generalized orientation of the circular CCD camera's sensor chip with the electronically scanned letterbox format superimposed on it at an angular direction of minus forty five degrees.

Referring to drawings FIG. 63A and FIG. 63B and FIG. 63C, in a preferred embodiment, a circular HD CCD TV camera sensor chip is disclosed. Besides the instrumented baseball home plate application described in the present invention, the specifications disclosed in the present invention with regard to the circular CCD camera sensor chip equally apply to instrumented baseball pitcher's rubbers, instrumented ice hockey pucks, and instrumented sports paraphernalia in general.

FIG. 63A shows an HD letterbox picture frame format 11 of electronically scanned pixel elements where the top of the HD letterbox picture frame format 11 is parallel to the x-axis 2 of the chip's circular sensor mosaic. The HD letterbox picture frame format has an aspect ratio of 16:9 by convention. The aspect ratio is the ratio of the letterbox's length dimension to its height dimension.

The resolutions for the 16:9 letterbox format are as follows:

By convention for entry level HD720, there are a total of 921,600 pixel elements enclosed within the HD letter box picture frame. This is derived by multiplying the number of standard pixels per line (i.e. 1,280) by the number of standard lines HD per picture frame (i.e. 720).

By convention for highest entry level HD768, there are a total of 1,049,088 pixel elements enclosed within the HD letter box picture frame. This is derived by multiplying the number of standard pixels per line (i.e. 1,366) by the number of standard lines HD per picture frame (i.e. 768).

By convention for standard HD1080, there are a total of 2,073,600 pixel elements enclosed within the HD letter box picture frame. This is derived by multiplying the number of standard pixels per line (i.e. 1,920) by the number of standard lines HD per picture frame (i.e. 1,080).

By convention for standard HD, there are a total of 2,073, 600 pixel elements enclosed within the HD letter box picture frame. This is derived by multiplying the number of standard pixels per line (i.e. 1,920) by the number of standard lines HD per picture frame (i.e. 1,080).

There are other high definition resolutions that differ from the common 16:9 letterbox format such as 17:9, 5:3, 3:2, 5:4, 8:5, and 4:3. Each of these formats has a finite number of pixel resolutions possible.

The remainder of the present preferred embodiment pertains to the standard HD1080 16:9 letterbox format with 2,073,600 pixel elements. It is obvious that other preferred embodiments of circular CCD sensor arrays can be constructed using any or all of the other HD letterbox, HD non-letterbox, non-HD letterbox and non-HD non-letterbox formats and resolutions.

4 is the geometrical center of the CCD sensor array. It lies at the intersection of the x and y axes on the chip's surface. The x-y plane is on the surface of the chip. The number of equally spaced pixel elements per inch in the x direction is equal to the number of equally spaced pixel elements per inch in the y direction. The origin of the z-axis of the chip is at 4 and is normal to the x-y plane of the chip. The z-axis 4 of the chip is normal to the chip's surface and is out of the x-y plane of the paper. The z-axis 4 of the chip is the optical axis of a camera lens (not shown) which is normal to the instrumented baseball home plate 12. The camera lens is above the x-y plane of the chip as it would normally be in the instrumentation package assembly, at a distance equal to its back focal length. The camera lens focuses the images of objects and players that are on the playing field onto the surface of the chip, and fills the chip's circular sensor array 1. The HD CCD sensor array's pixel elements fill the circular sensor array 1. Refer to FIG. 33A, FIG. 33B, FIG. 33C, FIG. 33D, FIG. 34A, FIG. 34B, FIG. 34C, FIG. 35A, FIG. 35B, FIG. 35C for specifications of instrumentation package assemblies showing the CCD cameras.

The camera lens is looking skyward from the instrumented baseball home plate. Refer to FIG. 44A, FIG. 44B, FIG. 45A, FIG. 45B, FIG. 48A, FIG. 48B, FIG. 48C, FIG. 48D, FIG. 49A, FIG. 49B, FIG. 49C, FIG. 49D, FIG. 51A, FIG. 51B, FIG. 51C, FIG. 51D, FIG. 52A, FIG. 52B, FIG. 53A, FIG. 53B, FIG. 53C, FIG. 54A, FIG. 54B, and FIG. 54C for specifications of instrumented baseball home plates. Since the camera lens has an extremely wide angle field of view, it images the pictures of the playing field and the players that are near the edges of the field of view, onto the flat circular CCD sensor array 5 near its circular edge. The imagery from the camera lens fully covers the entire circular array of 3, 811,378 pixel elements on the chip right out to the chip's circumference. The coordinates of all the pixels on the chip's circumference are given by the following mathematical expression which is the equation for a circle:

$$X*X+Y*Y=R*R$$

2 is the x-axis of the chip's CCD etched sensor array mosaic. The x-axis passes through the geometrical center of the chip's circular mosaic. The x-axis is in the plane of the chip.

3 is the y-axis of the chip's CCD sensor array. The y-axis passes through the geometrical center of the circular chip. The y-axis is in the plane of the chip.

5, 6, 7, and 8 are the corner points of the HD letterbox picture frame format. The coordinates of the corner points obey the expression: X*X+Y*Y=R*R because they all are on the chip's circumference.

9 is called the angular direction vector. It is a virtual mathematical vector pointing from the center 4 of the HD letterbox's picture frame format 11 to the top of the HD letterbox picture frame format. The top of the HD letterbox picture frame format 11 is the line joining the two corner points 5 and 6. For extremely wide field lenses, like fish eye lenses for example, this vector essentially points to the direction on the playing field where the televised HD pictures of the objects that appear below the center of the TV picture frame are upright to the TV audience.

10 is the angle that 9 makes with the y-axis 3. This angle will be called theta. Theta is measured in degrees. Theta is positive when it is measured counter clockwise from the y-axis 3. Theta is negative when it is measured clockwise from the y-axis 3.

11 is the top of the HD letterbox picture frame format. The HD letterbox picture frame format contains the standard 2,073,600 pixel elements which are scanned on the chip. 12 is the top of the outline of the instrumented baseball home plate. The instrumented baseball home plate is positioned on the baseball playing field at its standard location on the baseball diamond. Refer to FIG. 59A, FIG. 59B, FIG. 60A, FIG. 60B, FIG. 61A, and FIG. 61B for specifications of the baseball diamond. FIG. 63B and FIG. 63C show a typical chip 1 (shown enlarged) positioned inside the instrumented baseball home plate 12. Chip 1 is a part of the typical CCD camera that is housed inside the instrumentation package assembly that is located within the instrumented baseball home plate 12.

FIG. 63B and FIG. 63C are not drawn to scale. The purpose of these figures is to show the orientation of the CCD sensor arrayed chip mosaic and the HD letterbox picture frame format relative to the instrumented baseball home plate 12. On the baseball diamond, by convention, the top of the instrumented baseball home plate, as shown, faces the pitcher.

Let the general Cartesian coordinates (x, y) of the corner points of the HD picture frame format be defined as follows:

The corner point 5 is defined as P1, where P1=P1(X1, Y1).

The corner point 6 is defined as P2, where P2=P2(X2, Y2).

The corner point 7 is defined as P3, where P3=P3(X3, Y3).

The corner point 8 is defined as P4, where P4=P4(X4, Y4).

The HD letterbox picture frame format has an aspect ratio of 16:9 by convention. R is the radius of the circular CCD sensor array. The radius R is an arbitrary value which is set by the chip manufacturer and is dependent on the desired individual pixel dimensions.

As an example, referring to FIG. 63A, the physical coordinates of the corner points 5, 6, 7, and 8 on the CCD chip's pixel mosaic are as follows:

Point 5 is P1, where P1=P1(X1, Y1)=P1(+0.871575R, +0.490261R).

Point 6 is P2, where P2=P2(X2, Y2)=P2(−0.871575R, +0.490261R).

Point 7 is P3, where P3=P3(X3, Y3)=P3(−0.871575R, −0.490261R).

Point 8 is P4, where P4=P4(X4, Y4)=P4(+0.871575R, −0.490261R).

As another example, referring to FIG. 63C where the angular direction vector 9 is shown at an angle 10 of minus forty five degrees with the y-axis of the instrumented baseball home plate outline 12, the angular vector 9 is pointing toward first base.

The physical coordinates of the corner points 5, 6, 7, and 8 on the CCD chip's pixel mosaic are therefore as follows:

Point 5 is P1, where P1=P1(X1, Y1)=P1(+0.962962R, −0.26963R).

Point 6 is P2, where P2=P2(X2, Y2)=P2(−0.26963R, +0.962962R).

Point 7 is P3, where P3=P3(X3, Y3)=P3(−0.962962R, +0.26963R).

Point 8 is P4, where P4=P4(X4, Y4)=P4(+0.26963R, −0.962962R).

Even though all the pixel elements etched on the circular CCD sensor array are active to the light striking them from the camera lens, the only pixel elements that are electronically scanned to form the televised TV picture are the ones within the letterbox picture frame format bounded by the corner point coordinates for 5, 6, 7, and 8 above.

Per convention, the pitcher's mound is along the positive y-axis where 10 is zero degrees. The catcher is squatted along the negative y-axis where 10 is one hundred and eighty degrees.

The CCD sensor array 1 is used in the instrumentation package assembly camera which is inside the instrumented baseball home plate 12. FIG. 63B shows the general case where the HD letterbox picture frame format 11 is oriented at an arbitrary angle 10 of theta degrees.

FIG. 63A shows the HD letterbox picture frame format 11 oriented at an angle 10 of zero degrees. At this angle, the vector 9 is facing the pitcher. The advantage gained by using the present invention specified above is that it greatly simplifies the instrumentation package assembly and thereby reduces its cost, and make it less likely to become misaligned or physically damaged. The present invention specified above greatly simplifies the instrumentation package assembly by eliminating the need to mechanically rotate the camera and the camera lens. The electro-mechanical actuating mechanism is thereby eliminated. The functions once provided by the electro-mechanical actuating mechanism in other embodiments are now provided electronically in the present embodiment without having to physically move any parts.

The disadvantage of this embodiment is that it requires that a circular flat CCD array be produced by a semiconductor company. Also, the letterbox picture frame electronically scans and reads only 54.4% of the pixels on the chip at any time, so there is a substantial wasted amount of overhead. This produces bandwidth limitations in the supporting electronics. These disadvantages however are over-weighted by the advantages.

In another preferred embodiment, a chip with a large oversized square array of pixels is used rather than a circular array of pixels. The disadvantage is that a large percentage of pixels would not be used because the letterbox picture frame would electronically scan and read only 39% of the pixels in the square array. This means that 61% of the pixels in the chip's CCD mosaic would go unused at any time the HD letterbox is scanned, resulting in a substantial wasted amount of overhead. A chip with a square array of pixels becomes more practical as the cost to develop and produce the square arrayed chips approaches that of the circular arrayed chips and the bandwidth limitations can be overcome at a lower cost.

The pixel elements that are on each corner of the HD letter box picture frame format are located on the circumference of the CCD sensor array of pixels at the four points 5, 6, 7 and 8. The four points are expressed mathematically as P1, P2, P3 and P4. The four points P1, P2, P3 and P4 have coordinates (X1, Y1), (X2, Y2), (X3, Y3) and (X4, Y4) respectively. The coordinates of the corner points 5=P1, 6=P2, 7=P3, and 8=P4 are a function of the angle theta 10.

In general, the mathematical relationships between the coordinates of the corner points of the HD letterbox picture frame format on the CCD array and theta 10 are as follows:

$$X = x\cos(\text{theta}) - y\sin(\text{theta})$$

and $$Y = x\sin(\text{theta}) + y\cos(\text{theta})$$

where x and y are the point coordinates when theta is zero degrees.

As a general example, referring to FIG. 63C with the angular direction vector 9 shown at an arbitrary angle 10 of theta degrees with the y-axis of the instrumented baseball home plate outline 12, the physical coordinates of the corner points 5, 6, 7, and 8 on the CCD chip's pixel mosaic are therefore as follows:

P1=P1(X1, Y1), where X1=0.871575R cos(theta)−0.490261R sin(theta).

Y1=0.871575R sin(theta)+0.490261R cos(theta).

P2=P2(X2, Y2), where X2=−0.871575R cos(theta)−0.490261R sin(theta).

Y2=−0.871575R sin(theta)+0.490261R cos(theta).

P3=P3(X3, Y3), where X3=−0.871575R cos(theta)+0.490261R sin(theta).

Y3=−0.871575R sin(theta)−0.490261R cos(theta).

P4=P4(X4, Y4), where X4=+0.871575R cos(theta)+0.490261R sin(theta).

Y4=+0.871575R cos(theta)−0.490261R sin(theta).

Even though all the pixel elements etched on the circular CCD sensor array are active to the light striking them from the camera lens, the only pixel elements that are electronically scanned to form the televised TV picture are the ones within the letterbox picture frame format bounded by the point coordinates for 5, 6, 7, and 8 above.

In another preferred embodiment, we can accomplish the same performance as above by using standard square chips, where the dimension of each side of the square is equal to the diameter of the circular chip sensor array, and where we only use the pixel elements inscribed in the circular region of the chip.

Referring to the Preferred Embodiments Specified in FIG. 63A and FIG. 63B and FIG. 63C, the Circular HD CCD Sensor Chip Satisfies all of the Following Further Objectives:

It is an objective of the present invention to equip a TV camera with a flat circular shaped CCD sensor chip. It is an objective of the present invention to equip a TV camera with a flat circular shaped CCD sensor array chip. It is an objective of the present invention to equip a TV camera with a flat circular shaped CCD sensor arrayed chip to enable the TV viewing audience to see an upright image, within the HD letterbox format picture frame, no matter what horizontal angular direction the cameraman chooses to point the camera. It is an objective of the present invention to equip a TV camera with a flat circular shaped CCD sensor arrayed chip to enable the TV viewing audience to see an upright image, within the HD letterbox format picture frame, no matter what horizontal angular direction the cameraman chooses to point the camera, without the cameraman having to physically rotate the camera about its optical axis. It is an objective of the present invention to equip a camera with a flat circular shaped CCD sensor arrayed chip to enable the camera to deliver a HD letterbox format no matter what the angular direction is that the cameraman chooses to point the camera. It is an objective of the present invention to equip a camera with a flat circular shaped CCD sensor arrayed chip to be used to equip TV cameras for all kinds of instrumented sports paraphernalia besides instrumented baseball home plates, for example instrumented baseball pitcher's rubbers and instrumented ice hockey pucks. It is an objective of the present invention to greatly simplify the instrumentation package assembly and reduce its cost, and make it less likely to become misaligned or physically damaged. It is an objective of the present invention to eliminate the need to mechanically rotate the camera and the camera lens to point the camera. It is an objective of the present invention to use a square shaped chip sensor array where the dimension of each side of the square is equal to the diameter of the circular chip sensor array, and we only use the pixel elements inscribed in the circular region of the chip.

FIG. 64A

The detailed physical elements disclosed in the typical instrumented sports stadium drawing shown in FIG. 64A are identified as follows: 1 is the instrumentation package assembly inside 2. 2 is the instrumented sports paraphernalia. 3 is the playing field. 4 is a typical instrumented sports stadium. 5 is the boundary of the sports stadium parking lot and the air space above the sports stadium. 6 is the wireless radio bidirectional antenna array relay junction. 7 is the remote base station. 8 is the bidirectional wireless radio wave communication link between the antenna array relay junction 6 and the remote base station 7. 9 is the bidirectional wireless radio wave communication link between the instrumented sports paraphernalia 2 and the antenna array relay junction 6.

FIG. 64A is a top view of a typical instrumented sports stadium having been configured for use with both static and dynamic instrumented sports paraphernalia, for televising games from the playing field using wireless radio wave communication links.

Referring to the preferred embodiment disclosed in FIG. 64A, a typical instrumented sport stadium 4 equipped for wireless television operation employing single point non-diversity reception techniques is specified. The typical instrumented sport stadium 4 is physically configured with instrumented sports paraphernalia 2, remote base station 7, and antenna array relay junction 6.

Typical instrumented sports paraphernalia used in an instrumented sports stadium/arena as disclosed in FIG. 64A are: instrumented footballs as disclosed in FIG. 1A and FIG. 1B and FIG. 1C and FIG. 1D, FIG. 9A and FIG. 9B, FIG. 9C and FIG. 9D, FIG. 9E, FIG. 9F, FIG. 10A and FIG. 10B, FIG. 11A and FIG. 11B, FIG. 12A and FIG. 12B, FIG. 13A and FIG. 13B, FIG. 14A and FIG. 14B, FIG. 15A and FIG. 15B, FIG. 16A and FIG. 16B, and FIG. 17A and FIG. 17B; instrumented baseball bases as disclosed in FIG. 38A and FIG. 38B, FIG. 39A and FIG. 39B, FIG. 42A and FIG. 42B, FIG. 43A and FIG. 43B, FIG. 46A and FIG. 46B, FIG. 47A and FIG. 47B, FIG. 47C and FIG. 47D, and FIG. 50A and FIG. 50B; instrumented baseball plates as disclosed in FIG. 44A and FIG. 44B, FIG. 45A and FIG. 45B, FIG. 48A and FIG. 48B and FIG. 48C and FIG. 48C, FIG. 49A and FIG. 49B and FIG. 49C and FIG. 49D, FIG. 51A and FIG. 51B and FIG. 51C and FIG. 51D, FIG. 52A and FIG. 52B, FIG. 53A and FIG. 53B and FIG. 53C, and FIG. 54A and FIG. 54B and FIG. 54C; an instrumented baseball pitcher's rubber as disclosed in FIG. 65A and FIG. 65B and FIG. 65C; and instrumented ice hockey pucks as disclosed in FIG. 66A and FIG. 66B and FIG. 66C.

2 is meant to represent both a typical static or dynamic instrumented sports paraphernalia which are among a multiplicity of different instrumented sports paraphernalia that may be on the playing field 3 simultaneously with one another. As a result of 2 being instrumented with 1, 2 has the capability to televise games wirelessly via radio waves.

A typical instrumented sports stadium 4 is a stadium that is a venue for one or more types of sports events i.e. baseball and/or football. Static instrumented sports paraphernalia 2 are sports paraphernalia that have been instrumented and whose locations on the playing field 3 are fixed. Dynamic instrumented sports paraphernalia 2 are sports paraphernalia that have been instrumented and whose locations on the playing field 3 are varying.

The typical instrumented sport stadium 4 is configured to handle the simultaneous television signals from a multiplicity of such instrumented sports paraphernalia that are on the playing field 3 at a multiplicity of both fixed and varying locations. Each instrumented sports paraphernalia 2 has a radio wave communications link 9 which runs in the air above the playing field 3 between 2 and 6.

1 and 6 wirelessly communicate bi-directionally via radio wave signals 9. 6 and 7 wirelessly communicate bi-directionally via radio wave signals 8. 8 is the wireless radio communication link between the wireless radio antenna array relay junction 6 and the remote base station 7.

The typical instrumented sport stadium 4 is configured with instrumented sports paraphernalia 2, remote base station 7, and antenna array relay junction 6. The antenna array relay junction 6 is located within the sport stadium 4 but outside the limits of the playing field 3. The antenna array relay junction 6 is located above the ground level of the playing field 3. 6 is a bi-directional radio antenna array wirelessly linking the sports paraphernalia 2 to the remote base station 7 which is located inside or outside the sport stadium 4 but within the boundaries of the sport stadium parking lot 5.

The purpose of 6 is to relay radio signals between 1 and 7. There is a radio wave link between 1 and 6, and another radio wave link between 6 and 7. 6 relays television and system status signals from 1 to 7, and relays command and control signals from 7 to 1.

In this embodiment 1 is configured to communicate wirelessly with the remote base station 7 employing single point non-diversity reception techniques via a fixed point multi-directional antenna array relay junction 6. This feature set enables the complete system to be used in virtually any sport stadium or training field environment unobtrusively i.e. no underground cabling or trenching of the field, and with only a minimal amount of set-up time required prior to use.

At the time the complete system comprised of 1, 6 and 7 is initially placed into operation at a given sport stadium or training field, testing to determine the very best received signal strength, location and optimal placement of 6 relative to 1, and 7 relative to 6 is performed by field-side personnel. familiar with the system.

The aerial position of 6 mounted above 3 is set to ensure that during a typical game or training session, 7 may operate and receive the high quality mages made in real-time from 1.

Single point non diversity reception refers to a wireless communication technique whereby a single physical repeater antenna array location within a sports stadium is used to convey the radio frequency signals traveling to and from the instrumented sports paraphernalia and the remote base station. The quality and reliability of the signals received at the remote base station when using this technique relies heavily on the assumption that a decent signal to noise ratio is attainable even while the sports paraphernalia is in moved throughout such a stadium, i.e. during a game.

Multipoint diversity reception refers to a wireless communication technique whereby a network of multiple physical repeater antenna arrays are located within a sports stadium and are used to convey the radio frequency signals traveling to and from the instrumented sports paraphernalia and the remote base station. The signals intercepted at each repeater location are individually compared by the network transceiver at the remote base station and the strongest signal with the best signal to noise ratio is automatically selected for application to the other electronics at the remote base station. The quality and reliability of the signals received at the remote base station when using this technique is far less dependent on the assumption that a decent signal to noise ratio is attainable from what a single repeater antenna array location would achieve even while the sports paraphernalia is in moved throughout such a stadium, i.e. during a game.

Referring to the Preferred Embodiments Specified in FIG. 64A, the Typical Instrumented Sports Stadium Satisfies all of the Following Further Objectives:

It is an objective of the present invention to replace existing prior art non-instrumented sports paraphernalia that are currently on existing playing fields/rinks with substitute instrumented sports paraphernalia. It is an objective of the present invention to equip existing prior art sports stadiums with instrumented sports paraphernalia systems comprised of instrumented sports paraphernalia, an antenna array relay junction, bi-directional communication links, and a remote base station to improve the quality of the stadium's sports TV broadcasts. It is an objective of the present invention for any instrumented sports stadium/arena to be composed of a playing field/rink, the boundary of the sports stadium parking lot and the air space above the sports stadium, a wireless radio bidirectional antenna array relay junction, a remote base station, a bidirectional wireless radio wave communication link between the antenna array relay junction and the remote base station, is the bidirectional wireless radio wave communication link between the instrumented sports paraphernalia and the antenna array relay junction. It is an objective of the present invention to equip any sport stadium/arena to simultaneously wirelessly televise sports games from a multiplicity of both dynamic and static sports paraphernalia i.e. footballs, $1^{st}$, $2^{nd}$, $3^{rd}$ baseball bases, pitcher's rubbers, baseball home plates, and ice hockey pucks located on the playing field/rink to a remote base station. It is an objective of the present invention that the antenna array relay junction receive televised signals simultaneously from a multiplicity of static instrumented sports paraphernalia that are on the playing field. It is an objective of the present invention that the antenna array relay junction receive televised signals from a single dynamic instrumented sports paraphernalia that is on the playing field. It is an objective of the present invention that the antenna array relay junction receives televised signals simultaneously from a multiplicity of instrumented sports paraphernalia that are on the playing field and relays them simultaneously to the remote base station. It is an objective of the present invention that the antenna array relay junction receives command and control signals from the remote base station and relays them to a single dynamic instrumented sports paraphernalia that is on the playing field. It is an objective of the present invention that the antenna array relay junction receives command and control signals from the remote base station and relays them simultaneously to a multiplicity of static instrumented sports paraphernalia that are on the playing field.

FIG. 64B

The detailed physical elements disclosed in the typical instrumented sports stadium drawing shown in FIG. 64B are identified as follows: 1 is the instrumentation package assembly inside 2. 2 is the instrumented sports paraphernalia. 3 is the playing field. 4 is the typical instrumented sports stadium. 5 is the boundary of the sports stadium parking lot and the air space above the typical instrumented sports stadium. 6 is the bidirectional fiber optics/copper cable antenna array relay junction. 7 is the remote base station. 8 is the bidirectional wireless radio communication link between the antenna array relay junction 6 and the remote base station 7. 9 is the bidirectional fiber optics cable/copper cable communication link between the instrumented sports paraphernalia 2 and the antenna array relay junction 6.

FIG. 64B is a top view of a typical instrumented sports stadium 4 having been configured and equipped for use with static instrumented sports paraphernalia 2, for televising games from the playing field 3 using fiber optics cable communication links 9

Referring to the preferred embodiment disclosed in FIG. 64B, a typical instrumented sport stadium equipped for fiber optics cable/copper cable television operation employing single point non-diversity reception techniques is specified. The typical instrumented sport stadium 4 is physically configured with instrumented sports paraphernalia 2, fiber optics cable/copper cable link 9, remote base station 7, and antenna array relay junction 6.

Typical instrumented sports paraphernalia used in an instrumented sports stadium/arena as disclosed in FIG. 64B are: instrumented baseball bases as disclosed in FIG. 38A and FIG. 38B, FIG. 39A and FIG. 39B, FIG. 42A and FIG. 42B, FIG. 43A and FIG. 43B, FIG. 46A and FIG. 46B, FIG. 47A and FIG. 47B, FIG. 47C and FIG. 47D, and FIG. 50A and FIG. 50B; instrumented baseball plates as disclosed in FIG. 51A and FIG. 51B and FIG. 51C and FIG. 51D, FIG. 52A and FIG. 52B, FIG. 53A and FIG. 53B and FIG. 53C, and FIG. 54A and FIG. 54B and FIG. 54C; and instrumented baseball pitcher's rubber's as disclosed in FIG. 65A and FIG. 65B and FIG. 65C;

A typical instrumented sports stadium 4 is a stadium that is a venue for one or more types of sports events i.e. baseball games. Static instrumented sports paraphernalia 2 are instrumented sports paraphernalia that have been instrumented and whose locations on the stadium playing field 3 are fixed; for example, instrumented baseball bases, instrumented baseball plates and instrumented pitcher's rubbers.

2 is meant to represent a typical static instrumented sports paraphernalia which is among a multiplicity of different static instrumented sports paraphernalia that may be on the playing field 3 simultaneously with one another. As a result of 2 being instrumented with 1, 2 has the capability to televise games wirelessly via radio waves and/or by fiber optics cable/copper cable.

FIG. 64B shows a typical static instrumented sports paraphernalia 2 on the playing field 3. The typical instrumented sport stadium 4 is configured to handle the simultaneous television signals from a multiplicity of such static instrumented sports paraphernalia that are on the playing field at the same time at multiple fixed locations. Each static instrumented sports paraphernalia 2 has its own fiber optics cable/copper cable communications link 9 which runs under ground beneath the playing field 3 between 2 and 6.

1 and 6 communicate bi-directionally using signals via a fiber optics cable/copper cable link 9 6 and 7 wirelessly communicate via radio wave signals 8. 8 is the wireless radio communication link between the antenna array relay junction 6 and the remote base station 7.

The typical instrumented sport stadium 4 is configured with instrumented sports paraphernalia 2, fiber optics cable/copper cable link 9, remote base station 7, and antenna array relay junction 6. The antenna array relay junction 6 is located within the sport stadium 4 but outside the limits of the playing field 3. The antenna array relay junction 6 is located above the ground level of the playing field 3. 6 is a bi-directional radio antenna array linking the sports paraphernalia 2 to the remote base station 7 which is located inside or outside the typical instrumented sport stadium 4 but within the boundaries of the typical instrumented sport stadium parking lot 5.

The purpose of 6 is to relay signals between 1 and 7. There is a fiber optics/copper cable link between 1 and 6, and a radio link between 6 and 7. 6 relays television and system status signals from 1 to 7, and relays command and control signals from 7 to 1.

In this embodiment 1 is configured to communicate with the remote base station 7 employing single point non-diversity reception techniques via a fixed point multi-directional antenna array relay junction 6.

At the time the complete system comprised of 1, 6 and 7 is initially placed into operation at a given typical instrumented sport stadium or training field, testing to determine the very best received signal strength, location and optimal placement of 6 relative to 1, and 7 relative to 6 is performed by field-side personnel familiar with the system.

The aerial position of 6 mounted above 3 is set to ensure that during a typical game or training session, 7 may operate and receive the high quality mages made in real-time from 1. Referring to the Preferred Embodiments Specified in FIG. 64B, the Typical Instrumented Sports Stadium Satisfies all of the Following Further Objectives:

It is an objective of the present invention to replace existing prior art non-instrumented sports paraphernalia that are currently on existing playing fields/rinks with substitute instrumented sports paraphernalia. It is an objective of the present invention to equip existing prior art sports stadiums with instrumented sports paraphernalia systems comprised of instrumented sports paraphernalia, an antenna array relay junction, bi-directional communication links, and a remote base station to improve the quality of the stadium's sports TV broadcasts. It is an objective of the present invention for any instrumented sports stadium/arena to be composed of a playing field/rink, the boundary of the sports stadium parking lot and the air space above the sports stadium, a wireless radio bidirectional antenna array relay junction, a remote base station, a bidirectional wireless radio wave communication link between the antenna array relay junction and the remote base station, a bidirectional fiber optics/copper cable communication link between the instrumented sports paraphernalia and the antenna array relay junction. It is an objective of the present invention to equip any sport stadium with static instrumented sports paraphernalia, an antenna array relay junction, fiber optics/copper cable communication links, and a remote base station. It is an objective of the present invention for any sport stadium to be configured and equipped to televise simultaneously from a multiplicity of static sports paraphernalia located on the playing field, to a remote base station. It is an objective of the present invention to equip any sport stadium to simultaneously televise sports games from a multiplicity of static sports paraphernalia i.e. 1$^{st}$, 2$^{nd}$, 3$^{rd}$ baseball bases and baseball home plates located on the playing field, to a remote base station. It is an objective of the present invention to configure and equip any sport stadium to simultaneously wirelessly televise sports games from a multiplicity of static sports paraphernalia i.e. 1$^{st}$, 2$^{nd}$, 3$^{rd}$ baseball bases and baseball home plates located on the playing field to a remote base station. It is an objective of the present invention to configure and equip any sport stadium to simultaneously televise sports games using bi-directional fiber optics/copper cable communications links extending from a multiplicity of static sports paraphernalia i.e. 1$^{st}$, 2$^{nd}$, 3$^{rd}$ baseball bases and baseball home plates, located on the playing field to a remote base station. It is an objective of the present invention to configure and equip any sport stadium both wirelessly and by use of fiber optics cable/copper cable, to simultaneously televise sports games from a multiplicity of static sports paraphernalia i.e. 1$^{st}$, 2$^{nd}$, 3$^{rd}$ baseball bases and baseball home plates located on the playing field, to a remote base station. It is an objective of the present invention to configure and equip any sports training field to both wirelessly and by use of fiber optics cable/copper cable, simultaneously televise sports games from a multiplicity of static sports paraphernalia i.e. 1$^{st}$, 2$^{nd}$, 3$^{rd}$ baseball bases and baseball home plates located on the playing field, to a remote base station.

FIG. 64C

The detailed physical elements disclosed in the typical instrumented sports stadium drawing shown in FIG. 64C are identified as follows: 1 is the instrumentation package assembly inside 2. 2 is the instrumented sports paraphernalia that has been instrumented with the instrumentation package assembly 1. 3 is the playing field. 4 is a typical instrumented sports stadium. 5 is the boundary of the typical instrumented sports stadium parking lot and the air space above the sports stadium. 6 is the antenna array relay junction. 7 is the remote base station. 8 is the bidirectional wireless radio wave communication link between the antenna array relay junction 6 and the remote base station 7. 9 is the bidirectional fiber optics cable/copper cable communication link between the instrumented sports paraphernalia 2 and the antenna array relay junction 6. 10 is the bidirectional wireless radio wave communication link between the instrumented sports paraphernalia 2 and the antenna array relay junction 6. 11 is the bidirectional fiber optics cable/copper cable communication link between the antenna array relay junction 6 and the remote base station 7. 12 is the instrumented sports paraphernalia that has been instrumented with the instrumentation package assembly 15. 13 is the bidirectional wireless radio wave communication link between the instrumented sports paraphernalia 12 and the antenna array relay junction 6. 14 is the bidirectional fiber optics cable/copper cable communication link between the instrumented sports paraphernalia 12 and the antenna array relay junction 6. 15 is the instrumentation package assembly inside 12.

FIG. 64C is a top view of a typical instrumented sports stadium that has been configured and equipped for use with both static and dynamic instrumented sports paraphernalia, for televising games from both on the playing field and off the playing field using both bi-directional wireless radio wave communication links and/or bi-directional fiber optics cable/copper cable communication links.

Typical instrumented sports paraphernalia used in an instrumented sports stadium/arena as disclosed in FIG. 64C are: instrumented footballs as disclosed in FIG. 1A and FIG. 1B and FIG. 1C and FIG. 1D, FIG. 9A and FIG. 9B, FIG. 9C and FIG. 9D, FIG. 9E, FIG. 9F, FIG. 10A and FIG. 10B, FIG. 11A and FIG. 11B, FIG. 12A and FIG. 12B, FIG. 13A and FIG. 13B, FIG. 14A and FIG. 14B, FIG. 15A and FIG. 15B, FIG. 16A and FIG. 16B, and FIG. 17A and FIG. 17B; instrumented baseball bases as disclosed in FIG. 38A and FIG. 38B, FIG. 39A and FIG. 39B, FIG. 42A and FIG. 42B, FIG. 43A and FIG. 43B, FIG. 46A and FIG. 46B, FIG. 47A and FIG. 47B, FIG. 47C and FIG. 47D, and FIG. 50A and FIG. 50B; instrumented baseball plates as disclosed in FIG. 44A and FIG. 44B, FIG. 45A and FIG. 45B, FIG. 48A and FIG. 48B and FIG. 48C and FIG. 48C, FIG. 49A and FIG. 49B and FIG. 49C and FIG. 49D, FIG. 51A and FIG. 51B and FIG. 51C and FIG. 51D, FIG. 52A and FIG. 52B, FIG. 53A and FIG. 53B and FIG. 53C, and FIG. 54A and FIG. 54B and FIG. 54C; an instrumented baseball pitcher's rubber as disclosed in FIG. 65A and FIG. 65B and FIG. 65C; and instrumented ice hockey pucks as disclosed in FIG. 66A and FIG. 66B and FIG. 66C.

Referring to the preferred embodiment disclosed in FIG. 64C, a typical instrumented sport stadium equipped for both bi-directional wireless radio wave television and bi-directional fiber optics cable/copper cable television operation employing single point non-diversity reception techniques is specified. The typical instrumented sport stadium 4 is physically configured with instrumented sports paraphernalia 2, fiber optics cable/copper cable link 9, remote base station 7, fiber optics cable/copper cable link 11, and antenna array relay junction 6. The remote base station 7 exercises command and control of the sports paraphernalia 2. The electronics, signals and data flows of the remote base station 7 are specified in FIG. 25A and FIG. 25B. Except for differences in processing software, the remote base stations specified in FIG. 59A and FIG. 59B and FIG. 60A and FIG. 60B and FIG. 61A and FIG. 61B and FIG. 62A and FIG. 62B and FIG. 62C and FIG. 62D and FIG. 62E and FIG. 64A and FIG. 64B are substantially identical.

A typical instrumented sports stadium 4 is a stadium that is a venue for one or more types of sports events i.e. baseball and/or football. Static instrumented sports paraphernalia 2 are sports paraphernalia that have been instrumented and whose locations on the playing field 3 are fixed. Dynamic instrumented sports paraphernalia 2 are sports paraphernalia that have been instrumented and whose locations on the playing field 3 are varying.

2 is meant to represent both a typical static or dynamic instrumented sports paraphernalia which are among a multiplicity of different instrumented sports paraphernalia that may be on the playing field 3 simultaneously with one another. As a result of 2 being instrumented with 1, 2 has the capability to televise games wirelessly via radio waves and/or by fiber optics cable/copper cable.

During the calendar year some sports stadiums are often used as venues for more than one sport. For example, during different seasons during the year some are used for both baseball and football. During the game of football, the instrumented football is an example of the instrumented sports paraphernalia. During the game of baseball, the instrumented $1^{st}$, $2^{nd}$, $3^{rd}$ bases and instrumented home plate are examples of the instrumented sports paraphernalia.

The instrumented football is an example of a dynamic instrumented sports paraphernalia. The instrumented $1^{st}$, $2^{nd}$, $3^{rd}$ bases and instrumented home plate are examples of static sports paraphernalia. The location of the instrumented football varies on the playing field during the game. The locations of the $1^{st}$, $2^{nd}$, $3^{rd}$ bases, instrumented pitcher's rubber, and instrumented home plate are fixed on the playing field during the game. It is therefore advantageous to configure these sports stadiums to use both static and dynamic sports paraphernalia.

Some typical instrumented sports stadiums are larger than others and can economically justify the cost of using fiber optics cable/copper cable communication links between the fixed sports paraphernalia on the playing field and the antenna array relay junction 6; and between the antenna array relay junction 6 and the remote base station 7. The cost of a bi-directional fiber optics cable/copper cable communication link installation exceeds the cost of a bi-directional wireless radio wave communication link installation. Therefore, the bi-directional wireless radio wave communication link installation has a cost advantage over the bi-directional fiber optics cable/copper cable communication link installation.

The bi-directional fiber optics cable/copper cable communication link has a distinct performance advantage over the bi-directional wireless radio wave communication link. The bi-directional fiber optics cable/copper cable communication link has a much greater bandwidth than the bi-directional wireless radio wave communication link. Consequently, the bi-directional fiber optics cable/copper cable communication link has both a much greater capability and flexibility in producing HD video and sound than the bi-directional wireless radio wave communication link.

2 is meant to represent a typical instrumented sports paraphernalia which is representative of any one of a possible multiplicity of instrumented sports paraphernalia that are televising on the playing field simultaneously. For example, in the game of football there is only one instrumented football in play that is televising on the playing field at any one time. For example, in the game of baseball there are at least four instrumented sports paraphernalia televising on the playing field at any one time i.e. the instrumented $1^{st}$ base, instrumented $2^{nd}$ base, instrumented $3^{rd}$ base and the instrumented home plate.

2 is also meant to represent a typical static or dynamic instrumented sports paraphernalia that are televising on the playing field simultaneously. Static instrumented sports paraphernalia 2 are sports paraphernalia whose locations on the playing field 3 are fixed. The instrumented $1^{st}$ base, instrumented $2^{nd}$ base, instrumented $3^{rd}$ base and instrumented home plate are examples of static instrumented sports paraphernalia. Dynamic instrumented sports paraphernalia 2 are sports paraphernalia whose locations on the playing field 3 are varying. The instrumented football is an example of a dynamic instrumented sports paraphernalia.

2 is a typical static/dynamic instrumented sports paraphernalia on the playing field 3. The sport stadium 4 is configured to handle the simultaneous television signals from a multiplicity of such static or dynamic instrumented sports paraphernalia that are on the playing field at a multiplicity of both fixed and varying locations respectively.

Each dynamic instrumented sports paraphernalia 2 has a bi-directional radio wave communications link 10 which runs in the air above the playing field 3 between 2 and 6 as the location of 2 on the playing field varies.

Each static instrumented sports paraphernalia 2 has a bi-directional radio wave communications link 10 which runs in the air above the playing field 3 between 2 and 6, as well as a bi-directional fiber optics/copper cable communications link 9 that runs in the ground beneath the playing field 3 between 2 and 6.

The antenna array relay junction 6 has a bi-directional radio wave communications link 8 which runs in the air above the playing field 3 between 6 and 7. The antenna array relay junction 6 also has a bi-directional fiber optics/copper cable communications link 9 that runs between 6 and 7.

8 is the wireless radio communication link between the fiber optics/copper cable/wireless radio antenna array relay junction 6 and the remote base station 7.

The typical instrumented sport stadium 4 is configured with the antenna array relay junction 6. The antenna array relay junction 6 is located within the sport stadium 4 but outside the limits of the playing field 3. The antenna array relay junction 6 is located above the ground level of the playing field 3.

6 is a bi-directional radio antenna array wirelessly linking the sports paraphernalia 2 to the remote base station 7 which is located outside the sport stadium 4 but within the boundaries of the sport stadium parking lot 5. 6 is also a bi-directional fiber optics cable/copper cable junction linking the sports paraphernalia 2 to the remote base station 7.

The purpose of 6 is to relay televised radio wave signals between 2 and 7. The purpose of 6 is also to relay televised fiber optics cable/copper cable signals between 2 and 7.

There is a radio wave link between 1 and 6, and another radio wave link between 6 and 7. 6 relays television and system status signals from 1 to 7, and relays command and control signals from 7 to 1.

In this embodiment 1 is configured to communicate wirelessly with the remote base station 7 employing single point non-diversity reception techniques via a fixed point multi-directional antenna array 6. This feature set enables the complete system to be used in virtually any sport stadium or training field environment unobtrusively i.e. no underground cabling or trenching of the field, and with only a minimal amount of set-up time required prior to use.

At the time the complete system comprised of 1, 6 and 7 is initially placed into operation at a given sport stadium or training field, testing to determine the very best received signal strength, location and optimal placement of 6 relative to 1, and 7 relative to 6 is performed by field-side personnel. familiar with the system.

The aerial position of 6 mounted above 3 is set to ensure that during a typical game or training session, 7 may operate and receive the high quality mages made in real-time from 1.

In a further preferred embodiment, the present invention referring to FIG. 54A and FIG. 54B contemplates an instrumented baseball home plate, which when stationed off of any baseball playing field i.e. at the traditional home plate location in the pitcher's bullpen can wirelessly and autonomously televise baseball pitching practice and warm-up sessions under command and control of the remote base station. The remote base station is disclosed in FIG. 59A and FIG. 59B and FIG. 60A and FIG. 60B and FIG. 61A and FIG. 61B. In addition to adding an element to the entertainment of the TV viewing audience, the embodiment serves to provide video and sound to aid the pitchers and the pitching coaches in evaluating the quality of the pitcher's progress, prowess, fitness and "stuff".

12 is a typical static or dynamic instrumented sports paraphernalia that are televising off of the playing field simultaneously. 15 is the instrumentation package assembly inside 12.

Static instrumented sports paraphernalia are sports paraphernalia whose locations off of the playing field 3 are fixed. The instrumented pitcher's rubber and the instrumented home plate are examples of static instrumented sports paraphernalia. Dynamic instrumented sports paraphernalia are sports paraphernalia whose locations off of the playing field 3 are varying.

For example, the baseball bullpen is within the typical instrumented stadium but is located off of the playing field. In an additional preferred embodiment, the present invention contemplates at least two static instrumented sports paraphernalia televising at any one time from the bullpen i.e. the instrumented pitcher's rubber and the instrumented home plate. During practice and warm-up sessions in the bullpen, the pitchers stand on the instrumented pitcher's rubber and pitch baseballs to a catcher behind the instrumented baseball home plate. The typical instrumented sport stadium 4 is configured to handle the simultaneous television signals from a multiplicity of such static or dynamic instrumented sports paraphernalia that are off of the playing field at a multiplicity of both fixed and varying locations respectively.

Single point non diversity reception refers to a wireless communication technique whereby a single physical repeater antenna array location within a sports stadium is used to convey the radio frequency signals traveling to and from the instrumented sports paraphernalia and the remote base station. The quality and reliability of the signals received at the remote base station when using this technique relies heavily on the assumption that a decent signal to noise ratio is attainable even while the sports paraphernalia is in moved throughout such a stadium, i.e. during a game.

Multipoint diversity reception refers to a wireless communication technique whereby a network of multiple physical repeater antenna arrays are located within a sports stadium and are used to convey the radio frequency signals traveling to and from the instrumented sports paraphernalia and the remote base station. The signals intercepted at each repeater location are individually compared by the network transceiver at the remote base station and the strongest signal with the best signal to noise ratio is automatically selected for application to the other electronics at the remote base station. The quality and reliability of the signals received at the remote base station when using this technique is far less dependent on the assumption that a decent signal to noise ratio is attainable from what a single repeater antenna array location would achieve even while the sports paraphernalia is in moved throughout such a stadium, i.e. during a game.

Referring to the Preferred Embodiments Specified in FIG. 64C, the Typical Instrumented Sports Stadium Satisfies all of the Following Further Objectives:

It is an objective of the present invention to replace existing prior art non-instrumented sports paraphernalia that are currently on existing playing fields/rinks with substitute instrumented sports paraphernalia. It is an objective of the present invention to equip existing prior art sports stadiums with instrumented sports paraphernalia systems comprised of instrumented sports paraphernalia, an antenna array relay junction, bi-directional communication links, and a remote base station to improve the quality of the stadium's sports TV broadcasts. It is an objective of the present invention for any instrumented sports stadium/arena to be composed of a playing field/rink, the boundary of the sports stadium parking lot and the air space above the sports stadium, a wireless radio and fiber optics/copper cable bidirectional antenna array relay junction, a remote base station, a bidirectional wireless radio wave communication link between the antenna array relay junction and the remote base station, a bidirectional fiber optics/copper cable communication link between the instrumented sports paraphernalia and the antenna array relay junction, a bidirectional wireless radio wave communication link between the antenna array relay junction and the instrumented sports paraphernalia, and a bidirectional fiber optics/copper cable communication link between the remote base station and the antenna array relay junction. It is an objective of the present invention to equip any sport stadium/arena with instrumented sports paraphernalia, an antenna array relay junction, wireless and/or fiber optics/copper cable communication links, and a remote base station. It is an objective of the present invention to equip any sport stadium to simultaneously wirelessly televise sports games from a multiplicity of both dynamic and static sports paraphernalia i.e. footballs, $1^{st}$, $2^{nd}$, $3^{rd}$ baseball bases, pitcher's rubbers, ice hockey pucks, and baseball home plates located on the playing field to a remote base station. It is an objective of the present invention to equip any sport stadium to simultaneously wirelessly televise sports activity from a multiplicity of both dynamic and static sports paraphernalia i.e. pitcher's rubbers and baseball home plates located off the playing field to a remote base station. It is an objective of the present invention to configure and equip any sports training field to both wirelessly/and by use of fiber optics cable/copper cable, simultaneously televise sports games from a multiplicity of static sports paraphernalia i.e. $1^{st}$, $2^{nd}$, $3^{rd}$ baseball bases and baseball home plates located on the playing field, to a remote base station. It is an objective of the present invention to configure and equip any sport stadium to simultaneously televise sports games using both wireless and bi-directional fiber optics/copper cable communications links from a multiplicity of static sports paraphernalia i.e. pitcher's rubbers and baseball home plates, located off the playing field i.e. pitcher's bullpen, to a remote base station. It is an objective of the present invention to provide the remote base station with an automatic means and/or manual means to select any two of the four cameras that are parts of an instrumentation package assembly, to be a 3-D stereo camera pair. It is an objective of the present invention to enable the remote base station to adjust the rotational axis of each camera in the 3-D stereo camera pair in real-time to have the proper alignment and letterbox aspect ratio to produce the proper three-dimensional display irrespective of the camera's line of sight angular direction relative to the instrumented baseball home plate. It is an objective of the present invention that the antenna array relay junction receive televised signals simultaneously from a multiplicity of static instrumented sports paraphernalia that are on the playing field. It is an objective of the present invention that the antenna array relay junction receive televised signals from a single dynamic instrumented sports paraphernalia that is on the playing field. It is an objective of the present invention that the antenna array relay junction receives televised signals simultaneously from a multiplicity of instrumented sports paraphernalia that are on the playing field and relays them simultaneously to the remote base station. It is an objective of the present invention that the antenna array relay junction receives command and control signals from the remote base station and relays them to a single dynamic instrumented sports paraphernalia that is on the playing field. It is an objective of the present invention that the antenna array relay junction receives command and control signals from the remote base station and relays them simultaneously to a multiplicity of static instrumented sports paraphernalia that are on the playing field.

FIG. 65A and FIG. 65B and FIG. 65C

The detailed physical elements disclosed in the instrumented baseball pitcher's rubber drawings shown in FIG. 65A and FIG. 65B and FIG. 65C are identified as follows: 1 is the y-axis of the instrumentation package assembly containing camera 35. 2 is the axis of symmetry of the instrumented baseball pitcher's rubber. 3 is the y-axis of the instrumentation package assembly containing camera 24. 4 is the rear side of the instrumented baseball pitcher's rubber. 5 is the induction coil used to charge the battery pack inside the instrumentation package assembly. 6 is the induction coil used to charge the battery pack inside the instrumentation package assembly. 7 is the plane-parallel-flat optical window. 8 is the left side of the instrumented baseball pitcher's rubber. 9 is the front side of the pitcher's rubber, 10 is the side 8 of the instrumented baseball pitcher's rubber. 11 is the central hub of the instrumentation package assembly containing the battery pack. 12 is the Type XI buffer plate assembly. 13 is the bottom of the instrumented baseball pitcher's rubber. 14 is the bellows segment of the instrumentation package assembly. 15 is the y-axis of symmetry of the instrumented baseball pitcher's rubber. 16 is the bottom of the instrumentation package assembly. 17 is an instrumentation package assembly. 18 is the top of the instrumentation package assembly. 19 is the y-axis of camera 48. 20 is the plane-parallel-flat optical window. 21 is the y-axis of the instrumentation package assembly 46. 22 is the upper protective cover plate. 23 is a lower protective cover plate. 24 is the y-axis of camera 58. 25 is a wireless radio antenna element. 26 is a wireless radio antenna element. 27 is the optical axis direction of the cameras 35, 36, and 48 and 58 before they are tilted. 28 is the z-axis of the camera 36. 29 is a wireless radio antenna. 30 is the z-axis of the instrumentation package assembly 11. 31 is a wireless radio antenna. 32 is the end of the instrumented baseball pitcher's rubber. 33 is a microphone. 34 is a microphone. 35 is a camera. 36 is a camera. 37 is a camera lens. 38 is a camera lens. 39 is a wireless radio antenna element. 40 is the bellows segment of the instrumentation package assembly. 41 is the gas valve. 42 is an access lid heat sink. 43 is the microphone. 44 is the microphone. 45 is a wireless radio antenna. 46 is an instrumentation package assembly. 47 is the bottom of the instrumentation package assembly. 48 is a camera. 49 is the bellows segment of the instrumentation package assembly. 50 is the optical axis of camera 48. 51 is the induction coil used to charge the battery pack 72. 52 is the z-axis of the instrumentation package assembly 46 and the instrumented baseball pitcher's rubber. 53 is an access lid heat sink. 54 is the optical axis of camera 58. 55 is the induction coil used to charge the battery pack 72. 56 is the bellows segment of the instrumentation package assembly. 57 is the gas valve. 58 is a camera. 59 is the Type XI buffer plate assembly. 60 is the central hub of the instrumentation package assembly containing the battery pack. 61 is a wireless radio antenna. 62 is a microphone. 63 is the upper protective cover plate. 64 is the plane-parallel-flat optical window. 65 is a camera lens. 66 is a camera lens. 67 is the plane-parallel-flat optical window. 68 is the encapsulating rubber material that fills the instrumented baseball pitcher's rubber. 69 is a microphone that is flush with the top surface 8 of the instrumented baseball pitcher's rubber. 70 is the microphone cable that connects the microphone 69 to the microphone connector 71. 71 is the microphone connector. 72 is the battery pack. 73 is the optical axis direction of the cameras 35, 36, and 48 and 58 after they are tilted together. 74 (not shown). 75 is the fiber optics cable/copper cable connector. 76 is the fiber optics cable/copper cable connector. 77 is the slotted opening in the bottom of the instrumented baseball pitcher's rubber for the fiber optics cable/copper cable access. 78 is the slotted opening in the bottom of the instrumented baseball pitcher's rubber for the fiber optics cable/copper cable access. 79 is a wireless radio antenna.

FIG. 65A is a top view of the instrumented baseball pitcher's rubber.

FIG. 65B is a side view of the instrumented baseball pitcher's rubber.

FIG. 65C is an end view of the instrumented baseball pitcher's rubber.

Referring to the preferred embodiment disclosed in FIG. 65A and FIG. 65B and FIG. 65C, an instrumented baseball pitcher's rubber equipped for bi-directional wireless radio wave 3-D stereo television and/or bi-directional fiber optics cable/copper cable 3-D stereo television operation, employing single point non-diversity communication techniques and/or multi point diversity communication techniques, is specified. The instrumented baseball pitcher's rubber is equipped to be enabled, commanded and controlled by administrative data conveyed simultaneously from the remote base station utilizing both bi-directional wireless radio wave and bi-directional fiber optics cable/copper cable communication.

A conventional baseball pitcher's rubber is traditionally considered to be sport's paraphernalia. It is a white rubber slab that is six inches wide by two feet long. The instrumented baseball pitcher's rubber is instrumented sports paraphernalia. The instrumented baseball pitcher's rubber contains two instrumentation package assemblies 17 and 46 inside it. The outward appearance of the instrumented baseball pitcher's rubber is made identical to the conventional baseball pitcher's rubber so it will not be obtrusive to the game or to the players. The instrumented baseball pitcher's rubber material 68 is white rubber. The instrumented baseball pitcher's rubber sits on the baseball diamond at its traditional location at the pitcher's mound. The instrumented baseball pitcher's rubber is two feet long, six inches front to back wide, and lies with its top surface 8 flush with the ground of the pitcher's mound. Its front edge 9 faces the catcher and the batter.

Cameras 35 and 36 form a 3-D stereo camera pair. Cameras 48 and 58 form a 3-D stereo camera pair. Each of the two 3-D stereo camera pairs comprised of cameras 35, 36 and cameras 48 and 58 respectively are tilted toward the catcher by the same tilt angle. The tilt angle is the difference between 73 and 27. The distance between 4 and 5 is six inches. The distance between 10 and 32 is two feet.

The two instrumentation package assemblies 17 and 46 are identical to one another, and are disclosed in FIG. 34A and FIG. 34B and FIG. 34C.

Referring to drawings FIG. 51A and FIG. 51B and FIG. 51C and FIG. 51D, in a preferred embodiment, the present invention contemplates an instrumented baseball pitcher's rubber, which when stationed on any baseball playing field at any traditional pitcher's mound location and/or in the bull pen at any traditional pitcher's mound location, can both wirelessly and/or by using fiber optics/copper cable connectivity, autonomously televise baseball games and/or pitcher's warm-up sessions under the command and control of the remote base station. The remote base station is disclosed in FIG. 59A and FIG. 59B, and FIG. 60A and FIG. 60B, and FIG. 61A and FIG. 61B, and FIG. 64A, and FIG. 64B, and FIG. 64C.

Preferred embodiments specifying the fiber optics/copper cable transmission link are disclosed in FIG. 60A and FIG. 60B, and FIG. 61A and FIG. 61B, FIG. 64B, and FIG. 64C.

The preferred embodiment specifying the wireless radio transmission link is disclosed in FIG. 59A and FIG. 59B, and FIG. 64C.

The instrumented baseball pitcher's rubber is instrumented with two identical instrumentation package assemblies disclosed in FIG. 34A and FIG. 34C. Details of instrumentation package assembly elements are shown in FIG. 33D.

As with a previous preferred embodiment shown in FIG. 49A and FIG. 49B and FIG. 49C and FIG. 49D, the present preferred embodiment shown in FIG. 65A and FIG. 65B and FIG. 65C provides the TV viewing audience with vantage points from two separate 3-D stereo camera pairs whose instrumentation package assemblies 17 and 46 are spaced approximately ten to fourteen inches apart. The distance between the centerlines 30 and 52 of the two instrumentation package assemblies 17 and 46 is chosen to separate the two 3-D stereo camera pairs so that there is one pair at either end of the instrumented baseball pitcher's rubber. If one of the 3-D stereo camera pairs is fouled by dirt and debris, then the other one will be available to televise the event.

The fiber optics/copper cable transmission link is disclosed in the preferred embodiment shown in FIG. 60A and FIG. 60B. The fiber optics/copper cable transmission link is also disclosed in two another preferred embodiments shown in FIG. 61A and FIG. 61B, and FIG. 64C.

The instrumented baseball pitcher's rubber employs two instrumentation package assemblies that are substantially identical to the instrumentation package assembly shown in FIG. 34A and FIG. 34B and FIG. 34C. Each of the instrumentation package assemblies uses the Type XI buffer plate assembly shown in FIG. 21ZA and FIG. 21ZB and FIG. 21ZC. Details of the instrumentation package assembly elements are shown in FIG. 33D.

It is understood that as the state of the art in TV camera technology advances, there will be other better TV cameras that use other than CCD technology. The present invention will work equally well with them as they become available. Therefore, the present invention uses CCD TV cameras as an example of TV cameras that may be used simply because they are the best that today's technology offers, and is not confined only to their use now and in the future.

Referring to the disclosed instrumented baseball pitcher's rubber shown in FIG. 65A and FIG. 65B and FIG. 65C, the instrumented baseball pitcher's rubber has two instrumentation package assemblies 17 and 46 mounted inside the instrumented baseball pitcher's rubber. Details of instrumentation package assembly are shown in FIG. 21ZA and FIG. 21ZB and FIG. 21ZC. Except for the optical windows, the outer appearance of the instrumented baseball pitcher's rubber and the conventional baseball pitcher's rubber are identical, both being made of the same white rubber material 68 having the same size, shape, color and texture. Except for the four small inconspicuous optical windows 7, 20, 67 and 64 on the top 8, both the instrumented baseball pitcher's rubber and the conventional baseball pitcher's rubber have the same outward appearance as seen by the player's.

Each of the instrumentation package assemblies 17 and 46 carries two CCD sensor arrayed cameras and two microphones. A third microphone is mounted above each of the instrumentation package assemblies through the top 8 of instrumented baseball pitcher's rubber. Each of the microphones in the top 8 is connected by an electrical cable to a cable connector on each of the instrumentation package assemblies. The two cameras in each of the instrumentation package assemblies are arranged side by side and form a 3-D stereo camera pair. The two cameras are separated by an interpupillary distance.

The linear distance separation of the optical axes of the two camera lenses that make up a stereo camera pair is an important function of the buffer plate. For the buffer plate, the distance measured between the axes is defined as the interpupilarly distance between the camera lenses.

We note here for reference that for modern commercial 3-dimensional cameras, the range of settings for the interpupillary distance is adjustable from 44 to 150 mm. Following the range of settings referenced for modern commercial 3-dimensional cameras, the size of the buffer plate interpupillary distance is made to accommodate an interpulilary distance range of 44 to 150 mm also. Therefore, the axial separation between each stereo pair of camera lenses can vary from 44 to 150 mm.

It is understood that other alternative interpupillary distances may be used to produce other alternative 3-D effects. For example, larger interpupillary distance will produce more striking 3-D effects.

The two cameras 35 and 36 that form one of the 3-D stereo camera pairs have optical windows 20 and 7 respectively. The interpupillary distance is the distance between the two camera's 35 and 36 optical axes. The cameras 35 and 36 that form the 3-D stereo camera pair, 35 and 36 look upward from the top of the instrumented baseball pitcher's rubber along their common line of sight 73 which is tilted relative to the normal 27 to the top 8 of the instrumented baseball pitcher's rubbers.

The two cameras 48 and 58 that form one of the 3-D stereo camera pairs have optical windows 67 and 20 respectively. The interpupillary distance is the distance between the two camera's 48 and 58 optical axes. The cameras 48 and 58 that form the 3-D stereo camera pair, 48 and 58 look upward from the top of the instrumented baseball pitcher's rubber along their common line of sight 73 which is tilted relative to the normal 27 to the top 8 of the instrumented baseball pitcher's rubbers.

The instrumented baseball pitcher's rubber has four sides. Side 9 faces the catcher. Side 4 faces $2^{nd}$ base. The top 8 of the instrumented baseball pitcher's rubber sits horizontally on the baseball playing field, and is made level with the playing field as is customary. The bottom 13 of the instrumented baseball pitcher's rubber is buried underneath the ground of the playing field.

In a preferred embodiment, a fiber optics cable/copper cable bi-directional communications link is buried underneath the ground of the playing field beneath the pitcher's mound under the instrumented baseball pitcher's rubber. Refer to FIG. 60A and FIG. 60B, and FIG. 61A and FIG. 61B, FIG. 64B, and FIG. 64C. The fiber optics cable/copper cable is passed through the openings 77 and 78 in the bottom of the instrumented baseball pitcher's rubber and connected to the instrumented baseball pitcher's rubber via the two fiber optics cable/copper cable connectors 75 and 76.

The z-axis 30 is perpendicular to the top 8 of the instrumented baseball pitcher's rubber. The z-axis 52 is perpendicular to the top 8 of the instrumented baseball pitcher's rubber. The line of sight direction 73 of the four cameras 35, 36, 48 and 58 that form the two 3-D stereo camera pairs is tilted forward toward the catcher in order that the televised video from both 3-D stereo camera pairs show the viewers the images of the catcher and the batter closer to the center of the letter box picture format as the baseball is pitched from the pitcher to the batter. In FIG. 49D the line of sight direction 24 is tilted toward the pitcher. The two cameras 35 and 36 that form the 3-D stereo camera pair 35 and 36 and the two cameras 48 and 58 that form the 3-D stereo camera pair 48 and 58 are identical to each other. The two cameras 35 and 36 use the same identical lenses 37 and 38. The two cameras 48 and 58 use the same identical lenses 65 and 66.

In one preferred embodiment, the lens pair 37 and 38 is identical to the lens pair 48 and 58.

In another preferred embodiment, the lens pair 37 and 38 is different than the lens pair 48 and 58. This enables the cameraman to get different shots from the two 3-D stereo camera pairs.

In a preferred embodiment, lenses 37 and 38 are extremely wide angle lenses. These lenses have nearly 180 degree fields of view. It is noted that in other preferred embodiments, other lens types can be employed with other fields of view. An advantage of the extremely wide angle lenses is that even though the cameras are pointed skyward, they can see right down to the outfield horizon which is at the edge of their fields of view. The view that the TV audience will get is similar to the view that you would get if you were laying flat on your back on the playing field, with your head on the instrumented baseball pitcher's rubber, and your feet facing the catcher. Your two eyes would be analogous to either one of the 3-D stereo camera pairs inside the instrumented baseball pitcher's rubber. For the present invention we herein define side 10 as the right hand side of the instrumented baseball pitcher's rubber, and side 32 as the left hand side of the instrumented home plate.

The two cameras 35 and 36 that form the 3-D stereo camera pair have optical windows 7 and 20. The two cameras 35 and 36 that form the 3-D stereo camera pair have the same line of sight 73. The two cameras 35 and 36 that form the 3-D stereo camera pair have optical windows 7 and 20. The line of sight 73 of the 3-D stereo camera pair is tilted relative to axes direction 27. Axis direction 27 is perpendicular to the top 8 of the instrumented baseball pitcher's rubber.

The two cameras 48 and 58 that form the 3-D stereo camera pair have optical windows 67 and 64. The two cameras 48 and 58 that form the 3-D stereo camera pair have the same line of sight direction 73. The two cameras 48 and 58 that form the 3-D stereo camera pair have optical windows 67 and 64. The line of sight direction 73 of the 3-D stereo camera pair is tilted relative to axis direction 27. Axis direction 27 is perpendicular to the top 8 of the instrumented baseball pitcher's rubber.

The interpupillary distance is the distance between 27 and 28, and between 50 and 54, which is the distance between the optical axes of camera lenses 37 and 38, and the distance between the optical axes of camera lenses 66 and 65. The line of sight direction 73 of the cameras 35 and 36, and cameras 48 and 58, that form the two 3-D stereo camera pairs are tilted away from the vertical.

The line of sight direction 73 of the cameras 35 and 36, and cameras 48 and 58 that form the two 3-D stereo camera pairs is tilted away from the vertical and toward the catcher. The line of sight directions of the cameras 35 and 36, and cameras 48 and 58 that form the two 3-D stereo camera pairs are tilted away from the vertical and away from the pitcher.

The two cameras 35 and 36 are identical to each other. The two cameras 35 and 36 use the same two lenses 37 and 38. The two cameras 48 and 58 are identical to each other. The two cameras 48 and 58 use the same two lenses 65 and 66. At times, in order to produce more dramatic shots of the pitcher or the catcher during the game, the cameraman may want to pre-orchestrate the positioning of the 3-D camera's line of sight 73 before the baseball game begins. This can be accomplished by pre-tilting, and encapsulating in-place, the 3-D cameras 35 and 36, and 48 and 58 inside the instrumented baseball pitcher's rubber in advance of the game when the field is being prepared before the game. The 3-D stereo camera's line of sight 73 is tilted toward the catcher in order to raise the image of the catcher above the lower edge of the TV picture frame and produce a larger picture of the catcher. This produces the dramatic effect of making the catcher seem closer to the TV viewing audience. This effect makes the catcher and his mitt seem closer to the TV viewing audience. If the batter swings at a pitch and misses, the TV viewing audience will see the baseball hit the crater in the catcher's mitt as it is being caught. The TV viewing audience will hear the scraping of the pitcher's feet on the mound and on the pitcher's rubber as he winds up and throws the ball.

Each of the four cameras inside the instrumented baseball pitcher's rubber is aligned within their respective instrumentation package assemblies 11 and 46 so that each of the cameras yields televised upright images of objects that appear between the center and the bottom edge of the TV picture frame. The four cameras are aligned inside their instrumentation package assemblies so that the TV viewing audience sees the batter, catcher and umpire in the bottom half of the TV picture frame.

When the pitcher throws the baseball to the catcher, the TV audience will see the baseball approaching the bottom half of the TV picture from near the center of the picture. The size of the baseball grows smaller as it gets further from the instrumented baseball pitcher's rubber and gets closer to the instrumented baseball home plate and the batter. Since the cameras are directly below the pitcher, an image of the pitcher's chin will occupy near the center of the TV picture frame. The size of the baseball will appear to be at its biggest as it is pitched from directly over the instrumented baseball pitcher's rubber. The TV audience will hear the whoosh of air in microphones 43 and 69 as the pitcher pitches the baseball. The TV audience will see the batter swing his bat to strike the baseball as it whizzes by. The TV audience will hear the loud crack of the batter's bat in microphones 43 and 69 as the batter hits the baseball. The sounds received from each of the microphones by the remote base station are processed using special software to produce surround sound which is broadcast to the TV viewing audience. The TV audience will see the baseball, as the pitcher sees it, as it is hit by the bat. The TV audience will see the baseball as it travels outward from the batter's bat onto the playing field toward the pitcher, as the pitcher sees it. The TV audience will see the baseball get larger as it gets closer to the pitcher and appears to hit the TV viewers in 3-D.

The audience will see the batter drop the bat and scramble toward first base on the left hand side of the screen. The TV audience will hear the rustle and scraping of the pitcher's cleats on the ground in microphones 33, 34, 44 and 62 as he scrambles to field the ball. In summary, the instrumented baseball pitcher's rubber provides video and sound to the viewing audience that is so exciting and realistic that it makes the individual members of the audience feel that they are at the pitcher's mound and in the game. In many ways this is more exciting than viewing the game in person from the stands of the baseball stadium. Therefore, the instrumented baseball pitcher's rubber not only provides a step forward in entertainment, but it also provides a great training tool to prospective baseball players by giving them the true life visual and auditory sensations and feelings of being in the game without actually being there.

The instrumented baseball pitcher's rubber is symmetrical about its x-axis 15. The instrumented baseball pitcher's rubber has four sides 4, 9, 10, and 32 and a top 8 and bottom 13. The top 8 of the instrumented baseball pitcher's rubber sits horizontally on the baseball playing field. The four holes in the top 8 of the instrumented baseball pitcher's rubber are made just large enough to prevent vignetting of the cameras field of view through the optical windows 7, 20, 64 and 67. Camera's 35 and 36 are mounted inside the instrumentation package assembly 11. Camera's 48 and 58 are mounted inside the instrumentation package assembly 46. The cameraman has a choice of camera lenses to use. Utilization of extremely wide angle lenses allows the TV viewing audience to see past the catcher and down behind the catcher.

Tilting of the two 3-D stereo camera pairs line of sight direction 73 is accomplished by using the bellows sections 14 and 40, and 49 and 56 of the instrumentation package assemblies 11 and 46 respectively. The bellows sections 14, 40, 49 and 56 are flexible. The bellows sections 14 and 40, which connect the buffer plate assembly 12 to the instrumentation package assembly 11, is bent to the desired tilt angle for the camera's 35 and 36 line of sight direction 73. The bellows sections 49 and 56, which connect the buffer plate assembly 59 to the instrumentation package assembly 46, is bent to the desired tilt angle for the camera's 48 and 58 line of sight direction 73.

After the desired tilt angle is set by bending the bellows sections, all the components inside the instrumented baseball home plate are encapsulated in place using the white rubber encapsulating compound 68. The tilted line of sight 73 is common for all four cameras 35, 36, 48 and 58, their lenses 37, 38, 65 and 66, their optical window's 7, 20, 64 and 67, their buffer plates 12 and 59, and their bellows sections 14, 40, 49, and 56.

Keeping in mind that the line of sight 73 is common for camera's, lenses, optical window's, and buffer plates, it follows from the specification discussed above that the line of sight 73 of cameras, lenses, optical windows, and buffer plates can be tilted in a like manner, towards or away from the catcher as well, by bending the bellows sections as before. Tilting 73 towards the batter would bring the image of the batter closer to the center of the TV picture frame and make him look closer and larger. Tilting 73 away from the batter would move the image of the batter away from the center of the TV picture frame and make him look further away and smaller Utilization of extremely wide angle lenses allows the TV viewing audience to see down past the batter and behind the batter.

When a player is running toward the instrumented baseball home plate from third base, the two 3-D stereo camera pairs in the instrumented baseball pitcher's rubber can see where he is coming from. The cameras can see the player as he runs and touches the instrumented baseball home plate. The cameras can see the player as he is sliding into the instrumented baseball home plate. The cameras can see the catcher as he tags the player before the player touches the instrumented baseball home plate and scores a run. From the vantage point of the instrumented baseball pitcher's rubber, the viewing audience can see the strained player darting for the instrumented baseball home plate. The viewing audience can see details of the pitcher as he attempts to cover the play. The viewing audience can see a close-up of the pitcher's attempt to cover the play. As the baseball is thrown home, the viewing audience can see the catcher reach down for it close to the plate. The camera's vantage point at the instrumented baseball pitcher's rubber gives the audience a viewing angle of the game never seen before by television viewing audiences. The instrumented baseball pitcher's rubber's cameras gives the TV viewing audience unending contemporaneous shots that get across a sense of the action of being there—like a player in the game that prior art cameras looking on from their disadvantaged viewing points from outside the playing field cannot get across.

In the present preferred embodiment, cameras 35, 36, 48 and 58 when using common extremely wide angle lenses 37, 38, 65 and 66 with zoom capability, even though the cameras are pointed from the top 8 of the instrumented baseball pitcher's rubber, they can see past the catcher right down to the horizon because of their near 180 degree field of view. This is a distinct advantage of extremely wide angle lenses over other types of lenses. However, it should be pointed out that the cameraman may elect to use a variety of other camera lens pairs with different capabilities depending on the visual effects he wishes to convey to the TV viewing audience. For example, the cameraman may elect to use a camera lens pairs with a narrower more highly magnified field of view in order to concentrate the attention of the TV viewing audience on the pitcher's taut and sweaty stubble filled face.

The instrumentation package assemblies 11 and 46 are supported inside the instrumented baseball pitcher's rubber at their upper ends by their buffer plates 12 and 59 respectively. The instrumentation package assemblies 11 and 46 and their buffer plates 12 and 59 are permanently encapsulated inside of the instrumented baseball home plate as the encapsulating material 68 around them cures. After the encapsulating material 68 sets, it becomes a weatherproof shock absorbing padding material. The small diameter ends of the buffer plates 12 and 59 peer through the top 8 and upper protective cover plates 22 and 63 of the instrumented baseball pitcher's rubber. The small diameter ends of the buffer plates are sealed and molded into the shock absorbing padding 68 around their circumferences. The encapsulating material 68 is a permanent resilient compound that is air-tight and water-tight.

The buffer plates are encapsulated by the encapsulating material 68 inside the instrumented baseball pitcher's rubber. Synthetic rubber is another example of encapsulating material besides natural rubber that is used. The mechanical axes of the bores in the buffer plates are tilted to the top 8 of the instrumented baseball pitcher's rubber so that they have a common line of sight directions 73. The ends of the instrumentation package assemblies 11 and 46 are inserted into the bores in the buffer plates 12 and 59, thereby tilting the mechanical axis of the ends of instrumentation package assemblies 11 and 46 to the top 8 of the instrumented baseball pitcher's rubber.

The buffer plates 12 and 59 act as mechanical bearings for the instrumentation package assemblies 11 and 46, and thereby restrict and restrain the motion of the instrumentation package assemblies 11 and 46 inside the instrumented baseball pitcher's rubber. Besides functioning as bearings to support the instrumentation package assemblies 11 and 46 within the instrumented baseball pitcher's rubber, the buffer plates provides a hollow portal through which the cameras inside the instrumentation package assemblies 11 and 46 may peer out of the instrumented baseball pitcher's rubber at the baseball playing field along line of sight direction 73.

Except for the four small holes in the top 8 used for the optical windows, the instrumented baseball pitcher's rubber's outward appearance looks substantially the same as the conventional professional league baseball pitcher's rubber and the conventional high school league baseball pitcher's rubber, and plays the same as these rubbers, and meets the official requirements for these venues and is interchangeable with them in these venues as substitutes.

The buffer plates 12 and 59 are Type XI buffer plates and are disclosed in FIG. 21ZA and FIG. 21ZB and FIG. 21ZC. The buffer plate 12 and 59 are molded into the instrumented baseball pitcher's rubber using the white rubber encapsulating material 68. The small diameter end of the buffer plates 12 and 59 pass through the upper cover protective cover plates 22 and 63 and protrude through the molded rubber top 8 of the instrumented baseball pitcher's rubber. The buffer plates carry the optical windows 20, 7, 64 and 67. The optical windows tilt with their buffer plates. The flat surfaces of optical windows 20, 7, 64 and 67 are tilted and made relatively flush with the top 8 of the instrumented baseball pitcher's rubber.

The cameras 35 and 36, and 48 and 58 are aligned together within their respective instrumentation package assemblies 11 and 46 respectively so that they yield wirelessly transmitted upright 3-D images of objects that appear between the center and bottom of the TV picture frame. This is accomplished in any one of two different modes. Each of these two modes conveys its own spectacular viewing angle of the game to the TV viewing audience. Each of these two modes is achieved by physically rotating the cameras and their lenses together about their optical axes respectively by using an actuating device that is mechanically coupled to the cameras and lenses inside the instrumentation package assemblies. The mechanical actuating device has two mechanical stops that are mechanically detented 180 degrees apart from one another. The mechanical actuating devices are housed within their camera's instrumentation package assemblies. The mechanical actuating device can rotate the cameras and lenses together to any one of the two stops about their optical axes respectively. The cameraman in the remote base station selects which of the two modes is to be employed, and sends a signal to the instrumentation package assemblies to set the cameras and lenses to the desired mode he selected.

In the first mode, the cameras and lenses are aligned in rotation about their optical axes respectively inside its instrumentation package assemblies by the mechanical actuating devices so that the TV viewing audience sees the horizon near the bottom edge of the 3-D TV picture frame. This is equivalent to what a person would see visually if he were laying flat down on the playing field with his head resting on the instrumented baseball pitcher's rubber and looking upward with his feet facing the catcher. The batter appears standing upright in the picture frame with his head near the bottom of the SD/HD letterbox 3-D TV picture frame.

In the second mode, the cameras and lenses are aligned in rotation inside their instrumentation package assemblies by the mechanical actuating device so that the TV viewing audience sees the catcher squatting upright with his feet near the bottom of the TV picture frame. This is equivalent to what a person would see visually if he were laying flat down on the playing field with his head resting on the instrumented baseball pitcher's rubber and looking upward with his feet facing the catcher at the apex of the instrumented baseball home plate).

Since the TV picture that the TV audience sees is in 3-D, the TV audience will duck their heads as the size of the baseball grows larger as it gets closer to the instrumented baseball pitcher's rubber and the pitcher.

The instrumented baseball pitcher's rubber has two upper protective cover plates 22 and 63 embedded and molded into it. The protective cover plates 22 and 63 are on the top of the instrumented baseball pitcher's rubber. The outer body of the top of the protective cover plates are made spherically dome shaped so their edges do not come close to the top 8 of the instrumented baseball pitcher's rubber to protect the pitcher from hitting their edges. The entire body of the bottom protective cover plate 23 is made flat and has rounded edges like the edges on the top protective plate 22. Its purpose is to protect the instrumentation package assemblies and prevent the instrumented baseball pitcher's rubber from bending to maintain camera alignment.

The materials chosen for the protective cover plates 22, 63 and 23 in the present preferred embodiment are polycarbonates, ABS, or fiber reinforced plastics. Although a variety of other materials would function almost equally as well, these have an advantage in that they are lightweight and stiff, enabling the thickness of the protective cover plates 22, 63 and 23 to remain thin while still delivering the significant stiffness needed to perform their mechanical shielding function in the limited space they can occupy within the instrumented baseball home plate. These materials have an additional advantage in that they are transparent to the transmitted and received radio waves which need to move to and from the antennas inside the instrumented baseball home plate without absorption or reflection.

The instrumentation package assemblies are sandwiched between the top and bottom protective cover plates. The purpose of these protective cover plates is to act as a shield to protect the instrumentation package assemblies from being damaged during the game by the pitcher stepping on the instrumented baseball pitcher's rubber. During the normal course of the game, the top of the instrumented baseball pitcher's rubber will be hit and crushed by the pitcher and by his equipment. The protective cover plates 22 and 63 protect the instrumentation package assemblies within the instrumented baseball pitcher's rubber from physical damage due to these hits.

Around the top, bottom and sides of the instrumented baseball pitcher's rubber, the space between the outer covering and the protective cover plates is filled with white rubber encapsulating material 68. When cured, this encapsulating material 68 acts as cushioning to absorb shock and vibration to the instrumented baseball pitcher's rubber. The molting material 68 encapsulates the upper and lower protective cover plates 22, 63 and 23 and maintains their positions inside the molded instrumented baseball home plate. The space between the protective cover plates 22, 63 and 23 and the instrumentation package assemblies 11 46 is also filled with the same encapsulating material 68. When cured, this encapsulating material 68 acts as cushioning to absorb shock and vibration to the instrumentation package assemblies. The molding material 68 encapsulates the instrumentation package assemblies inside the instrumented baseball pitcher's rubber and thereby maintains their positions inside the molded instrumented baseball pitcher's rubber The top protective cover plates 22 and 63 are spherically dome shaped in their outer regions. The major purpose of making them spherically dome shaped is to provide maximum protection for the optical windows 20, 7, 64 and 67 whose surfaces are at the very top 8 of the instrumented baseball pitcher's rubber. The upper protective cover plates are flat in their inner regions close to the optical windows. The flat shape enables the upper protective cover plates to surround the optical windows at the top 8 of the instrumented baseball pitcher's rubber where the optical windows are most likely to be exposed to the greatest threat of damage due to hits to the top 8 of the instrumented baseball pitcher's rubber. The upper protective cover plates are buried in molding material 68 at the center top 8 of the instrumented baseball pitcher's rubber around the optical windows by approximately 1/32 to 1/8 inch below the top 8. The dome shape enables the upper protective cover plates to come very close to the top 8 of the instrumented baseball pitcher's rubber where the players will have only grazing contact with its curved surface if they crash into the instrumented baseball pitcher's rubber, thereby eliminating the threat of injury to the players if they hit the top of the instrumented baseball pitcher's rubber. The spherical shape of the protective cover plates causes their edges to be curved downward and away from the top of the outer skin and places them approximately over 1 inch below the top surface 8 of the instrumented baseball pitcher's rubber.

The lower protective cover plate 23 is entirely flat and is buried in encapsulating material 68 over an inch or more above the bottom surface of the instrumented baseball pitcher's rubber. The lower protective cover plate spans the distance between one side of the instrumented baseball pitcher's rubber and the other. It physically supports the bottom of each of the instrumentation package assemblies containing the two 3-D stereo camera pairs and contributes toward holding them in optical and mechanical alignment with one another. The body of the lower protective cover plate 23 is made flat because it is buried in the ground and there is no danger of the players coming into violent contact with it. The flat shape is easier to make and less expensive to manufacture. Its thickness is also made in the range of approximately 1/8 to 1/2 inches. However, its thickness is not physically restrained because of its location, as is the case with the upper protective cover plates. In all cases, the edges of the protective cover plates 22, 63 and 23 come within no less than 1/4 inches from all sides of the instrumented baseball pitcher's rubber.

Each of the microphones 43 and 69 listens for sounds from the outside vicinity of top 8 of the instrumented baseball pitcher's rubber. Each of the microphones 33, 34, 44 and 67 listens for sounds of impacts conducted from the ground and body of the instrumented baseball pitcher's rubber. The condenser microphones enable the viewing audience to hear real-time contacts, impacts and shocks to the instrumented baseball pitcher's rubber and to the ground around it.

Microphones 43 and 69 protrude through holes in the top 8 of the instrumented baseball pitcher's rubber. Microphones 43 and 69 are mounted above the upper protective cover plates and connected by cables from each to an electrical connector on each of the instrumentation package assemblies respectively.

In a further preferred embodiment, the present invention contemplates an instrumented baseball pitcher's rubber, which when stationed off of any baseball playing field i.e. at the traditional pitcher's mound location in the pitcher's bullpen, can wirelessly by RF radio and/or by fiber optics cable and/or by coaxial copper cable, autonomously televise baseball pitching practice and warm-up sessions under command and control of the remote base station. The remote base station is disclosed in FIG. 59A and FIG. 59B and FIG. 60A and FIG. 60B and FIG. 61A and FIG. 61B, and FIG. 64A and FIG. 64B, and FIG. 64C. In addition to adding an element to the entertainment of the TV viewing audience, this embodiment serves to aid the pitchers and the pitching coaches in evaluating the quality of the pitcher's progress, prowess, fitness and "stuff".

The instrumented baseball pitcher's rubber is an example of static instrumented sports paraphernalia. For televising games from off the playing field, for example in the pitcher's bullpen, refer to FIG. 64C which is a top view of a general sports stadium that has been configured and equipped for use with both static and dynamic instrumented sports paraphernalia, using both bi-directional wireless RF radio wave communication links and/or bi-directional fiber optics cable communication links and/or coaxial copper cable communication links.

In another preferred embodiment, the interpupillary distances may be increased by electronically forming a 3-D stereo camera pair with cameras 35 and 48.

In another preferred embodiment, the interpupillary distances may be increased by electronically forming a 3-D stereo camera pair with cameras 35 and 58.

In another preferred embodiment, the interpupillary distances may be increased by electronically forming a 3-D stereo camera pair with cameras 36 and 48.

In another preferred embodiment, the interpupillary distances may be increased by electronically forming a 3-D stereo camera pair with cameras 36 and 58.

Electronically, mechanically and optically all four of these 3-D stereo camera pairs operate simultaneously with the 3-D stereo camera pair formed with cameras 36 and 35, and the 3-D stereo camera pair formed with cameras 48 and 58. An advantage of these four embodiments in certain venues is that the 3-D effect to the TV viewers is magnified in these four alternative embodiments relative to the present embodiment. This occurs because their interpupillary distances are larger due to the increased spatial separations across the instrumented baseball pitcher's rubber between the cameras in the electronically formed 3-D stereo camera pairs. Another advantage occurs when an optical window is obscured by dirt; the remaining cameras can be paired to continue to produce 3-D imagery for the TV viewers. A disadvantage of this arrangement is that the alignment of the cameras in these 3-D stereo camera pairs is more difficult to maintain owing to the increased distance between the cameras. In each of these four embodiments the four cameras are identical to one another, the four camera lenses are identical to one another, and the four line of sight directions of the cameras are identical to one another. The SD/HD letter box picture formats of cameras 43 and 44 are aligned together. The SD/HD letter box picture formats of cameras 41 and 42 and 43 and 44 are aligned together so that any two of the four cameras can be a 3-D stereo camera pair.

Charging the battery pack in the pitcher's rubber is accomplished in the same fashion as charging the instrumented baseball home plate and the instrumented baseball bases as is shown in FIG. 37A and FIG. 37B and FIG. 37C, and FIG. 37E and FIG. 37F and FIG. 37G. The charging station unit is placed on the top of the instrumented baseball pitcher's rubber in order to inductively couple electricity into the coils of the instrumented baseball pitcher's rubber to charge its battery packs.

The cameraman, in the remote base station, software selects either the wireless mode of communication, and/or the fiber optics/copper cable mode of communication between the instrumented baseball pitcher's rubber and the remote base station. The cameraman can use whichever equipment (antenna array relay junction or fiber optics cable/copper cable) that is installed in the baseball stadium with which to command and control his choice and communicate it to the instrumented baseball pitcher's rubber on the baseball stadium playing field. These choices are also physically switch selectable by the cameraman with his access through the opening in the bottom of the instrumented baseball pitcher's rubber.

The cameraman selects items from a software menu of control commands that go to the network transceiver at the remote base station that are subsequently transmitted to the instrumented sports paraphernalia (the instrumented baseball pitcher's rubber) for the purpose of adjusting various system initializations, operating parameters, radio frequency, polling system status data such as battery condition, and initiating remote mechanical adjustments such as camera focus, optical zoom, iris and movement to the cameras' field of view, etc over the selected bi-directional communications link i.e. wireless radio, fiber optics or copper cable connectivity being used within the particular sports stadium.

These commands, when intercepted by the network transceiver within the instrumented sports paraphernalia are applied to its microprocessor, which then in turn upon executing the instructions stored within the contents of its firmware applies a pulse coded control signal via the power and control interconnect interface inside the instrumentation package to the corresponding electronics i.e. the mechanical actuators that provides optical focus and/or zoom adjustment of the cameras and microphone gain and selection, etc as desired by the cameraman and/or special software running on the computer at the remote base station. The power and control interconnect interface as shown in FIG. 33E (item 21), which is represented by dotted lines, consists of the electrical control wiring to and from the electronic components of the instrumented sports paraphernalia that are being controlled.

Referring to the Preferred Embodiments Specified in FIG. 65A and FIG. 65B and FIG. 65C, the Instrumented Baseball Pitcher's Rubber Satisfies all of the Following Further Objectives:

It is an objective of the present invention to replace existing prior art non-instrumented baseball pitcher's rubbers that are currently on existing baseball fields with substitute instrumented baseball pitcher's rubbers. It is an objective of the present invention to instrument the baseball pitcher's rubber with four cameras, eight induction coils, four plane-parallel-flat optical windows, two central hubs of the instrumentation package assembly, two battery packs, two buffer plate assemblies, four bellows segments, two upper protective cover plates, two lower protective cover plates, eight wireless radio antenna elements, four tilted cameras, six microphones, four camera lenses, gas valves, access lid heat sinks, encapsulating rubber material, fiber optics cable/copper cable connector, and a slotted opening. It is an objective of the present invention to instrument the baseball pitcher's rubber with two instrumentation package assemblies, two buffer plate assemblies, two upper protective cover plates, two lower protective cover plates, two additional microphones, and encapsulation/molding material. It is an objective of the present invention to instrument the pitcher's mound on the baseball playing field with an instrumented baseball pitcher's rubber.

It is an objective of the present invention to televise from the pitcher's bullpen with an instrumented pitcher's rubber. It is an objective of the present invention to instrument the pitcher's bullpen with an instrumented pitcher's rubber. It is an objective of the present invention to enable an instrumented baseball pitcher's rubber, which when stationed on any baseball playing field at any traditional pitcher's rubber location, to both wirelessly and/or by using fiber optics/copper cable connectivity, autonomously televise baseball games under the command and control of a remote base station. It is an objective of the present invention to enable an instrumented baseball pitcher's rubber, which when stationed in any baseball bull pen at any traditional pitcher's rubber location, to both wirelessly and/or by using fiber optics/copper cable connectivity, autonomously televise baseball warm-up and training activity under the command and control of a remote base station.

It is an objective of the present invention to enable the cameraman in a remote base station to select either the wireless mode of communication and/or the fiber optics/copper cable mode of communication for the instrumented baseball pitcher's rubber where the cameraman can use whichever equipment (antenna array relay junction or fiber optics cable/copper cable) which is installed in the baseball stadium with which to command and control his choice and communicate it to the instrumented baseball pitcher's rubber on the baseball stadium playing field or in the bullpen, where his choices are physically switch selectable with access through the bottom of the instrumented baseball pitcher's rubber. It is an objective of the present invention to enable the cameraman in the remote base station to electronically command and control any combination of any two of the four cameras in the instrumented baseball pitcher's rubber to act as a 3-D stereo camera pair.

FIG. 66A and FIG. 66B and FIG. 66C

The detailed physical elements disclosed in the instrumented ice hockey puck drawings shown in FIG. 66A and FIG. 66B and FIG. 66C are identified as follows: 1 is the y-axis of camera 43. 2 is the y-axis of symmetry of the instrumented ice hockey puck. 3 is the y-axis of camera 44. 4 is the side of the instrumented ice hockey puck. 5 is a lower induction coil used to charge the battery pack inside the instrumentation package assembly. 6 is a lower induction coil used to charge the battery pack inside the instrumentation package assembly. 7 is a plane-parallel-flat optical window. 8 is the top of the instrumented ice hockey puck. 9 is the front side of the instrumented ice hockey puck. 10 is the side of the instrumented ice hockey puck. 11 is the central hub of the instrumentation package assembly containing the battery pack. 12 is the Type XI buffer plate. 13 is the bottom of the instrumented ice hockey puck. 14 is the bellows segment of the instrumentation package assembly. 15 is the x-axis of symmetry of the instrumented ice hockey puck. 16 is the bottom of the instrumentation package assembly. 17 is the side of the instrumentation package assembly. 18 is the top of the instrumentation package assembly. 19 is the top of the instrumented ice hockey puck. 20 is the plane-parallel-flat optical window. 21 is the front side of the instrumented ice hockey puck and faces the pitcher. 22 is the right side of the instrumented ice hockey puck. 23 is the upper protective cover plate. 24 is the lower protective cover plate. 25 is a wireless radio antenna. 26 is a wireless radio antenna. 27 is a wireless radio antenna. 28 is a wireless radio antenna, 29is the z-axis of the camera whose optical window is 20. 30 is the z-axis of the instrumentation package assembly and the instrumented ice hockey puck. 31 is the z-axis of the camera whose optical window is 7. 32 is a fiber optics/copper cable connector in the bottom of the instrumentation package assembly. 33 is a lower induction coil. 34 is a lower induction coil. 35 is an optical window. 36 is an optical window. 37is the z-axis of the camera whose optical window is 35. 38 is the z-axis of the camera whose optical window is 36. 39 is the bellows section of the instrumentation package assembly belonging to optical window 36. 40 is the bellows section of the instrumentation package assembly belonging to optical window 35. 41 is a camera. 42 is a camera. 43 is a camera. 44 is a camera. 45 is a camera lens. 46 is a camera lens. 47 is a camera lens. 48 is a camera lens. 49 is a microphone. 50 is a microphone. 51 is a gas valve. 52 is an access lid heat sink. 53 is a microphone. 54 is the microphone cable. 55 is the microphone connector. 56 is the battery pack.

FIG. 66A is a top view of the instrumented ice hockey puck.

FIG. 66B is a front view of the instrumented ice hockey puck.

FIG. 66C is a side view of the instrumented ice hockey puck.

Referring to the preferred embodiment disclosed in FIG. 66A and FIG. 66B and FIG. 66C, an instrumented ice hockey puck equipped with two wireless radio wave 3-D stereo television cameras employing single point, multi point and/or multi point diversity reception techniques is specified. The instrumented ice hockey puck is equipped to be enabled, commanded and controlled by administrative data conveyed simultaneously from the remote base station utilizing wireless radio communication. The instrumented ice hockey puck uses the instrumentation package assembly shown in FIG. 35A and FIG. 35B. Similar instrumentation package assemblies, for example FIG. 35A and FIG. 35C are used in the instrumented baseball home plate embodiments disclosed in FIG. 53A and FIG. 53B and FIG. 53C, and FIG. 54A and FIG. 54B and FIG. 54C. The instrumentation package assembly shown in FIG. 35A and FIG. 35B uses four of the instrumentation package assembly elements shown in FIG. 33D.

A conventional ice hockey puck is traditionally considered to be sport's paraphernalia. It is a black colored disk three inches in diameter by one inch thick. The instrumented ice hockey puck is instrumented sports paraphernalia. The instrumented ice hockey puck is three inches in diameter and one inch thick. Its size, shape, color, texture, weight, dynamic playability and outward appearance are identical to the conventional regulation ice hockey pucks. The instrumented ice hockey puck contains one instrumentation package assembly 11 inside it. This is the identical instrumentation package assembly used in some instrumented baseball home plates, for example FIG. 53A and FIG. 53B and FIG. 53C, and FIG. 54A and FIG. 54B and FIG. 54C. The outward appearance of the instrumented ice hockey puck is made identical to the conventional ice hockey puck so it will not be obtrusive to the game or to the players. The dynamics of the instrumented hockey puck are made identical to the dynamics of the conventional ice hockey puck. The instrumented ice hockey puck material 19 is vulcanized hard black rubber just like the conventional regulation hockey puck. The weight of the instrumented hockey puck is 5.5 to 6.0 ounces which is the regulation weight of conventional ice hockey pucks. The instrumented ice hockey puck is used during a hockey game on the hockey court/rink in an arena/stadium by the players in the same way a conventional hockey puck is used. It is a direct substitute for conventional hockey pucks. The instrumented ice hockey puck is three inches in diameter and one inch thick. The distance between the instrumented ice hockey puck's top 8 and its bottom 13 is one inch, just like the conventional regulation ice hockey pucks. 8 and 13 are flat and parallel to one another.

The instrumentation package assembly 11 is disclosed in FIG. 35A and FIG. 35B. The four identical instrumentation package assembly elements which constitute a major part of the instrumentation package assembly 11 are disclosed in FIG. 33D.

Referring to drawings FIG. 66A and FIG. 66B and FIG. 66C, in a preferred embodiment, the present invention contemplates an instrumented ice hockey puck, which when used on any hockey court can wirelessly and autonomously televise ice hockey games under the command and control of the remote base station. The remote base station is disclosed in FIG. 64A and FIG. 64C and elsewhere in the present invention.

The instrumented ice hockey puck employs a four camera instrumentation package assembly substantially identical to the instrumentation package assembly shown in FIG. 35A and FIG. 35B. It uses the Type XII buffer plate assembly shown in FIG. 21ZZA and FIG. 21ZZB and FIG. 21ZZC. It uses the upper protective cover plate shown in FIG. 58A and FIG. 58B and FIG. 58C. Four instrumentation package assembly elements are primary parts of the instrumentation package assembly. The instrumentation package assembly uses the identical instrumentation package assembly elements disclosed in FIG. 33D. The instrumented ice hockey puck must be arranged at the beginning of the game with its top 8 facing upward from the ice with its cameras looking skyward.

The radio transmission link is similar to that disclosed in FIG. 59A and FIG. 59B except that the baseball diamond is replaced with a hockey rink in a typical instrumented sports stadium/arena. The radio transmission link is also disclosed in FIG. 64A and FIG. 64C.

As with the previous preferred embodiment shown in FIG. 53A and FIG. 53B and FIG. 53C, the present invention provides the TV viewing audience with 3-D stereo pictures and stereophonic surround sound.

It is understood that as the state of the art in TV camera technology advances, that there will be other better TV cameras that use other than CCD technology. The present invention will work equally well with them as they become available. Therefore, the present invention uses CCD TV cameras as an example of TV cameras that may be used simply because they are the best that today's technology offers, and is not confined only to their sole use in the future.

Referring to the disclosed instrumented ice hockey puck shown in FIG. 66A and FIG. 66B and FIG. 66C, the instrumented ice hockey puck has one instrumentation package assembly 11 mounted inside the puck. Details of instrumentation package assembly 11 are specified in FIG. 35A and FIG. 35B. The top 8 of both the instrumented ice hockey puck and the conventional ice hockey puck are identical, having the same size, shape, color and texture.

The instrumentation package assembly 11 carries four CCD sensor arrayed cameras 41, 42, 43, and 44. The instrumentation package assembly 11 carries three microphones 49, 50, and 53. The four cameras 41, 42, 43, and 44 in the instrumentation package assembly 11 are arranged into two pairs 41, 42 and 43, 44. The imagery from each camera in the pair is combined by the processors in the remote base station to be broadcast as 3-D video to the TV viewing audience. Each camera pair effectively becomes a 3-D stereo camera pair. The first 3-D stereo camera pair is comprised of cameras 41 and 42. The second 3-D stereo camera pair is comprised of cameras 43 and 44. The pairs of cameras 41, 42 and 43, 44 act independently of one another to simultaneously produce two 3-D stereo TV pictures of the game. Each of the cameras 41 and 42 that form the first 3-D stereo camera pair 41, 42 are separated by an interpupillary distance. Each of the cameras 43 and 44 that form the second 3-D stereo camera pair 43, 44 are separated by an interpupillary distance.

The linear distance separation of the optical axes of the two camera lenses that make up the stereo camera pairs is an important function of the buffer plate. For the buffer plate, the distance measured between the optical axes of the lenses is defined as the interpupilarly distance between the camera lenses.

The diameter of the hockey puck is three inches. This dimension puts a practical limitation on the maximum interpupillary distance between the cameras that make up a 3-D stereo camera pair. For todays state of the art SD/HD cameras with body diameters of 0.7 inches for example, and assuming a generous clearance of 0.25 inches between the walls of the puck and the camera bodies, this leaves 1.8 inches for interpupillary distance, or 45.72 mm. Therefore, the axial separation between each 3-D stereo pair of camera lenses can vary up to 46 mm in this example. Therefore in this example, the separation between 29 and 31 can vary up to 46 mm, and the separation between 37 and 38 can vary up to 46 mm also. It is understood that different interpupillary distances produce different 3-D effects. For example, larger interpupillary distance will produce more striking 3-D effects. In the future, as SD/HD cameras get smaller in diameter we may be able to raise the interpupillary distance to 46 to 57 mm.

The 3-D stereo camera pair 41 and 42 in the instrumentation package assembly 11 that forms the first 3-D stereo camera pair has optical windows 35 and 36 respectively. The 3-D stereo camera pair 43 and 44 in the instrumentation package assembly 11 that forms the second 3-D stereo camera pair has optical windows 20 and 7 respectively. The two cameras 41 and 42 in the instrumentation package assembly 11 that form the first 3-D stereo camera pair have optical axes 37 and 38. The two cameras 43 and 44 in the instrumentation package assembly 11 that form the second 3-D stereo camera pair have optical axes 29 and 31. The interpupillary distance for both of these 3-D stereo camera pairs is set to be identical.

The lines of sight of the first and of the second 3-D stereo camera pairs are both looking straight upward from the top 8 of the instrumented ice hockey puck along their respective optical axes. Their lines of sight are all parallel to one another. The SD/HD letter box picture formats of cameras 41 and 42 are aligned together. The SD/HD letter box picture formats of cameras 43 and 44 are aligned together also. Video information from all four cameras is transmitted simultaneously from the instrumented ice hockey puck to the remote base station where it is processed. The SD/HD letter box picture formats of cameras 41 and 42 and 43 and 44 are aligned together so that any two of the four cameras can be configured to be a 3-D stereo camera pair in the remote base station's processing software. Gyroscope data from the instrumented ice hockey puck accompanies the video data transmitted from the instrumented ice hockey puck to the remote base station. The gyroscope data is processed by the remote base station software to yield the spin rate, spin sense and direction of forward motion of the instrumented ice hockey puck. The spin rate, spin sense and direction of forward motion is then used by the processor to remove the spin from the imagery through derotation processing which stabilizes the imagery in the SD/HD letterbox picture format and holds it upright for broadcast to viewing by the TV audience.

The instrumented ice hockey puck has two protective cover plates 23 and 24 embedded and molded into it. One protective cover plate 23 is on the top and one 24 is on the bottom of the instrumented ice hockey puck. The outer body of the top protective cover plate 23 is made spherically dome shaped. The entire body of the bottom protective cover plate 24 is made flat and has rounded edges like the edges on the top protective cover plate 23.

The materials chosen for the protective cover plates 23 and 24 in the present preferred embodiment are polycarbonates, ABS or fiber reinforced plastics. Although a variety of other materials would function equally as well. Polycarbonates, ABS or fiber reinforced plastics have an advantage in that they are lightweight and stiff, enabling their thickness to remain thin while still delivering the significant stiffness needed to perform their mechanical shielding function in the limited space they can occupy within the instrumented ice hockey puck. They have an additional advantage in that they are transparent to the transmitted and received radio waves which need to move to and from the antennas 25, 26, 27 and 28 inside the instrumented ice hockey puck without absorption or reflection.

The instrumentation package assembly 11 is sandwiched between the top and bottom protective cover plates 23 and 24. The purpose of these protective cover plates 23 and 24 is to act as mechanical shields to protect the instrumentation package assembly 11 from being damaged during the game. During the normal course of the game, the top 8 of the instrumented ice hockey puck will be hit and crushed by the players and by their equipment. For example, the players may step on the instrumented ice hockey puck or slide into it, or hit it with their hockey sticks, or bounce it off of a wall. They may even drop their knees on it. The two protective cover plates 23 and 24 protect the instrumentation package assembly 11 within the instrumented ice hockey puck from physical damage due to these hits.

The space between the top 8, bottom 13 and sides of the instrumented baseball home plate and the protective cover plates 23 and 24 is filled with vulcanized hard rubber or synthetic rubber encapsulating material 19. A combination of encapsulation voids and encapsulated tiny lead spheres are used to carefully balance and set the moments of inertia of the instrumented puck to match those of the conventional regulation puck. Synthetic rubber is an example of an encapsulating material that is used besides vulcanized hard rubber to mold the disk. When cured, this encapsulating material 19 acts to absorb shock and vibration to the instrumented ice hockey puck. The material 19 encapsulates the upper and lower protective cover plates 23 and 24 and maintains their positions inside the molded instrumented ice hockey puck. The space between the protective cover plates 23 and 24 and the instrumentation package assembly 11 is also filled with the same encapsulating material. When cured, this encapsulating material 19 acts to absorb shock and vibration to the instrumentation package assembly 11. The material 19 encapsulates the instrument package assembly 11 inside the instrumented ice hockey puck and thereby maintains its position centered with 30 coaxial with the mechanical z-axis of the disk inside the molded instrumented ice hockey puck.

The top protective cover plate 23 is made flat in its innermost region close to the optical windows 35, 36 and 20, 7. The purpose of making it flat in its innermost region is to provide maximum protection for the optical windows 35, 36 and 20, 7 whose surfaces are at the very top 8 of the instrumented ice hockey puck. The flat shape enables the protective cover plate 23 to surround the optical windows 35, 36 and 20, 7 at the top 8 of the instrumented ice hockey puck where the optical windows 5, 36 and 20, 7 are most likely to be exposed to the greatest threat of damage due to hits to the top of the instrumented ice hockey puck. The upper protective cover plate 23 is buried in encapsulating material at the center top of the instrumented ice hockey puck around the optical windows 35, 36 and 20, 7 by approximately 1/32 inch or more below the top 8. The dome shape enables the upper protective cover plate 23 to come very close to the top center of the instrumented ice hockey puck where the players will have only grazing contact with its curved surface if they crash into the instrumented ice hockey puck, thereby eliminating the threat of injury to the players if they hit the top of the instrumented ice hockey puck. Furthermore, the spherical shape of the protective cover plate 23 causes its edge to be rounded downward away from the top 8 and places it approximately ½ inch or more below the top surface 8 of the instrumented baseball home plate.

The lower protective cover plate 24 is entirely flat and is buried in encapsulating material 19 approximately ¼ inch or more above the bottom surface of the instrumented baseball home plate. The body of the lower protective cover plate 24 is made flat because it is buried inside the puck and there is no danger of the players coming into violent contact with it. The flat shape is easier to make and less expensive to manufacture. Its thickness is also made in the range of approximately ⅛ to ¼ inches. The thickness of the lower protective cover plate 24 is not physically restrained because of its location, as is the case with the upper protective cover plate 23.

In all cases, the rounded edges of the protective cover plates 23 and 24 come within no less than ¼ inch or more from all sides of the instrumented ice hockey puck.

Alignment of all four cameras of the instrumented ice hockey puck is achieved using the following representative procedure. When the instrumented ice hockey puck is arranged on the ice so that the hockey net lies along the positive y-axis direction 2 of the instrumented ice hockey puck, the first camera pair 43 and 44 is aligned together in rotation about their respective z-axes within the instrumentation package assembly 11 so that they simultaneously yield wirelessly transmitted upright 3-D stereo images of the hockey net to the remote base station which appear between the center and the bottom of the TV picture frame, and have their letterbox picture frames aligned together. The second camera pair 41 and 42 is aligned together in rotation about their respective z-axes within the instrumentation package assembly 11 so that they simultaneously yield wirelessly transmitted upright 3-D stereo images of the hockey net which appear between the center and the bottom of the TV picture frame, and have their letterbox picture frames aligned together with those of cameras 43 and 44 so that they are all superimposed on one another.

3-D stereo camera pair 43 and 44 will enable the TV audience to see what the instrumented ice hockey puck sees as it travels outward from the crack of the hockey stick on its body. The TV audience will see the hockey net get larger as the instrumented ice hockey puck gets closer to the net and the goal tender. Microphones 49, 50 and 53 will deliver the sound of a loud crack to the TV viewing audience as the player's hockey stick crashes against the instrumented ice hockey puck. The TV audience will see the goal tender drop down close-up as the instrumented ice hockey puck approaches the net and the goal tender tries to block its flight. Members of the TV viewing audience will duck to avoid being hit by the goal tenders hockey stick as he wields it to intercept the puck. The TV audience will hear the thud and groans of the goal tender as he blocks the puck. The TV audience will hear the scraping by the goal tender's skates as they dig into the ice on the rink. The TV audience will hear the players collide as they scramble for the puck. The sounds received from each of the microphones by the remote base station are processed using special software to produce surround sound which is broadcast to the TV viewing audience.

The televised images viewed by the TV audience are maintained upright in the HD letterbox picture frame despite the rotational motions of the instrumented ice hockey puck, by transmitting pitch, yaw and roll data from the gyroscopes along with the televised image data from the instrumented ice hockey puck's instrumentation package assembly 11 to the remote base station which processes the imagery and gyroscope data in its hardware and software and derotates the imagery and holds it upright and stable for the TV audience. Pitch, yaw and roll gyroscopes and encoders are part of the supporting electronics in each of the four instrumentation package elements that are inside the instrumentation package assembly 11.

In a preferred embodiment where standard SD/HD letterbox CCD chips are used in the cameras, since the shape of the CCD sensor array of pixel elements is a letterbox, this causes the common area of pixels of the physically spinning letterbox to be a square covering only 9/16 or 56% of the field of view of the whole letterbox. Therefore, in a preferred embodiment using standard camera chips we loose 44% of the field of view and are reduced essentially to a square picture format. We can recover the field of view by using physically larger sized standard chips and shorter focal length camera lenses.

In another preferred embodiment, the circular HD CCD TV camera sensor chips disclosed in drawings FIG. 63A and FIG. 63B and FIG. 63C are used in the four cameras 41, 42, 43 and 44 rather than ordinary prior art CCD sensor chips. These circular HD CCD TV camera sensor chips have an advantage over ordinary HD CCD sensor chips because they permit transmission of the entire circular sensor array to the remote base station for processing, even though the instrumented ice hockey puck is spinning. The pixel elements of ordinary prior art CCD sensor chips cover only the area of the letterbox, thereby causing a loss of field of view when the ice hockey puck spins. Use of the circular HD CCD TV camera sensor chips eliminates this problem of field of view loss when the puck spins. Using software, the SD/HD letterbox picture frame format is made to spin in sync with the spin of the instrumented ice hockey puck in the processor to derotate and stabilize the imagery and lock it in its upright position relative to the direction of forward motion of the ice hockey puck without loss of any of the field of view. For example, as the instrumented ice hockey puck spins on the ice rink about its z-axis 30, the optical images formed on all four of the circular HD CCD TV camera sensor chips by the camera lenses 45, 46, 47 and 48, fully fill the circular sensor's surfaces. Imagery from the entire circular sensor surface is scanned because all the pixel elements on the sensor are active simultaneously. As the instrumented ice hockey puck spins on the ice, so does the optical images on the circular sensor's surfaces of all four chips. The circular sensors are large enough to cover and track the full SD/HD letterbox picture frame format of the images whatever their rotation angle may be. Image data from all the pixel elements on the face of the circular sensor is wirelessly transmitted to the remote base station from the instrumented ice hockey puck for processing. At the remote base station, the spinning virtual electronic SD/HD letterbox frame within the software processor collects the signals from only those pixel elements within the rectangular letterbox borders for transmission to the TV viewing audience. The roll gyroscopes detect the z-axis 30 spin of the instrumentation package assembly within the spinning instrumented ice hockey puck and encodes the spin data as well as the pitch and yaw data. The spin(roll) data along with pitch and yaw data, and the image data from the circular camera sensors are transmitted to the remote base station wirelessly from the RF antennas 25, 26, 27 and 28 via the antenna array relay junction in the ice hockey arena. The remote base station processes the encoded spin data with the image data and delivers a spin stable upright HD letterbox picture to the TV viewing audience. An advantage of this preferred embodiment is that it completely eliminates the need for the mechanical actuators and bearings associated with each of the instrumentation package elements specified in FIG. 33D. This reduces the weight and the volume requirements of the instrumentation package assembly inside the instrumented ice hockey puck.

In another preferred embodiment, we can accomplish the same performance as above by using standard square chips, where the dimension of each side of the square is equal to the diameter of the circular chip sensor array, and we only use the pixel elements inscribed in the circular region of the chip.

It should be noted at this point, that in general any combination of any two of the four cameras can be electronically commanded and controlled by the cameraman from the remote base station to act as 3-D stereo camera pairs. For example 41 and 42, 41 and 43, 41 and 44, 42 and 43, 42 and 44, 43 and 44.

Each of the microphones 49 and 50 listens for sounds from their respective sides of the instrumented ice hockey puck. The condenser microphones enable the viewing audience to hear real-time contacts, impacts and shocks to the instrumented ice hockey puck. Microphones 49 and 50 enable the TV audience to hear sounds that result from air or any physical contacts or vibrations to the instrumented ice hockey puck; like for example, the crash of a player sliding into the instrumented ice hockey puck.

Microphone 53 protrudes through a hole in the top of the instrumented ice hockey puck.

Microphone 53 is mounted through a hole in the upper protective cover plate. Microphone 53 is connected by cable to electrical connector 55. 55 is connected to the electronics in the instrumentation package assembly 18. Microphone 53 enables the TV audience to hear sounds that occur on the hockey rink like extemporaneous remarks from the players. In certain venues the cameraman may be asked to disable these sounds. The cameraman may disable these sounds remotely by transmitting a microphone disabling signal to the ice hockey puck from the remote base station. Microphone 53 enables the TV audience to hear the whoosh of air as a hockey sticks wiz past the instrumented ice hockey puck.

Simultaneously live 3D TV pictures are taken by the TV cameras 41, 42, 43 and 44 of their respective field of views of the live action on the hockey rink. Cameras 41, 42, 43 and 44 will enable the TV audience to see close-ups from the pucks perspective as players maneuver to strike the instrumented ice hockey puck as it whizzes bye. This will be an action packed event never before witnessed by a TV audience. Some members of the TV audience will flinch as the puck is struck by an oncoming stick. Each of the plays will produce breath taking excitement and expectations by the TV viewing audience. In summary, the instrumented ice hockey puck provides video and sound to the viewing audience that is so exciting and realistic that it makes the individual members of the audience feel that they are in the game on the rink amongst the players. In many ways this is more exciting than viewing the game in person from the stands of the hockey stadium.

The four CCD sensor arrayed TV cameras 41, 42, 43, and 44 are chosen to be identical to one another. The four TV camera lenses 45, 46, 47 and 48 are chosen to be identical to one another. The interpupillary distance between 41 and 42 is identical to the interpupillary distance between 43 and 44. The field of view of each of the lenses is an extremely wide angle approaching one hundred and eighty degrees. Except for the small parallax between the four images due to the interpupillary distances between the four camera lenses 45, 46, 47 and 48, the images of the ice arena as seen by the four TV cameras as projected onto their four HD circular CCD sensor arrays, are identical to one another. The cameras and their lenses are arranged symmetrically around the z-axis 30 of the puck. The center of gravity of the instrumented ice hockey puck is in its center and equidistant from its top 8 and bottom 13.

As an example of how the remote base station does its image processing, if the hockey puck is initially located at rest at the center of the ice hockey rink at x-y-z coordinates P(0, 0, 0), with the puck arranged on the ice so that cameras 44 and 43 are aligned along x-axis of the rink, and its cameras 41 and 42 are aligned along the y-axis of the rink, and if the two hockey goal nets are located at coordinates N(d, 0, 0) and N(−d, 0, 0) at either end of the rink, then the TV viewing audience will see the net N(d, 0, 0) appear upright near the bottom central edge of the HD letterbox picture frame screen format. The initial 3-D image of the net N(d, 0, 0) that the TV viewing audience sees is generated by the images from cameras 41 and 42 because these cameras, which comprise a 3-D stereo camera pair, offer the greatest parallax for objects like the net N(d, 0, 0) which lie along the x-axis. Initially, the stereo camera pair formed by cameras 43 and 44 offer minimum parallax for images of the net and will produce no 3-D effects for the net because cameras 43 and 44 lie inline together along the x-axis.

If the hockey puck is now struck so it accelerates to velocity V along the x-axis of the rink toward the net N(d, 0, 0), and if the puck has a clockwise spin (or roll) about its z-axis 50, then as the hockey puck travels closer to the net N(d, 0, 0), the TV viewing audience will see the net N(d, 0, 0) be imaged upright above the bottom central edge of the HD letterbox picture frame screen format and see it appear to be growing larger and closer to the center of the letterbox picture frame in 3-D. The pitch, roll and yaw gyroscope data from each of the instrumentation package assembly elements is simultaneously transmitted to the base station via the antenna array relay junction where the spin rate, spin sense, and the forward velocity direction of each of the four cameras is calculated by the processing software. The software in the remote base station processes the data it receives from the hockey puck's onboard instrumentation package assembly and aligns the HD letterbox picture frame screen formats of the four cameras so that they are stable relative to the direction of the net N(d, 0, 0). The software in the remote base station processes the data it receives from the hockey puck's onboard instrumentation package assembly, and derotates the spinning imagery that all four TV cameras see, and removes the spin from the imagery of all four cameras to stabilize it and make it upright in the HD letterbox picture frame screen format that the TV viewing audience sees. As the hockey puck spins, during each and every time interval, the remote base station's processors alternately select the imagery from the one of the two spinning 3-D stereo camera pairs with the most parallax, in order to maximize the 3-D effect and keep it uniform during any one time interval as the two 3-D stereo camera pairs spin. If this were not done, the TV viewing audience would see the 3-D effects change and fade and then alternately reoccur as the puck spins and the 3-D stereo camera pairs change angular places relative to the net N(d, 0, 0).

The remote base station receives imagery from all four cameras simultaneously. The remote base station software automatically processes the incoming data stream and sets up the order in time when the processors alternately select which 3-D stereo camera pair's imagery is to be televised to the TV viewing audience as the puck spins. Except for processing software and joy sticks, the remote base station used in conjunction with the instrumented ice hockey pucks is substantially identical to those specified in FIG. 59A and FIG. 59B and FIG. 60A and FIG. 60B and FIG. 61A and FIG. 61B and FIG. 62A and FIG. 62B and FIG. 62C and FIG. 62D and FIG. 62E and FIG. 64A and FIG. 64B. Block diagrams of the electronics circuitry signal and data flows are specified in FIG. 25A and FIG. 25B. The processing software is similar to that used for the instrumented football preferred embodiments disclosed elsewhere in the present invention to stabilize and maintain upright imagery using the data from the instrumented ice hockey puck gyroscope encoders and the image recognition data from the set-up camera system shown in FIG. 26A and FIG. 26B, and FIG. 27.

The 3-D stereo effects of the N(d, 0, 0) net's imagery, as seen by the TV audience as the puck moves forward towards the net, are maximized when the parallax in the images between the respective cameras comprising a 3-D stereo camera pair which are televising the net are maximized. At the point in the puck's spin where the full interpupillary distance between the cameras comprising the 3-D stereo camera pair televising the net is perpendicular to the forward direction of the puck toward the net, the 3-D effect of the net's image is at a maximum as seen by the TV audience. The parallax in the images between the two respective cameras comprising a 3-D stereo camera pair is maximized when a line drawn between the two cameras comprising the 3-D stereo camera pair is perpendicular to a line drawn from the center of the puck to the net N(d, 0, 0) which is the direction of the pucks forward motion. Since the two stereo camera pairs are imbedded in the puck, when the puck spins, the line drawn between the two cameras will spin also. This changes the angle between the line and the direction of forward motion of the puck, thereby continuously changing the parallax and the 3-D effects of the net's image. In order to minimize this modulation of the 3-D effect that the TV audience sees as the puck spins, the processors will alternately select and switch the 3-D stereo camera pair to broadcast to the TV viewers every ⅛ of a turn (or forty-five degree change in rotation angle) of the puck. The processors easily calculate the time to make the switch based on the data stream transmitted to the remote base station from the roll(spin) gyros in the puck from which they derive the spin rate, spin sense and forward motion direction of the instrumented ice hockey puck.

In another preferred embodiment, the same four cameras 41, 42, 43, and 44 specified in the previous preferred embodiment are used, but instead of arranging the cameras into the two 3-D stereo camera pairs described previously as the first and second 3-D stereo camera pairs, where 41 and 42 constituted the first 3-D stereo camera pair, and where 43 and 44 constituted the second 3-D stereo camera pair, the cameras 41, 42, 43, and 44 are grouped into four additional unique 3-D stereo camera pairs. The four additional 3-D stereo camera pairs are cameras 41 and 43; cameras 43 and 42, cameras 42 and 44; cameras 44 and 41. We will call 41 and 43 the third 3-D stereo camera pair. We will call 43 and 42 the fourth 3-D stereo camera pair. We will call 42 and 44 the fifth 3-D stereo camera pair. We will call 44 and 41 the sixth 3-D stereo camera pair.

In order to use the 3-D composite pictures from any one of these four additional 3-D stereo camera pairs, the scan directions of the letterbox picture frame formats must be electronically rotated about the optical axes of the cameras to align their letterbox formats together before televising the TV pictures. Although electronic rotation of the scan direction of the letterbox can be achieved using standard CCD sensor chips, the circular CCD sensor arrayed chips referred to in FIG. 63A and FIG. 63B and FIG. 63C are particularly suitable for this application because the letterbox can be rotated without any loss of the field of view of the camera. The cameraman in the remote base station will verify that the letterbox formats of the pictures from the two cameras that make up each 3-D stereo camera pair are aligned. The letterbox formats must be aligned so that the resultant composite 3-D picture made up of the pictures from the two 3-D stereo cameras will overlay and register with proper parallax to produce the required 3-D sensation in the TV viewing audience.

The additional four 3-D stereo pairs of cameras act electronically and independently to simultaneously produce four additional 3-D stereo TV pictures of the game. They use the same electronics as before, and the same lenses as before as in the previous preferred embodiment.

In the previous preferred embodiment, each of the cameras 41 and 42 that formed the first 3-D stereo camera pair 41, 42 are separated by as much as a 46 millimeter interpupillary distance. Each of the cameras 43 and 44 that formed the second 3-D stereo camera pair 43, 44 are separated by 46 millimeters.

It can be seen from simple geometry that the interpupillary distance for the third, fourth, fifth and sixth 3-D stereo camera pairs is equal to one half the square root of two times the interpupillary distance for either the first or second 3-D stereo camera pairs. For example, if the interpupillary distance for the first 3-D stereo camera pair is 46 millimeters, then the interpupillary distance for the third 3-D stereo camera pair would be 0.707 times 46 millimeters or 32.5 millimeters.

75 millimeters is the maximum interpupillary distance of the average human's eyes. It is understood that other alternative interpupillary distances may be used to produce other alternative 3-D effects. For example, larger interpupillary distance will produce more striking 3-D effects.

The 3-D stereo camera pair 41 and 43 in the instrumentation package assembly 11 that forms the third 3-D stereo camera pair, has optical windows 35 and 20 respectively.

The 3-D stereo camera pair 43 and 42 in the instrumentation package assembly 11 that forms the fourth 3-D stereo camera pair has optical windows 20 and 36 respectively.

The 3-D stereo camera pair 42 and 44 in the instrumentation package assembly 11 that forms the fifth 3-D stereo camera pair, has optical windows 36 and 7 respectively.

The 3-D stereo camera pair 44 and 41 in the instrumentation package assembly 11 that forms the sixth 3-D stereo camera pair has optical windows 7 and 35 respectively.

The two cameras 41 and 43 in the instrumentation package assembly 11 that form the third 3-D stereo camera pair have optical axes 37 and 29 respectively.

The two cameras 43 and 42 in the instrumentation package assembly 11 that form the fourth 3-D stereo camera pair have optical axes 29 and 38 respectively.

The two cameras 42 and 44 in the instrumentation package assembly 11 that form the fifth 3-D stereo camera pair have optical axes 38 and 31 respectively.

The two cameras 44 and 41 in the instrumentation package assembly 11 that form the sixth 3-D stereo camera pair have optical axes 31 and 37 respectively.

Electronically, mechanically, and optically all of these six 3-D stereo camera pairs operate simultaneously. An advantage occurs when an optical window of one of the cameras is obscured by dirt; the remaining cameras can be paired remotely by the operator in the remote base station to continue to produce 3-D imagery for the TV viewers.

The lines of sight of the first, second, third, fourth, fifth and sixth 3-D stereo camera pairs are all looking straight upward from the top 8 of the instrumented ice hockey puck along their respective optical axes which are all parallel to one another. Their lines of sight are all parallel to one another. The four holes in the top 8 of the instrumented ice hockey puck are made just large enough to prevent vignetting of the cameras field of view.

In an alternate preferred embodiment where in certain venues stereo 3-D is not required or deemed useful from the instrumented ice hockey puck, a stereo 3-D camera pair that typically has two identical lenses, for example 47 and 48, may be replaced with two dissimilar lenses having different lens settings, focal lengths and fields of view for example.

The weights of the lenses must be kept the same in order to maintain balance and the center of gravity location of the puck. Under these same circumstances, the identical cameras, for example 43 and 44 of the 3-D stereo camera pair may also be replaced with two dissimilar cameras. The weights of the cameras must be kept the same in order to maintain balance and the center of gravity location of the puck. For example, the two 3-D stereo camera pairs that face the net from the top of the instrumented ice hockey puck may be considered to be non-essential by the cameraman. Instead, the cameraman may elect to set four dissimilar focal lengths into the zoom lenses facing the net. One lens, 41 for example, may be set to a long focal length for close-up facial expressions of the players as they strike the puck, where another lens 42 may be set to a short focal length for wider shots of the players moving into position to strike the puck.

It should be noted at this point, that in general any combination of any two of the four cameras can be electronically commanded and controlled by the cameraman from the remote base station to act as 3-D stereo camera pairs, for example 41 and 42, 41 and 43, 41 and 44, 42 and 43, 42 and 44, 43 and 44.

In general, for all the preferred embodiments disclosed in the present invention, the instrumented ice hockey puck uses the instrumentation package assembly shown in FIG. 35A and FIG. 35B and FIG. 35C. The instrumentation package assembly shown in FIG. 35A and FIG. 35B and FIG. 35C uses four of the instrumentation package assembly elements shown in FIG. 33D. The instrumentation package assembly elements shown in FIG. 33D use gyroscopic transducers which are specified in the electronics block diagram FIG. 33E.

A detailed example of the operation of the gyroscopic transducers follows. Referring to FIG. 33E, a self contained three-dimensional gyroscopic transducer 32 is shown. This transducer consists of three separate individual low power semiconductor based encoders. Each of these three encoders is configured at the time of manufacture to respond to a pre-determined action of motion specific to the direction of rotation, forward or backward motion and rise or fall conditions of the instrumented hockey puck in real-time. The hockey puck's pitch, roll and yaw are encoded. Roll is associated with the spin of the puck on the ice about its vertical z-axis.

Each encoder provides a pulse coded binary data output that varies in accordance with the relative direction and rate of movement of the instrumented hockey puck. For example, during a typical hockey game the puck will be struck by a player's stick causing the puck to suddenly accelerate in a horizontal direction towards the goal net. The amplitude of this acceleration is perceived by the horizontal motion encoder and its resultant pulse coded data output is fed to an interrupt request port of microprocessor 7. The connection between 32 and 7 is such that each of the encoders will accurately convey information about the multiple possibilities of physical motions of the instrumented hockey puck during a typical game, as previously described above, to 7 for further transmission to the remote base station via the administrative data link established by components 7, 10, 13 and 23 respectively. At the time of boot-up, microprocessor 7 is instructed by the firmware contents contained within read only memory 6 to continually execute a routine check of the data presented to its interrupt ports at a sampling rate sufficiently high enough so as to accurately convey the resultant pulse coded data output that represents the direction of rotation, forward or backward motion and rise or fall conditions of the instrumented hockey puck in real-time to a computer at the remote base station for use by special software.

When the instrumented hockey puck is first initialized prior to use from an idle position, normally by a command sent over the administrative data link from the remote base station, microprocessor 7 according to its firmware instructions contained within read only memory 6 initializes the gyroscopic encoders in a zero motion state so that the remote base station's computer is able to synchronize the previously mentioned special software.

During a typical hockey game this computer simultaneously receives the image data streams transmitted by the instrumented hockey puck and automatically, using the previously mentioned special software, continuously calculates and applies to the received image data stream temporarily stored in memory the correct amount of counter adjustment necessary to hold the images in an upright stable unscrambled position when viewed by the TV audience on a hi definition display or monitor. The cameraman operating the remote base station computer also has the ability to manually issue commands that affect the amount of correction applied to the final image stream. Such commands are very useful in conjunction with other special effects often used during a televised hockey game.

The administrative data link referenced above is a bi-directional communications path over which control commands, as well as status data between the instrumented sports paraphernalia and the remote base station are conveyed. These commands and/or status data consist of data packets or streams that are independent in function of those that are used to convey image and/or sound information to the remote base station but share the same communications transport mechanism overall This communications transport mechanism is formed whenever the microprocessor within the instrumented sports paraphernalia communicates with the remote base station over the particular mode of communications connectivity that the stadium has been equipped for i.e. fiber optics, copper cable or wireless radio.

This microprocessor is connected via an I/O port to the network transceiver within the instrumented sports paraphernalia and periodically monitors this port for activity.

When a data stream arrives at this port from the remote base station, the microprocessor executes a series of instructions contained in ROM in such a way that it will respond and act only on those commands that are correctly identified based on a unique identification integer code present in the signal that immediately precedes the control data stream contents. If the stream is identified as valid the microprocessor will execute the received command as determined by the firmware stored in ROM and transmit a status data acknowledgement to the remote base station Status data received by the remote base station transceiver is handled in a manner similar to that of the instrumented sports paraphernalia as previously described.

When the remote base station transceiver intercepts an appropriately coded transmission over the particular mode of communications connectivity that the stadium has been equipped for i.e. fiber optics, copper cable or wireless radio, it will respond and act on it in the manner determined by the communications handling provisions of the special software running on the associated computer at the remote base station.

In another preferred embodiment, a less costly instrumented ice hockey puck using only one TV camera is constructed. This one camera embodiment is far less complex than the previous four camera preferred embodiment. Because of the obvious nature and simplicity of this one camera embodiment, a separate drawing is not shown. The instrumentation package assembly element shown in FIG. 33D is the identically same unit used in the four camera embodiment. The one camera embodiment uses the instrumentation package assembly shown in drawings FIG. 33A and FIG. 33B and FIG. 33C. The one camera embodiment does not produce 3-D. The instrumentation package assembly shown in FIG. 33A and FIG. 33B and FIG. 33C is mounted, aligned and encapsulated into the ice hockey puck in the same manner as the previous preferred embodiment that uses four cameras. The z-axis of the instrumentation package assembly is aligned and made coincident with the z-axis 30 of the puck which is normal to the top center of the puck, so that the single camera sees out the top of the puck. The center of gravity is in the center of the ice hockey puck as in the previous preferred embodiment. The image stabilization is done by the remote base station in the same way as before also. As the puck spins about its z-axis, so does the camera and its CCD sensor array. As the CCD sensor array spins about the z-axis of the puck, the imagery formed on the sensor seems to spin relative to the CCD sensor. The instrumented ice hockey puck wirelessly communicates with the remote base station in the identical manner as before. The spinning pixel data and the gyroscope data are communicated to the remote base station as before. The remote base station uses the same processing software as before to de-rotate and stabilize the imagery and make it upright relative to the direction of forward motion of the instrumented puck. The instrumented ice hockey puck has the same appearance, playing and handling qualities, as before.

The cameraman, in the remote base station, software selects the wireless mode of communication between the instrumented ice hockey puck and the remote base station. The cameraman uses the antenna array relay junction that is installed in the ice hockey stadium/arena with which to command and control his choice and communicate it to the instrumented ice hockey puck in the ice hockey rink.

The cameraman selects items from a software menu of control commands that go to the network transceiver at the remote base station that are subsequently transmitted to the instrumented sports paraphernalia (the instrumented ice hockey puck) for the purpose of adjusting various system initializations, operating parameters, radio frequency, polling system status data such as battery condition, and initiating remote mechanical adjustments such as camera focus, optical zoom, iris and movement to the cameras' field of view, etc over the selected bi-directional communications link i.e. wireless radio connectivity being used within the particular sports stadium/arena.

These commands, when intercepted by the network transceiver within the instrumented sports paraphernalia, are applied to its microprocessor, which then in turn upon executing the instructions stored within the contents of its firmware applies a pulse coded control signal via the power and control interconnect interface inside the instrumentation package to the corresponding electronics i.e. the mechanical actuators that provides optical focus and/or zoom adjustment of the cameras and microphone gain and selection, etc as desired by the cameraman and/or special software running on the computer at the remote base station. The power and control interconnect interface as shown in FIG. 33E (item 21), which is represented by dotted lines, consists of the electrical control wiring to and from the electronic components of the instrumented sports paraphernalia that are being controlled.

Referring to the Preferred Embodiments Specified in FIG. 66A and FIG. 66B and FIG. 66C; the Instrumented Ice Hockey Puck Satisfies all of the Following Further Objectives:

It is an objective of the present invention to replace existing prior art non-instrumented ice hockey pucks that are currently on existing rinks with substitute instrumented ice hockey pucks. It is an objective of the present invention to equip an ice hockey arena with an instrumented ice hockey system for the improvement of the TV broadcast quality of ice hockey games. It is an objective of the present invention for the instrumented ice hockey puck to be composed of an instrumentation package assembly, a buffer plate assembly, an upper protective cover shield, a lower protective cover shield, and synthetic or vulcanized rubber encapsulation/molding material. It is an objective of the present invention to physically configure two 3-D stereo camera pairs from a total of four cameras looking out from the top of the instrumented ice hockey puck. It is an objective of the present invention to electronically configure six 3-D stereo camera pairs from a total of four cameras looking out from the top of the instrumented ice hockey puck. It is an objective of the present invention to physically configure a single camera looking out from the top of the instrumented ice hockey puck. It is an objective of the present invention to stabilize the imagery obtained from the instrumented ice hockey puck in an upright condition in the picture frame, regardless of the pitch, roll or yaw of the ice hockey puck, as viewed by a live TV audience in the HD CCD letterbox picture format. It is an objective of the present invention to stabilize the imagery obtained from the instrumented ice hockey puck in an upright condition in the picture frame, regardless of the pitch, roll or yaw of the football, as viewed by a live TV audience in the HD CCD letterbox picture format by using gyroscopic encoders. It is an objective of the present invention to stabilize the imagery obtained from the instrumented ice hockey puck in an upright condition in the picture frame, regardless of the pitch, roll or yaw of the ice hockey puck, as viewed by a live TV audience in the HD CCD letterbox picture format by image recognition processing. It is an objective of the present invention to stabilize the imagery obtained from the instrumented ice hockey puck in an upright condition in the picture frame, regardless of the pitch, roll or yaw of the ice hockey puck, as viewed by a live TV audience in the HD CCD letterbox picture format by using gyroscopic encoders and image recognition processing. It is an objective of the present invention to stabilize the imagery obtained from the instrumented ice hockey puck in an upright condition in the picture frame, regardless of the pitch, roll or yaw of the ice hockey puck, as viewed by a live TV audience in the HD CCD letterbox picture format by using image recognition processing of the archived data base derived from the tripod mounted set-up camera system used in the ice hockey arena venue. It is an objective of the present invention to stabilize the imagery obtained from the instrumented ice hockey puck in an upright condition in the picture frame, regardless of the pitch, roll or yaw of the ice hockey puck, as viewed by a live TV audience in the HD CCD letterbox picture format by using image recognition processing of the archived data base derived from the tripod mounted set-up camera system in the remote base station. It is an objective of the present invention to provide views of the game not seen before during broadcasts by real time TV audiences. It is an objective of the present invention to provide views of the game from the instrumented ice hockey puck. It is an objective of the present invention to provide views of the game from the surface of the ice rink, as seen from the top of the instrumented ice hockey puck. It is an objective of the present invention to provide views of the game from the surface of the ice rink, as seen from the top of the instrumented ice hockey puck using the two 3-D stereo camera pairs. For example, views in front of the instrumented ice hockey puck as it is being passed forwardly, and views in back of the instrumented ice hockey puck as it is being passed forwardly toward the goal keeper who stands motionless in front of the net. It is an objective of the present invention to provide sounds of the game not heard before during broadcasts by real time TV audiences. It is an objective of the present invention to provide sounds of the game as heard by the instrumented ice hockey puck as it slides on the ice. It is an objective of the present invention to provide sounds heard from the ice hockey puck as it is passed from player to player and hits the net. It is an objective of the current invention that the electronics components needed to carry out all the electronic functions of the instrumentation package assembly defined above, be packaged into the confined space of the instrumentation package assembly inside the instrumented ice hockey puck and that the weight limitations, center of gravity and moment of inertia considerations set out for the instrumentation package assembly be adhered to. It is an objective of the present invention to enable coaches who are on the sidelines during training sessions to hear the spoken dialog of their team's players from on the ice hockey rink. It is an objective of the present invention to enable coaches who are on the sidelines during training sessions to view details of the team's players during training sessions on the ice hockey rink. It is an objective of the present invention to enable referees who are on and off the rink during games to review details of the game from the four cameras onboard the instrumented ice hockey puck by instant replay. It is an objective of the present invention to equip the instrumentation package assembly to capture video and sounds on the ice hockey rink from the instrumented ice hockey puck. It is an objective of the present invention to equip the instrumented ice hockey puck with an instrumentation package assembly that has four TV cameras, three microphones, four wireless antenna elements, battery pack and supporting electronics housed inside its enclosure. It is an objective of the present invention to equip the instrumentation package assembly inside the instrumented ice hockey puck with means to wirelessly televise the captured video and sounds to a remote base station via an antenna array relay junction stationed off the playing field but within (and around) the space of the instrumented sports stadium/arena. The antenna array relay junction is equipped to relay the video and sounds to the remote base station. The remote base station is located within the instrumented sports stadium/arena or its vicinity. It is an objective of the present invention that the instrumented ice hockey puck is under the command and control of a cameraman in the remote base station. It is an objective of the present invention to enable the instrumentation package assembly to be mounted inside the instrumented ice hockey puck in a manner permitting its four cameras and three microphones to see and hear out of the instrumented ice hockey puck. It is an objective of the present invention to enable the instrumentation package assembly to be mounted inside the instrumented ice hockey puck in a manner permitting the instrumentation package assembly to be protected from damage during the game on the ice. It is an objective of the present invention to enable the instrumentation package assembly to be mounted inside the instrumented ice hockey puck in a manner permitting it to maintain its mechanical and optical alignment during the game on the ice. It is an objective of the present invention to provide a permanent position and nesting place for the instrumentation package assembly inside the instrumented ice hockey puck. It is an objective of the present invention to provide means to permit easy assembly and alignment of the instrumentation package assembly in the instrumented ice hockey puck. It is an objective of the present invention to provide the instrumented ice hockey puck with the identical handling and playability qualities as conventional regulation ice hockey pucks. It is an objective of the present invention to provide means to permit the instrumentation package assembly to be nested, cradled and isolated from shock and vibration inside the instrumented ice hockey puck. It is an objective of the present invention to provide an instrumentation package assembly that is sized so that it can be easily loaded and assembled into the instrumented ice hockey puck. It is an objective of the present invention to provide the instrumented ice hockey puck with an instrumentation package assembly that carries its own rechargeable battery pack. It is an objective of the present invention to provide the instrumented ice hockey puck with an instrumentation package assembly that carries its own rechargeable battery pack that has sufficient energy to power the cameras, lenses, antennas and electronics for the duration of the ice hockey puck game. It is an objective of the present invention to charge the battery pack of the instrumented ice hockey puck using the same charging unit as used for instrumented baseball bases, instrumented baseball home plates and instrumented pitcher's rubbers. It is an objective of the present invention to provide the instrumented ice hockey puck with instrumentation package assembly electronics that require little power to operate and are lightweight. It is an objective of the present invention to provide the instrumented ice hockey puck with an instrumentation package assembly that carries its own battery pack that is recharged wirelessly by induction. It is an objective of the present invention to provide the instrumented ice hockey puck with an instrumentation package assembly that can withstand axial and tangential compression and decompression loads exerted on it during play. It is an objective of the present invention to provide the instrumented ice hockey puck with physical characteristics such as total weight, center of gravity and moments of inertia that are identical to regulation conventional ice hockey pucks. It is an objective of the present invention to provide instrumented ice hockey puck with playing qualities and handling qualities that are identical to those in prior art conventional regulation ice hockey pucks. It is an objective of the present invention that the instrumented ice hockey puck will withstand dirt, water, ice and weather conditions. It is an objective of the present invention that the instrumented ice hockey puck's encapsulation will provide cushioning to protect the instrumentation package assembly from shock and vibration damage. It is an objective of the present invention to provide the instrumented ice hockey puck with provisions for holding the instrumentation package assembly in alignment and for cushioning and isolating the instrumentation package assembly from shocks received by the instrumented ice hockey puck during the game. It is an objective of the present invention that the optical windows be made small to be unobtrusive to the game without vignetting the field of view of the cameras under the prevailing lighting conditions on the rink in the arena. It is an objective of the present invention that the optical windows withstand heavy blows received during the game and protect the instrumentation package assembly. It is an objective of the present invention that the optical windows be easily removed and replaced. It is an objective of the present invention to simplify the instrumented ice hockey puck and reduce its cost for low budget venues by using only a single TV camera instead of the four camera preferred embodiment. It is an objective of the present invention for the simplified one camera instrumented ice hockey puck to operate in the same sports stadium/arena and use the same remote base station, wireless communication links and antenna array relay junction as the four camera preferred embodiment. It is an objective of the present invention for the simplified one camera instrumented ice hockey puck to have the same appearance, playability and handling qualities as the conventional regulation ice hockey pucks.

DRAWINGS

The following drawings are not drawn to scale, but are drawn rather to make the details of the current invention apparent and recognizable.

What is claimed as being new and desired to be protected by Letters Patent of the United States is as follows:

1. A system for broadcasting media content relating to a sporting event, comprising:
- an instrumented sports stadium comprising an instrumented playing surface;
  - said instrumented playing surface comprising a plurality of instrumented sports paraphernalia disposed on said instrumented playing surface;
  - said instrumented sports paraphernalia comprising at least one package assembly, mounted within said instrumented sports paraphernalia, and comprising at least one camera and at least one microphone to capture said media content relating to said sporting event;
    - wherein said instrumented sports paraphernalia is configured to transmit said media content to a remote base station via a relay junction;
    - wherein said relay junction comprises at least one of a bi-directional RF signal antenna repeater, a fiber optic cable signal repeater, and a copper cable signal repeater, and
    - wherein said relay junction is configured to relay signals between said package assembly and said remote base station;
  - said remote base station is configured to:
    - receive said media content from said instrumented sports paraphernalia via said relay junction, and is configured to process said media content and broadcast the processed media content to a live television viewing audience,
    - transmit command and control signals to said instrumented sports paraphernalia to control electronic, mechanical, and optical functions within said instrumented sports paraphernalia, and
    - compare video content from said received media content with a reference image of said instrumented playing surface in order to produce stabilized and upright video image by removing rotational effects in the video image;
    - wherein said reference image is obtained prior to the commencement of said sporting event using a tripod mounted set-up camera;
    - wherein said tripod mounted set-up camera is configured to capture a plurality of reference images from a plurality of points on said instrumented playing surface, and
    - said tripod mounted set-up camera is configured to transmit said plurality of reference images to said remote base station using an RF wireless link;
- said instrumented sports stadium further comprising a hand-held remote control unit, comprising:
  - circuitry configured to allow said hand-held remote control unit to wirelessly enable and disable said instrumented sports paraphernalia, and to interrogate the status of electrical, mechanical, and/or optical functions of said instrumented sports paraphernalia, and
  - circuitry to wirelessly transmit commands to, and receive status data from, said instrumented sports paraphernalia.

2. The system of claim 1 wherein the instrumented sports paraphernalia of the instrumented playing surface is comprised of:
- at least one instrumented football;
- wherein said instrumented football is comprised of:
- a conventional football cover-liner form; and
- a first buffer plate assembly; and
- a second buffer plate assembly; and
- a inflatable bladder; and
- wherein said conventional football cover-liner form has an interior resilient surface having a pre-formed concave ellipsoidal vesica piscis shaped surface having rotational symmetry around its long y-axis;
- wherein the conventional football cover-liner form is further comprised of:
- a vertex I; and
- a vertex II;
- a lacing gap; wherein said lacing gap binds said conventional football cover-liner form together when said inflatable bladder is inflated; and
- wherein said vertex I and said vertex II are two identical vertices and are minor images of one another and are located at opposite ends of the conventional football cover-liner form from one another; and wherein the conventional football cover-liner form is modified by perforating the conventional football cover-liner form at said vertex I and said vertex II with a mutually coaxial precision machined cylindrical bore having a finite diameter centered on the conventional football cover-liner form long y-axis; and wherein said mutually coaxial precision machined cylindrical bore smoothly cuts through the conventional football cover-liner form panels and their seam stitching protuberances between the conventional football cover-liner form panels at said vertex I and said vertex II; and wherein the package assembly is further comprised of an autonomous sealed cylinder-like shaped body for capturing video and conducted sounds of the instrumented playing surface from said vertex I and said vertex II; and wherein the package assembly has a length measuring the distance between said vertex I and said vertex II; and wherein the package assembly is further comprised of:

a gyroscope encoder; wherein said gyroscope encoder is configured for providing a dynamic means of determining the relative physical state of said instrumented football with respect of pitch, yaw and roll;

wherein said conventional football cover-liner form is for serving as an enclosure for said first buffer plate assembly and said second buffer plate assembly and said inflatable bladder and the package assembly; and wherein said first buffer plate assembly and said second buffer plate assembly are identical; and wherein said first buffer plate assembly is positioned within the conventional football cover-liner form at said vertex I; and wherein said second buffer plate assembly is positioned within the conventional football cover-liner form at said vertex II; and wherein said first buffer plate assembly is comprised of:

an elongated body having rotational symmetry about said long y-axis;

wherein said elongated body is comprised of:

two opposite ends referred to as end A and end B;

two contiguous exterior surfaces referred to as exterior surface A and exterior surface B;

at least one contiguous y-coaxial precision bore between said end A and said end B of said first buffer plate assembly; and at least one contiguous y-coaxial precision bore between said end A and said end B of said second buffer plate assembly; and a tapered circular cylindrical extension having a finite length and diameter; and wherein said contiguous y-coaxial precision bore I of said first buffer plate assembly and said contiguous y-coaxial precision bore II of said second buffer plate assembly are for acting as a see-through coaxial bearings for mounting and capturing the cylinder-like shaped the package assembly between said vertex I and said vertex II of said instrumented football; and wherein said inflatable bladder is comprised of an inner y-axial central hollow cylindrical cavity open at both ends and extending down the full length of the long y-axis of said inflatable bladder having a finite diameter and length for surrounding, cradling, hugging, holding, nesting and protecting the package assembly within said inner y-axial central hollow cylindrical cavity;

wherein said exterior surface A is comprised of a convex ellipsoidal vesica piscis shaped surface contiguous with said tapered circular cylindrical extension of finite outside diameter at said end A of said exterior surface A;

wherein said convex ellipsoidal vesica piscis shaped surface of said exterior surface A matches the inside of said concave ellipsoidal vesica piscis shape of the conventional football cover-liner form at said vertex I and said vertex II;

wherein said tapered circular cylindrical extension of said exterior surface A of said first buffer plate assembly is pressed into said mutually coaxial precision machined cylindrical bore of the conventional football cover-liner form at said vertex I; and wherein said tapered circular cylindrical extension of said exterior surface A of said second buffer plate assembly is pressed into said mutually coaxial precision machined cylindrical bore of the conventional football cover-liner form at said vertex II; and wherein a bonding agent secures said tapered circular cylindrical extension of said exterior surface A to said mutually coaxial precision machined cylindrical bore of the conventional football cover-liner form at said vertex I; and wherein a bonding agent secures said tapered circular cylindrical extension of said exterior surface A to said mutually coaxial precision machined cylindrical bore of the conventional football cover-liner form at said vertex II; and wherein said exterior surface A of said first buffer plate assembly is attached by a bonding agent to the inside surface of the conventional football cover-liner form at said vertex I; and wherein said exterior surface A of said second buffer plate assembly is attached by a bonding agent to the inside surface of the conventional football cover-liner form at said vertex II; and wherein said first buffer plate assembly and said second buffer plate assembly is for propping up said vertex I and said vertex II of the conventional football cover-liner form and for holding together the conventional football cover-liner form panels;

wherein said exterior surface A and said exterior surface B and the conventional football cover-liner form contiguously join together for forming a smooth tapered transition for said inflatable bladder so as not to pinch said inflatable bladder;

wherein said inflatable bladder is disposed inside the conventional football cover-liner form and sandwiched between said first buffer plate assembly and said second buffer plate assembly;

wherein the package assembly is for wirelessly transmitting said captured video and said conducted sounds to the remote base station via the relay junction;

wherein said inflatable bladder is comprised of:

an exterior resilient surface configured for having a convex ellipsoidal vesica piscis shape around its girth for matching said concave ellipsoidal vesica piscis interior shape inside said conventional football cover-liner form for propping up said conventional football cover-liner form;

wherein the inflatable bladder is for applying y-axial pressure on the first buffer plate assembly and the second buffer plate assembly for maintaining the y-axial length of the instrumented football;

wherein each of the opposite ends of the inflatable bladder are each identical mirror images of each other; and wherein one end has a form matching the form of said exterior surface B of the first buffer plate assembly; and wherein the other end has a form matching the form of said exterior surface B of the second buffer plate assembly; and wherein the form of said exterior surface B of the first buffer plate assembly and the form of said exterior surface B of the second buffer plate assembly are identical.

3. The system of claim 1 wherein the instrumented sports paraphernalia of the instrumented playing surface is comprised of:

at least one instrumented football;

wherein said instrumented football is comprised of:

a conventional football cover-liner form; and a buffer plate assembly I; and a buffer plate assembly II; and a first inflatable bladder; and two of the package assemblies; wherein one of the two package assemblies is referred to as the package assembly I, and the other of the two package assemblies as the package assembly II;

wherein said conventional football cover-liner form has an interior resilient surface having a pre-formed concave ellipsoidal vesica piscis shape having rotational symmetry around its long y-axis; and wherein said conventional football cover-liner form is comprised of:

a vertex I; and a vertex II; and a lacing gap; wherein said lacing gap binds said conventional football cover-liner form together when said first inflatable bladder is inflated; and wherein said vertex I and said vertex II are two identical vertices and are minor images of one another and are located at opposite ends of said conventional football cover-liner form from one another; and wherein said conventional football cover-liner form is modified by perforating said conventional football cover-liner form at said vertex I and said vertex II with a mutually coaxial precision cylindrical bore;

said mutually coaxial precision cylindrical bore having a finite diameter centered along said instrumented football's long y-axis; and wherein said conventional football cover-liner form is for serving as an enclosure for said buffer plate assembly I and said buffer plate assembly II and said first inflatable bladder and the package assembly I and the package assembly II; and wherein said buffer plate assembly I and said buffer plate assembly II are identical; and wherein said buffer plate assembly I is positioned within said conventional football cover-liner form at said vertex I; and wherein said buffer plate assembly II is positioned within said conventional football cover-liner form at said vertex II; and wherein said buffer plate assembly I is comprised of:

an elongated body having rotational symmetry about said y-axis;

wherein said elongated body is comprised of:

two opposite ends referred to as end A and end B; and two connected external surfaces referred to as exterior surface A and exterior surface B;

wherein said exterior surface A is configured with a convex ellipsoidal vesica piscis shaped surface contiguously connecting with a tapered circular cylindrical extension of finite length and diameter at said end A of said exterior surface A;

wherein said convex ellipsoidal vesica piscis shaped surface of said exterior surface A matches said concave ellipsoidal vesica piscis shaped surface of said conventional football cover-liner form at said vertex I and said vertex II;

wherein said tapered circular cylindrical extension of said exterior surface A of said buffer plate assembly I is pressed into said mutually coaxial precision cylindrical bore of said conventional football cover-liner form at said vertex I and bonded therein with a bonding agent; and wherein said tapered circular cylindrical extension of said exterior surface A of said buffer plate assembly II is pressed into said mutually coaxial precision cylindrical bore of said conventional football cover-liner form at said vertex II and bonded therein with a bonding agent; and wherein said external surface A of said buffer plate assembly I is attached by bonding to the inside of said conventional football cover-liner form at said vertex I with a bonding agent;

wherein said external surface A of said buffer plate assembly II is attached by bonding to the inside of said conventional football cover-liner form at said vertex II with a bonding agent;

wherein said buffer plate assembly I and said buffer plate assembly II prop up said vertex I and said vertex II respectively;

wherein said exterior surface A and said exterior surface B and said conventional football cover-liner form join together for forming a smooth transition for said first inflatable bladder so as not to pinch said first inflatable bladder;

wherein the package assembly I is comprised of:

one of the camera; wherein the camera is a TV camera and is referred to as the camera I;

a camera lens I;

one of the microphone; wherein the microphone is referred to as the microphone I;

wherein the package assembly II is comprised of:

another one of the camera; wherein the camera is a TV camera and is referred to as the camera II;

a camera lens II;

another one of the microphone; wherein the microphone is referred to as the microphone II;

wherein the camera I is for capturing video of the instrumented playing surface through said vertex I of said instrumented football; and wherein the camera II is for capturing video of the instrumented playing surface through said vertex II of said instrumented football; and wherein the microphone I and the microphone II are for capturing sounds conducted into said instrumented football; and wherein the package assembly I is contained within said buffer plate assembly I; and wherein the package assembly II is contained within said buffer plate assembly II; and wherein the package assembly I inside buffer plate assembly I is rotated and adjusted independently around the long y-axis of said conventional football cover-liner form inside said buffer plate assembly Ito align said captured video from the camera I in an upright condition using said lacing gap as an arbitrary reference; and wherein the package assembly II inside buffer plate assembly II is rotated and adjusted independently around the long y-axis of said conventional football cover-liner form inside said buffer plate assembly II to align said captured video from the camera II in an upright condition using said lacing gap as an arbitrary reference; and wherein the package assembly I contained within said buffer plate assembly I is of modular construction whereby facilitating ease of alignment and replacement; and wherein the package assembly II contained within said buffer plate assembly II is of modular construction whereby facilitating ease of alignment and replacement; and wherein the package assembly I contained within said buffer plate assembly I comprises:

an electronic transceiver I for wirelessly televising said captured video and said conducted sounds to the remote base station via the relay junction; and wherein the package assembly II contained within said buffer plate assembly II further comprises:

an electronic transceiver II for wirelessly televising said captured video and said conducted sounds to the remote base station via the relay junction; and wherein said first inflatable bladder is disposed inside of said conventional football cover-liner form and sandwiched between said buffer plate assembly I and said buffer plate assembly II; and wherein said first inflatable bladder is comprised of:

an exterior resilient surface configured for having a convex ellipsoidal vesica piscis shape around its girth for matching said concave ellipsoidal vesica piscis interior shape inside said conventional football cover-liner form for propping up said conventional football cover-liner form; and wherein furthermore said first inflatable bladder is for applying y-axial pressure on said buffer plate assembly I for maintaining the y-axial length of said instrumented football; and wherein furthermore said first inflatable bladder is for applying y-axial pressure on said buffer plate assembly II for maintaining the y-axial length of said instrumented football.

4. The system of claim 1 wherein the instrumented sports paraphernalia of the instrumented playing surface is comprised of:

at least one instrumented ice hockey puck;

wherein said instrumented ice hockey puck is comprised of:

a conventional ice hockey puck form;

a first upper protective cover plate shield;

a first buffer plate assembly;

a plurality of antenna elements;

a first lower protective cover plate shield;

a plurality of external microphones;

wherein said conventional ice hockey puck form is comprised of:

a molded flat top surface;

a molded flat bottom surface;

wherein the microphones are for capturing sounds conducted into said instrumented ice hockey puck caused by motions, actions and contacts with said instrumented ice hockey puck occurring during games on the instrumented playing surface;

wherein said plurality of external microphone is flush with said molded flat top surface of said instrumented ice hockey puck and is for capturing airborne sounds occurring on the instrumented playing surface around said instrumented ice hockey puck;

wherein the microphones and said external microphones are physically different from one another;

wherein said conventional ice hockey puck form is comprised of:

a molded cylindrical disk-like form ice;

wherein said molded flat top surface is modified with at least one precision bore of finite diameter symmetrically disposed on said molded flat top surface with respect to the centerline of said cylindrical disk-like form;

wherein the package assembly is furthermore comprised of a gyro encoder for measuring and encoding the pitch, roll and yaw of said instrumented ice hockey puck;

wherein said conventional ice hockey puck form is for serving as a playable enclosure for said first upper protective cover plate shield and said first buffer plate assembly and the package assembly and said plurality of antenna elements and said first lower protective cover plate shield and said plurality of external microphones, and wherein encapsulating rubber material fills said conventional ice hockey puck form for molding and encapsulating said first upper protective cover plate shield and said first buffer plate assembly and the package assembly and said plurality of antenna elements and said first lower protective cover plate shield thereby maintaining mechanical and optical alignment despite said instrumented ice hockey puck being subjected to shocks and vibrations during a game; and wherein said plurality of antenna elements are configured for wirelessly radiating the media content from said instrumented ice hockey puck to the remote base station via the relay junction; and for serving as elements in a bi-directional communications path over which control commands, as well as status data between said instrumented ice hockey puck and the remote base station are conveyed; and wherein said first upper protective cover plate shield and said first buffer plate assembly and the package assembly and said plurality of antenna elements are molded and encapsulated within said conventional ice hockey puck form; and wherein furthermore the camera is for capturing video of the instrumented playing surface through said instrumented ice hockey puck's said precision bore disposed on said molded flat top surface of said conventional ice hockey puck form;

wherein said first upper protective cover plate shield is comprised of:

a dome shaped circular disk-like object configured for protecting the package assembly from physical forces applied to said molded flat top surface and molded cylindrical sides of said conventional ice hockey puck form; and wherein said first upper protective cover plate shield is deployed between said molded flat top and said first buffer plate assembly and the package assembly;

wherein said first lower protective cover plate shield is comprised of:

a circular disk-like object configured for protecting the package assembly from physical forces applied to said molded flat bottom surface and said molded cylindrical sides of said conventional ice hockey puck form; and wherein said first buffer plate assembly is comprised of:

a mounting for aligning the package assembly inside said conventional ice hockey puck form;

wherein each said first buffer plate assembly is comprised of:

at least one portal through said molded flat top surface of said conventional ice hockey puck form for permitting at least one the camera to peer through said portal and view the instrumented playing surface;

wherein the package assembly is for receiving RF wireless command and control signals from the remote base station via the relay junction to control the functions within the package assembly; and wherein any two of the cameras are configured for forming a 3-D stereo camera pair;

wherein the cameras of said 3-D stereo camera pair are separated by a pre-determined interpupillary distance; and wherein the sequence of the physical elements in order of their occurrence measured from said molded flat top surface is said external microphones and said first upper protective cover plate shield and said first buffer plate assembly and the package assembly and said plurality of antenna elements and said first lower protective cover plate shield; and wherein said first upper protective cover plate shield is perforated through its said dome shaped top surface with at least one precision clearance bore of finite diameter symmetrically disposed coaxially below said precision bore in said molded flat top surface;

wherein said precision bore in said molded flat top surface is similarly coaxial with matching bores in said first buffer plate assembly and the package assembly.

5. The system of claim 1 wherein the instrumented sports paraphernalia of the instrumented playing surface is comprised of:

at least one instrumented ice hockey puck;

wherein said instrumented ice hockey puck is molded into the form of a conventional ice hockey puck form; and:

wherein furthermore the package assembly is molded and encapsulated within said conventional ice hockey puck form for shock-proofing and alignment; and wherein furthermore the package assembly comprises:

a gyro encoder for measuring the pitch, roll and yaw data of said instrumented ice hockey puck; and a transceiver electronics for wirelessly transmitting encoded RF signals of the pitch, roll and yaw data of said instrumented ice hockey puck via the relay junction to the remote base station for processing to remove the effects of the motion of said instrumented ice hockey puck on the pictures and sounds broadcast by the remote base station; and wherein said transceiver electronics furthermore is for wirelessly transmitting RF signals of said video and said sounds via the relay junction to the remote base station for processing said video and said sounds broadcast by the remote base station to a live TV viewing audience in real time in a stabilized upright condition relative to the direction of forward motion of the instrumented ice hockey puck; and wherein said transceiver electronics furthermore is for wirelessly transmitting RF signals of said video and said sounds under the command and control of the remote base station via the relay junction;

wherein the remote base station commands and controls the functions within said instrumented ice hockey puck via the relay junction; and wherein said transceiver electronics furthermore is for transmitting status control signals in response to the remote base station control commands for completing the feedback control loop, whereby the quality and quantity of said instrumented ice hockey arena's TV broadcasts to a live TV viewing audience is improved by the system;

a power supply circuitry for wirelessly charging a battery pack inside said instrumented ice hockey puck by externally induced time varying magnetic flux in the 100 to 450 kHz frequency range.

6. The system of claim 1 wherein the relay junction of the instrumented sports stadium is further comprised of:

a) at least one physical fixed point multi-directional electronics I configured as a bi-directional radio frequency signal receiver and transmitter for simultaneously receiving and transmitting RF signals via the air-ways from and to a plurality of the instrumented sports paraphernalia respectively;

b) at least one physical fixed point multi-directional electronics III configured as a bi-directional signal receiver and transmitter for simultaneously receiving and transmitting RF signals via fiber optic/copper cable communication links from and to a plurality of the instrumented sports paraphernalia respectively;

c) a plurality of physical fixed point multi-directional electronics V configured for surrounding the outside perimeter of the instrumented playing surface for comparing and selecting the strongest signal with the best signal to noise ratio from the instrumented sports paraphernalia on the instrumented playing surface;

d) at least one physical fixed point multi-directional electronics VI configured to transmit status data signals to the remote base station from the instrumented sports paraphernalia;

e) at least one antenna repeater electronics configured for relaying bi-directional wireless radio frequency signals between the instrumented sports paraphernalia and the remote base station;

f) at least one antenna repeater electronics further configured for relaying bi-directional signals to the remote base station using bi-directional fiber optic/copper cable communication links;

g) at least one physical fixed point multi-directional electronics II configured as a bi-directional radio frequency signal repeater for simultaneously receiving and transmitting RF signals via the air-ways from and to a the remote base station respectively;

h) at least one physical fixed point multi-directional electronics IV configured as a bi-directional signal repeater for simultaneously receiving and transmitting RF signals via fiber optic/copper cable communication links from and to a the remote base station respectively;

i)

wherein the location of the relay junction is within the instrumented sports stadium boundaries but outside the limits of the instrumented playing surface for not interfering with the games.

7. The system of claim 1 wherein the instrumented sports stadium is further comprised of:

a charging station unit; and wherein the instrumented sports paraphernalia of the instrumented playing surface is comprised of at least one rechargeable battery pack; and wherein said charging station unit is configured for wirelessly charging said battery pack by magnetic induction coupling; and wherein furthermore said charging station unit is for interrogative diagnostic testing and assessing the overall optical alignment and optical quality status of the instrumented sports paraphernalia; and wherein furthermore said charging station unit is for running diagnostics for all operations and functions of the instrumented sports paraphernalia; wherein furthermore said charging station unit is for wirelessly communicating with the instrumented sports paraphernalia by magnetic induction coupling using carrier frequencies in the 100 to 450 KHZ range;

wherein said charging station unit is comprised of:

a first induction coil for inducing time varying magnetic fields into the instrumented sports paraphernalia;

a second induction coil for inducing time varying magnetic fields into the instrumented sports paraphernalia;

a holding mechanism configured for restraining said instrumented sports paraphernalia between said first induction coil and said second induction coil for alignment and optical quality testing and diagnostics; and during the charging cycle; and wherein said first induction coil and said second induction coil are wound on said holding mechanism having a finite inside diameter for coaxially encircling the instrumented sports paraphernalia;

wherein said first induction coil and said second induction coil inductively couple and concentrate magnetic flux having time varying frequencies in the 100 to 450 KHZ range into the instrumented sports paraphernalia.

8. The system of claim 1 wherein the hand-held remote control unit of the instrumented sports stadium further comprises:

a primary induction coil; and a handle; and a antenna; and wherein said handle is for manually aligning and holding said primary induction coil in contact with the instrumented sports paraphernalia for transmitting time varying magnetic flux into the instrumented sports paraphernalia; and wherein the inside diameter of said primary induction coil is a finite value to encircle the instrumented sports paraphernalia; and wherein furthermore said hand-held remote control unit is for wirelessly communicating with the instrumented sports paraphernalia by magnetic induction coupling using carrier frequencies in the 100 to 450 KHZ range; and wherein said primary induction coil is configured for receiving time varying magnetic flux encoded signals from the instrumented sports paraphernalia; and wherein said primary induction coil is configured for transmitting time varying magnetic flux encoded signals to said vertex of the instrumented sports paraphernalia; and wherein said antenna is configured for transmitting encoded RF signals to the instrumented sports paraphernalia; and furthermore for receiving RF signals from the instrumented sports paraphernalia;

wherein the hand-held remote control unit is furthermore menu driven configured for:

a) transmitting encoded signals for enabling and disabling the instrumented sports paraphernalia for turning it on and off; and b) transmitting encoded control command signals to the instrumented sports paraphernalia for interrogatively diagnostically testing its functions; and c) receiving encoded status signals from the instrumented sports paraphernalia for evaluating its functions' response to control commands; and d) receiving encoded status signals from the instrumented sports paraphernalia for evaluating the health of its functions; and e) transmitting encoded control commands to the instrumented sports paraphernalia to adjust communication frequencies; and f) transmitting encoded control command signals to the instrumented sports paraphernalia for setting its wireless carrier frequency.

9. The system of claim 1 wherein said hand-held remote control unit of the instrumented sports stadium is furthermore comprised of:

a primary induction coil; and a handle; and a antenna; and wherein said handle is for manually aligning and holding said primary induction coil in contact with the instrumented sports paraphernalia for transmitting time varying magnetic flux into the instrumented sports paraphernalia; and wherein the inside diameter of said primary induction coil is a finite value to encircle the instrumented sports paraphernalia; and wherein furthermore the hand-held remote control unit is for wirelessly communicating with the instrumented sports paraphernalia by magnetic induction coupling using carrier frequencies in the 100 to 450 KHZ range; and wherein said primary induction coil is configured for receiving time varying magnetic flux encoded signals from the instrumented sports paraphernalia; and wherein said primary induction coil is configured for transmitting time varying magnetic flux encoded signals to the vertex of the instrumented sports paraphernalia; and wherein said antenna is configured for transmitting encoded RF signals to the instrumented sports paraphernalia; and furthermore for receiving RF signals from the instrumented sports paraphernalia;

wherein the hand-held remote control unit is furthermore configured for:

a) transmitting encoded signals for enabling and disabling the instrumented sports paraphernalia for turning it on and off; and b) transmitting encoded control command signals to the instrumented sports paraphernalia for interrogatively diagnostically testing its functions; and c) receiving encoded status signals from the instrumented sports paraphernalia for evaluating its functions' response to control commands; and d) receiving encoded status signals from the instrumented sports paraphernalia for evaluating the health of its functions; and e) transmitting encoded control command signals to the instrumented sports paraphernalia for setting its wireless carrier frequency.

10. The system of claim 1 wherein the tripod mounted set-up camera of the instrumented sports stadium is further comprised of:

a CPU memory for storing the plurality of reference images for every future sports venue to be played;

a transceiver electronics for transmitting the plurality of reference images from the tripod mounted set-up camera to the remote base station via the relay junction using a bi-directional wireless RF data link;

a removable memory for storing the plurality of reference images.

11. The system of claim 1 wherein the remote base station of the instrumented sports stadium is further configured for:

a) processing the media content comprised of:

televised pictures transmitted by the package assembly; and including the production of 3-D pictures; and wherein any two of the cameras are configured for forming a 3-D stereo camera pair for producing said 3-D pictures; wherein the two cameras of said 3-D stereo camera pair are separated by a finite interpupillary distance; and televised conducted sounds transmitted by the package assembly; and b) processing said televised pictures captured by said 3-D stereo camera pairs for making each pair of pictures appear upright to the viewing audience;

c) processing said televised pictures captured by said 3-D stereo camera pairs for making the letter box format of the pair of pictures be aligned with one another;

d) broadcasting to a live TV viewing audience processed said televised pictures and processed said televised conducted sounds including said 3-D pictures and said conducted surround sound;

e) enabling the remote base station to process said 3-D pictures from said 3-D stereo camera pairs and align said 3-D pictures from said 3-D stereo camera pairs and their frames with the sports stadium's horizon for making said 3-D pictures and their frames from said 3-D stereo camera pairs appear upright to the TV viewing audience;

f) enabling the remote base station to align said 3-D stereo camera pair's picture frames with one another;

g) enabling the remote base station to align the 3-D stereo camera pair's picture frames with the instrumented playing surface;

h) enabling the remote base station to select, using a command and control signal, which of the instrumented sports paraphernalia on the instrumented playing surface are activated;

i) processing pictures wirelessly received from the instrumented sports paraphernalia to appear upright to the TV viewing audience;

j) processing and stabilizing imagery in an upright condition as viewed by a live TV audience in the letterbox picture format by using image recognition processing of the plurality of reference images derived from the tripod mounted set-up camera as background reference material;

k) executing a real time algorithm for continuously monitoring and comparing the received signal strength indication and status data information from each of a plurality of corresponding the bi-directional RF signal antenna repeaters for determining dynamically which the bi-directional RF signal antenna repeaters to use to receive the best overall specific payload data packet from the instrumented sports paraphernalia;

l) executing a real time algorithm for continuously monitoring, comparing and determining dynamically the radio frequency, gain, polarization and error correction that should be applied by the plurality of the bi-directional RF signal antenna repeaters to receive the best overall specific payload data packet from the instrumented sports paraphernalia;

m) executing a real time algorithm for continuously monitoring and comparing the received signal strength indication and status data information from the relay junction for determining dynamically the condition of the payload data packet from the instrumented sports paraphernalia to help to anticipate the next break from the instrumented sports paraphernalia;

n) executing a real time algorithm for continuously monitoring, comparing and determining dynamically the radio frequency, gain, polarization and error correction that should be applied by the relay junction to receive the best overall specific payload data packet from the instrumented sports paraphernalia;

o) executing an algorithm in real-time for continuously monitoring and comparing the received signal strength indication and status data information from each of a plurality of the bi-directional RF signal antenna repeaters and determining dynamically which of the bi-directional RF signal antenna repeaters to use to receive the best overall specific payload data packet from the instrumented sports paraphernalia;

p) executing an algorithm in real-time continuously monitoring, comparing and determining dynamically the radio frequency, gain, polarization and error correction that should be applied by the bi-directional RF signal antenna repeaters to receive the best overall specific payload data packet from the instrumented sports paraphernalia, and q) executing the real-time selection of the correct the bi-directional RF signal antenna repeaters, radio frequency, gain, and polarization, for ensuring the video images and said televised conducted sounds captured by the instrumented sports paraphernalia will be of high quality and will have sufficient stability to allow additional decoding and post processing of the payload data packet by the remote base station;

r) executing algorithms in real-time for continuously monitoring, comparing and determining dynamically the radio frequency, gain, polarization and error correction that should be applied by the bi-directional RF signal antenna repeaters to receive the best overall specific payload data packet from the instrumented sports paraphernalia to ensure that the images and sounds captured by the instrumented sports paraphernalia will be of high quality and will have sufficient stability to allow additional decoding and post processing of the payload data packet by additional electronics hardware and software located at the remote base station;

s) executing an algorithm in real-time for continuously monitoring, comparing and determining dynamically the radio frequency, gain, polarization and error correction that should be applied by the bi-directional RF signal antenna repeaters to receive the best overall specific payload data packet from the instrumented sports paraphernalia and ensuring by real-time selection of the correct antenna arrays, radio frequency, gain, and polarization that the images and sounds captured by the instrumented sports paraphernalia will be of high quality and will have sufficient stability to allow additional decoding and post processing of the payload data packet by additional electronics hardware and software located at the remote base station;

t) transmitting status data to said hand-held remote control unit from the remote base station's;

u) receiving function status control signals from the relay junction for completing the feedback control loop between the relay junction and the remote base station;

v) receiving and processing sounds of the game for producing ordinary sound and conducted surround sound for broadcasting to a TV viewing audience;

w) receiving a status data acknowledgement by the remote base station from the hand-held remote control unit;

x) stabilizing imagery in an upright condition regardless of the pitch, roll or yaw of the instrumented sports paraphernalia, as viewed by a live TV audience in the letterbox picture format by using image recognition processing; and y) stabilizing imagery in an upright condition regardless of the pitch, roll or yaw of the instrumented sports paraphernalia as viewed by a live TV audience in the letterbox picture format by using image recognition processing of the reference images derived from the tripod mounted set-up camera; and z) stabilizing and making upright the pictures received from the instrumented sports paraphernalia by removing the rotational effects of motion on said televised picture and thereby making said televised picture upright before broadcasting said televised pictures to the live TV viewing audience;

aa) adjusting the virtual rotational axis of each the camera in real-time for having proper alignment and for having proper letterbox aspect ratio for producing a proper three-dimensional display regardless of the camera's line of sight angular direction relative to the instrumented sports paraphernalia;

bb) commanding and controlling the electronic and mechanical functions of the relay junction by transmitting control signals from the remote base station to the relay junction;

cc) comparing and processing the video content received from the instrumented sports paraphernalia containing imagery of the instrumented stadium and its horizon and the plurality of the reference images received from the tripod mounted set-up camera;

dd) determining the real-time selection of radio frequency, gain and polarization to ensure that the images and sounds captured by the instrumented sports paraphernalia are of high quality and will have sufficient stability to allow additional decoding and post processing of the payload data packet by other downstream electronics hardware and software located at the remote base station;

ee) making real-time selection of the bi-directional RF signal antenna repeaters for ensuring that the images and sounds captured by the instrumented sports paraphernalia will be of high quality and will have sufficient stability to allow additional decoding and post processing of the payload data packet by other electronics hardware and software located at the remote base station;

ff) measuring the received signal strength and status data associated with a specific payload data packet consisting of image and audio data and executing a real-time algorithm for continuously monitoring and comparing the received signal strength indication and status data information from each of the bi-directional RF signal antenna repeaters feeding the relay junction and determining dynamically the radio frequency, gain, polarization and error correction that should be applied by the repeater antenna array to receive the best overall specific payload data packet from the instrumented sports paraphernalia;

gg) responding to intercepts of appropriately coded transmissions over the particular mode of communications connectivity that the sport stadium has been equipped for including fiber optics, copper cable or wireless radio;

hh) a means for running image recognition algorithms for establishing the upright reference for each picture taken by the instrumented sports paraphernalia;

ii) selecting any two of the cameras to be said 3-D stereo camera pair.

12. The system of claim 2 wherein the elongated body of the first buffer plate assembly further comprises:

a precision cylindrical axial bore A having a finite diameter A driven into said end A; wherein said precision cylindrical axial bore A is threaded;

a precision cylindrical axial bore B having a finite diameter B driven into said end B;

wherein said diameter B is greater than said diameter A; and wherein the elongated body further comprises:

a shoulder I at the intersection of said precision cylindrical axial bore A and said precision cylindrical axial bore B;

wherein said shoulder I at the intersection of said precision cylindrical axial bore A and said precision cylindrical axial bore B is for restraining the y-axial movement of the package assembly; and wherein said precision cylindrical axial bore B is for restraining the x-z movement of the package assembly;

a plurality of annular grooves disposed in said precision cylindrical axial bore A for seating a plurality of o-rings for sealing dirt and moisture and for providing shock and vibration isolation to the package assembly;

wherein said precision cylindrical axial bore B of the first buffer plate assembly and the second buffer plate assembly act jointly as co-axial shaft mounting bearings for holding and aligning the package assembly between them;

wherein the package assembly is mounted co-axially between the vertex I and the vertex II and between the first buffer plate assembly and the second buffer plate assembly and aligned on said y-axis of the conventional football cover-liner form;

wherein said precision cylindrical axial bore A and said precision cylindrical axial bore B is for providing the package assembly with an unobstructed field of view through the first buffer plate assembly and the second buffer plate assembly for peering outside of the vertex I and the vertex II through the conventional football cover-liner form onto the instrumented playing surface; and wherein furthermore the package assembly is comprised of:

a camera lens I;

a camera lens II;

two of the cameras; wherein one of the two cameras is referred to as the camera I, and the other as the camera II;

two of the microphones; wherein one of the two microphones is referred to as the microphone I, and the other as the microphone II;

wherein the camera I is for capturing video images of the instrumented playing surface through the vertex I of the instrumented football;

wherein the camera II is for capturing video images of the playing surface through said vertex II of the instrumented football;

wherein said camera lens I is disposed within said precision cylindrical axial bore A at said vertex I;

wherein said camera lens II is disposed within said precision cylindrical axial bore A at said vertex II;

wherein the front lens element of said camera lens I acts as a protruding optical window from said vertex I providing a clear sealed path through which the camera I can peer outward through the conventional football cover-liner form;

wherein the front lens element of said camera lens II acts as a protruding optical window from the vertex II providing a clear sealed path through which the camera II can peer outward through the conventional football cover-liner form;

wherein the microphone I and the microphone II are for capturing sounds conducted into the instrumented football; and wherein the elongated body is further comprised of:

a the exterior surface B configured with a cup-like concave shaped surface matching the convex form of the surface on the inflatable bladder pressed against it.

13. The system of claim 2 wherein the elongated body of the first buffer plate assembly further comprises:

a precision cylindrical axial bore A having a finite diameter A driven into the end A; wherein said precision cylindrical axial bore A is threaded; and a precision cylindrical axial bore B having a finite diameter B driven into the end B; and wherein said diameter B is greater than said diameter A; and wherein the elongated body further comprises:

a shoulder I at the intersection of said precision cylindrical axial bore A and said precision cylindrical axial bore B; and wherein said shoulder I at the intersection of said precision cylindrical axial bore A and said precision cylindrical axial bore B is for restraining the y-axial movement of the package assembly; and wherein said precision cylindrical axial bore B is for restraining the x-z movement of the package assembly; and a plurality of annular grooves disposed in said precision cylindrical axial bore A for seating a plurality of o-rings for sealing dirt and moisture and for providing shock and vibration isolation to the package assembly; and wherein said precision cylindrical axial bore B of the first buffer plate assembly and the second buffer plate assembly act jointly as co-axial shaft mounting bearings for holding and aligning the package assembly between them; and wherein the package assembly is mounted co-axially between the vertex I and the vertex II and between the first buffer plate assembly and the second buffer plate assembly and aligned on said y-axis of the conventional football cover-liner form; and wherein said precision cylindrical axial bore A and said precision cylindrical axial bore B is for providing the package assembly with an unobstructed field of view through the first buffer plate assembly and the second buffer plate assembly for peering outside of the vertex I and the vertex II through the conventional football cover-liner form onto the instrumented playing surface; and wherein the package assembly is comprised of:

a camera lens I;

a camera lens II;

two of the cameras; wherein one of the two cameras is referred to as the camera I, and the other as the camera II;

two of the microphones; wherein one of the two microphones is referred to as the microphone I, and the other as the microphone II;

wherein the camera I is for capturing video images of the instrumented playing surface through the vertex I of the instrumented football; and wherein the camera II is for capturing video images of the instrumented playing surface through the vertex II of the said instrumented football; and wherein said camera lens I is disposed within said precision cylindrical axial bore A at the vertex I; and wherein said camera lens II is disposed within said precision cylindrical axial bore A at the vertex II; and wherein the elongated body further comprises:

an optical window; and wherein said optical window is comprised of:

an optical element having a sealed convex spherical-shell-like shaped exterior surface attached to and facing outward and protruding from the end A for providing a clear sealed path through which the camera I and the camera II can peer outward through the conventional football cover-liner form thereby providing an unobstructed field of view; and an antireflection coating on its surfaces which is hard and scratch and stain resistant; and wherein said coating has a brownish tint to make said optical window unobtrusive to the players;

wherein furthermore said optical window is for providing protection for the camera and the camera lens;

wherein the microphone I and the microphone II are for capturing sounds conducted into the instrumented football; and wherein the elongated body is further comprised of:

a the exterior surface B configured with a cup-like concave shaped surface for matching the convex form of the surface of the inflatable bladder pressed against it.

14. The system of claim 2 wherein the elongated body of the first buffer plate assembly further comprises:

a precision cylindrical axial bore A having a finite diameter A driven into said end A; wherein said precision cylindrical axial bore A is threaded;

a precision cylindrical axial bore B having a finite diameter B driven into said end B;

a precision cylindrical axial bore C having a finite diameter C driven into said end B; and wherein said diameter C is greater than said diameter A; and wherein said diameter A is greater than said diameter B; and wherein said elongated body further comprises:

a shoulder I at the intersection of said precision cylindrical axial bore A and said precision cylindrical axial bore B; and a shoulder II at the intersection of said precision cylindrical axial bore C and said precision cylindrical axial bore B; wherein said shoulder is for restraining the y-axial movement of the package assembly; and a plurality of annular grooves disposed in said precision cylindrical axial bore A for seating a plurality of o-rings for sealing dirt and moisture and for providing shock and vibration isolation to the package assembly;

wherein said precision cylindrical axial bore C of the first buffer plate assembly and the second buffer plate assembly act jointly as co-axial shaft mounting bearings for holding and aligning the package assembly there between;

wherein the package assembly is mounted co-axially between the vertex I and the vertex II and between the first buffer plate assembly and the second buffer plate assembly and aligned on said y-axis of the conventional football cover-liner form;

wherein said precision cylindrical axial bore A and said precision cylindrical axial bore B and said precision cylindrical axial bore C is for providing the package assembly with an unobstructed field of view through its said bearing for peering outside of the vertex I and the vertex II through the conventional football cover-liner form onto the instrumented playing surface;

wherein the package assembly is comprised of:
a camera lens I;
a camera lens II;
two of the cameras; wherein one of the two cameras is referred to as the camera I, and the other as the camera II;
two of the microphones; wherein one of the two microphones is referred to as the microphone I, and the other as the microphone II;
wherein the camera I is for capturing video images of the instrumented playing surface through the vertex I of the instrumented football; and
wherein the camera II is for capturing video images of the instrumented playing surface through the vertex II of the instrumented football; and
wherein said camera lens I is disposed within said precision cylindrical axial bore A at the vertex I; and
wherein said TV camera lens II is disposed within said precision cylindrical axial bore A at the vertex II; and
wherein the first buffer plate assembly further comprises:
a threaded cell-like sleeve; and
an optical window;
wherein said threaded cell-like sleeve is for housing and sealing said optical window;
wherein said threaded cell-like sleeve is threaded into said precision cylindrical axial bore A; and
wherein said threaded cell-like sleeve is for permitting easy removal and replacement of damaged said optical windows;
wherein each said precision cylindrical axial bore acts as a portal through which the camera I and the camera II of the package assembly can see through each said optical window of the first buffer plate assembly and the second buffer plate assembly through the vertex I and the vertex II;
wherein the elongated body is further comprised of:
said exterior surface B configured with a cup-like concave shaped surface matching the convex form of the surface of the inflatable bladder pressed against it; and
wherein said optical window is comprised of:
an optical element having a sealed convex spherical-shell-like shaped exterior surface facing outward and flush with the end A for providing a clear sealed path through which the cameras can peer outward through the conventional football cover-liner form thereby providing an unobstructed field of view; and
an antireflection coating on its surfaces which is hard and scratch and stain resistant; and
wherein said coating has a brownish tint to make said optical window unobtrusive to the players;
wherein furthermore said optical window is for providing protection for the camera and said camera lens;
wherein said shoulder I at the intersection of said precision cylindrical axial bore A and said precision cylindrical axial bore B is for restraining the y-axial movement of said threaded cell-like sleeve.

15. The system of claim 2 wherein the elongated body of the first buffer plate assembly further comprises:
a precision cylindrical axial bore A having a finite diameter A driven into the end A; wherein said precision cylindrical axial bore A is threaded;
a precision cylindrical axial bore B having a finite diameter B driven into the end B;
a precision cylindrical axial bore C having a finite diameter C driven into the end B; and
wherein said diameter C is greater than said diameter A; and
wherein said diameter A is greater than said diameter B; and
wherein the elongated body further comprises:
a shoulder I at the intersection of said precision cylindrical axial bore A and said precision cylindrical axial bore B; and
a shoulder II at the intersection of said precision cylindrical axial bore C and said precision cylindrical axial bore B; wherein said shoulder II is for restraining the y-axial movement of the package assembly; and
a plurality of annular grooves disposed in said precision cylindrical axial bore A for seating a plurality of o-rings for sealing dirt and moisture and for providing shock and vibration isolation to the package assembly;
wherein said precision cylindrical axial bore C of the first buffer plate assembly and the second buffer plate assembly act jointly as co-axial shaft mounting bearings for holding and aligning the package assembly there between;
wherein the package assembly is mounted co-axially between the vertex I and the vertex II and between the first buffer plate assembly and the second buffer plate assembly and aligned on said y-axis of the conventional football cover-liner form;
wherein said precision cylindrical axial bore A and said precision cylindrical axial bore B and said precision cylindrical axial bore C is for providing the package assembly with an unobstructed field of view through said co-axial shaft mounting bearings bearing for peering outside of the vertex I and the vertex II through the conventional football cover-liner form onto the instrumented playing surface;
wherein the package assembly is comprised of:
a camera lens I;
a camera lens II;
two of the cameras; wherein one of the two cameras is referred to as the camera I, and the other as the camera II;
two of the microphones; wherein one of the two microphones is referred to as the microphone I, and the other as the microphone II;
wherein the camera I is for capturing video images of the instrumented playing surface through the vertex I of the instrumented football; and
wherein the camera II is for capturing video images of the instrumented playing surface through the vertex II of the instrumented football; and
wherein said camera lens I is disposed within said precision cylindrical axial bore A at the vertex I; and
wherein said camera lens II is disposed within said precision cylindrical axial bore A at the vertex II; and
wherein the first buffer plate assembly further comprises:
a threaded cell-like sleeve; and
an optical window;
wherein said threaded cell-like sleeve is for housing and sealing said optical window;
and for permitting easy removal and replacement of damaged said optical windows;
wherein said optical window is for sealing said precision cylindrical axial bore A;
wherein said threaded cell-like sleeve is threaded into said precision cylindrical axial bore A;
wherein each said precision cylindrical axial bore A and said precision cylindrical axial bore B and said precision cylindrical axial bore C acts as a portal through which the camera I and the camera II of the said package assembly can see through each said optical window of the first buffer plate assembly and the second buffer plate assembly through the vertex I and the vertex II;

wherein the elongated body is further comprised of:

the exterior surface B configured with a cup-like concave shaped surface matching the convex form of the surface of the inflatable bladder pressed against it; and wherein said optical window is comprised of:

an optical element having a sealed convex spherical-shell-like shaped exterior surface facing outward and recessed flush with the end A for providing a clear sealed path through which the cameras can peer outward through the conventional football cover-liner form thereby providing an unobstructed field of view; and an antireflection coating on its surfaces which is hard and scratch and stain resistant; and wherein said coating has a brownish tint to make said optical window unobtrusive to the players;

wherein furthermore said optical window is for providing protection for the camera and said camera lens;

wherein said optical window is for permitting easy access for removal and exchange of said camera lenses by removal of said threaded sleeve containing said optical window;

wherein said threaded cell-like sleeve is for enabling the easy interchange of said optical windows having different curvatures ranging from plane flat surfaces to shell-like-domed shaped concentric surfaces;

wherein said shoulder I at the intersection of said precision cylindrical axial bore A and said precision cylindrical axial bore B is for restraining the y-axial movement of said threaded cell-like sleeve.

16. The system of claim 2 wherein the elongated body of the first buffer plate assembly further comprises:

a precision cylindrical axial bore A having a finite diameter A driven into the end A; wherein said precision cylindrical axial bore A is threaded;

a precision cylindrical axial bore B having a finite diameter B driven into the end B;

a precision cylindrical axial bore C having a finite diameter C driven into the end B; and wherein said diameter C is greater than said diameter A; and wherein said diameter A is greater than said diameter B; and wherein the elongated body further comprises:

a shoulder I at the intersection of said precision cylindrical axial bore A and said precision cylindrical axial bore B; and a shoulder II at the intersection of said precision cylindrical axial bore C and said precision cylindrical axial bore B; wherein said shoulder is for restraining the y-axial movement of the package assembly; and a plurality of annular grooves disposed in said precision cylindrical axial bore A for seating a plurality of o-rings for sealing dirt and moisture and for providing shock and vibration isolation to the package assembly;

wherein said precision cylindrical axial bore C of the first buffer plate assembly and the second buffer plate assembly are configured to act jointly as a co-axial shaft mounting bearings for holding and aligning the package assembly there between;

wherein the package assembly is mounted co-axially between the vertex I and the vertex II and between the first buffer plate assembly and the second buffer plate assembly and aligned on said y-axis of the conventional football cover-liner form;

wherein said precision cylindrical axial bore A and said precision cylindrical axial bore B and said precision cylindrical axial bore C is for providing the package assembly with an unobstructed field of view through its said co-axial shaft mounting bearings for peering outside of the vertex I and the vertex II through the conventional football cover-liner form onto the;

wherein the package assembly is comprised of:

a camera lens I;

a camera lens II;

two of the cameras; wherein one of the two cameras is referred to as the camera I, and the other as the camera II;

two of the microphones; wherein one of the two microphones is referred to as the microphone I, and the other as the microphone II;

wherein the camera I is for capturing the video images of the instrumented playing surface through the vertex I of the instrumented football; and wherein the camera II is for capturing the video images of the instrumented playing surface through the vertex II of the instrumented football; and wherein said camera lens I is disposed within said precision cylindrical axial bore A at the vertex I; and wherein said camera lens II is disposed within said precision cylindrical axial bore A at the vertex II; and wherein the first buffer plate assembly further comprises:

a threaded cell-like sleeve; and an optical window;

wherein said threaded cell-like sleeve is for housing and sealing said optical window;

and for permitting easy removal and replacement of damaged said optical window;

wherein said threaded cell-like sleeve is threaded into said precision cylindrical axial bore A;

wherein each said precision cylindrical axial bore A and said precision cylindrical axial bore B act as a portal through which the camera I and the camera II of the package assembly can see through each said optical window of the first buffer plate assembly and the second buffer plate assembly through the vertex I and the vertex II;

wherein the elongated body is further comprised of:

the exterior surface B configured with a cup-like concave shaped surface matching the convex form of the surface of the inflatable bladder pressed against it; and wherein said shoulder I at the intersection of said precision cylindrical axial bore A and said precision cylindrical axial bore B is for restraining the y-axial movement of said threaded cell-like sleeve; and wherein said optical window is comprised of:

an optical element having a sealed convex spherical-shell-like shaped exterior surface facing outward and recessed flush with the conventional football cover-liner form at the end A for providing protection for said optical window from damage on the playing field;

and for providing a clear sealed path through which the cameras can peer outward through the conventional football cover-liner form thereby providing an unobstructed field of view; and an antireflection coating on its surfaces which is hard and scratch and stain resistant; and wherein said antireflection coating has a brownish tint to make said optical window unobtrusive to the players;

wherein furthermore said optical window is for providing protection for the camera and said camera lens;

wherein said optical window is for permitting easy access for removal and exchange of said camera lenses by removal of said threaded cell-like sleeve containing said optical window;

wherein said threaded cell-like sleeve is for enabling the easy interchange of said optical windows having different curvatures ranging from plane flat surfaces to shell-like-domed shaped concentric surfaces; wherein the elongated body is further comprised of:

four radially slotted clearance slots at ninety degree intervals on said exterior surface A of the first buffer plate assembly and the external surface A of the second buffer plate assembly for preventing an interference fit with the conventional football cover-liner form panel stitching on the vesica piscis surfaces on the inside of the conventional football's cover-liner form at the vertex I and the vertex II by providing clearance for the protuberances in the conventional football cover-liner form stitching in the seams between adjacent cover panels;

wherein said radially slotted clearance slots of said exterior surface A of the first buffer plate assembly I is attached by a bonding agent to the protuberances in the conventional football cover-liner form stitching in the seams between adjacent cover panels at the vertex I; and wherein said radially slotted clearance slots of the exterior surface A of the first buffer plate assembly is attached by a bonding agent to the protuberances in the conventional football cover-liner form stitching in the seams between adjacent cover panels at the vertex II.

17. The system of claim 2 wherein the elongated body of the first buffer plate assembly further comprises:

a precision cylindrical axial bore A having a finite diameter A in the end A;

wherein said precision cylindrical axial bore A is threaded;

a precision cylindrical axial bore B having a finite diameter B driven into the end B;

a precision cylindrical axial bore C having a finite diameter C driven into the end B; and wherein said diameter C is greater than said diameter A; and wherein said diameter A is greater than said diameter B; and wherein the elongated body further comprises:

a shoulder I at the intersection of said precision cylindrical axial bore A and said precision cylindrical axial bore B; and a shoulder II at the intersection of said precision cylindrical axial bore C and said precision cylindrical axial bore B; wherein said shoulder is for restraining the y-axial movement of the package assembly; and a plurality of annular grooves disposed in said precision cylindrical axial bore A for seating a plurality of o-rings for sealing dirt and moisture and for providing shock and vibration isolation to the package assembly;

wherein said precision cylindrical axial bore C of the first buffer plate assembly and the second buffer plate assembly are configured to act jointly as a co-axial shaft mounting bearings for holding and aligning the package assembly there between;

wherein the package assembly is mounted co-axially between the vertex I and the vertex II and between the first buffer plate assembly and the second buffer plate assembly and aligned on said y-axis of the conventional football cover-liner form;

wherein said precision cylindrical axial bore A and said precision cylindrical axial bore B and said precision cylindrical axial bore C is for providing the package assembly with an unobstructed field of view through its said co-axial shaft mounting bearing for peering outside of the vertex I and the vertex II;

wherein the package assembly is comprised of:

a camera lens I;

a camera lens II;

two of the cameras; wherein one of the two cameras is referred to as the camera I, and the other as the camera II;

two of the microphones; wherein one of the two microphones is referred to as the microphone I, and the other as the microphone II;

wherein the camera I is for capturing the video images of the instrumented playing surface through the vertex I of the instrumented football; and wherein the camera II is for capturing the video images of the instrumented playing surface through the vertex II of the instrumented football; and wherein said camera lens I is disposed within said precision cylindrical axial bore A at the vertex I; and wherein said camera lens II is disposed within said precision cylindrical axial bore A at the vertex II; and wherein the first buffer plate assembly further comprises:

a threaded cell-like sleeve; and an optical window;

wherein said threaded cell-like sleeve is for housing and sealing said optical window;

and for permitting easy removal and replacement of damaged said optical windows;

wherein said threaded cell-like sleeve is threaded into said precision cylindrical axial bore A;

wherein each said precision cylindrical axial bore A and said precision cylindrical axial bore B and said precision cylindrical axial bore C acts as a portal through which the camera I and the camera II of the package assembly can see through each said optical window of the first buffer plate assembly and the second buffer plate assembly through the vertex I and the vertex II;

wherein the exterior surface B is configured with a cup-like concave shaped surface for matching the convex form of the surface of the inflatable bladder pressed against it; and wherein said optical window is comprised of:

an plane-parallel-flat sealed optical element recessed flush with the conventional football cover-liner form at the end A for providing a clear sealed path through which the camera can peer outward through the conventional football cover-liner form providing an unobstructed field of view; and an antireflection coating on its surfaces which is hard and scratch and stain resistant; and wherein said antireflection coating has a brownish tint to make said optical window unobtrusive to the players;

wherein furthermore said optical window is for providing protection for the camera and said camera lens I and said camera lens II;

wherein said optical window is for permitting easy access for removal and exchange of said camera lens I and said camera lens II by removal of said threaded cell-like sleeve containing said optical window;

wherein said threaded cell-like sleeve is for enabling the easy interchange of said optical windows having different curvatures ranging from plane flat surfaces to shell-like-domed shaped concentric surfaces;

wherein the elongated body is further comprised of:

four radially slotted clearance slots at ninety degree intervals on the exterior surface A of the first buffer plate assembly and the exterior surface A of the second buffer plate assembly for preventing an interference fit with the conventional football cover-liner form panel stitching on the vesica piscis surfaces on the inside of the conventional football cover-liner form at the vertex I and the vertex II, by providing clearance for the protuberances in the conventional football cover-liner form stitching in the seams between adjacent cover panels;

wherein said radially slotted clearance slots of the exterior surface A of said first buffer plate assembly is attached by a bonding agent to the protuberances in the conventional football cover-liner form stitching in the seams between adjacent cover panels at the vertex I; and wherein said radially slotted clearance slots of said exterior surface A of the second buffer plate assembly is attached by a bonding agent to the protuberances in the conventional football cover-liner form stitching in the seams between adjacent cover panels at the vertex II.

18. The system of claim 2 wherein the inflatable bladder of the instrumented football is further comprised of:

one open slot that runs radially outward from the inner y-axial central hollow cylindrical cavity to the exterior resilient surface of the inflatable bladder; said open slot forming two parallel walls running parallel to the y-axis for the full length of the inflatable bladder;

wherein said open slot walls close up and press flat against one another when the inflatable bladder is inflated and the conventional football cover-liner form is laced at the lacing gap; and wherein the inflatable bladder is disposed within the lacing gap for enabling the first package assembly to be loaded and aligned directly through the lacing gap into said central hollow cylindrical cavity whereby simplifying the assembly phase of the manufacturing process of the instrumented football whereby reducing the cost of production.

19. The system of claim 2 wherein the package assembly of the instrumented football is further comprised of:

an enclosure; and two of the camera lenses comprised of; a first camera lens is for the camera I; and a second camera lens is for the camera II;

two of the cameras; wherein one of the two cameras is referred to as the camera I, and the other as the camera II;

two of the microphones; wherein one of the two microphones is referred to as the microphone I, and the other as the microphone II;

two inductive pickup coils; wherein one inductive pickup coil is referred to as inductive pickup coil 1, and the other as inductive pickup coil 2;

a rechargeable battery pack; and at least two phased array antennas; and wherein said enclosure of the package assembly is comprised of an elongated cylinder-like shaped body for housing the two cameras and two said camera lenses and the two microphones and two said inductive pickup coil and said rechargeable battery pack;

wherein said enclosure of the package assembly is mounted co-axially between the vertex I and the vertex II and captured between the first buffer plate assembly and the second buffer plate assembly and aligned to the conventional football cover-liner form;

wherein the camera I and the camera II are for capturing the video images of the instrumented playing surface through the instrumented football's the vertex I and the vertex II respectively;

wherein the microphone I and the microphone II are for capturing sounds conducted into the instrumented football at the vertex I and the vertex II respectively;

wherein said inductive pickup coil 1 and said inductive pickup coil 2 are for serving as air core transformer secondary windings for gathering time varying magnetic flux induced into the vertices of the instrumented football having frequencies in the 100 to 450 Khz range for charging said rechargeable battery pack; and for receiving and transmitting control and status signals by magnetic induction having carrier frequencies in the 100 to 450 Khz range;

wherein said rechargeable battery pack is for being electrically charged via said inductive pickup coil 1 and said inductive pickup coil 2; and for performing as an electrical power source supplying electricity to the package assembly;

wherein said inductive pickup coil 1 and said inductive pickup coil 2 are wound on the exterior of said enclosure for reducing heat flow into said enclosure; wherein said inductive pickup coil 1 and said inductive pickup coil 2 are wound at opposite ends of said enclosure;

wherein said phased array antennas are for receiving and transmitting radio signals to and from the instrumented football.

20. The system of claim 2 wherein the inflatable bladder of the instrumented football is further comprised of:

two slots that are one hundred eighty degrees apart and opposite to one another that run radially outward from said central hollow cavity to the exterior surface of the inflatable bladder thereby forming parallel radial slot walls in the inflatable bladder resulting in two identical bladder halves; wherein each of the inflatable bladder half comprises ½ of said cylindrical hollow cavity space;

wherein each the inflatable bladder half being comprised of:

a gas valve for inflation;

wherein each the inflatable bladder half comprises ½ of said cylindrical hollow cavity space;

wherein said slot walls run the full length of the inflatable bladder from end to end parallel to the y-axis, and wherein said slot walls close up and press flat against one another when the inflatable bladder is inflated with said dry gas and the conventional football cover-liner form is laced;

wherein the inflatable bladder is disposed with one said slot located beneath the opening to the lacing gap for enabling the package assembly to be loaded and aligned directly through the lacing gap into said central hollow cavity whereby simplifying the assembly phase of the manufacturing process of the instrumented football whereby reducing the cost of production;

wherein the inflatable bladder further comprises:

two gas valves identical to the gas valves used in conventional football bladders;

wherein said two gas valves are disposed in the same y-axis location on the inflatable bladder as with the conventional football bladders; wherein one of said gas valves is at the same (x, z) location on one of the inflatable bladder halves as with the conventional football bladders, and wherein the other said gas valve is at the (−x, z) location on the other one of the inflatable bladder halves, and wherein both said gas valves are positioned ninety degrees apart from one another in the x-z plane of the inflatable bladder, and where said gas valves are each positioned at forty five degrees on either side of the lacing gap.

21. The system of claim 3 wherein the elongated body of the buffer plate assembly I further comprises:

a precision cylindrical axial bore A having a finite diameter A driven into the end A; wherein said precision cylindrical axial bore A is threaded;

a precision cylindrical axial bore B having a finite diameter B driven into the end B; wherein said precision cylindrical axial bore B is threaded; wherein said diameter B is greater than said diameter A;

a precision cylindrical axial bore C having a finite diameter C driven into the end B; and wherein said diameter C is greater than said diameter A; and wherein said diameter A is greater than said diameter B; and wherein the elongated body further comprises:

a shoulder I at the intersection of said precision cylindrical axial bore A and said precision cylindrical axial bore B; and a shoulder II at the intersection of said precision cylindrical axial bore C and said precision cylindrical axial bore B; wherein said shoulder II is for restraining the y-axial movement of the package assembly I; and an axially symmetric hollow threaded cavity I formed within said precision cylindrical axial bore C; wherein said symmetric hollow threaded cavity forms a threaded nest for the package assembly I wherein the package assembly I is threaded into said hollow threaded cavity I and rests against said shoulder I;

wherein the buffer plate assembly I comprises:

a threaded plug I for sealing said hollow threaded cavity I at the exterior surface B; wherein said threaded plug I is removable for enabling the package assembly Ito be removed for service and maintenance;

a dry pressurized gas for filling said hollow threaded cavity Ito keep dirt and moisture from damaging the package assembly I; and a plurality of annular grooves disposed in said precision cylindrical axial bore A for seating a plurality of o-rings for sealing dirt and moisture from entering said hollow threaded cavity I and said hollow threaded cavity II;

wherein said precision cylindrical axial bore A and said precision cylindrical axial bore B is for providing the camera I of the package assembly I with an unobstructed field of view for peering outside of the vertex I through the conventional football cover-liner form onto the instrumented playing surface;

wherein the buffer plate assembly I further comprises:

a threaded cell-like sleeve I; and an optical window I;

wherein the buffer plate assembly II further comprises:

a threaded cell-like sleeve II; and an optical window II;

wherein said threaded cell-like sleeve I is for housing and sealing said optical window I; and is for permitting easy removal and replacement of damaged said optical windows I;

wherein said threaded cell-like sleeve I is threaded into said precision cylindrical axial bore A;

wherein said precision cylindrical axial bore A of the package assembly I acts as a portal through which the camera I of the package assembly I can see through said optical window I of the buffer plate assembly I through the vertex I;

wherein similarly said precision cylindrical axial bore A of the package assembly II acts as a portal through which the camera II of the package assembly II can see through said optical window II of the buffer plate assembly II through the vertex II;

wherein said optical window I is comprised of:

an optical element I having a sealed convex spherical-shell-like shaped exterior surface facing outward and recessed flush with the conventional football cover-liner form at the end A for providing a clear sealed path through which the camera I can peer outward through the conventional football cover-liner form providing an unobstructed field of view; and an antireflection coating on its surfaces which is hard and scratch and stain resistant; and wherein said coating has a brownish tint to make said optical window I unobtrusive to the players;

wherein furthermore said optical window I is for providing protection for the camera I and the camera lens I;

wherein said optical window I is for permitting easy access for removal and exchange of the camera lens I by removal of said threaded cell-like sleeve I containing said optical window I;

wherein said threaded cell-like sleeve I is for enabling the easy interchange of said optical window I having different curvatures ranging from plane flat surfaces to shell-like-domed shaped concentric surfaces;

wherein the elongated body is further comprised of:

four radially slotted clearance slots at ninety degree intervals on the exterior surface A of the buffer plate assembly I and the exterior surface A of the buffer plate assembly II for preventing an interference fit with the conventional football cover-liner form panel stitching on the vesica piscis surfaces on the inside of the conventional football cover-liner form at the vertex I and the vertex II, by providing clearance for the protuberances in the conventional football cover-liner form stitching in the seams between adjacent cover panels; and wherein said radially slotted clearance slots of said exterior surface A of the buffer plate assembly I is attached by a bonding agent to the protuberances in the conventional football cover-liner form stitching in the seams between adjacent cover panels at the vertex I; and wherein said radially slotted clearance slots of the exterior surface A of the buffer plate assembly II is attached by a bonding agent to the protuberances in the conventional football cover-liner form stitching in the seams between adjacent cover panels at the vertex II; and wherein the elongated body is further comprised of:

a plurality of wireless radio antenna elements for enabling the transmission and reception of radio signals by the package assembly I and the package assembly II;

wherein said wireless radio antenna elements are molded into the elongated body of the buffer plate assembly I and the buffer plate assembly II for aligning them and protecting them from damage;

wherein the buffer plate assembly I is further comprised of:

wherein the elongated body having the exterior surface B configured with a convex vesica piscis shaped surface for pressing against the first inflatable bladder having a concave vesica piscis shaped dimpled surface; and wherein said threaded plug I is comprised of:

a convex vesica shaped surface for pressing against said concave vesica piscis shaped dimpled surface of the first inflatable bladder;

wherein said convex vesica shaped surface of said threaded plug I smoothly joins and is a continuation of the exterior surface B for pressing against the first inflatable bladder having said concave vesica piscis shaped dimpled surface whereby permitting the use of conventional football bladders which is an extremely important feature.

22. The system of claim 3 wherein the first inflatable bladder of the instrumented football is further comprised of:

a gas;

a gas valve;

wherein said gas is comprised of at least one dry air gas and dry helium gas;

wherein said gas valve is centered and protrudes through the exterior surface of the first inflatable bladder at a point equidistant between the vertex I and the vertex I.

23. The system of claim 3 wherein the first inflatable bladder of the instrumented football is further comprised of:

a conventional football bladder whose inflated shape is modified simply by depressing and folding inward both vertices of said conventional football bladder at both of its ends on the y-axis to form identical concave vesica piscis shaped formed dimples at either of its ends whereby the dimpled said conventional football bladder can be used inside the instrumented football without materially changing said conventional football bladder;

wherein the first inflatable bladder is for applying y-axial pressure on the exterior surface B of the buffer plate assembly I and on the exterior surface B of the buffer plate assembly II;

wherein the convex vesica piscis shape of the exterior surface B on the buffer plate assembly I and on the buffer plate assembly II is for matching and being in smooth contact with the concave vesica piscis shaped formed dimples of the first inflatable bladder.

24. The system of claim 3 wherein the package assembly I of the instrumented football is further comprised of:

a inductive pickup coil;

a rechargeable battery pack;

wherein said inductive pickup coil is for serving as an air core transformer secondary winding for gathering time varying magnetic flux induced into said vertex I of the instrumented football by an external source at frequencies in the 100 to 450 Khz range for charging said rechargeable battery pack; and for receiving and transmitting control and status signals by magnetic induction having carrier frequencies in the 100 to 450 Khz range;

wherein said rechargeable battery pack is furthermore for performing as an rechargeable electrical power source for supplying electricity to the package assembly I.

25. The system of claim 3 wherein the elongated body of the first buffer plate assembly I further comprises:

a precision cylindrical axial bore A having a finite diameter A driven into the end A; wherein said precision cylindrical axial bore A is threaded;

a precision cylindrical axial bore B having a finite diameter B driven into the end B; wherein said precision cylindrical axial bore B is threaded; wherein said diameter B is greater than said diameter A;

a precision cylindrical axial bore C having a finite diameter C driven into the end B; and wherein said diameter C is greater than said diameter A; and wherein said diameter A is greater than said diameter B; and wherein the elongated body further comprises:

a shoulder I at the intersection of said precision cylindrical axial bore A and said precision cylindrical axial bore B; and a shoulder II at the intersection of said precision cylindrical axial bore C and said precision cylindrical axial bore B; wherein said shoulder II is for restraining the y-axial movement of the package assembly I; and an axially symmetric hollow threaded cavity I formed within said precision cylindrical axial bore C; wherein the package assembly I is threaded and nested into said hollow threaded cavity I and rests against said shoulder II;

wherein the exterior surface A and the exterior surface B are configured with a cup-like concave shaped surface; and wherein said cup-like concave shaped surface is for matching the convex form of the opposite surface of the first inflatable bladder pressed against it; and wherein the buffer plate assembly I comprises:

a threaded plug I for sealing said hollow threaded cavity I at the exterior surface B; wherein said threaded plug I is removable for enabling the package assembly Ito be removed for service and maintenance;

wherein said threaded plug I is comprised of;

a concave shaped surface for smoothly joining the exterior surface B and for being a continuation of the exterior surface B for pressing against the first inflated bladder having a convex shaped surface;

wherein the buffer plate assembly I is further comprised of:

a dry pressurized gas for filling said hollow threaded cavity Ito keep dirt and moisture from damaging the package assembly I; and a plurality of annular grooves disposed in said precision cylindrical axial bore A for seating a plurality of o-rings for sealing dirt and moisture from entering said hollow threaded cavity I;

wherein said precision cylindrical axial bore A and said precision cylindrical axial bore B is for providing the camera I of the package assembly I with an unobstructed field of view for peering outside of the vertex I through the conventional football cover-liner form onto the instrumented playing surface;

wherein the buffer plate assembly I further comprises:

a threaded cell-like sleeve I; and an optical window I;

wherein said threaded cell-like sleeve I is for housing and sealing said optical window I;

and is for permitting easy removal and replacement of damaged said optical windows I;

wherein said threaded cell-like sleeve I is threaded into said precision cylindrical axial bore A;

wherein said precision cylindrical axial bore A of the package assembly I acts as a portal through which the camera I of the package assembly I can see through said optical window I of the buffer plate assembly I through the vertex I;

wherein similarly said precision cylindrical axial bore A of the package assembly II acts as a portal through which the camera II of the package assembly II can see through said optical window of the buffer plate assembly II through the vertex II;

wherein said optical window I is comprised of:

an optical element I having a sealed convex spherical-shell-like shaped exterior surface facing outward and recessed flush with the conventional football cover-liner form at the end A for providing a clear sealed path through which the camera I can peer outward through the conventional football cover-liner form providing an unobstructed field of view; and an antireflection coating on its surfaces which is hard and scratch and stain resistant; and wherein said antireflection coating has a brownish tint to make said optical window I unobtrusive to the players;

wherein furthermore said optical window I is for providing protection for the camera I and said camera lens I;

wherein said optical window I is for permitting easy access for removal and exchange of said camera lens I by removal of said threaded cell-like sleeve I containing said optical window I;

wherein said threaded cell-like sleeve I is for enabling the easy interchange of said optical window I having different curvatures ranging from plane flat surfaces to shell-like-domed shaped concentric surfaces;

wherein the elongated body is further comprised of:

four radially slotted clearance slots at ninety degree intervals on the exterior surface A of the buffer plate assembly I and the exterior surface A of the buffer plate assembly II for preventing an interference fit with the conventional football cover-liner form panel stitching on the vesica piscis surfaces on the inside of the conventional football cover-liner form at the vertex I and the vertex II, by providing clearance for the protuberances in the conventional football cover-liner form stitching in the seams between adjacent cover panels;

wherein said radially slotted clearance slots of the exterior surface A of the buffer plate assembly I is attached by a bonding agent to the protuberances in the conventional football cover-liner form stitching in the seams between adjacent cover panels at the vertex I; and wherein said radially slotted clearance slots of the exterior surface A of the buffer plate assembly II is attached by a bonding agent to the protuberances in the conventional football cover-liner form stitching in the seams between adjacent cover panels at the vertex II; and wherein the elongated body is further comprised of:

a plurality of wireless radio phased antenna elements for enabling the transmission and reception of radio signals by the package assembly I and the package assembly II;

wherein said wireless radio phased antenna elements are molded into the elongated body of the buffer plate assembly I and the buffer plate assembly II for aligning them and protecting them from damage; and wherein the material used for the buffer plate assembly I and the buffer plate assembly II is transparent to RF frequencies for not interfering with receiving and transmission of RF by said wireless radio phased antenna elements;

wherein said shoulder II at the intersection of said precision cylindrical axial bore A and said precision cylindrical axial bore B is for restraining the y-axial movement of said threaded cell-like sleeve.

26. The system of claim 3 wherein the first inflatable bladder of the instrumented football is further comprised of:

an inner y-axial central hollow cylindrical cavity open at both ends and extending down the full length of the long y-axis of the first inflatable bladder having a finite diameter and length for surrounding, cradling, hugging, holding, nesting and protecting the package assembly I within said inner y-axial central hollow cylindrical cavity down the full length of said inner y-axial central hollow cylindrical cavity;

wherein said inner y-axial central hollow cylindrical cavity diameter before inflation with gas, is greater than the diameter of the package assembly I for allowing the package assembly I to be easily slipped into the first inflatable bladder's said inner y-axial central hollow cylindrical cavity;

wherein the first inflatable bladder puts radial pressure on the package assembly I for isolating the package assembly I from shock and vibration during games when the first inflatable bladder is inflated with a gas and the conventional football cover-liner form is laced;

wherein the overall y-axial length of the first inflatable bladder is shorter than the y-axial length of the conventional football bladders for making the first inflatable bladder fit in the space between the buffer plate assembly I and the buffer plate assembly II against which the first inflatable bladder presses;

wherein the first inflatable bladder is further comprised of:

a pressurized dry gas; and a gas valve for pumping said gas into the first inflatable bladder; and a rotationally symmetric external surface about said y-axis, and wherein said pressurized dry gas includes but is not restricted to air or helium;

wherein said gas valve is in the x-z plane and protrudes through the inflated external surface of the first inflatable bladder at a point equidistant between both of the ends of the first inflatable bladder; and wherein said inner central hollow cylindrical cavity diameter is smaller than the diameter of the package assembly I after the first inflatable bladder is inflated with said pressurized dry gas for causing an interference fit for restraining the package assembly I in place.

27. The system of claim 3 wherein the package assembly of the instrumented football is further comprised of:

a MPEG video signal compression module of;

a MPEG audio signal compression module of;

a MPEG stream encoder;

a network transceiver;

a CPU system control microprocessor;

a ROM;

a plurality of antennas;

a power supply;

a gyroscopic encoders;

wherein said gyroscope encoders is configured for providing a dynamic means of determining the relative physical state of the instrumented football with respect to its pitch, yaw and roll;

wherein said MPEG video signal compression module is configured for receiving video signals from the camera I;

wherein said MPEG audio signal compression module is configured for receiving audio signals from the microphones I;

wherein said MPEG video signal compression module and said MPEG audio signal compression module are configured for compressing the video signals and said audio signals respectively and inputting compressed video data packets and compressed audio data packets respectively into said MPEG stream encoder;

wherein said MPEG stream encoder is for combining said compressed video data packets and said compressed audio data packets into a single data stream for inputting into said network transceiver;

wherein said network transceiver is configured for coupling said single data stream to said plurality of antennas;

wherein said plurality of antennas is for transmitting and receiving wireless RF communication data packets to and from the remote base station via the relay junction;

wherein furthermore said network transceiver is configured for receiving control status signals from said CPU system control microprocessor and for transmitting said control status signals to the remote base station via the relay junction;

wherein said network transceiver is configured for receiving said compressed signals along with bi-directional system control status data packets from said CPU system control microprocessor and for transmitting;

wherein furthermore said network transceiver is configured for transmitting and receiving control commands to and from the remote base station;

wherein said plurality of antennas are configured for providing isotropic gain to reach the RF wireless the relay junction; and wherein said plurality of antennas are configured as a phased array antenna system operating within the GHz radio spectrum for capturing and radiating the RF transmitted and received respectively between the relay junction and the instrumented football, and wherein said power supply is comprised of a rechargeable battery pack, and wherein said power supply is comprised of:

a rechargeable battery pack for supplying electricity to the instrumented football;

a inductive pickup coil for inductively coupling electrical energy from outside of the instrumented football into said rechargeable battery pack during a recharging cycle;

wherein said inductive pickup coil is configured to operate in the 100 to 400 kHz frequency range; and wherein said gyroscopic encoders are configured for providing a dynamic means of determining the relative physical state of the instrumented football with respect to pitch, yaw and roll;

wherein said ROM initializes said gyroscopic encoders in a zero motion state;

wherein said CPU system control microprocessor executes instructions contained in said ROM to act only on those control commands that are correctly identified based on a unique identification integer code present in the signal that immediately precedes the control data stream contents, when a data stream arrives at said CPU system control microprocessor from the remote base station;

wherein the remote base station is furthermore configured for processing and stabilizing imagery in an upright condition regardless of the pitch, roll or yaw of the instrumented sports paraphernalia using pitch, roll and yaw signal data transmitted to the remote base station by said gyroscopic encoders from within the instrumented sports paraphernalia.

28. The system of claim 4 wherein the package assembly of the instrumented ice hockey puck is furthermore comprised of:

an induction coil; and an electronics; and an enclosure;

a camera lens for the camera;

a rechargeable battery wherein said enclosure is comprised of three contiguous sections, wherein:

a small diameter hollow cylindrical enclosure segment;

a large diameter cylindrical hollow enclosure segment;

a hollow corrugated bellows enclosure segment;

wherein said small diameter hollow cylindrical enclosure segment is for mounting said camera lens;

wherein said large diameter cylindrical hollow enclosure segment is for mounting the camera;

wherein said hollow corrugated bellows enclosure segment is for mounting said electronics;

wherein said small diameter hollow cylindrical enclosure segment and said large diameter cylindrical hollow enclosure segment are connected by a shoulder;

wherein said three contiguous section connections are air tight; wherein said enclosure is sealed and pressurized with dry gas for protecting said camera lens and the camera and said electronics; and wherein said enclosure is made of materials which are transparent to radio frequencies and air tight;

wherein said electronics is for RF wirelessly communicating picture and sound data to the remote base station via the relay junction;

wherein furthermore said electronics is for communicating picture and sound data using fiber optics signal cable and copper signal cable to the remote base station via the relay junction;

wherein furthermore said electronics is for controlling the electrical functions within the package assembly;

wherein furthermore said electronics is for charging said rechargeable battery from said induction coil; wherein said rechargeable battery is for supplying electricity to said electronics;

wherein said induction coil is for wirelessly charging said rechargeable battery;

wherein furthermore said electronics is for controlling and managing said rechargeable battery power consumption.

29. The system of claim 4 wherein the first upper protective cover plate shield of the instrumented ice hockey puck is further comprised of:

at least one clearance hole; and a top spherical surface region; and a top flattened surface region; and a rounded circular edge region; and at least one mounting hole for the external microphones; and at least one optical window for providing the cameras a portal on top of the-instrumented ice hockey puck;

wherein said clearance hole is for providing an aperture on top of the instrumented ice hockey puck through which said optical window may protrude flush with the top flat surface of the instrumented ice hockey puck; and wherein said clearance hole is for physically surrounding said optical window on top of the instrumented ice hockey puck with its walls for protecting said optical window from damage during the game; and wherein the finite diameter of the first upper protective cover plate is for protecting the package assembly and the antenna elements; and wherein the first upper protective cover plate shield is for mounting and supporting the microphone which protrudes above the upper surface of the first upper protective cover plate shield and protrudes through and is flush with the flat top surface of the instrumented ice hockey puck; and wherein the microphone is for capturing both airborne sounds and sounds conducted into the instrumented ice hockey puck; and wherein said top flattened surface region is flattened in proximity to said clearance hole for protecting said optical window; and for providing a location for the microphone mounting hole close to the flat top surface of the instrumented ice hockey puck; and wherein said top spherical surface region is for keeping its edge curved downward and away from the flat top surface of the instrumented ice hockey puck for protecting the top and circumference of the package assembly; and wherein the dome shape of said top spherical surface region is for increasing its stiffness; and wherein the finite diameter of said upper protective cover plate is to cover the tips of the antenna elements; and wherein said rounded circular edge is rounded off for protecting the players from injury if the instrumented ice hockey puck were to fracture.

30. The system of claim 4 wherein the package assembly of the instrumented ice hockey puck is further comprised of:

one main central body;

at least one supporting electronics; and one rechargeable battery pack; and at least one induction coil; and four quad radio antenna array elements; and a gyroscopic encoders;

wherein said gyroscope encoders is configured for providing a dynamic means of determining the relative physical state of the instrumented football with respect to its pitch, yaw and roll;

wherein the package assembly is an autonomous module designed as a sealed unit for being mounted inside the instrumented ice hockey puck; and for seeing and capturing video of the instrumented playing surface out of the top surface of the instrumented ice hockey puck; and for hearing ordinary and conducted sounds from the instrumented playing surface; and for transmitting video and audio signals to the remote base station for processing; and for receiving control signals from the remote base station for controlling its functions; and for transmitting control status signals back to the remote base station for completing the feedback control loop; and wherein said supporting electronics is comprised of:

a network transceiver; and wherein at least one said supporting electronics is for wirelessly televising ice hockey media captured from the cameras and the microphones to the remote base station via the relay junction; and wherein at least one said supporting electronics is furthermore for televising ice hockey media captured from the cameras and the microphones to the remote base station via at least one wireless RF radio link to the remote base station; and wherein said supporting electronics is for receiving command and control signals from the remote base station for putting function settings on automatic under the control said supporting electronics; and wherein said network transceiver is for wirelessly transmitting real-time pictures and sounds from the cameras and the microphones via said quad radio antenna array elements to the remote base station; and wherein furthermore said network transceiver is for providing for wirelessly receiving command and control radio signals from the remote base station; and wherein the remote base station is furthermore configured for processing and stabilizing imagery in an upright condition regardless of the pitch, roll or yaw of the instrumented football using pitch, roll and yaw signal data transmitted to the remote base station by said gyroscopic encoders from within the instrumented football;

wherein command and control signals received by said supporting electronics from the remote base station are for controlling the functions of the package assembly; and wherein said main central body is a finite diameter hollow cylindrical cavity having dimensions; and wherein said main central body is for housing said rechargeable battery pack; and wherein said main central body is for housing said rechargeable battery pack which supplies electrical power to each of the elements within the package assembly; and wherein said main central body is configured with a removable lid on its bottom for accessing and servicing said rechargeable battery pack and contents therein; and wherein said lid is for allowing access to said rechargeable battery pack and the camera and said support electronics and said quad radio antenna array elements and the microphone for servicing prior to molding and encapsulation; and wherein said induction coil is attached to the bottom outside surface of said lid; and wherein said lid is for mounting a gas valve mounted on it for permitting dry gas to be injected into said main central body cavity to pressurize the package assembly prior to molding and encapsulation; and wherein said lid is for allowing access to switch selectable functions through the opening in the bottom of the instrumented ice hockey puck prior to molding and encapsulation; and wherein the package assembly is filled with a dry pressurized gas for preventing the entry of moisture and dirt;

wherein the cameras and said supporting electronics are joined to said main central body by corrugated bellows segments; and wherein the cameras look out of the top of the instrumented ice hockey puck; and wherein the camera are for providing imagery of the instrumented playing surface to the cameras; and wherein any two of the cameras are for making a 3-D stereo camera pair wherein the optical axes of each of the cameras are set parallel to one another; and wherein the camera have o-ring seals for preventing leakage of the pressurized dry gas from the cavity of the package assembly; and wherein said quad radio antenna array elements are mounted radially in a horizontal plane 90degrees apart from one another and extend outward through the cylindrical wall of said main central body; and wherein said quad radio antenna array elements are in quadrature to radiate radio signals to the relay junction with satisfactory gain for overcoming RF noise and for providing a large enough gain bandwidth product to accommodate real-time picture quality requirements; and wherein the relay junction is deployed in the sports stadium for receiving said radio signals from said quad radio antenna array elements; and wherein a helix antenna is wound on the inside diameter of said main central body for transmitting and receiving radio signals to and from the remote base station; and wherein said induction coils are for inductively coupling electrical energy into the package assembly for charging said rechargeable battery pack; and wherein said induction coils are wound on the exterior of said main central body enclosure for minimizing their heat transfer into said main central body enclosure cavity that would otherwise raise the temperature of said supporting electronics within said main central body enclosure cavity thereby lowering the signal to noise ratio; and wherein said induction coils are electrically connected through said main central body enclosure walls to said support electronics inside said enclosure; and wherein said induction coils are for inductively coupling to a source of electrical power from a charging unit which is external to the instrumented ice hockey puck by coaxially laying an external induction coil of the charging unit flat on the top or bottom of the instrumented ice hockey puck for charging said rechargeable battery pack; and wherein said corrugated bellows segment is for mechanically connecting said camera lens and the camera and said support electronics to said main central body; and wherein said corrugated bellows segment is mechanically flexible for tilting the line of sight of the camera relative to said main central body; and wherein said corrugated bellows segment is for pre-setting the tilt in place prior to encapsulation; and wherein said corrugated bellows segment is for mechanically connecting the camera and said support electronics to said main central body; and wherein said corrugated bellows segment is flexible for allowing the section containing the camera to be bent together in order to tilt the line of sight of the camera relative to said main central body; and wherein said corrugated bellows segment is for acting as a spring to resist shocks and vibration and for compressing and expanding its length when under stress from outside forces without damaging the contents of the package assembly; and wherein the microphones are for capturing the sounds of real-time contacts and impacts and shocks to the instrumented ice hockey puck; and wherein the first buffer plate assembly is for acting as a see-through bearing for mounting the package assembly inside the instrumented ice hockey puck.

31. The system of claim 4 wherein the first buffer plate assembly of the instrumented ice hockey puck is further comprised of:

a unitary body having opposite ends: end 1 and end 2; and at least one set of three coaxially joined contiguous precision cylindrical bores: bore A, bore B and bore C;

a bore A having a finite diameter DA;

a bore B having a finite diameter DB;

a bore C having a finite diameter DC;

wherein said bore A is threaded;

wherein said diameter C is greater than said diameter DA;

wherein said diameter A is greater than said diameter DB;

wherein the finite thickness between said end 1 and said end 2 is T;

wherein said bore A has length LA;

wherein said bore B has length LB;

wherein said bore C has length LC;

wherein the sum of said lengths LA+LB+LC is equal to T;

wherein said bore A and said bore B join to form shoulder E;

wherein said bore B and said bore C join to form shoulder F;

wherein said shoulder F is for restraining the y-axial movement of the package assembly;

wherein the first buffer plate assembly further comprises:

a threaded cell-like sleeve; and wherein the inside diameter and outside diameter are threaded; and an optical window; and wherein said threaded cell-like sleeve is for housing and sealing said optical window;

wherein said outside diameter of said threaded cell-like sleeve is equal to DA;

wherein said inside diameter of said threaded cell-like sleeve is equal to DB;

wherein the length of said threaded cell-like sleeve is L;

wherein said threaded cell-like sleeve is threaded into said bore A for a distance LA till it bottoms on said shoulder D for permitting easy removal of said threaded cell-like sleeve for replacement of damaged said optical windows;

wherein said threaded cell-like sleeve protrudes from said end A by a distance equal to L–LA;

wherein said shoulder F is for restraining the y-axial movement of said wherein said first buffer plate assembly further comprises:

a plurality of o-ring seals, a plurality of annular grooves, wherein said plurality of annular grooves is disposed in said bore A and said bore B and said bore C for seating said plurality of o-rings for sealing against dirt and moisture and for providing shock and vibration isolation to the package assembly;

wherein said bore C acts as a co-axial shaft mounting bearing for holding and aligning the package assembly;

wherein said bore A and said bore B and said bore C is for providing the package assembly with an unobstructed field of view through for peering outside of said flat molded top;

wherein each said set acts as a portal through which each of the cameras of the package assembly can peer outside of said flat molded top.

32. The system of claim 4 wherein the first buffer plate assembly of the instrumented ice hockey puck is further comprised of:

a threaded cell-like sleeve; and an optical window;

wherein said threaded cell-like sleeve is threaded for sealing and retaining said optical window; and threaded for easy removal and replacement of damaged said optical windows; and wherein said optical window is an optical element for serving as a sealed optical portal through the molded flat top surface of the instrumented ice hockey puck through which the camera peers onto the playing surface.

33. The system of claim 10 wherein furthermore the tripod mounted set-up camera is further comprised of:

a) two setup cameras; and b) two camera lenses; and c) a motorized tripod mount; and d) a laptop computer; and e) system software; and f) a USB high-speed port of said laptop computer; and wherein said two setup cameras are comprised of;

set-up camera 1; and set-up camera 2; and wherein said two setup camera lenses are comprised of;

set-up camera lens 1; and set-up camera lens 2; and wherein said set-up camera 1 is identical to said set-up camera 2; and wherein said set-up camera lens 1 is identical to said set-up camera lens 2; and wherein said set-up camera 1 and said set-up camera 2 are identical to the camera used in the instrumented sports paraphernalia; and wherein said set-up camera lens 1 and said set-up camera lens 2 are identical to the camera lenses used in the instrumented sports paraphernalia; and wherein said two setup cameras and said two camera lenses are configured for simultaneously capturing the reference images from pre-determined coordinate vantage points on the instrumented playing surface; and wherein said two setup cameras are aligned on said motorized tripod mount to look in opposite directions 180 degrees apart from one another; and wherein said motorized tripod mount is configured for mounting said two setup cameras and said two camera lenses; and configured for slewing the lines of sight of said two setup cameras and said two camera lenses to pre-determined pitch and yaw angles; and wherein said laptop computer is configured for commanding and controlling the operation of said motorized tripod mount; and configured for controlling the operation of said two setup cameras and said two camera lenses; and configured for processing said video images for building the plurality of reference images; and wherein said system software is configured for storing said pre-determined pitch and yaw angles for said motorized tripod mount for each of said pre-determined coordinate vantage points on the instrumented playing surface;

wherein said USB high-speed port is for loading said plurality of reference images onto said removable flash memory; and wherein said removable flash memory is for storing the plurality of reference images; and for transporting the plurality of reference images to the remote base station, wherein for each said archival image database the two setup cameras and said two camera lenses used to build said plurality of reference images are made identical to the cameras and said camera lenses used in each of the instrumented sports paraphernalia for keeping said archival image database matched to its specific the instrumented sports paraphernalia; and wherein a separate said the plurality of reference images is built for each of the instrumented sports paraphernalia configuration of the camera and said camera lens for keeping the plurality of reference images matched to its specific the instrumented sports paraphernalia.

34. The system of claim 19 wherein the enclosure is further comprised of:

a first optical window; and a first small diameter slightly tapered cylinder section; and a first large diameter cylinder section; and a middle section; and a second large diameter cylinder section; and a second small diameter slightly tapered cylinder section; and a second optical window;

wherein said first optical window and said first small diameter slightly tapered cylinder section and said first large diameter cylinder section and said middle section and said second large diameter cylinder section and said second small diameter slightly tapered cylinder section and said second optical window are respectively sequentially coaxially connected;

wherein said first small diameter slightly tapered cylinder section and said first large diameter cylinder section and said middle section and said second large diameter cylinder section and said second small diameter slightly tapered cylinder section are made from materials transparent to radio frequencies for allowing passage of GHZ RF to and from the phased array antennas mounted within the enclosure;

wherein said first small diameter section is for housing the first camera lens;

wherein said first large diameter cylinder section is for housing the camera; and for mounting the inductive pickup coil 1 close to the vertex 1 for maximizing the linkage of externally induced magnetic flux during the rechargeable battery pack recharging cycle and for maximizing the linkage of an induced magnetic flux carrier for bi-directional communications during diagnostic testing;

wherein said middle section is for housing the rechargeable battery pack;

wherein said second large diameter section is for housing the second camera; and for mounting the inductive pickup coil 2 close to the vertex 2 for maximizing the linkage of externally induced magnetic flux during the rechargeable battery pack recharging cycle and for maximizing the linkage of induced magnetic flux for bi-directional communications during diagnostic testing;

wherein said second small diameter slightly tapered cylinder section is for housing the camera lens;

wherein said first small diameter slightly tapered cylinder section and said first large diameter cylinder section intersect and join together to form a first shoulder;

wherein said second small diameter slightly tapered cylinder section and said second large diameter slightly tapered cylinder section intersect and join together to form a second shoulder;

wherein said first optical window is for sealing the enclosure form moisture and dirt; and for permitting the camera to look out through said first small diameter section onto the instrumented playing surface from the enclosure;

wherein said second optical window is for sealing the enclosure form moisture and dirt; and for permitting the camera to look out through said second small diameter slightly tapered cylinder section onto the playing surface from the enclosure.

35. The system of claim 19 wherein the package assembly of the instrumented football is further comprised of:

at least one MPEG signal compression modules;

a network transceiver;

a CPU system control microprocessor;

a ROM;

a power supply;

wherein said MPEG signal compression modules are configured for receiving output signals from two of the cameras;

wherein said MPEG signal compression modules are configured for receiving output signals from two of the microphones;

wherein said MPEG signal compression modules are configured for compressing said signals into a composite MPEG format stream using a compression protocol;

wherein said network transceiver is configured for receiving said composite MPEG stream image and audio data along with bi-directional system control status data packets from and to said CPU system control microprocessor;

wherein furthermore said network transceiver is configured for transmitting and receiving control commands to and from the remote base station;

wherein said network transceiver is configured for transmitting and receiving wireless communication data packets to and from the remote base station, and wherein furthermore said network transceiver is configured for receiving control commands from said CPU system control microprocessor;

wherein the phased array antennas are furthermore configured inside the enclosure for operating within the GHz radio spectrum, and wherein the phased array antennas are furthermore configured for providing an isotropic gain sufficient to reach the wireless the relay junction; and wherein the phased array antennas are furthermore configured for capturing and radiating the RF energy transmitted and received between said network transceiver and the relay junction; and wherein said power supply is configured with the inductive pickup coil 1 and the inductive pickup coil 2 are for inductively coupling electrical energy from a source outside of the instrumented football into the rechargeable battery pack during a recharging cycle;

wherein the inductive pickup coil 1 and the inductive coil 2 are configured to operate in the 100 to 400 kHz frequency range; and wherein said real-time gyroscopic encoders are configured for providing a dynamic means of determining the relative physical state of the instrumented football; and wherein said ROM initializes the gyroscopic encoders in a zero motion state, wherein said CPU system control microprocessor executes a series of instructions contained in said ROM to act only on those control commands that are correctly identified based on a unique identification integer code present in the signal that immediately precedes the control data stream contents when a data stream arrives at said CPU system control microprocessor from the remote base station;

wherein the remote base station is furthermore configured for processing and stabilizing imagery in an upright condition regardless of the pitch, roll or yaw of the instrumented football using pitch, roll and yaw signal data transmitted to the remote base station by the gyroscopic encoders from within the instrumented football.

36. The system of claim 34 wherein the middle section is further comprised of:

a hollow resilient flexible-stretchable-compressible segment having a finite diameter and length.

37. The system of claim 34 wherein the middle section is further comprised of:

a hollow firm cylindrical segment having a finite diameter and length.

38. The system of claim 34 wherein the first optical window is further comprised of:

a single domed shaped optical element having a finite diameter.

39. The system of claim 34 wherein the second optical window is further comprised of:

a single domed shaped optical element having a finite diameter.

40. The system of claim 34 wherein the first optical window is further comprised of:

a front lens element of the first camera lens;

wherein said front lens element of the first camera lens is recessed flush with the conventional football cover-liner form for providing a clear sealed path through which the camera can peer outward through the conventional football cover-liner form for yielding an unobstructed field of view.

41. The system of claim 34 wherein the second optical window is further comprised of:

a front lens element of the second camera lens;

wherein said front lens element of the second camera lens is recessed flush with the conventional football cover-liner form for providing a clear sealed path through which the camera can peer outward through the conventional football cover-liner form for yielding an unobstructed field of view.

42. A system for broadcasting media content relating to a sporting event, comprising:

an instrumented sports stadium comprising an instrumented playing surface;

said instrumented playing surface comprising a plurality of instrumented sports paraphernalia disposed on said instrumented playing surface;

said instrumented sports paraphernalia comprising at least one package assembly, mounted within said instrumented sports paraphernalia, and comprising: at least one camera and at least one microphone to capture said media content relating to said sporting event;

wherein said instrumented sports paraphernalia is configured to transmit said media content to a remote base station via a relay junction;

wherein said relay junction comprises at least one of a bi-directional RF signal antenna repeater, a fiber optic cable signal repeater, and a copper cable signal repeater, and wherein said relay junction is configured to relay signals between said package assembly and said remote base station;

said remote base station is configured to:

receive said media content from said instrumented sports paraphernalia via said relay junction, and is configured to process said media content and broadcast the processed media content to a live television viewing audience, transmit command and control signals to said instrumented sports paraphernalia to control electronic, mechanical, and optical functions within said instrumented sports paraphernalia, and said instrumented sports stadium further comprising a hand-held remote control unit, comprising:

circuitry configured to allow said hand-held remote control unit to wirelessly enable and disable said instrumented sports paraphernalia, and to interrogate the status of electrical, mechanical, and/or optical functions of said instrumented sports paraphernalia, and circuitry to wirelessly transmit commands to, and receive status data from, said instrumented sports paraphernalia.

43. The system of claim 42 wherein the instrumented sports paraphernalia is further comprised of:

at least one instrumented baseball base;

wherein said instrumented baseball base is comprised of:

a conventional baseball base form;

wherein said conventional baseball base form is configured for serving as a molded enclosure having four molded side surfaces which meet together to form four corners and a molded top surface and a molded bottom surface;

wherein furthermore said conventional baseball base form is configured for serving as an enclosure for housing the package assembly;

wherein the package assembly is further comprised of:

at least one electronics for encoding video and conducted sounds into data packets and communicating said data packets to the remote base station via the relay junction;

a flexible segment for adjusting the tilt angle of the line of sight of the camera up and down and from side to side;

wherein furthermore the conventional baseball base form is configured with at least one optical portal aperture of finite diameter disposed in at least one of said four molded side surfaces for serving as a window through which the cameras peer at the instrumented playing surface;

wherein the camera is a TV camera; and wherein the package assembly is configured to capture video from each of said four sides of said conventional baseball base form; and capture conducted sounds from each of said four sides of said conventional baseball base form; and encode video and conducted sounds into data packets and communicate said data packets to the remote base station via the relay junction;

wherein the package assembly is molded and encapsulated within said conventional baseball base form for shock-proofing and alignment.

44. The system of claim 42 wherein the instrumented sports paraphernalia is further comprised of:

at least one instrumented baseball home plate;

wherein said instrumented baseball home plate is comprised of:

a conventional baseball home plate form;

a first upper protective cover plate shield;

at least one first buffer plate assembly;

a plurality of phased array antenna elements;

a plurality of external microphones;

a first lower protective cover plate shield;

wherein said conventional baseball home plate form is configured for serving as a molded enclosure with five side surfaces which meet to form five corners and a top surface and a bottom surface;

wherein furthermore said conventional baseball home plate form is configured for serving as an enclosure for housing said first upper protective cover plate shield and said first buffer plate assemblies and the package assembly and said plurality of phased array antenna elements and the microphones and said first lower protective cover plate shield;

wherein said first upper protective cover plate shield, and said first buffer plate assemblies, and the package assembly, and the plurality of phased array antenna elements and the microphones are molded and encapsulated within said conventional baseball home plate form for shock-proofing and alignment; and wherein furthermore said conventional baseball home plate form is perforated through its molded top surface with at least one precision bore of finite diameter for serving as a optical portals through which the cameras peers at the instrumented playing surface;

wherein said plurality of external microphones are mechanically attached and electrically connected to the package assembly;

wherein the microphones is for capturing sounds conducted into said instrumented baseball home plate caused by motions, actions and contacts with said instrumented baseball home plate occurring during games on the instrumented playing surface;

wherein said plurality of external microphone is flush with said molded flat top surface of said instrumented baseball home plate and is for capturing airborne sounds occurring around said instrumented baseball home plate;

wherein the microphones and said external microphones are physically different from one another;

wherein said plurality of phased array antenna elements are mechanically attached and electrically connected to the package assembly;

wherein said first upper protective cover plate shield is comprised of:

a dome shaped circular disk-like object configured for protecting the package assembly from physical forces applied to said molded top and said molded sides of the conventional baseball home plate form; and wherein said first upper protective cover plate shield is deployed between said molded top and said first buffer plate assembly and the package assembly;

wherein said first lower protective cover plate shield is comprised of:

a flat surface object configured for protecting the package assembly from physical forces applied to the bottom of said conventional baseball home plate form; and wherein said first buffer plate assembly is comprised of:

a apparatus configured for mounting and aligning the package assembly inside said instrumented baseball home plate;

wherein each said first buffer plate assembly is comprised of:

at least one portal through said flat top of said conventional baseball home plate form configured for permitting at least one the cameras to peer through said portal and view the instrumented playing surface;

wherein the sequence of the physical elements in order of their occurrence measured from said top surface is the external microphones, said first upper protective cover plate shield, said first buffer plate assembly, the package assembly, said plurality of phased array antenna elements, and said first lower protective cover plate shield; and wherein said first upper protective cover plate shield is perforated through its said dome shaped top surface with at least one precision clearance bore of finite diameter symmetrically disposed coaxially below said precision bore in said top surface;

wherein said precision bore in said top surface is similarly coaxial with matching bores in said first buffer plate assembly and the package assembly.

45. The system of claim 42 wherein the instrumented sports paraphernalia is further comprised of:

at least one instrumented baseball home plate;

wherein the instrumented baseball home plate is comprised of:

a conventional baseball home plate form;

wherein said conventional baseball home plate form is configured for serving as a molded enclosure having five molded side surfaces which meet together to form five corners and a molded top surface and a molded bottom surface;

wherein furthermore said conventional baseball home plate form is configured for serving as an enclosure for housing the package assembly;

wherein the package assembly is comprised of:

at least one electronics for encoding the media content into data packets and communicating said data packets to the remote base station via the relay junction;

wherein furthermore said conventional baseball home plate form is configured with at least one optical portal aperture of finite diameter disposed in said molded top surface for serving as a window through which the cameras peers at the instrumented playing surface;

wherein the package assembly is molded and encapsulated within said conventional baseball home plate form for shock-proofing and alignment; and wherein the package assembly is configured to:

capture video from the top of said conventional baseball home plate form;

capture conducted sounds through said conventional baseball home plate form;

encode video and conducted sounds into data packets and communicate said data packets to the remote base station via the relay junction;

wherein the tilt angle of the line of sight of the cameras can be set relative to a normal to said molded top surface.

46. The system of claim 42 wherein the instrumented sports paraphernalia is further comprised of:

at least one instrumented baseball pitcher's rubber;

wherein said instrumented baseball pitcher's rubber is comprised of:

a conventional baseball pitcher's rubber form;

a least two upper protective cover plate shields;

at least two first buffer plate assemblies;

a plurality of phased array antenna elements;

a plurality of external microphones;

a lower protective cover plate shield;

wherein said conventional baseball pitcher's rubber form is configured for serving as a molded enclosure with four side surfaces which meet to form four corners and a top surface and a bottom surface;

wherein furthermore said conventional baseball pitcher's rubber form is configured for serving as said molded enclosure for housing said first upper protective cover plate shield and said first buffer plate assemblies and the package assemblies and said plurality of phased array antenna elements and said plurality of external microphones and said lower protective cover plate shield;

wherein said first upper protective cover plate shields and said first buffer plate assemblies and the package assemblies and said plurality of phased array antenna elements and said plurality of external microphones are molded and encapsulated within said conventional baseball pitcher's rubber form for shock-proofing and alignment; and wherein said conventional baseball pitcher's rubber form is perforated through its molded top surface with at least two precision bores of finite diameter for serving as optical portals through which the cameras peers at the instrumented playing surface;

wherein said plurality of external microphones are mechanically attached and electrically connected to the package assemblies;

wherein the microphones is for capturing sounds conducted into said instrumented baseball pitcher's rubber caused by motions, actions and contacts with said instrumented baseball pitcher's rubber occurring during games on the instrumented playing surface;

wherein said plurality of external microphone is flush with said molded flat top surface of said instrumented baseball pitcher's rubber and is for capturing airborne sounds occurring around said instrumented baseball pitcher's rubber;

wherein the microphones and said external microphones are physically different from one another;

wherein said plurality of phased array antenna elements are mechanically attached and electrically connected to the package assemblies;

wherein said upper protective cover plate shield is comprised of:

a dome shaped circular disk-like object for protecting the package assembly from physical forces applied to said molded flat top of said conventional baseball pitcher's rubber form; and wherein said upper protective cover plate shield is deployed between said molded top and said first buffer plate assembly and the package assembly;

wherein said lower protective cover plate shield is comprised of:

a flat surface object configured for protecting the package assembly from physical forces applied to the molded flat bottom of said instrumented baseball pitcher's rubber; and wherein said first buffer plate assembly is:

an apparatus configured for mounting and aligning the package assembly inside said instrumented baseball pitcher's rubber;

wherein said first buffer plate assembly is comprised of:

at least one portal through said molded flat top of said conventional baseball pitcher's rubber form configured for permitting at least one the camera to peer through said portal and view the instrumented playing surface;

wherein the sequence of the physical elements in order of their occurrence measured from said molded top surface is said external microphones, said first upper protective cover plate shield, said first buffer plate assembly, the package assembly, said phased array antenna elements, and said first lower protective cover plate shield; and wherein said first upper protective cover plate shield is perforated through its said dome shaped top surface with at least one precision clearance bore of finite diameter symmetrically disposed coaxially below said precision bore in said molded flat top surface;

wherein said precision bore in said molded flat top surface is similarly coaxial with matching bores in said first buffer plate assembly and the package assembly.

47. The system of claim 42 wherein the instrumented sports paraphernalia is further comprised of:

at least one instrumented baseball pitcher's rubber;

wherein said instrumented baseball pitcher's rubber is comprised of:

a conventional baseball pitcher's rubber form;

wherein said conventional baseball pitcher's rubber form is configured for serving as a molded enclosure having four molded flat side surfaces which meet together to form four corners and a molded top surface and a molded bottom surface;

wherein furthermore said conventional baseball pitcher's rubber form is configured for serving as an enclosure for housing the package assembly;

wherein the package assembly is further comprised of:

at least one electronics for encoding the media content into data packets and communicating said data packets to the remote base station via the relay junction;

wherein the camera is a TV camera;

wherein furthermore said conventional baseball pitcher's rubber form is configured with at least one optical portal aperture of finite diameter disposed in said top surface for serving as a window through which the camera peers at the instrumented playing surface;

wherein the package assembly is configured to:

capture video from the top of said conventional baseball pitcher's rubber form;

capture conducted sounds through said conventional baseball pitcher's rubber form;

wherein the package assembly is molded and encapsulated within said conventional baseball pitcher's rubber form for shock-proofing and alignment; and wherein the tilt angle of the line of sight of the camera can be set relative to a normal to said top surface.

48. The system of claim 42 wherein the instrumented sports stadium is further comprised of:

a battery pack charging unit configured for wirelessly charging the battery pack within at least one the instrumented sports paraphernalia by magnetic induction coupling; and wherein said battery pack is for supplying electricity to the instrumented sports paraphernalia;

wherein said battery pack charging unit is comprised of:

an enclosure; and a primary induction coil; and wherein said enclosure is comprised of:

a top flat surface; and a bottom flat surface; and wherein said enclosure is configured for housing said primary induction coil with windings in a plane parallel to said top surface and said bottom flat surface; and wherein said primary induction coil is configured for creating lines of time varying magnetic flux in the 100 to 450 Khz frequency range to emerge perpendicular to said top flat surface and said bottom flat surface of said enclosure; and wherein said primary induction coil is configured with a finite diameter to coaxially immerse at least one the instrumented sports paraphernalia in said magnetic flux;

wherein said top flat surface is for retaining at least one of the instrumented sports paraphernalia in said magnetic flux; and alternately said bottom flat surface is for retaining at least one of the instrumented sports paraphernalia in said magnetic flux;

wherein said battery pack charging unit is furthermore comprised of:

a supporting electronics; and a CPU microprocessor and memory;

wherein said CPU microprocessor and memory is for running interrogative diagnostics for all operations and functions and status of at least one the instrumented sports paraphernalia; and wherein said supporting electronics is configured for applying current in the 100 to 450 Khz frequency range to said primary induction coil.

49. The system of claim 42 wherein the instrumented playing surface of the instrumented sports stadium is further comprised of:

a single contiguous underground trench comprising five contiguous segments;

wherein said single contiguous underground trench is configured for deploying fiber-optics signal cable and copper signal cable; and low voltage copper power cable carrying between 5 and 15 volts;

an off-field cable junction box I;

wherein said off-field cable junction box I is for serving as a communications cable hub between said fiber-optics signal cable and said copper signal cable and said copper low voltage power cable that are deployed in said single contiguous underground trench segments, and the relay junction; wherein said off-field cable junction box I is located off of the instrumented playing surface on the side-lines a finite distance from the conventional home plate location;

wherein said contiguous underground trench is comprised of:

five straight inter-connected underground trench segments; and wherein said five straight inter-connected underground trench segments are for linking said off-field cable junction box I underground to beneath the conventional home plate, conventional first base, conventional second base, conventional third base and conventional pitcher's rubber conventional baseball field locations; and wherein one trench segment interconnects the off-field cable junction box I location underground to beneath the conventional home plate location; and wherein one trench segment interconnects the conventional home plate location underground to beneath the conventional first base location; and wherein one trench segment interconnects the conventional first base location underground to beneath the conventional second base location; and wherein one trench segment interconnects the conventional second base location underground to beneath the conventional third base location; and wherein one trench segment interconnects the conventional third base location underground to beneath the conventional pitcher's rubber location; and wherein said fiber-optics signal cable and said copper signal cable are for carrying bi-directional encoded data communication signals; and said copper low voltage power cable for carrying low voltage power; and whereby the cable lengths are minimized thereby minimizing electrical noise and cable cost and providing voltage levels that are safe to the players.

50. The system of claim 42 wherein the instrumented playing surface of the instrumented sports stadium is further comprised of:

five interconnected underground trench segments; and wherein said interconnected underground trench segments are configured for deploying fiber-optics signal cable and copper signal cable; and copper low voltage power cable carrying between 5 and 15 volts;

an off-field cable junction box II; and wherein said off-field cable junction box II is for serving as a communications cable hub between said fiber-optics signal cable and said copper signal cable; and said copper low voltage power cable that are deployed in said contiguous underground trench segments, and the relay junction; wherein said off-field cable junction box II is located off of the instrumented playing surface on the side-lines at a finite distance from the conventional home plate location;

wherein said contiguous underground trench is comprised of:

five straight inter-connected underground trench segments; and wherein said five straight inter-connected underground trench segments are for linking said off-field cable junction box II underground to beneath the conventional home plate, conventional first base, conventional second base, conventional third base and conventional pitcher's rubber conventional baseball field locations; and wherein one trench segment interconnects the off-field cable junction box location underground to the conventional home plate location underground; and wherein one trench segment interconnects the conventional home plate location underground to the conventional pitcher's rubber location underground; and wherein one trench segment interconnects the conventional pitcher's rubber location underground to the conventional second base location underground; and wherein one trench segment interconnects the conventional home plate location underground to the conventional first base location underground; and wherein one trench segment interconnects the conventional home plate location underground to the conventional third base location underground; and wherein said fiber-optics signal cable and said copper signal cable are for carrying bi-directional encoded data communication signals; and said copper low voltage power cable for carrying low voltage power; and whereby the cable lengths are minimized thereby minimizing electrical noise and cable cost and providing voltage levels that are safe to the players.

51. The system of claim 43 wherein the package assembly of the instrumented baseball base is further comprised of:

a main enclosure;

wherein said main enclosure is the central body of the package assembly;

a rechargeable battery pack;

a phased array antenna;

a plurality of radial package assembly elements:

wherein each of said radial package assembly elements is comprised of:

a hollow flexible shock absorbing cylinder-like enclosure; and wherein said main enclosure is furthermore for serving as a hub for attaching said plurality of radial package assembly elements; and wherein said hollow flexible shock absorbing cylinder-like enclosure is for housing:

a electronics; and a camera lens; and an optical window; and wherein each of said plurality of said radial package assembly elements extends radially outward from said main enclosure by a finite distance;

wherein said optical window is disposed in a threaded cell-like sleeve which is threaded into an end of said hollow flexible shock absorbing cylinder-like enclosure of said radial package assembly element;

wherein said optical window is flush with the side of the instrumented baseball base;

wherein said optical window is for serving as a portal through said side for permitting the camera to peer onto the instrumented playing surface from inside the instrumented baseball base;

wherein furthermore said hollow flexible shock absorbing cylinder-like enclosure is for tilting the line of sight of the camera and said camera lens;

wherein said electronics is for encoding and communicating the video from the camera and audio from said plurality of the microphones to the relay junction;

wherein said phased array antenna is for wirelessly transmitting and receiving RF signals between the package assembly and the relay junction;

wherein said rechargeable battery pack is for providing a source of electricity to the package assembly.

52. The system of claim 43 wherein the instrumented baseball base is further comprised of:

a conventional baseball base form;

a first upper protective cover plate shield;

at least four first buffer plate assemblies;

a plurality of phased array antenna elements;

a plurality of external microphones;

a first lower protective cover plate shield;

wherein the conventional baseball base form is configured for serving as a molded enclosure having four molded side surfaces which meet together to form four corners and a top molded surface and a bottom molded surface having the identical exterior dimensions, shape, color and appearance as the conventional baseball base form;

wherein furthermore the conventional baseball base form is configured for serving as an enclosure for housing said first upper protective cover plate shield and said first buffer plate assemblies and the package assemblies and said plurality of phased array antenna elements and said plurality of external microphones and said first lower protective cover plate shield; and wherein said first upper protective cover plate shield, and said first buffer plate assemblies and the package assemblies and said plurality of phased array antenna elements and said plurality of external microphones and said first lower protective cover plate shield are molded and encapsulated within the conventional baseball base form for shock-proofing and alignment; and wherein furthermore the conventional baseball base form is perforated in each of its said molded side surfaces with at least one portal of finite diameter symmetrically disposed on each of said molded side surfaces and two portals of finite diameter symmetrically disposed across from each other on either side of said corners for serving as optical portals through which the cameras peer at the instrumented playing surface;

wherein said plurality of external microphones are mechanically attached and electrically connected to the package assemblies;

wherein the microphones is for capturing sounds conducted into the instrumented baseball base caused by motions, actions and contacts with the instrumented baseball base occurring during games on the instrumented playing surface;

wherein said plurality of external microphone are flush with said top molded surface and said molded side surfaces of the instrumented baseball base and are for capturing airborne sounds occurring around the instrumented baseball base;

wherein said plurality of phased array antenna elements are mechanically attached and electrically connected to the package assemblies for transmitting and receiving wireless RF signals to and from the relay junction;

wherein said plurality of phased array antenna elements are for adjusting to maximize the signal to noise ratio for transmitting and receiving wireless RF signals to and from the relay junction;

wherein said first upper protective cover plate shield is comprised of:

a flat surface square shaped plate I configured for protecting the package assembly from physical forces applied to said top molded surface and sides of the instrumented baseball base; and wherein said first upper protective cover plate shield is disposed below said top molded surface; and wherein said first lower protective cover plate shield is comprised of:

a flat surface square shaped plate II configured for protecting the package assembly from physical forces applied to said bottom surface of the instrumented baseball base; and wherein said first lower protective cover plate shield is disposed above said bottom molded surface; and wherein said first buffer plate assembly is comprised of:

a mounting apparatus for aligning the package assembly inside the instrumented baseball base;

wherein each said first buffer plate assembly is comprised of:

at least one portal through said molded side surface of the instrumented baseball base configured for permitting at least one the camera to peer through said portal and view the instrumented playing surface;

wherein said portal in said molded side surface is coaxial with clearance bores in said first buffer plate assembly and the package assembly.

53. The system of claim 43 wherein the instrumented baseball base is further comprised of:

a first buffer plate assembly, wherein said first buffer plate assembly is comprised of:

a unitary body having opposite ends: end 1 and end 2; and at least one set of three coaxially joined contiguous precision cylindrical bores: bore A, bore B and bore C;

a bore A having a finite diameter DA;

a bore B having a finite diameter DB;

a bore C having a finite diameter DC;

wherein said bore A is threaded;

wherein said diameter C is greater than said diameter DA;

wherein said diameter A is greater than said diameter DB;

wherein the finite thickness between said end 1 and said end 2 is T;

wherein said bore A has length LA;

wherein said bore B has length LB;

wherein said bore C has length LC;

wherein the sum of said lengths LA+LB+LC is equal to T;

wherein said bore A and said bore B join to form shoulder E;

wherein said bore B and said bore C join to form shoulder F;

wherein said shoulder F is for restraining the y-axial movement of the package assembly;

wherein said first buffer plate assembly further comprises:

a threaded cell-like sleeve; and wherein the inside diameter and outside diameter are threaded; and an optical window;

wherein said threaded cell-like sleeve is for housing and sealing said optical window;

wherein said outside diameter of said threaded cell-like sleeve is equal to DA;

wherein said inside diameter of said threaded cell-like sleeve is equal to DB;

wherein the length of said threaded cell-like sleeve is L;

wherein said threaded cell-like sleeve is threaded into said bore A for a distance LA till it bottoms on said shoulder F for permitting easy removal of said threaded cell-like sleeve for replacement of damaged said optical windows;

wherein said threaded cell-like sleeve protrudes from said end A by a distance equal to L−LA;

wherein said shoulder F is for restraining the y-axial movement of said wherein said first buffer plate assembly further comprises:

a plurality of o-ring seals, a plurality of annular grooves, wherein said plurality of annular grooves is disposed in said bore A and said bore B and said bore C for seating said plurality of o-rings for sealing against dirt and moisture and for providing shock and vibration isolation to the package assembly;

wherein said bore C acts as a co-axial shaft mounting bearing for holding and aligning the package assembly;

wherein said bore A and said bore B and said bore C is for providing the package assembly with an unobstructed field of view through for peering outside of the instrumented baseball base;

wherein each said set acts as a portal through which each the camera of the package assembly can peer outside of the instrumented baseball base.

54. The system of claim 43 wherein the instrumented baseball base is further comprised of:

a buffer plate assembly;

wherein said buffer plate assembly of the instrumented baseball base is comprised of:

a threaded cell-like sleeve; and an optical window;

wherein said threaded cell-like sleeve is threaded for sealing and retaining said optical window; and threaded for easy removal and replacement of damaged said optical windows; and wherein said optical window is an optical element for serving as a sealed optical portal through the instrumented baseball base through which the camera peers onto the instrumented playing surface; and wherein said optical window is for protecting the camera from damage.

55. The system of claim 43 wherein the package assembly of the instrumented baseball base is further comprised of:

at least one said package assembly element;

wherein said package assembly element is comprised of:

a camera lens; and an electronics; and an enclosure;

wherein said enclosure is comprised of three contiguous sections:

a small diameter hollow cylindrical enclosure segment;

a large diameter cylindrical hollow enclosure segment; a hollow corrugated bellows enclosure segment;

wherein said small diameter hollow cylindrical enclosure segment is for mounting said camera lens;

wherein said large diameter cylindrical hollow enclosure segment is for mounting the camera;

wherein said hollow corrugated bellows enclosure segment is for mounting said electronics;

wherein said small diameter hollow cylindrical enclosure segment and said large diameter cylindrical hollow enclosure segment are connected by a shoulder;

wherein said three contiguous section connections are air tight; wherein said enclosure is sealed and pressurized with dry gas for protecting said camera lens and the said camera and said electronics; and wherein said enclosure is made of materials which are transparent to radio frequencies and air tight;

wherein said electronics is for RF wirelessly communicating video and audio data to the remote base station via the relay junction;

wherein furthermore said electronics means is for communicating picture and sound data using fiber optics/copper cable to the remote base station via the relay junction.

56. The system of claim 43 wherein the package assembly of the instrumented baseball base is further comprised of:

an induction coil; and a rechargeable battery pack; and a power supply electronics;

wherein said induction coil is for wirelessly receiving time varying magnetic flux in the 100 to 400 kHz frequency range from an external charging source for charging said rechargeable battery pack;

wherein said power supply electronics is for controlling the charging of said rechargeable battery pack from said induction coil; and for controlling and managing power consumption from said rechargeable battery pack.

57. The system of claim 43 wherein the molded bottom surface of the instrumented baseball base is configured to electrically connect to the copper low voltage power cable buried in the instrumented playing surface beneath the instrumented baseball base; and wherein the molded bottom surface of the instrumented baseball base is configured to electrically connect to the copper signal cable buried in the instrumented playing surface beneath the instrumented baseball base; and wherein said molded bottom surface of the instrumented baseball base is configured to connect to the fiber optics signal cable buried in the instrumented playing surface beneath the instrumented baseball base.

58. The system of claim 44 wherein the first buffer plate assembly of the instrumented baseball home plate is further comprised of:

a unitary body having opposite ends: end 1 and end 2; and at least one set of three coaxially joined contiguous precision cylindrical bores: bore A, bore B and bore C;
a bore A having a finite diameter DA;
a bore B having a finite diameter DB;
a bore C having a finite diameter DC;
wherein said bore A is threaded;
wherein said diameter C is greater than said diameter DA;
wherein said diameter A is greater than said diameter DB;
wherein thickness between said end 1 and said end 2 is T;
wherein said bore A has length LA;
wherein said bore B has length LB;
wherein said bore C has length LC;
wherein the sum of said lengths LA+LB+LC is equal to T;
wherein said bore A and said bore B join to form shoulder E;
wherein said bore B and said bore C join to form shoulder F;
wherein said shoulder F is for restraining the y-axial movement of the package assembly;
wherein the first buffer plate assembly further comprises:
a threaded cell-like sleeve; and wherein the inside diameter and outside diameter are threaded; and
an optical window;
wherein said threaded cell-like sleeve is for housing and sealing said optical window;
wherein the finite said outside diameter of said threaded cell-like sleeve is equal to DA;
wherein the finite said inside diameter of said threaded cell-like sleeve is equal to DB;
wherein the length of said threaded cell-like sleeve is L;
wherein said threaded cell-like sleeve is threaded into said bore A for a distance LA till it bottoms on said shoulder F for permitting easy removal of said threaded cell-like sleeve for replacement of damaged said optical windows;
wherein said threaded cell-like sleeve protrudes from said end 1 by a distance equal to L−LA;
wherein said shoulder F is for restraining the y-axial movement of said
wherein the first buffer plate assembly further comprises:
a plurality of o-ring seals,
a plurality of annular grooves,
wherein said plurality of annular grooves is disposed in said bore A and said bore B and said bore C for seating said plurality of o-rings for sealing against dirt and moisture and for providing shock and vibration isolation to the package assembly;
wherein said bore C acts as a co-axial shaft mounting bearing for holding and aligning the package assembly;
wherein said bore A and said bore B and said bore C is for providing the package assembly with an unobstructed field of view through for peering outside of the molded top surface of the instrumented baseball home plate;
wherein each of said bore A and said bore B and said bore C acts as a portal through which each the camera of the package assembly can peer outside of the molded top surface the instrumented baseball home plate.

59. The system of claim 44 wherein the first buffer plate assembly of the instrumented baseball home plate is further comprised of:

a threaded cell-like sleeve; and
an optical window;
wherein said threaded cell-like sleeve is threaded for sealing and retaining said optical window; and
threaded for easy removal and replacement of damaged said optical windows; and
wherein said optical window is an optical element for serving as a sealed optical portal through the molded top surface of the instrumented baseball home plate through which the camera peers onto the instrumented playing surface.

60. The system of claim 45 wherein the package assembly of the instrumented baseball home plate is further comprised of:

one main central body;
at least one supporting electronics; and
one rechargeable battery pack; and
at least one induction coils; and
four quad radio antenna array elements; and
wherein the package assembly is configured:
a) as an autonomous module designed as a sealed unit for being mounted inside the instrumented baseball home plate; and
b) for seeing and capturing video of the instrumented playing surface out of the top surface of the instrumented baseball home plate; and
c) for hearing ordinary and conducted sounds from the instrumented playing surface; and
d) for transmitting video and audio signals to the remote base station for processing; and for receiving control signals from the remote base station for controlling its functions; and for transmitting control status signals back to the remote base station for completing the feedback control loop; and
wherein said supporting electronics is comprised of:
a network transceiver; and
wherein at least one said supporting electronics is for wirelessly televising the media content captured from the cameras and the microphones and said plurality of external microphones to the remote base station via the relay junction; and
wherein at least one said supporting electronics is furthermore for televising the media content captured from the cameras and the microphones and said plurality of external microphones to the remote base station via at least one of a bi-directional fiber optics/copper cable communication link and one wireless RF radio link to the remote base station; and
wherein said supporting electronics is for receiving command and control signals from the remote base station for putting function settings on automatic under the control of said supporting electronics; and
wherein said network transceiver is for wirelessly transmitting real-time the media content from the cameras and the microphones and said plurality of external microphones via said quad radio antenna array elements to the remote base station; and
wherein furthermore said network transceiver is for providing for wirelessly receiving command and control radio signals from the remote base station; and wherein command and control signals received by said supporting electronics from the remote base station are for controlling the functions of the package assembly; and wherein said main central body is configured with a hollow cylindrical cavity with a cylindrical wall having an exterior and an inside diameter of finite dimensions; and wherein said main central body is for housing said rechargeable battery pack; and wherein said main central body is for housing said rechargeable battery pack which supplies electrical power to each of the elements within the package assembly; and wherein said main central body is configured with a removable lid on its bottom surface for accessing and servicing said rechargeable battery pack and contents therein; and wherein said lid is for allowing access to said rechargeable battery pack and the camera and said supporting electronics and said quad radio antenna array elements and the microphone for servicing; and wherein said inductive coil is attached to the bottom outside surface of said lid; and wherein a fiber optics/copper cable connector is attached through the bottom of said lid; and wherein said lid has a gas valve mounted on it for permitting dry gas to be injected into the cavity to pressurize the package assembly; and wherein said lid is for allowing access to switch selectable functions through the opening in the bottom of the instrumented baseball home plate; and wherein the package assembly is filled with a dry pressurized gas for preventing the entry of moisture and dirt;

wherein the cameras and said supporting electronics are joined to said main central body by corrugated bellows segments; and wherein the cameras look out of the top of the instrumented baseball home plate; and wherein camera lenses are for providing imagery of the instrumented playing surface to the cameras; and wherein any two of the cameras are for making a 3-D stereo camera pairs having their optical axes set parallel to one another; and wherein said camera lenses have o-ring seals for preventing leakage of a pressurized dry gas from the cavity of the package assembly; and wherein said quad radio antenna array elements are mounted radially in a horizontal plane 90 degrees apart from one another and extend outward through said cylindrical wall of said main central body; and wherein said quad radio antenna array elements are in quadrature to radiate radio signals to the relay junction with satisfactory gain for overcoming RF noise and for providing a large enough gain bandwidth product to accommodate real-time picture quality requirements; and wherein the relay junction is deployed in the sports stadium for receiving said radio signals from said quad radio antenna array elements; and wherein a helix antenna is wound on said inside diameter of said main central body for transmitting and receiving RF signals to and from the remote base station; and wherein said induction coils are for inductively coupling electrical energy into the package assembly for charging said rechargeable battery pack; and wherein said induction coils are wound on said exterior of said main central body enclosure for minimizing their heat transfer into said main central body enclosure cavity that would raise the temperature of said supporting electronics within said main central body enclosure cavity thereby lowering the signal to noise ratio; and wherein said induction coils are electrically connected through said cylindrical enclosure walls to said support electronics inside said main central body enclosure; and wherein said induction coil is for inductively coupling to a source of electrical power from a charging unit which is external to the instrumented baseball home plate by coaxially laying the charging unit flat on the top or bottom of the instrumented baseball home plate for charging said rechargeable battery pack; and wherein said corrugated bellows segment is for mechanically connecting said camera lens and the camera and said support electronics to said main central body; and wherein said corrugated bellows segment is mechanically flexible for tilting the line of sight of the camera and said camera lens relative to said main central body; and wherein said corrugated bellows segment is for pre-setting the tilt in place prior to encapsulation; and wherein said corrugated bellows segment is for mechanically connecting said camera lens and the camera and said support electronics to said main central body;

wherein said corrugated bellows segment is flexible for allowing the section containing said camera lens and the camera to be bent together in order to tilt the line of sight of the camera relative to said main central body and the instrumented baseball home plate; and wherein said corrugated bellows segment is for acting as a spring to resist shocks and vibration and for compressing and expanding its length when under stress from outside forces without damaging the contents of the package assembly; and wherein the microphones are for capturing the sounds of real-time contacts and impacts and shocks to the instrumented baseball home plate; and wherein the buffer plate assembly is for acting as a see-through bearing for mounting the package assembly inside the instrumented baseball home plate.

61. The system of claim 45 wherein the package assembly of the instrumented baseball home plate is further comprised of:

a camera lens; and an induction coil; and an electronics; and an enclosure;

wherein said enclosure is comprised of three contiguous sections:

a small diameter hollow cylindrical enclosure segment;

a large diameter cylindrical hollow enclosure segment;

a hollow corrugated bellows enclosure segment;

wherein said camera lens is for providing imagery for the camera;

wherein said small diameter hollow cylindrical enclosure segment is for mounting said camera lens;

wherein said large diameter cylindrical hollow enclosure segment is for mounting the camera;

wherein said hollow corrugated bellows enclosure segment is for mounting said electronics;

wherein said small diameter hollow cylindrical enclosure segment and said large diameter cylindrical hollow enclosure segment are connected by a shoulder;

wherein said three contiguous sections are air tight; wherein said enclosure is sealed and pressurized with dry gas for protecting said camera lens and the camera and said electronics;

wherein said enclosure is made of materials which are transparent to radio frequencies and air tight;

wherein said electronics is for RF wirelessly communicating picture and sound data to the remote base station via the relay junction;

wherein furthermore said electronics is for communicating picture and sound data using fiber optics/copper cable to the remote base station via the relay junction;

wherein furthermore said electronics is for controlling the electrical functions within the package assembly element.

62. The system of claim 46 wherein the first buffer plate assembly of the instrumented baseball pitcher's rubber is further comprised of:

a unitary body having opposite ends: end 1 and end 2; and at least one set of three coaxially joined contiguous precision cylindrical bores: bore A, bore B and bore C;

wherein bore A having a finite diameter DA;

wherein bore B having a finite diameter DB;

wherein bore C having a finite diameter DC;

wherein said bore A is threaded;

wherein said diameter C is greater than said diameter DA;

wherein said diameter A is greater than said diameter DB;

wherein the finite thickness between said end 1 and said end 2 is T;

wherein said bore A has length LA;

wherein said bore B has length LB;

wherein said bore C has length LC;

wherein the sum of said lengths LA+LB+LC is equal to T;

wherein said bore A and said bore B join to form shoulder E;

wherein said bore B and said bore C join to form shoulder F;

wherein said shoulder F is for restraining the y-axial movement of the package assembly;

wherein the first buffer plate assembly further comprises:

a threaded cell-like sleeve; and wherein the inside diameter and outside diameter are threaded; and an optical window;

wherein said threaded cell-like sleeve is for housing and sealing said optical window;

wherein said outside diameter of said threaded cell-like sleeve is equal to DA;

wherein said inside diameter of said threaded cell-like sleeve is equal to DB;

wherein the length of said threaded cell-like sleeve is L;

wherein said threaded cell-like sleeve is threaded into said bore A for a distance LA till it bottoms on said shoulder F for permitting easy removal of said threaded cell-like sleeve for replacement of damaged said optical windows;

wherein said threaded cell-like sleeve protrudes from said end 1 by a distance equal to L–LA;

wherein said shoulder F is for restraining the y-axial movement of said wherein the first buffer plate assembly further comprises:

a plurality of o-ring seals, a plurality of annular grooves, wherein said plurality of annular grooves is disposed in said bore A and said bore B and said bore C for seating said plurality of o-rings for sealing against dirt and moisture and for providing shock and vibration isolation to the package assembly;

wherein said bore C acts as a co-axial shaft mounting bearing for holding and aligning the package assembly;

wherein said bore A and said bore B and said bore C is for providing the package assembly with an unobstructed field of view through for peering outside of the top surface of the instrumented baseball pitcher's rubber;

wherein each said set acts as a portal through which each the camera of the package assembly can peer outside of the top surface of the instrumented baseball pitcher's rubber.

63. The system of claim 46 wherein the first buffer plate assembly of the instrumented baseball pitcher's rubber is comprised of:

a threaded cell-like sleeve; and an optical window;

wherein said threaded cell-like sleeve is threaded for sealing and retaining said optical window; and threaded for easy removal and replacement of damaged said optical windows; and wherein said optical window is an optical element for serving a sealed optical portal through said top surface of the instrumented baseball pitcher's rubber through which the camera peers onto the instrumented playing surface.

64. The system of claim 47 wherein the package assembly of the instrumented baseball pitcher's rubber is further comprised of:

one main central body;

at least two supporting electronics; and one rechargeable battery pack; and at least two induction coils; and four quad radio antenna array elements; and at least one corrugated bellows segment; and wherein the package assembly is further configured:

as an autonomous module designed as a sealed unit for being mounted inside the instrumented baseball pitcher's rubber; and for seeing and capturing video of the instrumented playing surface out of the top surface of the instrumented baseball pitcher's rubber; and for hearing ordinary and conducted sounds from the instrumented playing surface; and for transmitting video and audio signals to the remote base station for processing; and for receiving control signals from the remote base station for controlling its functions; and for transmitting control status signals back to the remote base station for completing the feedback control loop; and wherein said supporting electronics is comprised of:

a network transceiver; and wherein said network transceiver is for wirelessly televising media content captured from the cameras and the microphones and said plurality of external microphones to the remote base station via the relay junction; and wherein said network transceiver is furthermore for televising media content captured from the cameras and the microphones and said plurality of external microphones to the remote base station via at least one of a bi-directional fiber optics/copper cable communication link and one wireless RF radio link to the remote base station; and wherein furthermore said network transceiver is for receiving command and control signals from the remote base station for putting function settings on automatic under the control said supporting electronics; and wherein said network transceiver is for wirelessly transmitting real-time media content from the cameras and the microphones and said plurality of external microphones via said quad radio antenna array elements to the remote base station; and wherein furthermore said network transceiver is for providing for wirelessly receiving command and control radio signals from the remote base station; and wherein command and control signals received by said supporting electronics from the remote base station are for controlling the functions of the package assembly; and wherein said main central body is hollow cylindrical cavity having finite dimensions; and wherein said main central body is for housing said rechargeable battery pack; and wherein said hollow cylindrical cavity is configured with an inside diameter and an outside diameter; and wherein furthermore said main central body is for housing said rechargeable battery pack which supplies electrical power to each of the elements within the package assembly; and wherein furthermore said main central body is configured with a removable lid on its bottom for accessing and servicing said rechargeable battery pack and contents therein; and wherein said lid is for allowing access to said rechargeable battery pack and the camera and said supporting electronics and said quad radio antenna array elements and the microphone for servicing; and wherein one of the two said inductive coil is electrically attached to the bottom outside surface of said lid; and wherein said fiber optics/copper cable is electrically attached to said supporting electronics of the instrumented baseball pitcher's rubber through the bottom of said lid; and wherein said lid has a gas valve mounted on it for permitting a dry gas to be injected into the cavity to pressurize the package assembly; and wherein said lid is for allowing access to switch selectable functions through the opening in the bottom of the instrumented baseball pitcher's rubber; and wherein the package assembly is filled with a dry pressurized gas for preventing the entry of moisture and dirt;

wherein the cameras and said camera lenses and said supporting electronics are joined to said main central body by said corrugated bellows segments; and wherein the cameras look out of the top surface of the instrumented baseball pitcher's rubber; and wherein a camera lens is for providing imagery of the instrumented playing surface to the cameras; and wherein any two of the cameras are for forming a 3-D stereo camera pair; and wherein the optical axis of each of the cameras of said 3-D stereo camera pairs are set parallel to one another; and wherein said camera lenses have o-ring seals for preventing leakage of the pressurized dry gas from the cavity of the package assembly; and wherein said quad radio antenna array elements are mounted radially in a horizontal plane 90 degrees apart from one another and extend outward through the cylindrical wall of said main central body; and wherein furthermore said quad radio antenna array elements are in quadrature to radiate radio signals to the relay junction with satisfactory gain for overcoming RF noise and for providing a large enough gain bandwidth product to accommodate real-time picture quality requirements; and wherein the relay junction is deployed in the sports stadium for receiving said radio signals from said quad radio antenna array elements; and wherein a helix antenna is wound on said inside diameter of said main central body for transmitting and receiving RF signals to and from the remote base station; and wherein said two induction coils are for inductively coupling electrical energy into the package assembly for charging said rechargeable battery pack; and wherein furthermore said two induction coils are wound on the exterior of said main central body enclosure for minimizing their heat transfer into said main central body enclosure cavity that would raise the temperature of said supporting electronics within said main central body enclosure cavity thereby lowering the signal to noise ratio; and wherein said two induction coils are electrically connected to said supporting electronics; and wherein said two induction coils are referred to as the upper induction coil and the lower induction coil; wherein said upper induction coil and said lower induction coil is for inductively coupling to a source of electrical power from a charging unit which is external to the instrumented baseball pitcher's rubber by coaxially laying the external induction coil of the charging unit flat on the top or bottom of the instrumented baseball pitcher's rubber for charging said rechargeable battery pack; and wherein said corrugated bellows segment is for mechanically connecting said camera lens and the camera and said supporting electronics to said main central body; and wherein furthermore said corrugated bellows segment is mechanically flexible for tilting the line of sight of the camera and said camera lens relative to said main central body; and wherein furthermore said corrugated bellows segment is for pre-setting the tilt in place prior to encapsulation; and wherein furthermore said corrugated bellows segment is for mechanically connecting said camera lens and the camera and said supporting electronics to said main central body; and wherein furthermore said corrugated bellows segment is flexible for allowing the section containing said camera lens and the camera to be bent together in order to tilt the line of sight of the camera relative to said main central body; and wherein furthermore said corrugated bellows segment is for acting as a spring to resist shocks and vibration and for compressing and expanding its length when under stress from outside forces without damaging the contents of the package assembly; and wherein the microphones are for capturing the sounds of real-time contacts and impacts and shocks to the instrumented baseball pitcher's rubber; and wherein the buffer plate assembly is for acting as a see-through bearing for mounting the package assembly inside the instrumented baseball pitcher's rubber.

65. The system of claim 47 wherein the package assembly of the instrumented baseball pitcher's rubber is further comprised of:

at least one package assembly element;

wherein said package assembly element is comprised of:

a camera lens; and an induction coil; and an enclosure;

wherein said enclosure is comprised of three contiguous sections:

a small diameter hollow cylindrical enclosure segment;

a large diameter cylindrical hollow enclosure segment;

a hollow corrugated bellows enclosure segment;

wherein said small diameter hollow cylindrical enclosure segment is for mounting said camera lens;

wherein said large diameter cylindrical hollow enclosure segment is for mounting the camera;

wherein said hollow corrugated bellows enclosure segment is for mounting the electronics;

wherein said small diameter hollow cylindrical enclosure segment and said large diameter cylindrical hollow enclosure segment are connected by a shoulder;

wherein said three contiguous section connections are air tight; wherein said cylindrical hollow enclosure is sealed and pressurized with dry gas for protecting said camera lens and the camera and the electronics; and wherein said cylindrical hollow enclosure is made of materials which are transparent to radio frequencies and air tight;

wherein the electronics is for RF wirelessly communicating picture and sound data to the remote base station via the relay junction;

wherein furthermore the electronics is for communicating picture and sound data using a fiber optics/copper cable link to the remote base station via the relay junction.

66. The system of claim 49 wherein the instrumented sports paraphernalia is configured to electrically connect to the copper low voltage power cable buried in the instrumented playing surface beneath the instrumented sports paraphernalia; and wherein the instrumented sports paraphernalia is configured to electrically connect to the copper signal cable buried beneath the instrumented playing surface and under the instrumented sports paraphernalia; and wherein the instrumented sports paraphernalia is configured to connect to the fiber optics signal cable buried beneath the instrumented playing surface and under the instrumented sports paraphernalia.

67. The system of claim 50 wherein furthermore the instrumented sports paraphernalia is further configured to:

a) electrically connect to the copper low voltage power cable buried in the instrumented playing surface beneath the instrumented sports paraphernalia; and b) electrically connect to the copper signal cable buried in the instrumented playing surface beneath the instrumented sports paraphernalia; and c) electrically connect to the fiber optics signal cable buried in the instrumented playing surface beneath the instrumented sports paraphernalia.

* * * * *